US010757020B2

(12) United States Patent
Morris

(10) Patent No.: US 10,757,020 B2
(45) Date of Patent: Aug. 25, 2020

(54) ROUTING METHODS, SYSTEMS, AND COMPUTER PROGRAM PRODUCTS

(71) Applicant: SITTING MAN, LLC, Madison, GA (US)

(72) Inventor: Robert Paul Morris, Raleigh, NC (US)

(73) Assignee: SITTING MAN, LLC, Madison, GA (US)

(*) Notice: Subject to any disclaimer, the term of this patent is extended or adjusted under 35 U.S.C. 154(b) by 0 days.

(21) Appl. No.: 16/181,286

(22) Filed: Nov. 5, 2018

(65) Prior Publication Data

US 2019/0149449 A1 May 16, 2019

Related U.S. Application Data

(63) Continuation of application No. 14/274,632, filed on May 9, 2014, which is a continuation-in-part of (Continued)

(51) Int. Cl.
*G06F 15/16* (2006.01)
*H04L 12/741* (2013.01)
(Continued)

(52) U.S. Cl.
CPC ............ *H04L 45/745* (2013.01); *H04L 45/02* (2013.01); *H04L 45/04* (2013.01); *H04L 45/16* (2013.01);
(Continued)

(58) Field of Classification Search
CPC .............................. H04L 45/02; H04L 45/126
(Continued)

(56) References Cited

U.S. PATENT DOCUMENTS 5,195,181 A 3/1993 Bryant et al.
5,353,283 A 10/1994 Tsuchiya
(Continued)

FOREIGN PATENT DOCUMENTS

CN 1726679 A 1/2006
CN 101247253 A 8/2008
(Continued)

OTHER PUBLICATIONS

U.S. Appl. No. 61/831,932.
(Continued)

*Primary Examiner* — Oscar A Louie
*Assistant Examiner* — Oluwatosin M Gidado
(74) *Attorney, Agent, or Firm* — Patrick E. Caldwell, Esq.; The Caldwell Firm, LLC

(57) ABSTRACT

In one embodiment, a non-transitory computer-readable media is provided storing computer instructions that, when executed by one or more processors of a first node in a network, cause the first node to: receive an Internet Protocol (IP) packet that includes a first identifier and further includes an outside-scope second identifier that, for the first node, identifies a first region that does not include the first node and that is communicatively coupled to the first node via a second node; select, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment; and forward, via the outgoing network interface and to the second node, data received in the IP packet.

36 Claims, 229 Drawing Sheets

Related U.S. Application Data application No. 13/727,662, filed on Dec. 27, 2012, now abandoned, and a continuation-in-part of application No. 13/727,651, filed on Dec. 27, 2012, now abandoned, and a continuation-in-part of application No. 13/727,652, filed on Dec. 27, 2012, now abandoned, and a continuation-in-part of application No. 13/727,653, filed on Dec. 27, 2012, now abandoned, and a continuation-in-part of application No. 13/727,655, filed on Dec. 27, 2012, now abandoned, and a continuation-in-part of application No. 13/727,657, filed on Dec. 27, 2012, now abandoned, and a continuation-in-part of application No. 13/727,647, filed on Dec. 27, 2012, now abandoned, and a continuation-in-part of application No. 13/727,649, filed on Dec. 27, 2012, now abandoned.

(60) Provisional application No. 61/822,978, filed on May 14, 2013, provisional application No. 61/822,386, filed on May 12, 2013, provisional application No. 61/897,234, filed on Oct. 30, 2013, provisional application No. 61/830,064, filed on Jun. 1, 2013, provisional application No. 61/831,932, filed on Jun. 6, 2013, provisional application No. 61/833,565, filed on Jun. 11, 2013.

(51) Int. Cl.

| | |
|---|---|
| ***H04L 12/761*** | (2013.01) |
| ***H04L 12/751*** | (2013.01) |
| ***H04L 12/715*** | (2013.01) |
| ***H04L 12/707*** | (2013.01) |
| ***H04L 12/723*** | (2013.01) |
| *H04L 12/733* | (2013.01) |
| *H04L 29/12* | (2006.01) |

(52) U.S. Cl.
CPC .............. *H04L 45/22* (2013.01); *H04L 45/50* (2013.01); *H04L 45/126* (2013.01); *H04L 61/1511* (2013.01); *H04L 61/2007* (2013.01)

(58) Field of Classification Search
USPC .......................................................... 709/245
See application file for complete search history.

(56) References Cited

U.S. PATENT DOCUMENTS

| | | | |
|---|---|---|---|
| 5,426,639 | A | 6/1995 | Follett et al. |
| 5,452,293 | A | 9/1995 | Wilkinson et al. |
| 5,504,747 | A | 4/1996 | Sweazey |
| 5,649,108 | A | 7/1997 | Spiegel et al. |
| 5,764,624 | A | 6/1998 | Endo et al. |
| 5,845,086 | A | 12/1998 | Doebrich et al. |
| 5,968,124 | A | 10/1999 | Takahashi et al. |
| 6,032,197 | A | 2/2000 | Birdwell et al. |
| 6,205,429 | B1 | 3/2001 | Peng |
| 6,374,303 | B1 | 4/2002 | Armitage et al. |
| 6,574,195 | B2 | 6/2003 | Roberts |
| 6,577,600 | B1 | 6/2003 | Bare |
| 6,631,484 | B1 | 10/2003 | Born |
| 6,647,428 | B1 | 11/2003 | Bannai et al. |
| 6,650,640 | B1 | 11/2003 | Muller et al. |
| 6,675,218 | B1 | 1/2004 | Mahler et al. |
| 6,728,220 | B2 | 4/2004 | Behzadi |
| 6,816,460 | B1 | 11/2004 | Ahmed et al. |
| 6,963,570 | B1 | 11/2005 | Agarwal |
| 6,990,108 | B2 | 1/2006 | Karlsson et al. |
| 6,996,126 | B2 | 2/2006 | Deml et al. |
| 7,012,919 | B1 | 3/2006 | So et al. |
| 7,023,846 | B1 | 4/2006 | Andersson et al. |
| 7,031,253 | B1 | 4/2006 | Katukam et al. |
| 7,031,607 | B1 | 4/2006 | Smith |
| 7,047,114 | B1 | 5/2006 | Rogers |
| 7,061,921 | B1 | 6/2006 | Sheth |
| 7,065,040 | B2 | 6/2006 | Nagamine |
| 7,068,654 | B1 | 6/2006 | Joseph et al. |
| 7,072,346 | B2 | 7/2006 | Hama |
| 7,082,140 | B1 | 7/2006 | Hass |
| 7,088,721 | B1 | 8/2006 | Droz et al. |
| 7,154,416 | B1 | 12/2006 | Savage |
| 7,174,387 | B1 | 2/2007 | Shand et al. |
| 7,174,390 | B2 | 2/2007 | Schulter et al. |
| 7,177,311 | B1 | 2/2007 | Hussain et al. |
| 7,180,887 | B1 | 2/2007 | Schwaderer et al. |
| 7,181,742 | B2 | 2/2007 | Hooper |
| 7,254,138 | B2 | 8/2007 | Sandstrom |
| 7,260,097 | B2 | 8/2007 | Casey |
| 7,269,132 | B1 | 9/2007 | Casey et al. |
| 7,286,479 | B2 | 10/2007 | Bragg |
| 7,286,566 | B1 | 10/2007 | Parruck et al. |
| 7,315,541 | B1 | 1/2008 | Housel et al. |
| 7,330,440 | B1 | 2/2008 | Bryant et al. |
| 7,340,535 | B1 | 3/2008 | Alam |
| 7,359,377 | B1 | 4/2008 | Kompella et al. |
| 7,366,865 | B2 | 4/2008 | Lakshmanamurthy et al. |
| 7,373,401 | B1 | 5/2008 | Azad |
| 7,403,542 | B1 | 7/2008 | Thompson |
| 7,420,992 | B1 | 9/2008 | Fang et al. |
| 7,430,210 | B2 | 9/2008 | Havala et al. |
| 7,460,473 | B1 | 12/2008 | Kodama et al. |
| 7,462,639 | B2 | 12/2008 | Georges et al. |
| 7,463,639 | B1 | 12/2008 | Rekhter |
| 7,466,661 | B1 | 12/2008 | Previdi et al. |
| 7,471,669 | B1 | 12/2008 | Sabesan et al. |
| 7,529,224 | B2 | 5/2009 | Basso et al. |
| 7,551,632 | B2 | 6/2009 | Thubert et al. |
| 7,564,803 | B1 | 7/2009 | Minei et al. |
| 7,577,143 | B1 | 8/2009 | Kompella |
| 7,602,778 | B2 | 10/2009 | Guichard et al. |
| 7,610,330 | B1 | 10/2009 | Quinn et al. |
| 7,619,982 | B2 | 11/2009 | Blair et al. |
| 7,636,299 | B2 | 12/2009 | Asa et al. |
| 7,660,892 | B2 | 2/2010 | Choong et al. |
| 7,673,072 | B2 | 3/2010 | Boucher et al. |
| 7,675,861 | B2 | 3/2010 | Metzger et al. |
| 7,706,306 | B2 | 4/2010 | Bardalai et al. |
| 7,773,630 | B2 | 8/2010 | Huang et al. |
| 7,782,834 | B2 | 8/2010 | Chitrapu |
| 7,787,361 | B2 | 8/2010 | Rahman et al. |
| 7,813,356 | B2 | 10/2010 | Roberts |
| 7,817,667 | B2 | 10/2010 | Frederiksen et al. |
| 7,835,393 | B2 | 11/2010 | Ren et al. |
| 7,885,259 | B2 | 2/2011 | Filsfils |
| 7,885,294 | B2 | 2/2011 | Patel et al. |
| 7,894,352 | B2 | 2/2011 | Kompella et al. |
| 7,894,458 | B2 | 2/2011 | Jiang et al. |
| 7,933,272 | B2 | 4/2011 | Morris |
| 7,940,695 | B1 | 5/2011 | Bahadur et al. |
| 7,944,853 | B2 | 5/2011 | Eglin et al. |
| 7,970,931 | B2 | 6/2011 | Ventakaramaiah et al. |
| 7,983,174 | B1 | 7/2011 | Monaghan et al. |
| 8,000,267 | B2 | 8/2011 | Solis et al. |
| 8,004,967 | B2 | 8/2011 | Wang |
| 8,028,298 | B2 | 9/2011 | Moore |
| 8,064,441 | B2 | 11/2011 | Wijnands et al. |
| 8,065,439 | B1 | 11/2011 | Johnson et al. |
| 8,068,417 | B1 | 11/2011 | Roberts |
| 8,073,968 | B1 | 12/2011 | Shah et al. |
| 8,248,920 | B2 | 8/2012 | Tallet |
| 8,248,969 | B2 | 8/2012 | Yan |
| 8,254,272 | B1 | 8/2012 | Vasseur |
| 8,259,585 | B1 | 9/2012 | P et al. |
| 8,275,313 | B1 | 9/2012 | Myers et al. |
| 8,301,738 | B1 | 10/2012 | Alex |
| 8,310,957 | B1 | 11/2012 | Rekhter |
| 8,339,973 | B1 | 12/2012 | Pichumani et al. |
| 8,380,846 | B1 | 2/2013 | Abu-Ghazaleh et al. |
| 8,422,514 | B1 | 4/2013 | Kothari et al. |
| 8,456,987 | B1 | 6/2013 | Valluri et al. |
| 8,509,056 | B1 | 8/2013 | Arya et al. |

(56) References Cited

U.S. PATENT DOCUMENTS

| | | | |
|---|---|---|---|
| 8,537,840 | B1 | 9/2013 | Raszuk et al. |
| 8,542,706 | B2 | 9/2013 | Wang et al. |
| 8,611,335 | B1 | 12/2013 | Wu et al. |
| 8,619,817 | B1 | 12/2013 | Everson et al. |
| 8,630,167 | B2 | 1/2014 | Smith |
| 8,631,483 | B2 | 1/2014 | Soni et al. |
| 8,675,488 | B1 | 3/2014 | Sidebottom et al. |
| 8,693,341 | B2 | 4/2014 | Rajamanickam et al. |
| 8,705,533 | B1 | 4/2014 | Venkatraman et al. |
| 8,711,883 | B2 | 4/2014 | Kang et al. |
| 8,724,627 | B2 | 5/2014 | Filsfils et al. |
| 8,743,679 | B2 | 6/2014 | Gerstel et al. |
| 8,751,686 | B2 | 6/2014 | Filsfils et al. |
| 8,762,532 | B2 | 6/2014 | Kohlenz et al. |
| 8,792,384 | B2 | 7/2014 | Banerjee et al. |
| 8,798,047 | B1 | 8/2014 | Wadekar et al. |
| 8,813,220 | B2 | 8/2014 | Knapp et al. |
| 8,825,900 | B1 | 9/2014 | Gross et al. |
| 8,831,025 | B2 | 9/2014 | Finney et al. |
| 8,838,705 | B2 | 9/2014 | Zwaal et al. |
| 8,867,363 | B2 | 10/2014 | Mohapatra et al. |
| 8,873,409 | B2 | 10/2014 | Filsfils et al. |
| 8,891,532 | B1 | 11/2014 | Smith et al. |
| 8,892,772 | B1 | 11/2014 | Filsfils et al. |
| 8,908,517 | B2 | 12/2014 | Filsfils et al. |
| 8,913,613 | B2 | 12/2014 | Srinivasan et al. |
| 8,948,179 | B2 | 2/2015 | Zhao et al. |
| 8,953,590 | B1 | 2/2015 | Aggarwal et al. |
| 8,982,710 | B2 | 3/2015 | Meilik et al. |
| 9,014,049 | B2 | 4/2015 | Filsfils et al. |
| 9,015,299 | B1 | 4/2015 | Shah |
| 9,030,934 | B2 | 5/2015 | Shah et al. |
| 9,036,463 | B2 | 5/2015 | Bashandy et al. |
| 9,036,474 | B2 | 5/2015 | Dibirdi et al. |
| 9,049,233 | B2 | 6/2015 | Frost et al. |
| 9,065,750 | B2 | 6/2015 | Vasseur et al. |
| 9,094,335 | B2 | 7/2015 | Subramanian et al. |
| 9,094,337 | B2 | 7/2015 | Bragg et al. |
| 9,112,734 | B2 | 8/2015 | Edwards et al. |
| 9,118,572 | B2 | 8/2015 | Sajassi et al. |
| 9,124,652 | B1 | 9/2015 | Jain et al. |
| 9,143,395 | B2 | 9/2015 | Bashandy et al. |
| 9,178,796 | B2 | 11/2015 | Previdi et al. |
| 9,178,805 | B2 | 11/2015 | Goel |
| 9,185,022 | B2 | 11/2015 | Vasseur et al. |
| 9,197,508 | B2 | 11/2015 | Vasseur et al. |
| 9,231,726 | B2 | 1/2016 | Lee et al. |
| 9,253,041 | B2 | 2/2016 | Previdi et al. |
| 9,258,174 | B1 | 2/2016 | Gerstel et al. |
| 9,282,031 | B2 | 3/2016 | Liu et al. |
| 9,294,416 | B2 | 3/2016 | Ceccarelli et al. |
| 9,300,584 | B1 | 3/2016 | Filsfils et al. |
| 9,319,312 | B2 | 4/2016 | Filsfils et al. |
| 9,369,371 | B2 | 6/2016 | Filsfils et al. |
| 9,369,387 | B2 | 6/2016 | Filsfils et al. |
| 9,391,704 | B2 | 7/2016 | Gerstel et al. |
| 9,401,858 | B2 | 7/2016 | Francois et al. |
| 9,444,677 | B2 | 9/2016 | Kumar et al. |
| 9,462,043 | B2 | 10/2016 | Frost et al. |
| 9,479,403 | B2 | 10/2016 | Filsfils et al. |
| 9,491,686 | B2 | 11/2016 | Bosch et al. |
| 9,503,363 | B2 | 11/2016 | Sivabalan et al. |
| 9,525,619 | B2 | 12/2016 | Filsfils et al. |
| 9,544,232 | B2 | 1/2017 | Srinivasan et al. |
| 9,548,959 | B2 | 1/2017 | Boutros et al. |
| 9,559,954 | B2 | 1/2017 | Filsfils et al. |
| 9,565,160 | B2 | 2/2017 | Previdi et al. |
| 9,571,349 | B2 | 2/2017 | Previdi et al. |
| 9,590,850 | B2 | 3/2017 | Filsfils et al. |
| 9,634,867 | B2 | 4/2017 | Lee et al. |
| 9,634,924 | B2 | 4/2017 | Filsfils et al. |
| 9,634,929 | B2 | 4/2017 | Boutros et al. |
| 9,647,944 | B2 | 5/2017 | Filsfils et al. |
| 9,660,897 | B1 | 5/2017 | Gredler |
| 9,698,910 | B2 | 7/2017 | Filsfils et al. |
| 9,705,815 | B2 | 7/2017 | Mattson et al. |
| 9,749,227 | B2 | 8/2017 | Frost et al. |
| 9,780,909 | B2 | 10/2017 | Wood et al. |
| 9,813,333 | B2 | 11/2017 | Zhao et al. |
| 9,825,845 | B2 | 11/2017 | Wang et al. |
| 9,825,856 | B2 | 11/2017 | Yong et al. |
| 9,832,115 | B2 | 11/2017 | Cai et al. |
| 9,847,939 | B2 | 12/2017 | Patel et al. |
| 9,858,241 | B2 | 1/2018 | Srinivasan et al. |
| 9,912,577 | B2 | 3/2018 | Filsfils et al. |
| 9,929,946 | B2 | 3/2018 | Filsfils et al. |
| 9,942,057 | B2 | 4/2018 | Bryant et al. |
| 9,979,601 | B2 | 5/2018 | Filsfils et al. |
| 9,979,629 | B2 | 5/2018 | Sivabalan et al. |
| 10,142,160 | B1 | 11/2018 | Adams et al. |
| 10,212,076 | B1 | 2/2019 | Morris |
| 2001/0037401 | A1 | 11/2001 | Soumiya et al. |
| 2001/0040895 | A1 | 11/2001 | Templin |
| 2001/0052053 | A1 | 12/2001 | Nemirovsky et al. |
| 2002/0057651 | A1 | 5/2002 | Roberts |
| 2002/0057699 | A1 | 5/2002 | Roberts |
| 2002/0080786 | A1 | 6/2002 | Roberts |
| 2002/0099856 | A1 | 7/2002 | Shitama |
| 2002/0101868 | A1 | 8/2002 | Clear et al. |
| 2002/0103631 | A1 | 8/2002 | Feldmann et al. |
| 2002/0103732 | A1 | 8/2002 | Bundy et al. |
| 2002/0150094 | A1* | 10/2002 | Cheng .................. H04L 12/185 370/389 |
| 2002/0176371 | A1 | 11/2002 | Behzadi |
| 2002/0191541 | A1 | 12/2002 | Buchanan et al. |
| 2003/0016678 | A1 | 1/2003 | Maeno |
| 2003/0026271 | A1 | 2/2003 | Erb et al. |
| 2003/0039212 | A1 | 2/2003 | Lloyd et al. |
| 2003/0058790 | A1 | 3/2003 | Nagamine |
| 2003/0099194 | A1 | 5/2003 | Lee et al. |
| 2003/0099203 | A1 | 5/2003 | Rajan et al. |
| 2003/0118051 | A1 | 6/2003 | Ooms |
| 2003/0126272 | A1 | 7/2003 | Corl et al. |
| 2003/0133412 | A1 | 7/2003 | Iyer et al. |
| 2003/0142674 | A1 | 7/2003 | Casey |
| 2003/0142685 | A1 | 7/2003 | Bare |
| 2003/0179742 | A1 | 9/2003 | Ogier et al. |
| 2003/0231634 | A1 | 12/2003 | Henderson et al. |
| 2004/0032856 | A1 | 2/2004 | Sandstrom |
| 2004/0160958 | A1 | 8/2004 | Oh |
| 2004/0174879 | A1 | 9/2004 | Basso et al. |
| 2004/0196840 | A1 | 10/2004 | Amrutur et al. |
| 2004/0196854 | A1 | 10/2004 | Thubert et al. |
| 2004/0202158 | A1 | 10/2004 | Takeno et al. |
| 2004/0218535 | A1 | 11/2004 | Liong et al. |
| 2004/0219922 | A1 | 11/2004 | Gage et al. |
| 2004/0240442 | A1 | 12/2004 | Grimminger et al. |
| 2004/0249951 | A1 | 12/2004 | Grabelsky et al. |
| 2005/0066017 | A1 | 3/2005 | Bogia |
| 2005/0071130 | A1 | 3/2005 | Benjamin et al. |
| 2005/0073958 | A1 | 4/2005 | Atlas et al. |
| 2005/0105515 | A1 | 5/2005 | Reed et al. |
| 2005/0152298 | A1* | 7/2005 | Thubert .................. H04L 29/06 370/312 |
| 2005/0174998 | A1 | 8/2005 | Vesterinen et al. |
| 2005/0213513 | A1 | 9/2005 | Ngo et al. |
| 2005/0232303 | A1 | 10/2005 | Deforche et al. |
| 2005/0240943 | A1 | 10/2005 | Smith et al. |
| 2005/0259586 | A1 | 11/2005 | Hafid et al. |
| 2005/0259655 | A1 | 11/2005 | Cuervo et al. |
| 2006/0002304 | A1 | 1/2006 | Ashwood-Smith |
| 2006/0013209 | A1 | 1/2006 | Somasundaram |
| 2006/0039371 | A1 | 2/2006 | Castro et al. |
| 2006/0045088 | A1 | 3/2006 | Nguyen |
| 2006/0056397 | A1 | 3/2006 | Aizu et al. |
| 2006/0075134 | A1 | 4/2006 | Aalto et al. |
| 2006/0080421 | A1 | 4/2006 | Hu |
| 2006/0092940 | A1 | 5/2006 | Ansari et al. |
| 2006/0126272 | A1 | 6/2006 | Horio et al. |
| 2006/0146696 | A1 | 7/2006 | Li et al. |
| 2006/0182034 | A1 | 8/2006 | Klinker et al. |
| 2006/0187817 | A1 | 8/2006 | Charzinski et al. |
| 2006/0215544 | A1 | 9/2006 | Asa et al. |
| 2006/0239199 | A1 | 10/2006 | Blair et al. |

(56) References Cited

U.S. PATENT DOCUMENTS

2006/0239201 A1 10/2006 Metzger et al.
2006/0262735 A1 11/2006 Guichard et al.
2006/0274716 A1 12/2006 Oswal et al.
2007/0019647 A1 1/2007 Roy et al.
2007/0053342 A1 3/2007 Sierecki et al.
2007/0058638 A1 3/2007 Guichard et al.
2007/0064715 A1 3/2007 Lloyd et al.
2007/0112975 A1 5/2007 Cassar
2007/0133406 A1 6/2007 Vasseur
2007/0147363 A1 6/2007 Oswal et al.
2007/0171825 A1 7/2007 Roberts et al.
2007/0171826 A1 7/2007 Roberts et al.
2007/0189291 A1 8/2007 Tian
2007/0230362 A1 10/2007 Bardalai et al.
2007/0237160 A1 10/2007 Natarajan et al.
2007/0245034 A1 10/2007 Retana et al.
2007/0266148 A1* 11/2007 Ruiz .................. H04L 41/5038 709/224
2008/0002699 A1 1/2008 Rajsic
2008/0025203 A1 1/2008 Tallet
2008/0034116 A1 2/2008 Li et al.
2008/0037117 A1 2/2008 Seki et al.
2008/0075016 A1 3/2008 Ashwood-Smith
2008/0075117 A1 3/2008 Tanaka
2008/0084881 A1 4/2008 Dharwadkar et al.
2008/0101227 A1 5/2008 Fujita et al.
2008/0101239 A1 5/2008 Goode
2008/0101367 A1 5/2008 Weinman
2008/0172497 A1 7/2008 Mohan et al.
2008/0189393 A1 8/2008 Wagner
2008/0192762 A1 8/2008 Kompella et al.
2008/0212465 A1 9/2008 Yan
2008/0225864 A1 9/2008 Aissaoui et al.
2008/0253367 A1 10/2008 Ould-Brahim
2008/0259820 A1 10/2008 White et al.
2008/0279201 A1 11/2008 Lu et al.
2009/0041038 A1 2/2009 Martini et al.
2009/0049194 A1 2/2009 Csaszar et al.
2009/0067445 A1 3/2009 Diguet et al.
2009/0080431 A1 3/2009 Rekhter
2009/0135815 A1 5/2009 Pacella
2009/0141721 A1 6/2009 Filsfils
2009/0161576 A1 6/2009 Morris
2009/0175274 A1 7/2009 Aggarwal et al.
2009/0213858 A1 8/2009 Dolganow et al.
2009/0252161 A1 10/2009 Morris
2009/0285101 A1 11/2009 Lu
2009/0290486 A1 11/2009 Wang
2009/0296710 A1 12/2009 Agrawal et al.
2009/0310481 A1 12/2009 Deng et al.
2009/0323694 A1 12/2009 Miki et al.
2009/0323696 A1 12/2009 Schwan et al.
2010/0010975 A1 1/2010 Morris
2010/0010992 A1 1/2010 Morris
2010/0011048 A1 1/2010 Morris
2010/0014424 A1 1/2010 Agrawal et al.
2010/0027509 A1* 2/2010 Velev .................... H04W 8/082 370/331
2010/0063983 A1 3/2010 Groarke et al.
2010/0088717 A1 4/2010 Candelore et al.
2010/0103937 A1 4/2010 O'Neil
2010/0124220 A1 5/2010 Morris
2010/0124231 A1 5/2010 Kompella
2010/0128628 A1 5/2010 Wu et al.
2010/0142401 A1 6/2010 Morris
2010/0142548 A1 6/2010 Sheth
2010/0145602 A1 6/2010 Morris
2010/0145963 A1 6/2010 Morris
2010/0146132 A1 6/2010 Morris
2010/0161732 A1 6/2010 Morris
2010/0195516 A1 8/2010 McReynolds et al.
2010/0202455 A1 8/2010 Sundaram et al.
2010/0220739 A1 9/2010 Ishiguro
2010/0232435 A1 9/2010 Jabr et al.
2010/0241742 A1 9/2010 Douceur et al.
2010/0250777 A1 9/2010 Morris
2010/0265943 A1 10/2010 Dong et al.
2010/0272110 A1 10/2010 Allan et al.
2010/0284309 A1 11/2010 Allan et al.
2010/0290480 A1 11/2010 Westphal et al.
2011/0007670 A1 1/2011 Yan
2011/0060844 A1 3/2011 Allan et al.
2011/0063986 A1 3/2011 Denecheau et al.
2011/0090913 A1 4/2011 Kim et al.
2011/0216779 A1 9/2011 Peterson et al.
2011/0228780 A1 9/2011 Ashwood-Smith et al.
2011/0261722 A1 10/2011 Awano
2011/0268114 A1 11/2011 Wijnands et al.
2011/0273980 A1 11/2011 Smith
2011/0280123 A1 11/2011 Wijnands et al.
2011/0286326 A1 11/2011 Awano
2011/0286452 A1 11/2011 Balus et al.
2012/0044944 A1 2/2012 Kotha et al.
2012/0063526 A1 3/2012 Xiao et al.
2012/0069740 A1 3/2012 Lu et al.
2012/0069845 A1 3/2012 Carney et al.
2012/0075988 A1 3/2012 Lu et al.
2012/0076014 A1 3/2012 Bragg
2012/0082034 A1 4/2012 Vasseur
2012/0092986 A1 4/2012 Chen
2012/0106560 A1 5/2012 Gumaste
2012/0120808 A1 5/2012 Nandagopal et al.
2012/0120959 A1 5/2012 Krause
2012/0147768 A1 6/2012 Johnsson et al.
2012/0163384 A1 6/2012 Takase et al.
2012/0170461 A1 7/2012 Long
2012/0179796 A1 7/2012 Nagaraj et al.
2012/0213225 A1 8/2012 Subramanian et al.
2012/0218884 A1 8/2012 Kini et al.
2012/0230255 A1* 9/2012 Li ......................... H04B 7/022 370/328
2012/0236860 A1 9/2012 Kompella et al.
2012/0239799 A1 9/2012 Wang et al.
2012/0287818 A1 11/2012 Corti et al.
2012/0307629 A1 12/2012 Vasseur et al.
2013/0003728 A1 1/2013 Kwong et al.
2013/0021908 A1 1/2013 Ceccarelli et al.
2013/0051237 A1 2/2013 Ong
2013/0058345 A1 3/2013 Kano
2013/0077476 A1 3/2013 Enyedi et al.
2013/0077624 A1 3/2013 Keesara et al.
2013/0077625 A1 3/2013 Khera et al.
2013/0077626 A1 3/2013 Keesara et al.
2013/0114402 A1 5/2013 Ould-Brahim et al.
2013/0142052 A1 6/2013 Burbidge et al.
2013/0188634 A1 7/2013 Magee
2013/0219034 A1 8/2013 Wang et al.
2013/0227108 A1 8/2013 Dunbar et al.
2013/0232193 A1 9/2013 Ali et al.
2013/0250809 A1 9/2013 Hui et al.
2013/0258842 A1 10/2013 Mizutani
2013/0266012 A1 10/2013 Dutta et al.
2013/0266013 A1 10/2013 Dutta et al.
2013/0322248 A1 12/2013 Guo
2013/0343204 A1 12/2013 Geib et al.
2014/0003425 A1 1/2014 Zhao et al.
2014/0010083 A1 1/2014 Hamdi et al.
2014/0056300 A1 2/2014 Zhao et al.
2014/0067911 A1 3/2014 Block et al.
2014/0098675 A1 4/2014 Frost et al.
2014/0160925 A1 6/2014 Xu et al.
2014/0169370 A1 6/2014 Filsfils et al.
2014/0173078 A1 6/2014 McCord et al.
2014/0177637 A1 6/2014 Duncan et al.
2014/0177638 A1 6/2014 Bragg et al.
2014/0185618 A1 7/2014 Perlman et al.
2014/0189045 A1 7/2014 Morris
2014/0189081 A1 7/2014 Morris
2014/0189152 A1 7/2014 Morris
2014/0189153 A1 7/2014 Morris
2014/0189154 A1 7/2014 Morris
2014/0189155 A1 7/2014 Morris
2014/0189156 A1 7/2014 Morris
2014/0189159 A1 7/2014 Morris

(56) References Cited

U.S. PATENT DOCUMENTS

| | | | |
|---|---|---|---|
| 2014/0192677 | A1 | 7/2014 | Chew et al. |
| 2014/0198634 | A1 | 7/2014 | Kumar et al. |
| 2014/0204946 | A1 | 7/2014 | Li |
| 2014/0211794 | A1 | 7/2014 | Frost et al. |
| 2014/0215087 | A1 | 7/2014 | Zhao et al. |
| 2014/0226662 | A1 | 8/2014 | Frost et al. |
| 2014/0233385 | A1 | 8/2014 | Beliveau et al. |
| 2014/0254596 | A1 | 9/2014 | Filsfils et al. |
| 2014/0269266 | A1 | 9/2014 | Filsfils et al. |
| 2014/0269421 | A1 | 9/2014 | Previdi et al. |
| 2014/0269422 | A1 | 9/2014 | Filsfils et al. |
| 2014/0269698 | A1 | 9/2014 | Filsfils et al. |
| 2014/0269699 | A1 | 9/2014 | Filsfils et al. |
| 2014/0269721 | A1 | 9/2014 | Bashandy et al. |
| 2014/0269725 | A1 | 9/2014 | Filsfils et al. |
| 2014/0269727 | A1 | 9/2014 | Filsfils et al. |
| 2014/0286195 | A1 | 9/2014 | Fedyk |
| 2014/0317259 | A1 | 10/2014 | Previdi et al. |
| 2014/0328207 | A1 | 11/2014 | Agrawal et al. |
| 2014/0341222 | A1 | 11/2014 | Filsfils et al. |
| 2014/0363160 | A1 | 12/2014 | Gumaste et al. |
| 2014/0369356 | A1 | 12/2014 | Bryant et al. |
| 2015/0003455 | A1 | 1/2015 | Haddad et al. |
| 2015/0003458 | A1 | 1/2015 | Li et al. |
| 2015/0003463 | A1 | 1/2015 | Li et al. |
| 2015/0023328 | A1 | 1/2015 | Thubert et al. |
| 2015/0030020 | A1 | 1/2015 | Kini et al. |
| 2015/0109902 | A1 | 4/2015 | Kumar et al. |
| 2015/0156035 | A1 | 6/2015 | Foo et al. |
| 2015/0188804 | A1 | 7/2015 | Ashwood-Smith |
| 2015/0195197 | A1 | 7/2015 | Yong et al. |
| 2015/0200843 | A1 | 7/2015 | Frost et al. |
| 2015/0207671 | A1 | 7/2015 | Farkas et al. |
| 2015/0236959 | A1 | 8/2015 | Cai et al. |
| 2015/0256456 | A1 | 9/2015 | Previdi et al. |
| 2015/0263940 | A1 | 9/2015 | Kini et al. |
| 2015/0271066 | A1 | 9/2015 | Frost et al. |
| 2015/0271102 | A1 | 9/2015 | Antich |
| 2015/0326473 | A1 | 11/2015 | Dunbar et al. |
| 2015/0326675 | A1 | 11/2015 | Kini et al. |
| 2015/0381406 | A1 | 12/2015 | Francois et al. |
| 2016/0006614 | A1 | 1/2016 | Zhao |
| 2016/0021000 | A1 | 1/2016 | Previdi et al. |
| 2016/0028640 | A1 | 1/2016 | Zhang et al. |
| 2016/0173366 | A1 | 6/2016 | Saad et al. |
| 2016/0191372 | A1 | 6/2016 | Zhang et al. |
| 2016/0254987 | A1 | 9/2016 | Eckert et al. |
| 2016/0254988 | A1 | 9/2016 | Eckert et al. |
| 2016/0254991 | A1 | 9/2016 | Eckert et al. |
| 2016/0352629 | A1 | 12/2016 | Wang et al. |
| 2016/0352654 | A1 | 12/2016 | Filsfils et al. |
| 2016/0373317 | A1 | 12/2016 | Ali et al. |
| 2017/0005877 | A1 | 1/2017 | Papadimitriou |
| 2017/0019330 | A1 | 1/2017 | Filsfils et al. |
| 2017/0041223 | A1 | 2/2017 | Akashi |
| 2017/0048138 | A1 | 2/2017 | Sivabalan et al. |
| 2017/0064717 | A1 | 3/2017 | Filsfils et al. |
| 2017/0104673 | A1 | 4/2017 | Bashandy et al. |
| 2017/0111261 | A1 | 4/2017 | Francois et al. |
| 2017/0111277 | A1 | 4/2017 | Previdi et al. |
| 2017/0230274 | A1 | 8/2017 | Filsfils et al. |
| 2017/0302561 | A1 | 10/2017 | Filsfils et al. |
| 2017/0302571 | A1 | 10/2017 | Frost et al. |
| 2017/0324497 | A1 | 11/2017 | Ruffini et al. |
| 2017/0324654 | A1 | 11/2017 | Previdi et al. |
| 2017/0331672 | A1 | 11/2017 | Fedyk et al. |
| 2017/0346718 | A1 | 11/2017 | Psenak et al. |
| 2017/0346737 | A1 | 11/2017 | Previdi et al. |
| 2017/0366453 | A1 | 12/2017 | Previdi et al. |
| 2018/0034728 | A1 | 2/2018 | Filsfils et al. |
| 2018/0041420 | A1 | 2/2018 | Saad et al. |
| 2018/0083871 | A1 | 3/2018 | Filsfils et al. |
| 2018/0109450 | A1 | 4/2018 | Filsfils et al. |
| 2018/0131616 | A1 | 5/2018 | LaBerge et al. |
| 2018/0302320 | A1 | 10/2018 | Aranha et al. |

FOREIGN PATENT DOCUMENTS

| | | | |
|---|---|---|---|
| CN | 101399688 | A | 4/2009 |
| CN | 101496357 | A | 7/2009 |
| CN | 101803293 | A | 8/2010 |
| CN | 101841442 | A | 9/2010 |
| CN | 101616466 | B | 12/2010 |
| CN | 102098222 | A | 6/2011 |
| CN | 102132533 | A | 7/2011 |
| CN | 102299852 | A | 12/2011 |
| CN | 102498694 | A | 6/2012 |
| CN | 101931548 | B | 9/2012 |
| CN | 102714625 | A | 10/2012 |
| EP | 2974164 | A1 | 1/2016 |
| EP | 2974176 | A1 | 1/2016 |
| WO | 2009018728 | A1 | 2/2009 |
| WO | 2015063618 | A1 | 5/2015 |
| WO | 2015094296 | A1 | 6/2015 |

OTHER PUBLICATIONS

U.S. Appl. No. 61/833,565.

U.S. Appl. No. 61/897,234.

U.S. Appl. No. 61/621,811.

U.S. Appl. No. 61/729,119.

Filsfils et al., "Segment Routing Architecture," Cisco Systems, Inc., draft-filsfils-rtgwg-segment-routing-00, Jun. 28, 2013, pp. 1-28.

Filsfils et al., "Segment Routing Architecture," Cisco Systems, Inc., draft-filsfils-rtgwgsegment-routing-01, Network Working Group, Internet-Draft, Oct. 21, 2013, pp. 1-28.

Filsfils et al., "Segment Routing Architecture," Cisco Sytems, Inc., draft-filsfilsrtgwg-segment-routing-01, Network Working Group, Internet-Draft, Oct. 21, 2013, pp. 1-28.

Filsfils et al., "Segment Routing Architecture," draft-ietf-spring-segment-routing-07, Network Working Group, Internet-Draft, Dec. 15, 2015, pp. 1-24.

Filsfils et al., "Segment Routing Interoperability with LDP," Cisco Systems, Inc., draft-filsfils-springsegment-routing-ldp-interop-01; Apr. 18, 2014, pp. 1-16.

Filsfils et al., "Segment Routing Interoperability with LDP," Cisco Systems, Inc., draft-filsfils-spring-segment-routingldp-interop-01.txt, Apr. 18, 2014, pp. 1-16.

Filsfils et al., "Segment Routing Use Cases," draft-filsfils-rtgwg-segment-routing-use-cases-01, Network Working Group, Internet-Draft, Jul. 14, 2013, pp. 1-46.

Filsfils et al., "Segment Routing Use Cases," draft-filsfils-rtgwg-segment-routing-use-cases-02, Network Working Group, Internet-Draft, Oct. 21, 2013, pp. 1-36.

Filsfils et al., "Segment Routing with MPLS Data Plane," draft-ietf-spring-segment-routing-mpls-05, Network Working Group, Internet-Draft, Jul. 6, 2016, 15 pages.

Frost et al., "MPLS Generic Associated Channel (G-Ach) Advertisement Protocol," Cisco Systems, Inc., draft-ietfmpls-gach-adv-00, Internet-Draft, Jan. 27, 2012, pp. 1-17.

Frost et al., "MPLS Generic Associated Channel (G-Ach) Advertisement Protocol," Cisco Systems, Inc., draft-ietfmpls-gach-adv-08, Internet-Draft, Jun. 7, 2013, pp. 1-22.

Frost et al., "MPLS Generic Associated Channel (G-Ach) Advertisement Protocol," Cisco Systems, Inc., Request for Comments 7212, Jun. 2014, pp. 1-23.

Fuller, V, et al, "Classless Inter-Domain Routing (CIDR): An Address Assignment and Aggregation Strategy", RFC 1519, pp. 1-24, Internet Engineering Task Force (IEFT), http:l/tools.ieft.org/rfc/rfc1519.txt, Jun. 1999.

Fuller, V. et al, "Classless Inter-Domain Routing (CIDR): an Address Assignment and Aggregation Strategy" RFC 1519, Network Working Group, CIDR Address Strategy, Sep. 1993, 24 pages.

Geib, R., "Segment Routing Based OAM Use Case," IETF 87, Berlin, Jul./Aug. 2013, pp. 1-3.

Geib, R., "Use Case for a Scalable and Topology Aware MPLS data plan moniotoring System," Deutsch Telekom, draft-geib-spring-oam-usecase-01, Internet-Draft, Feb. 5, 2014, pp. 1-10.

(56) References Cited

OTHER PUBLICATIONS

Geib, R., "Use Case for a Scalable and Topology Aware MPLS data plan monitoring System," Deutsch Telekom, draft-geib-spring-oam-usecase-00, Internet-Draft, Oct. 17, 2013, pp. 1-7.
Gerla, M., et al, "Fisheye State Routing Protocol (FSR) for Ad Hoc Netvvorks", draft-ietf-manet-fsr-03.txt, pp. 1-17, Internet Engineering Task Force,http:f/tools.ietf.org/html/draft-ietf-manet-fsr-03.txt, Jun. 2002.
Glenn, R. et al, "The NULL Encryption Algorithm and Its Use With Ipsec" RFC 2410, Network Working Group, Nov. 1998, 6 pages.
Gredler et al., "Advertising MPLS Labels in IS-IS draftgredler-isis-label-advertisement-00," Juniper Networks, Inc., Internet-Draft, Apr. 5, 2013, pp. 1-13.
Gredler et al., "Advertising MPLS LSPs in the IGP," hannes@juniper.net, IETF87, Berlin, draft-gredler-ospf-label-advertisement-03, May 21, 2013, pp. 1-17.
Guilbaud, "Google-Localizing Packet Loss in a Large Complex Network," Nicolas Guilbaud and Ross Cartlidge, Google Presentation, Feb. 5, 2013, pp. 1-43.
Gupta, P. et al, "Routing Lookups in Hardware at Memory Access Speeds," Computer Systems Laboratory, Stanford University, Stanford, CA 94305-9030, 8 pages.
Halpern et al., "Service Function Chaining (SFC) Architecture—draft-ietf-sfc-architecture-09," Network Workinq Group, Internet-Draft, Jun. 7, 2015, pp. 1-29.
Hass, Z., et al, "The Interzone Routing Protocol (IERP) for Ad Hoc Networks", draft-ietf-manet-zone-ierp-02.txt, pp. 1-14, Internet Engineering Task Force,http://tools.ietf.org/html/draft-ietf-manet-zone-ierp-02.txt, Jul. 2002.
Hedrick, C, "Routing Information Protoocl", RFC 1058, pp. 1-33, Internet Engineering Task Force, http://tools.ietf.org/rfc/rfc1058.txt, Jun. 1988.
Hinden et al "IPv6 Global Unicast Address Format" RFC 3587, Aug. 2003, 5 pages.
Hinden, R. et al, "An IPv6 Aggregatable Global Unicast Address Format" RFC 2374, Network Working Group, Jul. 1998, 12 pages.
Hinden, R. et al, "Internet Protocol Version 6 (IPv6) Addressing Architecture" RFC 3513, Network Working Group, Apr. 2003, 26 pages.
Hinden, R., et al, "Internet Protocol Version 6 (IPv6) Addressing Architecture", RFC 3513, pp. 1-26, Internet Engineering Task Force, http://tools.ietf.org/rfc/rfc3513.txt, Apr. 2003.
Hinden, R., et al,, "Aggregatable Global Unicast Address Format", RFC 2374, pp. 1-12, Internet Engineering Task Force, http:/tools.ietf.org/rfc/rfc2374, Jul. 1998.
Housley, R., "Using Advanced Encryption Standard (AES) CCM Mode with IPsec Encapsulating Security Payload (ESP)," Network Working Group, RFC 4309, Standards Track, Dec. 2005, 13 pages; https://tools.ietf.org/pdf/rfc4309.pdf.
Hu, Y., et al, "Flow State in Dynamic Source Routing Protocol for Mobile Ad Hoc Networks", draft-ietf-manet-dsrflow-00.txt, pp. 1-30, Internet Engineering Task Force,http://tools.ietf.org/html/drafl-ietf-manet-dsrflow-OO.txt, Feb. 2001.
Hui. J .. et al. ""An IPv6 Routing Header for Source Routes with the Routing Protocol for Low-Power and Lossy Networks (RPL)"". RFC 6554. pp. 1-13. Internet Engineering Task Force. http://tools.ietf.org/rfc/rfc6554.txt. Mar. 2012.
Imaizumi et al., "FMEHR: An Alternative Approach to Multi-Path Forwarding on Packed Switched Networks," Networks, 2005, pp. 196-201.
Jiang, M., et al, "Cluster Based Routing Protocol (CBR)", ddrafl-ietf-manet-cbrp-spec-01.txt, pp. 1-27, Internet Engineering Task Force,http://tools.ietf.org/html/ddrafl-ietf-manet-cbrp-spec-01.txt, Aug. 1999.
Johnson, D., et al, "The Dynamic Source Routing Protocol (DSR) for Mobile Ad Hoc Networks for IPv4", RFC 4728, pp. 1-107, Internet Engineering Task Force, http://lools.ielf.org/rfc/rfc4728.lxl, Feb. 2007.
Kent et al., "Security Architecture for the Internet Protocol," Network Working Group, RFC 4301, Standards Track, Dec. 2005, 101 pages; https://tools.ietf.org/pdf/rfc4301.pdf.
Kettaf, N., et al, "Admission Control enabled on demand Routing (ACOR)", drafl-kettaf-manet-acor-03.txt pp. 1-24, Internet Engineering Task Forcer,http://tools.ietf.org/html/draft-kettaf-manet-acor-03.txt, Oct. 2007.
Kompella et al, "Label Switched Paths (LSP) Hierarchy with Generalized Multi-Protocol Label Switching (GMPLS) Traffic Enginerring (TE)," Juniper Networks, Network Working Group, Request for Comments 4206, Oct. 2005, pp. 1-14.
Kompella et al., "Detecting Multi-Protocol Label Switched (MPLS) Data Plane Failures," Juniper Networks, Inc., Network Working Group, Request for Comments 4379, Feb. 2006, pp. 1-50.
Kompella et al., "Virtual Private LAN Service (VPLS) Using BGP for Auto-Discovery and Signaling," Network Working Group, Request for Comments 4761, Juniper Networks, Jan. 2007, pp. 1-28.
Kumar et al., "Label Switched Path (LSP) Ping/Trace for Segment Routing Networks Using MPLS Dataplane," Cisco Systems, Inc., draft-kumar-mpls-spring-lsp-ping-00, Oct. 21, 2013, pp. 1-12.
Kumar et al., "Label Switched Path (LSP) Ping/Trace for Segment Routing Networks Using MPLS Dataplane," draft-ietf-mpls-spring-lsp-ping-00, Network Work Group, Internet Draft, May 10, 2016, 17 pages.
Kumar et al., "Label Switched Path (LSP) Ping/Trace for Segment Routing Networks Using MPLS Dataplane," draftkumarkini-mpls-spring-lsp-ping-00, Network Work Group, Internet-Draft, Jan. 2, 2014, pp. 1-15.
Notice of Allowance dated Mar. 1, 2019 for U.S. Appl. No. 15/961,826.
Notice of Allowance dated Mar. 7, 2019 for U.S. Appl. No. 15/961,832.
Dffice Action dated Jan. 22, 2019 for U.S. Appl. No. 16/153,223.
Dffice Action dated Jan. 24, 2019 for U.S. Appl. No. 16/153,262.
Dffice Action dated Feb. 7, 2019 for U.S. Appl. No. 16/153,168.
Dffice Action dated Feb. 26, 2019 for U.S. Appl. No. 16/153,146.
Dffice Action dated Mar. 12, 2019 for U.S. Appl. No. 16/153,196.
Office Action dated Mar. 14, 2019 for U.S. Appl. No. 16/195,827.
Office Action dated Mar. 21, 2019 for U.S. Appl. No. 16/195,816.
Office Action dated Mar. 21, 2019 for U.S. Appl. No. 16/195,830.
Abandonment dated Jun. 24, 2019 for U.S. Appl. No. 15/961,832.
Advisory_Action_dated Sep. 17, 2019_for_U.S. Appl. No. 16/195,830.
Final Rejection dated Jun. 13, 2019 for U.S. Appl. No. 16/153,114.
Final Rejection dated Jun. 14, 2019 for U.S. Appl. No. 16/195,823.
Final Rejection dated Jun. 17, 2019 for U.S. Appl. No. 16/195,827.
Final Rejection dated Jul. 12, 2019 for U.S. Appl. No. 16/264,580.
Final Rejection dated Jul. 22, 2019 for U.S. Appl. No. 16/195,830.
NOA_dated Aug. 22, 2019_for_U.S. Appl. No. 16/153,262.
NOA_dated Aug. 26, 2019_for_U.S. Appl. No. 16/153,114.
Non-Final Rejection dated May 15, 2019 for U.S. Appl. No. 16/181,286.
Non-Final Rejection dated Jun. 10, 2019 for U.S. Appl. No. 16/296,195.
Non-Final Rejection dated Jun. 14, 2019 for U.S. Appl. No. 16/269,524.
Non-Final Rejection dated Jul. 31, 2019 for U.S. Appl. No. 16/454,040.
Non-Final Rejection dated Aug. 1, 2019 for U.S. Appl. No. 16/454,030.
Non-Final Rejection dated Aug. 1, 2019 for U.S. Appl. No. 16/454,043.
Non-Final_Rejection_dated Sep. 12, 2019_for_U.S. Appl. No. 16/195,823.
Notice of Allowance dated May 16, 2019 for U.S. Appl. No. 16/153,262.
Notice of Allowance dated May 17, 2019 for U.S. Appl. No. 16/153,050.
Notice of Allowance dated May 22, 2019 for U.S. Appl. No. 16/101,382.
Notice of Allowance dated May 24, 2019 for U.S. Appl. No. 16/101,387.
Notice of Allowance dated May 28, 2019 for U.S. Appl. No. 16/101,386.
Notice of Allowance dated May 28, 2019 for U.S. Appl. No. 16/195,816.
Notice of Allowance dated May 31, 2019 for U.S. Appl. No. 16/101,382.
Notice of Allowance dated Jun. 1, 2019 for U.S. Appl. No. 15/961,826.

(56) References Cited

OTHER PUBLICATIONS

Notice of Allowance dated Jun. 4, 2019 for U.S. Appl. No. 15/961,828.
Notice of Allowance dated Jun. 4, 2019 for U.S. Appl. No. 15/961,832.
Notice of Allowance dated Jun. 7, 2019 for U.S. Appl. No. 16/101,380.
Notice of Allowance dated Jun. 14, 2019 for U.S. Appl. No. 16/195,832.
Notice of Allowance dated Jun. 24, 2019 for U.S. Appl. No. 16/101,386.
Notice of Allowance dated Jun. 11, 2019 for U.S. Appl. No. 16/153,146.
Notice of Allowance dated Jun. 11, 2019 for U.S. Appl. No. 16/153,196.
Notice of Allowance dated Jun. 11, 2019 for U.S. Appl. No. 16/153,223.
Notice of Allowance dated Jul. 3, 2019 for U.S. Appl. No. 16/153,196.
Notice of Allowance dated Jul. 12, 2019 for U.S. Appl. No. 16/195,827.
Notice of Allowance dated Jul. 22, 2019 for U.S. Appl. No. 16/101,387.
Notice of Allowance dated Jul. 22, 2019 for U.S. Appl. No. 16/153,050.
Notice of Allowance dated Jul. 22, 2019 for U.S. Appl. No. 16/153,168.
Notice of Allowance dated Jul. 31, 2019 for U.S. Appl. No. 16/101,380.
Notice of Allowance dated Aug. 5, 2019 for U.S. Appl. No. 16/153,146.
Notice of Allowance dated Aug. 9, 2019 for U.S. Appl. No. 16/153,223.
Notice of Allowance dated Aug. 12, 2019 for U.S. Appl. No. 16/153,262.
Notice of Allowance dated Aug. 13, 2019 for U.S. Appl. No. 16/195,827.
Notice of Allowance dated Sep. 5, 2019 for U.S. Appl. No. 16/264,580.
Reconsideration After Non-Final Rejection dated Apr. 9, 2019 for U.S. Appl. No. 16/153,114.
Reconsideration After Non-Final Rejection dated May 17, 2019 for U.S. Appl. No. 16/264,580.
Reconsideration After Non-Final Rejection dated May 20, 2019 for U.S. Appl. No. 16/264,580.
Final Rejection dated Mar. 28, 2019 for U.S. Appl. No. 16/101,386.
Non-Final Rejection filed Apr. 17, 2019 for U.S. Appl. No. 16/195,832.
Non-Final Rejection dated Apr. 4, 2019 for U.S. Appl. No. 16/153,114.
Non-Final Rejection dated May 6, 2019 for U.S. Appl. No. 16/264,580.
Notice of Allowance filed Mar. 29, 2019 for U.S. Appl. No. 16/101,382.
Notice of Allowance filed Mar. 29, 2019 for U.S. Appl. No. 16/101,387.
Notice of Allowance filed Apr. 17, 2019 for U.S. Appl. No. 16/153,146.
Notice of Allowance filed Apr. 19, 2019 for U.S. Appl. No. 16/195,816.
Notice of Allowance filed Apr. 12, 2019 for U.S. Appl. No. 16/101,386.
Notice of Allowance dated Mar. 27, 2019 for U.S. Appl. No. 15/961,828.
Notice of Allowance dated Apr. 17, 2019 for U.S. Appl. No. 16/153,146.
Notice of Allowance dated Apr. 19, 2019 for U.S. Appl. No. 16/195,816.
Notice of Allowance dated Apr. 25, 2019 for U.S. Appl. No. 16/153,223.
Notice of Allowance dated Apr. 29, 2019 for U.S. Appl. No. 16/153,196.
Notice of Allowance dated Apr. 30, 2019 for U.S. Appl. No. 15/961,826.
Response to Final Office Action dated Apr. 30, 2019 for U.S. Appl. No. 16/153,050.
Abley. J .. et al. ""Deprecation of Type 0 Routing Headers in IPv6"". RFC 5095. pages 1-7. Internet Engineering Task Force. http://tools.ielf.org/rfc/rfc5095.txt. Dec. 2007.
Aggarwal et al., "MPLS Upstream Label Assignment and Context Specific Label Space," Network Working Group, FRC 5331, Aug. 2008, 13 pages.
Akiya et al., "Seamless Bidirectional Forwarding Detection (BFD) for Segment Routing (SR)," draft-akiyabfd-seamless-sr-01, Internet Engineering Task Force, Internet-Draft, Dec. 5, 2013, 7 pages.
Akiya et al., "Seamless Bidirectional Forwarding Detection (BFD) for Segment Routing (SR)," draft-akiyabfd-seamless-sr-02, Internet Engineering Task Force, Internet-Draft, Jun. 7, 2014, 7 pages.
Akiya et al., "Seamless Bidirectional Forwarding Detection (BFD) for Segment Routing (SR)," draft-akiyabfd-seamless-sr-03, Internet Engineering Task Force, Internet-Draft, Aug. 23, 2014, 7 pages.
Akiya et al., "Seamless Bidirectional Forwarding Detection (BFD) for Segment Routing (SR)," draft-akiyabfd-seamless-sr-04, Internet Engineering Task Force, Internet-Draft, Feb. 23, 2015, 7 pages.
Akiya et al., "Seamless Bidirectional Forwarding Detection (BFD) for Segment Routing (SR)," draft-akiyabfdseamless-sr-00, Internet Engineering Task Force, Internet-Draft, Jun. 7, 2013, 7 pages.
Akiya, N., "Segment Routing Implications on BFD," Sep. 9, 2013, 2 pages.
Alcatel-Lucent, "Segment Routing and Path Computation Element—Using Traffic Engineering to Optimize Path Placement and Efficiency in IP/MPLS Networks," Technology White Paper, 2015, 28 pages.
Aldrin et al., "Seamless Bidirectional Forwarding Detection (S-BFD) Use Cases," draft-ietf-bfd-seamlessuse-aase-08, Network Working Group, Internet-Draft, May 6, 2016, 15 pages.
Almquist, P., "Type of Service in the Internet Protocol Suite", RFC 1349, pp. 1-28, Internet Engineering Task Force, http://lools.ielf.org/rfc./rfc1349. lxl, Jul. 1992.
Awduche et al., "Overview and Principles of Internet Traffic Engineering," Network Working Group, Request for Comments, 3272, May 2002, pp. 1-71.
Awduche et al., "Requirements for Traffic Engineering Over MPLS," Network Working Group, Request for Comments, 2702, Sep. 1999, pp. 1-29.
Awduche et al., "RSVP-TE: Extensions to RSVP for LSP Tunnels," Network Working Group, Internet-Draft, Feb. 2001, pp. 1-12.
Awduche et al., "RSVP-TE: Extensions to RSVP for LSP Tunnels," Network Working Group, RFC 3209, Dec. 2001, pp. 1-61.
Backes et al., "Deutsche Telekom AG's Statement About IPR Related to Draft-Geig-Spring-OAM-Usecase-01," Aug. 23, 2012, pp. 1-2.
Backes et al., "Deutsche Telekom AG's Statement About IPR Related to Draft-Geig-Spring-OAM-Usecase-01," Feb. 5, 2014, pp. 1-2.
Baker, F. (ed), "Requirements for IP Version 4 Routers", RFC 1812, pp. 1-175, Internet Engineering Task Force, http://tools.ietf.org/rfc/rfc1812.txt, Jun. 1995.
Bates et al., "Multiprotocol Extensions for BGP-4," Network Working Group, RFC 4760, Standards Track, Jan. 2007, 47 pages; https://tools.ietf.org/pdf/rfc4760.pdf.
Begtasevic, F. et al. "Measurements of the Hopcount in Internet," Delft University of Technology, Information Technology and Systems, 7 pages.
Bergkvist, J., et al, "Boomerang—A Simple Resource Reservation Framework for IP", drafl-ietf-manet-cbrp-spec-01.txt, pp. 1-15, Internet Engineering Task Force.http ://tools.ietf.org/html/drafl-ietf-manet-cbrp-spec-01.txt, Nov. 2000.
Bryant et al., "IP Fast Reroute Using Tunnels-draft-bryant-ipfrr-tunnels-03," Cisco Systems, Network Working Group, Internet-Draft, Nov. 16, 2007, pp. 1-30.
Bryant et al., "Remote LFA FRR," Cisco Systems, draft-ietf-rtgwg-remote-lfa-04, Network Working Group, Internet-Draft, Nov. 22, 2013, pp. 1-24.
Chandranmenon, Girish and Varghese, George. "Trading Packet Headers for Packet Processing," SIGCOMM, 1995.
Chroboczek, J., "The Babel Routing Protocol", RFC 6126, pp. 1-45, Internet Engineering Task Force, http://tools.ietf_org/rfc/rfc6126.txt, Apr. 2011.

(56) References Cited

OTHER PUBLICATIONS

Cisco Systems, Inc., "Introduction to Intermediate System-to-Intermediate System Protocol," published 1992-2002; pp. 1-25.
Clausen,T. et al {ed), "Optimized Link State Routing Protocol {OSLR)", RFC 3626, pp. 1-75, Internet Engineering Task Force, http://tools.ietf.org/rfc/rfc3626.txt, Oct. 2003.
Bolton, R., et al, "OSPF for IPv6", RFC 2740, pp. 1-80, Internet Engineering Task Force, http:fftools.ietf.org/rfc/rfc2740.txt, Dec. 1999.
Crabbe et al., "PCEP Extensions for MPLS-TE LSP Protection With Stateful PCE Draft-Crabbe-PCE-Stateful-PCE-Protection-00," Network Working Group, Internet-Draft, Oct. 2012, pp. 1-12.
Crabbe et al., "PCEP Extensions for MPLS-TE LSP Protection With Stateful PCE Draft-Crabbe-PCE-Stateful-PCTProtection-04," Network Working Group, Internet-Draft, May 8, 2013, pp. 1-54.
Crabbe et al., Stateful PCE Extensions for MPLS-TE LSPs, draft-crabbe-pce-stateful-pce-mpls-te-00, Network Working Group, Internet-Draft, Oct. 15, 2012, pp. 1-15.
Crabbe et al., "Stateful PCE Extensions for MPLS-TE LSPs," draft-crabbe-pce-statement-pce-mpls-te-01, Network Norking Group, Internet-Draft, May 8, 2013, pp. 1-11.
Deering et al., "Internet Protocol, Version 6 (1Pv6) Specification," Cisco, Network Working Group, Request for Comments 2460, Dec. 1998, pp. 1-39.
Deering, S, et al, "Internet Protocol, Version 6, (IPv6) Specification", RFC 2460, pp. 1-39, Internet Engineering Task Force (IEFT), http://tools.iefl.org/rfc/rfc2460. txt, Dec. 1998.
Deering, S. (ed)., "ICMP Router Discovery Messages", RFC 1256, pp. 1-19, Internet Engineering Task Force, http://tools. ielf. org/rfc/rfc1256. !xi, Sep. 1991.
Deering, S. et al, "IPv6 Scoped Address Architecture" RFC 4007, Network Working Group, Mar 2005, 24 pages.
Dragos Niculescu, "Survey of Active Network Research", Retrieved on Jul. 22, 2004, Jul. 1999, pp. 1-13.
Eckert et al., "Traffic Engineering for Bit Index Explicit Replication BIER-TE, draft-eckert-bier-te-arch-01," Network Working Group, Internet-Draft, Jul. 5, 2015, pp. 1-23.
Eckert T., "Traffic Engineering for Bit Index Explicit Replication BIER-TE, draft-eckert-bier-te-arch-00," Network Eorking Group, Internet-Draft, Mar. 5, 2015, pp. 1-21.
Estrin, D. et al, "A Unified Approach to Inter-Domain Routing", RFC 1322, pp. 1-38, Internet Engineering Task Force, http://lools. ielf.org/rfc/rfc1322.lx., May 1992.
Esytrin, D. et al, "Source Demand Routing: Packet Format and Forwarding Specification (Version 1 ).", RFC 1940, pp. 1-27, Internet Engineering Task Force, http://lools.ielf.org/rfc/rfc1940.lxl, May 1996.
Farinacci et al., "Generic Routing Encapsulation (GRE)," Network Working Group, RFC 2784, Standards Track, Mar. 2000, 9 pages; https://tools.ietf.org/pdf/rfc2784.pdf.
Farrel et al., "A Path Computation Element (PCE)-Based Architecture," Old Dog Consulting, Network Working Group, Request for Comments 4655, Aug. 2006, pp. 1-80.
Farrel et al., "Inter-Domain MPLS and GMPLS Traffic Enginerring—Resource Reservation Protocol-Traffic Enginerring (RSVP-TE) Extensions," Old Dog Consulting, Newtork Working Group, Request for Comments 5151, Feb. 2008, pp. 1-25.
Farrel, "Path Computation Element," Presentation, 11th Annual International Conference on Next Generation Internet and Related Technologies MPLS 2008, Oct. 19-22, 2008, 57 pages.
Fedyk et al., "Generalized Multiprotocol Label Switching (GMPLS) Control Ethernet Provider Backbone Traffic Engineering (PBB-TE)," Alcatel-Lucent, Internet Engineering Task Force (IETF), Request for Comments 6060, Mar. 2011, pp. 1-20.
U.S. Appl. No. 61/710,121.
U.S. Appl. No. 61/822,386.
U.S. Appl. No. 61/822,978.
U.S. Appl. No. 61/830,064.
Kumar et al., "OAM Requirements for Segment Routing Network," draft-kumar-spring-sr-oam-requirement-00, Spring, Internet-Draft, Feb. 14, 2014, 6 pages.
Kumar et al., "OAM Requirements for Segment Routing Network," draft-kumar-spring-sr-oam-requirement-01, Spring; Internet-Draft, Jul. 1, 2014, 6 pages.
Kumar et al., "OAM Requirements for Segment Routing Network," draft-kumar-spring-sr-oam-requirement-02, Spring, Internet-Draft, Dec. 31, 2014, 6 pages.
Kumar et al., "OAM Requirements for Segment Routing Network," draft-kumar-spring-sr-oam-requirement-03, Spring, Internet-Draft, Mar. 9, 2015, 6 pages.
Lauder, P. et al, "Hierarchical Network Routing," Software Systems Research Group, Department of Computer Scient, University of Sydney, 13 pages, available at www.janeelix.com/piers/papers/Routing/routing.html.
Li et al., "IS-IS Extensions for Traffic Engineering," Redback Networks, Inc., Network Working Group, Request for Comments 5305, Oct. 2008, 17 pages.
Li, T. (ed), "Recommendataion for a Routing Architecture", RFC 6115, pp. 1-73, Internet Engineering Task Force, http:/ftools.ietf.org/rfc/rfc6115.txt, Feb. 2011.
Lougheed, K., et al, (ed.),"A Border Gateway Protocol 3 (BGP-3)", RFC 1267, pp. 1-35, Internet Engineering Task Force, http://tools.ietf.org/rfc/rfc1267.txt, Oct. 1991.
Mahalingam et al., "Virtual eXtensible Local Area Network (VXLAN): A Framework for Overlaying Virtualized Layer 2 Networks over Layer 3 Networks," Network Working Group, RFC 7348, Aug. 2014, 22 pages; https://tools.ietf.org/pdf/rfc7348.pdf.
Metaswitch Networks, "PCE—An Evolutionary Approach to SDN," Metaswitch Networks White Paper, 2010, 21 pages; http://www.metaswitch.com/sites/default/files/metaswitch-white-paper-pce-an-evolutionary-approach-to-sdn.pdf.
Moy, J, "OSPF Version 2", RFC 2328, pp. 1-13, Internet Engineering Task Force, http://tools.ietf.org/rfc/rfc2328.txt, Oct. 1991.
Neumann, A., et al, "Better Approach to Mobile Ad-hoc Networking (BAT.MAN.)", draft-wunderlich-openmesh-manet-routing-00.txt pp. 1-24, Internet Engineering Task Force,http://tools.ietf.org/html/drafl-wunderlich-openmesh-manet-routing-003.txt, Apr. 2008.
Office Action Summary in U.S. Appl. No. 13/727,662 dated Apr. 10, 2015.
Oran, D., (ed.), "OSI IS-IS Intrad-domain Routing Protocol", RFC 1142, pp. 1-193, Internet Engineering Task Force, http://tools.ietf.org/rfc/rfc1142. txt, Feb. 1990.
Pao, D. et al, "Efficient Hardware Architecture for Fast IP Address Lookup" IEEE, Proceedings Twenty First Annual Joint Conference of the IEEE Computer and Communications Societies, Jun. 23-27, 2002, vol. 2, pp. 555-561.
Perkins, C. et al, "Ad hoc On-Demand Distance Vector (AODV) Routing", RFC 3561, pp. 1-37, Internet Engineering Task Force, http://lools.ielf.org/rfc/rfc3561.lxl, Jul. 2003.
Pignataro et al., "Seamless Bidirectional Forwarding Detection (S-BFD) for IPv4, IPv6 and MPLS," draftietf-bfd-seamless-ip-06, Internet Engineering Task Force, Internet-Draft, May 6, 2016, 8 pages.
Pignataro et al.,"Seamless Bidirectional Forwarding Detection (S-BFD)," draft-ietf-bfd-seamless-base-11, Internet Engineering Task Force, Internet-Draft, May 6, 2016, 21 pages.
Postel, J et al "Comments on the IP Source Route Option" RFC unnumbered, IETF 1987, 18 pages.
Postel, J. et al. "Darpa Internet Program Protocol Specification RFC 791", Sep. 1981, prepared for DARPA by Information Sciences Institute, University of Southern California, 50 pages, IETF.
Postel, J; "Internet Protocol, DARPA Internet Protocol Specification", RFC 791 ,pp. 1-45, Internet Engineering Task Force (IEFT), http://tools.iefl.org/rfc/rfc791.txt, Sep. 1981.
Postel, John (ed.), Editor; "Transmission Control Protocol—DARPA Internet Protocol Specification", RFC 793, pp. 1-85, USC/Information Sciences Institute, http://tools.ietf.org/rfc/rfc793.txt, Sep. 1981.
Previdi et al., "IS-IS Extensions for Segment Routing," draft-ietf-isis-segment-routing-extensions-05, IS-IS for IP Internets, Internet-Draft, Jun. 30, 2015, pp. 1-37.

(56) References Cited

OTHER PUBLICATIONS

Previdi et al., "IS-IS Extensions for Segment Routing," draft-ietf-isis-segment-routing-extensions-06, IS-IS for IP Internets, Internet-Draft, Dec. 14, 2015, pp. 1-39.
Previdi et al., "Segment Routing Egress Peer Engineering BGPLS Extensions", Network Working Group Internet-Draft, < draft-previdi-idr-bgpls-segment-routing-epe-01 >, Internet Engineering Task Force Trust, Oct. 25, 2014, 16 pages.
Previdi et al., "Segment Routing with IS-IS Routing Protocol, draft-previdi-filsfils-isis-segment-routing-00," Cisco Systems, Inc., IS-IS for IP Internets, Internet-Draft, Mar. 12, 2013, pp. 1-27.
Previdi et al., "Segment Routing with IS-IS Routing Protocol, draft-previdi-filsfils-isis-segment-routing-02," Cisco Systems, Inc., Internet-Draft Mar. 20, 2013, pp. 1-27.
Psenak et al. "OSPF Extensions for Segment Routing," draft-ietf-ospf-segment-routing-extensions-05, Open Shortest Path First IGP, Internet-Draft, Jun. 26, 2015, pp. 1-29.
Quinn et al., "Network Service Header—draft-quinn-sfc-nsh-07.txt," Network Working Group, Internet-Draft, Feb. 24, 2015, pp. 1-43.
Raszuk, R., "MPLS Domain Wide Labels," NTT 13, draft-raszuk-mpls-domain-widelabels-00, MPLS Working Group, Internet-Draft, Jul. 14, 2013, pp. 1-6.
Rekhter et al.,"Carrying Label Information in BGP-4," Request for Comments 3107, The Internet Society, May 2001, 8 pages.
Rekhter, et. al, "Application of the Border Gateway Protocol in the Internet", RFC 1268, pp. 1-13, Internet Engineering Task Force, http://tools.ietf.org/rfc/rfc1268.txt, Oct. 1991.
Rekhter, Y. et al (ed), "A Border Gateway Protocol 4 {BGP-4)", RFC 4271, pp. 1-104, Internet Engineering Task Force, http://tools.ietf.org/rfc/rfc4271.txt, Jan. 2006.
Roberts, Lawrence, "A Radical New Router", IEEE Spectrum, Jul. 2009, pp. 1-6.
Rosen et al. "Multiprotocol Label Switching Architecture," RFC 3031, Jan. 2001, 61 pages.
Rosen et al., "BGP/MPLS IP Virtual Private Networks (VPNs)," Network Working Group, RFC 4364, Standards Track, Feb. 2006, 47 pages; https://tools.ietf.org/pdf/rfc4364.pdf.
Rosen et al., "BGP/MPLS VPNs", Cisco Systems, Inc., Network Working Group, Request for Comments: 2547; Mar. 1999, pp. 1-25.
Sivabalan et al., "PCE-Initiated Traffic Engineering Path Setup in Segment Routed Networks; draft-sivabalan-pcesegmentrouting-00," Internet Engineering Task Force, IETF, Standard Working Draft, Internet Society (ISOC) 4, Rue Des Falaises CH-1205, Geneva, Switzerland, Jun. 2013, pp. 1-16.
Steenstrup, M., "Inter-Domain Policy Routing Protocol Specification: Version 1", RFC 1479, pp. 1-108, Internet Engineering Task Force, http://tools.ietf.org/rfc/rfc1479.txt, Jul. 1993.
Tian et al., "Source Routed MPLS LSP Using Domain Wide Label," draft-tian-mpls-lsp-source-route-01.txt, Redback Networks, Network Working Group, Internet Draft, Jul. 2004, pp. 1-12.
Vasseur et al., "A Link-Type Sub-TLV to Convey the Number of Traffic Engineering Label Switched Paths Signaled with Zero Reserved Bandwidth Across a Link," Cisco Systems, Inc., Network Working Group, Request for Comments 5330, Oct. 2008, 16 pages.
Vasseur et al., "Path Computation Element (PCE) Communication Protocol (PCEP) Request for Comments: 5440," Cisco Systems, Internet Engineering Task Force, IETF, Standard, Internet Society (ISOC) 4, Rue Des Falaises CH-1205, Geneva, Switzerland, chapters 4-8, Mar. 2009, pp. 1-87.
Waitzman, D., et al, "Distance Vector Multicast Routing Protocol", RFC 1075, pp. 1-24, Internet Engineering Task Force, http://tools.ietf.org/rfc/rfc1075.txt, Nov. 1988.
Wang et al., "Research and Implementation of a Scalable Secure Active Network Node", Proceedings of the First International Conference on Machine Learning and Cybernetics, IEEE, Nov. 2002, pp. 111-115.
Wetherall et al., "The Active IP Option," Proceedings of the 7th Workshop of ACM SIGOPS Systems Support for Worldwide Applications, Sep. 1996, pp. 33-40.
Wijnands et al., "Multicast Extensions for LDP," Cisco Systems, Inc., Yuji Kamite and Hitoshi Fukuda, NTT Communications, Network Working Group; Internet Draft; Mar. 2005, pp. 1-12.
U.S. Appl. No. 13/927,394.
U.S. Appl. No. 13/944,050.
U.S. Appl. No. 14/029,600.
U.S. Appl. No. 14/047,310.
U.S. Appl. No. 14/096,358.
U.S. Appl. No. 14/155,601.
U.S. Appl. No. 14/205,245.
U.S. Appl. No. 14/210,837.
U.S. Appl. No. 14/211,065.
U.S. Appl. No. 14/211,101.
U.S. Appl. No. 14/211,174.
U.S. Appl. No. 14/211,274.
U.S. Appl. No. 14/212,084.
U.S. Appl. No. 14/212,284.
U.S. Appl. No. 14/244,502.
U.S. Appl. No. 14/279,659.
U.S. Appl. No. 14/292,264.
U.S. Appl. No. 14/315,570.
U.S. Appl. No. 14/319,353.
U.S. Appl. No. 14/334,300.
U.S. Appl. No. 14/449,632.
U.S. Appl. No. 14/527,025.
U.S. Appl. No. 14/637,510.
U.S. Appl. No. 14/659,220.
U.S. Appl. No. 14/717,665.
U.S. Appl. No. 14/825,273.
U.S. Appl. No. 14/851,361.
U.S. Appl. No. 14/874,709.
U.S. Appl. No. 14/996,541.
U.S. Appl. No. 15/048,192.
U.S. Appl. No. 15/054,480.
U.S. Appl. No. 15/132,920.
U.S. Appl. No. 15/146,522.
U.S. Appl. No. 15/188,810.
U.S. Appl. No. 15/216,334.
U.S. Appl. No. 15/227,721.
U.S. Appl. No. 15/234,794.
U.S. Appl. No. 15/244,735.
U.S. Appl. No. 15/271,811.
U.S. Appl. No. 15/345,049.
U.S. Appl. No. 15/426,911.
U.S. Appl. No. 15/637,744.
U.S. Appl. No. 15/639,398.
U.S. Appl. No. 15/677,210.
U.S. Appl. No. 15/691,044.
U.S. Appl. No. 15/826,900.
U.S. Appl. No. 15/827,973.
U.S. Appl. No. 61/776,463.
U.S. Appl. No. 61/791,242.
U.S. Appl. No. 15/266,498.
U.S. Appl. No. 15/165,794.
U.S. Appl. No. 15/347,443.
U.S. Appl. No. 14/814,575.
U.S. Appl. No. 14/862,915.
U.S. Appl. No. 15/280,262.
International Application No. PCT/US2014/018206.
European Application No. 15160384.
U.S. Appl. No. 61/824,696.
U.S. Appl. No. 61/829,696.
U.S. Appl. No. 61/842,418.
U.S. Appl. No. 61/892,635.
U.S. Appl. No. 61/895,196.
U.S. Appl. No. 61/948,811.
U.S. Appl. No. 61/993,348.
U.S. Appl. No. 61/763,224.
U.S. Appl. No. 61/779,823.
U.S. Appl. No. 14/020,930.
U.S. Appl. No. 14/020,932.
U.S. Appl. No. 14/020,936.
U.S. Appl. No. 14/047,981.

(56) References Cited

OTHER PUBLICATIONS

U.S. Appl. No. 14/070,462.
U.S. Appl. No. 14/078,219.
U.S. Appl. No. 15/098,790.
U.S. Appl. No. 61/869,704.
U.S. Appl. No. 61/889,978.
U.S. Appl. No. 13/760,155.
U.S. Appl. No. 13/863,013.

* cited by examiner

30500a

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Vers |  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum       |
+-+-+-+-+-+-+-+-+-+-+-+-+-+-+-+-+-+-+-+-+-+-+-+-+-+-+-+-+-+-+-+-+
|                       Source Address                          |
+-+-+-+-+-+-+-+-+-+-+-+-+-+-+-+-+-+-+-+-+-+-+-+-+-+-+-+-+-+-+-+-+
|                    Destination Address                        |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Vers |  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum       |
+-+-+-+-+-+-+-+-+-+-+-+-+-+-+-+-+-+-+-+-+-+-+-+-+-+-+-+-+-+-+-+-+
|                       Address Data                            |
+-+-+-+-+-+-+-+-+-+-+-+-+-+-+-+-+-+-+-+-+-+-+-+-+-+-+-+-+-+-+-+-+
|                 Address Data Continued        |    Padding    |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
```

```
+-------+ +------+ +------+     +------+
|Telnet| | FTP  | | TFTP| ... | ...  |
+-------+ +------+ +------+     +------+
      |   |         |             |
     +------+     +------+     +------+
     | TCP  |     | UDP  | ... | ...  |
     +------+     +------+     +------+
        |           |             |
     +--------------------------+----+
     |    Internet Protocol & ICMP   |
     +--------------------------+----+
                    |
       +---------------------------+
       |   Local Network Protocol  |
       +---------------------------+

        Protocol Relationships
```

FIG. 134A

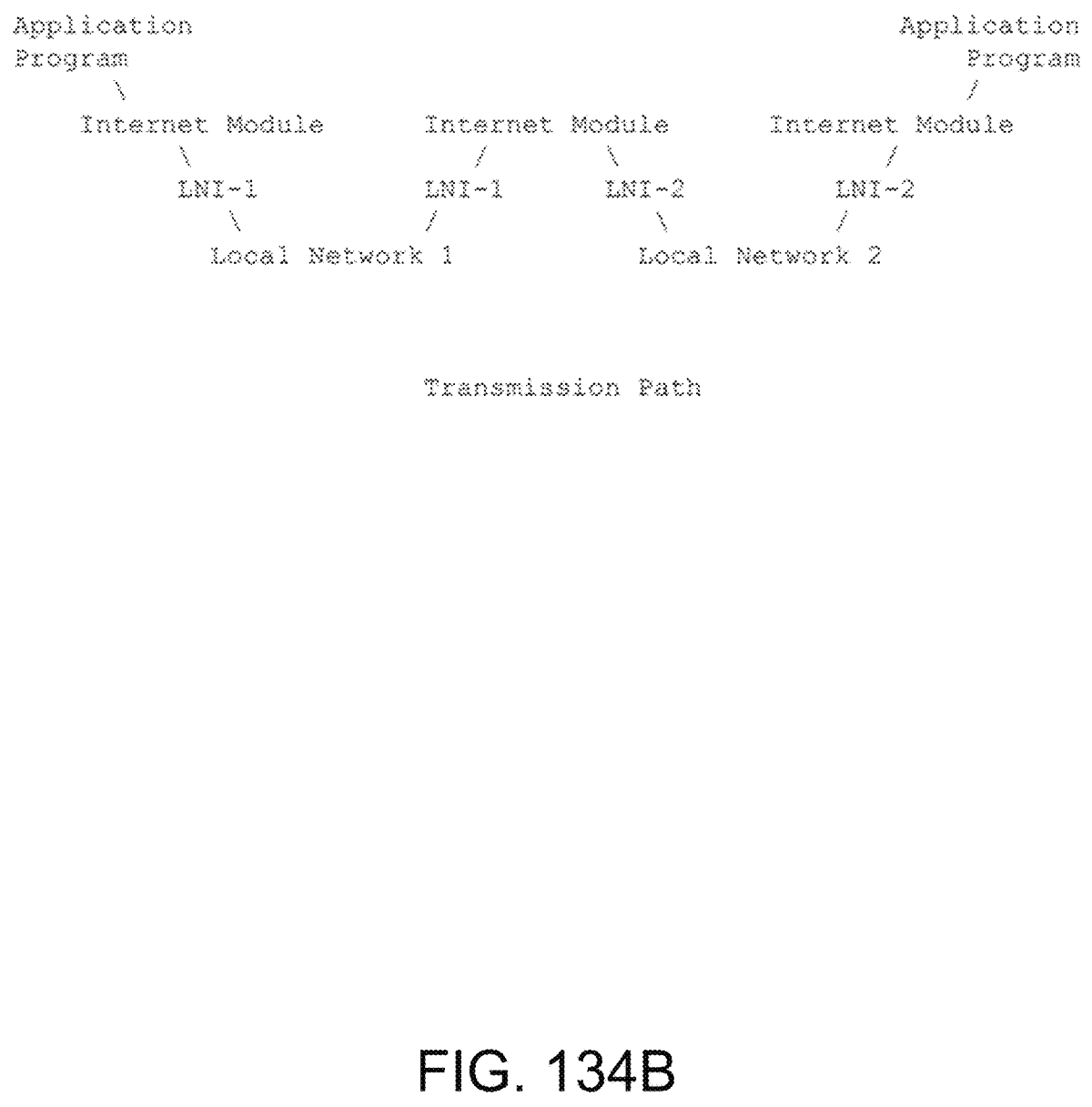

```
Application                                                     Application
Program                                                             Program
      \                                                             /
   Internet Module       Internet Module       Internet Module
          \                   /       \                  /
         LNI-1            LNI-1        LNI-2          LNI-2
            \              /             \             /
           Local Network 1             Local Network 2
```

Transmission Path

FIG. 134B

```
  +-------------------------------+
  | Internet Protocol & ICMP & GGP|
  +-------------------------------+
          |                 |
+---------------+   +---------------+
|   Local Net   |   |   Local Net   |
+---------------+   +---------------+

         Gateway Protocols
```

FIG. 134C

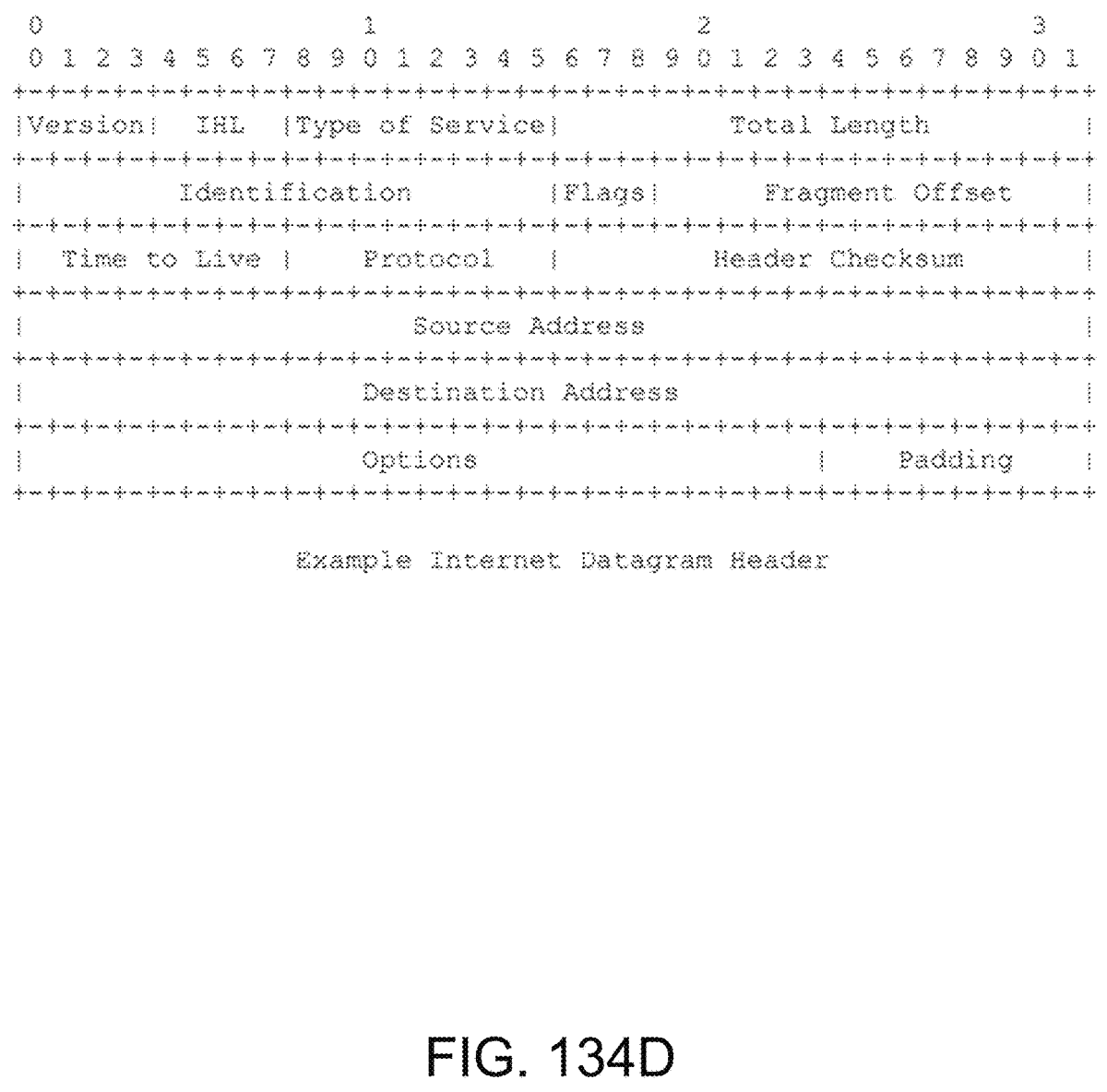

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Version|  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum       |
+-+-+-+-+-+-+-+-+-+-+-+-+-+-+-+-+-+-+-+-+-+-+-+-+-+-+-+-+-+-+-+-+
|                       Source Address                          |
+-+-+-+-+-+-+-+-+-+-+-+-+-+-+-+-+-+-+-+-+-+-+-+-+-+-+-+-+-+-+-+-+
|                    Destination Address                        |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
```

Example Internet Datagram Header

FIG. 134D

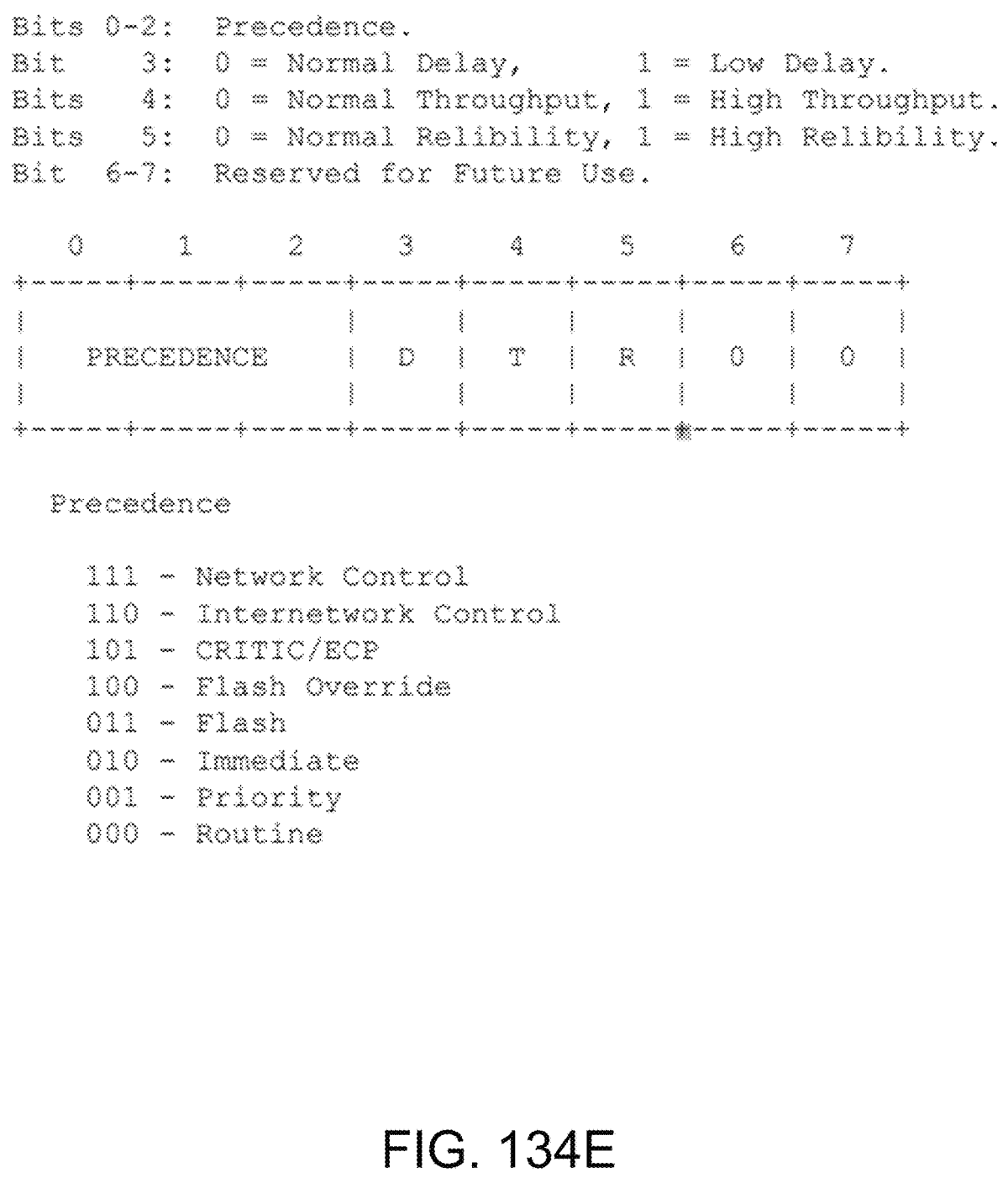

```
Bits 0-2:  Precedence.
Bit    3:  0 = Normal Delay,      1 = Low Delay.
Bits   4:  0 = Normal Throughput, 1 = High Throughput.
Bits   5:  0 = Normal Relibility, 1 = High Relibility.
Bit  6-7:  Reserved for Future Use.

   0     1     2     3     4     5     6     7
+-----+-----+-----+-----+-----+-----+-----+-----+
|                 |     |     |     |     |     |
|   PRECEDENCE    |  D  |  T  |  R  |  0  |  0  |
|                 |     |     |     |     |     |
+-----+-----+-----+-----+-----+-----+-----+-----+

  Precedence

    111 - Network Control
    110 - Internetwork Control
    101 - CRITIC/ECP
    100 - Flash Override
    011 - Flash
    010 - Immediate
    001 - Priority
    000 - Routine
```

FIG. 134E

Figure 134F:
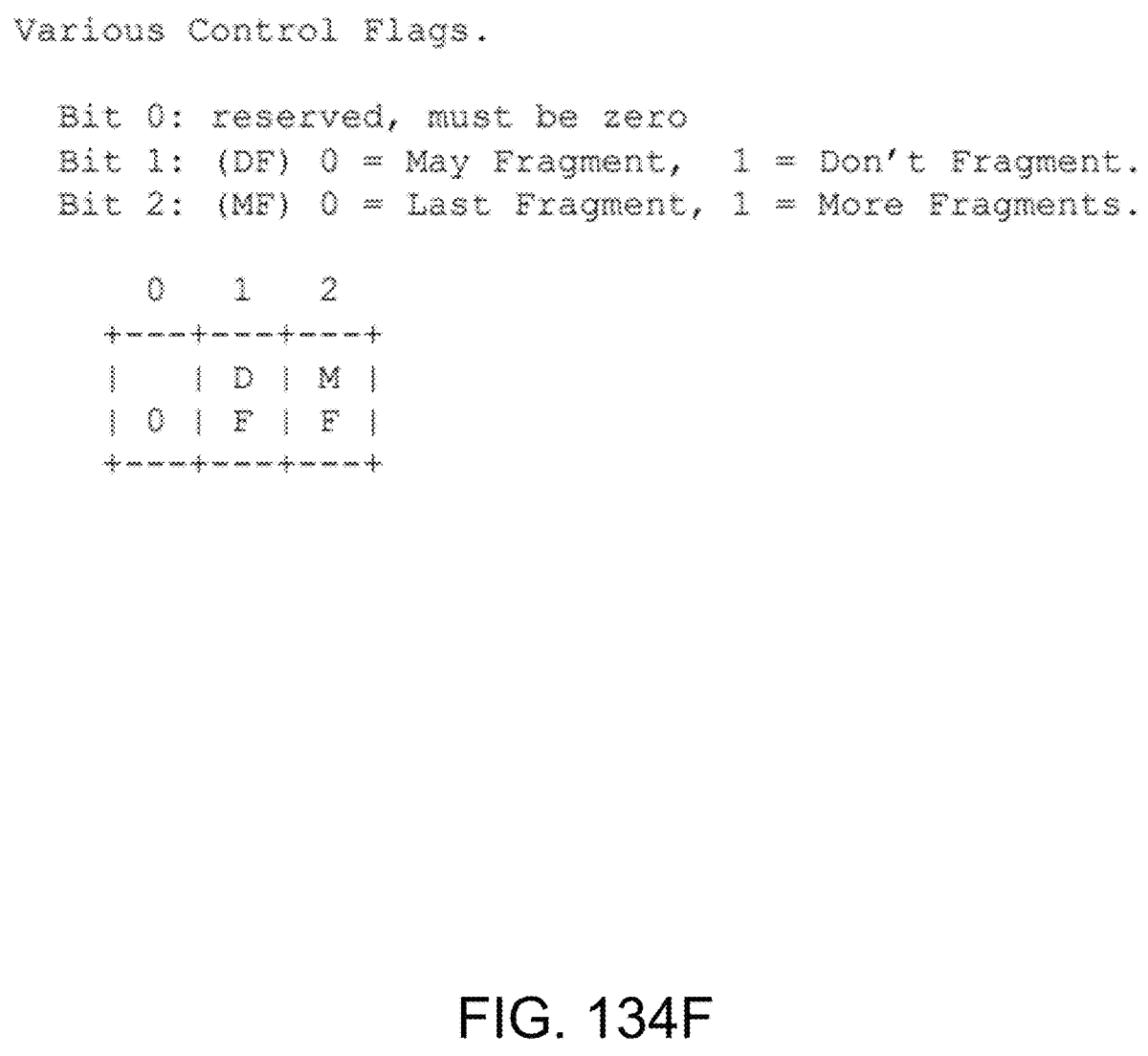

```
Various Control Flags.

  Bit 0: reserved, must be zero
  Bit 1: (DF) 0 = May Fragment,  1 = Don't Fragment.
  Bit 2: (MF) 0 = Last Fragment, 1 = More Fragments.

      0   1   2
    +---+---+---+
    |   | D | M |
    | 0 | F | F |
    +---+---+---+
```

| CLASS | NUMBER | LENGTH | DESCRIPTION |
|---|---|---|---|
| 0 | 0 | - | End of Option list. This option occupies only 1 octet; it has no length octet. |
| 0 | 1 | - | No Operation. This option occupies only 1 octet; it has no length octet. |
| 0 | 2 | 11 | Security. Used to carry Security, Compartmentation, User Group (TCC), and Handling Restriction Codes compatible with DOD requirements. |
| 0 | 3 | var. | Loose Source Routing. Used to route the internet datagram based on information supplied by the source. |
| 0 | 9 | var. | Strict Source Routing. Used to route the internet datagram based on information supplied by the source. |
| 0 | 7 | var. | Record Route. Used to trace the route an internet datagram takes. |
| 0 | 8 | 4 | Stream ID. Used to carry the stream identifier. |
| 2 | 4 | var. | Internet Timestamp. |

FIG. 134G

```
+--------+--------+---//---+---//---+---//---+---//---+
|10000010|00001011|SSS  SSS|CCC  CCC|HHH  HHH|  TCC   |
+--------+--------+---//---+---//---+---//---+---//---+
 Type=130 Length=11
```

FIG. 134H

```
+--------+--------+--------+---------//--------+
|10000011| length | pointer|     route data    |
+--------+--------+--------+---------//--------+
 Type=131
```

FIG. 134I

```
+--------+--------+--------+---------//--------+
|10001001| length | pointer|     route data    |
+--------+--------+--------+---------//--------+
 Type=137
```

FIG. 134J

```
+--------+--------+--------+---------//---------+
|00000111| length | pointer|     route data     |
+--------+--------+--------+---------//---------+
  Type=7
```

FIG. 134K

```
+--------+--------+--------+--------+
|10001000|00000010|    Stream ID    |
+--------+--------+--------+--------+
 Type=136 Length=4
```

FIG. 134L

| High Order Bits | Format | Class |
|---|---|---|
| 0 | 7 bits of net, 24 bits of host | a |
| 10 | 14 bits of net, 16 bits of host | b |
| 110 | 21 bits of net, 8 bits of host | c |
| 111 | escape to extended addressing mode | |

FIG. 134M

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver= 4 |IHL= 5 |Type of Service|        Total Length = 21      |
+-+-+-+-+-+-+-+-+-+-+-+-+-+-+-+-+-+-+-+-+-+-+-+-+-+-+-+-+-+-+-+-+
|      Identification = 111     |Flg=0|   Fragment Offset = 0   |
+-+-+-+-+-+-+-+-+-+-+-+-+-+-+-+-+-+-+-+-+-+-+-+-+-+-+-+-+-+-+-+-+
|   Time = 123  |  Protocol = 1 |        header checksum        |
+-+-+-+-+-+-+-+-+-+-+-+-+-+-+-+-+-+-+-+-+-+-+-+-+-+-+-+-+-+-+-+-+
|                         source address                        |
+-+-+-+-+-+-+-+-+-+-+-+-+-+-+-+-+-+-+-+-+-+-+-+-+-+-+-+-+-+-+-+-+
|                      destination address                      |
+-+-+-+-+-+-+-+-+-+-+-+-+-+-+-+-+-+-+-+-+-+-+-+-+-+-+-+-+-+-+-+-+
|     data      |
+-+-+-+-+-+-+-+-+
```

Example Internet Datagram

FIG. 134N

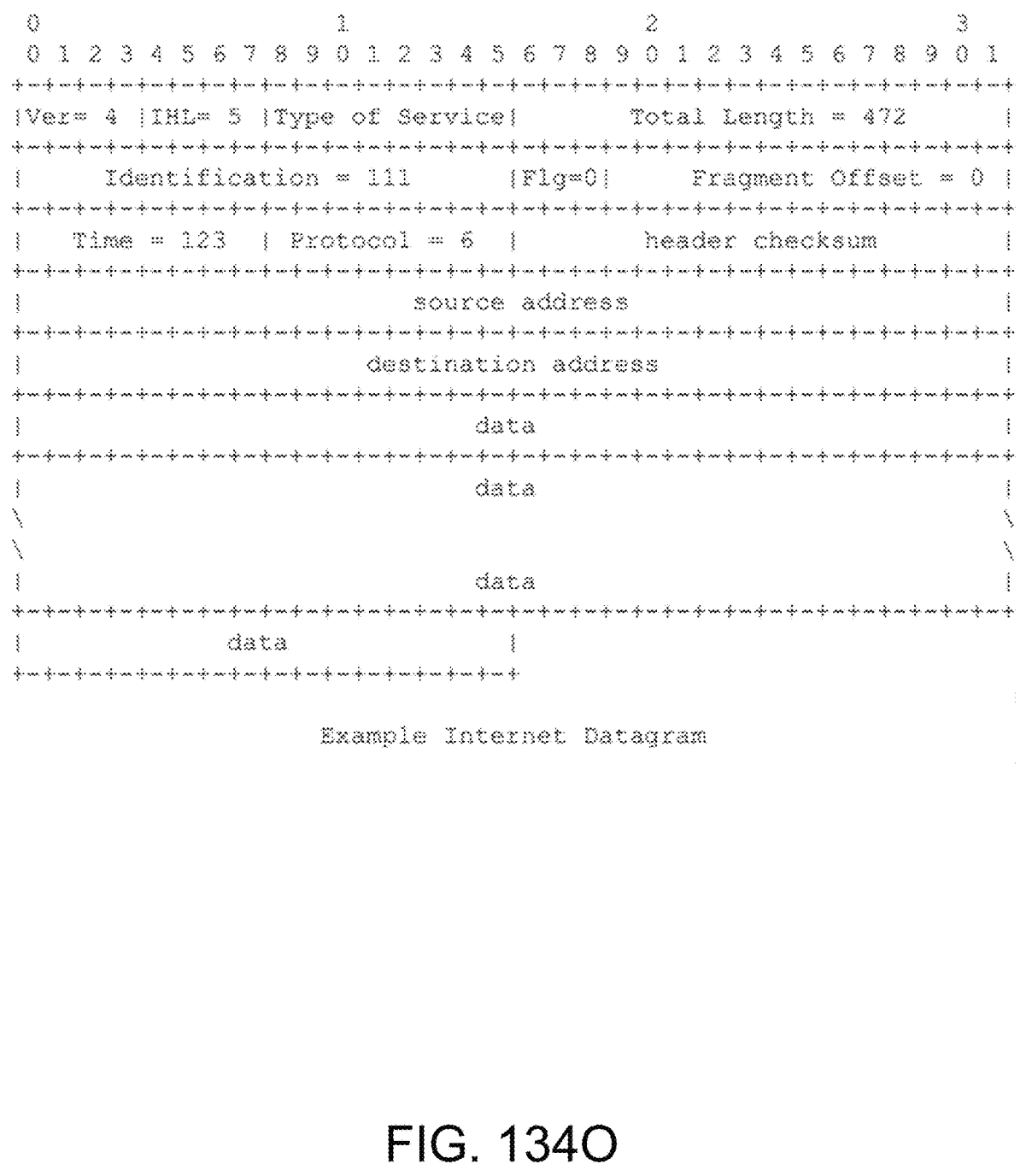

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver= 4 |IHL= 5 |Type of Service|        Total Length = 472     |
+-+-+-+-+-+-+-+-+-+-+-+-+-+-+-+-+-+-+-+-+-+-+-+-+-+-+-+-+-+-+-+-+
|     Identification = 111      |Flg=0|     Fragment Offset = 0 |
+-+-+-+-+-+-+-+-+-+-+-+-+-+-+-+-+-+-+-+-+-+-+-+-+-+-+-+-+-+-+-+-+
|   Time = 123  | Protocol = 6  |        header checksum        |
+-+-+-+-+-+-+-+-+-+-+-+-+-+-+-+-+-+-+-+-+-+-+-+-+-+-+-+-+-+-+-+-+
|                         source address                        |
+-+-+-+-+-+-+-+-+-+-+-+-+-+-+-+-+-+-+-+-+-+-+-+-+-+-+-+-+-+-+-+-+
|                      destination address                      |
+-+-+-+-+-+-+-+-+-+-+-+-+-+-+-+-+-+-+-+-+-+-+-+-+-+-+-+-+-+-+-+-+
|                             data                              |
+-+-+-+-+-+-+-+-+-+-+-+-+-+-+-+-+-+-+-+-+-+-+-+-+-+-+-+-+-+-+-+-+
|                             data                              |
\                                                               \
\                                                               \
|                             data                              |
+-+-+-+-+-+-+-+-+-+-+-+-+-+-+-+-+-+-+-+-+-+-+-+-+-+-+-+-+-+-+-+-+
|             data              |
+-+-+-+-+-+-+-+-+-+-+-+-+-+-+-+-+
```

Example Internet Datagram

FIG. 134O

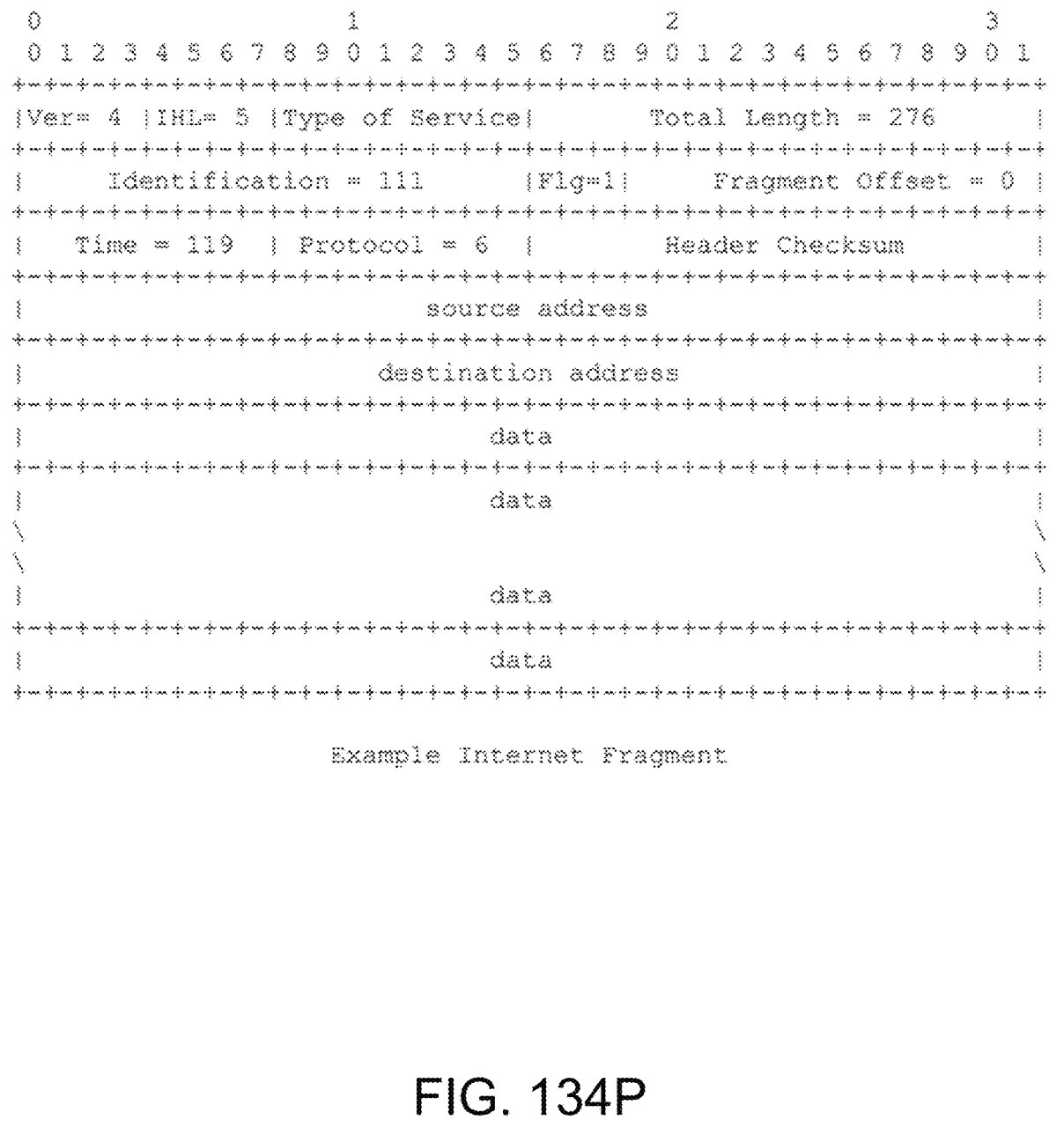

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver= 4 |IHL= 5 |Type of Service|       Total Length = 276      |
+-+-+-+-+-+-+-+-+-+-+-+-+-+-+-+-+-+-+-+-+-+-+-+-+-+-+-+-+-+-+-+-+
|     Identification = 111      |Flg=1|     Fragment Offset = 0 |
+-+-+-+-+-+-+-+-+-+-+-+-+-+-+-+-+-+-+-+-+-+-+-+-+-+-+-+-+-+-+-+-+
|   Time = 119  | Protocol = 6  |        Header Checksum        |
+-+-+-+-+-+-+-+-+-+-+-+-+-+-+-+-+-+-+-+-+-+-+-+-+-+-+-+-+-+-+-+-+
|                        source address                         |
+-+-+-+-+-+-+-+-+-+-+-+-+-+-+-+-+-+-+-+-+-+-+-+-+-+-+-+-+-+-+-+-+
|                      destination address                      |
+-+-+-+-+-+-+-+-+-+-+-+-+-+-+-+-+-+-+-+-+-+-+-+-+-+-+-+-+-+-+-+-+
|                             data                              |
+-+-+-+-+-+-+-+-+-+-+-+-+-+-+-+-+-+-+-+-+-+-+-+-+-+-+-+-+-+-+-+-+
|                             data                              |
\                                                               \
\                                                               \
|                             data                              |
+-+-+-+-+-+-+-+-+-+-+-+-+-+-+-+-+-+-+-+-+-+-+-+-+-+-+-+-+-+-+-+-+
|                             data                              |
+-+-+-+-+-+-+-+-+-+-+-+-+-+-+-+-+-+-+-+-+-+-+-+-+-+-+-+-+-+-+-+-+
```

Example Internet Fragment

FIG. 134P

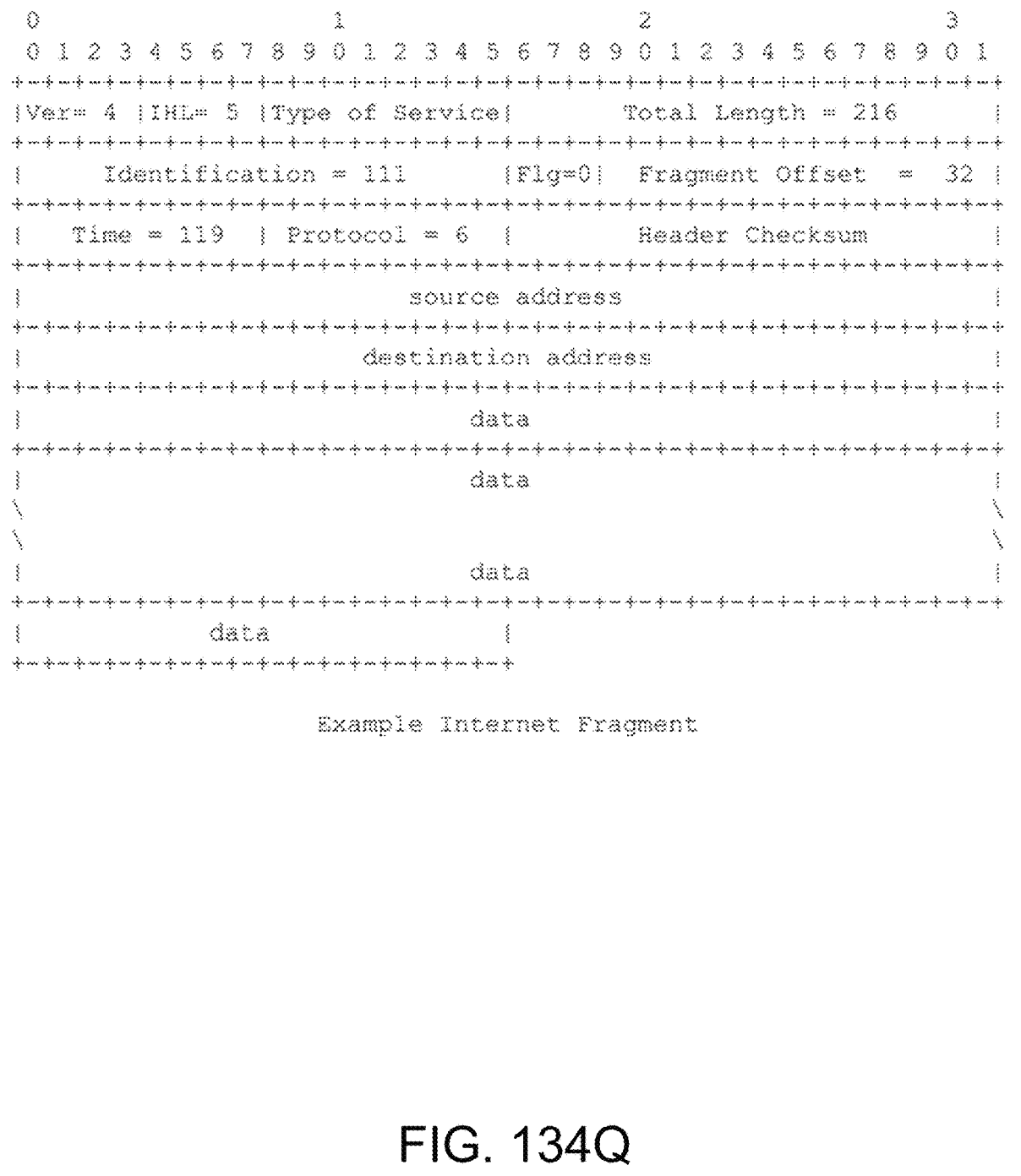

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver= 4 |IHL= 5 |Type of Service|       Total Length = 216      |
+-+-+-+-+-+-+-+-+-+-+-+-+-+-+-+-+-+-+-+-+-+-+-+-+-+-+-+-+-+-+-+-+
|     Identification = 111      |Flg=0|  Fragment Offset  =  32 |
+-+-+-+-+-+-+-+-+-+-+-+-+-+-+-+-+-+-+-+-+-+-+-+-+-+-+-+-+-+-+-+-+
|   Time = 119  | Protocol = 6  |        Header Checksum        |
+-+-+-+-+-+-+-+-+-+-+-+-+-+-+-+-+-+-+-+-+-+-+-+-+-+-+-+-+-+-+-+-+
|                         source address                        |
+-+-+-+-+-+-+-+-+-+-+-+-+-+-+-+-+-+-+-+-+-+-+-+-+-+-+-+-+-+-+-+-+
|                      destination address                      |
+-+-+-+-+-+-+-+-+-+-+-+-+-+-+-+-+-+-+-+-+-+-+-+-+-+-+-+-+-+-+-+-+
|                             data                              |
+-+-+-+-+-+-+-+-+-+-+-+-+-+-+-+-+-+-+-+-+-+-+-+-+-+-+-+-+-+-+-+-+
|                             data                              |
\                                                               \
\                                                               \
|                             data                              |
+-+-+-+-+-+-+-+-+-+-+-+-+-+-+-+-+-+-+-+-+-+-+-+-+-+-+-+-+-+-+-+-+
|            data               |
+-+-+-+-+-+-+-+-+-+-+-+-+-+-+-+-+
```

Example Internet Fragment

FIG. 134Q

Figure 134R:
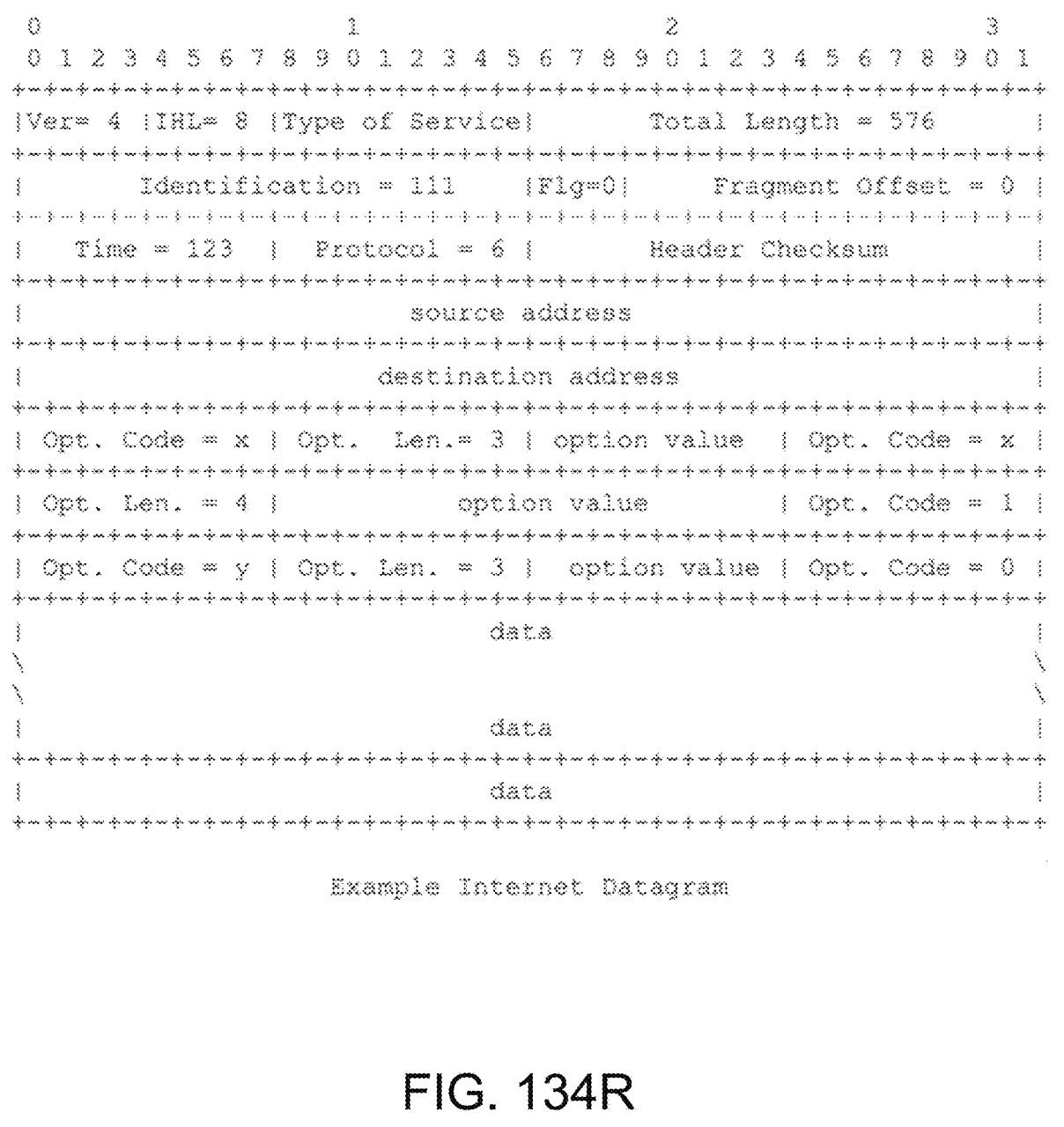

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver= 4 |IHL= 8 |Type of Service|       Total Length = 576      |
+-+-+-+-+-+-+-+-+-+-+-+-+-+-+-+-+-+-+-+-+-+-+-+-+-+-+-+-+-+-+-+-+
|       Identification = 111    |Flg=0|     Fragment Offset = 0 |
+-+-+-+-+-+-+-+-+-+-+-+-+-+-+-+-+-+-+-+-+-+-+-+-+-+-+-+-+-+-+-+-+
|   Time = 123  |  Protocol = 6 |       Header Checksum         |
+-+-+-+-+-+-+-+-+-+-+-+-+-+-+-+-+-+-+-+-+-+-+-+-+-+-+-+-+-+-+-+-+
|                        source address                         |
+-+-+-+-+-+-+-+-+-+-+-+-+-+-+-+-+-+-+-+-+-+-+-+-+-+-+-+-+-+-+-+-+
|                      destination address                      |
+-+-+-+-+-+-+-+-+-+-+-+-+-+-+-+-+-+-+-+-+-+-+-+-+-+-+-+-+-+-+-+-+
| Opt. Code = x | Opt.  Len.= 3 | option value  | Opt. Code = x |
+-+-+-+-+-+-+-+-+-+-+-+-+-+-+-+-+-+-+-+-+-+-+-+-+-+-+-+-+-+-+-+-+
| Opt. Len. = 4 |           option value        | Opt. Code = 1 |
+-+-+-+-+-+-+-+-+-+-+-+-+-+-+-+-+-+-+-+-+-+-+-+-+-+-+-+-+-+-+-+-+
| Opt. Code = y | Opt. Len. = 3 |  option value | Opt. Code = 0 |
+-+-+-+-+-+-+-+-+-+-+-+-+-+-+-+-+-+-+-+-+-+-+-+-+-+-+-+-+-+-+-+-+
|                             data                              |
\                                                               \
\                                                               \
|                             data                              |
+-+-+-+-+-+-+-+-+-+-+-+-+-+-+-+-+-+-+-+-+-+-+-+-+-+-+-+-+-+-+-+-+
|                             data                              |
+-+-+-+-+-+-+-+-+-+-+-+-+-+-+-+-+-+-+-+-+-+-+-+-+-+-+-+-+-+-+-+-+

                   Example Internet Datagram
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       1       |       2       |       3       |       4       |
+-+-+-+-+-+-+-+-+-+-+-+-+-+-+-+-+-+-+-+-+-+-+-+-+-+-+-+-+-+-+-+-+
|       5       |       6       |       7       |       8       |
+-+-+-+-+-+-+-+-+-+-+-+-+-+-+-+-+-+-+-+-+-+-+-+-+-+-+-+-+-+-+-+-+
|       9       |      10       |      11       |      12       |
+-+-+-+-+-+-+-+-+-+-+-+-+-+-+-+-+-+-+-+-+-+-+-+-+-+-+-+-+-+-+-+-+
```

Transmission Order of Bytes

```
 0 1 2 3 4 5 6 7
+-+-+-+-+-+-+-+-+
|1 0 1 0 1 0 1 0|
+-+-+-+-+-+-+-+-+

Significance of Bits
```

FIG. 134T

```
End of Option List

  +--------+
  |00000000|
  +--------+
    Type=0
```

FIG. 134U

```
No Operation

   +--------+
   |00000001|
   +--------+
     Type=1
```

FIG. 134V

Internet Timestamp

```
+--------+--------+--------+--------+
|01000100| length | pointer|oflw|flg|
+--------+--------+--------+--------+
|          internet address          |
+--------+--------+--------+--------+
|             timestamp              |
+--------+--------+--------+--------+
|                 .                  |
                  .
                  .
Type = 68
```

FIG. 134W

Procedure:

```
(1)  BUFID <- source|destination|protocol|identification;
(2)  IF FO = 0 AND MF = 0
(3)     THEN IF buffer with BUFID is allocated
(4)             THEN flush all reassembly for this BUFID;
(5)          Submit datagram to next step; DONE.
(6)     ELSE IF no buffer with BUFID is allocated
(7)             THEN allocate reassembly resources
                     with BUFID;
                     TIMER <- TLB; TDL <- 0;
(8)          put data from fragment into data buffer with
             BUFID from octet FO*8 to
                                 octet (TL-(IHL*4))+FO*8;
(9)          set RCVBT bits from FO
                                to FO+((TL-(IHL*4)+7)/8);
(10)         IF MF = 0 THEN TDL <- TL-(IHL*4)+(FO*8)
(11)         IF FO = 0 THEN put header in header buffer
(12)         IF TDL # 0
(13)          AND all RCVBT bits from 0
                                     to (TDL+7)/8 are set
(14)            THEN TL <- TDL+(IHL*4)
(15)                 Submit datagram to next step;
(16)                 free all reassembly resources
                     for this BUFID; DONE.
(17)         TIMER <- MAX(TIMER,TTL);
(18)         give up until next fragment or timer expires;
(19) timer expires: flush all reassembly with this BUFID; DONE.
```

FIG. 134X

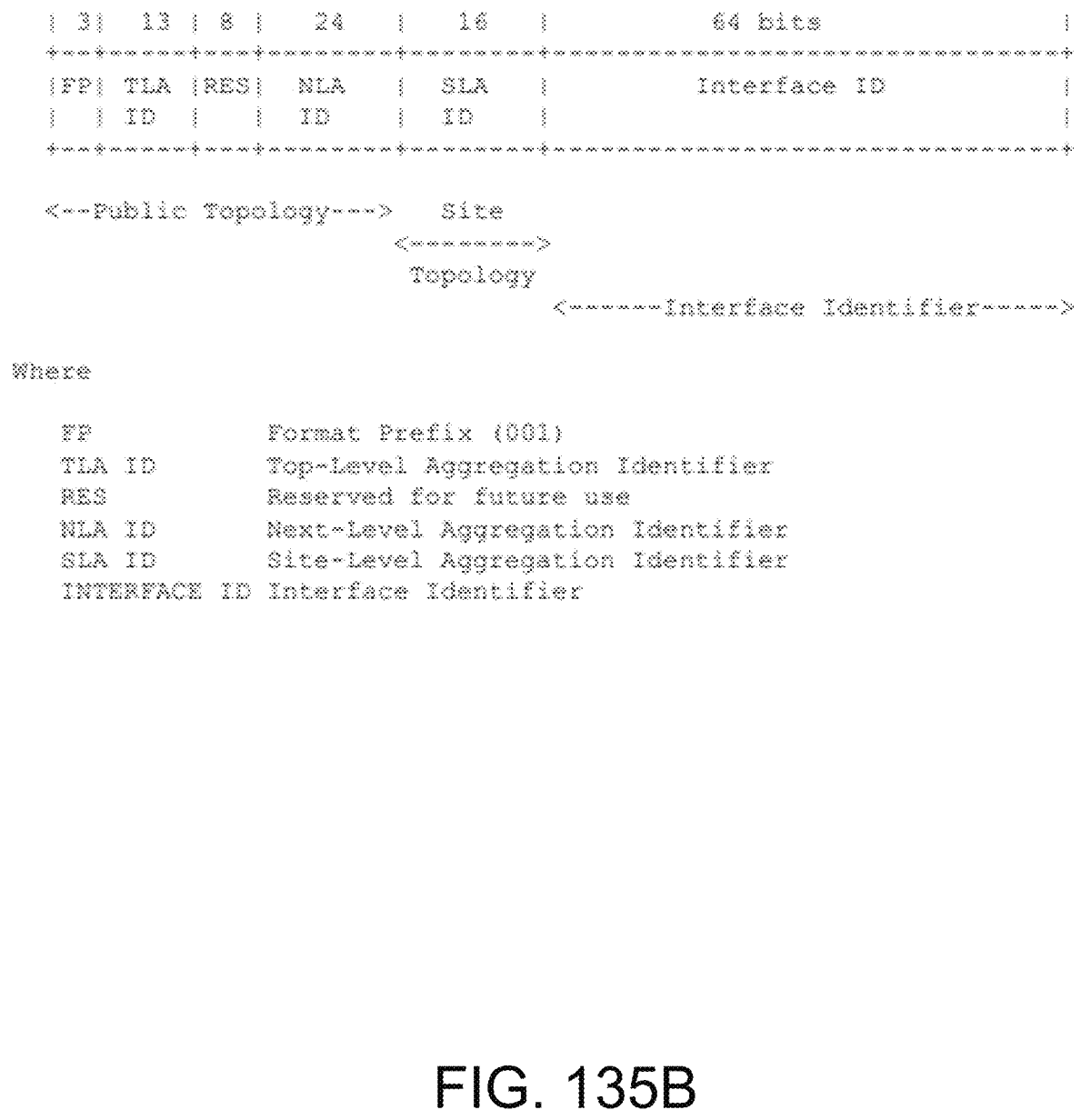

```
| 3|  13 | 8 |    24    |    16    |          64 bits               |
+--+-----+---+----------+----------+--------------------------------+
|FP| TLA |RES|  NLA     |  SLA     |         Interface ID           |
|  | ID  |   |  ID      |  ID      |                                |
+--+-----+---+----------+----------+--------------------------------+

<--Public Topology--->   Site
                       <-------->
                        Topology
                                 <------Interface Identifier----->
```

Where

```
   FP           Format Prefix (001)
   TLA ID       Top-Level Aggregation Identifier
   RES          Reserved for future use
   NLA ID       Next-Level Aggregation Identifier
   SLA ID       Site-Level Aggregation Identifier
   INTERFACE ID Interface Identifier
```

FIG. 135B

```
|  n  |      24-n bits      |   16   |    64 bits      |
+-----+--------------------+--------+-----------------+
|NLA1 |      Site ID       | SLA ID | Interface ID    |
+-----+--------------------+--------+-----------------+
```

FIG. 135C

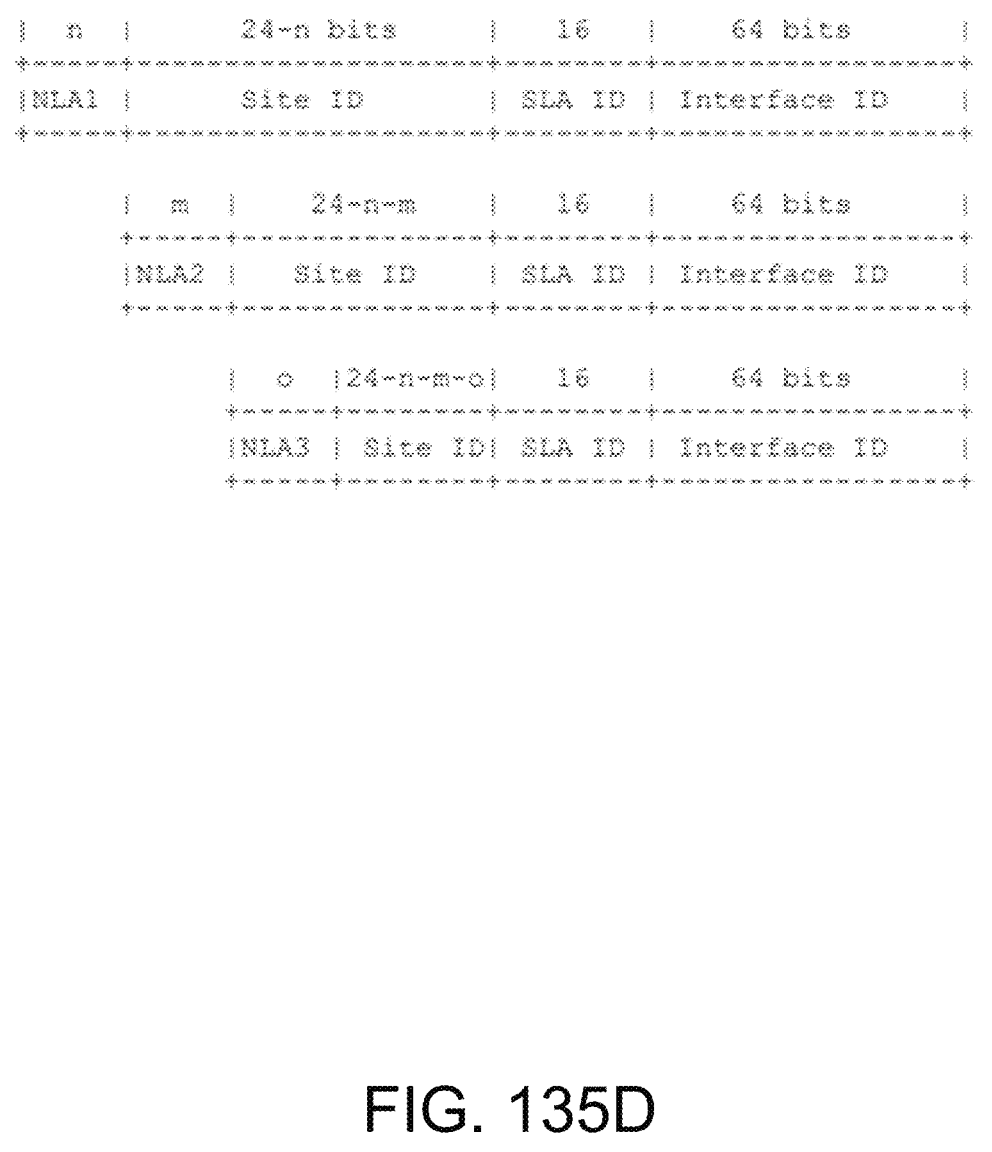

```
|  n  |      24-n bits      |   16   |     64 bits      |
+-----+---------------------+--------+------------------+
|NLA1 |      Site ID        | SLA ID | Interface ID     |
+-----+---------------------+--------+------------------+

      |  m  |    24-n-m     |   16   |     64 bits      |
      +-----+---------------+--------+------------------+
      |NLA2 |   Site ID     | SLA ID | Interface ID     |
      +-----+---------------+--------+------------------+

            |  o  |24-n-m-o|   16   |     64 bits      |
            +-----+---------+--------+------------------+
            |NLA3 | Site ID| SLA ID | Interface ID     |
            +-----+---------+--------+------------------+
```

FIG. 135D

```
|  n  |    16-n    |               64 bits                   |
+-----+------------+-----------------------------------------+
|SLA1 |   Subnet   |             Interface ID                |
+-----+------------+-----------------------------------------+

      | m  |16-n-m |               64 bits                   |
      +----+-------+-----------------------------------------+
      |SLA2|Subnet |             Interface ID                |
      +----+-------+-----------------------------------------+
```

FIG. 136

```
+-+-+-+-+-+-+-+-+-+-+-+-+-+-+-+-+-+-+-+-+-+-+-+-+-+-+-+-+-+-+-+-+
|Version| Traffic Class |           Flow Label                  |
+-+-+-+-+-+-+-+-+-+-+-+-+-+-+-+-+-+-+-+-+-+-+-+-+-+-+-+-+-+-+-+-+
|         Payload Length        |  Next Header  |   Hop Limit   |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                         Source Address                        +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                      Destination Address                      +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

FIG. 137A

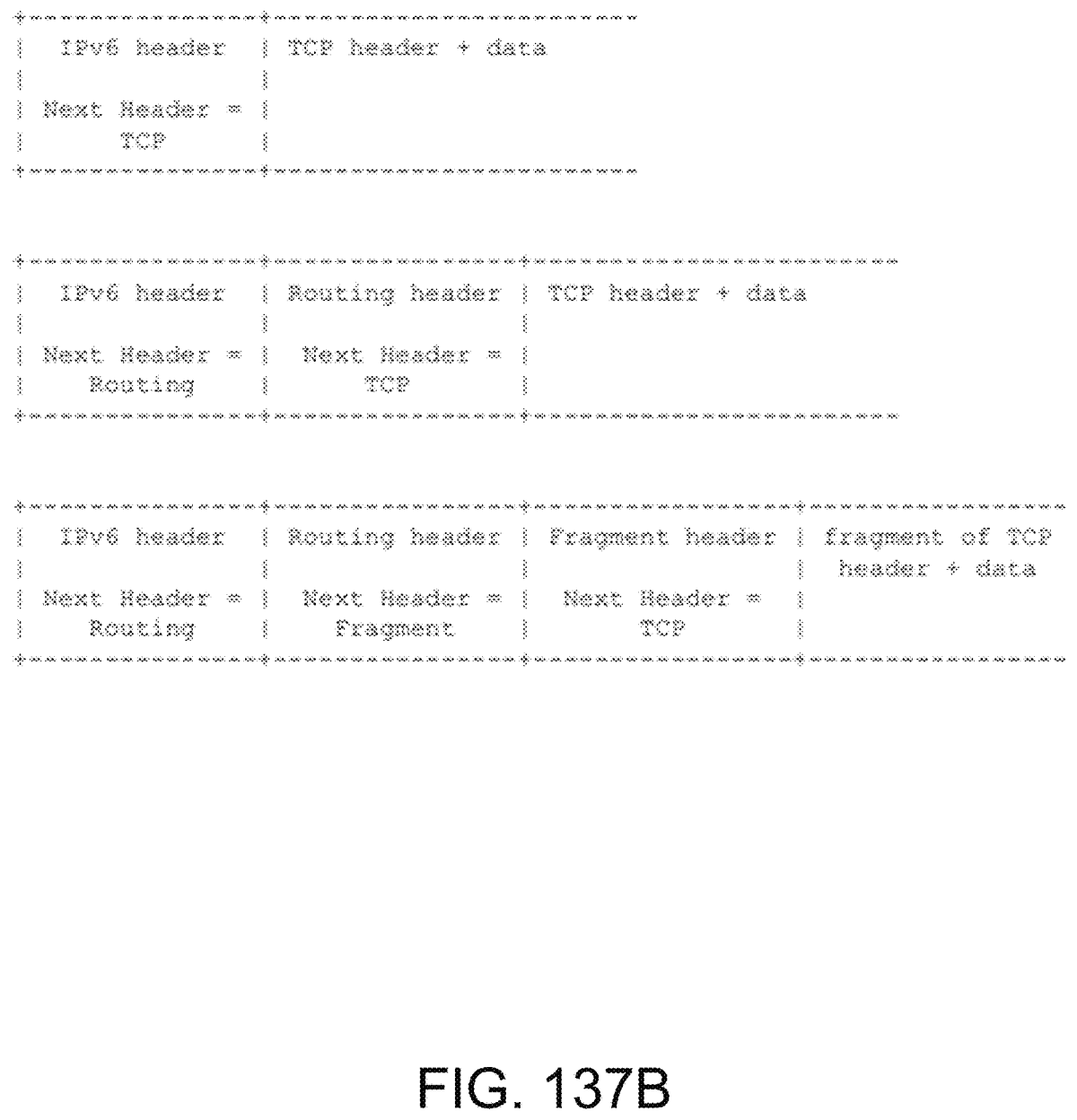

```
+---------------+------------------------
|  IPv6 header  | TCP header + data
|               |
| Next Header = |
|      TCP      |
+---------------+------------------------

+---------------+----------------+------------------------
|  IPv6 header  | Routing header | TCP header + data
|               |                |
| Next Header = |  Next Header = |
|    Routing    |      TCP       |
+---------------+----------------+------------------------

+---------------+----------------+-----------------+----------------
|  IPv6 header  | Routing header | Fragment header | fragment of TCP
|               |                |                 |  header + data
| Next Header = |  Next Header = |  Next Header =  |
|    Routing    |    Fragment    |       TCP       |
+---------------+----------------+-----------------+----------------
```

FIG. 137B

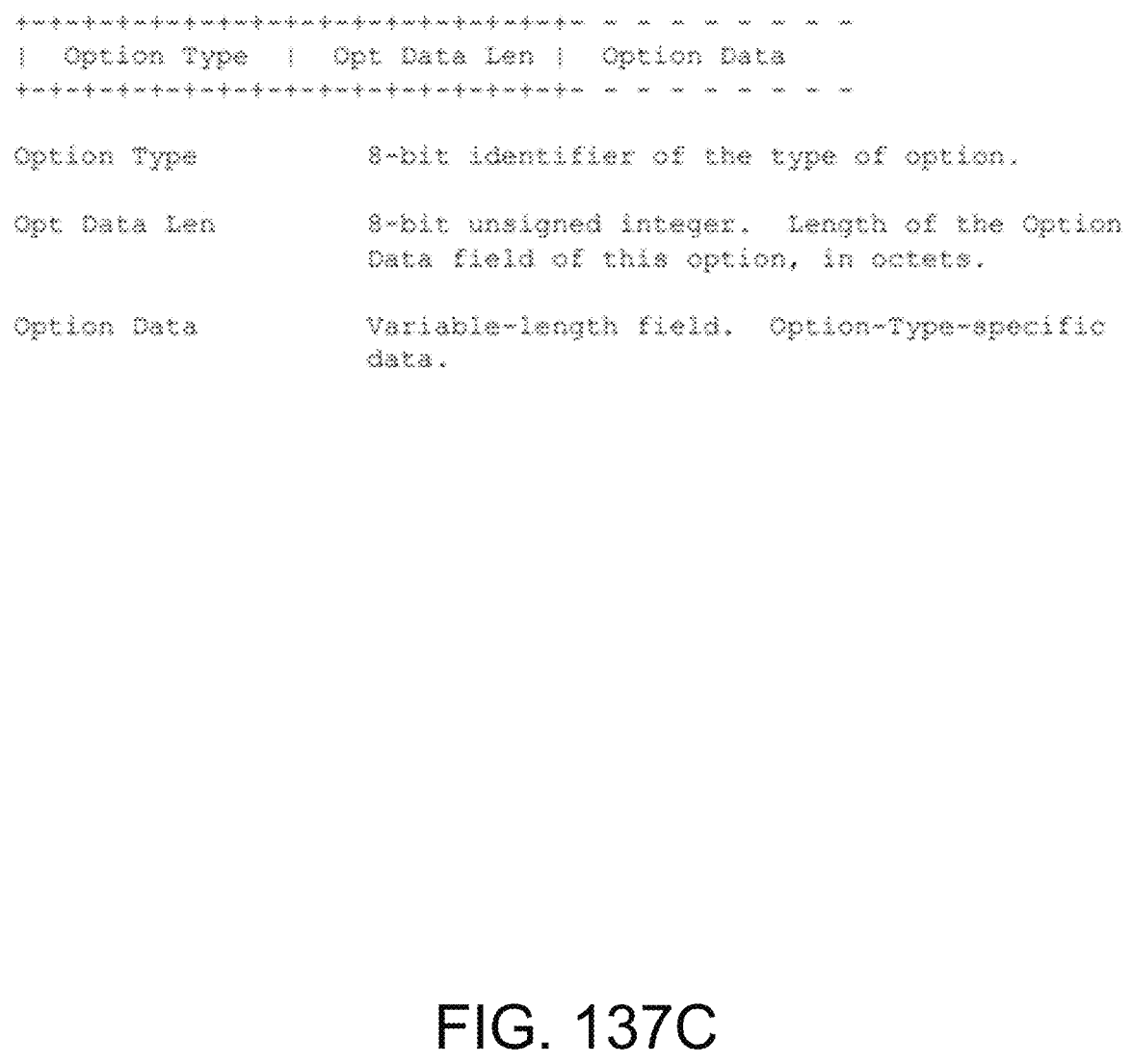

```
+-+-+-+-+-+-+-+-+-+-+-+-+-+-+-+-+- - - - - - - - -
|  Option Type  |  Opt Data Len |  Option Data
+-+-+-+-+-+-+-+-+-+-+-+-+-+-+-+-+- - - - - - - - -

Option Type          8-bit identifier of the type of option.

Opt Data Len         8-bit unsigned integer.  Length of the Option
                     Data field of this option, in octets.

Option Data          Variable-length field.  Option-Type-specific
                     data.
```

FIG. 137C

```
+-+-+-+-+-+-+-+-+-+-+-+-+-+-+-+-+- - - - - - - - -
|       1       |  Opt Data Len |  Option Data
+-+-+-+-+-+-+-+-+-+-+-+-+-+-+-+-+- - - - - - - - -
```

FIG. 137E

```
+-+-+-+-+-+-+-+-+-+-+-+-+-+-+-+-+-+-+-+-+-+-+-+-+-+-+-+-+-+-+-+-+
|  Next Header  |  Hdr Ext Len  |                               |
+-+-+-+-+-+-+-+-+-+-+-+-+-+-+-+-+                               +
|                                                               |
.                                                               .
.                            Options                            .
.                                                               .
|                                                               |
+-+-+-+-+-+-+-+-+-+-+-+-+-+-+-+-+-+-+-+-+-+-+-+-+-+-+-+-+-+-+-+-+
```

FIG. 137F

```
+-+-+-+-+-+-+-+-+-+-+-+-+-+-+-+-+-+-+-+-+-+-+-+-+-+-+-+-+-+-+-+-+
|  Next Header  |  Hdr Ext Len  |  Routing Type | Segments Left |
+-+-+-+-+-+-+-+-+-+-+-+-+-+-+-+-+-+-+-+-+-+-+-+-+-+-+-+-+-+-+-+-+
|                                                               |
.                                                               .
.                       type-specific data                      .
.                                                               .
|                                                               |
+-+-+-+-+-+-+-+-+-+-+-+-+-+-+-+-+-+-+-+-+-+-+-+-+-+-+-+-+-+-+-+-+
```

FIG. 137G

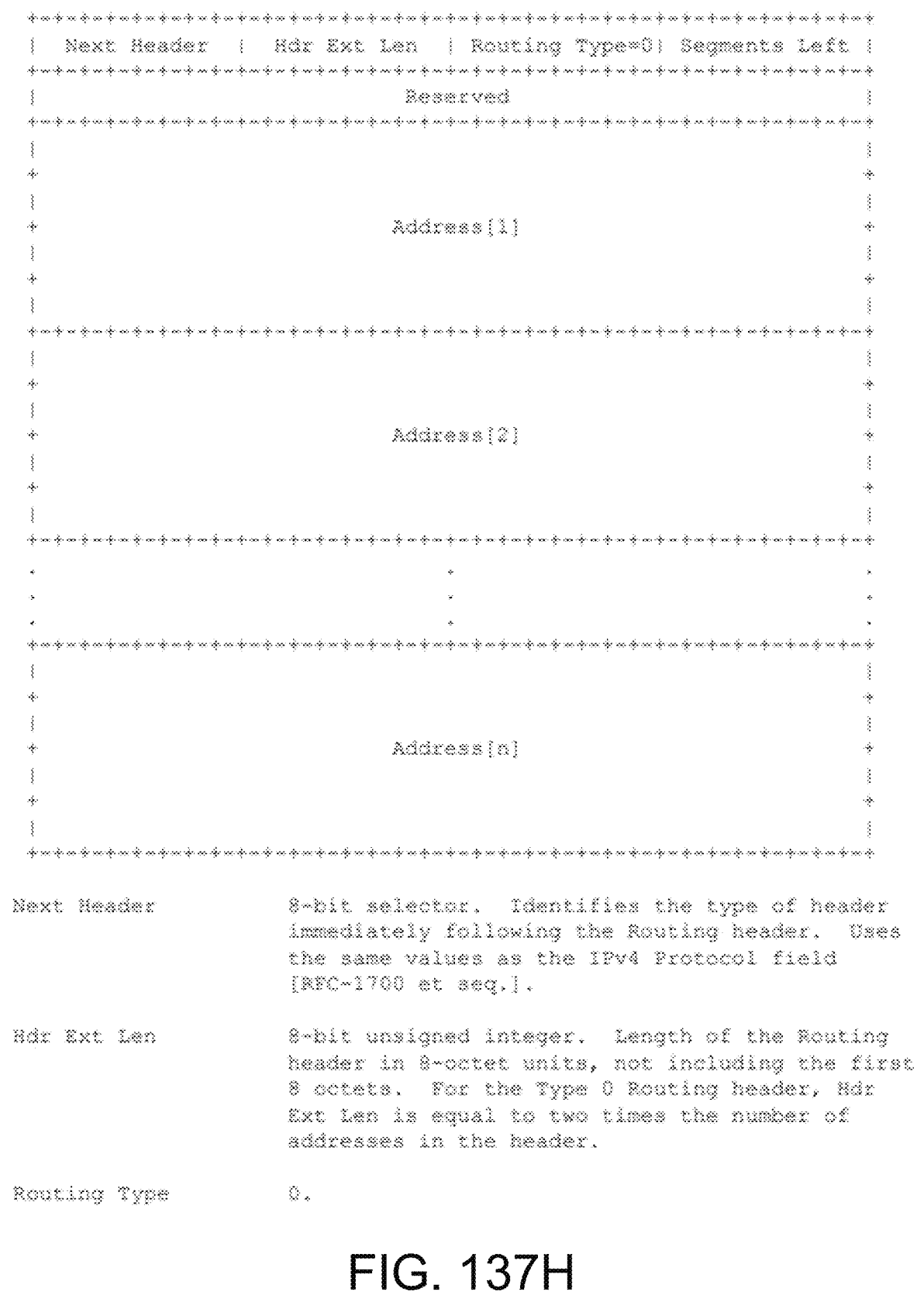

```
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type=0| Segments Left |
+-+-+-+-+-+-+-+-+-+-+-+-+-+-+-+-+-+-+-+-+-+-+-+-+-+-+-+-+-+-+-+-+
|                            Reserved                           |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                           Address[1]                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                           Address[2]                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
.                               .                               .
.                               .                               .
.                               .                               .
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                           Address[n]                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

```
Next Header          8-bit selector.  Identifies the type of header
                     immediately following the Routing header.  Uses
                     the same values as the IPv4 Protocol field
                     [RFC-1700 et seq.].

Hdr Ext Len          8-bit unsigned integer.  Length of the Routing
                     header in 8-octet units, not including the first
                     8 octets.  For the Type 0 Routing header, Hdr
                     Ext Len is equal to two times the number of
                     addresses in the header.

Routing Type         0.
```

FIG. 137H

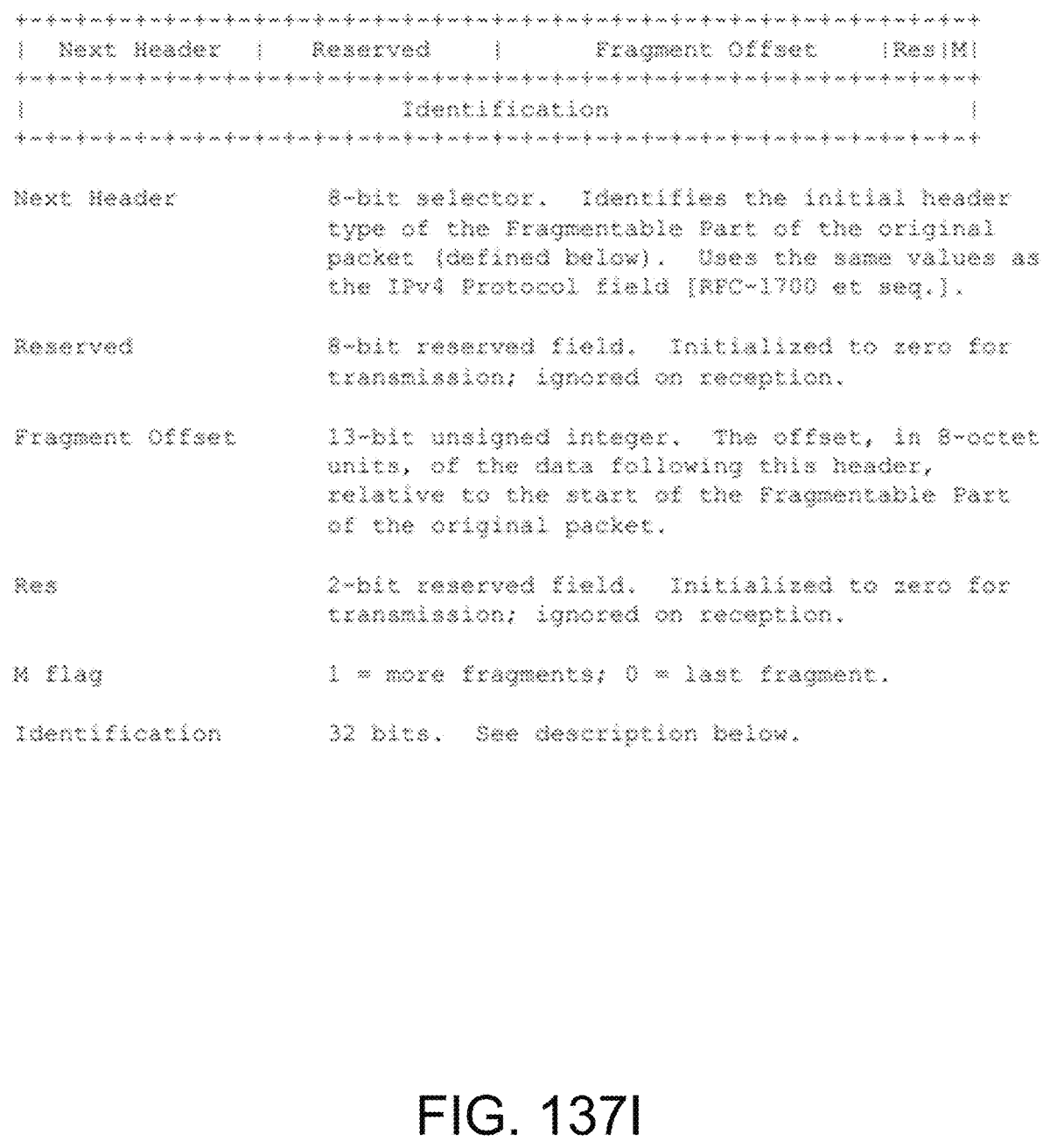

```
+-+-+-+-+-+-+-+-+-+-+-+-+-+-+-+-+-+-+-+-+-+-+-+-+-+-+-+-+-+-+-+-+
|  Next Header  |   Reserved    |      Fragment Offset    |Res|M|
+-+-+-+-+-+-+-+-+-+-+-+-+-+-+-+-+-+-+-+-+-+-+-+-+-+-+-+-+-+-+-+-+
|                         Identification                        |
+-+-+-+-+-+-+-+-+-+-+-+-+-+-+-+-+-+-+-+-+-+-+-+-+-+-+-+-+-+-+-+-+

Next Header          8-bit selector.  Identifies the initial header
                     type of the Fragmentable Part of the original
                     packet (defined below).  Uses the same values as
                     the IPv4 Protocol field [RFC-1700 et seq.].

Reserved             8-bit reserved field.  Initialized to zero for
                     transmission; ignored on reception.

Fragment Offset      13-bit unsigned integer.  The offset, in 8-octet
                     units, of the data following this header,
                     relative to the start of the Fragmentable Part
                     of the original packet.

Res                  2-bit reserved field.  Initialized to zero for
                     transmission; ignored on reception.

M flag               1 = more fragments; 0 = last fragment.

Identification       32 bits.  See description below.
```

FIG. 137I

```
+-----------------+---------------------//-----------------------+
|  Unfragmentable |              Fragmentable                    |
|       Part      |                  Part                        |
+-----------------+---------------------//-----------------------+
```

FIG. 137J

```
+-----------------+----------------+----------------+--//--+------------+
|  Unfragmentable |    first       |    second      |      |    last    |
|       Part      |   fragment     |   fragment     | .... |  fragment  |
+-----------------+----------------+----------------+--//--+------------+
```

FIG. 137K

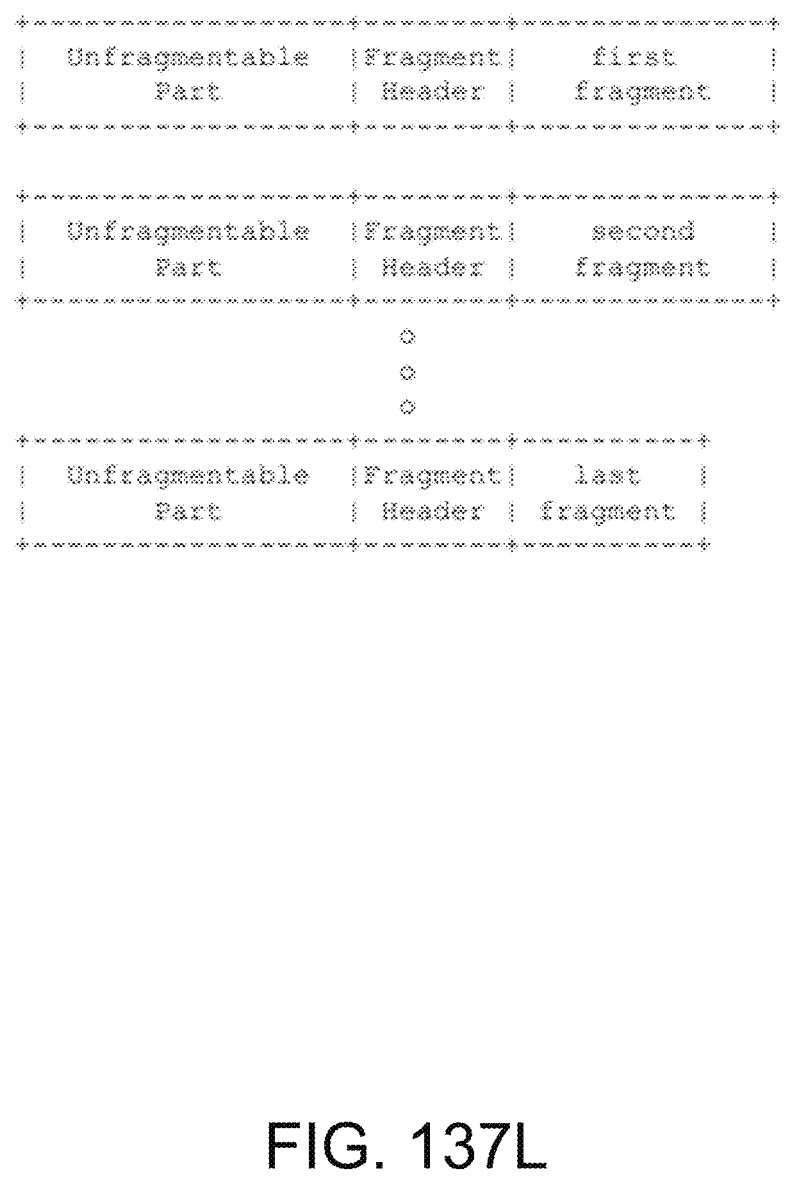

```
+-----------------+--------+--------------+
|  Unfragmentable |Fragment|    first     |
|       Part      | Header |   fragment   |
+-----------------+--------+--------------+

+-----------------+--------+--------------+
|  Unfragmentable |Fragment|    second    |
|       Part      | Header |   fragment   |
+-----------------+--------+--------------+
                      o
                      o
                      o
+-----------------+--------+----------+
|  Unfragmentable |Fragment|   last   |
|       Part      | Header | fragment |
+-----------------+--------+----------+
```

FIG. 137L

```
+-----------------+--------------------//----------------------+
|  Unfragmentable |              Fragmentable                  |
|       Part      |                  Part                      |
+-----------------+--------------------//----------------------+
```

FIG. 137M

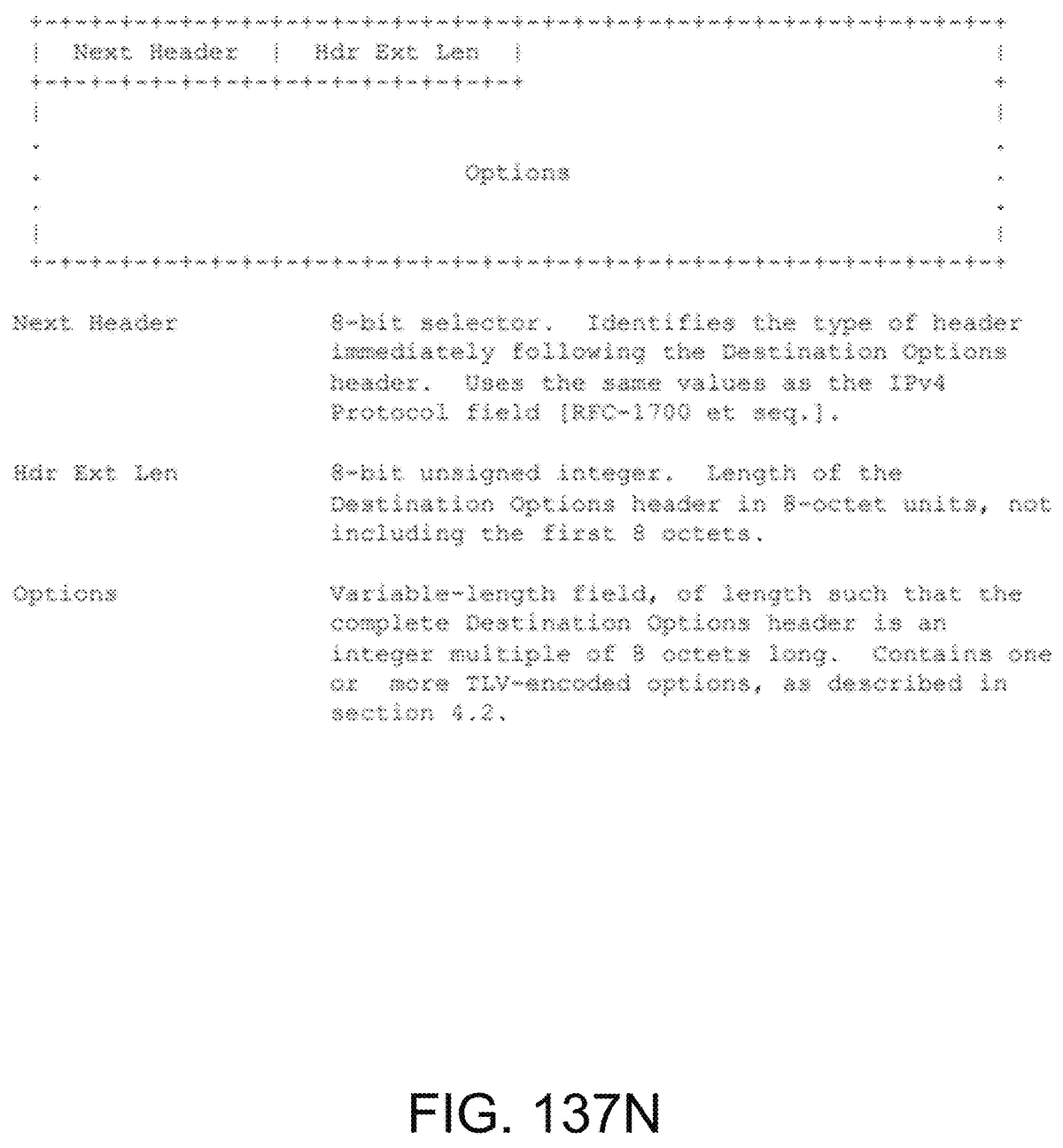

```
+-+-+-+-+-+-+-+-+-+-+-+-+-+-+-+-+-+-+-+-+-+-+-+-+-+-+-+-+-+-+-+-+
|  Next Header  |  Hdr Ext Len  |                               |
+-+-+-+-+-+-+-+-+-+-+-+-+-+-+-+-+                               +
|                                                               |
.                                                               .
.                            Options                            .
.                                                               .
|                                                               |
+-+-+-+-+-+-+-+-+-+-+-+-+-+-+-+-+-+-+-+-+-+-+-+-+-+-+-+-+-+-+-+-+
```

```
Next Header          8-bit selector.  Identifies the type of header
                     immediately following the Destination Options
                     header.  Uses the same values as the IPv4
                     Protocol field [RFC-1700 et seq.].

Hdr Ext Len          8-bit unsigned integer.  Length of the
                     Destination Options header in 8-octet units, not
                     including the first 8 octets.

Options              Variable-length field, of length such that the
                     complete Destination Options header is an
                     integer multiple of 8 octets long.  Contains one
                     or  more TLV-encoded options, as described in
                     section 4.2.
```

FIG. 137N

```
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                         Source Address                        +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                      Destination Address                      +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                   Upper-Layer Packet Length                   |
+-+-+-+-+-+-+-+-+-+-+-+-+-+-+-+-+-+-+-+-+-+-+-+-+-+-+-+-+-+-+-+-+
|                      zero                     |  Next Header  |
+-+-+-+-+-+-+-+-+-+-+-+-+-+-+-+-+-+-+-+-+-+-+-+-+-+-+-+-+-+-+-+-+
```

FIG. 137O

```
                                +-+-+-+-+-+-+-+-+-+-+-+-+-+-+-+-+
                                | Option Type=X |Opt Data Len=12|
+-+-+-+-+-+-+-+-+-+-+-+-+-+-+-+-+-+-+-+-+-+-+-+-+-+-+-+-+-+-+-+-+
|                         4-octet field                         |
+-+-+-+-+-+-+-+-+-+-+-+-+-+-+-+-+-+-+-+-+-+-+-+-+-+-+-+-+-+-+-+-+
|                                                               |
+                         8-octet field                         +
|                                                               |
+-+-+-+-+-+-+-+-+-+-+-+-+-+-+-+-+-+-+-+-+-+-+-+-+-+-+-+-+-+-+-+-+
```

FIG. 137P

```
+-+-+-+-+-+-+-+-+-+-+-+-+-+-+-+-+-+-+-+-+-+-+-+-+-+-+-+-+-+-+-+-+
|  Next Header  | Hdr Ext Len=1 | Option Type=X |Opt Data Len=12|
+-+-+-+-+-+-+-+-+-+-+-+-+-+-+-+-+-+-+-+-+-+-+-+-+-+-+-+-+-+-+-+-+
|                         4-octet field                         |
+-+-+-+-+-+-+-+-+-+-+-+-+-+-+-+-+-+-+-+-+-+-+-+-+-+-+-+-+-+-+-+-+
|                                                               |
+                         8-octet field                         +
|                                                               |
+-+-+-+-+-+-+-+-+-+-+-+-+-+-+-+-+-+-+-+-+-+-+-+-+-+-+-+-+-+-+-+-+
```

FIG. 137Q

```
                                                +-+-+-+-+-+-+-+-+
                                                | Option Type=Y |
+-+-+-+-+-+-+-+-+-+-+-+-+-+-+-+-+-+-+-+-+-+-+-+-+-+-+-+-+-+-+-+-+
|Opt Data Len=7 | 1-octet field |         2-octet field         |
+-+-+-+-+-+-+-+-+-+-+-+-+-+-+-+-+-+-+-+-+-+-+-+-+-+-+-+-+-+-+-+-+
|                         4-octet field                         |
+-+-+-+-+-+-+-+-+-+-+-+-+-+-+-+-+-+-+-+-+-+-+-+-+-+-+-+-+-+-+-+-+
```

FIG. 137R

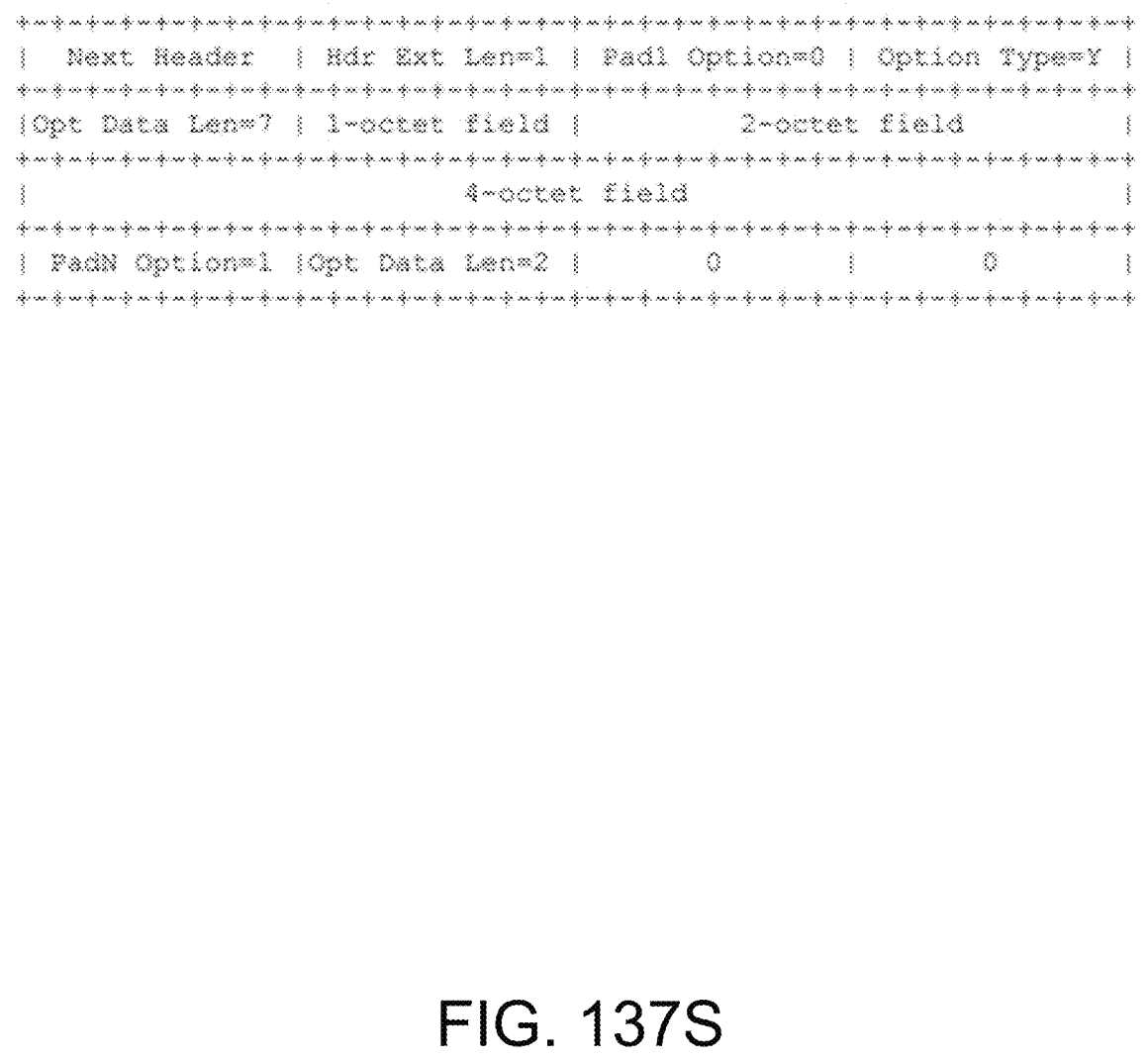

```
+-+-+-+-+-+-+-+-+-+-+-+-+-+-+-+-+-+-+-+-+-+-+-+-+-+-+-+-+-+-+-+-+
|  Next Header  | Hdr Ext Len=1 | Pad1 Option=0 | Option Type=Y |
+-+-+-+-+-+-+-+-+-+-+-+-+-+-+-+-+-+-+-+-+-+-+-+-+-+-+-+-+-+-+-+-+
|Opt Data Len=7 | 1-octet field |         2-octet field         |
+-+-+-+-+-+-+-+-+-+-+-+-+-+-+-+-+-+-+-+-+-+-+-+-+-+-+-+-+-+-+-+-+
|                         4-octet field                         |
+-+-+-+-+-+-+-+-+-+-+-+-+-+-+-+-+-+-+-+-+-+-+-+-+-+-+-+-+-+-+-+-+
| PadN Option=1 |Opt Data Len=2 |       0       |       0       |
+-+-+-+-+-+-+-+-+-+-+-+-+-+-+-+-+-+-+-+-+-+-+-+-+-+-+-+-+-+-+-+-+
```

FIG. 137S

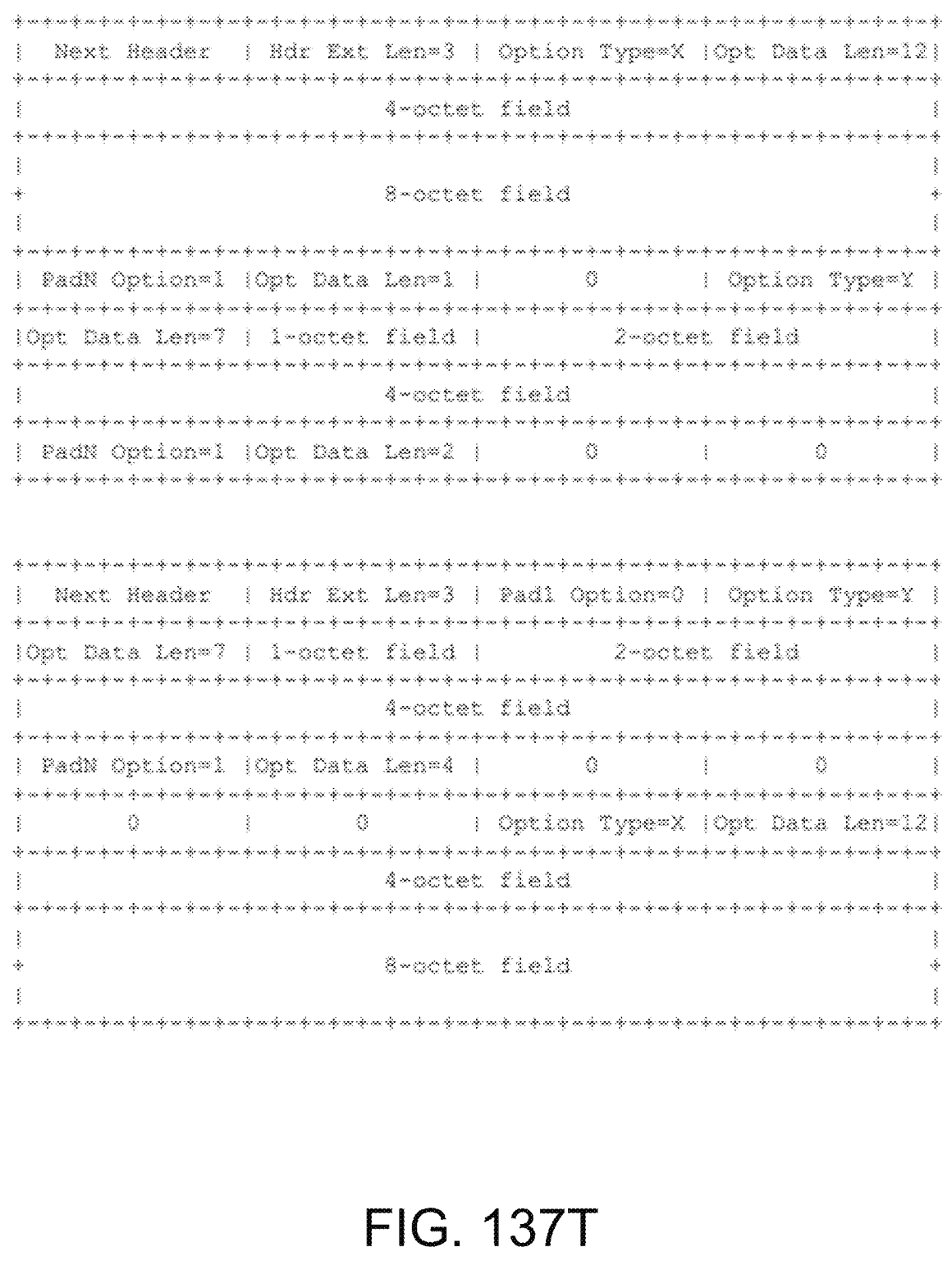

```
+-+-+-+-+-+-+-+-+-+-+-+-+-+-+-+-+-+-+-+-+-+-+-+-+-+-+-+-+-+-+-+-+
|  Next Header  | Hdr Ext Len=3 | Option Type=X |Opt Data Len=12|
+-+-+-+-+-+-+-+-+-+-+-+-+-+-+-+-+-+-+-+-+-+-+-+-+-+-+-+-+-+-+-+-+
|                         4-octet field                         |
+-+-+-+-+-+-+-+-+-+-+-+-+-+-+-+-+-+-+-+-+-+-+-+-+-+-+-+-+-+-+-+-+
|                                                               |
+                         8-octet field                         +
|                                                               |
+-+-+-+-+-+-+-+-+-+-+-+-+-+-+-+-+-+-+-+-+-+-+-+-+-+-+-+-+-+-+-+-+
| PadN Option=1 |Opt Data Len=1 |       0       | Option Type=Y |
+-+-+-+-+-+-+-+-+-+-+-+-+-+-+-+-+-+-+-+-+-+-+-+-+-+-+-+-+-+-+-+-+
|Opt Data Len=7 | 1-octet field |         2-octet field         |
+-+-+-+-+-+-+-+-+-+-+-+-+-+-+-+-+-+-+-+-+-+-+-+-+-+-+-+-+-+-+-+-+
|                         4-octet field                         |
+-+-+-+-+-+-+-+-+-+-+-+-+-+-+-+-+-+-+-+-+-+-+-+-+-+-+-+-+-+-+-+-+
| PadN Option=1 |Opt Data Len=2 |       0       |       0       |
+-+-+-+-+-+-+-+-+-+-+-+-+-+-+-+-+-+-+-+-+-+-+-+-+-+-+-+-+-+-+-+-+
```

```
+-+-+-+-+-+-+-+-+-+-+-+-+-+-+-+-+-+-+-+-+-+-+-+-+-+-+-+-+-+-+-+-+
|  Next Header  | Hdr Ext Len=3 | Pad1 Option=0 | Option Type=Y |
+-+-+-+-+-+-+-+-+-+-+-+-+-+-+-+-+-+-+-+-+-+-+-+-+-+-+-+-+-+-+-+-+
|Opt Data Len=7 | 1-octet field |         2-octet field         |
+-+-+-+-+-+-+-+-+-+-+-+-+-+-+-+-+-+-+-+-+-+-+-+-+-+-+-+-+-+-+-+-+
|                         4-octet field                         |
+-+-+-+-+-+-+-+-+-+-+-+-+-+-+-+-+-+-+-+-+-+-+-+-+-+-+-+-+-+-+-+-+
| PadN Option=1 |Opt Data Len=4 |       0       |       0       |
+-+-+-+-+-+-+-+-+-+-+-+-+-+-+-+-+-+-+-+-+-+-+-+-+-+-+-+-+-+-+-+-+
|       0       |       0       | Option Type=X |Opt Data Len=12|
+-+-+-+-+-+-+-+-+-+-+-+-+-+-+-+-+-+-+-+-+-+-+-+-+-+-+-+-+-+-+-+-+
|                         4-octet field                         |
+-+-+-+-+-+-+-+-+-+-+-+-+-+-+-+-+-+-+-+-+-+-+-+-+-+-+-+-+-+-+-+-+
|                                                               |
+                         8-octet field                         +
|                                                               |
+-+-+-+-+-+-+-+-+-+-+-+-+-+-+-+-+-+-+-+-+-+-+-+-+-+-+-+-+-+-+-+-+
```

FIG. 137T

```
The type of an IPv6 address is identified by the high-order bits of
the address, as follows:

Address type         Binary prefix        IPv6 notation   Section
------------         -------------        -------------   -------
Unspecified          00...0  (128 bits)   ::/128          2.5.2
Loopback             00...1  (128 bits)   ::1/128         2.5.3
Multicast            11111111             FF00::/8        2.7
Link-local unicast   1111111010           FE80::/10       2.5.6
Site-local unicast   1111111011           FEC0::/10       2.5.6
Global unicast       (everything else)

Anycast addresses are taken from the unicast address spaces (of any
scope) and are not syntactically distinguishable from unicast
addresses.
```

FIG. 138A

```
|                          128 bits                          |
+------------------------------------------------------------+
|                        node address                        |
+------------------------------------------------------------+
```

FIG. 138B

```
|                   n bits                    |   128-n bits   |
+---------------------------------------------+----------------+
|               subnet prefix                 | interface ID   |
+---------------------------------------------+----------------+
```

FIG. 138C

```
 0       0 0       1 1       2
|0       7 8       5 6       3|
+----+----+----+----+----+----+
|cccc|ccug|cccc|cccc|cccc|cccc|
+----+----+----+----+----+----+
```

FIG. 138D

```
|         n bits         |   m bits  |       128-n-m bits         |
+------------------------+-----------+----------------------------+
| global routing prefix  | subnet ID |       interface ID         |
+------------------------+-----------+----------------------------+
```

FIG. 138E

```
|                80 bits               | 16 |      32 bits        |
+--------------------------------------+----+---------------------+
|0000..............................0000|0000|    IPv4 address     |
+--------------------------------------+----+---------------------+
```

FIG. 138F

```
|                80 bits               | 16 |       32 bits        |
+--------------------------------------+----+----------------------+
|0000..............................0000|FFFF|    IPv4 address      |
+--------------------------------------+----+----------------------+
```

FIG. 138G

```
|   10     |
|  bits    |         54 bits          |          64 bits           |
+----------+-------------------------+----------------------------+
|1111111010|           0             |       interface ID         |
+----------+-------------------------+----------------------------+
```

FIG. 138H

```
|   10     |
|  bits    |         54 bits          |         64 bits            |
+----------+-------------------------+----------------------------+
|1111111011|        subnet ID         |       interface ID         |
+----------+-------------------------+----------------------------+
```

FIG. 138I

```
|                         n bits                         |   128-n bits   |
+--------------------------------------------------------+----------------+
|                   subnet prefix                        | 00000000000000 |
+--------------------------------------------------------+----------------+
```

FIG. 138J

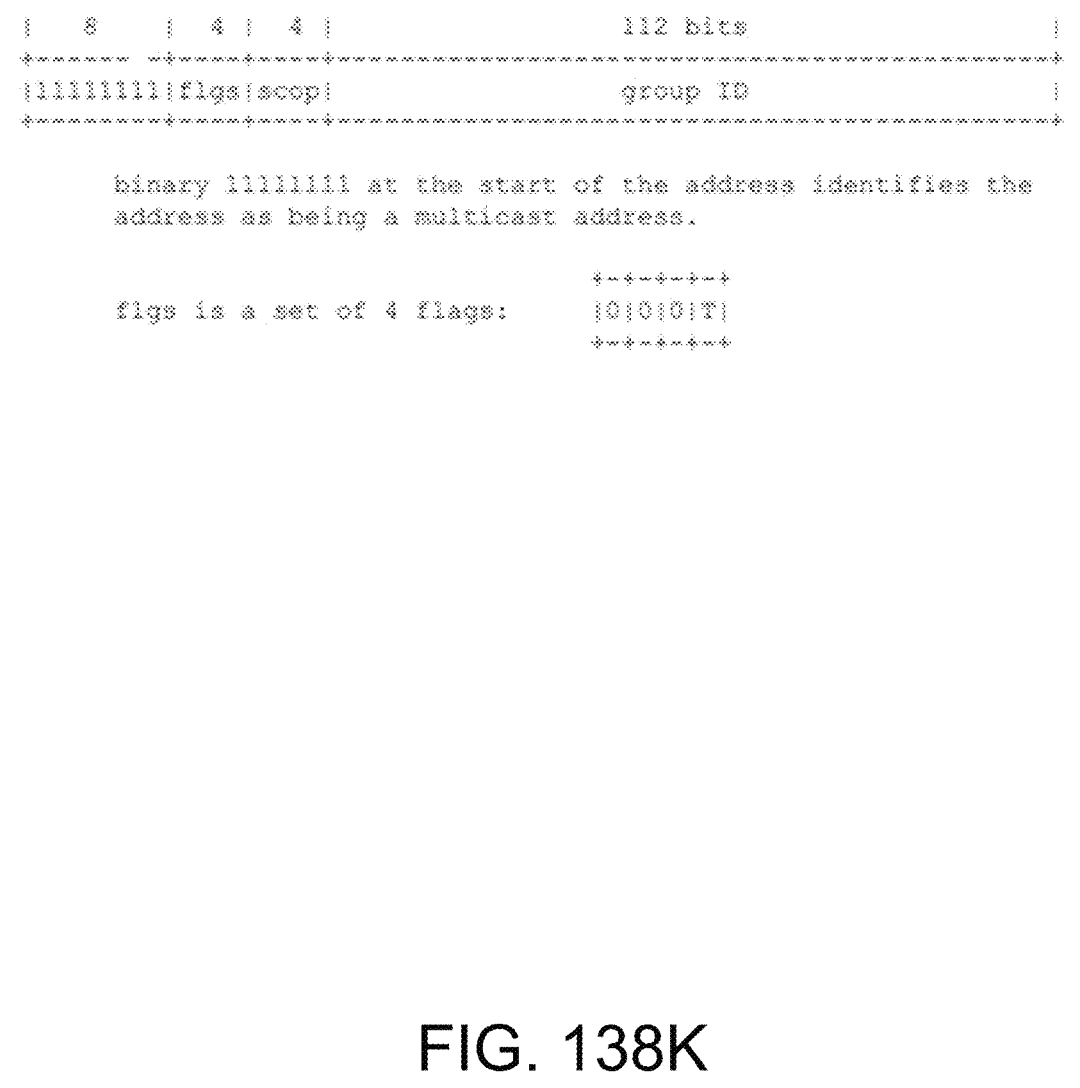

```
|   8    |  4 |  4 |                 112 bits                    |
+------ -+----+----+---------------------------------------------+
|11111111|flgs|scop|                 group ID                    |
+--------+----+----+---------------------------------------------+

     binary 11111111 at the start of the address identifies the
     address as being a multicast address.

                                    +-+-+-+-+
     flgs is a set of 4 flags:      |0|0|0|T|
                                    +-+-+-+-+
```

FIG. 138K

| Allocation | Prefix (binary) | Fraction of Address Space |
|---|---|---|
| Unassigned (see Note 1 below) | 0000 0000 | 1/256 |
| Unassigned | 0000 0001 | 1/256 |
| Reserved for NSAP Allocation | 0000 001 | 1/128 [RFC1888] |
| Unassigned | 0000 01 | 1/64 |
| Unassigned | 0000 1 | 1/32 |
| Unassigned | 0001 | 1/16 |
| Global Unicast | 001 | 1/8 [RFC2374] |
| Unassigned | 010 | 1/8 |
| Unassigned | 011 | 1/8 |
| Unassigned | 100 | 1/8 |
| Unassigned | 101 | 1/8 |
| Unassigned | 110 | 1/8 |
| Unassigned | 1110 | 1/16 |
| Unassigned | 1111 0 | 1/32 |
| Unassigned | 1111 10 | 1/64 |
| Unassigned | 1111 110 | 1/128 |
| Unassigned | 1111 1110 0 | 1/512 |
| Link-Local Unicast Addresses | 1111 1110 10 | 1/1024 |
| Site-Local Unicast Addresses | 1111 1110 11 | 1/1024 |
| Multicast Addresses | 1111 1111 | 1/256 |

FIG. 138L

```
|0             1|1            3|3            4|4            6|
|0             5|6            1|2            7|8            3|
+----------------+----------------+----------------+----------------+
|cccccc0gcccccccc|ccccccccmmmmmmmm|mmmmmmmmmmmmmmmm|mmmmmmmmmmmmmmmm|
+----------------+----------------+----------------+----------------+
```

FIG. 138M

```
|0              1|1              3|3              4|4              6|
|0              5|6              1|2              7|8              3|
+----------------+----------------+----------------+----------------+
|cccccclgcccccccc|ccccccccmmmmmmmm|mmmmmmmmmmmmmmmm|mmmmmmmmmmmmmmmm|
+----------------+----------------+----------------+----------------+
```

FIG. 138N

```
|0              1|1              3|3              4|
|0              5|6              1|2              7|
+----------------+----------------+----------------+
|cccccc0gcccccccc|ccccccccmmmmmmmm|mmmmmmmmmmmmmmmm|
+----------------+----------------+----------------+
```

FIG. 138O

```
|0              1|1             3|3             4|4             6|
|0              5|6             1|2             7|8             3|
+----------------+---------------+---------------+---------------+
|cccccclgcccccccc|ccccccccllllllll|lllllll0mmmmmmmm|mmmmmmmmmmmmmmmm|
+----------------+---------------+---------------+---------------+
```

```
|0              1|1              3|3              4|4              6|
|0              5|6              1|2              7|8              3|
+----------------+----------------+----------------+----------------+
|0000000000000000|0000000000000000|0000000000000000|0000000001001111|
+----------------+----------------+----------------+----------------+
```

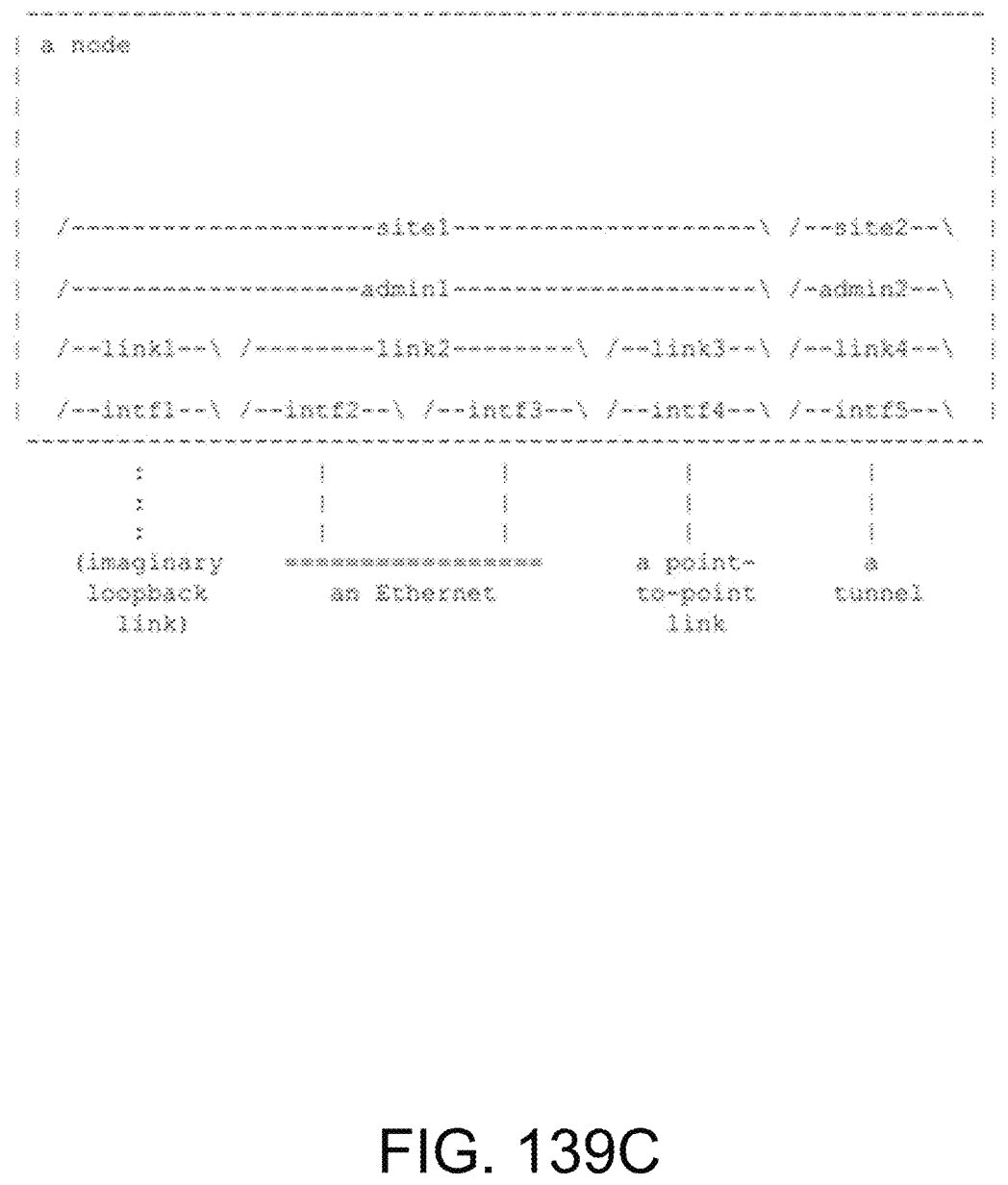

```
 ---------------------------------------------------------------
| a node                                                          |
|                                                                 |
|                                                                 |
|                                                                 |
|                                                                 |
|                                                                 |
|  /--------------------site1---------------------\ /--site2--\  |
|                                                                 |
|  /-------------------admin1---------------------\ /-admin2--\  |
|                                                                 |
|  /--link1--\ /---------link2---------\ /--link3--\ /--link4--\  |
|                                                                 |
|  /--intf1--\ /--intf2--\ /--intf3--\ /--intf4--\ /--intf5--\  |
 ---------------------------------------------------------------
        :           |           |           |           |
        :           |           |           |           |
        :           |           |           |           |
   (imaginary   =================        a point-       a
    loopback       an Ethernet           to-point     tunnel
      link)                                link
```

FIG. 139C

ROUTING METHODS, SYSTEMS, AND COMPUTER PROGRAM PRODUCTS

RELATED APPLICATIONS

The present application is a continuation of U.S. application Ser. No. 14/274,632 (published US 2014-0365682 A1) filed May 9, 2014 and entitled "Methods, Systems, and Computer Program Products for Associating a Name with a Network Path" which, in turn, is a continuation-in-part of and claims priority to: U.S. application Ser. No. 13/727,647 (published US 2014-0189152 A1) filed Dec. 27, 2012 and entitled "Methods, Systems, and Computer Program Products for Identifying a Protocol Address based on Path Information," U.S. application Ser. No. 13/727,649 (published US 2014-0189081 A1) filed Dec. 27, 2012 and entitled "Methods, Systems, and Computer Program Products for Assigning an Interface Identifier to a Network Interface," U.S. application Ser. No. 13/727,651 (published US 2014-0189045 A1) filed Dec. 27, 2012 and entitled "Methods, Systems, and Computer Program Products for Routing Based on a Nested Protocol Address," U.S. application Ser. No. 13/727,652 (published US 2014-0189153 A1) filed Dec. 27, 2012 and entitled "Methods, Systems, and Computer Program Products for Routing Based on a Scope-Specific Address," U.S. application Ser. No. 13/727,653 (published US 2014-0189159 A1) filed Dec. 27, 2012 and entitled "Methods, Systems, and Computer Program Products for Identifying a Protocol Address in a Scope-Specific Address Space," U.S. application Ser. No. 13/727,655 (published US 2014-0189154 A1) filed Dec. 27, 2012 and entitled "Methods, Systems, and Computer Program Products for Determining a Shared Identifier for a Hop in a Network," U.S. application Ser. No. 13/727,657 (published US 2014-0189155 A1) filed Dec. 27, 2012 and entitled "Methods, Systems, and Computer Program Products for Determining a Protocol Address For a Node," and U.S. application Ser. No. 13/727,662 (published US 2014-0189156 A1) filed Dec. 27, 2012 and entitled "Methods, Systems, and Computer Program Products for Routing Based on a Path-Based Protocol Address," where U.S. application Ser. No. 14/274,632 further claims priority to U.S. Provisional Application No. 61/822,978 filed May 14, 2013 and entitled "Methods, Systems, and Computer Program Products For Transmitting Data Via A Scope-Specific Protocol Address," U.S. Provisional Application No. 61/822,386 filed May 12, 2013 and entitled "Methods, Systems, and Computer Program Products For Associating a Name With a Network Path," U.S. Provisional Application No. 61/897,234 filed Oct. 30, 2013 and entitled "Methods, Systems, and Computer Program Products For Transmitting Data Via A Variable Length Protocol Address," U.S. Provisional Application No. 61/830,064 filed Jun. 1, 2013 and entitled "Methods, Systems, and Computer Program Products For Adjusting A Separator Field For A Protocol Address," U.S. Provisional Application No. 61/831,932 filed Jun. 6, 2013 and entitled "Methods, Systems, and Computer Program Products for Source Routing," and U.S. Provisional Application No. 61/833,565 filed Jun. 11, 2013 and entitled "Methods, Systems, and Computer Program Products For Changing Protocol Address By A Network Relay," the entire contents of all of the above are herein incorporated by reference.

This application is related to the following currently pending U.S. Patent Applications by the present inventor, the entire disclosures of each being incorporated by reference herein: application Ser. No. 11/962,285 (published US 2009-0161576 A1), filed on 2007 Dec. 21, entitled "Methods and Systems for Sending Information to a Zone Included in an Internet Network";

Application Ser. No. 12/062,101 (published US 2009-0252161 A1), filed on 2008 Apr. 3, entitled "Methods and Systems for Routing a Data Packet Based on Geospatial Information";

Application Ser. No. 12/170,833 (published US 2010-0010975 A1), filed on 2008 Jul. 10, entitled "Methods and Systems for Resolving a Query Region to a Network Identifier";

Application Ser. No. 12/170,829 (published US 2010-0010992 A1), filed on 2008 Jul. 10, entitled "Methods and Systems for Resolving a Location Information to a Network Identifier";

Application Ser. No. 12/170,821 (published US 2010-0011048 A1), filed on 2008 Jul. 10, entitled "Methods and Systems for Resolving a Geospatial Query Region to a Network Identifier";

Application Ser. No. 12/272,989 (published US 2010-0124220 A1), by the present inventor, filed on 2008 Nov. 18, entitled "Methods and Systems for Incrementally Resolving a Host Name to a Protocol address";

Application Ser. No. 12/328,059 (published US 2010-0142401 A1), filed on 2008 Dec. 4, entitled "Methods, Systems, and Computer Program Products for Determining a Network Identifier of a Node Providing a Type of Service for a Geospatial Region";

Application Ser. No. 12/328,038 (published US 2010-0145602 A1), filed on 2008 Dec. 4, entitled "Methods, Systems, and Computer Program Products for Associating Resources of a First Geospace with a Second Geospace";

Application Ser. No. 12/328,048 (published US 2010-0145963 A1), filed on 2008 Dec. 4, entitled "Methods, Systems, and Computer Program Products for Resolving a Network Identifier Based on a Geospatial Domain Space Harmonized with a Non-Geospatial Domain Space"

Application Ser. No. 12/328,063 (published US 2010-0146132 A1), filed on 2008 Dec. 4, entitled "Methods, Systems, and Computer Program Products for Accessing a Resource Having a Protocol address Associated With a Location on a Map";

Application Ser. No. 12/339,675 (published US 2010-0161732 A1), filed on 2008 Dec. 19, entitled "Methods, Systems, and Computer Program Products for Maintaining Consistency Between Non-Geospatial and Geospatial Address space directories";

Application Ser. No. 12/401,707 (published US 2010-0232433 A1), filed on 2009 Mar. 11, entitled "Methods and Systems for Resolving a Source node Identifier in a First Identifier Domain Space to a Second Node Identifier in a Second Identifier Domain Space"; and Application Ser. No. 12/414,007 (published US 2010-0250777 A1), filed on 2009 Mar. 30, entitled "Methods, Systems, and Computer Program Products for Resolving a First Source Node Identifier to a Second Source Node Identifier".

BACKGROUND

It is unlikely that the designers of the early network that is now referred to as the "Internet" expected it to become as large as it has become. The fact that the global Internet Protocol (IP) address space for 32-bit addresses has been fully allocated is evidence of this. As the Internet grows, new problems will arise and some current problems are getting worse. For example, while network speeds and bandwidth are increases, so are causes of network latency.

The Internet Engineering Task Force (IETF) has taken steps at various times in the past and are presently taking steps to address a number of problems resulting from the Internet's growth. Problems addressed by the IETF are described in a number of "Request for Comments" (RFC) documents published the IETF. Documents referenced herein include: "Request for Comments" (RFC) document RFC 791 edited by J. Postel, titled "Internet Protocol, DARPA Internet Protocol Specification", published by the IETF in September, 1981;

"Request for Comments" (RFC) document RFC 201519 by V. Fuller, et al, titled "Classless Inter-Domain Routing (CIDR): An Address Assignment and Aggregation Strategy", published by the Internet Engineering Task Force (IETF), in June, 1999;

"Request for Comments" (RFC) document RFC 2410 by S. Deering, et al, titled "Internet Protocol, Version 206, (IPv6) Specification", published by the IETF in December, 1998;

"Request for Comments" (RFC) document RFC 3513 by R. Hinden, et al, titled "Internet Protocol Version 6 (IPv6) Addressing Architecture", published by the IETF in April, 2003; and "Request for Comments" (RFC) document RFC 2374 by R. Hinden, et al, titled "Aggregatable Global Unicast Address Format", published by the IETF in July, 1998.

The authors of RFC 201519 in dealing with a number of issues state that their proposal".

RFC 791 states, "The internet protocol implements two basic functions: addressing and fragmentation". RFC 791 goes on to state, "A distinction is made between names, addresses, and routes. A name indicates what we seek. An address indicates where it is. A route indicates how to get there. The internet protocol deals primarily with addresses. It is the task of higher level (i.e., host-to-host or application) protocols to make the mapping from names to addresses. The internet module maps internet addresses to local net addresses. It is the task of lower level (i.e., local net or gateways) procedures to make the mapping from local net addresses to routes".

Further new protocols and platforms for building new protocols, such as OpenFlow of the Open Network Foundation (ONF), have been introduced, and will continue to be introduced. Such protocols and platforms are within the scope of the subject matter of the present disclosure. The OpenFlow protocol is specified in "OpenFlow Switch Specification", by Pfaff, B, et al, and published by the ONF in Feb. 29, 2011.

In order to address a number of current and future problems facing the Internet, the subject matter described herein challenges the distinctions asserted in RFC 791 and establishes new relationships between and among names, addresses, and routes. The description herein further demonstrates that current internet addresses do not indicate where a node or network interface component (NIC) of a node is. They provide another global identifier space for identifying nodes and their network interfaces. This global identifier space to some extent is duplicative of the domain name space, which is also a global identifier space for identifying nodes and network interfaces. This duplication of roles is unnecessary as described below.

Accordingly, there exists a need for methods, systems, and computer program products for associating a name with a network path.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a non-transitory computer-readable media is provided storing computer instructions that, when executed by one or more processors of a first node in a network, cause the first node to: receive an Internet Protocol (IP) packet that includes a first identifier and further includes an outside-scope second identifier that, for the first node, identifies a first region that does not include the first node and that is communicatively coupled to the first node via a second node; select, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment; and forward, via the outgoing network interface and to the second node, data received in the IP packet.

In still another embodiment, an apparatus is provided, comprising: a first node including at least one non-transitory memory configured to store instructions, and one or more processors in communication with the at least one non-transitory memory, wherein the one or more processors is configured to execute the instructions to cause the first node to: receive an Internet Protocol (IP) packet that includes a first identifier and further includes an outside-scope second identifier that, for the first node, identifies a first region that does not include the first node and that is communicatively coupled to the first node via a second node; select, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment; and forward, via the outgoing network interface and to the second node, data received in the IP packet.

In yet still another embodiment, a method is provided, comprising: at a first node in a network: receiving an Internet Protocol (IP) packet that includes a first identifier and further includes an outside-scope second identifier that, for the first node, identifies a first region that does not include the first node and that is communicatively coupled to the first node via a second node; selecting, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment; and forwarding, via the outgoing network interface, data received in the IP packet.

In even still another embodiment, a first node is provided, comprising: means for receiving an Internet Protocol (IP) packet that includes a first identifier and further includes an outside-scope second identifier that, for the first node, identifies a first region that does not include the first node and that is communicatively coupled to the first node via a second node; means for selecting, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment; and means for forwarding, via the outgoing network interface and to the second node, data received in the IP packet.

Methods and systems are described for associating a name with a network path. In one aspect, the method includes receiving a first message, from a first node by a second node via a first network path in a network, identifying a first symbolic identifier of the first node, wherein the first network path includes a first hop included in communicatively coupling the first node and the second node. The method further includes identifying second path information identifying a second hop in a second network path included in communicatively coupling the second node and a third node. The method still further includes sending a second message, identifying the first symbolic identifier and the first hop, to the third node via the second hop to associate the first symbolic identifier with a third network path that includes a node included in at least one of the first hop and the second hop. Performing at least one the preceding actions comprising the method includes execution of an instruction by a processor.

Also, a system for associating a name with a network path is described that includes at least one processor; and logic encoded in at least one data storage media for execution by the at least one processor that when executed is operable for and/or is otherwise included in receiving a first message, from a first node by a second node via a first network path in a network, identifying a first symbolic identifier of the first node, wherein the first network path includes a first hop included in communicatively coupling the first node and the second node; identifying second path information identifying a second hop in a second network path included in communicatively coupling the second node and a third node; and sending a second message, identifying the first symbolic identifier and the first hop, to the third node via the second hop to associate the first symbolic identifier with a third network path that includes a node included in at least one of the first hop and the second hop.

Further, a system for associating a name with a network path is described. The system includes a processor that executes an instruction included in at least one of a resolver component, a topology space component, and a topology relay component during operation of the system. During operation of the system the resolver component is operable for and/or is otherwise included in receiving a first message, from a first node by a second node via a first network path in a network, identifying a first symbolic identifier of the first node, wherein the first network path includes a first hop included in communicatively coupling the first node and the second node; the topology space component is operable for and/or is otherwise included in identifying second path information identifying a second hop in a second network path included in communicatively coupling the second node and a third node; and the topology relay component is operable for and/or is otherwise included in sending a second message, identifying the first symbolic identifier and the first hop, to the third node via the second hop to associate the first symbolic identifier with a third network path that includes a node included in at least one of the first hop and the second hop.

Methods and systems are described for associating a name with a network path. In one aspect, the method includes detecting, by a second node in a network, a first node in first hop included in communicatively coupling the second node and the first node. The method further includes determining a first hop identifier for the first hop. The method still further includes sending, by the second node, the first hop identifier to a topology service to include a representation of the first node in a first location in a topological space, wherein the first location is identified relative to the second node based on the first hop identifier. Performing at least one the preceding actions comprising the method includes execution of an instruction by a processor.

Also, a system for associating a name with a network path is described that includes at least one processor; and logic encoded in at least one data storage media for execution by the at least one processor that when executed is operable for and/or is otherwise included in detecting, by a second node in a network, a first node in first hop included in communicatively coupling the second node and the first node; determining a first hop identifier for the first hop; and sending, by the second node, the first hop identifier to a topology service to include a representation of the first node in a first location in a topological space, wherein the first location is identified relative to the second node based on the first hop identifier.

Further, a system for associating a name with a network path is described. The system includes a processor that executes an instruction included in at least one of a topology monitor component, a topology space component, and a topology communication component during operation of the system. During operation of the system the topology monitor component is operable for and/or is otherwise included in detecting, by a second node in a network, a first node in first hop included in communicatively coupling the second node and the first node; the topology space component is operable for and/or is otherwise included in determining a first hop identifier for the first hop; and the topology communication component is operable for and/or is otherwise included in sending, by the second node, the first hop identifier to a topology service to include a representation of the first node in a first location in a topological space, wherein the first location is identified relative to the second node based on the first hop identifier.

BRIEF DESCRIPTION OF THE DRAWINGS

Objects and advantages of the present invention will become apparent to those skilled in the art upon reading this description in conjunction with the accompanying drawings, and in which:

FIG. 50A is a diagram illustrating an exemplary network protocol data unit header according to another aspect of the subject matter described herein;

FIG. 50B is a diagram illustrating an exemplary network protocol data unit header according to another aspect of the subject matter described herein;

FIG. 88D is a diagram illustrating an exemplary representation of a protocol address according to another aspect of the subject matter described herein;

FIG. 88E is a diagram illustrating an exemplary representation of a protocol address according to another aspect of the subject matter described herein;

FIG. 89 is a flow diagram illustrating another method according to an aspect of the subject matter described herein;

FIG. 90 is a flow diagram illustrating another method according to an aspect of the subject matter described herein;

FIG. 91 is a flow diagram illustrating another method according to an aspect of the subject matter described herein;

FIG. 92 is a flow diagram illustrating another method according to an aspect of the subject matter described herein; and FIG. 93 is a flow diagram illustrating another method according to an aspect of the subject matter described herein.

FIG. 94 is a block diagram illustrating an exemplary hardware device included in and/or otherwise providing an execution environment in which the subject matter may be implemented;

FIG. 95 is a flow diagram illustrating a method for source routing according to an aspect of the subject matter described herein;

FIG. 96 is a block diagram illustrating an arrangement of components for source routing according to another aspect of the subject matter described herein;

FIG. 97A is a block diagram illustrating an arrangement of components for source routing according to another aspect of the subject matter described herein;

FIG. 97B is a block diagram illustrating an arrangement of components for source routing according to another aspect of the subject matter described herein;

FIG. 98 is a block diagram illustrating an arrangement of components for source routing according to another aspect of the subject matter described herein;

Figure 99A:
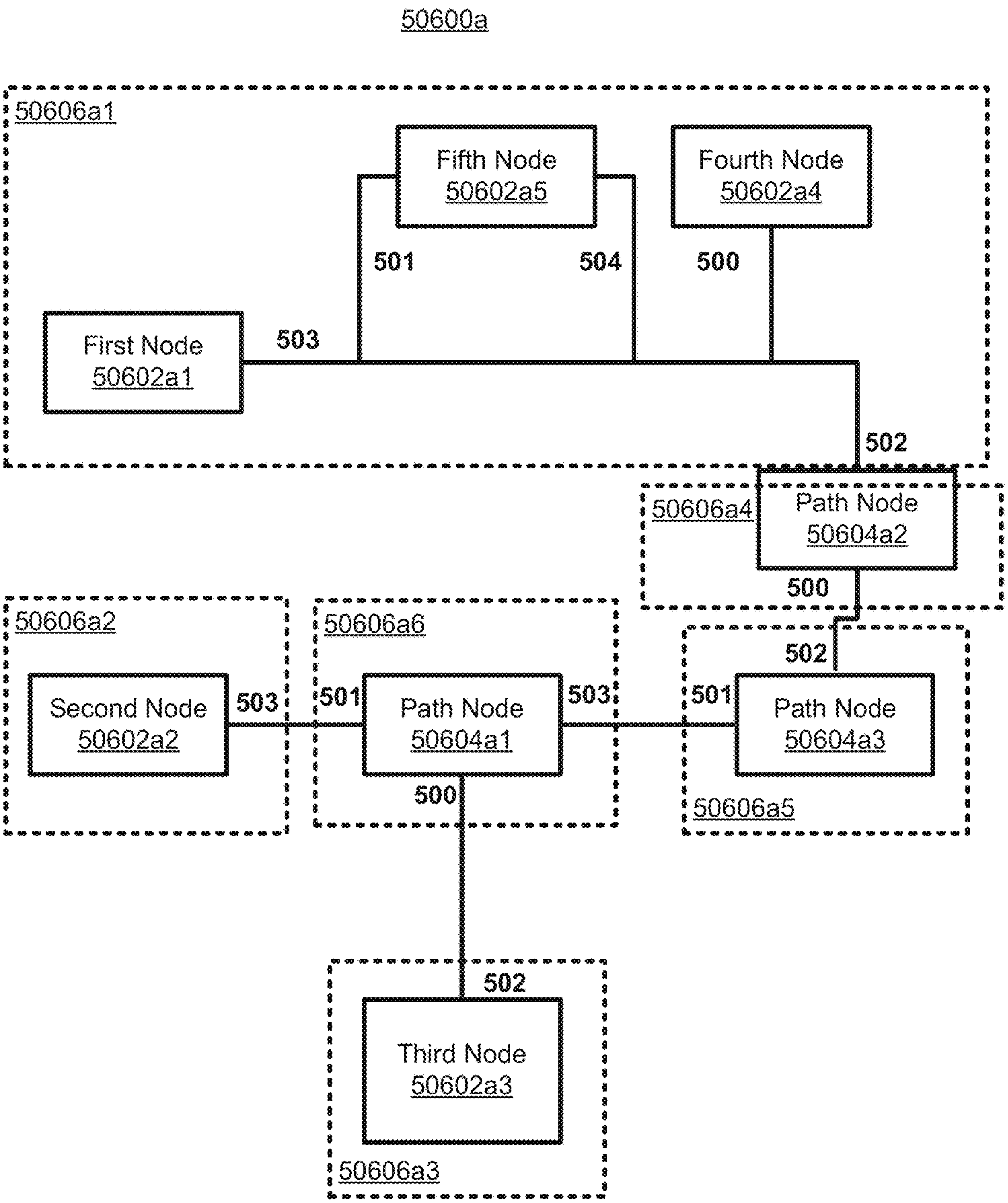
Figure 99B:
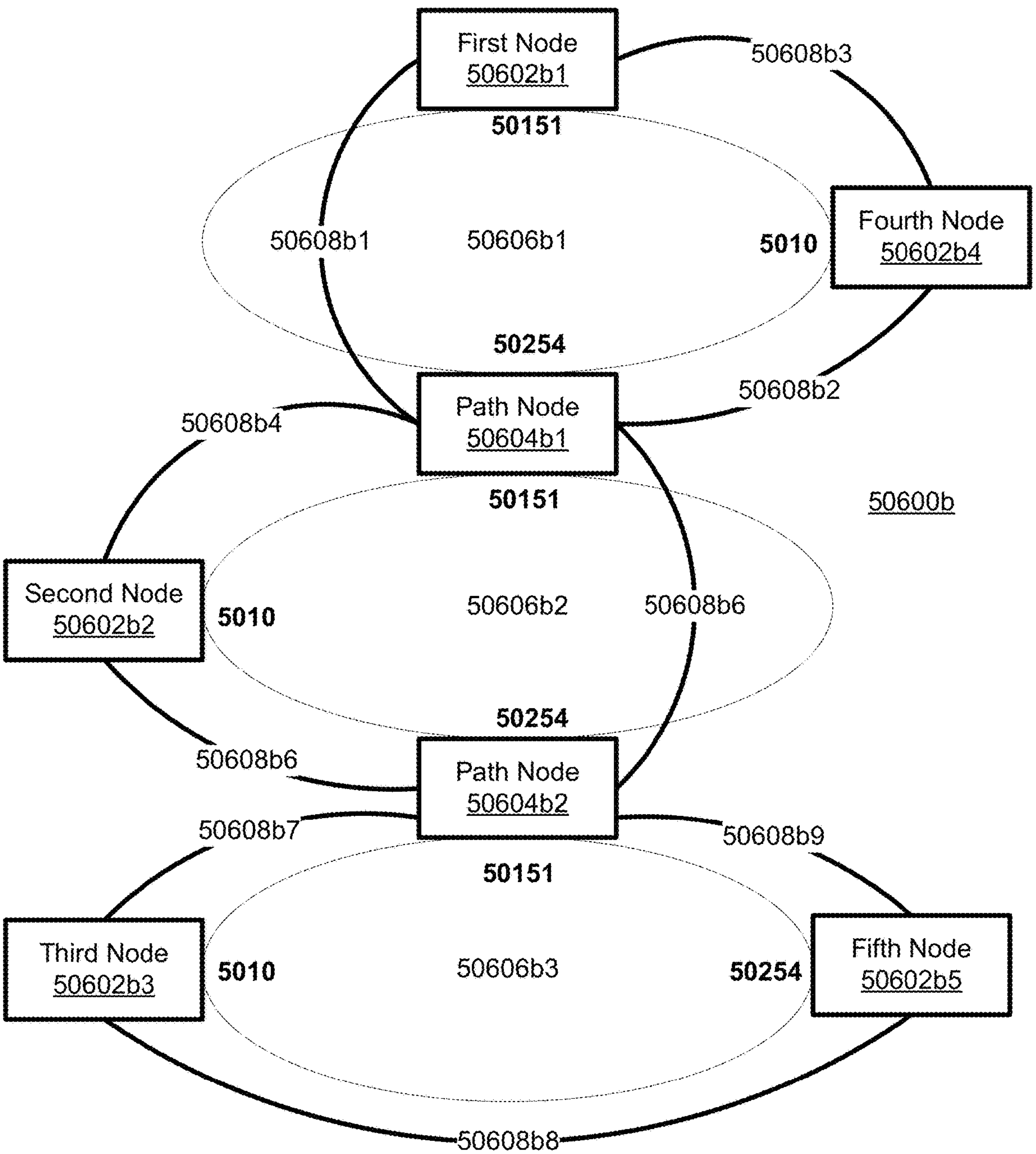
Figure 99C:
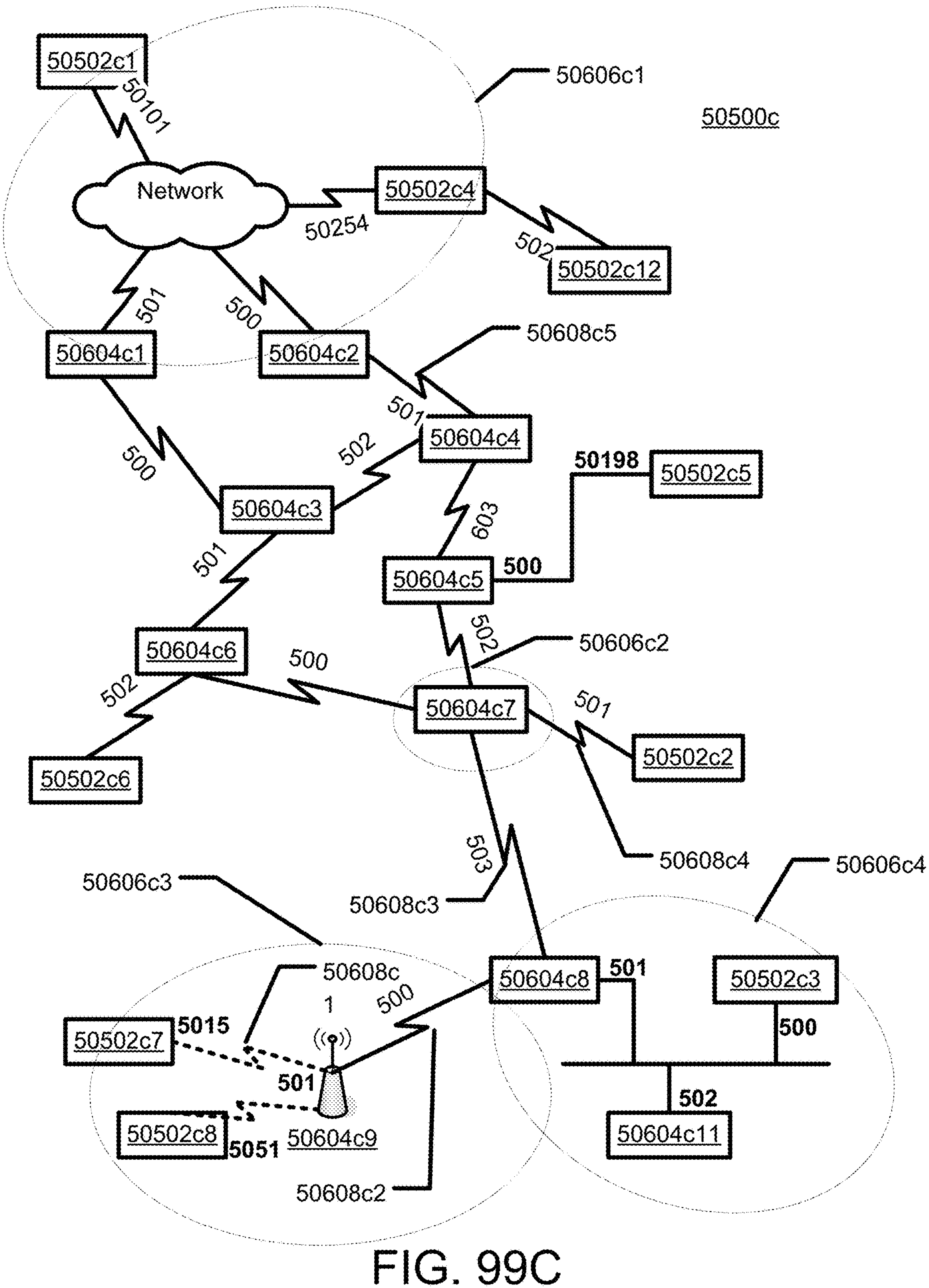
Figure 100A:
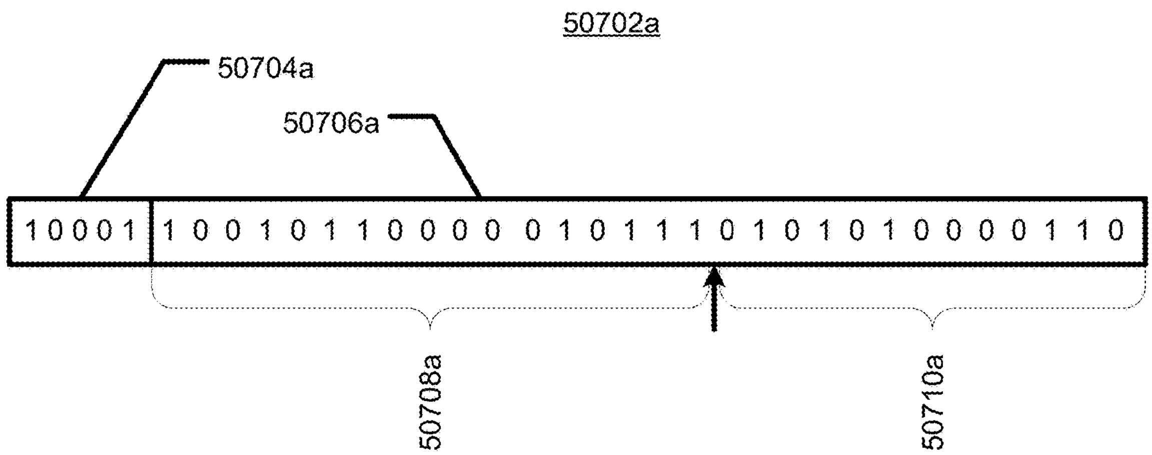
Figure 100B:
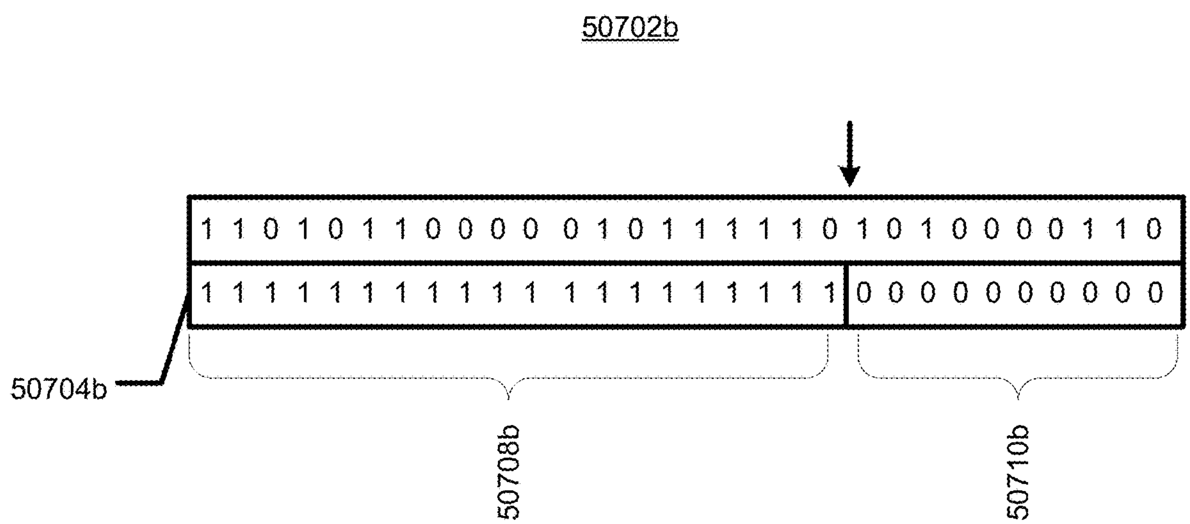
Figure 100C:
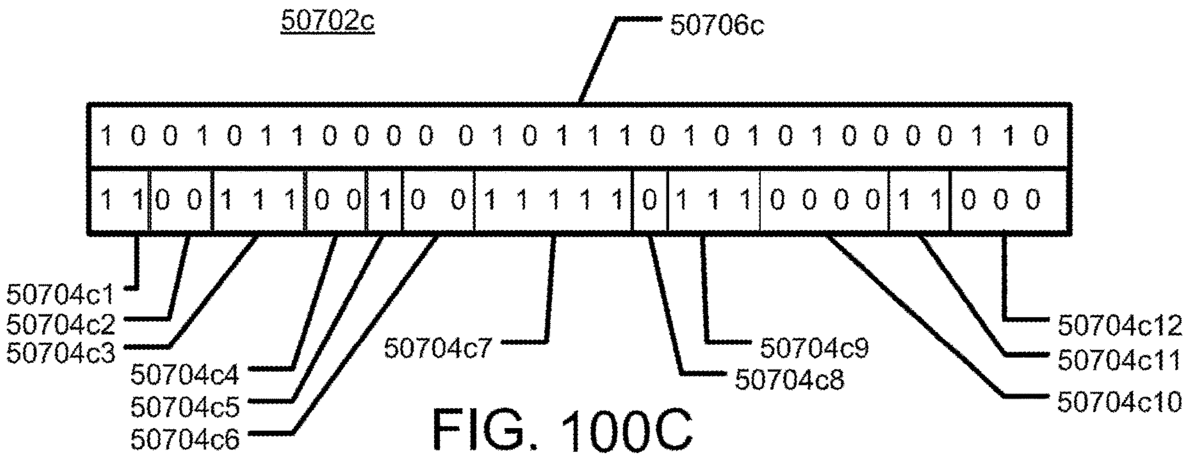
Figure 100D:
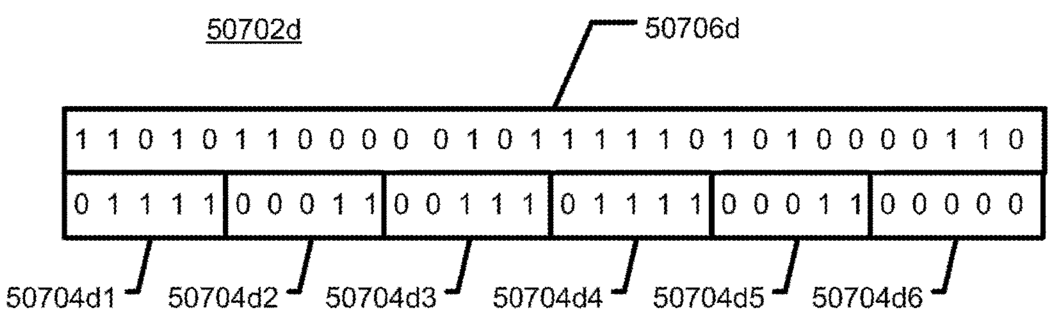
Figure 100E:
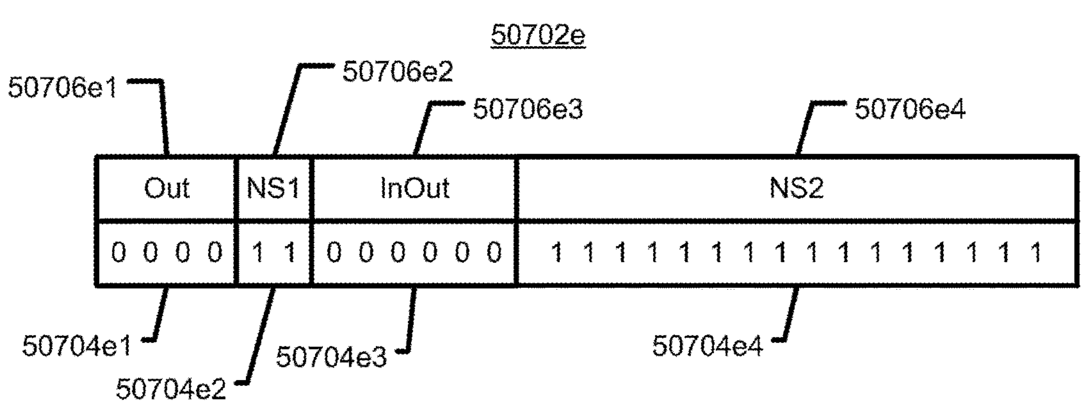
Figure 101:
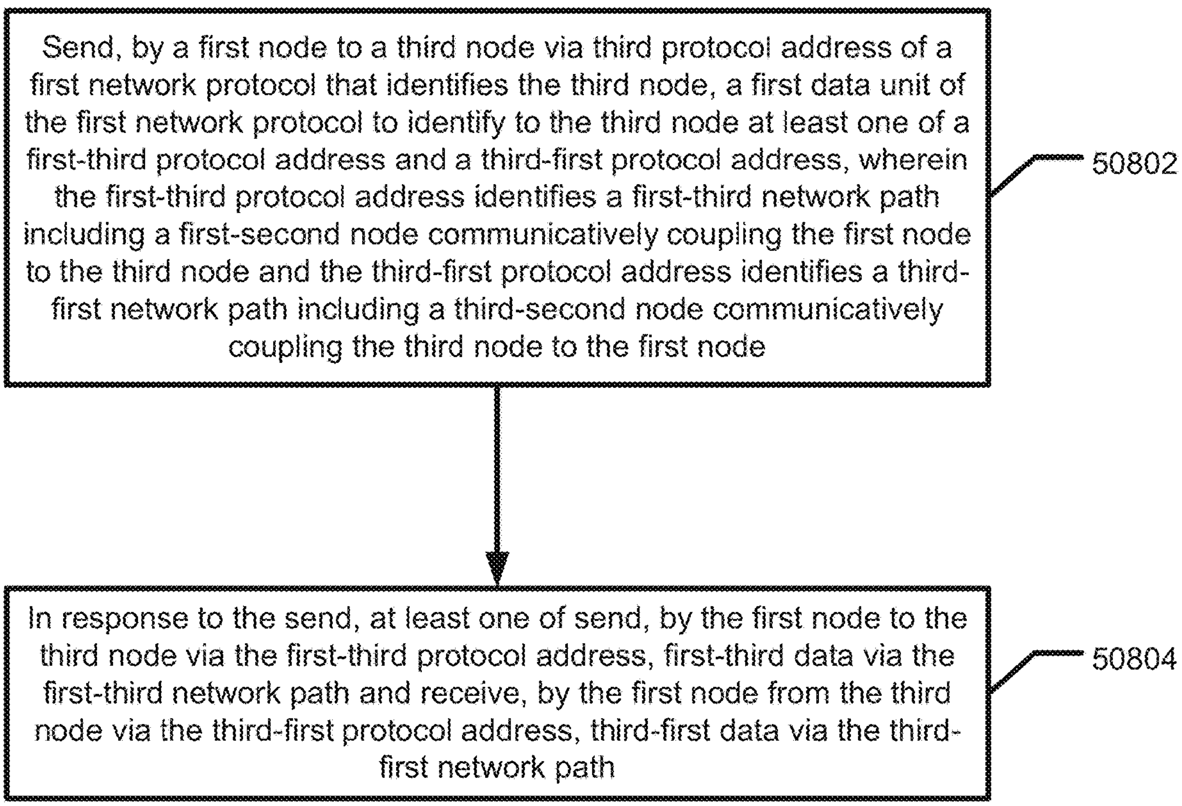
Figure 102:
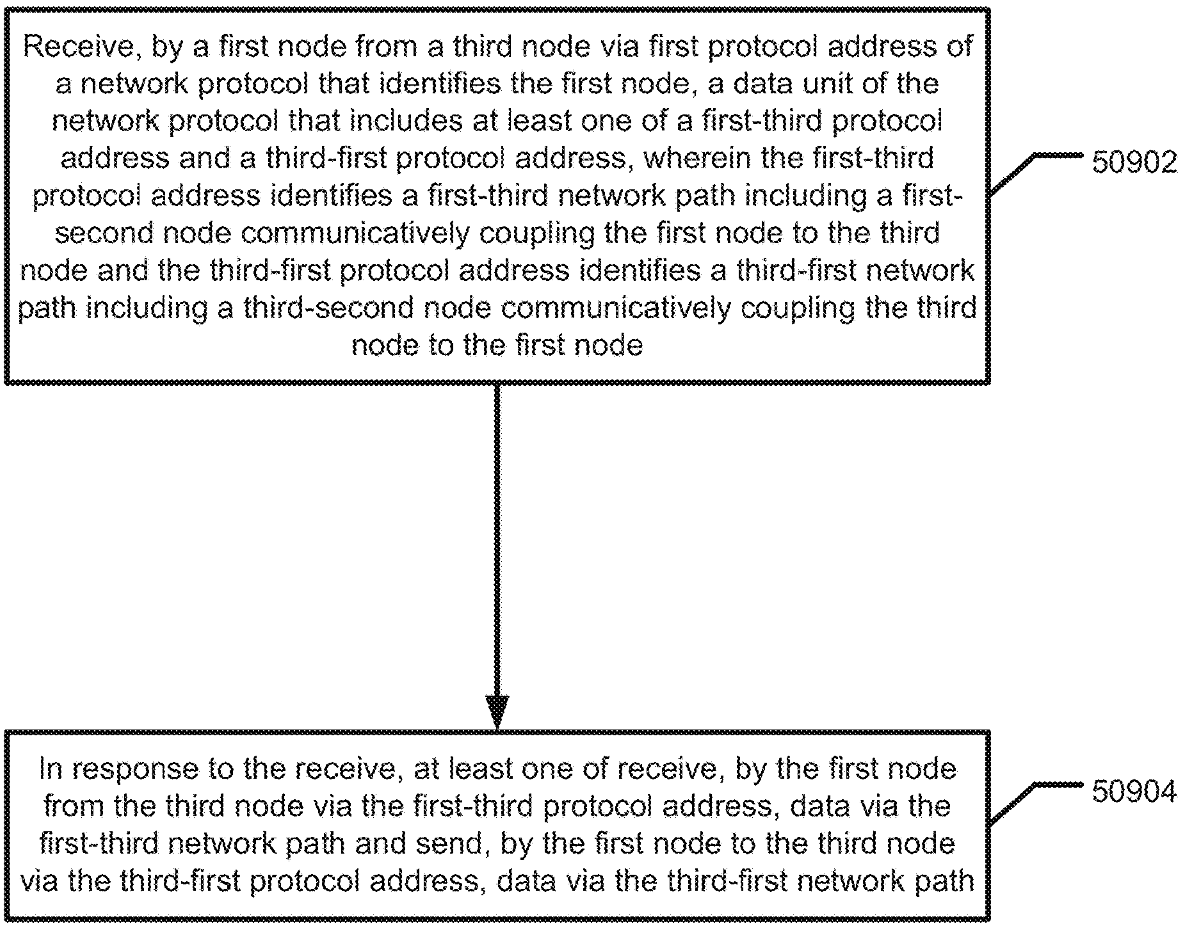
Figure 103:
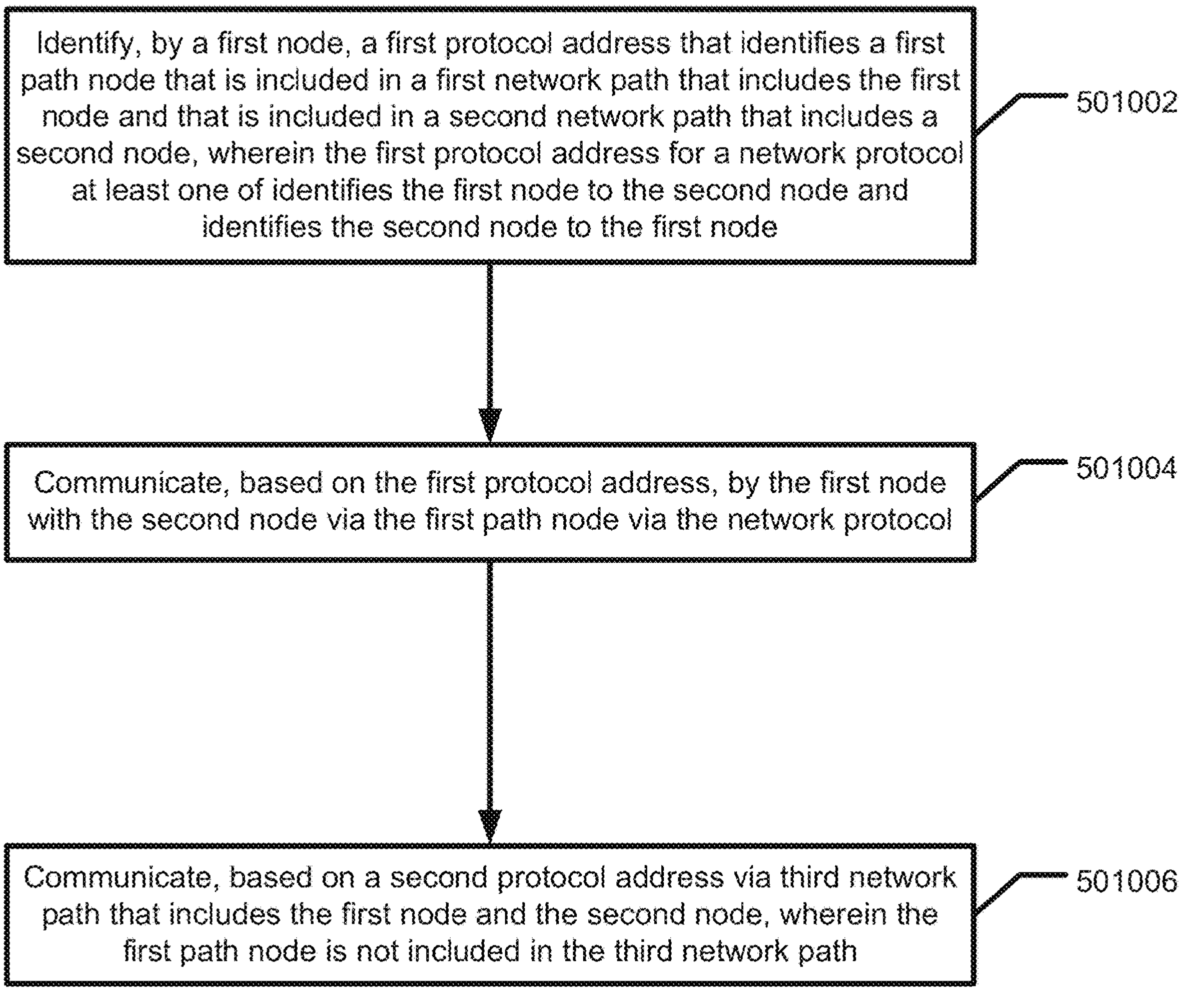
Figure 104:
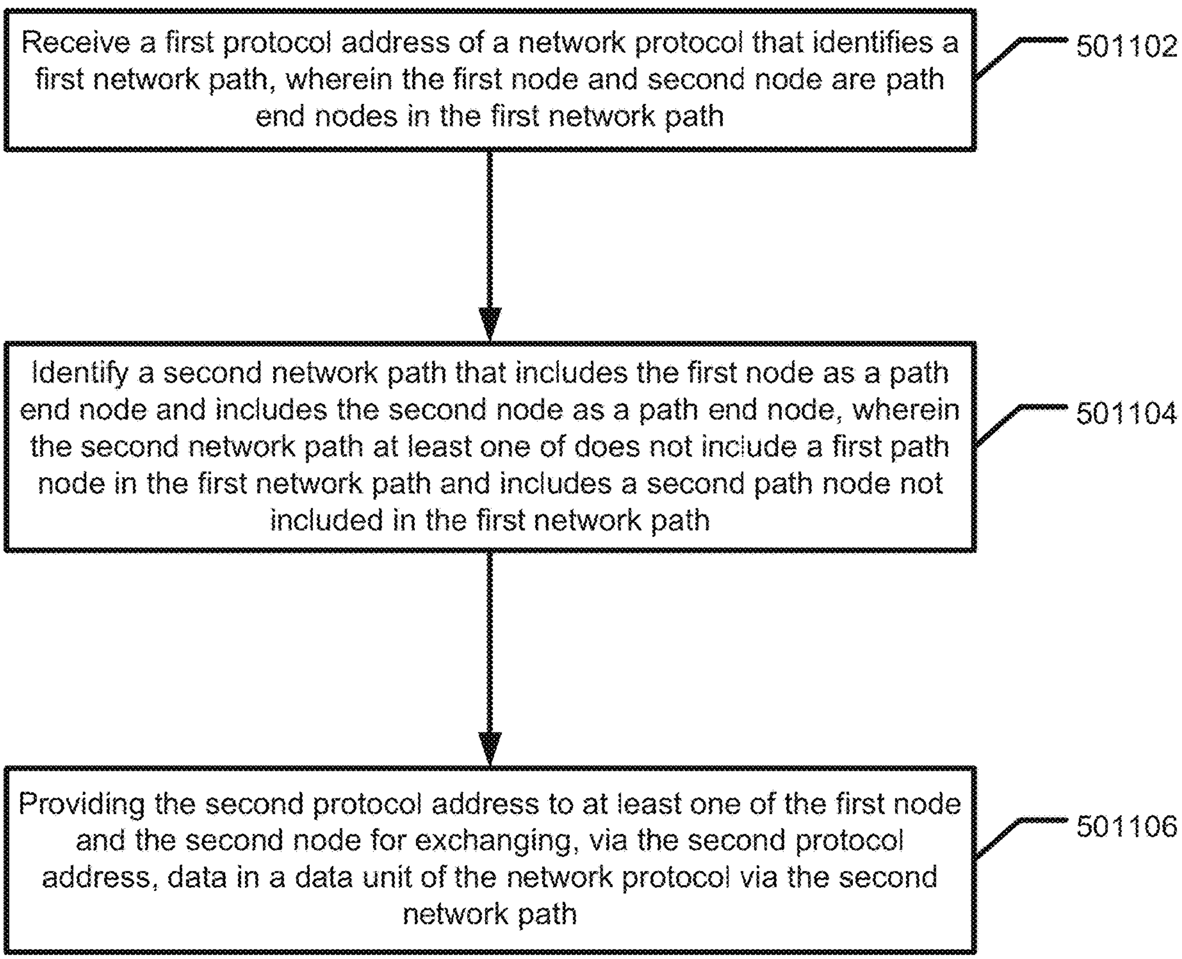
Figure 105:
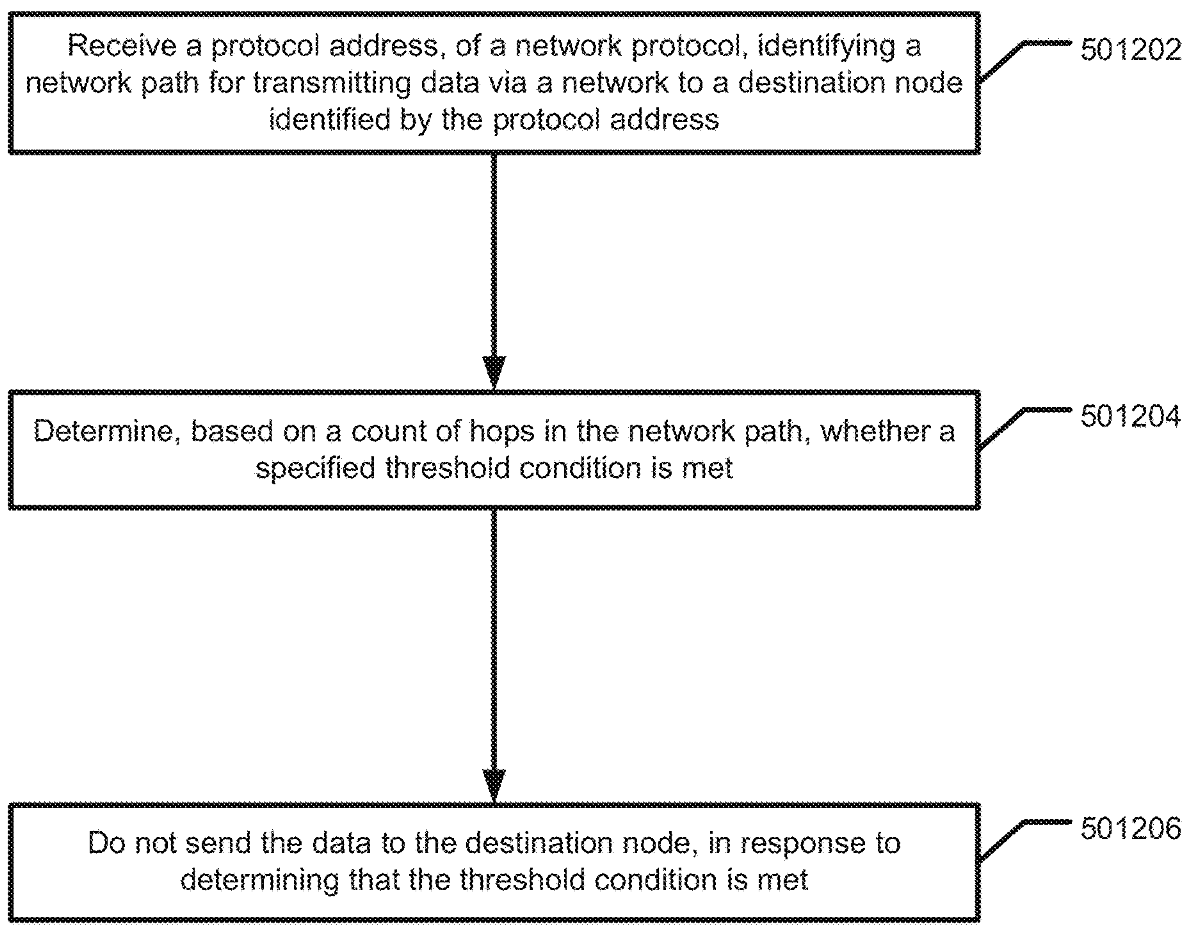
Figure 106:
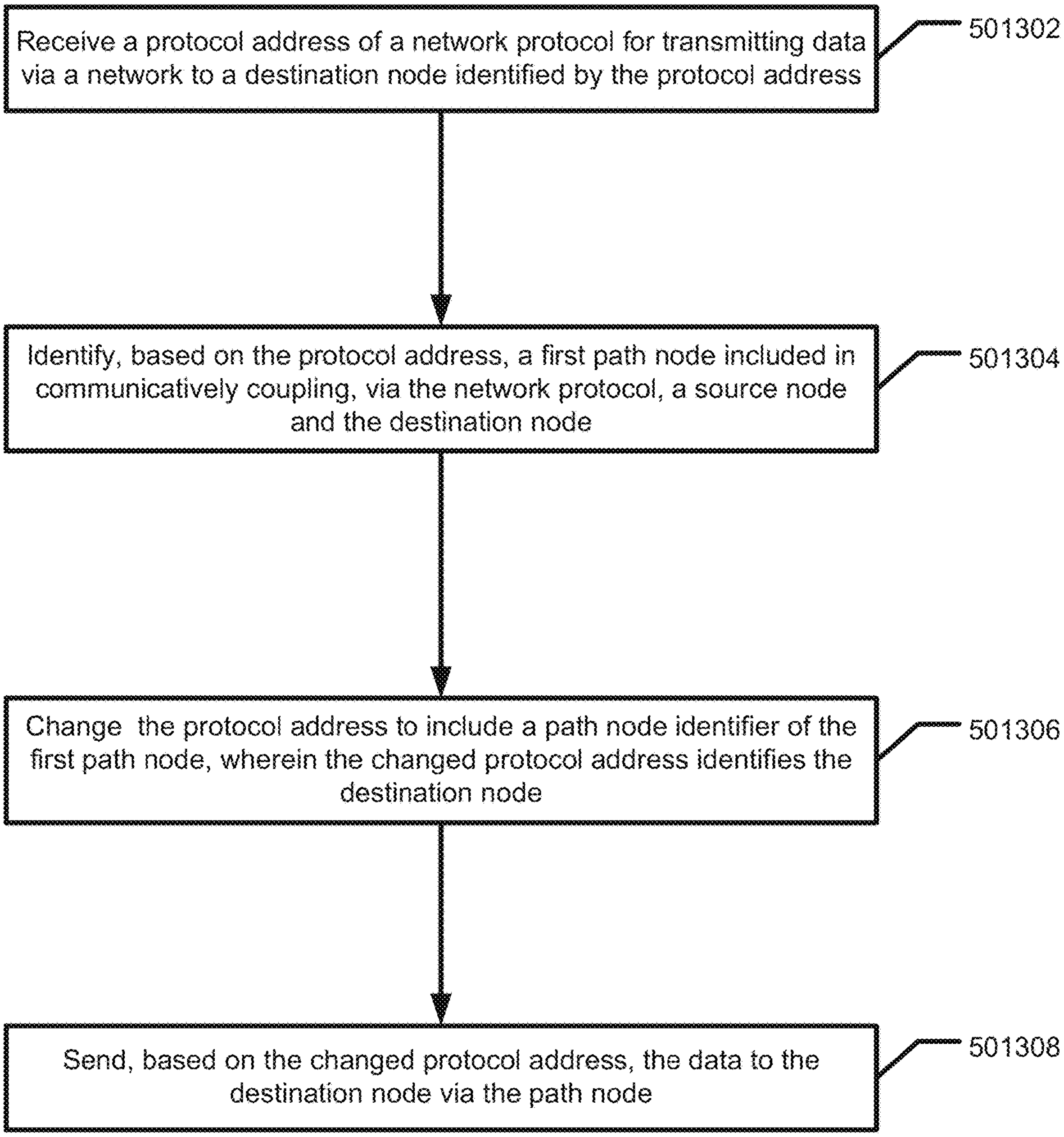
Figure 107:
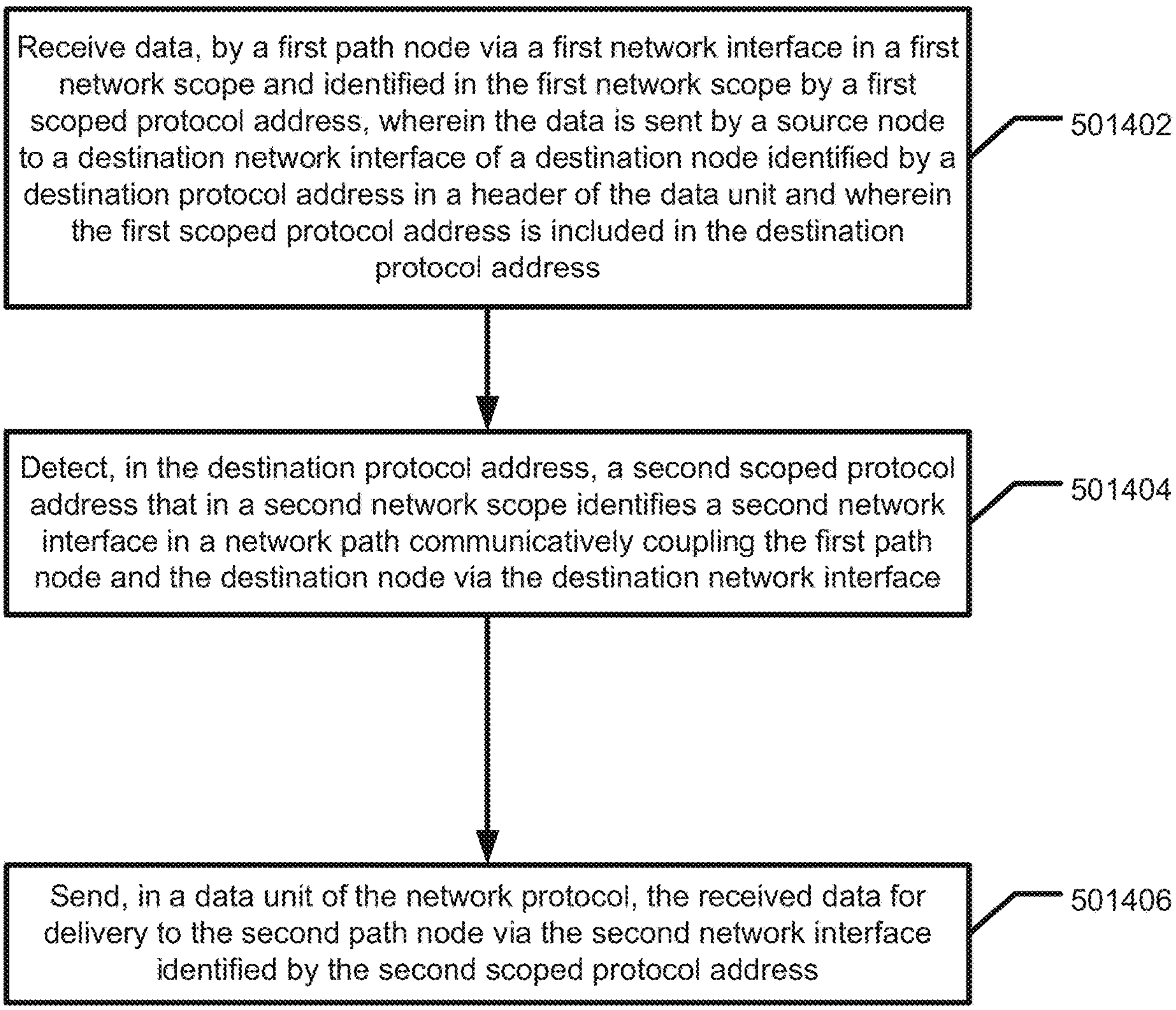
Figure 108:
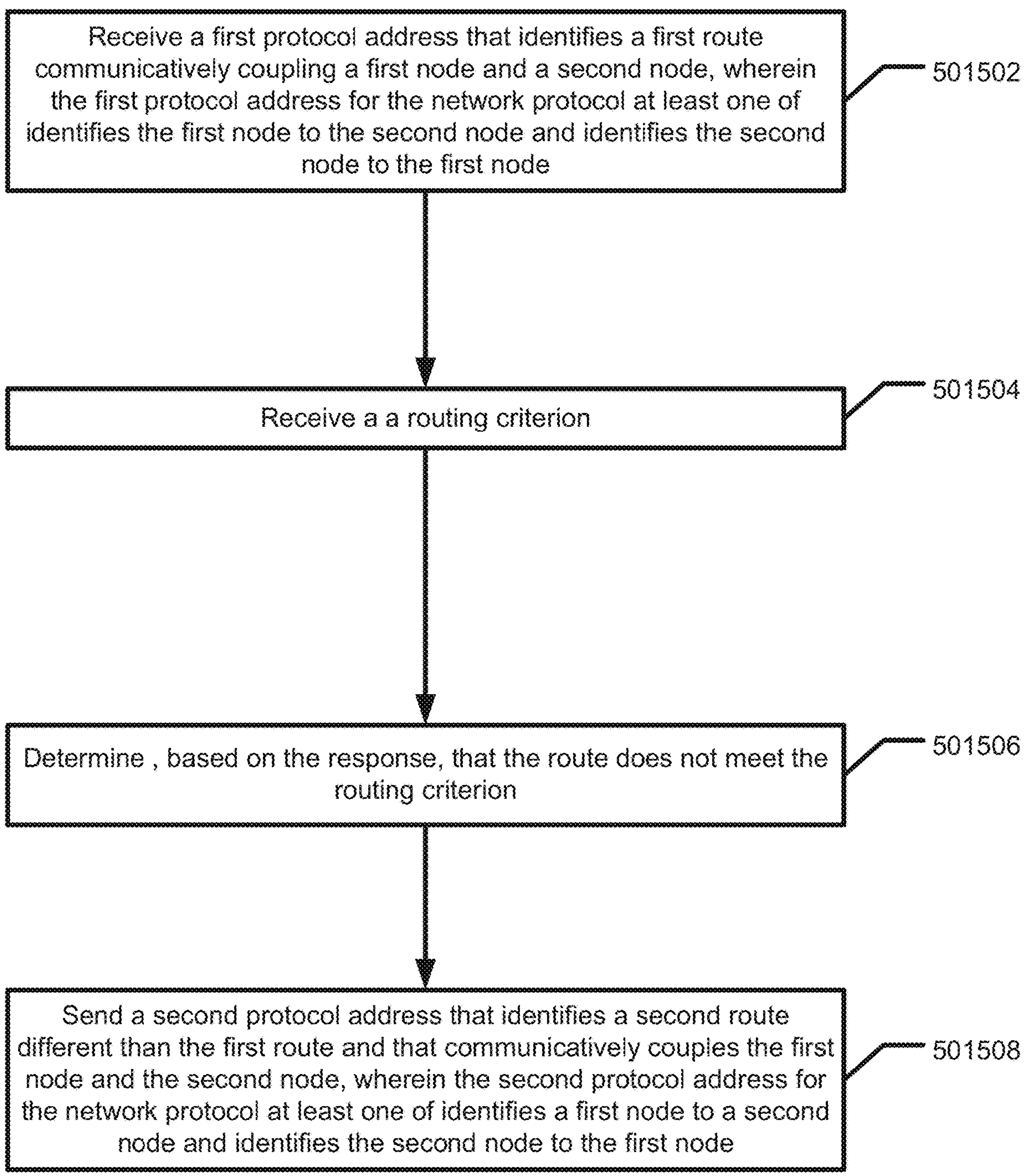
Figure 109:
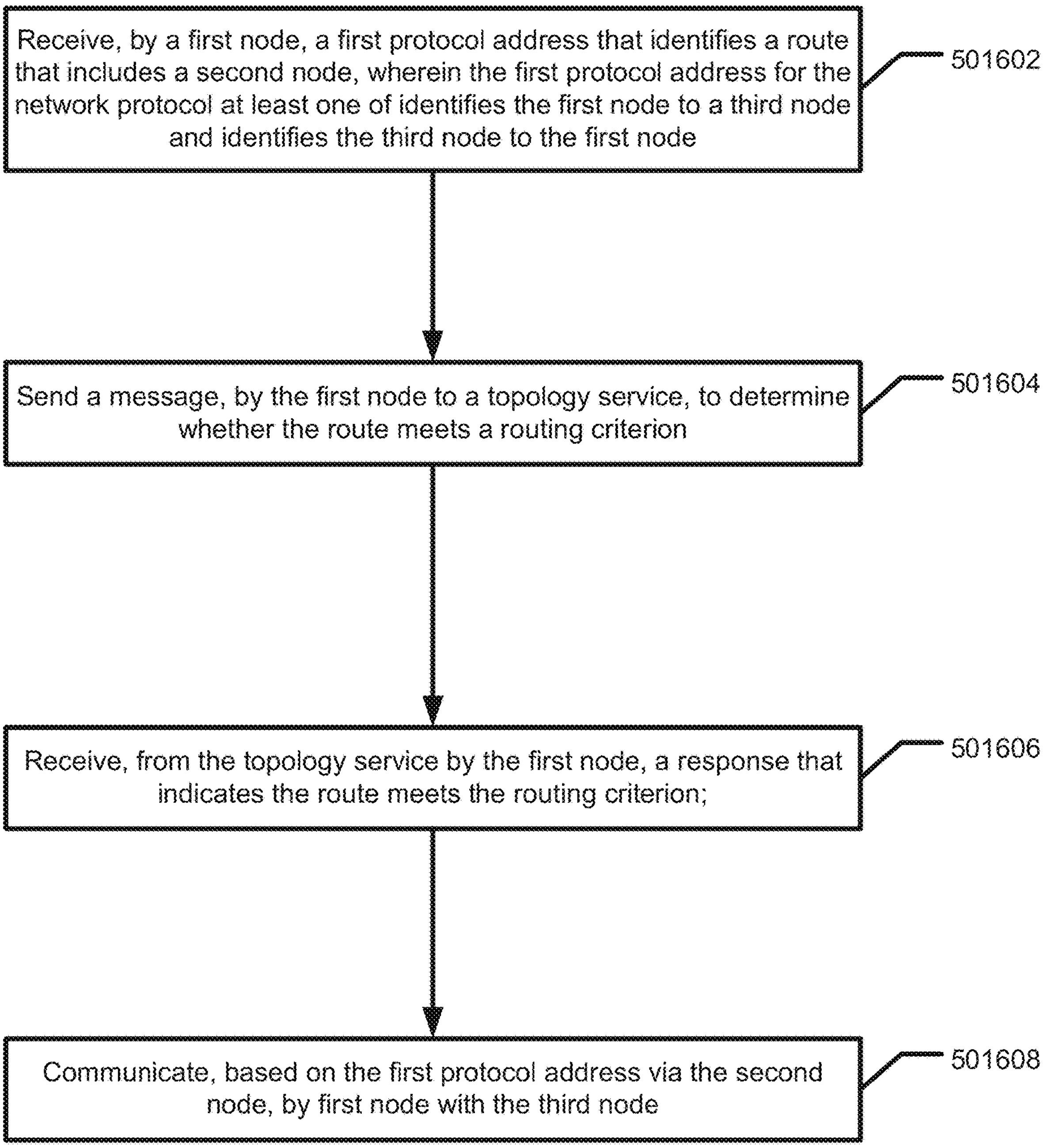
Figure 110:
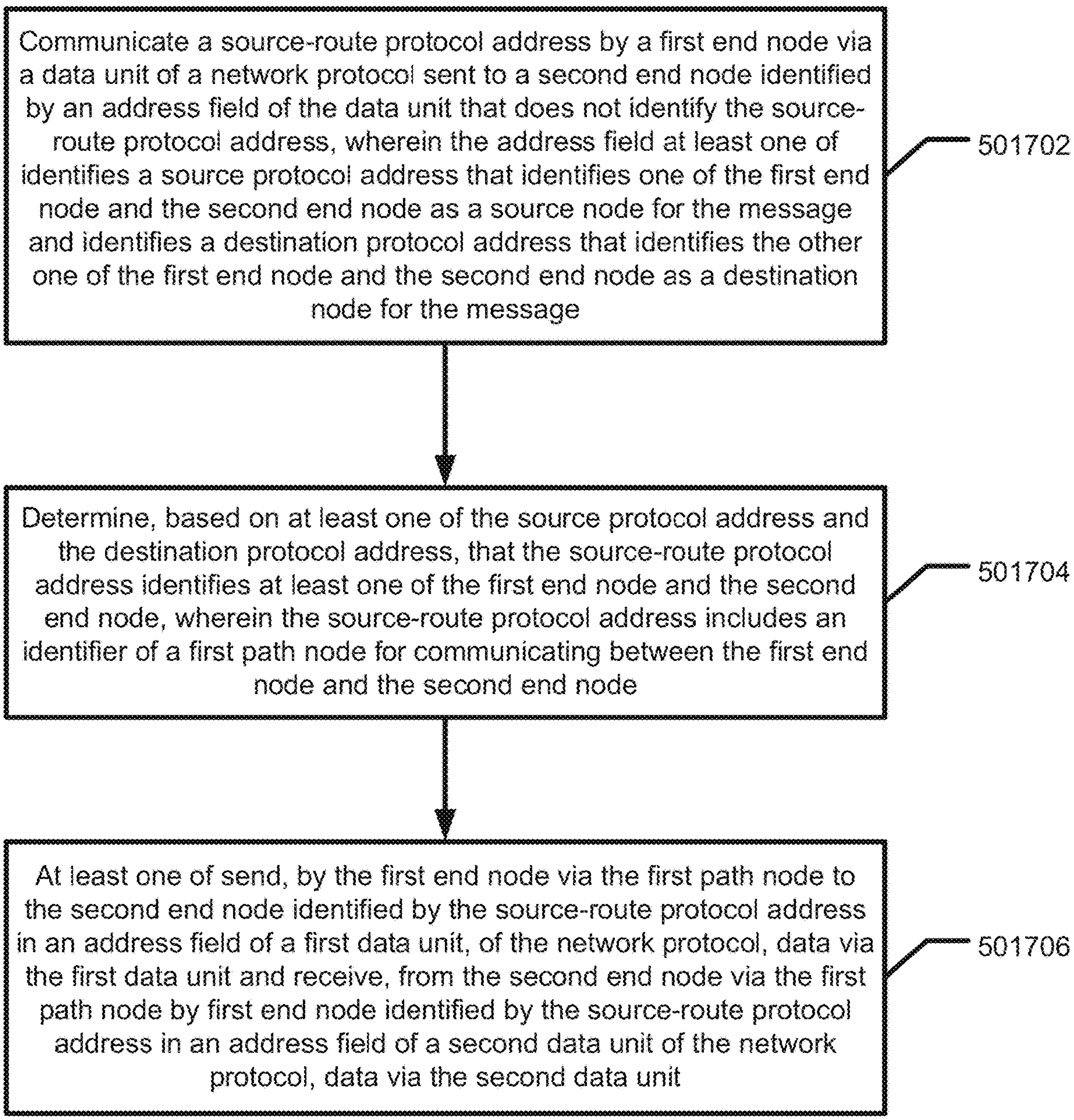
Figure 111:
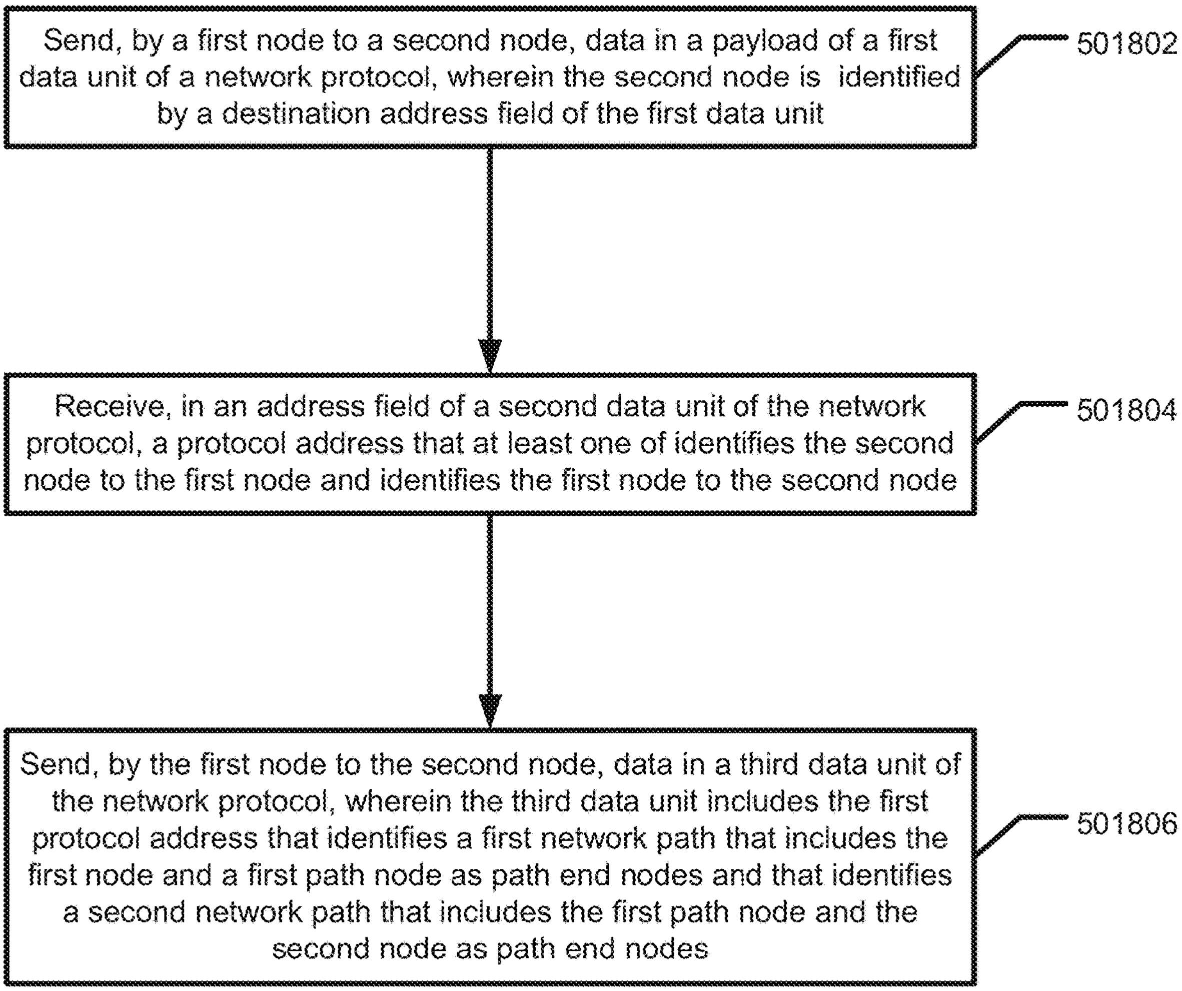
Figure 112:
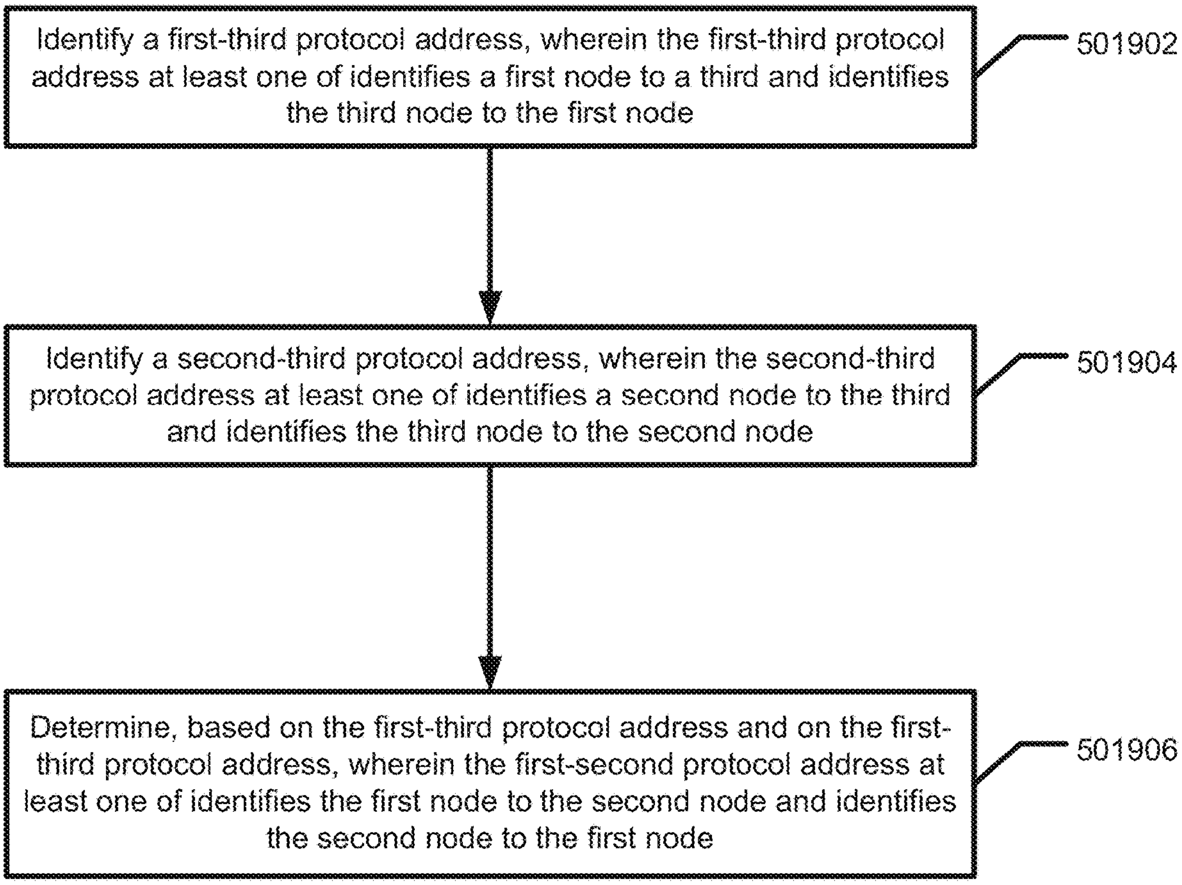
Figure 113:
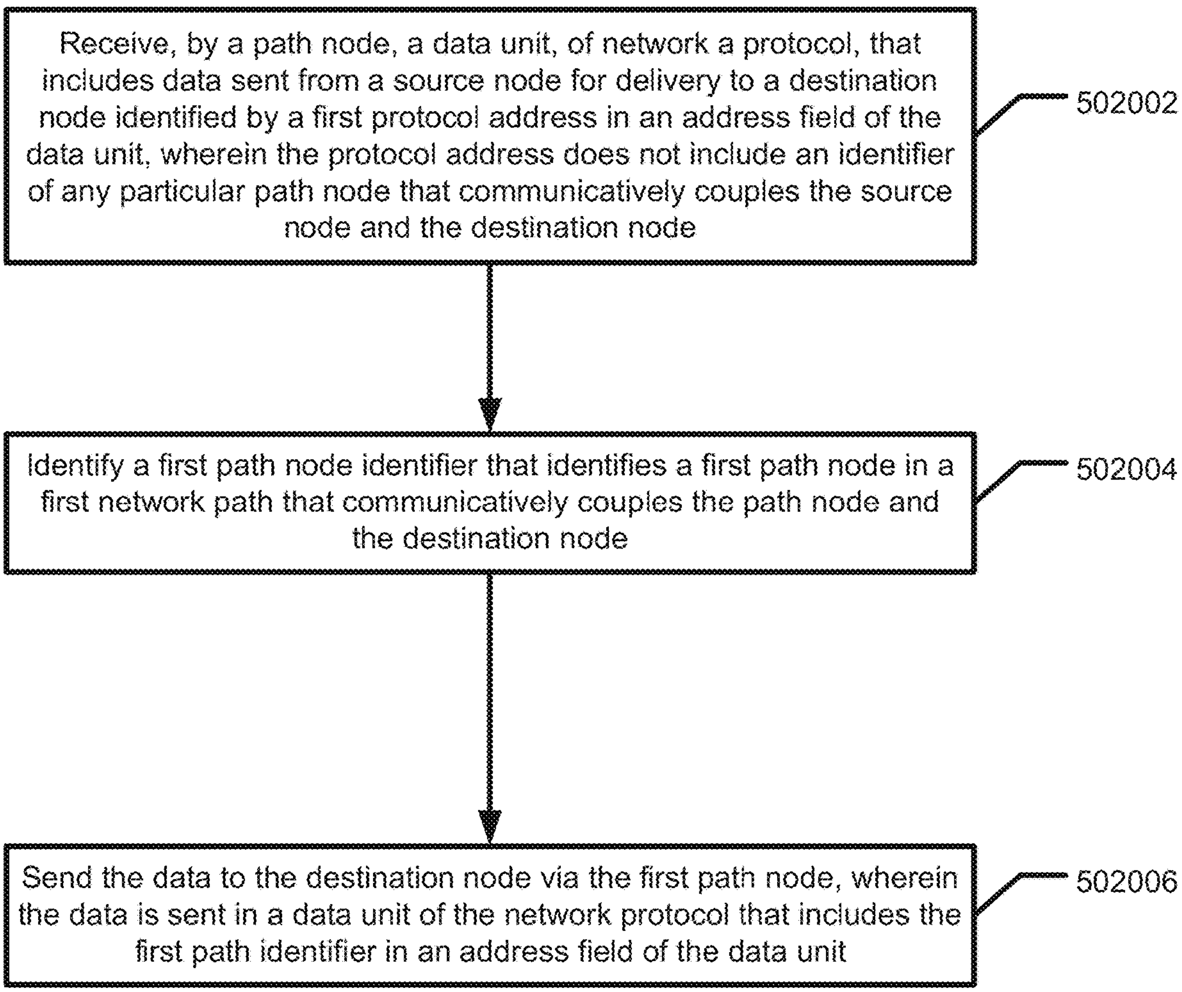

FIG. 99A is a network diagram illustrating an exemplary system for source routing according to another aspect of the subject matter described herein;

FIG. 99B is a network diagram illustrating an exemplary system for source routing according to another aspect of the subject matter described herein;

FIG. 99C is a network diagram illustrating an exemplary system for source routing according to another aspect of the subject matter described herein;

FIG. 100A is a diagram illustrating an exemplary representation of a protocol address according to another aspect of the subject matter described herein;

FIG. 100B is a diagram illustrating an exemplary representation of a protocol address according to another aspect of the subject matter described herein;

FIG. 100C is a diagram illustrating an exemplary representation of a protocol address according to another aspect of the subject matter described herein;

FIG. 100D is a diagram illustrating an exemplary representation of a protocol address according to another aspect of the subject matter described herein;

FIG. 100E is a diagram illustrating an exemplary representation of a protocol address according to another aspect of the subject matter described herein;

FIG. 101 is a flow diagram illustrating another method according to an aspect of the subject matter described herein;

FIG. 102 is a flow diagram illustrating another method according to an aspect of the subject matter described herein;

FIG. 103 is a flow diagram illustrating another method according to an aspect of the subject matter described herein;

FIG. 104 is a flow diagram illustrating another method according to an aspect of the subject matter described herein;

FIG. 105 is a flow diagram illustrating another method according to an aspect of the subject matter described herein;

FIG. 106 is a flow diagram illustrating another method according to an aspect of the subject matter described herein;

FIG. 107 is a flow diagram illustrating another method according to an aspect of the subject matter described herein;

FIG. 108 is a flow diagram illustrating another method according to an aspect of the subject matter described herein;

FIG. 109 is a flow diagram illustrating another method according to an aspect of the subject matter described herein;

FIG. 110 is a flow diagram illustrating another method according to an aspect of the subject matter described herein;

FIG. 111 is a flow diagram illustrating another method according to an aspect of the subject matter described herein;

FIG. 112 is a flow diagram illustrating another method according to an aspect of the subject matter described herein; and FIG. 113 is a flow diagram illustrating another method according to an aspect of the subject matter described herein.

Figure 114:
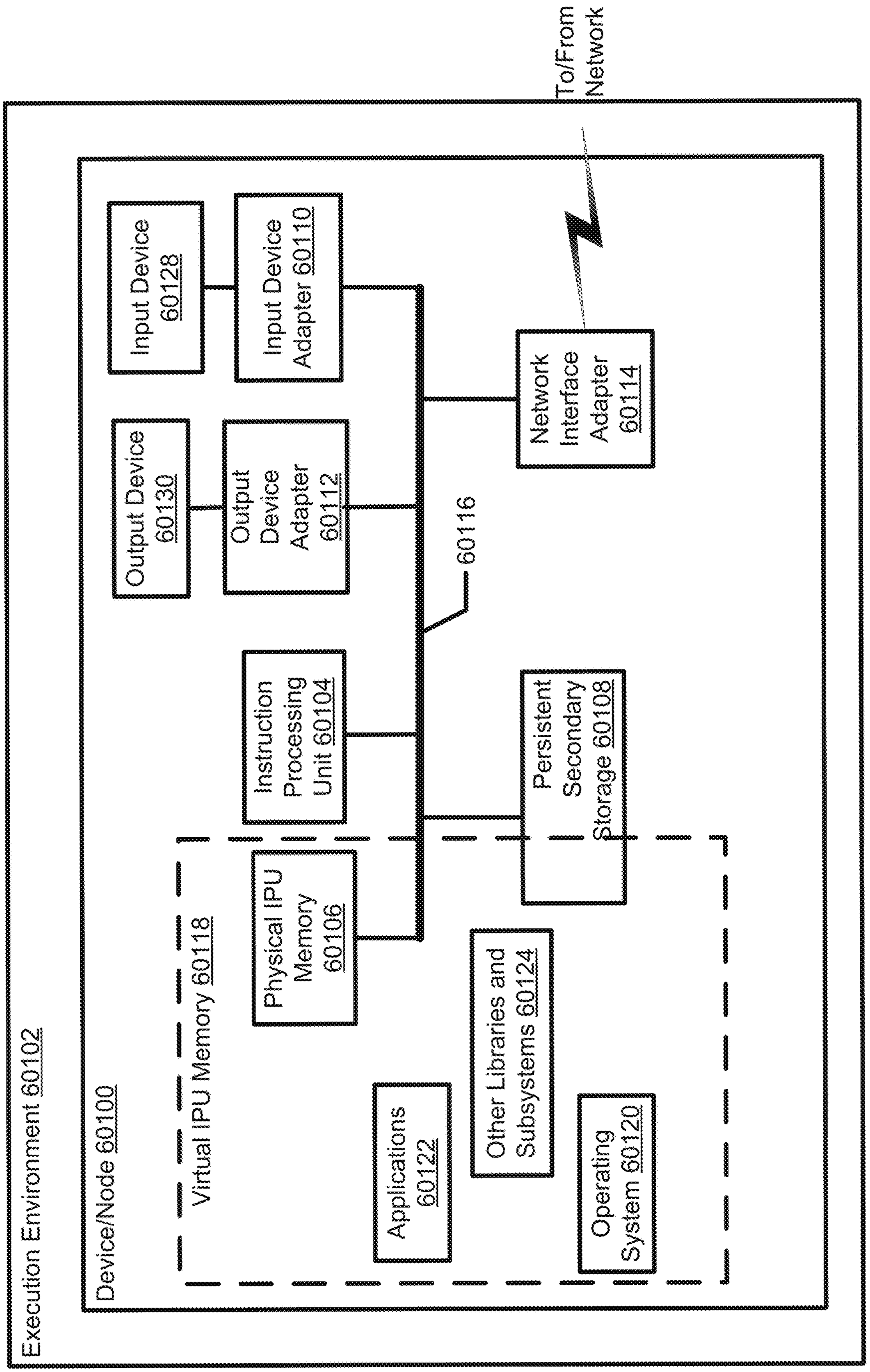
Figure 115:
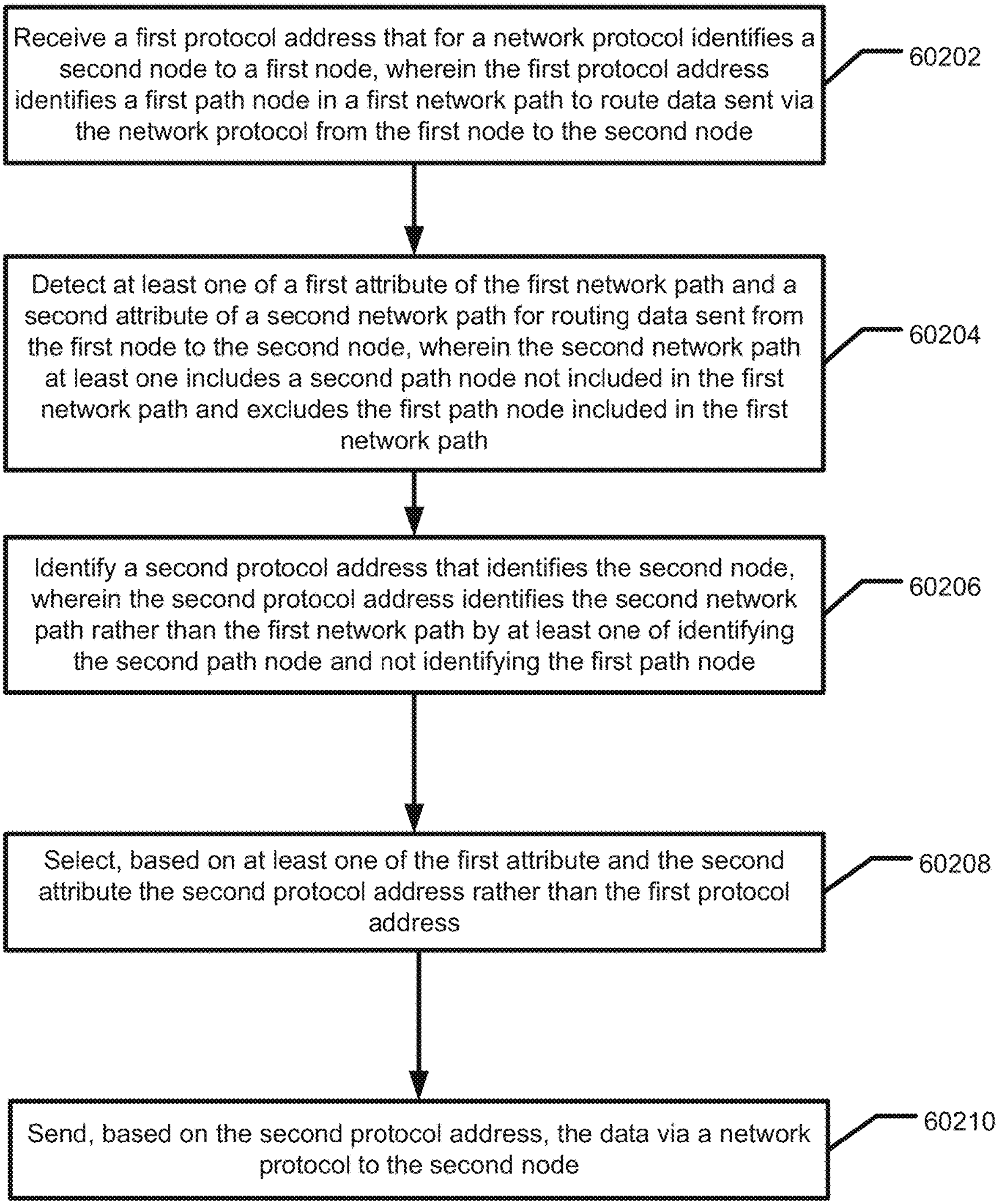
Figure 116:
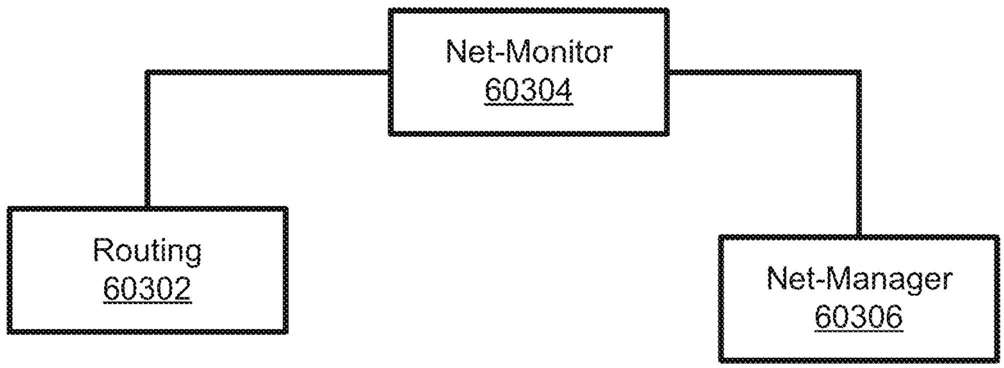
Figure 117A:
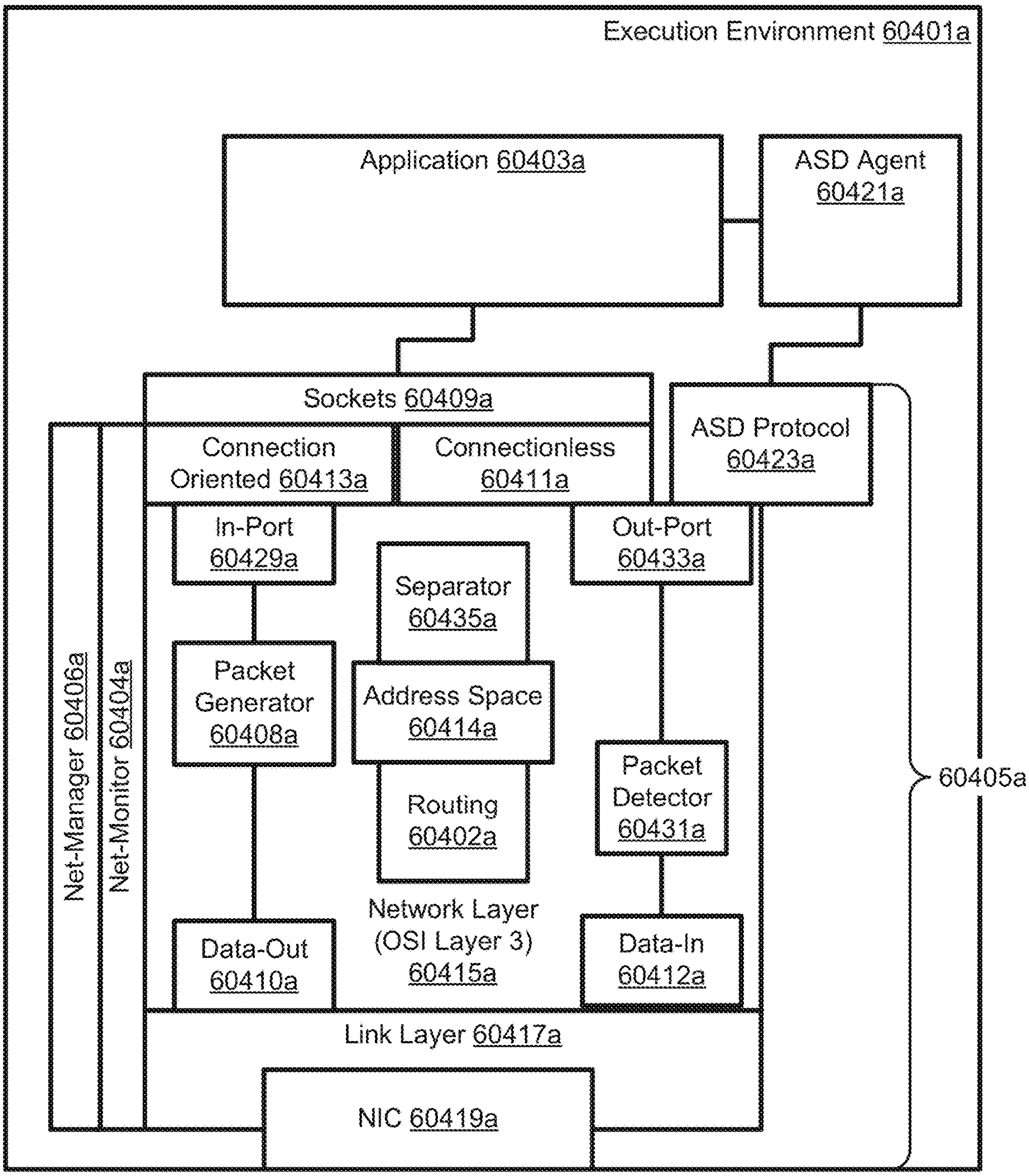
Figure 117B:
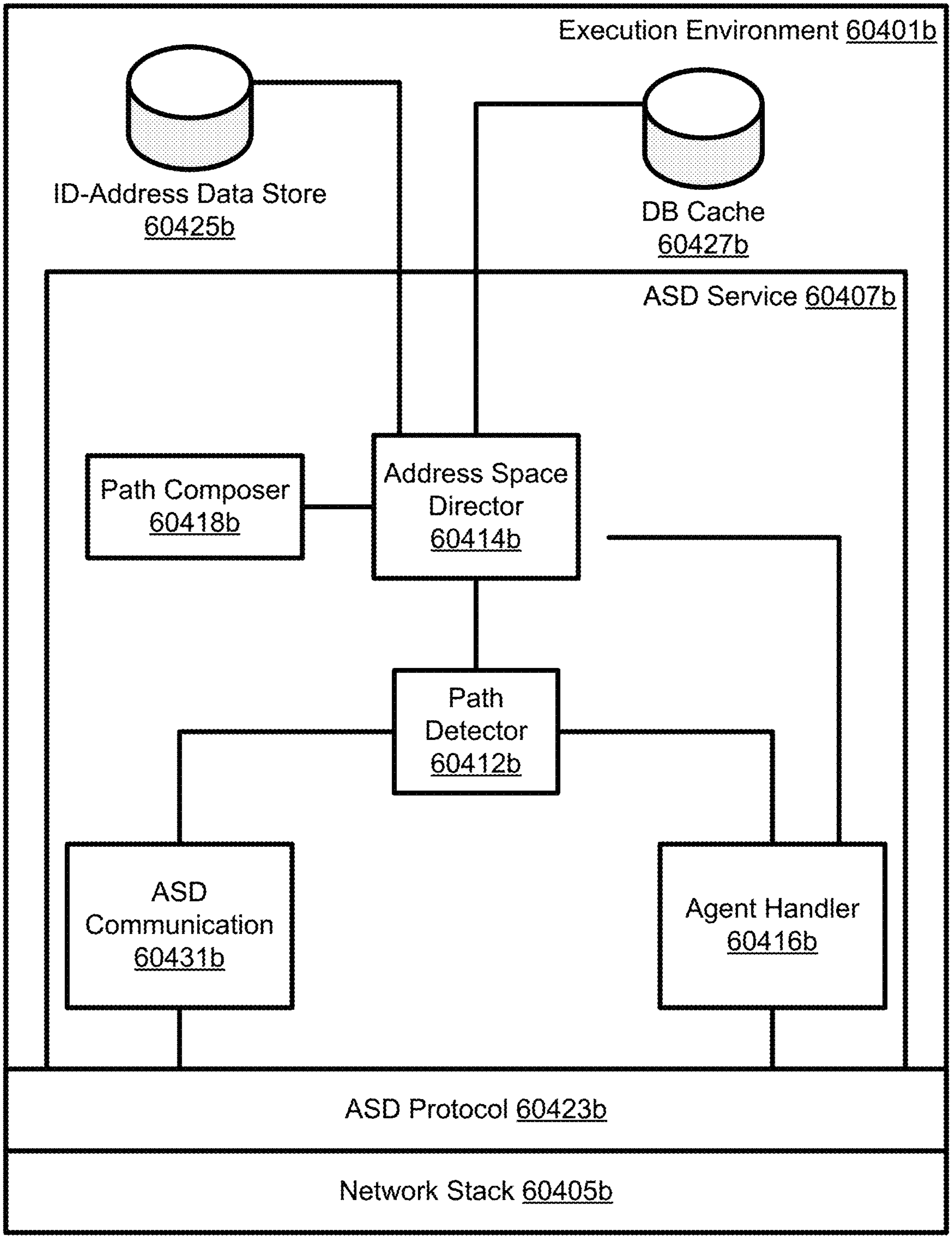
Figure 118:
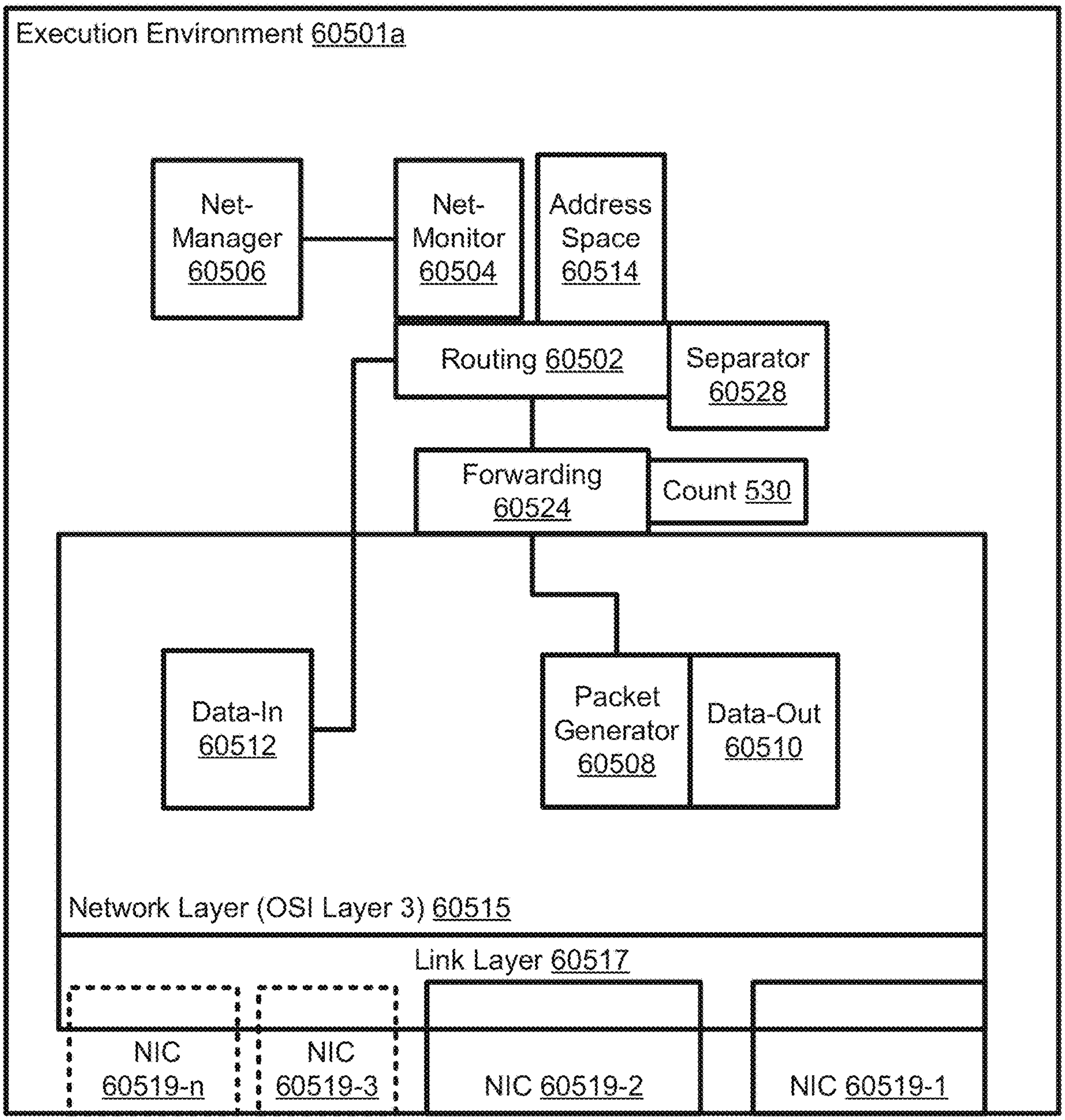
Figure 119A:
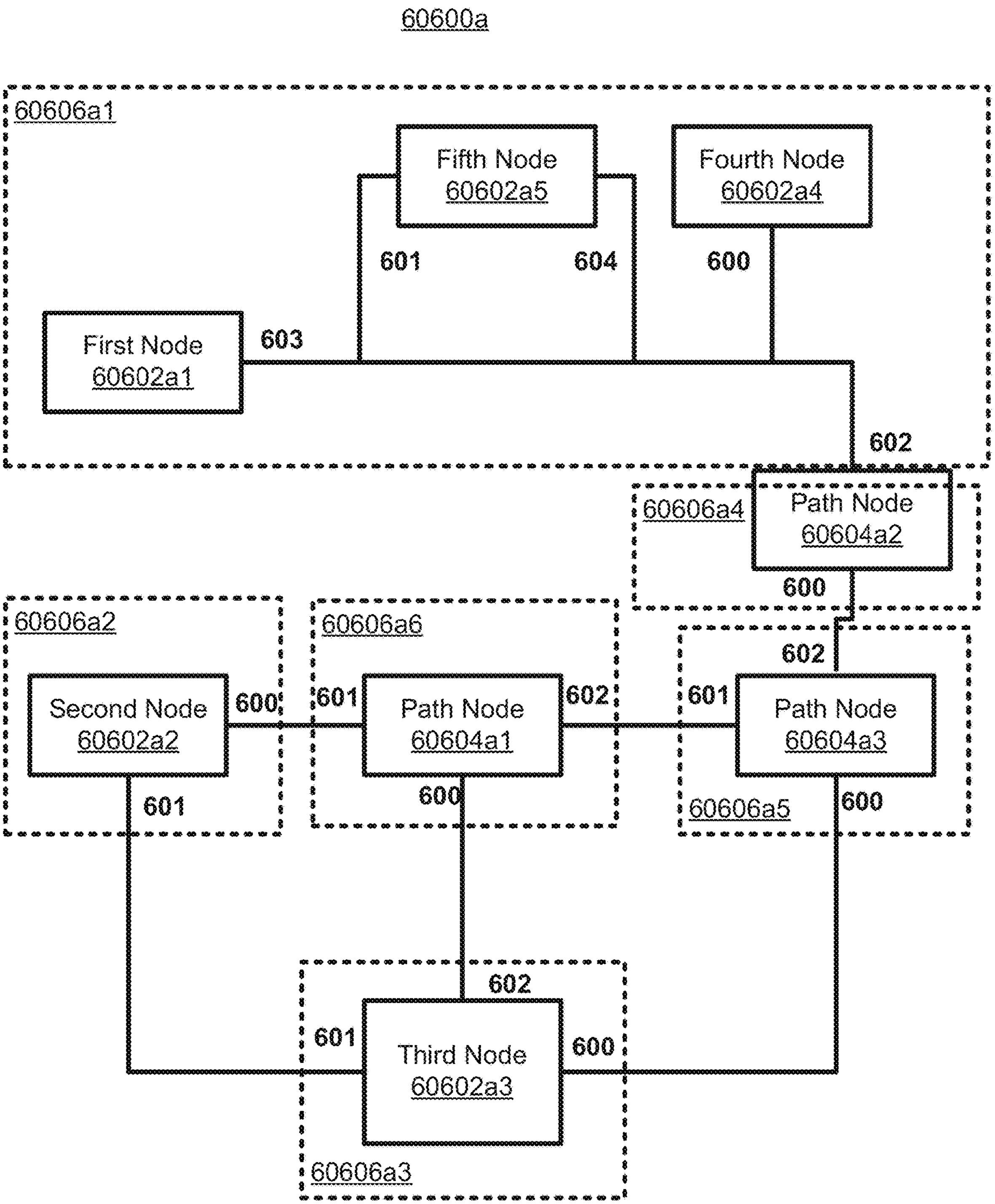
Figure 119B:
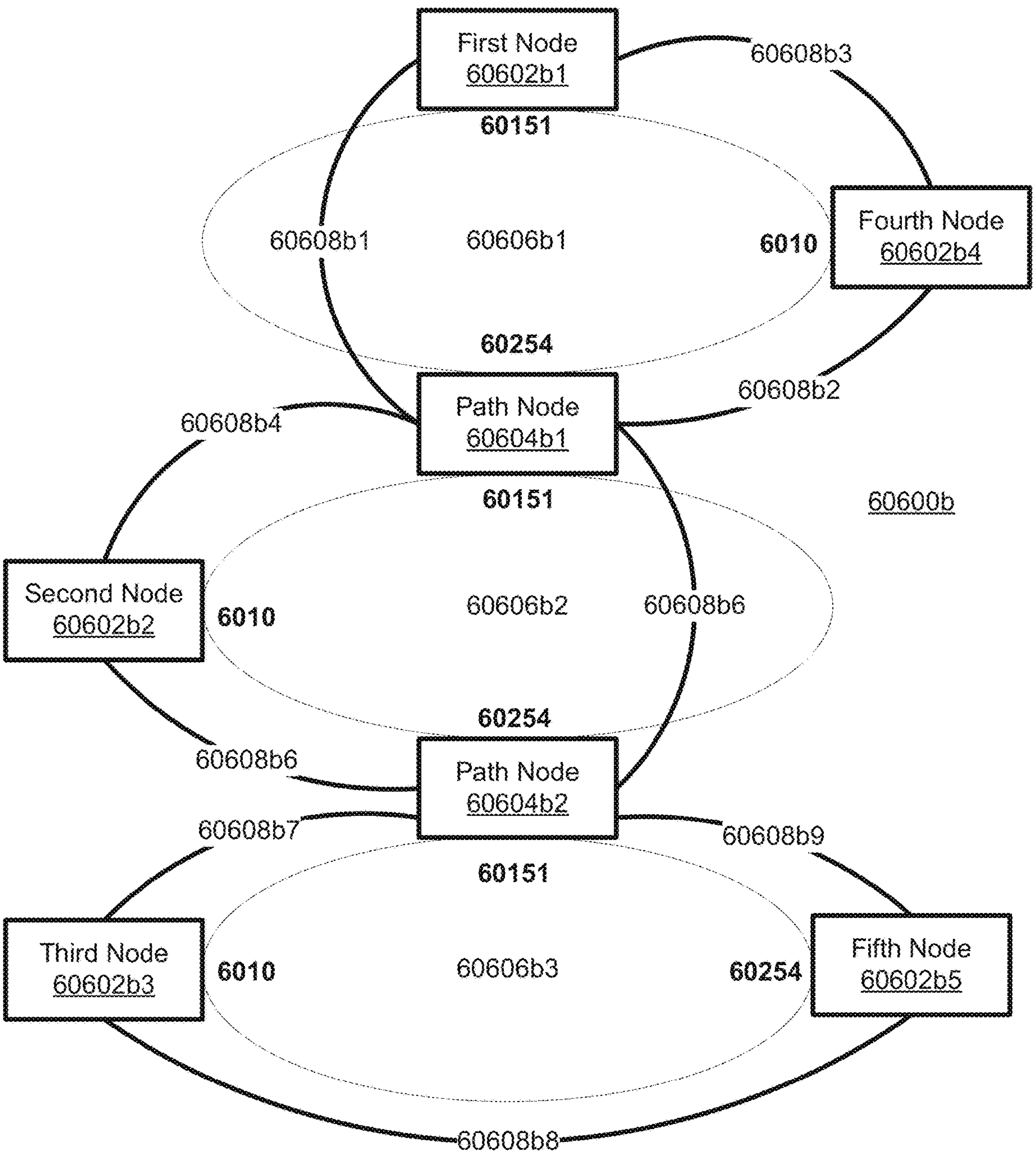
Figure 119C:
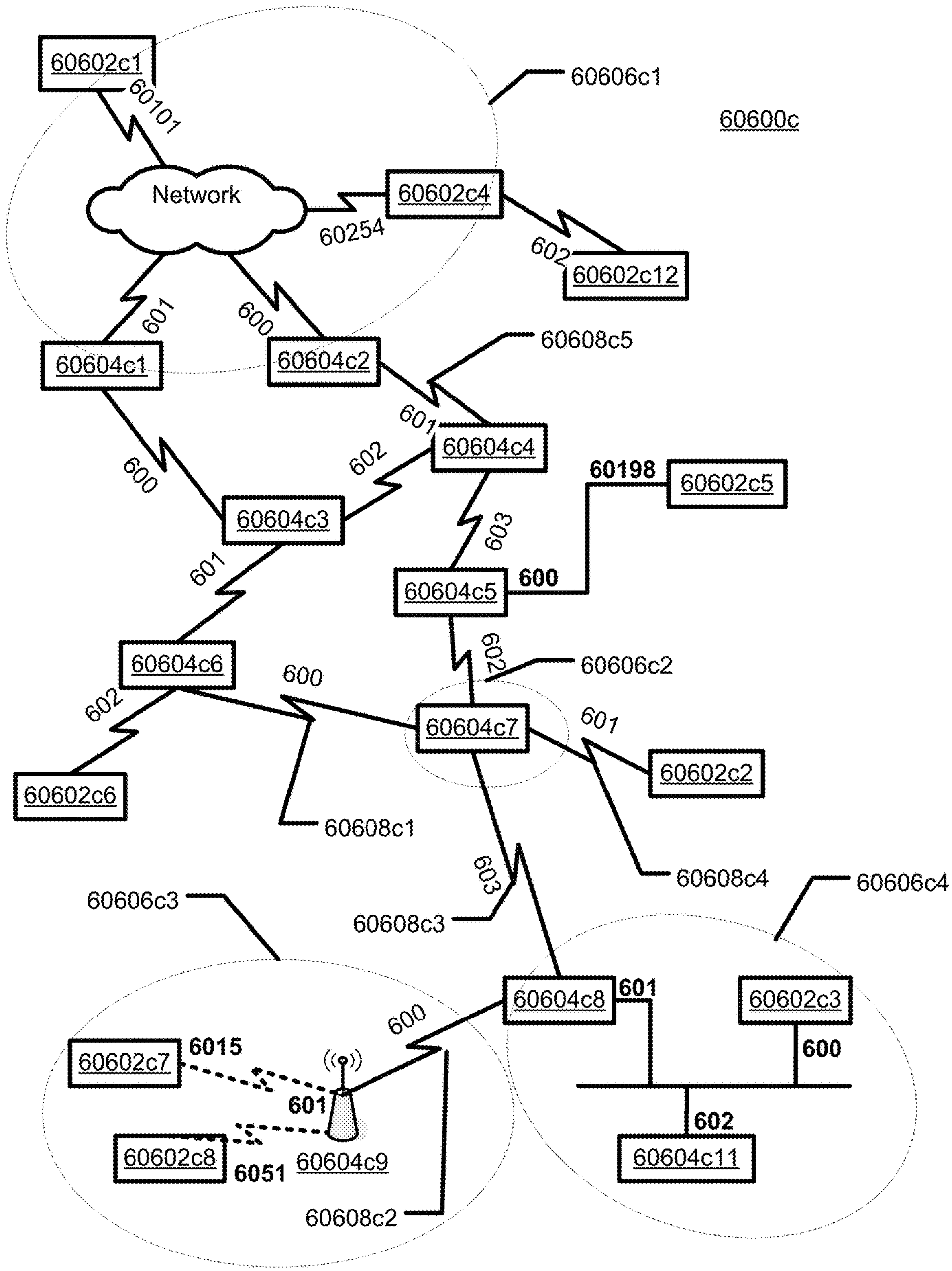
Figure 120A:
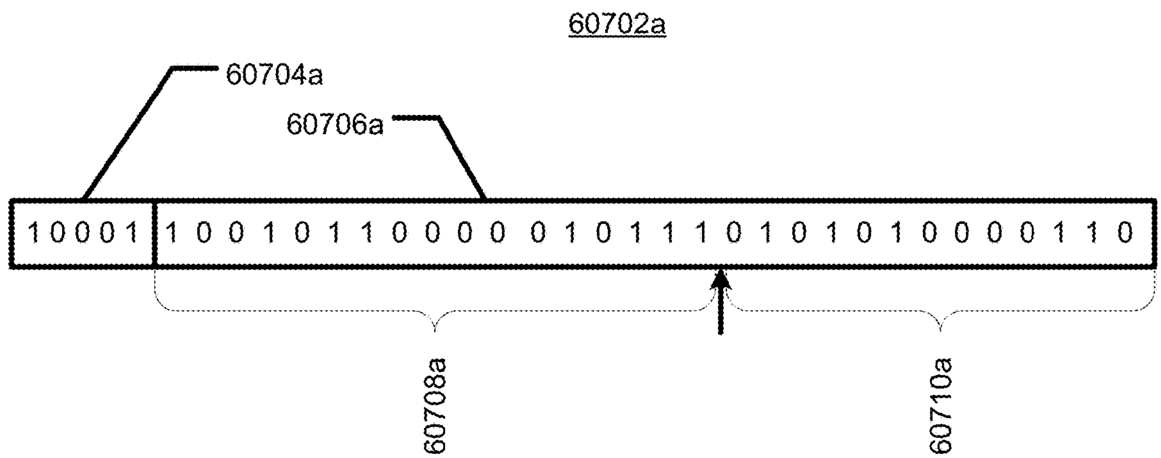
Figure 120B:
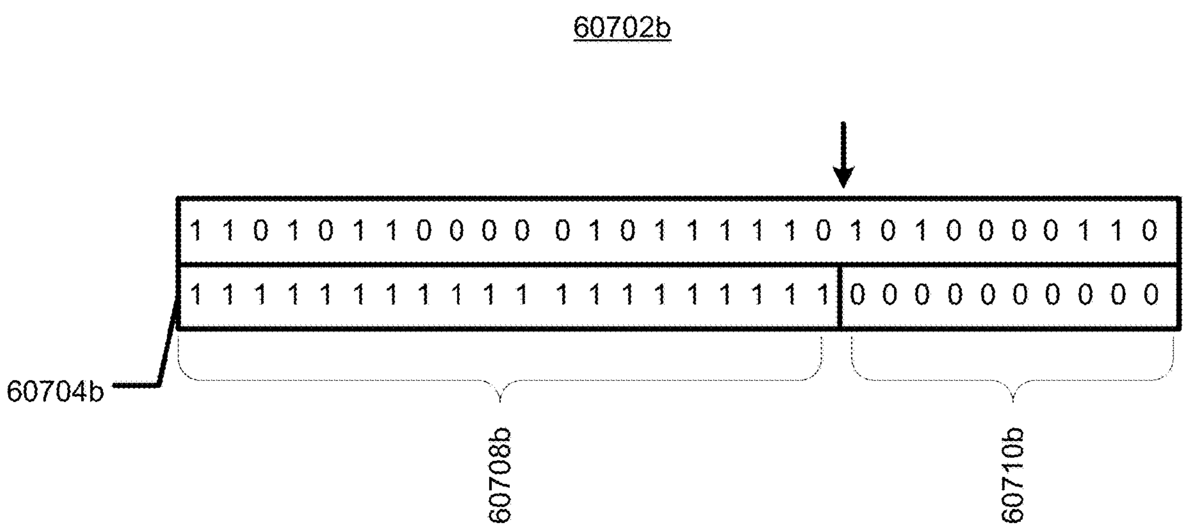
Figure 120C:
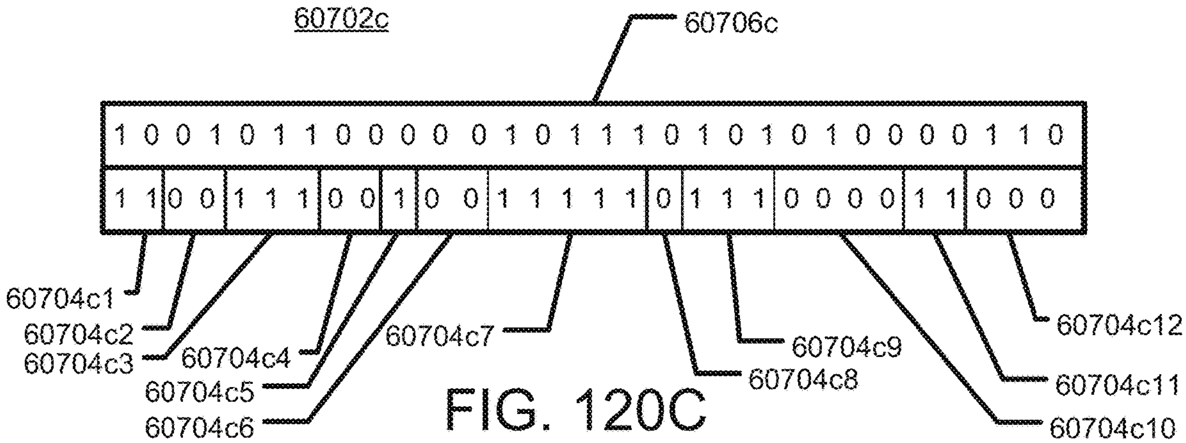
Figure 120D:
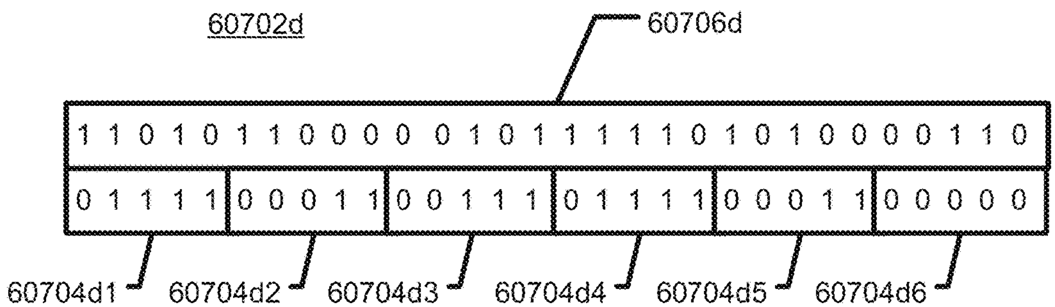
Figure 120E:
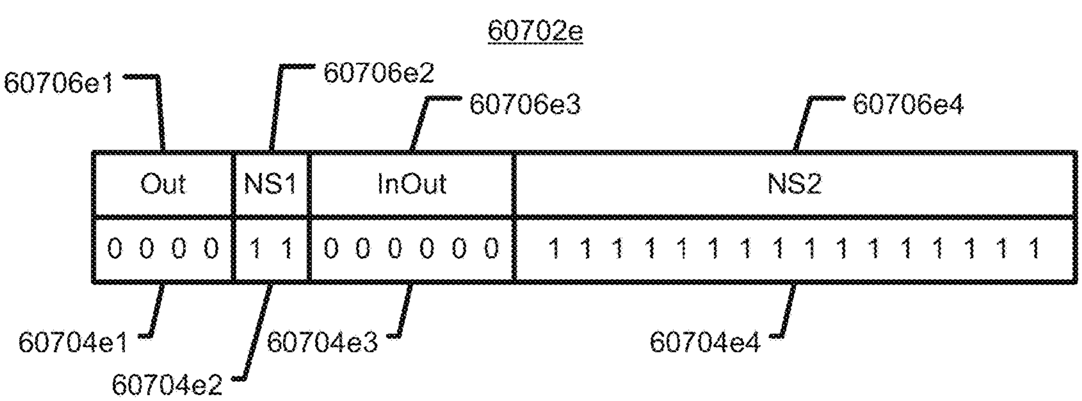
Figure 121:
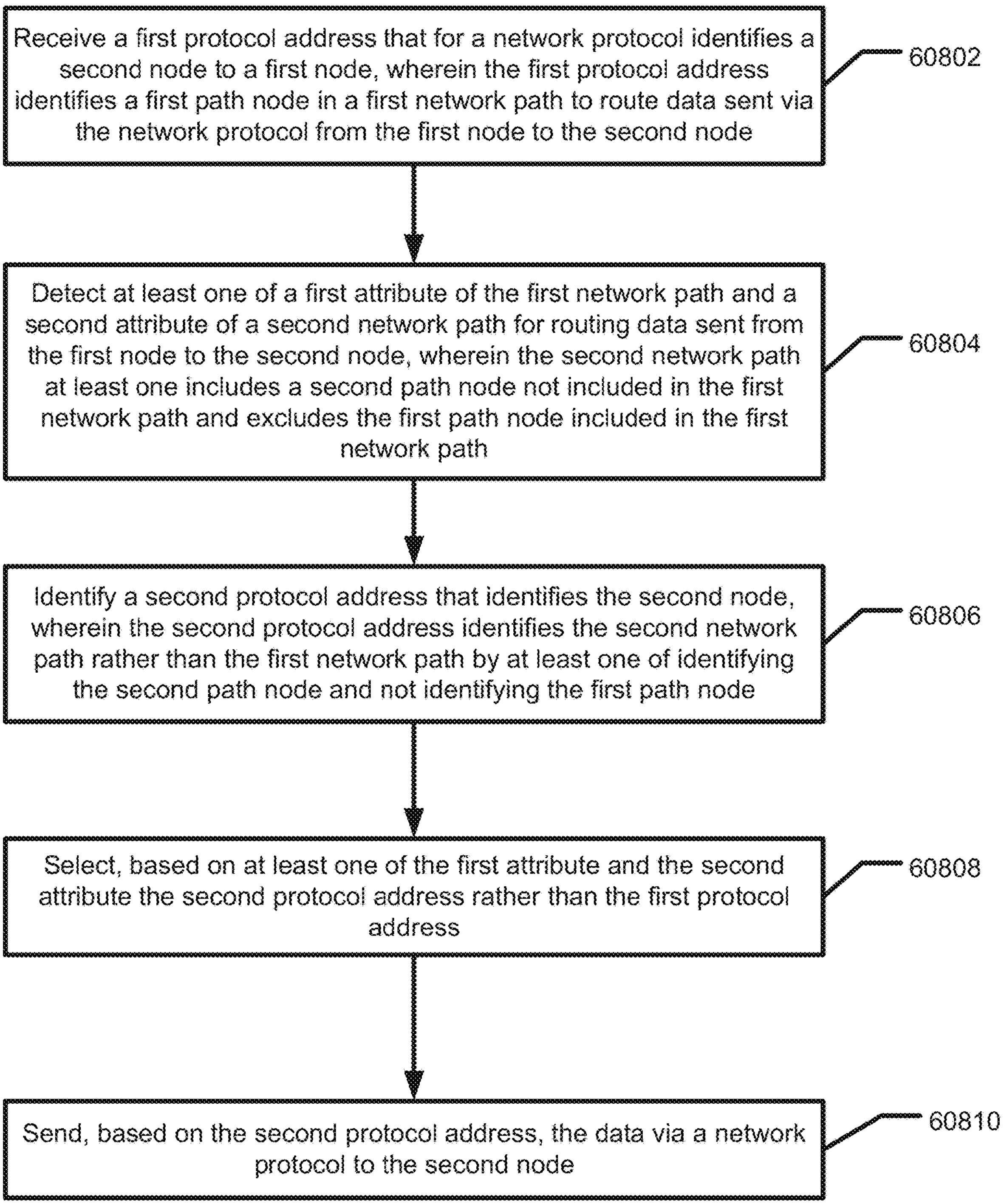
Figure 122:
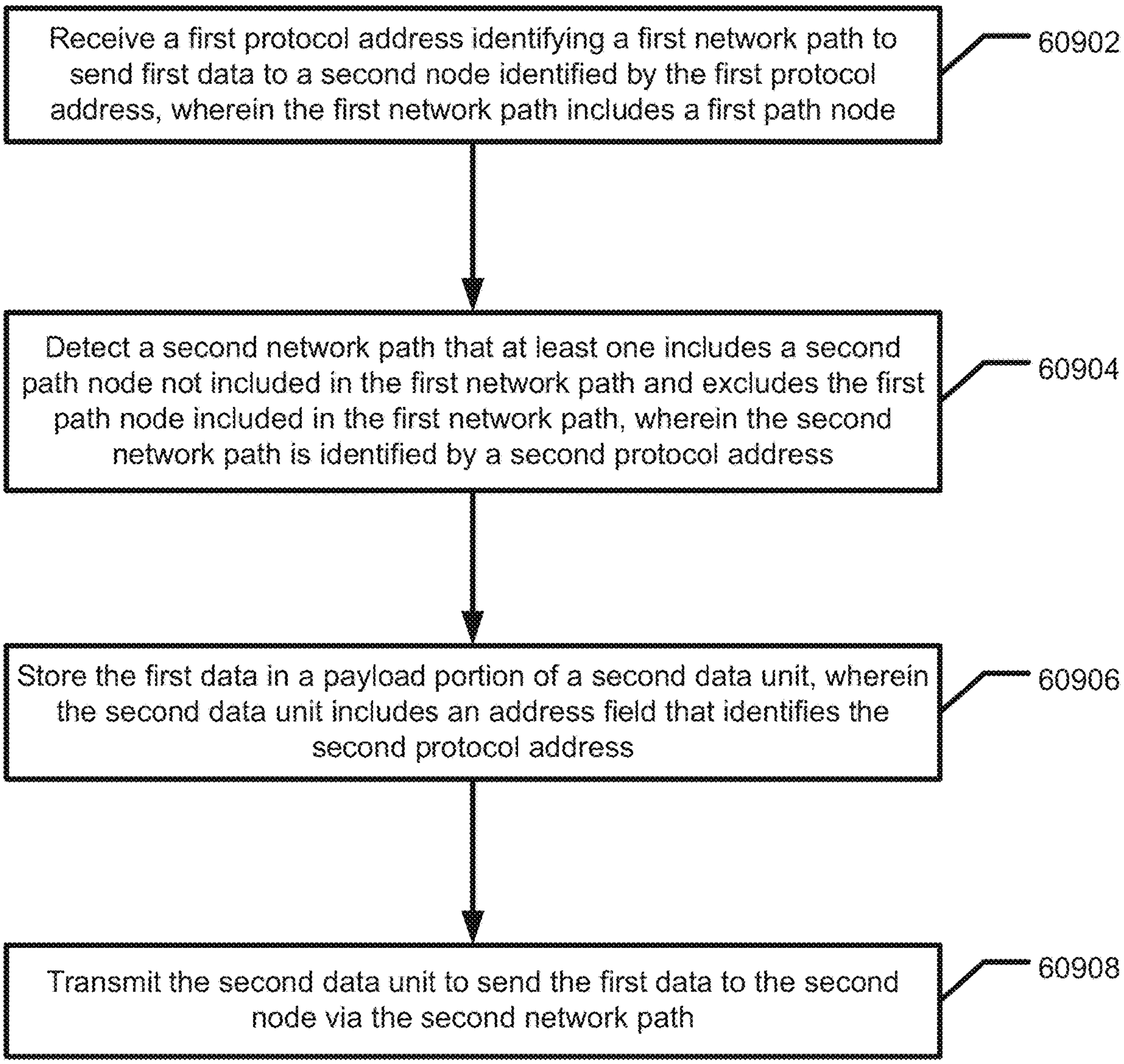
Figure 123:
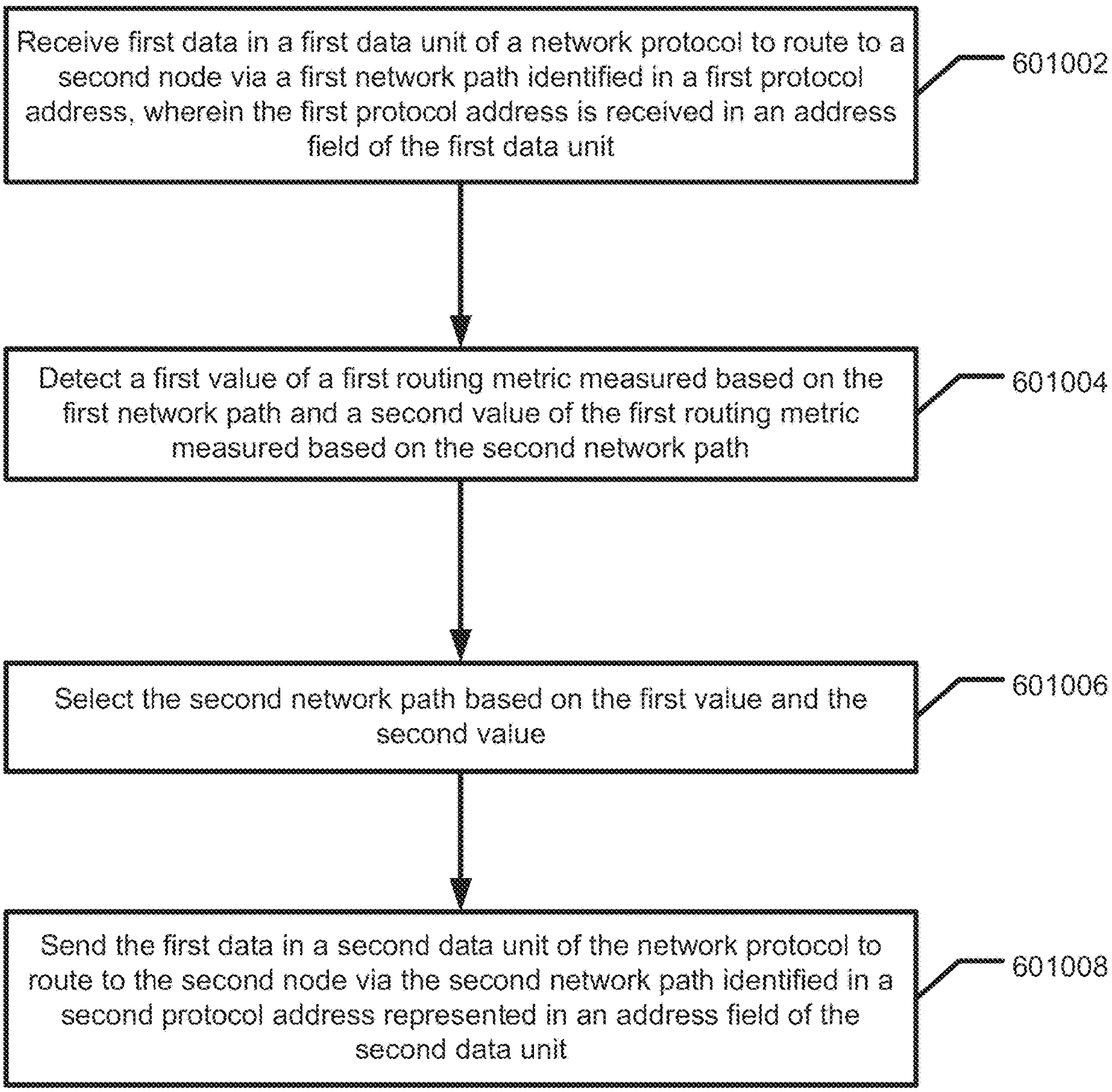
Figure 124:
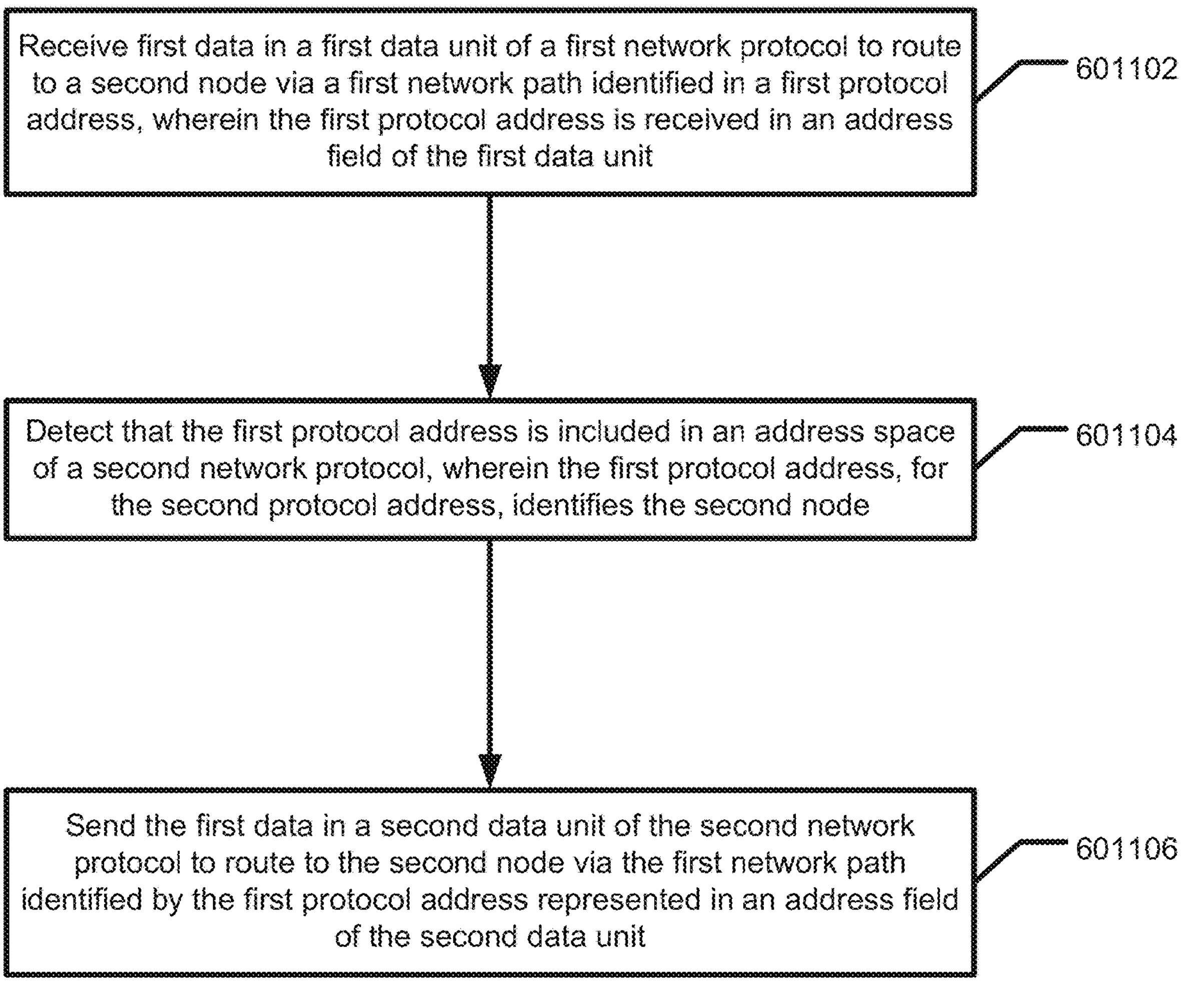
Figure 125:
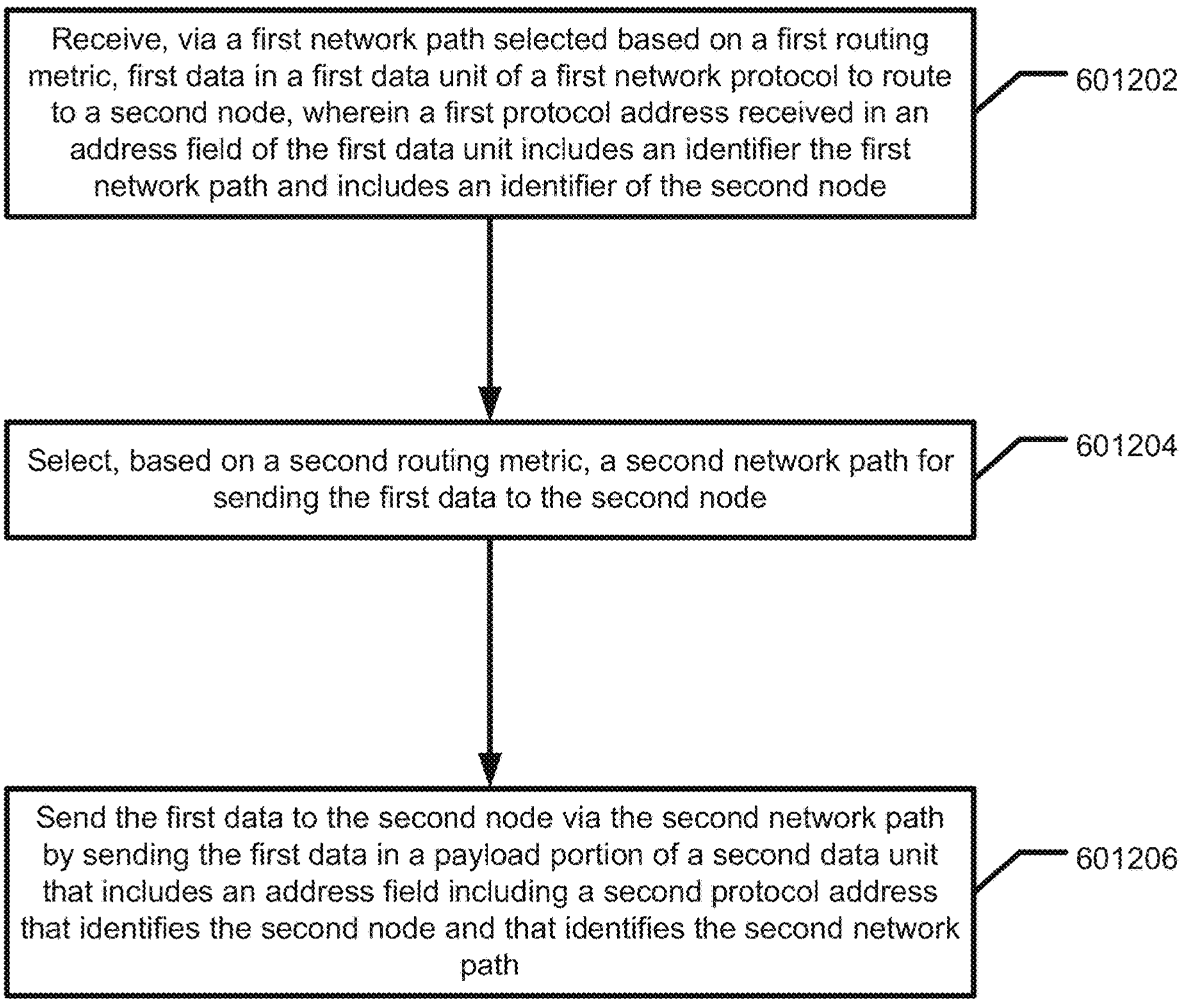
Figure 126:
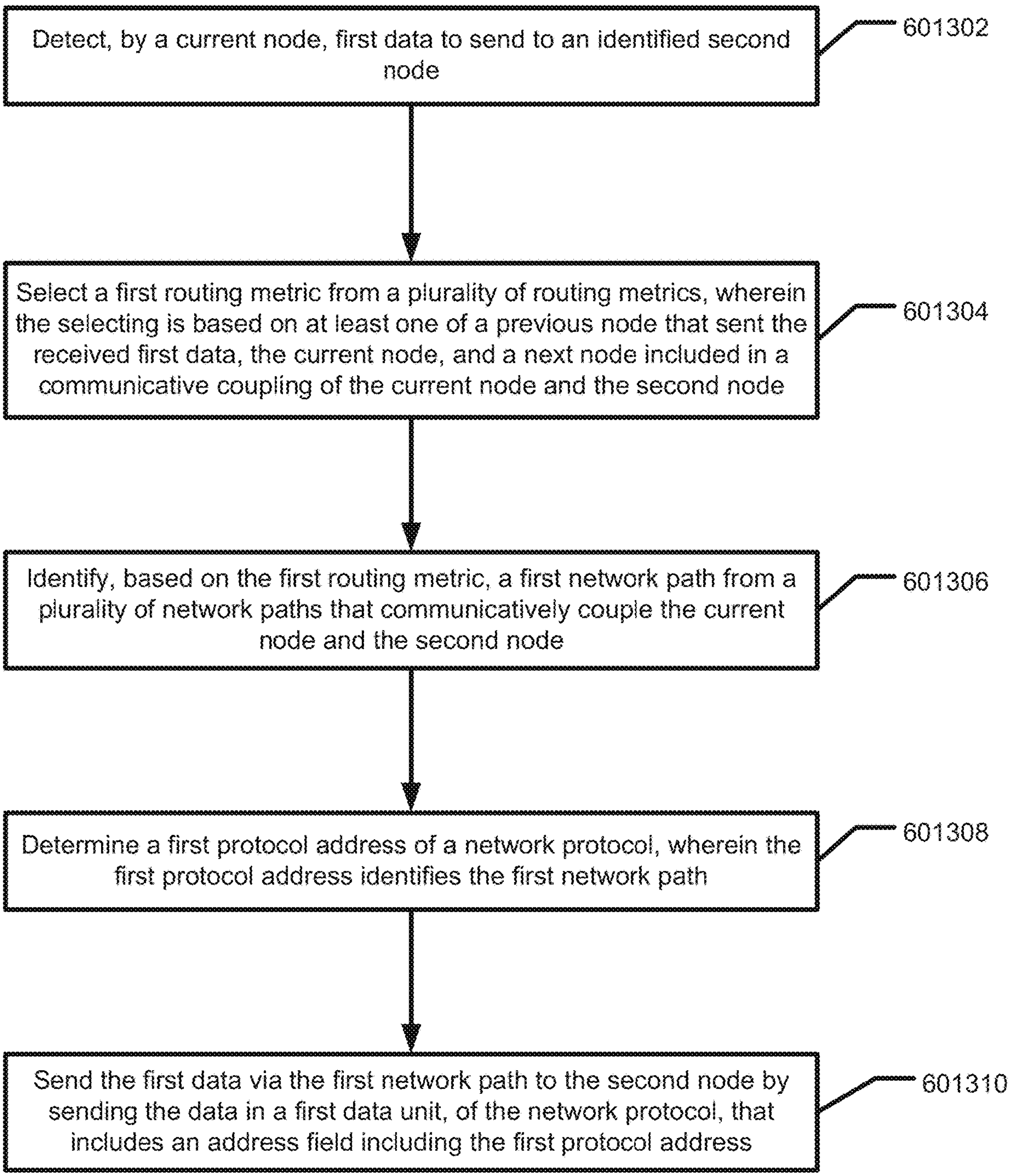
Figure 127:
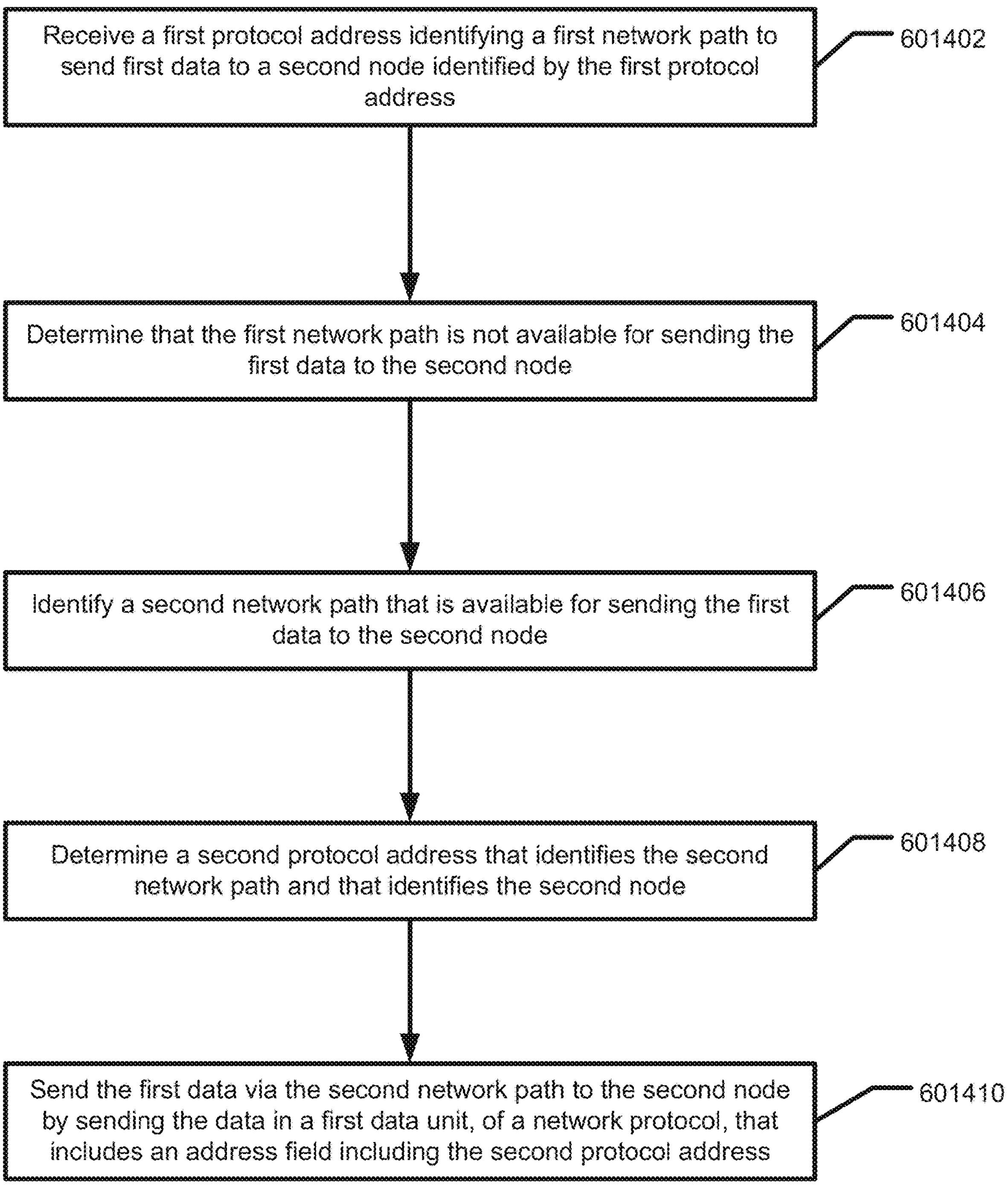
Figure 128:
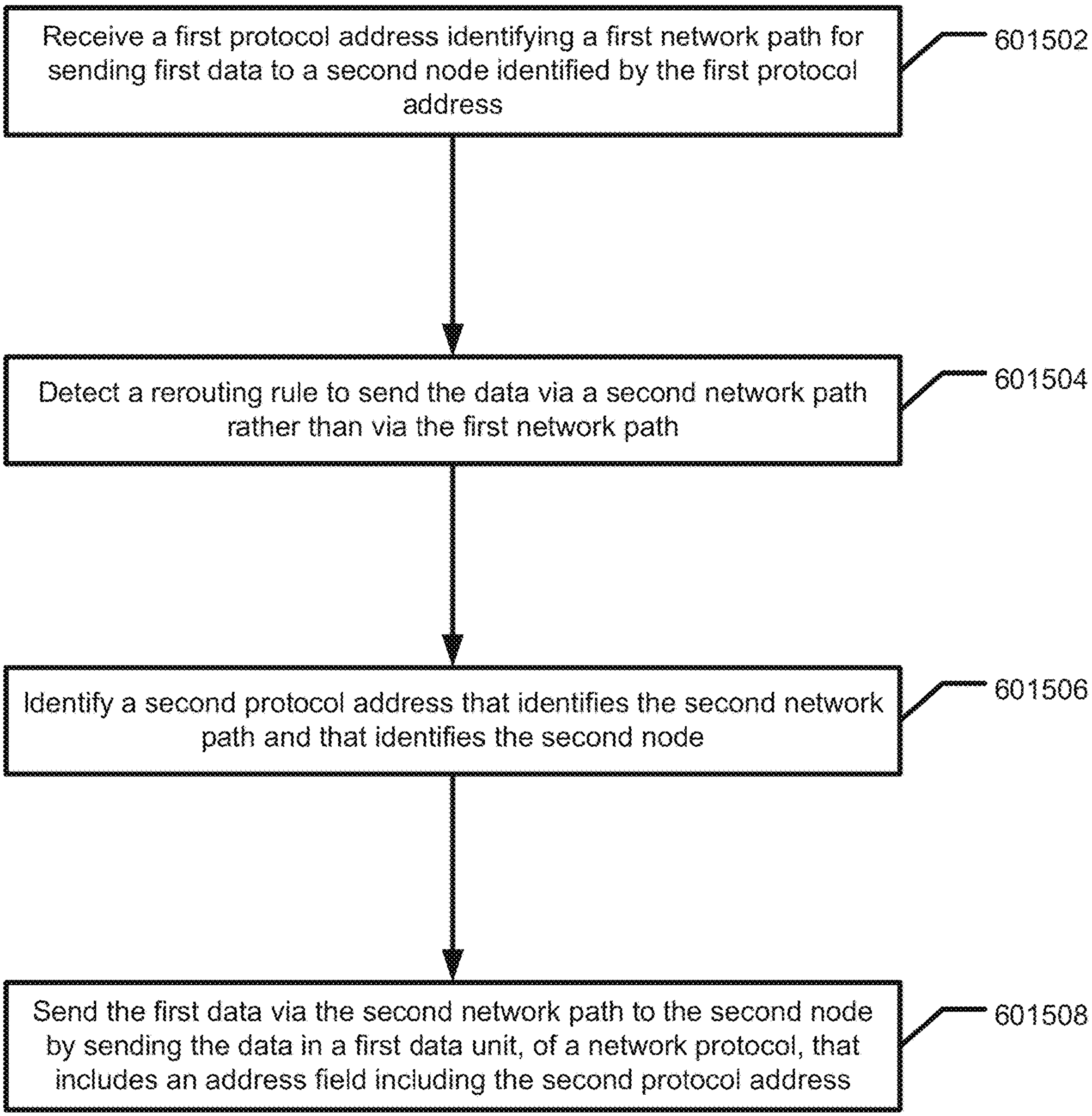
Figure 129:
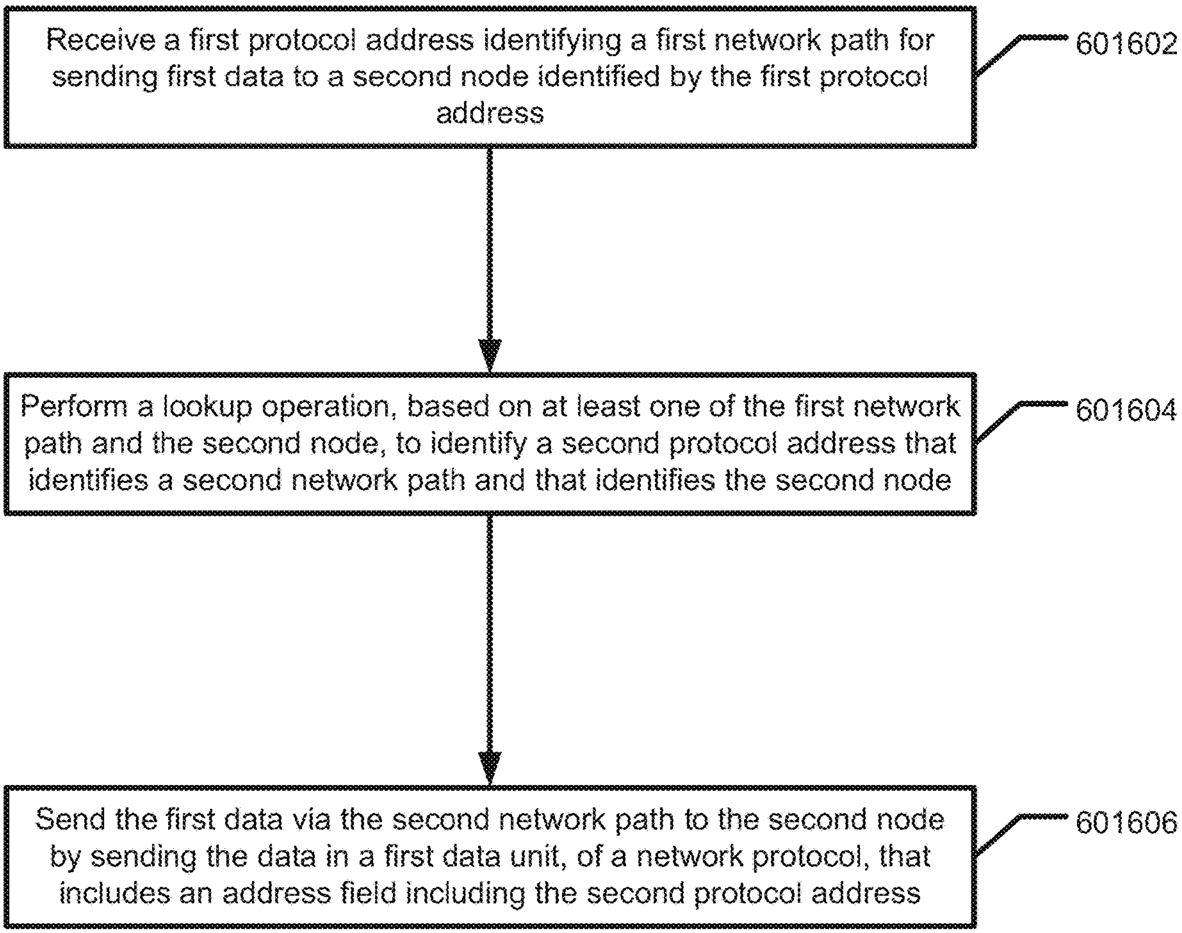
Figure 130:
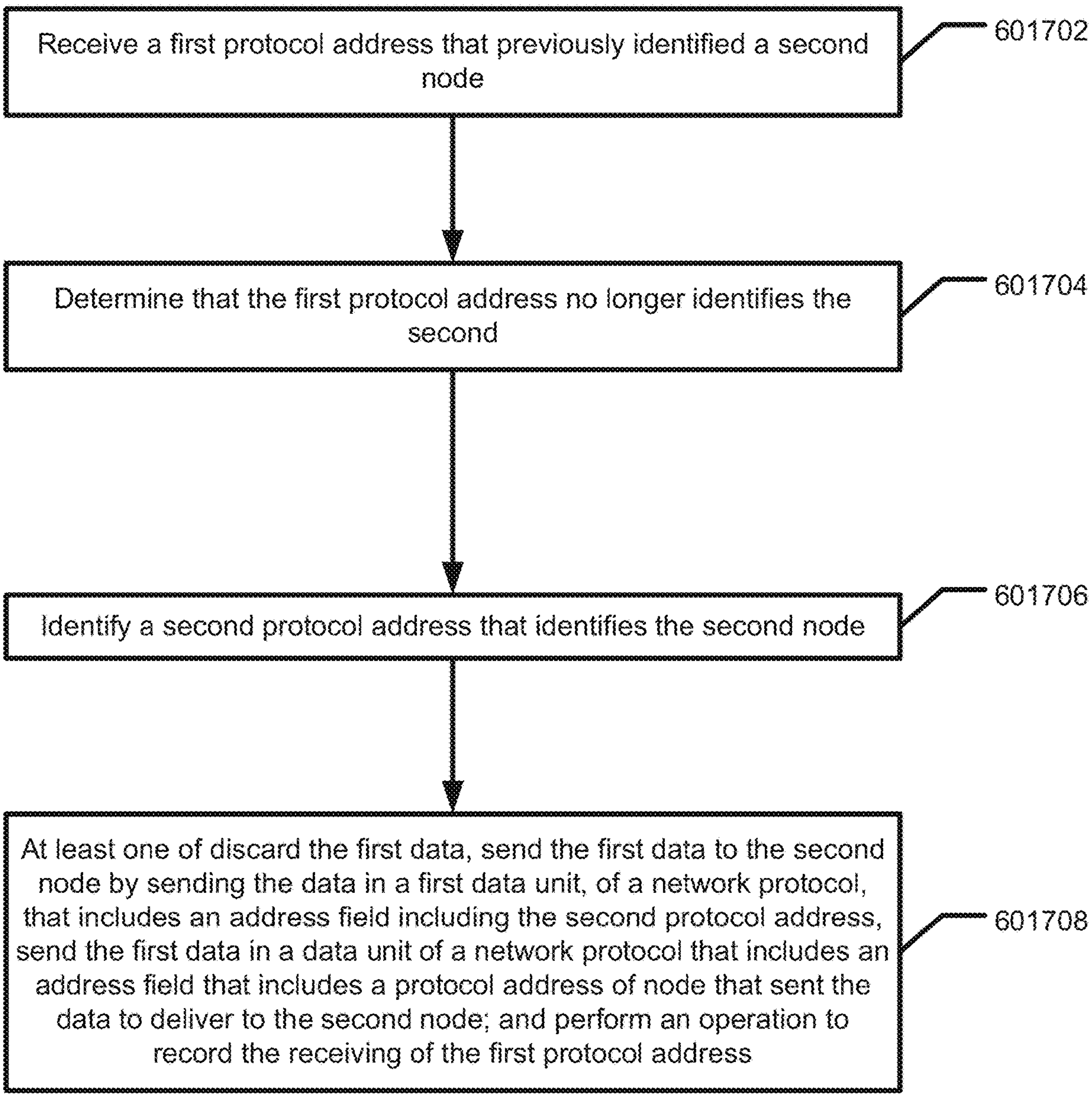
Figure 131:
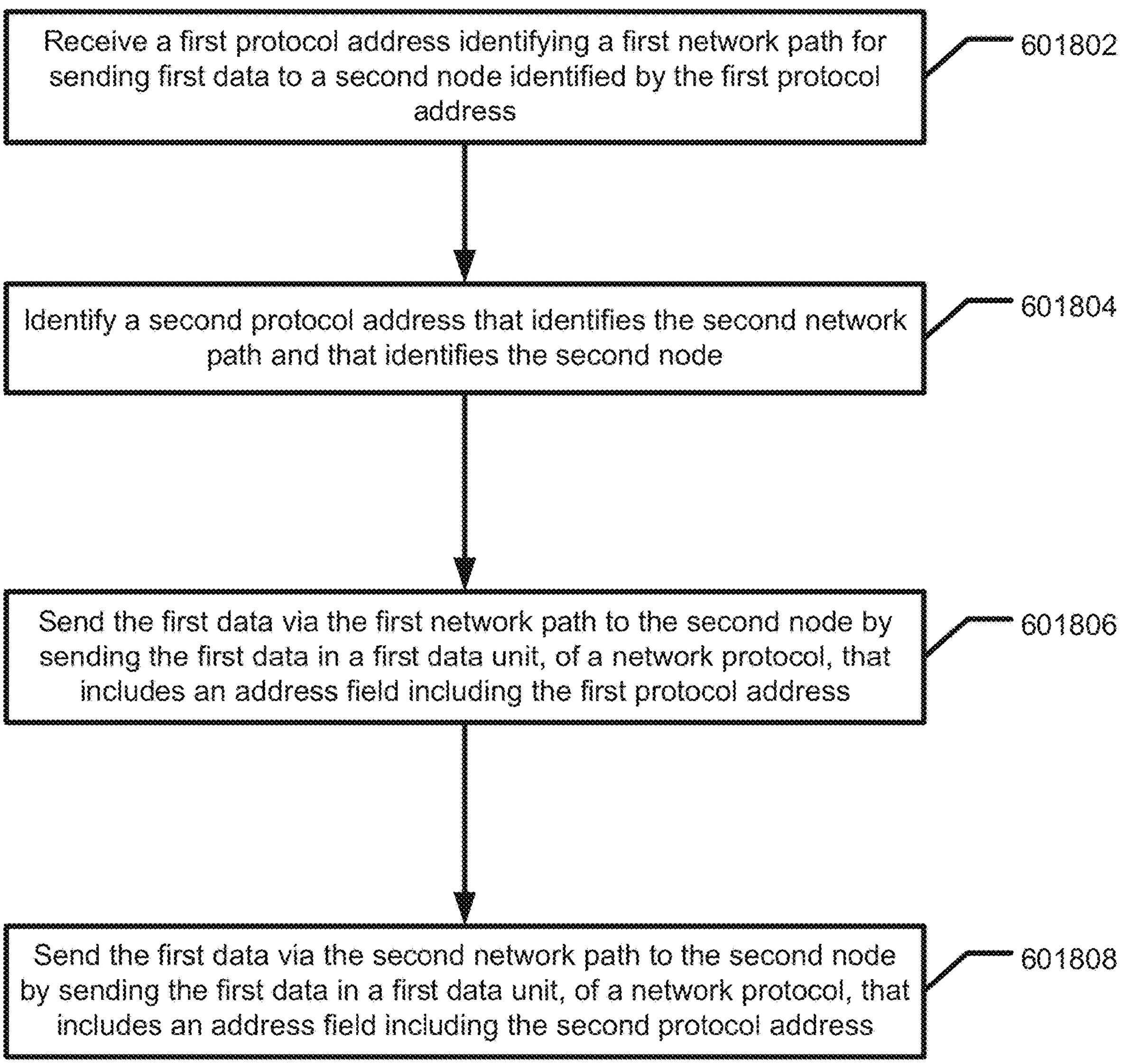
Figure 132:
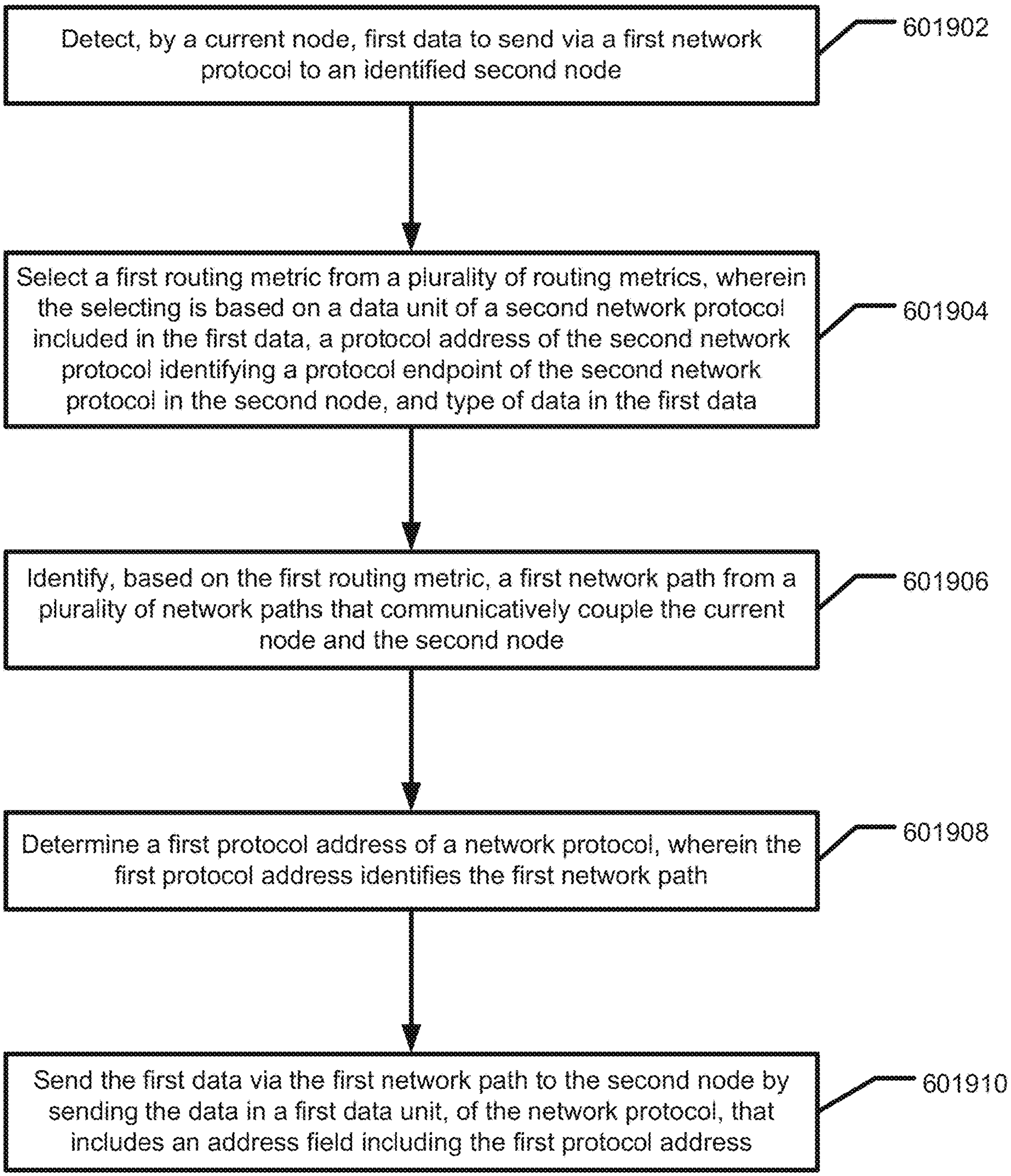
Figure 133:
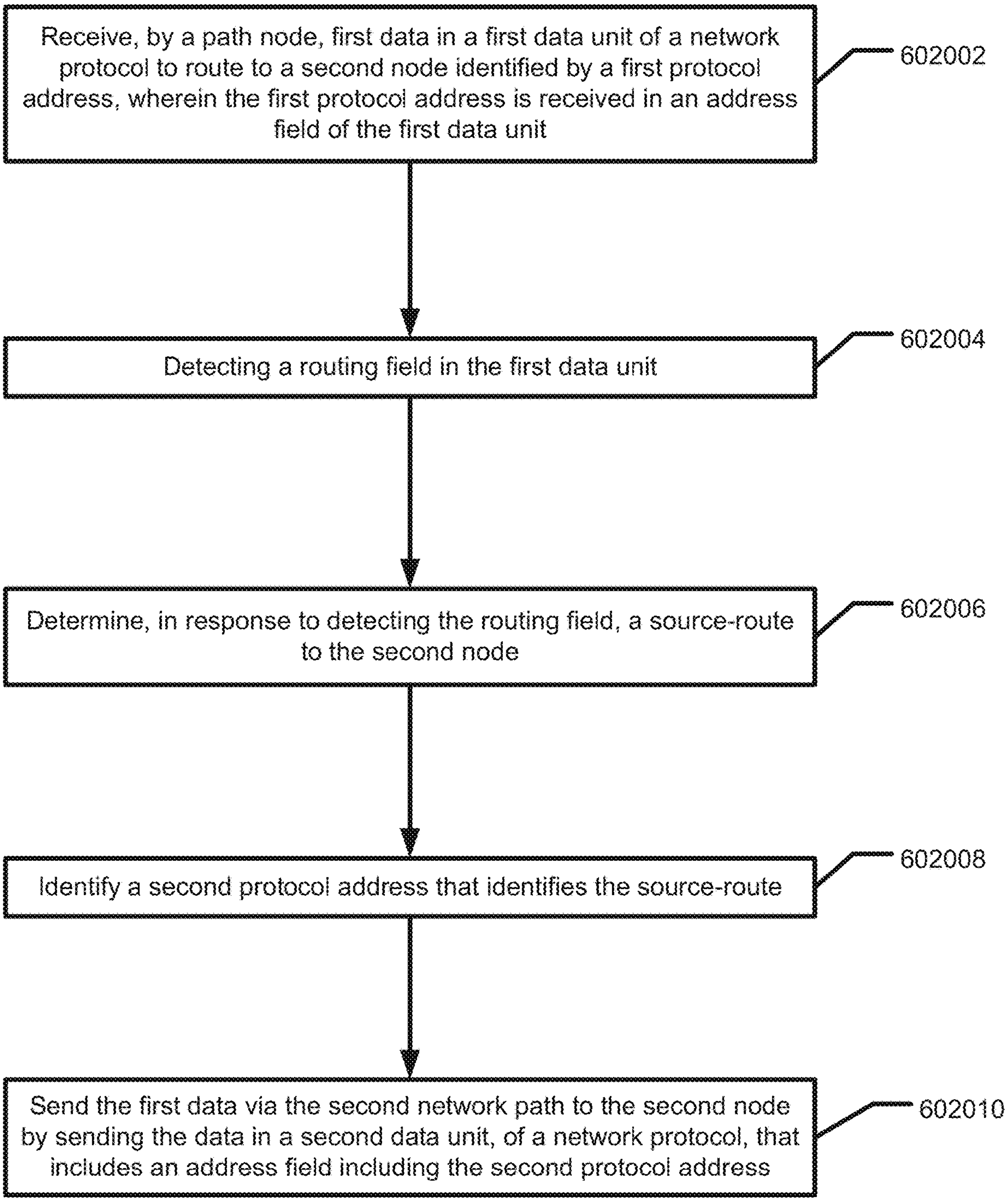

FIG. 114 is a block diagram illustrating an exemplary hardware device included in and/or otherwise providing an execution environment in which the subject matter may be implemented;

FIG. 115 is a flow diagram illustrating a method for source routing according to an aspect of the subject matter described herein;

FIG. 116 is a block diagram illustrating an arrangement of components for source routing according to another aspect of the subject matter described herein;

FIG. 117A is a block diagram illustrating an arrangement of components for source routing according to another aspect of the subject matter described herein;

FIG. 117B is a block diagram illustrating an arrangement of components for source routing according to another aspect of the subject matter described herein;

FIG. 118 is a block diagram illustrating an arrangement of components for source routing according to another aspect of the subject matter described herein;

FIG. 119A is a network diagram illustrating an exemplary system for source routing according to another aspect of the subject matter described herein;

FIG. 119B is a network diagram illustrating an exemplary system for source routing according to another aspect of the subject matter described herein;

FIG. 119C is a network diagram illustrating an exemplary system for source routing according to another aspect of the subject matter described herein;

FIG. 120A is a diagram illustrating an exemplary representation of a protocol address according to another aspect of the subject matter described herein;

FIG. 120B is a diagram illustrating an exemplary representation of a protocol address according to another aspect of the subject matter described herein;

FIG. 120C is a diagram illustrating an exemplary representation of a protocol address according to another aspect of the subject matter described herein;

FIG. 120D is a diagram illustrating an exemplary representation of a protocol address according to another aspect of the subject matter described herein;

FIG. 120E is a diagram illustrating an exemplary representation of a protocol address according to another aspect of the subject matter described herein;

FIG. 121 is a flow diagram illustrating another method according to an aspect of the subject matter described herein;

FIG. 122 is a flow diagram illustrating another method according to an aspect of the subject matter described herein;

FIG. 123 is a flow diagram illustrating another method according to an aspect of the subject matter described herein;

FIG. 124 is a flow diagram illustrating another method according to an aspect of the subject matter described herein;

FIG. 125 is a flow diagram illustrating another method according to an aspect of the subject matter described herein;

FIG. 126 is a flow diagram illustrating another method according to an aspect of the subject matter described herein;

FIG. 127 is a flow diagram illustrating another method according to an aspect of the subject matter described herein;

FIG. 128 is a flow diagram illustrating another method according to an aspect of the subject matter described herein;

FIG. 129 is a flow diagram illustrating another method according to an aspect of the subject matter described herein;

FIG. 130 is a flow diagram illustrating another method according to an aspect of the subject matter described herein;

FIG. 131 is a flow diagram illustrating another method according to an aspect of the subject matter described herein;

FIG. 132 is a flow diagram illustrating another method according to an aspect of the subject matter described herein;

FIG. 133 is a flow diagram illustrating another method according to an aspect of the subject matter described herein.

Figure 134A:
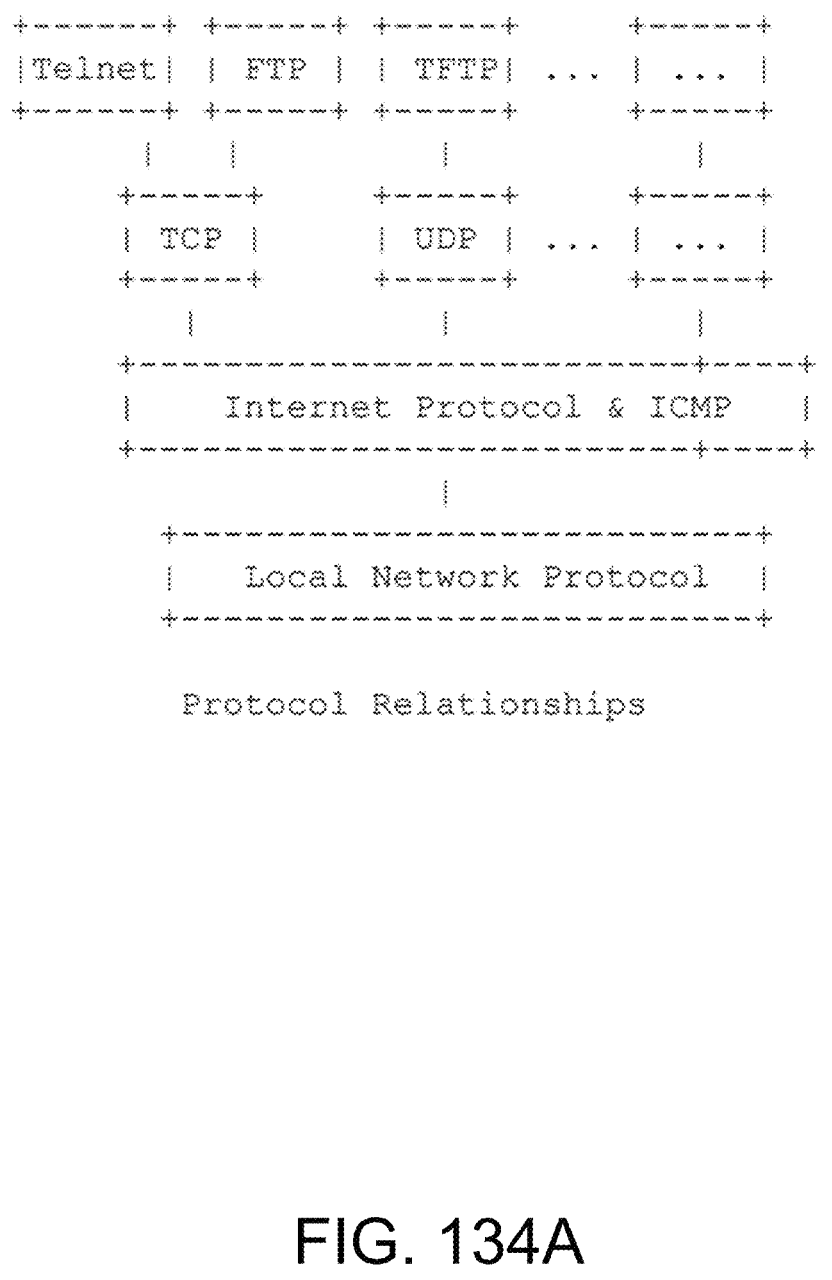
Figure 134C:
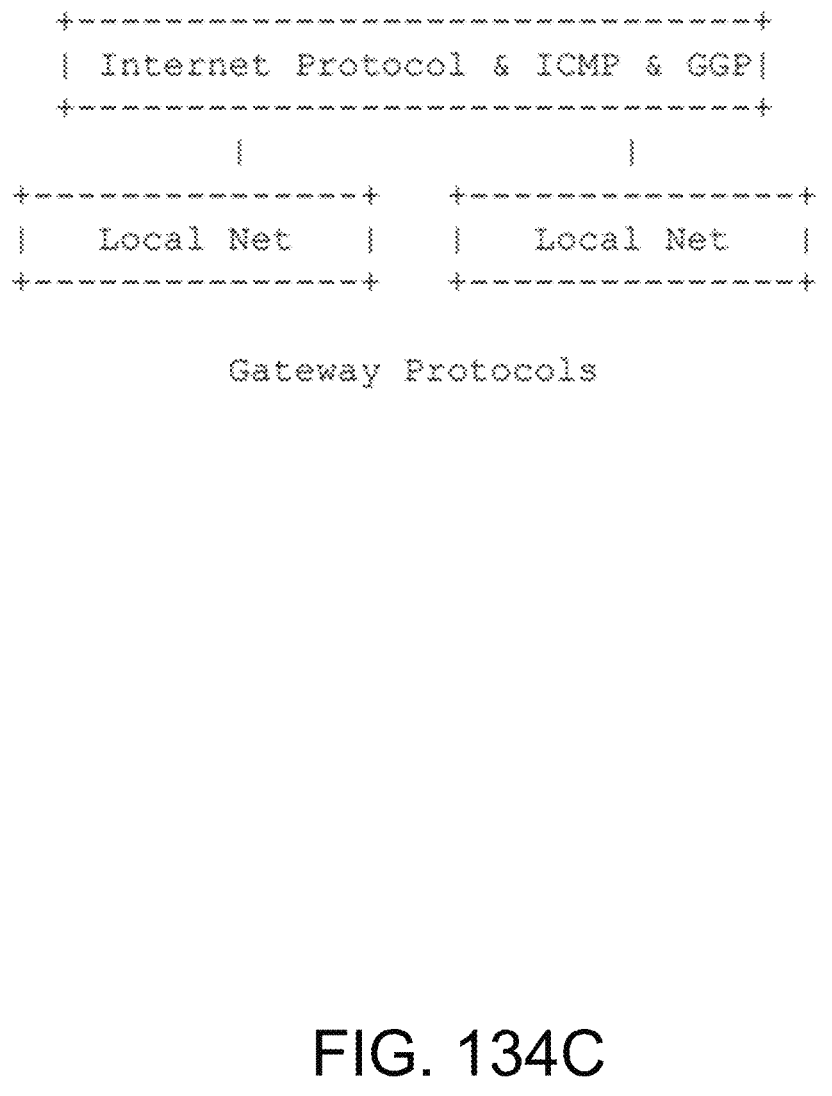
Figure 134H:
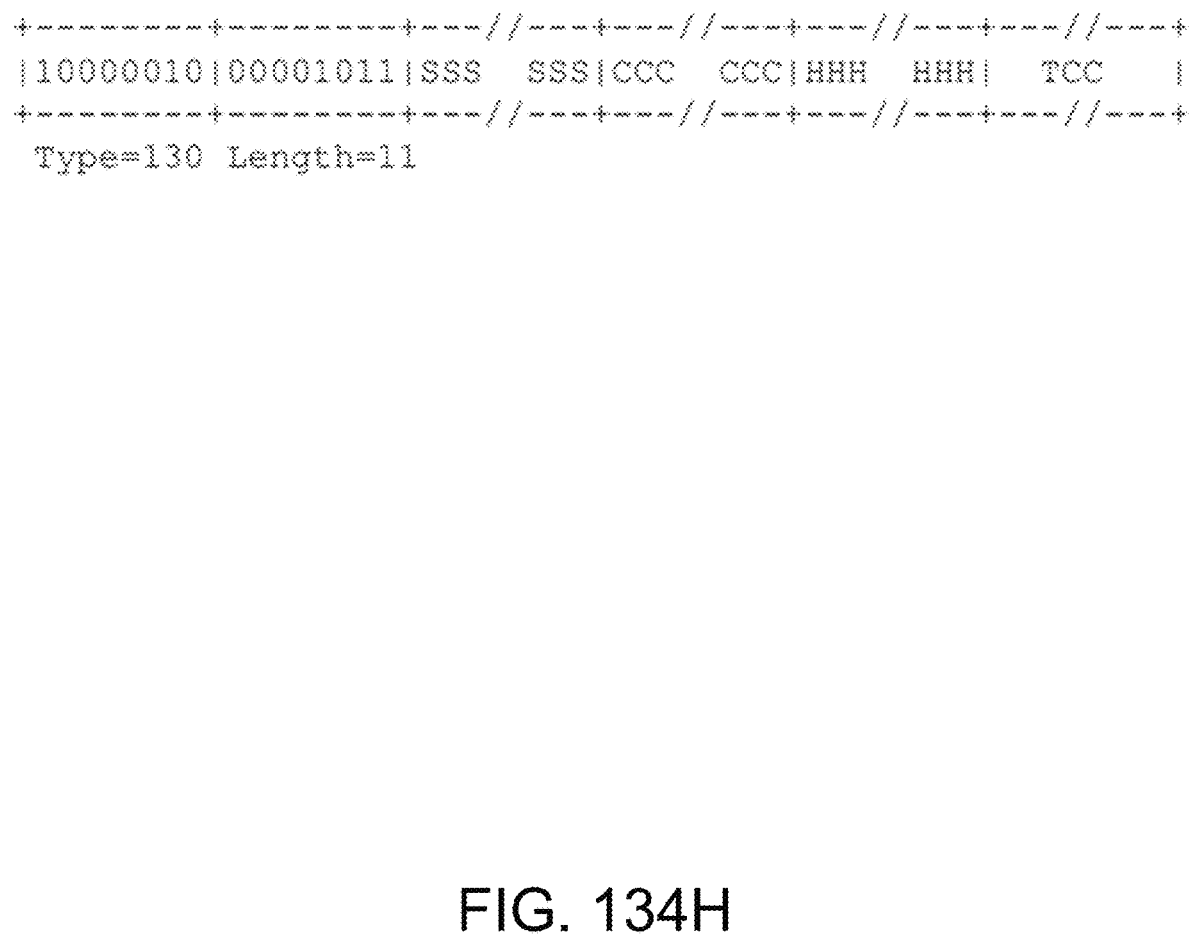
Figure 134I:
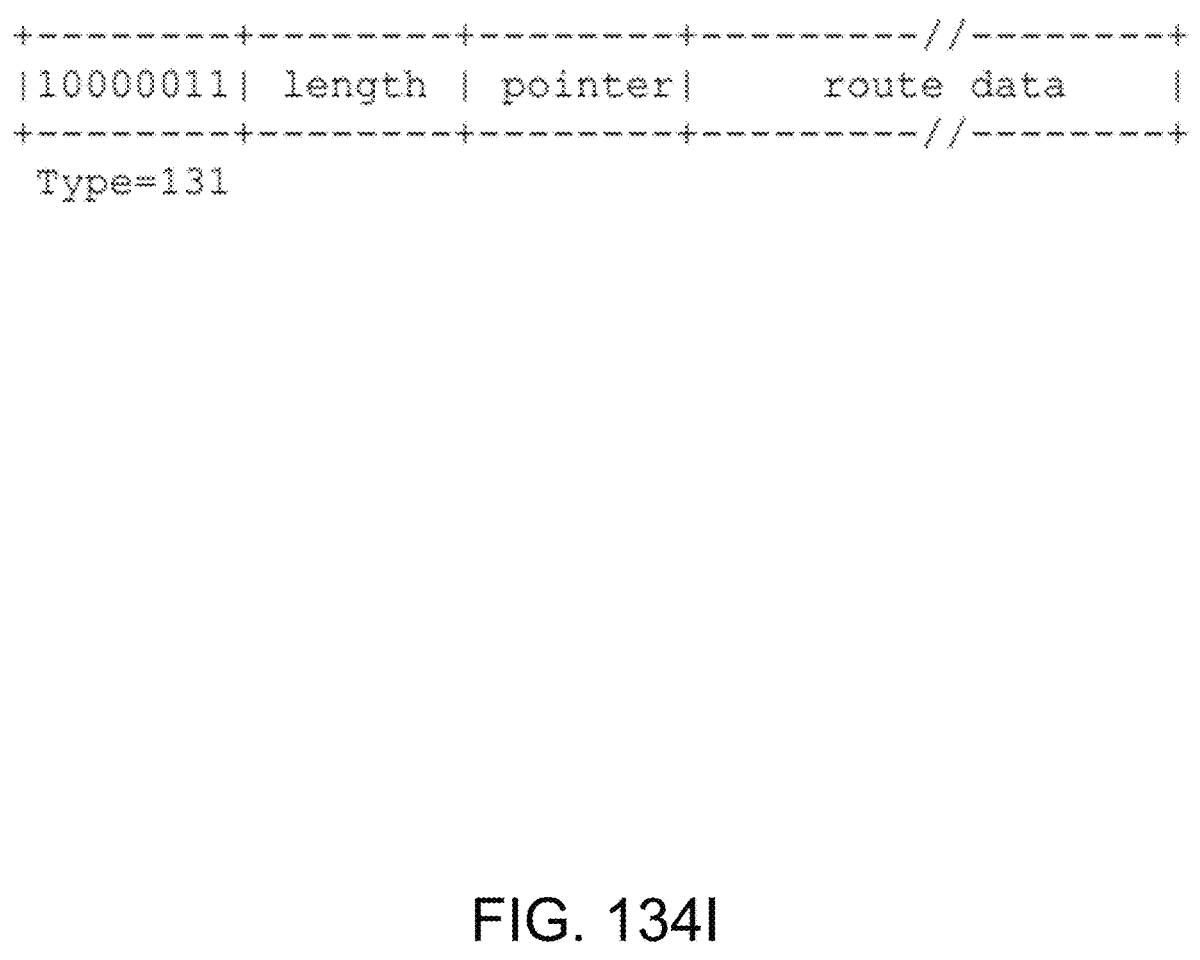
Figure 134J:
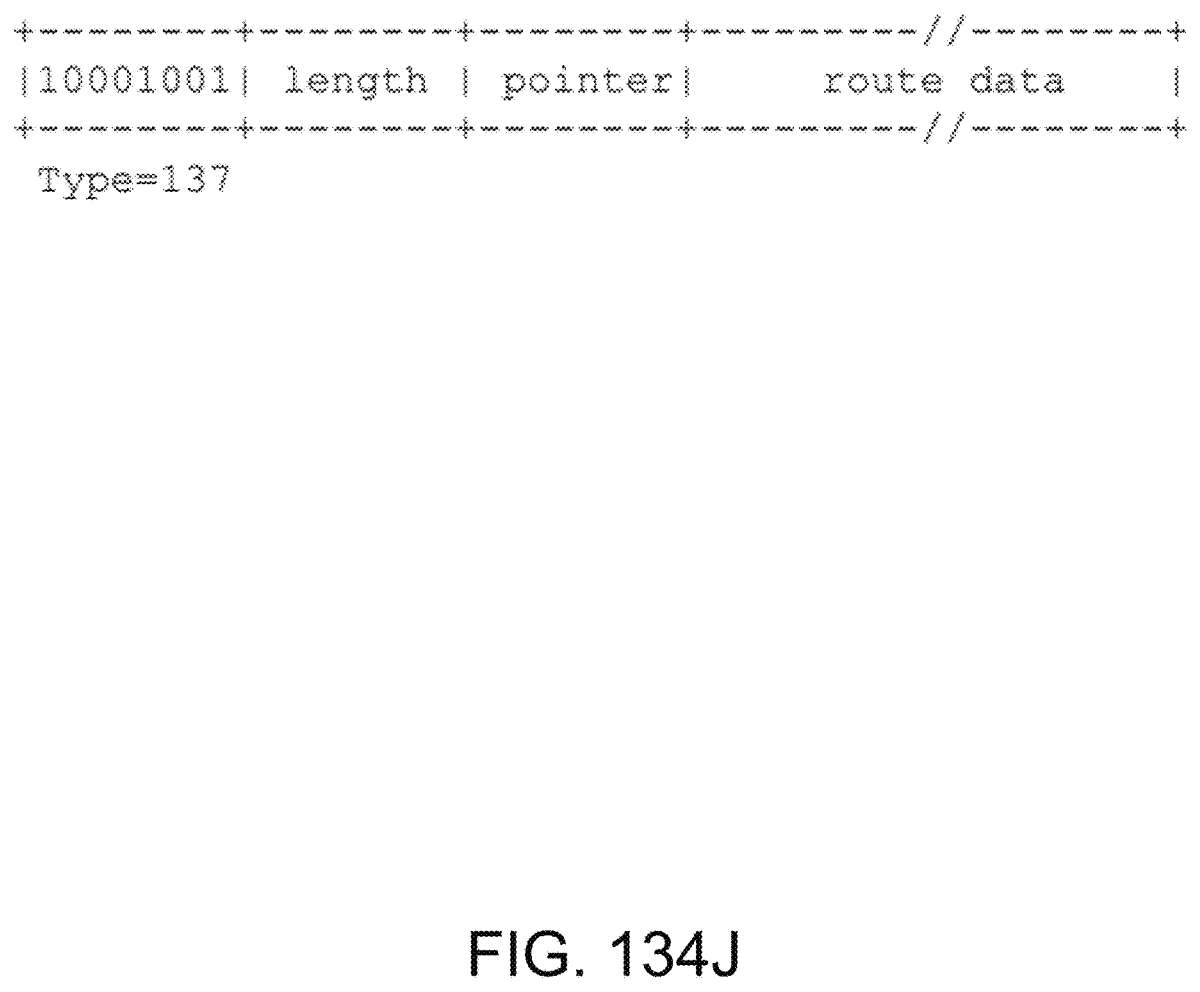
Figure 134K:
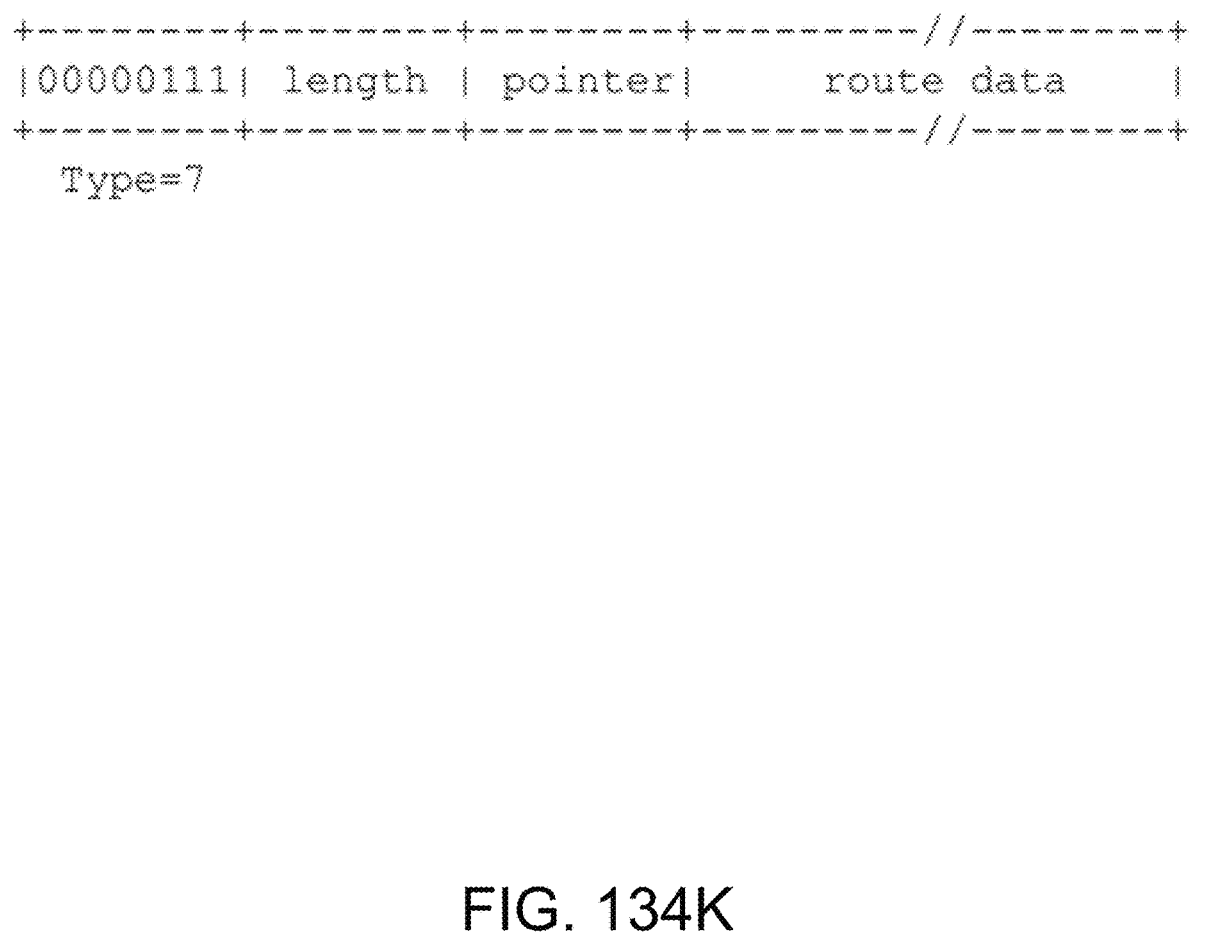
Figure 134L:
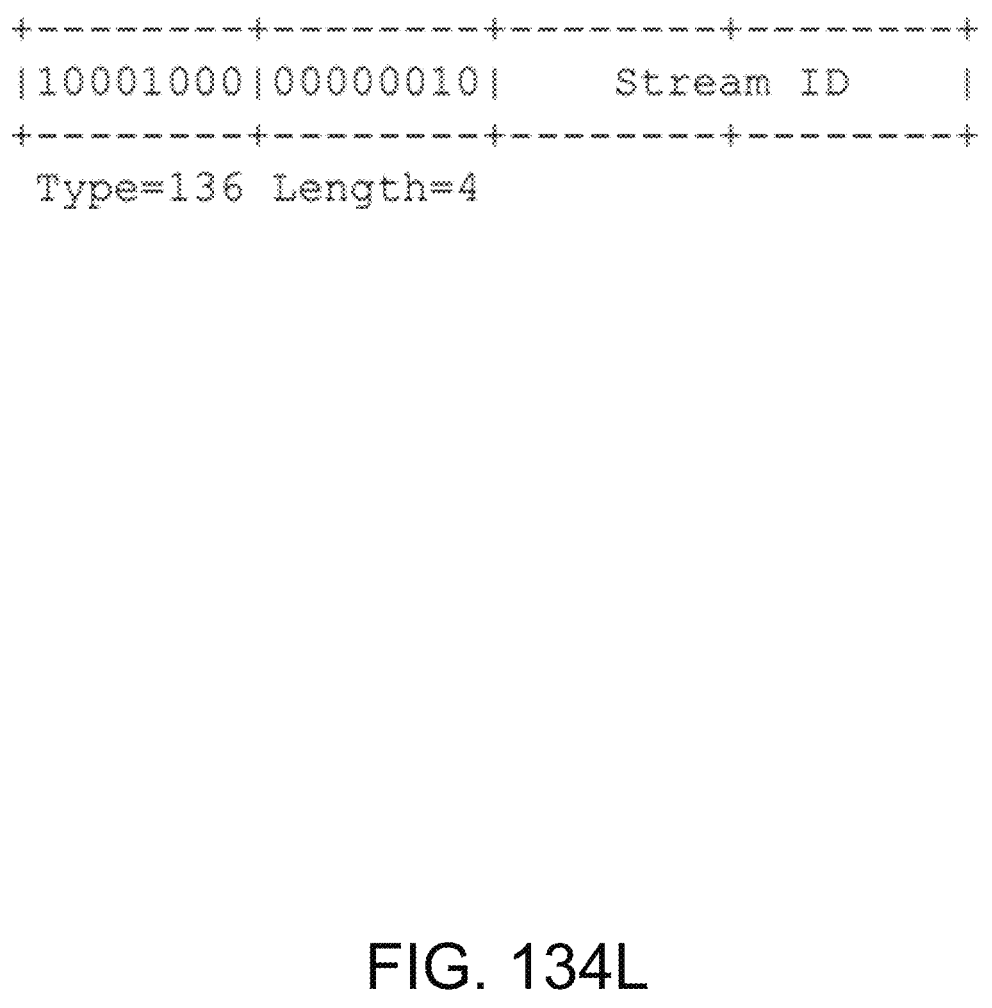
Figure 134S:
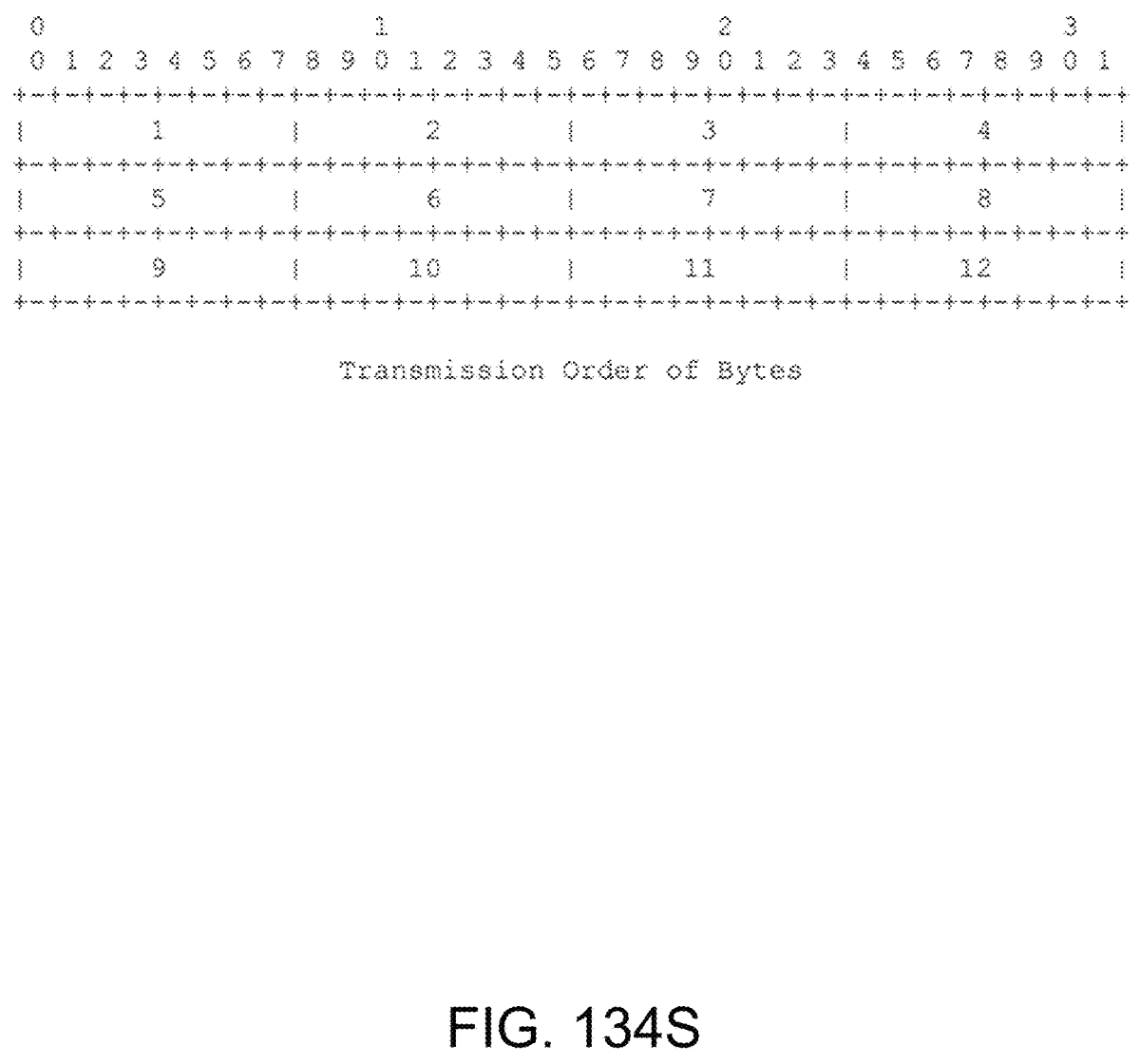
Figure 134U:
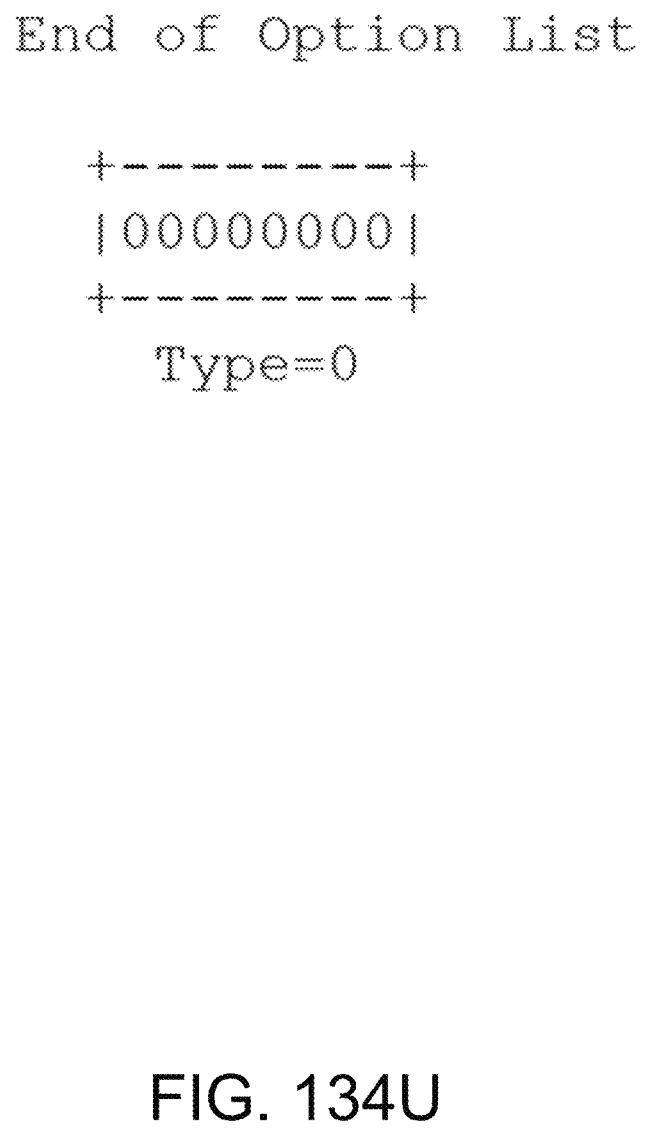
Figure 134V:
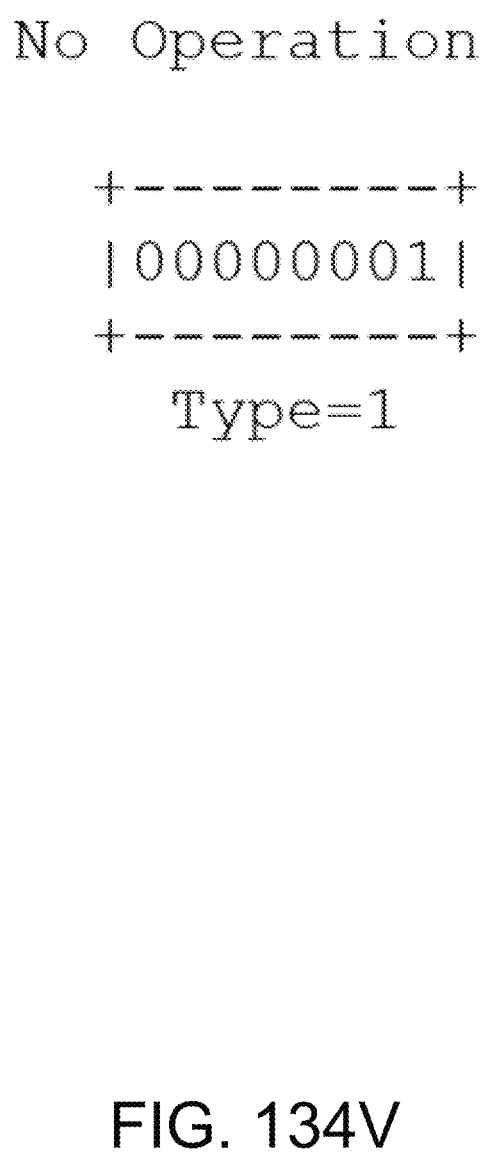
Figure 134W:
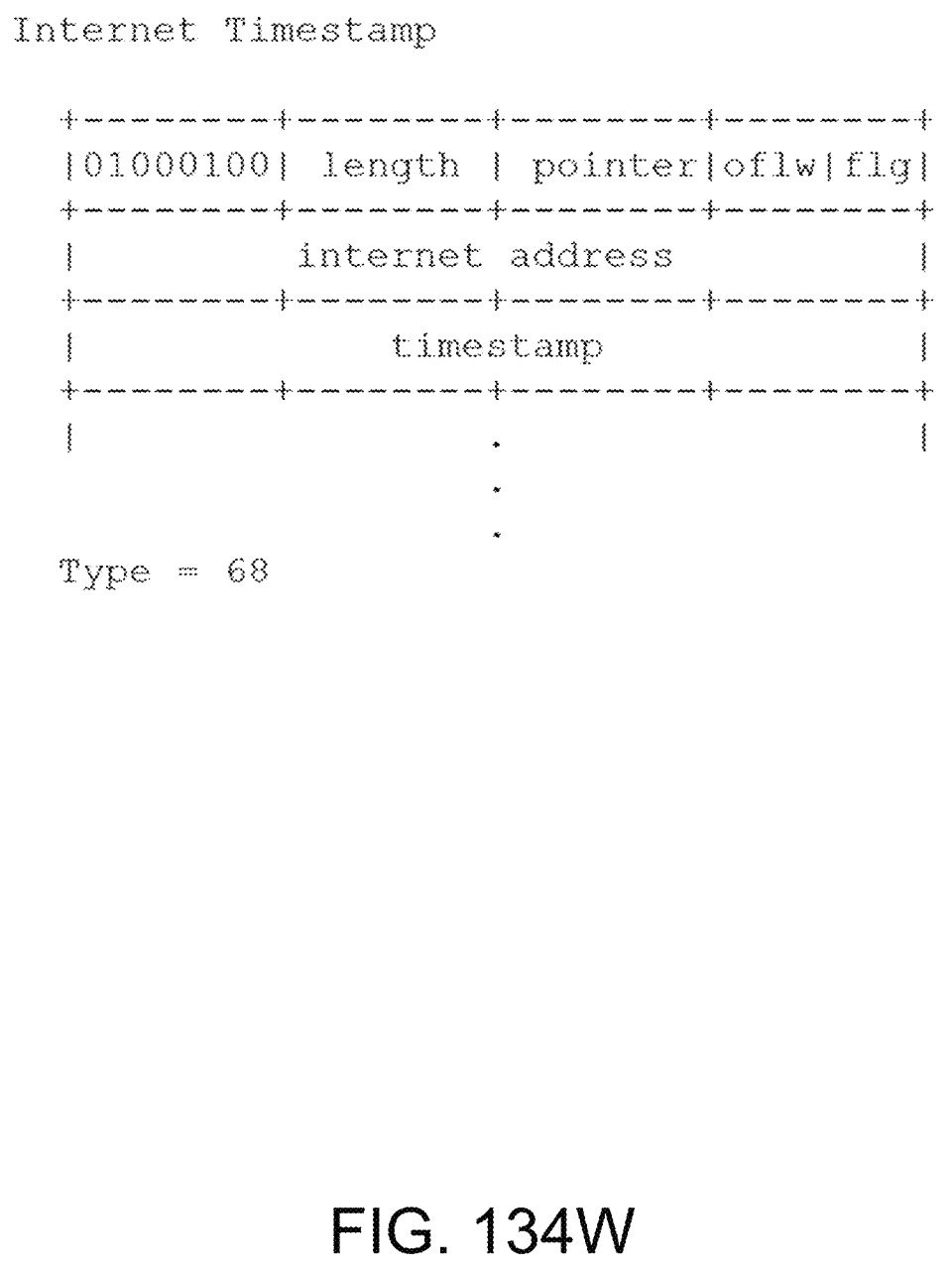
Figure 135A:
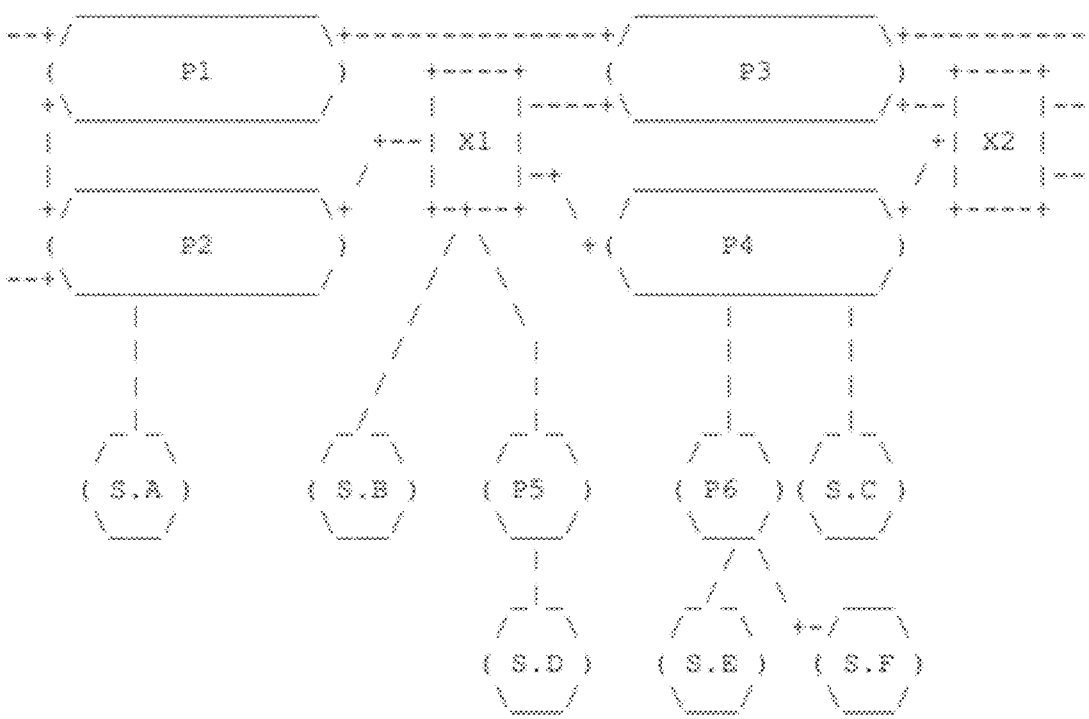
Figure 137D:
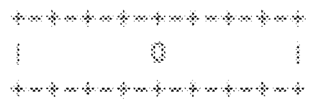
Figure 139A:
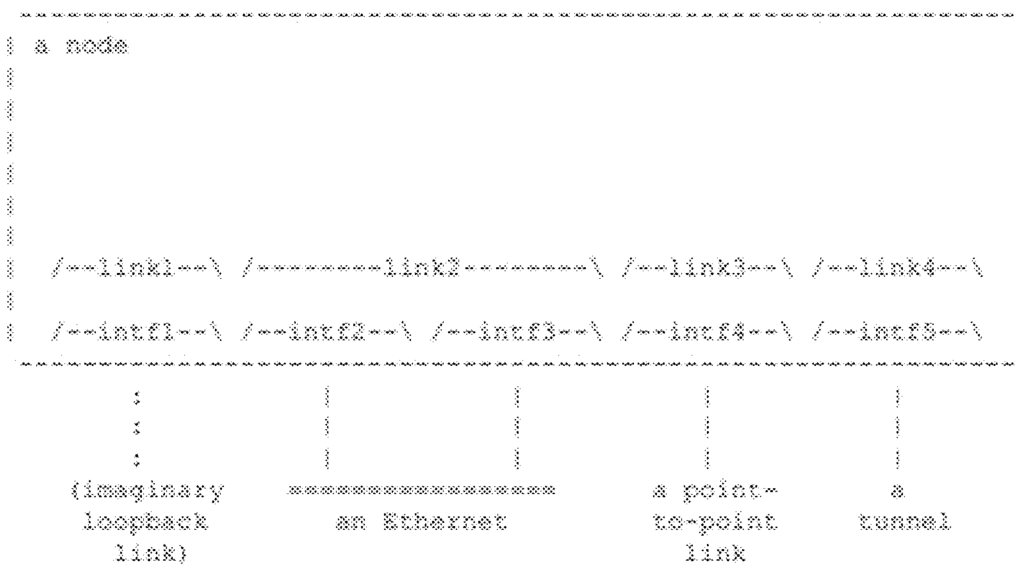
Figure 139B:
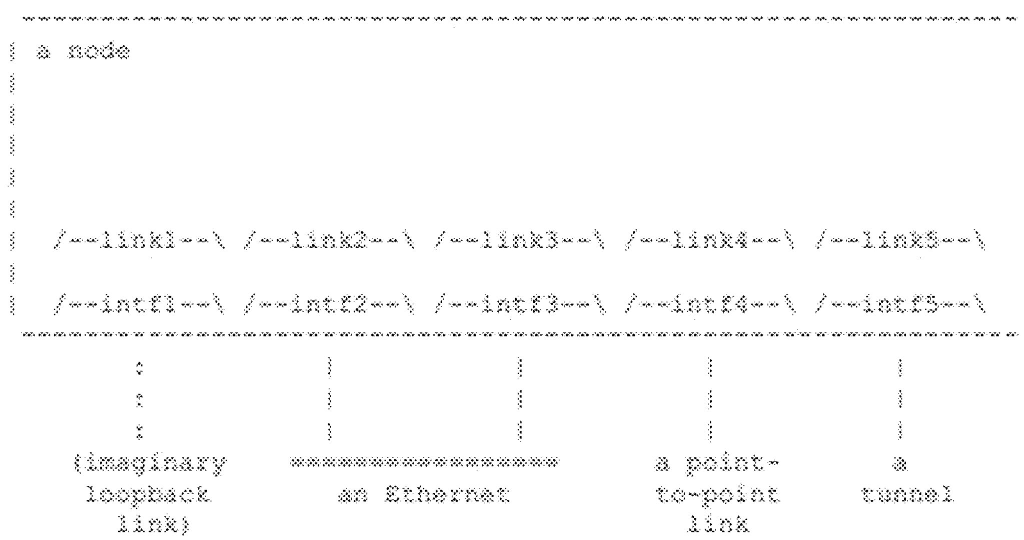
Figure 139D:
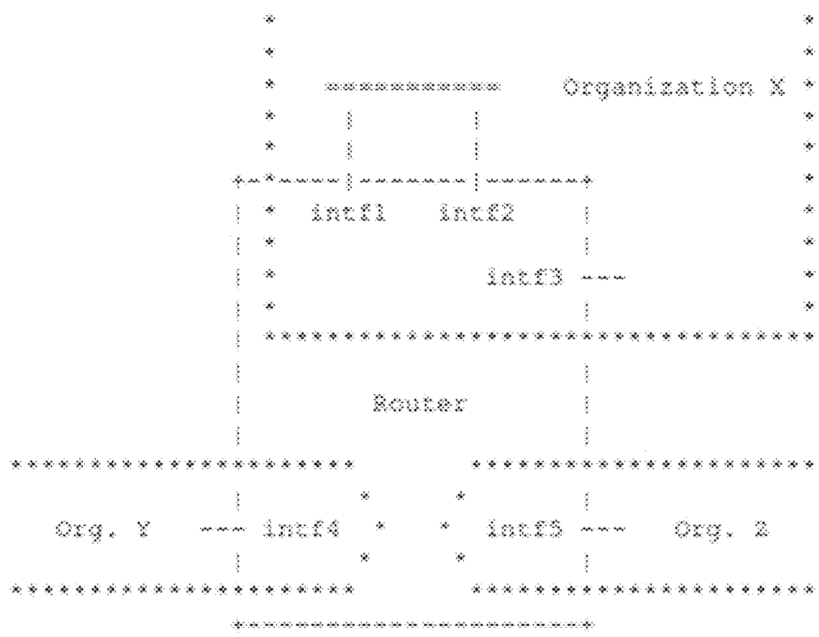

FIG. 134A is a diagram illustrating an exemplary representation according to an aspect of the subject matter described herein;

FIG. 134B is a diagram illustrating an exemplary representation according to an aspect of the subject matter described herein;

FIG. 134C is a diagram illustrating an exemplary representation according to an aspect of the subject matter described herein;

FIG. 134D is a diagram illustrating an exemplary representation according to an aspect of the subject matter described herein;

FIG. 134E is a diagram illustrating an exemplary representation according to an aspect of the subject matter described herein;

FIG. 134F is a diagram illustrating an exemplary representation according to an aspect of the subject matter described herein;

FIG. 134G is a diagram illustrating an exemplary representation according to an aspect of the subject matter described herein;

FIG. 134H is a diagram illustrating an exemplary representation according to an aspect of the subject matter described herein;

FIG. 134I is a diagram illustrating an exemplary representation according to an aspect of the subject matter described herein;

FIG. 134J is a diagram illustrating an exemplary representation according to an aspect of the subject matter described herein;

FIG. 134K is a diagram illustrating an exemplary representation according to an aspect of the subject matter described herein;

FIG. 134L is a diagram illustrating an exemplary representation according to an aspect of the subject matter described herein;

FIG. 134M is a diagram illustrating an exemplary representation according to an aspect of the subject matter described herein;

FIG. 134N is a diagram illustrating an exemplary representation according to an aspect of the subject matter described herein;

FIG. 134O is a diagram illustrating an exemplary representation according to an aspect of the subject matter described herein;

FIG. 134P is a diagram illustrating an exemplary representation according to an aspect of the subject matter described herein;

FIG. 134Q is a diagram illustrating an exemplary representation according to an aspect of the subject matter described herein;

FIG. 134R is a diagram illustrating an exemplary representation according to an aspect of the subject matter described herein;

FIG. 134S is a diagram illustrating an exemplary representation according to an aspect of the subject matter described herein;

FIG. 134T is a diagram illustrating an exemplary representation according to an aspect of the subject matter described herein;

FIG. 134U is a diagram illustrating an exemplary representation according to an aspect of the subject matter described herein;

FIG. 134V is a diagram illustrating an exemplary representation according to an aspect of the subject matter described herein;

FIG. 134W is a diagram illustrating an exemplary representation according to an aspect of the subject matter described herein;

FIG. 134X is a diagram illustrating an exemplary representation according to an aspect of the subject matter described herein;

Figure 135C:
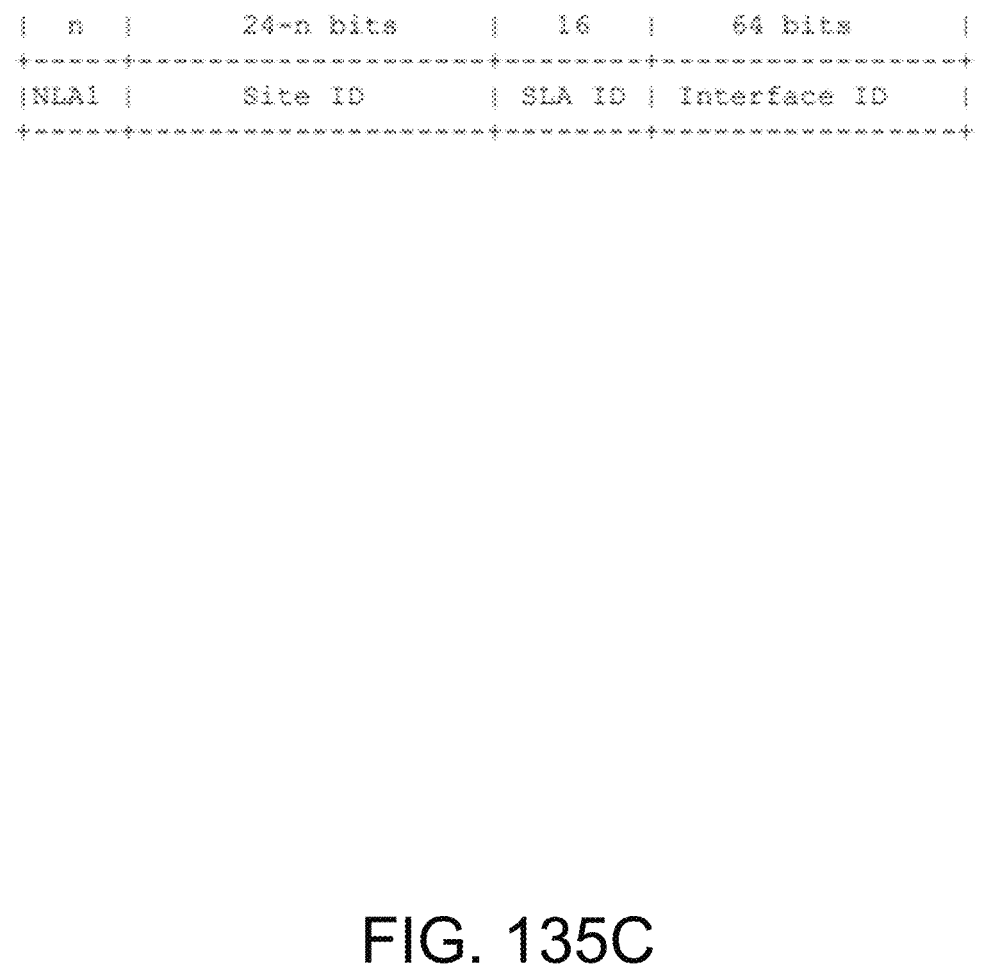

FIG. 135A is a diagram illustrating an exemplary representation according to an aspect of the subject matter described herein;

FIG. 135B is a diagram illustrating an exemplary representation according to an aspect of the subject matter described herein;

FIG. 135C is a diagram illustrating an exemplary representation according to an aspect of the subject matter described herein;

FIG. 135D is a diagram illustrating an exemplary representation according to an aspect of the subject matter described herein;

Figure 136:
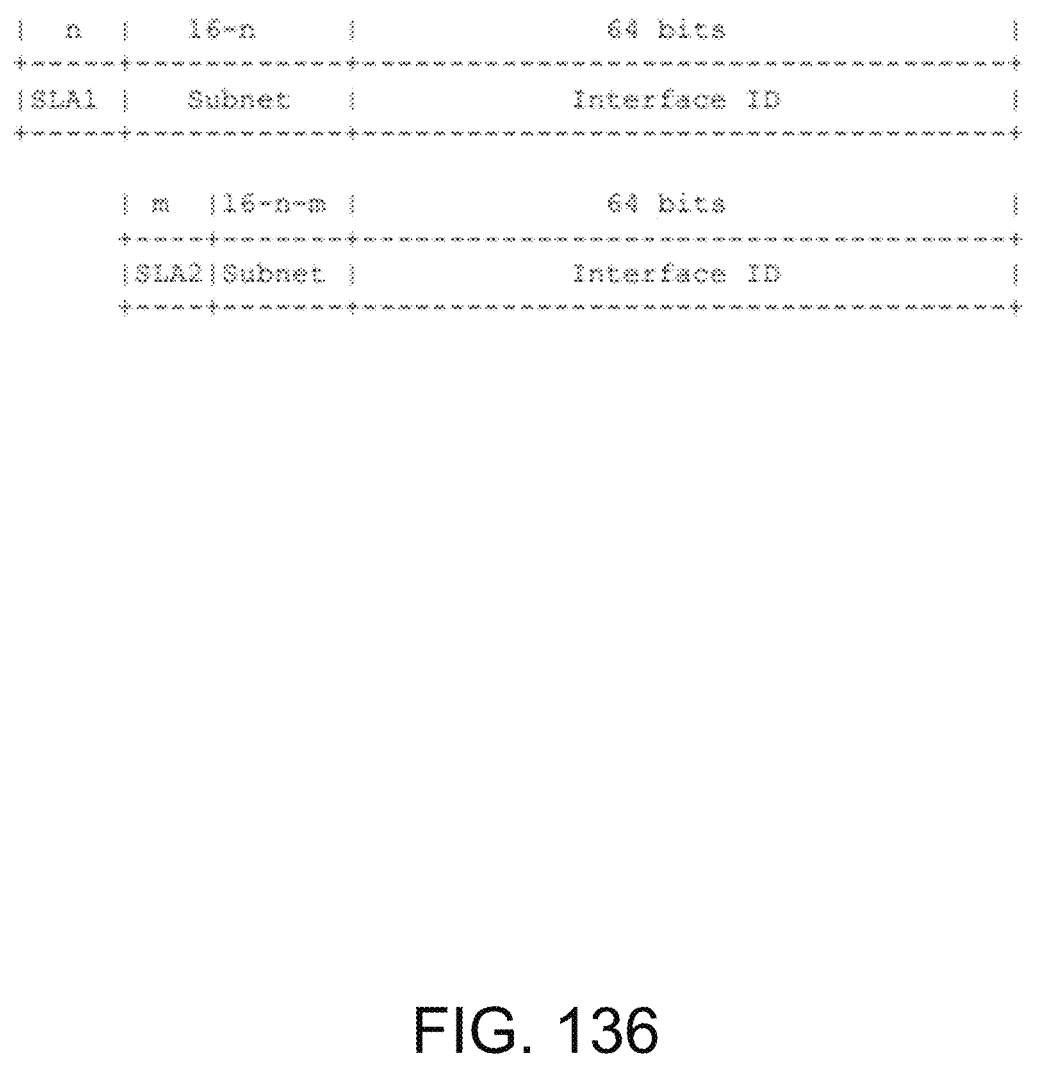

FIG. 136 is a diagram illustrating an exemplary representation according to an aspect of the subject matter described herein;

Figure 137A:
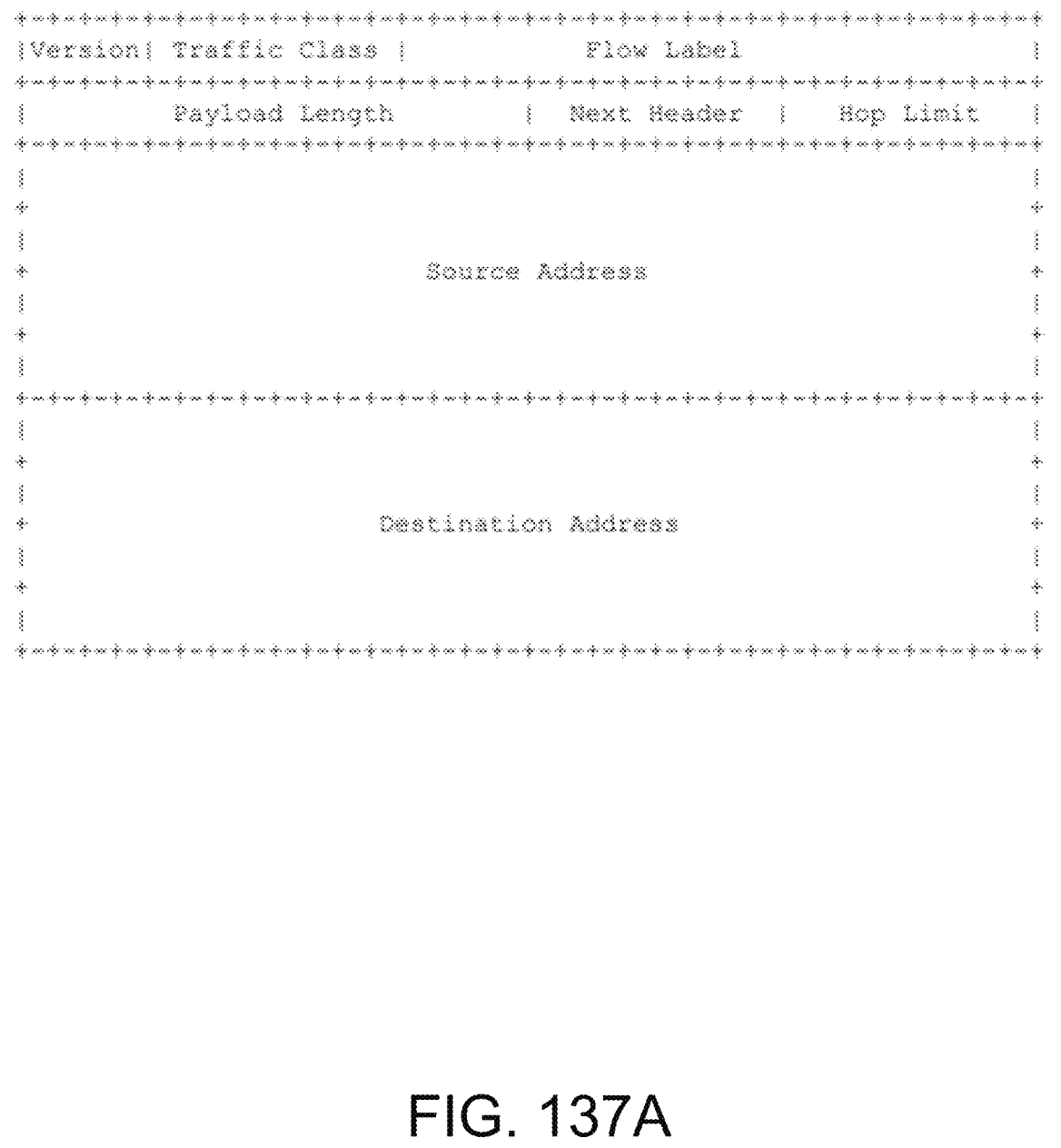
Figure 137E:
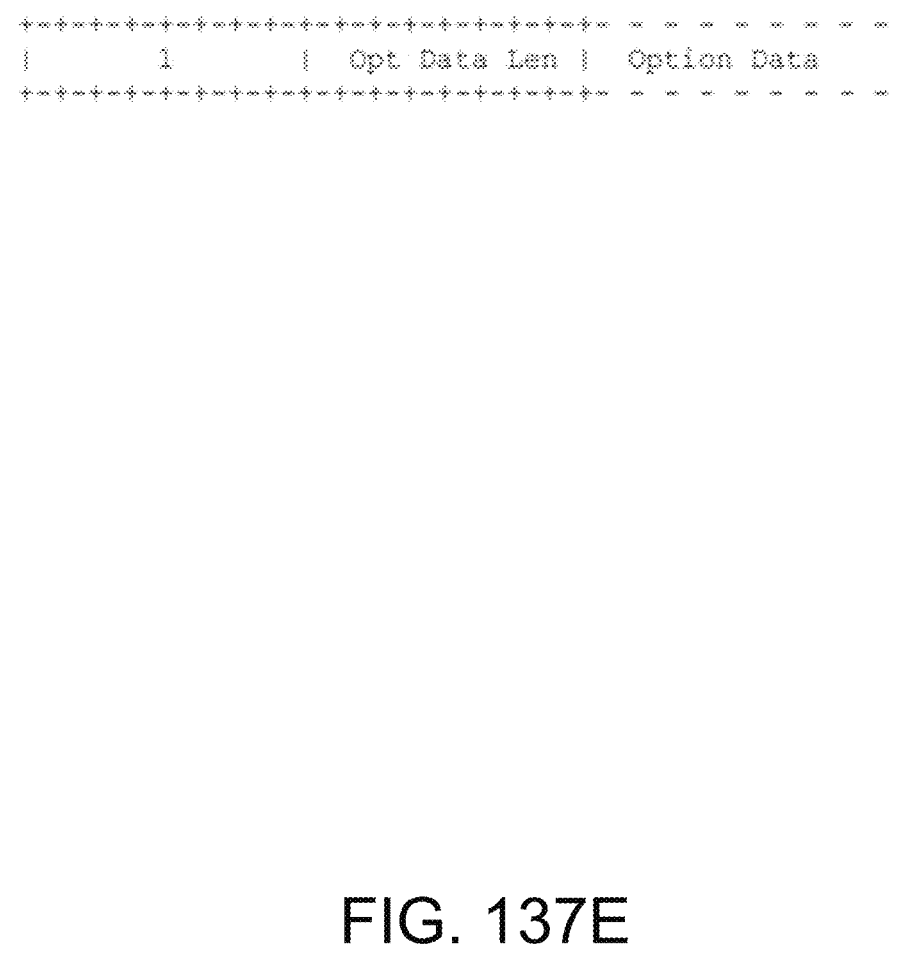
Figure 137F:
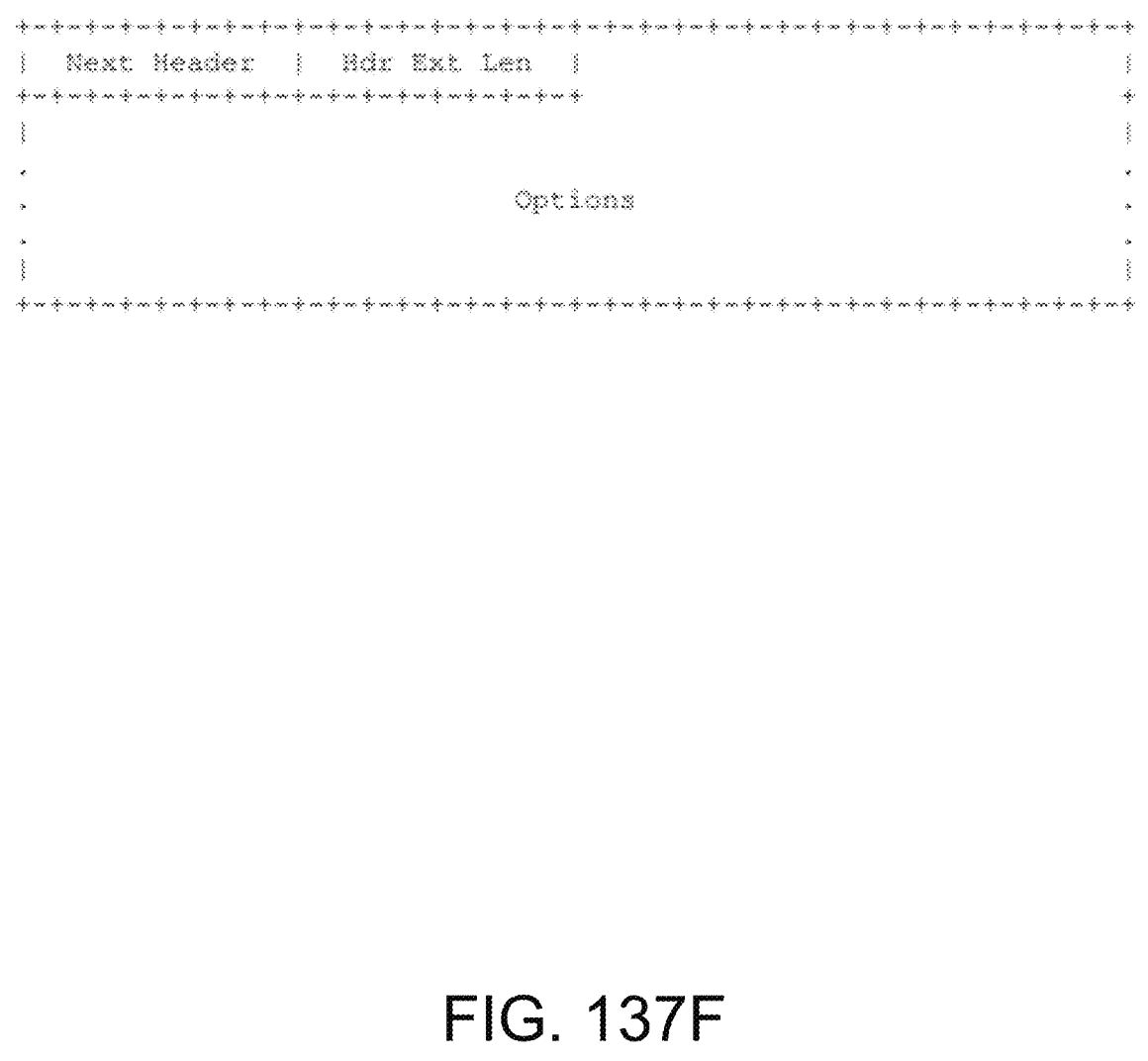
Figure 137G:
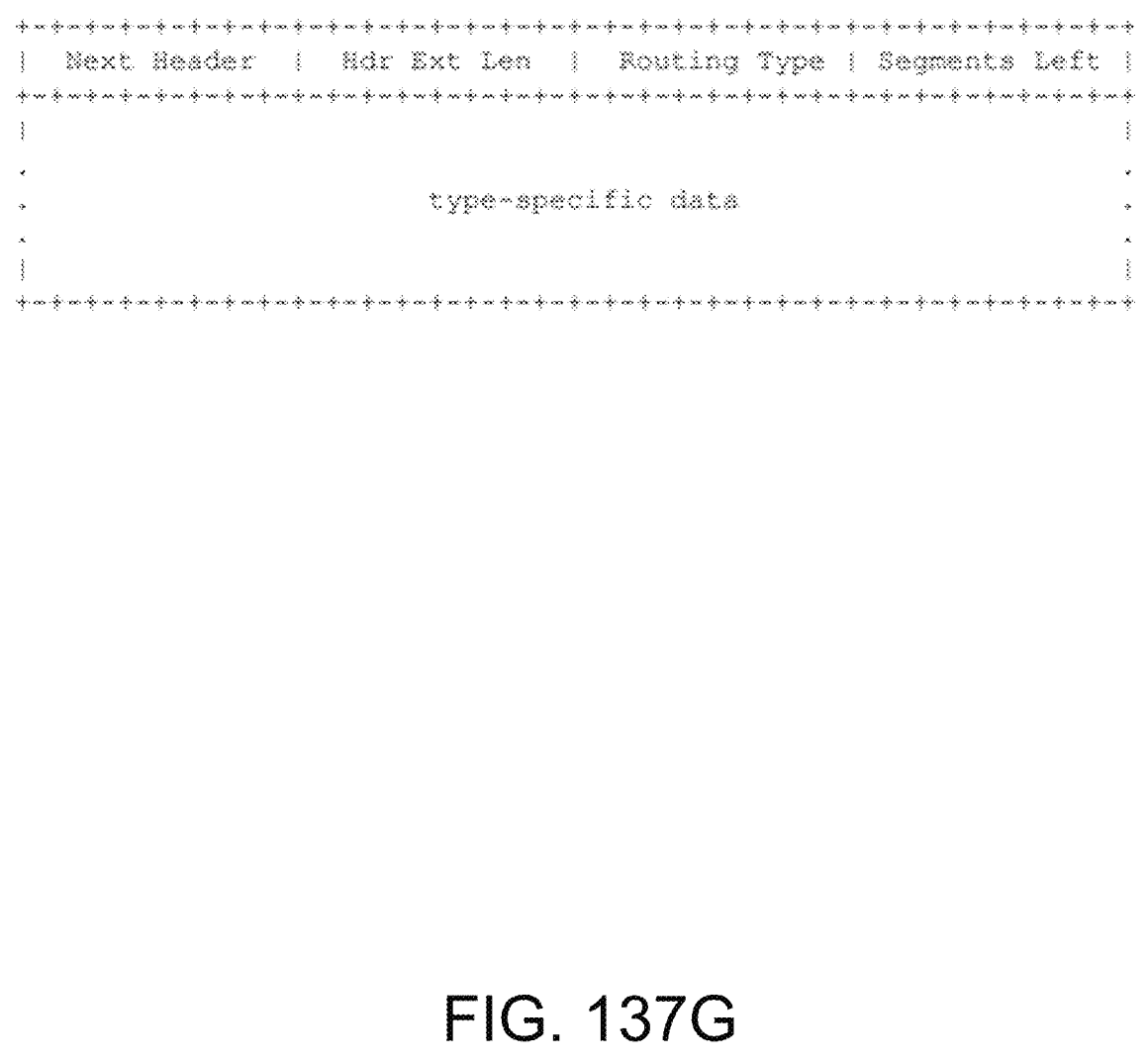
Figure 137J:
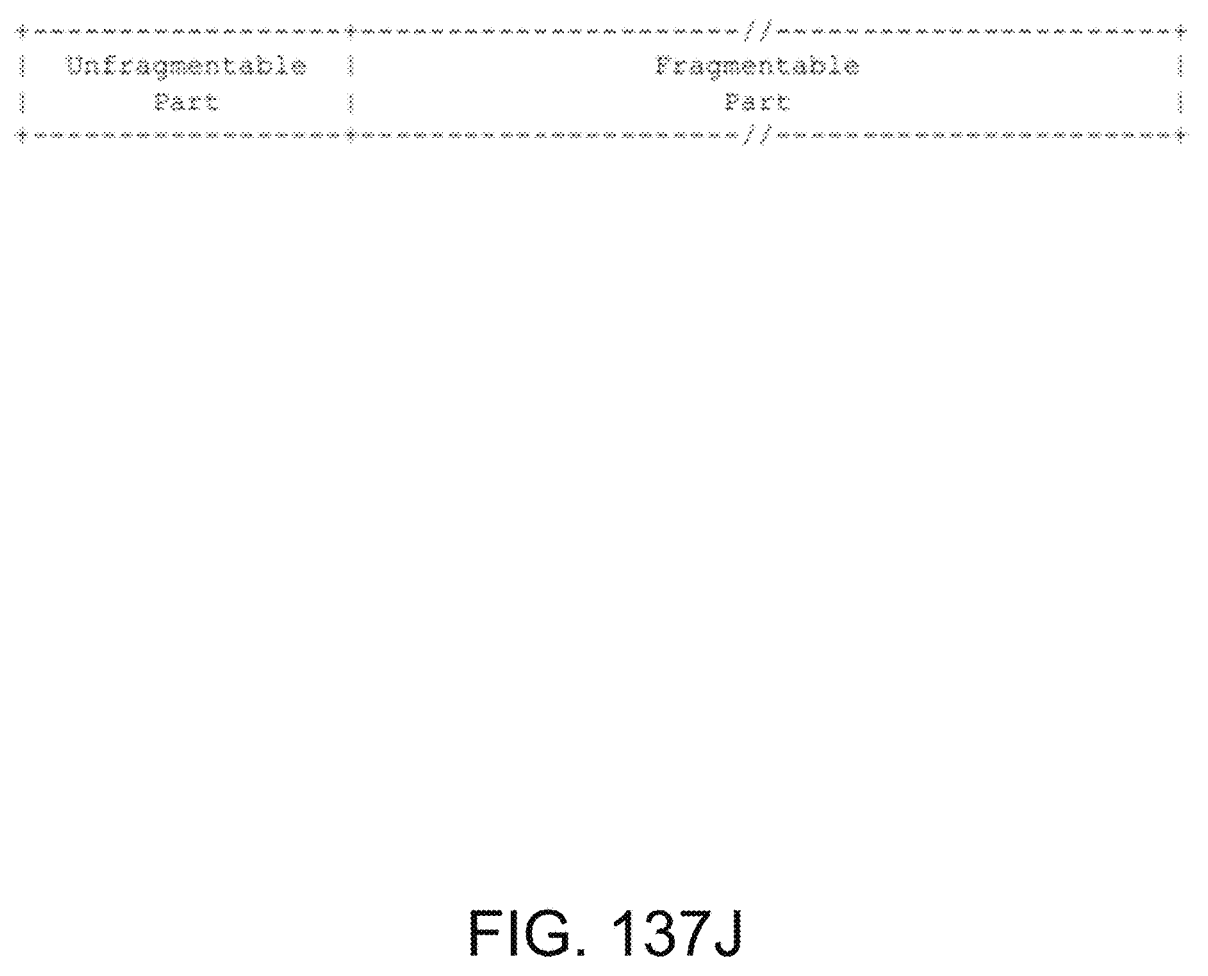
Figure 137K:
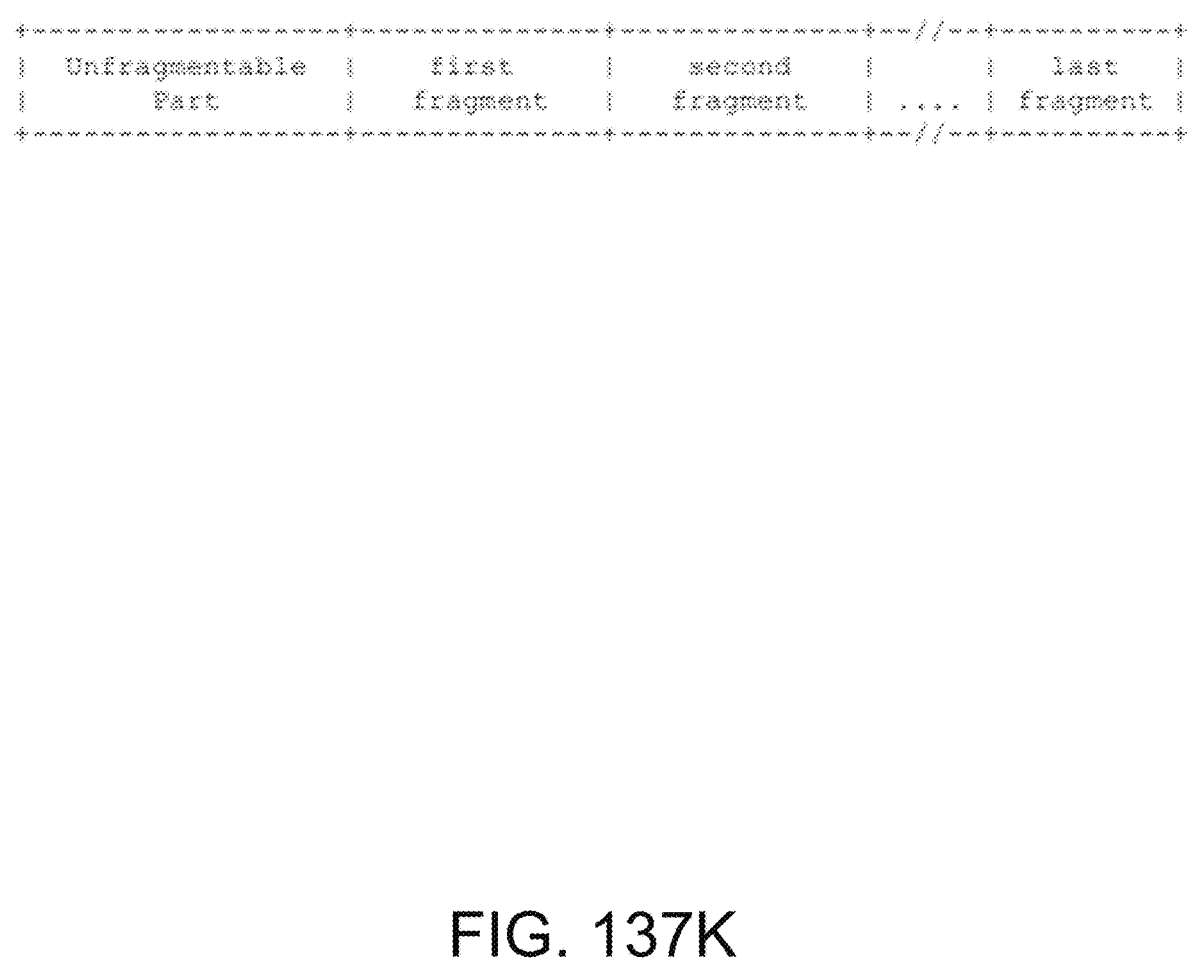
Figure 137M:
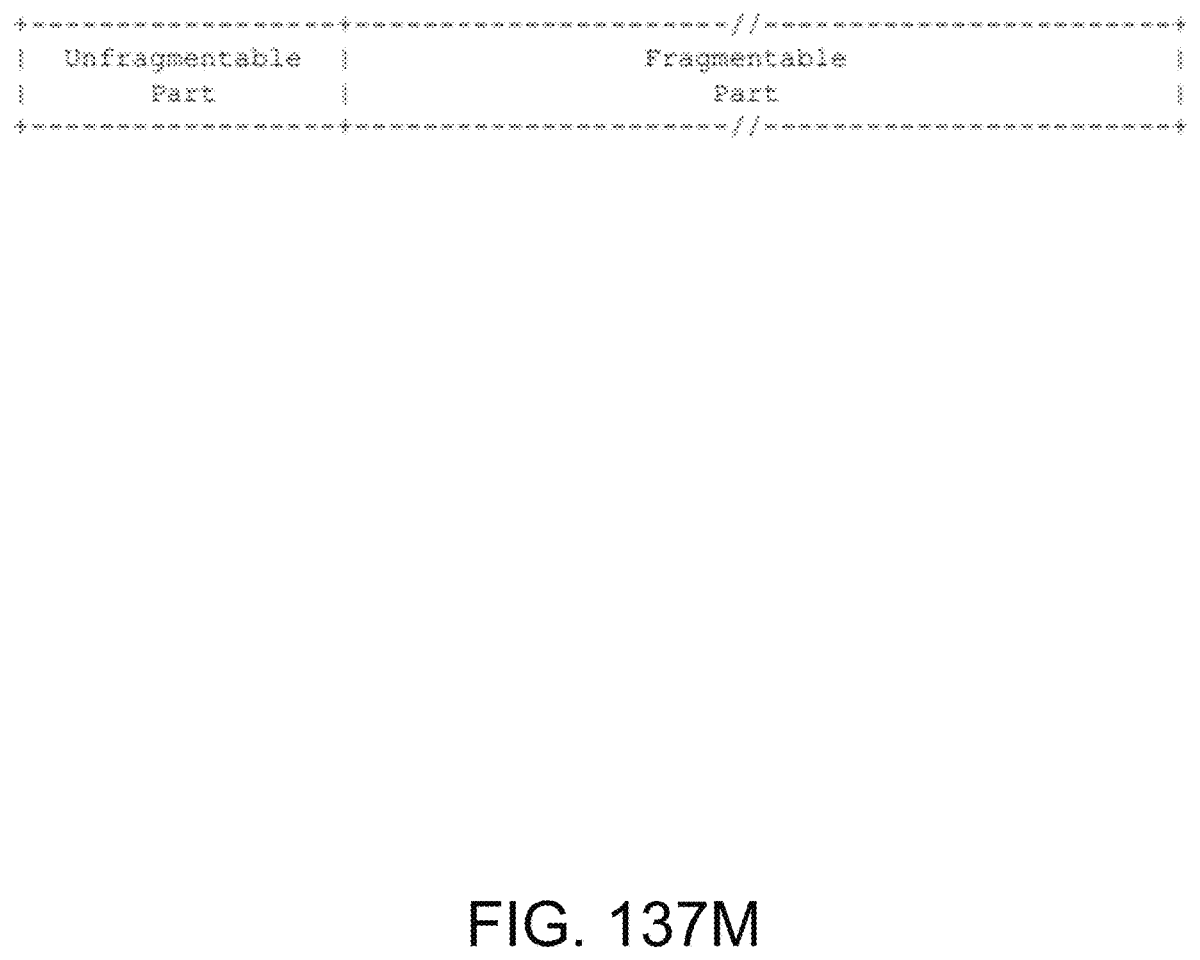
Figure 137O:
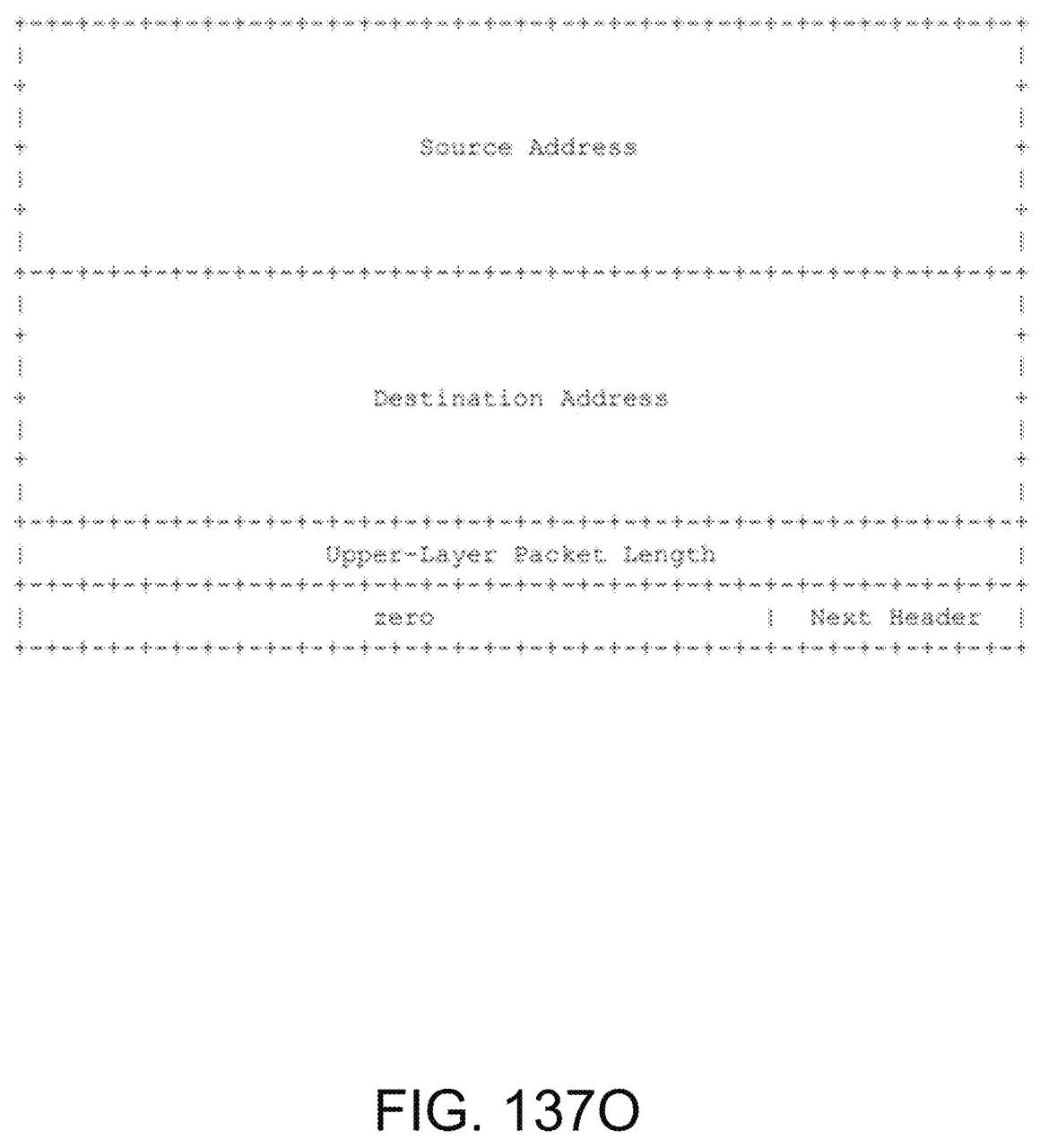
Figure 137P:
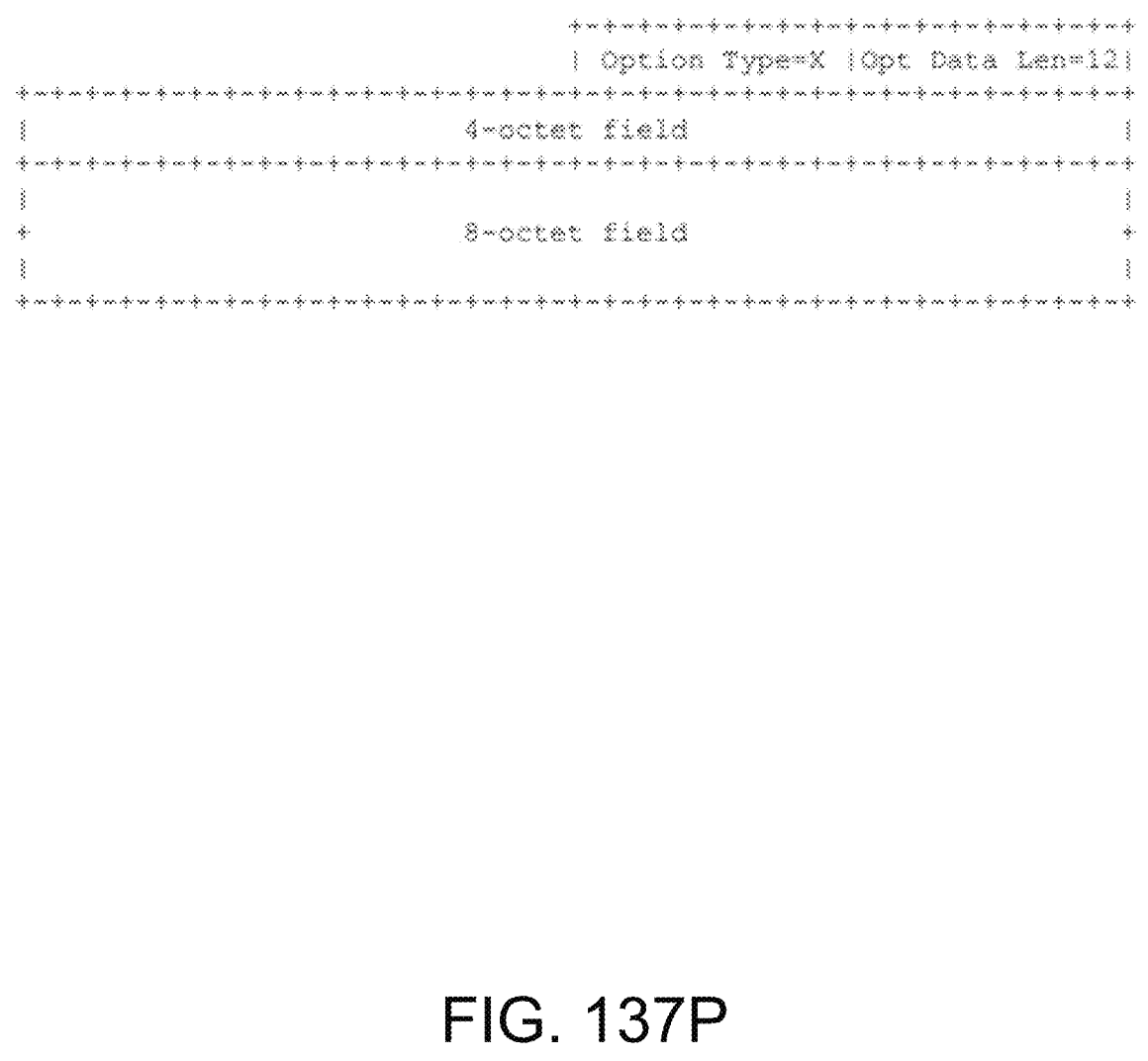
Figure 137Q:
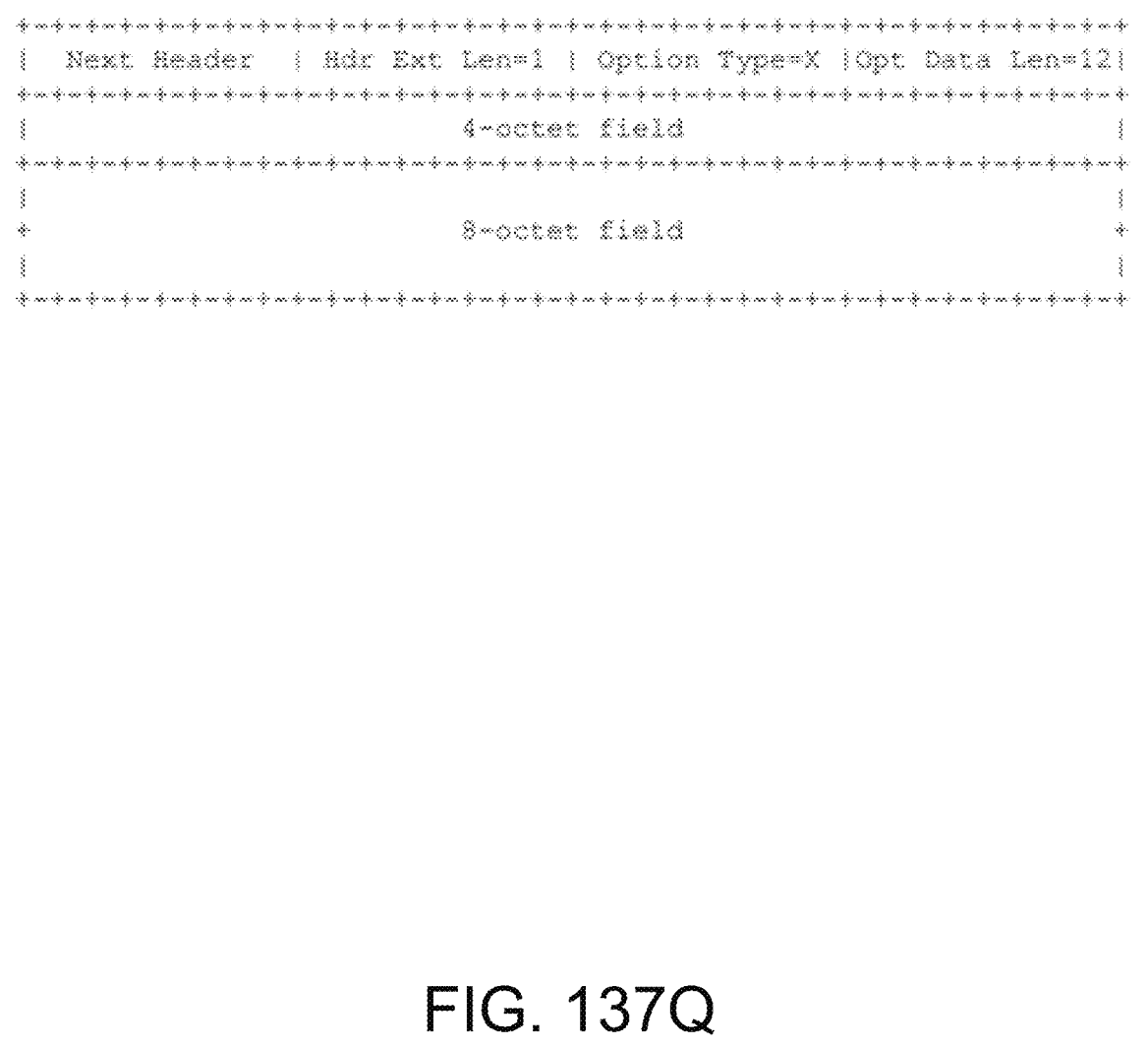

FIG. 137A is a diagram illustrating an exemplary representation according to an aspect of the subject matter described herein;

FIG. 137B is a diagram illustrating an exemplary representation according to an aspect of the subject matter described herein;

FIG. 137C is a diagram illustrating an exemplary representation according to an aspect of the subject matter described herein;

FIG. 137D is a diagram illustrating an exemplary representation according to an aspect of the subject matter described herein;

FIG. 137E is a diagram illustrating an exemplary representation according to an aspect of the subject matter described herein;

FIG. 137F is a diagram illustrating an exemplary representation according to an aspect of the subject matter described herein;

FIG. 137G is a diagram illustrating an exemplary representation according to an aspect of the subject matter described herein;

FIG. 137H is a diagram illustrating an exemplary representation according to an aspect of the subject matter described herein;

FIG. 137I is a diagram illustrating an exemplary representation according to an aspect of the subject matter described herein;

FIG. 137J is a diagram illustrating an exemplary representation according to an aspect of the subject matter described herein;

FIG. 137K is a diagram illustrating an exemplary representation according to an aspect of the subject matter described herein;

FIG. 137L is a diagram illustrating an exemplary representation according to an aspect of the subject matter described herein;

FIG. 137M is a diagram illustrating an exemplary representation according to an aspect of the subject matter described herein;

FIG. 137N is a diagram illustrating an exemplary representation according to an aspect of the subject matter described herein;

FIG. 137O is a diagram illustrating an exemplary representation according to an aspect of the subject matter described herein;

FIG. 137P is a diagram illustrating an exemplary representation according to an aspect of the subject matter described herein;

FIG. 137Q is a diagram illustrating an exemplary representation according to an aspect of the subject matter described herein;

FIG. 137R is a diagram illustrating an exemplary representation according to an aspect of the subject matter described herein;

FIG. 137S is a diagram illustrating an exemplary representation according to an aspect of the subject matter described herein;

FIG. 137T is a diagram illustrating an exemplary representation according to an aspect of the subject matter described herein;

Figure 138B:
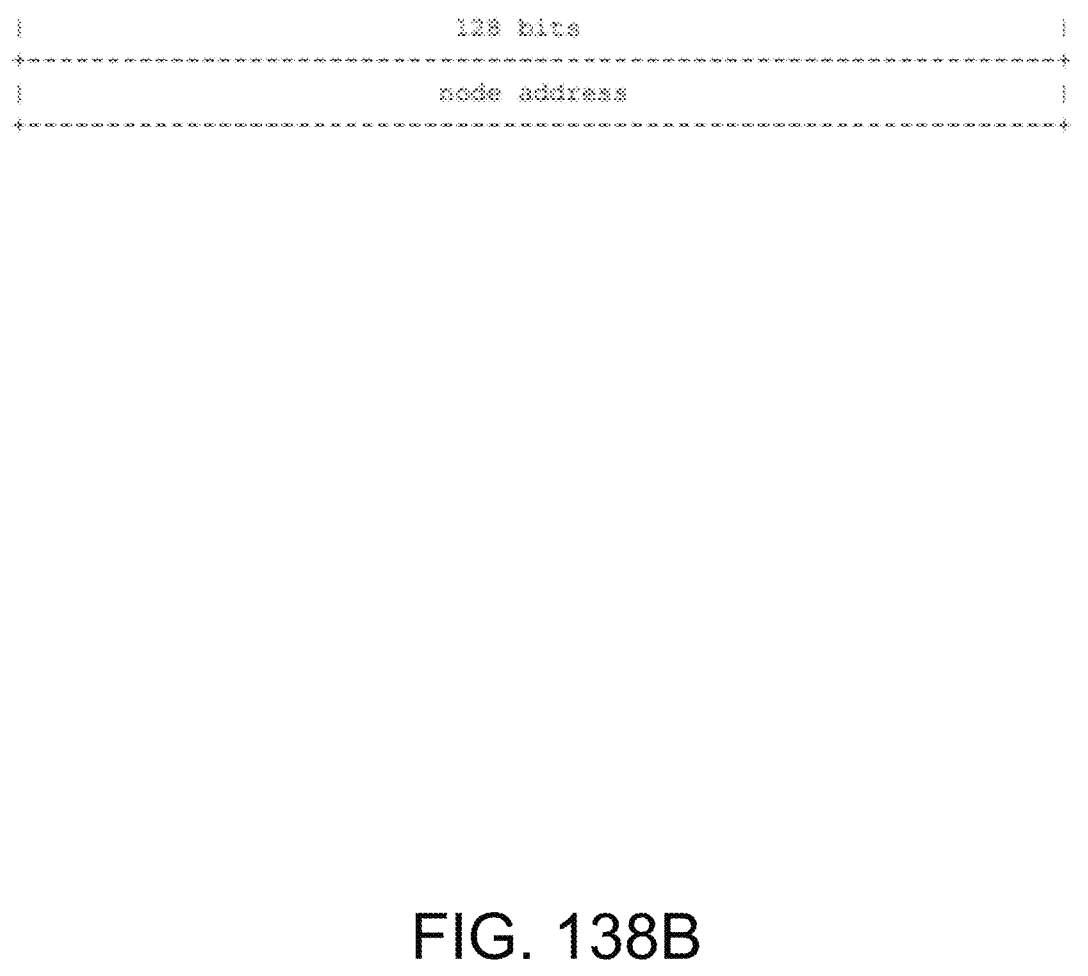
Figure 138C:
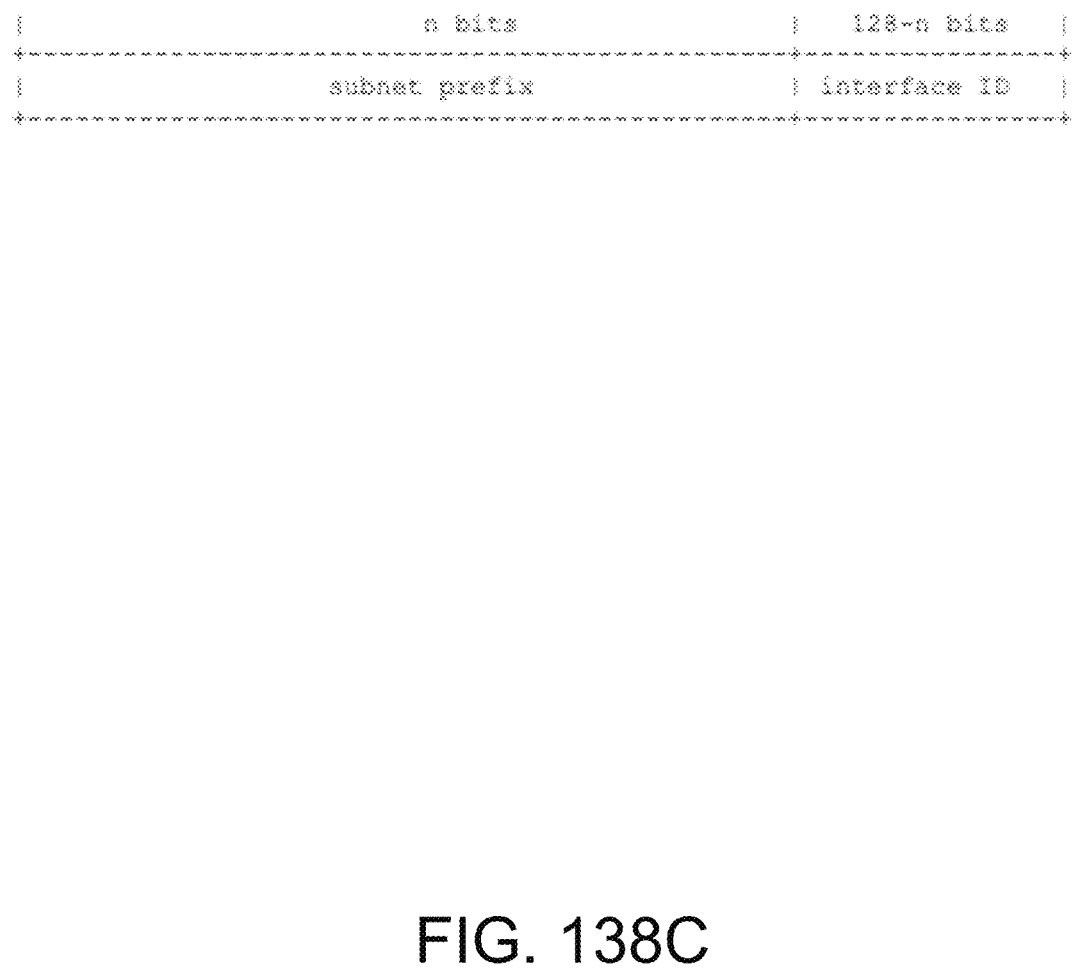
Figure 138E:
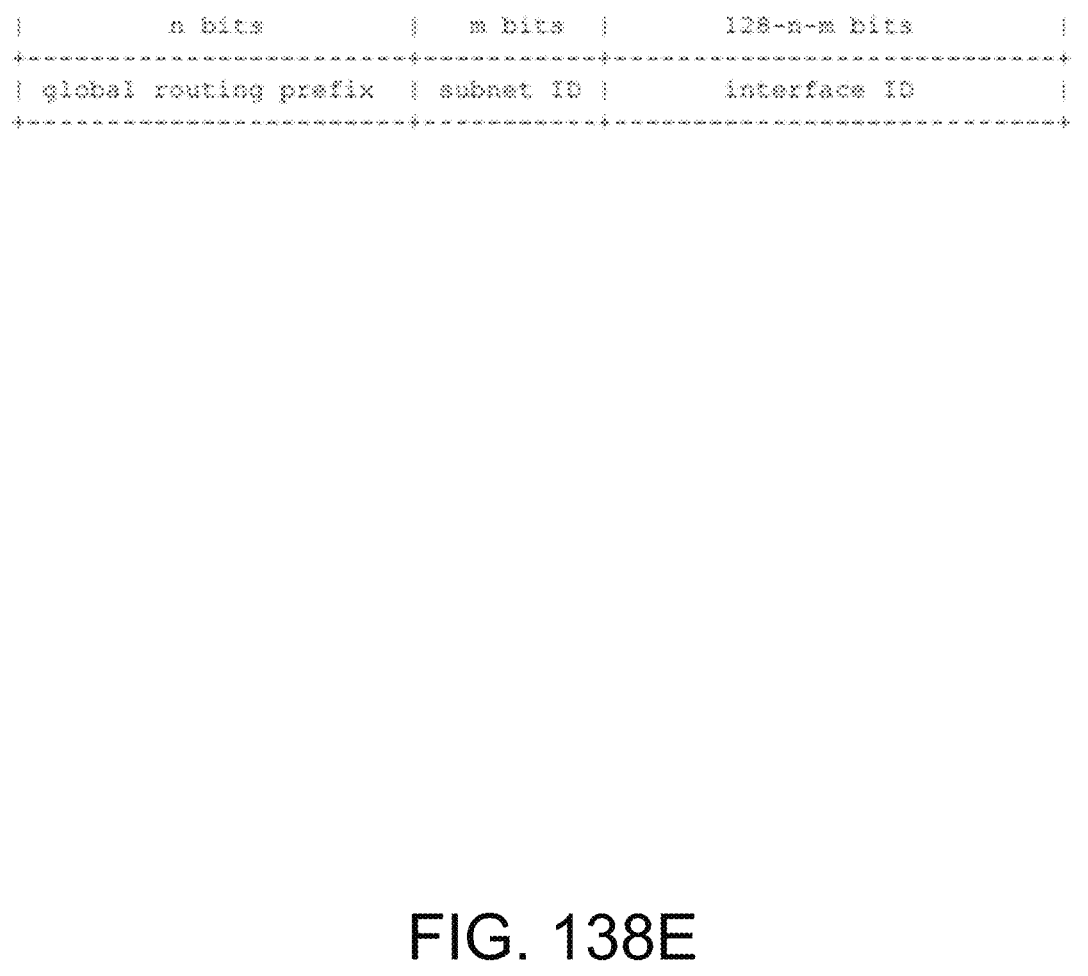
Figure 138F:
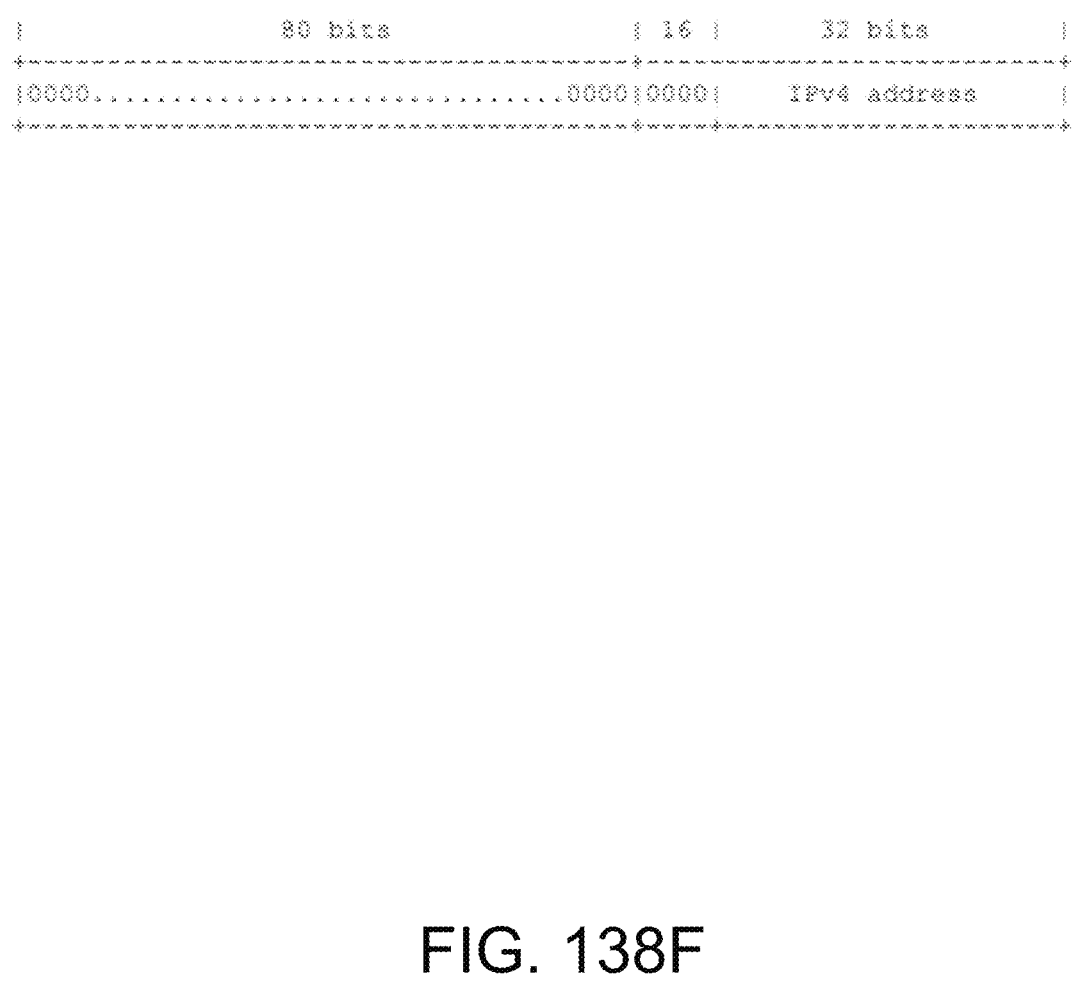
Figure 138G:
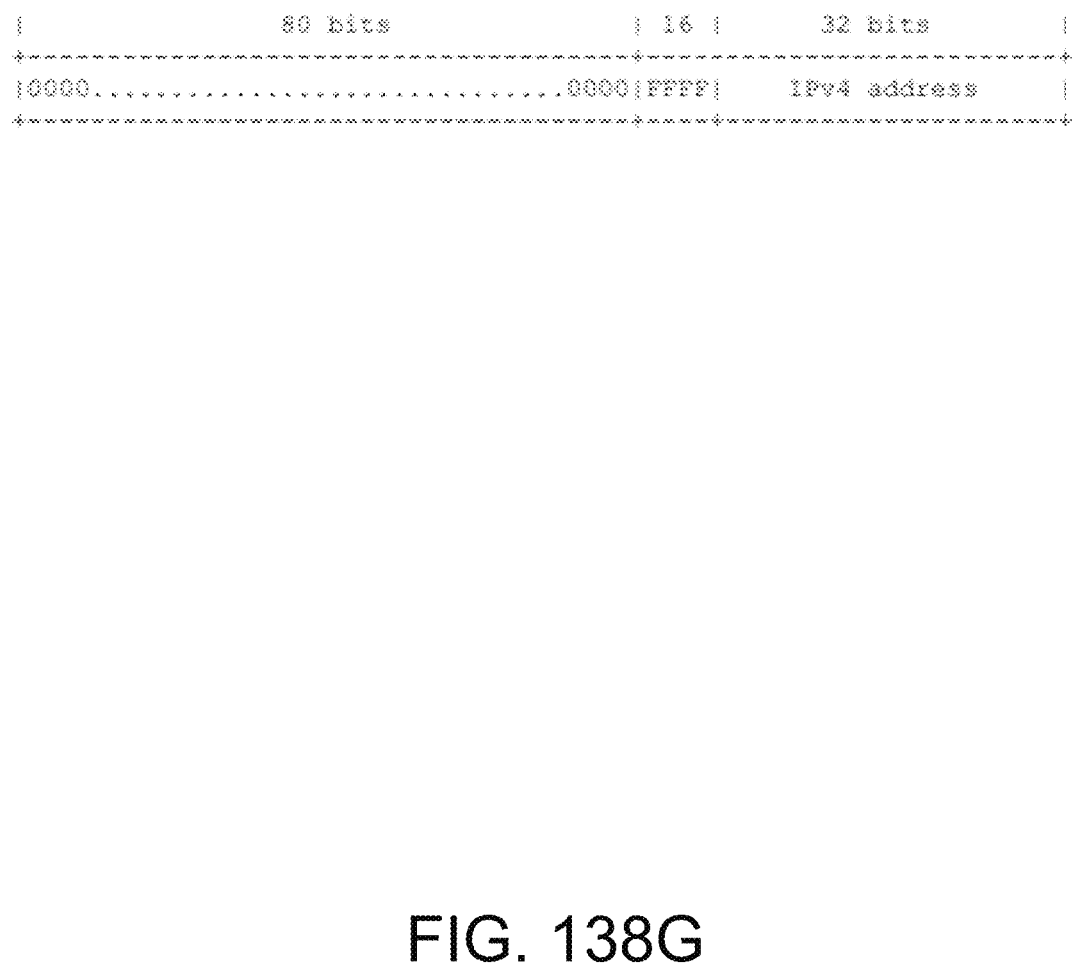
Figure 138H:
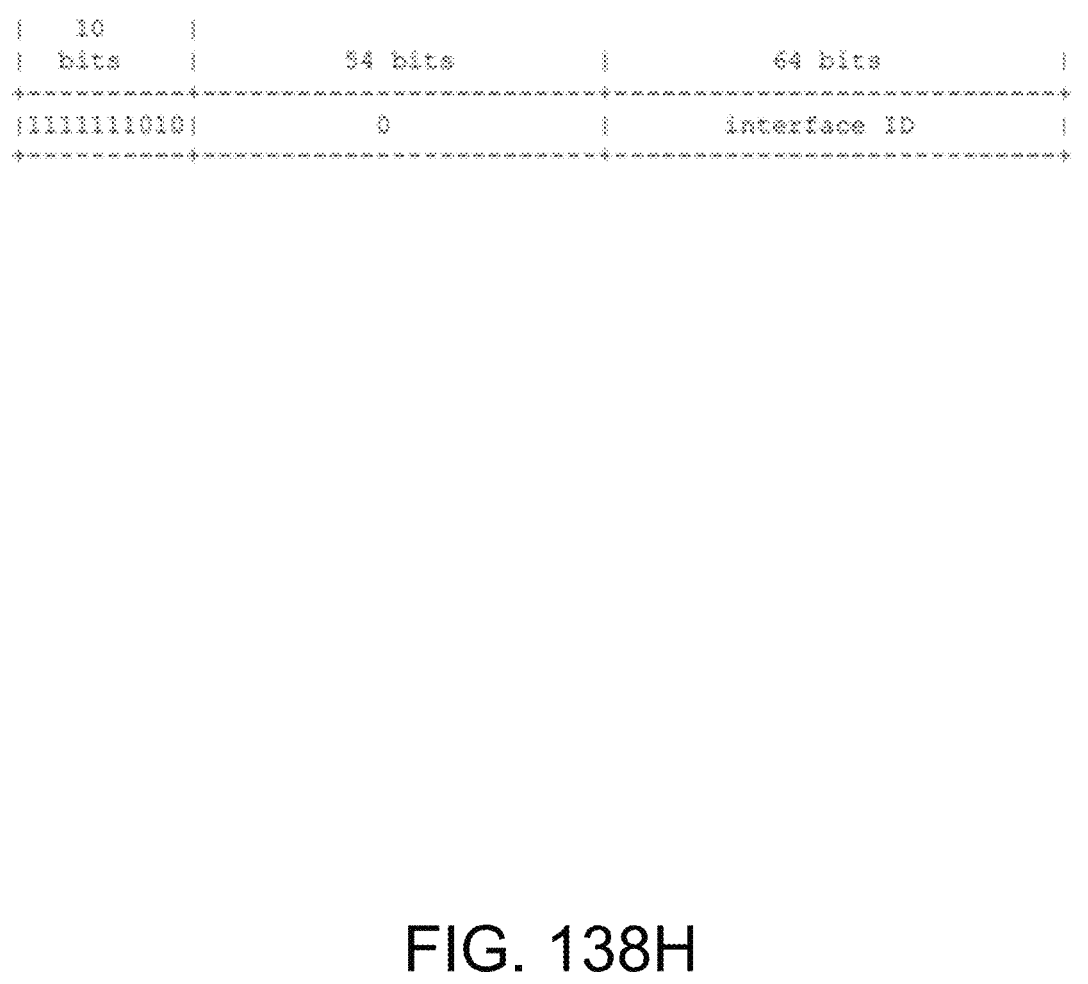
Figure 138I:
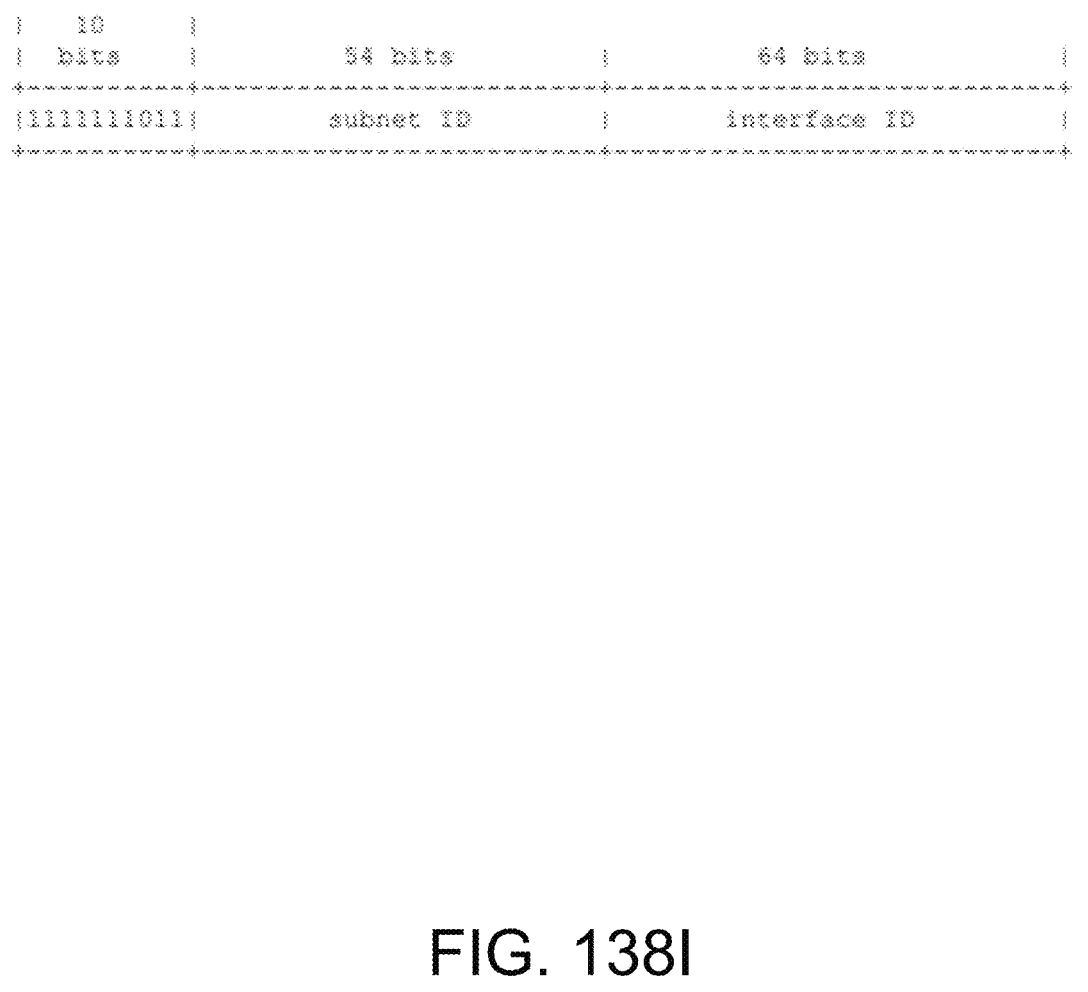
Figure 138J:
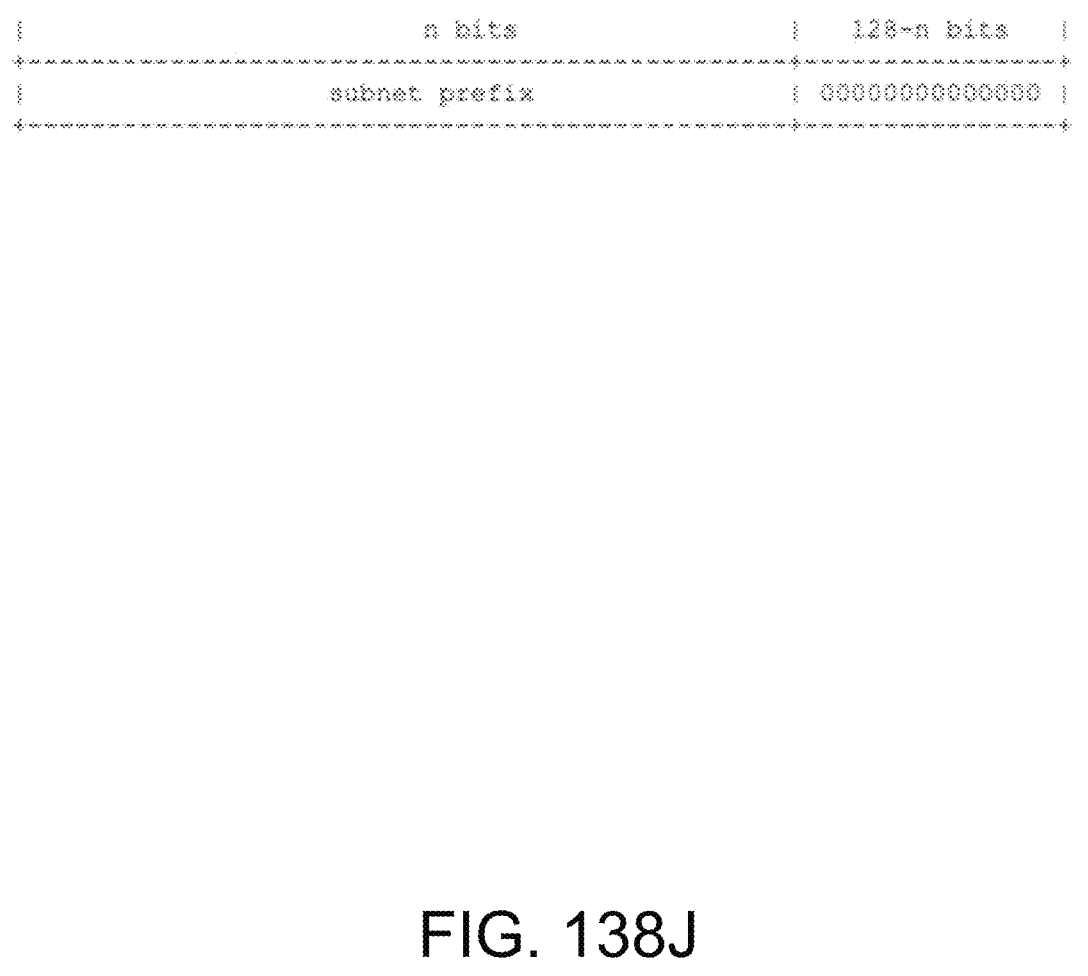
Figure 138M:
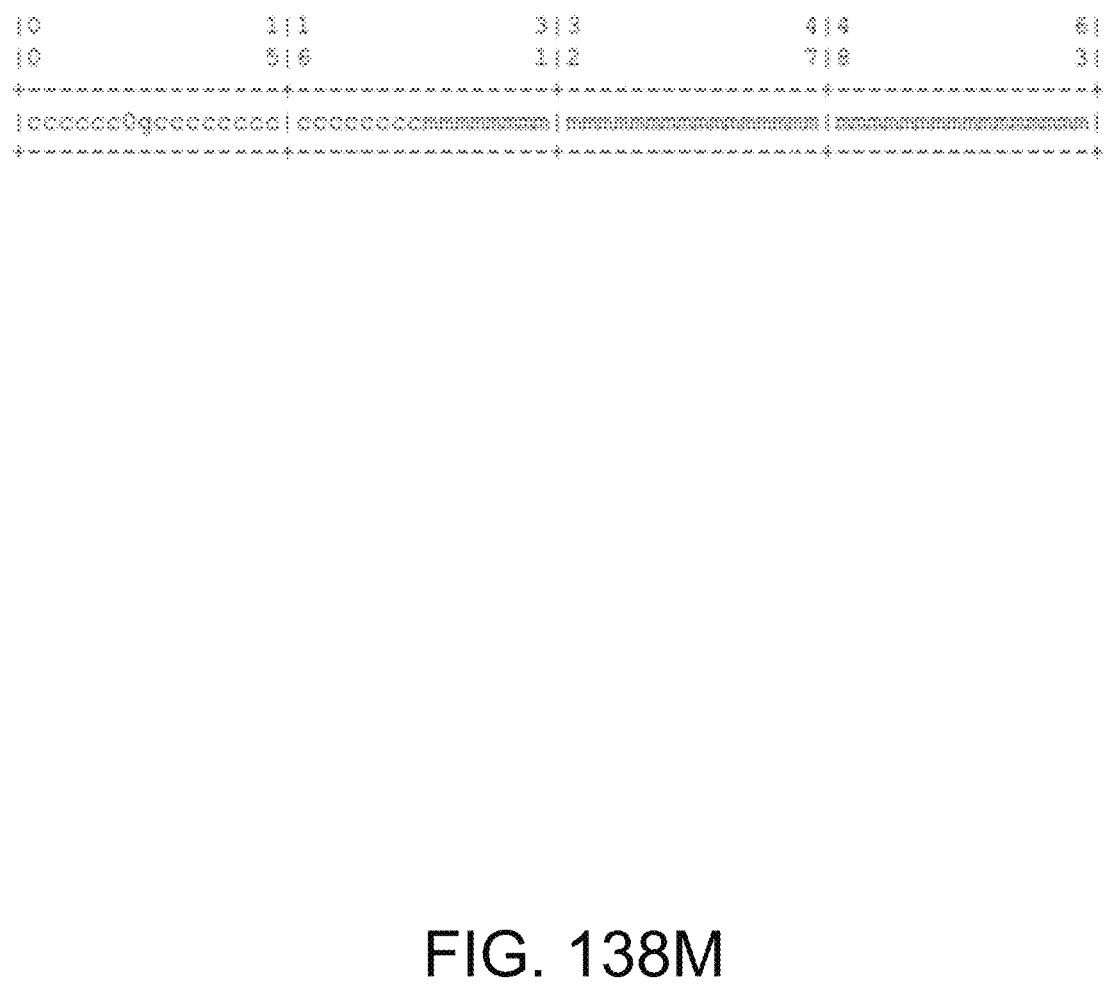
Figure 138O:
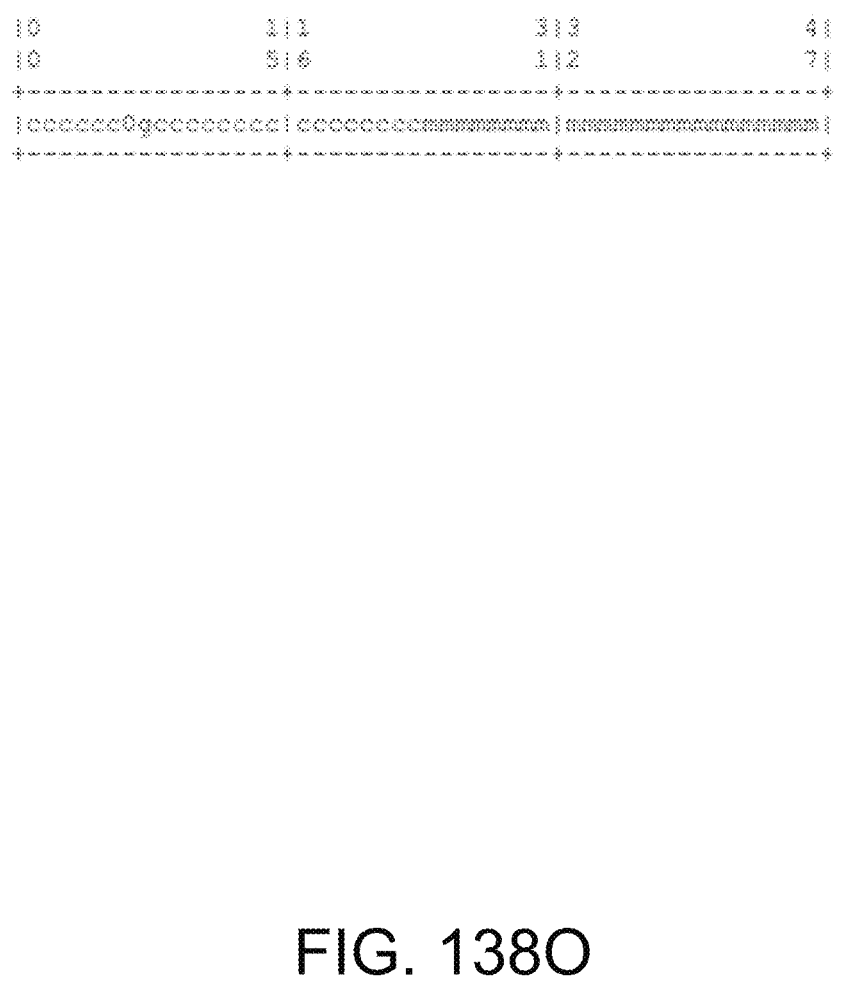
Figure 138P:
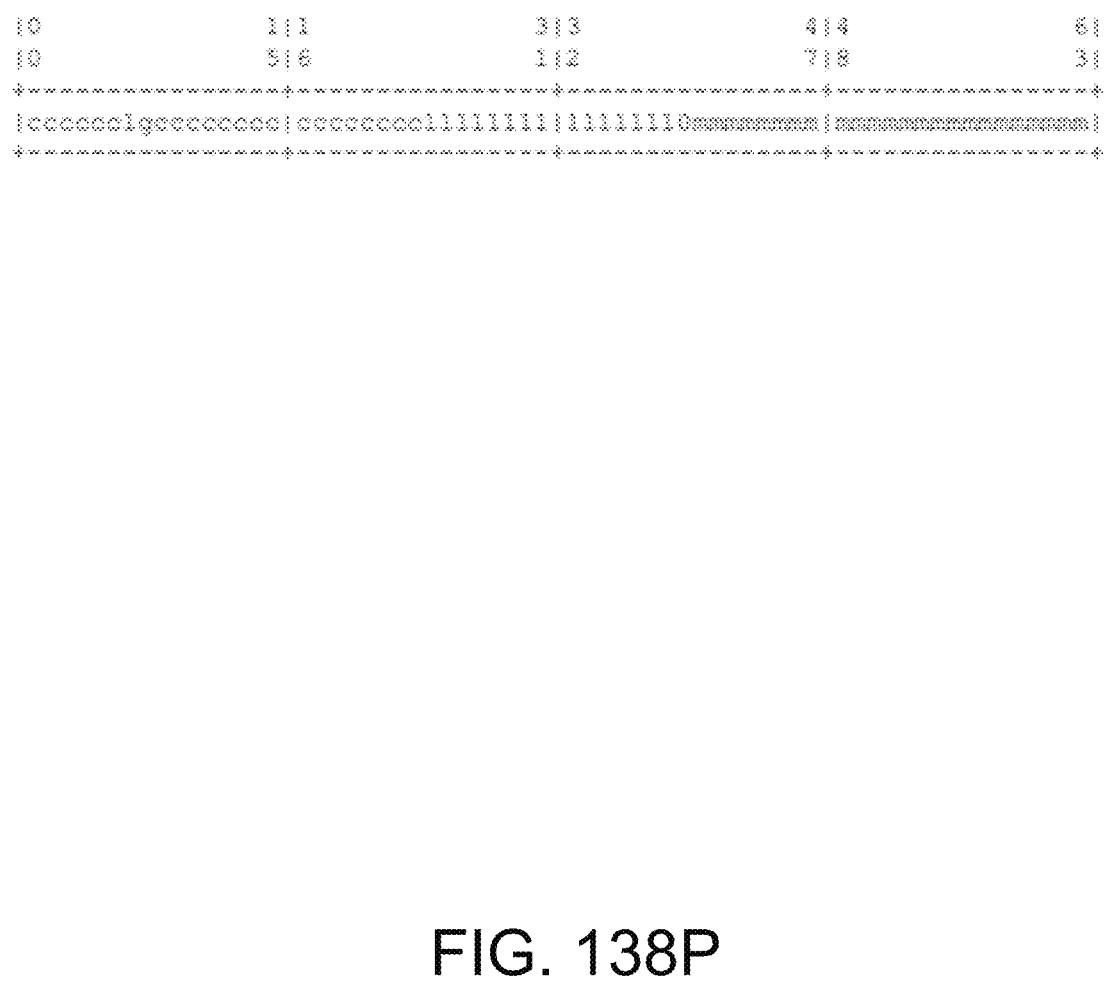
Figure 138Q:
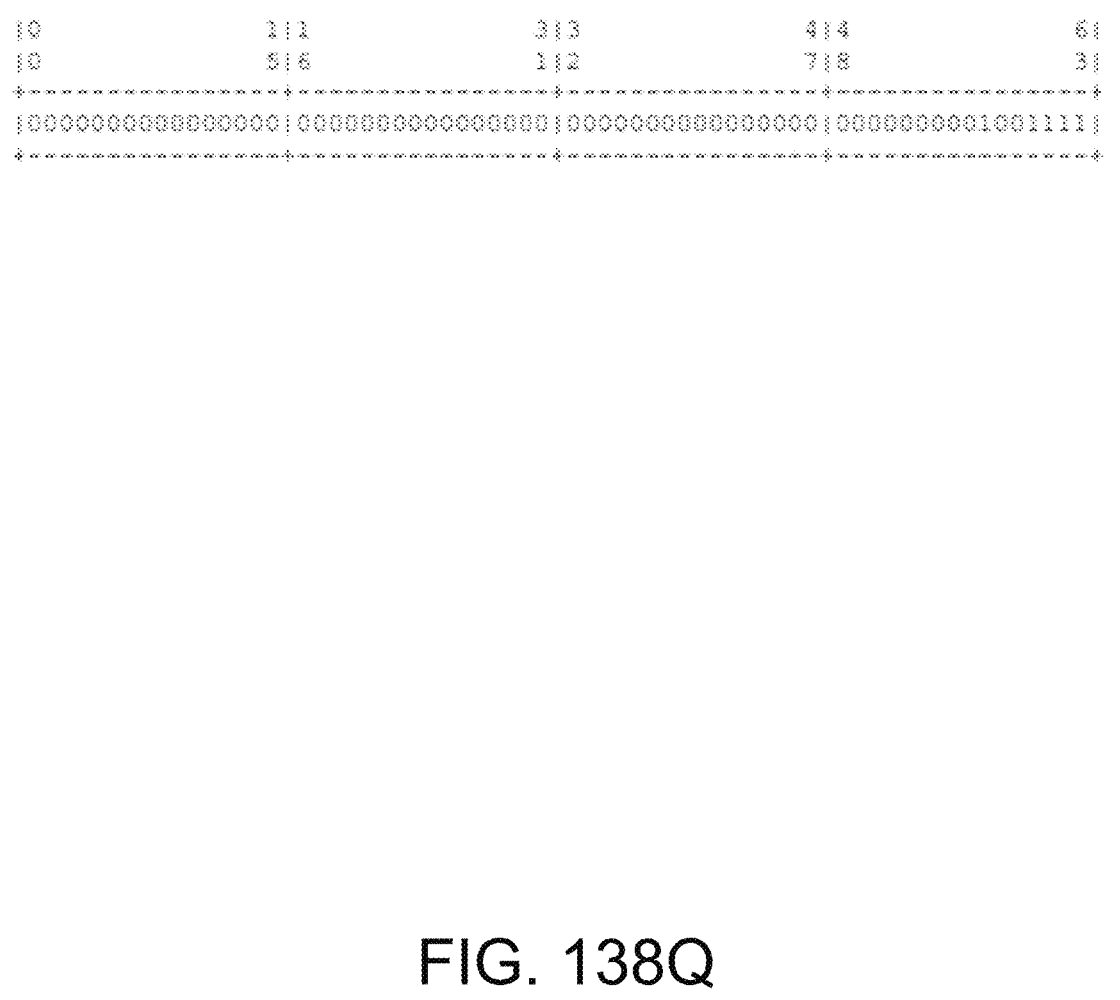

FIG. 138A is a diagram illustrating an exemplary representation according to an aspect of the subject matter described herein;

FIG. 138B is a diagram illustrating an exemplary representation according to an aspect of the subject matter described herein;

FIG. 138C is a diagram illustrating an exemplary representation according to an aspect of the subject matter described herein;

FIG. 138D is a diagram illustrating an exemplary representation according to an aspect of the subject matter described herein;

FIG. 138E is a diagram illustrating an exemplary representation according to an aspect of the subject matter described herein;

FIG. 138F is a diagram illustrating an exemplary representation according to an aspect of the subject matter described herein;

FIG. 138G is a diagram illustrating an exemplary representation according to an aspect of the subject matter described herein;

FIG. 138H is a diagram illustrating an exemplary representation according to an aspect of the subject matter described herein;

FIG. 138I is a diagram illustrating an exemplary representation according to an aspect of the subject matter described herein;

FIG. 138J is a diagram illustrating an exemplary representation according to an aspect of the subject matter described herein;

FIG. 138K is a diagram illustrating an exemplary representation according to an aspect of the subject matter described herein;

FIG. 138L is a diagram illustrating an exemplary representation according to an aspect of the subject matter described herein;

FIG. 138M is a diagram illustrating an exemplary representation according to an aspect of the subject matter described herein;

FIG. 138N is a diagram illustrating an exemplary representation according to an aspect of the subject matter described herein;

FIG. 138O is a diagram illustrating an exemplary representation according to an aspect of the subject matter described herein;

FIG. 138P is a diagram illustrating an exemplary representation according to an aspect of the subject matter described herein;

FIG. 138Q is a diagram illustrating an exemplary representation according to an aspect of the subject matter described herein;

FIG. 139A is a diagram illustrating an exemplary representation according to an aspect of the subject matter described herein;

FIG. 139B is a diagram illustrating an exemplary representation according to an aspect of the subject matter described herein;

FIG. 139C is a diagram illustrating an exemplary representation according to an aspect of the subject matter described herein; and FIG. 139D is a diagram illustrating an exemplary representation according to an aspect of the subject matter described herein.

DETAILED DESCRIPTION

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

Definitions

Figure 1:
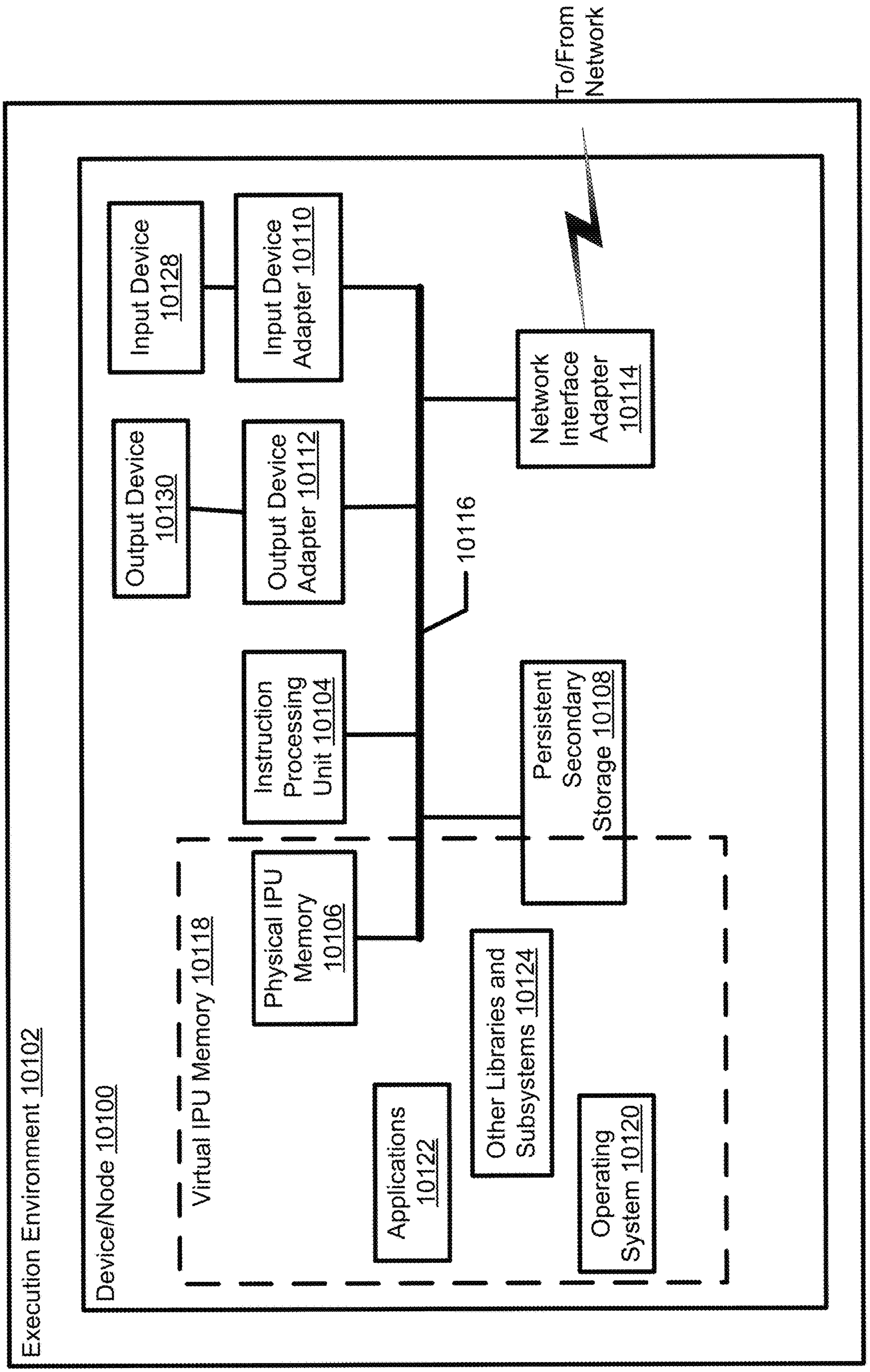
FIG. 1 is a block diagram illustrating an exemplary hardware device included in and/or otherwise providing an execution environment in which the subject matter may be implemented.

An "execution environment", as used herein, is an arrangement of hardware and, in some aspects, software that may be further modified, transformed, and/or otherwise configured to include and/or otherwise host an arrangement of components to perform a method of the subject matter described herein. An execution environment includes a processor to execute an instruction included in at least one component of such an arrangement. An execution environment includes and/or is otherwise provided by one or more devices. The execution environment is said to be the execution environment "of" the device and/or devices. Exemplary devices included in and/or otherwise providing suitable execution environments that may be adapted, programmed, and/or otherwise modified according to the subject matter include a workstation, a desktop computer, a laptop or notebook computer, a server, a handheld computer, a mobile telephone or other portable telecommunication device, a media playing device, a gaming system, a tablet computer, a portable electronic device, a handheld electronic device, a multiprocessor device, a distributed system, a consumer electronic device, a router, a network server, or any other type and/or form of computing, telecommunications, network, and/or media device that is suitable to perform the subject matter described herein. Those skilled in the art will understand that the components illustrated in FIG. 1 are exemplary and may vary by particular execution environment. An execution environment may be and/or may include a virtual execution environment including software components operating in a host execution environment.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs).

The terms "network node" and "node" in this document both refer to a device having a network interface component for operatively coupling the device to a network. Further, the terms "device" and "node" used herein refer to one or more devices and nodes, respectively, providing and/or otherwise included in an execution environment unless clearly indicated otherwise.

A computer program may include one or more software components. As used herein, the term "software component" refers to any data representation that may be and/or may be translated into a set of machine code instructions and may optionally include associated data. Software component representations other than machine code include object code, byte code, and source code. Object code includes a set of instructions and/or data elements that either are prepared to link prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code. A software component may include one or more components. As used herein, the terms "application", and "service" may be realized in one or more software components and/or in one or more hardware components.

Software components typically include instructions executed by a processor in a computing context referred to as a "process". A process may include one or more "threads". A "thread" includes a sequence of instructions executed by a processor in a computing sub-context of a process. The terms "thread" and "process" may be used interchangeably herein when a process includes only one thread.

As used herein, the term "network protocol" refers to a set of rules, conventions, and/or schemas that govern how nodes exchange information over a network. The set may define, for example, a convention and/or a data structure. The term "network path" as used herein refers to a sequence of nodes in a network that are communicatively coupled to transmit data in one or more data units of a network protocol between a pair of nodes in the network.

A "data unit", as the term is used herein, is an entity specified according to a network protocol to transmit data between a pair of nodes in a network path to send the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node and a payload portion to include a representation of data to be delivered to the identified destination node. Various address types are specified defining a vocabulary for one or more address portions of an IP data unit. The terms "data unit", "frame", "data packet", and "packet" are used interchangeably herein. One or more data units of a first network protocol may transmit a "message" of a second network protocol. For example, one or more data units of the IP protocol may include a TCP message. In another example, one or more TCP data units may transmit a HTTP message. A message may be empty.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint that may be represented in a data unit of the network protocol. For example, 192.168.1.1 is an IP protocol address represented in a human readable format that may be represented in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

Since a protocol endpoint is included in a node and is accessible via a network via a network interface, a protocol address identifies a node and identifies a network interface of the node. A network interface may include one or more NICs operatively coupled to a network.

A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

The term "hop" as used herein refers to a pair of consecutive nodes in a network path to transmit, via a network protocol, data sent from a source node to a destination node. A "hop path" is thus a sequence of hops in a network that respectively include a sequence of pairs of consecutive nodes included in transmitting data from a first path end node of the network path to a second path end node of the network path.

The term "path-based protocol address" as used herein refers to a protocol address for a network protocol that includes one or more path segment identifiers that identify one or more respective portions of a network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of network interface identifiers that identify a sequence of network interfaces in a network path. A "NIC-based protocol address" is a type of network-interface-based protocol address that includes a plurality of identifiers that identify a sequence of network interface components. A "hop-based protocol address" is a type path-based protocol address since a hop is a type of network path.

Given the above definitions, note that the terms "network path" and "hop" may be defined in terms of network interfaces. A "network path" and a "hop path" include a sequence of network interfaces in a network that are included in transmitting data between a pair of path end nodes in the network. A "hop" refers to at least part of a network path that includes a pair of consecutive network interfaces in a sequence of network interfaces in a network path. A "network path" is thus a sequence of hops in a network that respectively includes a sequence of pairs of consecutive network interfaces included in transmitting data from a first path end node of the network path to a second path end node of the network path.

The term "network topology" or "topology", for short, as used herein refers to a representation of protocol endpoints and/or nodes in a network, and representations of hops representing communicative couplings between and/or among the protocol endpoints and/or nodes in the network. A network may have different network topologies with respect to different network protocols. A network topology may represent physical communicative couplings between nodes in the network. A network topology may represent logical couplings between protocol endpoints and/or nodes of a particular network protocol or a particular type of network protocol.

The domain name system (DNS) of the Internet operates based on an application layer protocol defined by the DNS. The nodes in the DNS are communicatively coupled via the DNS protocol and may be represented by a logical network topology. A DNS system includes nodes connected via the DNS protocol. The DNS system has a network topology defined by nodes that include protocol endpoints of the DNS protocol. In still another example, a token-ring network has a circular topology at the link layer, but may have a star topology at the physical layer.

As used herein, an "entity-specific address space" refers to an address space defined for a specific entity where the addresses in the address space operate as identifiers in the context of the entity. An address from an entity-specific address space is referred to herein as an "entity-specific address". An address is "entity-specific" in that what it identifies is based on the entity to which it is specific. Another address having the same form and content may identify a different entity when in an address space specific to another entity. Addresses in an entity-specific address space operate as identifiers in the context of an entity to which they are "specific" as defined by the specific association of the address space and the entity. Without knowledge of the entity to which an entity-specific address space is specific, what an address in the entity-specific address space identifies is indeterminate. The terms "entity-specific address" and "entity-specific identifier" are used interchangeably herein. An entity-specific address may identify an entity included in the entity to which the address is specific or may identify an entity external to the entity to which the address is specific. The fact that an address is entity-specific does not define a scope for the address.

A portion of a network is a type of entity. A type of entity-specific address space described herein is a scope-specific address space. As used herein, a "scope-specific address space", specific to a particular region of a network, is an address space defined for the particular network region, where an address in the scope-specific protocol address operates as identifier, according to a network protocol, of a protocol endpoint in a node outside of the particular region when processed in the context of a node in the particular region. The region is indicated by the span of an indicated scope. The terms "region" and "zone" are used interchangeably herein. An address from a scope-specific address space is referred to herein as a "scope-specific protocol address". An address is "scope-specific" in that what protocol endpoint it identifies depends on the region to which it is specific. Another address having the exact same form and content may identify a different protocol endpoint when in an address space that is specific to another region. A protocol address in a scope-specific address space serves as an identifier in the context of a node in a region to which the scope-specific address space is "specific" as defined by an association of the address space and the region indicated by the scope. Without knowledge of the particular region to which a scope-specific address space is specific, what a scope-specific protocol address in the scope-specific address space identifies is indeterminate. The terms "scope-specific protocol address" and "scope-specific protocol identifier" are used interchangeably herein. Types of scope-specific address spaces indicating exemplary spans include site-specific, LAN-specific, subnet-specific, city-specific, business-specific, and node-specific.

For a network protocol, an address in a scope-specific address space serves as an identifier of a protocol endpoint in a node. Data may be received via the protocol endpoint from a network via one or more network interfaces that operatively couple the node to the network. Data may be sent via the protocol endpoint to transmit over the network via the one or more network interfaces in the node. Since a protocol endpoint of a network protocol is included in a node and is accessible via a network via a network interface, a protocol address identifying the protocol endpoint also identifies the node and identifies a network interface of the node.

As used herein, a "node-specific address space" is a scope-specific address space defined for a specific node in a network, where the addresses in the node-specific address space operate as identifiers of nodes and/or network interfaces in the network when processed in the context of the specific node. An address from a node-specific address space is referred to herein as a "node-specific address". An address is "node-specific" in that what it identifies depends on the node to which is defined as specific. Another address having the exact same form and content may identify a different node when in an address space specific to another node. Addresses in a node-specific address space operate as identifiers in the context of a node to which they are "specific" as defined by the specific association of the address space and the node. Without knowledge of the node to which a node-specific address space is specific, addresses in the node-specific address space are indeterminate. The terms "node-specific address" and "node-specific identifier" are used interchangeably herein. A node-specific address space is a type of scope-specific address space.

The term "node" is defined above. Note that an identifier of a network interface in a network also identifies a node that includes the network interface. Thus, a network interface-specific address is also a node-specific address. Network interfaces in a node may have their own respective network interface-specific address spaces that are also node-specific. The network interface-specific address spaces may be combined to form a node-specific address space and/or may be managed as separate address spaces. The adjectives "node-specific" and "network interface-specific" may be used interchangeably.

A scope-specific identifier differs from a scoped address as described in "Request for Comments" (RFC) document RFC 4007 by S. Deering, et al, titled "IPv6 Scoped Address Architecture", published by the IETF in December, 2006 and further described in application Ser. No. 11/962,285, by the present inventor, filed on 2007 Dec. 21, entitled "Methods and Systems for Sending Information to a zone Included in an internet Network". A scoped address space is shared by nodes in a given scope. While a link-local scoped address is specific to a particular node, a link-local scoped address simply identifies a network interface component local to the particular node. A loop-back internet address is specific to a node as well. Neither link-local scoped addresses nor loop-back addresses identify one node to another. As such, neither serves as a node-specific identifier as defined above.

A "scoped address" is described by RFC 3513 and RFC 4007 as an identifier that, in a particular region of a network, serves as a protocol address of a network interface and/or a node in the particular region. The extent of the particular region is referred to as the scope of the region and thus the scope within which the identifier serves as a protocol address. A particular region included within a scope is indicated by its span. A scoped address is a valid protocol address only within a particular region as indicated by the address's indicated scope. Examples of scope indicators include node-scope where identifiers are valid only to a single node in the indicated span, LAN-scope where identifiers are valid for nodes in the span of a particular LAN, and subnet-scope where identifiers are valid only for nodes in a particular subnet. RFC 3513 currently defines support for link-local scope, site-local scope, and global scope. A data unit transmitted with a scoped address should not be delivered to node that does not have a network interface in the span indicated by the scope.

"Path information" is any information that identifies a network path and/or a hop path for data transmitted via one a specified network protocols. Path information may be identified by identifying network interfaces, NICs, nodes, and/or hops included in a network path. "Address information" is any information that identifies a protocol address that, for a network protocol, identifies a protocol endpoint. Address information may identify a unicast protocol address for a network protocol. In identifying a protocol endpoint, a protocol address identifies a node and a network interface.

Those skilled in the art will understand upon reading the descriptions herein that the subject matter disclosed herein is not restricted to the network protocols described and/or their corresponding OSI layers. For ease of illustration, the subject matter is described in terms of protocols that correspond to OSI layer three, also referred to as network layer protocols, in general. Particular descriptions are based on versions of the Internet Protocol (IP). Address information may identify one or more protocol addresses. Exemplary protocol addresses include IP addresses, IPX addresses, DECNet addresses, VINES Internet Protocol addresses, and Datagram Delivery Protocol (DDP) addresses, HTTP URLS, TCP port and IP address pairs, and the like.

The term "path-based address" is defined above. A "node-based address" is a path-based address where some or all of the address includes node identifiers that identify a sequence of nodes in a network path. A "network-interface-based address" is a path-based address where some or all of the address includes identifiers of network interfaces in a sequence in a network path. A "NIC-based address" is a type of network-interface-based address that identifies a sequence of network interface components. A "hop-based address" is a path-based address where some or all of the address identifies one or more hops in a network path. The protocol address types defined are not mutually exclusive.

The term "metric space", as used herein, refers to a set, as defined in mathematics, where a distance between elements of the set is defined according to a metric. Metric spaces defined in Euclidean geometry are well-known examples. Those skilled in the art of metric spaces, such as Euclidian spaces, will appreciate that an one-to-one mapping may be determined and/or otherwise identified for mapping addresses from a first coordinate space having a first origin for a metric space to addresses from a second coordinate space having a second origin in the metric space. Given a mapping rule between a first scope-specific address space and a second scope-specific address space and a mapping between the second scope-specific address space and a third scope-specific address space based on a third coordinate space identifying a third origin in the metric space, a mapping from the first coordinate space to the third coordinate space may be determined. A mapping between coordinate spaces for a metric space may be included a coordinate shift and/or a rotation, for example. The mapping may be pre-specified and accessible to the nodes in one or both address spaces. Mapping between locations in a number of different metric spaces is well known in mathematics. For example, a top half of the surface of sphere may be mapped to a plane. Some will further appreciate that some metric spaces may be mapped to other metric spaces. Some of these mappings are one-to-one and/or onto.

An "execution environment", as used herein, is an arrangement of hardware and, in some aspects, software that may be further modified, transformed, and/or otherwise configured to include and/or otherwise host an arrangement of components to perform a method of the subject matter described herein. An execution environment includes a processor to execute an instruction included in at least one component of such an arrangement. An execution environment includes and/or is otherwise provided by one or more devices. The execution environment is said to be the execution environment "of" the device and/or devices. Exemplary devices included in and/or otherwise providing suitable execution environments that may be adapted, programmed, and/or otherwise modified according to the subject matter include a workstation, a desktop computer, a laptop or notebook computer, a server, a handheld computer, a mobile telephone or other portable telecommunication device, a media playing device, a gaming system, a tablet computer, a portable electronic device, a handheld electronic device, a multiprocessor device, a distributed system, a consumer electronic device, a router, a network server, or any other type and/or form of computing, telecommunications, network, and/or media device that is suitable to perform the subject matter described herein. Those skilled in the art will understand that the components illustrated in FIG. 1 are exemplary and may vary by particular execution environment. An execution environment may be and/or may include a virtual execution environment including software components operating in a host execution environment.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs).

The terms "network node" and "node" in this document both refer to a device having a network interface component for operatively coupling the device to a network. Further, the terms "device" and "node" used herein refer to one or more devices and nodes, respectively, providing and/or otherwise included in an execution environment unless clearly indicated otherwise.

A computer program may include one or more software components. As used herein, the term "software component" refers to any data representation that may be and/or may be translated into a set of machine code instructions and may optionally include associated data. Software component representations other than machine code include object code, byte code, and source code. Object code includes a set of instructions and/or data elements that either are prepared to link prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code. A software component may include one or more components.

As used herein, the terms "application", and "service" may be realized in one or more software components and/or in one or more hardware components.

Software components typically include instructions executed by a processor in a computing context referred to as a "process". A process may include one or more "threads". A "thread" includes a sequence of instructions executed by a processor in a computing sub-context of a process. The terms "thread" and "process" may be used interchangeably herein when a process includes only one thread.

As used herein, the term "network protocol" refers to a set of rules, conventions, and/or schemas that govern how nodes exchange information over a network. The set may define, for example, a convention and/or a data structure. The term "network path" as used herein refers to a sequence of nodes in a network that are communicatively coupled to transmit data in one or more data units of a network protocol between a pair of nodes in the network.

A "data unit", as the term is used herein, is an entity specified according to a network protocol to transmit data between a pair of nodes in a network path to send the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node and a payload portion to include a representation of data to be delivered to the identified destination node. Various address types are specified defining a vocabulary for one or more address portions of an IP data unit. The terms "data unit" ", frame" ", data packet", and "packet" are used interchangeably herein. One or more data units of a first network protocol may transmit a "message" of a second network protocol. For example, one or more data units of the IP protocol may include a TCP message. In another example, one or more TCP data units may transmit an HTTP message. A message may be empty.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a data unit than a data unit in which the data is forwarded by the node.

A "protocol address", as the term is used herein, for a network protocol is an identifier of a protocol endpoint that may be represented in a data unit of the network protocol. For example, 192.168.1.1 is an IP protocol address represented in a human readable format that may be represented in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

Since a protocol endpoint is included in a node and is accessible via a network via a network interface, a protocol address identifies a node and identifies a network interface of the node. A network interface may include one or more NICs operatively coupled to a network.

A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

The term "hop" as used herein refers to a pair of consecutive nodes in a network path to transmit, via a network protocol, data sent from a source node to a destination node. A "hop path" is thus a sequence of hops in a network that respectively include a sequence of pairs of consecutive nodes included in transmitting data from a first path end node of the network path to a second path end node of the network path.

The term "path-based protocol address" as used herein refers to a protocol address for a network protocol that includes one or more path segment identifiers that identify one or more respective portions of a network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of network interface identifiers that identify a sequence of network interfaces in a network path. A "NIC-based protocol address" is a type of network-interface-based protocol address that includes a plurality of identifiers that identify a sequence of network interface components. A "hop-based protocol address" is a type path-based protocol address since a hop is a type of network path.

Given the above definitions, note that the terms "network path" and "hop" may be defined in terms of network interfaces. A "network path" and a "hop path" include a sequence of network interfaces in a network that are included in transmitting data between a pair of path end nodes in the network. A "hop" refers to at least part of a network path that includes a pair of consecutive network interfaces in a sequence of network interfaces in a network path. A "network path" is thus a sequence of hops in a network that respectively includes a sequence of pairs of consecutive network interfaces included in transmitting data from a first path end node of the network path to a second path end node of the network path.

The term "network topology" or "topology", for short, as used herein refers to a representation of protocol endpoints and/or nodes in a network, and representations of hops representing communicative couplings between and/or among the protocol endpoints and/or nodes in the network. A network may have different network topologies with respect to different network protocols. A network topology may represent physical communicative couplings between nodes in the network. A network topology may represent logical couplings between protocol endpoints and/or nodes of a particular network protocol or a particular type of network protocol.

The domain name system (DNS) of the Internet operates based on an application layer protocol defined by the DNS. The nodes in the DNS are communicatively coupled via the DNS protocol and may be represented by a logical network topology. A DNS system includes nodes connected via the DNS protocol. The DNS system has a network topology defined by nodes that include protocol endpoints of the DNS protocol. In still another example, a token-ring network has a circular topology at the link layer, but may have a star topology at the physical layer.

As used herein, an "entity-specific address space" refers to an address space defined for a specific entity where the addresses in the address space operate as identifiers in the context of the entity. An address from an entity-specific address space is referred to herein as an "entity-specific address". An address is "entity-specific" in that what it identifies is based on the entity to which it is specific. Another address having the same form and content may identify an entity when in an address space specific to another entity. Addresses in an entity-specific address space operate as identifiers in the context of an entity to which they are "specific" as defined by the specific association of the address space and the entity. Without knowledge of the entity to which an entity-specific address space is specific, what an address in the entity-specific address space identifies is indeterminate. The terms "entity-specific address" and "entity-specific identifier" are used interchangeably herein. An entity-specific address may identify an entity included in the entity to which the address is specific or may identify an entity external to the entity to which the address is specific. The fact that an address is entity-specific does not define a scope for the address.

A portion of a network is a type of entity. A type of entity-specific address space described herein is a scope-specific address space. As used herein, a "scope-specific address space", specific to a particular region of a network, is an address space defined for the particular network region, where an address in the scope-specific protocol address operates as identifier, according to a network protocol, of a protocol endpoint in a node outside of the particular region when processed in the context of a node in the particular region. The region is indicated by the span of an indicated scope. The terms "region" and "zone" are used interchangeably herein. An address from a scope-specific address space is referred to herein as a "scope-specific protocol address". An address is "scope-specific" in that what protocol endpoint it identifies depends on the region to which it is specific. Another address having the exact same form and content may identify a protocol endpoint when in an address space that is specific to another region. A protocol address in a scope-specific address space serves as an identifier in the context of a node in a region to which the scope-specific address space is "specific" as defined by an association of the address space and the region indicated by the scope. Without knowledge of the particular region to which a scope-specific address space is specific, what a scope-specific protocol address in the scope-specific address space identifies is indeterminate. The terms "scope-specific protocol address" and "scope-specific protocol identifier" are used interchangeably herein. Types of scope-specific address spaces indicating exemplary spans include site-specific, LAN-specific, subnet-specific, city-specific, business-specific, and node-specific.

For a network protocol, an address in a scope-specific address space serves as an identifier of a protocol endpoint in a node. Data may be received via the protocol endpoint from a network via one or more network interfaces that operatively couple the node to the network. Data may be sent via the protocol endpoint to transmit over the network via the one or more network interfaces in the node. Since a protocol endpoint of a network protocol is included in a node and is accessible via a network via a network interface, a protocol address identifying the protocol endpoint also identifies the node and identifies a network interface of the node.

As used herein, a "node-specific address space" is a scope-specific address space defined for a specific node in a network, where the addresses in the node-specific address space operate as identifiers of nodes and/or network interfaces in the network when processed in the context of the specific node. An address from a node-specific address space is referred to herein as a "node-specific address". An address is "node-specific" in that what it identifies depends on the node to which is defined as specific. Another address having the exact same form and content may identify a node when in an address space specific to another node. Addresses in a node-specific address space operate as identifiers in the context of a node to which they are "specific" as defined by the specific association of the address space and the node. Without knowledge of the node to which a node-specific address space is specific, addresses in the node-specific address space are indeterminate. The terms "node-specific address" and "node-specific identifier" are used interchangeably herein. A node-specific address space is a type of scope-specific address space.

The term "node" is defined above. Note that an identifier of a network interface in a network also identifies a node that includes the network interface. Thus, a network interface-specific address is also a node-specific address. Network interfaces in a node may have their own respective network interface-specific address spaces that are also node-specific. The network interface-specific address spaces may be combined to form a node-specific address space and/or may be managed as separate address spaces. The adjectives "node-specific" and "network interface-specific" may be used interchangeably.

A scope-specific identifier differs from a scoped address as described in "Request for Comments" (RFC) document RFC 4007 by S. Deering, et al, titled "IPv6 Scoped Address Architecture", published by the IETF in December, 2006 and further described in application Ser. No. 11/962,285, by the present inventor, filed on 2007 Dec. 21, entitled "Methods and Systems for Sending Information to a zone Included in an Internet Network". A scoped address space is shared by nodes in a given scope. While a link-local scoped address is specific to a particular node, a link-local scoped address simply identifies a network interface component local to the particular node. A loop-back internet address is specific to a node as well. Neither link-local scoped addresses nor loop-back addresses identify one node to another. As such, neither serves as a node-specific identifier as defined above.

A "scoped address" is described by RFC 3513 and RFC 4007 as an identifier that, in a particular region of a network, serves as a protocol address of a network interface and/or a node in the particular region. The extent of the particular region is referred to as the scope of the region and thus the scope within which the identifier serves as a protocol address. A particular region included within a scope is indicated by its span. A scoped address is a valid protocol address only within a particular region as indicated by the address's indicated scope. Examples of scope indicators include node-scope where identifiers are valid only to a single node in the indicated span, LAN-scope where identifiers are valid for nodes in the span of a particular LAN, and subnet-scope where identifiers are valid only for nodes in a particular subnet. RFC 3513 currently defines support for link-local scope, site-local scope, and global scope. A data unit transmitted with a scoped address should not be delivered to node that does not have a network interface in the span indicated by the scope.

"Path information" is any information that identifies a network path and/or a hop path for data transmitted via one a specified network protocols. Path information may be identified by identifying network interfaces, NICs, nodes, and/or hops included in a network path. "Address information" is any information that identifies a protocol address that, for a network protocol, identifies a protocol endpoint. Address information may identify a unicast protocol address for a network protocol. In identifying a protocol endpoint, a protocol address identifies a node and a network interface.

Those skilled in the art will understand upon reading the descriptions herein that the subject matter disclosed herein is not restricted to the network protocols described and/or their corresponding OSI layers. For ease of illustration, the subject matter is described in terms of protocols that correspond to OSI layer three, also referred to as network layer protocols, in general. Particular descriptions are based on versions of the Internet Protocol (IP). Address information may identify one or more protocol addresses. Exemplary protocol addresses include IP addresses, IPX addresses, DECNet addresses, VINES Internet Protocol addresses, and Datagram Delivery Protocol (DDP) addresses, HTTP URLS, TCP port and IP address pairs, and the like.

The term "path-based address" is defined above. A "node-based address" is a path-based address where some or all of the address includes node identifiers that identify a sequence of nodes in a network path. A "network-interface-based address" is a path-based address where some or all of the address includes identifiers of network interfaces in a sequence in a network path. A "NIC-based address" is a type of network-interface-based address that identifies a sequence of network interface components. A "hop-based address" is a path-based address where some or all of the address identifies one or more hops in a network path. The protocol address types defined are not mutually exclusive.

The term "metric space", as used herein, refers to a set, as defined in mathematics, where a distance between elements of the set is defined according to a metric. Metric spaces defined in Euclidean geometry are well-known examples. Those skilled in the art of metric spaces, such as Euclidian spaces, will appreciate that a one-to-one mapping may be determined and/or otherwise identified for mapping addresses from a first coordinate space having a first origin for a metric space to addresses from a second coordinate space having a second origin in the metric space. Given a mapping rule between a first scope-specific address space and a second scope-specific address space and a mapping between the second scope-specific address space and a third scope-specific address space based on a third coordinate space identifying a third origin in the metric space, a mapping from the first coordinate space to the third coordinate space may be determined. A mapping between coordinate spaces for a metric space may be included a coordinate shift and/or a rotation, for example. The mapping may be pre-specified and accessible to the nodes in one or both address spaces. Mapping between locations in a number of different metric spaces is well known in mathematics. For example, a top half of the surface of sphere may be mapped to a plane. Some will further appreciate that some metric spaces may be mapped to other metric spaces. Some of these mappings are one-to-one and/or onto.

An "operating environment" or "computing environment", as used herein, is an arrangement of hardware and, in some aspects, software that may be further modified, transformed, and/or otherwise configured to include and/or otherwise host an arrangement of components to perform a method of the subject matter described herein. An operating environment includes a processor to execute an instruction included in at least one component of such an arrangement. An operating environment includes and/or is otherwise provided by one or more devices. The operating environment is said to be the operating environment "of" the device and/or devices.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs).

The terms "network node" and "node" in this document both refer to a device having a network interface component (NIC) for operatively coupling the device to a network. Further, the terms "device" and "node" used herein refer to one or more devices and nodes, respectively, providing and/or otherwise included in an operating environment unless clearly indicated otherwise.

As used herein, the term "network protocol" refers to a set of rules and/or conventions that govern how nodes exchange information over a network. The set may define, for example, a convention and/or a data structure. A "data unit", as the term is used herein, is an entity specified according to a network protocol to transmit data between a pair of nodes in a network path to send the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node, and also defines a payload portion to include data to be delivered to the identified destination node. Various address types are specified defining a vocabulary for one or more address fields of an IP data unit. The terms "data unit", "frame", "data unit", and "packet" are used interchangeably herein. One or more data units of a first network protocol may transmit a "message" of a second network protocol. For example, one or more data units of the IP protocol may include a TCP message. In another example, one or more TCP data units may transmit a HTTP message. A message may be empty as may a payload of a data unit.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint of the network protocol when included in an address field of a data unit of the network protocol. For example, 192.168.1.1 is an IP protocol address represented in a human readable format that may be represented in an address field of a header of an IP packet (i.e. an IP data unit) to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

Since a protocol endpoint is accessible by way of a network via a network interface in a node, a protocol address may be processed to identify a node and may be processed to identify a network interface of the node. A network interface may include one or more NICs operatively coupled to a network.

The term "network path" as used herein refers to a sequence of nodes in a network that are communicatively coupled to transmit data in one or more data units of one or more network protocols between a pair of nodes in the network. A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

For a network protocol, the term "hop", as used herein, refers to a pair of consecutive nodes in a network path to transmit, via the network protocol, data sent from a source node to a destination node. A "hop path" is thus a sequence of hops in a network that respectively include a sequence of pairs of consecutive nodes included in transmitting data from a first path end node of the network path to a second path end node of the network path.

The term "path-based protocol address" as used herein refers to a protocol address for a network protocol that includes one or more path segment identifiers that identify one or more respective portions of a network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of network interface identifiers that identify a sequence of network interfaces in a network path. A "NIC-based protocol address" is a type of network-interface-based protocol address that includes a plurality of identifiers that identify a sequence of network interface components. A "hop-based protocol address" is a type path-based protocol address since a hop is a type of network path.

Given the above definitions, note that the terms "network path" and "hop" may be defined in terms of network interfaces. A "network path" and a "hop path" include a sequence of network interfaces in a network that are included in transmitting data between a pair of path end nodes in the network. A "hop" refers to at least part of a network path that includes a pair of consecutive network interfaces in a sequence of network interfaces in a network path. A "network path" is thus a sequence of hops in a network that respectively includes a sequence of pairs of consecutive network interfaces included in transmitting data from a first path end node of the network path to a second path end node of the network path.

The term "network topology" or "topology", for short, as used herein refers to a representation of protocol endpoints, network interfaces, and/or nodes in a network, and representations of communicative couplings between and/or among the protocol endpoints, network interfaces, and/or nodes in the network. A network may have different network topologies with respect to different network protocols and/or with respect to different attributes of a same network protocol. A network topology may represent physical communicative couplings between protocol endpoints, network interfaces, and/or nodes in the network. A network topology may represent logical couplings between protocol endpoints, network interfaces, and/or nodes of a particular network protocol or a particular type of network protocol.

As used herein, an "entity-specific address space" refers to an address space defined for a specific entity where the addresses in the address space operate as identifiers in the context of the entity. An address from an entity-specific address space is referred to herein as an "entity-specific address". An address is "entity-specific" in that what it identifies is based on the entity to which it is specific. An address may identify one entity in one address space specific to a particular entity and may identify a different entity in another address space specific to a different entity. Addresses in an entity-specific address space operate as identifiers in the context of an entity to which they are "specific" as defined by the specific association of the address space and the entity. Without knowledge of the entity to which an entity-specific address space is specific, what an address in the entity-specific address space identifies is indeterminate. The terms "entity-specific address" and "entity-specific identifier" are used interchangeably herein.

An entity-specific address may identify an entity included in the entity to which the address is specific. Such as an address is said to be a "scoped". An entity-specific address may identify an entity external to the entity to which the address is specific. Such as address is said to be "scope-specific". The fact that an address is entity-specific does not define a scope for the address.

A portion of a network is a type of entity. A type of entity-specific address space described herein is a scope-specific address space. As used herein, a "scope-specific address space", specific to a particular region of a network, is an address space defined for the particular network region, where an address in the scope-specific protocol address operates as an identifier, according to a network protocol, of a protocol endpoint in a node outside of the particular region when processed in the context of a node in the particular region. The region is indicated by the span of an indicated scope. The terms "region" and "zone" are used interchangeably herein. An address from a scope-specific address space is referred to herein as a "scope-specific protocol address". An address is "scope-specific" in that what protocol endpoint it identifies depends on the region to which it is specific. Another address having the exact same form and content may identify a different protocol endpoint when in an address space that is specific to another region. A protocol address in a scope-specific address space serves as an identifier in the context of a node in a region to which the scope-specific address space is "specific" as defined by an association of the address space and the region indicated by the scope. Without knowledge of the particular region to which a scope-specific address space is specific, what a scope-specific protocol address in the scope-specific address space identifies is indeterminate. The terms "scope-specific protocol address" and "scope-specific protocol identifier" are used interchangeably herein. Types of scope-specific address spaces indicating exemplary spans include site-specific, LAN-specific, subnet-specific, city-specific, business-specific, and node-specific.

For a network protocol, an address in a scope-specific address space serves as an identifier of a protocol endpoint in a node. Data may be received via the protocol endpoint from a network via one or more network interfaces that operatively couple the node to the network. Data may be sent via the protocol endpoint to transmit over the network via the one or more network interfaces in the node. Since a protocol endpoint of a network protocol is included in a node and is accessible via a network via a network interface, a protocol address identifying the protocol endpoint also identifies the node and identifies a network interface of the node.

As used herein, a "node-specific address space" is a scope-specific address space defined for a specific node in a network, where the addresses in the node-specific address space operate as identifiers of nodes and/or network interfaces in the network when processed in the context of the specific node. An address from a node-specific address space is referred to herein as a "node-specific address". An address is "node-specific" in that what it identifies depends on the node to which is defined as specific. Another address having the exact same form and content may identify a different node when in an address space specific to another node. Addresses in a node-specific address space operate as identifiers in the context of a node to which they are "specific" as defined by the specific association of the address space and the node. Without knowledge of the node to which a node-specific address space is specific, addresses in the node-specific address space are indeterminate. The terms "node-specific address" and "node-specific identifier" are used interchangeably herein. A node-specific address space is a type of scope-specific address space.

The term "node" is defined above. Note that an identifier of a network interface in a network also identifies a node that includes the network interface. Thus, a network interface-specific address is also a node-specific address. Network interfaces in a node may have their own respective network interface-specific address spaces that are also node-specific. The network interface-specific address spaces may be combined to form a node-specific address space and/or may be managed as separate address spaces. The adjectives "node-specific" and "network interface-specific" may be used interchangeably.

A scope-specific identifier differs from a scoped address. Scoped addresses are described in RFC 3007, RFC 3513, and further described in application Ser. No. 11/962,285, by the present inventor, filed on 2007 Dec. 21, entitled "Methods and Systems for Sending Information to a Zone Included in an Internet Network". A scoped address space is shared by nodes in a given scope. While a link-local scoped address is specific to a particular node, a link-local scoped address simply identifies a network interface component local to the particular node. A loop-back internet address is specific to a node as well. Neither link-local scoped addresses nor loop-back addresses identify one node to another. As such, neither serves as a node-specific identifier as defined above.

A "scoped address" is described by RFC 3513 and RFC 3007 as an identifier that, in a particular region of a network, serves as a protocol address of a network interface and/or a node in the particular region. The extent of the particular region is referred to as the scope of the region and thus the scope within which the identifier serves as a protocol address. A particular region included within a scope is indicated by its span. A scoped address is a valid protocol address only within a particular region as indicated by the address's indicated scope. Examples of scope indicators include node-scope where identifiers are valid only to a single node in the indicated span, LAN-scope where identifiers are valid for nodes in the span of a particular LAN, and subnet-scope where identifiers are valid only for nodes in a particular subnet. RFC 3513 currently defines support for link-local scope, site-local scope, and global scope. A data unit transmitted with a scoped address should not be delivered to node that does not have a network interface in the span indicated by the scope.

"Path information" is any information that identifies a network path, such as a hop path, for data transmitted via one or more specified network protocols. Path information may be identified by identifying network interfaces, NICs, nodes, and/or hops included in a network path. "Address information" is any information that identifies a protocol address that, for a network protocol, identifies a protocol endpoint. Address information may identify a unicast protocol address for a network protocol. In identifying a protocol endpoint, a protocol address identifies a node and a network interface.

Those skilled in the art will understand upon reading the descriptions herein that the subject matter disclosed herein is not restricted to the network protocols described and/or their corresponding OSI layers. For ease of illustration, the subject matter is described in terms of protocols that correspond to OSI layer three, also referred to as network layer protocols, in general. Particular descriptions are based on versions of the Internet Protocol (IP). Address information may identify one or more protocol addresses. Exemplary protocol addresses include IP addresses, IPX addresses, DECNet addresses, VINES Internet Protocol addresses, and Datagram Delivery Protocol (DDP) addresses, HTTP URLS, TCP port and IP address pairs, and the like.

The term "metric space", as used herein, refers to a set, as defined in mathematics, where a distance between elements of the set is defined according to a metric. Metric spaces defined in Euclidean geometry are well-known examples. Those skilled in the art of metric spaces, such as Euclidian spaces, will appreciate that a one-to-one mapping may be determined and/or otherwise identified for mapping addresses from a first coordinate space having a first origin for a metric space to addresses from a second coordinate space having a second origin in the metric space. Given a mapping rule between a first scope-specific address space and a second scope-specific address space and a mapping between the second scope-specific address space and a third scope-specific address space based on a third coordinate space identifying a third origin in the metric space, a mapping from the first coordinate space to the third coordinate space may be determined. A mapping between coordinate spaces for a metric space may be include, for example, coordinate shift and/or a rotation, for example. The mapping may be pre-specified and accessible to the nodes in one or both address spaces. Mapping between locations in a number of different metric spaces is well known in mathematics. For example, a top half of the surface of sphere may be mapped to a plane. Some will further appreciate that some metric spaces may be mapped to other metric spaces. Some of these mappings are one-to-one and/or onto.

As used herein, the term "software component" refers to any data representation that includes and/or may be translated to include one or more instructions executable by a processor. A software component may optionally include associated data that does not represent an instruction executable by a processor.

An "execution environment", as used herein, is an arrangement of hardware and, in some aspects, software that may be further modified, transformed, and/or otherwise configured to include and/or otherwise host an arrangement of components to perform a method of the subject matter described herein. An execution environment includes a processor to execute an instruction included in at least one component of such an arrangement. An execution environment includes and/or is otherwise provided by one or more devices. The execution environment is said to be the execution environment "of" the device and/or devices. Exemplary devices included in and/or otherwise providing suitable execution environments that may be adapted, programmed, and/or otherwise modified according to the subject matter include a workstation, a desktop computer, a laptop or notebook computer, a server, a handheld computer, a mobile telephone or other portable telecommunication device, a media playing device, a gaming system, a tablet computer, a portable electronic device, a handheld electronic device, a multiprocessor device, a distributed system, a consumer electronic device, a router, a switch, a bridge, a network server, or any other type and/or form of computing, telecommunications, network, and/or media device that is suitable to perform the subject matter described herein. Those skilled in the art will understand that the components illustrated in FIG. 1 are exemplary and may vary by particular execution environment. An execution environment may be and/or may include a virtual execution environment including software components operating in a host execution environment.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs).

The terms "network node" and "node" in this document both refer to a device having a network interface component for operatively coupling the device to a network. Further, the terms "device" and "node" used herein refer to one or more devices and nodes, respectively, providing and/or otherwise included in an execution environment unless clearly indicated otherwise.

A computer program may include one or more software components. As used herein, the term "software component" refers to any data representation that may be and/or may be translated into a set of machine code instructions and may optionally include associated data. Software component representations other than machine code include object code, byte code, and source code. Object code includes a set of instructions and/or data elements that either are prepared to link prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code. A software component may include one or more components. As used herein, the terms "application", and "service" may be realized in one or more software components and/or in one or more hardware components.

Software components typically include instructions executed by a processor in a computing context referred to as a "process". A process may include one or more "threads". A "thread" includes a sequence of instructions executed by a processor in a computing sub-context of a process. The terms "thread" and "process" may be used interchangeably herein when a process includes only one thread.

As used herein, the term "network protocol" refers to a set of rules, conventions, and/or schemas that govern how nodes exchange information over a network. The set may define, for example, a convention and/or a data structure. For example, data for transmitting from a source node to a destination node may be included in a payload portion of a data unit of a particular network protocol. The network protocol may define a format that identifies the payload based on one or more valid data structures for a data unit. For example, a payload portion may be identified by a location with respect to the start of a data unit or relative to another portion of the data unit. Alternatively or additionally, the network protocol may defined a vocabulary defining a keyword, a bit pattern, and/or other detectable marker that when detected identifies a payload or part of a payload in a data unit. The network protocol may define one or more format rules and/or vocabulary rules that an in-data component may detect in identifying address information in a data unit. The term "schema" refers to a definition of a structure and/or a vocabulary for constructing and/or detecting a valid data unit with respect to a network protocol for which the schema is defined. For example, both an IPv4 packet and an IPv6 packet are specified according to a schema that specifies rules for including address information in a destination protocol address field and in a source protocol address field in an IP header based on location and size.

A "data unit", as the term is used herein, is an entity specified according to a network protocol to transmit data between a pair of nodes in a network path in sending the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node and a payload portion to include a representation of data to be delivered to the identified destination node. Various address types are specified defining a vocabulary for one or more address portions of an IP data unit. The terms "data unit", "frame", "data packet", and "packet" are used interchangeably herein. One or more data units of a first network protocol may transmit a "message" of a second network protocol. For example, one or more data units of the IP protocol may include a TCP message. In another example, one or more TCP data units may transmit a HTTP message. A message may be empty.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint that may be represented in a data unit of the network protocol. For example, "192.168.1.1" is an IP protocol address represented in a human readable format that may be represented in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address "192.168.1.1". An identifier may be both a symbolic identifier and a protocol address depending on its role with respect to its use for a particular network protocol.

Since a protocol endpoint is accessible by way of a network via a network interface in a node, a protocol address identifies a node and identifies a network interface of the node. A network interface may include one or more NICs operatively coupled to a network.

A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

The term "network path" as used herein refers to a sequence of nodes in a network that are communicatively coupled to transmit data in one or more data units of a network protocol between a pair of nodes in the network.

The term "hop" as used herein refers to a pair of consecutive nodes in a network path to transmit, via a network protocol, data sent from a source node to a destination node. A "hop path" is thus a sequence of hops in a network that respectively include a sequence of pairs of consecutive nodes included in transmitting data from a first path end node of the network path to a second path end node of the network path. A "network path" is thus a sequence of hops in a network that respectively includes a sequence of pairs of consecutive network interfaces included in transmitting data from a first path end node of the network path to a second path end node of the network path.

Given the above definitions, note that the terms "network path" and "hop" may be defined in terms of network interfaces. A "network path" is a sequence of network interfaces in a network to transmit data in one or more data units of a specified network protocol between a pair of path end nodes in the network. A "hop" refers to a pair of consecutive network interfaces, in a pair of nodes, in a sequence of network interfaces in a network path. A hop in a sequence in a network path corresponds to a pair of network interfaces in the sequence of network interfaces in the network path.

The term "path-based protocol address" as used herein refers to a protocol address for a network protocol that includes one or more path segment identifiers that identify one or more respective portions of a network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of network interface identifiers that identify a sequence of network interfaces in a network path. A "NIC-based protocol address" is a type of network-interface-based protocol address that includes a plurality of identifiers that identify a sequence of network interface components. A "hop-based protocol address" is a type path-based protocol address since a hop is a type of network path. The protocol address types defined are not mutually exclusive.

The term "network topology" or "topology", for short, as used herein refers to a representation of protocol endpoints, network interfaces, and/or nodes in a network, and representations of communicative couplings between and/or among the protocol endpoints, network interfaces, and/or nodes in the network. A network may have different network topologies with respect to different network protocols and/or address spaces. A network topology may represent physical communicative couplings between protocol endpoints, network interfaces, and/or nodes in the network. A network topology may represent logical couplings between protocol endpoints, network interfaces, and/or nodes of a particular network protocol or a particular type of network protocol.

The domain name system (DNS) of the Internet operates based on an application layer protocol defined by the DNS. The nodes in the DNS are communicatively coupled via the DNS protocol and may be represented by a logical network topology. A DNS system includes nodes connected via the DNS protocol. The DNS system has a network topology defined by nodes that include protocol endpoints of the DNS protocol. Such a topology may also include nodes that relay DNS protocol data units between and/or among nodes with DNS protocol endpoints. In still another example, a token-ring network has a circular topology at the link layer, but may have a star topology at the physical layer.

As used herein, an "entity-specific address space" refers to an address space defined for a specific entity where the addresses in the address space operate as identifiers in the context of the entity. An address from an entity-specific address space is referred to herein as an "entity-specific address". An address is "entity-specific" in that what it identifies is based on the entity to which it is specific. An address may identify one entity in one address space specific to a particular entity and may identify a different entity in another address space specific to a different entity. Addresses in an entity-specific address space operate as identifiers in the context of an entity to which they are "specific" as defined by the specific association of the address space and the entity. Without knowledge of the entity to which an entity-specific address space is specific, what an address in the entity-specific address space identifies is indeterminate. The terms "entity-specific address" and "entity-specific identifier" are used interchangeably herein. An entity-specific address may identify an entity included in the entity to which the address is specific. Such as an address is said to be a "scoped". An entity-specific address identifies an entity external to the entity to which the address is specific. Such as address is said to be "scope-specific". The fact that an address is entity-specific does not define a scope for the address.

A portion of a network is a type of entity. A type of entity-specific address space described herein is a scope-specific address space. As used herein, a "scope-specific address space", specific to a particular region of a network, is an address space defined for the particular network region, where an address in the scope-specific protocol address operates as an identifier, according to a network protocol, of a protocol endpoint in a node outside of the particular region when processed in the context of a node in the particular region. The region is indicated by the span of an indicated scope. The terms "region" and "zone" are used interchangeably herein. An address from a scope-specific address space is referred to herein as a "scope-specific protocol address". An address is "scope-specific" in that what protocol endpoint it identifies depends on the region to which it is specific. Another address having the exact same form and content may identify a different protocol endpoint when in an address space that is specific to another region. A protocol address in a scope-specific address space serves as an identifier in the context of a node in a region to which the scope-specific address space is "specific" as defined by an association of the address space and the region indicated by the scope. Without knowledge of the particular region to which a scope-specific address space is specific, what a scope-specific protocol address in the scope-specific address space identifies is indeterminate. The terms "scope-specific protocol address" and "scope-specific protocol identifier" are used interchangeably herein. Types of scope-specific address spaces indicating exemplary spans include site-specific, LAN-specific, subnet-specific, city-specific, business-specific, and node-specific.

For a network protocol, an address in a scope-specific address space serves as an identifier of a protocol endpoint in a node. Data may be received via the protocol endpoint from a network via one or more network interfaces that operatively couple the node to the network. Data may be sent via the protocol endpoint to transmit over the network via the one or more network interfaces in the node. Since a protocol endpoint of a network protocol is included in a node and is accessible via a network via a network interface, a protocol address identifying the protocol endpoint also identifies the node and identifies a network interface of the node.

As used herein, a "node-specific address space" is a scope-specific address space defined for a specific node in a network, where the addresses in the node-specific address space operate as identifiers of nodes and/or network interfaces in the network when processed in the context of the specific node. An address from a node-specific address space is referred to herein as a "node-specific address". An address is "node-specific" in that what it identifies depends on the node to which is defined as specific. Another address having the exact same form and/or content may identify a different node when in an address space specific to another node. Addresses in a node-specific address space operate as identifiers in the context of a node to which they are "specific" as defined by the specific association of the address space and the node. Without knowledge of the node to which a node-specific address space is specific, addresses in the node-specific address space are indeterminate. The terms "node-specific address" and "node-specific identifier" are used interchangeably herein. A node-specific address space is a type of scope-specific address space.

The term "node" is defined above. Note that an identifier of a network interface in a network also identifies a node that includes the network interface. Thus, a network interface-specific address is also a node-specific address. Network interfaces in a node may have their own respective network interface-specific address spaces that are also node-specific. The network interface-specific address spaces may be combined to form a node-specific address space and/or may be managed as separate address spaces. The adjectives "node-specific" and "network interface-specific" may be used interchangeably.

A scope-specific identifier differs from a scoped address. Scoped addresses are described in RFC 4007, RFC 3513, and further described in application Ser. No. 11/962,285, by the present inventor, filed on 2007 Dec. 21, entitled "Methods and Systems for Sending Information to a Zone Included in an Internet Network". A scoped address space is shared by nodes in a given scope. While a link-local scoped address is specific to a particular node, a link-local scoped address simply identifies a network interface component local to the particular node. A loop-back internet address is specific to a node as well. Neither link-local scoped addresses nor loop-back addresses identify one node to another. As such, neither serves as a node-specific identifier as defined above.

A "scoped address" is described by RFC 3513 and RFC 4007 as an identifier that, in a particular region of a network, serves as a protocol address of a network interface and/or a node in the particular region. The extent of the particular region is referred to as the scope of the region and thus the scope within which the identifier serves as a protocol address. A particular region included within a scope is indicated by its span. A scoped address is a valid protocol address only within a particular region as indicated by the address's indicated scope. Examples of scope indicators include node-scope where identifiers are valid only to a single node in the indicated span, LAN-scope where identifiers are valid for nodes in the span of a particular LAN, and subnet-scope where identifiers are valid only for nodes in a particular subnet. RFC 3513 currently defines support for link-local scope, site-local scope, and global scope. A data unit transmitted with a scoped address should not be delivered to node that does not have a network interface in the span indicated by the scope.

"Path information" is any information that identifies a network path, such as a hop path, for data transmitted via one or more specified network protocols. Path information may be identified by identifying network interfaces, NICs, nodes, and/or hops included in a network path.

"Address information" is any information that identifies a protocol address that, for a network protocol, identifies a protocol endpoint. Address information may identify a unicast protocol address for a network protocol. In identifying a protocol endpoint, a protocol address identifies a node and a network interface.

For ease of illustration, the description that follows focuses on IP networks and protocols in the TCP/IP suite due to their wide use and because they are well-known in the art. Those skilled in the art will understand upon reading the descriptions herein that the subject matter disclosed herein is not restricted to the network protocols described and/or their corresponding OSI layers. For example, link layer protocols and link-layer networks are considered to be within the scope of the subject matter of this disclosure.

The term "metric space", as used herein, refers to a set, as defined in mathematics, where a distance between elements of the set is defined according to a metric. Metric spaces defined in Euclidean geometry are well-known examples. Those skilled in the art of metric spaces, such as Euclidian spaces, will appreciate that a one-to-one mapping may be determined and/or otherwise identified for mapping addresses from a first coordinate space having a first origin for a metric space to addresses from a second coordinate space having a second origin in the metric space. Given a mapping rule between a first scope-specific address space and a second scope-specific address space and a mapping between the second scope-specific address space and a third scope-specific address space based on a third coordinate space identifying a third origin in the metric space, a mapping from the first coordinate space to the third coordinate space may be determined. A mapping between coordinate spaces for a metric space may include, for example, coordinate shift and/or a rotation. The mapping may be pre-specified and accessible to the nodes in one or both address spaces. Mapping between locations in a number of different metric spaces is well known in mathematics. For example, a top half of the surface of sphere may be mapped to a plane. Some will further appreciate that some metric spaces may be mapped to other metric spaces. Some of these mappings are one-to-one and/or on-to.

An "execution environment", as used herein, is an arrangement of hardware and, in some aspects, software that may be further modified, transformed, and/or otherwise configured to include and/or otherwise host an arrangement of components to perform a method of the subject matter described herein. An execution environment includes a processor to execute an instruction included in at least one component of such an arrangement. An execution environment includes and/or is otherwise provided by one or more devices. The execution environment is said to be the execution environment "of" the device and/or devices. Exemplary devices included in and/or otherwise providing suitable execution environments that may be adapted, programmed, and/or otherwise modified according to the subject matter include a workstation, a desktop computer, a laptop or notebook computer, a server, a handheld computer, a mobile telephone or other portable telecommunication device, a media playing device, a gaming system, a tablet computer, a portable electronic device, a handheld electronic device, a multiprocessor device, a distributed system, a consumer electronic device, a router, a switch, a bridge, a network server, or any other type and/or form of computing, telecommunications, network, and/or media device that is suitable to perform the subject matter described herein. Those skilled in the art will understand that the components illustrated in FIG. 1 are exemplary and may vary by particular execution environment. An execution environment may be and/or may include a virtual execution environment including software components operating in a host execution environment.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs).

The terms "network node" and "node" in this document both refer to a device having a network interface component for operatively coupling the device to a network. Further, the terms "device" and "node" used herein refer to one or more devices and nodes, respectively, providing and/or otherwise included in an execution environment unless clearly indicated otherwise.

As used herein, the term "network protocol" refers to a set of rules, conventions, and/or schemas that govern how nodes exchange information over a network. The set may define, for example, a convention and/or a data structure. For example, data for transmitting from a source node to a destination node may be included in a payload portion of a data unit of a particular network protocol. The network protocol may define a format that identifies the payload based on one or more valid data structures for a data unit. For example, a payload portion may be identified by a location with respect to the start of a data unit or relative to another portion of the data unit. Alternatively or additionally, the network protocol may defined a vocabulary defining a keyword, a bit pattern, and/or other detectable marker that when detected identifies a payload or part of a payload in a data unit. The network protocol may define one or more format rules and/or vocabulary rules that an in-data component may detect in identifying address information in a data unit. The term "schema" refers to a definition of a structure and/or a vocabulary for constructing and/or detecting a valid data unit with respect to a network protocol for which the schema is defined. For example, both an IPv4 packet and an IPv6 packet are specified according to a schema that specifies rules for including address information in a destination protocol address field and in a source protocol address field in an IP header based on location and size.

A "data unit", as the term is used herein, is an entity specified according to a network protocol to transmit data between a pair of nodes in a network path in sending the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node and a payload portion to include a representation of data to be delivered to the identified destination node. Various address types are specified defining a vocabulary for one or more address portions of an IP data unit. The terms "data unit", "frame", "data unit", and "packet" are used interchangeably herein. One or more data units of a first network protocol may transmit a "message" of a second network protocol. For example, one or more data units of the IP protocol may include a TCP message. In another example, one or more TCP data units may transmit a HTTP message. A message may be empty.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint that may be represented in a data unit of the network protocol. For example, "192.168.1.1" is an IP protocol address represented in a human readable format that may be represented in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address "192.168.1.1". An identifier may be both a symbolic identifier and a protocol address depending on its role with respect to its use for a particular network protocol.

Since a protocol endpoint is accessible by way of a network via a network interface in a node, a protocol address identifies a node and identifies a network interface of the node. A network interface may include one or more NICs operatively coupled to a network.

A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

The term "network path" as used herein refers to a sequence of nodes in a network that are communicatively coupled to transmit data in one or more data units of a network protocol between a pair of nodes in the network.

The term "hop" as used herein refers to a pair of consecutive nodes in a network path to transmit, via a network protocol, data sent from a source node to a destination node. A "hop path" is thus a sequence of hops in a network that respectively include a sequence of pairs of consecutive nodes included in transmitting data from a first path end node of the network path to a second path end node of the network path. A "network path" is thus a sequence of hops in a network that respectively includes a sequence of pairs of consecutive network interfaces included in transmitting data from a first path end node of the network path to a second path end node of the network path.

Given the above definitions, note that the terms "network path" and "hop" may be defined in terms of network interfaces. A "network path" is a sequence of network interfaces in a network to transmit data in one or more data units of a specified network protocol between a pair of path end nodes in the network. A "hop" refers to a pair of consecutive network interfaces, in a pair of nodes, in a sequence of network interfaces in a network path. A hop in a sequence in a network path corresponds to a pair of network interfaces in the sequence of network interfaces in the network path.

The term "path-based protocol address" as used herein refers to a protocol address for a network protocol that includes one or more path segment identifiers that identify one or more respective portions of a network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of network interface identifiers that identify a sequence of network interfaces in a network path. A "NIC-based protocol address" is a type of network-interface-based protocol address that includes a plurality of identifiers that identify a sequence of network interface components. A "hop-based protocol address" is a type path-based protocol address since a hop is a type of network path. The protocol address types defined are not mutually exclusive.

The term "network topology" or "topology", for short, as used herein refers to a representation of protocol endpoints, network interfaces, and/or nodes in a network, and representations of communicative couplings between and/or among the protocol endpoints, network interfaces, and/or nodes in the network. A network may have different network topologies with respect to different network protocols and/or address spaces. A network topology may represent physical communicative couplings between protocol endpoints, network interfaces, and/or nodes in the network. A network topology may represent logical couplings between protocol endpoints, network interfaces, and/or nodes of a particular network protocol or a particular type of network protocol.

The domain name system (DNS) of the Internet operates based on an application layer protocol defined by the DNS. The nodes in the DNS are communicatively coupled via the DNS protocol and may be represented by a logical network topology. A DNS system includes nodes connected via the DNS protocol. The DNS system has a network topology defined by nodes that include protocol endpoints of the DNS protocol. Such a topology may also include nodes that relay DNS protocol data units between and/or among nodes with DNS protocol endpoints. In still another example, a token-ring network has a circular topology at the link layer, but may have a star topology at the physical layer.

As used herein, an "entity-specific address space" refers to an address space defined for a specific entity where the addresses in the address space operate as identifiers in the context of the entity. An address from an entity-specific address space is referred to herein as an "entity-specific address". An address is "entity-specific" in that what it identifies is based on the entity to which it is specific. An address may identify one entity in one address space specific to a particular entity and may identify a different entity in another address space specific to a different entity. Addresses in an entity-specific address space operate as identifiers in the context of an entity to which they are "specific" as defined by the specific association of the address space and the entity. Without knowledge of the entity to which an entity-specific address space is specific, what an address in the entity-specific address space identifies is indeterminate. The terms "entity-specific address" and "entity-specific identifier" are used interchangeably herein. An entity-specific address may identify an entity included in the entity to which the address is specific. Such as an address is said to be a "scoped". An entity-specific address identifies an entity external to the entity to which the address is specific. Such as address is said to be "scope-specific". The fact that an address is entity-specific does not define a scope for the address.

A portion of a network is a type of entity. A type of entity-specific address space described herein is a scope-specific address space. As used herein, a "scope-specific address space", specific to a particular region of a network, is an address space defined for the particular network region, where an address in the scope-specific protocol address operates as an identifier, according to a network protocol, of a protocol endpoint in a node outside of the particular region when processed in the context of a node in the particular region. The region is indicated by the span of an indicated scope. The terms "region" and "zone" are used interchangeably herein. An address from a scope-specific address space is referred to herein as a "scope-specific protocol address". An address is "scope-specific" in that what protocol endpoint it identifies depends on the region to which it is specific. Another address having the exact same form and content may identify a different protocol endpoint when in an address space that is specific to another region. A protocol address in a scope-specific address space serves as an identifier in the context of a node in a region to which the scope-specific address space is "specific" as defined by an association of the address space and the region indicated by the scope. Without knowledge of the particular region to which a scope-specific address space is specific, what a scope-specific protocol address in the scope-specific address space identifies is indeterminate. The terms "scope-specific protocol address" and "scope-specific protocol identifier" are used interchangeably herein. Types of scope-specific address spaces indicating exemplary spans include site-specific, LAN-specific, subnet-specific, city-specific, business-specific, and node-specific.

For a network protocol, an address in a scope-specific address space serves as an identifier of a protocol endpoint in a node. Data may be received via the protocol endpoint from a network via one or more network interfaces that operatively couple the node to the network. Data may be sent via the protocol endpoint to transmit over the network via the one or more network interfaces in the node. Since a protocol endpoint of a network protocol is included in a node and is accessible via a network via a network interface, a protocol address identifying the protocol endpoint also identifies the node and identifies a network interface of the node.

As used herein, a "node-specific address space" is a scope-specific address space defined for a specific node in a network, where the addresses in the node-specific address space operate as identifiers of nodes and/or network interfaces in the network when processed in the context of the specific node. An address from a node-specific address space is referred to herein as a "node-specific address". An address is "node-specific" in that what it identifies depends on the node to which is defined as specific. Another address having the exact same form and/or content may identify a different node when in an address space specific to another node. Addresses in a node-specific address space operate as identifiers in the context of a node to which they are "specific" as defined by the specific association of the address space and the node. Without knowledge of the node to which a node-specific address space is specific, addresses in the node-specific address space are indeterminate. The terms "node-specific address" and "node-specific identifier" are used interchangeably herein. A node-specific address space is a type of scope-specific address space.

The term "node" is defined above. Note that an identifier of a network interface in a network also identifies a node that includes the network interface. Thus, a network interface-specific address is also a node-specific address. Network interfaces in a node may have their own respective network interface-specific address spaces that are also node-specific. The network interface-specific address spaces may be combined to form a node-specific address space and/or may be managed as separate address spaces. The adjectives "node-specific" and "network interface-specific" may be used interchangeably.

A scope-specific identifier differs from a scoped address. Scoped addresses are described in RFC 4007, RFC 3513, and further described in application Ser. No. 11/962,285, by the present inventor, filed on 2007 Dec. 21, entitled "Methods and Systems for Sending Information to a Zone Included in an Internet Network". A scoped address space is shared by nodes in a given scope. While a link-local scoped address is specific to a particular node, a link-local scoped address simply identifies a network interface component local to the particular node. A loop-back internet address is specific to a node as well. Neither link-local scoped addresses nor loop-back addresses identify one node to another. As such, neither serves as a node-specific identifier as defined above.

A "scoped address" is described by RFC 3513 and RFC 4007 as an identifier that, in a particular region of a network, serves as a protocol address of a network interface and/or a node in the particular region. The extent of the particular region is referred to as the scope of the region and thus the scope within which the identifier serves as a protocol address. A particular region included within a scope is indicated by its span. A scoped address is a valid protocol address only within a particular region as indicated by the address's indicated scope. Examples of scope indicators include node-scope where identifiers are valid only to a single node in the indicated span, LAN-scope where identifiers are valid for nodes in the span of a particular LAN, and subnet-scope where identifiers are valid only for nodes in a particular subnet. RFC 3513 currently defines support for link-local scope, site-local scope, and global scope. A data unit transmitted with a scoped address should not be delivered to node that does not have a network interface in the span indicated by the scope.

"Path information" is any information that identifies a network path, such as a hop path, for data transmitted via one or more specified network protocols. Path information may be identified by identifying network interfaces, NICs, nodes, and/or hops included in a network path.

"Address information" is any information that identifies a protocol address that, for a network protocol, identifies a protocol endpoint. Address information may identify a unicast protocol address for a network protocol. In identifying a protocol endpoint, a protocol address identifies a node and a network interface.

For ease of illustration, the description that follows focuses on IP networks and protocols in the TCP/IP suite due to their wide use and because they are well-known in the art. Those skilled in the art will understand upon reading the descriptions herein that the subject matter disclosed herein is not restricted to the network protocols described and/or their corresponding OSI layers. For example, link layer protocols and link-layer networks are considered to be within the scope of the subject matter of this disclosure.

The term "metric space", as used herein, refers to a set, as defined in mathematics, where a distance between elements of the set is defined according to a metric. Metric spaces defined in Euclidean geometry are well-known examples. Those skilled in the art of metric spaces, such as Euclidian spaces, will appreciate that a one-to-one mapping may be determined and/or otherwise identified for mapping addresses from a first coordinate space having a first origin for a metric space to addresses from a second coordinate space having a second origin in the metric space. Given a mapping rule between a first scope-specific address space and a second scope-specific address space and a mapping between the second scope-specific address space and a third scope-specific address space based on a third coordinate space identifying a third origin in the metric space, a mapping from the first coordinate space to the third coordinate space may be determined. A mapping between coordinate spaces for a metric space may include, for example, coordinate shift and/or a rotation. The mapping may be pre-specified and accessible to the nodes in one or both address spaces. Mapping between locations in a number of different metric spaces is well known in mathematics. For example, a top half of the surface of sphere may be mapped to a plane. Some will further appreciate that some metric spaces may be mapped to other metric spaces. Some of these mappings are one-to-one and/or on-to.

An "execution environment", as used herein, is an arrangement of hardware and, in some aspects, software that may be further modified, transformed, and/or otherwise configured to include and/or otherwise host an arrangement of components to perform a method of the subject matter described herein. An execution environment includes a processor to execute an instruction included in at least one component of such an arrangement. An execution environment includes and/or is otherwise provided by one or more devices. The execution environment is said to be the execution environment "of" the device and/or devices. Exemplary devices included in and/or otherwise providing suitable execution environments that may be adapted, programmed, and/or otherwise modified according to the subject matter include a workstation, a desktop computer, a laptop or notebook computer, a server, a handheld computer, a mobile telephone or other portable telecommunication device, a media playing device, a gaming system, a tablet computer, a portable electronic device, a handheld electronic device, a multiprocessor device, a distributed system, a consumer electronic device, a router, a switch, a bridge, a network server, or any other type and/or form of computing, telecommunications, network, and/or media device that is suitable to perform the subject matter described herein. Those skilled in the art will understand that the components illustrated in FIG. 1 are exemplary and may vary by particular execution environment. An execution environment may be and/or may include a virtual execution environment including software components operating in a host execution environment.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs).

The terms "network node" and "node" in this document both refer to a device having a network interface component capable of operatively coupling the device to a network. Further, the terms "device" and "node" used herein refer to one or more devices and nodes, respectively, providing and/or otherwise included in an execution environment unless clearly indicated otherwise.

As used herein, the term "network protocol" refers to a set of rules, conventions, and/or schemas that govern how nodes exchange information over a network. The set may define, for example, a convention and/or a data structure. For example, data for transmitting from a source node to a destination node may be included in a payload portion of a data unit of a particular network protocol. The network protocol may define a format that identifies the payload based on one or more valid data structures for a data unit. For example, a payload portion may be identified by a location with respect to the start of a data unit or relative to another portion of the data unit. Alternatively or additionally, the network protocol may be specified at least in part by a vocabulary defining a keyword, a bit pattern, and/or other detectable marker that when detected identifies a payload or part of a payload in a data unit. The network protocol may define one or more format rules and/or vocabulary rules that a data-in component may detect in identifying in a data unit an address field that includes and/or otherwise identifies a protocol address. The term "schema" refers to a definition of a structure and/or a vocabulary for constructing and/or detecting a valid data unit with respect to a network protocol for which the schema is defined. For example, both an IPv4 packet and an IPv6 packet are specified according to a schema that specifies rules for including a protocol address in a destination protocol address field and in a source protocol address field in an IP header based on location and size.

A "data unit", as the term is used herein, is an entity specified according to a network protocol to transmit data between a pair of nodes in a network path in sending the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node and a payload portion to include a representation of data to be delivered to the identified destination node. Various address types are specified defining a vocabulary for one or more address portions of an IP data unit. The terms "data unit", "frame", "data unit", and "packet" are used interchangeably herein. One or more data units of a first network protocol may transmit a "message" of a second network protocol. For example, one or more data units of the IP protocol may include a TCP message. In another example, one or more TCP data units may transmit a HTTP message. A message may be empty.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint of the network protocol. The protocol address may be represented in a data unit of the network protocol. For example, "192.168.1.1" is an IP protocol address represented in a human readable format that may be represented in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address "192.168.1.1". An identifier may be both a symbolic identifier and a protocol address depending on its role with respect to its use for a particular network protocol.

Since a protocol endpoint is accessible by way of a network via a network interface in a node, a protocol address identifies a node and identifies a network interface of the node. A network interface may include one or more NICs operatively coupled to a network.

A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

The term "network path" as used herein refers to a sequence of nodes in a network that are communicatively coupled to transmit data in one or more data units of a network protocol between a pair of nodes in the network.

The term "hop" as used herein refers to a pair of consecutive nodes in a network path to transmit, via a network protocol, data sent from a source node to a destination node. A "hop path" is thus a sequence of hops in a network that respectively include a sequence of pairs of consecutive nodes included in transmitting data from a first path end node of the network path to a second path end node of the network path. A "network path" is thus a sequence of hops in a network that respectively includes a sequence of pairs of consecutive network interfaces included in transmitting data from a first path end node of the network path to a second path end node of the network path.

Given the above definitions, note that the terms "network path" and "hop" may be defined in terms of network interfaces. A "network path" is a sequence of network interfaces in a network to transmit data in one or more data units of a specified network protocol between a pair of path end nodes in the network. A "hop" refers to a pair of consecutive network interfaces, in a pair of nodes, in a sequence of network interfaces in a network path. A hop in a sequence in a network path corresponds to a pair of network interfaces in the sequence of network interfaces in the network path.

The term "path-based protocol address" as used herein refers to a protocol address for a network protocol that includes one or more path segment identifiers that identify one or more respective portions of a network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of network interface identifiers that identify a sequence of network interfaces in a network path. A "NIC-based protocol address" is a type of network-interface-based protocol address that includes a plurality of identifiers that identify a sequence of network interface components. A "hop-based protocol address" is a type path-based protocol address since a hop is a type of network path. The protocol address types defined are not mutually exclusive.

The term "network topology" or "topology", for short, as used herein refers to a representation of protocol endpoints, network interfaces, and/or nodes in a network, and representations of communicative couplings between and/or among the protocol endpoints, network interfaces, and/or nodes in the network. A network may have different network topologies with respect to different network protocols and/or address spaces. A network topology may represent physical communicative couplings between protocol endpoints, network interfaces, and/or nodes in the network. A network topology may represent logical couplings between protocol endpoints, network interfaces, and/or nodes of a particular network protocol or a particular type of network protocol.

The domain name system (DNS) of the Internet operates based on an application layer protocol defined by the DNS. The nodes in the DNS are communicatively coupled via the DNS protocol and may be represented by a logical network topology. A DNS system includes nodes connected via the DNS protocol. The DNS system has a network topology defined by nodes that include protocol endpoints of the DNS protocol. Such a topology may also include nodes that relay DNS protocol data units between and/or among nodes with DNS protocol endpoints. In still another example, a token-ring network has a circular topology at the link layer, but may have a star topology at the physical layer.

As used herein, an “entity-specific address space” refers to an address space defined for a specific entity where the addresses in the address space operate as identifiers in the context of the entity. An address from an entity-specific address space is referred to herein as an “entity-specific address”. An address is “entity-specific” in that what it identifies is based on the entity to which it is specific. An address may identify one entity in one address space specific to a particular entity and may identify a different entity in another address space specific to a different entity. Addresses in an entity-specific address space operate as identifiers in the context of an entity to which they are “specific” as defined by the specific association of the address space and the entity. Without knowledge of the entity to which an entity-specific address space is specific, what an address in the entity-specific address space identifies is indeterminate. The terms “entity-specific address” and “entity-specific identifier” are used interchangeably herein. An entity-specific address may identify an entity included in the entity to which the address is specific. Such as an address is said to be a “scoped”. An entity-specific address identifies an entity external to the entity to which the address is specific. Such as address is said to be “scope-specific”. The fact that an address is entity-specific does not define a scope for the address.

A portion of a network is a type of entity. A type of entity-specific address space described herein is a scope-specific address space. As used herein, a “scope-specific address space”, specific to a particular region of a network, is an address space defined for the particular network region, where an address in the scope-specific protocol address operates as an identifier, according to a network protocol. of a protocol endpoint in a node outside of the particular region when processed in the context of a node in the particular region. The region is indicated by the span of an indicated scope. The terms “region” and “zone” are used interchangeably herein. An address from a scope-specific address space is referred to herein as a “scope-specific protocol address”. An address is “scope-specific” in that what protocol endpoint it identifies depends on the region to which it is specific. Another address having the exact same form and content may identify a different protocol endpoint when in an address space that is specific to another region. A protocol address in a scope-specific address space serves as an identifier in the context of a node in a region to which the scope-specific address space is “specific” as defined by an association of the address space and the region indicated by the scope. Without knowledge of the particular region to which a scope-specific address space is specific, what a scope-specific protocol address in the scope-specific address space identifies is indeterminate. The terms “scope-specific protocol address” and “scope-specific protocol identifier” are used interchangeably herein. Types of scope-specific address spaces indicating exemplary spans include site-specific, LAN-specific, subnet-specific, city-specific, business-specific, and node-specific.

For a network protocol, an address in a scope-specific address space serves as an identifier of a protocol endpoint in a node. Data may be received via the protocol endpoint from a network via one or more network interfaces that operatively couple the node to the network. Data may be sent via the protocol endpoint to transmit over the network via the one or more network interfaces in the node. Since a protocol endpoint of a network protocol is included in a node and is accessible via a network via a network interface, a protocol address identifying the protocol endpoint also identifies the node and identifies a network interface of the node.

As used herein, a “node-specific address space” is a scope-specific address space defined for a specific node in a network, where the addresses in the node-specific address space operate as identifiers of nodes and/or network interfaces in the network when processed in the context of the specific node. An address from a node-specific address space is referred to herein as a “node-specific address”. An address is “node-specific” in that what it identifies depends on the node to which is defined as specific. Another address having the exact same form and/or content may identify a different node when in an address space specific to another node. Addresses in a node-specific address space operate as identifiers in the context of a node to which they are “specific” as defined by the specific association of the address space and the node. Without knowledge of the node to which a node-specific address space is specific, addresses in the node-specific address space are indeterminate. The terms “node-specific address” and “node-specific identifier” are used interchangeably herein. A node-specific address space is a type of scope-specific address space.

The term “node” is defined above. Note that an identifier of a network interface in a network also identifies a node that includes the network interface. Thus, a network interface-specific address is also a node-specific address. Network interfaces in a node may have their own respective network interface-specific address spaces that are also node-specific. The network interface-specific address spaces may be combined to form a node-specific address space and/or may be managed as separate address spaces. The adjectives “node-specific” and “network interface-specific” may be used interchangeably.

A scope-specific identifier differs from a scoped address. Scoped addresses are described in RFC 4007, RFC 3513, and further described in application Ser. No. 11/962,285, by the present inventor, filed on 2007 Dec. 21, entitled “Methods and Systems for Sending Information to a Zone Included in an Internet Network”. A scoped address space is shared by nodes in a given scope. While a link-local scoped address is specific to a particular node, a link-local scoped address simply identifies a network interface component local to the particular node. A loop-back internet address is specific to a node as well. Neither link-local scoped addresses nor loop-back addresses identify one node to another. As such, neither serves as a node-specific identifier as defined above.

A “scoped address” is described by RFC 3513 and RFC 4007 as an identifier that, in a particular region of a network, serves as a protocol address of a network interface and/or a node in the particular region. The extent of the particular region is referred to as the scope of the region and thus the scope within which the identifier serves as a protocol address. A particular region included within a scope is indicated by its span. A scoped address is a valid protocol address only within a particular region as indicated by the address's indicated scope. Examples of scope indicators include node-scope where identifiers are valid only to a single node in the indicated span, LAN-scope where identifiers are valid for nodes in the span of a particular LAN, and subnet-scope where identifiers are valid only for nodes in a particular subnet. RFC 3513 currently defines support for link-local scope, site-local scope, and global scope. A data unit transmitted with a scoped address should not be delivered to node that does not have a network interface in the span indicated by the scope.

“Path information” is any information that identifies a network path, such as a hop path, for data transmitted via one or more specified network protocols. Path information may be identified by identifying network interfaces, NICs, nodes, and/or hops included in a network path.

For ease of illustration, the description that follows focuses on IP networks and protocols in the TCP/IP suite due to their wide use and because they are well-known in the art. Those skilled in the art will understand upon reading the descriptions herein that the subject matter disclosed herein is not restricted to the network protocols described and/or their corresponding OSI layers. For example, link layer protocols and link-layer networks are considered to be within the scope of the subject matter of this disclosure.

The term “metric space”, as used herein, refers to a set, as defined in mathematics, where a distance between elements of the set is defined according to a metric. Metric spaces defined in Euclidean geometry are well-known examples. Those skilled in the art of metric spaces, such as Euclidian spaces, will appreciate that a one-to-one mapping may be determined and/or otherwise identified for mapping addresses from a first coordinate space having a first origin for a metric space to addresses from a second coordinate space having a second origin in the metric space. Given a mapping rule between a first scope-specific address space and a second scope-specific address space and a mapping between the second scope-specific address space and a third scope-specific address space based on a third coordinate space identifying a third origin in the metric space, a mapping from the first coordinate space to the third coordinate space may be determined. A mapping between coordinate spaces for a metric space may include, for example, coordinate shift and/or a rotation. The mapping may be pre-specified and accessible to the nodes in one or both address spaces. Mapping between locations in a number of different metric spaces is well known in mathematics. For example, a top half of the surface of sphere may be mapped to a plane. Some will further appreciate that some metric spaces may be mapped to other metric spaces. Some of these mappings are one-to-one and/or on-to.

A “source-route protocol address”, as the term is used herein, is a protocol address of a network protocol that identifies a protocol endpoint in a second node for a first node, and that also includes or otherwise identifies at least one path node that communicatively couples the first node and the second node. A node identified by a source-route protocol address may be identified by a network interface identifier of a network interface in the path node, by a hop that includes the path node, and by a protocol address that for a network protocol identifies the path node to another node in a network path that communicatively couples the first node and the second node.

Execution Environment:

An exemplary device included in an execution environment that may be programmed, adapted, modified, and/or otherwise configured according to the subject matter is illustrated in FIG. 1. FIG. 1 illustrates a hardware device 10100 included in an execution environment 10102. FIG. 1 illustrates that execution environment 10102 includes a processor 10104, such as one or more microprocessors; a physical processor memory 10106 including storage locations identified by addresses in a physical memory address space of processor 10104; a persistent secondary storage 10108, such as one or more hard drives and/or flash storage media; an input device adapter 10110, such as a key or keypad hardware, a keyboard adapter, and/or a mouse adapter; an output device adapter 10112, such as a display and/or an audio adapter to present information to a user; a network interface component, illustrated by a network interface adapter 10114, to communicate via a network such as a LAN and/or WAN; and a mechanism that operatively couples elements 10104-10114, illustrated as a bus 10116. Elements 10104-10114 may be operatively coupled by various means. Bus 10116 may comprise any type of bus architecture, including a memory bus, a peripheral bus, a local bus, and/or a switching fabric.

Processor 10104 may access instructions and data via one or more memory address spaces in addition to the physical memory address space. A memory address space includes addresses identifying locations in a processor memory. The addresses in a memory address space are included in defining a processor memory. Processor 10104 may have more than one processor memory. Thus, processor 10104 may have more than one memory address space. Processor 10104 may access a location in a processor memory by processing an address identifying the location. The processed address may be identified by an operand of an instruction and/or may be identified by a register and/or other portion of processor 10104.

FIG. 1 illustrates a virtual processor memory 10118 spanning at least part of physical processor memory 10106 and may span at least part of persistent secondary storage 10108. Virtual memory addresses in a memory address space may be mapped to physical memory addresses identifying locations in physical processor memory 10106. Both physical processor memory 10106 and virtual processor memory 10118 are processor memory, as defined above.

Physical processor memory 10106 may include various types of memory technologies. Exemplary memory technologies include static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 10100 SDRAM, Double Data Rate SDRAM (DDR SDRAM), Enhanced SDRAM (ESDRAM), SyncLink DRAM (SLDRAM), Ferroelectric RAM (FRAM), RAMBUS DRAM (RDRAM) Direct DRAM (DRDRAM), and/or XDRTM DRAM. Physical processor memory 10106 may include volatile memory as illustrated in the previous sentence and/or may include non-volatile memory such as non-volatile flash RAM (NVRAM) and/or ROM.

Persistent secondary storage 10108 may include one or more flash memory storage devices, one or more hard disk drives, one or more magnetic disk drives, and/or one or more optical disk drives. Persistent secondary storage may include a removable data storage medium. The drives and their associated computer readable media provide volatile and/or nonvolatile storage for computer-executable instructions, data structures, software components, and other data.

Execution environment 10102 may include software components stored in persistent secondary storage 10108, in remote storage accessible via a network, and/or in a processor memory. FIG. 1 illustrates execution environment 10102 including an operating system 10120, one or more applications 10122, and other software components and/or data components illustrated by other libraries and subsystems 10124. In an aspect, some or all software components may be stored in locations accessible to processor 10104 in a shared memory address space shared by the software components. The software components accessed via the shared memory address space may be stored in a shared processor memory defined by the shared memory address space. In another aspect, a first software component may be stored in one or more locations accessed by processor 10104 in a first address space and a second software component may be stored in one or more locations accessed by processor 10104 in a second address space. The first software component is stored in a first processor memory defined by the first address space and the second software component is stored in a second processor memory defined by the second address space.

Execution environment 10102 may receive user-provided information via one or more input devices illustrated by an input device 10128. Input device 10128 provides input information to other components in execution environment 10102 via input device adapter 10110. Execution environment 10102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 10128 included in execution environment 10102 may be included in device 10100 as FIG. 1 illustrates or may be external (not shown) to device 10100. Execution environment 10102 may include one or more internal and/or external input devices. External input devices may be connected to device 10100 via corresponding network interfaces such as a serial port, a parallel port, and/or a universal serial bus (USB) port. Input device adapter 10110 may receive input and provide a representation to bus 10116 to be received by processor 10104, physical processor memory 10106, and/or other components included in execution environment 10102.

An output device 10130 in FIG. 1 exemplifies one or more output devices that may be included in and/or that may be external to and operatively coupled to device 10100. For example, output device 10130 is illustrated connected to bus 10116 via output device adapter 10112. Output device 10130 may be a display device. Exemplary display devices include liquid crystal displays (LCDs), light emitting diode (LED) displays, and projectors. Output device 10130 presents output of execution environment 10102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. FIG. 1 illustrates network interface adapter (NIA) 10114 as a network interface component included in execution environment 10102 to operatively couple device 10100 to a network. A network interface component includes a network interface hardware (NIH) component and optionally a network interface software (NIS) component. Exemplary network interface components include network interface controllers, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., AMPS, TDMA, CDMA, GSM, GPRS UMTS, and/or PCS network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

Figure 2:
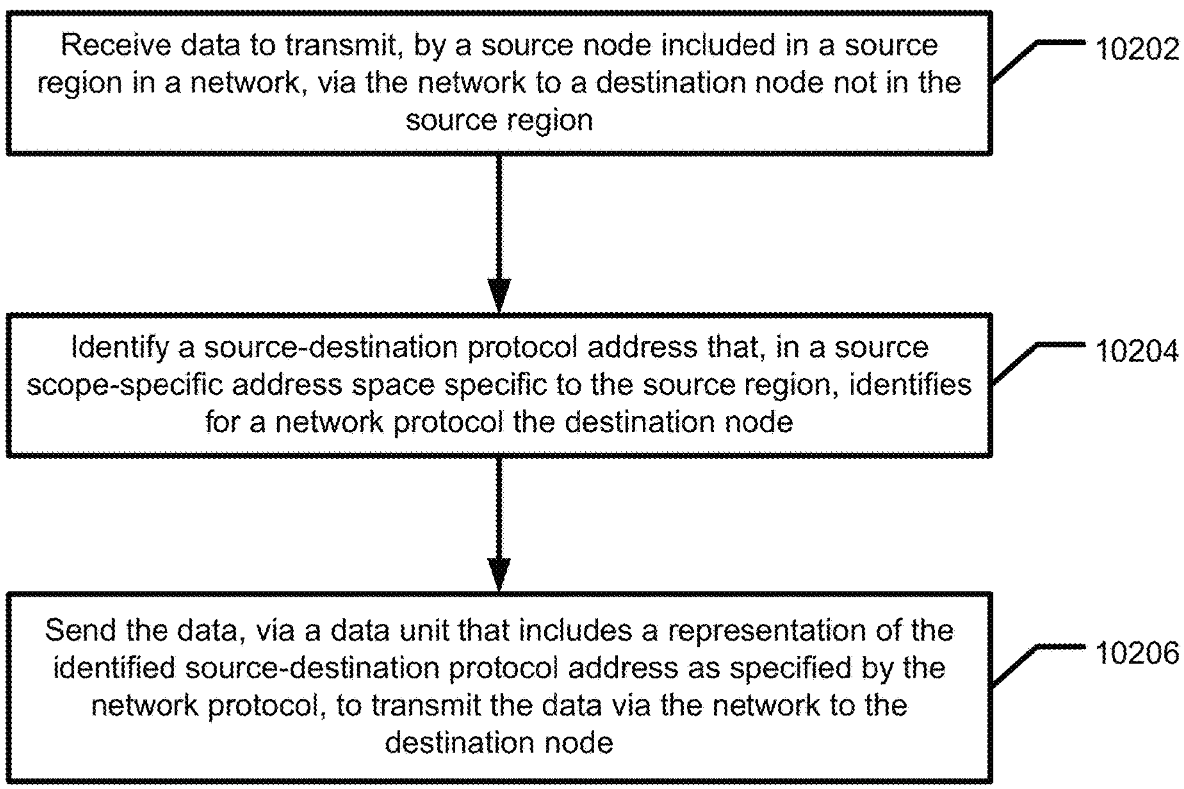
FIG. 2 is a flow diagram illustrating a method for transmitting data via a scope-specific protocol address according to an aspect of the subject matter described herein.
Figure 3:
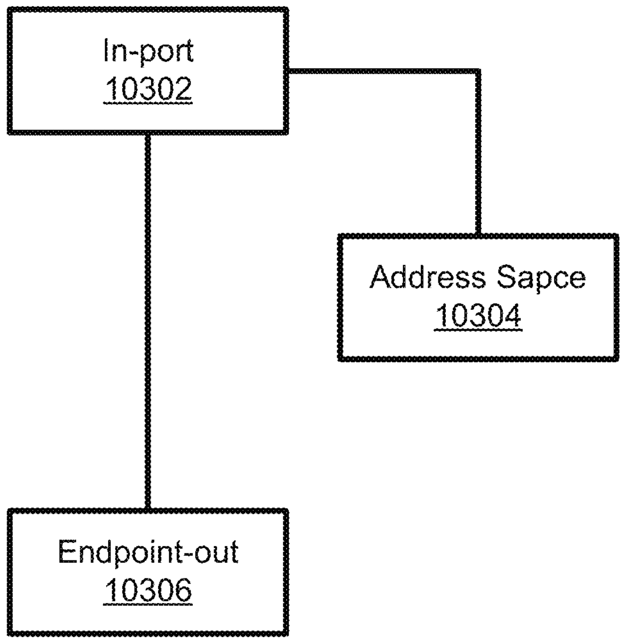
FIG. 3 is a block diagram illustrating an arrangement of components for transmitting data via a scope-specific protocol address according to another aspect of the subject matter described herein.

FIG. 3 illustrates an arrangement of components in a system that operates in an execution environment, such as execution environment 10102 in FIG. 1. The arrangement of components in the system operates to perform the method illustrated in FIG. 2. The system illustrated includes an in-port component 10302, an address space component 10304, and an endpoint-out component 10306. A suitable execution environment includes a processor, such as processor 10104, to process an instruction in at least one of an in-port component, an address space component, and an endpoint-out component.

Some components, illustrated in the drawings are identified by numbers with an alphanumeric suffix. A component may be referred to generically in the singular or the plural by dropping a suffix of a portion thereof of the component's identifier. For example, nodes; such as node **10502*a*1, node 10502*a*2, node 10502*a*3, and their adaptations and analogs; are referred to herein generically with respect to FIG. 5A as a node 10502 or execution environments 10502 when describing more than one. Nodes; such as node 10502*a*1, node 10502*b*2, node 10502*c*7, and their adaptations and analogs; are referred to herein generically with respect to FIGS. 5A-C as a node 10502 or execution environments 10502** when describing more than one. Other components identified with an alphanumeric suffix may be referred to generically or as a group in a similar manner.

Figure 4:
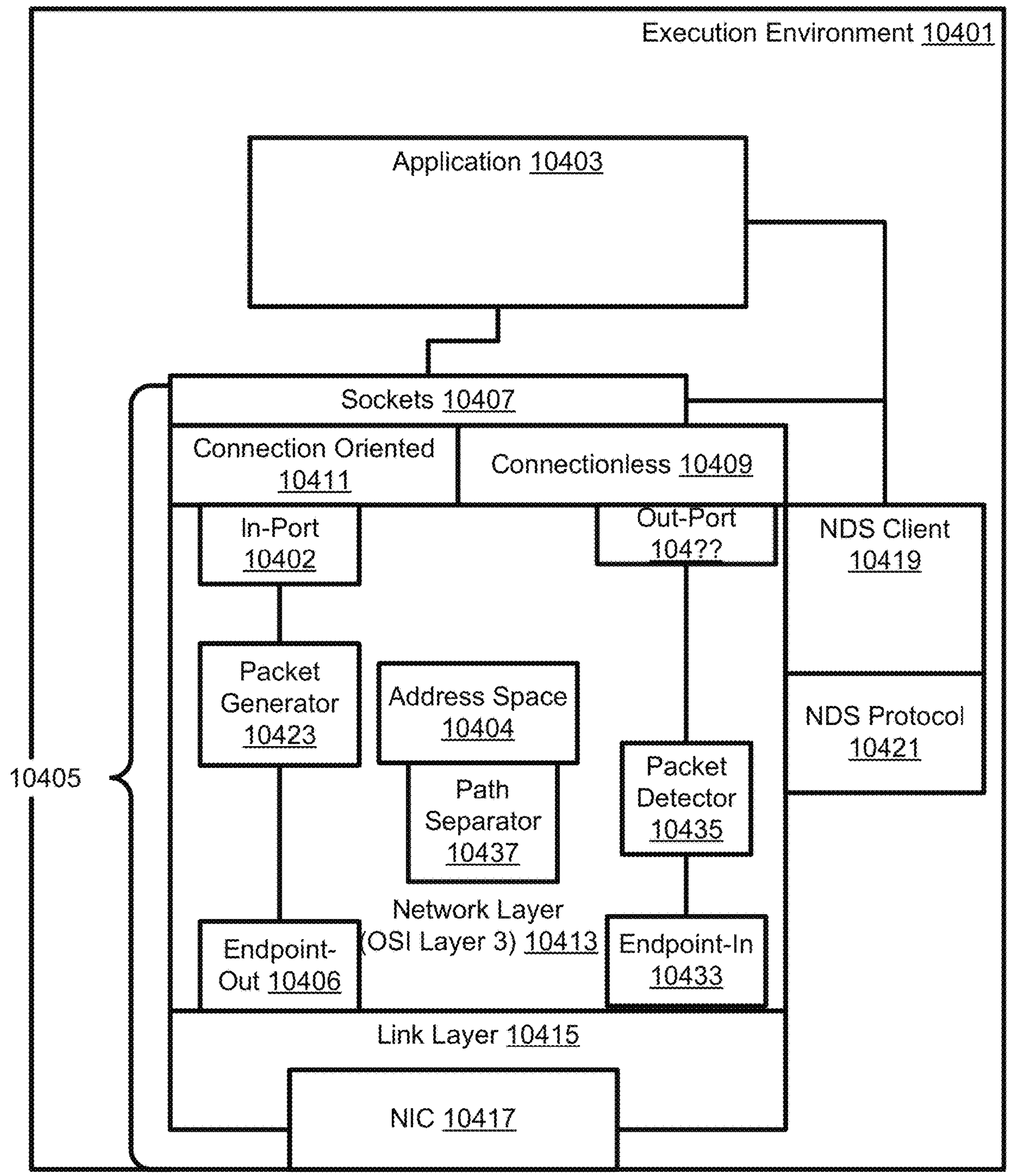
FIG. 4 is a block diagram illustrating an arrangement of components for transmitting data via a scope-specific protocol address according to another aspect of the subject matter described herein.

Some or all of the exemplary components illustrated in FIG. 3 may perform the method illustrated in FIG. 2 in a number of execution environments. FIG. 4 is a block diagram illustrating the components of FIG. 3 and/or analogs of the components of FIG. 3 respectively adapted for operation in an execution environment 10401 that includes and/or otherwise is provided by one or more nodes.

FIG. 1 illustrates components of an exemplary device that may at least partially provide and/or otherwise be included in an execution environment. The components illustrated in FIG. 4 may be included in or otherwise combined with the components of FIG. 1 to create a variety of arrangements of components according to the subject matter described herein. Those skilled in the art will understand that other execution environments in addition to the various adaptations, analogs, and instances of the execution environments described herein are suitable for hosting an adaptation of the arrangement in FIG. 3.

Figure 5A:
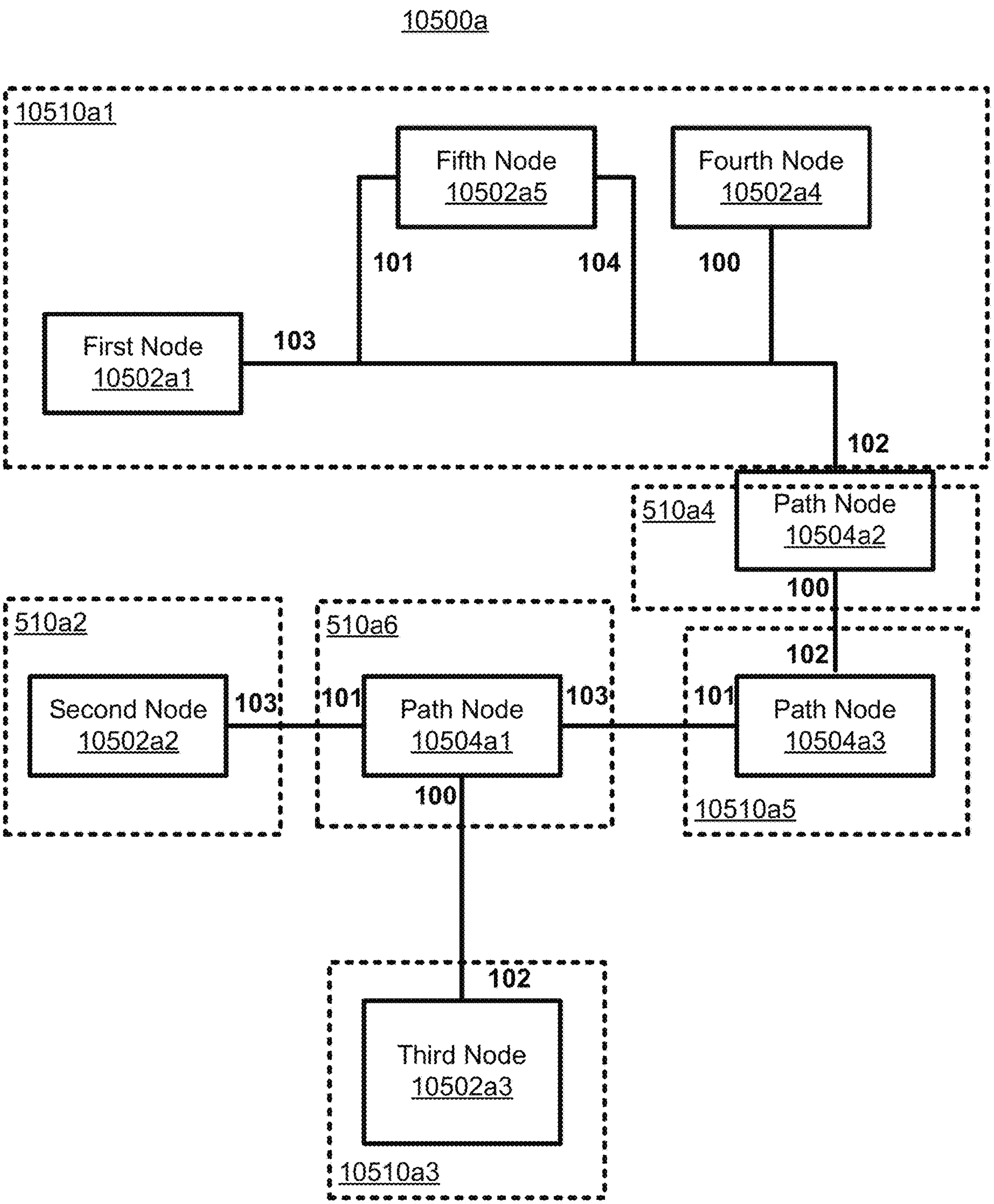
FIG. 5A is a network diagram illustrating an exemplary system for transmitting data via a scope-specific protocol address according to another aspect of the subject matter described herein.
Figure 5B:
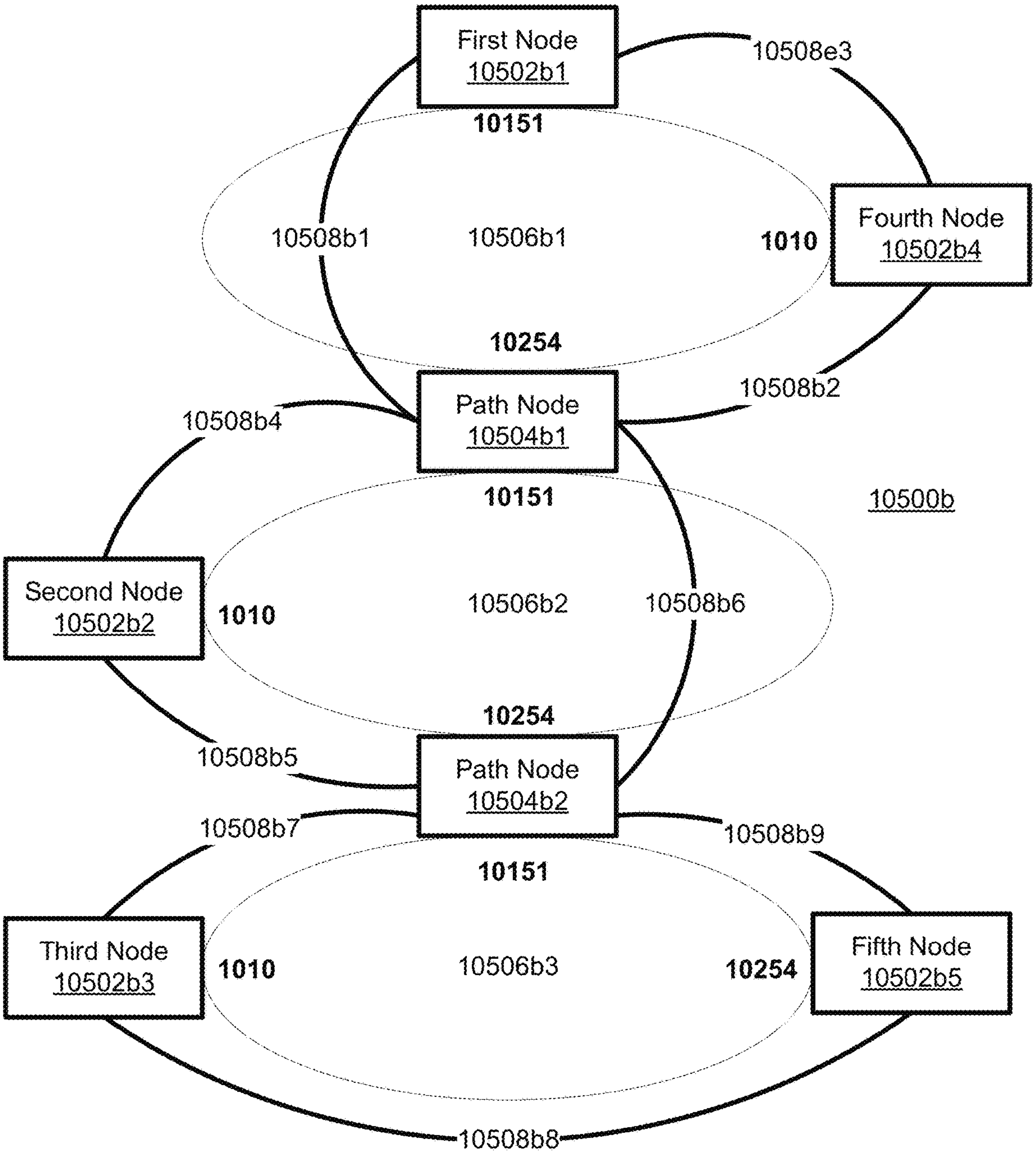
FIG. 5B is a network diagram illustrating an exemplary system for transmitting data via a scope-specific protocol address according to another aspect of the subject matter described herein.
Figure 5C:
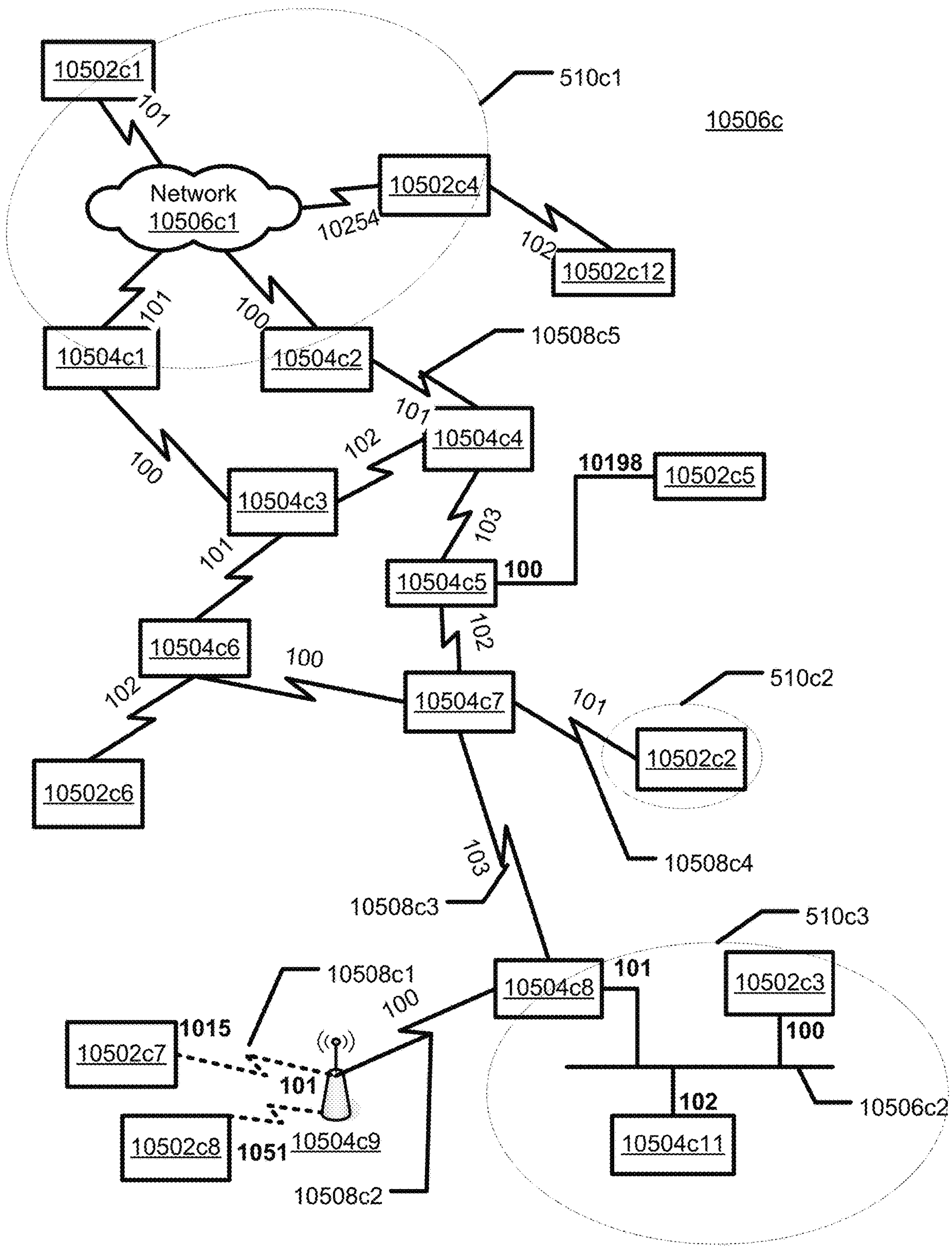
FIG. 5C is a network diagram illustrating an exemplary system for transmitting data via a scope-specific protocol address according to another aspect of the subject matter described herein.

FIGS. 5A-C respectively illustrate networks 10500*a* including nodes that in various aspects may include adaptations, analogs, and instances of an execution environment 10401, illustrated in FIG. 4. The various illustrated nodes are operatively coupled via network interface components to the respective networks 10500*a* in FIGS. 5A-C. While any node may perform the method illustrated in FIG. 2, for ease of illustration, each of FIGS. 5A-C includes nodes 10502 for describing adaptations of the arrangement in FIG. 3 performing different aspects of the method illustrated in FIG. 2. an adaptation, analog, and/or instance of execution environment 10401, in FIG. 4, may be described as being included in and/or operating in a node 10502 in describing some aspects of the method illustrated in FIG. 2. Other nodes, such as path nodes 10504, in FIGS. 5A-C are described in terms of one or more roles they may play in interoperating with one or more nodes 10502. Exemplary path nodes 10504 include a router, a gateway, a switch, a virtual private network concentrator, a modem, a wireless access point, a bridge, a hub, a repeater, a firewall, a proxy server, an application for relaying messages, and the like.

FIG. 4 illustrates an execution environment 10401 hosting a program, illustrated by an application 10403 that sends and/or receives data via a network stack 10405. The network stacks 10405 in FIG. 4 may be structured according to a layered architecture or model. FIG. 4 illustrates components that may be included in a network stack having a layered structure. Some components illustrated in the network stack 10405 correspond to components of the layered architecture specified by the Open System Interconnection (OSI) model, known to those skilled in the art. For example, a network stack 10405 may comply with the specifications for protocols included in the TCP/IP protocol suite. The OSI model specifies a seven-layer stack. The TCP/IP protocol suite may be mapped to layers three and four of the seven layers. Those skilled in the art will understand that fewer or more layers may be included in various adaptations, analogs, and/or instances of execution environment 10401 illustrated in FIG. 4, and in aspects described herein as well as other execution environments suitable for hosting an adaptation of the arrangement of components illustrated in FIG. 3.

An application, such as a networking application 10403 operating in a node 10502, may exchange data with another node 10502 by interoperating with one or more components of a corresponding network stack 10405. In FIG. 4, a networking application 10403 may interoperate with a sockets component 10407 to access a protocol endpoint, via a socket, to send data via one or more data units to and/or to receive data via a one or more data units from another node 10502. The application may specify an attribute of a protocol to the sockets component 10407 to open a specified type of protocol endpoint of a network protocol supporting the specified attribute.

FIG. 4 illustrates a sockets component 10407 operatively coupled to a connectionless component 10409 supporting an unreliable transport layer protocol where delivery of data is not guaranteed and a connection-oriented component 10411 configured to support a reliable transport layer protocol designed to guarantee data delivery or to otherwise notify the application of a delivery failure. The user datagram protocol (UDP) in the TCP/IP protocol suite is currently the most widely used connectionless transport layer protocol. The most widely used connection-oriented transport layer protocol currently in use is the transmission control protocol (the TCP) also included in the TCP/IP protocol suite.

Transport layer protocols supported by connectionless component 10409 and by connection-oriented component 10411 generate transport layer data units to include data received from an operatively coupled application to deliver the data via the data units according to a network layer protocol to a transport layer protocol endpoint, such as a socket, in another node 10502. Analogously, data sent via an application in another node via a transport layer component may be received according to the network layer protocol by a compatible transport layer component, such as a connection-oriented component 10411 and/or by a connectionless component 10409, to deliver via a socket to an application operating in the execution environment 10401 in the receiving other node 10502.

FIG. 4 illustrates a network layer component 10413 that delivers data according to a network layer protocol from a source node to a destination node across a link, a LAN, a WAN, and/or an internet, such as the Internet and/or an intranet.

A network layer protocol is designed and configured to deliver data across one or more communication links and/or networks between nodes in a network or internet. In FIG. 4, a network layer component 10413 may receive a transport layer data unit from a connection-oriented component 10411 or a connectionless component 10409, or data from another component in execution environment 10401. The network layer component 10413 may format and/or otherwise package the data in network layer data units. The data units may be sent, via a linker layer protocol, to a next node in a network path to a destination node.

One or more link layer protocols may be included in communicatively coupling a source node 10502 and a destination node 10502 via a network path that includes one or more path nodes 10504 as illustrated in FIGS. 5A-C. In FIG. 4, a network layer component 10413 may provide a network layer data unit as data (i.e. a message) to a component supporting a link layer protocol compatible with exchanging data via a physical data transmission medium coupled to a NIC. A link layer component 10415, in FIG. 4, illustrates a component in execution environment 10401 supporting a link layer protocol. Exemplary link layer protocols include Ethernet, Token-ring, and asynchronous transfer mode (ATM), to name a few. Some or all of a link layer component 10415 may be included in a NIC, as illustrated in FIG. 4 by a NIC 10417. A portion of a link layer component may be external to an operatively coupled NIC. The external portion may be realized, at least in part, as a device driver for the NIC. Exemplary physical data transmission media include Ethernet cables of various types, co-axial cable, and fiber optic cable, and various media suitable for carrying various types of wireless signals.

For ease of illustration, the description that follows focuses on IP networks and protocols in the TCP/IP suite due to their wide use and because they are well-known in the art. Those skilled in the art will understand that the scope of the subject matter described is not limited to IP networks. For example, link layer protocols and networks are considered to be within the scope of the subject matter of this disclosure.

With respect to FIG. 4, a link layer component 10415 may receive a network layer data unit for a network layer component 10413. The network layer data unit may be formatted as one or more IP protocol packets from the network layer component 10413 supporting the Internet Protocol (IP). The link layer component 10415 packages IP packets from network layer component 10413 according to the particular link layer protocol supported. The link layer component 10415 may include a network layer data unit in one or more link layer data units. Analogously, the link layer component 10415 interprets data, received as signals transmitted by the physical medium operatively coupled to the NIC 10417, according to a particular link layer protocol supported to receive network layer data units in one or more link layer data units. The link layer component 10415 may strip off link layer specific data and transfer the payload of the link layer data units to the network layer component 10413 to process the included network layer data unit.

A network layer component 10413 operating in a node 10502 may communicate with one or more nodes 10502 over a LAN, a link, and/or a network of networks such as an intranet or the Internet. A network layer component 10413 in the node 10502 may receive transport layer data units, for example, formatted as TCP packets from a connection-oriented layer component 10411 and/or transport layer data units formatted as UDP packets from a connectionless component 10409 illustrated in FIG. 4. The network layer component 10413 packages transport layer data units from the connection-oriented component 10411 and/or the transport layer data units from the connectionless component 10409 into network layer data units, such as IP packets, to transmit across a network 10500*a* operatively coupled to the node. The network 10500*a* may be and/or may include an internet.

Analogously, the network layer component 10413 interprets data, received from a link layer component 10415 in the node 10502*b*, as IP protocol data and detects IP packets in the received data. The network layer component 10413 may strip off IP layer specific data and transfer the payload of one or more IP packets to the connection-oriented layer component 10411 and/or to the connectionless component 10409 to process as transport layer data units according to a particular transport layer protocol.

As described above, FIG. 4 illustrates a network stack 10405 that sends and receives data over a network, such as networks 10500*a* illustrated in FIGS. 5A-C, via a network interface component, such as a NIC 10417. For example, a networking application 10403 in FIG. 4 operating in a first node 10502 may interoperate with another application operating in a second node 10502 via their respective network stacks 10405.

In addition to the protocols described above, protocols corresponding to layers in the OSI model above the transport layer may be included in communicating via a network. The term "application protocol" as used herein refers to any protocol or combination of protocols that correspond to one or more layers in the OSI reference model above the transport layer. Programs and executables operating in execution environments 10401 may communicate via one or more application protocols. Exemplary application protocols include a hypertext transfer protocol (HTTP), various remote procedure call (RPC) protocols, various instant messaging protocol, email protocols, and various presence protocols.

Data exchanged between nodes 10502 in a network 10500*a* may be exchanged via data units of one or more protocols. Each layer of a network stack may provide a layer specific protocol component. Some protocols, combine services from multiple layers of the OSI model into a single layer such as the Systems Network Architecture (SNA) protocol. Still others may take a hybrid approach. With the advent of software defined networking and flexible protocols such as OpenFlow, new protocols and variations of existing protocols are being introduced and will be introduced that are within the scope of the subject matter of the present disclosure.

A network protocol is defined by one or more formatting rules and/or a vocabulary referred to as a schema. The schema defines valid data units to exchange between and/or among protocol endpoints defined by the respective network protocol. A network protocol also specifies and/or otherwise is compatible with one or more address spaces for identifying protocol endpoints for exchanging data. The terms "identifier space" and "address space" are used interchangeably herein. For example, various versions of hypertext transfer protocol (HTTP) specify a format for HTTP uniform resource locators (URL). HTTP specifies a location in a HTTP header that identifies a URL as an identifier or address from the HTTP address space that identifies both a resource and recipient of a HTTP data unit. The transmission control protocol (TCP) specifies a format and vocabulary for a TCP header including a destination protocol endpoint field for including what the TCP refers to as a destination port number that, when combined with a destination protocol address from an IP packet, identifies a transport layer protocol endpoint of a receiver of data included in a TCP data unit. A sending endpoint is similarly identified by a source port number included in a source protocol endpoint field of a TCP data unit and a source protocol address from an IP data unit.

Other exemplary address spaces that identify protocol endpoints in various protocols include an email address space identifying a protocol endpoint for the simple mail transfer protocol (SMTP), a telephone number address space for various telephony protocols, instant message address spaces for various instant message protocols, and media access control (MAC) addresses for various link layer protocols, to name just a few examples.

In delivering data across a network between protocol endpoints, addresses from address spaces of the various protocols at the various layers may be translated and/or otherwise mapped between the various layers of a network stack. For example, a unicast IP address in an IP packet is mapped to link layer addresses for the various links the IP packet is transported across in a network path via a path node 10504 between a source node 10502 sending the IP packet and a destination node 10502 receiving the IP packet. Addresses at the various layers are assigned from a suitable address space of network protocols of the respective layers.

Since addresses from address spaces at various layers of a network stack are often not suited for remembering and/or identifying by users, an address space of symbolic identifiers or names may be used to provide aliases for addresses in an address space identifying protocol endpoints corresponding to a protocol supported by a layer of a network stack. The domain name space is a well-known identifier space of names for identifying nodes and/or network interfaces as protocol endpoints of the IP protocol in the Internet, private internets, and intranets. The domain name system (DNS) is a collection of domain name system services maintaining databases that associate names from the domain name space with protocol addresses, in particular with IP addresses. The domain name space defines a global name space shared across the Internet.

FIG. 5B illustrates a network path, as defined above, for transmitting data via a network protocol from a first node 10502*b*1 to a fifth node 10502*b*5 in a network 10500*b* that includes a sequence of nodes including of the first node 10502*b*1, a first path node 10504*b*1, a second path node

**10504*b*2, and the fifth node 10502*b*5. In FIG. 5C, a first network path communicatively coupling a seventh node 10502*c*7 and an eighth path node 10504*c*8 includes a first sequence of nodes including the seventh node 10502*c*7, a ninth path node 10504*c*9, and the eighth path node 10504*c*8. The first network path, as FIG. 5C illustrates, is included in a second network path communicatively coupling the seventh node 10502*c*7 and a second node 10502*c*2 that includes a second sequence of nodes including the nodes in the first sequence, a seventh path node 10504*c*7, and the second node 10502*c*2**. A network path may be a physical network path and/or a logical network path based on a particular network protocol defining the protocol endpoints.

FIG. 5B, illustrates a number of network paths and hop paths communicatively coupling a first node **10502*b*1 and a fifth node 10502*b*5 in a network 10500*b*. One hop path illustrated includes a sequence of hops including a first hop 10508*b*1, a sixth hop 10508*b*6, and a ninth hop 10508*b*9. In FIG. 5C, the first network path described above communicatively coupling the seventh node 10502*c*7 and the eighth path node 10504*e*8 includes a first sequence of hops including a first hop 10508*c*1 and a second hop 10508*c*2. The first network path is included in the second network path described above that includes a second sequence of hops including the first sequence of hops, a third hop 10508*c*3, and a fourth hop 10508*c*4**.

In FIG. 5B, the network path described above communicatively coupling the first node **10502*b*1 and the fifth node 10502*b*5 includes a sequence of network interfaces including a network interface in the first path node 10504*b*1 in the first hop 10508*b*1, a network interface in the second path node 10504*b*2 in the sixth hop 10508*b*6, and a network interface in the fifth node 10502*b*5 in the ninth hop 10508*b*9. The network paths, in FIG. 5**C and described above, may analogously be described as a sequence of network interfaces.

Aspects of Operation in Execution Environments

With reference to FIG. 2, a block 10202 illustrates that the method includes receiving data to transmit, by a source node included in a source region in a network, via the network to a destination node not in the source region. Accordingly, a system for transmitting data via a scope-specific protocol address includes means for receiving data to transmit, by a source node included in a source region in a network, via the network to a destination node not in the source region. The system for transmitting data via a scope-specific protocol address includes one or more processors and logic encoded in one or more computer readable media for execution by the one or more processors that when executed is operable for and/or is otherwise included in receiving data to transmit, by a source node included in a source region in a network, via the network to a destination node not in the source region.

For example, the arrangement in FIG. 3 includes an in-port component 10302 that is operable for and/or is otherwise included in receiving data to transmit, by a source node included in a source region in a network, via the network to a destination node not in the source region. FIG. 4 illustrates in-port components 10402 as adaptations and/or analogs of the in-port component 10302 in FIG. 3. One or more in-port components 10402 operate in an execution environment 10401 in and/or otherwise in association with one or more components of one or more network protocols. In FIG. 4, an in-port component 10402 is illustrated as a component of a network layer component 10413.

With reference to FIG. 2, a block 10204 illustrates that the method includes identifying a source-destination protocol address that, in a source scope-specific address space specific to the source region, identifies for a network protocol the destination node. Accordingly, a system for transmitting data via a scope-specific protocol address includes means for identifying a source-destination protocol address that, in a source scope-specific address space specific to the source region, identifies for a network protocol the destination node. The system for transmitting data via a scope-specific protocol address includes one or more processors and logic encoded in one or more computer readable media for execution by the one or more processors that when executed is operable for and/or is otherwise included in identifying a source-destination protocol address that, in a source scope-specific address space specific to the source region, identifies for a network protocol the destination node.

For example, the arrangement in FIG. 3 includes an address space component 10304 that is operable for and/or is otherwise included in identifying a source-destination protocol address that, in a source scope-specific address space specific to the source region, identifies for a network protocol the destination node. FIG. 4 illustrates address space components 10404 as adaptations and/or analogs of the address space component 10304 in FIG. 3. One or more address space components 10404 operate in an execution environment 10401 in and/or otherwise in association with one or more components of one or more network protocols. In FIG. 4, an address space component 10404 is illustrated as component of a network layer component 10413.

In FIG. 2, a block 10206 illustrates that the method includes sending the data, via a data unit that includes a representation of the identified source-destination protocol address as specified by the network protocol, to transmit the data via the network to the destination node. Accordingly, a system for transmitting data via a scope-specific protocol address includes means for sending the data, via a data unit that includes a representation of the identified source-destination protocol address as specified by the network protocol, to transmit the data via the network to the destination node. The system for transmitting data via a scope-specific protocol address includes one or more processors and logic encoded in one or more computer readable media for execution by the one or more processors that when executed is operable for and/or is otherwise included in sending the data, via a data unit that includes a representation of the identified source-destination protocol address as specified by the network protocol, to transmit the data via the network to the destination node.

For example, the arrangement in FIG. 3 includes an endpoint-out component 10306 that is operable for and/or is otherwise included in sending the data, via a data unit that includes a representation of the identified source-destination protocol address as specified by the network protocol, to transmit the data via the network to the destination node. FIG. 4 illustrates endpoint-out components 10406 as adaptations and/or analogs of the endpoint-out component 10306 in FIG. 3. One or more endpoint-out components operate in an execution environment 10401 in and/or otherwise in association with one or more components of one or more network protocols In FIG. 4, an endpoint-out component 10406 is illustrated as component of a network layer component 10413.

While the subject matter disclosed herein is applicable to network protocols at various layers, the present disclosure describes embodiments at layer 3 (i.e. the network layer) and layer 2 (i.e. the link layer) of the OSI stack. Examples of network layer protocols that may be modified to support various types of addresses described, such as scope-specific addresses, include an Internet Protocol (IP), DECNet outing Protocol (DRP), an Internetwork Packet Exchange (IPX) protocol, an Internet Datagram Protocol (IDP), a VINES Internet Protocol, and a Datagram Delivery Protocol (DDP).

Examples of link layer protocols that may be modified to support scope-specific addresses and/or other address types disclosed herein including variants and analogs include an Ethernet protocol, Token-ring protocol, FDDI protocol, and an asynchronous transfer mode (ATM) protocol.

A network protocol may be defined by a schema. The schema may define a data unit of the network protocol including a data portion, referred to herein as a payload portion, defined for including data to transmit between protocol endpoints of the network protocol. A protocol schema may specify a protocol address portion of a data unit defined to include a protocol address in an address space of the network protocol. A protocol address portion may be included in a data unit that identifies a destination node. A protocol address portion may be included in a data unit that identifies a source node. A protocol address portion in a data unit is not included in the payload portion of a data unit for the network protocol. The schema defines at least one rule and/or a vocabulary including one or more elements. The one or more rules and/or one or more elements in the vocabulary may define a constraint for including and/or otherwise identifying a protocol address in a data unit of the network protocol. Such a protocol address may identify, according to the schema, a destination protocol endpoint. A destination node that includes the destination protocol endpoint is identified as well.

Data to transmit in a payload portion may be received from an application process, such as application 10403, operating in an execution environment, such as execution environment 10401, of a source node such as various nodes 10502 in FIGS. 5A-C. The data may be received by a protocol layer component, such as network layer component 10412, that operates in the execution environment according to a network protocol. The data may be received by the protocol layer component from the application process interoperating via an interface of the protocol component directly and/or indirectly via one or more intervening components, such as protocol layer component of a higher layer protocol and/or a programming interface in the execution environment that may communicatively couple the application process with more than one protocol layer component.

A region having a scope-specific address space may include a network interface of a source node. FIG. 5A illustrates a first region 10510*a*1 of network 10500*a*. A first node 10502*a*1, a fifth node 10502*a*5, and a fourth node 10502*a*4 each include network interfaces in the first region 10510*a*1. A source node may include another network interface in another region of the network. A second path node 10504*a*2 in FIG. 5A illustrates a node that includes a network interface in the first region 10510*a*1 and includes a second network interface in a fourth region 10510*a*4. A source node may include one or more network interfaces all in a same network region, as illustrated by the fifth node 10504*a*5 in FIG. 5A.

A region of a network having a scope-specific address that identifies one or more nodes not in the region may be defined by a span of a scoped address. Scoped addresses are described in RFC 3513 and in RFC 4007 included by reference in the present disclosure above. The nodes in the span may identify one another for the network protocol via scoped addresses. In the first region 10510*a*1 in FIG. 5A each node may identify another node in the first region 10510*a*1 via an identifier of a network interface. The network interface identifiers server as identifiers of nodes in the first region 10510*a*1, as nodes in other regions may have the same network interface identifier as a node in the first region 10510*a*1. The first region 10510*a*1 is defined by the span of the network interface identifiers of the first node 10502*a*1, the fifth node 10502*a*5, and the fourth node 10502*a*4. A span may define a network region that includes two or more nodes communicatively coupled via a link. For example, the nodes 10502 in the first region 10510*a*1 may be include in an Ethernet LAN. Such a scope is referred to as a link-local scope. Other exemplary scopes for scoped addresses include site-local scope, LAN-local scope, geographic-local scope, and subnet-local scope. For a destination node, outside a network region defined by a scoped address space, no address in the scoped address space identifies the destination node to any node in the role of a source node with respect to the destination node. For example, a third node 10502*a*3 in a third network region 10510*a*3 in FIG. 5A has a network interface with an identifier illustrated as '2'. In the first region 10510*a*1, '2' identifies a network interface of the second path node 10504*a*2. The span of the scoped address, '2', is restricted to the first region 10510*a*1.

A protocol address that identifies a destination node may be identified in various ways, in various aspects. With respect to FIG. 5A and FIG. 4, an instance of an execution environment 10401 may be included and/or otherwise may be provided by a first node 10502*a*1 in a first region 10510*a*1 including a portion of a network 10500*a*. An in-port component 10402 may receive data to transmit to a destination node. An address space component 10402 in the first node 10502*a*1 may receive and/or otherwise detect address information from an application 10403 and/or one or more of a sockets component 10407, a connection-oriented component 10411, a connectionless component 10409, and an NDS client component 10419. The address information may include and/or otherwise identify a protocol address that identifies a destination node. A destination node not included in the first region 10510*a*1 may be identified by a protocol address in a scope-specific address space. A destination node in the first region 10510*a*1 may be identified by a scoped address, as described above. Alternatively or additionally, a protocol address from a global address space, such an IPv4 or IPv6 TBD protocol address may identify a destination node whether it is in the first region 10510*a*1 or not.

A protocol address may be formatted as required by the network protocol and address space supported by the network layer component 10413. Schemas for scope-specific address spaces are illustrated in FIGS. 6A-E and are described below. Alternatively or additionally, the protocol address may be received in another form, such as a text string. For example, a name or symbolic identifier of a destination node may be received and/or otherwise identified by an address space component 10404.

The first node 10502*a*1 may identify the destination node by identifying a protocol endpoint, of the network protocol, that is in a node outside the first region 10510*a*1. As defined and described herein, such a protocol endpoint may be identified by a protocol address from a first scope-specific address space specific to the first region 10510*a*1. The protocol address identifies the node including the protocol endpoint and identifies a network interface of the node. With respect of FIG. 5A, a first protocol address, in the first scope-specific address space, may serve as an identifier of a network interface of a second node 10502*a*2. The second node 10502*a*2 is illustrated in a second region 10510*a*2 that may include only the second node 10502*a*2.

The address information may be detected by the address space component 10404. The address space component 10404 may include instructions that when executed by processor are included in generating and/or storing a representation of the first protocol address as address information in a data unit specified according to the network protocol, such as the Internet Protocol, supported by the network layer component 10413. The address space component 10404 may interoperate with a packet generator component 10423 to include the address information in the data unit as specified by the network protocol.

In FIG. 5A, an identifier, 102.102.103.103, identifies a sequence of network interfaces of nodes in a network path communicatively coupling the second node 10502*a*2 and nodes in the first region 10510*a*1. The identifier identifies the second node 10502*a*2 to nodes in the first region 10510*a*1. The identifier may be represented in and/or otherwise by the first protocol address as the source-destination protocol address referred to in the method illustrated in FIG. 2. Exemplary representations are described below with respect to FIGS. 6A-E below. The sequence, 102.102.103.103, when specific to a node outside the first region 10510*a*1 may serve as a protocol address for another node other than the second node 10502*a*2 or may not identify any nodes with respect to the other node, as is the case illustrated in FIG. 5A.

A packet generator component 10423 in an execution environment 10402 of the first node 10502*a*1 may include one or more instructions that when performed by the first node 10502*a*1 identifies a source protocol address based on address information represented in a data unit of a network protocol to identify the first node 10502*a*1 as the source node of the data in the data unit. The packet generator component 10423 may interoperate with the address space component 10404 to receive the source address information to include a representation of the source protocol address in the data unit.

An address space component 10404 in the first node 10502*a*1 may identify a source protocol address that, in a second scope-specific address space specific to the second region 10510*a*2 that includes the second node 10502*a*2, identifies the first node 10502*a*1. The second scope-specific address space may be node-specific. The sequence, 101.101.100.103, identifies a sequence of network interfaces in a network path from the second node 10502*a*2 to the first node 10502*a*1 that, in a second node-specific address space specific to the second node 10502*a*2, identifies the first node 10502*a*1. The source protocol address may be pre-specified to the first node 10502*a*1 via a user and/or may be determined based on a previous communication with the second node 10502*a*2. The source protocol address may be retrieved via a request to a network directory service, as described in more detail below.

In another aspect, a packet generator component 10423 may receive source address information that identifies a scoped address that identifies the first node 10502*a*1 in the first region 10510*a*1. In FIG. 5A, the number ‘3’ may identify a network interface of the first node 10502*a*1 in the scope of the first region 10510*a*1. As the data is transmitted via the network path identified by the first protocol address to the second node 10502*a*2, the source address information included in one or more data units, included in transmitting the data, may be augmented and/or otherwise updated to provide source address information from which the second node 10502*a*2 may detect and/or may otherwise determine a protocol address that identifies the first node 10502*a*1 in an address space usable by the second node 10502*a*2.

A first node may detect address information that identifies a first-second protocol address that, in a first scope-specific address space specific to a first region that includes the first node, identifies the second node. Alternatively or additionally, the second node may detect address information that identifies a second-first protocol address that, in a second scope-specific address space specific to a second region that includes the second node, identifies the first node to the second node. Alternatively or additionally, the second node may receive address information identifying the first-second protocol address. The second node may determine the second-first protocol address based on the first-second protocol address. Alternatively or additionally, the first node may receive the second-first protocol address. The first node may determine the first-second protocol address based on the second-first protocol address.

Returning to FIG. 4 and FIG. 5A, address information may be detected, by an address space component 10404 operating in a network layer component 10413, in an address representation in a data unit received via the network 10500*a*. An instance of an execution environment 10401 may include and/or otherwise may be provided by the third node 10502*a*3 in a third region 10510*a*3 in the network 10500*a*. An address space component 10402 in the third node 10502*a*3 may receive and/or otherwise detect address information in a data unit received from another node, such as the second node 10502*a*2 via a NIC 10417 and a link layer component 10415 operating in the third node 10502*a*3, as described above. The data unit may be received from the link layer component 10415 via an endpoint-in component 10433 in the network layer component 10413. The data unit may be identified and/or otherwise detected by a packet detector component 10435 interoperating with the endpoint-in component 10433.

The packet detector component 10435 may detect an address representation in the data unit according to a schema defined by a network layer protocol supported by the network layer component 10413. The address information represented may be provided to an address space component 10404. An address space component 10404 operating in the third node 10502*a*3 may receive and/or otherwise detect the address information via a packet detector component 10435.

The address space component 10404 may determine an address space that includes a protocol address identified by the address information. For example, the address space component 10404 may identify that a protocol address detected in the address information is in a third scope-specific address space specific to a third region 10510*a*3 that includes the third node 10502*a*3 in detecting an identifier of a node, such as the second node 10502*a*2, that sent the data in the received data unit.

When the protocol address, identified in address information is detected by the address space component 10404, is not in an address space that is usable for sending data to another node, the address space component 10404 may determine a protocol address in a suitable address space as described in more detail below. The address space component 10404 may receive address information that identifies the third node, in a second scope-specific address space of the second node that sent the data unit. The address space component 10404 may determine a third-second protocol address that, in a third node-specific address space specific to the third node, identifies the second node 10502*a*2. In another aspect, the address information may identify a global or local scoped address. The data in the data unit may be provided by the network layer component 10413 to a protocol endpoint identified by a higher layer protocol as described above.

A scope-specific address may be formatted to be included in data units of an existing network protocol. For example, a schema for a scope-specific address space may be defined to include an address in the address space in an address field of a header of the IP protocol according to a currently existing specification, such as RFC 791 and/or RFC 3513. While such protocol addresses may have the same or substantially similar rules for valid format and content as those currently in use, the protocol addresses when processed according to the subject matter described herein are scope-specific and identify nodes in the context of regions to which they are specific. For details on the format and vocabularies of current address spaces refer to the appropriate specification. A type bit and/or a pattern of bits in a data unit header may be defined by a network protocol to indicate that address information in the data unit identifies a scope-specific address.

FIGS. 6A-E illustrate a number of exemplary address representations 10602*a* illustrating various address formats and vocabularies for representing scope-specific addresses. Various portions of the respective address representations 10602*a* are illustrated as contiguous, but need not be so in various embodiments according to the subject matter described herein. Each of the types of address representation 10602*a* shown in FIGS. 6A-E may be included in a destination protocol address portion and/or a source protocol address portion of an IPv4 data unit header and/or an IPv6 data unit header. Further, data units of various link layer protocol may be adapted to include analogous scope specific addresses for transmitting via one or more link layer network. A scope specific address may be identified as scope-specific by a bit pattern or identifier defined to identify a protocol address as a scope-specific address. The bit pattern or identifier may be stored in a type bits portion of a data unit, such as an IP packet, and/or in some other specified location.

Figure 6A:
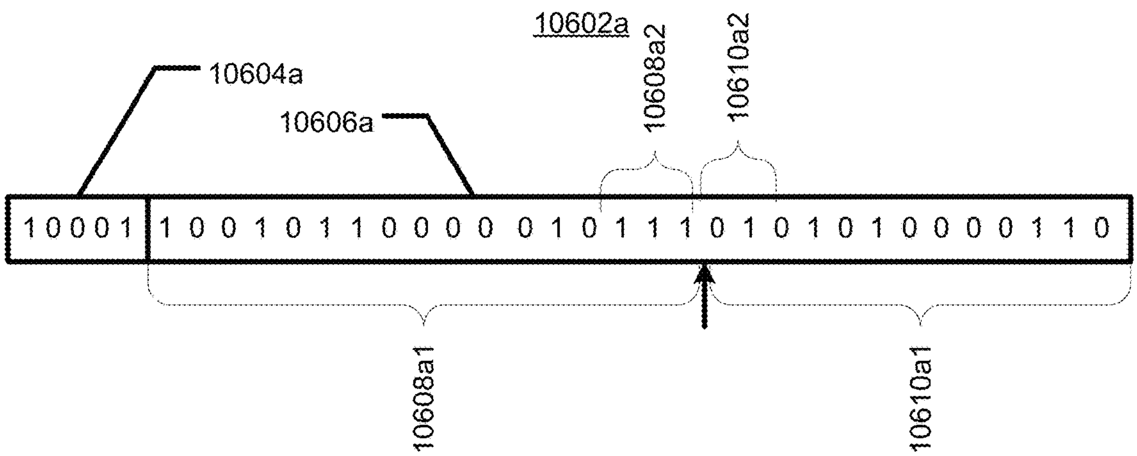
FIG. 6A is a diagram illustrating an exemplary representation of a protocol address according to another aspect of the subject matter described herein.

FIG. 6A illustrates an address representation 10602*a* that may be included in a data unit or packet of an Internet Protocol and/or may be used to transmit data via packets of a link layer protocol (e.g. via one or more link layer switches). An address representation 10602*a* may identify one or more scope-specific addresses for one or more respective nodes in a network path for transmitting data from one path end node to another. In an aspect, an address representation 10602*a* may be processed as including at least three portions. An address separator field 10604*a* is illustrated including a binary number. In FIG. 6A, the binary number illustrated equals seventeen in base ten. The number in the address separator field 10604*a* identifies a boundary in an address information field 10606*a* separating a first address field 10608*a* and a second address field 10610*a*. The first address field 10608*a* may identify a first protocol address that, in a first scope-specific address space of a first node, identifies a second node included in the network path. The second address field 10610*a* may identify a second protocol address that, in a second scope-specific address space of the second node, identifies the third node.

With respect to FIG. 5A, an address representation 10602*a* may be included in a data unit including data from the first node 10502*a*1 to transmit to the second node 10502*a*2. As described above, the sequence, 102.102.103.103, may be represented in an address information field 10606*a* to identify a first-second protocol address that, for the first node 10502*a*1, identifies the second node 10502*a*2. The first-second protocol address may be an identifier that, in the first scope-specific address space, identifies the second node 10502*a*2.

At the first node 10502*a*1, a packet generator component 10423 and/or an address space component 10404 operating in the first node 10502*a*1 may set and/or otherwise detect a value in the address separator field 10604*a* that indicates a first address field 10608*a* has a zero size. The entire address information field 10606*a*, thus, constitutes a second address field 10610*a* at the first node 10502*a*1 and identifies the first-second protocol address that may be set and/or otherwise detected by the path separator component 10437.

At a third path node 10504*a*3, an address separator field 10604*a* in a data unit including the data from the first node 10502*a*1 may be set to and/or otherwise may be detected, by a path separator component 10437 and/or an address space component 10404 in the third path node 10504*a*3, as a value that identifies 102.102, in a first address field 10608*a*. The information in the first address field 10608*a* identifies a protocol address that, in the first scope-specific address space identifies the third path node 10504*a*3. The value in the address separator field also identifies a second address field 10610*a* that identifies 103.103 as a protocol address that, in a fifth scope-specific address space specific to a fifth region 10510*a*5 including the third path node 10504*a*3, identifies the second node 10502*a*2.

At the second node 10502*a*2 a data unit including the data from the first node 10502*a*1 may include a value, set and/or detected by a path separator component in the second node 10502*a*2, in an address separator field 10604*a* that indicates that the address information field 10606*a* includes only a first address field 10608*a* identifying 102.102.103.103 as the first protocol address.

As the data from the first node 10502*a*1 is transmitted from node to node in the network path the value represented in an address separator field 10604*a* in an address information field 10606*a* in a data unit including the data or a portion thereof may be adjusted by respective path separator components 10437 in the nodes in the network path to identify a protocol address in a suitable address space for the respective nodes.

At the second node 10502*a*2, the value in the separator address field may indicate to an address space component 10404 that address information field 10606*a* also includes information for determining and/or otherwise identifying a second-first protocol address that, in the second scope-specific address space, identifies the first node 10502*a*1. An example and description are provided below.

The above describes an address representation 10602*a* processed to identify destination address information in a data unit of a network protocol, such as an IP protocol and/or a layer 2 protocol. An address representation 10602*a* may include source address information with respect to a node receiving data in a data unit, described in the previous paragraph, sent from the first node 10502*a*1 to the second node 10502*a*2. An address information field 10606*a* including source address information at the third path node 10504*a*3 may include a first address field 10608*a* identifying the sequence, 100.103, that identifies a protocol address that, in the fifth scope-specific address space specific to the fifth region 10510*a*5, identifies the first node 10502*a*1 as the source node for the data in the data unit. The address information field 10606*a* including the source address information at the third path node 10504*a*3 may include a second address field 10610*a* identifying the sequence 101.101 that identifies a protocol address that, in the second node-specific address space specific to the second region 10510*a*2, identifies the third path node 10504*a*3 as a path node in the network path traversed by the data sent from the first node 10502*a*1.

A destination-source protocol address, that in a destination scope-specific address space specific to a destination network region that includes the destination node, identifies the source node may be identified. A data unit may include separate address representations for destination address information and source address information as, for example, current IP packet headers are specified. Alternatively, a data unit such as an IP packet and or an Ethernet frame may include an address representation that identifies source address information in the context of one address space specific to a node, in a region, in a network path traversed by the data unit and identifies destination address information to another node, in another region in the network path.

A source-destination protocol address may identify a destination-source protocol address. Rather than requiring separate source and destination representations as current packet headers require, such as IP packets, a single address representation may identify some or all of a destination protocol address with respect to one scope-specific address space and some or all of a source protocol address with respect to another scope-specific address space. More details, as well as examples, are described below.

Figure 6B:
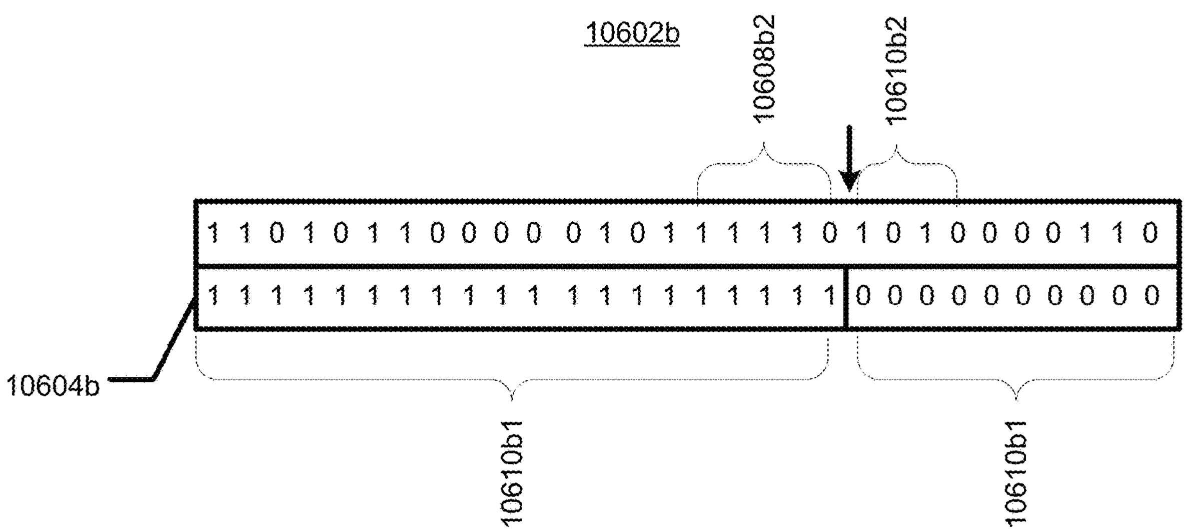
FIG. 6B is a diagram illustrating an exemplary representation of a protocol address according to another aspect of the subject matter described herein.

FIG. 6B illustrates another type of address representation 10602*b* that may be included in a data unit to provide address information according to a particular network protocol, such as IP, IPX, or ATM. Instead of or in addition to including an address separator field 10604*a* that distinguishes a first address field 10608*a* from a second address field 10610*a* based on a bit count, a bit-mask may be specified as one or more address separator fields 10604*b* to identify a first address field 10608*b* and a second address field 10610*b* in an address information field 10606*b*. Address information represented as illustrated in FIG. 6B may be processed in an analogous manner to that described for the address information represented in FIG. 6A based on the bit mask address separator field(s) 10604*b* rather than and/or in addition to a size address separator field 10604*a* illustrated in FIG. 6A.

Figure 6C:
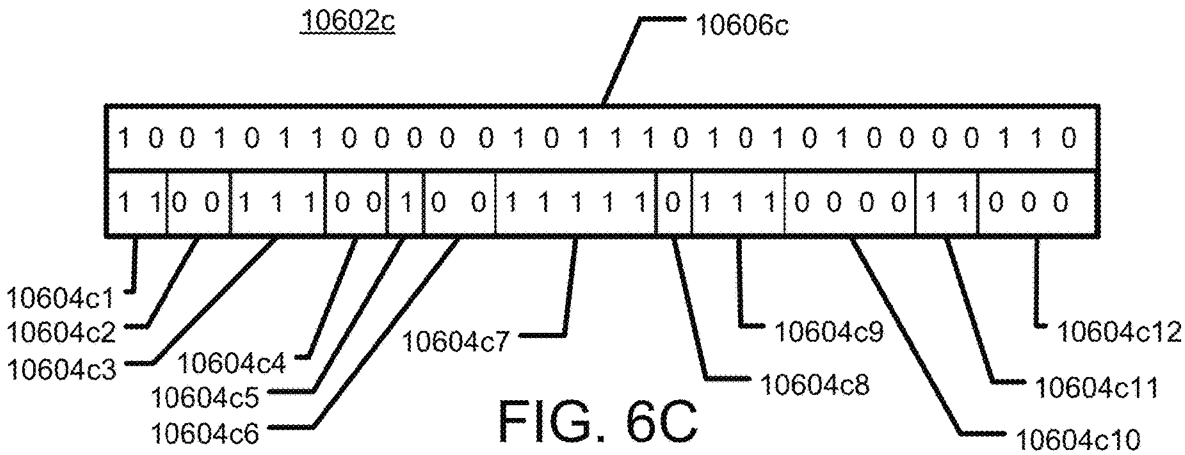
FIG. 6C is a diagram illustrating an exemplary representation of a protocol address according to another aspect of the subject matter described herein.

FIG. 6C illustrates an address representation 10602*c* identifying one or more scope-specific addresses. An address information field 10606*c* may be interpreted as one or more scope-specific addresses based on one or more address separator field(s) 10604*c*. Address separator fields 10604*c* are specified according to a network protocol to distinguish one node-specific address from another in an address information field 10606*c*. FIG. 6C illustrates an address separator field 10604*a* that distinguishes and/or identifies hop identifiers that may be scope-specific addresses and/or may be included in a scope-specific address. A scope-specific address may identify a node one hop away from the region for which the address is specific. The address separator fields 10604*c* distinguish separate hop identifiers based on changes in values of bits in consecutive address separator fields 10604*c*. In FIG. 6C, a first address separator field 10604*c*1 includes one or more 1-valued bits that correspond to bit positions in the address information field 10606*c* to identify a first address field referred to in FIG. 6C as a first hop information field. Scope-specific addresses that include more than one hop may be distinguished similarly as shown in FIG. 6B. Combinations of hop identifiers and path identifiers may be distinguished as scope-specific addresses by address separator fields 10604*a*. An illustrated second hop information field 10604*c*2 includes one or more 100-valued bits to identify a second hop information field in address information field 10606*c*. Additional alternating sequences of 1-valued bits and 0-valued bits illustrated by address separator fields 10604*c*310-12*c* correspond to and identify other hop information fields identifying hops in a network path communicatively coupling a pair of path end nodes and identified by a scope-specific address.

In FIG. 5C, a hop may be identified by an interface identifier of a network interface in a pair of communicatively coupled nodes included in the hop. For example, the number, 101 may serve as a hop identifier specific to a second path node 10504*c*2 to identify a fifth hop 10508*c*5 including the second path node 10504*c*2 and a fourth path node 10504*c*4. The number 101 also identifies a network path for exchanging data between the two nodes. The number 101 may also be a protocol address that, in a second path node-specific address space specific to the second path node 10504*c*2, identifies the fourth path node 10504*c*4. The number 101 may also identify a hop for the fourth path node 10504*c*4 to exchange data with the second path node 10504*c*2; may also be a protocol address that, in a fourth path node-specific address space specific to the fourth path node 10504*c*4 identifies the second path node 10504*c*2; and may identify a particular network interface of the second path node 10504*c*2 and/or of the fourth path node 10504*c*4.

A first node 10502*c*1 may identify a second node 10502*c*2 by a first-second protocol address that, in a first scope-specific address space specific to a first region 10510*c*1 including the first node 10502*c*1, identifies the second node 10502*c*2. The first-second protocol address may include and/or otherwise may be based on a sequence of hop identifiers 100.100.101.103.102.101. Note that other network paths are illustrated for transmitting data from the first node 10502*c*1 to the second node 10502*c*2 and may also be and/or otherwise may identify protocol addresses in the first scope-specific address space that identify the second node 10502*c*2 to nodes in the first region 10510*c*1. Note that the second path node 10504*c*2 includes a network interface that is in the first region 10510*c*1 and a network interface that is not in the first region. In communicating with the second node 10502*c*2, via the network interface outside the first region 10510*c*1, the second path node 10504*c*2 is defined to be outside the first region 10510*c*1. When the second path node 10504*c*2 communicates with a node outside the first region 10510*c*1 via the second path node's 10504*c*2 network interface in the first region 10510*c*1, the second path node 10504*c*2 is defined to be in the first region 10510*c*1. For example when the second path node 10504*c*2 communicates with a twelfth node 1050210*c*12 via fourth node 10502*c*4, the second path 10504*c*2 is in the first region 10510*c*2 with respect to the twelfth node 1050210*c*12.

The second node 10502*c*2 may identify a third node 10502*c*3 by a second-third protocol address that, in a second node-specific address space specific to the second node 10502*c*2 in the second region 10510*c*2, identifies the third node 10502*c*3. The protocol address may be based on a sequence of hop identifiers 101.103.100 that identifies the third node 10502*c*3 with respect to the second node 10502*c*2. The third node 10502*c*3 is in a third region 10510*c*3. Within the third region 10510*c*3, the third node 10502*c*3 may be identified by a local-scope address 100. Nodes in the third region 10510*c*3 may identify nodes outside the third region 10510*c*3 with identifiers from a third scope-specific address space specific to the third region 10510*c*3.

The hop identifiers, 100.101.103.102.101, may be represented in an address representation 10602*c* in a data unit for sending data from the first node 10502*c*1 to the second node 10502*c*2. The hop identifiers, 101.103.100, may be represented in an address representation 10602*c* in a data unit for sending data from the second node 10502$c$2 to the third node 10502$c$3. The identifiers may be given a bit or binary representation and the hop identifiers may be distinguished or separated via address separator fields 10604$c$ as described above with respect to FIG. 6C. An address separator field analogous to that shown in FIG. 6A may also or alternatively be included and processed as described above. Assignment of hop identifiers is described in application Ser. No. 13/727,649 filed on 2012 Dec. 27, entitled "Methods, Systems, and Computer Program Products for Assigning an interface Identifier to a Network Interface"; application Ser. No. 13/727,655 filed on 2012 Dec. 27, entitled "Methods, Systems, and Computer Program Products for Determining a Shared identifier for a Hop in a Network", and application Ser. No. 13/727,657 filed on 2012 Dec. 27, entitled "Methods, Systems, and Computer Program Products for Determining a Hop Identifier for a Network Protocol", by the present inventor.

Note that the address information that identifies protocol addresses for the second node 10502$c$2 and for the third node 10502$c$3 in the preceding description may include information for identifying a return path or a portion thereof. For example, the second-third protocol address 101.103.100 identifies 103.101, which may be a portion of a third-second protocol address that, in the third scope-specific address space, identifies the second node 10502$c$2 for nodes in the third region 10510$c$3. The first-second protocol address, 100.101.103.102.101, identifies 101.102.103.101 that, in the second-node-specific address space, identifies a network path from the second node to the first region 10510$c$1. Note that the second node may be in a region that includes only one node. The sequence, 101.102.103.101, however, does not identify any network interfaces of nodes in the first region 10510$c$1. Separate source address information may be included in a data unit sent to the second node 10502$c$2 that includes data sent from the first node 10502$c$1. The source address information may identify 101.102.103.101.10101 as a second-first protocol address that, in the second node-specific address space, identifies the first node 10502$c$2. In, the first region 10510$c$1, 10101 may be a scoped address that identifies the first node 10502$c$1 in the scope of the first region 10510$c$1. Thus, a scope-specific address may include a scoped address.

As described in the previous paragraph, a hop may be assigned an identifier that is shared by the pair of nodes in the hop. Thus, a sequence of hop identifiers may serve as a scope-specific address in one scope-specific address space when processed in one order of the sequence and may serve as another scope-specific address specific to another node when processed according to another order of the sequence. Any of the address types illustrated in FIGS. 6-C, along with various variants and analogs, are suitable for including reversible address information.

Figure 6D:
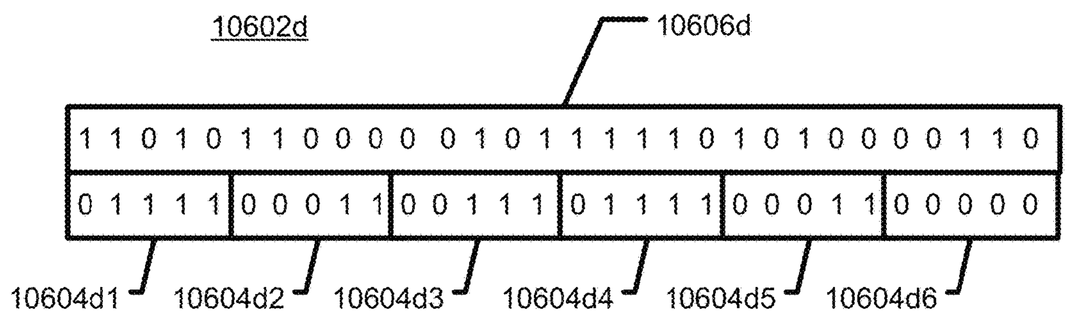
FIG. 6D is a diagram illustrating an exemplary representation of a protocol address according to another aspect of the subject matter described herein.

FIG. 6D includes an address representation 10602$d$ illustrating aspects of a schema for representing path information based on identifiers of network interfaces or other suitable pairs of numbers for identifying protocol endpoints of a hop and/or a network path. An address information field 10606$d$ includes path information identifying a network path for communicating data between a pair of path end nodes in the network path. FIG. 6D illustrates that an address representation 10602$d$ may include one or more address separator fields 10604$d$ that correspond to and/or otherwise identify respective one or more portions of the address information field 10606$d$ that are based on a pair of identifiers of protocol endpoints.

An address separator field 10604$d$ includes series of 1-valued bits and 0-valued bits. A change from a 1 value to a 0 value and vice versa may indicate a boundary that separates protocol endpoint identifiers and/or interface identifiers. An address separator field 10604$d$1 includes one 0-valued bit followed by four 1-valued bits. The 0-valued bit may be defined to indicate that a first network interface in a first hop identifier is 1 bit long with a corresponding position in the address information field 10606$d$.

FIG. 6D identifies the first interface identifier as the number 1 in base ten. The four 1-valued bits in the first address separator field 10604$d$1 may be similarly defined to identify the location of a second interface identifier in the first hop identifier. The second interface identifier, as illustrated in FIG. 6D, has the value 10 in base ten. The first hop identifier includes the numbers 101 and 1010. The first hop identifier may be represented as a string, 1-10. A second hop identifier is located by the end of the series of four 1-valued bits in the first address separator field 10604$d$1 to a series of three 0-valued bits that identify a boundary of a second address separator field 10604$d$2 for second hop information identifying a second hop identifier, and the three 0-valued bits also identify the location of a first interface identifier in second hop information in the address information field 10606$d$. Two subsequent 1-valued bits identify the location in the address information field 10606$d$ of a second interface identifier in the second hop information. The second hop identifier includes the numbers 6 and 0 in base ten. The remaining address separator fields 10604$d$ may be processed similarly. The protocol address illustrated FIG. 6D may be represented textually as 1-10.6-0.0-5.1-14.5-0.6.

Note that the address separator field 10604$d$6 does not identify a pair of identifiers and is similar to address separator fields 10604$c$ in FIG. 6C. Alternatively, an address separator field 10604$d$ may correspond to a portion of an address information field 10606$d$ that identifies a scoped address. This is illustrated to demonstrate that protocol addresses may be uniform or non-uniform in their format and content.

In FIG. 5B, a first node 10502$b$1 and a second node 10502$b$2 may be included in respective regions. Each of the two nodes may identify the other by a protocol address in a respective node-specific address space. For example, a sequence of pairs of interface identifiers 10151-1010254.10151-1010 may be a protocol address that, in a first node-specific address space specific to the first node 10502$b$1, identifies the second node 10502$b$2. The first node may send a data unit including an address representation 10602$d$ of the type illustrated in FIG. 6D.

Note that reversing the interface identifiers yields the identifier 1010-10151.10254-10151 that may be a protocol address that, in a second node-specific address space specific to the second node 10502$b$2, identifies the first node 10502$b$1. The second node 10502$b$2 and a third node 10502$b$3 may be included in regions that respectively include the nodes. Each of the two nodes may identify the other by a protocol address in a respective node-specific address space. A sequence of pairs of interface identifiers 1010-10254.10151-1010 may be a protocol address that, in the second node-specific address space, identifies the third node 10502$b$3. Reversing the interface identifiers yields the identifier 1010-10151.10254-1010 that may be a protocol address that, in a third node-specific address space specific to the third node 10502$b$3, identifies the second node 10502$b$2.

A sequence of hop identifiers based on interface identifiers may serve as a scope-specific address in one scope-specific address space when processed in one order of the sequence and may serve as another scope-specific address specific to another node when processed according to another order of the sequence.

Figure 6E:
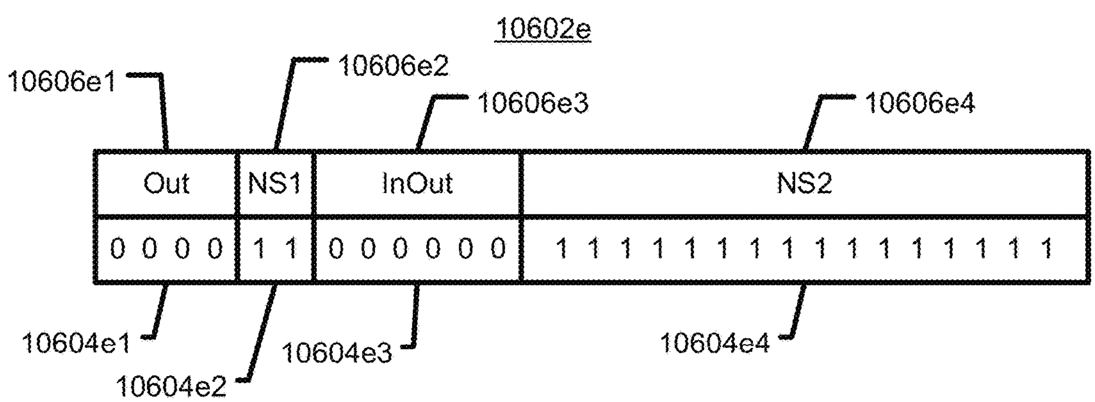
FIG. 6E is a diagram illustrating an exemplary representation of a protocol address according to another aspect of the subject matter described herein.

FIG. 6E illustrates an address representation 10602*e* that further demonstrates that a protocol address may be based on path information and/or may be based on address information that does not identify a network path. An address representation 10602*e* may include portions that include path information and/or portions that include scoped addresses. An address separator field 10604*e* is defined to distinguish address fields in a manner similar to the method described for distinguishing hop identifiers in FIG. 6C. A first address information field 10606*e*1 corresponding to the first address separator field 10604*e*1 includes a single interface identifier for an outbound network interface for a first node as described above with respect to FIG. 6A and FIG. 5C. A second address information field 10606*e*2 corresponding to a second address separator field 10604*e*2 may include a scoped address having an inside scope, an outside scope, or both. A node processing the second address information field 10606*e*2 may be included in a portion of a network spanned by the scope of the scoped address. The node may process the scoped address accordingly.

See application Ser. No. 11/962,285, by the present inventor, filed on 2007 Dec. 21, entitled "Methods and Systems for Sending Information to a Zone Included in an Internet Network" for a description of addresses having outside scope and/or inside scope and processing of such addresses. A third address information field 10606*e*3 corresponding to a third address separator field 10604*e*3 may include a pair of identifiers as described with respect to FIG. 6D. A fourth address information field 10606*e*4 corresponding to a fourth address separator field 10604*e*4 may include a protocol address analogous to one of the types of addresses described with respect to the second address information field 10606*e*2 such as a local-scoped address. FIG. 6E illustrates that a scope-specific address specific to a node may include an address and/or a portion of an address that are/is not from a scope-specific address space.

In FIG. 5B, a first node 10502*b*1 may be included in a first region that includes network interfaces coupling nodes to a first network 10506*b*1 included in the network 10500*b*. A second node 10502*b*2 may be included in a second region that includes network interfaces coupling nodes to a second network 10506*b*2. Each of the two nodes may identify the other by a protocol address in their respective scope-specific address spaces. For example, a sequence of scoped addresses 10254.1010 may be a protocol address that, in a first scope-specific address space specific to the first network 10506*b*1, may identify the second node 10502*b*2 to the first node 10502*b*1, as well as to other nodes in the first region defined by the first network 10506*b*1. A data unit including an address represented as in 10602*e* in FIG. 6E may identify a scope-specific address based on a sequence of scoped addresses. Similarly, a sequence of scoped addresses 10254.1010 may be a protocol address that, in a second scope-specific address space specific to the second network 10506*b*2, identifies a third node 10502*b*3 to the second node 10502*b*2 as well as to other nodes in the second region defined by the second network 10506*b*2.

As described above, a source-destination protocol address may include and/or may otherwise identify source-destination path information identifying a source-destination network path included in communicatively coupling the source node and the destination node. A source-destination protocol address may include and/or may otherwise identify first hop information identifying a first hop including a first pair of communicatively coupled nodes included in communicatively coupling the source node and the destination node. At least one the hop identifier may include and/or may otherwise identify an identifier of at least one of the nodes in the first pair. The identifier of the at least one of the nodes in the first pair may include and/or otherwise may identify a network interface that is included in communicatively coupling the first pair. A source-destination protocol address may include and/or may otherwise identify a plurality of hop identifiers in an identifiable first order and in an identifiable second order, wherein the source-destination protocol address includes the plurality of hop identifiers in the first order and a destination-source protocol address, that identifies the source node to the destination node, includes the plurality of hop identifiers in the second order. At least one of the first order and the second order may be identified in the data unit by sequence information defined by a schema of the network protocol. The sequence information may be represented separately from the plurality of hop identifiers One or more network layer protocol data units may be provided to a link layer component 10415 as data to include in one or more link layer protocol data units to transmit via a NIC 10417 based on the network interface identified by the packet generator component 10423. In a node with one NIC operatively coupled to a physical data transmission medium or with multiple NICs operatively coupled to the shared data transmission medium, an endpoint-out component 10406 may send network layer data packets via the one NIC or any of the multiple NICs over the physical data transmission medium to deliver to the destination node according to a network interface identified by the packet generator component 10423. Link layer protocol data units may be sent by the link layer component 10415 according to a compatible link layer protocol and link layer address information. For example, Ethernet frames may be sent as link layer protocol data units via an Ethernet cable operatively coupled to a NIC 10417 included in a suitable network path to transmit the data to the destination node.

Additionally, the source-destination protocol address and/or the destination-source protocol address may include a plurality of hop identifiers identifying a sequence of hopes in a network path included in communicatively coupling the source node and the destination node. The address information may include the plurality of hop identifiers in an identifiable first order and in an identifiable second order. The source-destination protocol address may include the plurality of hop identifiers in the first order. The destination-source protocol address may include the plurality of hop identifiers in the second order. One or both of the first order and the second may be identified in the address information. One or both of the first order and the second order may be identified by sequence information represented separately from the plurality of hop identifiers.

A first hop including a first hop node and a second hop node, both in the network path, may be identified with respect to the source node by a source hop identifier in a source scope-specific address space specific to a source region that includes the source node. The first hop including the first hop node and the second hop node, both in the network path, may be identified with respect to the destination node by a destination hop identifier in the destination scope-specific address space.

The description above with respect to FIGS. 6A-E and FIGS. 5A-C demonstrates that not only are nodes identifiable via scope-specific addresses from scope-specific address spaces, but a hop in a network may be identified by a scope-specific identifier from a scope-specific identifier space. In FIG. 5C, a third hop 10508*c*3 between a seventh path node 10504*c*7 and an eighth path node 10504*c*8 may be identified with respect to a first node 10502*c*1 by a hop identifier from a first scope-specific address space specific to the first node 10502*c*1. The sequence 100.101.103.102.103 identifies the third hop 10508*c*1 that includes a seventh path node 10504*c*7 and the eighth path node 10504*c*8. The third hop 10508*c*3 identified with respect to a sixth path node 10504*c*6 may be identified by the sequence, 100.103, in node-specific address space specific to the sixth path node 10504*c*6. The sequence 101.103 is an identifier that, in the third scope-specific address space specific to the third region 10510*c*3, identifies the third hop 10508*c*3. The number, 103, is an identifier that, in the seventh node-specific address space specific to the seventh path node 10504*c*7, identifies the third hop 10508*c*3.

FIG. 5C illustrates that the third hop 10508*c*3 includes the seventh path node 10504*d*7 and the eighth path node 10504*c*8. A third hop identifier from the first scope-specific address space specific to the first region 10510*c*1 may be represented as 101.100.101.100.103, as FIG. 5C illustrates. The third hop identifier includes a hop identifier 103 that identifies the third hop 10508*c*3 with respect to an eighth path node 10504*c*8. "101.100.101.100.103" is scope-specific to the nodes in the first region 10510*c*1. The seventh path node 10504*c*7 is included in a network path from the first node 10502*c*1 to the eighth path node 10504*c*8 that includes the third hop 10508*c*3.

As described above, sending data via a scope-specific address may include sending the data via a sequence of hops in a network path included in communicatively coupling a source node and a destination node. The source-destination protocol address may include a plurality of hop identifiers respectively identifying the hops in the sequence. They data may be sent via a first path node in a network path communicatively coupling the source node and the destination node. In an aspect, the first path node is not included in the source network region and the first path node is not included a destination network region that includes the destination node. The source-destination protocol address may include a source-first address that, in the source scope-specific address space and for the network protocol, identifies the first path node to the source node. The source-destination protocol address may include a first hop identifier that identifies a first hop in the network path, where the first hop includes at least one of the source node and the first path node A protocol address that for a network protocol identifies a second node to a first node may include an identifier of a network path included in communicatively coupling a first node and a second node. For example, with respect to FIGS. 6A-E and FIG. 5C, a sequence, 10101.101.103.102.103.102, may represent a protocol address that identifies an eleventh node 1050210*c*11 to a first node 10502*c*1 in a network 10500*c*. The address may be for a network layer protocol and/or one or more link layer protocols supported by portions of the network 10500*c*.

A protocol address that for a network protocol identifies a second node to a first node may include first hop information identifying a first hop including a first pair of communicatively coupled nodes included in communicatively coupling the first node and the second node. The sequence, 100.101.103.102.103.102, described in the previous paragraph includes the hop identifier "101" which identifies a fifth hop 10508*c*5 in the network 10500*c*. The first hop 10502*c*5 includes a fourth path node 10504*c*4 and a second path node 10504*c*2, included in a network path that communicatively couples the first node 10502*c*1 and the eleventh node 1050210*c*11.

A hop identifier in a protocol address may include at least one of the first node and the second node. The hop identifier may include a network interface identifier of a network interface of a node in the hop. In network 10500*b* in FIG. 5B, a sequence, "10151-10254.10151-1010, identifies a second node 10502*b*2 to a first node 10502*b*1. "10151-10254" is a scoped hop identifier that in the first network region 10506*b*1 identifies a first hop 10508*b*1 including the first node 10502*b*1 and a first path node 10504*b*1. "10151-1010" is a hop identifier that in the second network region 10506*b*2 identifies a fourth hop 10508*b*4 including the first path node 10504*b*1 and the second node 10502*b*2.

A protocol address that for a network protocol identifies a second node to a first node may be defined by a network protocol to include a network interface identifier identifying a network interface included in communicatively coupling a first node and a second node. With respect to FIG. 5B and the previous paragraph, "10254" is an identifier of a network interface of the first path node 10504*b*1 in the first network region. With respect to FIG. 5C, "102" is a network interface identifier of the eleventh path node 1050210*c*11 in the third network region 10510*c*3. FIG. 5C further illustrates that "103" may identify a network interface of a seventh path node 10504*c*7 to an eighth path node 10504*c*8 in a third hop 10508*c*3. "103" may alternatively or additionally identify a network interface of the eighth path node 10504*c*8 to the seventh path node 10504*c*7 in the third hop 10508*c*3

As described above, a protocol address may be identified that, in a second scope-specific address space specific to a second network region that includes the second node, identifies the first node. The protocol address that identifies the second node may include address information that identifies the first node. In FIG. 5B, the sequence, "10151-10254.10151-1010, that identifies a second node 10502*b*2 to a first node 10502*b*1 includes the sequence "1010-10151.10254-10151" that a network protocol identifies the first node 10502*b*1 to the second node 10502*b*2.

As has been described above, a protocol address that for a network protocol identifies a second node to a first node may include a plurality of hop identifiers in an identifiable first order and in an identifiable second order, wherein the protocol address includes the plurality of hop identifiers in the first order and a second-first protocol address, that identifies the first node to the second node, includes the plurality of hop identifiers in the second order. At least one of the first order and the second order may be identified by sequence information defined by a schema of the network protocol in the data unit. The sequence information may be represented separately from the plurality of hop identifiers.

A network may be represented in a topological space. The domain name system includes a hierarchical representation of the Internet, but currently neither the hierarchical structure of the name space nor the hierarchical structure of the IP address space represents communicatively couplings and/or routes in the network.

As described with respect to FIGS. 6A-E and FIGS. 5A-C, identifying a protocol address that for a network protocol identifies a second node to a first node may include identifying a second location of the second node in a topological space relative to a first location in the topological space of the first node. The protocol address identifies the second location relative to the first location. The protocol address may identify a path location of a path node represented in the topological space, wherein the path location is included in a path in the topological space that connects the first location and the second location. The protocol address that for a network protocol identifies a second node to a first node may identify a sequence locations in the path in the topological space.

Sending data in a data unit by a first node may include detecting, in the data unit, address separating information specified according to the network protocol for detecting at least one of a first-next protocol address information and a next-first protocol address information. The address separating information may be updated for identifying, by a next node included in communicatively coupling the first node and the second node, the at least one of the first-next protocol address information and next-first protocol address information in the address information, wherein the next-first protocol address information includes information for identifying the first node.

A protocol address, that for a network protocol identifies a second node to a first node, may include a first-PN protocol address that, in the first scope-specific address space specific to the first region, identifies a first path node (PN) included in a first network path included in communicatively coupling the first node and the second node.

Additionally or alternatively, a protocol address, that for a network protocol identifies a second node to a first node, may include a PN-second protocol address that, in the PN scope-specific address space specific to a PN region that includes the path node, identifies the second node. The path node is included in a network path that communicatively couples the first node and the second node Further, identifying a protocol address that for a network protocol identifies a second node to a first node may include identifying, based on the protocol address, the first-PN protocol address and based PN-second protocol address Sending data from a first node to a second node identified by a may include sending the data via a path node in a network path communicatively coupling the first node and the second node. The path node, in an aspect, is not included in a first network region that includes the first node and the path node is not included a second network region that includes the second node. The protocol address may include a first-PN address that, in the first scope-specific address space and for the network protocol, identifies the path node to the first node and the protocol address includes a PN-second address that, in a PN-scope-specific address space specific to a PN network region that includes the path node, identifies the second node to the first path node for the network protocol Further, a protocol address that for a network protocol identifies a second node to a first node may include a first hop identifier that identifies a first hop in a network path. The first hop may one or both of the first node and the first path node. A first hop identifier may be assigned from the first scope-specific address space to identify the first hop in response to a negotiation between the first node and another node in the first hop. A protocol address that for a network protocol identifies a second node to a first node may include a second hop identifier that identifies a second hop in the network path, wherein the second hop includes at least one of the second node and the first path node A protocol address that for a network protocol identifies a second node to a first node may include a hop identifier that identifies a hop in the network path. The hop identifier may, in a scope-specific address space specific to a network region that includes one of a pair of nodes in the first hop, identify the other one of the pair of nodes. The hop includes a first hop node and a second hop node that are communicatively coupled via a first network interface in the first hop node and via a second network interface in the second hop node. The first hop identifier may include at one or more of a first network interface identifier identifying the first network interface and a second network interface identifying the second network interface to at least one of the first hop node and the second hop node FIG. 8 illustrates an arrangement of components that may operate in an execution environment, such as execution environment 10102 in FIG. 1 to perform a method illustrated in FIG. 7. The system illustrated by the arrangement includes an in-port component 10802, an address space component 10804, and an endpoint-out component 10806. A suitable execution environment includes a processor, such as processor 10104, to process an instruction in at least one of an in-port component, an address space component, and an endpoint-out component.

Figure 7:
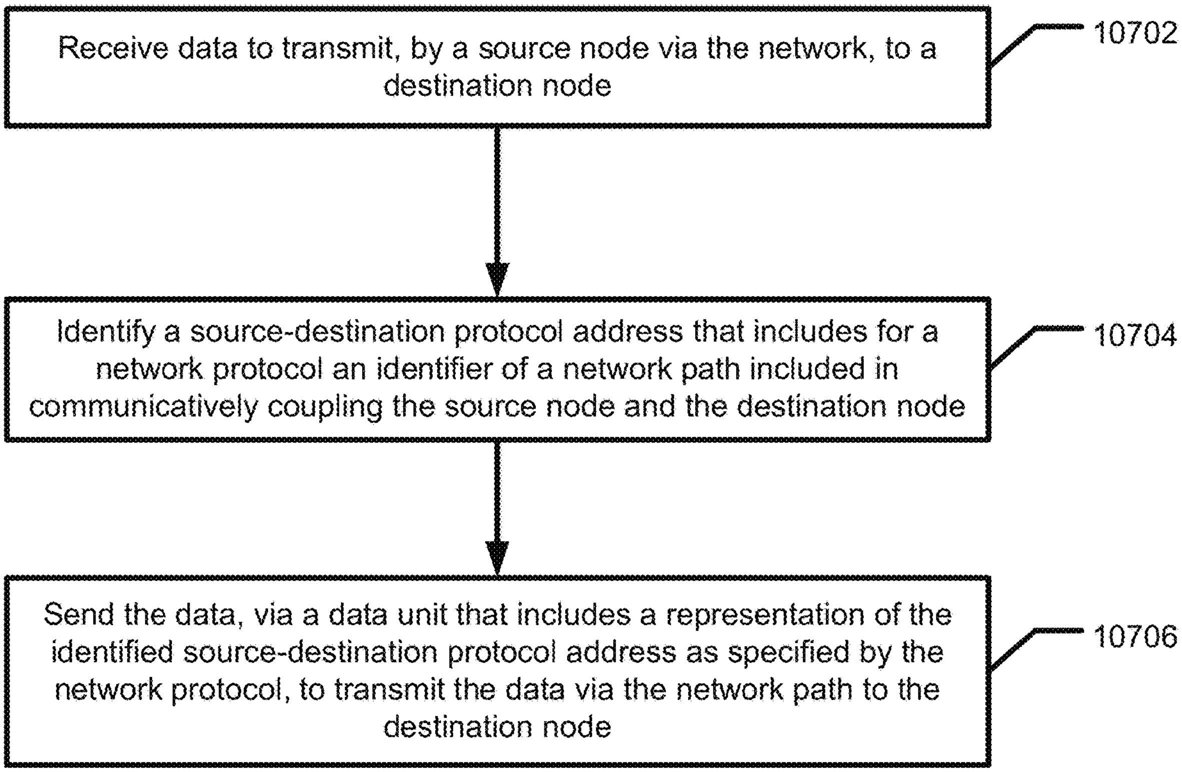
FIG. 7 is a flow diagram illustrating a method according to an aspect of the subject matter described herein.
Figure 8:
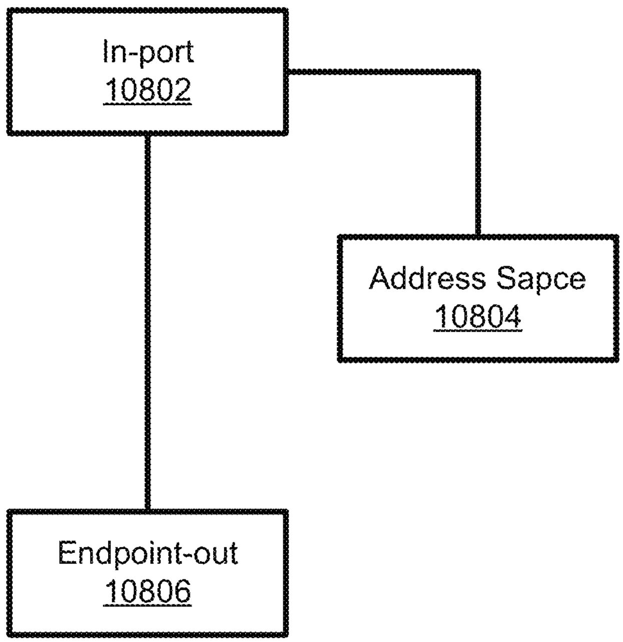
FIG. 8 is a block diagram illustrating an arrangement of components for performing the method illustrated in FIG. 7 according to another aspect of the subject matter described herein.

With reference to FIG. 7, a block 10702 illustrates that the method includes receiving data to transmit, by a source node via the network, to a destination node. Accordingly, the system in FIG. 8 includes means for receiving data to transmit, by a source node via the network, to a destination node. For example, the arrangement in FIG. 8 includes an in-port component 10802 that is operable for and/or is otherwise included in receiving data to transmit, by a source node via the network, to a destination node. The system includes one or more processors and logic encoded in one or more computer readable media for execution by the one or more processors that when executed is operable for and/or is otherwise included in receiving data to transmit, by a source node via the network, to a destination node. FIG. 4 illustrate an in-port components 10402 which may be adaptations and/or analogs of the in-port component 10802 in FIG. 9.

With reference to FIG. 7, a block 10704 illustrates that the method includes identifying a source-destination protocol address that includes for a network protocol an identifier of a network path included in communicatively coupling the source node and the destination node. Accordingly, the system in FIG. 8 includes means for identifying a source-destination protocol address that includes for a network protocol an identifier of a network path included in communicatively coupling the source node and the destination node. For example, the arrangement in FIG. 8 includes an address space component 10804 that is operable for and/or is otherwise included in identifying a source-destination protocol address that includes for a network protocol an identifier of a network path included in communicatively coupling the source node and the destination node. The system includes one or more processors and logic encoded in one or more computer readable media for execution by the one or more processors that when executed is operable for and/or is otherwise included in identifying a source-destination protocol address that includes for a network protocol an identifier of a network path included in communicatively coupling the source node and the destination node. FIG. 4 illustrates an address space component 10404 which may be an adaptation and/or analog of the address space component 10804 in FIG. 8.

With reference to FIG. 7, a block 10706 illustrates that the method includes sending the data, via a data unit that includes a representation of the identified source-destination protocol address as specified by the network protocol, to transmit the data via the network path to the destination node. Accordingly, the system in FIG. 8 includes means for sending the data, via a data unit that includes a representation of the identified source-destination protocol address as specified by the network protocol, to transmit the data via the network path to the destination node. For example, the arrangement in FIG. 8 includes an endpoint-out component 10806 that is operable for and/or is otherwise included in sending the data, via a data unit that includes a representation of the identified source-destination protocol address as specified by the network protocol, to transmit the data via the network path to the destination node. The system includes one or more processors and logic encoded in one or more computer readable media for execution by the one or more processors that when executed is operable for and/or is otherwise included in sending the data, via a data unit that includes a representation of the identified source-destination protocol address as specified by the network protocol, to transmit the data via the network path to the destination node. FIG. 4 illustrates endpoint-out components 10406 which may be adaptations and/or analogs of the endpoint-out component 10806 in FIG. 8.

Figure 9:
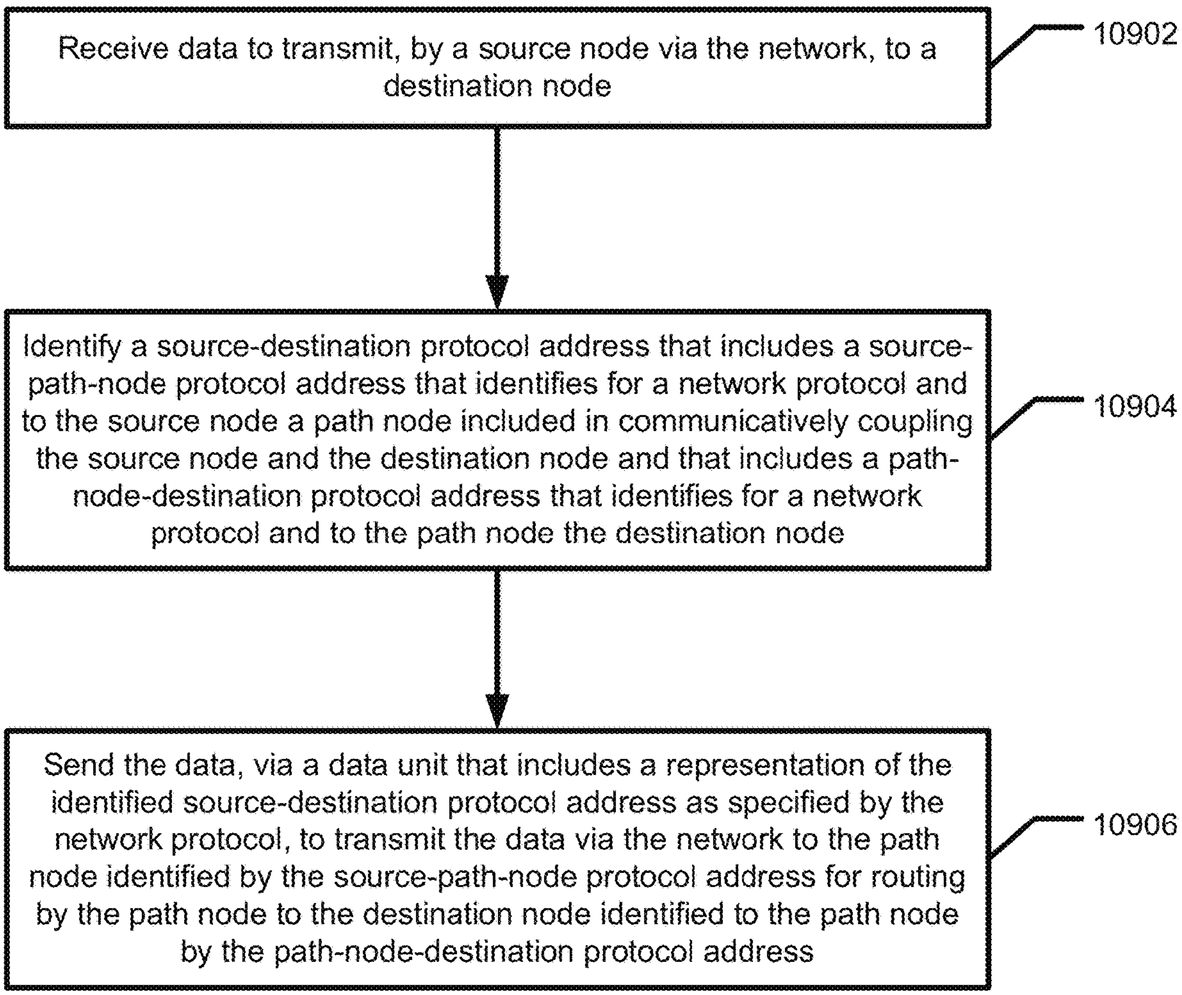
FIG. 9 is a flow diagram illustrating a method according to an aspect of the subject matter described herein.
Figure 10:
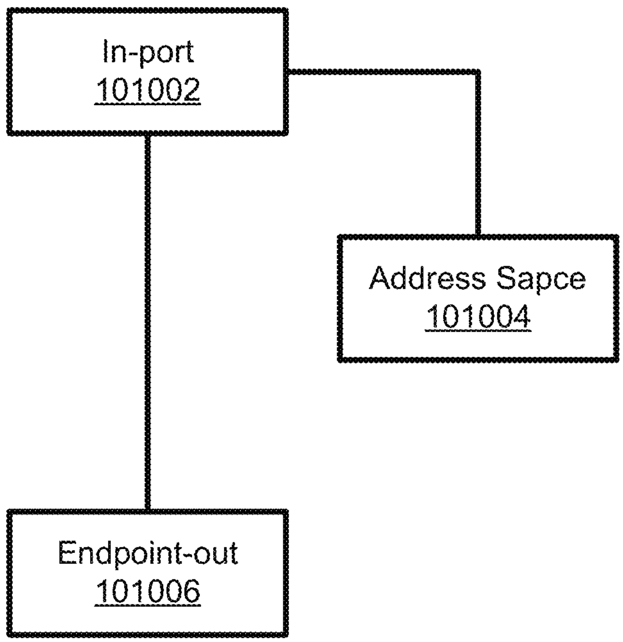
FIG. 10 is a block diagram illustrating an arrangement of components for performing the method illustrated in FIG. 9 according to another aspect of the subject matter described herein.

FIG. 10 illustrates an arrangement of components that may operate in an execution environment, such as execution environment 10102 in FIG. 1 to perform a method illustrated in FIG. 9. The system illustrated by the arrangement includes an in-port component 101002, an address space component 101004, and an endpoint-out component 101006. A suitable execution environment includes a processor, such as processor 10104, to process an instruction in at least one of an in-port component, an address space component, an endpoint-out component. Those skilled in the art will understand that other execution environments in addition to the various adaptations, analogs, and instances of the execution environments described herein are suitable for hosting an adaptation of the arrangement in FIG. 10.

With reference to FIG. 9, a block 10902 illustrates that the method includes receiving data to transmit, by a source node via the network, to a destination node. Accordingly, the system in FIG. 10 includes means for receiving data to transmit, by a source node via the network, to a destination node. For example, the arrangement in FIG. 10 includes an in-port component 101002 that is operable for and/or is otherwise included in receiving data to transmit, by a source node via the network, to a destination node. The system includes one or more processors and logic encoded in one or more computer readable media for execution by the one or more processors that when executed is operable for and/or is otherwise included in receiving data to transmit, by a source node via the network, to a destination node. FIG. 4 illustrates in-port components 10402 which may be adaptations and/or analogs of the in-port component 101002 in FIG. 10.

With reference to FIG. 9, a block 10904 illustrates that the method includes identifying a source-destination protocol address that includes a source-path-node protocol address that identifies for a network protocol and to the source node a path node included in communicatively coupling the source node and the destination node and that includes a path-node-destination protocol address that identifies for a network protocol and to the path node the destination node. Accordingly, the system in FIG. 10 includes means for identifying a source-destination protocol address that includes a source-path-node protocol address that identifies for a network protocol and to the source node a path node included in communicatively coupling the source node and the destination node and that includes a path-node-destination protocol address that identifies for a network protocol and to the path node the destination node. For example, the arrangement in FIG. 10 includes an address space component 101004 that is operable for and/or is otherwise included in identifying a source-destination protocol address that includes a source-path-node protocol address that identifies for a network protocol and to the source node a path node included in communicatively coupling the source node and the destination node and that includes a path-node-destination protocol address that identifies for a network protocol and to the path node the destination node. The system includes one or more processors and logic encoded in one or more computer readable media for execution by the one or more processors that when executed is operable for and/or is otherwise included in identifying a source-destination protocol address that includes a source-path-node protocol address that identifies for a network protocol and to the source node a path node included in communicatively coupling the source node and the destination node and that includes a path-node-destination protocol address that identifies for a network protocol and to the path node the destination node. FIG. 4 illustrates address space components 10404 which may be adaptations and/or analogs of the address space component 101004 in FIG. 10.

With reference to FIG. 9, a block 10906 illustrates that the method includes sending the data, via a data unit that includes a representation of the identified source-destination protocol address as specified by the network protocol, to transmit the data via the network to the path node identified by the source-path-node protocol address for routing by the path node to the destination node identified to the path node by the path-node-destination protocol address. Accordingly, the system in FIG. 10 includes means for sending the data, via a data unit that includes a representation of the identified source-destination protocol address as specified by the network protocol, to transmit the data via the network to the path node identified by the source-path-node protocol address for routing by the path node to the destination node identified to the path node by the path-node-destination protocol address. For example, the arrangement in FIG. 10 includes an endpoint-out component 101006 that is operable for and/or is otherwise included in sending the data, via a data unit that includes a representation of the identified source-destination protocol address as specified by the network protocol, to transmit the data via the network to the path node identified by the source-path-node protocol address for routing by the path node to the destination node identified to the path node by the path-node-destination protocol address. The system includes one or more processors and logic encoded in one or more computer readable media for execution by the one or more processors that when executed is operable for and/or is otherwise included in sending the data, via a data unit that includes a representation of the identified source-destination protocol address as specified by the network protocol, to transmit the data via the network to the path node identified by the source-path-node protocol address for routing by the path node to the destination node identified to the path node by the path-node-destination protocol address. FIG. 4 illustrates endpoint-out components 10406 which may be adaptations and/or analogs of the endpoint-out component 101006 in FIG. 10.

Figure 11:
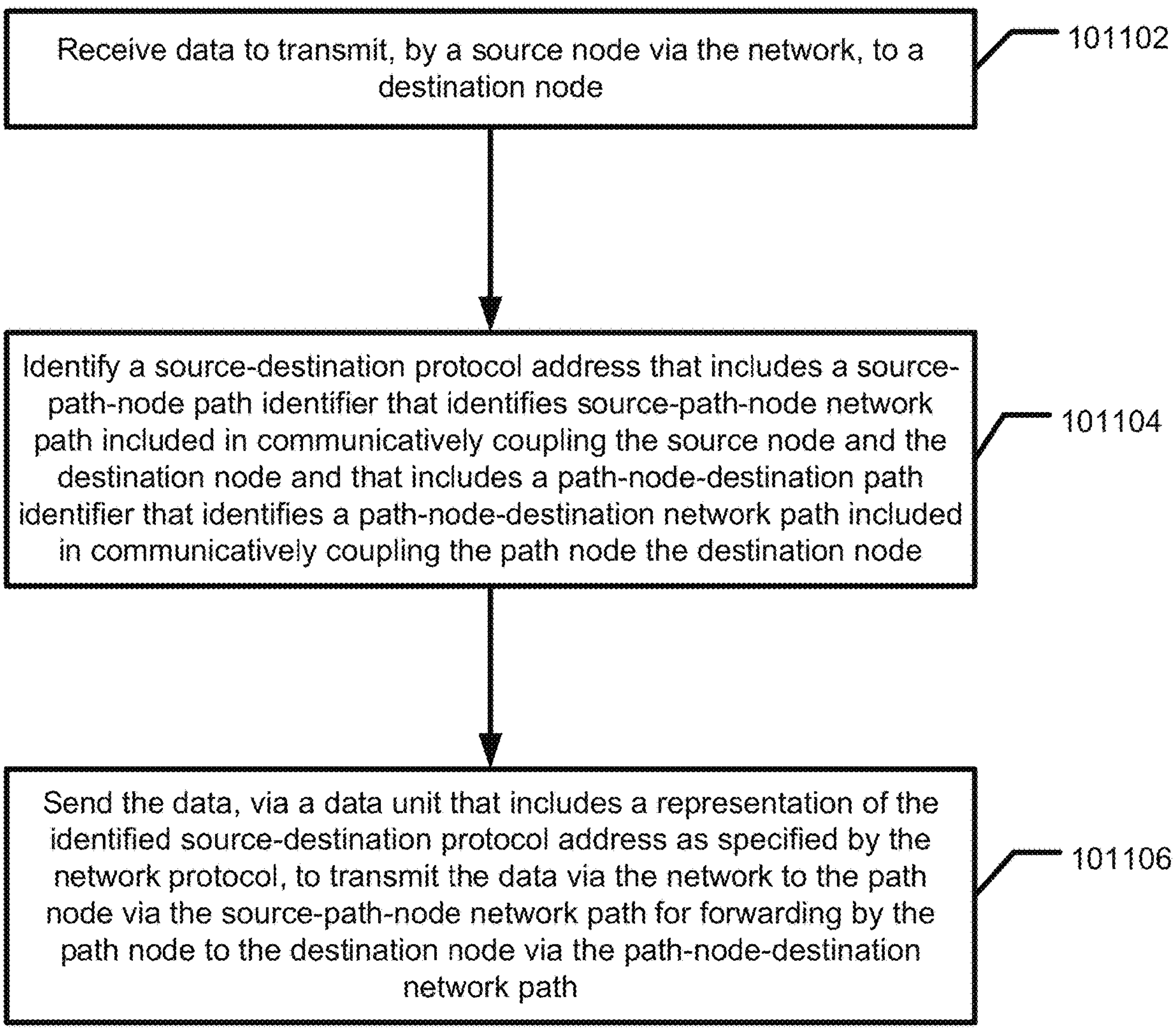
FIG. 11 is a flow diagram illustrating a method according to an aspect of the subject matter described herein.
Figure 12:
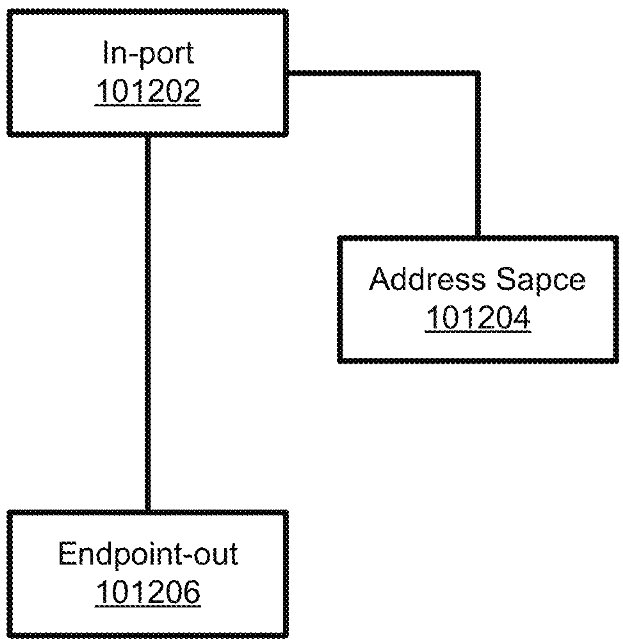
FIG. 12 is a block diagram illustrating an arrangement of components for performing the method illustrated in FIG. 11 according to another aspect of the subject matter described herein.

FIG. 12 illustrates an arrangement of components that may operate in an execution environment, such as execution environment 10102 in FIG. 1 to perform a method illustrated in FIG. 11. The system illustrated by the arrangement includes an in-port component 101202, an address space component 101204, and an endpoint-out component 101206. A suitable execution environment includes a processor, such as processor 10104, to process an instruction in at least one of an in-port component, an address space component, an endpoint-out component. Those skilled in the art will understand that other execution environments in addition to the various adaptations, analogs, and instances of the execution environments described herein are suitable for hosting an adaptation of the arrangement in FIG. 12.

With reference to FIG. 11, a block 101102 illustrates that the method includes receiving data to transmit, by a source node via the network, to a destination node. Accordingly, the system in FIG. 12 includes means for receiving data to transmit, by a source node via the network, to a destination node. For example, the arrangement in FIG. 12 includes an in-port component 101202 that is operable for and/or is otherwise included in receiving data to transmit, by a source node via the network, to a destination node. The system includes one or more processors and logic encoded in one or more computer readable media for execution by the one or more processors that when executed is operable for and/or is otherwise included in receiving data to transmit, by a source node via the network, to a destination node. FIG. 4 illustrates in-port components 10402 may be adaptations and/or analogs of the in-port component 101202 in FIG. 12.

With reference to FIG. 11, a block 101104 illustrates that the method includes identifying a source-destination protocol address that includes a source-path-node path identifier that identifies source-path-node network path included in communicatively coupling the source node and the destination node and that includes a path-node-destination path identifier that identifies a path-node-destination network path included in communicatively coupling the path node the destination node. Accordingly, the system in FIG. 12 includes means for identifying a source-destination protocol address that includes a source-path-node path identifier that identifies source-path-node network path included in communicatively coupling the source node and the destination node and that includes a path-node-destination path identifier that identifies a path-node-destination network path included in communicatively coupling the path node the destination node. For example, the arrangement in FIG. 12 includes an address space component 101204 that is operable for and/or is otherwise included in identifying a source-destination protocol address that includes a source-path-node path identifier that identifies source-path-node network path included in communicatively coupling the source node and the destination node and that includes a path-node-destination path identifier that identifies a path-node-destination network path included in communicatively coupling the path node the destination node. The system includes one or more processors and logic encoded in one or more computer readable media for execution by the one or more processors that when executed is operable for and/or is otherwise included in identifying a source-destination protocol address that includes a source-path-node path identifier that identifies source-path-node network path included in communicatively coupling the source node and the destination node and that includes a path-node-destination path identifier that identifies a path-node-destination network path included in communicatively coupling the path node the destination node. FIG. 4 illustrates address space components 10404 which may be adaptations and/or analogs of the address space component 101204 in FIG. 12.

With reference to FIG. 11, a block 101106 illustrates that the method includes sending the data, via a data unit that includes a representation of the identified source-destination protocol address as specified by the network protocol, to transmit the data via the network to the path node via the source-path-node network path for forwarding by the path node to the destination node via the path-node-destination network path. Accordingly, the system in FIG. 12 includes means for sending the data, via a data unit that includes a representation of the identified source-destination protocol address as specified by the network protocol, to transmit the data via the network to the path node via the source-path-node network path for forwarding by the path node to the destination node via the path-node-destination network path. For example, the arrangement in FIG. 12 includes an endpoint-out component 101206 that is operable for and/or is otherwise included in sending the data, via a data unit that includes a representation of the identified source-destination protocol address as specified by the network protocol, to transmit the data via the network to the path node via the source-path-node network path for forwarding by the path node to the destination node via the path-node-destination network path. The system includes one or more processors and logic encoded in one or more computer readable media for execution by the one or more processors that when executed is operable for and/or is otherwise included in sending the data, via a data unit that includes a representation of the identified source-destination protocol address as specified by the network protocol, to transmit the data via the network to the path node via the source-path-node network path for forwarding by the path node to the destination node via the path-node-destination network path. FIG. 4 illustrates endpoint-out components 10406 which may be adaptations and/or analogs of the endpoint-out component 101206 in FIG. 12.

Figure 13:
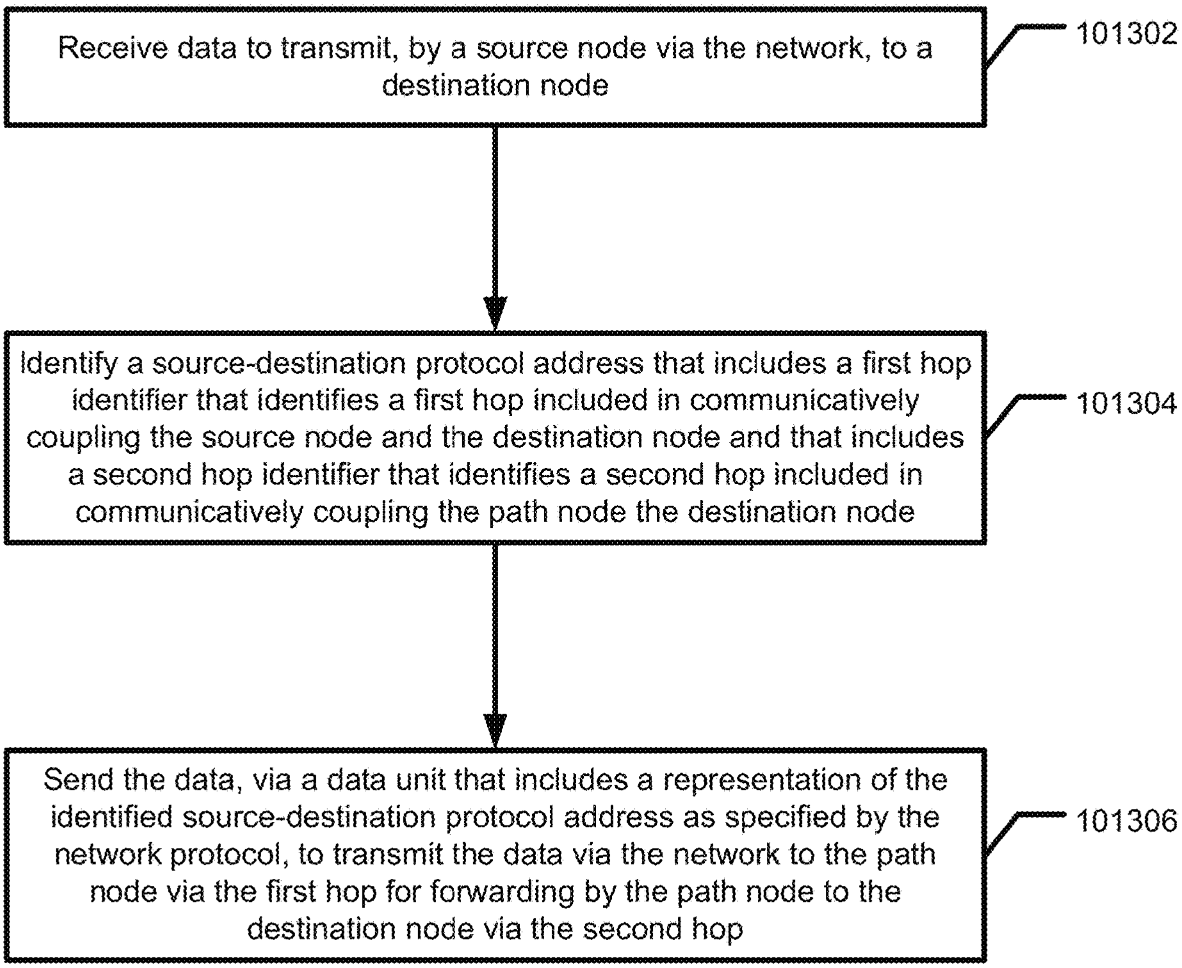
FIG. 13 is a flow diagram illustrating a method according to an aspect of the subject matter described herein.
Figure 14:
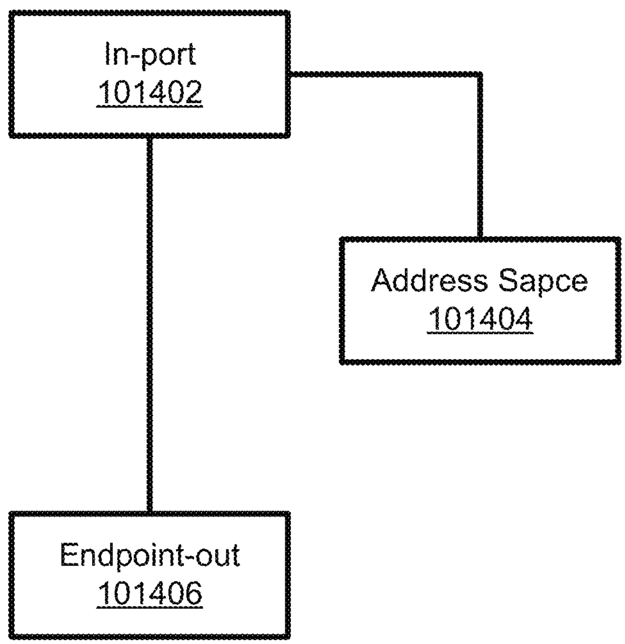
FIG. 14 is a block diagram illustrating an arrangement of components for performing the method illustrated in FIG. 13 according to another aspect of the subject matter described herein.

FIG. 14 illustrates an arrangement of components that may operate in an execution environment, such as execution environment 10102 in FIG. 1 to perform a method illustrated in FIG. 13. The system illustrated by the arrangement includes an in-port component 101402, an address space component 101404, and an endpoint-out component 101406. A suitable execution environment includes a processor, such as processor 10104, to process an instruction in at least one of an in-port component, an address space component, an endpoint-out component. Those skilled in the art will understand that other execution environments in addition to the various adaptations, analogs, and instances of the execution environments described herein are suitable for hosting an adaptation of the arrangement in FIG. 14.

With reference to FIG. 13, a block 101302 illustrates that the method includes receiving data to transmit, by a source node via the network, to a destination node. Accordingly, the system in FIG. 14 includes means for receiving data to transmit, by a source node via the network, to a destination node. For example, the arrangement in FIG. 14 includes an in-port component 101402 that is operable for and/or is otherwise included in receiving data to transmit, by a source node via the network, to a destination node. The system includes one or more processors and logic encoded in one or more computer readable media for execution by the one or more processors that when executed is operable for and/or is otherwise included in receiving data to transmit, by a source node via the network, to a destination node. FIG. 4 illustrates in-port components 10402 which may be adaptations and/or analogs of the in-port component 101402 in FIG. 14.

With reference to FIG. 13, a block 101304 illustrates that the method includes identifying a source-destination protocol address that includes a first hop identifier that identifies a first hop included in communicatively coupling the source node and the destination node and that includes a second hop identifier that identifies a second hop included in communicatively coupling the path node the destination node. Accordingly, the system in FIG. 14 includes means for identifying a source-destination protocol address that includes a first hop identifier that identifies a first hop included in communicatively coupling the source node and the destination node and that includes a second hop identifier that identifies a second hop included in communicatively coupling the path node the destination node. For example, the arrangement in FIG. 14 includes an address space component 101404 that is operable for and/or is otherwise included in identifying a source-destination protocol address that includes a first hop identifier that identifies a first hop included in communicatively coupling the source node and the destination node and that includes a second hop identifier that identifies a second hop included in communicatively coupling the path node the destination node. The system includes one or more processors and logic encoded in one or more computer readable media for execution by the one or more processors that when executed is operable for and/or is otherwise included in identifying a source-destination protocol address that includes a first hop identifier that identifies a first hop included in communicatively coupling the source node and the destination node and that includes a second hop identifier that identifies a second hop included in communicatively coupling the path node the destination node. FIG. 4 illustrates address space components 10404 which may be adaptations and/or analogs of the address space component 101404 in FIG. 14.

With reference to FIG. 13, a block 101306 illustrates that the method includes sending the data, via a data unit that includes a representation of the identified source-destination protocol address as specified by the network protocol, to transmit the data via the network to the path node via the first hop for forwarding by the path node to the destination node via the second hop. Accordingly, the system in FIG. 14 includes means for sending the data, via a data unit that includes a representation of the identified source-destination protocol address as specified by the network protocol, to transmit the data via the network to the path node via the first hop for forwarding by the path node to the destination node via the second hop. For example, the arrangement in FIG. 14 includes an endpoint-out component 101406 that is operable for and/or is otherwise included in sending the data, via a data unit that includes a representation of the identified source-destination protocol address as specified by the network protocol, to transmit the data via the network to the path node via the first hop for forwarding by the path node to the destination node via the second hop. The system includes one or more processors and logic encoded in one or more computer readable media for execution by the one or more processors that when executed is operable for and/or is otherwise included in sending the data, via a data unit that includes a representation of the identified source-destination protocol address as specified by the network protocol, to transmit the data via the network to the path node via the first hop for forwarding by the path node to the destination node via the second hop. FIG. 4 illustrates endpoint-out components 10406 which may be adaptations and/or analogs of the endpoint-out component 101406 in FIG. 14.

Figure 15:
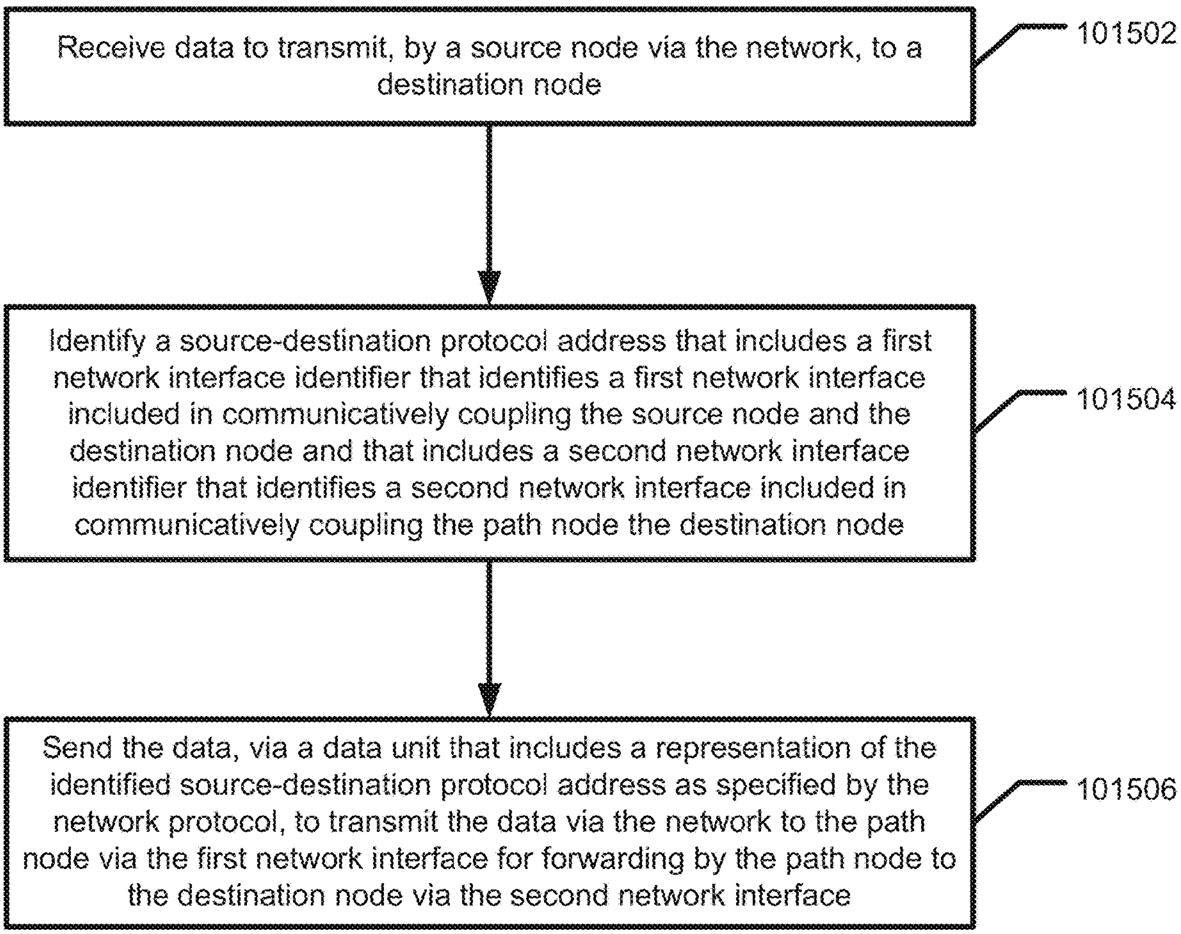
FIG. 15 is a flow diagram illustrating a method according to an aspect of the subject matter described herein.
Figure 16:
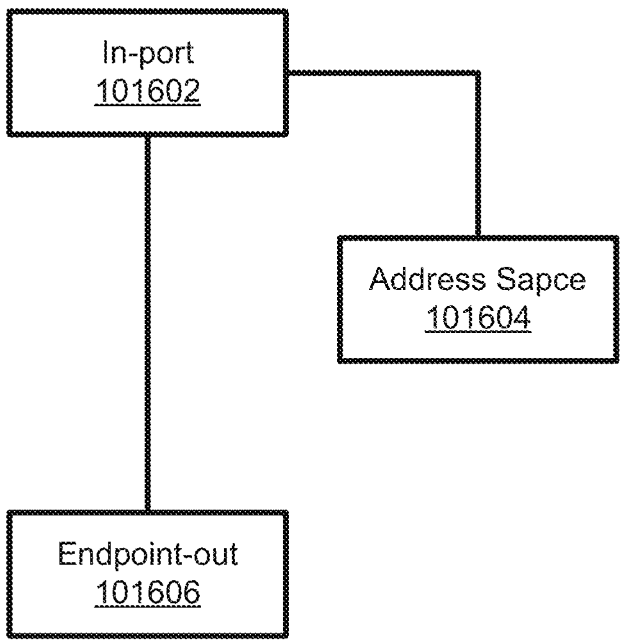
FIG. 16 is a block diagram illustrating an arrangement of components for performing the method illustrated in FIG. 15 according to another aspect of the subject matter described herein.

FIG. 16 illustrates an arrangement of components that may operate in an execution environment, such as execution environment 10102 in FIG. 1 to perform a method illustrated in FIG. 15. The system illustrated by the arrangement includes an in-port component 101602, an address space component 101604, an endpoint-out component 101606. A suitable execution environment includes a processor, such as processor 10104, to process an instruction in at least one of an in-port component, an address space component, and an endpoint-out component. Those skilled in the art will understand that other execution environments in addition to the various adaptations, analogs, and instances of the execution environments described herein are suitable for hosting an adaptation of the arrangement in FIG. 16.

With reference to FIG. 15, a block 101502 illustrates that the method includes receiving data to transmit, by a source node via the network, to a destination node. Accordingly, the system in FIG. 16 includes means for receiving data to transmit, by a source node via the network, to a destination node. For example, the arrangement in FIG. 16 includes an in-port component 101602 that is operable for and/or is otherwise included in receiving data to transmit, by a source node via the network, to a destination node. The system includes one or more processors and logic encoded in one or more computer readable media for execution by the one or more processors that when executed is operable for and/or is otherwise included in receiving data to transmit, by a source node via the network, to a destination node. FIG. 4 illustrates in-port components 10402 which may be adaptations and/or analogs of the in-port component 101602 in FIG. 16.

With reference to FIG. 15, a block 101504 illustrates that the method includes identifying a source-destination protocol address that includes a first network interface identifier that identifies a first network interface included in communicatively coupling the source node and the destination node and that includes a second network interface identifier that identifies a second network interface included in communicatively coupling the path node the destination node. Accordingly, the system in FIG. 16 includes means for identifying a source-destination protocol address that includes a first network interface identifier that identifies a first network interface included in communicatively coupling the source node and the destination node and that includes a second network interface identifier that identifies a second network interface included in communicatively coupling the path node the destination node. For example, the arrangement in FIG. 16 includes an address space component 101604 that is operable for and/or is otherwise included in identifying a source-destination protocol address that includes a first network interface identifier that identifies a first network interface included in communicatively coupling the source node and the destination node and that includes a second network interface identifier that identifies a second network interface included in communicatively coupling the path node the destination node. The system includes one or more processors and logic encoded in one or more computer readable media for execution by the one or more processors that when executed is operable for and/or is otherwise included in identifying a source-destination protocol address that includes a first network interface identifier that identifies a first network interface included in communicatively coupling the source node and the destination node and that includes a second network interface identifier that identifies a second network interface included in communicatively coupling the path node the destination node. FIG. 4 illustrates address space components 10404 which may be adaptations and/or analogs of the address space component 101604 in FIG. 16.

With reference to FIG. 15, a block 101506 illustrates that the method includes sending the data, via a data unit that includes a representation of the identified source-destination protocol address as specified by the network protocol, to transmit the data via the network to the path node via the first network interface for forwarding by the path node to the destination node via the second network interface. Accordingly, the system in FIG. 16 includes means for sending the data, via a data unit that includes a representation of the identified source-destination protocol address as specified by the network protocol, to transmit the data via the network to the path node via the first network interface for forwarding by the path node to the destination node via the second network interface. For example, the arrangement in FIG. 16 includes an endpoint-out component 101606 that is operable for and/or is otherwise included in sending the data, via a data unit that includes a representation of the identified source-destination protocol address as specified by the network protocol, to transmit the data via the network to the path node via the first network interface for forwarding by the path node to the destination node via the second network interface. The system includes one or more processors and logic encoded in one or more computer readable media for execution by the one or more processors that when executed is operable for and/or is otherwise included in sending the data, via a data unit that includes a representation of the identified source-destination protocol address as specified by the network protocol, to transmit the data via the network to the path node via the first network interface for forwarding by the path node to the destination node via the second network interface. FIG. 4 illustrates endpoint-out components 10406 which may be adaptations and/or analogs of the endpoint-out component 101606 in FIG. 16.

Figure 17:
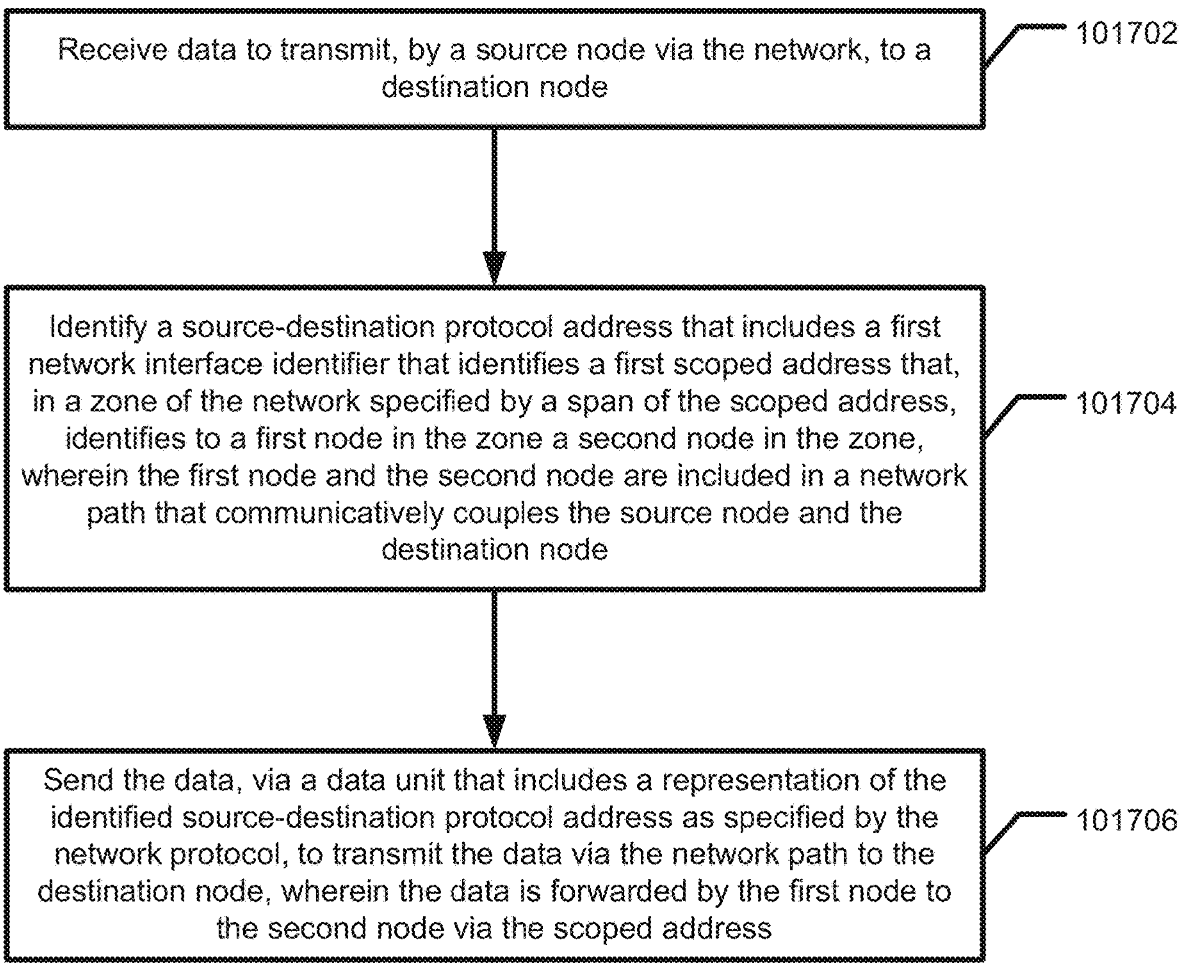
FIG. 17 is a flow diagram illustrating a method according to an aspect of the subject matter described herein.
Figure 18:
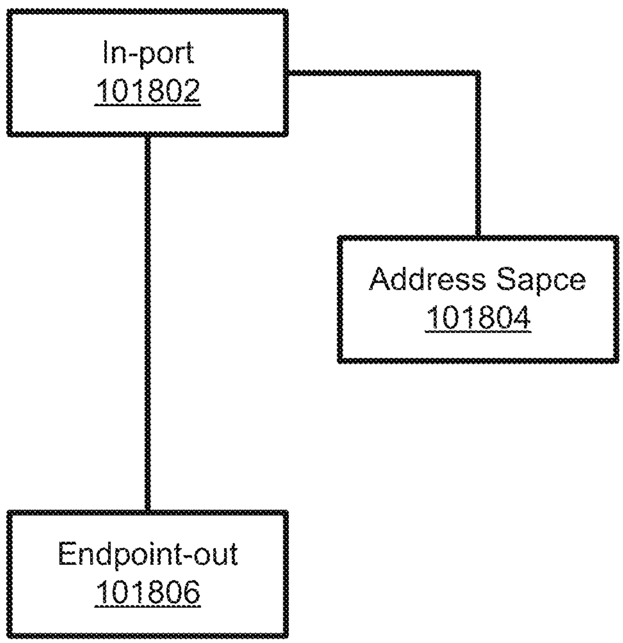
FIG. 18 is a block diagram illustrating an arrangement of components for performing the method illustrated in FIG. 17 according to another aspect of the subject matter described herein.

FIG. 18 illustrates an arrangement of components that may operate in an execution environment, such as execution environment 10102 in FIG. 1 to perform a method illustrated in FIG. 17. The system illustrated by the arrangement includes an in-port component 101802, an address space component 101804, and an endpoint-out component 101806. A suitable execution environment includes a processor, such as processor 10104, to process an instruction in at least one of an in-port component, an address space component, and an endpoint-out component. Those skilled in the art will understand that other execution environments in addition to the various adaptations, analogs, and instances of the execution environments described herein are suitable for hosting an adaptation of the arrangement in FIG. 18.

With reference to FIG. 17, a block 101702 illustrates that the method includes receiving data to transmit, by a source node via the network, to a destination node. Accordingly, the system in FIG. 18 includes means for receiving data to transmit, by a source node via the network, to a destination node. For example, the arrangement in FIG. 18 includes an in-port component 101802 that is operable for and/or is otherwise included in receiving data to transmit, by a source node via the network, to a destination node. The system includes one or more processors and logic encoded in one or more computer readable media for execution by the one or more processors that when executed is operable for and/or is otherwise included in receiving data to transmit, by a source node via the network, to a destination node. FIG. 4 illustrates in-port components 10402 which may be adaptations and/or analogs of the in-port component 101802 in FIG. 18.

With reference to FIG. 17, a block 101704 illustrates that the method includes identifying a source-destination protocol address that includes a first network interface identifier that identifies a first scoped address that, in a zone of the network specified by a span of the scoped address, identifies to a first node in the zone a second node in the zone, wherein the first node and the second node are included in a network path that communicatively couples the source node and the destination node. Accordingly, the system in FIG. 18 includes means for identifying a source-destination protocol address that includes a first network interface identifier that identifies a first scoped address that, in a zone of the network specified by a span of the scoped address, identifies to a first node in the zone a second node in the zone, wherein the first node and the second node are included in a network path that communicatively couples the source node and the destination node. For example, the arrangement in FIG. 18 includes an address space component 101804 that is operable for and/or is otherwise included in identifying a source-destination protocol address that includes a first network interface identifier that identifies a first scoped address that, in a zone of the network specified by a span of the scoped address, identifies to a first node in the zone a second node in the zone, wherein the first node and the second node are included in a network path that communicatively couples the source node and the destination node. The system includes one or more processors and logic encoded in one or more computer readable media for execution by the one or more processors that when executed is operable for and/or is otherwise included in identifying a source-destination protocol address that includes a first network interface identifier that identifies a first scoped address that, in a zone of the network specified by a span of the scoped address, identifies to a first node in the zone a second node in the zone, wherein the first node and the second node are included in a network path that communicatively couples the source node and the destination node. FIG. 4 illustrates address space components 10404 which may be adaptations and/or analogs of the address space component 101804 in FIG. 18.

With reference to FIG. 17, a block 101706 illustrates that the method includes sending the data, via a data unit that includes a representation of the identified source-destination protocol address as specified by the network protocol, to transmit the data via the network path to the destination node, wherein the data is forwarded by the first node to the second node via the scoped address. Accordingly, the system in FIG. 18 includes means for sending the data, via a data unit that includes a representation of the identified source-destination protocol address as specified by the network protocol, to transmit the data via the network path to the destination node, wherein the data is forwarded by the first node to the second node via the scoped address. For example, the arrangement in FIG. 18 includes an endpoint-out component 101806 that is operable for and/or is otherwise included in sending the data, via a data unit that includes a representation of the identified source-destination protocol address as specified by the network protocol, to transmit the data via the network path to the destination node, wherein the data is forwarded by the first node to the second node via the scoped address. The system includes one or more processors and logic encoded in one or more computer readable media for execution by the one or more processors that when executed is operable for and/or is otherwise included in sending the data, via a data unit that includes a representation of the identified source-destination protocol address as specified by the network protocol, to transmit the data via the network path to the destination node, wherein the data is forwarded by the first node to the second node via the scoped address. FIG. 4 illustrates endpoint-out components 10406 which may be adaptations and/or analogs of the endpoint-out component 101806 in FIG. 18.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that operate to perform the functionality described herein and may be implemented in software, hardware, or a combination of the two. While at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a software component in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. By way of example, and not limitation, computer readable media may comprise computer storage media and communication media. Computer storage media includes volatile and nonvolatile, removable and non-removable media implemented in any method or technology for storage of information such as computer readable instructions, data structures, software components or other data. Computer storage media includes, but is not limited to, Random Access Memory (RAM), Read Only Memory (ROM); Electrically Erasable Programmable Read Only Memory (EEPROM); flash memory or other memory technology; portable computer diskette; Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by an execution environment.

Communication media typically embodies computer readable instructions, data structures, software components, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Thus, the subject matter described herein may be embodied in many different forms, and all such forms are contemplated to be within the scope of what is claimed. It will be understood that various details may be changed without departing from the scope of the claimed subject matter.

The use of the terms "a" and "a" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The use of "including", "comprising", "having", and variations thereof are meant to encompass the items listed thereafter and equivalents thereof as well as additional items and equivalents thereof. Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided to", "received from", "identified to", "interoperated" and similar terms and their variants.

As used herein, any reference to an entity "in" an association is equivalent to describing the entity as "included in and/or identified by" the association, unless explicitly indicated otherwise.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety. In case of conflict, the present disclosure, including definitions, will control. In addition, the materials, methods, and examples are illustrative only and not intended to be limiting.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

Figure 19:
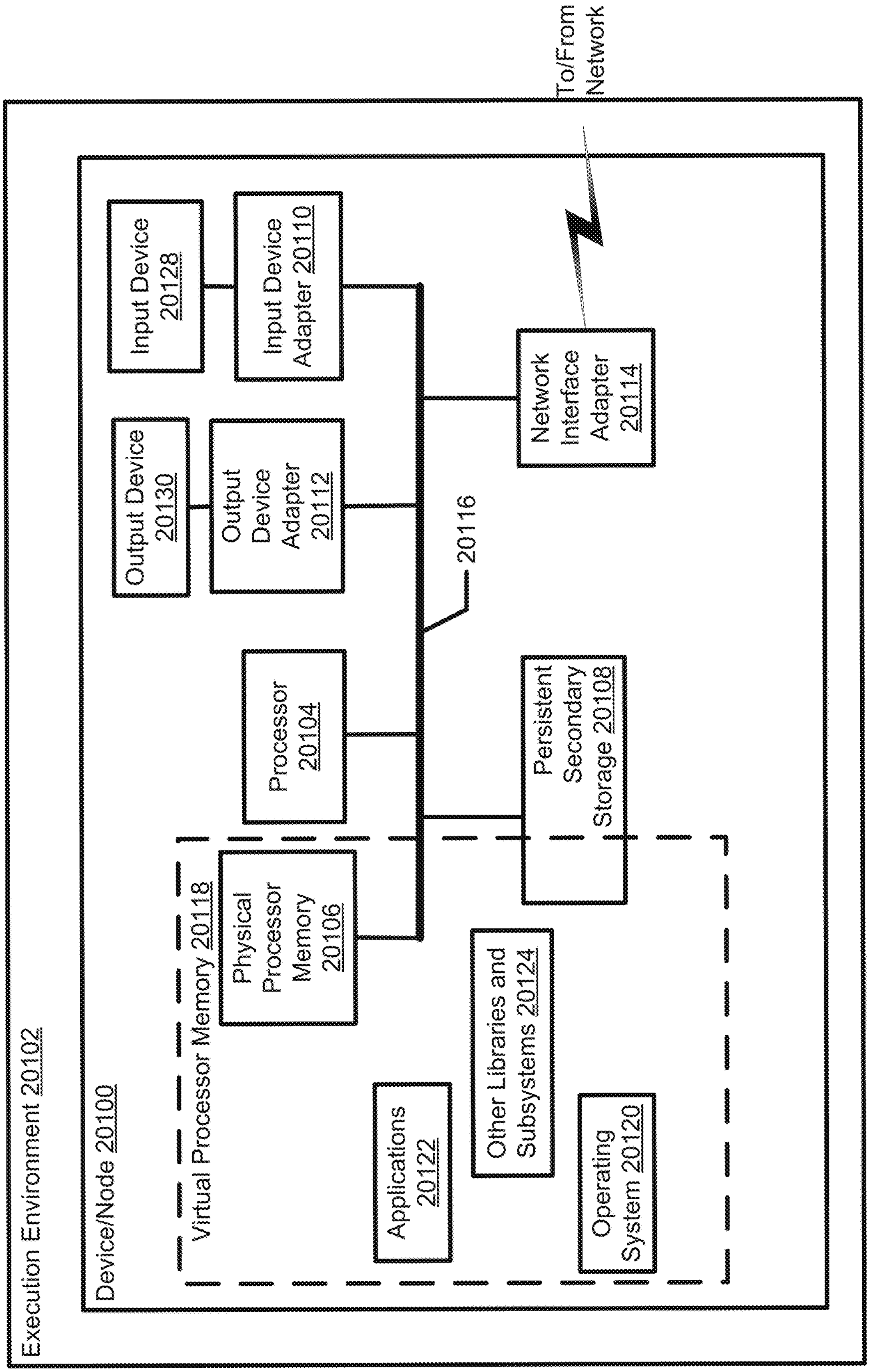
FIG. 19 is a block diagram illustrating an exemplary hardware device included in and/or otherwise providing an execution environment in which the subject matter may be implemented.

An exemplary device included in an execution environment that may be programmed, adapted, modified, and/or otherwise configured according to the subject matter is illustrated in FIG. 19. FIG. 19 illustrates a hardware device 20100 included in an execution environment 20102. FIG. 19 illustrates that execution environment 20102 includes a processor 20104, such as one or more microprocessors; a physical processor memory 20106 including storage locations identified by addresses in a physical memory address space of processor 20104; a persistent secondary storage 20108, such as one or more hard drives and/or flash storage media; an input device adapter 20110, such as a key or keypad hardware, a keyboard adapter, and/or a mouse adapter; an output device adapter 20112, such as a display and/or an audio adapter to present information to a user; a network interface component, illustrated by a network interface adapter 20114, to communicate via a network such as a LAN and/or WAN; and a mechanism that operatively couples elements 20104-20114, illustrated as a bus 20116. Elements 20104-20114 may be operatively coupled by various means. Bus 20116 may comprise any type of bus architecture, including a memory bus, a peripheral bus, a local bus, and/or a switching fabric.

Processor 20104 may access instructions and data via one or more memory address spaces in addition to the physical memory address space. A memory address space includes addresses identifying locations in a processor memory. The addresses in a memory address space are included in defining a processor memory. Processor 20104 may have more than one processor memory. Thus, processor 20104 may have more than one memory address space. Processor 20104 may access a location in a processor memory by processing an address identifying the location. The processed address may be identified by an operand of an instruction and/or may be identified by a register and/or other portion of processor 20104.

FIG. 19 illustrates a virtual processor memory 20118 spanning at least part of physical processor memory 20106 and may span at least part of persistent secondary storage 20108. Virtual memory addresses in a memory address space may be mapped to physical memory addresses identifying locations in physical processor memory 20106. Both physical processor memory 20106 and virtual processor memory 20118 are processor memory, as defined above.

Physical processor memory 20106 may include various types of memory technologies. Exemplary memory technologies include static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 20100 SDRAM, Double Data Rate SDRAM (DDR SDRAM), Enhanced SDRAM (ESDRAM), SyncLink DRAM (SLDRAM), Ferroelectric RAM (FRAM), RAMBUS DRAM (RDRAM) Direct DRAM (DRDRAM), and/or XDRTM DRAM. Physical processor memory 20106 may include volatile memory as illustrated in the previous sentence and/or may include non-volatile memory such as non-volatile flash RAM (NVRAM) and/or ROM.

Persistent secondary storage 20108 may include one or more flash memory storage devices, one or more hard disk drives, one or more magnetic disk drives, and/or one or more optical disk drives. Persistent secondary storage may include a removable data storage medium. The drives and their associated computer readable media provide volatile and/or nonvolatile storage for computer-executable instructions, data structures, software components, and other data.

Execution environment 20102 may include software components stored in persistent secondary storage 20108, in remote storage accessible via a network, and/or in a processor memory. FIG. 19 illustrates execution environment 20102 including an operating system 20120, one or more applications 20122, and other software components and/or data components illustrated by other libraries and subsystems 20124. In an aspect, some or all software components may be stored in locations accessible to processor 20104 in a shared memory address space shared by the software components. The software components accessed via the shared memory address space may be stored in a shared processor memory defined by the shared memory address space. In another aspect, a first software component may be stored in one or more locations accessed by processor 20104 in a first address space and a second software component may be stored in one or more locations accessed by processor 20104 in a second address space. The first software component is stored in a first processor memory defined by the first address space and the second software component is stored in a second processor memory defined by the second address space.

Execution environment 20102 may receive user-provided information via one or more input devices illustrated by an input device 20128. Input device 20128 provides input information to other components in execution environment 20102 via input device adapter 20110. Execution environment 20102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 20128 included in execution environment 20102 may be included in device 20100 as FIG. 19 illustrates or may be external (not shown) to device 20100. Execution environment 20102 may include one or more internal and/or external input devices. External input devices may be connected to device 20100 via corresponding network interfaces such as a serial port, a parallel port, and/or a universal serial bus (USB) port. Input device adapter 20110 may receive input and provide a representation to bus 20116 to be received by processor 20104, physical processor memory 20106, and/or other components included in execution environment 20102.

An output device 20130 in FIG. 19 exemplifies one or more output devices that may be included in and/or that may be external to and operatively coupled to device 20100. For example, output device 20130 is illustrated connected to bus 20116 via output device adapter 20112. Output device 20130 may be a display device. Exemplary display devices include liquid crystal displays (LCDs), light emitting diode (LED) displays, and projectors. Output device 20130 presents output of execution environment 20102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. FIG. 19 illustrates network interface adapter (NIA) 20114 as a network interface component included in execution environment 20102 to operatively couple device 20100 to a network. A network interface component includes a network interface hardware (NIH) component and optionally a network interface software (NIS) component. Exemplary network interface components include network interface controllers, network interface cards, network interface adapters, and line cards. A node may include one or more network interface components to interoperate with a wired network and/or a wireless network. Exemplary wireless networks include a BLUETOOTH network, a wireless 20802.11 network, and/or a wireless telephony network (e.g., AMPS, TDMA, CDMA, GSM, GPRS UMTS, and/or PCS network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

Figure 20:
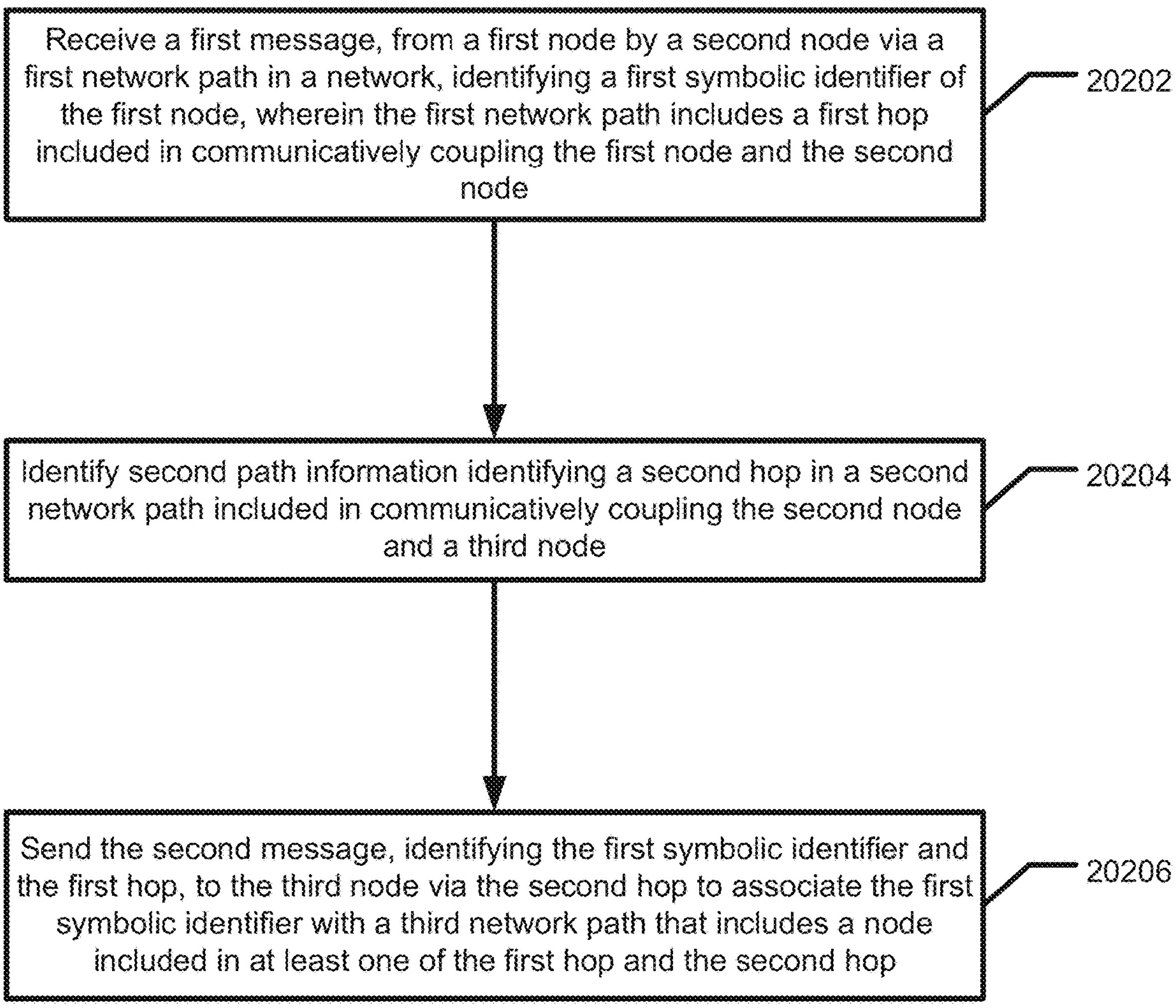
FIG. 20 is a flow diagram illustrating a method for associating a name with a network path according to an aspect of the subject matter described herein.
Figure 21:
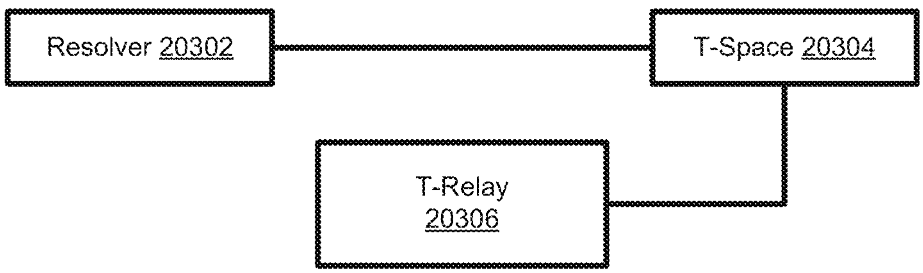
FIG. 21 is a block diagram illustrating an arrangement of components for associating a name with a network path according to another aspect of the subject matter described herein.

FIG. 21 illustrates an arrangement of components in a system that operates in an execution environment, such as execution environment 20102 in FIG. 19. The arrangement of components in the system operates to perform the method illustrated in FIG. 20. The system illustrated includes a resolver component 20302, a topology space component 20304, and a topology relay component 20306. A suitable execution environment includes a processor, such as processor 20104, to process an instruction in at least one of a resolver component, a topology space component, and a topology relay component.

Some components, illustrated in the drawings are identified by numbers with an alphanumeric suffix. A component may be referred to generically in the singular or the plural by dropping a suffix of a portion thereof of the component's identifier. For example, execution environments; such as execution environment 20401*a*, execution environment 20401*b*, and their adaptations and analogs; are referred to herein generically as an execution environment 20401 or execution environments 20401 when describing more than one. Other components identified with an alphanumeric suffix may be referred to generically or as a group in a similar manner.

Figure 22A:
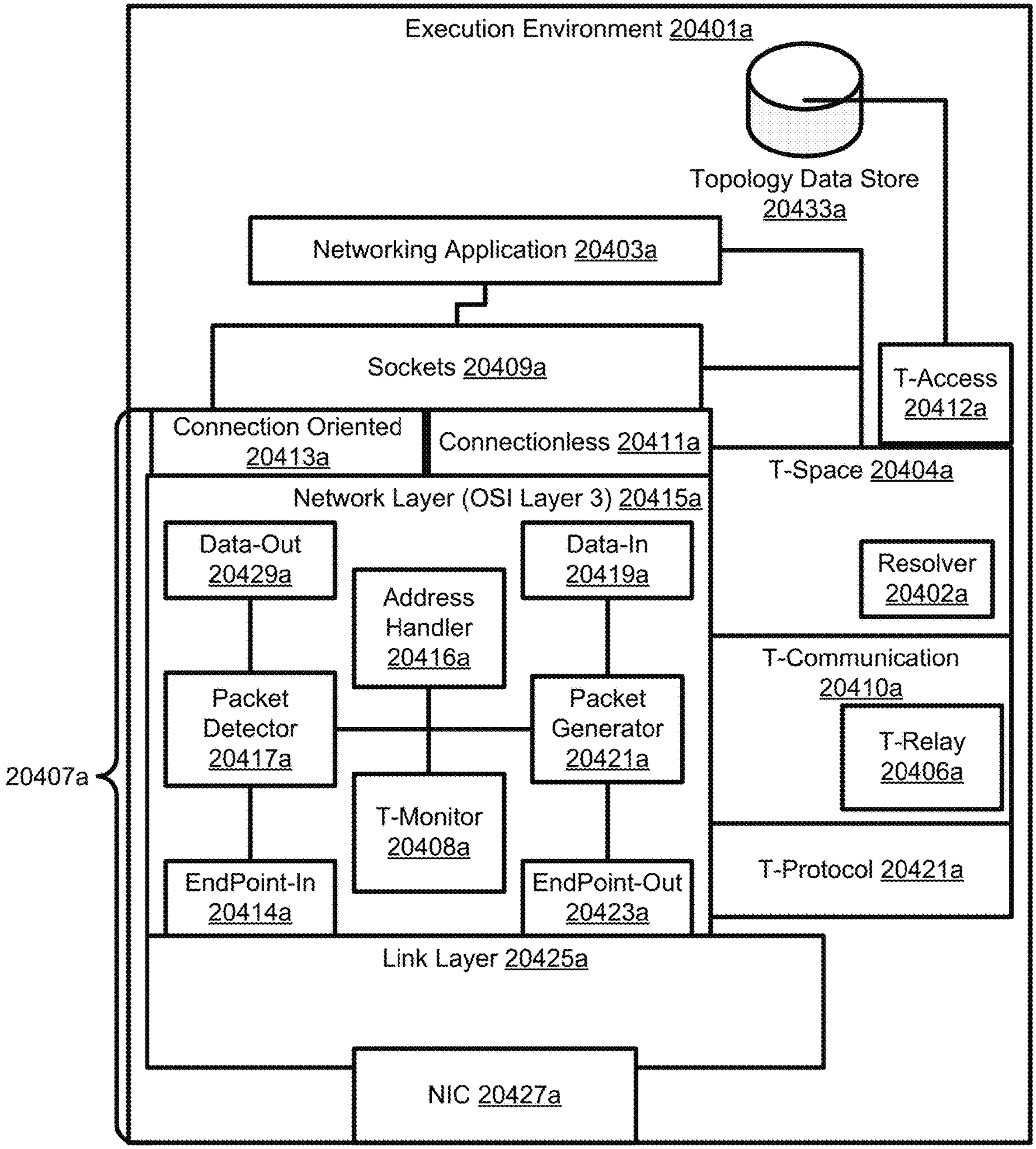
FIG. 22A is a block diagram illustrating an arrangement of components for associating a name with a network path according to another aspect of the subject matter described herein.
Figure 22B:
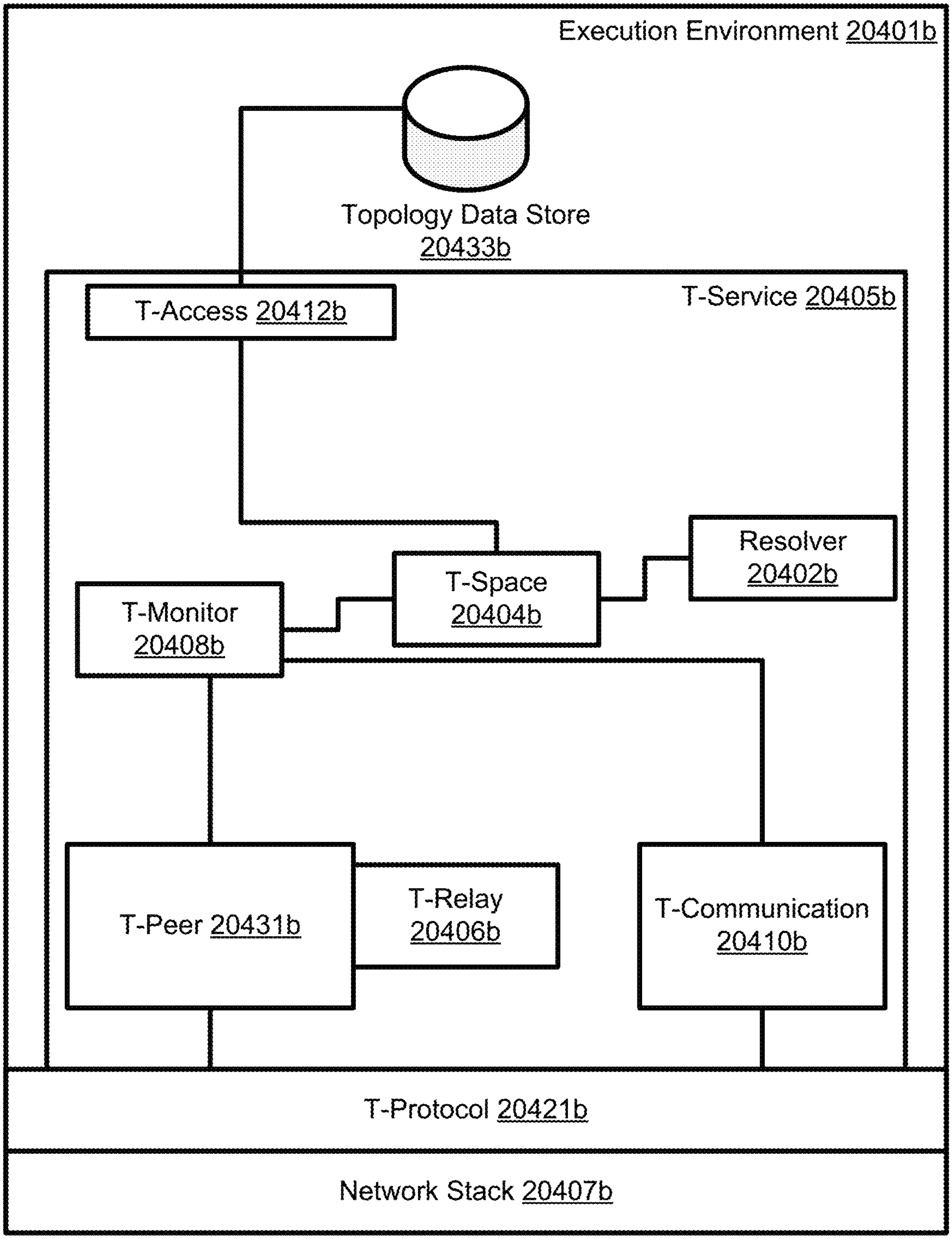
FIG. 22B is a block diagram illustrating an arrangement of components for associating a name with a network path according to another aspect of the subject matter described herein.

Some or all of the exemplary components illustrated in FIG. 21 may perform the method illustrated in FIG. 20 in a number of execution environments. FIGS. 22A-B are block diagrams illustrating the components of FIG. 21 and/or analogs of the components of FIG. 21 respectively adapted for operation in an execution environment 20401 that includes and/or otherwise is provided by one or more nodes.

FIG. 19 illustrates components of an exemplary device that may at least partially provide and/or otherwise be included in an execution environment. The components illustrated in FIG. 22A-B may be included in or otherwise combined with one or more of the components of FIG. 19 to create a variety of arrangements of components according to the subject matter described herein. Those skilled in the art will understand that other execution environments in addition to the various adaptations, analogs, and instances of the execution environments described herein are suitable for hosting an adaptation of the arrangement in FIG. 21.

Figure 23A:
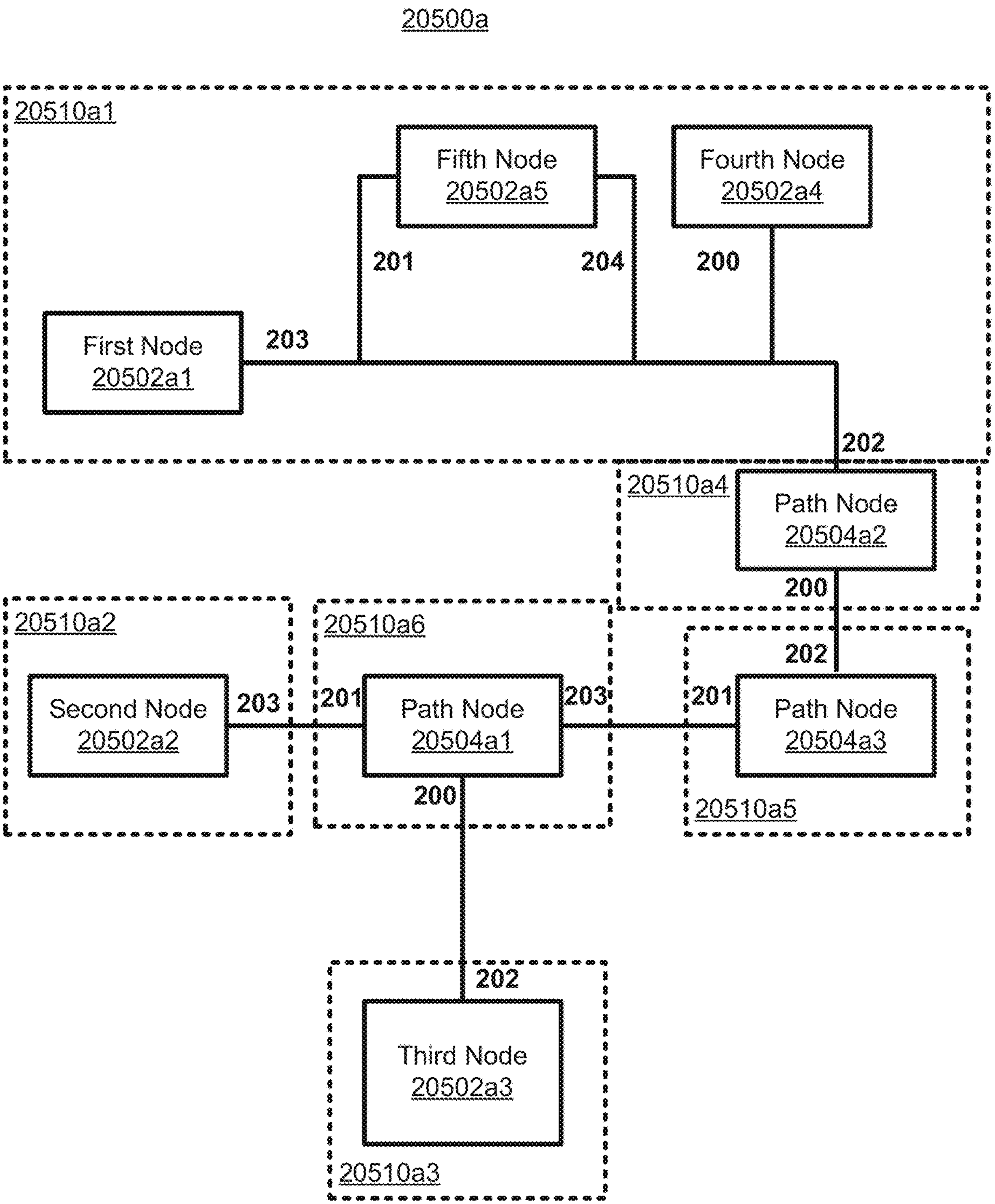
FIG. 23A is a network diagram illustrating an exemplary system for associating a name with a network path according to another aspect of the subject matter described herein.
Figure 23B:
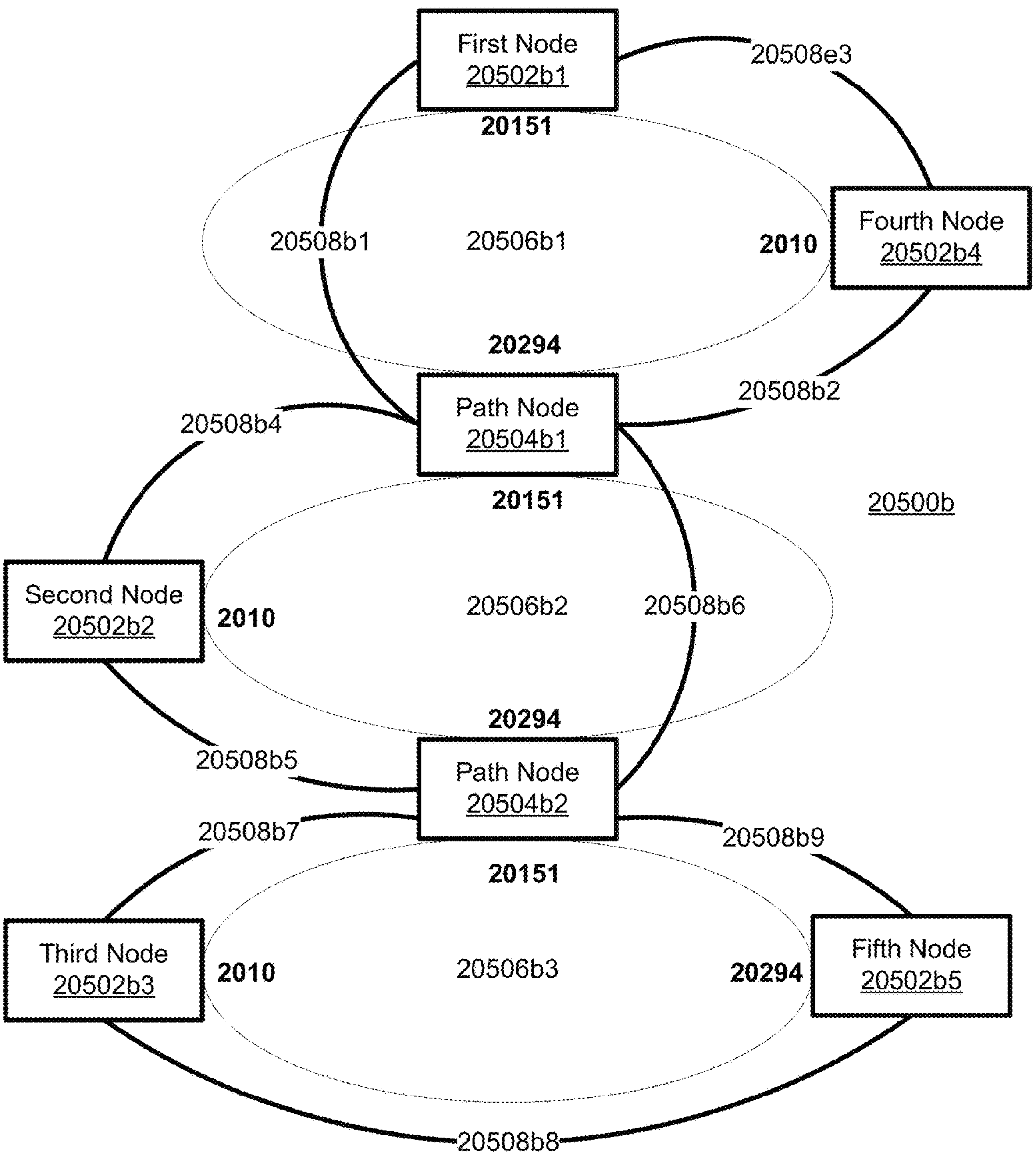
FIG. 23B is a network diagram illustrating an exemplary system for associating a name with a network path according to another aspect of the subject matter described herein.
Figure 23C:
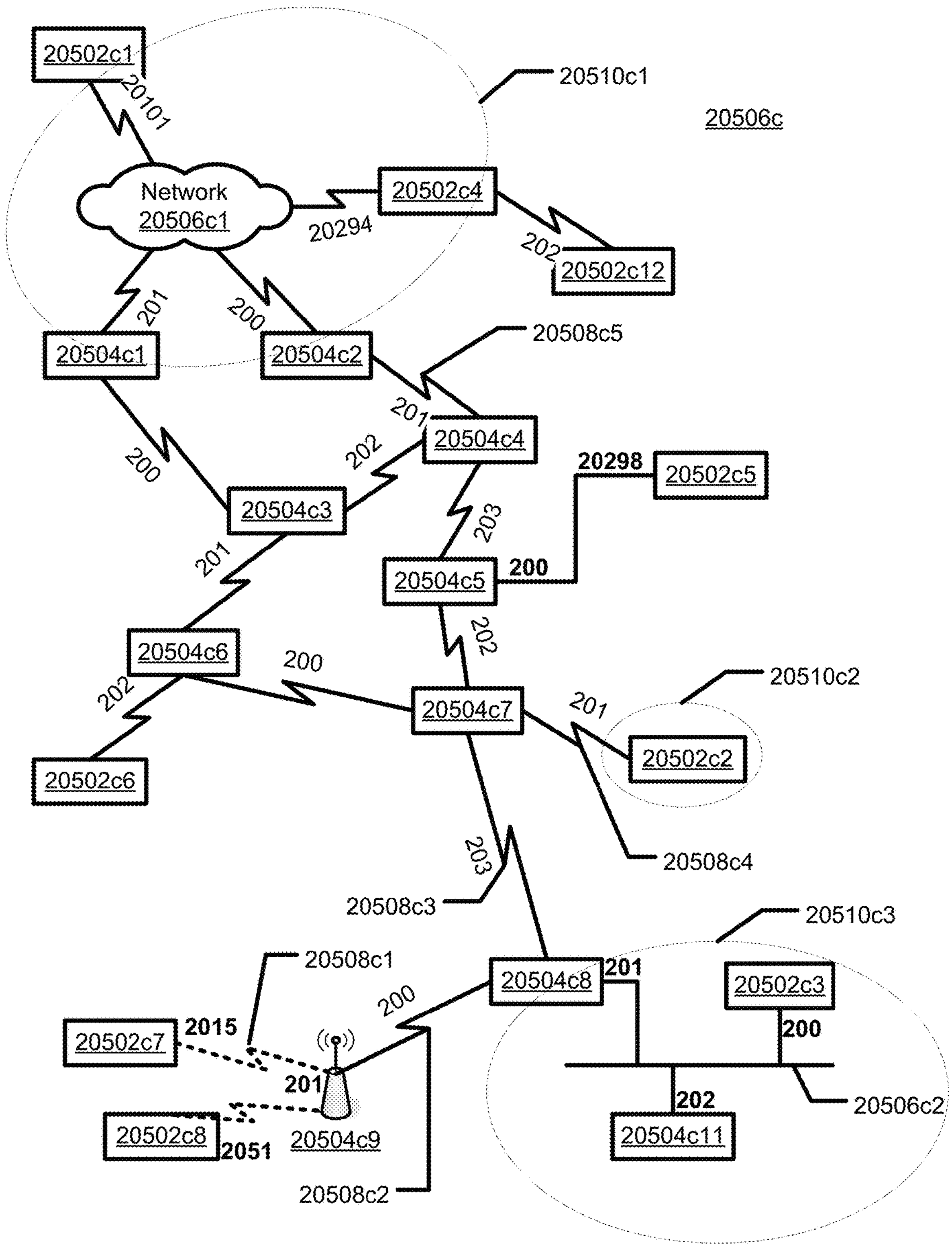
FIG. 23C is a network diagram illustrating an exemplary system for associating a name with a network path according to another aspect of the subject matter described herein.

FIGS. 23A-C respectively illustrate networks 20500 including nodes that in various aspects may include adaptations, analogs, and instances of any of the execution environments 20401, illustrated in FIG. 22A-B. The various illustrated nodes are operatively coupled via network interface components to the respective networks 20500 in FIGS. 23A-C. While any node may perform the method illustrated in FIG. 20, for ease of illustration, each of FIGS. 23A-C includes nodes 20502 for describing adaptations of the arrangement in FIG. 21 performing different aspects of the method illustrated in FIG. 20. An adaptation, analog, and/or instance of execution environment 20401*a*, in FIG. 22A, may be described as being included in and/or operating in a node 20502 in describing some aspects of the method illustrated in FIG. 20. In describing other aspects, a node 20502 may be described as including and/or otherwise providing an adaptation, analog, and/or instance of execution environment 20401*b* in FIG. 22B. Other nodes, such as path nodes 20504, in FIGS. 23A-C are described in terms of one or more roles they may play in interoperating with one or more nodes 20502. Exemplary path nodes 20504 include a router, a gateway, a switch, a virtual private network concentrator, a modem, a wireless access point, a bridge, a hub, a repeater, a firewall, a proxy server, an application for relaying messages, and the like.

FIG. 22A illustrates an execution environment 20401*a* hosting a program, illustrated by a networking application 20403*a* that sends and/or receives data via a network stack 20407*a*. FIG. 22B illustrates an execution environment 20401*b* including a topology service (t-service) 20405*b*, that sends and receives data by interoperating directly and/or indirectly with one or more components of a network stack 20407*b*. The network stacks 20407 in FIGS. 22A-B may be structured according to a layered architecture or model. FIG. 22A illustrates components that may be included in a network stack having a layered structure. The network stack 20407*b* may be structured analogously or may be structured in another manner known to those skilled in the art. Some components illustrated in the network stack 20407*a* correspond to components of the layered architecture specified by the Open System Interconnection (OSI) model, known to those skilled in the art. For example, network stacks 20407 may comply with the specifications for protocols included in the TCP/IP protocol suite. The OSI model specifies a seven-layer stack. The TCP/IP protocol suite may be mapped to layers three and four of the seven layers. Those skilled in the art will understand that fewer or more layers may be included in various adaptations, analogs, and/or instances of execution environments 20401 illustrated in FIG. 22A and in FIG. 22B, and in aspects described herein as well as other execution environments suitable for hosting an adaptation of the arrangement of components illustrated in FIG. 21.

An application, such as a networking application 20403*a* and/or a t-service 20405*b*, operating in a node 20502, may exchange data via a network with another node 20502 by interoperating with one or more components of a corresponding network stack 20407. In FIG. 22A, a networking application 20403*a* in an execution environment 20401*a* of a node 20502 may interoperate with a sockets component 20409*a* to access a protocol endpoint, via a socket, to send data via one or more data units to send and/or to receive data via a one or more data units from another node 20502. The application may specify an attribute of a network protocol to the sockets component 20409*a* to open a specified type of protocol endpoint of the network protocol supporting the specified attribute.

FIG. 22A illustrates a sockets component 20409*a* operatively coupled to a connectionless component 20411*a* supporting an unreliable transport layer protocol where delivery of data is not guaranteed and a connection-oriented component 20413*a* configured to support a reliable transport layer protocol designed to guarantee data delivery or to otherwise notify the application of a delivery failure. The user datagram protocol (UDP) in the TCP/IP protocol suite is currently the most widely used connectionless transport layer protocol. The most widely used connection-oriented transport layer protocol currently in use is the transmission control protocol (the TCP) also included in the TCP/IP protocol suite.

Transport layer protocols supported by connectionless component 20411*a* and by connection-oriented component 20413*a* generate transport layer data units to include data received from an operatively coupled application and/or a higher layer protocol component to deliver the data via the data units according to a network layer protocol to a transport layer protocol endpoint, accessed via a socket, in another node 20502. Analogously, data sent via an application in another node via a transport layer component may be received according to the network layer protocol by a compatible transport layer component, such as a connection-oriented component 20413*a* and/or by a connectionless component 20411*a*, to deliver to another protocol layer and/or to an application operating in the execution environment 20401*a* in the receiving other node 20502.

FIG. 22A illustrates a network layer component 20415*a* that delivers data according to a network layer protocol from a source node to a destination node across a link, a LAN, a WAN, and/or an internet, such as the Internet and/or an intranet. A network layer may include a component representing an endpoint of a network protocol of the network layer. In FIG. 22A, the network layer component includes an endpoint-in component 20414*a* to receiving data according to the network protocol from a data-out component (not shown) of a linker layer component 20425*a*. Data in one or more data units of the network protocol may be provided to a protocol endpoint in an application or higher layer protocol component. An endpoint-in component 20414*a* may provide a data unit to packet detector component 20417*a* to extract data to deliver to via a data-out component 20429*a* to a protocol endpoint of a higher layer protocol and/or application. A protocol layer component may receive data from an endpoint-out component (not shown) of a higher layer protocol component and/or application via a data-in component 20419*a*. The data-in component 20419*a* may interoperate with a packet generator component 20421*a* to generate a data unit of a network layer protocol which may be transmitted via an endpoint-out component 20423*a*.

A network layer protocol is designed and configured to deliver data across one or more communication links and/or networks between nodes in a network or internet. In FIG. 22A, a network layer component 20415*a* may receive a transport layer data unit from a connection-oriented component 20413*a* or a connectionless component 20411*a*, or data from another component in execution environment 20401*a*. The network layer component 20415*a* may format and/or otherwise package the data in network layer data units of the supported network layer protocol. The data units may be sent, via a linker layer protocol, to a next node in a network path to a destination node.

One or more link layer protocols may be included in communicatively coupling a source node 20502 and a destination node 20502 via a network path that includes one or more path nodes 20504 as illustrated in FIGS. 23A-C. In FIG. 22A, a network layer component 20415*a* may provide a network layer data unit as data (i.e. a message) to a component supporting a link layer protocol compatible with exchanging data via a physical data transmission medium coupled to a NIC. A link layer component 20425*a*, in FIG. 22A, illustrates a component in execution environment 20401*a* supporting a link layer protocol. Exemplary link layer protocols include Ethernet, Token-ring, and asynchronous transfer mode (ATM), to name a few. Some or all of a link layer component 20425*a* may be included in a NIC, as illustrated in FIG. 22A by a NIC 20427*a*. A portion of a link layer component may be external to an operatively coupled NIC. The external portion may be realized, at least in part, as a device driver for the NIC. Exemplary physical data transmission media include Ethernet cables of various types, co-axial cable, and fiber optic cable, and various media suitable for carrying various types of wireless signals.

For ease of illustration, the description that follows focuses on IP networks and protocols in the TCP/IP suite due to their wide use and because they are well-known in the art. Those skilled in the art will understand that the scope of the subject matter described is not limited to IP networks nor is it limited to network layer protocols. For example, the subject matter of this disclosure is applicable to the exchanging data via one or more link layer protocols via one or more physical links.

With respect to FIG. 22A, a link layer component 20425*a* may receive a network layer data unit for a network layer component 20415*a*. The network layer data unit may be formatted as one or more IP protocol packets from the network layer component 20415*a* supporting the Internet Protocol (IP). The link layer component 20425*a* packages IP packets from network layer component 20415*a* according to the particular link layer protocol supported. The link layer component 20425*a* may include a network layer data unit in one or more link layer data units. Analogously, the link layer component 20425*a* interprets data, received as signals transmitted by the physical medium operatively coupled to the NIC 20427*a*, according to a particular link layer protocol supported to receive network layer data units in one or more link layer data units. The link layer component 20425*a* may strip off link layer specific data and transfer the payload of the link layer data units to the network layer component 20415*a* to process the included network layer data unit.

A network layer component 20415*a* operating in a node 20502 may communicate with one or more nodes 20502 over a LAN, a link, and/or a network of networks such as an intranet or the Internet. A network layer component 20415*a* in the node 20502 may receive transport layer data units, for example, formatted as TCP packets from a connection-oriented layer component 20413*a* and/or transport layer data units formatted as UDP packets from a connectionless component 20411*a* illustrated in FIG. 22A. The network layer component 20415*a* packages transport layer data units from the connection-oriented component 20413*a* and/or the transport layer data units from the connectionless component 20411*a* into network layer data units, such as IP packets, to transmit across a network 20500, such as illustrated in FIGS. 23A-C.

Analogously, the network layer component 20415*a* may interpret data, received from a link layer component 20425*a* in the node 20502*b*, as IP protocol data and may detect IP packets in the received data. The network layer component 20415*a* may strip off IP layer specific data and transfer the payload of one or more IP packets to the connection-oriented layer component 20413*a* and/or to the connectionless component 20411*a* to process as transport layer data units according to a particular transport layer protocol.

As described above, FIGS. 22A-B each illustrate adaptations of network stacks 20407 that send and receive data over a network, such as networks 20500 illustrated in FIGS. 23A-C, via a network interface component, such as a NIC 20427*a*. For example, a networking application 20403*a* in FIG. 22A operating in a first node 20502 may interoperate with a t-service 20405*b* and/or another application operating in a second node 20502 via their respective network stacks: the network stack 20407*a* and the network stack 20407*b*.

In addition to the protocols described above, protocols corresponding to layers in the OSI model above the transport layer may be included in communicating via a network. The term "application protocol" as used herein refers to any protocol or combination of protocols that correspond to one or more layers in the OSI reference model above the transport layer. Programs and executables operating in execution environments 20401 may communicate via one or more application protocols. Exemplary application protocols include a hypertext transfer protocol (HTTP), various remote procedure call (RPC) protocols, various instant messaging protocol, email protocols, and various presence protocols.

Data exchanged between nodes 20502 in a network 20500 may be exchanged via data units of one or more protocols. Each layer of a network stack may provide a layer specific protocol component. Some protocols, combine services from multiple layers of the OSI model into a single layer such as the SYSTEMS NETWORK ARCHITECTURE (SNA) protocol. Still others may take a hybrid approach. With the advent of software defined networking and flexible protocols such as OPENFLOW, new protocols and variations of existing protocols are being introduced and will be introduced that are within the scope of the subject matter of the present disclosure.

A network protocol is defined by one or more formatting rules and/or a vocabulary referred to as a schema. The schema defines valid data units to exchange between and/or among protocol endpoints defined by the respective network protocol. A network protocol also specifies and/or otherwise is compatible with one or more address spaces for identifying protocol endpoints for exchanging data. The terms "identifier space" and "address space" are used interchangeably herein. For example, various versions of hypertext transfer protocol (HTTP) specify a format for HTTP uniform resource locators (URL). HTTP specifies a location in an HTTP header that identifies a URL as an identifier or address from the HTTP address space that identifies both a resource and recipient of an HTTP data unit. The transmission control protocol (TCP) specifies a format and vocabulary for a TCP header including a destination protocol endpoint field for including what the TCP refers to as a destination port number that, when combined with a destination protocol address from an IP packet, identifies a transport layer protocol endpoint of a receiver of data included in a TCP data unit. A sending endpoint is similarly identified by a source port number included in a source protocol endpoint field of a TCP data unit and a source protocol address from an IP data unit.

Other exemplary address spaces that identify protocol endpoints in various protocols include an email address space identifying a protocol endpoint for the simple mail transfer protocol (SMTP), a telephone number address space for various telephony protocols, instant message address spaces for various instant message protocols, and media access control (MAC) addresses for various link layer protocols, to name just a few examples.

Since addresses from address spaces at various layers of a network stack are often not suited for remembering and/or identifying by users, an address space of symbolic identifiers or names may be used to provide aliases for addresses in an address space identifying protocol endpoints corresponding to a protocol supported by a layer of a network stack. The domain name space is a well-known identifier space of names for identifying nodes and/or network interfaces as protocol endpoints of the IP protocol in the Internet, private internets, and intranets. The domain name system (DNS) is a collection of domain name system services maintaining databases that associate names from the domain name space with protocol addresses, in particular with IP addresses. The domain name space defines a global name space shared across the Internet.

FIG. 22B illustrates an execution environment 20401*b* hosting a t-service 20405*b*, such as a DNS service. An adaptation of the arrangement of components in FIG. 21 is illustrated operating in the t-service 20405*b*. The t-service 20405*b* is configured to receive a request from a topology communication (t-communication) component 20410*a* in FIG. 22A to resolve a symbolic identifier to a protocol address of a protocol endpoint. A networking application 20403*a* or other component in an execution environment 20401*a* may communicate with a t-service 20405*b* via an application specific topology protocol supported by a t-communication component 20410*a* illustrated in FIG. 22A and a topology service protocol (t-protocol) component 20421*b* in each of FIGS. 22A-B. A t-service 20405*b* may communicate with other t-services in other nodes included in a topology service system via a topology peer (t-peer) component 20431*b*. Exemplary topology protocols include the DNS protocol, the lightweight directory access protocol (LDAP), and the X.20500 protocol.

FIG. 23B illustrates a network path, as defined above, for transmitting data via a network protocol from a first node 20502*b*1 to a fifth node 20502*b*5 in a network 20500*b* that includes a sequence of nodes including of the first node 20502*b*1, a first path node 20504*b*1, a second path node 20504*b*2, and the fifth node 20502*b*5. In FIG. 23C, a first network path communicatively coupling a seventh node 20502*c*7 and an eighth path node 20504*c*8 includes a first sequence of nodes including the seventh node 20502*c*7, a ninth path node 20504*c*9, and the eighth path node 20504*c*8. The first network path, as FIG. 23C illustrates, is included in a second network path communicatively coupling the seventh node 20502*c*7 and a second node 20502*c*2 that includes a second sequence of nodes including the nodes in the first sequence, a seventh path node 20504*c*7, and the second node 20502*c*2. A network path may be a physical network path and/or a logical network path based on a particular network protocol defining the protocol endpoints.

FIG. 23B, illustrates a number of network paths and hop paths communicatively coupling a first node 20502*b*1 and a fifth node 20502*b*5 in a network 20500*b*. One hop path illustrated includes a sequence of hops including a first hop 20508*b*1, a sixth hop 20508*b*6, and a ninth hop 20508*b*9. In FIG. 23C, the first network path described above communicatively coupling the seventh node 20502*c*7 and the eighth path node 20504*e*8 includes a first sequence of hops including a first hop 20508*c*1 and a second hop 20508*c*2. The first network path is included in the second network path described above that includes a second sequence of hops including the first sequence of hops, a third hop 20508*c*3, and a fourth hop 20508*c*4.

In FIG. 23B, the network path described above communicatively coupling the first node 20502*b*1 and the fifth node 20502*b*5 includes a sequence of network interfaces including a network interface in the first path node 20504*b*1 in the first hop 20508*b*1, a network interface in the second path node 20504*b*2 in the sixth hop 20508*b*6, and a network interface in the fifth node 20502*b*5 in the ninth hop 20508*b*9. The network paths, in FIG. 23C and described above, may analogously be described as a sequence of network interfaces.

Operational Details and Aspects

With reference to FIG. 20, a block 20202 illustrates that the method includes receiving a first message, from a first node by a second node via a first network path in a network, identifying a first symbolic identifier of the first node, wherein the first network path includes a first hop included in communicatively coupling the first node and the second node. Accordingly, a system for associating a name with a network path includes means for receiving a first message, from a first node by a second node via a first network path in a network, identifying a first symbolic identifier of the first node, wherein the first network path includes a first hop included in communicatively coupling the first node and the second node. For example, the arrangement in FIG. 21, includes resolver component 20302 that is operable for and/or is otherwise included in receiving a first message, from a first node by a second node via a first network path in a network, identifying a first symbolic identifier of the first node, wherein the first network path includes a first hop included in communicatively coupling the first node and the second node. The system for associating a name with a network path includes one or more processors and logic encoded in one or more computer readable media for execution by the one or more processors that when executed is operable for and/or is otherwise included in receiving a first message, from a first node by a second node via a first network path in a network, identifying a first symbolic identifier of the first node, wherein the first network path includes a first hop included in communicatively coupling the first node and the second node.

FIG. 22A-B illustrate resolver components 20402 as adaptations and/or analogs of the resolver component 20302 in FIG. 21. One or more resolver components 20402 operate in an execution environment 20401. In FIG. 22A, a resolver component 20402*a* is illustrated as a component of a topology space (t-space) component 20404*a*. In FIG. 22B, a resolver component 20402*b* may be included in a t-service 20405*b*. A node 20502 may include a resolver component 20402*a* and/or a resolver component 20402*b* A path node 20504 may also include an adaptation and/or an analog of a resolver component.

With reference to FIG. 20, a block 20204 illustrates that the method includes identifying second path information identifying a second hop in a second network path included in communicatively coupling the second node and a third node. Accordingly, a system for associating a name with a network path includes means for identifying second path information identifying a second hop in a second network path included in communicatively coupling the second node and a third node. The system for associating a name with a network path includes one or more processors and logic encoded in one or more computer readable media for execution by the one or more processors that when executed is operable for and/or is otherwise included in identifying second path information identifying a second hop in a second network path included in communicatively coupling the second node and a third node.

For example, the arrangement in FIG. 21 includes topology space component 20304 that is operable for and/or is otherwise included in identifying second path information identifying a second hop in a second network path included in communicatively coupling the second node and a third node. FIGS. 22A-B illustrate topology space components 20404 as adaptations and/or analogs of the topology space component 20304 in FIG. 21. One or more topology space components 20404 operate in an execution environment 20401. In FIG. 22A, a topology space component 20404*a* is illustrated as component of a network layer component 20415*a*. In FIG. 22B, a topology space component 20404*b* is illustrated as component of a t-service component 20405*b*. A node 20502 may include a topology space component 20404*a* and/or a topology space component 20404*b*. A path node 20504 may also include an adaptation and/or an analog of a topology space component.

In FIG. 20, a block 20206 illustrates that the method includes sending a second message, identifying the first symbolic identifier and the first hop, to the third node via the second hop to associate the first symbolic identifier with a third network path that includes a node included in at least one of the first hop and the second hop. Accordingly, a system for associating a name with a network path includes means for sending a second message, identifying the first symbolic identifier and the first hop, to the third node via the second hop to associate the first symbolic identifier with a third network path that includes a node included in at least one of the first hop and the second hop. The system for associating a name with a network path includes one or more processors and logic encoded in one or more computer readable media for execution by the one or more processors that when executed is operable for and/or is otherwise included in sending a second message, identifying the first symbolic identifier and the first hop, to the third node via the second hop to associate the first symbolic identifier with a third network path that includes a node included in at least one of the first hop and the second hop.

For example, the arrangement in FIG. 21, includes topology relay component 20306 that is operable for and/or is otherwise included in sending a second message, identifying the first symbolic identifier and the first hop, to the third node via the second hop to associate the first symbolic identifier with a third network path that includes a node included in at least one of the first hop and the second hop. FIGS. 22A-B illustrate topology relay components 20406 as adaptations and/or analogs of the topology relay component 20306 in FIG. 21. One or more topology relay component 20406 operate in an execution environment 20401. In FIG. 22A, a topology relay component 20406*a* is illustrated as component of a t-communication component 20410*a*. In FIG. 22B, a topology relay component 20406*b* is illustrated as component of a t-service component 20405*b*. For example, a node 20502 may include a topology relay component 20406*a* and/or a topology relay component 20406*b*. A path node 20504 may also include an adaptation and/or an analog of a topology relay component.

Address information and path information may be detected in various ways as described herein. With respect to FIG. 23A and FIG. 22A, an instance of an execution environment 20401*a* may be included and/or otherwise may be provided by a first node 20502*a*1 in a first region 20510*a*1 including a portion of a network 20500*a*. An address handler component 20416*a* in the first node 20502*a*1 may receive and/or otherwise detect address information from a networking application 20403*a* and/or one or more of a sockets component 20409*a*, a connection-oriented component 20413*a*, a connectionless component 20411*a*, and a t-communication component 20410*a*. The address handler component 20416*a* may receive the address information via a data-in component 20419*a* that provides an interface for network layer component 20415*a* to receive data to transmit via a network. The address information may include and/or otherwise identify a protocol address. The protocol address may be formatted as required by the network protocol supported by the network layer component 20415*a*. Schemas for various types of protocol addresses, such as those included scope-specific address spaces and/or path-based address spaces, are illustrated in FIGS. 24A-E described below. Alternatively or additionally, the protocol address may be represented in another form, such as a text string.

The first node 20502*a*1 may identify a protocol endpoint in a node outside the first region 20510*a*1 by a protocol address from, for example a first scope-specific address space specific to the first region 20510*a*1. The protocol address identifies the node including the protocol endpoint and identifies a network interface of the node. With respect of FIG. 23A, a first protocol address, in the address space, may serve as an identifier of a network interface of a second node 20502*a*2. The second node 20502*a*2 is illustrated in a second region 20510*a*2 that may include only the second node 20502*a*2. Some or all of a protocol address may be a scoped address, which may have a scope that spans the first region 20510*a*1 and identifies a node in the first region 20510*a*1 to another node in the first region 20510*a*1.

The address information and/or path information may be received in a data unit of a network protocol supported by a network layer component 20415*a*. Networking application 20403*a* in the first node 20502*a*1 may provide data to send to the second node 20502*a*2 by providing address information identifying a protocol address that in the first region identifies the second node 20502*a*2. The address information may be detected by the address handler component 20416*a*. The address handler component 20416*a* may include instructions to generate and/or to store a representation of the protocol address as address information in a data unit specified according to the network protocol, such as the Internet Protocol or an Ethernet protocol, supported by the network layer component 20415*a* or the link layer component 20425*a*. The address handler component 20416*a* may interoperate with a packet generator component 20421*a* to include the address information in the data unit as specified by the corresponding network protocol. The address information may include and/or or may otherwise identify path information that identifies a network path that communicatively couples the first node 20502*a*1 and the second node 20502*a*2.

In FIG. 23A, an identifier, 202.202.203.203, identifies a sequence of network interfaces of nodes in a network path that identifies the second node 20502*a*2 with respect to the nodes in the first region 20510*a*1. Exemplary representations of the identifier as a protocol address are described below with respect to FIGS. 24A-E. The identifier, 202.202.203.203, when specific to a node outside the first region 20510*a*1 may serve as a protocol address for another node other than the second node 20502*a*2 or may not identify any nodes with respect to the other node, as is the case illustrated in FIG. 23A.

The packet generator component 20421*a* in the first node 20502*a*1 may include one or more instructions that when executed by the first node 20502*a*1 identify a source protocol address based on address information represented in the data unit to identify the first node 20502*a*1 as the source node of the data in the data unit. The packet generator component 20421*a* may interoperate with a t-space component 20404*a* to receive the source address information to include a representation of the source protocol address in the data unit.

A t-space component 20404*a* in the first node 20502*a*1 may identify a source protocol address that, in a second scope-specific address space specific to the second region 20510*a*2 that includes the second node 20502*a*2, identifies the first node 20502*a*1. The second scope-specific address space may be node-specific. The identifier, 201.201.200.203, identifies a sequence of network interfaces and hops in a network path from the second node 20502*a*2 to the first node 20502*a*1. In a second node-specific address space specific to the second node 20502*a*2, the identifier identifies the first node 20502*a*1. The source protocol address may be pre-specified to the first node 20502*a*1 via a user and/or may be determined based on a previous communication with the second node 20502*a*2. The source protocol address may be retrieved via a request to a network directory service, as described in more detail below and referred to herein as a “topology service”.

A packet generator component 20421*a* may receive source address information that identifies a scoped address that identifies the first node 20502*a*1 in the first region 20510*a*1. In one aspect, illustrated in FIG. 23A, the number ‘3’ may identify a network interface of the first node 20502*a*1 and or a hop in the scope of the first region 20510*a*1. As the data is transmitted via the network path identified by source address information included in one or more data units, included in transmitting the data, may be augmented and/or otherwise updated to provide source address information from which the second node 20502_a_2 may detect and/or may otherwise determine a protocol address that identifies the first node 20502_a_1 in an address space usable by the second node 20502_a_2.

The second node 20502_a_2, in FIG. 23A, may identify path information, such as the identifier, 201.202, as an identifier of a sequence of network interfaces of nodes and/or hops in a network path that communicatively couples the second node 20502_a_2 and a third node 20502_a_3. The identifier, 201.202, when specific to a node outside the second region 20510_a_2 may serve as a protocol address for another node other than the third node 20502_a_3 or may not identify any nodes with respect to the other node, as is the case illustrated in FIG. 23A.

The second node may receive a first message via one or more data units that identify 202.202.203.203 as a protocol address of the second node 20502_a_2. The first message may be sent by a t-communication component 20410_a_ operating in an execution environment 20401_a_ of the first node 20502_a_1. The first message may include a symbolic identifier, such as a domain name, of the first node 20502_a_1 to register in a topology service system including a t-service 20405_b_ illustrated in FIG. 22B.

In an aspect, a topology monitor (t-monitor) component 20408_a_ in an execution environment of the second node 20502_a_2 may detect the path information, 202.202.203.203 in address information detected in an address field of a data unit and/or from an application operating in the second node 20502_a_2. The t-monitor component 20408_a_ may provide path information to a t-space component 20404_a_. The t-space component 20404_a_ may associate the symbolic identifier received via the resolver component 20402_a_ with a location in a topological space identified based on the path information. The location may be associated with symbolic identifier to identify address information which may include an identifier of the first node 20502_a_1 with respect to the second region 20510_a_1. The t-space component 20404_a_ may save the association in a local topology data store 20433_a_, which in an aspect may serve as a cache. Additionally, the second node 20502_a_2 may forward the symbolic identifier in a second message to be registered in a topology service system, such as the domain name system or an analog of the domain name system. The t-space component 20404_a_ may interoperate with a t-access component 20412_a_ to identify address information stored in a topology data store 20433_a_ to send along with the symbolic identifier. The t-space component 20404_a_ may interact with a topology relay (t-relay) component 20406_a_ to generate the second message to send to deliver to a node including a t-service to register the symbolic identifier.

The second node 20502_a_2 may send a message to the third node 20502_a_3 in one or more data units identifying the identifier, 201.202, in a destination address field of the respective data unit(s). The message may include and/or otherwise identify the symbolic identifier received from the first node 20502_a_1.

In another aspect, the second node 20502_a_2 may be included in and/or may otherwise provide an instance of the execution environment 20401_b_. In FIG. 22B, a symbolic identifier sent in a message sent by a t-communication component 20410_a_ via a t-protocol component 20421_a_ in the first node 20502_a_1 may be received in a message sent by the second node 20502_a_2. The message from the first node 20502_a_1 may include address information received and/or otherwise identified by a t-communication component 20410_b_, illustrated in FIG. 22B, in the second node 20502_a_2. The message may include a symbolic identifier which is detected by a resolver component 20402_b_. The message may include and/or otherwise identify path information identifying a network path included in communicatively coupling the first node 20502_a_1 and the second node 20502_a_2. For example, the path information in the message may identify a network path that communicatively couples the first node 20502_a_1 and the second node 20502_a_2. Path information that identifies a network path that communicatively couples the second node 20502_a_2 and the third node 20502_a_3 may be included in and/or otherwise identified by address information of a data unit included in transmitting the message from the second node 20502_a_2 to the third node 20502_a_3. The message may be received by the t-communication component 20410_b_ to create and/or update a record associating the symbolic identifier with address information and/or path information that identifies the first node with respect to another node in the network 20500_a_.

The t-communication component 20410_b_ may provide information received in the message, directly and/or indirectly, to a t-space component 20404_b_ to create and/or update the record. Path information may alternatively be received in a request to resolve a symbolic identifier to address information identifying a protocol address. A request to resolve a symbolic identifier may be received by the t-communication component 20410_b_ and/or by a t-peer component 20431_b_.

The t-space component 20404_b_ may interoperate with a t-monitor component 20408_b_ in execution environment 20401_b_ of the second node 20502_a_2. The t-monitor component 20408_b_ may receive the address information identifying the sequence, 202.202.203.203, along with a symbolic identifier of the first node 20502_a_1. The t-monitor component 20408_b_ may provide the address information to a t-space component 20404_b_ to associate with the symbolic identifier as described above. The address information may be associated by determining a location for the first node 20502_a_1 in a topological space representing some or all of a network. A topological space, stored in a topology data store 20433_b_, and representing part or all of the network may be updated, via a topology access (t-access) component 20412_b_, to represent the first node 20502_a_1 at the location. For example, a record associating the symbolic identifier and the location in the topological space may be created and/or otherwise updated. Such a record may be stored in a topology data store 20433_b_ illustrated in FIG. 22B. The t-access component 20412_b_ may interoperate with a t-space component 20404_b_ to represent the first node 20502_a_1 in one or more topological spaces maintained by the t-service 20405_b_ in the topology data store 20433_b_.

The t-space component 20404_b_ may additionally forward the symbolic identifier in a second message to be registered in another node, such as the third node 20502_a_3, in a distributed topology service system. The t-space component 20404_b_ may interoperate with a resolver component 20402_b_ to identify address information and/or location information locating the first node 20502_a_1 to send along with the symbolic identifier. Location information may identify a location relative to another entity and/or location in a topological space and/or may identify an absolute location based on a coordinate system. The resolver component may interact with a t-relay component 20406_b_ to generate the second message to deliver to a node, such as the third node 20502_a_3 of an execution environment 20401_b_ including a t-service 20405*b*, which may register the symbolic identifier and/or forward to yet another t-service in the topology service system.

The second node 20502*a*2 may send a message to the third node 20502*a*3 in one or more data units identifying the sequence, 201.202, in a destination address field of the data unit(s). The message may include and/or otherwise identify the symbolic identifier of the first node 20502*a*1.

As described, the third node 20502*a*3 may be included in and/or may otherwise provide an instance of the execution environment 20401*b*, in FIG. 22B. A symbolic identifier of the first node 20502*a*1 may be sent in a message by a t-communication component 20410*a* via a t-protocol component 20421*a* in the first node 20502*a*1. The message may be received by the second node 20502*a*2. A message from the second node 20502*a*2 to the third node 20502*a*3 may include address information and/or path information, which may be received and/or otherwise identified by a t-communication component 20410*b*, illustrated in FIG. 22B, in the third node 20502*a*3. The message received by the third node 20502*a*3 may include the symbolic identifier of the first node 20502*a*1, such as a DNS name, and may include and/or otherwise may be received based on address information and/or path information for communicating with the first node 20502*a*2. The data may be received by the t-communication component 20410*b* to create and/or update a record associating the symbolic identifier with some or all of the address information and/or path information.

The t-communication component 20410*b* may provide the data unit or a suitable portion thereof, directly and/or indirectly, to the t-monitor component 20408*b* in interoperating, directly or indirectly, with a t-space component 20404*b* to create and/or update a representation of a node in a topological space. Address information may alternatively be received in a request to resolve a symbolic identifier to address information identifying a protocol address. A request to resolve a symbolic identifier may be received by the t-communication component 20410*b* and/or by a t-peer component 20431*b*.

The third node may associate the symbolic identifier with a third sequence of network interface identifiers, 202.202.203.203.201.202, that identifies the third node 20502*a*3 in an address space specific to the first node 20502*a*1. Thus, the first node may be registered with a t-service operating in an execution environment of the third node 20502*a*3 by the second node 20502*a*2. The first node 20502*a*1 need not have access to an address of the t-service 20405*b* in the third node to register the symbolic identifier of the first node 20502*a*1. A first node may register with a t-service, unknown to the first node, by sending its symbolic identifier to another node that does have access to a protocol address of node included in and/or providing an execution environment hosting the t-service. If a node receives a symbolic identifier of another node to register and the receiving node does not know the address of a topology node hosting a t-service, the receiving node may forward the symbolic identifier to still another node that might have access to a protocol address of the topology node. The symbolic identifier may be forwarded among nodes until a node including a t-service (i.e. a topology node) is located. As the symbolic identifier is forwarded path information, hop information, network interface information, and scope specific address information may be collected to deliver to a t-service.

As described herein, a first node may detect address information and/or path information that identifies a first-second protocol address that, in a first scope-specific address space specific to a first region that includes the first node, identifies the second node. Alternatively or additionally, the second node may detect address information that identifies a second-first protocol address that, in a second scope-specific address space specific to a second region that includes the second node, identifies the first node to the second node. Alternatively or additionally, the second node may receive address information identifying the first-second protocol address. The second node may determine the second-first protocol address based on the first-second protocol address. Alternatively or additionally, the first node may receive the second-first protocol address. The first node may determine the first-second protocol address based on the second-first protocol address.

Returning to FIG. 22B and FIG. 23A, address information and/or path information may be detected by and/or otherwise may be identified based on a t-space component 20404*b* operating in a t-service 20405*b* in an address representation in a data unit received via the network 20500*a*. An instance of an execution environment 20401*b* may include and/or otherwise may be provided by the third node 20502*a*3 in a third region 20510*a*3 in the network 20500*a*. A t-monitor component 20408*b* in the third node 20502*a*3 may receive and/or otherwise detect address information and/or path information in a data unit received from another node, such as the second node 20502*a*2 via a NIC and a link layer component operating in the third node 20502*a*3, as described above. The data unit may be received from the link layer component via a t-protocol component 20421*b* by a t-peer component 20431*b*.

A t-space component 20404*b* in the third node 20503*a*3 may determine an address space that includes a protocol address identified by the address information. For example, the t-space component 20404*b* may identify that a protocol address detected in the address information is in a third scope-specific address space specific to a third region 20510*a*3 that includes the third node 20502*a*3 in detecting an identifier of a node, such as the second node 20502*a*2, that sent the data in the received data unit.

When the protocol address, identified in address information is detected by the t-space component 20404*b*, is not in an address space that is usable for sending data to another node, the t-space component 20404*b* may determine a protocol address in a suitable address space as described in more detail below. In one aspect, the t-space component 20404*b* may receive address information that identifies the third node, in a second scope-specific address space of the second node that sent the data unit. The t-space component 20404*b* may determine a third-second protocol address, that in a third node-specific address space specific to the third node, identifies the second node 20502*a*2. In another aspect, the address information may identify a global or local scoped address.

FIGS. 24A-E illustrate a number of exemplary address representations 20602 illustrating various address formats and vocabularies for representing scope-specific addresses, path-based addresses, hop-based addresses, network interface-based addresses, scoped address-based addresses, and/or hybrid addresses. Various portions of the respective address representations 20602 are illustrated as contiguous, but need not be so in various embodiments according to the subject matter described herein. Each of the types of address representation 20602 shown in FIGS. 24A-E may be included in a destination protocol address portion and/or a source protocol address portion of an IPv4 data unit header, an IPv6 data unit header, or a link layer protocol header. The address type, such as scope-specific, may be identified by a bit pattern or identifier defined to identify a protocol address type. The bit pattern or identifier may be stored in a type bits portion of an IP packet and/or in some other specified location.

Figure 24A:
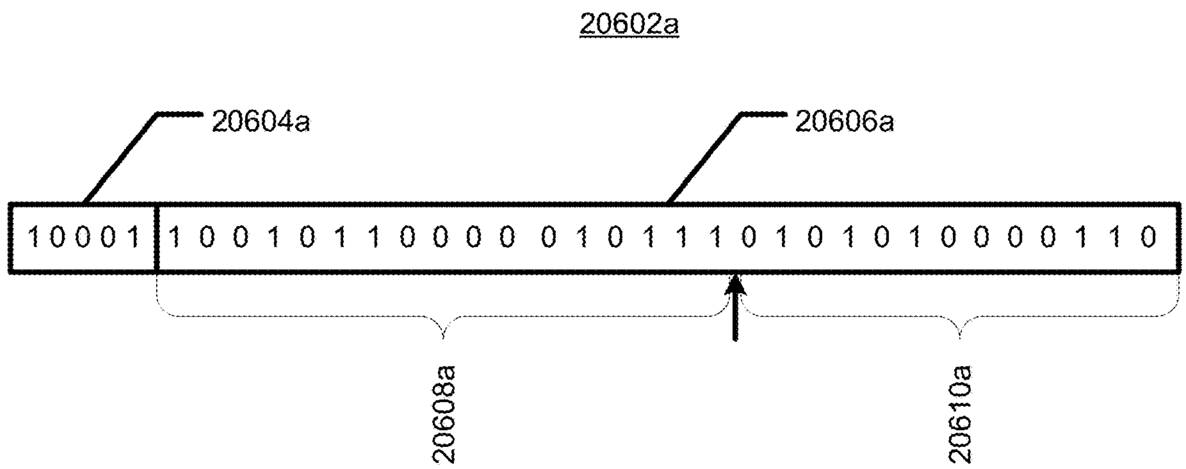
FIG. 24A is a diagram illustrating an exemplary representation of a protocol address according to another aspect of the subject matter described herein.

FIG. 24A illustrates an address representation 20602*a* that may be included in a data unit or packet of a network layer protocol, such the Internet Protocol, and/or a frame or packet of a link layer protocol. An address representation 20602*a* may identify one or more scope-specific addresses for one or more respective nodes in a network path for transmitting data from one path end node to another. In an aspect, an address representation 20602*a* may be processed as including at least three portions. An address separator field 20604*a* is illustrated including a binary number. In FIG. 24A, the binary number illustrated equals seventeen in base ten. The number in the address separator field 20604*a* identifies a boundary in an address information field 20606*a* separating a first address field 20608*a* and a second address field 20610*a*. The first address field 20608*a* may identify a first protocol address that, in a first scope-specific address space of a first node, identifies a second node included in the network path. The second address field 20610*a* may identify a second protocol address that, in a second scope-specific address space of the second node, identifies the third node.

With respect to FIG. 23A, an address representation 20602*a* may be included in a data unit including data from the first node 20502*a*1 to transmit to the second node 20502*a*2. As described above, the sequence, 202.202.203.203, may be represented in an address information field 20606*a* to identify a first-second protocol address that, for the first node 20502*a*1, identifies the second node 20502*a*2. The first-second protocol address may be an identifier that, in the first scope-specific address space, identifies the second node 20502*a*2.

At the first node 20502*a*1, an address handler component 20416*a* and/or a t-space component 20404*a* operating in the first node 20502*a*1 may set and/or otherwise detect a value in the address separator field 20604*a* that indicates a first address field 20608*a* has a zero size. The entire address information field 20606*a*, thus, constitutes a second address field 20610*a* at the first node 20502*a*1 and identifies the first-second protocol address that may be set and/or otherwise detected by the address handler component 20416*a*.

At a third path node 20504*a*3, an address separator field 20604*a* in a data unit including the data from the first node 20502*a*1 may be set to and/or otherwise may be detected, by an address handler component 20416*a* and/or a t-space component 20404*a* in the third path node 20504*a*3, as a value that identifies 202.202 in a first address field 20608*a*. The information in the first address field 20608*a* identifies a protocol address that, in the first scope-specific address space identifies the third path node 20504*a*3. The value in the address separator field also identifies a second address field 20610*a* that identifies 203.203 as a protocol address that, in a fifth scope-specific address space specific to a fifth region 20510*a*5 including the third path node 20504*a*3, identifies the second node 20502*a*2.

At the second node 20502*a*2 a data unit including the data from the first node 20502*a*1 may include a value, set and/or detected by an address handler component in the second node 20502*a*2, in an address separator field 20604*a* that indicates that the address information field 20606*a* includes only a first address field 20608*a* identifying 202.202.203.203 as the first protocol address.

As the data from the first node 20502*a*1 is transmitted from node to node in the network path the value represented in an address separator field 20604*a* in an address information field 20606*a* in a data unit including the data or a portion thereof may be adjusted by respective address handler components 20416*a* in the nodes in the network path to identify a protocol address in a suitable address space for the respective nodes.

In an aspect, at the second node 20502*a*2, the value in the separator address field may indicate to a t-space component 20404*a* that address information field 20606*a* also includes information for determining and/or otherwise identifying a second-first protocol address, that in the second scope-specific address space, identifies the first node 20502*a*1. An example and description are provided below.

The above describes an address representation 20602*a* in the role of identifying destination address information in a data unit of a network protocol, such as an IP protocol or an Ethernet frame. An address representation 20602*a* may include source address information with respect to a node receiving a data unit sent from the first node 20502*a*1 to the second node 20502*a*2. An address information field 20606*a* including source address information at the third path node 20504*a*3 may include a first address field 20608*a* identifying the sequence, 200.203, that identifies a protocol address that, in the fifth scope-specific address space specific to the first region 20510*a*5, identifies the first node 20502*a*1 as the source node for the data in the data unit. The address information field 20606*a* including the source address information at the third path node 20504*a*3 may include a second address field 20610*a* identifying the sequence, 201.201, that identifies a protocol address that, in the second node-specific address space specific to the second region 20510*a*2, identifies the third path node 20504*a*3 as a path node in the network path traversed by the data sent from the first node 20502*a*1.

A data unit may include separate address representations for destination address information and source address information as, for example, current IP packet headers are specified. Alternatively, a data unit such as an IP packet may include an address representation that identifies source address information in the context of one address space specific to a node, in a region, in a network path traversed by the data unit and identifies destination address information to another node, in another region in the network path. Rather than requiring separate source and destination representations, a single address representation may identify some or all of a destination protocol address with respect to one scope-specific address space and some or all of a source protocol address with respect to another scope-specific address space. More details, as well as examples, are described below.

Figure 24B:
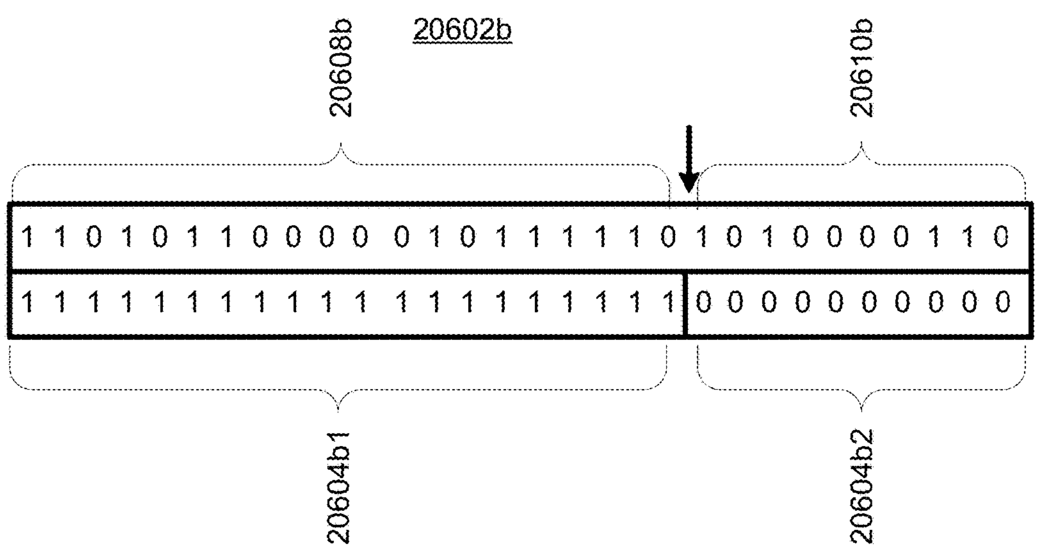
FIG. 24B is a diagram illustrating an exemplary representation of a protocol address according to another aspect of the subject matter described herein.

FIG. 24B illustrates another type of address representation 20602*b* that may be included in a data unit to provide address information according to a particular network protocol, such as IP, IPX, or Ethernet. Instead of or in addition to including an address separator field 20604 that distinguishes a first address field 20608 from a second address field 20610 based on a bit count, a bit-mask may be specified as one or more address separator fields 20604*b* to identify a first address field 20608*b* and a second address field 20610*b* in an address information field 20606*b*. Address information represented as illustrated in FIG. 24B may be processed in an analogous manner to that described for the address information represented in FIG. 24A based on the bit mask address separator field(s) 20604*b* rather than and/or in addition to a size address separator field 20604*a* illustrated in FIG. 24A.

Figure 24C:
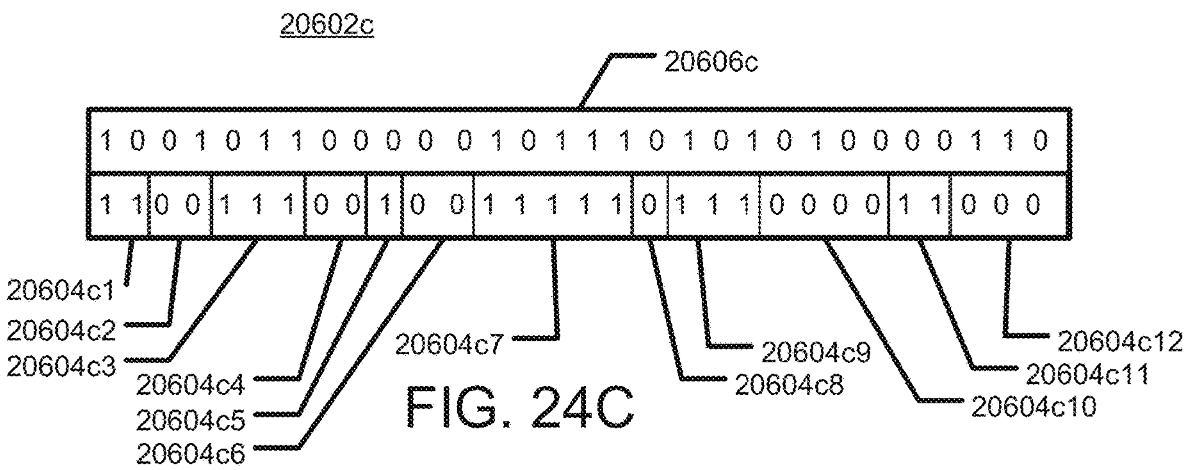
FIG. 24C is a diagram illustrating an exemplary representation of a protocol address according to another aspect of the subject matter described herein.

FIG. 24C illustrates an address representation 20602*c* identifying one or more scope-specific addresses. An address information field 20606*c* may be interpreted as one or more scope-specific addresses based on one or more address separator field(s) 20604*c*. Address separator fields 20604*c* are specified according to a network protocol to distinguish one node-specific address from another in an address information field 20606*c*. FIG. 24C illustrates an address separator field 20604 that distinguishes and/or identifies hop identifiers that may be scope-specific addresses and/or included in a scope-specific address. A scope-specific address may identify a node one hop away from the region for which the address is specific. The address separator fields 20604*c* distinguish separate hop identifiers based on changes in values of bits in consecutive address separator fields 20604*c*. In FIG. 24C, a first address separator field 20604*c*1 includes one or more 1-valued bits that correspond to bit positions in the address information field 20606*c* to identify a first address field referred to in FIG. 24C as a first hop information field. Scope-specific addresses that include more than one hop may be distinguished similarly as shown in FIG. 24B. Combinations of hop identifiers and path identifiers may be distinguished as scope-specific addresses by address separator fields 20604. An illustrated second hop information field 20604*c*2 includes one or more 0-valued bits to identify a second hop information field in address information field 20606*c*. Additional alternating sequences of 1-valued bits and 0-valued bits illustrated by address separator fields 20604*c*3-2012*c* correspond to and identify other hop information fields identifying hops in a network path communicatively coupling a pair of path end nodes and identified by a scope-specific address.

In FIG. 23C, a hop may be identified by an interface identifier of a network interface in a pair of communicatively coupled nodes included in the hop. For example, the number, 201, may serve as a hop identifier specific to a second path node 20504*c*2 to identify a fifth hop 20508*c*5 including the second path node 20504*c*2 and a fourth path node 20504*c*4. The number, 201, also identifies a network path for exchanging data between the two nodes. The number, 201, may also be a protocol address, that in a second path node-specific address space specific to the second path node 20504*c*2, identifies the fourth path node 20504*c*4. The number 1 may also identify a hop for the fourth path node 20504*c*4 to exchange data with the second path node 20504*c*2, may also be a protocol address that, in a fourth path node-specific address space specific to the fourth path node 20504*c*4 identifies the second path node 20504*c*2, and may identify a particular network interface of the second path node 20504*c*2 and/or of the fourth path node 20504*c*4.

A first node 20502*c*1 may identify a second node 20502*c*2 by a first-second protocol address, that in a first scope-specific address space specific to a first region 20510*c*1 including the first node 20502*c*1, identifies the second node 20502*c*2. The first-second protocol address may include and/or otherwise may be based on a sequence of hop identifiers 200.200.201.203.202.201. Note that other network paths are illustrated for transmitting data from the first node 20502*c*1 to the second node 20502*c*2 and may also be and/or otherwise may identify protocol addresses in the first scope-specific address space that identify the second node 20502*c*2 to nodes in the first region 20510*c*1. Note that the second path node 20504*c*2 includes a network interface that is in the first region 20510*c*1 and a network interface that is not in the first region. In communicating with the second node 20502*c*2 via the network interface outside the first region 20510*c*1 the second path node 20504*c*2 is defined to be outside the first region 20510*c*1. When the second path node 20504*c*2 communicates with a node outside the first region 20510*c*1 via the second path node's 20504*c*2 network interface in the first region 20510*c*1, the second path node 20504*c*2 is defined to be in the first region 20510*c*1. For example when the second path node 20504*c*2 communicates with a twelfth node 20502*c*12 via fourth node 20502*c*4, the second path 20504*c*2 is in the first region 20510*c*2 with respect to the twelfth node 20502*c*12.

The second node 20502*c*2 may identify a third node 20502*c*3 by a second-third protocol address that, in a second node-specific address space specific to the second node 20502*c*2 in the second region 20510*c*2, identifies the third node 20502*c*3. The protocol address may be based on a sequence of hop identifiers, 201.203.200, that identifies the third node 20502*c*3 with respect to the second node 20502*c*2. The third node 20502*c*3 is in a third region 20510*c*3. Within the third region 20510*c*3, the third node 20502*c*3 may be identified by a local-scope address 200. Nodes in the third region 20510*c*3 may identify nodes outside the third region 20510*c*3 with identifiers from a third scope-specific address space specific to the third region 20510*c*3.

The hop identifiers, 200.201.203.202.201, may be represented in an address representation 20602*c* in a data unit for sending data from the first node 20502*c*1 to the second node 20502*c*2. The hop identifiers, 201.203.200, may be represented in an address representation 20602*c* in a data unit for sending data from the second node 20502*c*2 to the third node 20502*c*3. The identifiers may be given a bit or binary representation and the hop identifiers may be distinguished or separated via address separator fields 20604*c* as described above with respect to FIG. 24C. An address separator field analogous to that shown in FIG. 24A may also or alternatively be included and processed as described above. Assignment of hop identifiers is described in application Ser. No. 13/727,649 filed on 2012 Dec. 27, entitled "Methods, Systems, and Computer Program Products for Assigning an Interface Identifier to a Network Interface"; application Ser. No. 13/727,655 filed on 2012 Dec. 27, entitled "Methods, Systems, and Computer Program Products for Determining a Shared identifier for a Hop in a Network", and application Ser. No. 13/727,657 filed on 2012 Dec. 27, entitled "Methods, Systems, and Computer Program Products for Determining a Hop Identifier for a Network Protocol", by the present inventor.

Note that the address information that identifies protocol addresses for the second node 20502*c*2 and for the third node 20502*c*3 in the preceding description may include information for identifying a return path or a portion thereof. For example, the second-third protocol address, 201.203.200, identifies 203.201, which may be a portion of a third-second protocol address that, in the third scope-specific address space, identifies the second node 20502*c*2 for nodes in the third region 20510*c*3. The first-second protocol address, 200.201.203.202.201, identifies 201.202.203.201 that, in the second-node-specific address space, identifies a network path from the second node to the first region 20510*c*1. Note that the second node may be in a region that includes only one node. The sequence, 201.202.203.201, however, does not identify any network interfaces of nodes in the first region 20510*c*1. Separate source address information may be included in a data unit sent to the second node 20502*a*2 that includes data sent from the first node 20502*c*1. The source address information may identify 201.202.203.201.101 as a second-first protocol address that, in the second node-specific address space, identifies the first node 20502*c*2. In, the first region 20510*c*1,

101 may be a scoped address that identifies the first node 20502*c*1 in the scope of the first region 20510*c*1. Thus, a scope-specific address may include a scoped address.

As described in the previous paragraph, a hop may be assigned an identifier that is shared by the pair of nodes in the hop. Thus, a sequence of hop identifiers may serve as a scope-specific address in one scope-specific address space when processed in one order of the sequence and may serve as another scope-specific address specific to another node when processed according to another order of the sequence. Any of the address types illustrated in FIGS. 24A-C, along with various variants and analogs, are suitable including reversible address information.

Figure 24D:
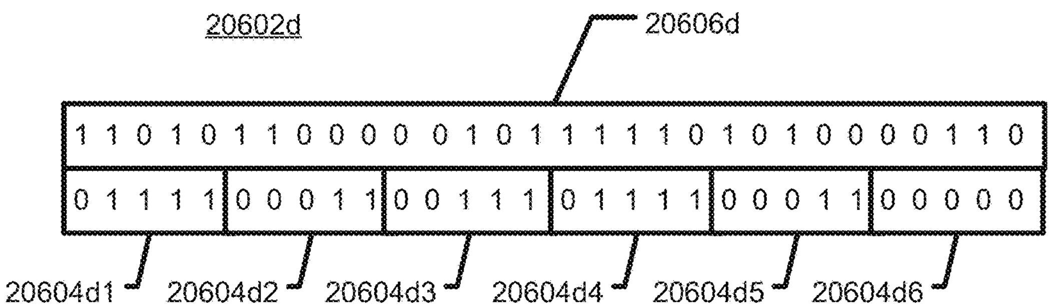
FIG. 24D is a diagram illustrating an exemplary representation of a protocol address according to another aspect of the subject matter described herein.

FIG. 24D includes an address representation 20602*d* illustrating aspects of a schema for representing path information based on identifiers of network interfaces or other suitable pairs of numbers for identifying protocol endpoints of a hop and/or a network path. An address information field 20606*d* includes path information identifying a network path for communicating data between a pair of path end nodes in the network path. FIG. 24D illustrates that an address representation 20602*d* may include one or more address separator fields 20604*d* that correspond to and/or otherwise identify respective one or more portions of the address information field 20606*d* that are based on a pair of identifiers of protocol endpoints.

An address separator field 20604*d* includes series of 1-valued bits and 0-valued bits. A change from a 1-value to a 0-value and vice versa may indicate a boundary that separates protocol endpoint identifiers and/or interface identifiers. An address separator field 20604*d*1 includes one 0-valued bit followed by four 1-valued bits. The 0-valued bit may be defined to indicate that a first network interface in a first hop identifier is one bit long with a corresponding position in the address information field 20606*d*.

FIG. 24D identifies the first interface identifier as the number, 201, in base ten. The four 1-valued bits in the first address separator field 20604*d*1 may be similarly defined to identify the location of a second interface identifier in the first hop identifier. The second interface identifier, as illustrated in FIG. 24D, has the value 2010 in base ten. The first hop identifier includes the numbers 1 and 2010. The first hop identifier may be represented as a string, 1-2010. A second hop identifier is located by the end of the series of four 1-valued bits in the first address separator field 20604*d*1 to a series of three 0-valued bits that identify a boundary of a second address separator field 20604*d*2 for second hop information identifying a second hop identifier, and the three 0-valued bits also identify the location of a first interface identifier in second hop information in the address information field 20606*d*. Two subsequent 1-valued bits identify the location in the address information field 20606*d* of a second interface identifier in the second hop information. The second hop identifier includes the numbers 6 and 0 in base ten. The remaining address separator fields 20604*d* may be processed similarly. The protocol address illustrated in FIG. 24D may be represented textually as 1-10.6-0.0-5.1-14.5-0.6.

Note that the address separator field 20604*d*6 does not identify a pair of identifiers and is similar to address separator fields 20604*c* in FIG. 24C. Alternatively, an address separator field 20604*d* may correspond to a portion of an address information field 20606*d* that identifies a scoped address. This is illustrated to demonstrate that protocol addresses may be uniform or non-uniform in their format and content.

In FIG. 23B, a first node 20502*b*1 and a second node 20502*b*2 may be included in regions that respectively include the nodes. Each of the two nodes may identify the other by a protocol address in a respective node-specific address space. For example, a sequence of pairs of interface identifiers, 20151-20294.20151-2010, may be a protocol address, that in a first node-specific address space specific to the first node 20502*b*1, identifies the second node 20502*b*2. The first node may send a data unit including an address representation 20602*d* of the type illustrated in FIG. 24D.

Note that reversing the interface identifiers yields the identifier, 2010-20151.20294-20151, that may be a protocol address that, in a second node-specific address space specific to the second node 20502*b*2, identifies the first node 20502*b*1. The second node 20502*b*2 and a third node 20502*b*3 may be included in regions that respectively include the nodes. Each of the two nodes may identify the other by a protocol address in a respective node-specific address space. A sequence of pairs of interface identifiers, 2010-20294.20151-2010, may be a protocol address, that in the second node-specific address space, identifies the third node 20502*b*3. Reversing the interface identifiers yields the identifier, 2010-20151.20294-2010, that may be a protocol address, that in a third node-specific address space specific to the third node 20502*b*3, identifies the second node 20502*b*2.

A sequence of hop identifiers based on interface identifiers may serve as a scope-specific address in one scope-specific address space when processed in one order of the sequence and may serve as another scope-specific address specific to another node when processed according to another order of the sequence.

Figure 24E:
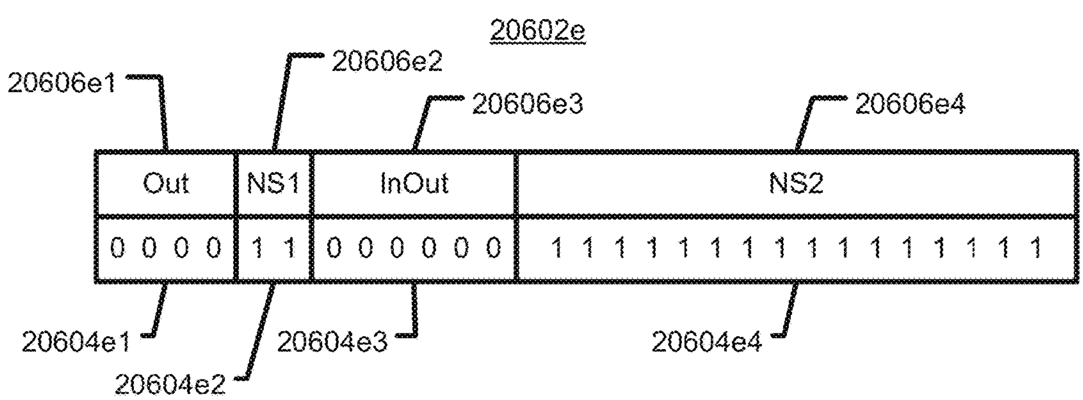
FIG. 24E is a diagram illustrating an exemplary representation of a protocol address according to another aspect of the subject matter described herein.

FIG. 24E illustrates an address representation 20602*e* that further demonstrates that a protocol address may be based on path information and/or may be based on address information that does not identify a network path. An address representation 20602*e* may include portions that include path information and/or portions that include scoped addresses. An address separator field 20604*e* is defined to distinguish address fields in a manner similar to the method described for distinguishing hop identifiers in FIG. 24C. A first address information field 20606*e*1 corresponding to the first address separator field 20604*e*1 includes a single interface identifier for an outbound network interface for a first node as described above with respect to FIG. 24A and FIG. 23C. A second address information field 20606*e*2 corresponding to a second address separator field 20604*e*2 may include a scoped address having an inside scope, an outside scope, or both. A node processing the second address information field 20606*e*2 may be included in a portion of a network spanned by the scope of the scoped address. The node may process the scoped address accordingly.

See application Ser. No. 11/962,285, by the present inventor, filed on 2007 Dec. 21, entitled "Methods and Systems for Sending Information to a Zone Included in an Internet Network" for a description of addresses having outside scope and/or inside scope and processing of such addresses. A third address information field 20606*e*3 corresponding to a third address separator field 20604*e*3 may include a pair of identifiers as described with respect to FIG. 24D. A fourth address information field 20606*e*4 corresponding to a fourth address separator field 20604*e*4 may include a protocol address analogous to one of the types of addresses described with respect to the second address information field 20606*e*2 such as a local-scoped address. FIG. 24E illustrates that a scope-specific address specific to a node may include an address and/or a portion of an address that are/is not from a scope-specific address space.

In FIG. 23B, a first node 20502*b*1 may be included in a first region that includes network interfaces coupling nodes to a first network 20506*b*1 included in the network 20500*b*. A second node 20502*b*2 may be included in a second region that includes network interfaces coupling nodes to a second network 20506*b*2. Each of the two nodes may identify the other by a protocol address in their respective scope-specific address spaces. For example, a sequence of scoped addresses, 20294.2010, may be a protocol address that, in a first scope-specific address space specific to the first network 20506*b*1, may identify the second node 20502*b*2 to the first node 20502*b*1, as well as to other nodes in the first region defined by the first network 20506*b*1. A data unit including an address represented as in 20602*e* in FIG. 24E may identify a scope-specific address based on a sequence of scoped addresses. Similarly, a sequence of scoped addresses, 20294.2010, may be a protocol address that, in a second scope-specific address space specific to the second network 20506*b*2, identifies a third node 20502*b*3 to the second node 20502*b*2 as well as to other nodes in the second region defined by the second network 20506*b*2.

In another aspect, scope-specific addresses for a first node, a second node, and a third node may conform to a currently known schema defining a valid Internet Protocol address as specified by RFC 791 and/or RFC 3513. The protocol addresses may be processed as scope-specific as opposed to interpreting them as from a global address space as is currently done. A pattern in a type field may indicate a protocol address is scope-specific. In a further aspect, a mapping may be specified between scope-specific address spaces. A mapping may be ruled-based and/or may be specified by associations such as represented by a lookup table.

In an aspect, a node, referred to as a first origin node, in a network in a first region having a first scope-specific address space may assign a protocol address, of a network protocol, identifying a location of a representation of the node as an origin according to a coordinate system for a metric space that includes a network topology representing the network based on the network protocol. Alternatively or additionally, a network interface of an origin node may be identified by a coordinate identifying the origin of the coordinate space in the metric space. Another node, referred to as a second origin node, in the network in a second region having second scope-specific address space may assign a protocol address identifying a location of a representation of the other node as an origin according to a second coordinate system for the metric space that includes the network topology representing the network. The first scope-specific address space includes identifiers from the first coordinate system based on the first origin node location and the second scope-specific address space includes identifiers from the second coordinate system based on the second origin node location Those skilled in the art of metric spaces, such as geometric spaces, will appreciate that a one-to-one mapping may be determined and/or otherwise identified for mapping addresses from a first coordinate space having a first origin for a metric space to addresses from a second coordinate space having a second origin in the metric space. Given a mapping rule between the first scope-specific address space and the second scope-specific address space and a mapping between the second scope-specific address space and third scope-specific address space based on a third coordinate space identifying a third origin in the metric space, a mapping from the first coordinate space to the third coordinate space may be determined. A mapping between coordinate spaces for a metric space may include a coordinate shift and/or a rotation, for example. The mapping may be pre-specified and accessible to nodes in one or both address spaces. Mapping between locations in a number of different metric spaces are well known in mathematics.

Nodes may exchange mapping information. In an aspect, the address information may identify a mapping rule when exchanged between nodes. The mapping rule may be determined by second node and sent to a first node. The mapping rule may include mapping information for mapping addresses from the third scope-specific address space to the first scope-specific address space. Those skilled in the art will see that given address information for protocol addresses from any two scope-specific address spaces identifying respective origin locations in a metric space including a representation of a network and given a protocol address of third node not included in a region of either of the two scope-specific address spaces, a mapping rule may be determined by a resolver component to map the protocol address of the third node in one of the two scope-specific address spaces to the other to identify the third node in the other scope-specific address space.

Exemplary metric spaces include Euclidean spaces, non-Euclidean spaces, and geometric spaces. A Cartesian coordinate system is an exemplary address space for a Euclidean space. Another example of a geometric address space is a geospatial address space such as used currently in geolocation services. Networks have topologies that may be represented in a geo-space including locations addressed via a geometric address space. A metric space including a network topology of a network may be multi-dimensional space. For example, nodes are included in a real-world three-dimensional space that may be associated with a geospatial address space. In one aspect, locations of nodes in a network topology in a metric space may be located based on any suitable metric. Exemplary metrics may measure and/or otherwise may be based on physical distance in the real world between nodes, data transmission times, energy unitization, network congestion, latency, and the like. Exemplary metric spaces include non-Euclidean spaces as well as Euclidean spaces.

A first node, a second node, and a third node may be represented in a metric space. A first path in the metric space connecting the representation of the first node to the representation of the second node may be identified based on a first path location identifier that identifies a location in the first path of a representation of a node, a network interface in the node, a NIC in the network interface, and/or a hop that includes the node in a first network path communicatively coupling the first node and the second node. A second path in the metric space connecting the representation of the second node to the representation of the third node may be identified based on a second path location identifier that identifies a location in the second path of a representation of a node, a network interface in the node, a NIC in the network interface, and/or a hop that includes the node in a second network path communicatively coupling the second node and the third node. A first-third protocol address, that identifies the third node with respect to the first node for a network protocol, may be determined based on the first path location identifier and/or the second path location identifier. The first-third protocol address may include the first path location identifier and/or the second path location identifier.

The first path location identifier may be a relative identifier that identifies the representation in the first path relative to a first location identifier identifying a first location, in the metric space, that includes a representation of the first node or relative to a second location identifier identifying a second location, in the metric space, that includes a representation of the second node. Analogously, the second path location identifier may also be a relative identifier that identifies the representation in the second path relative to the second location identifier or relative a third location identifier identifying a third location, in the metric space, that includes a representation of the third node. The first-third protocol address may be determined based on at least one of the first path location identifier and the third path location identifier. The first-third protocol address may be relative identifier that identifies the third node relative to the first node. The first-third protocol address may include a third location identifier that identifies the third location relative to the first location identifier.

Figure 25A:
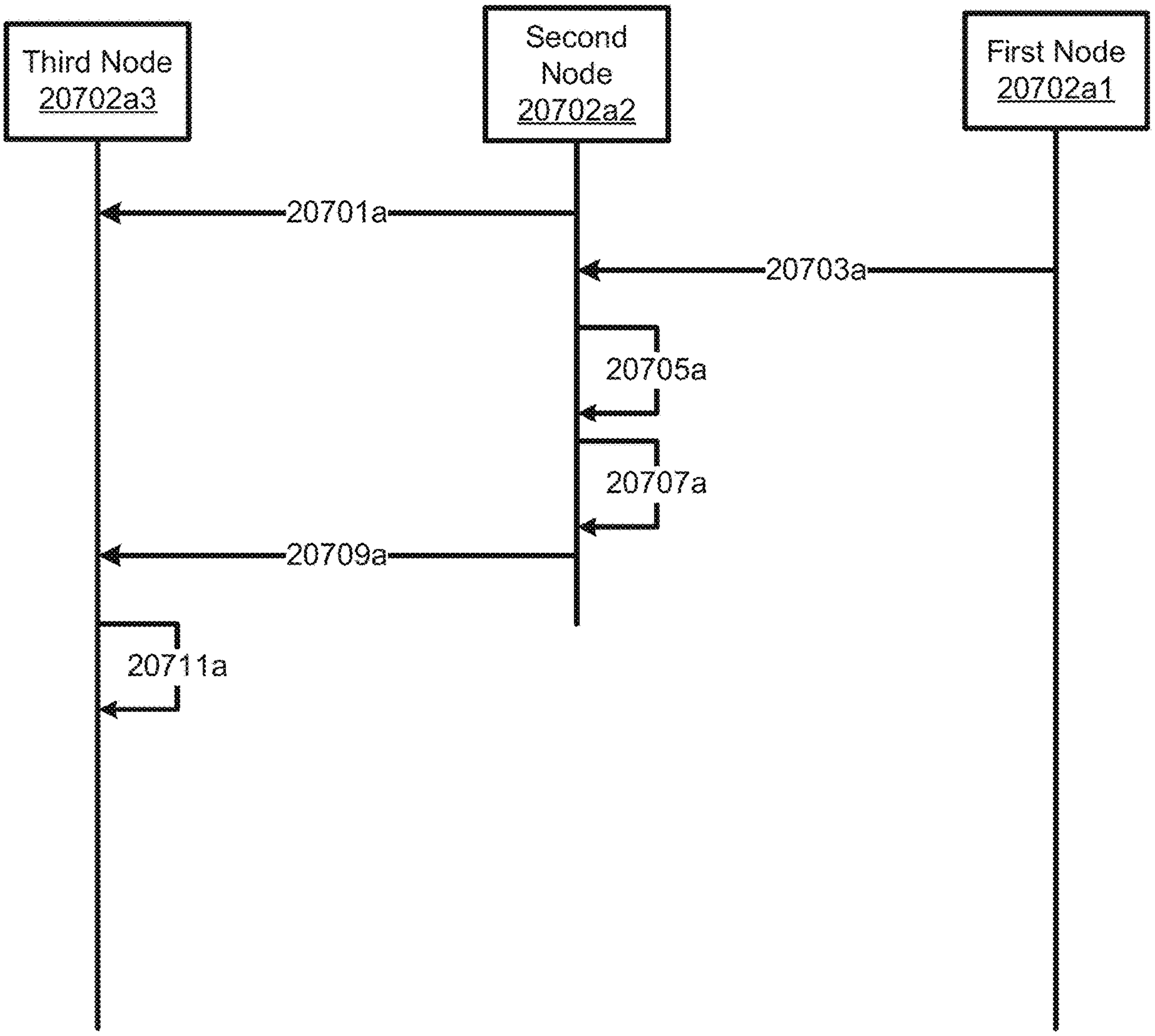
FIG. 25A is a message flow diagram illustrating messages exchanged between nodes in another aspect of the subject matter described herein.

In FIG. 25A, messages are exchanged between a first node 20702*a*1, a second node 20702*a*2, and a third node 20702*a*3. The nodes in FIG. 25A may represent nodes in networks described above illustrated in FIGS. 23A-C. In FIG. 25A, in one aspect, the first node 20702*a*1 is included in and/or otherwise provides an instance of the execution environment 20401*a* including a t-communication component 20410*a*. The second node 20702*a*2, in the aspect, may host a t-service and/or a t-communication component. The third node 20702*a*3 may host a t-service and/or a t-communication component compatible with the t-service in the second node 20702*a*2.

FIG. 25A illustrates a first message 20701*a* including a second symbolic identifier of the second node 20702*a*2 to register in a t-service operating in the third node 20702*a*3. The second message may be sent via a second network path that communicatively couples the second node 20702*a*2 and the third node 20702*a*3. A protocol address that identifies the third node 20702*a*3 to the second node 20702*a*2 may be user configured and/or may be received via the network. IP addresses of DNS servers are configured in such a manner.

FIG. 25A illustrates a second message 20703*a* including a first symbolic identifier of the first node. Some or all of the third message and/or a data unit that includes some or all of the message may identify first path information and/or first address information. The second message 20703*a* may be sent in one or more data units including and/or otherwise identifying the first path information in an address representation, such as illustrated in FIGS. 24A-E. The first path information may identify a first network path that communicatively couples the first node 20702*a*1 and the second node 20702*a*2. The first path information may include first hop information that identifies a first hop in the first network path. The second message 20701*a* may include a request to register the symbolic identifier of the first node 20702*a*1 with a t-service. The second message 20703*a* may be sent by a t-communication component in the first node 20702*a*1 via a network stack. The second message 20703*a* may be received by a resolver component in an execution environment of the second node 20702*a*2 via a compatible stack and a t-protocol component operating in the second node 20702*a*2.

A third message 20705*a* illustrates interoperation between the resolver component 20402*a* and a t-space component 20404*a* to associate the first path information with the symbolic identifier as describe above. The registration request in the second message 20703*a* may be provided to the t-service in the second node 20702*a*2 to create and/or update a record associating the symbolic identifier and the first information and/or with topology information for determining the first path/address information.

A fourth message 20707*a* illustrates a data flow included in identifying the second path information by the t-space component 20404*a* in the second node 20702*a*2. The second path information may be identified to relay the first symbolic identifier to the t-service in the third node 20702*a*3 to register the first node 20702*a*1. The second path information may be accessed from a t-service as described above and/or may be detected by a t-monitor component 20408*a* in address information in a data unit exchanged between a node communicatively coupled to the second node 20702*a*2 via the third node 20702*a*3 and/or from a node communicatively coupled to the third node 20702*a*3 via the second node 20702*a*2.

FIG. 25A illustrates a fifth message 20709*a* sent by a t-relay component to the third node 20702*a*3 from the second node 20702*a*2 via the second network path. The fifth message 20709*a* may include the first symbolic identifier and path information identifying the first network path. A resolver component 20402*b* and a t-space component 20404*b* in the third node 20702*a*3 may associate the first path information and the second path information with the symbolic identifier, as illustrated by a sixth message 20711*a*. The t-service may create and/or update a record associating the first symbolic identifier and third path information, based on the first and second path information and/or with topology information for determining the first path/address information. The third path information may identify a third network path the communicatively couples the third node 20702*a*3 and the first node 20702*a*1.

The t-service 20405*b* in the third node 20702*a*3 may represent a domain in a structured domain space, such as the domain name space of the Internet that has a hierarchical structure. When the symbolic identifier is not in a domain of the t-service 20405*b* in the second node 20702*a*2, the t-service 20405*b* may forward the request for routing by a t-relay component 20406*b* interoperating with a t-peer component 20431*b* in a topology service system a t-service in another node that represents the domain of the symbolic identifier. Additionally or alternatively, the third node 20502*a*3 may forward the request for delivery to yet another node in the topology service system.

Exemplary topology service systems include the Internet domain name system, a lightweight directory access protocol (LDAP) system, and a Windows® directory. In addition to storing information for lookup based on a symbolic identifier, a t-service may include and/or may interoperate with one or more services that maintain a topology of some or all of a network based on address information exchanged between and among nodes. Resolving a symbolic identifier may include determining some or all of a route between nodes in a topological space. A symbolic identifier may be resolved to more than one instance of address information, which may identify more than one protocol address for transmitting data from one node to another.

Once the third node 20702*a*3 resolves a symbolic identifier it may cache and/or otherwise store an association between the symbolic identifier and the determined protocol address for later use. Note that a symbolic identifier may be resolved to one or more protocol addresses from the same scope-specific address space and/or different scope-specific address spaces, path-based address spaces, and the like.

The description above with respect to FIGS. 24A-E and FIGS. 23A-C demonstrates that not only are nodes identifiable via scope-specific addresses from scope-specific address spaces, but a hop in a network may be identified by a scope-specific identifier from a scope-specific identifier space. In FIG. 23C, a third hop 20508*c*3 between a seventh path node 20504*c*7 and an eighth path node 20504*c*8 may be identified with respect to a first node 20502*c*1 by a hop identifier from a first scope-specific address space specific to the first node 20502*c*1. The sequence, 200.201.203.202.203, identifies the third hop 20508*c*1 that includes a seventh path node 20504*c*7 and the eighth path node 20504*c*8. The third hop 20508*c*3 identified with respect to a sixth path node 20504*c*6 may be identified by the sequence, 200.203, in node-specific address space specific to the sixth path node 20504*c*6. The sequence, 201.203, is an identifier that, in the third scope-specific address space specific to the third region 20510*c*3, identifies the third hop 20508*c*3. The number, 203, is an identifier that, in the seventh node-specific address space specific to the seventh path node 20504*c*7, identifies the third hop 20508*c*3.

FIG. 23C illustrates that the third hop 20508*c*3 includes the seventh path node 20504*c*7 and the eighth path node 20504*c*8. A third hop identifier from the first scope-specific address space specific to the first region 20510*c*1 may be represented as 201.200.201.200.203, as FIG. 23C illustrates. The third hop identifier includes a hop identifier 3 that identifies the third hop 20508*c*3 with respect to an eighth path node 20504*c*8. "201.200.201.200.3" is scope-specific to the nodes in the first region 20510*c*1. The seventh path node 20504*c*7 is included in a network path from the first node 20502*c*1 to the eighth path node 20504*c*8 that includes the third hop Returning to FIG. 23A and FIG. 22B, the second node 20502*a*2 may receive a request from the first node 20502*a*1 that includes a symbolic identifier of the third node 20502*a*3. The request may be received by the t-communication component 20410*b* as described above. The request may include a command to resolve the symbolic identifier to address information that identifies a first-third protocol address that, in the first scope-specific address space, identifies the third node 20502*a*3 to the first node 20502*a*1. The protocol address may be identified in a data unit by the first node 20502*a*1 to send data in the data unit to the third node 20502*a*3. The t-communication component 20410*b* may interoperate with a resolver component 20402*b* to determine the first-third protocol address that identifies the third node 20502*a*3 to the first node 20502*a*1. The resolver component may determine whether the symbolic identifier is in a name domain managed by the t-service 20405*b*. If the symbolic identifier is in a domain managed by the t-service 20405*b*, the resolver component 20402*b* in the second node 20502*a*2 may request a t-space component 20404*b* to lookup address information for determining the first-third protocol address.

The t-space component 20404*b* may locate address information associated with the symbolic identifier stored in a record or via another association in a topology data store 20433*b*. If the symbolic identifier is located in the topology data store 20433*b*, the t-space component 20404*b* receives and/or otherwise detects address information associated with the symbolic identifier. If the resolver component 20402*b* determines that the symbolic identifier is not in a domain of the t-service 20403*a* in the second node 20502*a*2, the resolver component may request that the t-space component 20404*b* lookup and/otherwise determine the address information based on routing information collected by topology service system services in various nodes to determine the first-third protocol address via a lookup in a cache (not shown) that stores information received from other t-services operating in other nodes that manage other domains in the name space of symbolic identifiers.

If the symbolic identifier is not located in the cache, the resolver component 20402*b* may instruct the t-peer component 20431*b* in the second node 20502*a*2 to send the symbolic identifier to a node that includes a t-service that manages the domain that includes the symbolic identifier. The other node may resolve the symbolic identifier, partially resolve the symbolic identifier, and/or may send address information back to the second node 20502*a*2 for the resolver component 20402*a* to resolve the symbolic identifier.

As described various types of protocol addresses may conform to various schemas defining rules for formatting valid protocol addresses and/or defining vocabularies specifying valid content of a protocol address. Given first address information identifying a first protocol address and second address information identifying a second protocol address as described above with respect to the method illustrated in FIG. 20, a t-space component 20404 may determine a scope-specific first-third protocol address based on one or more of a schema of one or more of the first protocol address, a schema of the second protocol address, a schema of the third protocol address, a mapping between two or more of the schemas or portions thereof, relationships between the nodes to which the protocol addresses are specific, relationships between the scope-specific address spaces of the protocol addresses, and/or relationships between the nodes in a network that includes them. Some of the relationships listed may be represented in a network topology of the network. A t-space component 20404 may detect some or all of the network topology in determining the first-third protocol address.

As described above with respect to FIG. 23A and FIG. 24A, the sequence, 202.202.203.203 may be included in first address information that identifies a protocol address that, in the first scope-specific address space, identifies the second node 20502*a*2. The sequence 201.201.200.203 may be a protocol address that, in the second node-specific address space, identifies the first node 20502*a*1. The sequence, 201.201.200.203, may be included in the first address information in a data unit in addition to the sequence 202.202.203.3 as previously described.

Also as described above with respect to FIG. 23A and FIG. 24A, the sequence, 201.202, may be included in second address information that identifies a protocol address that, in the second node-specific address space, identifies the third node 20502*a*3. The sequence, 200.203, may be a protocol address that, in a third node-specific address space specific to a third region 20510*a*3 including the third node 20502*a*3, identifies the second node 20502*a*2. The sequence, 200.203, may be included in the second address information in the data unit in addition to the sequence, 201.202, as previously described.

One or more of the t-monitor components 20408 operating in the first node 20502*a*1 and/or a t-monitor component 20408 in the third node 20502*b*3 may detect the sequence, 202.202.203.203, and the sequence, 201.202. The sequence, 202.202.203.203, may be provided to the third node 20502*a*3 by the second node 20502*a*2, in an example, described in more detail below. The sequence, 201.202, may be provided to the first node 20502*a*1 by the second node 20502*a*2 and/or by the third node 20502*a*3, in an example described in more detail below. Given the two sequences, either or both of the t-space components 20404 in the first node 20502*a*1 and in the third node 20502*a*3 may determine a sequence, 202.202.203.203.201.202, and/or another sequence, 202.202.203.202, either or both of which may be a protocol address that, in the first scope-specific address space, identifies the third node 20502*a*3 for nodes in the first region 20510*a*1.

Further, t-monitor components 20408 respectively operating in the first node 20502*a*1 and/or in the third node 20502*a*3 may similarly detect the sequence, 201.201.200.203, and the sequence, 200.203.201.201, when included in the first address information and the second address information. Given the two sequences, either or both of the t-space components 20404 in the first node 20502*a*1 and in the third node 20502*a*3 may determine a sequence, 200.203.201.201.200.203, and/or another sequence, 200.201.200.203, either or both of which may be a protocol address that, in the third node-specific address space, identifies the first node 20502*a*1 for the third node 20502*a*3.

A t-space component 20404 operating in the second node 20502*a*2 may similarly identify protocol addresses for communicating between the first node 20502*a*2 and the third node 20502*a*, based on first address information and second address information, as described in the preceding paragraphs.

As FIG. 24B illustrates a variant of the address representation 20602*a* illustrated in FIG. 24A, a t-monitor component 20408*a* and/or a t-monitor component 20408*b* may include instructions to detect first and second address information to determine a protocol address in a manner analogous to that described above with respect to FIG. 23A and FIG. 24A.

As described above with respect to FIG. 23C and FIG. 24C, the sequence, 200.201.203.202.201, may be included in first address information that identifies a protocol address that, in the first scope-specific address space, identifies the second node 20502*c*2. The sequence may be reversed to identify a protocol address that, in the second node-specific address space specific to the second node 20502*c*2 identifies a network path to the first region 20510*c*1. The local-scoped address, 101, may be included in source address information in the first address information to identify the sequence, 201.202.203.201.101, that, in the second node-specific address space, identifies the first node 20502*c*1.

Also as described above with respect to FIG. 23C and FIG. 24C, the sequence, 201.203.200, may be included in second address information that identifies a protocol address that, in the second node-specific address space, identifies the third node 20502*c*3. The sequence, 201.203, may be may part of a protocol address that, in a third scope-specific address space specific to the third region 20510*c*3 identifies the second node 20502*c*2. The sequence, 201.203, is included in a portion of the sequence, 201.203.200, in reverse order.

One or more of the t-monitor components 20408 operating respectively in the first node 20502*c*1 and/or a t-monitor component 20408 in the third node 20502*c*3 may detect the sequence, 200.201.203.202.201, and the sequence, 201.203.200. The sequence, 200.201.203.202.201, may be provided to the third node 20502*c*3 by the second node 20502*c*2. The sequence, 201.203.200, may be provided to the first node 20502*c*1 by the second node 20502*c*2 and/or by the third node 20502*c*3. Given the two sequences, either or both of the t-space components 20404 in the first node 20502*c*1 and in the third node 20502*c*3 may determine a sequence, 200.201.203.202.201.201.203.200, and/or another sequence, 200.203.201.202.203.200, either or both of which may be a protocol address that, in the first scope-specific address space, identifies the third node 20502*c*3 for nodes in the first region 20510*c*1. Repeated path and/or hop identifiers may indicate a loop in a path in some address representations 20602*a* as the examples illustrates. A t-space component 20404 may detect loops and remove them to produce shorter protocol addresses. In other address types, loops may be detected by a t-space component 20404 to detect repeated pairs of hop and/or path identifiers where one identifier from a pair is from a source address and the other identifier in the pair is from a corresponding portion of a destination address.

Further, the t-monitor components 20408 respectively operating in the first node 20502*c*1 and/or in the third node 20502*c*3 may similarly detect the sequence, 201.202.203.201.101, and the sequence, 201.203.201, when included in the first address information and the second address information, respectively. Given the two sequences, either or both of the t-space components 20404 in the first node 20502*c*1 and in the third node 20502*c*3 may determine a sequence, 201.203.201.201.202.203.201.101, and/or another sequence, 201.203.202.201.101, either or both of which may be a protocol address that, in the third scope-specific address space, identifies the first node 20502*c*1 for nodes in the third region 20510*c*3.

A t-monitor component 20408 operating in the second node 20502*c*2 may similarly identify protocol addresses for communicating between the first node 20502*c*2 and the third node 20502*c*3, based on first address information and second address information, as described in the preceding paragraphs.

As described above with respect to FIG. 23B and FIG. 24D, the sequence, 20151-20294.20151-2010, may be included in first address information that identifies a protocol address that, in a first node-specific address space specific to the first node 20502*b*1, identifies the second node 20502*b*2. The sequence, 2010-20151.20294-20151, is included in the first address information as a second ordering of the identifiers in the sequence, 20151-20294.20151-2010, and may be a protocol address that, in a second node-specific address space specific to the second node 20502*b*2 identifies the first node 20502*b*1.

In addition, as described above with respect to FIG. 23B and FIG. 24D, the sequence, 2010-20294.20151-2010, may be included in second address information that identifies a protocol address that, in the second node-specific address space, identifies the third node 20502*b*3. The sequence, 2010-20151.20294-2010, is included in the first address information as a second ordering of the identifiers in the sequence, 2010-20294.20151-2010, and may be a protocol address that, in a third node-specific address space specific to the third node 20502*b*3 identifies the second node 20502*b*2.

One or more of the t-monitor components 20408 operating respectively in the first node 20502*b*1 and/or a t-monitor component 20408*a* in the third node 2050*b*3 may detect the sequence, 20151-20294.20151-2010, and the sequence, 2010-20294.20151-2010. The sequence 20151-20294.20151-2010 may be provided to the third node 20502*b*3 by the second node 20502*b*2. The sequence 2010-20294.20151-2010 may be provided to the first node 20502*b*1 by the second node 20502*b*2 and/or by the third node 2050*bc*3. Given the two sequences, either or both of t-space components 20404 in the first node 20502*b*1 and in the third node 20502*b*3 may determine a sequence, 20151-20294.20151-2010. "2010-20294.20151-2010" and/or another sequence, 20151-20294.20151-20294.20151-2010, either or both of which may be a protocol address that, in the first node-specific address space, identifies the third node 20502*b*3 for the first node 20502*c*1.

Further, t-space components 20404 respectively operating in the first node 20502*b*1 and/or in the third node 20502*b*3 may similarly detect the reverse sequence, 2010-20151.20294-20151, and the reverse sequence, 2010-20151.20294-2010, when included in the first address information and the second address information, respectively. Given the two sequences, either or both of the t-space components 20404 in the first node 20502*b*1 and in the third node 20502*b*3 may determine a sequence, 2010-20151.20294-2010. "2010-20151.20294-20151" and/or another sequence, 2010-20151.20294-20151.20294-20151, either or both of which may be a protocol address that, in the third node-specific address space, identifies the first node 20502*b*1 for the third node 20502*b*3.

A t-monitor component 20408 operating in the second node 20502*b*2, as described in more detail below, may similarly identify protocol addresses for communicating between the first node 20502*b*2 and the third node 20502*b*3, based on first address information and second address information, as described in the preceding paragraphs.

As described above, FIG. 24E illustrates that a scope-specific address specific to a node may include an address and/or one or more portions of addresses that are not from a scope-specific address space. As described above with respect to FIG. 23B and FIG. 24E, the sequence 20294.2010 may be included in first address information that identifies a protocol address that, in a first scope-specific address space specific to a first network 20506*b*1, identifies a second node 20502*b*2. The sequence, 20151.20151, may be included in the first address information as source address information that may be a protocol address that, in a second scope-specific address space specific to the second network 20506*b*2 identifies the first node 20502*b*1. Also as described above with respect to FIG. 23B and FIG. 24E, the sequence, 20294.2010, may be included in second address information that identifies a protocol address that, in the second scope-specific address space, identifies the third node 20502*b*3 for nodes in the second network 20506*b*2. The sequence, 20151.2010, may be included in the second address information as source address information that may be a protocol address that, in a third scope-specific address space specific to the third network 20506*c*2 identifies the second node 20506*b*2

One or more of the t-monitor components 20408 operating respectively in the first node 20502*b*1 and/or a t-monitor component 20408 in the third node 2050*b*3 may detect the identical sequences, 20294.2010, respectively included in the first scope-specific address space and the second scope-specific address space. Given the two sequences, either or both of the t-space components 20404 in the first node 20502*b*1 and in the third node 20502*b*3 may determine a sequence, 20294.2010.20294.2010, and/or another sequence, 20294.20294.2010, either or both of which may be a protocol address that, in the first scope-specific address space, identifies the third node 20502*b*3 for nodes in the first network 20506*b*1.

Further, the t-monitor components 20408 respectively operating in the first node 20502*b*1 and/or in the third node 20502*b*3 may similarly detect the sequences, 20151.20151, and 20151.2010. Given the two sequences, either or both of the resolver components 20402 in the first node 20502*b*1 and in the third node 20502*b*3 may determine a sequence, 20151.2010.20151.20151, and/or another sequence, 20151.20151.20151, either or both of which may be a protocol address that, in the third scope-specific address space, identifies the first node 20502*b*1 for nodes in the third network 20506*b*3. A t-space component 20404 may detect the duplicate identifier 2010 in first corresponding positions in the sequence, along with identifiers 20294 and 20151 in second corresponding positions in the sequence. The t-space component 20404 may also determine that all three identifiers are in the same region 20506*b*2 where they serve as local scoped addresses. The t-space component 20404 may determine that the identifier 2010 is based on the order in both sequences with respect to other identifiers in the same scope. A t-space component 20404 operating in the second node 20502*b*2, as described above, may similarly identify protocol addresses for communicating between the first node 20502*b*2 and the third node 20502*b*3, based on first address information and second address information, as described in the preceding paragraphs.

Figure 26:
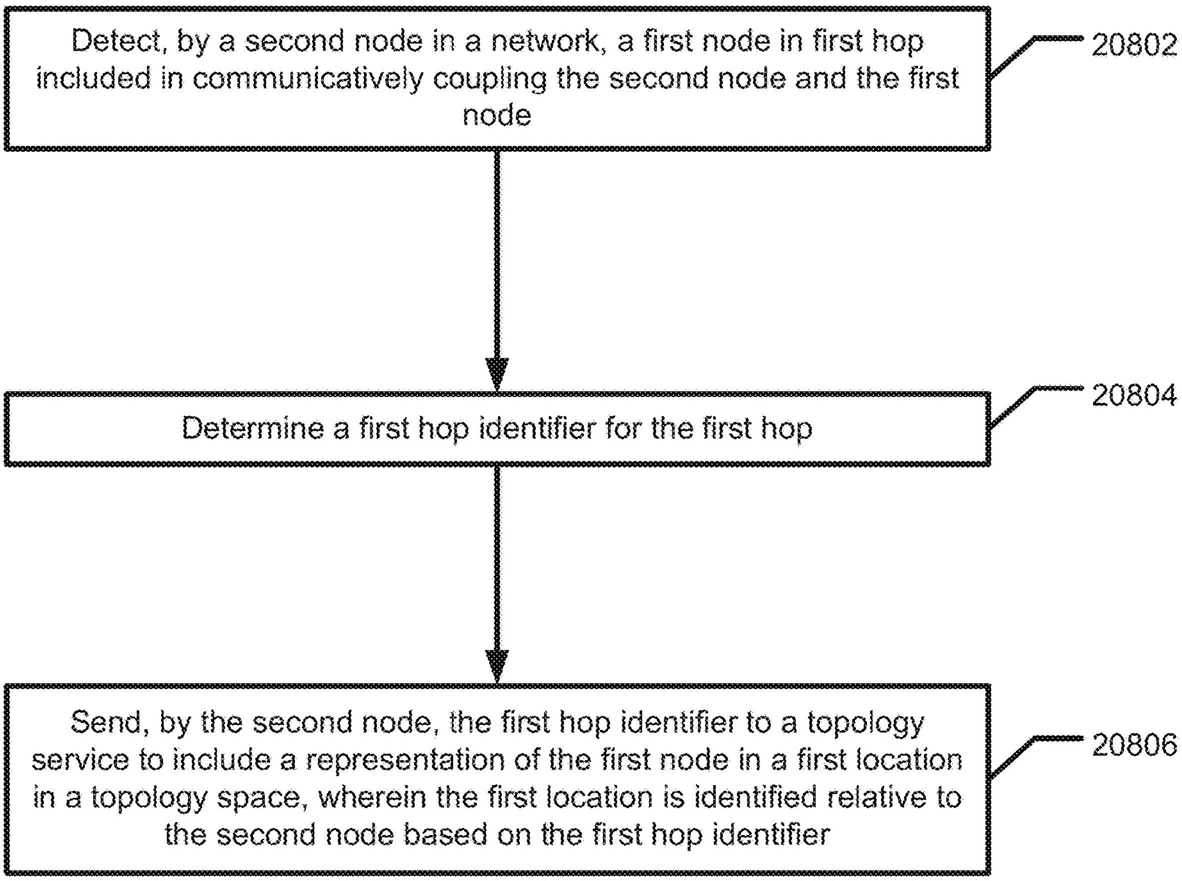
FIG. 26 is a flow diagram illustrating a method for associating a name with a network path according to an aspect of the subject matter described herein.
Figure 27:
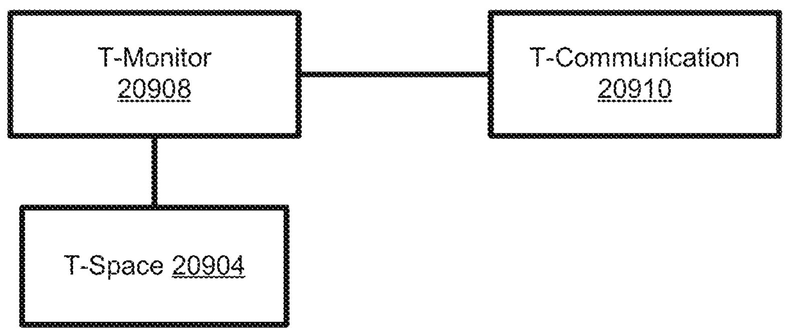
FIG. 27 is a block diagram illustrating an arrangement of components for associating a name with a network path according to another aspect of the subject matter described herein.

FIG. 27 illustrates an arrangement of components that may operate in an execution environment, such as execution environment 20102 in FIG. 19 to perform a method illustrated in FIG. 26. The system illustrated by the arrangement includes a topology monitor (t-monitor) component 20908 including one or more instructions to detect a hop in a network, a topology space (t-space) component 20904 including one or more instructions for maintaining and/or reporting network topology information, and a topology communication component 20910. A suitable execution environment includes a processor, such as processor 20104, to process an instruction in at least one of a topology monitor component, a topology space component, and a topology space component.

FIGS. 22A-B are block diagrams illustrating the components of FIG. 27 and/or analogs of the components of FIG. 27 adapted for operation in an execution environment 20401 that includes and/or otherwise is provided by one or more nodes. Those skilled in the art will understand that other execution environments in addition to the various adaptations, analogs, and instances of the execution environments described herein are suitable for hosting an adaptation of the arrangement in FIG. 27.

A block 20802, FIG. 26, illustrates that the method includes detecting, by a second node in a network, a first node in first hop included in communicatively coupling the second node and the first node. Accordingly, the system in FIG. 27 includes means for detecting, by a second node in a network, a first node in first hop included in communicatively coupling the second node and the first node. For example, the arrangement in FIG. 27, includes a topology monitor component 20908 that is operable for and/or is otherwise included in detecting, by a second node in a network, a first node in first hop included in communicatively coupling the second node and the first node. The system includes one or more processors and logic encoded in one or more computer readable media for execution by the one or more processors that when executed is operable for and/or is otherwise included in detecting, by a second node in a network, a first node in first hop included in communicatively coupling the second node and the first node.

FIGS. 22A-B illustrate topology monitor components 20408 as adaptations and/or analogs of the topology monitor component 20908 in FIG. 27. One or more topology monitor components 20408 operate in an execution environment 20401. In FIG. 22A, a topology monitor component 20408*a* is illustrated as a component of a t-space component 20404*a*. In FIG. 22B, a topology monitor component 20408*b* is illustrated as a component of a t-service 20405*b*. A node 20502 may include a topology monitor component 20408*a* and/or a topology monitor component 20408*b*. A path node 20504 may also include an adaptation and/or an analog of a topology monitor component.

With reference to FIG. 26, a block 20814 illustrates that the method includes determining a first hop identifier for the first hop. Accordingly, the system in FIG. 27 includes means for determining a first hop identifier for the first hop. For example, the arrangement in FIG. 27 includes topology space (t-space) component 20904 that is operable for and/or is otherwise included in determining a first hop identifier for the first hop. The system includes one or more processors and logic encoded in one or more computer readable media for execution by the one or more processors that when executed is operable for and/or is otherwise included in determining a first hop identifier for the first hop.

FIGS. 22A-B illustrate topology space components 20404 as adaptations and/or analogs of the topology space component 20904 in FIG. 27. One or more topology space components 20404 operate in an execution environment 20401. In FIG. 22A, a topology space component 20404*a* is illustrated operating in execution environment 20402*a*. In FIG. 22B, a topology space component 20404*b* is illustrated as a component of a t-service 20405*b*. A node 20502 may include a topology space component 20404*a* and/or a topology space component 20404*b*. A path node 20504 may also include an adaptation and/or an analog of a topology space component.

With reference to FIG. 26, a block 20816 illustrates that the method includes sending, by the second node, the first hop identifier to a topology service to include a representation of the first node in a first location in a topological space, wherein the first location is identified relative to the second node based on the first hop identifier. Accordingly, the system in FIG. 27 includes means for sending, by the second node, the first hop identifier to a topology service to include a representation of the first node in a first location in a topological space, wherein the first location is identified relative to the second node based on the first hop identifier. For example, the arrangement in FIG. 27, includes topology communication component 20910 that is operable for and/or is otherwise included in sending, by the second node, the first hop identifier to a topology service to include a representation of the first node in a first location in a topological space, wherein the first location is identified relative to the second node based on the first hop identifier. The system includes one or more processors and logic encoded in one or more computer readable media for execution by the one or more processors that when executed is operable for and/or is otherwise included in sending, by the second node, the first hop identifier to a topology service to include a representation of the first node in a first location in a topological space, wherein the first location is identified relative to the second node based on the first hop identifier.

FIGS. 22A-B illustrate topology communication components 20410 as adaptations and/or analogs of the topology communication component 20910 in FIG. 27. One or more topology communication components 20410 operate in an execution environment 20401. In FIG. 22A, a topology communication component 20410. In FIG. 22B, a topology communication component 20410*b* is illustrated as a component of a t-service 20405*b*. A node 20502 may include a topology communication component 20410*a* and/or a topology communication component 20410*b*. A path node 20504 may also include an adaptation and/or an analog of a topology communication component.

Figure 25B:
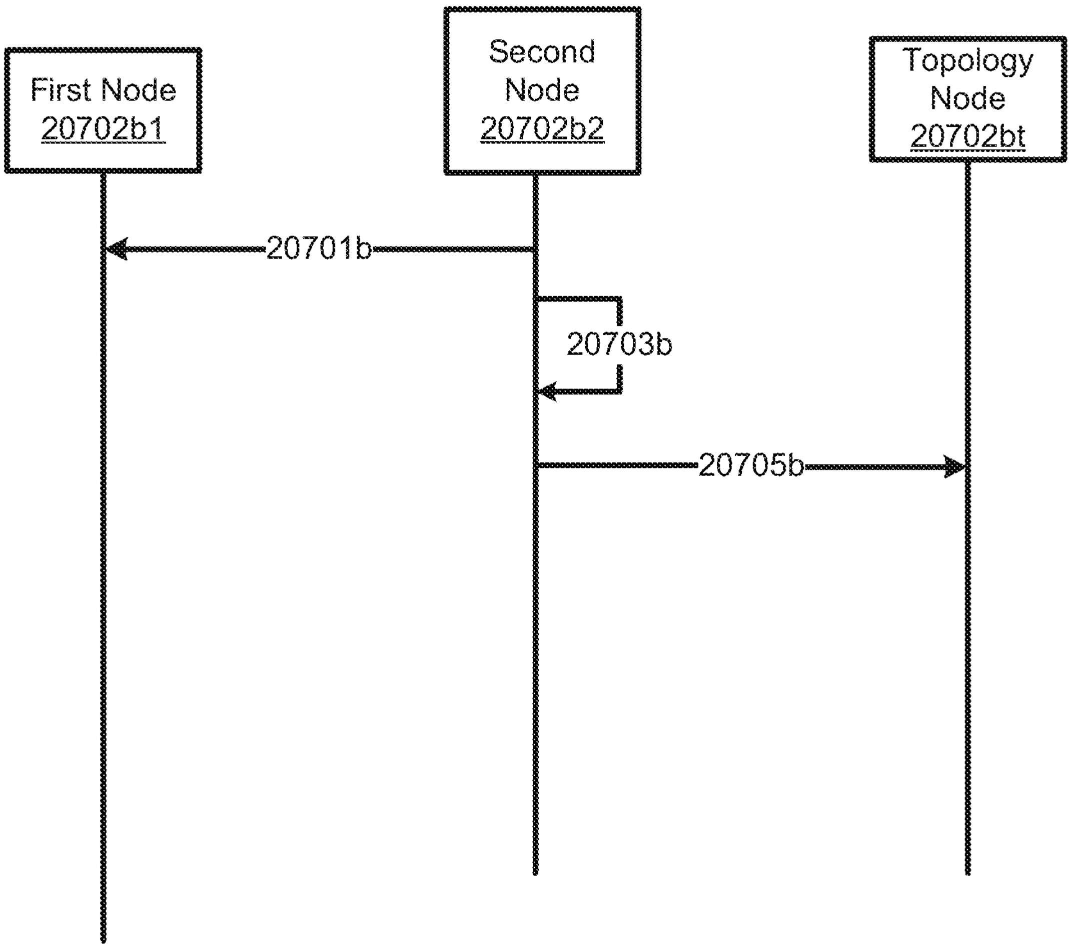
FIG. 25B is a message flow diagram illustrating messages exchanged between nodes in another aspect of the subject matter described herein.

With respect to FIG. 25B, the second node 20702*b*2 is included in and/or otherwise provides an instance of the execution environment 20401*a* including a t-communication component 20410*a*. A topology node 20702*bt*, in the aspect, may host a t-service. The second node 20702*b*2 may host a t-communication component compatible with the t-service in the topology node 20702*bt*. FIG. 25B illustrates a first message 20701*b* exchanged between a first node 20702*b*1 and the second node 20702*b*2. A topology monitor component 20408*a* in the second node 20702*a*2 may detect, based on address information in a data unit included in the exchange, that the first node is in first hop included in communicatively coupling the second node and the first node. The address information may be in a data unit of a link layer protocol and/or a higher layer protocol. The t-monitor component may operate in an appropriate protocol layer of a network stack in the second node 20702*a*2.

A second message 20703*b* illustrates a data flow, in the second node, including the topology space component 20404*a*, operating to determine a first hop identifier for the first hop. See application Ser. No. 13/727,649 filed on 2012 Dec. 27, entitled "Methods, Systems, and Computer Program Products for Assigning an Interface Identifier to a Network Interface", application Ser. No. 13/727,655 filed on 2012 Dec. 27, entitled "Methods, Systems, and Computer Program Products for Determining a Shared identifier for a Hop in a Network"; and application Ser. No. 13/727,657 filed on 2012 Dec. 27, entitled "Methods, Systems, and Computer Program Products for Determining a Hop Identifier for a Network Protocol".

A third message 20705*b* illustrates a message sent by a t-communication component 20410*a* in the second node 20702*b*2 to send the first hop identifier to a topology service 20405*b* in the topology node 20702*bt* to include a representation of the first node in a first location in a topological space. The first location is identified relative to the second node based on the first hop identifier.

Figure 28:
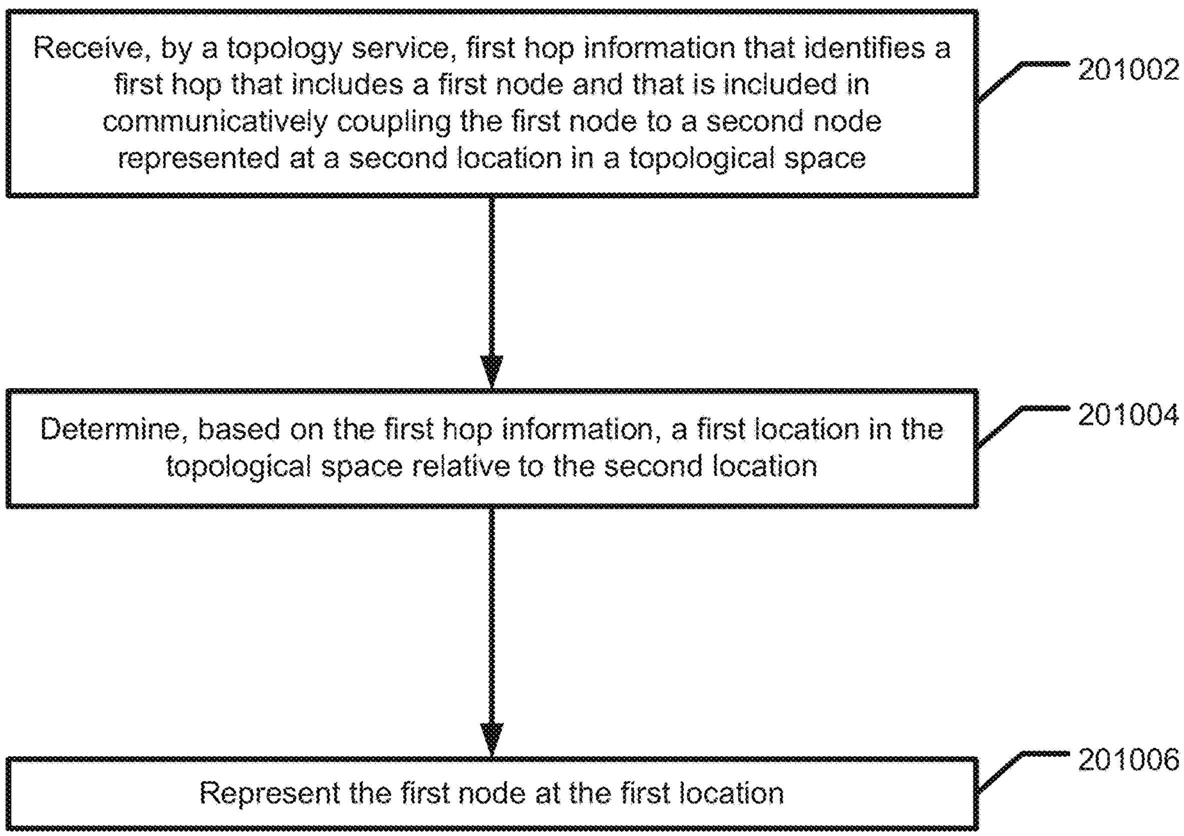
FIG. 28 is a flow diagram illustrating a method for associating a name with a network path according to an aspect of the subject matter described herein.
Figure 29:
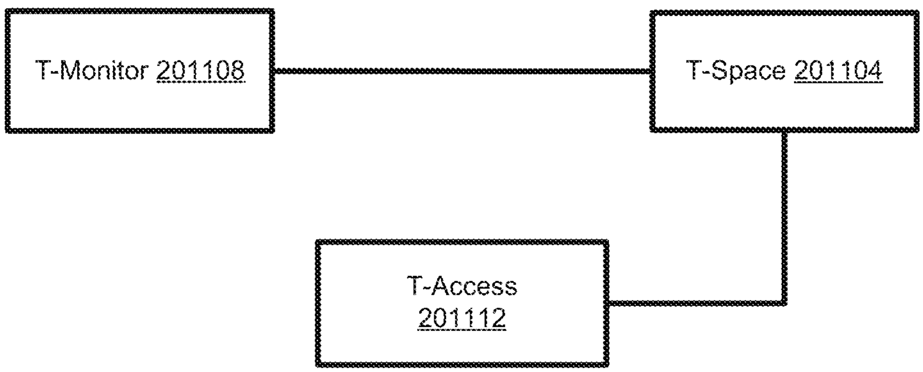
FIG. 29 is a block diagram illustrating an arrangement of components for associating a name with a network path according to another aspect of the subject matter described herein.

FIG. 29 illustrates an arrangement of components that may operate in an execution environment, such as execution environment 20102 in FIG. 19 to perform a method illustrated in FIG. 28. The system illustrated by the arrangement includes a topology monitor component 201108, a topology space component 201104, and a topology access component 201112. A suitable execution environment includes a processor, such as processor 20104, to process an instruction in at least one of a topology monitor component, a topology space component, and a topology access component. Those skilled in the art will understand that other execution environments in addition to the various adaptations, analogs, and instances of the execution environments described herein are suitable for hosting an adaptation of the arrangement in FIG. 28.

With reference to FIG. 28, a block 201002 illustrates that the method includes receiving, by a topology service, first hop information that identifies a first hop that includes a first node and that is included in communicatively coupling the first node to a second node represented at a second location in a topological space. Accordingly, a system for associating a name with a network path includes means for receiving, by a topology service, first hop information that identifies a first hop that includes a first node and that is included in communicatively coupling the first node to a second node represented at a second location in a topological space. For example, the arrangement in FIG. 29, includes topology monitor component 201108 that is operable for and/or is otherwise included in receiving, by a topology service, first hop information that identifies a first hop that includes a first node and that is included in communicatively coupling the first node to a second node represented at a second location in a topological space. The system for associating a name with a network path includes one or more processors and logic encoded in one or more computer readable media for execution by the one or more processors that when executed is operable for and/or is otherwise included in receiving, by a topology service, first hop information that identifies a first hop that includes a first node and that is included in communicatively coupling the first node to a second node represented at a second location in a topological space.

FIGS. 22A-B illustrate topology monitor components 20408 as adaptations and/or analogs of the topology monitor component 201108 in FIG. 29. One or more topology monitor components 20408 operate in an execution environment 20401. In FIG. 22A, and topology monitor component 20408*a* is illustrated as a component of a network layer component 20415*a*. In FIG. 22B, a topology monitor component 20408*b* is illustrated as a component of a t-service 20405*b*. A node 20502 may include a topology monitor component 20408*a* and/or a topology monitor component 20408*b*. A path node 20504 may also include an adaptation and/or an analog of a topology monitor component.

With reference to FIG. 28, a block 201004 illustrates that the method includes determining, based on the first hop information, a first location in the topological space relative to the second location. Accordingly, a system for associating a name with a network path includes means for determining, based on the first hop information, a first location in the topological space relative to the second location. For example, the arrangement in FIG. 29 includes topology space component 201104 that is operable for and/or is otherwise included in determining, based on the first hop information, a first location in the topological space relative to the second location. The system for associating a name with a network path includes one or more processors and logic encoded in one or more computer readable media for execution by the one or more processors that when executed is operable for and/or is otherwise included in determining, based on the first hop information, a first location in the topological space relative to the second location.

FIGS. 22A-B illustrate topology space components 20404 as adaptations and/or analogs of the topology space component 201124 in FIG. 29. One or more topology space components 20424 operate in an execution environment 20401. In FIG. 22A, and topology space component 20404*a* is illustrated. In FIG. 22B, a topology space component 20404*b* is illustrated as a component of a t-service 20405*b*. A node 20502 may include a topology space component 20404*a* and/or a topology space component 20404*b*. A path node 20504 may also include an adaptation and/or an analog of a topology space component.

With reference to FIG. 28, a block 201006 illustrates that the method includes representing the first node at the first location. Accordingly, a system for associating a name with a network path includes means for representing the first node at the first location. For example, the arrangement in FIG. 29 includes topology access component 201112 that is operable for and/or is otherwise included in representing the first node at the first location. The system for associating a name with a network path includes one or more processors and logic encoded in one or more computer readable media for execution by the one or more processors that when executed is operable for and/or is otherwise included in representing the first node at the first location.

FIGS. 22A-B illustrate topology access components 20412 as adaptations and/or analogs of the topology access component 201112 in FIG. 29. One or more topology access components 20412 operate in an execution environment 20401. In FIG. 22A, a topology access component 20412*a* may be included in an execution environment 20401*a* to access a topology data store 20433*a*, which may include cached topology data and/or a representation of a portion of a topological space in which a portion of the network is represented. In FIG. 22B, a topology access component 20412*b* is illustrated as a component of a t-service 20405*b*. A node 20502 may include a topology access component 20412*a* and/or a topology access component 20412*b*. A path node 20504 may also include an adaptation and/or an analog of a topology access component.

Figure 25C:
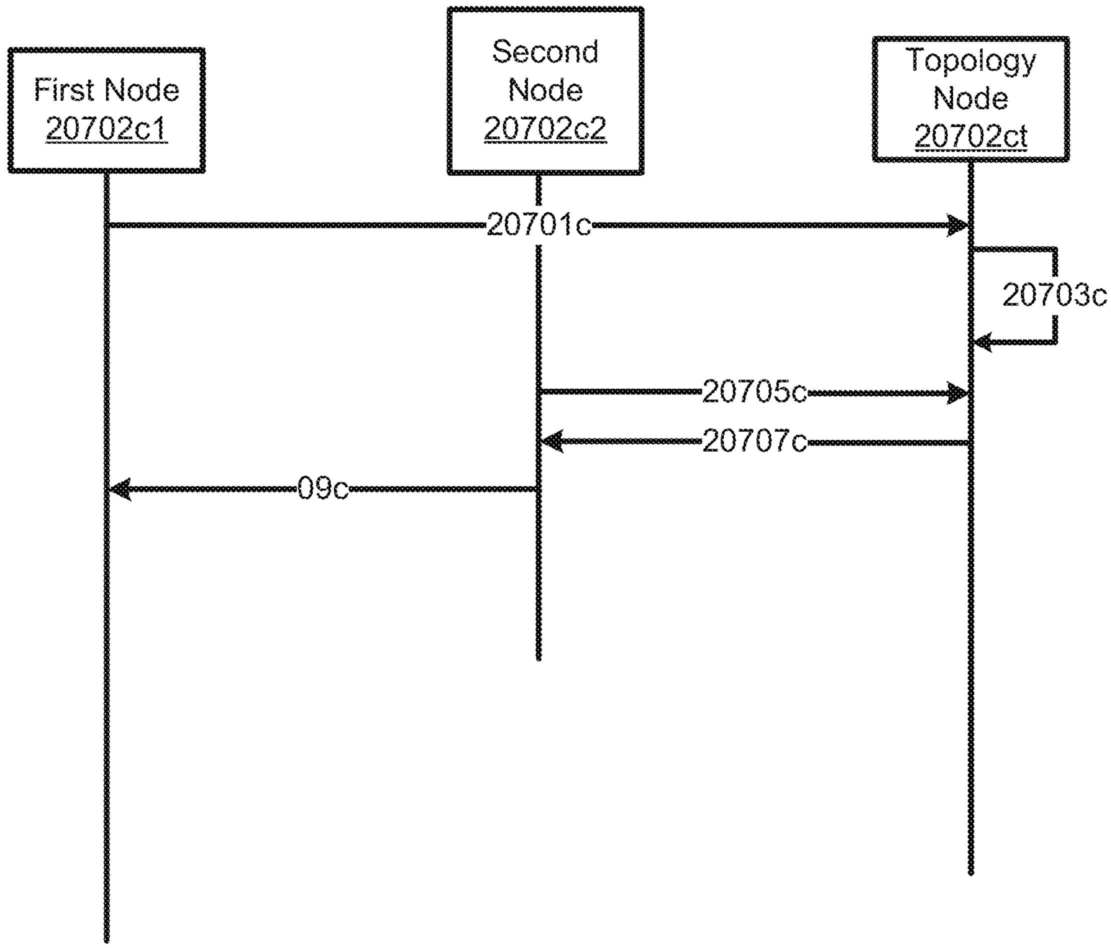
FIG. 25C is a message flow diagram illustrating messages exchanged between nodes in another aspect of the subject matter described herein.

With respect to FIG. 25C, a first node 20702*c*2 may be included in and/or otherwise provide an instance of an execution environment 20401 including a t-communication component 20410. The topology node 20702*ct*, in the aspect, may host a t-service. The first node 20702*c*2 may host a t-communication component compatible with the t-service in the topology node 20702*ct*. FIG. 25C illustrates a first message 20701*c* exchanged between a first node 20702*c*1 and the topology node 20702*ct*. The first message 20701*c* may include first hop information that identifies a first hop that includes the first node 20702*c*1 and that is included in communicatively coupling the first node to a second node 20702*c*2. The second node is represented in a topological space at a second location by a t-access component 20412*b*. The first hop information may be detected and/or otherwise may be received by a topology monitor component 20408*b* in the topology node 20702*ct*.

A topology monitor component 20408 in the second node 20702*c*2 may detect, based on address information in a data unit included in the exchange, that the first node 20702*c*1 is in the first hop that is included in communicatively coupling the second node 20702*c*2 and the first node 20702*c*1. The address information may be in a data unit of a link layer protocol and/or a higher layer protocol. A t-monitor component may operate in an appropriate protocol layer of a network stack in the second node 20702*c*2. A second message 20703*c* illustrates a data flow, in the topology node 20702*ct*, including the topology space component 20404*b*, operating to determine a first location in the topological space relative to the second location, based on the hop information. A third message 20705*c* illustrates a data flow including a t-access component 20412*b* and the t-space component 20404*b* that operate to associate the first node 20702*a*1 and/or an identifier (such as a symbolic identifier) of the first node 20702*a*1 with the first location in the topological space stored in a topology data store 20433*b*.

Figure 30:
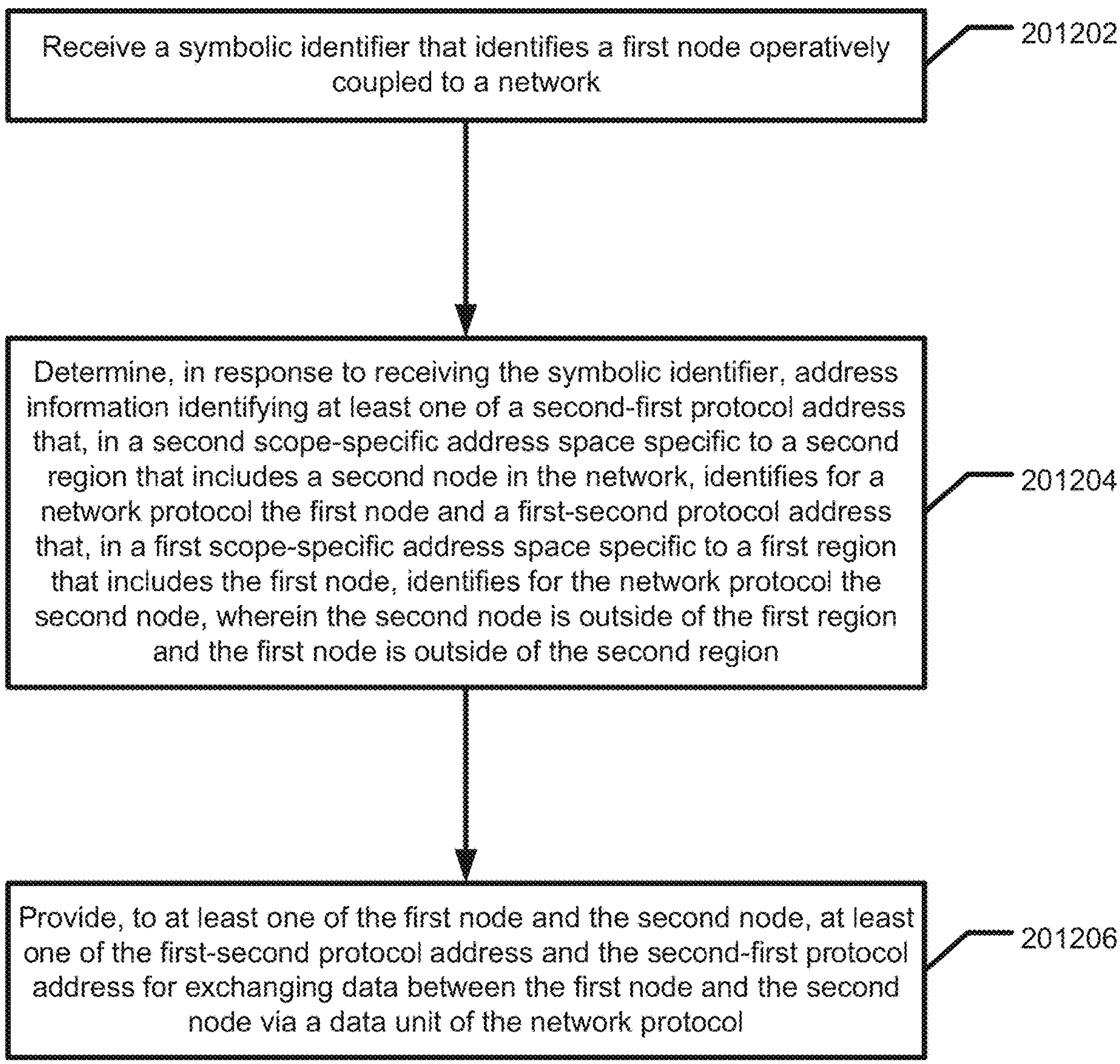
FIG. 30 is a flow diagram illustrating a method for associating a name with a network path according to an aspect of the subject matter described herein.
Figure 31:
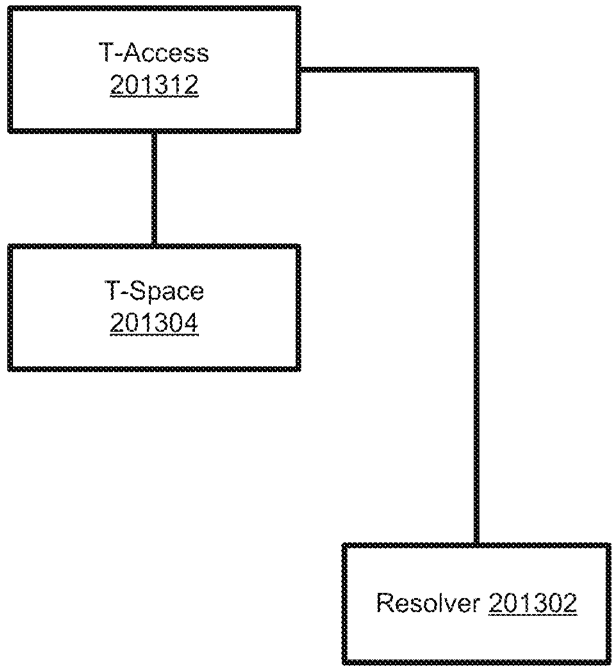
FIG. 31 is a block diagram illustrating an arrangement of components for associating a name with a network path according to another aspect of the subject matter described herein.

FIG. 31 illustrates an arrangement of components that may operate in an execution environment, such as execution environment 20102 in FIG. 19 to perform a method illustrated in FIG. 30. The system illustrated by the arrangement includes a resolver component 201302, a topology access component 201312, and a topology space component 201304. A suitable execution environment includes a processor, such as processor 20104, to process an instruction in at least one of a resolver component, a topology access component, and a topology space component. Those skilled in the art will understand that other execution environments in addition to the various adaptations, analogs, and instances of the execution environments described herein are suitable for hosting an adaptation of the arrangement in FIG. 30.

With reference to FIG. 30, a block 201202 illustrates that the method includes receiving a symbolic identifier that identifies a first node communicatively coupled to a network. Accordingly, a system for associating a name with a network path includes means for receiving a symbolic identifier that identifies a first node communicatively coupled to a network. For example, the arrangement in FIG. 31 includes resolver component 201302 that is operable for and/or is otherwise included in receiving a symbolic identifier that identifies a first node communicatively coupled to a network. The system for associating a name with a network path includes one or more processors and logic encoded in one or more computer readable media for execution by the one or more processors that when executed is operable for and/or is otherwise included in receiving a symbolic identifier that identifies a first node communicatively coupled to a network.

FIGS. 22A-B illustrate resolver components 20402 as adaptations and/or analogs of the resolver component 201302 in FIG. 31. One or more resolver components 20402 operate in an execution environment 20401. In FIG. 22A, and resolver component 20402*a* is illustrated as a component of a t-space component 20404*a*. In FIG. 22B, a resolver component 20402*b* is illustrated as a component of a t-service 20405*b*. A node 20502 may include a resolver component 20402*a* and/or a resolver component 20402*b*. A path node 20504 may also include an adaptation and/or an analog of a resolver component.

With reference to FIG. 30, a block 201234 illustrates that the method includes determining, in response to receiving the symbolic identifier, address information identifying at least one of a second-first protocol address that, in a second scope-specific address space specific to a second region that includes a second node in the network, identifies for a network protocol the first node and a first-second protocol address that, in a first scope-specific address space specific to a first region that includes the first node, identifies for the network protocol the second node, wherein the second node is outside of the first region and the first node is outside of the second region. Accordingly, a system for associating a name with a network path includes means for determining, in response to receiving the symbolic identifier, address information identifying at least one of a second-first protocol address that, in a second scope-specific address space specific to a second region that includes a second node in the network, identifies for a network protocol the first node and a first-second protocol address that, in a first scope-specific address space specific to a first region that includes the first node, identifies for the network protocol the second node, wherein the second node is outside of the first region and the first node is outside of the second region. For example, the arrangement in FIG. 31, includes topology access component 201312 that is operable for and/or is otherwise included in determining, in response to receiving the symbolic identifier, address information identifying at least one of a second-first protocol address that, in a second scope-specific address space specific to a second region that includes a second node in the network, identifies for a network protocol the first node and a first-second protocol address that, in a first scope-specific address space specific to a first region that includes the first node, identifies for the network protocol the second node, wherein the second node is outside of the first region and the first node is outside of the second region. The system for associating a name with a network path includes one or more processors and logic encoded in one or more computer readable media for execution by the one or more processors that when executed is operable for and/or is otherwise included in determining, in response to receiving the symbolic identifier, address information identifying at least one of a second-first protocol address that, in a second scope-specific address space specific to a second region that includes a second node in the network, identifies for a network protocol the first node and a first-second protocol address that, in a first scope-specific address space specific to a first region that includes the first node, identifies for the network protocol the second node, wherein the second node is outside of the first region and the first node is outside of the second region.

FIGS. 22A-B illustrate topology access components 20412 as adaptations and/or analogs of the topology access component 201312 in FIG. 31. One or more topology access components 20412 operate in an execution environment 20401. In FIG. 22A, a topology access component is 20412*a* illustrated. In FIG. 22B, a topology access component 20412*b* is illustrated as a component of a t-service 20405*b*. A node 20502 may include a topology access component 20412*a* and/or a topology access component 20412*b*. A path node 20504 may also include an adaptation and/or an analog of a topology access component.

With reference to FIG. 30, a block 201206 illustrates that the method includes providing, to at least one of the first node and the second node, at least one of the first-second protocol address and the second-first protocol address for exchanging data between the first node and the second node via a data unit of the network protocol. Accordingly, a system for associating a name with a network path includes means for providing, to at least one of the first node and the second node, at least one of the first-second protocol address and the second-first protocol address for exchanging data between the first node and the second node via a data unit of the network protocol. For example, the arrangement in FIG. 31, includes topology space component 201304 that is operable for and/or is otherwise included in providing, to at least one of the first node and the second node, at least one of the first-second protocol address and the second-first protocol address for exchanging data between the first node and the second node via a data unit of the network protocol. The system for associating a name with a network path includes one or more processors and logic encoded in one or more computer readable media for execution by the one or more processors that when executed is operable for and/or is otherwise included in providing, to at least one of the first node and the second node, at least one of the first-second protocol address and the second-first protocol address for exchanging data between the first node and the second node via a data unit of the network protocol.

FIGS. 22A-B illustrate topology space components 20404 as adaptations and/or analogs of the topology space component 201304 in FIG. 31. One or more topology space components 20404 operate in an execution environment 20401. In FIG. 22A, a topology space component 20404*a* is illustrated. In FIG. 22B, a topology space component 20404*b* is illustrated as a component of a t-service 20405*b*. A node 20502 may include a topology space component 20404*a* and/or a topology space component 20404*b*. A path node 20504 may also include an adaptation and/or an analog of a topology space component.

Figure 25D:
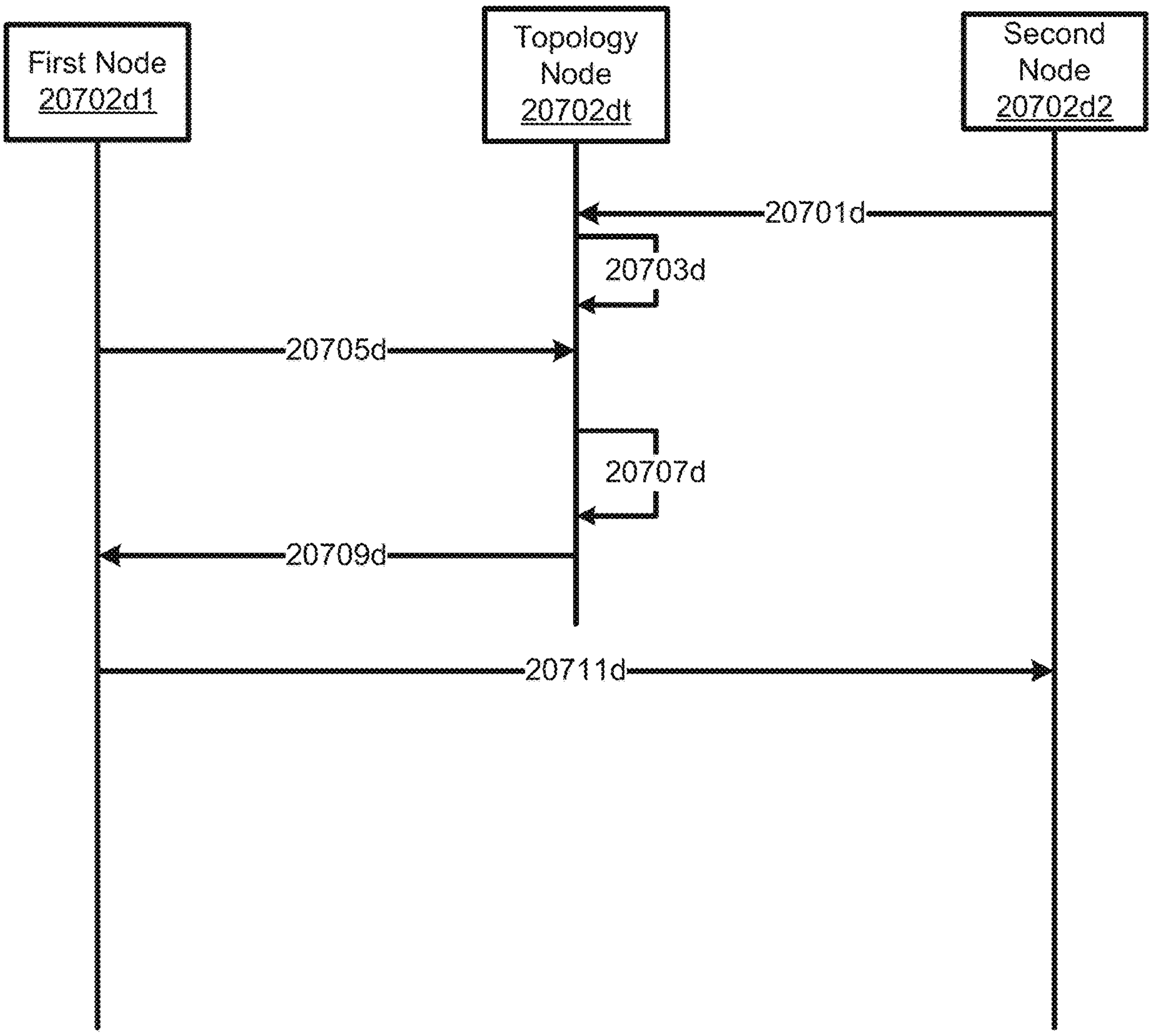
FIG. 25D is a message flow diagram illustrating messages exchanged between nodes in another aspect of the subject matter described herein.

With respect to FIG. 25D, a second node 20702*d*2 may be included in and/or otherwise provide an instance of an execution environment 20401 including a t-communication component 20410. A topology node 20702*dt*, in the aspect, may host a t-service. The second node 20702*d*2 may host a t-communication component compatible with the t-service in the topology node 20702*dt*. FIG. 25D illustrates a first message 20701*d* exchanged between the second node 20702*d*2 and the topology node 20702*dt*. The first message 20701*d* may include a symbolic identifier that identifies a first node 20702*d*1 operatively coupled to a network. The symbolic identifier may be received by a resolver component 20702*b* in the topology node 20702*dt*. The resolver component 20402*b* may interoperate with a t-access component 20412*b* illustrated by a second message 20703*d*. The interoperation may be direct and/or indirect. The interoperation may be performed to determine, in response to receiving the symbolic identifier, address information identifying at least one of a second-first protocol address that, in a second scope-specific address space specific to a second region that includes the second node **20702*d*2 in the network, identifies for a network protocol the first node 20702*d*1 and a first-second protocol address that, in a first scope-specific address space specific to a first region that includes the first node 20702*d*1, identifies for the network protocol the second node 20702*d*2, wherein the second node 20702*d*2 is outside of the first region and the first node 20702*d*1 is outside of the second region. A third message 20705*d* illustrates interoperation between a t-space component 20404*b* and a t-communication component 20410*b* to provide address information based on the location information to at least one of the first node 20702*d*1 and the second node 20702*d*2 to allow the first node 20702*d*1 and the second node 20702*d*2 to exchange, based on at least one of the first-second protocol address and the second-first protocol address, data via a data unit of a network protocol FIG. 33 illustrates an arrangement of components that may operate in an execution environment, such as execution environment 20102 in FIG. 19 to perform a method illustrated in FIG. 32. The system illustrated by the arrangement includes a topology monitor component 201508, a topology relay component 201506, a topology space component 2015042 and a resolver component 201502. A suitable execution environment includes a processor, such as processor 20104, to process an instruction in at least one of a topology monitor component, a topology relay component, a topology space component, and a resolver component. Those skilled in the art will understand that other execution environments in addition to the various adaptations, analogs, and instances of the execution environments described herein are suitable for hosting an adaptation of the arrangement in FIG. 32**.

Figure 32:
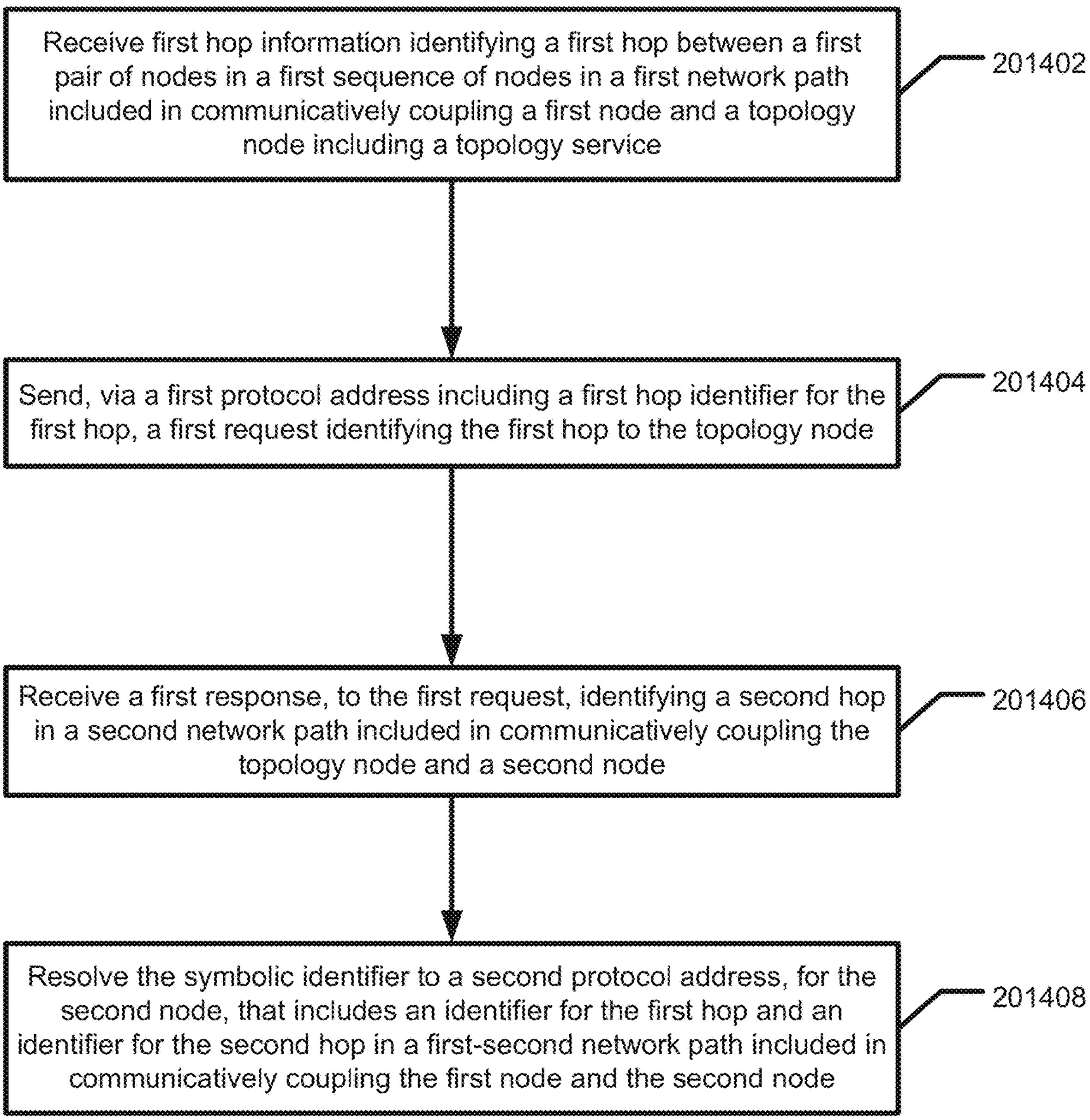
FIG. 32 is a flow diagram illustrating a method for associating a name with a network path according to an aspect of the subject matter described herein.
Figure 33:
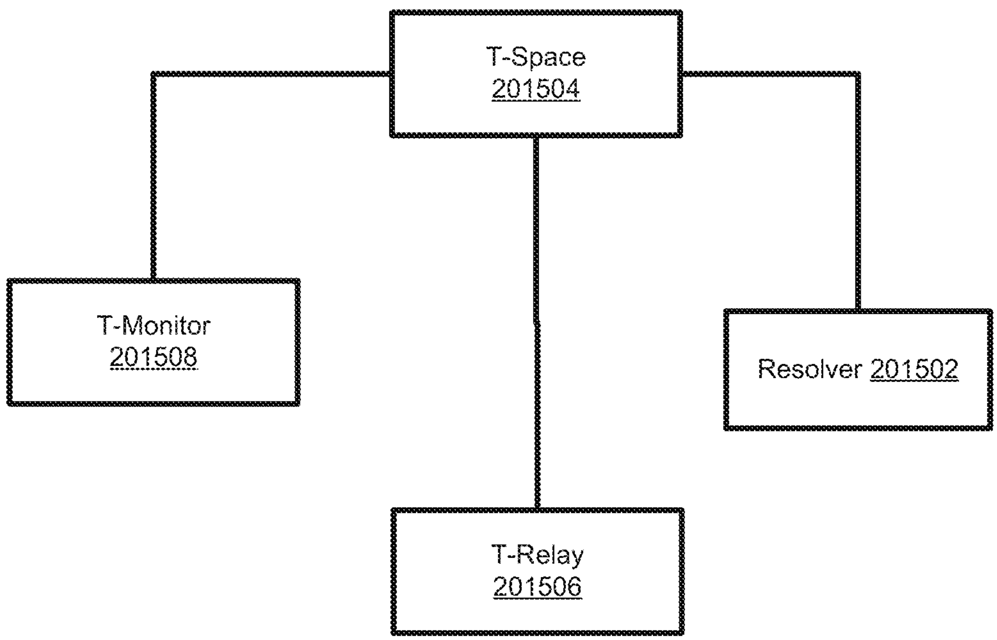
FIG. 33 is a block diagram illustrating an arrangement of components for associating a name with a network path according to another aspect of the subject matter described herein.

With reference to FIG. 32, a block 201402 illustrates that the method includes receiving first hop information identifying a first hop between a first pair of nodes in a first sequence of nodes in a first network path included in communicatively coupling a first node and a topology node including a topology service. Accordingly, a system for associating a name with a network path includes means for receiving first hop information identifying a first hop between a first pair of nodes in a first sequence of nodes in a first network path included in communicatively coupling a first node and a topology node including a topology service. For example, the arrangement in FIG. 33, includes topology monitor component 201508 that is operable for and/or is otherwise included in receiving first hop information identifying a first hop between a first pair of nodes in a first sequence of nodes in a first network path included in communicatively coupling a first node and a topology node including a topology service. The system for associating a name with a network path includes one or more processors and logic encoded in one or more computer readable media for execution by the one or more processors that when executed is operable for and/or is otherwise included in receiving first hop information identifying a first hop between a first pair of nodes in a first sequence of nodes in a first network path included in communicatively coupling a first node and a topology node including a topology service.

FIGS. 22A-B illustrate topology monitor components 20408 as adaptations and/or analogs of the topology monitor component 201508 in FIG. 33. One or more topology monitor components 20408 operate in an execution environment 20401. In FIG. 22A, and topology monitor component **20408*a* is illustrated. In FIG. 22B, a topology monitor component 20408*b* is illustrated as a component of a t-service 20405*b*. A node 20502 may include a topology monitor component 20408*a* and/or a topology monitor component 20408*b*. A path node 20504** may also include an adaptation and/or an analog of a topology monitor component.

With reference to FIG. 32, a block 201404 illustrates that the method includes sending, via a first protocol address including a first hop identifier for the first hop, a first request identifying the first hop to the topology node. Accordingly, a system for associating a name with a network path includes means for sending, via a first protocol address including a first hop identifier for the first hop, a first request identifying the first hop to the topology node. For example, the arrangement in FIG. 33 includes topology relay component 201506 that is operable for and/or is otherwise included in sending, via a first protocol address including a first hop identifier for the first hop, a first request identifying the first hop to the topology node. The system for associating a name with a network path includes one or more processors and logic encoded in one or more computer readable media for execution by the one or more processors that when executed is operable for and/or is otherwise included in sending, via a first protocol address including a first hop identifier for the first hop, a first request identifying the first hop to the topology node.

FIGS. 22A-B illustrate topology relay components 20406 as adaptations and/or analogs of the topology relay component 201506 in FIG. 33. One or more topology relay components 20406 operate in an execution environment 20401. In FIG. 22A, a topology relay component **20444*a* is illustrated. In FIG. 22B, a topology relay component 20406*b* is illustrated as a component of a t-service 20405*b*. A node 20502 may include a topology relay component 20406*a* and/or a topology relay component 20406*b*. A path node 20504** may also include an adaptation and/or an analog of a topology relay component.

With reference to FIG. 32, a block 201406 illustrates that the method includes receiving a first response, to the first request, identifying a second hop in a second network path included in communicatively coupling the topology node and a second node. Accordingly, a system for associating a name with a network path includes means for receiving a first response, to the first request, identifying a second hop in a second network path included in communicatively coupling the topology node and a second node. For example, the arrangement in FIG. 33, includes topology space component 201504 that is operable for and/or is otherwise included in receiving a first response, to the first request, identifying a second hop in a second network path included in communicatively coupling the topology node and a second node. The system for associating a name with a network path includes one or more processors and logic encoded in one or more computer readable media for execution by the one or more processors that when executed is operable for and/or is otherwise included in receiving a first response, to the first request, identifying a second hop in a second network path included in communicatively coupling the topology node and a second node.

FIGS. 22A-B illustrate topology space components 20404 as adaptations and/or analogs of the topology space component 201546 in FIG. 33. One or more topology space components 20404 operate in an execution environment 20401. In FIG. 22A, a topology space component **20404*a* is illustrated. In FIG. 22B, a topology space component 20404*b* is illustrated as a component of a t-service 20405*b***.

A node 20502 may include a topology space component 20404*a* and/or a topology space component 20404*b*. A path node 20504 may also include an adaptation and/or an analog of a topology space component.

With reference to FIG. 32, a block 201408 illustrates that the method includes resolving the symbolic identifier to a second protocol address, for the second node, that includes an identifier for the first hop and an identifier for the second hop in a first-second network path included in communicatively coupling the first node and the second node. Accordingly, a system for associating a name with a network path includes means for resolving the symbolic identifier to a second protocol address, for the second node, that includes an identifier for the first hop and an identifier for the second hop in a first-second network path included in communicatively coupling the first node and the second node. For example, the arrangement in FIG. 33, includes resolver component 201502 that is operable for and/or is otherwise included in resolving the symbolic identifier to a second protocol address, for the second node, that includes an identifier for the first hop and an identifier for the second hop in a first-second network path included in communicatively coupling the first node and the second node. The system for associating a name with a network path includes one or more processors and logic encoded in one or more computer readable media for execution by the one or more processors that when executed is operable for and/or is otherwise included in resolving the symbolic identifier to a second protocol address, for the second node, that includes an identifier for the first hop and an identifier for the second hop in a first-second network path included in communicatively coupling the first node and the second node.

FIGS. 22A-B illustrate resolver components 20402 as adaptations and/or analogs of the resolver component 201502 in FIG. 33. One or more resolver components 20402 operate in an execution environment 20401. In FIG. 22A, and resolver component 20402*a* is illustrated as a component of a network layer component 20415*a*. In FIG. 22B, a resolver component 20402*b* is illustrated as a component of a t-service 20405*b*. A node 20502 may include a resolver component 20402*a* and/or a resolver component 20402*b*. A path node 20504 may also include an adaptation and/or an analog of a resolver component.

Figure 34:
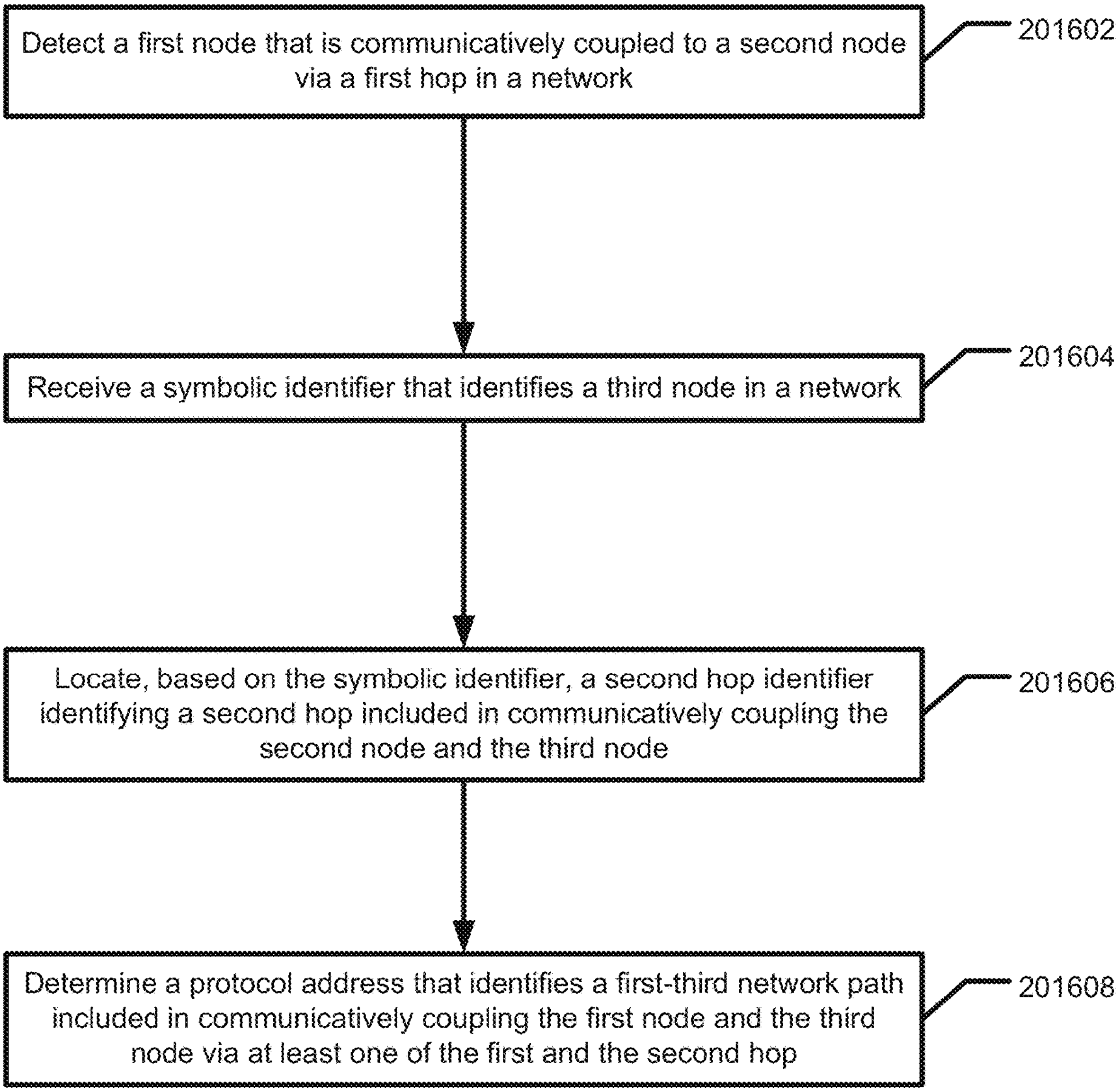
FIG. 34 is a flow diagram illustrating a method for associating a name with a network path according to an aspect of the subject matter described herein.
Figure 35:
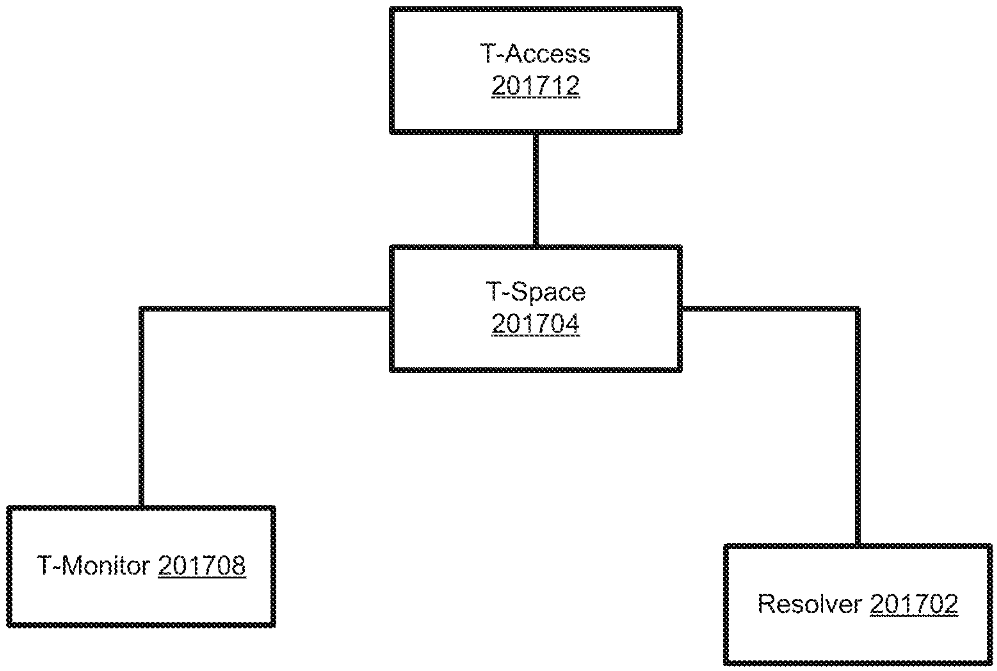
FIG. 35 is a block diagram illustrating an arrangement of components for associating a name with a network path according to another aspect of the subject matter described herein.

FIG. 35 illustrates an arrangement of components that may operate in an execution environment, such as execution environment 20102 in FIG. 19 to perform a method illustrated in FIG. 34. The system illustrated by the arrangement includes a topology monitor component 201708, a resolver component 201702, a topology access component 201712, and a topology space component 201704. A suitable execution environment includes a processor, such as processor 20104, to process an instruction in at least one of a topology monitor component, a resolver component, a topology access component, and a topology space component. Those skilled in the art will understand that other execution environments in addition to the various adaptations, analogs, and instances of the execution environments described herein are suitable for hosting an adaptation of the arrangement in FIG. 34.

With reference to FIG. 34, a block 201602 illustrates that the method includes detecting a first node that is communicatively coupled to a second node via a first hop in a network. Accordingly, a system for associating a name with a network path includes means for detecting a first node that is communicatively coupled to a second node via a first hop in a network. For example, the arrangement in FIG. 35 includes topology monitor component 201708 that is operable for and/or is otherwise included in detecting a first node that is communicatively coupled to a second node via a first hop in a network. The system for associating a name with a network path includes one or more processors and logic encoded in one or more computer readable media for execution by the one or more processors that when executed is operable for and/or is otherwise included in detecting a first node that is communicatively coupled to a second node via a first hop in a network.

FIGS. 22A-B illustrate topology monitor components 20408 as adaptations and/or analogs of the topology monitor component 201702 in FIG. 35. One or more topology monitor components 20408 operate in an execution environment 20401. In FIG. 22A, a topology monitor component 20408*a* is illustrated as a component of a network layer component 20415*a*. In FIG. 22B, a topology monitor component 20408*b* is illustrated as a component of a t-service 20405*b*. A node 20502 may include a topology monitor component 20408*a* and/or a topology monitor component 20408*b*. A path node 20504 may also include an adaptation and/or an analog of a topology monitor component.

With reference to FIG. 34, a block 201604 illustrates that the method includes receiving a symbolic identifier that identifies a third node in a network. Accordingly, a system for associating a name with a network path includes means for receiving a symbolic identifier that identifies a third node in a network. For example, the arrangement in FIG. 35, includes resolver component 201702 that is operable for and/or is otherwise included in receiving a symbolic identifier that identifies a third node in a network. The system for associating a name with a network path includes one or more processors and logic encoded in one or more computer readable media for execution by the one or more processors that when executed is operable for and/or is otherwise included in receiving a symbolic identifier that identifies a third node in a network.

FIGS. 22A-B illustrate resolver components 20402 as adaptations and/or analogs of the resolver component 201702 in FIG. 35. One or more resolver components 20402 operate in an execution environment 20401. In FIG. 22A, a resolver component 20402*a* is illustrated as a component of a t-space component 20404*a*. In FIG. 22B, a resolver component 20402*b* is illustrated as a component of a t-service 20405*b*. A node 20502 may include a resolver component 20402*a* and/or a resolver component 20402*b*. A path node 20504 may also include an adaptation and/or an analog of a resolver component.

With reference to FIG. 34, a block 201606 illustrates that the method includes locating, based on the symbolic identifier, a second hop identifier identifying a second hop included in communicatively coupling the second node and the third node. Accordingly, a system for associating a name with a network path includes means for locating, based on the symbolic identifier, a second hop identifier identifying a second hop included in communicatively coupling the second node and the third node. For example, the arrangement in FIG. 35 includes topology access component 201712 that is operable for and/or is otherwise included in locating, based on the symbolic identifier, a second hop identifier identifying a second hop included in communicatively coupling the second node and the third node. The system for associating a name with a network path includes one or more processors and logic encoded in one or more computer readable media for execution by the one or more processors that when executed is operable for and/or is otherwise included in locating, based on the symbolic identifier, a second hop identifier identifying a second hop included in communicatively coupling the second node and the third node.

FIGS. 22A-B illustrate topology access components 20412 as adaptations and/or analogs of the topology access component 1712 in FIG. 35. One or more topology access components 20412 operate in an execution environment 20401. In FIG. 22A, a topology access component 20412*a* is illustrated. In FIG. 22B, a topology access component 20412*b* is illustrated as a component of a t-service 20405*b*. A node 20502 may include a topology access component 20412*a* and/or a topology access component 20412*b*. A path node 20504 may also include an adaptation and/or an analog of a topology access component.

With reference to FIG. 34, a block 201608 illustrates that the method includes determining a protocol address that identifies a first-third network path included in communicatively coupling the first node and the third node via at least one of the first and the second hop. Accordingly, a system for associating a name with a network path includes means for determining a protocol address that identifies a first-third network path included in communicatively coupling the first node and the third node via at least one of the first and the second hop. For example, the arrangement in FIG. 35 includes topology space component 201704 that is operable for and/or is otherwise included in determining a protocol address that identifies a first-third network path included in communicatively coupling the first node and the third node via at least one of the first and the second hop. The system for associating a name with a network path includes one or more processors and logic encoded in one or more computer readable media for execution by the one or more processors that when executed is operable for and/or is otherwise included in determining a protocol address that identifies a first-third network path included in communicatively coupling the first node and the third node via at least one of the first and the second hop.

FIGS. 22A-B illustrate topology space components 20404 as adaptations and/or analogs of the topology space component 201704 in FIG. 35. One or more topology space components 20404 operate in an execution environment 20401. In FIG. 22A, a topology space component 20404*a* is illustrated. In FIG. 22B, a resolver component 20402*b* is illustrated as a component of a t-service 20405*b*. A node 20502 may include a topology space component 20404*a* and/or a topology space component 20404*b*. A path node 20504 may also include an adaptation and/or an analog of a topology space component.

Figure 36:
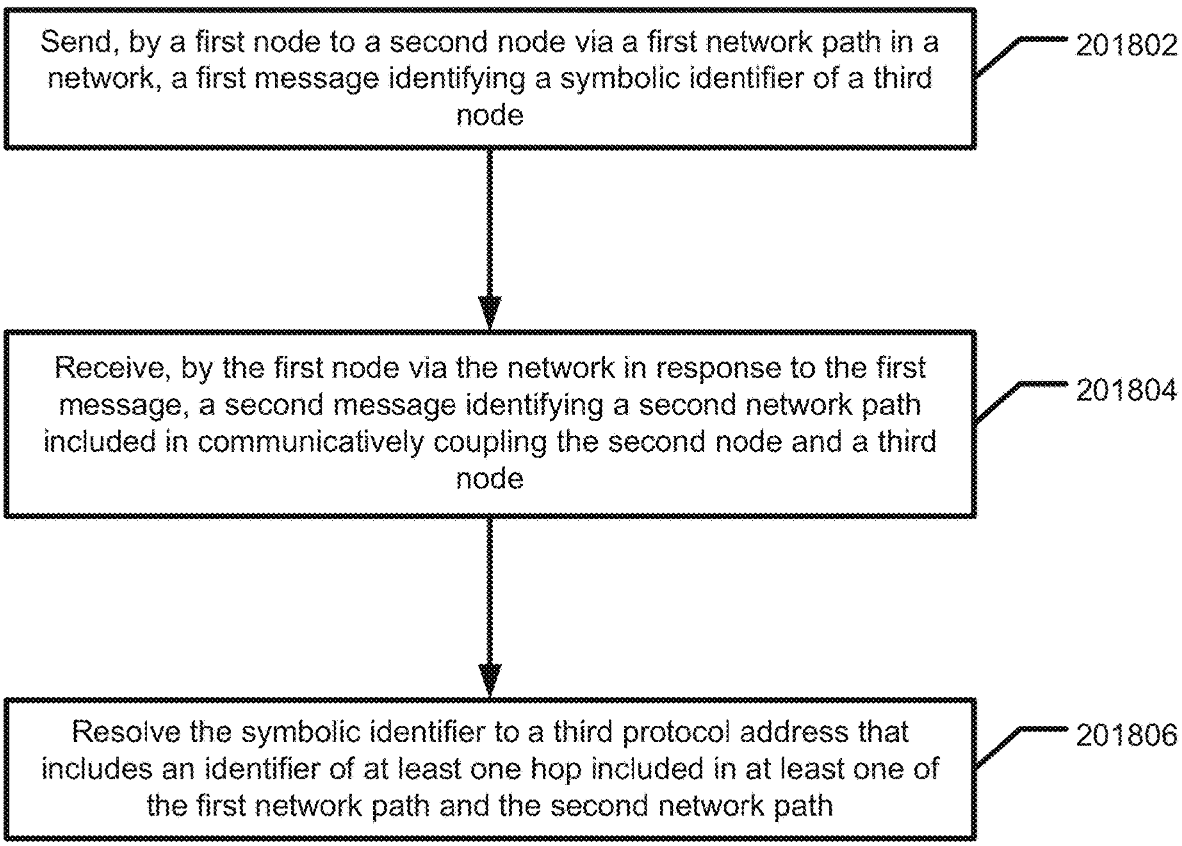
FIG. 36 is a flow diagram illustrating a method for associating a name with a network path according to an aspect of the subject matter described herein.
Figure 37:
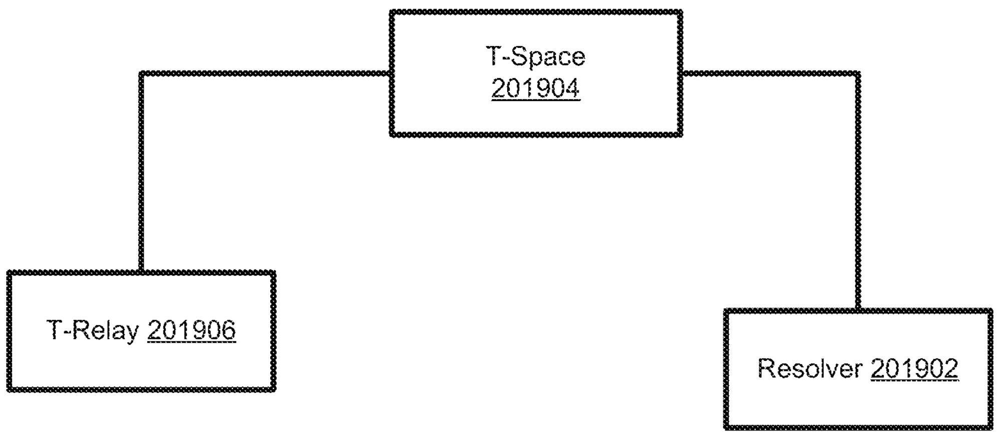
FIG. 37 is a block diagram illustrating an arrangement of components for associating a name with a network path according to another aspect of the subject matter described herein.

FIG. 37 illustrates an arrangement of components that may operate in an execution environment, such as execution environment 20102 in FIG. 19 to perform a method illustrated in FIG. 36. The system illustrated by the arrangement includes a topology relay component 201906, a topology space component 201904, and a resolver component 201902. A suitable execution environment includes a processor, such as processor 20104, to process an instruction in at least one of a topology relay component, a topology space component, and a resolver component 201902. Those skilled in the art will understand that other execution environments in addition to the various adaptations, analogs, and instances of the execution environments described herein are suitable for hosting an adaptation of the arrangement in FIG. 36.

With reference to FIG. 36, a block 201802 illustrates that the method includes sending, by a first node to a second node via a first network path in a network, a first message identifying a symbolic identifier of a third node. Accordingly, a system for associating a name with a network path includes means for sending, by a first node to a second node via a first network path in a network, a first message identifying a symbolic identifier of a third node. For example, the arrangement in FIG. 37, includes topology relay component 201906 that is operable for and/or is otherwise included in sending, by a first node to a second node via a first network path in a network, a first message identifying a symbolic identifier of a third node. The system for associating a name with a network path includes one or more processors and logic encoded in one or more computer readable media for execution by the one or more processors that when executed is operable for and/or is otherwise included in sending, by a first node to a second node via a first network path in a network, a first message identifying a symbolic identifier of a third node.

FIGS. 22A-B illustrate topology relay components 20406 as adaptations and/or analogs of the topology relay component 201906 in FIG. 37. One or more topology relay components 20406 operate in an execution environment 20401. In FIG. 22A, a topology relay component 20406*a* is illustrated as a component of a network layer component 20415*a*. In FIG. 22B, a topology relay component 20406*b* is illustrated as a component of a t-communication component 20410*b*. A node 20502 may include a topology relay component 20406*a* and/or a topology relay component 20406*b*. A path node 20504 may also include an adaptation and/or an analog of a topology relay component.

With reference to FIG. 36, a block 201804 illustrates that the method includes receiving, by the first node via the network in response to the first message, a second message identifying a second network path included in communicatively coupling the second node and a third node. Accordingly, a system for associating a name with a network path includes means for receiving, by the first node via the network in response to the first message, a second message identifying a second network path included in communicatively coupling the second node and a third node. For example, the arrangement in FIG. 37 includes topology space component 201904 that is operable for and/or is otherwise included in receiving, by the first node via the network in response to the first message, a second message identifying a second network path included in communicatively coupling the second node and a third node. The system for associating a name with a network path includes one or more processors and logic encoded in one or more computer readable media for execution by the one or more processors that when executed is operable for and/or is otherwise included in receiving, by the first node via the network in response to the first message, a second message identifying a second network path included in communicatively coupling the second node and a third node.

FIGS. 22A-B illustrate topology space components 20404 as adaptations and/or analogs of the topology space component 201904 in FIG. 37. One or more topology space components 20404 operate in an execution environment 20401. In FIG. 22A, a topology space component 20404*a* is illustrated. In FIG. 22B, a topology space component 20404*b* is illustrated as a component of a t-service 20405*b*. A node 20502 may include a topology space component 20404*a* and/or a topology space component 20404*b*. A path node 20504 may also include an adaptation and/or an analog of a topology space component.

With reference to FIG. 36, a block 201806 illustrates that the method includes resolving the symbolic identifier to a third protocol address that includes an identifier of at least one hop included in at least one of the first network path and the second network path. Accordingly, a system for associating a name with a network path includes means for resolving the symbolic identifier to a third protocol address that includes an identifier of at least one hop included in at least one of the first network path and the second network path. For example, the arrangement in FIG. 37, includes resolver component 201902 that is operable for and/or is otherwise included in resolving the symbolic identifier to a third protocol address that includes an identifier of at least one hop included in at least one of the first network path and the second network path. The system for associating a name with a network path includes one or more processors and logic encoded in one or more computer readable media for execution by the one or more processors that when executed is operable for and/or is otherwise included in resolving the symbolic identifier to a third protocol address that includes an identifier of at least one hop included in at least one of the first network path and the second network path.

FIGS. 22A-B illustrate resolver components 20402 as adaptations and/or analogs of the resolver component 201902 in FIG. 37. One or more resolver components 20402 operate in an execution environment 20401. In FIG. 22A, a resolver component 20402*a* is illustrated as a component of a t-space component 20404*a*. In FIG. 22B, a resolver component 20402*b* is illustrated as a component of a t-service 20405*b*. A node 20502 may include a resolver component 20402*a* and/or a resolver component 20402*b*. A path node 20504 may also include an adaptation and/or an analog of a resolver component.

Figure 38:
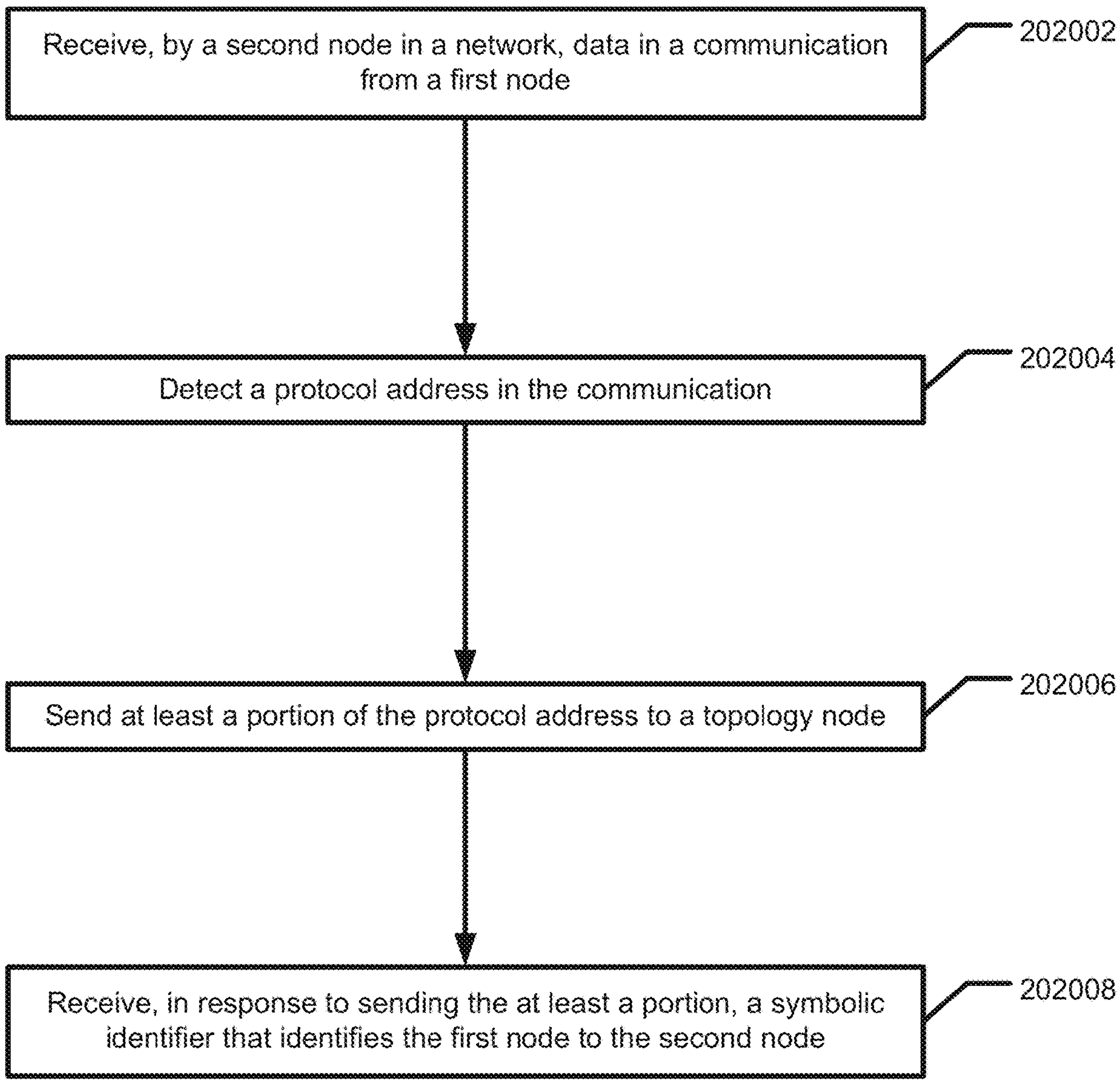
FIG. 38 is a flow diagram illustrating a method for associating a name with a network path according to an aspect of the subject matter described herein.
Figure 39:
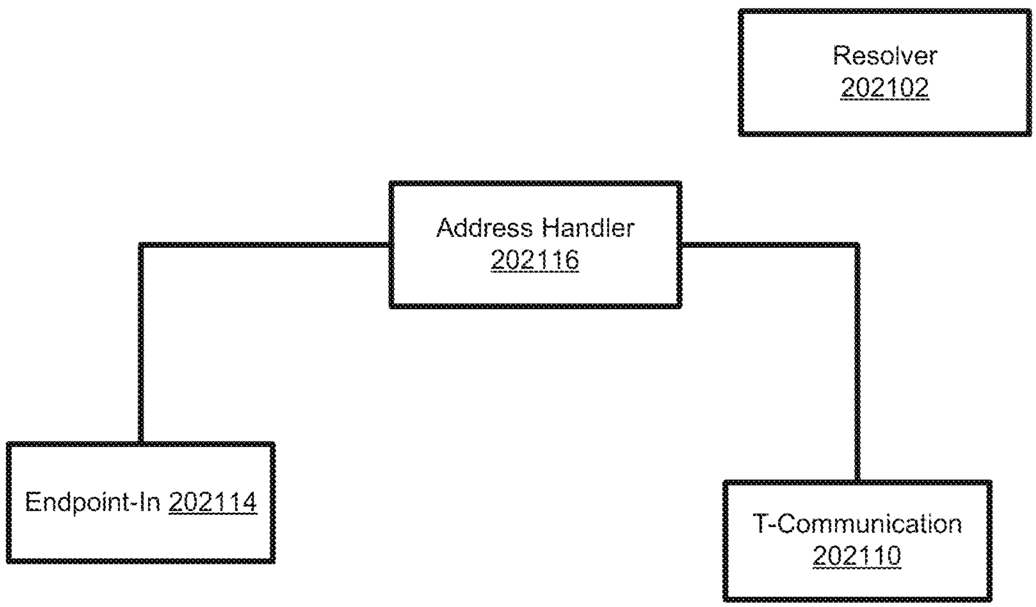
FIG. 39 is a block diagram illustrating an arrangement of components for associating a name with a network path according to another aspect of the subject matter described herein.

FIG. 39 illustrates an arrangement of components that may operate in an execution environment, such as execution environment 20102 in FIG. 19 to perform a method illustrated in FIG. 38. The system illustrated by the arrangement includes an endpoint-in component 202114, an address handler component 202116, a topology communication component 202110, and a resolver component 202102. A suitable execution environment includes a processor, such as processor 20104, to process an instruction in at least one of an endpoint-in component, an address handler component, a topology communication component, and a resolver component. Those skilled in the art will understand that other execution environments in addition to the various adaptations, analogs, and instances of the execution environments described herein are suitable for hosting an adaptation of the arrangement in FIG. 38.

With reference to FIG. 38, a block 202002 illustrates that the method includes receiving, by a second node in a network, data in a communication from a first node. Accordingly, a system for associating a name with a network path includes means for receiving, by a second node in a network, data in a communication from a first node. For example, the arrangement in FIG. 39 includes endpoint-in component 202114 that is operable for and/or is otherwise included in receiving, by a second node in a network, data in a communication from a first node. The system for associating a name with a network path includes one or more processors and logic encoded in one or more computer readable media for execution by the one or more processors that when executed is operable for and/or is otherwise included in receiving, by a second node in a network, data in a communication from a first node.

FIGS. 22A-B illustrate endpoint-in components 20414 as adaptations and/or analogs of the endpoint-in component 202114 in FIG. 39. One or more endpoint-in components 20414 operate in an execution environment 20401. In FIG. 22A, an endpoint-in component 20414*a* is illustrated as a component of a network layer component 20415*a*. In FIG. 22B, an endpoint-in component 20414*b* is illustrated as a component of a t-service 20405*b*. A node 20502 may include an endpoint-in component 20414*a* and/or an endpoint-in component 20414*b*. A path node 20504 may also include an adaptation and/or an analog of an endpoint-in component.

With reference to FIG. 38, a block 202004 illustrates that the method includes detecting a protocol address in the communication. Accordingly, a system for associating a name with a network path includes means for detecting a protocol address in the communication. For example, the arrangement in FIG. 39 includes address handler component 202116 that is operable for and/or is otherwise included in detecting a protocol address in the communication. The system for associating a name with a network path includes one or more processors and logic encoded in one or more computer readable media for execution by the one or more processors that when executed is operable for and/or is otherwise included in detecting a protocol address in the communication.

FIGS. 22A-B illustrate address handler components 20416 as adaptations and/or analogs of the address handler component 201916 in FIG. 39. One or more address handler components 20416 operate in an execution environment 20401. In FIG. 22A, an address handler component 20416*a* is illustrated as a component of a network layer component 20415*a*. In FIG. 22B, a handler component 20416*b* is illustrated as a component of a t-service 20405*b*. A node 20502 may include an address handler component 20416*a* and/or an address handler component 20416*b*. A path node 20504 may also include an adaptation and/or an analog of an address handler component.

With reference to FIG. 38, a block 202006 illustrates that the method includes sending at least a portion of the protocol address to a topology node. Accordingly, a system for associating a name with a network path includes means for sending at least a portion of the protocol address to a topology node. For example, the arrangement in FIG. 39 includes topology communication component 202110 that is operable for and/or is otherwise included in sending at least a portion of the protocol address to a topology node. The system for associating a name with a network path includes one or more processors and logic encoded in one or more computer readable media for execution by the one or more processors that when executed is operable for and/or is otherwise included in sending at least a portion of the protocol address to a topology node.

FIGS. 22A-B illustrate topology communication components 20410 as adaptations and/or analogs of the topology communication component 201910 in FIG. 39. One or more topology communication components 20410 operate in an execution environment 20401. In FIG. 22A, a topology communication component 20410*a* is illustrated. In FIG. 22B, a topology communication component 20410*b* is illustrated as a component of a t-service 20405*b*. A node 20502 may include a topology communication component 20410*a* and/or a topology communication component 20410*b*. A path node 20504 may also include an adaptation and/or an analog of a topology communication component.

With reference to FIG. 38, a block 202008 illustrates that the method includes receiving, in response to sending the at least a portion, a symbolic identifier that identifies the first node to the second node. Accordingly, a system for associating a name with a network path includes means for receiving, in response to sending the at least a portion, a symbolic identifier that identifies the first node to the second node. For example, the arrangement in FIG. 39, includes resolver component 202102 that is operable for and/or is otherwise included in receiving, in response to sending the at least a portion, a symbolic identifier that identifies the first node to the second node. The system for associating a name with a network path includes one or more processors and logic encoded in one or more computer readable media for execution by the one or more processors that when executed is operable for and/or is otherwise included in receiving, in response to sending the at least a portion, a symbolic identifier that identifies the first node to the second node.

FIGS. 22A-B illustrate resolver components 20402 as adaptations and/or analogs of the resolver component 201902 in FIG. 39. One or more resolver components 20402 operate in an execution environment 20401. In FIG. 22A, a resolver component 20402*a* is illustrated as a component of a t-space component 20404*a*. In FIG. 22B, a resolver component 20402*b* is illustrated as a component of a t-service 20405*b*. A node 20502 may include a resolver component 20402*a* and/or a resolver component 20402*b*. A path node 20504 may also include an adaptation and/or an analog of a resolver component.

Figure 40:
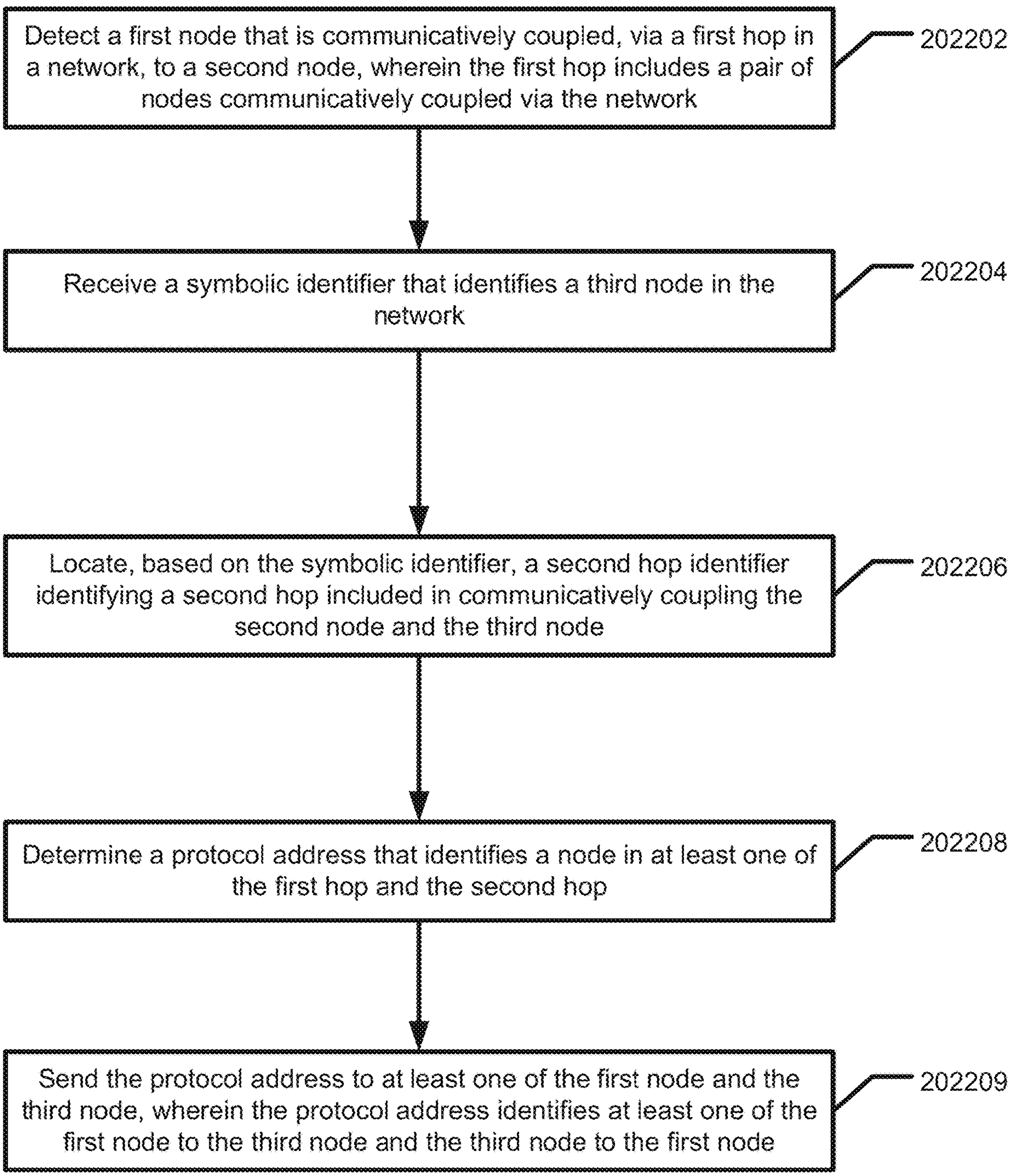
FIG. 40 is a flow diagram illustrating a method for associating a name with a network path according to an aspect of the subject matter described herein.
Figure 41:
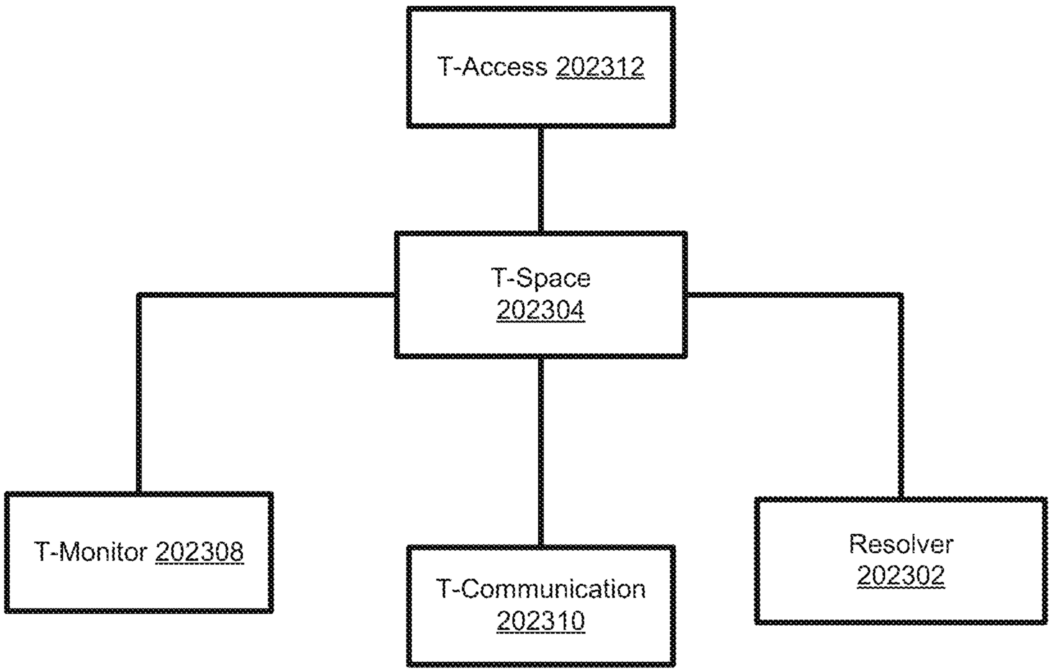
FIG. 41 is a block diagram illustrating an arrangement of components for associating a name with a network path according to another aspect of the subject matter described herein.

FIG. 41 illustrates an arrangement of components that may operate in an execution environment, such as execution environment 20102 in FIG. 19 to perform a method illustrated in FIG. 40. The system illustrated by the arrangement includes a topology monitor component 202308, a resolver component 202302, a topology access component 202312, a topology space component 202304, and a topology communication component 202310. A suitable execution environment includes a processor, such as processor 20104, to process an instruction in at least one of a topology monitor component, a resolver component, a topology access component, a topology space component, and a topology communication component. Those skilled in the art will understand that other execution environments in addition to the various adaptations, analogs, and instances of the execution environments described herein are suitable for hosting an adaptation of the arrangement in FIG. 40.

With reference to FIG. 40, a block 202202 illustrates that the method includes detecting a first node that is communicatively coupled, via a first hop in a network, to a second node, wherein the first hop includes a pair of nodes communicatively coupled via the network. Accordingly, a system for associating a name with a network path includes means for detecting a first node that is communicatively coupled, via a first hop in a network, to a second node, wherein the first hop includes a pair of nodes communicatively coupled via the network. For example, the arrangement in FIG. 41 includes topology monitor component 202308 that is operable for and/or is otherwise included in detecting a first node that is communicatively coupled, via a first hop in a network, to a second node, wherein the first hop includes a pair of nodes communicatively coupled via the network. The system for associating a name with a network path includes one or more processors and logic encoded in one or more computer readable media for execution by the one or more processors that when executed is operable for and/or is otherwise included in detecting a first node that is communicatively coupled, via a first hop in a network, to a second node, wherein the first hop includes a pair of nodes communicatively coupled via the network.

FIGS. 22A-B illustrate topology monitor components 20408 as adaptations and/or analogs of the topology monitor component 202108 in FIG. 41. One or more topology monitor components 20408 operate in an execution environment 20401. In FIG. 22A, a topology monitor component 20408*a* is illustrated as a component of a network layer component 20415*a*. In FIG. 22B, a monitor component 20408*b* is illustrated as a component of a t-service 20405*b*. A node 20502 may include a topology monitor component 20408*a* and/or a topology monitor component 20408*b*. A path node 20504 may also include an adaptation and/or an analog of a topology monitor component.

With reference to FIG. 40, a block 202204 illustrates that the method includes receiving a symbolic identifier that identifies a third node in the network. Accordingly, a system for associating a name with a network path includes means for receiving a symbolic identifier that identifies a third node in the network. For example, the arrangement in FIG. 41, includes resolver component 202302 that is operable for and/or is otherwise included in receiving a symbolic identifier that identifies a third node in the network. The system for associating a name with a network path includes one or more processors and logic encoded in one or more computer readable media for execution by the one or more processors that when executed is operable for and/or is otherwise included in receiving a symbolic identifier that identifies a third node in the network.

FIGS. 22A-B illustrate resolver components 20402 as adaptations and/or analogs of the resolver component 201902 in FIG. 41. One or more resolver components 20402 operate in an execution environment 20401. In FIG. 22A, a resolver component 20402*a* is illustrated as a component of a t-space component 20404*a*. In FIG. 22B, a resolver component 20402*b* is illustrated as a component of a t-service 20405*b*. A node 20502 may include a resolver component 20402*a* and/or a resolver component 20402*b*. A path node 20504 may also include an adaptation and/or an analog of a resolver component.

With reference to FIG. 40, a block 202206 illustrates that the method includes locating, based on the symbolic identifier, a second hop identifier identifying a second hop included in communicatively coupling the second node and the third node. Accordingly, a system for associating a name with a network path includes means for locating, based on the symbolic identifier, a second hop identifier identifying a second hop included in communicatively coupling the second node and the third node. For example, the arrangement in FIG. 41 includes topology access component 202312 that is operable for and/or is otherwise included in locating, based on the symbolic identifier, a second hop identifier identifying a second hop included in communicatively coupling the second node and the third node. The system for associating a name with a network path includes one or more processors and logic encoded in one or more computer readable media for execution by the one or more processors that when executed is operable for and/or is otherwise included in locating, based on the symbolic identifier, a second hop identifier identifying a second hop included in communicatively coupling the second node and the third node.

FIGS. 22A-B illustrate topology access components 20412 as adaptations and/or analogs of the topology access component 201912 in FIG. 41. One or more topology access components 20412 operate in an execution environment 20401. In FIG. 22A, a topology access component 20412*a* is illustrated. In FIG. 22B, a manager component 20412*b* is illustrated as a component of a t-service 20405*b*. A node 20502 may include a topology access component 20412*a* and/or a topology access component 20412*b*. A path node 20504 may also include an adaptation and/or an analog of a topology access component.

With reference to FIG. 40, a block 202208 illustrates that the method includes determining a protocol address that identifies a node in at least one of the first hop and the second hop. Accordingly, a system for associating a name with a network path includes means for determining a protocol address that identifies a node in at least one of the first hop and the second hop. For example, the arrangement in FIG. 41 includes topology space component 202304 that is operable for and/or is otherwise included in determining a protocol address that identifies a node in at least one of the first hop and the second hop. The system for associating a name with a network path includes one or more processors and logic encoded in one or more computer readable media for execution by the one or more processors that when executed is operable for and/or is otherwise included in determining a protocol address that identifies a node in at least one of the first hop and the second hop.

FIGS. 22A-B illustrate topology space components 20404 as adaptations and/or analogs of the topology space component 201904 in FIG. 41. One or more topology space components 20404 operate in an execution environment 20401. In FIG. 22A, a topology space component 20404*a* is illustrated. In FIG. 22B, a topology space component 20404*b* is illustrated as a component of a t-service 20405*b*. A node 20502 may include a topology space component 20404*a* and/or a topology space component 20404*b*. A path node 20504 may also include an adaptation and/or an analog of a topology space component.

With reference to FIG. 40, a block 202210 illustrates that the method includes sending the protocol address to at least one of the first node and the third node, wherein the protocol address identifies at least one of the first node to the third node and the third node to the first node. Accordingly, a system for associating a name with a network path includes means for sending the protocol address to at least one of the first node and the third node, wherein the protocol address identifies at least one of the first node to the third node and the third node to the first node. For example, the arrangement in FIG. 41, includes topology communication component 202310 that is operable for and/or is otherwise included in sending the protocol address to at least one of the first node and the third node, wherein the protocol address identifies at least one of the first node to the third node and the third node to the first node. The system for associating a name with a network path includes one or more processors and logic encoded in one or more computer readable media for execution by the one or more processors that when executed is operable for and/or is otherwise included in sending the protocol address to at least one of the first node and the third node, wherein the protocol address identifies at least one of the first node to the third node and the third node to the first node.

FIGS. 22A-B illustrate topology communication components 20410 as adaptations and/or analogs of the topology communication component 201910 in FIG. 41. One or more topology communication components 20410 operate in an execution environment 20401. In FIG. 22A, a topology communication component 20410*a* is illustrated. In FIG. 22B, a communication component 20410*b* is illustrated as a component of a t-service 20405*b*. A node 20502 may include a topology communication component 20410*a* and/or a topology communication component 20410*b*. A path node 20504 may also include an adaptation and/or an analog of a topology communication component.

Figure 42:
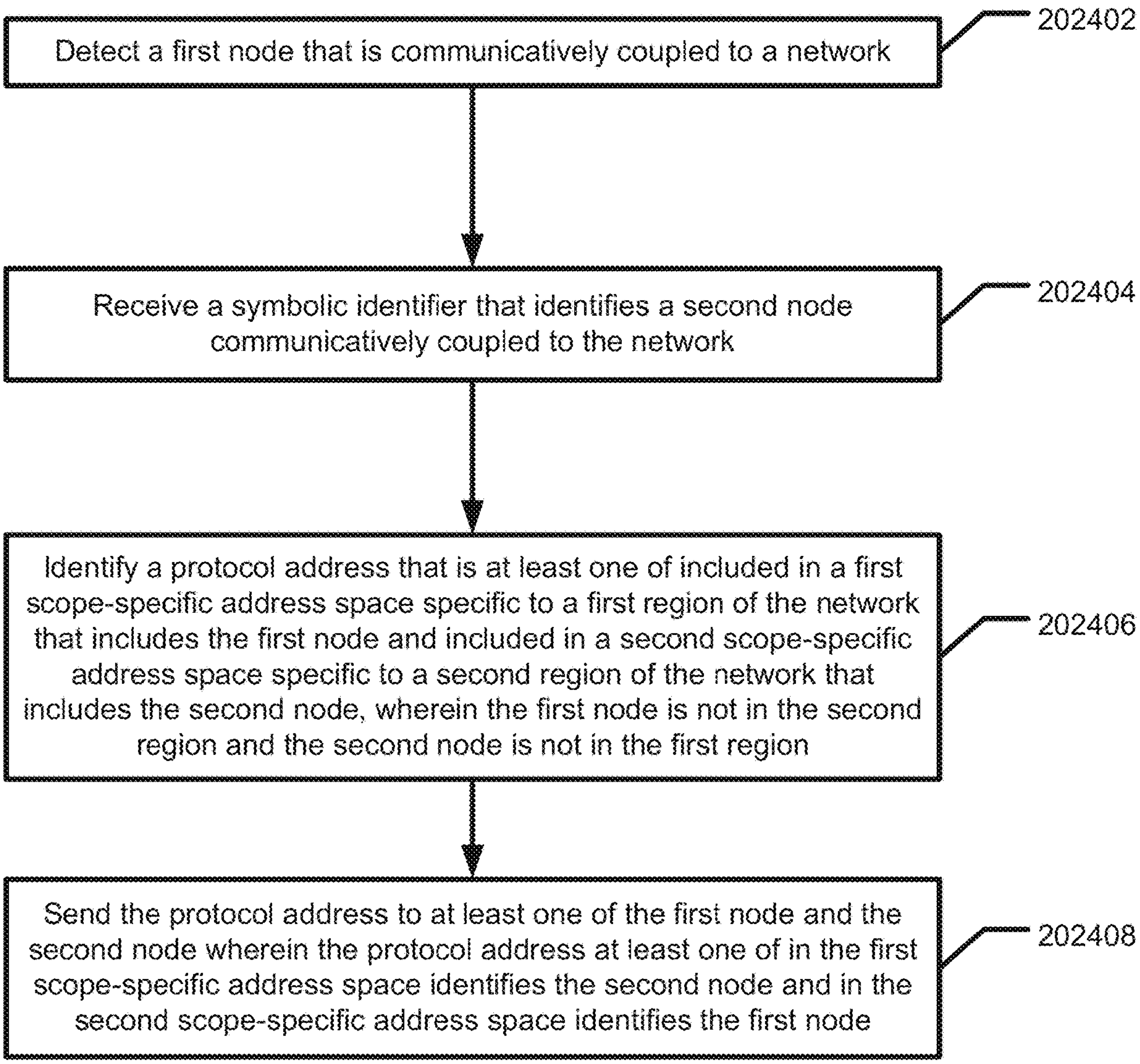
FIG. 42 is a flow diagram illustrating a method for associating a name with a network path according to an aspect of the subject matter described herein.
Figure 43:
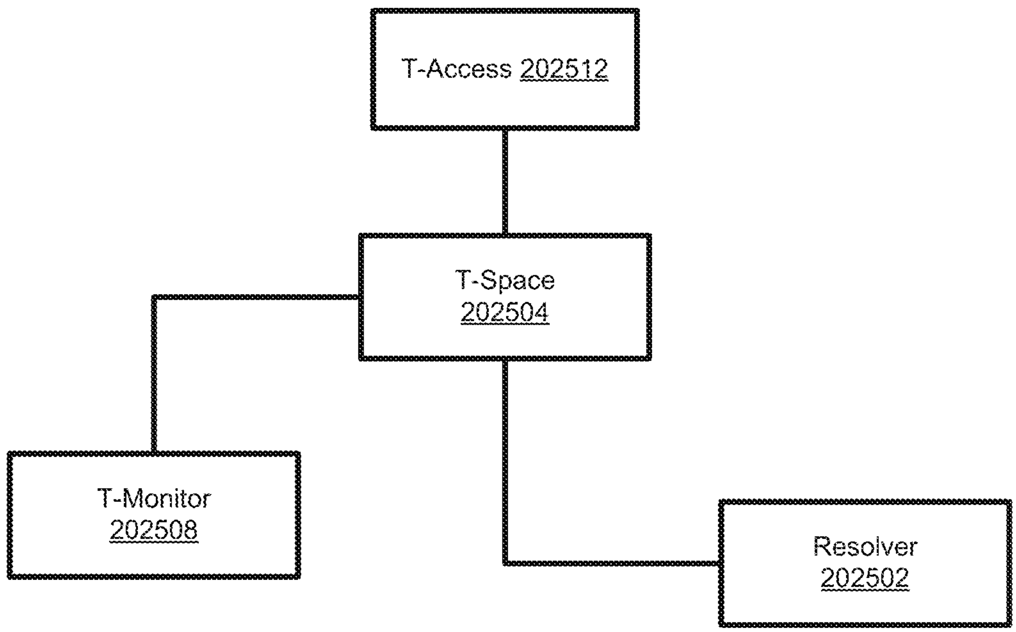
FIG. 43 is a block diagram illustrating an arrangement of components for associating a name with a network path according to another aspect of the subject matter described herein.

FIG. 43 illustrates an arrangement of components that may operate in an execution environment, such as execution environment 20102 in FIG. 19 to perform a method illustrated in FIG. 42. The system illustrated by the arrangement includes a topology monitor component 202508, a resolver component 202502, a topology access component 202512, and a topology space component 202504. A suitable execution environment includes a processor, such as processor 20104, to process an instruction in at least one of a topology monitor component, a resolver component, a topology access component, and a topology space component. Those skilled in the art will understand that other execution environments in addition to the various adaptations, analogs, and instances of the execution environments described herein are suitable for hosting an adaptation of the arrangement in FIG. 42.

With reference to FIG. 42, a block 202402 illustrates that the method includes detecting a first node that is communicatively coupled to a network. Accordingly, a system for associating a name with a network path includes means for detecting a first node that is communicatively coupled to a network. For example, the arrangement in FIG. 43 includes topology monitor component 202508 that is operable for and/or is otherwise included in detecting a first node that is communicatively coupled to a network. The system for associating a name with a network path includes one or more processors and logic encoded in one or more computer readable media for execution by the one or more processors that when executed is operable for and/or is otherwise included in detecting a first node that is communicatively coupled to a network.

FIGS. 22A-B illustrate topology monitor components 20408 as adaptations and/or analogs of the topology monitor component 202108 in FIG. 43. One or more topology monitor components 20408 operate in an execution environment 20401. In FIG. 22A, a topology monitor component 20408*a* is illustrated as a component of a network layer component 20415*a*. In FIG. 22B, a handler component 20408*b* is illustrated as a component of a t-service 20405*b*. A node 20502 may include a topology monitor component 20408*a* and/or a topology monitor component 20408*b*. A path node 20504 may also include an adaptation and/or an analog of a topology monitor component.

With reference to FIG. 42, a block 202404 illustrates that the method includes receiving a symbolic identifier that identifies a second node communicatively coupled to the network. Accordingly, a system for associating a name with a network path includes means for receiving a symbolic identifier that identifies a second node communicatively coupled to the network. For example, the arrangement in FIG. 43 includes resolver component 202502 that is operable for and/or is otherwise included in receiving a symbolic identifier that identifies a second node communicatively coupled to the network. The system for associating a name with a network path includes one or more processors and logic encoded in one or more computer readable media for execution by the one or more processors that when executed is operable for and/or is otherwise included in receiving a symbolic identifier that identifies a second node communicatively coupled to the network.

FIGS. 22A-B illustrate resolver components 20402 as adaptations and/or analogs of the resolver component 201902 in FIG. 43. One or more resolver components 20402 operate in an execution environment 20401 In FIG. 22A, a resolver component 20402*a* is illustrated as a component of a t-space component 20404*a*. In FIG. 22B, a resolver component 20402*b* is illustrated as a component of a t-service 20405*b*. A node 20502 may include a resolver component 20402*a* and/or a resolver component 20402*b*. A path node 20504 may also include an adaptation and/or an analog of a resolver component.

With reference to FIG. 42, a block 202406 illustrates that the method includes identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. Accordingly, a system for associating a name with a network path includes means for identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. For example, the arrangement in FIG. 43, includes topology access component 202512 that is operable for and/or is otherwise included in identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. The system for associating a name with a network path includes one or more processors and logic encoded in one or more computer readable media for execution by the one or more processors that when executed is operable for and/or is otherwise included in identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region.

FIGS. 22A-B illustrate topology access components 20412 as adaptations and/or analogs of the topology access component 201912 in FIG. 43. One or more topology access components 20412 operate in an execution environment 20401. In FIG. 22A, a topology access component 20412*a* is illustrated as a component of a network layer component 20415*a*. In FIG. 22B, a topology access component 20412*b* is illustrated as a component of a t-service 20405*b*. A node 20502 may include a topology access component 20412*a* and/or a topology access component 20412*b*. A path node 20504 may also include an adaptation and/or an analog of a topology access component.

With reference to FIG. 42, a block 202408 illustrates that the method includes sending the protocol address to at least one of the first node and the second node wherein the protocol address at least one of in the first scope-specific address space identifies the second node and in the second scope-specific address space identifies the first node. Accordingly, a system for associating a name with a network path includes means for sending the protocol address to at least one of the first node and the second node wherein the protocol address at least one of in the first scope-specific address space identifies the second node and in the second scope-specific address space identifies the first node. For example, the arrangement in FIG. 43, includes topology space component 202504 that is operable for and/or is otherwise included in sending the protocol address to at least one of the first node and the second node wherein the protocol address at least one of in the first scope-specific address space identifies the second node and in the second scope-specific address space identifies the first node. The system for associating a name with a network path includes one or more processors and logic encoded in one or more computer readable media for execution by the one or more processors that when executed is operable for and/or is otherwise included in sending the protocol address to at least one of the first node and the second node wherein the protocol address at least one of in the first scope-specific address space identifies the second node and in the second scope-specific address space identifies the first node.

FIGS. 22A-B illustrate topology space components 20404 as adaptations and/or analogs of the topology space component 201904 in FIG. 43. One or more topology space components 20404 operate in an execution environment 20401. In FIG. 22A, a topology space component 20404*a* is illustrated. In FIG. 22B, a topology space component 20404*b* is illustrated as a component of a t-service 20405*b*. A node 20502 may include a topology space component 20404*a* and/or a topology space component 20404*b*. A path node 20504 may also include an adaptation and/or an analog of a topology space component.

Figure 44:
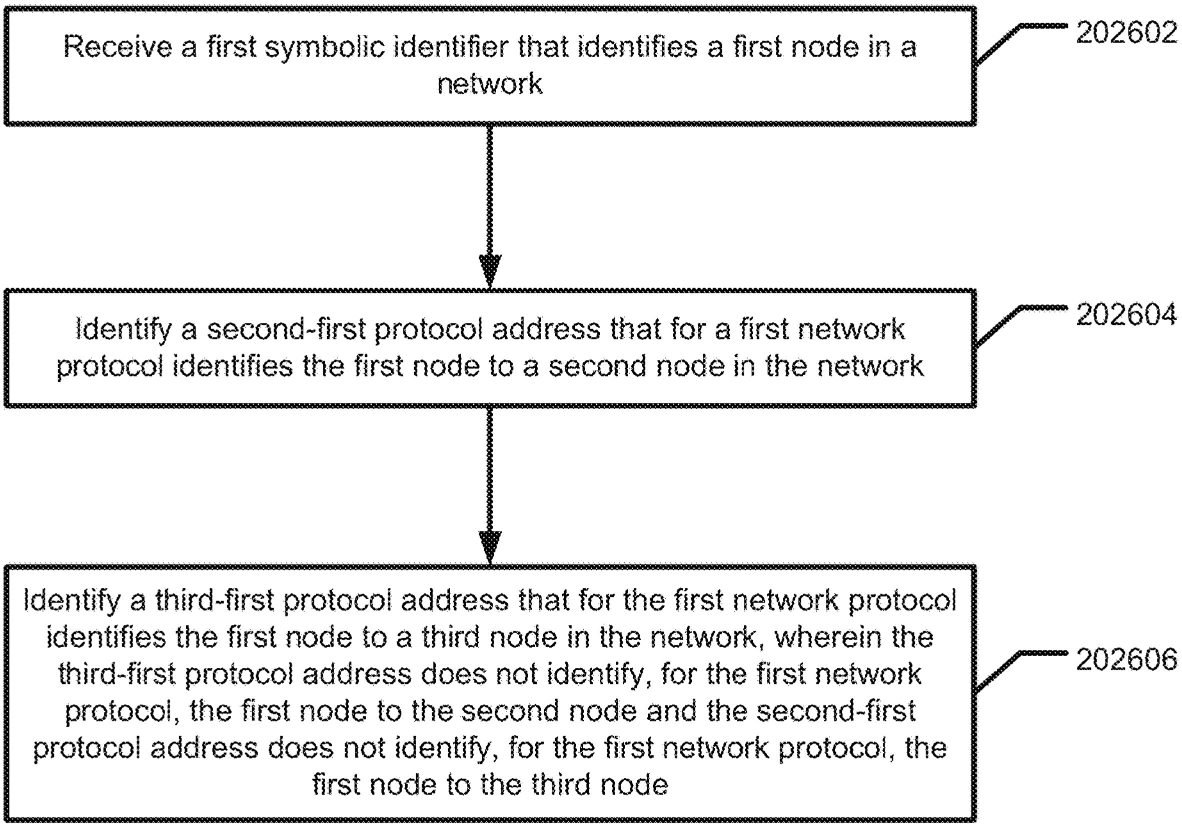
FIG. 44 is a flow diagram illustrating a method for associating a name with a network path according to an aspect of the subject matter described herein.
Figure 45:
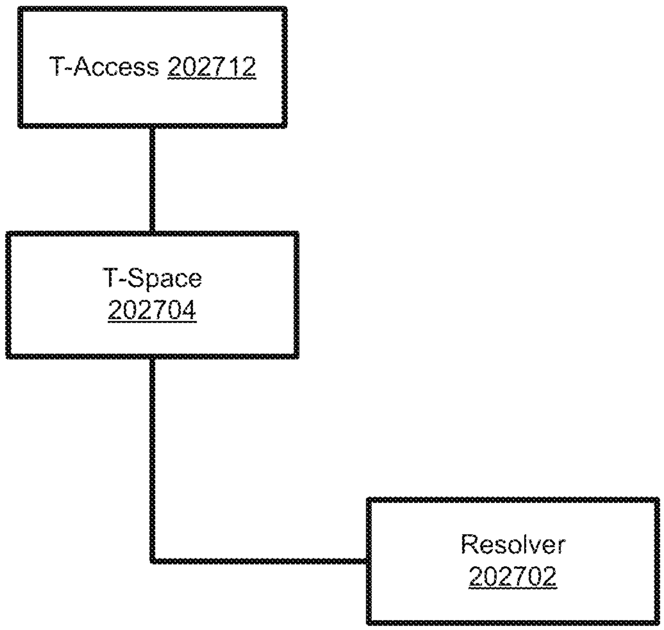
FIG. 45 is a block diagram illustrating an arrangement of components for associating a name with a network path according to another aspect of the subject matter described herein.

FIG. 45 illustrates an arrangement of components that may operate in an execution environment, such as execution environment 20102 in FIG. 19 to perform a method illustrated in FIG. 44. The system illustrated by the arrangement includes a resolver component 202702, a topology space component 202704, and a topology access component 202712. A suitable execution environment includes a processor, such as processor 20104, to process an instruction in at least one of a resolver component, a topology space component, and a topology access component. Those skilled in the art will understand that other execution environments in addition to the various adaptations, analogs, and instances of the execution environments described herein are suitable for hosting an adaptation of the arrangement in FIG. 44.

With reference to FIG. 44, a block 202602 illustrates that the method includes detecting a first node that is communicatively coupled to a network. Accordingly, a system for associating a name with a network path includes means for detecting a first node that is communicatively coupled to a network. For example, the arrangement in FIG. 45 includes resolver component 202702 that is operable for and/or is otherwise included in detecting a first node that is communicatively coupled to a network. The system for associating a name with a network path includes one or more processors and logic encoded in one or more computer readable media for execution by the one or more processors that when executed is operable for and/or is otherwise included in detecting a first node that is communicatively coupled to a network.

FIGS. 22A-B illustrate resolver components 20402 as adaptations and/or analogs of the resolver component 202702 in FIG. 45. One or more resolver components 20402 operate in an execution environment 20401. In FIG. 22A, a resolver component 20402*a* is illustrated as a component of a t-space component 20404*a*. In FIG. 22B, a resolver component 20402*b* is illustrated as a component of a t-service 20405*b*. A node 20502 may include a resolver component 20402*a* and/or a resolver component 20402*b*. A path node 20504 may also include an adaptation and/or an analog of a resolver component.

With reference to FIG. 44, a block 202604 illustrates that the method includes receiving a symbolic identifier that identifies a second node communicatively coupled to the network. Accordingly, a system for associating a name with a network path includes means for receiving a symbolic identifier that identifies a second node communicatively coupled to the network. For example, the arrangement in FIG. 45 includes topology space component 202704 that is operable for and/or is otherwise included in receiving a symbolic identifier that identifies a second node communicatively coupled to the network. The system for associating a name with a network path includes one or more processors and logic encoded in one or more computer readable media for execution by the one or more processors that when executed is operable for and/or is otherwise included in receiving a symbolic identifier that identifies a second node communicatively coupled to the network.

FIGS. 22A-B illustrate topology space components 20404 as adaptations and/or analogs of the topology space component 202704 in FIG. 45. One or more topology space components 20404 operate in an execution environment 20401 In FIG. 22A, a topology space component 20402*a* is illustrated. In FIG. 22B, a topology space component 20404*b* is illustrated as a component of a t-service 20405*b*. A node 20502 may include a topology space component 20404*a* and/or a topology space component 20404*b*. A path node 20504 may also include an adaptation and/or an analog of a topology space component.

With reference to FIG. 44, a block 202606 illustrates that the method includes identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. Accordingly, a system for associating a name with a network path includes means for identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. For example, the arrangement in FIG. 45, includes topology access component 202712 that is operable for and/or is otherwise included in identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. The system for associating a name with a network path includes one or more processors and logic encoded in one or more computer readable media for execution by the one or more processors that when executed is operable for and/or is otherwise included in identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region.

FIGS. 22A-B illustrate topology access components 20412 as adaptations and/or analogs of the topology access component 202712 in FIG. 45. One or more topology access components 20412 operate in an execution environment 20401. In FIG. 22A, a topology access component 20412*a* is illustrated. In FIG. 22B, a topology access component 20412*b* is illustrated as a component of a t-service 20405*b*. A node 20502 may include a topology access component 20412*a* and/or a topology access component 20412*b*. A path node 20504 may also include an adaptation and/or an analog of a topology access component.

In another aspect of the method illustrated in FIG. 20, the first-second protocol address may be in the first scope-specific address space, the second-first protocol address may be in a second-scope-specific address space specific to a second region that includes the second node, the second-third protocol address may be in the second scope-specific address space, and/or the third-second protocol address may be in the third scope-specific address space. One or more of the scope-specific address spaces may be node-specific address spaces specific to the respective one or more of the first node, the second node, and the third node.

A scope-specific address space may include identifiers that identify locations in a metric space that include a representation of a network topology of the network. The metric space may be a geometric space. In an aspect of the method illustrated in FIG. 20, the first-second protocol address may define relative to a first origin address that, in the first scope-specific address space, is defined to identify a first location of the first node and/or first region represented in a first metric space. The second-first protocol address may define relative to a second origin address that, in the second scope-specific address space, is defined to identify a second location of the second node and/or region represented in a second metric space.

Analogously, the second-third protocol address may be defined relative to a second origin address that, in the second scope-specific address space, is defined to identify a second location of the second node/region represented in a second metric space. The third-second protocol address may be defined relative to a third origin address that, in the third scope-specific address space, that is defined to identify a third location of the third node/region represented in a third metric space.

Still further, the first-third protocol address may be defined relative to a first origin address that, in the first scope-specific address space, is defined to identify a first location of the first region represented in a first metric space. The third-first protocol address may be defined relative to a third origin address that, in the third scope-specific address space, that is defined to identify a third location of the third node/region represented in a third metric space.

A metric space may be multi-dimensional. One or both of first scope-specific address space and the third scope-specific address space respectively include identifiers that identify locations in a multi-dimensional metric space. The locations may be defined with respect to axes that intersect defining an origin location. The first scope specific address space may include a first origin address that identifies a first origin location. An identifier, for a location in the metric space, in the first scope specific address space may be defined relative to the origin location. Analogous statements may be made for other scope specific address spaces, such as the third scope-specific address space and the second scope specific address space in aspects of the method illustrated in FIG. 20.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that operate to perform the functionality described herein and may be implemented in software, hardware, or a combination of the two. While at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a software component in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. By way of example, and not limitation, computer readable media may comprise computer storage media and communication media. Computer storage media includes volatile and nonvolatile, removable and non-removable media implemented in any method or technology for storage of information such as computer readable instructions, data structures, software components or other data. Computer storage media includes, but is not limited to, Random Access Memory (RAM), Read Only Memory (ROM); Electrically Erasable Programmable Read Only Memory (EEPROM); flash memory or other memory technology; portable computer diskette; Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by an execution environment.

Communication media typically embodies computer readable instructions, data structures, software components, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Thus, the subject matter described herein may be embodied in many different forms, and all such forms are contemplated to be within the scope of what is claimed. It will be understood that various details may be changed without departing from the scope of the claimed subject matter.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The use of "including", "comprising", "having", and variations thereof are meant to encompass the items listed thereafter and equivalents thereof as well as additional items and equivalents thereof. Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided to", "received from", "identified to", "interoperated" and similar terms and their variants.

As used herein, any reference to an entity "in" an association is equivalent to describing the entity as "included in and/or identified by" the association, unless explicitly indicated otherwise.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety. In case of conflict, the present disclosure, including definitions, will control. In addition, the materials, methods, and examples are illustrative only and not intended to be limiting.

An "operating environment" or "computing environment", as used herein, is an arrangement of hardware and, in some aspects, software that may be further modified, transformed, and/or otherwise configured to include and/or otherwise host an arrangement of components to perform a method of the subject matter described herein. An operating environment includes a processor to execute an instruction included in at least one component of such an arrangement. An operating environment includes and/or is otherwise provided by one or more devices. The operating environment is said to be the operating environment "of" the device and/or devices.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs).

The terms "network node" and "node" in this document both refer to a device having a network interface component (NIC) for operatively coupling the device to a network. Further, the terms "device" and "node" used herein refer to one or more devices and nodes, respectively, providing and/or otherwise included in an operating environment unless clearly indicated otherwise.

As used herein, the term "network protocol" refers to a set of rules and/or conventions that govern how nodes exchange information over a network. The set may define, for example, a convention and/or a data structure. A "data unit", as the term is used herein, is an entity specified according to a network protocol to transmit data between a pair of nodes in a network path to send the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node, and also defines a payload portion to include data to be delivered to the identified destination node. Various address types are specified defining a vocabulary for one or more address fields of an IP data unit. The terms "data unit", "frame", "data unit", and "packet" are used interchangeably herein. One or more data units of a first network protocol may transmit a "message" of a second network protocol. For example, one or more data units of the IP protocol may include a TCP message. In another example, one or more TCP data units may transmit a HTTP message. A message may be empty as may a payload of a data unit.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint of the network protocol when included in an address field of a data unit of the network protocol. For example, 192.168.1.1 is an IP protocol address represented in a human readable format that may be represented in an address field of a header of an IP packet (i.e. an IP data unit) to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

Since a protocol endpoint is accessible by way of a network via a network interface in a node, a protocol address may be processed to identify a node and may be processed to identify a network interface of the node. A network interface may include one or more NICs operatively coupled to a network.

The term "network path" as used herein refers to a sequence of nodes in a network that are communicatively coupled to transmit data in one or more data units of one or more network protocols between a pair of nodes in the network. A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

For a network protocol, the term "hop", as used herein, refers to a pair of consecutive nodes in a network path to transmit, via the network protocol, data sent from a source node to a destination node. A "hop path" is thus a sequence of hops in a network that respectively include a sequence of pairs of consecutive nodes included in transmitting data from a first path end node of the network path to a second path end node of the network path.

The term "path-based protocol address" as used herein refers to a protocol address for a network protocol that includes one or more path segment identifiers that identify one or more respective portions of a network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of network interface identifiers that identify a sequence of network interfaces in a network path. A "NIC-based protocol address" is a type of network-interface-based protocol address that includes a plurality of identifiers that identify a sequence of network interface components. A "hop-based protocol address" is a type path-based protocol address since a hop is a type of network path.

Given the above definitions, note that the terms "network path" and "hop" may be defined in terms of network interfaces. A "network path" and a "hop path" include a sequence of network interfaces in a network that are included in transmitting data between a pair of path end nodes in the network. A "hop" refers to at least part of a network path that includes a pair of consecutive network interfaces in a sequence of network interfaces in a network path. A "network path" is thus a sequence of hops in a network that respectively includes a sequence of pairs of consecutive network interfaces included in transmitting data from a first path end node of the network path to a second path end node of the network path.

The term "network topology" or "topology", for short, as used herein refers to a representation of protocol endpoints, network interfaces, and/or nodes in a network, and representations of communicative couplings between and/or among the protocol endpoints, network interfaces, and/or nodes in the network. A network may have different network topologies with respect to different network protocols and/or with respect to different attributes of a same network protocol. A network topology may represent physical communicative couplings between protocol endpoints, network interfaces, and/or nodes in the network. A network topology may represent logical couplings between protocol endpoints, network interfaces, and/or nodes of a particular network protocol or a particular type of network protocol.

As used herein, an "entity-specific address space" refers to an address space defined for a specific entity where the addresses in the address space operate as identifiers in the context of the entity. An address from an entity-specific address space is referred to herein as an "entity-specific address". An address is "entity-specific" in that what it identifies is based on the entity to which it is specific. An address may identify one entity in one address space specific to a particular entity and may identify a different entity in another address space specific to a different entity. Addresses in an entity-specific address space operate as identifiers in the context of an entity to which they are "specific" as defined by the specific association of the address space and the entity. Without knowledge of the entity to which an entity-specific address space is specific, what an address in the entity-specific address space identifies is indeterminate. The terms "entity-specific address" and "entity-specific identifier" are used interchangeably herein.

An entity-specific address may identify an entity included in the entity to which the address is specific. Such as an address is said to be a "scoped". An entity-specific address may identify an entity external to the entity to which the address is specific. Such as address is said to be "scope-specific". The fact that an address is entity-specific does not define a scope for the address.

A portion of a network is a type of entity. A type of entity-specific address space described herein is a scope-specific address space. As used herein, a "scope-specific address space", specific to a particular region of a network, is an address space defined for the particular network region, where an address in the scope-specific protocol address operates as an identifier, according to a network protocol, of a protocol endpoint in a node outside of the particular region when processed in the context of a node in the particular region. The region is indicated by the span of an indicated scope. The terms "region" and "zone" are used interchangeably herein. An address from a scope-specific address space is referred to herein as a "scope-specific protocol address". An address is "scope-specific" in that what protocol endpoint it identifies depends on the region to which it is specific. Another address having the exact same form and content may identify a different protocol endpoint when in an address space that is specific to another region. A protocol address in a scope-specific address space serves as an identifier in the context of a node in a region to which the scope-specific address space is "specific" as defined by an association of the address space and the region indicated by the scope. Without knowledge of the particular region to which a scope-specific address space is specific, what a scope-specific protocol address in the scope-specific address space identifies is indeterminate. The terms "scope-specific protocol address" and "scope-specific protocol identifier" are used interchangeably herein. Types of scope-specific address spaces indicating exemplary spans include site-specific, LAN-specific, subnet-specific, city-specific, business-specific, and node-specific.

For a network protocol, an address in a scope-specific address space serves as an identifier of a protocol endpoint in a node. Data may be received via the protocol endpoint from a network via one or more network interfaces that operatively couple the node to the network. Data may be sent via the protocol endpoint to transmit over the network via the one or more network interfaces in the node. Since a protocol endpoint of a network protocol is included in a node and is accessible via a network via a network interface, a protocol address identifying the protocol endpoint also identifies the node and identifies a network interface of the node.

As used herein, a "node-specific address space" is a scope-specific address space defined for a specific node in a network, where the addresses in the node-specific address space operate as identifiers of nodes and/or network interfaces in the network when processed in the context of the specific node. An address from a node-specific address space is referred to herein as a "node-specific address". An address is "node-specific" in that what it identifies depends on the node to which is defined as specific. Another address having the exact same form and content may identify a different node when in an address space specific to another node. Addresses in a node-specific address space operate as identifiers in the context of a node to which they are "specific" as defined by the specific association of the address space and the node. Without knowledge of the node to which a node-specific address space is specific, addresses in the node-specific address space are indeterminate. The terms "node-specific address" and "node-specific identifier" are used interchangeably herein. A node-specific address space is a type of scope-specific address space.

The term "node" is defined above. Note that an identifier of a network interface in a network also identifies a node that includes the network interface. Thus, a network interface-specific address is also a node-specific address. Network interfaces in a node may have their own respective network interface-specific address spaces that are also node-specific. The network interface-specific address spaces may be combined to form a node-specific address space and/or may be managed as separate address spaces. The adjectives "node-specific" and "network interface-specific" may be used interchangeably.

A scope-specific identifier differs from a scoped address. Scoped addresses are described in RFC 3007, RFC 3513, and further described in application Ser. No. 11/962,285, by the present inventor, filed on 2007 Dec. 21, entitled "Methods and Systems for Sending Information to a Zone Included in an Internet Network". A scoped address space is shared by nodes in a given scope. While a link-local scoped address is specific to a particular node, a link-local scoped address simply identifies a network interface component local to the particular node. A loop-back internet address is specific to a node as well. Neither link-local scoped addresses nor loop-back addresses identify one node to another. As such, neither serves as a node-specific identifier as defined above.

A "scoped address" is described by RFC 3513 and RFC 3007 as an identifier that, in a particular region of a network, serves as a protocol address of a network interface and/or a node in the particular region. The extent of the particular region is referred to as the scope of the region and thus the scope within which the identifier serves as a protocol address. A particular region included within a scope is indicated by its span. A scoped address is a valid protocol address only within a particular region as indicated by the address's indicated scope. Examples of scope indicators include node-scope where identifiers are valid only to a single node in the indicated span, LAN-scope where identifiers are valid for nodes in the span of a particular LAN, and subnet-scope where identifiers are valid only for nodes in a particular subnet. RFC 3513 currently defines support for link-local scope, site-local scope, and global scope. A data unit transmitted with a scoped address should not be delivered to node that does not have a network interface in the span indicated by the scope.

"Path information" is any information that identifies a network path, such as a hop path, for data transmitted via one or more specified network protocols. Path information may be identified by identifying network interfaces, NICs, nodes, and/or hops included in a network path. "Address information" is any information that identifies a protocol address that, for a network protocol, identifies a protocol endpoint. Address information may identify a unicast protocol address for a network protocol. In identifying a protocol endpoint, a protocol address identifies a node and a network interface.

Those skilled in the art will understand upon reading the descriptions herein that the subject matter disclosed herein is not restricted to the network protocols described and/or their corresponding OSI layers. For ease of illustration, the subject matter is described in terms of protocols that correspond to OSI layer three, also referred to as network layer protocols, in general. Particular descriptions are based on versions of the Internet Protocol (IP). Address information may identify one or more protocol addresses. Exemplary protocol addresses include IP addresses, IPX addresses, DECNet addresses, VINES Internet Protocol addresses, and Datagram Delivery Protocol (DDP) addresses, HTTP URLS, TCP port and IP address pairs, and the like.

The term "metric space", as used herein, refers to a set, as defined in mathematics, where a distance between elements of the set is defined according to a metric. Metric spaces defined in Euclidean geometry are well-known examples. Those skilled in the art of metric spaces, such as Euclidian spaces, will appreciate that a one-to-one mapping may be determined and/or otherwise identified for mapping addresses from a first coordinate space having a first origin for a metric space to addresses from a second coordinate space having a second origin in the metric space. Given a mapping rule between a first scope-specific address space and a second scope-specific address space and a mapping between the second scope-specific address space and a third scope-specific address space based on a third coordinate space identifying a third origin in the metric space, a mapping from the first coordinate space to the third coordinate space may be determined. A mapping between coordinate spaces for a metric space may be include, for example, coordinate shift and/or a rotation, for example. The mapping may be pre-specified and accessible to the nodes in one or both address spaces. Mapping between locations in a number of different metric spaces is well known in mathematics. For example, a top half of the surface of sphere may be mapped to a plane. Some will further appreciate that some metric spaces may be mapped to other metric spaces. Some of these mappings are one-to-one and/or onto.

As used herein, the term "software component" refers to any data representation that includes and/or may be translated to include one or more instructions executable by a processor. A software component may optionally include associated data that does not represent an instruction executable by a processor.

Methods, Systems, and Operation:

Some components, illustrated in the drawings are identified by numbers with an alphanumeric suffix. A component may be referred to generically in the singular or the plural by dropping a suffix of a portion thereof of the component's identifier.

Figure 46A:
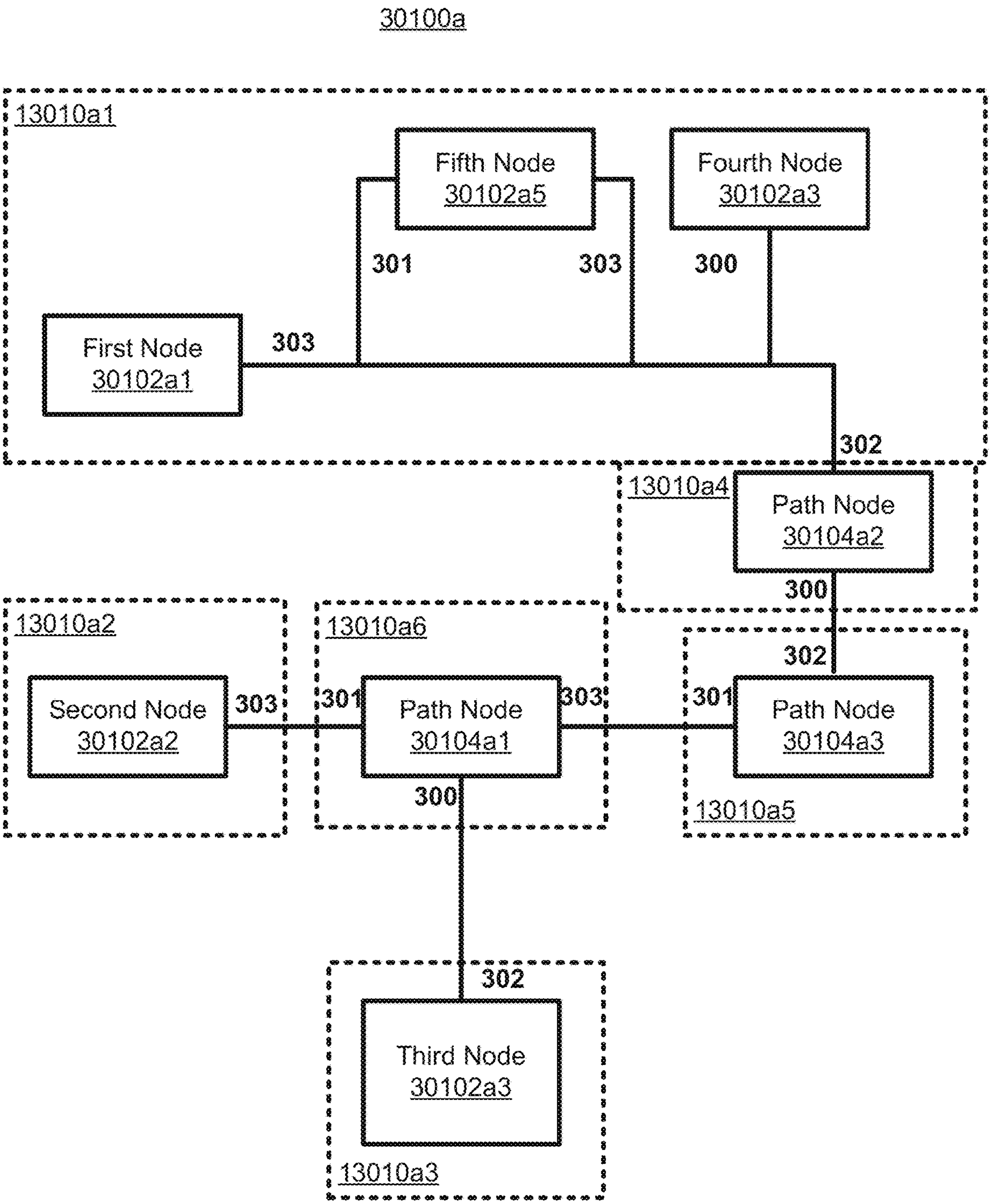
FIG. 46A is a network diagram illustrating an exemplary system for transmitting data via a variable length protocol address according to an aspect of the subject matter described herein.
Figure 46B:
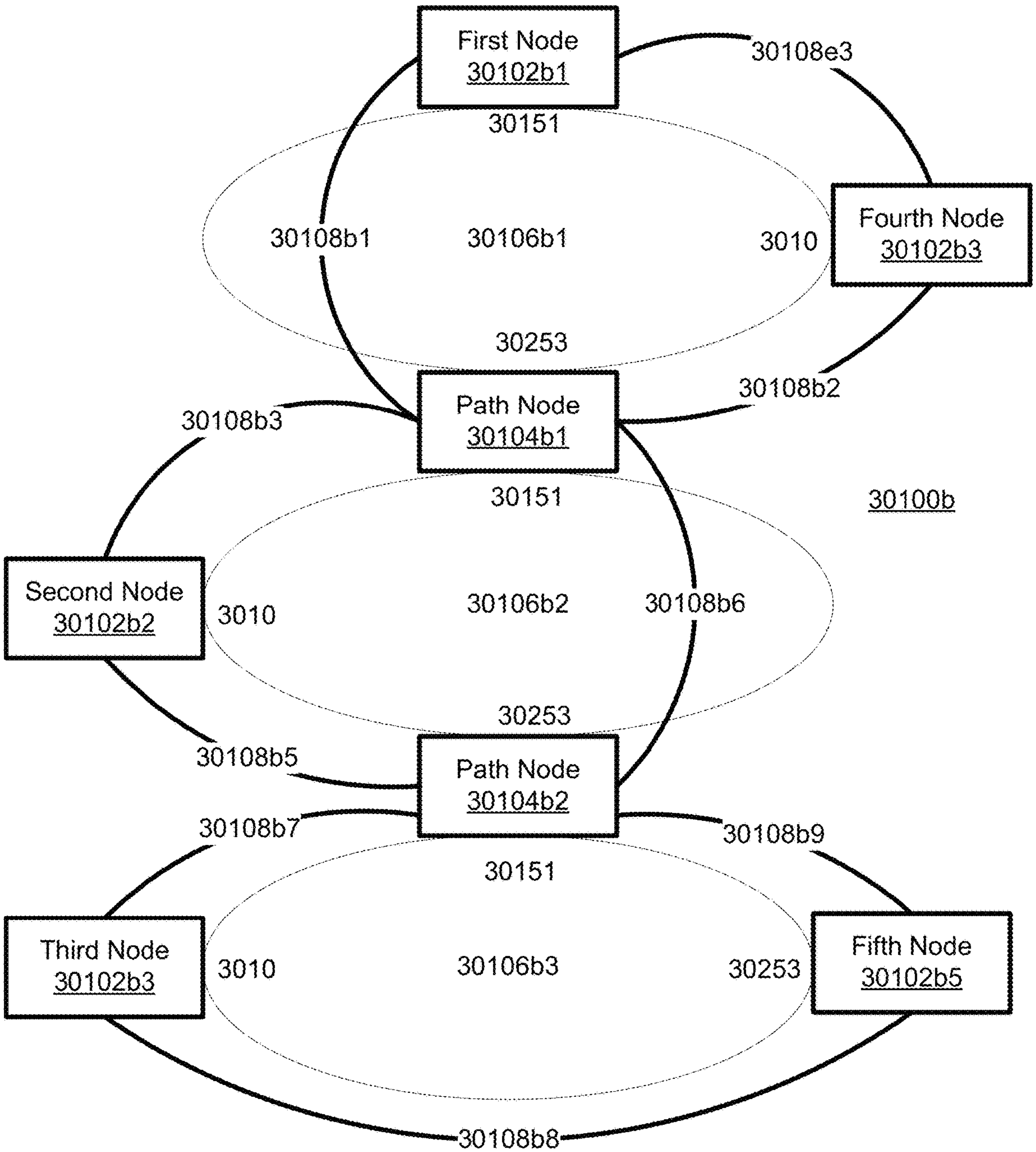
FIG. 46B is a network diagram illustrating an exemplary system for transmitting data via a variable length protocol address according to another aspect of the subject matter described herein.
Figure 46C:
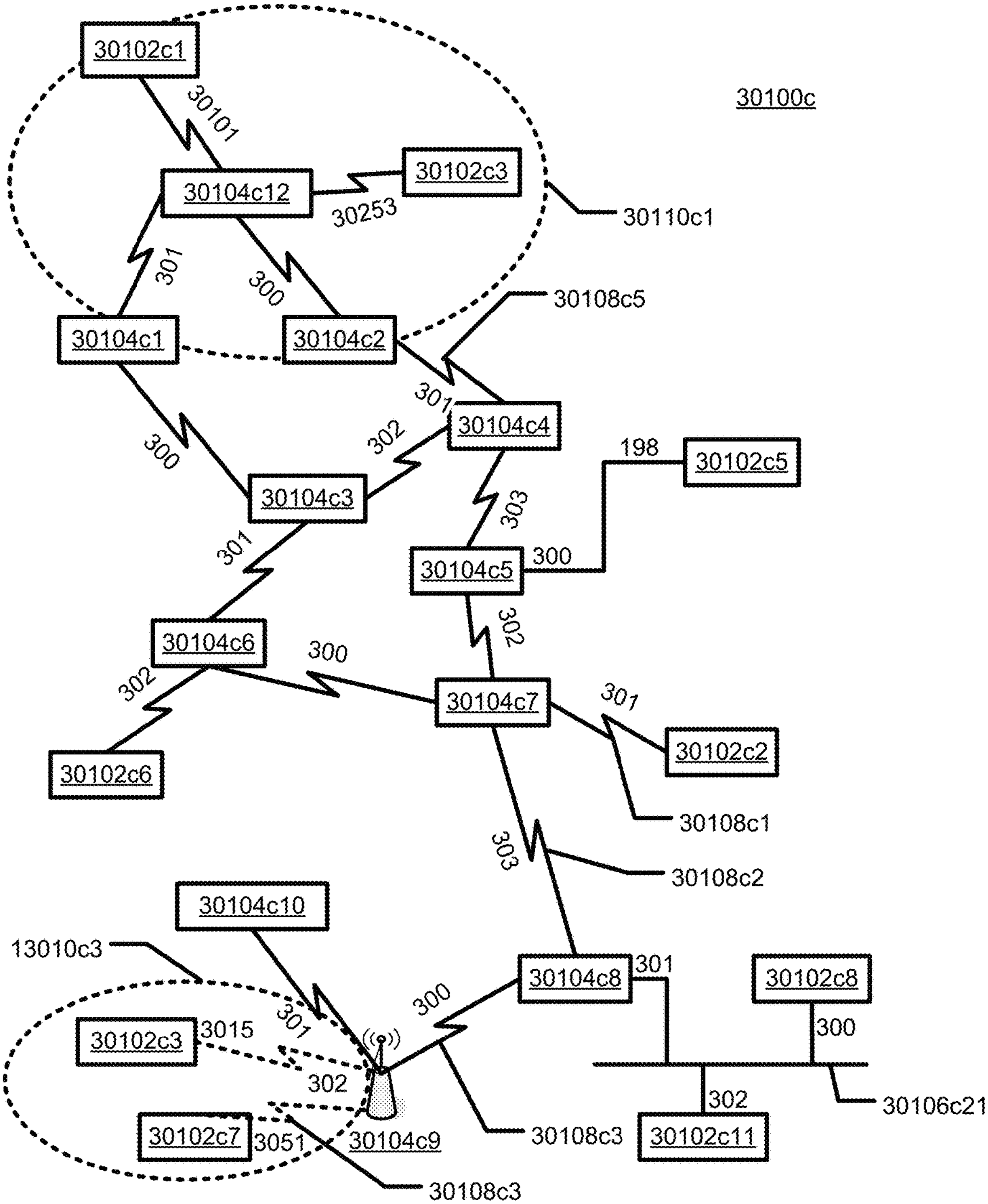
FIG. 46C is a network diagram illustrating an exemplary system for transmitting data via a variable length protocol address according to another aspect of the subject matter described herein.

FIGS. 46A-C show systems 30100 in accordance with various embodiments. As illustrated a system 30100 may include one or more networks. In the context of a system 30100, the network(s) may each take any form including, but not limited to a local area network (LAN), a wireless network, a wide area network (WAN) such as the Internet, a peer-to-peer network, etc. Nodes in a system 30100 in various aspects may include adaptations, analogs, and instances of the operating environments, illustrated in the drawings. The various illustrated nodes are operatively coupled via network interface components to the respective networks in FIGS. 46A-C. While any node may perform the various methods described and illustrated in the present disclosure, for ease of illustration, each of FIGS. 46A-C includes end nodes 30102 and path nodes 30104 for describing adaptations of the various arrangements for performing different aspects of the methods described herein. An operating environment may be described as being included in and/or operating in a node in describing some aspects of the various methods of the present disclosure. In describing other aspects, a node may be described as including and/or otherwise providing an operating environment. Nodes, such as path nodes 30104, in FIGS. 46A-C are described in terms of one or more roles they may play in interoperating with one or more end nodes 30102. Exemplary path nodes 30104 include a router, a gateway, a switch, a virtual private network concentrator, a modem, a wireless access point, a bridge, a hub, a repeater, a firewall, a proxy server, an application for relaying messages, and the like.

Figure 47:
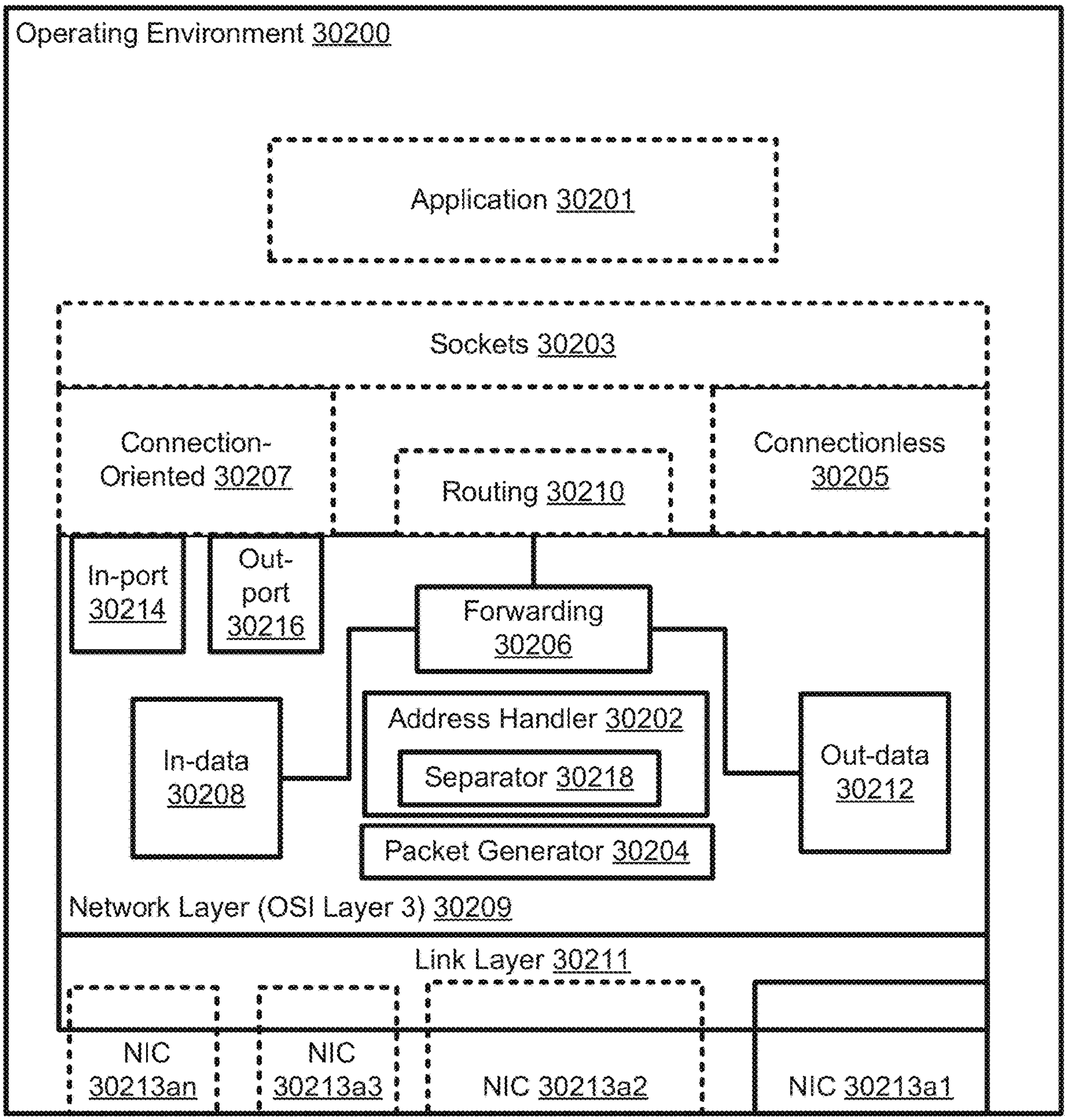
FIG. 47 is a block diagram illustrating an operating environment that may include logic for performing one or more of the methods described herein.

FIG. 47 illustrates an operating environment 30200 that may be include and/or otherwise maybe provided by an end node 30102 in some aspects. Operating environment 30200 may host a program, illustrated by an application 30201 that sends and/or receives data via a network stack. A network stack in FIG. 47 may be structured according to a layered architecture or model. FIG. 47 illustrates components that may be included in a network stack having a layered structure. Some components illustrated in the network stack correspond to components of the layered architecture specified by the Open System Interconnection (OSI) model, known to those skilled in the art. For example, a network stack may comply with the specifications for protocols included in the TCP/IP protocol suite. The OSI model specifies a seven-layer stack. The TCP/IP protocol suite may be mapped to layers three and four of the seven layers. Those skilled in the art will understand that fewer or more layers may be included in various adaptations, analogs, and/or instances of operating environment 30200 illustrated in FIG. 47, and in aspects described herein as well as other operating environments suitable for hosting logic for performing the methods described herein.

An application, such as an application 30201 operating in an operating environment 30200 of a node 30102, may exchange data with another node 30102 by interoperating with one or more components of a corresponding network stack. In FIG. 47, the application 30201 may interoperate with a sockets component 30203 to access a protocol endpoint of a network protocol, via a socket, to send data via one or more data units to and/or to receive data via a one or more data units from another node 30102. The application may specify an attribute of a protocol to the sockets component 30203 to open a specified type of protocol endpoint of a network protocol supporting the specified attribute.

FIG. 47 illustrates a sockets component 30203 operatively coupled to a connectionless component 30205 supporting an unreliable transport layer protocol where delivery of data is not guaranteed and a connection-oriented component 30208 configured to support a reliable transport layer protocol designed to guarantee data delivery or to otherwise notify the application of a delivery failure. The user datagram protocol (UDP) in the TCP/IP protocol suite is currently the most widely used connectionless transport layer protocol. The most widely used connection-oriented transport layer protocol currently in use is the transmission control protocol (the TCP) also included in the TCP/IP protocol suite.

Transport layer protocols supported by connectionless component 30205 and by connection-oriented component 30207 generate transport layer data units to include data received from an operatively coupled application to deliver the data via the data units according to a network layer protocol to a transport layer protocol endpoint in another node 30102. Analogously, data sent via an application in another node via a transport layer component may be received according to the network layer protocol by a compatible transport layer component, such as a connection-oriented component 30208 and/or by a connectionless component 30205, to deliver via a socket to an application operating in an operating environment 30200 in the receiving other node 30102.

FIG. 47 illustrates a network layer component 30209 that delivers data according to a network layer protocol from a source node to a destination node across a link, a LAN, a WAN, and/or an internet, such as the Internet and/or an intranet. A network layer protocol is designed and configured to deliver data across one or more communication links and/or networks between nodes in a network or internet. In FIG. 47, a network layer component 30209 may receive a transport layer data unit from a connection-oriented component 30207 or a connectionless component 30205, or data from another component in operating environment 30200. The network layer component 30209 may format and/or otherwise package the data in network layer data units. The data units may be sent, via a linker layer protocol, to a next node in a network path to a destination node.

One or more link layer protocols may be included in communicatively coupling a source node 30102 and a destination node 30102 via a network path that includes one or more path nodes 30104 as illustrated in FIGS. 46A-C. In FIG. 47, a network layer component 30209 may provide a network layer data unit as data (i.e. a message) to a component supporting a link layer protocol compatible with exchanging data via a physical data transmission medium coupled to a NIC. A link layer component 30211, in FIG. 47, illustrates a component in operating environment 30200 supporting a link layer protocol. Exemplary link layer protocols include Ethernet, Token-ring, and asynchronous transfer mode (ATM), to name a few. Some or all of a link layer component 30211 may be included in a NIC, as illustrated in FIG. 47 by a NIC 30211. A portion of a link layer component may be external to an operatively coupled NIC. The external portion may be realized, at least in part, as a device driver for the NIC. Exemplary physical data transmission media include Ethernet cables of various types, co-axial cable, and fiber optic cable, and various media suitable for carrying various types of wireless signals.

For ease of illustration, the description herein focuses on IP networks and protocols in the TCP/IP suite due to their wide use and because they are well-known in the art. Those skilled in the art will understand that the scope of the subject matter described is not limited to IP networks. For example, link layer protocols and networks are considered to be within the scope of the subject matter of this disclosure.

With respect to FIG. 47, a link layer component 30211 may receive a network layer data unit for a network layer component 30209. The network layer data unit may be formatted as one or more IP protocol packets from the network layer component 30209 supporting the Internet Protocol (IP). The link layer component 30211 packages IP packets from network layer component 30209 according to the particular link layer protocol supported. The link layer component 30211 may include a network layer data unit in one or more link layer data units. Analogously, the link layer component 30211 interprets data, received as signals transmitted by the physical medium operatively coupled to the NIC 30213, according to a particular link layer protocol supported to receive network layer data units in one or more link layer data units. The link layer component 30211 may strip off link layer specific data and transfer the payload of the link layer data units to the network layer component 30209 to process the included network layer data unit.

A network layer component 30209 operating in a node 30102 may communicate with one or more nodes 30102 over a LAN, a link, and/or a network of networks such as an intranet or the Internet. A network layer component 30209 in the node 30102 may receive transport layer data units, for example, formatted as TCP packets from a connection-oriented layer component 30207 and/or transport layer data units formatted as UDP packets from a connectionless component 30205 illustrated in FIG. 47. The network layer component 30209 packages transport layer data units from the connection-oriented component 30207 and/or the transport layer data units from the connectionless component 30205 into network layer data units, such as IP packets, to transmit across a network 30100 operatively coupled to the node. The network 30100 may be and/or may include an internet.

Analogously, the network layer component 30209 interprets data, received from a link layer component 30211 in the node 30102, as IP protocol data and detects IP packets in the received data. The network layer component 30209 may strip off IP layer specific data and transfer the payload of one or more IP packets to the connection-oriented layer component 30207 and/or to the connectionless component 30205 to process as transport layer data units according to a particular transport layer protocol.

As described above, FIG. 47 illustrates a network stack that sends and receives data over a network, such as networks 30100 illustrated in FIGS. 46A-C, via a network interface component, such as a NIC 30213. For example, a networking application 30201 in FIG. 47 operating in a first node 30102 may interoperate with another application operating in a second node 30102 via their respective network stacks.

In transmitting data from a source protocol endpoint in a source node 30102 to a destination protocol interface in a destination node 30102, the data is processed by a sequence of nodes in a network path that communicatively couples the source node 30102 and the destination node 30102. A node in the network path that is currently processing the data to send it to the destination 30102, is referred to herein as a "current node" with respect to the data or more precisely referred to as a "current path node" when the current node is a path node. A node in the network path that has previously transmitted the data being processed by the current node is referred to herein as a "previous node". A node in the network path that has not received the data being processed by the current node is referred to herein as a "next node". For ease of description, "data" refers to data sent in a data unit via a protocol endpoint in the source node being processed by a path node, current to the data, for transmitting to a next node in a network path to an identified destination node. As such, a source node 30102 may be a one of a current node and a previous node with respect to particular data. A path node 30104 may be one of a current node, a previous node, and a next node with respect to particular data. A destination node 30102 may be one or a next node and a current node with respect to particular data.

In another aspect, a path node 30104 may include and/or otherwise may be included in an operating environment 30200 including at least a some of the component illustrated in FIG. 47 for relaying data units of a network protocol. Data communicated between a source node 30102 and a destination node 30102 may be received by a path node 30104 via of a NIC 30213 operatively coupling the path node 30104 to a previous network path including the source node 30102 and the path node 30104 as path end nodes. One or more link layer protocol data units may be detected by a link layer component 30211 according to a compatible link layer protocol. For example, Ethernet frames may be detected as link layer protocol data units when received via a CAT 6 Ethernet cable. Data in a received link layer protocol data unit may be provided to a network layer component 30209 according to the specification of a particular network layer protocol, such as the IP.

A network interface in a path node 30104 may receive data communicated from a source node 30102 via a previous network path included in a network in a system 30100. One or more network paths may exist for receiving the data. A source node 30102 may be and/or otherwise may include a desktop PC, a notebook, a server, or a handheld computing device serving as a gateway, bridge, or other network relay device.

A path node 30104 may be configured for receiving data from a source node 30102 and for transmitting the received data to a destination node 30102 via a specified network protocol. For example, a path node 30104 may receive and transmit a data unit at a link layer as performed by an Ethernet bridge and a multiple protocol labeling switch (MPLS). Further, a path node 30104 may receive and transmit a data unit at a network layer as performed by an Internet protocol (IP) router. Still further, a path node 30104 may receive and transmit a data unit at an application layer, as defined above.

Accordingly, data from a source node 30102 may be included in and/or may include data formatted according a link layer protocol, a network layer protocol, and/or an application layer protocol. In-data logic may be configured according to a network layer protocol, a link layer protocol, and/or an application layer protocol.

In addition to the protocols described above, protocols corresponding to layers in the OSI model above the transport layer may be included in communicating via a network. The term "application protocol" as used herein refers to any protocol or combination of protocols that correspond to one or more layers in the OSI reference model above the transport layer. Programs and executables operating in operating environment 30200 may communicate via one or more application protocols. Exemplary application protocols include a hypertext transfer protocol (HTTP), various remote procedure call (RPC) protocols, various instant messaging protocol, email protocols, and various presence protocols.

Data exchanged between nodes in a network 30100, in FIGS. 46A-C, may be exchanged via data units of one or more protocols. Each layer of a network stack may provide a layer specific protocol component. Some protocols, combine services from multiple layers of the OSI model into a single layer such as the Systems Network Architecture (SNA) protocol. Still others may take a hybrid approach. With the advent of software defined networking and flexible protocols such as OpenFlow, new protocols and variations of existing protocols are being introduced and will be introduced that are within the scope of the subject matter of the present disclosure.

A network protocol is defined by one or more formatting rules and/or a vocabulary referred to as a schema. The schema defines valid data units to exchange between and/or among protocol endpoints defined by the respective network protocol. A network protocol also specifies and/or otherwise is compatible with one or more address spaces for identifying protocol endpoints for exchanging data. The terms "identifier space" and "address space" are used interchangeably herein. For example, various versions of hypertext transfer protocol (HTTP) specify a format for HTTP uniform resource locators (URL). HTTP specifies a location in a HTTP header that identifies a URL as an identifier or address from the HTTP address space that identifies both a resource and recipient of a HTTP data unit. The transmission control protocol (TCP) specifies a format and vocabulary for a TCP header including a destination protocol endpoint field for including what the TCP refers to as a destination port number that, when combined with a destination protocol address from an IP packet, identifies a transport layer protocol endpoint of a receiver of data included in a TCP data unit. A sending endpoint is similarly identified by a source port number included in a source protocol endpoint field of a TCP data unit and a source protocol address from an IP data unit.

Other exemplary address spaces that identify protocol endpoints in various protocols include an email address space identifying a protocol endpoint for the simple mail transfer protocol (SMTP), a telephone number address space for various telephony protocols, instant message address spaces for various instant message protocols, and media access control (MAC) addresses for various link layer protocols, to name just a few examples.

In delivering data across a network between protocol endpoints, addresses from address spaces of the various protocols at the various layers may be translated and/or otherwise mapped between the various layers of a network stack. For example, a unicast IP address in an IP packet may be mapped to link layer addresses for the various links the IP packet is transported across in a network path via a path node 30104 between a source node 30102 sending the data via the IP protocol and a destination node 30102 receiving the data. Addresses at the various layers are assigned from a suitable address space of network protocols of the respective layers.

Since addresses from address spaces at various layers of a network stack are often not suited for remembering and/or identifying by users, an address space of symbolic identifiers or names may be used to provide aliases for addresses in an address space identifying protocol endpoints corresponding to a protocol supported by a layer of a network stack. The domain name space is a well-known identifier space of names for identifying nodes and/or network interfaces as protocol endpoints of the IP protocol in the Internet, private internets, and intranets.

Figure 48:
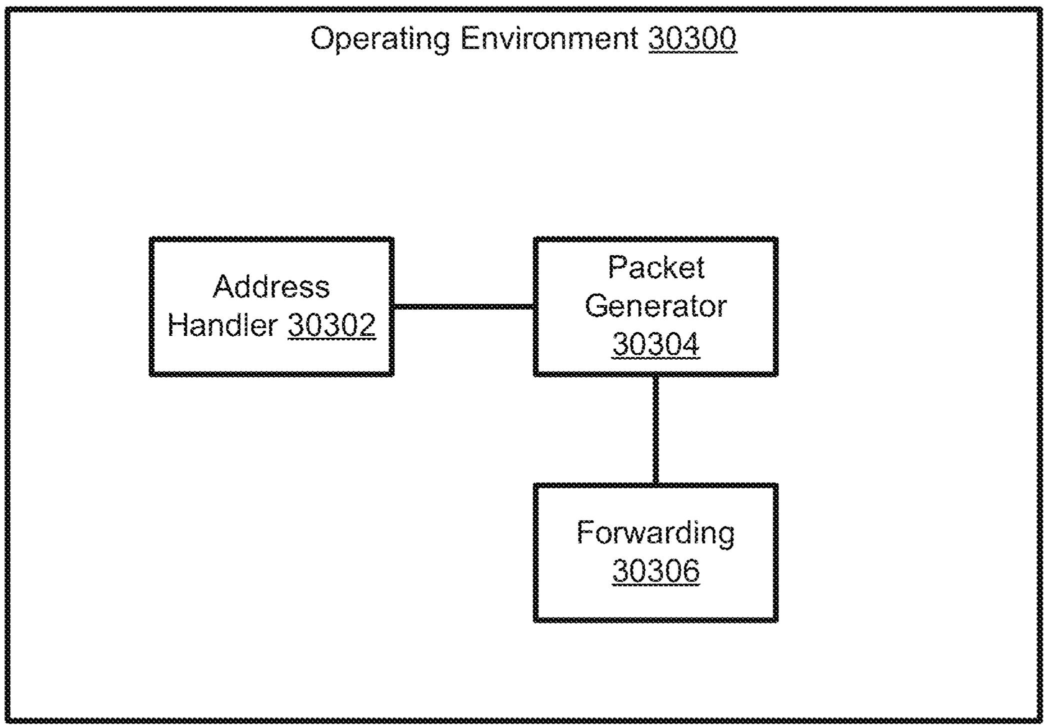
FIG. 48 is a block diagram illustrating an operating environment that includes logic for performing the method illustrated in FIG. 49 according to another aspect of the subject matter described herein.

FIG. 48 shows another representative operating environment 30300 that may be associated with nodes of FIGS. 46A-C, in accordance with one embodiment. As shown, the operating environment 30300 may include logic 30302 that is executed in receiving a first protocol address that identifies a destination protocol endpoint of a network protocol and executed in receiving a second protocol address that identifies a destination protocol endpoint of the network protocol, logic 30304 that is executed in storing the first protocol address in a first address field of a first data unit of the network protocol, wherein the first protocol address has a first length when stored in the first address field and the first address field is defined by the network protocol, logic 30306 that is executed in storing the second protocol address in a second address field of a second data unit of the network protocol, wherein the second protocol address has a second length when stored in the second address field and the second address field is defined by the network protocol, logic 30308 that is executed in sending data in a first payload of the first data unit via a network for delivery to a destination node that includes the destination protocol endpoint identified by the first protocol address, and logic 30310 that is executed in sending data in a second payload of the second data unit via network for delivery to a destination node that includes the second destination protocol endpoint identified by the second protocol address.

Figure 49:
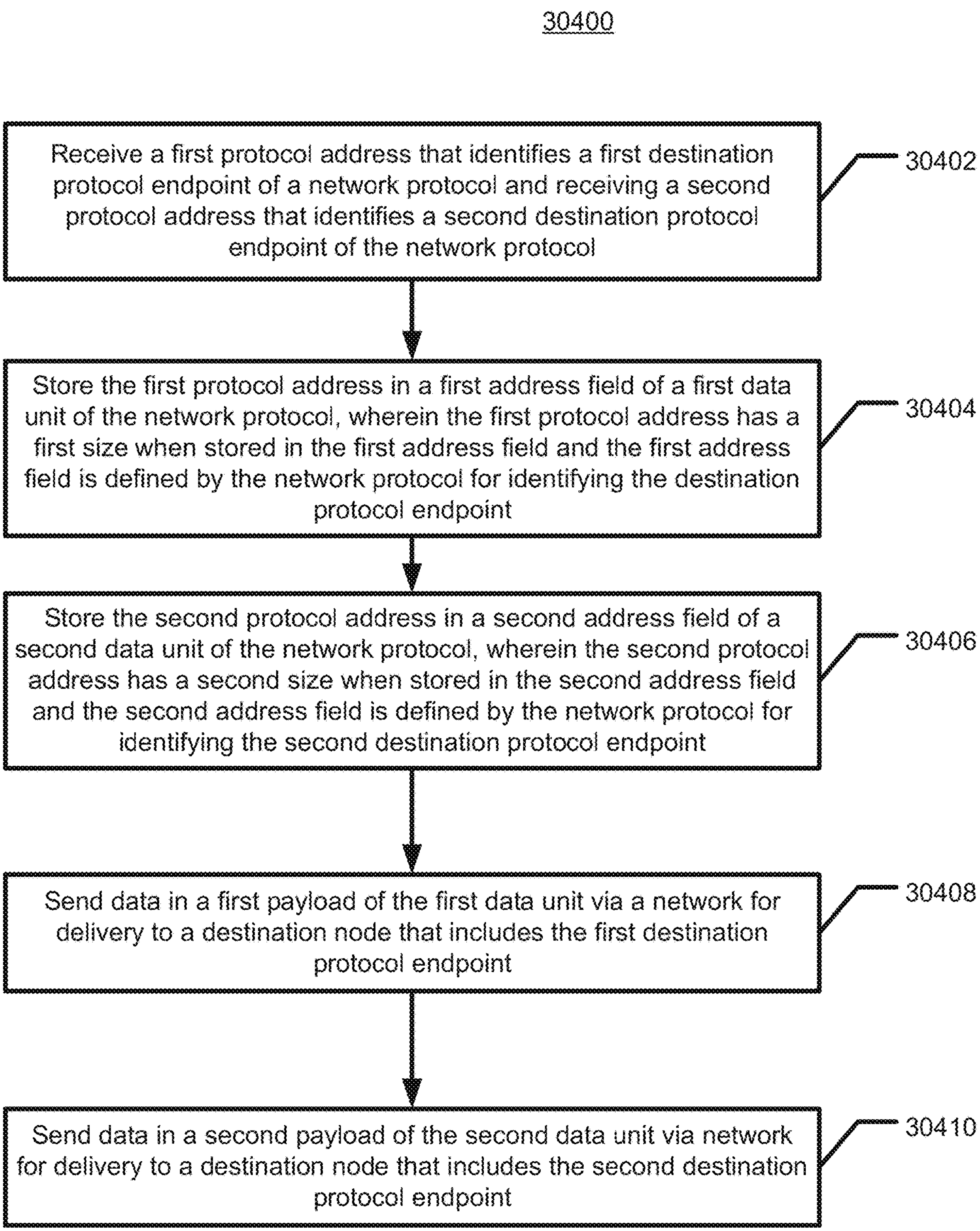
FIG. 49 is a diagram illustrating a method according to another aspect of the subject matter described herein.

FIG. 49 shows a method 30400. As an option, the method 30400 may be implemented in the context of the functionality and architecture of FIG. 48. Of course, however, the method 30400 may be carried out in any suitable operating environment.

As shown, the method 30400 includes receiving a first protocol address that identifies a destination protocol endpoint of a network protocol and receiving a second protocol address that identifies a destination protocol endpoint of the network protocol. See operation 30402. Additionally, the method 30400 includes storing the first protocol address in a first address field of a first data unit of the network protocol, wherein the first protocol address has a first length when stored in the first address field and the first address field is defined by the network protocol. See operation 30404. Also, the method 30400 includes storing the second protocol address in a second address field of a second data unit of the network protocol, wherein the second protocol address has a second length when stored in the second address field and the second address field is defined by the network protocol. See operation 30406. Further, the method 30400 includes sending data in a first payload of the first data unit via a network for delivery to a destination node that includes the destination protocol endpoint identified by the first protocol address. See operation 30408. Still further, the method 30400 includes sending data in a first payload of the first data unit via a network for delivery to a destination node that includes the destination protocol endpoint identified by the first protocol address. See operation 30410.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

FIGS. 50A-B illustrate exemplary data unit headers 30500 for a network layer protocol. Those skilled in the art will understand that the teachings herein are applicable to various network layer protocols such as IPv4 and IPv6 as well as to various link layer protocols. FIGS. 50A-B illustrate address fields 30502 in data units 30500. A network protocol may specify an address field that may include a protocol address that identifies a source of the data in a data unit and may include a protocol address that identifies a destination of the data sent from the source. Protocol addresses for the source and the destination may be stored separately or may occupy the same location in a data unit as is described below in further detail. Address data may be stored in a contiguous portion of a data unit, for example, according to a particular network protocol, according to a particular protocol address type, and/or according to a particular protocol address. Address data may be stored non-contiguously, for example, as specified and/or otherwise allowed for a particular network protocol, for a particular protocol address, and/or for a particular protocol address type.

An address field in a data unit may have a fixed length as specified by a network protocol. See for example FIG. 50A. IPv4, IPv6, and Ethernet are examples of protocols that specify fixed length address fields in data units of the respective network protocols. A network protocol may specify and/or otherwise allow that fixed length address fields in data units of the network protocol may respectively include protocol addresses of various lengths. A network protocol be specified so that protocol lengths may vary by bit count. A network protocol may specify and/or otherwise allow address lengths and/or address field lengths may vary by fixed lengths. A network protocol may be specified that requires and/or otherwise allows a protocol address and/or an address field to begin and/or end at an offset in a data unit that is a multiple of a specified constant. For example, a network protocol may specify that a protocol address ends on an even bit count from some specified location in a data unit, such as the beginning of a header. Additionally or alternatively, a network protocol may specify to require and/or otherwise allow a data unit to include an address field with a length that varies and/or a protocol address with a length that varies.

For example, the length of an address field may be determined based on the length of a protocol address stored and/or to be stored in the address field. Such an address field may have a length that is the same as the length of the protocol address stored in the address field. In another aspect, an address field may be longer than the protocol address of the protocol address stored in the address field. Protocol addresses stored in address fields and the respective address fields may have different requirements as specified by a network protocol. For example, address fields may be specified to end on a byte boundary while a protocol address stored in the address field may end on any bit boundary. A protocol may specify that a particular padding value be stored in an unused portion of an address field in a data unit of the network protocol.

FIGS. 51A-D illustrate address fields that may be valid for a data unit of a network protocol as defined by a schema specified for and/or by the network protocol to define a valid address field 30600 and/or a protocol address in a data unit of the network protocol. FIGS. 51A-D illustrate that an address field may include a type field 30602. A type field may allow a network protocol to operate with more than one type of protocol address. For example, the address types described herein may be defined as valid address types in IPv4, IPv6, and various link layer protocols. These address types may be valid along with address types currently in use by such protocols. For a network protocol supporting only one type of address, a type field 30502 is unneeded and may be optional or prohibited in a data unit by the network protocol.

FIGS. 51A-D illustrate address data fields 30604 in address fields 30600. Address data fields may vary as address fields vary as just described. An address data field may differ from an address field that includes it just as rules for a protocol address may differ from rules for an address field in which it may be stored. Likewise, rules for a protocol address may differ from rules for an address data field in which it may be stored according to a network protocol.

Figure 51A:
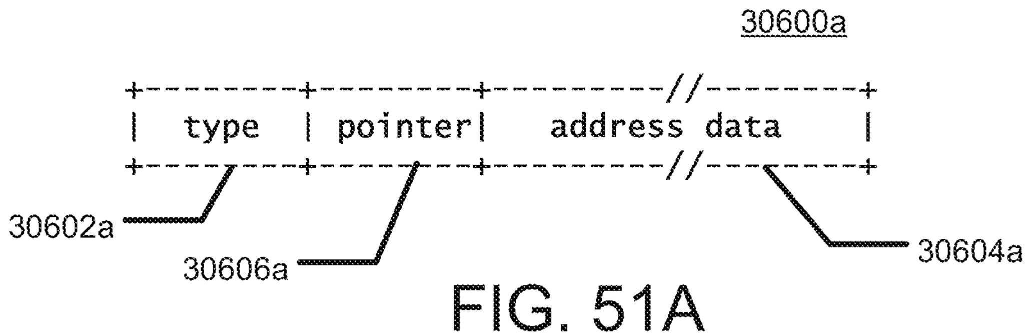
FIG. 51A is a diagram illustrating an exemplary address field for a network protocol data unit according to another aspect of the subject matter described herein.
Figure 51B:
FIG. 51B is a diagram illustrating an exemplary address field for a network protocol data unit according to another aspect of the subject matter described herein.
Figure 51C:
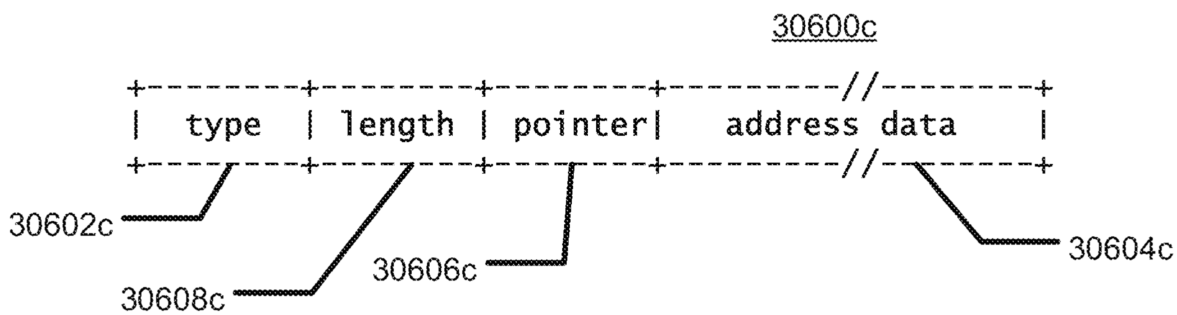
FIG. 51C is a diagram illustrating an exemplary address field for a network protocol data unit according to another aspect of the subject matter described herein.

FIGS. 51A-D illustrate pointer fields 30606 that identify a location of an address data field 30604 in a data unit. A pointer field 30606 and a corresponding address data field 30604 may be adjacent or contiguous in a data unit or may be separated or non-contiguous. In FIG. 51A, an address data field 30604 may have a fixed length as specified by a network protocol and/or address data field 30604 may have a length based on a type of protocol address identified in a corresponding type field 30602. In FIG. 51C, a length field 30608*c* is included in address field 30600*c* to specify a length of an address data field 30604*c* and/or a length or length of a protocol address in an address data field 30604*c*. In an aspect, an address data field 30604*c* may have a fixed length and a length field 30608*c* may specify a length of a protocol address stored in the address data field 30604*c*. An address field 30600 may include more than one length field as needed. For example, lengths of protocol addresses and address data fields may be allowed to vary for a particular network protocol.

Figure 51D:
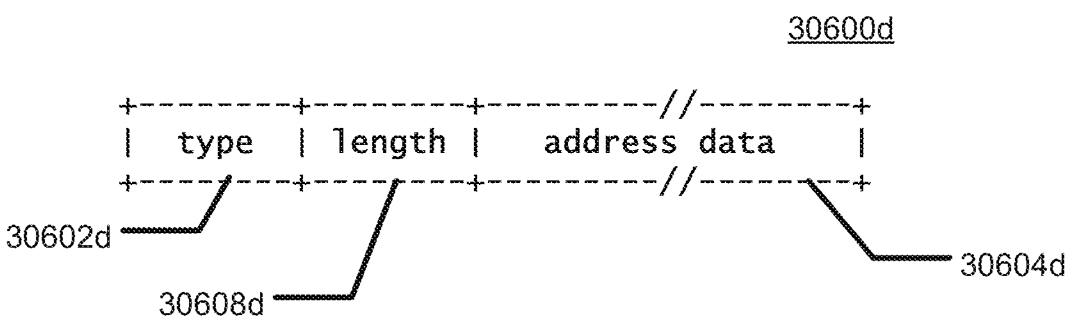
FIG. 51D is a diagram illustrating an exemplary address field for a network protocol data unit according to another aspect of the subject matter described herein.

FIG. 51B and FIG. 51D both illustrate address fields 30600 where a location of a type field 30602 identifies a location of a corresponding address data field 30604. They may be adjacent as illustrated or separated by a fixed or calculable distance in a data unit.

FIGS. 52A-E illustrate a number of exemplary address representations 30700 which may be stored in an address data field 30604, as exemplified in FIGS. 51A-D. FIGS. 52A-E illustrate addresses that may be valid according to various address schemas for representing addresses in address spaces including protocol addresses of various lengths. Various portions of the respective address representations 30700*a* are illustrated as contiguous, but need not be so in various embodiments according to the subject matter described herein. Each of the schemas defining address representations 30700 shown in FIGS. 52A-E as valid for a network protocol may be included in a destination protocol address field and/or a source protocol address field of a data unit of the network protocol, such as an IPv4 data unit header and/or an IPv6 data unit header. Further, data units of various link layer protocols may be adapted to include analogous protocol addresses representations for transmitting via one or more link layer network.

Figure 52A:
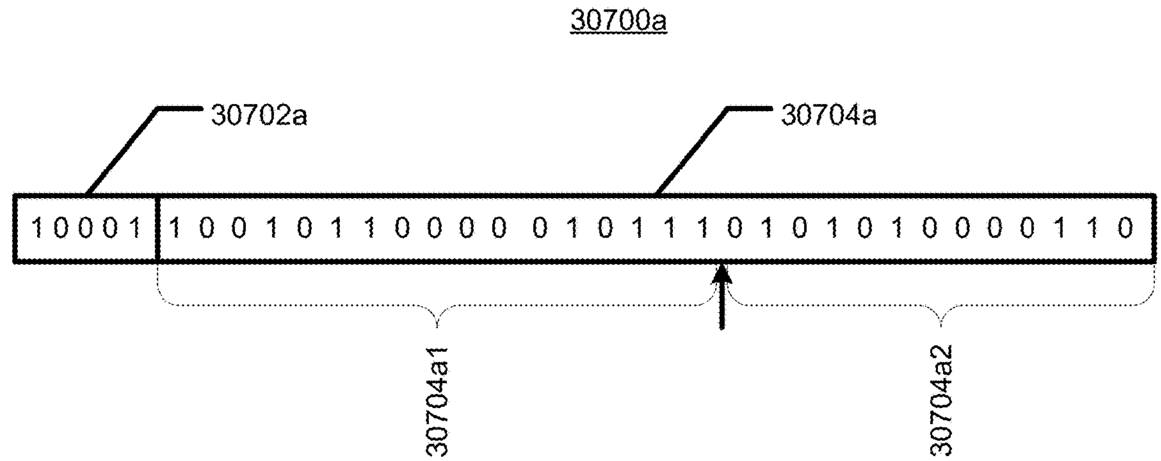
FIG. 52A is a diagram illustrating an exemplary representation of a protocol address according to another aspect of the subject matter described herein.

FIG. 52A illustrates address representation 30700*a* for protocol addresses of varying lengths that may be included in an address field of a data unit or packet of an Internet Protocol, other network layer protocol, and/or may be used to transmit data via packets of a link layer protocol (e.g. via one or more link layer switches or bridges). For example, an address representation 30700*a* may identify one or more scope-specific addresses of various lengths or with fixed lengths for one or more respective nodes in a network path for transmitting data from a source node to a destination node. In an aspect, an address representation 30700*a* may be processed as including at least three portions whose lengths may differ for data units processed by nodes in a network path from a source node to a destination node. An address separator field 30702*a* is illustrated including a number. In FIG. 52A, the number illustrated equals seventeen in base ten. The number in the address separator field 30702*a* may identify a boundary of an address data field 30704*a* separating a first address data field 307041 and a second address field 307042. The first address data field 307041 may identify a first protocol address that, in a first scope-specific address space of a first node, identifies a second node included in the network path. The second address data field 307042 may identify a second protocol address that, in a second scope-specific address space of the second node, identifies a third node. Address data field 30704*a* may identify a source-destination protocol address that identifies the third node as a destination node to the first node in the role of a source node.

Figure 52B:
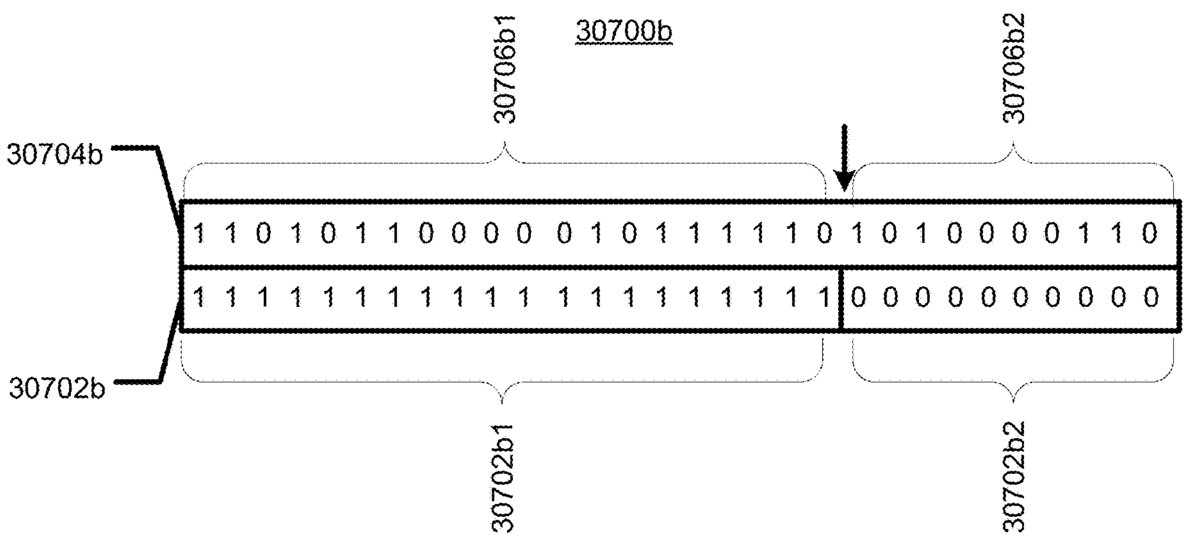
FIG. 52B is a diagram illustrating an exemplary representation of a protocol address according to another aspect of the subject matter described herein.

FIG. 52B illustrates another type of address representation 30700*b* that may be included in a data unit to provide address information according to a particular network protocol, such as IP, IPX, or ATM. Instead of or in addition to including an address separator field 30702*b* that distinguishes a first address field 30706*b*1 from a second address field 30706*b*2 based on a bit count, a bit-mask may be specified as one or more address separator fields 30702*b* to identify a first address field 30706*b*1 and a second address field 30706*b*2 in an address data field 30706*b*. Address information represented as illustrated in FIG. 52B may be processed in an analogous manner to that described for the address information represented in FIG. 52A based on the bit mask address separator field(s) 30702*b* rather than and/or in addition to a length address separator field 30702*a* illustrated in FIG. 52A.

Figure 52C:
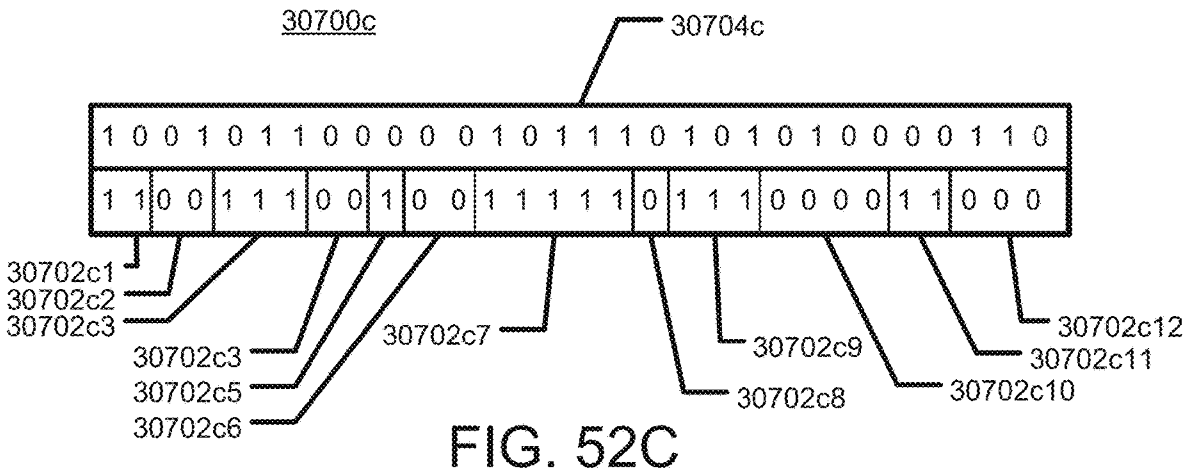
FIG. 52C is a diagram illustrating an exemplary representation of a protocol address according to another aspect of the subject matter described herein.

FIG. 52C illustrates an address representation 30700*c* identifying one or more scope-specific addresses. An address data field 30704*c* may be interpreted as one or more scope-specific addresses based on one or more address separator field(s) 30702*c*. Address separator fields 30702*c* are specified according to a network protocol to distinguish one node-specific address from another in an address data field 30704*c*. FIG. 52C illustrates an address separator fields 30702*c* that distinguishes and/or identifies hop identifiers that may be scope-specific addresses and/or may be included in a scope-specific address. A scope-specific address may identify a node one hop away from the region for which the address is specific. The address separator fields 30702*c* distinguish separate hop identifiers based on changes in values of bits in consecutive address separator fields 30702*c*. In FIG. 52C, a first address separator field 30702*c*1 includes one or more one-valued bits that correspond to bit positions in the address data field 30704*c* to identify a first address field referred to in FIG. 52C as a first hop information field. Scope-specific addresses that include more than one hop may be distinguished similarly as shown in FIG. 52B. Combinations of hop identifiers and path identifiers may be distinguished as scope-specific addresses by address separator fields 30702*c*. An illustrated second hop information field 30702*c*2 includes one or more zero-valued bits to identify a second hop information field in address data field 30704*c*. Additional alternating sequences of one-valued bits and zero-valued bits illustrated by address separator fields 30702*c*3-12*c* correspond to and identify other hop information fields identifying hops in a network path communicatively coupling a pair of path end nodes and identified by a scope-specific address.

Figure 52D:
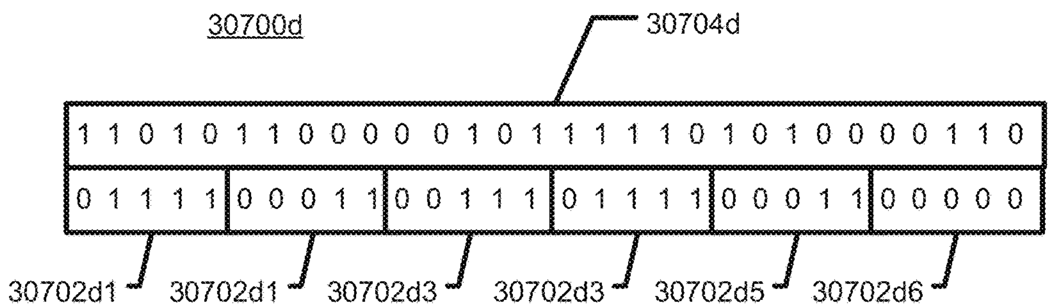
FIG. 52D is a diagram illustrating an exemplary representation of a protocol address according to another aspect of the subject matter described herein.

FIG. 52D includes an address representation 30700*d* illustrating aspects of a schema for representing path information based on identifiers of network interfaces or other suitable pairs of numbers for identifying protocol endpoints of a hop and/or a network path. An address data field 30704*d* includes path information identifying a network path for communicating data between a pair of path end nodes in the network path. FIG. 52D illustrates that an address representation 30700*d* may include one or more address separator fields 30702*d* that correspond to and/or otherwise identify respective one or more portions of the address data field 30704*d* that are based on a pair of identifiers of protocol endpoints.

An address separator field 30702*d* includes a series of one-valued bits and zero-valued bits. A change from a one-value to a zero-value and vice versa may indicate a boundary that separates protocol endpoint identifiers and/or interface identifiers. An address separator field 30702*d*1 includes one zero-valued bit followed by four one-valued bits. The zero-valued bit may be defined to indicate that a first network interface in a first hop identifier is one bit long with a corresponding position in the address data field 30704*d*.

FIG. 52D identifies the first interface identifier as the number one in base ten. The four one-valued bits in the first address separator field 30702*d*1 may be similarly defined to identify the location of a second interface identifier in the first hop identifier. The second interface identifier, as illustrated in FIG. 52D, has the value ten in base ten. The first hop identifier includes the numbers one and ten. The first hop identifier may be represented as a string, 1-10. A second hop identifier is located by the end of the series of four one-valued bits in the first address separator field 30702*d*1 to a series of three zero-valued bits that identify a boundary of a second address separator field 30702*d*2 for second hop information identifying a second hop identifier, and the three zero-valued bits also identify the location of a first interface identifier in second hop information in the address data field 30704*d*. Two subsequent one-valued bits identify the location in the address data field 30704*d* of a second interface identifier in the second hop information. The second hop identifier includes the numbers six and zero in base ten. The remaining address separator fields 30702*d* may be processed similarly. The protocol address illustrated FIG. 52D may be represented textually as 1-10.6-0.0-5.1-14.5-0.6.

Note that the address separator field 30702*d*6 does not identify a pair of identifiers and is similar to address separator fields 30702*c* in FIG. 52C. Alternatively, an address separator field 30702*d* may correspond to a portion of an address data field 30704*d* that identifies a scoped address. This is illustrated to demonstrate that protocol addresses may be uniform or non-uniform in their format and content as well as length.

Figure 52E:
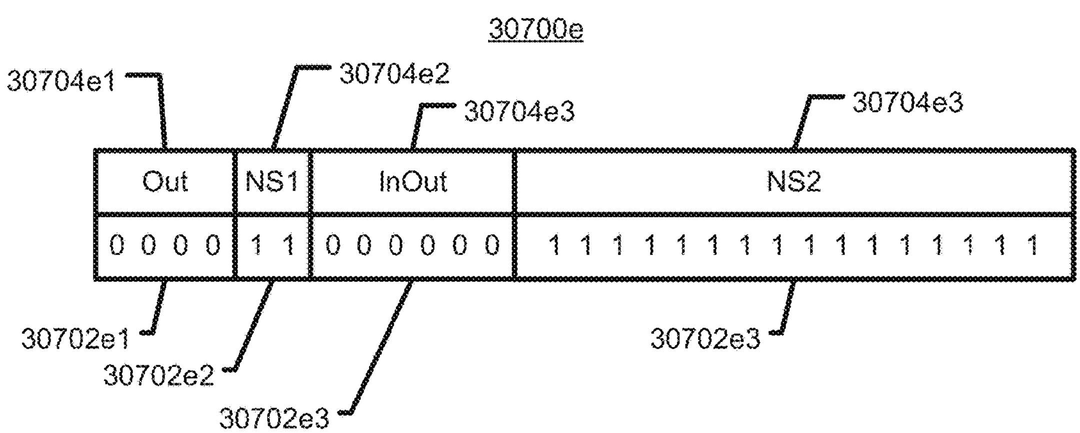
FIG. 52E is a diagram illustrating an exemplary representation of a protocol address according to another aspect of the subject matter described herein.

FIG. 52E illustrates an address representation 30700*e* that further demonstrates that a protocol address may be based on path information that identifies a particular network path and/or may be based on address information that does not identify a particular network path. For example, an address representation 30700*e* may include portions that include path information and/or portions that include scoped addresses. An address separator field 30702*e* is defined to distinguish address fields in a manner similar to the method described for distinguishing hop identifiers in FIG. 52C. A first address data field 30704*e*1 corresponding to the first address separator field 30702*e*1 includes a single interface identifier for an outbound network interface for a first node as described above with respect to FIG. 52A and FIG. 46C. A second address data field 30704*e*2 corresponding to a second address separator field 30702*e*2 may include a scoped address having an inside scope, an outside scope, or both. A node processing the second address data field 30704*e*2 may be included in a portion of a network spanned by the scope of the scoped address. The node may process the scoped address accordingly.

See application Ser. No. 11/962,285, by the present inventor, filed on 2007 Dec. 21, entitled "Methods and Systems for Sending Information to a Zone Included in an Internet Network" for a description of addresses having outside scope and/or inside scope and processing of such addresses. A third address data field 30704*e*3 corresponding to a third address separator field 30702*e*3 may include a pair of identifiers as described with respect to FIG. 52D. A fourth address data field 30704*e*4 corresponding to a fourth address separator field 30702*e*4 may include a protocol address analogous to one of the types of addresses described with respect to the second address data field 30704*e*2 such as a local-scoped address. FIG. 52E illustrates that a scope-specific address specific to a node may include an address and/or a portion of an address that are/is not from a scope-specific address space.

As described above an address field in a data unit of a network protocol may have a length that differs from an address field in another data unit of the network protocol. Alternatively, an address field may be specified for a network protocol that has a fixed length in data units of the network protocol, but may allow protocol addresses respectively stored in the address fields to have various lengths. A network protocol may specify that an address field may be stored contiguously in a data unit of the network protocol. Alternatively or additionally, a network protocol may specify that an address field be included in a data unit of the network protocol in a contiguous manner. Analogously, a network protocol may specify that a protocol address may be stored contiguously in an address field of a data unit of the network protocol. Alternatively or additionally, a network protocol may specify that a protocol address be included in an address field in a data unit of the network protocol in a contiguous manner.

A network protocol may specify conditions for allowable lengths of address fields and/or protocol address in data units of the network protocol. For example, a network protocol may be specified to allow address field lengths to be even numbers in bits or bytes. That is, lengths of address fields may be specified to differ by a length that is divisible by a particular number or particular numbers.

A first protocol address, having a first length, may be included in a first data unit to send data to a protocol endpoint of a network protocol in a destination node. A second protocol address, having a different length, may be included in a second data unit to send data to a protocol endpoint of the network protocol in the same destination node. The protocol endpoint identified by the second protocol address may be the same protocol endpoint identified by the first protocol address or may be a different protocol endpoint. For example, the first data unit be included in sending data to the destination node via first network path and the second data unit may be included in sending data to the destination node via a second network path. The data sent via the first network path and the data sent via the second network path may be sent by a same source node or a different source node.

Analogously, data sent in a payload of the first data unit may be received by a current node via a first path node and the data in a payload of the second data unit may be received by the current node via a second path node. The data in the first payload may be sent from a first source node and the data in the second payload may be sent from a second source node. In another aspect, the data in the first payload and the data in the second payload may be sent from a same source node. Further, the data in the first payload may be sent from a current node via a first path node and the data in the second payload may be sent by the current node via a second path node.

In another aspect, the protocol endpoint identified by the first protocol address may be in first destination node and a protocol endpoint identified by the second protocol address may be in a second destination node. Data sent in a first payload of the first data unit may be from a first source node and the data in a second payload of the second data unit may be from a second source node. In another aspect, the data in the first data unit and the data in the second data unit may be sent from a same source node Analogously, data in the first payload may be received by a current node via a first path node and data in the second payload is received by the current node via a second path node. Further, the data in the first payload may be from a first source node and the data in the second payload may be from a second source node. In another aspect, the data in the first payload and the data in the second payload are from a same source node.

Figure 53:
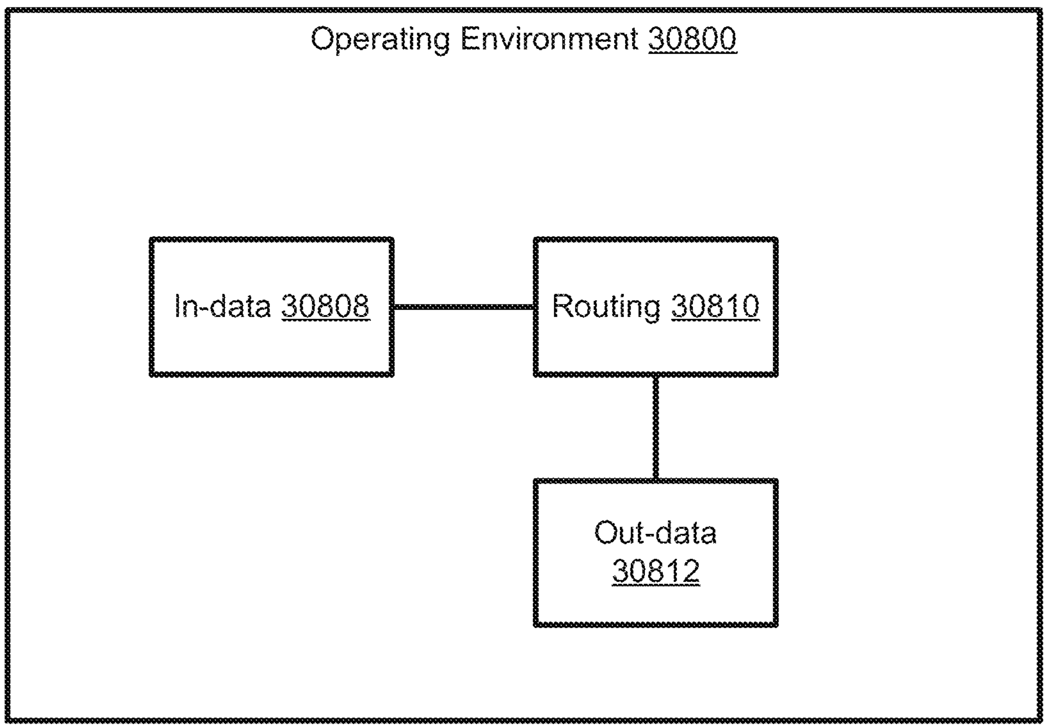
FIG. 53 is block diagram illustrating an operating environment that includes logic for performing the method illustrated in FIG. 54 according to another aspect of the subject matter described herein.

FIG. 53 shows a representative operating environment 30800 that may be associated with the nodes of FIGS. 46A-C, in accordance with one embodiment. As shown, the environment 30800 may include logic 30808 that is executed in receiving, by a path node and based on a first portion of a destination address, a first in-data unit in a flow of data units transmitted from a source node to a destination node, where in the destination address identifies the destination node and wherein the first in-data unit includes a second portion of the destination address, logic 30810 that is executed in receiving, based on the first portion, a second in-data unit in the flow, wherein the second in-data unit does not include the second portion, and logic 30806 that is executed in sending, to a next node via the second portion, a second-out data unit that includes second data received in the second in-data unit.

Figure 54:
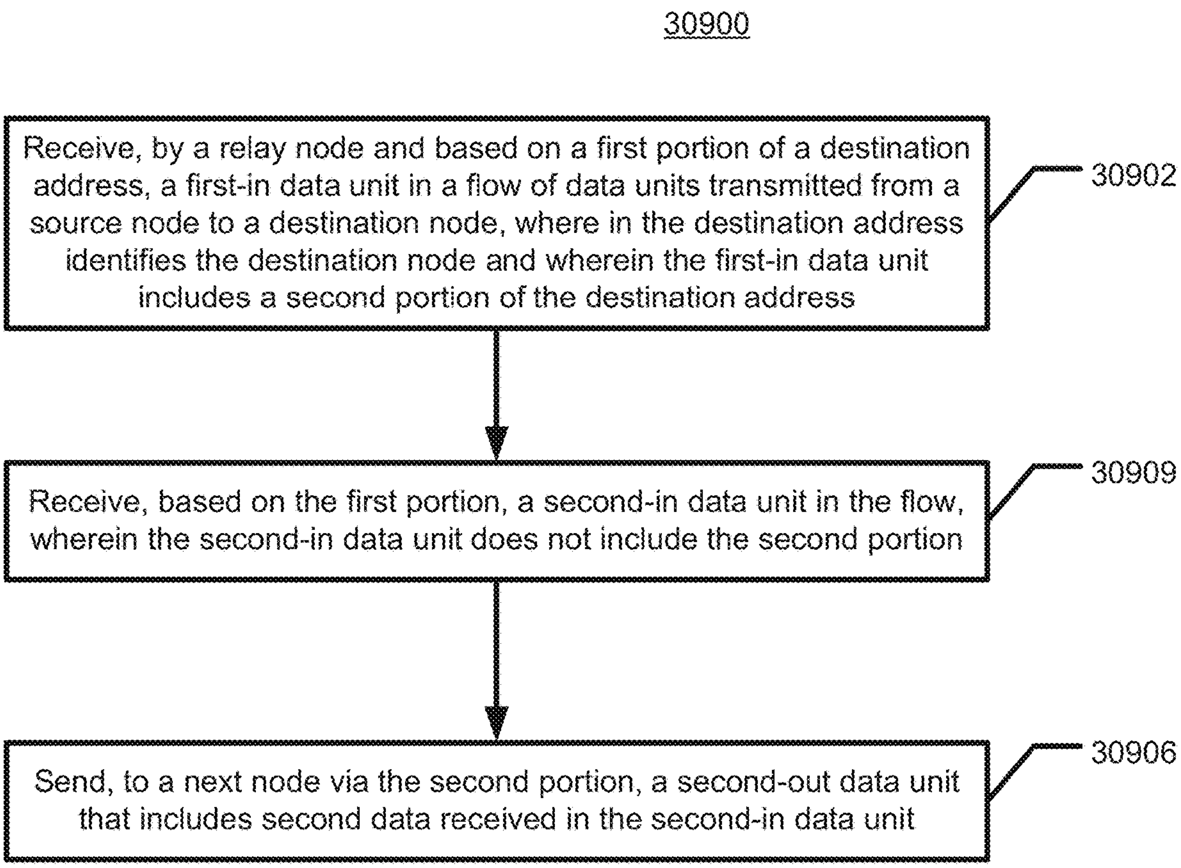
FIG. 54 is a diagram illustrating a method according to another aspect of the subject matter described herein.

FIG. 54 shows a method 30900. As an option, the present method 30900 may be implemented in the context of the functionality and architecture of FIGS. 46 and 53. Of course, however, the method 30900 may be carried out in any suitable operating environment. For example, logic in FIG. 54 may be included in components of operating environment 30200 in FIG. 47.

As shown, the method 30900 includes receiving, by a path node and based on a first portion of a destination address, a first in-data unit in a flow of data units transmitted from a source node to a destination node, where in the destination address identifies the destination node and wherein the first in-data unit includes a second portion of the destination address. See operation 30902. Additionally, the method 30900 includes receiving, based on the first portion, a second in-data unit in the flow, wherein the second in-data unit does not include the second portion. See operation 30904. Also, the method 30900 includes sending, to a next node via the second portion, a second-out data unit that includes second data received in the second in-data unit. See operation 30906.

Figure 55A:
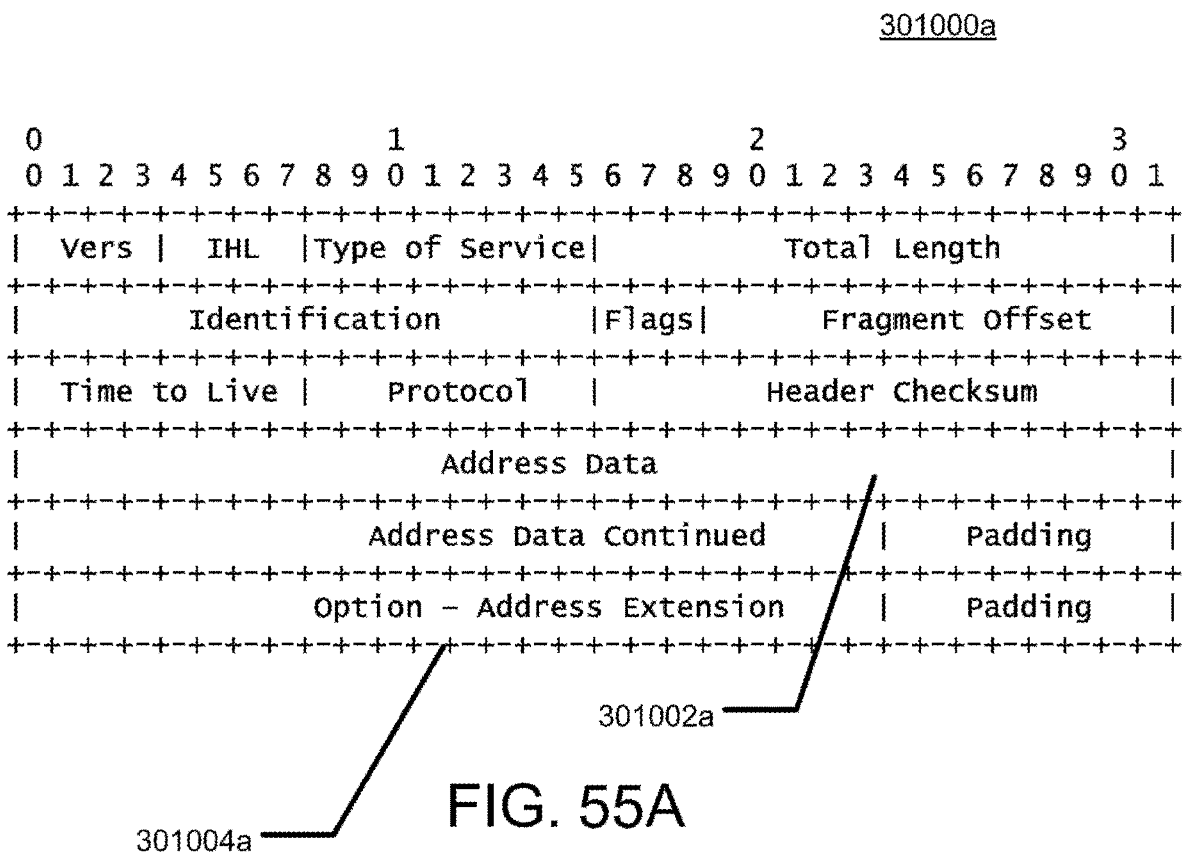
FIG. 55A is a diagram illustrating an exemplary network protocol data unit header according to another aspect of the subject matter described herein.
Figure 55B:
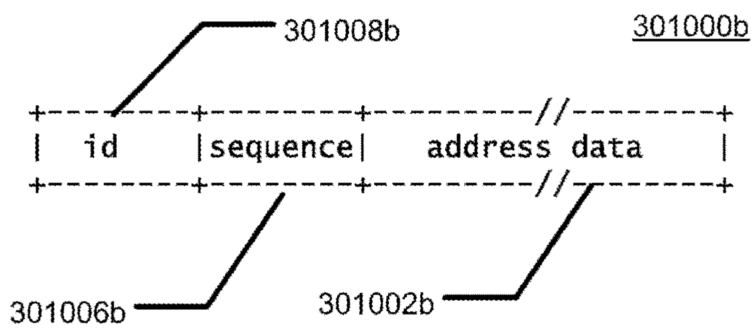
FIG. 55B is a diagram illustrating an exemplary network protocol data unit header according to another aspect of the subject matter described herein.

FIG. 55A-B illustrate a data unit header that includes a portion of a network address in an option field of the data unit. An address may be sent in pieces and distributed in nodes in a network path for relaying data in data units of the network protocol. This allows an address that is too long for a data unit of a network protocol to be processed in pieces by appropriate nodes in a network path.

In FIG. 46C, a first node **30102*c*1 may identify an endpoint of a network protocol in a second node 30102*c*2 by a sequence of hop identifiers 101.1.0.1.0.1 to identify a network path that communicatively couples the first node 30102*c*1 and the second node 30102*c*2. The first node 30102*c*1 may transmit a data unit to a first path node 30104*c*1 identified by the protocol address 101.1 which makes up a portion of the protocol address of the second node 30102*c*2 for the first node 30102*c*1. The protocol address 101.1 may be stored as address data 301002*a* illustrated in FIG. 55A in an address field 301000*b* of a header of the data unit. The data unit may include an address extension '0', as illustrated in FIG. 46C, as a next portion of the address of the second node 30102*c*2 as address data, in FIG. 55B in an option field 301000*b* in an option portion 301004*a* of a header 301000*a*. The next portion may be defined by the network protocol to identify a next hop in the address of the second node 30102*c*2 that identifies a third path node 30104*c*3 in the network path to the second node 30102*c*2. Further, a data unit may transmit to the third path node 30104*c*3 via the protocol address '0'. For example, the first node 30102*c*1 may store an association that identifies the address 101.1 and the address 0. The association may be identified by a path identifier shared by the first node 30102*c*1 and the first path node 30104*c*1. An address identifier may be shared by all the nodes in the network path that includes the first node 30102*c*1 and the second node 30102*c*2 as path end nodes. Alternative, nodes in sub-path may share path identified that are associated with the network path from the first node 30102*c*1 to the second node 30102*c*2**.

The path identifier may be received by the path node **30104*c*1 from the first node 30102*c*1 in the data unit with the address portion 0, received by the first node 30102*c*1 from the first path node 30104$c$2**, may be negotiated by the two nodes, and/or may be received from a different node which for example may include network management logic, topology management logic, and/or routing logic.

In an aspect, the first node 30102$c$1 may send a second data unit to the first path node 30104$c$1. The header of the data unit may include the path identifier described above in an id field 301006$b$ as illustrated in FIG. 55B. The first path node 30104$c$1 may include logic in a routing component to look up the path identifier to identify the associated address portion 0 that identifies the third path node 30104$c$3 to the first path node 30103$c$1. The second data unit may include still another portion of the protocol address, 1.0, of the second node 30102$c$2. The first path node 30104$c$1 may send data received in the data unit to the third path node 30104$c$3 along with the protocol address 1.0 and the path identifier. The third path node 30104$c$3 may store an association that identifies the address 0 and the address 1.0, that identifies the seventh path node 30104$c$7 to the third path node 30104$c$3. The association may be identified by an identifier shared by the first path node 30104$c$1 and the third path node 30104$c$1, which may be the path identifier shared by the first node 30102$c$1 and the first path node 30104$c$1. A portion 301 of the protocol address of the second node 30102$c$2 may be sent to a seventh path node 30104$c$7 in an analogous manner to create an association between the protocol address 1.0 and the protocol address 1. The data units transmitted in setting up the associations may include data to transmit to the second node 30102$c$2 sent from the first node 30102$c$1.

With the associations accessible to the respective path nodes 30104$c$, the first node 30102$c$1 may send data to the second node 30102$c$2 by sending the data in a data unit to the first path node 30104$c$1. The data unit may include the path identifier shared by the first node 30102$c$1 and the first path node 30104$c$1. The first path node 30104$c$2 may identify the next portion, 0, of the protocol address of the second node 30102$c$2 based on the path identifier and the association between the protocol address 1.0 and 0. The first path node 30104$c$1, in response, may send the data in a data unit addressed to the third path node 30104$c$3 along with the path identifier shared by the first path node 30104$c$1 and the third path node 30104$c$3. The third path node 30104$c$3 and the seventh path node 30104$c$7 may similarly and subsequently relay the data to the second node 30102$c$2 based on a shared path identifiers and stored associations analogous to those just described.

Alternatively or additionally, the second data unit in the previous paragraph may be received prior to receiving the first data unit. For example, the first node 30102$c$1 may send a data unit to the third path node 30104$c$3 that includes the protocol address 0 and a next portion 1.0 along with a path identifier or other suitable correlator. A data unit subsequently received and/or a data unit previously received via the protocol address 0 that includes the correlator may be processed by a routing component 30210, in FIG. 47, including logic 30810 and/or an equivalent in the third path node 30104$c$3. Based on the correlator the routing component 30210 may determine that the data in the subsequent received data unit and/or the previously received data unit is to be transmitted via the next path 1.0 along with the path identifier or correlator that identifies an association maintained by the seventh path node 30104$c$7 between the address portion 1.0 with the portion 301 that identifies the eighth hop 30108$c$1 including the seventh path node 30104$c$7 and the second node 30102$c$2.

Note that the various address portions associated by nodes in a network path may be the same length and/or different lengths as specified for an address space of a network protocol.

Figure 56:
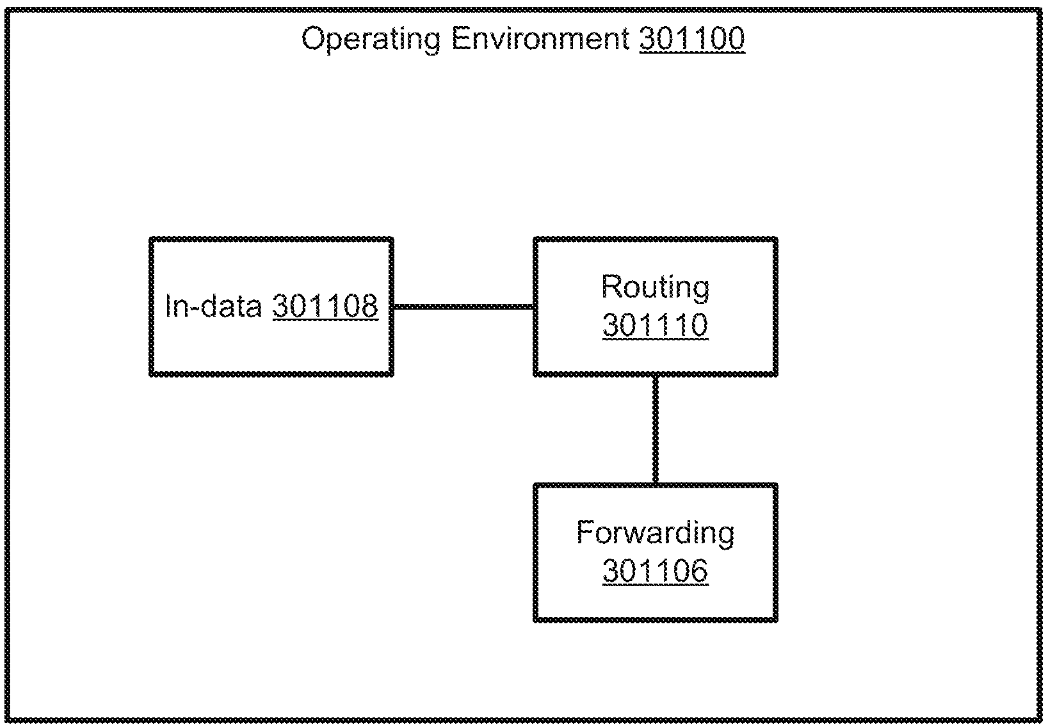
FIG. 56 is a block diagram illustrating an operating environment that includes logic for performing the method illustrated in FIG. 57 according to another aspect of the subject matter described herein.

FIG. 56 shows a representative operating environment 301100 that may be associated with the nodes 30104 of FIGS. 46A-C, in accordance with one embodiment. As shown, the operating environment 301100 may include logic 301108 that is executed in receiving, by a path node via a first network interface, data for delivering via a network to a destination node from a source node, wherein the data is received in a data unit, of a network protocol, that includes a destination address field defined by the network protocol to identify a destination protocol address that identifies the destination node and that identifies a first protocol address that identifies the path node, logic 301110 that is executed in identifying, in the destination address field, a second protocol address of a node that communicatively couples the path node and the destination node, and logic 301106 that is executed in transmitting, based on the second protocol address, the data for delivery to the destination node.

Figure 57:
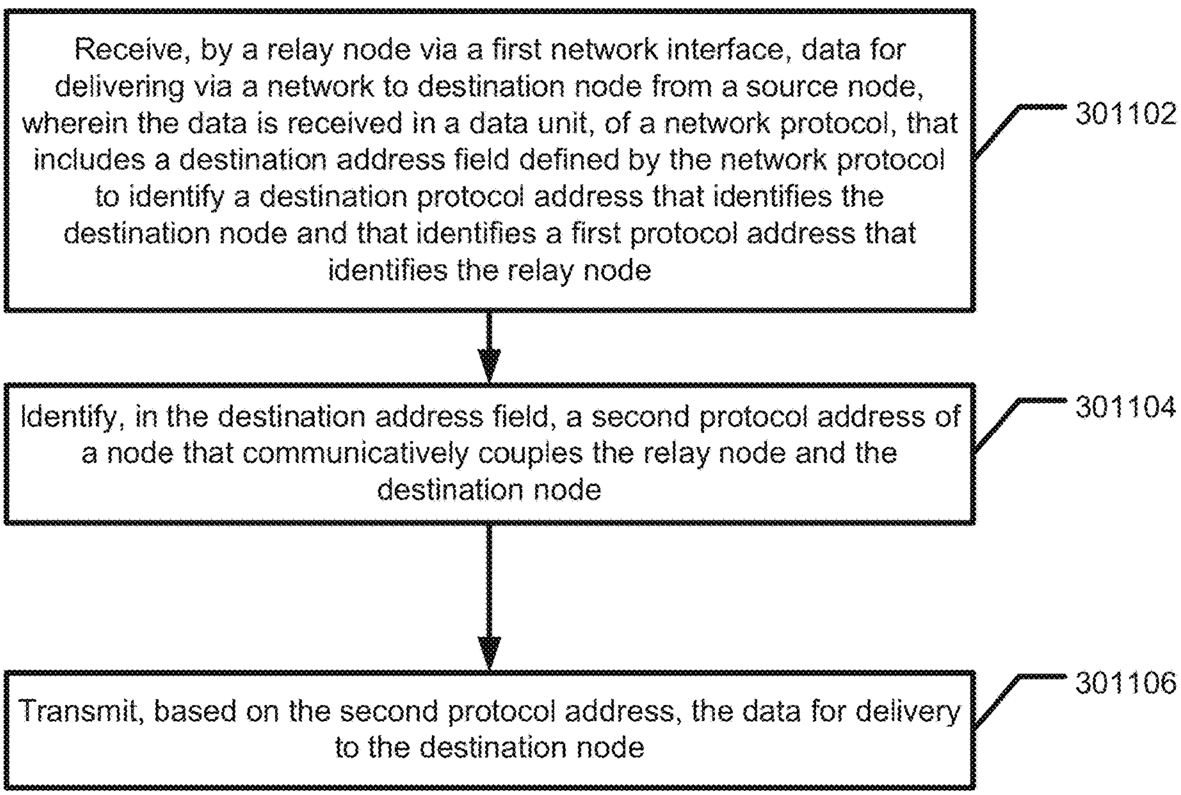
FIG. 57 is a diagram illustrating a method according to another aspect of the subject matter described herein.

FIG. 57 shows a method 301200. As an option, the present method 301200 may be implemented in the context of the functionality and architecture of FIGS. 46 and 56. Of course, however, the method 301200 may be carried out in any suitable operating environment. For example, logic in FIG. 56 may be included in one or more components of operating environment 30200 in FIG. 47.

As shown, the method 301200 includes receiving, by a path node via a first network interface, data for delivering via a network to a destination node from a source node, wherein the data is received in a data unit, of a network protocol, that includes a destination address field defined by the network protocol to identify a destination protocol address that identifies the destination node and that identifies a first protocol address that identifies the path node. See operation 301202. Additionally, the method 301200 includes identifying, in the destination address field, a second protocol address of a node that communicatively couples the path node and the destination node. See operation 301204. Also, the method 301200 includes transmitting, based on the second protocol address, the data for delivery to the destination node. See operation 301206.

With respect to FIG. 46A and FIG. 52A, an address representation 30700$a$ may be included in a data unit including data from a first node 30102$a$1 to transmit to a second node 30102$a$2. As described above, the sequence, 2.2.3.3, may be represented in an address data field 30704$a$ to identify, for example for a path-based protocol address, a first-second protocol address that, for the first node 30102$a$1, identifies the second node 30102$a$2. The first-second protocol address may be an identifier that identifies a network path to the second node 30102$a$2 from the first node 30102$a$1.

At the first node 30102$a$1, a packet generator component 30204 in an operating environment 30200 of the first node 30102$a$1 and/or an address handler component 30202 operating in the first node 30102$a$1 may set and/or otherwise detect a value in the address separator field 30702$a$ that indicates that a first address field 30704$a$1 has a zero length. The address data field 30704$a$, thus, constitutes a second address field at the first node 30102$a$1 and identifies the first-second protocol address that may be set and/or otherwise detected by a path separator component 30218. FIG. 46A illustrates that protocol addresses that identify various nodes to nodes in the first node 30102$a$1 have respective lengths which may differ. Further, a single address field may include a number of protocol addresses of various lengths.

An instance or analog of an execution environment 30200, in FIG. 47, may include and/or may be provided by a third path node **30104*a*3. The third path node 30104*a*3 may receive, via a NIC 30213*a*, data to deliver to the second node 30102*a*2. An in-data component 30208 may receive the data in a data unit. A routing component 30210 may process the destination protocol address in the data unit. The routing component 30210 may invoke and/or otherwise interoperate with a separator component 30218 to process an address separator field 30702*a* in the data unit including the data from the first node 30102*a*1. The separator component 30218 interoperating with a routing component 30210 in the third path node 30104*a*3 may be set to and/or otherwise may detect a value that identifies 2.2, in a first address field 30704*a*1. The information in the first address field 30704*a*1 identifies a protocol address that, in for the first node 30102*a*1 identifies the third path node 30104*a*3. The value in the address separator field also identifies a second address field 30704*a*2 that identifies 3.3 as a protocol address that for the third path node 30104*c*3 identifies the second node. The address in the second address field 30704*a*2 may be a scope-specific address that, in a fifth scope-specific address space specific to a fifth region 30110*a*5 including the third path node 30104*a*3, identifies the second node 30102*a*2. A forwarding component 30206 of the third path node 30104*a*3 may identify a NIC 30213 for transmitting the data. The data may be processed by an out-data component 30212 of the third path node 30104*a*3 that interoperates with a packet generator component 30204** to prepare a data unit to transmit the data.

At the second node **30102*a*2 a data unit including the data from the first node 30102*a*1 may include a value, set and/or detected by a separator component 30218 of the second node 30102*a*2, in an address separator field 30702*a* that indicates that the address data field 30704*a* includes only a first address field 30704*a*1** identifying 2.2.3.3 as the first protocol address.

As the data from the first node **30102*a*1 is transmitted from node to node in the network path the value represented in an address separator field 30702*a* in an address data field 30704*a* in a data unit including the data or a portion thereof may be adjusted by respective path separator components 30218** of the nodes in the network path to identify a protocol address in a suitable address space for the respective nodes.

Figure 58:
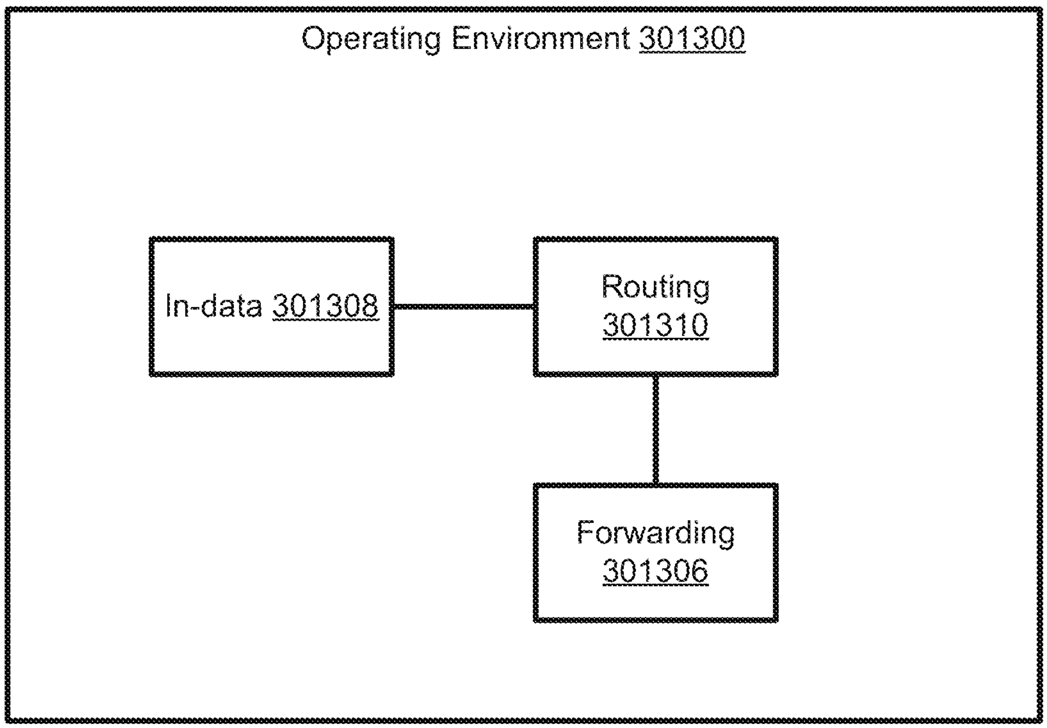
FIG. 58 is a block diagram illustrating an operating environment that includes logic for performing the method illustrated in FIG. 59 according to another aspect of the subject matter described herein.

FIG. 58 shows a representative operating environment 301300 that may be associated with the servers 30104 and/or clients 30106 of FIG. 46, in accordance with one embodiment. As shown, the operating environment 301300 may include logic 301308 that is executed in receiving, by a path node via a first network interface, data to deliver to a destination node from a source node via a network having a network topology included in a metric space, wherein the data is received in a data unit that includes an address field that identifies at least one of a source protocol address that identifies, relative to a path node protocol address that identifies a relay location of the path node in the metric space, the source node and a path node protocol address that identifies, relative to a source protocol address that identifies a source location of the source node in the metric space, the path node, logic 301310 that is executed in detecting in an address field in the data unit second address information that identifies at least one of a destination protocol address that identifies, relative to the path node protocol address, the destination node and a path node protocol address that identifies, relative to a destination protocol address that identifies a destination location of the destination node in the metric space, the path node, and logic 301306 that is executed in sending, via the least one of the destination protocol address and the path node protocol address, the data for delivery via the network to the destination node.

Figure 59:
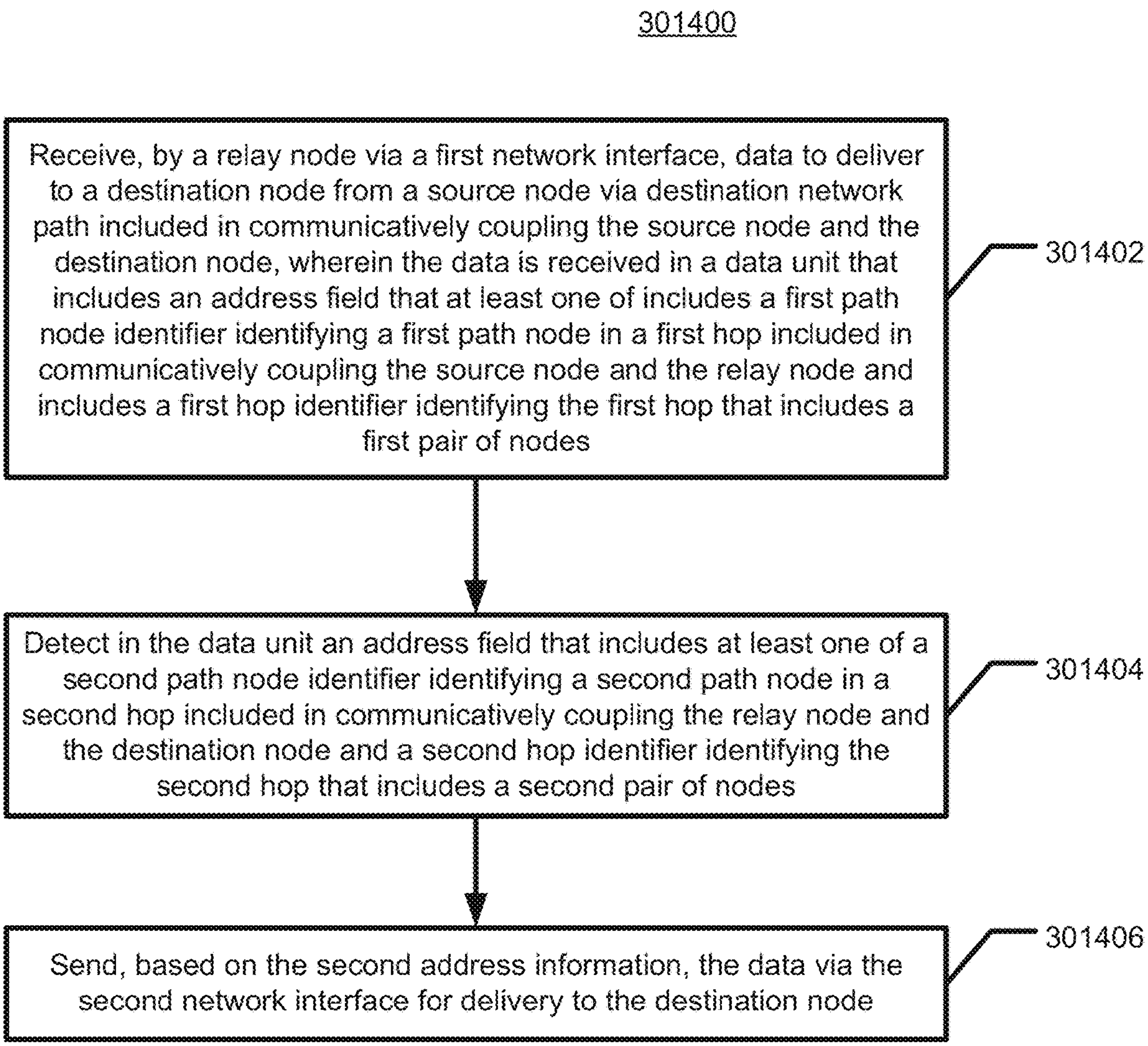
FIG. 59 is a diagram illustrating a method according to another aspect of the subject matter described herein.

FIG. 59 shows a method 301400. As an option, the present method 301400 may be implemented in the context of the functionality and architecture of FIGS. 46 and 58. Of course, however, the method 301400 may be carried out in any suitable operating environment. For example, logic in FIG. 58 may be included in one or more components of operating environment 30200 in FIG. 47.

As shown, the method 301400 includes receiving, by a path node via a first network interface, data to deliver to a destination node from a source node via a network having a network topology included in a metric space, wherein the data is received in a data unit that includes an address field that identifies at least one of a source protocol address that identifies, relative to a path node protocol address that identifies a relay location of the path node in the metric space, the source node and a path node protocol address that identifies, relative to a source protocol address that identifies a source location of the source node in the metric space, the path node. See operation 301402. Additionally, the method 301400 includes detecting in an address field in the data unit second address information that identifies at least one of a destination protocol address that identifies, relative to the path node protocol address, the destination node and a path node protocol address that identifies, relative to a destination protocol address that identifies a destination location of the destination node in the metric space, the path node. See operation 301404. Also, the method 301400 includes sending, via the least one of the destination protocol address and the path node protocol address, the data for delivery via the network to the destination node. See operation 301406.

In an aspect, a current address space may include identifiers that identify respective locations, in a multi-dimensional metric space, that is defined based on a plurality of axes that intersect at a current-origin location in the metric space that represents a node in the current scope-specific address space. A network interface of the node at the current-origin location may be identified based on an axis in the plurality of axes. The current-next protocol address may be detected relative to a current-origin address that, in the current scope-specific address space, identifies the current-origin location in the metric space, wherein the current-next protocol address identifies a next location in the metric space relative to the current-origin location and the next location represents the next node.

In related aspect, a current path node, in a network path for transmitting data from a source node to a destination node, may be in a current network region that has a current scope-specific address space. The current scope-specific address space may include an origin address, such as address "300.300.300.300", that identifies a network interface of a node in the network identifying an origin node and/or an origin network interface. Protocol addresses in the current scope-specific address space that identify other network interfaces and/or nodes may be defined relative to the origin address based on a specified mapping rule that is defined based on a relationship between the origin node and other network interfaces and/or nodes in the network. The mapping rule may be based on a metric and represented in a network topology of the network.

A mapping rule between a current node-specific address space of a current node and next scope-specific address space specific to a next node may be determined based on an current origin protocol address in the current scope-specific address space, a current-next protocol address in the next scope-specific address space that identifies the current node, and a protocol address in the current scope-specific address space of an origin network interface and/or origin node in the next network region.

The mapping rule may specify a coordinate shift and/or a rotation about an axis, for example. The mapping may be pre-specified and accessible to the current node. In another aspect, the current node may determine the mapping based on detected relationships between pairs of protocol addresses respectively from the two scope-specific addresses spaces of the current node and the next node, respectively, where a protocol address from each of the address spaces that identifies a same node is known to the current node.

Exemplary metric spaces include Euclidean spaces, non-Euclidean spaces, geo-spaces, and other geometric spaces. A Cartesian coordinate system is an exemplary address space for a Euclidean space. Another example of a geometric address space is a geospatial address space such as used currently in geo-location services. Networks have topologies that may be represented in a geo-space including locations addressed via a geometric address space.

Figure 60:
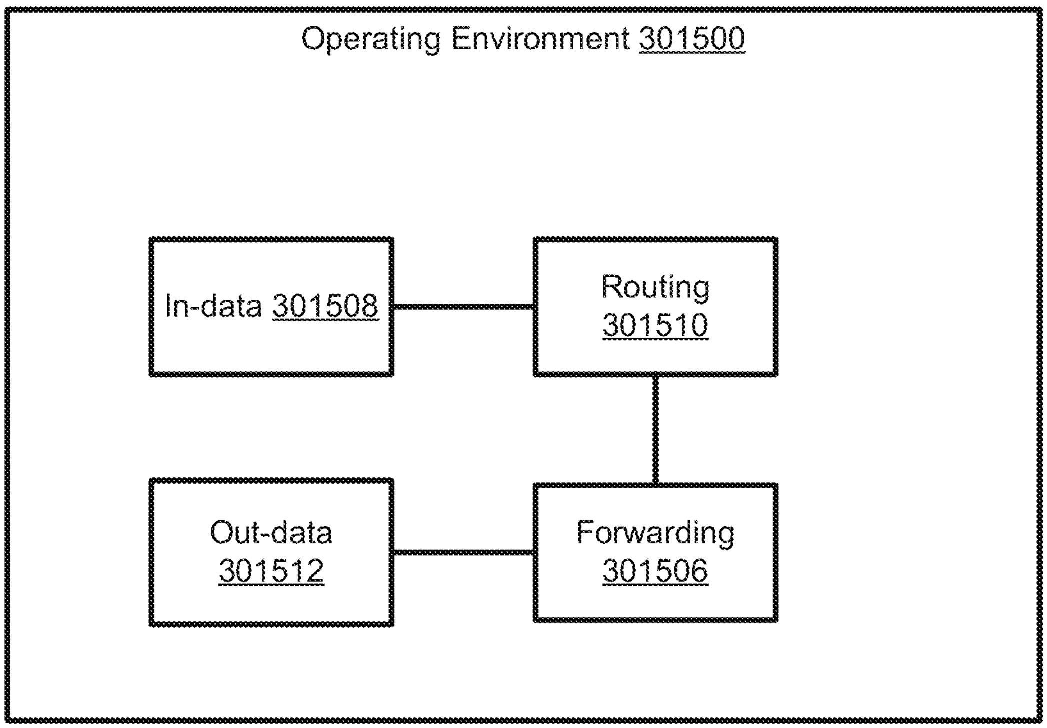
FIG. 60 is a block diagram illustrating an operating environment that includes logic for performing the method illustrated in FIG. 61 according to another aspect of the subject matter described herein.

FIG. 60 shows a representative operating environment 301500 that may be associated with the servers 30104 and/or clients 30106 of FIG. 46, in accordance with one embodiment. As shown, the operating environment 301500 may include logic 301508 that is executed in receiving, by a path node via a first network interface, data to deliver to a destination node from a source node via a destination network path included in communicatively coupling the source node and the destination node, wherein the data is received in a data unit that includes an address field that at least one of includes a first path node identifier identifying a first path node in a first hop included in communicatively coupling the source node and the path node and includes a first hop identifier identifying the first hop that includes a first pair of nodes, logic 301510 that is executed in detecting in the data unit an address field that includes at least one of a second path node identifier identifying a second path node in a second hop included in communicatively coupling the path node and the destination node and a second hop identifier identifying the second hop that includes a second pair of nodes, and logic 301506 that is executed in sending, based on the second address information, the data via a second network interface for delivery to the destination node, wherein the second network interface is included in communicatively coupling the path node and the destination node.

Figure 61:
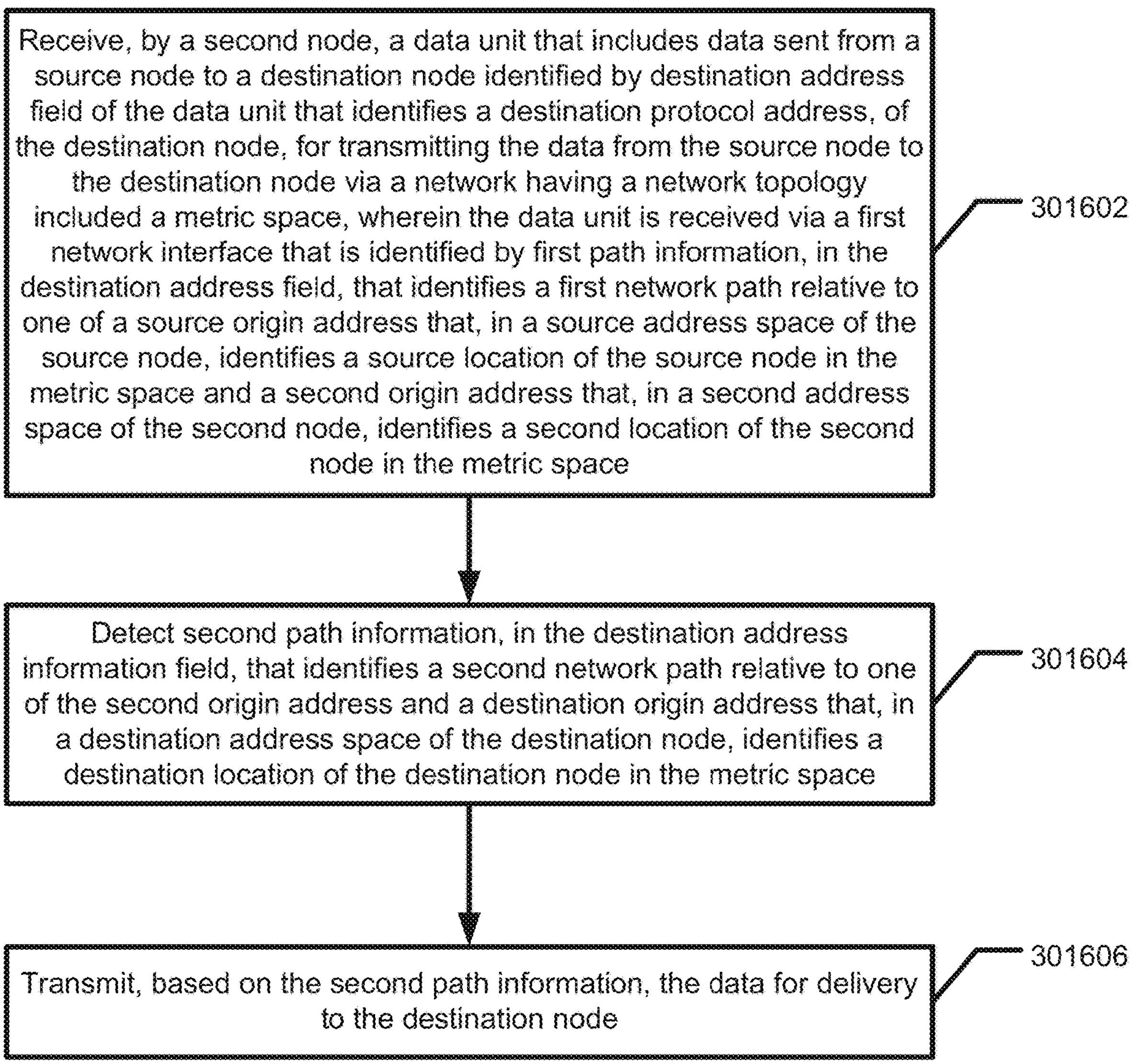
FIG. 61 is a diagram illustrating a method according to another aspect of the subject matter described herein.

FIG. 61 shows a method 301600. As an option, the present method 301600 may be implemented in the context of the functionality and architecture of FIGS. 46 and 60. Of course, however, the method 301600 may be carried out in any suitable operating environment. For example, logic in FIG. 60 may be included in one or more components of operating environment 30200 in FIG. 47.

As shown, the method 301600 includes receiving, by a path node via a first network interface, data to deliver to a destination node from a source node via destination network path included in communicatively coupling the source node and the destination node, wherein the data is received in a data unit that includes an address field that at least one of includes a first path node identifier identifying a first path node in a first hop included in communicatively coupling the source node and the path node and includes a first hop identifier identifying the first hop that includes a first pair of nodes. See operation 301602. Additionally, the method 301600 includes detecting in the data unit an address field that includes at least one of a second path node identifier identifying a second path node in a second hop included in communicatively coupling the path node and the destination node and a second hop identifier identifying the second hop that includes a second pair of nodes. See operation 301604. Also, the method 301600 includes sending, based on the second address information, the data via the second network interface for delivery to the destination node. See operation 301606.

In FIG. 46C, a hop may be identified by an interface identifier of a network interface in a pair of communicatively coupled nodes included in the hop. For example, the number, 301 may serve as a hop identifier specific to a second path node **30104*c*2 to identify a fifth hop 30108*c*5 including the second path node 30104*c*2 and a fourth path node 30104*c*4. The number 301 also identifies a network path for exchanging data between the two nodes. The number 301 may also be a protocol address that, in a second path node-specific address space specific to the second path node 30104*c*2, identifies the fourth path node 30104*c*4. The number 301 may also identify a hop for the fourth path node 30104*c*4 to exchange data with the second path node 30104*c*2; may also be a protocol address that, in a fourth path node-specific address space specific to the fourth path node 30104*c*4 identifies the second path node 30104*c*2; and may identify a particular network interface of the second path node 30104*c*2 and/or of the fourth path node 30104*c*4**.

A first node **30102*c*1 may identify a second node 30102*c*2 by a first-second protocol address that, in a first scope-specific address space specific to a first region 30110*c*1 including the first node 30102*c*1, identifies the second node 30102*c*2. The first-second protocol address may include and/or otherwise may be based on a sequence of hop identifiers 0.1.3.2.1. Note that other network paths are illustrated for transmitting data from the first node 30102*c*1 to the second node 30102*c*2 and may also be and/or otherwise may identify protocol addresses in the first scope-specific address space that identify the second node 30102*c*2 to nodes in the first region 30110*c*1**.

The hop identifiers, 0.1.3.2.1, may be represented in an address representation **30700*c* in an address field in a data unit for sending data from the first node 30102*c*1 to the second node 30102*c*2. The hop identifier 301 in the address identifies a fifth hop 30108*c*5 that includes the second path node 30104*c*2 and a third path node 30104*c*3. The hop identifier 303 in the address identifies a hop that includes the third path node 30104*c*3 and a fifth path node 30104*c*5. The hop identifier 302 in the address identifies a hop that includes the fifth path node 30104*c*5 and the seventh path node 30104*c*7. The second identifier 301 in the address identifies a first hop 30108*c*5 that includes the second path node 30104*c*2 and the seventh path node 30104*c*7**.

As described in the previous paragraph, a hop may be assigned an identifier that is shared by the pair of nodes in the hop. Thus, a sequence of hop identifiers may serve as a scope-specific address in one scope-specific address space when processed in one order of the sequence and may serve as another scope-specific address specific to another node when processed according to another order of the sequence. Any of the address types illustrated in FIGS. 52A-C, along with various variants and analogs, are suitable for including reversible address information.

Figure 62:
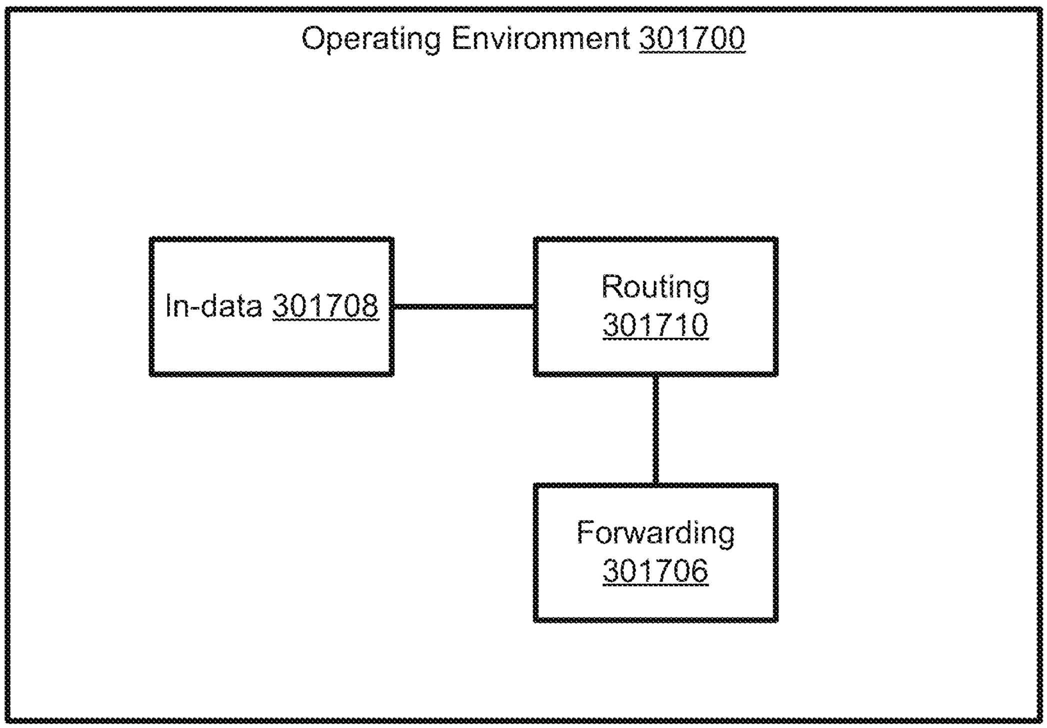
FIG. 62 is a block diagram illustrating an operating environment that includes logic for performing the method illustrated in FIG. 63 according to another aspect of the subject matter described herein.

FIG. 62 shows a representative operating environment 301700 that may be associated with the nodes of FIGS. 46A-C, in accordance with one embodiment. As shown, the environment 301700 may include logic 301708 that is executed in receiving, by a second node, a data unit that includes data sent from a source node to a destination node identified by destination address field of the data unit that identifies a destination protocol address, of the destination node, for transmitting the data from the source node to the destination node via a network having a network topology included in a metric space, wherein the data unit is received via a first network interface that is identified by first path information, in the destination address field, that identifies a first network path relative to one of a source origin address that, in a source address space of the source node, identifies a source location of the source node in the metric space and a second origin address that, in a second address space of the second node, identifies a second location of the second node in the metric space, logic 301710 that is executed in detecting second path information, in the destination address data field, that identifies a second network path relative to one of the second origin address and a destination origin address that, in a destination address space of the destination node, identifies a destination location of the destination node in the metric space, and logic 301706 that is executed in transmitting, based on the second path information, the data for delivery to the destination node.

Figure 63:
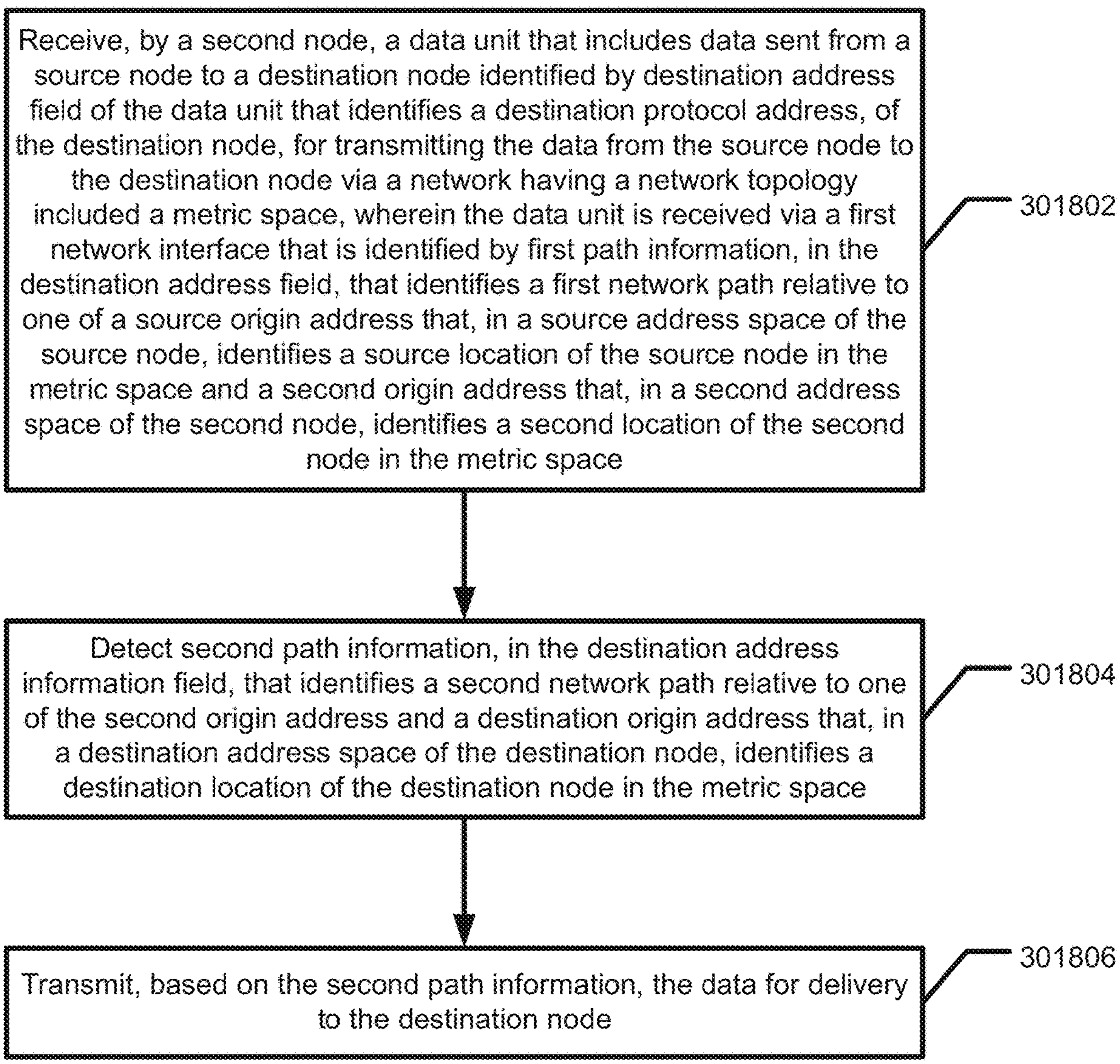
FIG. 63 is a diagram illustrating a method according to another aspect of the subject matter described herein.

FIG. 63 shows a method 301800. As an option, the present method 301800 may be implemented in the context of the functionality and architecture of FIGS. 46 and 62. Of course, however, the method 301800 may be carried out in any suitable operating environment. For example, logic in FIG. 62 may be realized in one or more components of operating environment 30200 in FIG. 47.

As shown, the method 301800 includes receiving, by a second node, a data unit that includes data sent from a source node to a destination node identified by destination address field of the data unit that identifies a destination protocol address, of the destination node, for transmitting the data from the source node to the destination node via a network having a network topology included a metric space, wherein the data unit is received via a first network interface that is identified by first path information, in the destination address field, that identifies a first network path relative to one of a source origin address that, in a source address space of the source node, identifies a source location of the source node in the metric space and a second origin address that, in a second address space of the second node, identifies a second location of the second node in the metric space. See operation 301802. Additionally, the method 301800 includes detecting second path information, in the destination address data field, that identifies a second network path relative to one of the second origin address and a destination origin address that, in a destination address space of the destination node, identifies a destination location of the destination node in the metric space. See operation 301804. Also, the method 301800 includes transmitting, based on the second path information, the data for delivery to the destination node. See operation 301806.

As described with respect to FIGS. 52A-E and FIGS. 46A-C, identifying a protocol address that for a network protocol identifies a second node to a first node may include identifying a second location of the second node in a metric space relative to a first location in the metric space of the first node. The protocol address identifies the second location relative to the first location. The protocol address may identify a path location of a path node represented in the topological space, wherein the path location is included in a path in the metric space that connects the first location and the second location. The protocol address that for a network protocol identifies a second node to a first node may identify a sequence locations in the path in the topological space.

Figure 64:
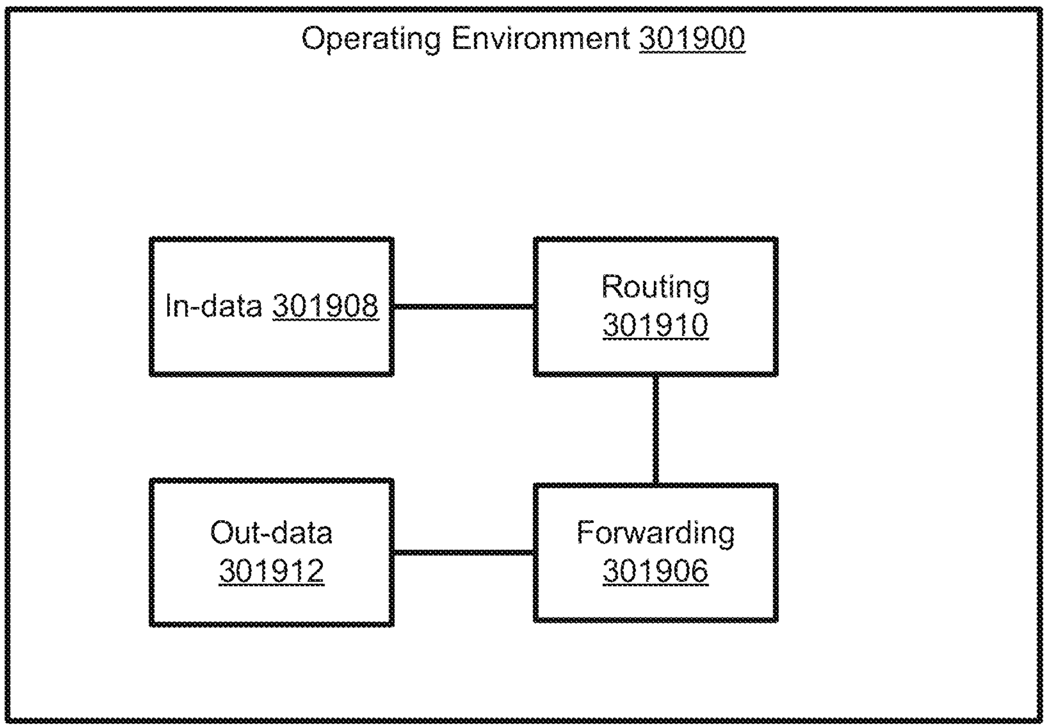
FIG. 64 is a block diagram illustrating an operating environment that includes logic for performing the method illustrated in FIG. 65 according to another aspect of the subject matter described herein.

FIG. 64 shows a representative operating environment 301900 that may be associated with node of FIGS. 46A-C, in accordance with one embodiment. As shown, the operating environment 301900 may include logic 301908 that is executed in receiving, via a network and based on a first hop identifier that is in a destination address field in a data unit of a network protocol and that identifies a first communicative coupling between a first pair of nodes in a network path from a source node to a destination node, a data unit, wherein the first hop identifier includes a first NIC identifier of a first NIC included in the first communicative coupling, logic 301910 that is executed in detecting, in the destination address, a second hop identifier that identifies a second communicative coupling between a second pair of nodes in the network path, logic 301906 that is executed in identifying a second NIC identifier identifying a second NIC included in the second communicative coupling, and logic 301912 that is executed in sending, based on the second hop identifier, the data for forwarding, via the second NIC, between the second pair in the network path to the destination node.

Figure 65:
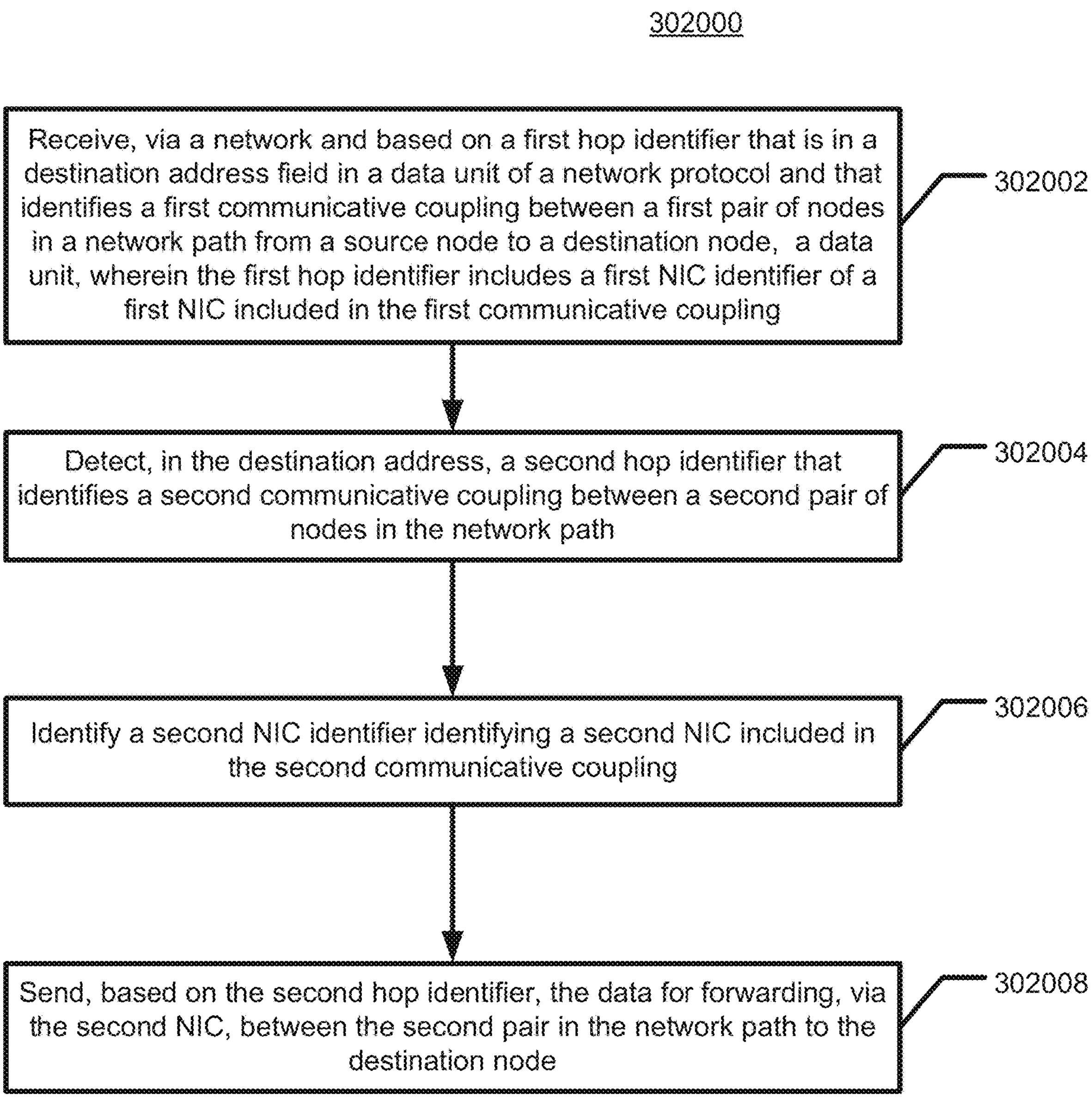
FIG. 65 is a diagram illustrating a method according to another aspect of the subject matter described herein.

FIG. 65 shows a method 302000. As an option, the present method 302000 may be implemented in the context of the functionality and architecture of FIGS. 46 and 64. Of course, however, the method 302000 may be carried out in any suitable operating environment. For example, logic in FIG. 64 may be realized in one or more components of operating environment 30200 in FIG. 47.

As shown, the method 302000 includes receiving, via a network and based on a first hop identifier that is in a destination address field in a data unit of a network protocol and that identifies a first communicative coupling between a first pair of nodes in a network path from a source node to a destination node, a data unit, wherein the first hop identifier includes a first NIC identifier of a first NIC included in the first communicative coupling. See operation 302002. Additionally, the method 302000 includes detecting, in the destination address, a second hop identifier that identifies a second communicative coupling between a second pair of nodes in the network path. See operation 302004. Also, the method 302000 includes identifying a second NIC identifier identifying a second NIC included in the second communicative coupling. See operation 302006. Further, the method 302000 includes sending, based on the second hop identifier, the data for forwarding, via the second NIC, between the second pair in the network path to the destination node. See operation 302008.

In FIG. 46B, a first node **30102*b*1 and a second node 30102*b*2 may be included in respective regions. Each of the two nodes may identify the other by a protocol address in a respective node-specific address space. For example, a sequence of pairs of interface identifiers 30151-30253.30151-3010 may be a protocol address that, in a first node-specific address space specific to the first node 30102*b*1, identifies the second node 30102*b*2. The first node may send a data unit including an address representation 30700*d* of the type illustrated in FIG. 52D. Note that 30151.30253 included in the address also identifies a first hope 30108*b*1 that includes the first node 30102*b*1 and a first path node 30104*b*1. Further, 30151-10 included in the address identifies a third hop 30108*b*3 that includes the first path node 30104*b*1 and the second node 30102*b*2**.

Figure 66:
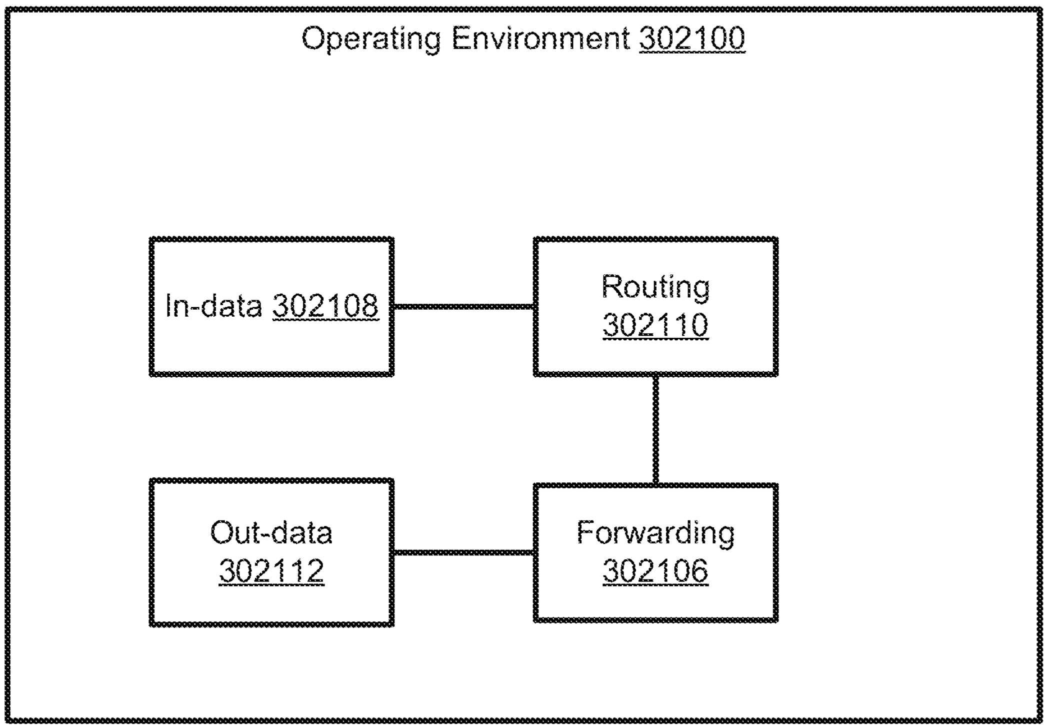
FIG. 66 is a block diagram illustrating an operating environment that includes logic for performing the method illustrated in FIG. 67 according to another aspect of the subject matter described herein.

FIG. 66 shows a representative operating environment 302100 that may be associated with nodes of FIG. 46A-C, in accordance with one embodiment. As shown, the operating environment 302100 may include logic 302102 that is executed in receiving, from a previous node by a current node via a previous network interface operatively coupling the current node to a network, data in a data unit of a network protocol, wherein the data unit is received from the previous node based on an address field included in the data unit to identify a protocol endpoint of the network protocol, logic 302110 that is executed in detecting a previous-next protocol address received in the address field and that, in a previous scope-specific address space specific to a previous network region including the previous node, identifies a next node, logic 302106 that is executed in determining, based on the previous-next protocol address, a next network interface communicatively coupling the current node to a next network region, and logic 302112 that is executed in sending, via the next network interface, the data to the next node by the current node.

Figure 67:
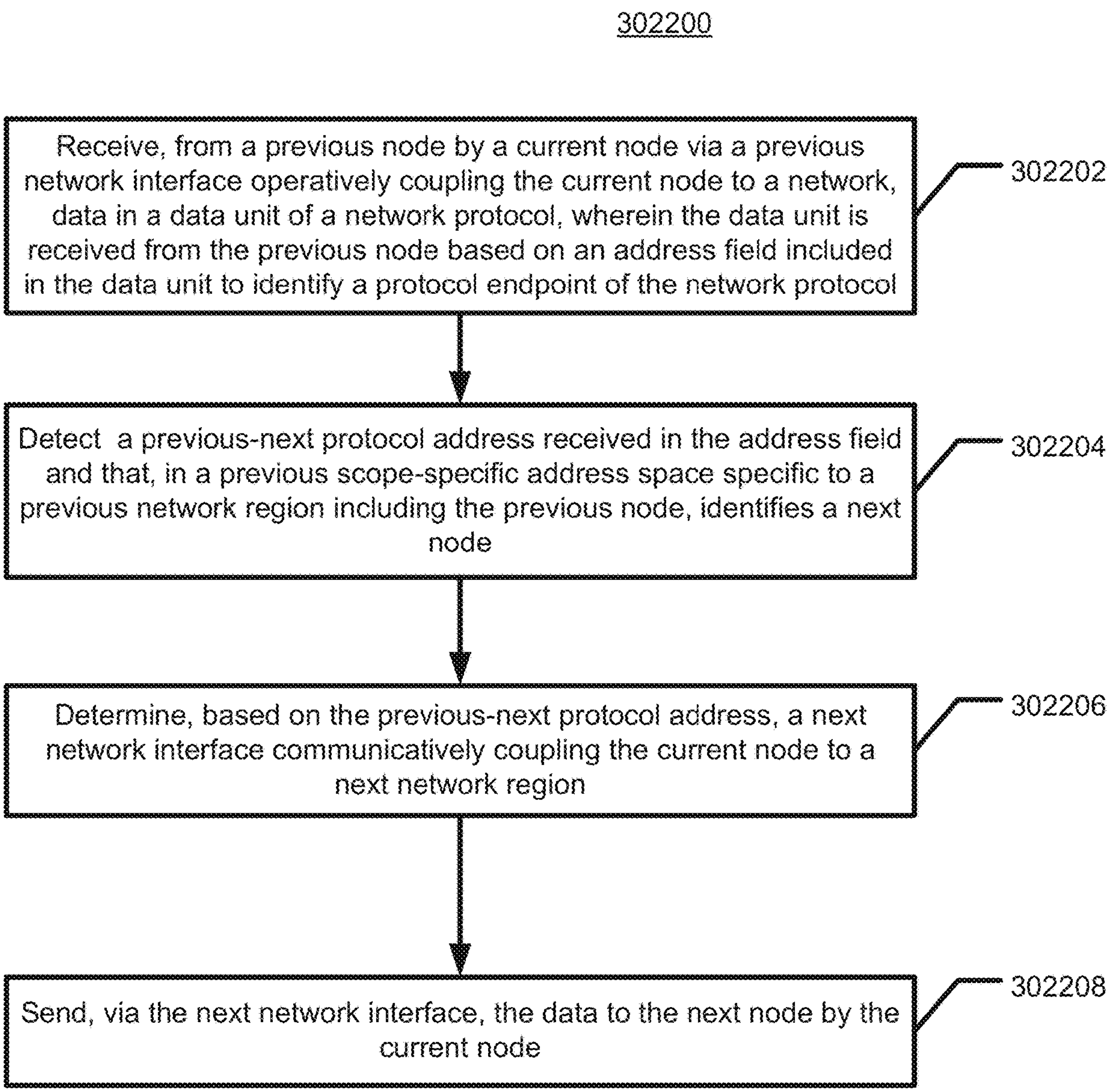
FIG. 67 is a diagram illustrating a method according to another aspect of the subject matter described herein.

FIG. 67 shows a method 302200. As an option, the present method 302200 may be implemented in the context of the functionality and architecture of FIGS. 46 and 66. Of course, however, the method 302200 may be carried out in any suitable operating environment. For example, logic in FIG. 66 may be included in component of operating environment 30200 in FIG. 47.

As shown, the method 302200 includes receiving, from a previous node by a current node via a previous network interface operatively coupling the current node to a network, data in a data unit of a network protocol, wherein the data unit is received from the previous node based on an address field included in the data unit to identify a protocol endpoint of the network protocol. See operation 302202. Additionally, the method 302200 includes detecting a previous-next protocol address received in the address field and that, in a previous scope-specific address space specific to a previous network region including the previous node, identifies a next node. See operation 302204. Also, the method 302200 includes determining, based on the previous-next protocol address, a next network interface communicatively coupling the current node to a next network region. See operation 302206. Further, the method 302200 includes sending, via the next network interface, the data to the next node by the current node. See operation 302208.

In FIG. 46A, a protocol address, 2.2.3.2, in data unit that includes data transmitted from a fourth node **30102*c*4 identifies a third node 30102*c*3 as the destination for the data. At a third path node 30104*c*3, the protocol address includes a previous-current protocol address, 2.2, that identifies the third path node 30104*c*3 (i.e. the current node) to the fourth node 30102*c*4 and includes a current-next protocol address, 3.2, that identifies the third node 30102*c*4 to the third path node 30104*c*3. Additionally, the protocol address, 2.2.3.2, at the third path node 30104*c*3, includes a previous-current protocol address, 2, that identifies the third path node 30104*c*3 (i.e. the current node) to the second path node 30102*c*2 and includes a current-next protocol address, 3, that identifies a first path node 30104*c*1 to the third path node 30104*c*4**.

Figure 68:
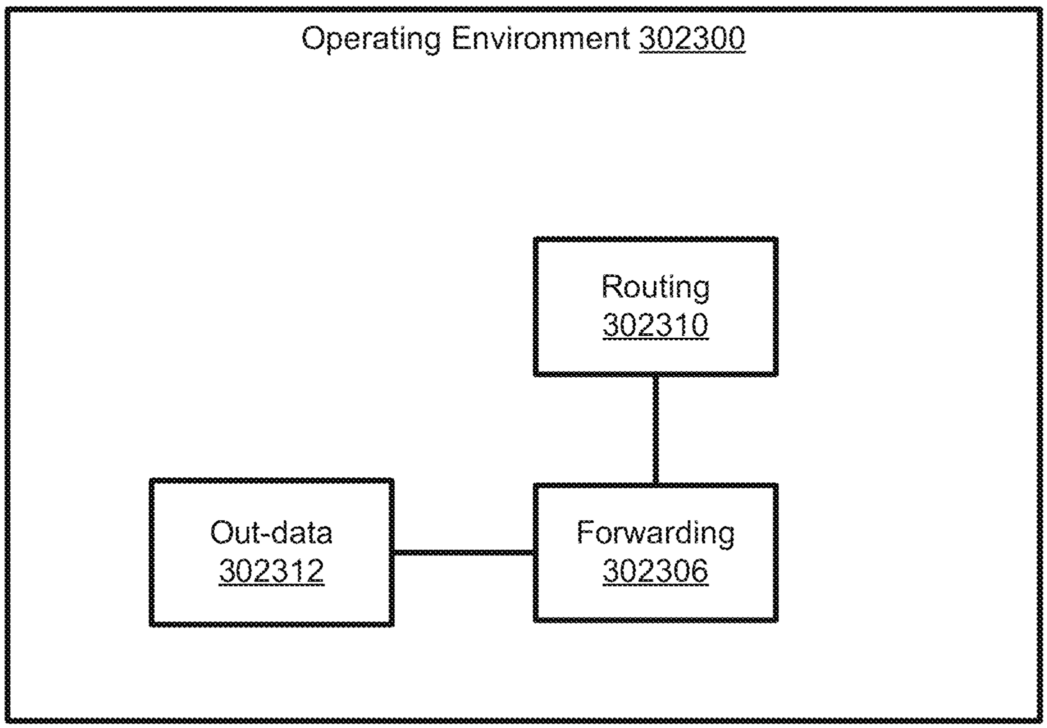
FIG. 68 is a block diagram illustrating an operating environment that includes logic for performing the method illustrated in FIG. 69 according to another aspect of the subject matter described herein.

FIG. 68 shows a representative operating environment 302300 that may be associated with nodes of FIG. 46A-C, in accordance with one embodiment. As shown, the operating environment 302300 may include logic 302310 that is executed in detecting, in a data unit that is specified according to a network protocol and that includes data from a source node for transmitting via a network to a destination node, a source-destination protocol address that identifies for the network protocol the destination node to the source node, logic 302306 that is executed in detecting, in the source-destination protocol address, a current-next protocol address that for the network protocol identifies, to a current node that has received the data, a next node that has not yet received the data, and logic 302312 that is executed in sending, by the current node based on the current-next protocol address, the data to the destination node via the next node, wherein the next node is not the destination node.

Figure 69:
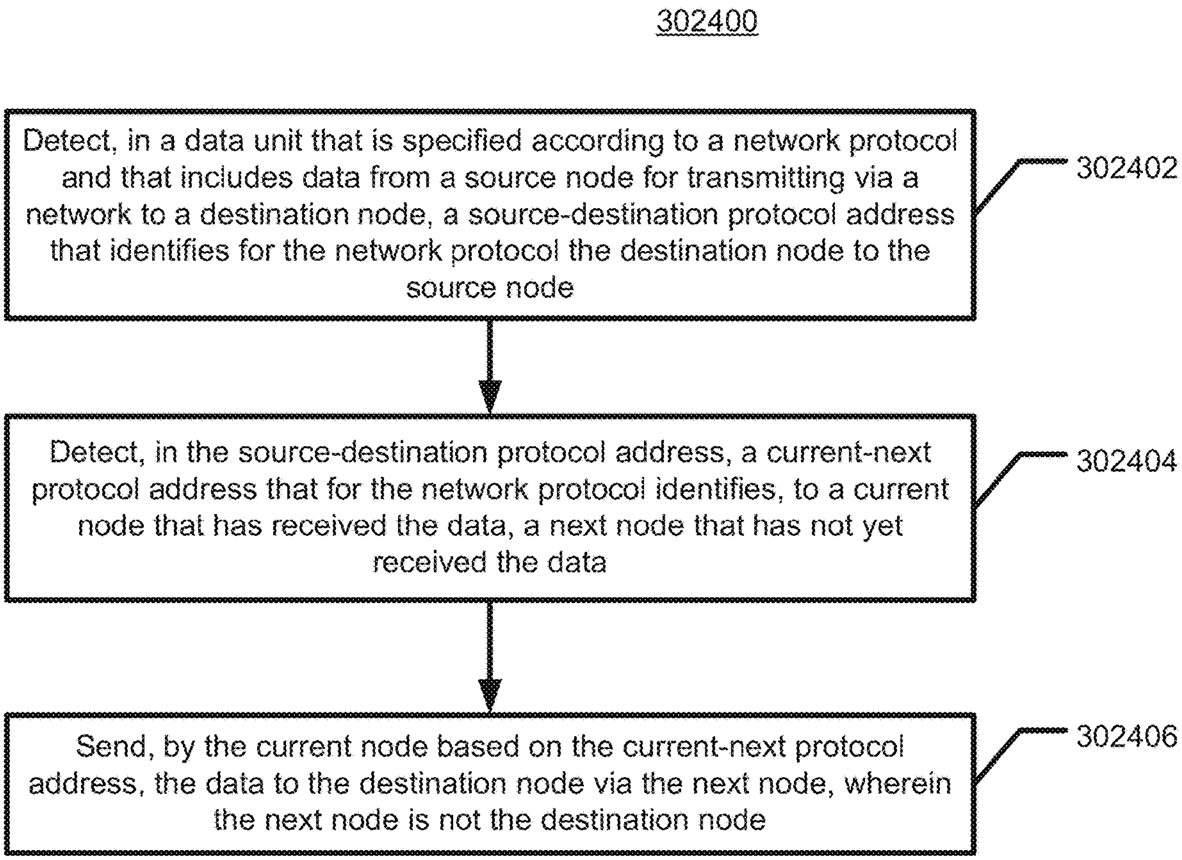
FIG. 69 is a diagram illustrating a method according to another aspect of the subject matter described herein.

FIG. 69 shows a method 302400. As an option, the present method 302400 may be implemented in the context of the functionality and architecture of FIGS. 46 and 68. Of course, however, the method 302400 may be carried out in any suitable operating environment. For example, logic in FIG. 68 may be included in one or more components of operating environment 30200 in FIG. 47.

As shown, the method 302400 includes detecting, in a data unit that is specified according to a network protocol and that includes data from a source node for transmitting via a network to a destination node, a source-destination protocol address that identifies for the network protocol the destination node to the source node. See operation 302402. Additionally, the method 302400 includes detecting, in the source-destination protocol address, a current-next protocol address that for the network protocol identifies, to a current node that has received the data, a next node that has not yet received the data. See operation 302404. Also, the method 302400 includes sending, by the current node based on the current-next protocol address, the data to the destination node via the next node, wherein the next node is not the destination node. See operation 302406.

Figure 70:
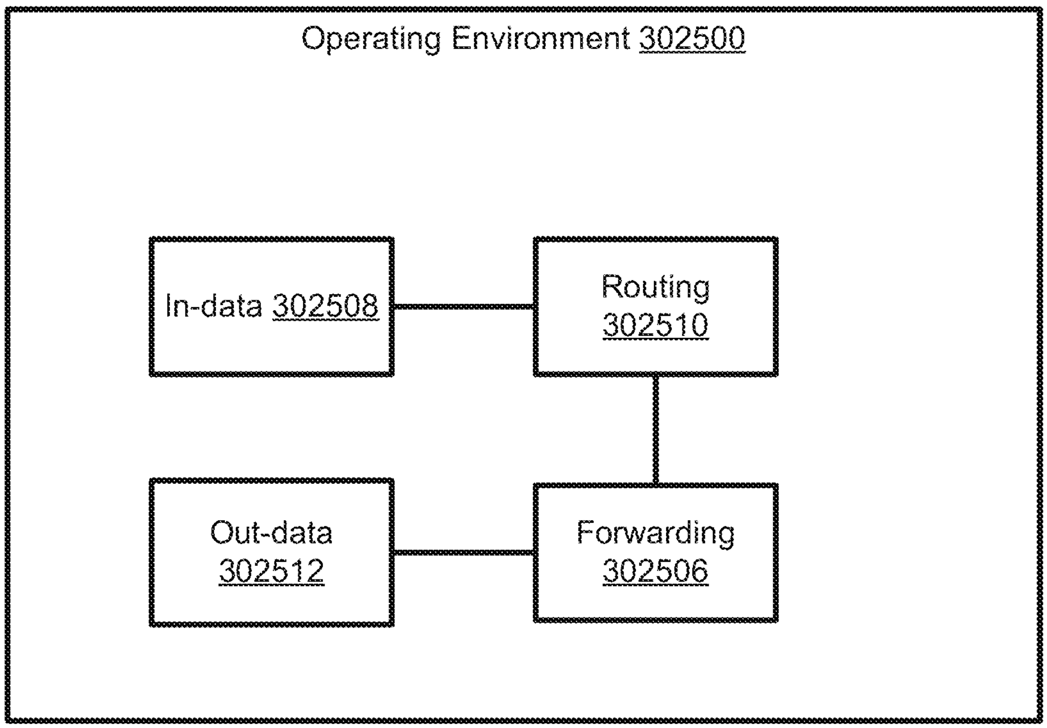
FIG. 70 is a block diagram illustrating an operating environment that includes logic for performing the method illustrated in FIG. 71 according to another aspect of the subject matter described herein.

FIG. 70 shows a representative operating environment 302500 that may be associated with node of FIG. 46A-C, in accordance with one embodiment. As shown, the operating environment 302500 may include logic 302502 that is executed in receiving, by a path node via a first network interface, data for delivering to a destination node from a source node via destination network path included in communicatively coupling the source node and the destination node, wherein the data is received in a data unit that for a network protocol includes an address field that includes at least one of a first path node identifier identifying a first path node in a first hop and a first hop identifier identifying the first hop that includes a first pair of nodes in a first portion of the destination network path and wherein the first hop is included in communicatively coupling the source node and the path node, logic 302504 that is executed in detecting, in the address field, at least one of a second path node identifier identifying a second path node in a second hop and a second hop identifier identifying the second hop that includes a second pair of nodes in a second portion of the destination network path, wherein the second hop is included in communicatively coupling the path node and the destination node, logic 302506 that is executed in identifying, based on the second address field, a second network interface included in communicatively coupling via the second portion the path node and the destination node, and logic 302508 that is executed in sending the data via the second network interface for delivery to the destination node.

Figure 71:
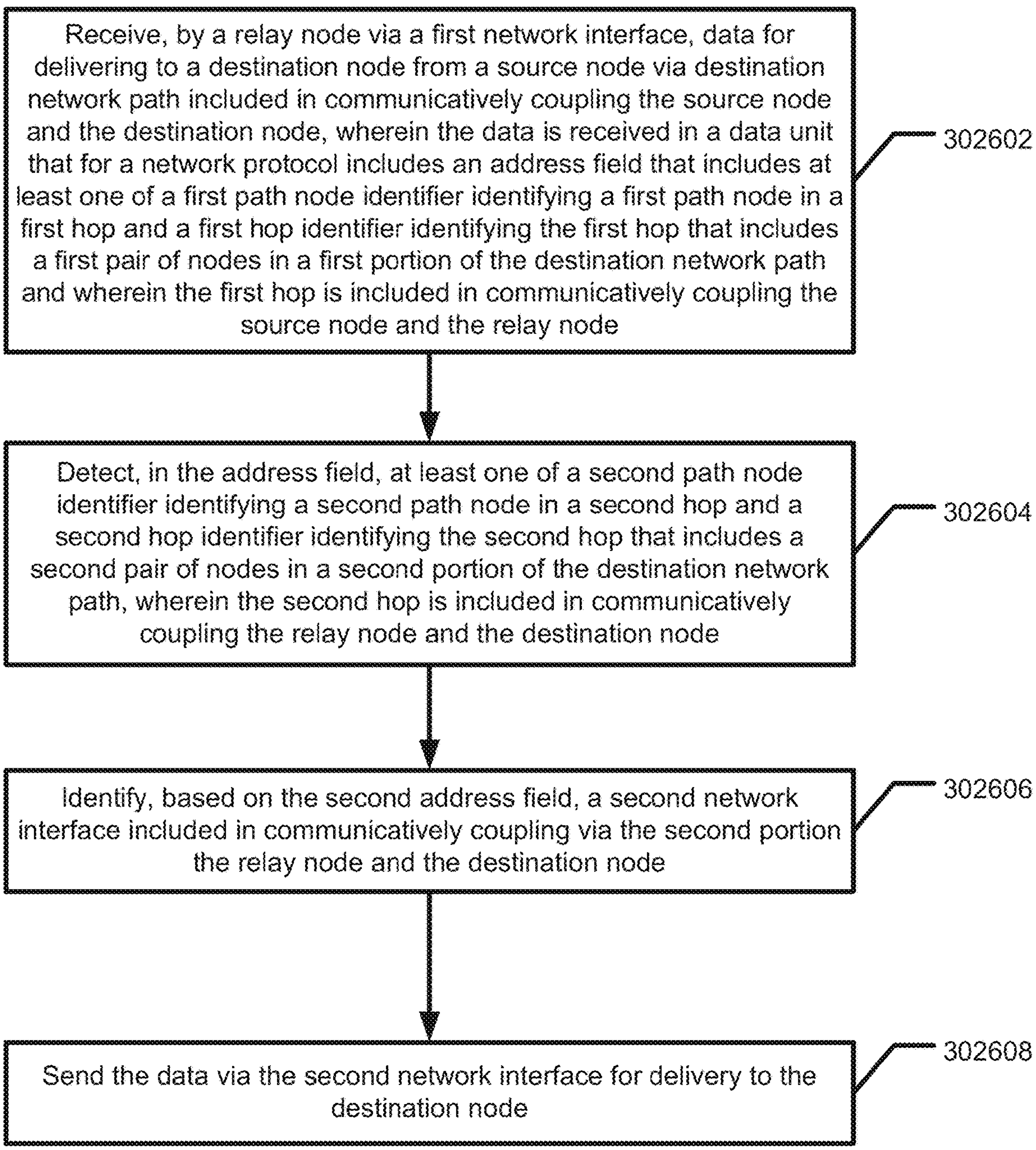
FIG. 71 is a diagram illustrating a method according to another aspect of the subject matter described herein.

FIG. 71 shows a method 302600. As an option, the present method 302600 may be implemented in the context of the functionality and architecture of FIGS. 46 and 70. Of course, however, the method 302600 may be carried out in any suitable operating environment. For example, logic in FIG. 70 may be included in one or more component of operating environment 30200 in FIG. 47.

As shown, the method 302600 includes receiving, by a path node via a first network interface, data for delivering to a destination node from a source node via destination network path included in communicatively coupling the source node and the destination node, wherein the data is received in a data unit that for a network protocol includes an address field that includes at least one of a first path node identifier identifying a first path node in a first hop and a first hop identifier identifying the first hop that includes a first pair of nodes in a first portion of the destination network path and wherein the first hop is included in communicatively coupling the source node and the path node. See operation 302602. Additionally, the method 302600 includes detecting, in the address field, at least one of a second path node identifier identifying a second path node in a second hop and a second hop identifier identifying the second hop that includes a second pair of nodes in a second portion of the destination network path, wherein the second hop is included in communicatively coupling the path node and the destination node. See operation 302604. Also, the method 302600 includes identifying, based on the second address field, a second network interface included in communicatively coupling via the second portion the path node and the destination node. See operation 302606. Further, the method 302600 includes sending the data via the second network interface for delivery to the destination node. See operation 302608.

A hop identifier in a protocol address may include at least one of the first node and the second node. The hop identifier may include a network interface identifier of a network interface of a node in the hop. In network 30100*b* in FIG. 46B, a sequence, 30151-30253.30151-3010, identifies a second node 30102*b*2 to a first node 30102*b*1. 30151-30253 is a scoped hop identifier that in the first network region 30106*b*1 identifies a first hop 30108*b*1 including the first node 30102*b*1 and a first path node 30104*b*1. 30151-3010 is a hop identifier that in the second network region 30106*b*2 identifies a fourth hop 30108*b*4 including the first path node 30104*b*1 and the second node 30102*b*2.

A protocol address that for a network protocol identifies a second node to a first node may be defined by a network protocol to include a network interface identifier identifying a network interface included in communicatively coupling a first node and a second node. With respect to FIG. 46B and the previous paragraph, 30253 is an identifier of a network interface of the first path node 30104*b* 1301 in the first network region. With respect to FIG. 46C, "303" may identify a network interface of a seventh path node 30104*c*7 to an eighth path node 30104*c*8 in a third hop 30108*c*3. "303" may alternatively or additionally identify a network interface of the eighth path node 30104*c*8 to the seventh path node 30104*c*7 in the second hop 30108*c*2

Figure 72:
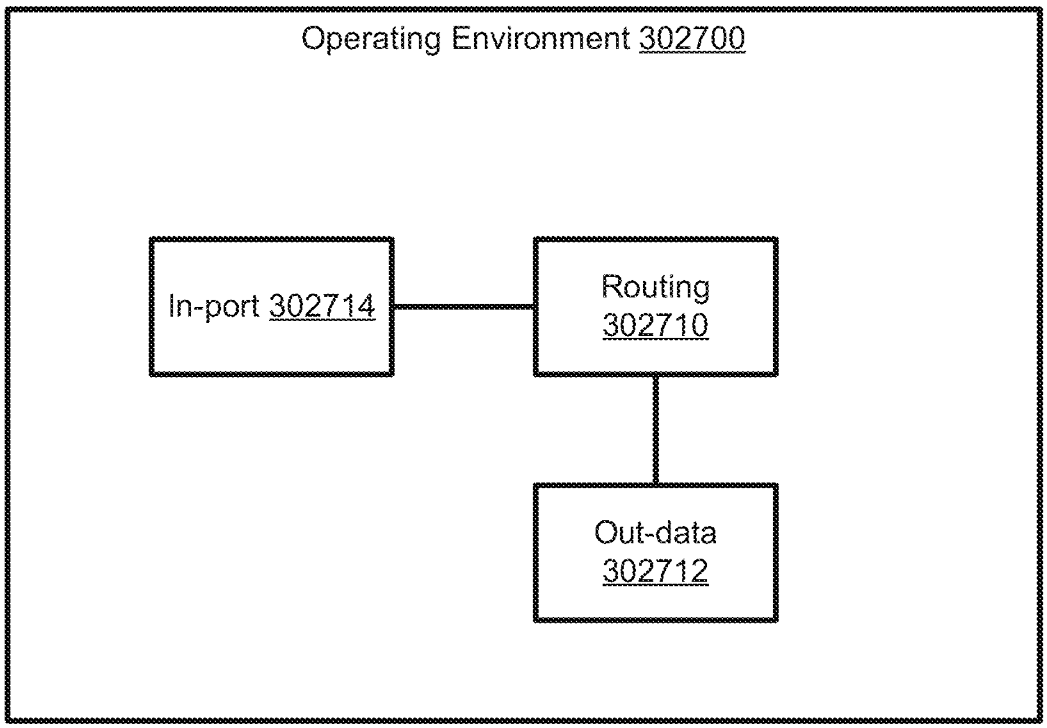
FIG. 72 is a block diagram illustrating an operating environment that includes logic for performing the method illustrated in FIG. 73 according to another aspect of the subject matter described herein.

FIG. 72 shows a representative operating environment 302700 that may be associated with nodes of FIGS. 46A-C, in accordance with one embodiment. As shown, the operating environment 302700 may include logic 302714 that is executed in detecting data from a component of a source node for sending to a destination node via a network path in a network, wherein the network path includes the source node and the destination node identified for a network protocol by a destination protocol address, logic 302710 that is executed in identifying, in the destination protocol address, a next protocol address of a next node in the network path that is not the destination node, and logic 302712 that is executed in sending, based on the next protocol address, the data to the next node.

Figure 73:
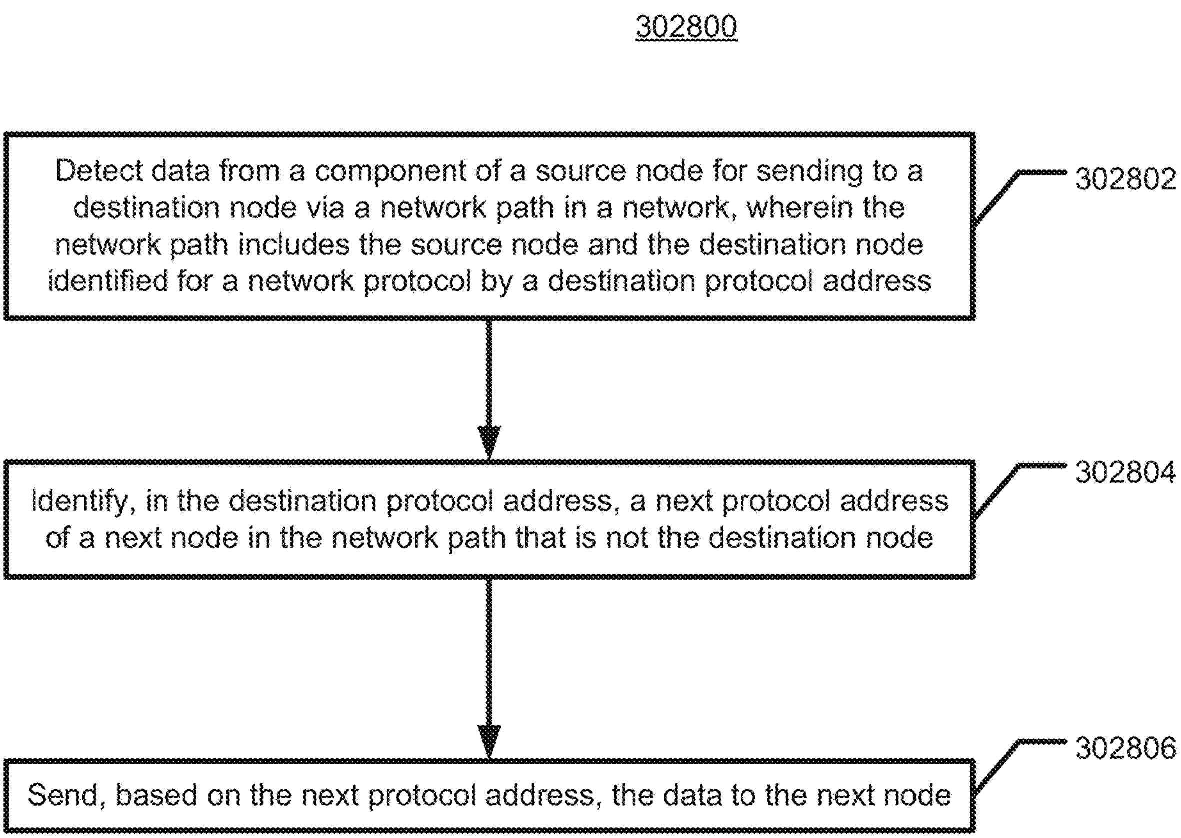
FIG. 73 is a diagram illustrating a method according to another aspect of the subject matter described herein.

FIG. 73 shows a method 302800. As an option, the present method 302800 may be implemented in the context of the functionality and architecture of FIGS. 46 and 72. Of course, however, the method 302800 may be carried out in any suitable operating environment. For example, logic in FIG. 72 may be included in one or more components of operating environment 30200 in FIG. 47.

As shown, the method 302800 includes detecting data from a component of a source node for sending to a destination node via a network path in a network, wherein the network path includes the source node and the destination node identified for a network protocol by a destination protocol address. See operation 302802. Additionally, the method 302800 includes Identifying, in the destination protocol address, a next protocol address of a next node in the network path that is not the destination node. See operation 302804. Also, the method 302800 includes sending, based on the next protocol address, the data to the next node. See operation 302806.

Figure 74:
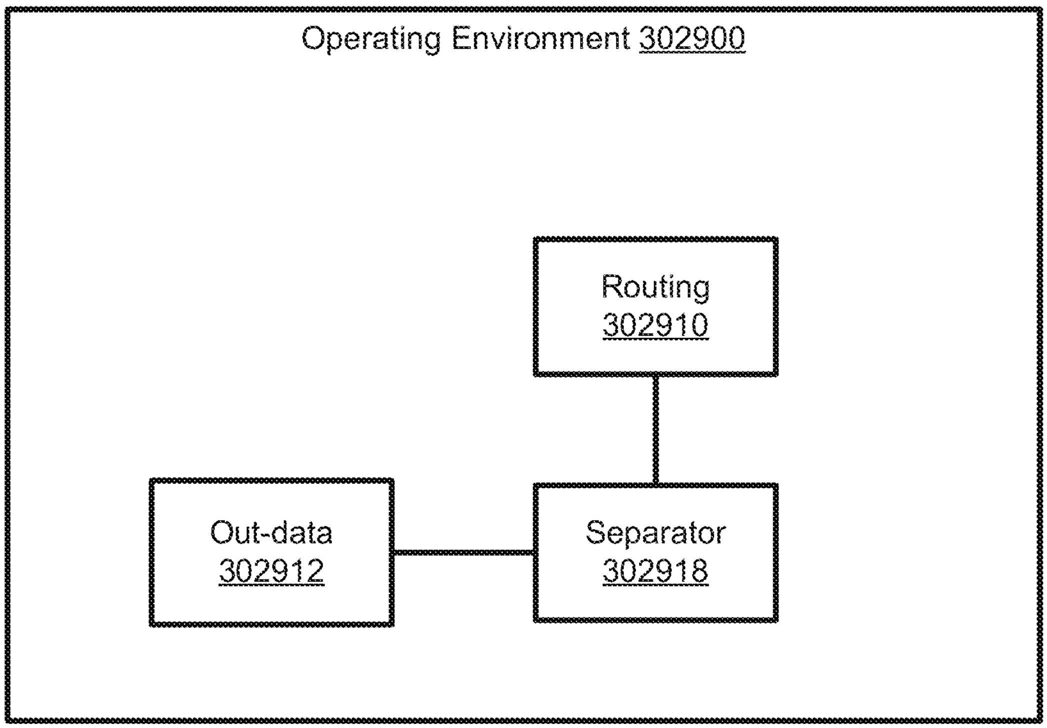
FIG. 74 is a block diagram illustrating an operating environment that includes logic for performing the method illustrated in FIG. 75 according to another aspect of the subject matter described herein.

FIG. 74 shows a representative operating environment 302900 that may be associated with nodes of FIG. 46A-C, in accordance with one embodiment. As shown, the environment 302900 may include logic 302910 that is executed in detecting, in a data unit included in sending data via a network protocol from a source node to a destination node via a network path that includes the source node and the destination node, an address field specified according to the network protocol to include a source protocol address, logic 302918 that is executed in identifying, in the address field, a previous portion for identifying a previous protocol address identifying a previous node in the network path that has received the data and a next portion for identifying a next protocol address identifying a next node in the network path that has not received the data, and logic 302912 that is executed in sending, based on the next portion, the data via the network for transmitting to the next node.

Figure 75:
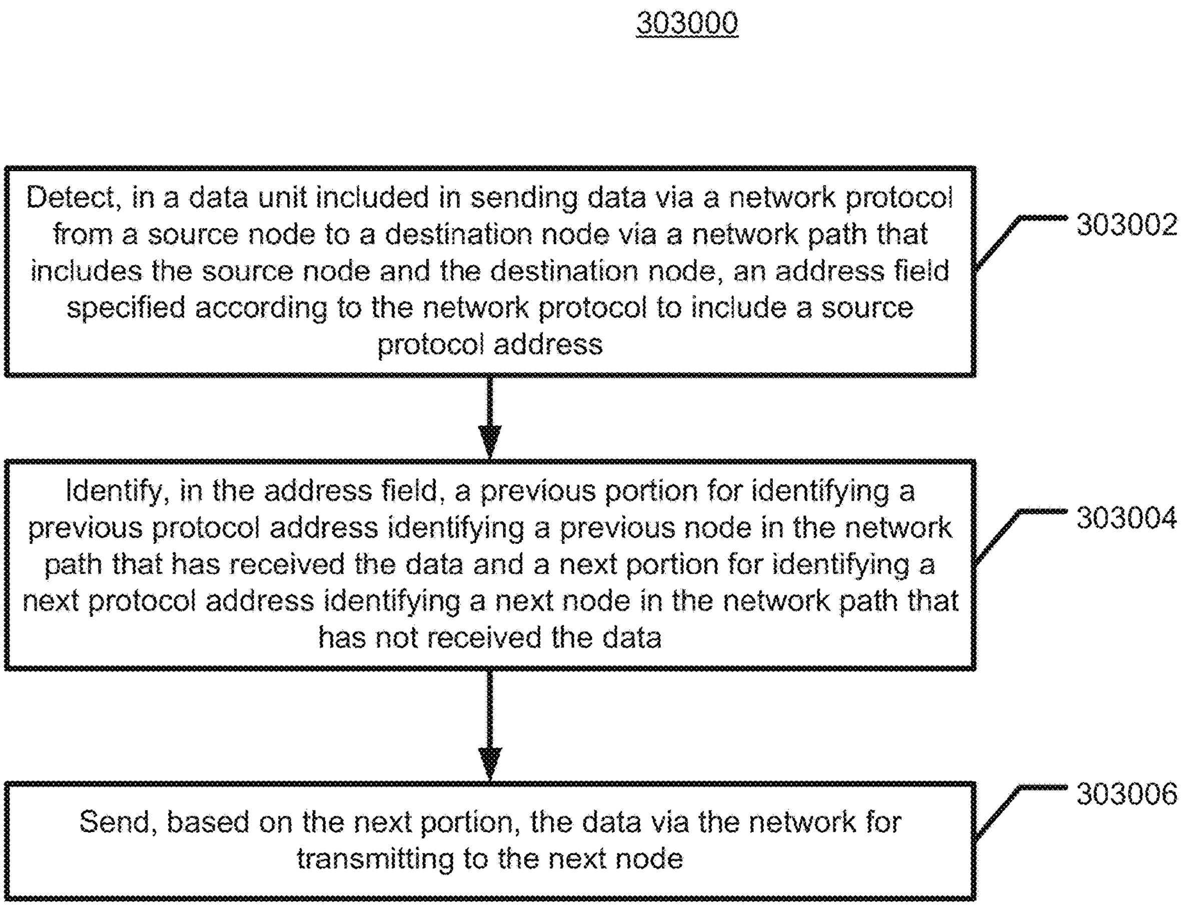
FIG. 75 is a diagram illustrating a method according to another aspect of the subject matter described herein.

FIG. 75 shows a method 303000. As an option, the present method 303000 may be implemented in the context of the functionality and architecture of FIGS. 46 and 74. Of course, however, the method 303000 may be carried out in any suitable operating environment. For example, logic in FIG. 74 may be included in one or more components of operating environment 30200 in FIG. 47.

As shown, the method 303000 includes detecting, in a data unit included in sending data via a network protocol from a source node to a destination node via a network path that includes the source node and the destination node, an address field specified according to the network protocol to include a source protocol address. See operation 303002. Additionally, the method 303000 includes identifying, in the address field, a previous portion for identifying a previous protocol address identifying a previous node in the network path that has received the data and a next portion for identifying a next protocol address identifying a next node in the network path that has not received the data. See operation 303004. Also, the method 303000 includes sending, based on the next portion, the data via the network for transmitting to the next node. See operation 303006.

With respect to FIG. 46A, at the second node 30102*a*2, the value in the separator address field may indicate to a routing component 30210 that an address data field 30704*a*, in FIG. 52A, also includes information for determining and/or otherwise identifying a second-first protocol address that identifies the first node 30102*a*1. An address representation 30700*a* may include source address information with respect to a node receiving data in a data unit, described in the previous paragraph, sent from the first node 30102*a*1 to the second node 30102*a*2. An address data field 30704*a* including source address information at the third path node 30104*a*3 may include a first address field 30704*a*1 identifying the sequence, 0.3, that identifies a protocol address that identifies the first node 30102*a*1 as the source node for the data in the data unit. The address data field 30704*a* including the source address information at the third path node 30104*a*3 may include a second address data field 30704*a*2 identifying the sequence 1.1 that identifies a protocol address that identifies the third path node 30104*a*3 as a path node in the network path traversed by the data sent from the first node 30102*a*1.

A destination-source protocol address, that in a destination scope-specific address space specific to a destination network region that includes the destination node, identifies the source node may be identified. A data unit may include separate address representations for destination address information and source address information as, for example, current IP packet headers are specified. Alternatively, a data unit such as an IP packet and or an Ethernet frame may include an address representation that identifies source address information in the context of one address space specific to a node, in a region, in a network path traversed by the data unit and identifies destination address information to another node, in another region in the network path. The protocol addresses may have variable lengths.

With respect to FIG. 46C, note that the address information that identifies protocol addresses for the second node 30102*c*2 and for the third node 30102*c*3 may include information for identifying a return path or a portion thereof. For example, the second-third protocol address 1.3.0 identifies 3.1, which may be a portion of a third-second protocol address that, in the third scope-specific address space, identifies the second node 30102*c*2 for nodes in the third region 30110*c*3. The first-second protocol address, 0.1.3.2.1, identifies 1.2.3.1 that, in the second-node-specific address space, identifies a network path from the second node to the first region 30110*c*1. Note that the second node may be in a region that includes only one node. The sequence, 1.2.3.1, however, does not identify any network interfaces of nodes in the first region 30110*c*1. Separate source address information may be included in a data unit sent to the second node 30102*c*2 that includes data sent from the first node 30102*c*1. The source address information may identify 1.2.3.1.101 as a second-first protocol address that, in the second node-specific address space, identifies the first node 30102*c*2. In, the first region 30110*c*1, 101 may be a scoped address that identifies the first node 30102*c*1 in the scope of the first region 30110*c*1. Thus, a scope-specific address may include a scoped address.

A sequence of hop identifiers based on interface identifiers may serve as a scope-specific address in one scope-specific address space when processed in one order of the sequence and may serve as another scope-specific address specific to another node when processed according to another order of the sequence. In FIG. 46B, a first node 30102*b*1 may be included in a first region that includes network interfaces coupling nodes to a first network 30106*b*1 included in the network 30100*b*. A second node 30102*b*2 may be included in a second region that includes network interfaces coupling nodes to a second network 30106*b*2. Each of the two nodes may identify the other by a protocol address in their respective scope-specific address spaces. For example, a sequence of scoped addresses 30253.3010 may be a protocol address that, in a first scope-specific address space specific to the first network 30106*b*1, may identify the second node 30102*b*2 to the first node 30102*b*1, as well as to other nodes in the first region defined by the first network 30106*b*1. A data unit including an address represented as in 30700*e* in FIG. 52E may identify a scope-specific address based on a sequence of scoped addresses. Similarly, a sequence of scoped addresses 30253.3010 may be a protocol address that, in a second scope-specific address space specific to the second network 30106*b*2, identifies a third node 30102*b*3 to the second node 30102*b*2 as well as to other nodes in the second region defined by the second network 30106*b*2.

As has been described above, a protocol address that for a network protocol identifies a second node to a first node may include a plurality of hop identifiers in an identifiable first order and in an identifiable second order, wherein the protocol address includes the plurality of hop identifiers in the first order and a second-first protocol address, that identifies the first node to the second node, includes the plurality of hop identifiers in the second order. At least one of the first order and the second order may be identified by sequence information defined by a schema of the network protocol in the data unit. The sequence information may be represented separately from the plurality of hop identifiers.

Figure 76:
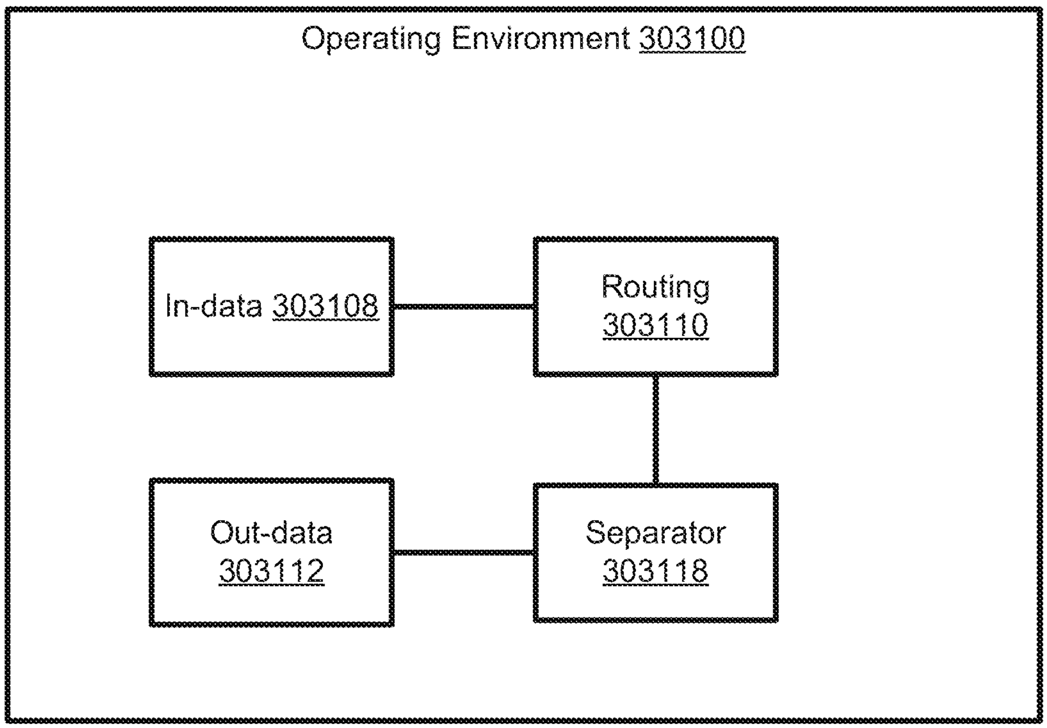
FIG. 76 is a block diagram illustrating an operating environment that includes logic for performing the method illustrated in FIG. 77 according to another aspect of the subject matter described herein.

FIG. 76 shows a representative operating environment 303100 that may be associated with nodes of FIG. 46A-C, in accordance with one embodiment. As shown, the operating environment 303100 may include logic 303108 that is executed in receiving a data unit that according to a network protocol includes an address field identifying a source-destination protocol address that identifies at least one of a source node and a destination node, logic 303110 that is executed in detecting next hop information in the data unit that identifies a first protocol address, in at least a portion of the source-destination protocol address, that identifies a first node in a network path, in a network, included in communicatively coupling the source node and the destination node, logic 303118 that is executed in changing the next hop information to identify a second protocol address, in at least a portion of the source-destination protocol address, that identifies a second node in the network path, and logic 303112 that is executed in sending the changed next hop information and data, received in the data unit, for transmitting, via the network path, to the destination node.

Figure 77:
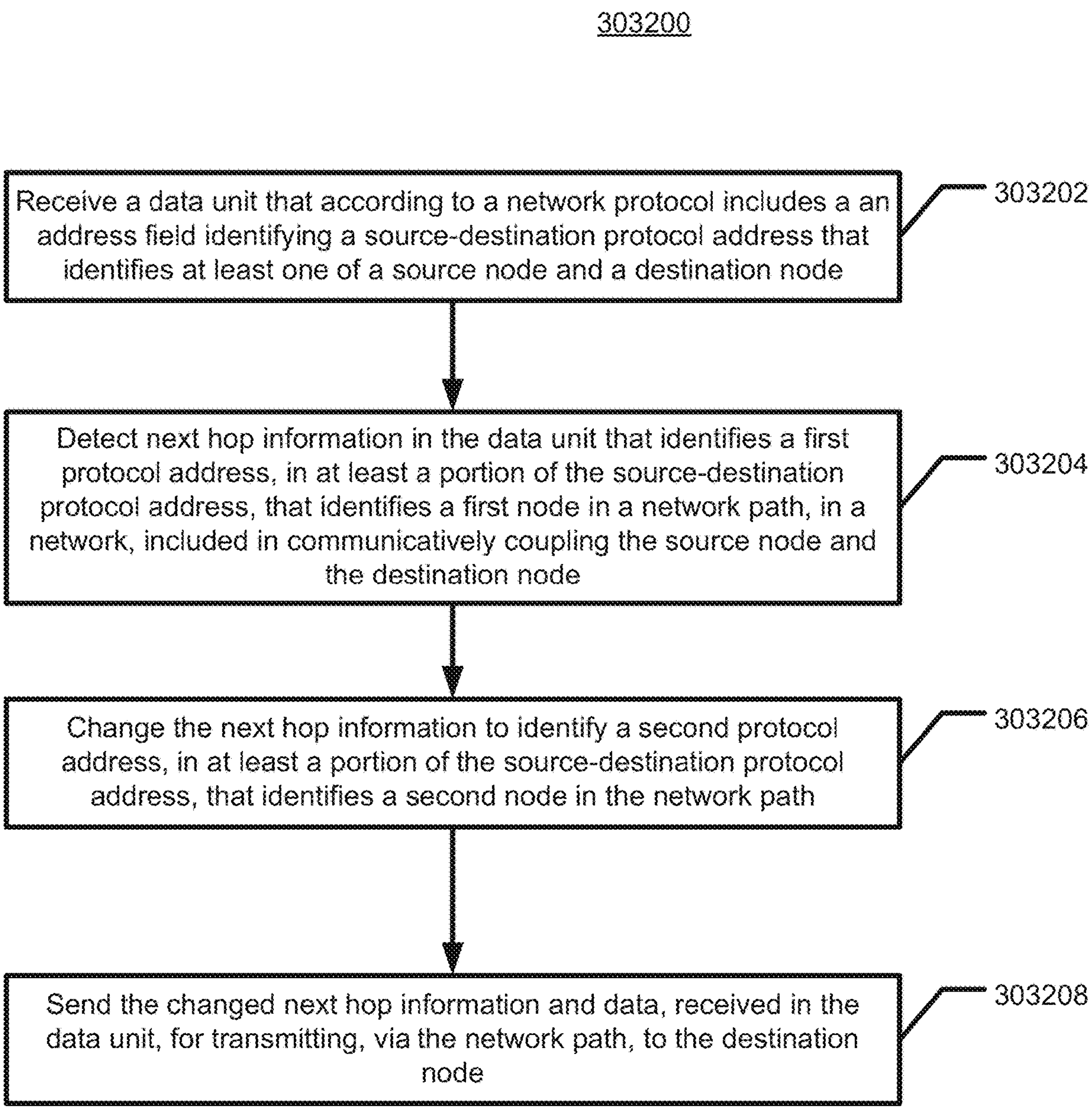
FIG. 77 is a diagram illustrating a method according to another aspect of the subject matter described herein.

FIG. 77 shows a method 303200. As an option, the present method 303200 may be implemented in the context of the functionality and architecture of FIGS. 46 and 76. Of course, however, the method 303200 may be carried out in any suitable operating environment. For example, logic in FIG. 56 may be included in one or more components of operating environment 30200 in FIG. 47.

As shown, the method 303200 includes receiving a data unit that according to a network protocol includes an address field identifying a source-destination protocol address that identifies at least one of a source node and a destination node. See operation 303202. Additionally, the method 303200 includes detecting next hop information in the data unit that identifies a first protocol address, in at least a portion of the source-destination protocol address, that identifies a first node in a network path, in a network, included in communicatively coupling the source node and the destination node. See operation 303204. Also, the method 303200 includes changing the next hop information to identify a second protocol address, in at least a portion of the source-destination protocol address, that identifies a second node in the network path. See operation 303206. Further, the method 303200 includes sending the changed next hop information and data, received in the data unit, for transmitting, via the network path, to the destination node. See operation 303208.

A protocol address that for a network protocol identifies a second node to a first node may include first hop information identifying a first hop including a first pair of communicatively coupled nodes included in communicatively coupling the first node and the second node. The sequence, 0.1.3.2.3.2, described in the previous paragraph includes the hop identifier 301 which identifies a fifth hop 30108*c*5 in the network 30100*c*. The first hop 30102*c*5 includes a fourth path node 30104*c*4 and a second path node 30104*c*2, included in a network path that communicatively couples the first node 30102*c*1 and the eleventh node 30102*c*11.

Figure 78:
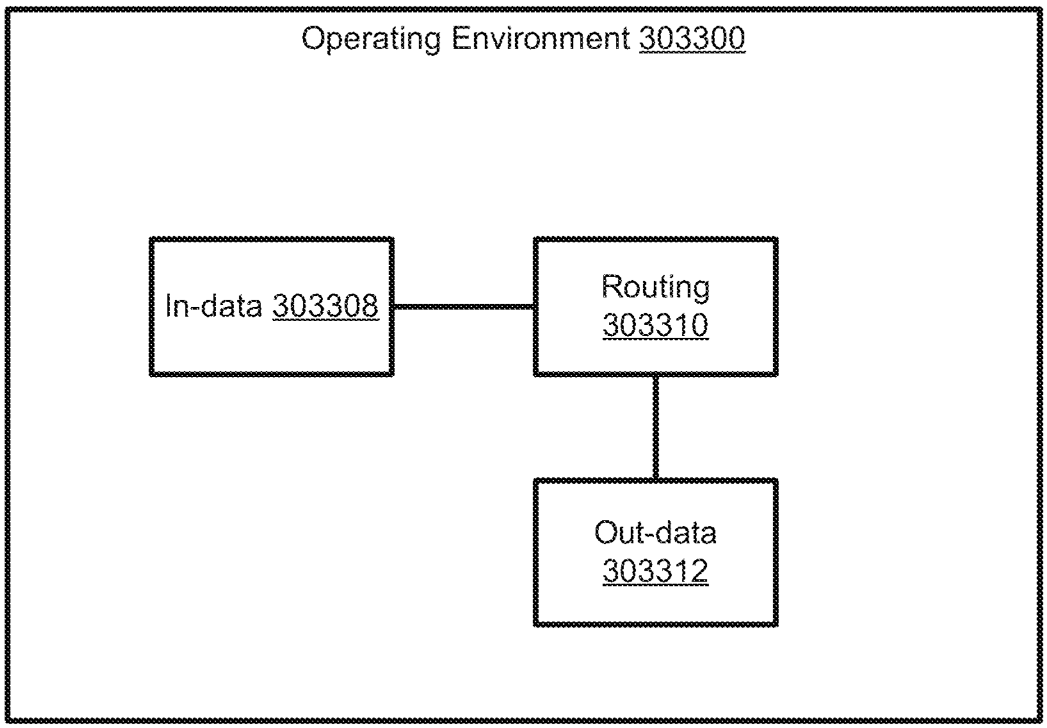
FIG. 78 is a block diagram illustrating an operating environment that includes logic for performing the method illustrated in FIG. 79 according to another aspect of the subject matter described herein.

FIG. 78 shows a representative operating environment 303300 that may be associated with nodes of FIG. 46A-C, in accordance with one embodiment. As shown, the operating environment 303300 may include logic 303308 that is executed in receiving, by a path node via a first network interface, data, for delivering via a network to destination node form a source node, in a data unit of a network protocol and that includes an address field identifying a first unicast protocol address, of the network protocol, that identifies the path node, wherein the address field is defined by the network protocol to identify a destination unicast protocol address that identifies the destination node, logic 303310 that is executed in identifying, in the destination protocol address, a second unicast protocol address, different than the destination address, that identifies the destination node, and logic 303312 that is executed in sending the data via a second network interface for delivery to the destination node.

Figure 79:
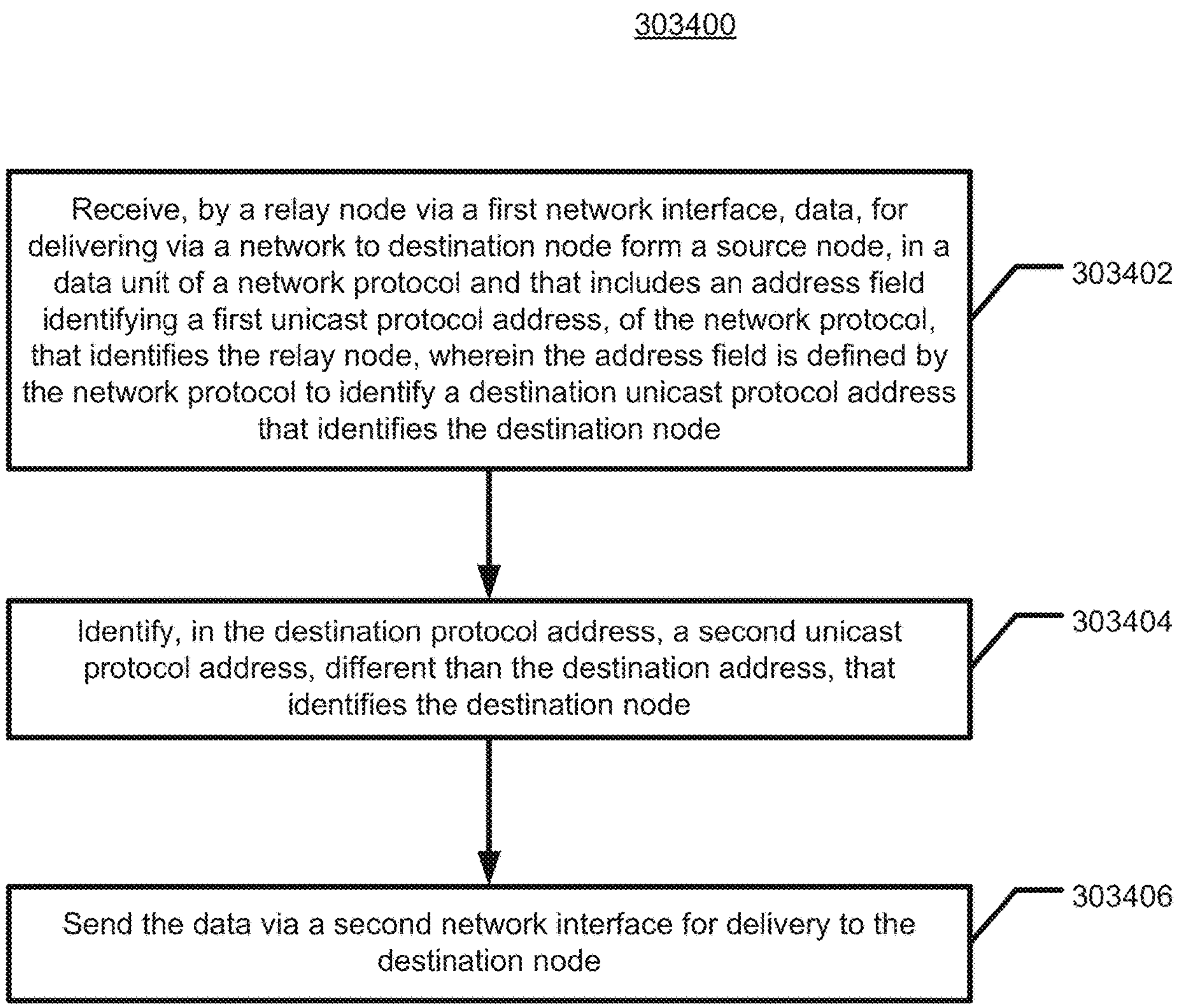
FIG. 79 is a diagram illustrating a method according to another aspect of the subject matter described herein.

FIG. 79 shows a method 303400. As an option, the present method 303400 may be implemented in the context of the functionality and architecture of FIGS. 46 and 78. Of course, however, the method 303400 may be carried out in any suitable operating environment. For example, logic in FIG. 78 may be included in one or more components of operating environment 30200 in FIG. 47.

As shown, the method 303400 includes receiving, by a path node via a first network interface, data, for delivering via a network to destination node form a source node, in a data unit of a network protocol and that includes an address field identifying a first unicast protocol address, of the network protocol, that identifies the path node, wherein the address field is defined by the network protocol to identify a destination unicast protocol address that identifies the destination node. See operation 303402. Additionally, the method 303400 includes receiving, by a path node via a first network interface, data, for delivering via a network to destination node form a source node, in a data unit of a network protocol and that includes an address field identifying a first unicast protocol address, of the network protocol, that identifies the path node, wherein the address field is defined by the network protocol to identify a destination unicast protocol address that identifies the destination node. See operation 303404. Also, the method 303400 includes sending the data via a second network interface for delivery to the destination node. See operation 303406.

Figure 80:
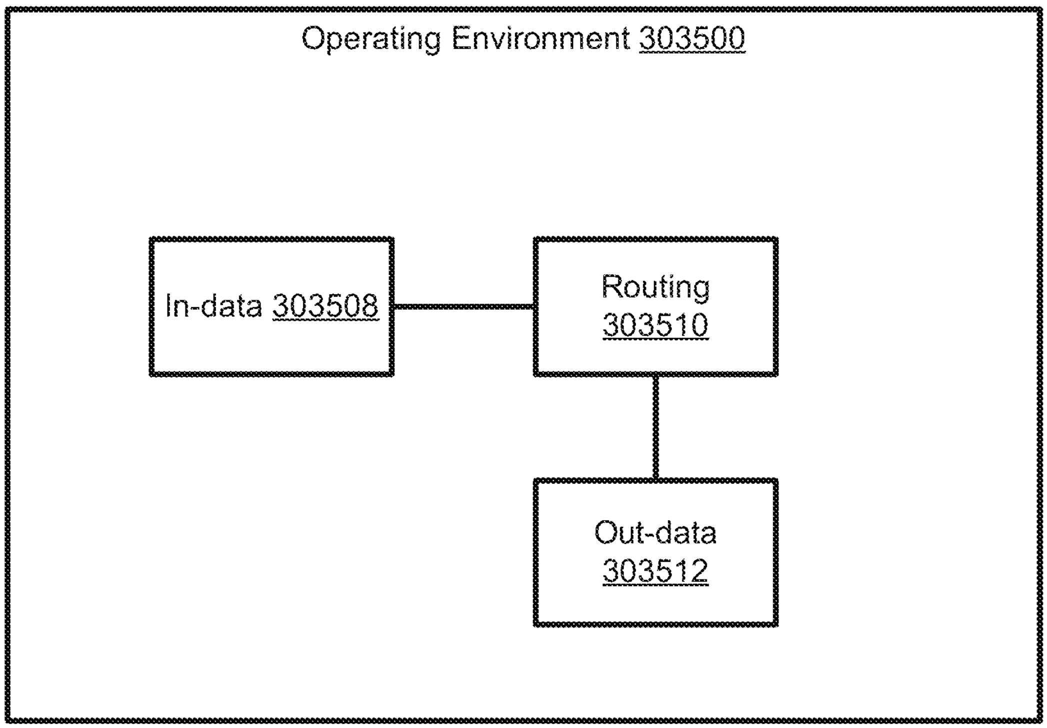
FIG. 80 is a block diagram illustrating an operating environment that includes logic for performing the method illustrated in FIG. 81 according to another aspect of the subject matter described herein.

FIG. 80 shows a representative operating environment 303500 that may be associated with the nodes of FIG. 46A-C, in accordance with one embodiment. As shown, the environment 303500 may include logic 303508 that is executed in detecting data, by a current node in a network path in a network, for sending from a source node to a destination node via the network path, wherein the network path includes the source node and the destination node, logic 303510 that is executed in identifying a next protocol address that, in a current node-specific address space specific to the current node, identifies a next node in the network path for a network protocol included in sending the data to the destination node, and logic 303512 that is executed in sending, via the network protocol and based on the next protocol address, the data to the next node by the current node.

Figure 81:
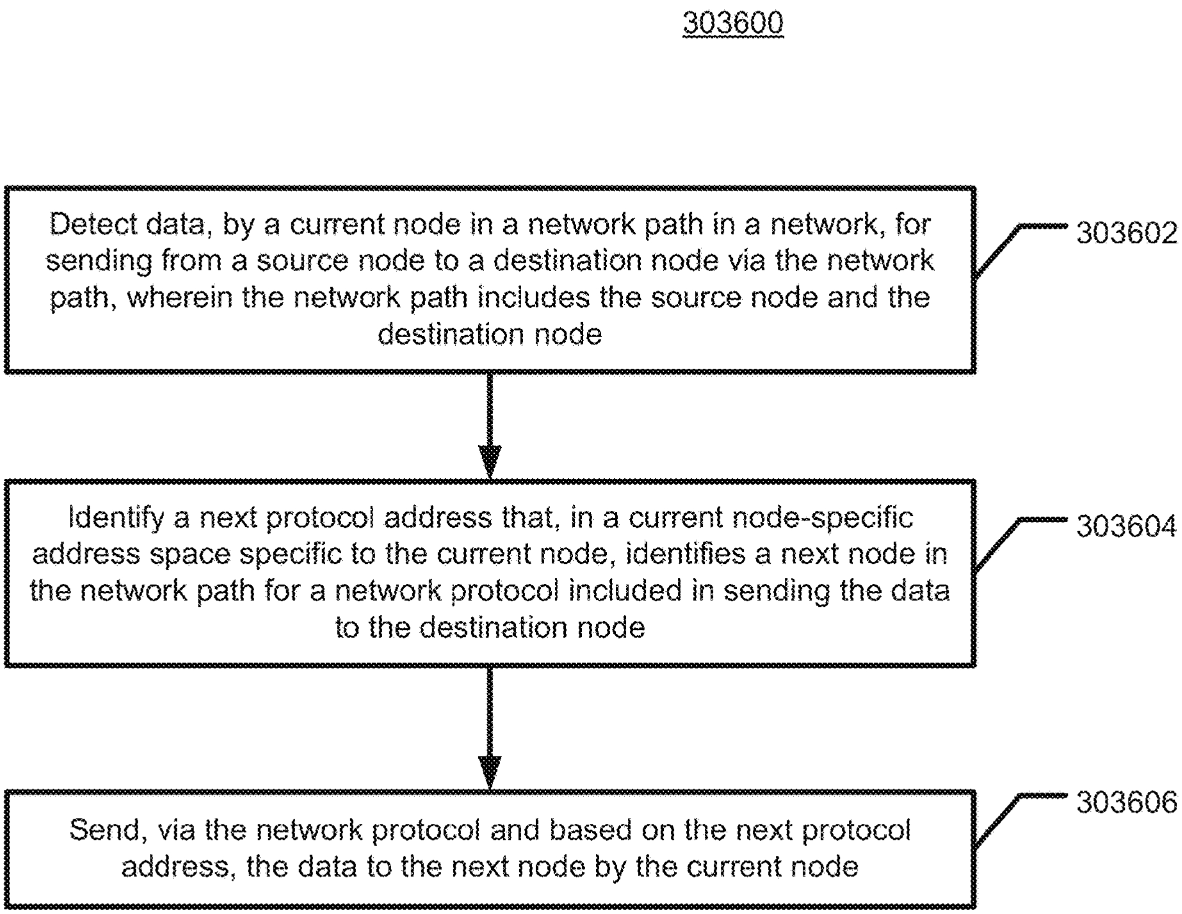
FIG. 81 is a diagram illustrating a method according to another aspect of the subject matter described herein.

FIG. 81 shows a method 303600. As an option, the present method 303600 may be implemented in the context of the functionality and architecture of FIGS. 46A-C and 80. Of course, however, the method 303600 may be carried out in any suitable operating environment. For example, logic in FIG. 80 may be included in one or more components of operating environment 30200 in FIG. 47.

As shown, the method 303600 includes detecting data, by a current node in a network path in a network, for sending from a source node to a destination node via the network path, wherein the network path includes the source node and the destination node. See operation 303602. Additionally, the method 303600 includes identifying a next protocol address that, in a current node-specific address space specific to the current node, identifies a next node in the network path for a network protocol included in sending the data to the destination node. See operation 303604. Also, the method 303600 includes sending, via the network protocol and based on the next protocol address, the data to the next node by the current node. See operation 303606.

A protocol address that for a network protocol identifies a second node to a first node may include an identifier of a network path included in communicatively coupling a first node and a second node. For example, with respect to FIGS. 52A-E and FIG. 46C, a sequence, 101-0.1.3.2.3.1-2, may represent a protocol address that identifies an eleventh node 30102*c*11 to a first node 30102*c*1 in a network 30100*c*. The address may be for a network layer protocol and/or one or more link layer protocols supported by portions of the network 30100*c*.

The description above with respect to FIGS. 52A-E and FIGS. 46A-C demonstrates that not only are nodes identifiable via scope-specific addresses from scope-specific address spaces, but a hop in a network may be identified by a scope-specific identifier from a scope-specific identifier space. In FIG. 46C, a second hop 30108*c*2 between a seventh path node 30104*c*7 and an eighth path node 30104*c*8 may be identified with respect to a first node 30102*c*1 by a hop identifier from a first scope-specific address space specific to the first node 30102*c*1. The sequence 0.1.3.2.3 identifies the second hop 30108*c*2 that includes a seventh path node 30104*c*7 and the eighth path node 30104*c*8. The second hop 30108*c*2 identified with respect to a sixth path node 30104*c*6 may be identified by the sequence, 0.3, in node-specific address space specific to the sixth path node 30104*c*6. The sequence 0.3 is an identifier that, in the third scope-specific address space specific to the third region 30110*c*3, identifies the second hop 30108*c*2. The number, 3, is an identifier that, in the seventh node-specific address space specific to the seventh path node 30104*c*7, identifies the second hop 30108*c*2.

As described above, sending data via a scope-specific address may include sending the data via a sequence of hops in a network path included in communicatively coupling a source node and a destination node. The source-destination protocol address may include a plurality of hop identifiers respectively identifying the hops in the sequence. They data may be sent via a first path node in a network path communicatively coupling the source node and the destination node. In an aspect, the first path node is not included in the source network region and the first path node is not included a destination network region that includes the destination node. The source-destination protocol address may include a source-first address that, in the source scope-specific address space and for the network protocol, identifies the first path node to the source node. The source-destination protocol address may include a first hop identifier that identifies a first hop in the network path, where the first hop includes at least one of the source node and the first path node Sending data in a data unit by a first node may include detecting, in the data unit, address separating information specified according to the network protocol for detecting at least one of a first-next protocol address information and a next-first protocol address information. The address separating information may be updated for identifying, by a next node included in communicatively coupling the first node and the second node, the at least one of the first-next protocol address information and next-first protocol address information in the address information, wherein the next-first protocol address information includes information for identifying the first node.

A protocol address, that for a network protocol identifies a second node to a first node, may include a first path node protocol address that, in the first scope-specific address space specific to the first region, identifies a first path node included in a first network path included in communicatively coupling the first node and the second node.

Additionally or alternatively, a protocol address, that for a network protocol identifies a second node to a first node, may include a second path node protocol address that, in the path node scope-specific address space specific to a path node region that includes the path node, identifies the second node. The path node is included in a network path that communicatively couples the first node and the second node Further, identifying a protocol address that for a network protocol identifies a second node to a first node may include identifying, based on the protocol address, the first path node protocol address and based path node second protocol address Sending data from a first node to a second node may include sending the data via a path node in a network path communicatively coupling the first node and the second node. The path node, in an aspect, is not included in a first network region that includes the first node and the path node is not included a second network region that includes the second node. The protocol address may include a first path node address that, in the first scope-specific address space and for the network protocol, identifies the path node to the first node and the protocol address includes a second path node address that, in a path-node-scope-specific address space specific to a path node network region that includes the path node, identifies the second node to the first path node for the network protocol Further, a protocol address that for a network protocol identifies a second node to a first node may include a first hop identifier that identifies a first hop in a network path. The first hop may one or both of the first node and the first path node. A first hop identifier may be assigned from the first scope-specific address space to identify the first hop in response to a negotiation between the first node and another node in the first hop. A protocol address that for a network protocol identifies a second node to a first node may include a second hop identifier that identifies a second hop in the network path, wherein the second hop includes at least one of the second node and the first path node A protocol address that for a network protocol identifies a second node to a first node may include a hop identifier that identifies a hop in the network path. The hop identifier may, in a scope-specific address space specific to a network region that includes one of a pair of nodes in the first hop, identify the other one of the pair of nodes. The hop includes a first hop node and a second hop node that are communicatively coupled via a first network interface in the first hop node and via a second network interface in the second hop node. The first hop identifier may include at one or more of a first network interface identifier identifying the first network interface and a second network interface identifying the second network interface to at least one of the first hop node and the second hop node As described various types of protocol addresses may conform to various schemas defining rules for formatting valid protocol addresses and/or defining vocabularies specifying valid content of a protocol address. Given a current node in a network path for transmitting data from a source node to a destination node, the current node may identify a next protocol address and/or a previous protocol address that are scope-specific protocol addresses according to various aspects as described above, and their analogs and extensions.

A next protocol address and/or a previous protocol address may be determined and/or otherwise identified based on one or more of a schema of one or more of a destination protocol address and/or a source protocol address identified in an address information of a data unit, a schema of a scope-specific hop identifier, a mapping between two or more of the schemas or portions thereof of two or more respective scope-specific address spaces, relationships between the nodes to which the protocol addresses are specific, relationships between the scope-specific address spaces of the protocol addresses, and relationships between the nodes in a network that includes them. Some of the relationships listed may be represented in a network topology of the network. A routing component 30210 may be configured to detect some or all of the network topology in determining a next protocol address and/or a previous protocol address.

In FIG. 47 a routing component 30210 may provide a next protocol address of a next node and/or forwarding information based on the next protocol address to a forwarding component 30206 for determining a network interface for sending data from a source node to a destination node via a next node in a network path from a current path node including the forwarding component 30206. In FIG. 47, a forwarding component 30206 is illustrated operatively coupled to a routing component 30210.

In an aspect, determining a next network interface based on a protocol address of a next node may include detecting a network interface identifier in the protocol address. In FIG. 46C, data in a data unit may be received by the seventh path node **30104*c*7 from the source node 30102*c*1. Address information in the data unit may identify the destination node 30102*c*7 via a protocol address, "101.0.1.2.3.0.51", representing a sequence of hops in a network path including the source node 30102*c*1 and the destination node 30102*c*7**.

As described above, the routing component may determine that a protocol address based on the sequence, "3.0.51", in the second scope-specific address space, identifies the destination node **30102*c*7. Further, the hop identifier, '3', may identify, in the second scope-specific address space, the eighth path node 30104*c*8 as a next node. The number '3', as described above is assigned to identify a hop including the seventh path seventh path node 30104*c*7 and the eighth path node, and thus identifies a network interface, in the seventh path node 30104*c*7**, that is included in the hop.

Identifying a next network interface may include performing a mapping and/or lookup that maps a portion of a protocol address of a next node to an identifier that identifies a NIC 30213 to a link layer component 30211. A next network interface may be identified by mapping a network layer address to a link layer address by means of a lookup table or record associating the network layer address with the link layer address.

For scope-specific protocol addresses that do not include an identifier of a next node, a similar lookup operation may be performed. In an aspect, a scope-specific address may be mapped to another address space such as global protocol address space or subnet-specific protocol address space shared by nodes in a portion of a network such as a LAN and/or a sub-network. Performing a mapping operation may reduce the number of lookup tables and/or records that must be maintained and/or otherwise accessed.

Protocol addresses illustrated in FIGS. 52A-E may include identifiers from scope-specific address spaces that identify a next node. In some aspects, a protocol address of next node includes an identifier of a network interface for transmitting data to a destination protocol address via a network path that includes a next node identified by the protocol address. Routing tables and/or routing policies are not required when protocol addresses include identifiers of next nodes. In some aspects, routing tables and routing policies may be supported to support addresses from global protocol address and may be supported when a hop identifier identifies a pair of nodes in a network path that are communicatively coupled via one or more other path nodes.

In FIG. 47, a forwarding component 30206 may provide data and a next protocol address to an out-data component 30212 for sending the data to a next node via a network interface identified by forwarding component 30206. The next node may be a destination node or a path node in a network path for transmitting data from a source node to the destination node. In FIG. 47, an out-data handler 30212 is illustrated operating in a network layer component 30209. The-out data component 30212 may include the data in one or more network layer protocol data units including an address information, as described above, addressed to the destination node according to a network layer protocol of the network protocol component 30209.

The one or more network layer protocol data units may be provided to a link layer component 30211 as data to include in one or more link layer protocol data units for transmitting via a NIC 30213 based on the network interface identified by the forwarding component 30206. In a node with one NIC operatively coupled to a physical data transmission medium or with multiple NICs operatively coupled to the shared data transmission medium, an out-data component 30212 may send network layer data units via the one NIC or any of the multiple NICs over the physical data transmission medium for delivery to the destination node according to network interface identified by the forwarding component 30213. Link layer protocol data units may be sent by the link layer component 30211 according to a compatible link layer protocol and link layer address information. For example, Ethernet frames may be sent as link layer protocol data units via an Ethernet cable operatively coupled to a NIC **30213*a*1** included in a suitable network path for transmitting the data to the destination node.

The following aspects of the method illustrated in FIG. 47 have been described above and illustrated in the drawings identified above. The address information referred to FIG. 47 may include next address information for identifying one or more of the current-next protocol address and a next-current protocol address that, in a next scope-specific address space specific to a next network region including the next node, identifies the current node. Further, the address information may include previous address information for identifying at least one of a previous-current protocol address that, in a previous scope-specific address space specific to a previous network region that includes the previous node, identifies the current node and a current-previous address that, in the current scope-specific address space, identifies the previous node.

Further, identifying the current-next protocol address may include identifying the current-next protocol address relative to a current location identifier that identifies a current location in a metric space including a network topology representing a node in the current network region. The current-next protocol address identifies a next location in the metric space relative to the current location and the next location represents the next node. The current location may be defined as an origin in the metric space and the current scope-specific address space may be defined based on the metric space and the origin. The current-next protocol address may identify a next network path included in communicatively coupling the current node and the next node and may identify a sequence of locations in the metric space that respectively represent nodes in the next network path according to the network topology.

Additionally, the source-destination protocol address and/or the destination-source protocol address may include a plurality of hop identifiers identifying a sequence of hopes in a network path included in communicatively coupling the source node and the destination node. The address information may include the plurality of hop identifiers in an identifiable first order and in an identifiable second order. The source-destination protocol address may include the plurality of hop identifiers in the first order. The destination-source protocol address may include the plurality of hop identifiers in the second order. One or both of the first order and the second may be identified in the address information. One or both of the first order and the second order may be identified by sequence information represented separately from the plurality of hop identifiers.

A first hop including a first hop node and a second hop node, both in the network path, may be identified with respect to the previous node by a previous hop identifier in a previous scope-specific address space specific to a previous network region that includes the previous node, identified with respect to the current node by a current hop identifier in the current scope-specific address space, and identified with respect to the next node by a next hop identifier in a next scope-specific address space specific to a next network region that includes the next node.

The first hop identifier may be assigned from a first scope-specific address space specific to a first network region that includes a network interface in the first hop node to identify the first hop in response to a negotiation between the nodes in the first hop.

The first hop node and the second hop node are communicatively coupled via a first network interface in the first hop node and via a second network interface in the second hop node, wherein the first hop identifier includes at least one of a first network interface identifier identifying the first network interface and a second network interface identifying the second network interface to at least one of the first hop node and the second hop node.

A current-first path hop identifier that, in the current scope-specific address space, identifies the first hop and the current-first path identifier includes the first hop identifier, wherein the current-first path hop identifier identifies a network path that includes the current node as a path end node, the first hop node, and the second hop node. The first hop may be included in communicatively coupling the current node and one of the source node and the destination node. The current node may be either the first hop node or the second hop node. The previous-current protocol address may include the first hop identifier or the current-next protocol address may include the first hop identifier.

Figure 82:
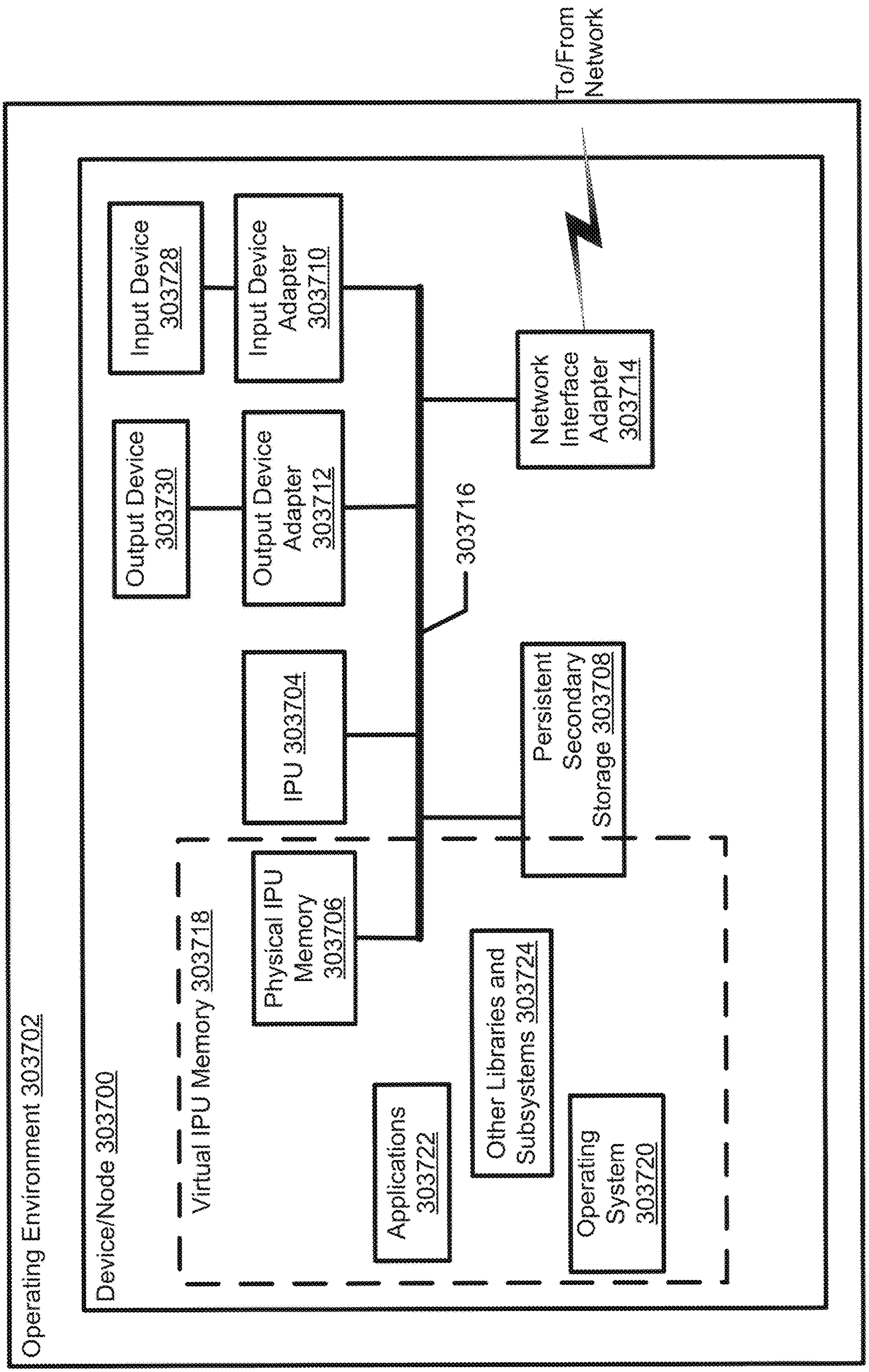
FIG. 82 is a block diagram illustrating an exemplary hardware device included in and/or otherwise providing an operating environment in which the subject matter may be implemented.

Operating Environment:

An exemplary device included in an operating environment that may be programmed, adapted, modified, and/or otherwise configured according to the subject matter of this disclosure is illustrated in FIG. 82. FIG. 82 illustrates a hardware device 303700 included in an operating environment 303702. FIG. 82 illustrates that operating environment 303702 includes a processor, illustrated as instruction processing unit (IPU) 303704, such as one or more microprocessors; a physical processor memory 303706 including storage locations identified by addresses in a physical memory address space of processor 303704; a persistent secondary storage 303708, such as one or more hard drives and/or flash storage media; an input device adapter 303710, such as a key or keypad hardware, a keyboard adapter, and/or a mouse adapter; an output device adapter 303712, such as a display and/or an audio adapter to present information to a user; a network interface component, illustrated by a network interface adapter 303714, to communicate via a network such as a LAN and/or WAN; and a mechanism that operatively couples elements 303704-303714, illustrated as a bus 303716. Elements 303704-303714 may be operatively coupled by various means. Bus 303716 may comprise any type of bus architecture, including a memory bus, a peripheral bus, a local bus, and/or a switching fabric.

Processor 303704 may access instructions and data via one or more memory address spaces in addition to the physical memory address space. A memory address space includes addresses identifying locations in a processor memory. The addresses in a memory address space are included in defining a processor memory. Processor 303704 may have more than one processor memory. Thus, processor 303704 may have more than one memory address space. Processor 303704 may access a location in a processor memory by processing an address identifying the location. The processed address may be identified by an operand of an instruction and/or may be identified by a register and/or other portion of processor 303704.

An address space including addresses that identify locations in a virtual processor memory is referred to as a "virtual memory address space"; its addresses are referred to as "virtual memory addresses"; and its processor memory is referred to as a "virtual processor memory" or "virtual memory". The term "processor memory" may refer to physical processor memory, such as processor memory 303706, and/or may refer to virtual processor memory, such as virtual processor memory 303718, depending on the context in which the term is used.

FIG. 82 illustrates a virtual processor memory 303718 spanning at least part of physical processor memory 303706 and may span at least part of persistent secondary storage 303708. Virtual memory addresses in a memory address space may be mapped to physical memory addresses identifying locations in physical processor memory 303706. Both physical processor memory 303706 and virtual processor memory 303718 are processor memory, as defined above.

Physical processor memory 303706 may include various types of memory technologies. Exemplary memory technologies include static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Ferroelectric RAM (FRAM), RAMBUS DRAM (RDRAM) Direct DRAM (DRDRAM), and/or XDRTM DRAM. Physical processor memory 303706 may include volatile memory as illustrated in the previous sentence and/or may include non-volatile memory such as non-volatile flash RAM (NVRAM) and/or ROM.

Persistent secondary storage 303708 may include one or more flash memory storage devices, one or more hard disk drives, one or more magnetic disk drives, and/or one or more optical disk drives. Persistent secondary storage may include a removable data storage medium. The drives and their associated computer readable media provide volatile and/or nonvolatile storage for computer-executable instructions, data structures, software components, and other data.

Operating environment 303702 may include software components stored in persistent secondary storage 303708, in remote storage accessible via a network, and/or in a processor memory. FIG. 82 illustrates operating environment 303702 including an operating system 303720, one or more applications 303722, and other software components and/or data components illustrated by other libraries and subsystems 303724. In an aspect, some or all software components may be stored in locations accessible to processor 303704 in a shared memory address space shared by the software components. The software components accessed via the shared memory address space may be stored in a shared processor memory defined by the shared memory address space. In another aspect, a first software component may be stored in one or more locations accessed by processor 303704 in a first address space and a second software component may be stored in one or more locations accessed by processor 303704 in a second address space. The first software component is stored in a first processor memory defined by the first address space and the second software component is stored in a second processor memory defined by the second address space.

Operating environment 303702 may receive user-provided information via one or more input devices illustrated by an input device 303728. Input device 303728 provides input information to other components in operating environment 303702 via input device adapter 303710. Operating environment 303702 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 303728 included in operating environment 303702 may be included in device 303700 as FIG. 82 illustrates or may be external (not shown) to device 303700. Operating environment 303702 may include one or more internal and/or external input devices. External input devices may be connected to device 303700 via corresponding network interfaces such as a serial port, a parallel port, and/or a universal serial bus (USB) port. Input device adapter 303710 may receive input and provide a representation to bus 303716 to be received by processor 303704, physical processor memory 303706, and/or other components included in operating environment 303702.

An output device 303730 in FIG. 46 exemplifies one or more output devices that may be included in and/or that may be external to and operatively coupled to device 303700. For example, output device 303730 is illustrated connected to bus 303716 via output device adapter 303712. Output device 303730 may be a display device. Exemplary display devices include liquid crystal displays (LCDs), light emitting diode (LED) displays, and projectors. Output device 303730 presents output of operating environment 303702 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an operating environment may operate in a networked environment communicating with one or more devices via one or more network interface components. FIG. 82 illustrates network interface adapter (NIA) 303714 as a network interface component included in operating environment 303702 to operatively couple device 303700 to a network. A network interface component includes a network interface hardware (NIH) component and optionally a network interface software (NIS) component. Exemplary network interface components include network interface controllers, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., AMPS, TDMA, CDMA, GSM, GPRS UMTS, and/or PCS network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

Exemplary devices included in and/or otherwise providing suitable operating environments that may be adapted, programmed, and/or otherwise modified according to the subject matter include a workstation, a desktop computer, a laptop or notebook computer, a server, a handheld computer, a mobile telephone or other portable telecommunication device, a media playing device, a gaming system, a tablet computer, a portable electronic device, a handheld electronic device, a multiprocessor device, a distributed system, a consumer electronic device, a router, a switch, a bridge, a network server, or any other type and/or form of computing, telecommunications, network, and/or media device that is suitable to perform the subject matter described herein. Those skilled in the art will understand that the components illustrated in FIG. 82 are exemplary and may vary by particular operating environment. An operating environment may be and/or may include a virtual operating environment including software components operating in a host operating environment.

FIG. 82 illustrates components of an exemplary device that may at least partially provide and/or otherwise be included in an operating environment. The components illustrated in FIG. 47 may be included in or otherwise combined with the components of FIG. 82 to create a variety of arrangements of components according to the subject matter described herein.

Performing the methods described herein, any extensions, and/or any other aspects may include one or more of, but is not limited to, calling a function or method of an object, sending a message via a network; sending a message via an interprocess communication mechanism such as a pipe, a semaphore, a shared data area, and/or a queue; and/or receiving a request such as poll and responding to invoke, and sending an asynchronous message.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

Various embodiments set forth herein may be implemented utilizing hardware, software, or any desired combination thereof. For that matter, any type of logic may be utilized which is capable of implementing the various functionality set forth herein.

Illustrative information is provided above regarding various optional architectures and features with which the foregoing frameworks may or may not be implemented, per the desires of the user. It should be strongly noted that such illustrative information is set forth for illustrative purposes and should not be construed as limiting in any manner. Any of the aspects identified by the illustrative information may be optionally incorporated with or without the exclusion of any other of the aspects. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a software component in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. By way of example, and not limitation, computer readable media may comprise computer storage media and communication media. Computer storage media includes volatile and nonvolatile, removable and non-removable media implemented in any method or technology for storage of information such as computer readable instructions, data structures, software components or other data. Computer storage media includes, but is not limited to, Random Access Memory (RAM), Read Only Memory (ROM); Electrically Erasable Programmable Read Only Memory (EEPROM); flash memory or other memory technology; portable computer diskette; Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by an operating environment.

Communication media typically embodies computer readable instructions, data structures, software components, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Thus, the subject matter described herein may be embodied in many different forms, and all such forms are contemplated to be within the scope of what is claimed. It will be understood that various details may be changed without departing from the scope of the claimed subject matter.

The use of the terms "a" and "a" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The use of "including", "comprising", "having", and variations thereof are meant to encompass the items listed thereafter and equivalents thereof as well as additional items and equivalents thereof. Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided to", "received from", "identified to", "interoperated" and similar terms and their variants.

As used herein, any reference to an entity "in" an association is equivalent to describing the entity as "included in and/or identified by" the association, unless explicitly indicated otherwise.

Unless otherwise defined, unless otherwise defined herein all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety, unless explicitly stated otherwise. In case of conflict, the present disclosure, including definitions, will control. In addition, the materials, methods, and examples are illustrative only and not intended to be limiting.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

Figure 83:
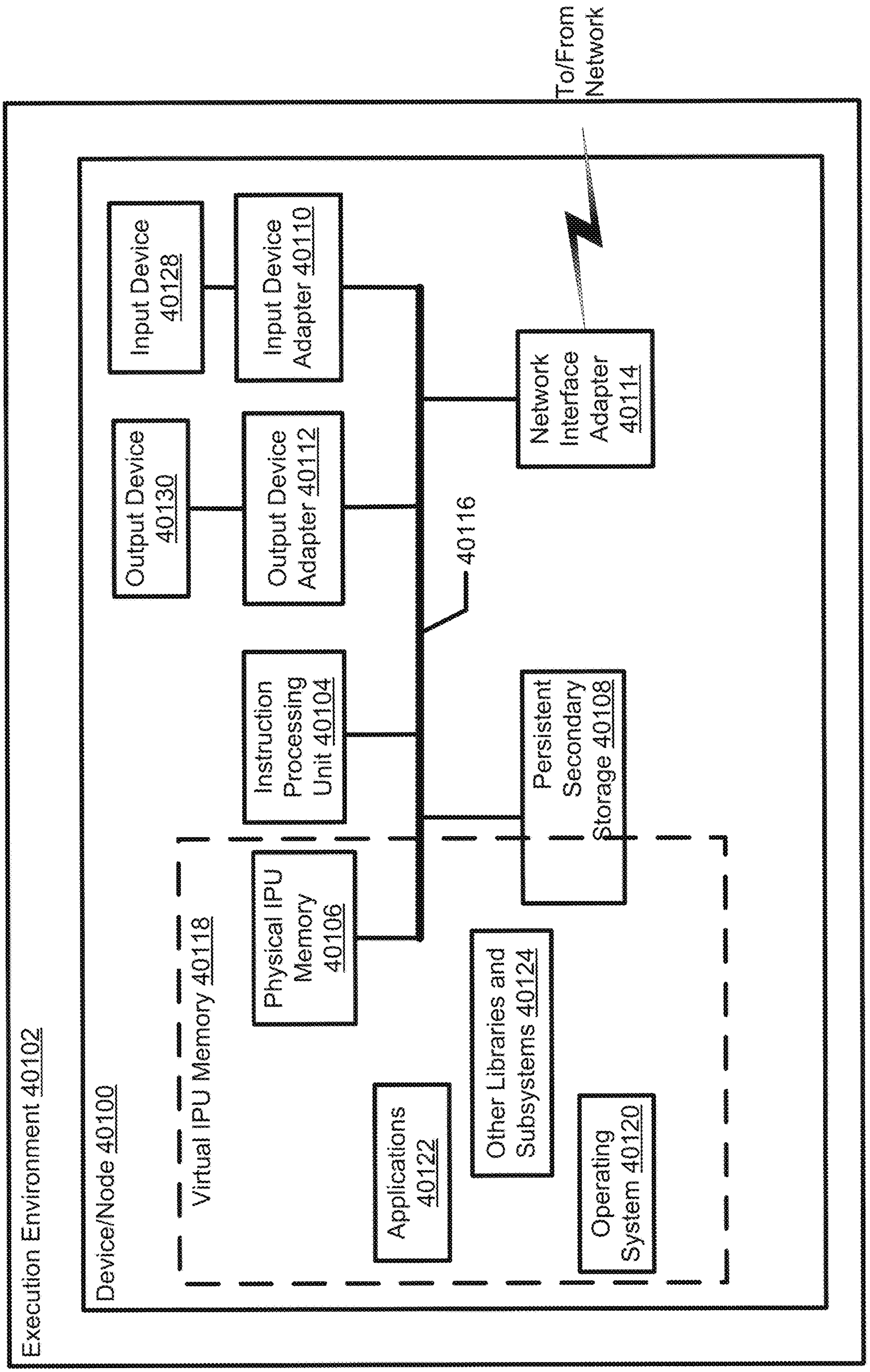
FIG. 83 is a block diagram illustrating an exemplary hardware device included in and/or otherwise providing an execution environment in which the subject matter may be implemented.

An exemplary device included in an execution environment that may be programmed, adapted, modified, and/or otherwise configured according to the subject matter is illustrated in FIG. 83. FIG. 83 illustrates a hardware device 40100 included in an execution environment 40102. FIG. 83 illustrates that execution environment 40102 includes a processor 40104, such as one or more microprocessors; a physical processor memory 40106 including storage locations identified by addresses in a physical memory address space of processor 40104; a persistent secondary storage 40108, such as one or more hard drives and/or flash storage media; an input device adapter 40110, such as a key or keypad hardware, a keyboard adapter, and/or a mouse adapter; an output device adapter 40112, such as a display and/or an audio adapter to present information to a user; a network interface component, illustrated by a network interface adapter 40114, to communicate via a network such as a LAN and/or WAN; and a mechanism that operatively couples elements 40104-40114, illustrated as a bus 40116. Elements 40104-40114 may be operatively coupled by various means. Bus 40116 may comprise any type of bus architecture, including a memory bus, a peripheral bus, a local bus, and/or a switching fabric.

Processor 40104 may access instructions and data via one or more memory address spaces in addition to the physical memory address space. A memory address space includes addresses identifying locations in a processor memory. The addresses in a memory address space are included in defining a processor memory. Processor 40104 may have more than one processor memory. Thus, processor 40104 may have more than one memory address space. Processor 40104 may access a location in a processor memory by processing an address identifying the location. The processed address may be identified by an operand of an instruction and/or may be identified by a register and/or other portion of processor 40104.

FIG. 83 illustrates a virtual processor memory 40118 spanning at least part of physical processor memory 40106 and may span at least part of persistent secondary storage 40108. Virtual memory addresses in a memory address space may be mapped to physical memory addresses identifying locations in physical processor memory 40106. Both physical processor memory 40106 and virtual processor memory 40118 are processor memory, as defined above.

Physical processor memory 40106 may include various types of memory technologies. Exemplary memory technologies include static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 40100 SDRAM, Double Data Rate SDRAM (DDR SDRAM), Enhanced SDRAM (ESDRAM), SyncLink DRAM (SLDRAM), Ferroelectric RAM (FRAM), RAMBUS DRAM (RDRAM) Direct DRAM (DRDRAM), and/or XDRTM DRAM. Physical processor memory 40106 may include volatile memory as illustrated in the previous sentence and/or may include non-volatile memory such as non-volatile flash RAM (NVRAM) and/or ROM.

Persistent secondary storage 40108 may include one or more flash memory storage devices, one or more hard disk drives, one or more magnetic disk drives, and/or one or more optical disk drives. Persistent secondary storage may include a removable data storage medium. The drives and their associated computer readable media provide volatile and/or nonvolatile storage for computer-executable instructions, data structures, software components, and other data.

Execution environment 40102 may include software components stored in persistent secondary storage 40108, in remote storage accessible via a network, and/or in a processor memory. FIG. 83 illustrates execution environment 40102 including an operating system 40120, one or more applications 40122, and other software components and/or data components illustrated by other libraries and subsystems 40124. In an aspect, some or all software components may be stored in locations accessible to processor 40104 in a shared memory address space shared by the software components. The software components accessed via the shared memory address space may be stored in a shared processor memory defined by the shared memory address space. In another aspect, a first software component may be stored in one or more locations accessed by processor 40104 in a first address space and a second software component may be stored in one or more locations accessed by processor 40104 in a second address space. The first software component is stored in a first processor memory defined by the first address space and the second software component is stored in a second processor memory defined by the second address space.

Execution environment 40102 may receive user-provided information via one or more input devices illustrated by an input device 40128. Input device 40128 provides input information to other components in execution environment 40102 via input device adapter 40110. Execution environment 40102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 40128 included in execution environment 40102 may be included in device 40100 as FIG. 83 illustrates or may be external (not shown) to device 40100. Execution environment 40102 may include one or more internal and/or external input devices. External input devices may be connected to device 40100 via corresponding network interfaces such as a serial port, a parallel port, and/or a universal serial bus (USB) port. Input device adapter 40110 may receive input and provide a representation to bus 40116 to be received by processor 40104, physical processor memory 40106, and/or other components included in execution environment 40102.

An output device 40130 in FIG. 83 exemplifies one or more output devices that may be included in and/or that may be external to and operatively coupled to device 40100. For example, output device 40130 is illustrated connected to bus 40116 via output device adapter 40112. Output device 40130 may be a display device. Exemplary display devices include liquid crystal displays (LCDs), light emitting diode (LED) displays, and projectors. Output device 40130 presents output of execution environment 40102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. FIG. 83 illustrates network interface adapter (NIA) 40114 as a network interface component included in execution environment 40102 to operatively couple device 40100 to a network. A network interface component includes a network interface hardware (NIH) component and optionally a network interface software (NIS) component. Exemplary network interface components include network interface controllers, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., AMPS, TDMA, CDMA, GSM, GPRS UMTS, and/or PCS network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

Some components, illustrated in the drawings are identified by numbers with an alphanumeric suffix. A component may be referred to generically in the singular or the plural by dropping a suffix of a portion thereof of the component's identifier. For example, execution environments; such as execution environment 40401*a*, execution environment 40401*b*, and their adaptations and analogs; are referred to herein generically as an execution environment 40401 or execution environments 40401 when describing more than one. Other components identified with an alphanumeric suffix may be referred to generically or as a group in a similar manner.

Figure 84:
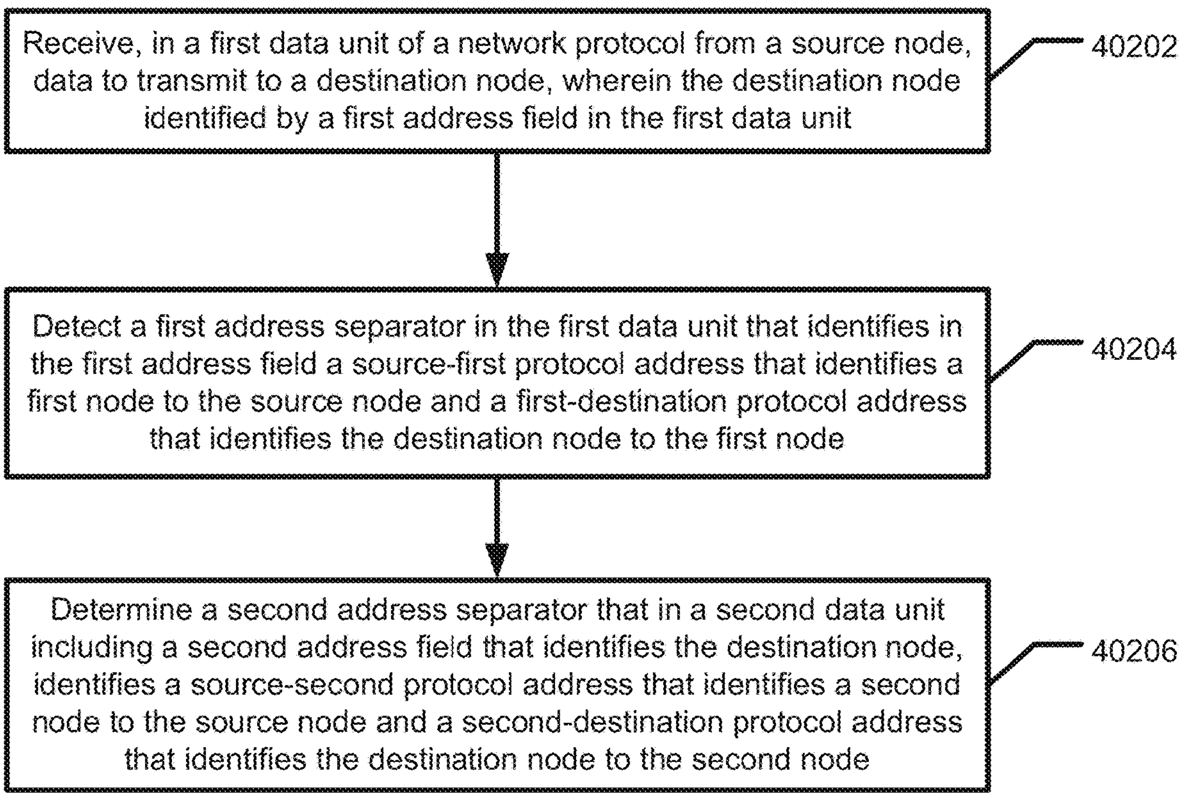
FIG. 84 is a flow diagram illustrating a method for adjusting a separator field for a protocol address according to an aspect of the subject matter described herein.
Figure 85:
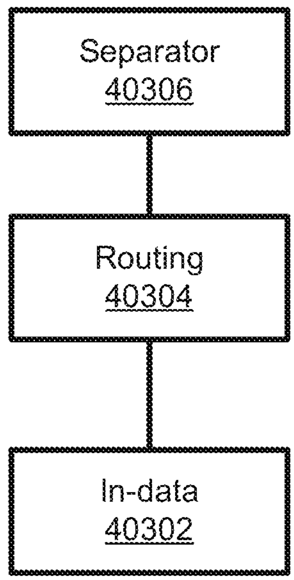
FIG. 85 is a block diagram illustrating an arrangement of components for adjusting a separator field for a protocol address according to another aspect of the subject matter described herein.
Figure 86A:
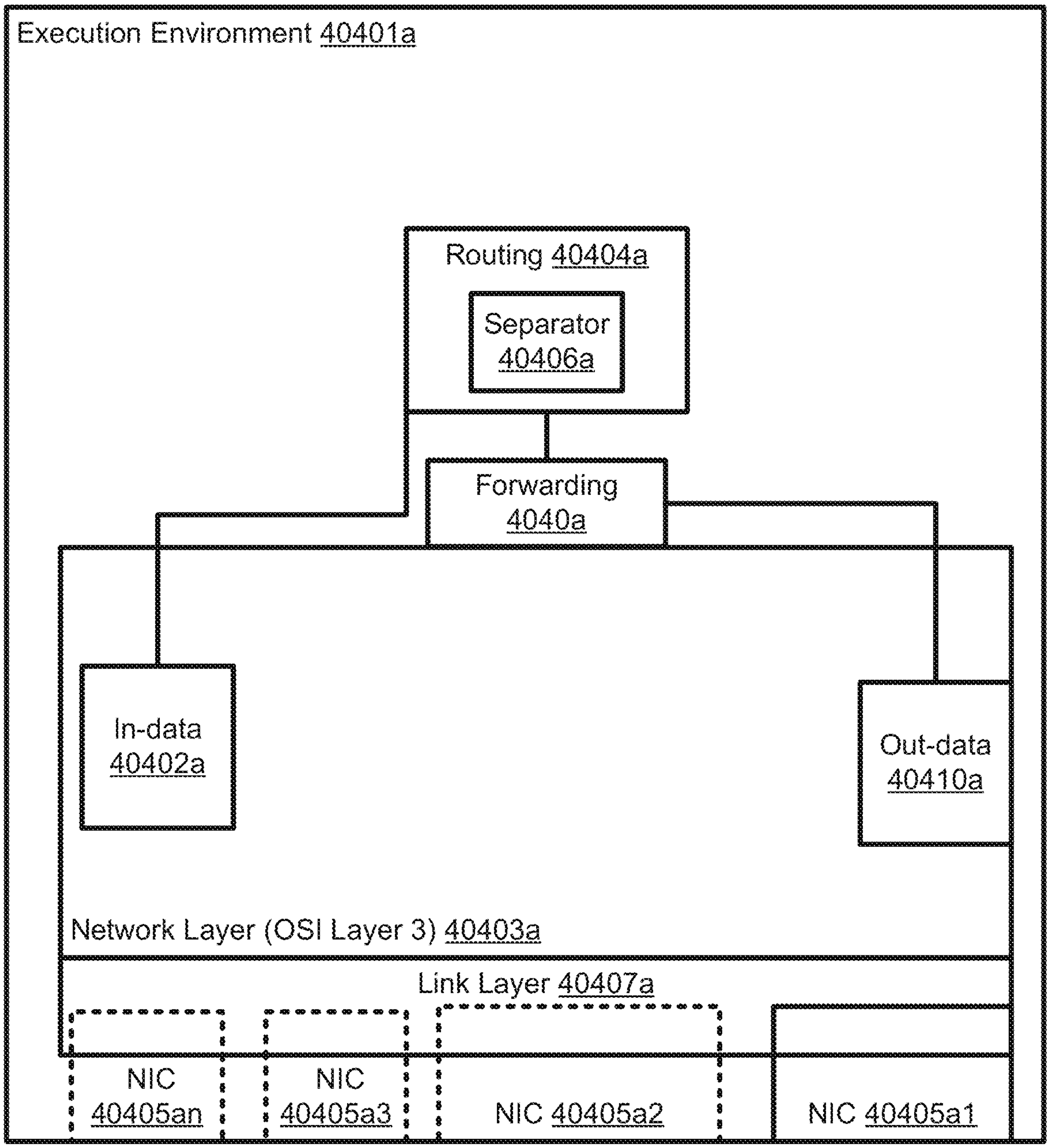
FIG. 86A is a block diagram illustrating an arrangement of components for adjusting a separator field for a protocol address according to another aspect of the subject matter described herein.
Figure 86B:
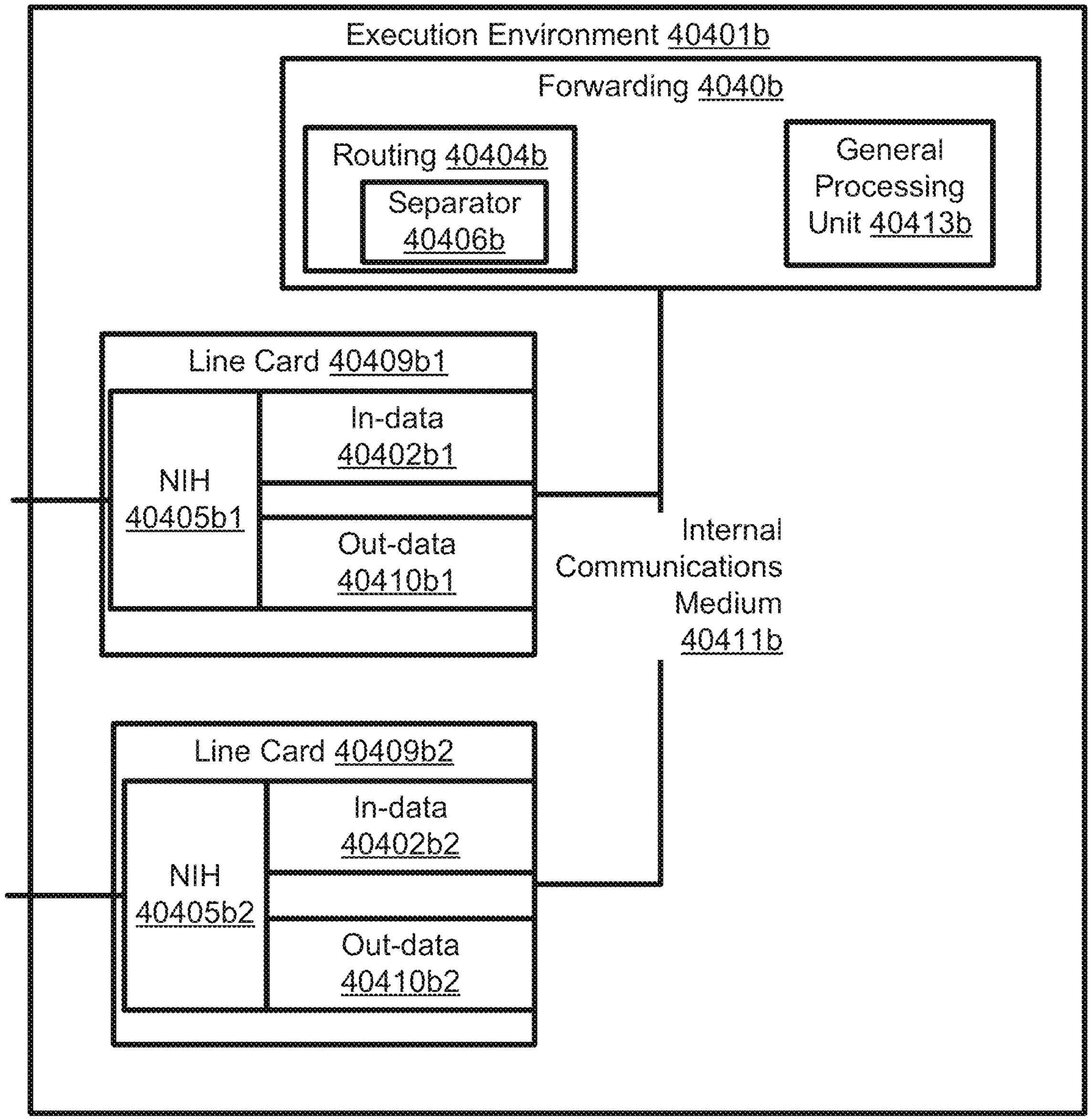
FIG. 86B is a block diagram illustrating an arrangement of components for adjusting a separator field for a protocol address according to another aspect of the subject matter described herein.
Figure 86C:
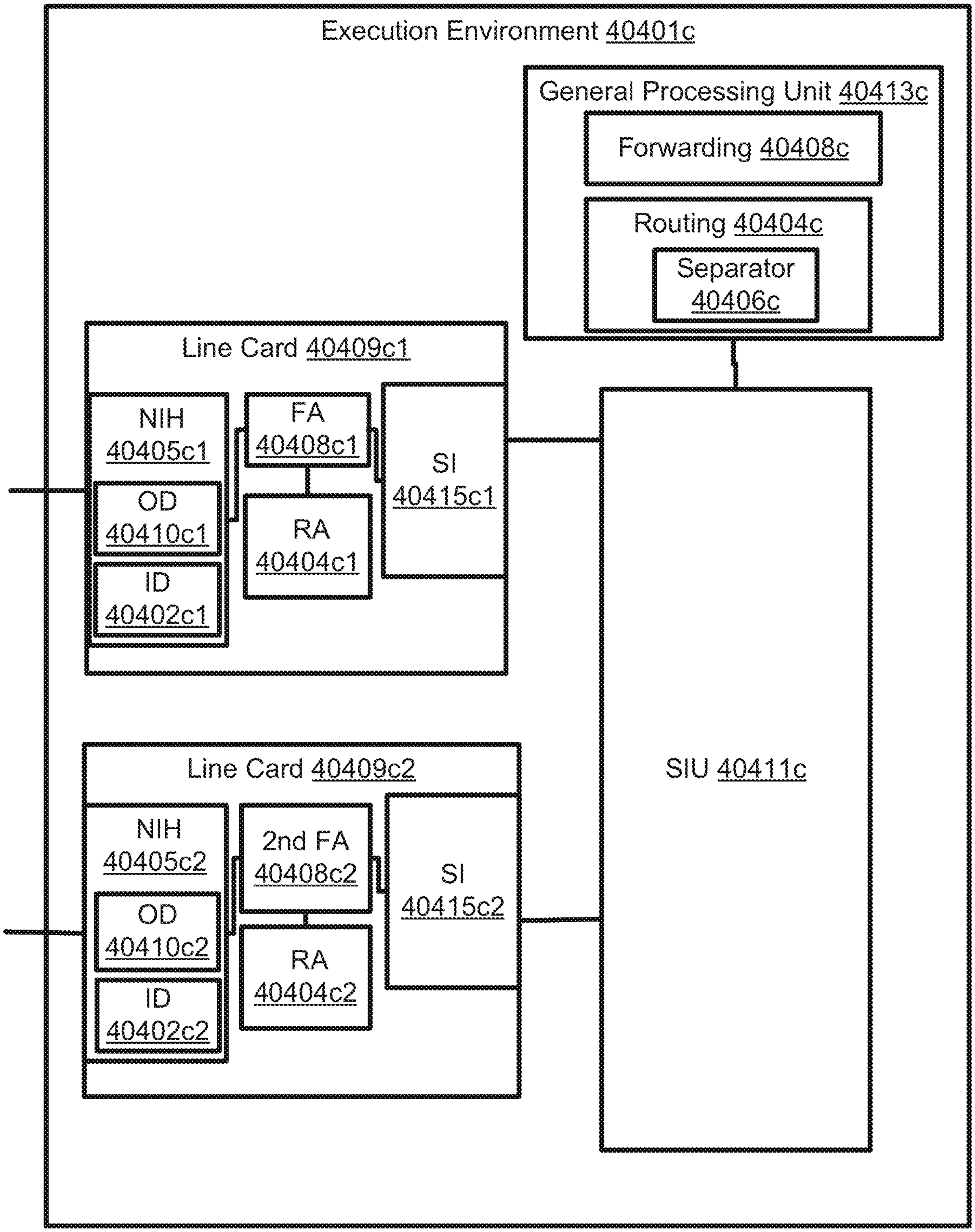
FIG. 86C is a block diagram illustrating an arrangement of components for adjusting a separator field for a protocol address according to another aspect of the subject matter described herein.

Some or all of the exemplary components illustrated in FIG. 85 may perform the method illustrated in FIG. 84 in a number of execution environments. FIGS. 86A-C are block diagrams illustrating the components of FIG. 85 and/or analogs of the components of FIG. 85 respectively adapted for operation in an execution environment 40401 that includes and/or otherwise is provided by one or more nodes.

FIG. 83 illustrates components of an exemplary device that may at least partially provide and/or otherwise be included in an execution environment. The components illustrated in FIG. 86A-C may be included in or otherwise combined with the components of FIG. 83 to create a variety of arrangements of components according to the subject matter described herein. Those skilled in the art will understand that other execution environments in addition to the various adaptations, analogs, and instances of the execution environments described herein are suitable for hosting an adaptation of the arrangement in FIG. 85.

Figure 87A:
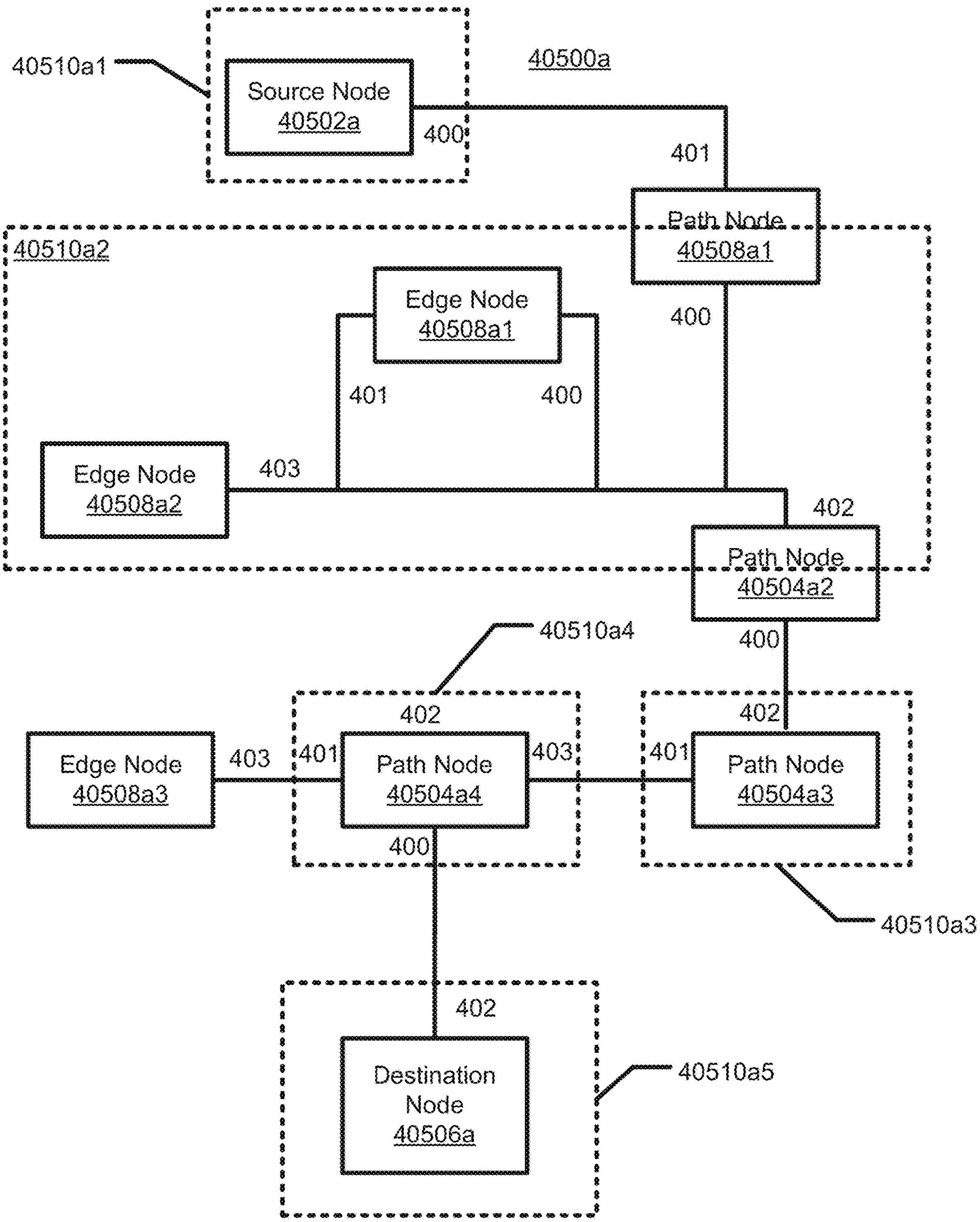
FIG. 87A is a network diagram illustrating an exemplary system for adjusting a separator field for a protocol address according to another aspect of the subject matter described herein.
Figure 87B:
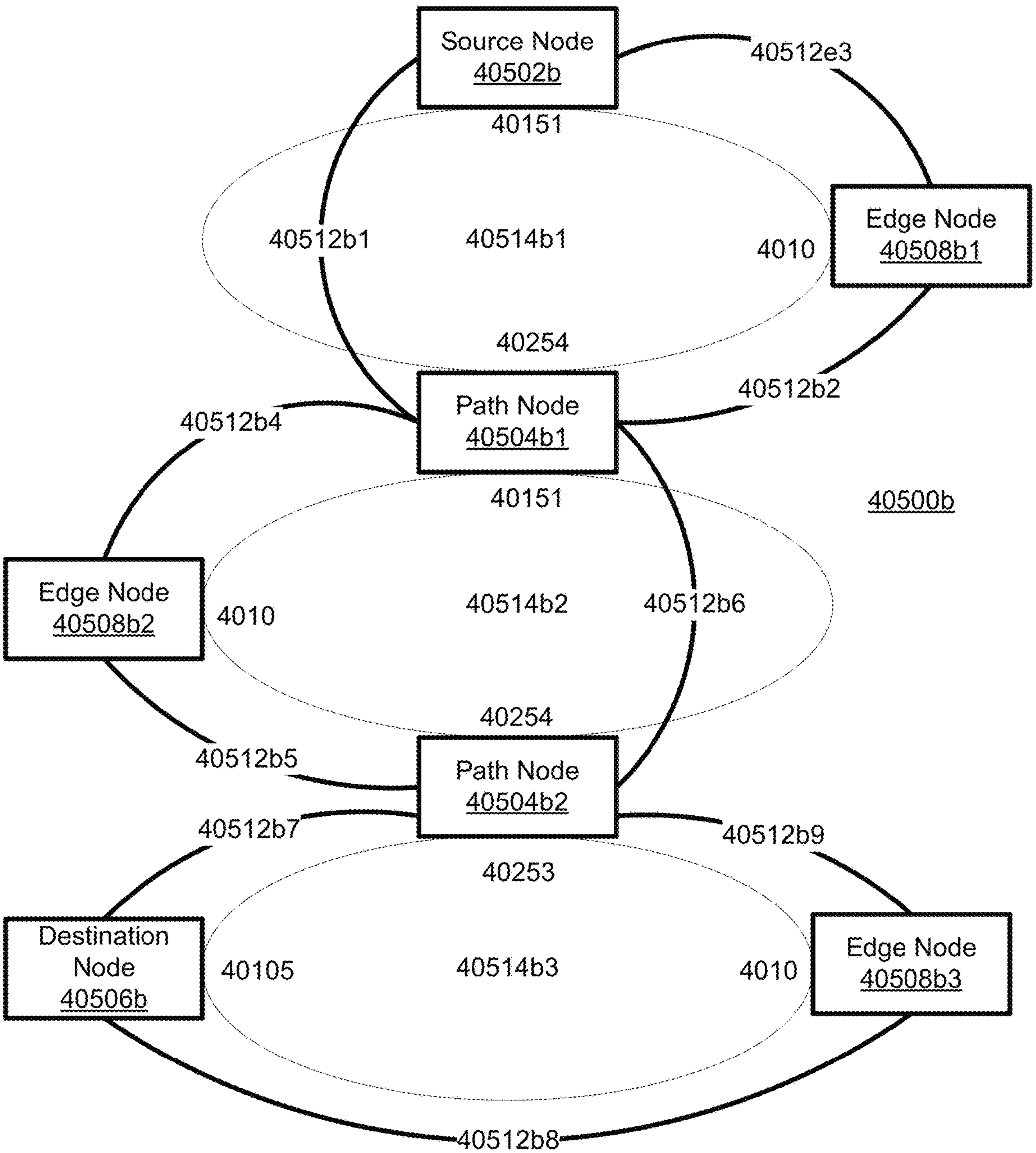
FIG. 87B is a network diagram illustrating an exemplary system for adjusting a separator field for a protocol address according to another aspect of the subject matter described herein.
Figure 87C:
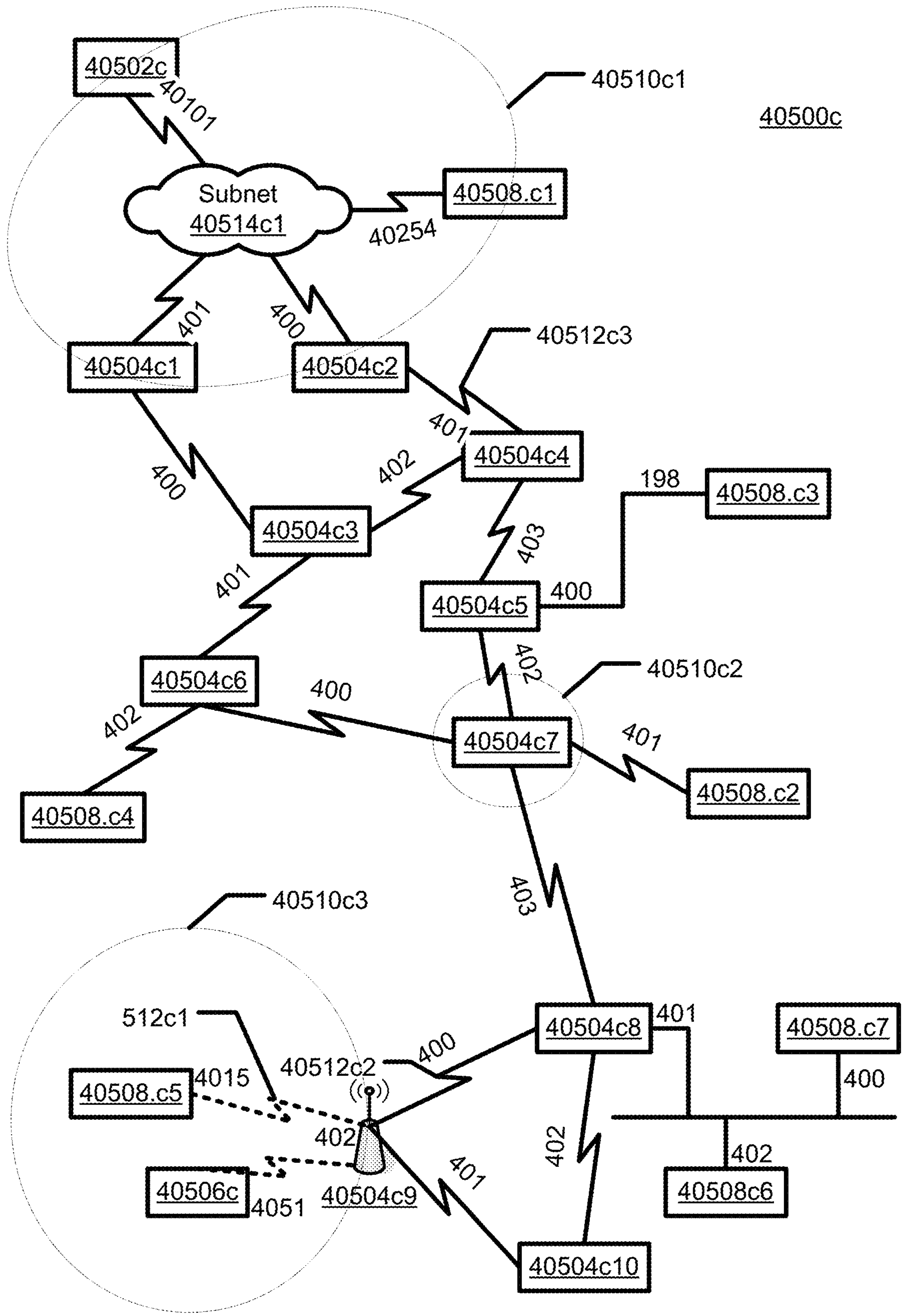
FIG. 87C is a network diagram illustrating an exemplary system for adjusting a separator field for a protocol address according to another aspect of the subject matter described herein.

FIGS. 87A-C respectively illustrate networks 40500 including nodes that in various aspects may include adaptations of any of the execution environments 40401, illustrated in FIG. 86A, FIG. 86B, and FIG. 86C. The various illustrated nodes are operatively coupled via respective network interface components to the respective networks 40500 in FIGS. 87A-C. For ease of illustration and description, each of FIGS. 87A-C includes nodes identified by a role played in sending data from one node to another. FIGS. 87A-C illustrate source nodes 40502 that initiate a transmission of data to respective recipients, path nodes 40504 that relay the data transmitted by respective source nodes 40502, and destination nodes 40506 identified by the respective source nodes as recipients of the data from source nodes 40502. In some of FIGS. 87A-C, one or more edge nodes 40508 are illustrated for describing adaptations of the arrangement in FIG. 85 performing various aspects of the method illustrated in FIG. 84 operating in one or more of the roles identified.

A path node 40504 illustrated in any of FIGS. 87A-C and/or a node otherwise operating as a path node may include and/or otherwise may be included in providing adaptations, analogs, and/or instances of any execution environment 40401 illustrated in FIGS. 86A-C. Exemplary nodes that operate as path nodes 40504 include a router, a switch, a wireless access point, a bridge, a gateway, and the like. A path node 40504 may include a first network interface component and a second network interface component. With respect to FIG. 87B, a first path node 40504*b*1 may be operatively coupled to a first network 40514*b*1 included in a network 40500*b* via a first network interface component, and may be operatively coupled to a second network 40514*b*2 via a second network interface component. The first path node 40504*b*1 may forward data sent from a source node 40502*b* in the first network 40514*b*1 to deliver via a second network 40514*b*2 to a destination node 40506*b* in a third network 40514*b*3. The first network 40514*b*1, the second network 40514*b*2, and/or the third network 40514*b*3 may respectively include and/or may be included in a local area network (LAN), an intranet, at least a portion of the Internet, and/or another wide area network (WAN).

The network components in some nodes may be configured according to a layered design or architecture known to those skilled in the art as a "network stack". Adaptations, analogs, and/or instances of execution environments 40401 in FIG. 86A, FIG. 86B, and FIG. 86C may include network components in a layered architecture, physically and/or logically. Other architectural models for network components may be included in other execution environments to send and/or receive data via a network, and are considered within the scope of the subject matter described herein. Combinations of layered architectures and non-layered architectures are also considered to be within the scope of the subject matter described herein.

Some components illustrated in FIG. 86A correspond to components of the layered architecture specified by the Open System Interconnection (OSI) model, known to those skilled in the art. For example network components in FIG. 86A may comply with specifications for protocols included in the TCP/IP protocol suite. The OSI model specifies a seven-layer network stack. The TCP/IP protocol suite may be mapped to layer three and layer four of the seven layers. Those skilled in the art will understand that fewer or more layers may be included in various adaptations, analogs, and/or instances of the execution environments 40401 illustrated in FIG. 86A, FIG. 86B, FIG. 86C, and their various aspects described herein; and for any other execution environment suitable for hosting an adaptation and/or analog of the arrangement of components illustrated in FIG. 85.

FIG. 86A illustrates a network layer component 40403*a* that corresponds to layer three of the open systems interconnection reference (OSI) model. The Internet Protocol (IP) is an exemplary layer three protocol, also referred to as a network layer protocol. FIG. 86A illustrates a first NIC 40405*a*1 that operatively couples a node including an adaptation, analog, and/or instance of the execution environment 40401_a_ to a network. One or more NICs 40405_a_ correspond to layer one, also known as the physical layer, of the OSI model to receive and send signals via a physical data transmission medium. Exemplary network layer protocols include an Internet Protocol (IP), DECNet routing Protocol (DRP), an Internetwork Packet Exchange (IPX) protocol, an Internet Datagram Protocol (IDP), a VINES Internet Protocol, and a Datagram Delivery Protocol (DDP).

FIG. 86A also illustrates a link layer component 40407_a_ that corresponds to layer two, also known as the link layer, of the OSI model to communicate, via layer one, between nodes sharing a physical data transmission medium such as nodes in a LAN. Exemplary link layer protocols include an Ethernet protocol, a Token-ring protocol, and asynchronous transfer mode (ATM) protocol, to name a few. Some or all of a link layer component 40407_a_ may be included in one or more NICs 40405, as illustrated in FIG. 86A. A portion of a link layer component may be external to and operatively coupled to one or more NICs. The external portion may be realized, at least in part, as a device driver for the one or more NICs. Exemplary physical data transmission media include Ethernet cables of various types, co-axial cables, fiber optic cables, and media suitable for transporting various types of wireless signals. FIG. 86A illustrates that some nodes included in and/or otherwise providing an adaptation, analog, and/or instance of the execution environment 40401_a_ may include more than two NICs 40405_a_, as illustrated by a third NIC 40405_a_3 through an Nth NIC 40405_an_.

The network layer component 40403_a_, illustrated in FIG. 86A, may operate to communicate across various types of link layer protocols, in various adaptations. Layer three protocols enable data to be exchanged between and among nodes on different networks across different types of physical data transmission media and differing link layer protocols. The Internet Protocol (IP) in the TCP/IP protocol is the most widely utilized network layer protocol currently in use. For ease of illustration, the description that follows provides examples based on IP networks and protocols in the TCP/IP suite due to their wide use and because they are well-known in the art. Those skilled in the art will understand that the scope of the subject matter described is not limited to IP networks.

In addition to the protocols described above, protocols corresponding to layers in the OSI model above the network layer may be included in communicating via a network. The term "application protocol" as used herein refers to any protocol or combination of protocols that correspond to one or more layers in the OSI reference model above the network layer. Programs and executables operating in execution environments 40401 may communicate via one or more application protocols. Exemplary application protocols include the transmission control protocol (the TCP) in the TCP/IP suite, the user datagram protocol (UDP) in the TCP/IP suite, various versions of hypertext transfer protocol (HTTP), various remote procedure call (RPC) protocols, various instant messaging protocols, various email protocols, and various other protocols for real-time communications. Data exchanged between nodes in a network may be exchanged via data units of one or more network protocols. An execution environment may include layer specific protocol components respectively configured according to the one or more network protocols. Some protocols and/or protocol components may define and/or provide services from multiple layers of the OSI model layer such as the Systems Network Architecture (SNA) protocol.

In addition to specifying schemas defining valid data units, a network protocol may define and/or otherwise be associated with a defined identifier space to identify protocol endpoints defined according to the network protocol. The terms "identifier space" and "address space" are used interchangeably herein. For example, various versions of hypertext transfer protocol (HTTP) specify a format for HTTP uniform resource locators (URL). HTTP specifies a location in an HTTP header that identifies a URL as an identifier or address from the HTTP address space that identifies both a resource and recipient of an HTTP data unit. The transmission control protocol (TCP) specifies a format and vocabulary for a TCP header including a destination protocol endpoint identifier field referred to as a destination port number that, when combined with a destination protocol address from an IP packet, identifies a transport layer protocol endpoint of a receiver of data sent in a TCP data unit via a network. A source protocol endpoint is similarly identified by a source port number, included in a TCP header as defined by the TCP, along with a source protocol address from an IP data unit as defined by the Internet Protocol.

Other exemplary address spaces that identify protocol endpoints in various network protocols include an email address space, a telephone number address space for various telephony protocols, instant message address spaces for various instant message protocols, and media access control (MAC) addresses for various link layer protocols, to name just a few examples. The address spaces identified are shared among the senders and receivers exchanging data via any particular protocol from among those identified herein as well as others that are known. Some address spaces are shared by senders and receivers in a LAN, an intranet, and/or in another identifiable portion of a network. Other address spaces are shared globally. For example, the HTTP identifier space is a global address space shared across the Internet. An HTTP identifier is defined to identify the same resource regardless of the application and/or node identifying the resource via the HTTP identifier. An HTTP URL is a global identifier in an HTTP network, such as the World Wide Web (Web). Addresses in a shared address space are referred to as scoped addresses that serve as identifiers of protocol endpoints in nodes that share the address space in a region of a network defined by a scope.

In delivering data via a network between protocol endpoints of a particular network protocol, addresses from address spaces of the various protocols at the various layers are typically translated and/or otherwise mapped between the various layers. For example, a unicast IP address in an IP packet is mapped to a link layer address for a link via which the IP packet is transported in a network path via a path node 40504 in relaying data from a source node 40502 to an identified destination node 40506. Addresses at the various layers are assigned from a suitable address space for corresponding network protocols.

FIG. 87B illustrates a network path, communicatively coupling the source node 40502_b_ and a second edge node 40508_b_2 in the network 40500_b_, includes a sequence of nodes including of the source node 40502_b_, a first path node 40504_b_1, and the second edge node 40508_b_2. In FIG. 87C, a first network path communicatively coupling a fifth edge node 40508_c_5 and an eighth path node 40504_c_8 includes a first sequence of nodes including the fifth edge node 40508_c_5, a ninth path node 40504_c_9, and the eighth path node 40504_c_8. The first network path is included in a second network path communicatively coupling the fifth edge node 40508_c_5 and the second edge node 40508_c_2 that includes a second sequence of nodes including the nodes in the first sequence, a seventh path node 40504*c*7, and the second edge node 40508*c*2. A network path may be physical network path and/or logical network path based on a particular network protocol defining protocol endpoints in the path end nodes.

FIG. 87B, illustrates a number of network paths communicatively coupling the source node 40502*b* and the destination node 40506*b* in the network. One network path illustrated includes a sequence of hops including a first hop 40512*b*1, a sixth hop 40512*b*6, and a seventh hop 40512*b*7. In FIG. 87C, the first network path described above communicatively coupling the fifth edge node 40508*c*5 and the eighth path node 40504*c*8 includes a first sequence of hops including a first hop 40512*c*1 and a second hop 40512*c*2. A hop may be a physical hop and/or a logical hop based on a network protocol defining a network topology in which the hop is identified and/or otherwise represented.

In FIG. 87B, the network path described above communicatively coupling the source node 40502*b* and the destination node 40506*b* includes a sequence of network interfaces including a network interface in the first path node 40504*b*1 in the first hop 40512*b*1, a network interface in a second path 40504*b*2 in a sixth hop 40512*b*6, and network interface in the destination node 40506*b* in a seventh hop 40512*b*7. The network paths in FIG. 87C described above may also be described as a sequence of network interfaces.

A network topology may represent logical hops in a network. In FIG. 87B, the first network 40514*b*1 may represented a physical topology when the first network 40514*b*1 represents a physical data transmission medium included in physically coupling nodes. The data transmission medium may be a token-ring LAN, for example, the hops 40512 in FIG. 87 may illustrate logical communicative couplings at a level of the network above the data transmission medium. The hops 40512 may represent network layer hops or hops at some other layer of the network above the physical layer. The domain name system (DNS) of the Internet provides another example of nodes in a logical network topology based on DNS protocol endpoints of the DNS protocol that identifies nodes in the Internet included the network topology. Hops in a DNS based network topology correspond to communicative couplings enabled by the DNS protocol Further Details With reference to FIG. 84, a block 40202 illustrates that the method includes receiving, in a first data unit of a network protocol from a source node, data to transmit to a destination node, wherein the destination node is identified by a first address field in the first data unit. Accordingly, a system for adjusting a separator field for a protocol address includes means for receiving, in a first data unit of a network protocol from a source node, data to transmit to a destination node, wherein the destination node is identified by a first address field in the first data unit. The system for adjusting a separator field for a protocol address includes one or more processors and logic encoded in one or more computer readable media for execution by the one or more processors that when executed is operable for and/or is otherwise included in receiving, in a first data unit of a network protocol from a source node, data to transmit to a destination node, wherein the destination node is identified by a first address field in the first data unit.

For example, the arrangement in FIG. 85 includes an in-data component 40302 that is operable for and/or is otherwise included in receiving, in a first data unit of a network protocol from a source node, data to transmit to a destination node, wherein the destination node is identified by a first address field in the first data unit. FIGS. 86A-C illustrate in-data components 40402 as adaptations and/or analogs of the in-data component 40302 in FIG. 85. One or more in-data components 40402 operate in an execution environment 40401.

With reference to FIG. 84, a block 40204 illustrates that the method includes detecting a first address separator in the first data unit that identifies in the first address field a source-first protocol address that identifies a first node to the source node and a first-destination protocol address that identifies the destination node to the first node. Accordingly, a system for adjusting a separator field for a protocol address includes means for detecting a first address separator in the first data unit that identifies in the first address field a source-first protocol address that identifies a first node to the source node and a first-destination protocol address that identifies the destination node to the first node. The system for adjusting a separator field for a protocol address includes one or more processors and logic encoded in one or more computer readable media for execution by the one or more processors that when executed is operable for and/or is otherwise included in detecting a first address separator in the first data unit that identifies in the first address field a source-first protocol address that identifies a first node to the source node and a first-destination protocol address that identifies the destination node to the first node.

For example, the arrangement in FIG. 85 includes a routing component 40304 that is operable for and/or is otherwise included in detecting a first address separator in the first data unit that identifies in the first address field a source-first protocol address that identifies a first node to the source node and a first-destination protocol address that identifies the destination node to the first node. FIGS. 86A-C illustrate routing components 40404 as adaptations and/or analogs of the routing component 40304 in FIG. 85. One or more routing components 40404 operate in an execution environment 40401.

In FIG. 84, a block 40206 illustrates that the method includes determining a second address separator that in a second data unit including a second address field that identifies the destination node, identifies a source-second protocol address that identifies a second node to the source node and a second-destination protocol address that identifies the destination node to the second node. Accordingly, a system for adjusting a separator field for a protocol address includes means for determining a second address separator that in a second data unit including a second address field that identifies the destination node, identifies a source-second protocol address that identifies a second node to the source node and a second-destination protocol address that identifies the destination node to the second node. The system for adjusting a separator field for a protocol address includes one or more processors and logic encoded in one or more computer readable media for execution by the one or more processors that when executed is operable for and/or is otherwise included in determining a second address separator that in a second data unit including a second address field that identifies the destination node, identifies a source-second protocol address that identifies a second node to the source node and a second-destination protocol address that identifies the destination node to the second node.

For example, the arrangement in FIG. 85 includes a separator component 40306 that is operable for and/or is otherwise included in determining a second address separator that in a second data unit including a second address field that identifies the destination node, identifies a source-second protocol address that identifies a second node to the source node and a second-destination protocol address that identifies the destination node to the second node. FIGS. 86A-C illustrate separator components 40406 as adaptations and/or analogs of the separator component 40306 in FIG. 85.

In transmitting data from a source protocol endpoint in a source node 40502 to a destination protocol interface in a destination node 40506, the data is processed by a sequence of nodes in a network path that communicatively couple the source node 40502 and the destination node 40506. A node in the network path that is currently processing the data to send it to the destination 40506, is referred to herein as a "current node" with respect to the data or more precisely referred to as a "current path node" when the current node is a path node. A node in the network path that has previously transmitted the data being processed by the current node is referred to herein as a "previous node". A node in the network path that has not received the data being processed by the current node is referred to herein as a "next node". For ease of description, "data" refers to data sent in a data unit via a protocol endpoint in the source node that is being processed by a path node, current to the data, to transmit to a next node in a network path to an identified destination node. As such, a source node 40502 may be a one of a current node and a previous node with respect to particular data. A path node 40504 may be one of a current node, a previous node, and a next node with respect to particular data. A destination node 40506 may be one or a next node and a current node with respect to particular data.

In FIG. 86A, an in-data component 40402*a* is included in network layer component 40403*a*. In FIG. 86B and in FIG. 86C, in-data components 40402 operates in respective line card components 40409.

A path node 40504 may include an adaptation and/or analog of the execution environment 40401*a*, illustrated in FIG. 86A. Data communicated between a source node 40502 and a destination node 40506 may be received by a path node 40504 via of a first NIC 40405*a*1 operatively coupling the path node 40504 to a previous network path including the source node 40502 and the path node 40504 as path end nodes. One or more link layer protocol data units may be detected by a link layer component 40407*a* according to a compatible link layer protocol. For example, Ethernet frames may be detected as link layer protocol data units when received via a CAT 6 Ethernet cable. Data in a received link layer protocol data unit may be provided to an in-data component 40402*a* in a network layer component 40403*a* according to the specification of a particular network layer protocol, such as the IP.

An in-data component 40402*a* may detect one or more network layer protocol data units in data received from the link layer component 40407*a*. For example, the in-data component 40402*a* may detect one or more IP packets in data received in one or more Ethernet frames. In-data component 40402*a* may detect a network layer data unit that includes data from the source node 40502 to relay to the destination node 40506 identified in address information in the detected network layer data unit as defined by a particular network layer protocol.

A network interface component 40405*a* in a path node 40504 may receive data communicated from a source node 40502 via a previous network path included in a network 40500. One or more network paths may exist for receiving the data. A source node 40502 may be and/or otherwise may include a desktop PC, a notebook, a server, or a handheld computing device serving as a gateway, bridge, or other network relay device.

A path node 40504 may receive data from a source node 40502 to transmit the received data to a destination node 40506 via a specified network protocol. For example, a path node 40504 may receive and transmit a data packet at a link layer as performed by an Ethernet bridge and a multiple protocol labeling switch (MPLS). Further, a path node 40504 may receive and transmit a data packet at a network layer as performed by an Internet protocol (IP) router. Still further, a path node 40504 may receive and transmit a data packet at an application layer, as defined above.

Accordingly, data from a source node 40502 may be included in and/or may include data formatted according a link layer protocol, a network layer protocol, and/or an application layer protocol. An in-data component may operate according to a network layer protocol, a link layer protocol, and/or an application layer protocol.

Data received from a source node 40502 by a path node may be received via one or more previous path nodes 40504 in one or more hops. Data may be received by a current path node 40504 from a previous node based on a previous-current protocol address. The previous-current protocol address may be a path-based addressed and/or may be a scope-specific address that, in a previous scope-specific address space specific to a previous network region that includes the previous node, identifies the current node as described in detail below.

In transmitting data from a source protocol endpoint in a source node 40502 to a destination protocol interface in a destination node 40506, the data is processed by a sequence of nodes in a network path that communicatively couples the source node 40502 and the destination node 40506. A node in the network path that is currently processing the data to send it to the destination 40506, is referred to herein as a "current node" with respect to the data or more precisely referred to as a "current path node" when the current node is a path node. A node in the network path that has previously transmitted the data being processed by the current node is referred to herein as a "previous node". A node in the network path that has not received the data being processed by the current node is referred to herein as a "next node". For ease of description, "data" refers to data sent in a one or more data units via a protocol endpoint in the source node where the data is being processed by a path node, current to the data, for transmitting to a next node in a network path to an identified destination node. As such, a source node 40502 may be a one of a current node and a previous node with respect to particular data. A path node 40504 may be one of a current node, a previous node, and a next node with respect to particular data. A destination node 40506 may be one or a next node and a current node with respect to particular data.

In FIG. 86A, a routing component 40404*a* is illustrated as a component of a network layer component 40403*a*. In FIG. 86B, a routing component 40442*b* is illustrated operatively coupled to multiple line card components 40409*b* for relaying data between and/or among portions of a network respectively coupled to the line cards 40409*b*. A routing component 40404*b* may logically operate at a network layer of a network stack and/or at another layer. In FIG. 86C, a routing component 40404*c* is illustrated as distributed throughout line card components 40409*c* of an execution environment 40401*c*. The routing component in the execution environment 40401*c* includes a first routing agent (RA) component 40404*c*1 in a first line card component 40409*c*1 and a second RA component 40404*c*2 in a second line card component 40409*c*2.

FIGS. 88A-E illustrate a number of new types of address representations 40602 illustrating various address formats and vocabularies for representing protocol addresses. Various portions of the respective address representations 40602 are illustrated as contiguous, but need not be so in various embodiments. The address representations 40602 in FIGS. 88A-E may be identified based on an aspect of a format of a data unit and/or an aspect of a vocabulary of a data unit as defined by a schema of a network protocol.

A routing component 40404*a* may detect a protocol address of a next node based on a schema for including address information in a data unit of a corresponding network protocol. The address information may be detected in a data unit by the routing component 40404*a*. In another aspect, address information may be detected by an in-data component 40404*a* that operates to provide some or all of the address information to the routing component 40404*a* to detect a protocol address of a next node.

Address representations 40602 in FIGS. 88A-E are described with respect to their use in data units of a network protocol. Each of the address types shown in FIGS. 88A-E may be adapted to be included in a destination protocol address portion and/or a source protocol address portion of, for example, an IPv4 data unit header and/or of an IPv6 data unit header. Whether an address is identified as scope-specific, path-based, and the like may be determined, by a routing component 40404*a*, by a bit pattern or identifier defined to identify a protocol address type, category, and/or class. The bit pattern or identifier may be located by the routing component 40404*a* stored in a type bits portion of an IP packet and/or in some other specified location. Those skilled in the art will realize that neither the schemas, which define a format rule(s) and/or a vocabulary rule(s) for a protocol address, described nor the protocols in which their use is described are exhaustive.

Figure 88A:
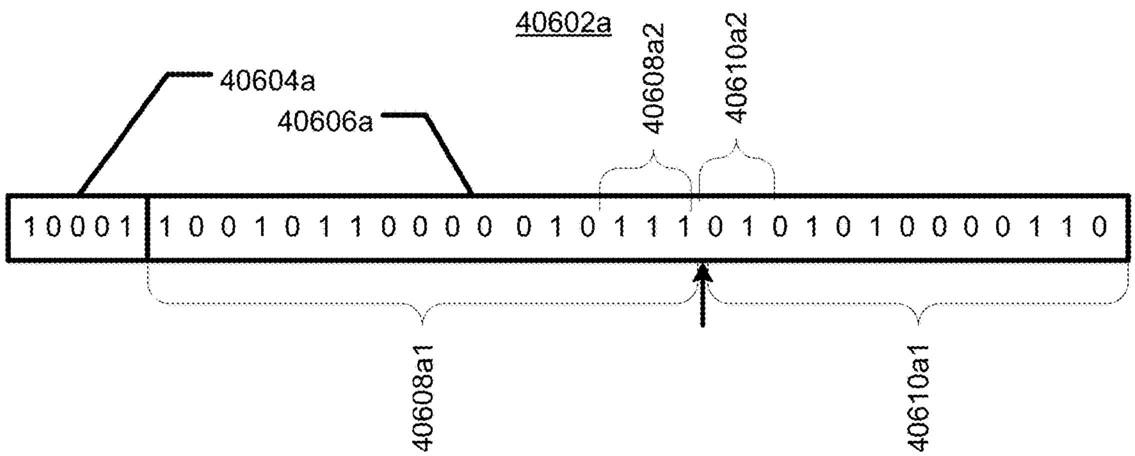
FIG. 88A is a diagram illustrating an exemplary representation of a protocol address according to another aspect of the subject matter described herein.

FIG. 88A illustrates address representation 40602*a* that may be detected by an in-data component 40402*a* and/or a routing component 40404*a* in a data unit or packet of an Internet Protocol or other network protocol. An address representation 40602*a* may identify, for example, one or more scope-specific addresses for a respective one or more nodes in a network path for transmitting data from a source node to a destination node via a network path. In an aspect, an address representation 40602*a* may be processed by an in-data component 40402*a* and/or a routing component 40404*a* as including at least three portions. An address separator field 40604*a* is illustrated including a binary number. In FIG. 88A, the binary number illustrated equals seventeen in base ten. The number in the address separator field 40604*a* identifies the size in an address information field 40606*a* of a previous address field 40608*a* to identify the previous address field 40608*a* and a next address field 40610*a*. For example, a routing component 40404*a*, in a current path node 40504, may process information in a previous address field 40608*a* to identify a previous address that, in a previous address space of a previous node in the network path, identifies the current path node 40504. A routing component 40404*a* may identify, based on information in a next address field 40610*a*, a next protocol address, that, in a current scope-specific address space of the current path node, identifies a next node in the network path.

Alternatively or additionally, a routing component 40404*a* may identify, based on information in a next address field 40610*a*, a current protocol address, that, in a next scope-specific address space specific to a next network region that includes the next node, identifies the current node. A routing component 40404*a* interoperating with an in-data component 40402 may determine a next protocol address, in the current scope-specific address space, that identifies the next node, based on the current protocol address. Further, the next scope-specific address space may be a node-specific address space specific to the next node. In another aspect, a routing component may determine the current address based on the next protocol address.

With respect to FIG. 87A, an address representation 40602*a* may be included in a data unit including data from a source node 40502*a*, in a first network region 40510*a*1, to transmit to a destination node 40506*a*. A first scope-specific address space may be specific to the first network region 40510*a*1. As described above, the sequence, "1.2.2.3.2", may be represented in an address information field 40606*a* to identify a protocol address that, in the first scope-specific address space, identifies the destination node 40506*a*.

Address information in a data unit may identify a source-destination protocol address that, in a source scope-specific address space specific to a source network region that includes a source node, identifies a destination node and/or may identify a destination-source protocol address, that in a destination scope-specific address space specific to a destination network region that includes the destination node, identifies the source node. A current-next protocol address may be included in at least one of the source-destination protocol address and the destination-source protocol address. The current next address is an address that, in a current scope-specific address space specific to a current network region including a current path node, identifies a next node with respect to the current path node.

At the source node 40502*a*, the address separator field 40604*a* may be set, by a separator component 40406*a*, to include a size of zero for a previous address field 40608*a*. The address information field 40606*a*, thus includes a next address field 40610*a* at the source node 40502*a* and identifies the destination node 40506*a* with respect to nodes in the first network region 40510*a*1.

At a first path node 40504*a*1, outside the first network region 40510*a*1, an address separator field 40604*a* in a data unit including the data from the source node 40502*a*, may include a value, '1', that identifies, in a previous address field 40608*a*, a protocol address that, in the first scope-specific address space identifies a second path node 40504*a*2. A routing component 40404*a* in a first path node 40504*c*1 may detect the value. The routing component 40404*a* interoperating with a separator component 40406*a* may also identify, based on the value in the address separator field 40604*a*, a next address field 40610*a* that identifies "2.2.3.2" as a next protocol address that, in a second scope-specific address space specific to a network interface, of the first path node 40504*a*1, in a second network region identifies the destination node 40506*a*. The separator component 40406*a* may detect the next protocol address. Note that, "2.2.3.2", identifies the destination node 40506*a* with respect to all the network interfaces in second network region 40510*a*2 for transmitting data from a node to the destination interface.

With respect to the destination node 40506*a*, the second path node 40504*a*2 is not considered to be in the second network region 40510*a*2 since the network interface in the second path node 40504*a*2, that is included in communicatively coupling the second path node 40504*a*2 to the destination node 40506*a*, is not included in the second network region 40510*a*1. The first path node 40504*a*1, with respect to the destination node 40506*a*, is included in the second network region 40510*a*2 since it has a network interface, in the second network region 40510*a*2, that is included in communicatively coupling the first path node 40504$a$1 with the destination node 40506$a$. Similarly, the second path node 40504$a$2 is included in the second network region 40510$a$2 with respect to the source node 40502$a$ and the first path node 40504$a$1 is not included in the second network region 40510$a$2 with respect to the source node 40502$a$.

At the destination node 40506$a$ a data unit including the data from the source node 40502$a$ may include a value in an address separator field 40604$a$ that indicates that the address information field includes only a previous address field 40608$a$ identifying "1.2.2.3.2", which is the destination protocol address when interpreted in the context of the first network region 40510$a$1.

In another aspect, a routing component 40404 and/or a separator component 40406 may detect, in a data unit by a current node, address separating information specified according to a network protocol to detect the next address information and/or the previous address information. The address separating information may be updated, by the separator component 40406 to identify, by the next node, at least one of next-previous address information and next-next address information in the address information, wherein the next-previous address information includes information identifying the current node. In yet another aspect, address separating information may be updated by a separator component 40406 in a current node to identify, by the current node, the previous address information and the next address information in the address information. As the data from the source node 40502$a$ is transmitted from node to node in the network path the value represented in an address separator field 40604$a$ in an address representation 40602$a$ in a data unit including the data or a portion thereof may be adjusted by various separator components 40406 and/or analogs to identify a protocol address in a suitable address space for the respective nodes in the network path.

At the destination node 40506$a$, the value in the separator address field and/or in another portion of the data unit may be defined to indicate that the address information field 40606$a$ also includes information for determining and/or otherwise identifying a protocol address that, in a fifth scope-specific address space specific a fifth network region 40510$a$5 that includes the destination node 40506$a$, identifies a network interface of a node, in the first network region 40510$a$1, in a network path from the destination node 40506$a$ to the source node 40502$a$. The address information field 40606$a$ in some aspects may include information for determining a protocol address that, in the fifth scope-specific address space, identifies the source node 40502$a$.

The above description describes an address representation 40602$a$ processed in the role of a destination protocol address in a data unit of a network protocol, such as an IP protocol. As a source protocol address with respect to a data unit, described in the previous paragraph, sent from the source node 40502$a$ to the destination node 40506$a$, an address information field 40606$a$, at the second path node 40504$a$2, may include a previous address field 40608$a$ identifying the sequence, "0.0", that identifies a protocol address that, in the second scope-specific address space, identifies the source node 40502$a$ as a sender of the data in the data unit. Note that the address, "0.0", identifies the source node 40502$a$ node to all nodes communicating with the source node 40502$a$ via network interfaces in the second network region 40510$a$2. The address information field 40606$a$ including the source address information at the second path node 40504$a$2 may include a next address field 40610$a$, identified by an address separator field 40604$a$, identifying the sequence "0.1.0" that identifies a protocol address that, in the fifth scope-specific address space, identifies the second path node 40504$a$2 to the destination node 40506$a$ as a path node 40504$a$ in a network path traversed by the data sent from the source node 40502$a$.

An in-data component 40402$a$ may detect address information in a data unit specified according to a network protocol to include a destination protocol address portion and a source protocol address portion as, for example, current IP packet headers are specified. Alternatively, an in-data component 40402$a$ may detect address information in a data unit defined to include an address portion that identifies a source protocol address in the context of one scope-specific address space specific to one node in a network path traversed by the packet and identifies a destination node another node in the network path. The Internet Protocol may be adapted to include a schema defining such a data unit as a valid IP packet. Rather than requiring separate source and destination portions, as current IP packet headers require, a single address portion may include address information that identifies a protocol address that is a destination protocol address in one scope-specific address space and a protocol address that is a source protocol address in another. A single address field may also be defined for protocol other than the IP. More details as well as examples are described below.

Figure 88B:
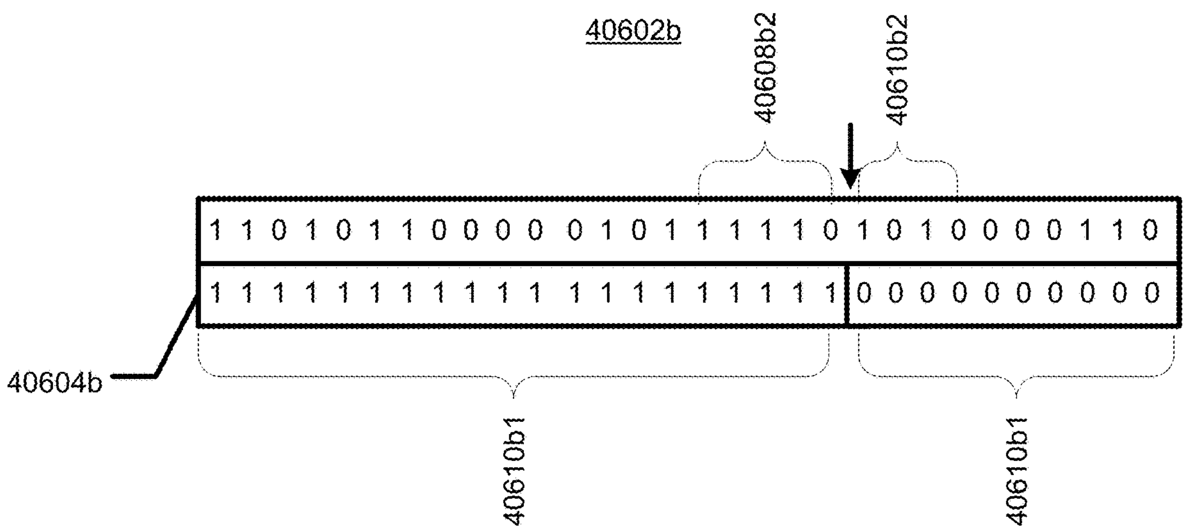
FIG. 88B is a diagram illustrating an exemplary representation of a protocol address according to another aspect of the subject matter described herein.

FIG. 88B illustrates a variant of the address type illustrated in FIG. 88A. Instead of or in addition to including an address separator field that distinguishes a previous address field from a next address field based on a bit count, a bit-mask may be specified as one or more address separator fields 40604$b$ to identify a previous address field 40608$b$ and a next address field 40610$b$ in an address information field 40606$b$ in an address representation 40602$b$ of a data unit formatted according to a particular network protocol, such as IP or IPX. Address information formatted as illustrated in FIG. 88B may be processed by a routing component 40404$a$ interoperating with an in-data component 40404$a$ and/or a separator component 40406$a$ in an analogous manner to that described for the address information in FIG. 88A based on the bit mask address separator field(s) 40604$b$ rather than and/or in addition to a size address separator field 40604$a$ illustrated in FIG. 88A.

Figure 88C:
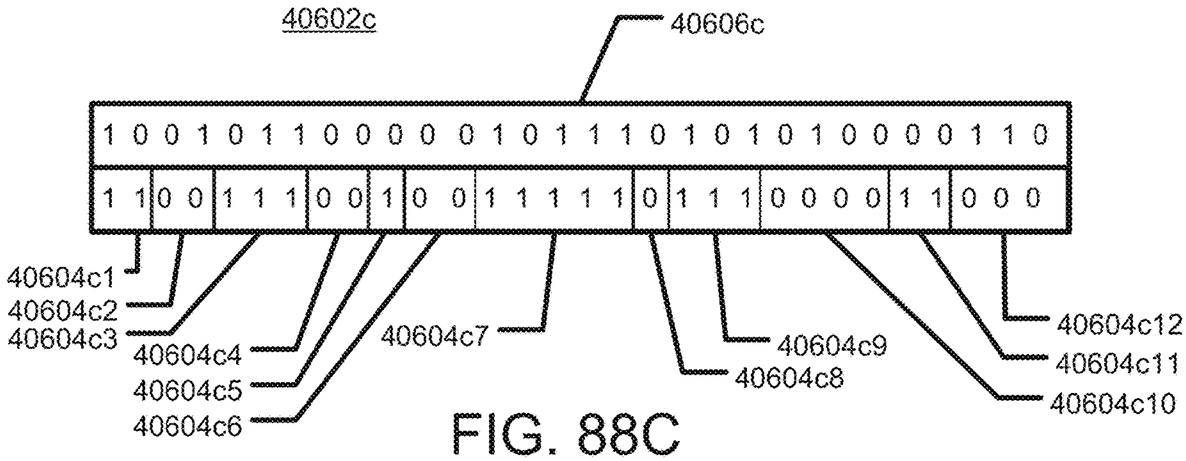
FIG. 88C is a diagram illustrating an exemplary representation of a protocol address according to another aspect of the subject matter described herein.

FIG. 88C illustrates an address representation 40602$c$ identifying path information that may be detected by a routing component 40404$a$. An address information field 40606$c$ may be interpreted as a network path identifier based on address separator field(s) 40604$c$ in a data unit. Address separator fields are specified according to a network protocol to distinguish one path identifier from another path identifier in an address information field 40606$c$.

In an aspect, illustrated in FIG. 88C, a routing component 40402$a$ and/or a separator component 40406$a$ may distinguish hop identifiers, since a single hop is a network path. A separator component 40406$a$ may distinguish separate hop identifiers based on changes in values in bits of consecutive address separator fields 40604$c$. In FIG. 88C, a first address separator field 40604$c$1 includes one or more '1' valued bits that correspond to bit positions in the address information field 40606$c$ to identify a previous address field referred to in FIG. 88C as a first hop information field. Network paths that include more than one hop may be distinguished similarly as shown in FIG. 88B. Combinations of hop identifiers and path identifiers may be distinguished by a routing component 40404$a$ and/or a separator component 40406$a$ based on information in address separator fields 40604 A second hop information field 40604$c$2, in FIG. 88C, includes two '0' bits to identify a second hop information field in address information field 40606*c*. Additional alternating sequences of '1' bits and '0' bits illustrated by address separator fields 40604*c*3-12*c* correspond to and identify other hop information fields identifying hops in a network path communicatively coupling a source node 40502 and a destination node 40506.

In FIG. 87C, a hop may be identified by a network interface identifier that may identify directly and/or indirectly one or more network interfaces in a pair of communicatively coupled nodes included in the hop. For example, the number, '1', may serve as a hop identifier specific to a second path node 40504*c*2 for identifying a first hop 40512*c*1 including the second path node 40504*c*2 and a fourth path node 40504*c*4. The number, '1', may also identifies a network path for exchanging data between the two nodes. The number, '1', may also be a protocol address, that in a scope-specific address space specific to a network region that includes the network interface, in the first hop 40512*c*1, of the second path node 40504*c*2, identifies the fourth path node 40504*c*4. The number, '1', may also identify a hop for the fourth path node 40504*c*4 to exchange data with the second path node 40504*c*2 and may also be a protocol address that, in a scope-specific address space specific a network region that includes the network interface, in the first hop 40512*c*1, of the fourth path node 40504*c*4, identifies the second path node 40504*c*2 and identifies a particular network interface of the second path node 40504*c*2.

A source node 40502*c* may identify a destination node 40506*c* by a destination protocol address, that in a first scope-specific address space specific to a first network region 40510*c*1 including the first node, identifies the destination node 40506*c*. The protocol address may be based on a sequence of hop identifiers, "0.1.1.2.3.0.51". Note that other network paths are illustrated for transmitting data from the source node 40502*c* to the destination node 40506*c* and may also identify protocol addresses in the first scope-specific address space that identify the destination node 40506*c* to nodes in the first network region 40510*c*1.

A seventh path node 40504*c*7 in the identified network path may identify the destination node 40506*c* based on another sequence of hop identifiers, "3.0.51". The sequence of hop identifiers may identify a protocol address that, in a second scope-specific address space specific to a second network region that includes the seventh path node 40504*c*7, identifies the destination node 40506*c*. Note that a routing component 40404*a* and/or a separator component 40406*a* operating in the seventh path node 40504*c*7 may detect the sequence, "3.0.51", in and/or otherwise based on the protocol address of the destination node 40506*c* from the first scope-specific address space. Further, the routing component 40402*a* and/or the separator component 40406*a* may detect a protocol address for the eighth path node 40504*c*8 as well as a protocol address for the ninth path node 40504*c*4, in and/or otherwise based on the sequence, "3.0.51". The detected protocol addresses may be specific to the second network region 40510*c*2 as illustrated in FIG. 87C.

The destination node 40506*c* is in a third network region 40510*c*3. Within the third network region 40510*c*3 the destination node 40506*c* may be identified by a local-scoped address, '51'. Nodes in the third network region 40510*c*3 may identify nodes outside the third network region 40510*c*3 with identifiers from a third scope-specific address space specific to the third network region 40510*c*3 while using local-scoped addresses to identify nodes in the third network region 40510*c*3.

The hop identifiers, "0.1.1.2.3.0.51", may be represented in an address representation 40602*c* in a data unit for sending data from the source node 40502*c* to the destination node 40506*c*, in FIG. 87C. At the seventh path node 40504*c*7, a routing component 40404*a* may determine and/or otherwise detect a protocol address of a next node based on a next address field identifying the sequence, "3.0.51". The identifiers may be given a bit or binary representation and the hop identifiers may be distinguished or separated via address separator fields 40604*c* as described above with respect to FIG. 88C. An address separator field analogous to that shown in FIG. 88A may also be included and processed as described above. Assignment of hop identifiers is described in application Ser. No. 13/727,655 filed on 2012 Dec. 27, entitled "Methods, Systems, and Computer Program Products for Determining a Shared identifier for a Hop in a Network" identified as related above.

Note that the address information that identifies one or more protocol addresses for the seventh path node 40504*c*7 and for the destination node 40506*c* in the preceding description may include information that identifies a return path or a portion thereof. For example, the sequence address, "3.0.51", identifies, "0.3", which may be a protocol address that, in the third scope-specific address space identifies the seventh path node 40504*c* for the ninth path node 40504*c*9 operating as a gateway for nodes in the third network region 40510*c*3. The sequence, "0.1.1.2", identifies, "2.1.1", that, in the second-node-specific address space identifies a network path from the seventh path node 40504*c*7 to a node having a network interface in first network region 40510*c*1, illustrated by a second path node 40504*c*2. The second network region 40510*c*2 may include only one node, thus the second scope-specific address space may be a node-specific address space. A current scope-specific address space for a current node may be a node-specific address space specific to the current node.

The sequence, "0.3", is not an identifier in the third scope-specific address space as can be seen in FIG. 85. Further, while the sequence "2.1.1" is an identifier in the second scope-specific address space it does not identify any network interfaces of nodes in the first network region 40510*c*1. Separate source address information may be included in a data unit received by the seventh path node 40504*c*7 that includes data sent from the source node 40502*c*. Address information in the data unit may include a source protocol address representation 40602*c* that may identify "2.1.1.101" as a protocol address that, in the second node-specific address space identifies the source node 40502*c*. Note that '101' may identify a hop in the first network region 40510*c*1 from the second path node 40504*c*2 to the source node 40502*c*. For example, subnet 40514*c*1 may be a LAN. In other aspect, '101' may be a scoped address that identifies the source node 40502*c* in the scope of the first network region 40510*c*2. Thus a scope-specific protocol address may include a scoped address.

As described in the previous paragraph, a hop may be assigned an identifier that is shared by the pair of nodes in the hop. Thus a sequence of hop identifiers may serve as a scope-specific address in one scope-specific address space when processed in one order of the sequence and may serve as another scope-specific address specific to another node when processed according to another order of the sequence. Any of the address types illustrated in FIGS. 88A-C, along with various variants and analogs, are suitable for including reversible address information.

Figure 88D:
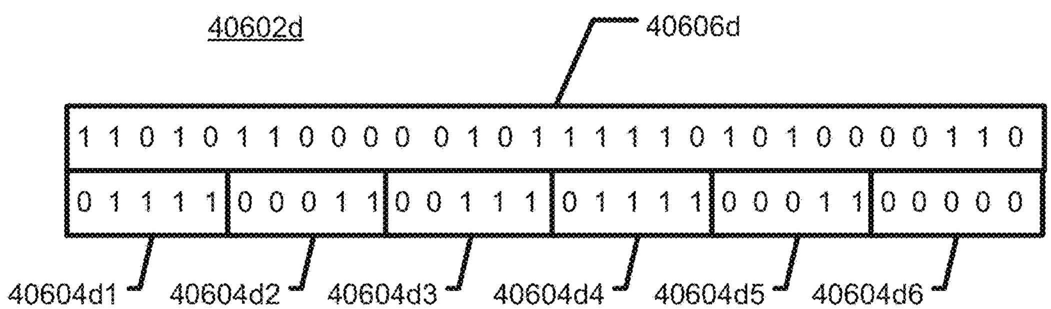

FIG. 88D includes an address representation 40602*d* illustrating a schema for representing path information based on identifiers of network interfaces included in a hop and/or path end nodes in a network path. A routing component 40404*a* and/or an in-data component 40402*a* may operate based on the schema or a portion of the schema. An address information field 40606*d* includes path information identifying a network path communicatively coupling a pair of path end nodes in a network path. FIG. 88D illustrates that an address representation 40602*d* may include one or more address separator fields 40604*d* that correspond to and/or otherwise identify respective one or more portions of the address information field 40606*d* that are based on one or more pairs of identifiers of network interfaces of path end nodes. An address separator field 40604*c* includes a series of '1' value bits and '0' value bits. A change from a '1' value to a '0' value and vice versa may indicate, to a routing component 40404*a* and/or a separator component 40406*a*, a boundary separating network interface identifiers. Since a network path may consist of a single hop, a pair of network interface identifiers corresponding to an address separator portion 40604*c* may identify network interfaces in a hop in a network path. An address separator field 40604*d*1 includes one '0' bit followed by four '1' bits. The '0' bit may be defined to indicate that a first network interface in a first hop identifier is one bit long with a corresponding position in the address information field 40606*d*. FIG. 88D identifies the first network interface identifier as the number '1' in base ten. The four '1' bits in the first address separator field 40604*d*1 may be similarly defined to identify the location of a second network interface identifier in the first hop identifier. The second network interface identifier, as illustrated in FIG. 88D, has the value '10' in base ten. The first hop identifier includes the numbers '1' and '10'. A second hop identifier is located by the end of the series of four '1' bits in the first address separator field 40604*d*1 to a series of three '0' bits that identify a boundary of a second address separator field 40604*d*2 for second hop information identifying a second hop identifier, and the three '0' bits also identify the location of a first network interface identifier in second hop information in the address information field 40606*d*. Two subsequent '1' bits identify the location in the address field 40606*d* of a second network interface identifier in the second hop information. The second hop identifier includes the numbers '6' and '0' in base ten. The remaining address separator fields 40604*d* may be processed similarly.

The protocol address illustrated FIG. 88D may be represented textually as "1-10.6-0.0-5.1-14.5-0.6". Note that the last hop mask does not include a pair of identifiers and is similar to address portions identified based on address separator fields 40604*c* described with respect to FIG. 88C or may be a scoped address. This is illustrated to demonstrate that protocol addresses may be uniform or non-uniform in their format and content. FIG. 88D illustrates that hop identifiers may be scope-specific hop identifiers and thus each hop identifier serves to identify a next node in the context of a path node a network path identified the hop and/or path identifiers, and also may serve to identify a previous node for a path node in the network path. As such its format and vocabulary the identifiers included in an address information field 40606*d* may be scope-specific.

In FIG. 87B, a source node 40502*b* may identify a destination node 40506*b* by a destination protocol address in a source node-specific address space specific to the source node, where the protocol address is based on pairs of network interface identifiers as described in the previous paragraphs. For example, FIG. 87B illustrates a sequence of pairs of network interface identifiers, "151-254.151-254.253-105", may be a protocol address, that in the source node-specific address space, identifies the destination node 40506*b*. The source node 40502*b* may send a data unit including an address representation 40602*d* illustrated in FIG. 88D. Note that reversing the network interface identifiers yields the identifier, "105-253.254-151.254-151", that may be a protocol address that, in a destination node-specific address space specific to the destination node 40506*b*, identifies the source node 40502*b*.

For a first path node 40504*b*1, an address representation 40602*d* in a data unit including data received from the source node 40502*b* may include previous address information identified by a routing component 40404*a* based on one or more address separator fields 40604 that identify the "151-254" and/or that identify the sequence "254-151". The sequence order as "151-254" may identify a protocol address that, in the source node-specific address space, identifies the first path node 40504*b*1. The sequenced ordered as "254-151" may identify a protocol address that, in a first path node-specific address space specific to the first path node 40504*b*1, identifies the source node.

Further for the first path node 40504*b*1, the address representation 40602*d* may include next address information identified by the routing component 40402*a* based on one or more address separator fields 40604*d* that identify the sequence, "151-254.253-105", in a first order and/or in a second order. The sequence, "151-254.253-105", in the first order may identify a protocol address that, in the first path node-specific address space, identifies the destination node 40506*b*. The sequence, "105-253.254-151", in the second order may identify a protocol address that, in the destination node-specific address space, identifies the first path node 40504*b*1.

Still further for the first path node 40504*b*1, the next address information identified by the routing component 40404*a* identifies the sequence, "151-254", in a first order and/or in a second order. The sequence, "151-254", in the first order may identify a protocol address that, in the first path node-specific address space, identifies a second path node 40504*c*2 in a network path to the destination node 40506*b*. The sequence, "254-151", in the second order may identify a protocol address that, in a second path node-specific address space specific to the second path node 40504*b*2, identifies the first path node 40504*b*1.

A sequence of hop identifiers based on network interface identifiers may serve as a scope-specific address in one scope-specific address space when processed in one order of the sequence and may serve as another scope-specific address specific to another node when processed according to another order of the sequence.

Figure 88E:
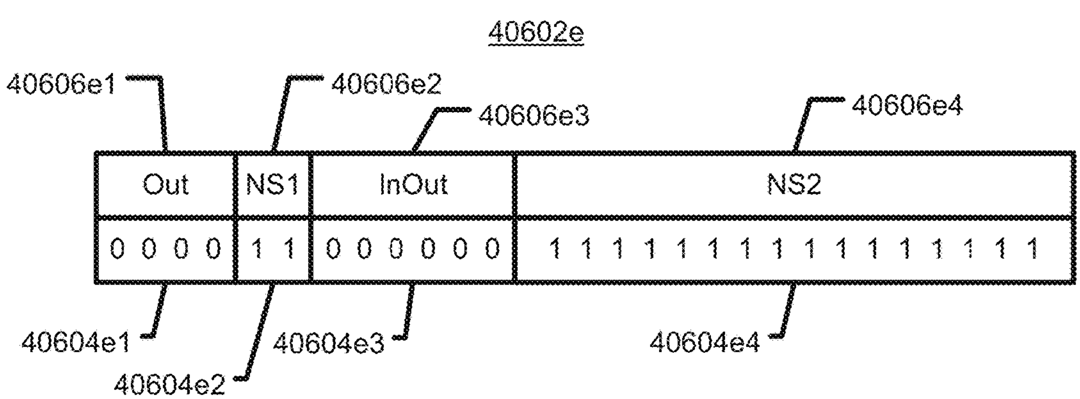

FIG. 88E illustrates an address representation 40602*e* that further demonstrates that a routing component 40404*a* and/or a separator component 40406*a* may be adapted to detect a protocol address, of a next node, in a protocol address based on path information and/or based on address information that does not identify a network path. An address representation 40602*e* may include portions that include path information and/or portions that include scoped protocol addresses. A routing component 40404*a* interoperating with a separator component 40406*a* may distinguish protocol address portions based on address separator fields 40604*e*. Address separator fields 40604*e* may be defined to identify protocol address portions in a manner similar to the method described to distinguish hop identifiers in FIG. 88C. A previous address information field 40606*e*1, in FIG. 88E, corresponding to a first address separator field 40604*e*1 includes a single network interface identifier for an outbound network interface for a source node 40502 as described above with respect to FIG. 88A and FIG. 87C. A next address information field **40606*e*2 corresponding to a second address separator field 40604*e*2 may include a scoped protocol address having an inside scope, an outside scope, or both. A node processing the second address information field 40606*e*2 may be included in a portion of a network spanned by the scope of the scoped protocol address. The node may process the scoped protocol address accordingly. See application Ser. No. 11/962,285, by the present inventor, filed on 2007 Dec. 21, entitled "Methods and Systems for Sending Information to a Zone Included in an Internet Network" for a description of addresses having outside scope and/or inside scope and processing of such addresses. A third address information field 40606*e*3 corresponding to a third address separator field 40604*e*3 may include a pair of identifiers as described with respect to FIG. 88D. A fourth address information field 40606*e*4 corresponding to a fourth address separator field 40604*d*4 may include a protocol address analogous to one of the types of addresses described with respect to the next address information field 40606*e*2 such as a local-scoped address. FIG. 88**E illustrates that a scope-specific protocol address specific to a node may include addresses and/or portions of addresses that are not from a scope-specific address space.

In FIG. 87B, a source node **40502*b*1 may be included in a first network region that includes network interfaces coupling nodes to a first network 40514*b*1 included in a network 40500*b*. A destination node 40506*b* may be included in a third network region that includes network interfaces coupling nodes to a third network 40514*b*3. Each of the two nodes may identify the other by a protocol address in respective scope-specific address spaces. For example, a sequence of scoped addresses, "254.254.105", may be a protocol address that, in a first scope-specific address space specific to the first network 40514*b*1, may identify the destination node 40506*b* to the source node 40502*b* as well as to other nodes in the first network region defined by the first network 40514*b*1. A data unit including an address representation 40602*e* in FIG. 88**E may identify a scope-specific protocol address based on a sequence of scoped addresses.

For a second path node **40504*b*2, an address representation 40602*e* in a data unit including data received from the source node 40502*b* may include previous address information identified by a routing component 40404*a* in the second path node 40504*b*2 based on one or more address separator fields 40604*e* that identifies previous sequence, "254.252" in previous address information in the address representation 40602*e*. The previous sequence may identify a protocol address that, in the first scope-specific address space, identifies the second path node 40504*b*2**.

Further for the second path node **40504*b*2, the previous address information identified by a routing component 40404*a* in the second path node 40504*b*2 identifies a first scoped address, '254', that in the scope of the second network 40514*b*2 identifies a network interface of the second path node 40504*b*2 to nodes with network interfaces in the second network 40514*b*2**.

Yet further for the second path node **40504*b*2, the address representation 40602*e* may include next address information identified by the routing component 40404*a* in the second path node 40504*b*2 based on one or more address separator fields 40604*e* that identifies a scoped address, '105'. The scoped address, '105', in the scope of the third network 40514*b*3 identifies the destination node 40506*b* to nodes with network interfaces in the third network 40514*b*3, such as the second path node 40504*c*2**.

In still another aspect, a scope-specific addresses may conform to a currently-known schema defining a valid Internet Protocol address as specified by RFC 791 and/or RFC 3513 in a scope-specific address space specific to a network region. The scope-specific address is processed as scope-specific as opposed to interpreting it as included in a global address space as is currently done. In one aspect, mapping may be specified between scope-specific address spaces and from the scope-specific address space to a global address space. A mapping may be ruled-based and/or may be specified by associations such as represented by a lookup table.

A routing component **40404*a* interoperating with a separator component 40406*a* in a current path node 40504 may detect first address information identifying a current-first protocol address that, in a current scope-specific address space specific to a current network region that includes the current path node 40504, identifies a first node in the network. Second address information identifying a first-second protocol address that, in a first scope-specific address space specific to a first network region that includes the first node, identifies a second node in a network path including the current node for transmitting data from a source node 40502 and an identified destination node 40506. The routing component 40402*a* operating in the current path node 40504 may detect a relationship between the current-first protocol address and the first-second protocol address. The routing component 40404*a* may generate a first-to-current mapping rule based on the relationship. The routing component 40404*a* may process the first-second protocol address based on the first-to-current mapping rule to determine a current-second protocol address that, in the current scope-specific address space, identifies the second node in the network path. The second node may be a next node with respect to the current path node 40504 and the data from the source node 40502. The second node may be the destination node 40506**.

In another aspect, a current-first protocol address, "10.22.106.3", from the current scope-specific address space, may serve as an identifier with respect to the current node of a first node in the network. A second-first protocol address, "40.88.58.1", in a second scope-specific address space, may serve as an identifier with respect to a second node of the first node. The current-first protocol address and second-first protocol address, in the example, include four parts. The first part of the second-first protocol address is greater by thirty than first part of the current-first protocol address. The second part of the second-first protocol address is greater by sixty-six than the second part of the current-first protocol address. The third part of the second-first protocol address is less by fifty-eight or greater by one hundred ninety-eight, taking the modulus based on a maximum value of two hundred fifty-five, than the third part of the current-first protocol address. The fourth part of the second-first protocol address greater by two or greater by two hundred fifty-four, taking the modulus based on a maximum value of two hundred fifty-five, than the current-first protocol address. A mapping rule may indicate that addresses in the current scope-specific address space have a one-to-one mapping between the current scope-specific address space to the second scope-specific address space that is based on an addend for each of the four portions of the various addresses, additionally taking the modulus of the result based on a maximum value for each address information field. By determining the addend the mapping rule may be determined by a routing component **40402*a*** in the current node. The current-second protocol address from the current scope-specific address space may serve to identify the second node as a next node in the network path. A protocol address in the current scope-specific address that identifies a previous node in the network path may be determined similarly.

A second-second protocol address may be represented as, "200.10.150.33", that in the second scope-specific address spaces identifies the second node. A routing component 40404 in the current path node 40504 may determine that the current-second protocol address, in the current scope-specific address space, for the second node may be calculated based on the mapping rule represented here as "200+30 mod 256.10+66 mod 256.150+198/mod 256.33+254 mod/256", or "230.76.92.31".

The mapping rule may be specific to the current scope-specific address space and the second scope-specific address space, may be specific to an identified group of scope-specific address spaces specific to a respective network regions, and/or may apply among all scope-specific address spaces in use by nodes in the network. Those skilled in the art will see given the examples than many mapping rules exist that allow protocol addresses to be determined from previous address information and next address information according to the method illustrated in FIG. 84.

In an aspect, a current scope-specific address space respectively may include identifiers that identify locations, in a multi-dimensional metric space, that is defined based on a plurality of axes that intersect at a current-origin location in the metric space that represents a node in the current scope-specific address space. A network interface of the node at the current-origin location may be identified based on an axis in the plurality of axes. The current-next protocol address may be detected relative to a current-origin address that, in the current scope-specific address space, identifies the current-origin location in the metric space, wherein the current-next protocol address identifies a next location in the metric space relative to the current-origin location and the next location represents the next node.

In related aspect, a current path node 40504, in a network path for transmitting data from a source node 40502 to a destination node 40506, may be in a current network region that has a current scope-specific address space. The current scope-specific address space may include an origin address, such as address "400.400.400.400", that identifies a network interface of a node in the network identifying an origin node and/or an origin network interface. Protocol addresses in the current scope-specific address space that identify other network interfaces and/or nodes may be defined relative to the origin address based on a specified mapping rule that is defined based on a relationship between the origin node and other network interfaces and/or nodes in the network. The mapping rule may be based on a metric and represented in a network topology of the network.

A mapping rule between a current node-specific address space of a current node and next scope-specific address space specific to a next node may be determined based on an current origin protocol address in the current scope-specific address space a current-next protocol address in the next scope-specific address space that identifies the current node, and a protocol address in the current scope-specific address space of an origin network interface and/or origin node in the next network region.

The mapping rule may specify a coordinate shift and/or a rotation about an axis, for example. The mapping may be pre-specified and accessible to the current node. In another aspect, the current node may determine the mapping based on detected relationships between pairs of protocol addresses respectively from the two scope-specific addresses spaces of the current node and the next node where a protocol address from each of the address spaces that identifies a same node is known to the current node.

Exemplary metric space include Euclidean spaces, non-Euclidean spaces, geo-spaces, and other geometric spaces. A Cartesian coordinate system is an exemplary address space for a Euclidean space. Another example of a geometric address space is a geospatial address space such as used currently in geo-location services. Networks have topologies that may be represented in a geo-space including locations addressed via a geometric address space.

As described various types of protocol addresses may conform to various schemas defining rules for formatting valid protocol addresses and/or defining vocabularies specifying valid content of a protocol address. Given a current node in a network path for transmitting data from a source node to a destination node, the current node may identify a next protocol address and/or a previous protocol address that are scope-specific protocol addresses according to various aspects as described above, and their analogs and extensions.

A next protocol address and/or a previous protocol address may be determined and/or otherwise identified based on one or more of a schema of one or more of a destination protocol address and/or a source protocol address identified in an address information of a data unit, a schema of a scope-specific hop identifier, a mapping between two or more of the schemas or portions thereof of two or more respective scope-specific address spaces, relationships between the nodes to which the protocol addresses are specific, relationships between the scope-specific address spaces of the protocol addresses, and relationships between the nodes in a network that includes them. Some of the relationships listed may be represented in a network topology of the network. A routing component 40404 may detect some or all of the network topology in determining a next protocol address and/or a previous protocol address.

In FIG. 86A, a routing component **40404*a* may provide a next protocol address of a next node and/or forwarding information based on the next protocol address to a forwarding component 40408*a* to determining a network interface for sending data from a source node 40502 to a destination node 40506 via a next node in a network path from a current path node 40504 including the forwarding component 40408*a*. In FIG. 86A, a forwarding component 40408*a* is illustrated operatively coupled to a network layer component 40403*a* and operatively coupled to the routing component 40404*a***.

Determining a next network interface based on a protocol address of a next node may include detecting a network interface identifier in the protocol address. In FIG. 87C, data in a data unit may be received by the seventh path node **40504*c*7 from the source node 40502*c*. Address information in the data unit may identify the destination node 40506*c* via a protocol address, "101.0.1.2.3.0.51", representing a sequence of hops in a network path including the source node 40502*c* and the destination node 40506*c***.

As described above, the routing component may determine that a protocol address based on the sequence, "3.0.51", in the second scope-specific address space, identifies the destination node **40506*c*. Further, the hop identifier, '3', may identify, in the second scope-specific address space, the eighth path node 40504*c*8 as a next node. The number '3', as described above is assigned to identify a hop including the seventh path seventh path node 40504*c*7 and the eighth path node, and thus identifies a network interface, in the seventh path node 40504*c*7**, that is included in the hop.

Identifying a next network interface may include performing a mapping and/or lookup that maps a portion of a protocol address of a next node to an identifier that identifies a NIC 40405*a* to a link layer component 40407*a*. A next network interface may be identified by mapping a network layer address to a link layer address by means of a lookup table or record associating the network layer address with the link layer address.

For scope-specific protocol addresses that do not include an identifier of a next node, a similar lookup operation may be performed. In an aspect, a scope-specific address may be mapped to another address space such as global protocol address space or subnet-specific protocol address space shared by nodes in a portion of a network such as a LAN and/or a sub-network. Performing a mapping operation may reduce the number of lookup tables and/or records that must be maintained and/or otherwise accessed.

Protocol addresses illustrated in FIGS. 88A-E may include identifiers from scope-specific address spaces that identify a next node. In some aspects, a protocol address of next node includes an identifier of a network interface for transmitting data to a destination protocol address via a network path that includes a next node identified by the protocol address. Routing tables and/or routing policies are not required when protocol addresses include identifiers of next nodes. In some aspects, routing tables and routing policies may be supported to support addresses from global protocol address and may be supported when a hop identifier identifies a pair of nodes in a network path that are communicatively coupled via one or more other path nodes.

In FIG. 86A, a forwarding component 40408*a* may provide data and a next protocol address to an out-data component 40410*a* to send the data to a next node via a network interface identified by forwarding component 40408*a*. The next node may be a destination node 40506 or a path node 40504 in a network path for transmitting data from a source node 40502 to the destination node 40506. In FIG. 86A, an out-data handler 40410*a* is illustrated operating in a network layer component 40403*a*. The out-data component 40410*a* may include the data in one or more network layer protocol data units including an address information, as described above, addressed to the destination node 40506 according to a network layer protocol of the network protocol component 40403*a*.

The one or more network layer protocol data units may be provided to a link layer component 40407*a* as data to include in one or more link layer protocol data units for transmitting via a NIC 40405*a* based on the network interface identified by the forwarding component 40408*a*. In a node with one NIC operatively coupled to a physical data transmission medium or with multiple NICs operatively coupled to the shared data transmission medium, an out-data component 40410*a* may send network layer data packets via the one NIC or any of the multiple NICs over the physical data transmission medium for delivery to the destination node 40506 according to network interface identified by the forwarding component 40408*a*. Link layer protocol data units may be sent by the link layer component 40407*a* according to a compatible link layer protocol and link layer address information. For example, Ethernet frames may be sent as link layer protocol data units via an Ethernet cable operatively coupled to a NIC 40405*a*1 included in a suitable network path for transmitting the data to the destination node 40506.

FIG. 86B illustrates another exemplary execution environment 40401*b* that may include and/or otherwise be provided by a path node 40504 in FIGS. 87A-C. In FIG. 86B, the execution environment 40401*b* includes a first line card 40409*b*1 that includes a first NIC 40405*b*1. The first line card 40405*b*1 is adapted for physically and operatively coupling the path node 40504 to a previous network path with respect to data from a source node 40502 for relaying to a destination node 40506. The execution environment 40401*b* also includes a second line card 40409*b*2 including a second NIC 40405*b*2 for physically and operatively coupling the path node 40504 to a next network path with respect to the data from the source node 40502.

Data, sent from a source node 40502, and an identifier of a destination node 40506 may be received in a data unit of a network protocol by the first NIC 40405*b*1 in the path node 40504. The data may be detected by an in-data component 40402*b*1 operatively coupled to first NIC 40405*b*1. Address information may be detected in an address representation included in the data unit according to the network protocol. The in-data component 40402*b*1 may send the address information to a routing component 40404*b* via an internal communications medium 40411*b*, such as a bus 40116 in FIG. 83, for determining a next protocol address, in a scope-specific address space of the path node 40504, that identifies a next node. The routing component 40404*b* may include, be processed by, and/or otherwise interoperate with a general processing unit 40413*b* and/or other hardware in processing the address information. A routing component 40404*b* may be included, in some aspects, to also process protocol addresses that do not include an identifier of the next network interface component, or for routing IP addresses from global address spaces as currently specified by RFC 791 and RFC 3513.

The routing component 40404*b* interoperating with separator component 40406*b* may determine the protocol address of the next node as describe above and/or in an analogous manner. The routing component 40404*b* may provide some or all of the next protocol address to a forwarding component 40408*b*. The forwarding component 40408 may identify a second line card 40409*b*2 including a second NIC 40405*b*2, based on some or all of the next protocol address. The forwarding component 40408*b* may interoperate with the GPU 40413*b* to configure the internal data transmission medium 40411*b* for delivering the data received in the data unit from the first line card 40409*b*1 to the second line card 40409*b*2 for final packaging in one or more data units of the network protocol by an out-data component 40410*b*2. The out-data component 40410*b*2 operate interoperates with the a second NIC 40405*b* to transmit the data via a data transmission medium to which the second NIC 40405*b*2 is operatively coupled.

FIG. 86C illustrates still another exemplary execution environment 40401*c* that may include and/or otherwise be provided by a path node 40504 in FIGS. 87A-C. In FIG. 86C, the execution environment 40401*c* includes a first line card 40409*c*1 that includes a first NIC 40405*c*1. The first line card 40405*c*1 is adapted for physically and operatively coupling the path node 40504 to a previous network path with respect to data from a source node 40502 for relaying to a destination node 40506. The execution environment 40401*c* also includes a second line card 40409*c*2 including a second NIC 40405*c*2 for physically and operatively coupling path node 40504 to a next network path with respect to the data from the source node 40502.

In FIG. 86C, a routing component 40404 and a separating component 40406 may be a distributed component. FIG. 86C illustrates that a routing component 40404 may be realized as routing agent components 40404*c* included in line cards 40409 in a path node 40504. A separating component (not shown) may be included in a routing component 40404*c* and/or otherwise accessible to a routing component 40404*c*. A forwarding component may also be distributed as illustrated in FIG. 86C by forwarding agent components 40408*c* included in the line cards 40409. An FA component 40408*c*1 may configure a switch interconnect unit (SIU) 40411*c* to provide a communication channel from a first line card 40409*c*1 to a second line card 40409*c*2 and vice versa, as needed. Each line card 40409*c* may include a switch interface (SI) component 40415*c* for writing data to a channel in the SIU component 40411*c* and/or for reading data from a channel.

A routing agent (RA) component, such as a first RA component 40404*c*1, may identify a next protocol address based on address information detected by a first in-data (ID) component 40402*c*1. Based on some or all of the next protocol address, the first FA component 40408*c*1 may identifying a next line card 40409*c*, such as a second line card 40409*c*2, for transmitting data received from a source node 40502 to a next node identified by the next protocol address as described above with respect to FIG. 86A and FIG. 86B. The first FA 40408*c*1 may setup a channel in the SIU component 40411*c* for communicating the data via a first SI component 40415*c*1 to a second SI component 40415*c*2 of the second line card 40409*c*2. The second SI component 40415*c*2 may read the data communicated via the SIU component 40411*c* and provide the data to a second out-data (OD) component 40410*c*2 in the second line card 40409*c*2 for transmitting to the next node. Data may be relayed from the destination node 40506 to the source node 40502 via a second ID component 40402*c*2 and a first OD component 40410*c*1 in an analogous manner.

The following aspects of the method illustrated in FIG. 84 have been described above and illustrated in the drawings identified above. The address information identified by an address field in a data unit may include next address information to identify one or more of the current-next protocol address and a next-current protocol address that, in a next scope-specific address space specific to a next network region including the next node, identifies the current node. Further, the address information may include previous address information to identify at least one of a previous-current protocol address that, in a previous scope-specific address space specific to a previous network region that includes the previous node, identifies the current node and a current-previous address that, in the current scope-specific address space, identifies the previous node.

Further, identifying the current-next protocol address may include identifying the current-next protocol address relative to a current location identifier that identifies a current location in a metric space including a network topology representing a node in the current network region. The current-next protocol address identifies a next location in the metric space relative to the current location and the next location represents the next node. The current location may be defined as an origin in the metric space and the current scope-specific address space may be defined based on the metric space and the origin. The current-next protocol address may identify a next network path included in communicatively coupling the current node and the next node and may identify a sequence of locations in the metric space that respectively represent nodes in the next network path according to the network topology.

Additionally, the source-destination protocol address and/or the destination-source protocol address may includes a plurality of hop identifiers identifying a sequence of hopes in a network path included in communicatively coupling the source node and the destination node. The address information may include the plurality of hop identifiers in an identifiable first order and in an identifiable second order. The source-destination protocol address may include the plurality of hop identifiers in the first order. The destination-source protocol address may include the plurality of hop identifiers in the second order. One or both of the first order and the second may be identified in the address information. One or both of the first order and the second order may be identified by sequence information represented separately from the plurality of hop identifiers.

A first hop including a first hop node and a second hop node, both in the network path, may be identified with respect to the previous node by a previous hop identifier in a previous scope-specific address space specific to a previous network region that includes the previous node, identified with respect to the current node by a current hop identifier in the current scope-specific address space, and identified with respect to the next node by a next hop identifier in a next scope-specific address space specific to a next network region that includes the next node.

The first hop identifier may be assigned from a first scope-specific address space specific to a first network region that includes a network interface in the first hop node to identify the first hop in response to a negotiation between the nodes in the first hop.

The first hop node and the second hop node are communicatively coupled via a first network interface in the first hop node and via a second network interface in the second hop node, wherein the first hop identifier includes at least one of a first network interface identifier identifying the first network interface and a second network interface identifying the second network interface to at least one of the first hop node and the second hop node.

A current-first path hop identifier that, in the current scope-specific address space, identifies the first hop and the current-first path identifier includes the first hop identifier, wherein the current-first path hop identifier identifies a network path that includes the current node as a path end node, the first hop node, and the second hop node. The first hop may be included in communicatively coupling the current node and one of the source node and the destination node. The current node may be either the first hop node or the second hop node. The previous-current protocol address may include the first hop identifier or the current-next protocol address may include the first hop identifier.

Figure 89:
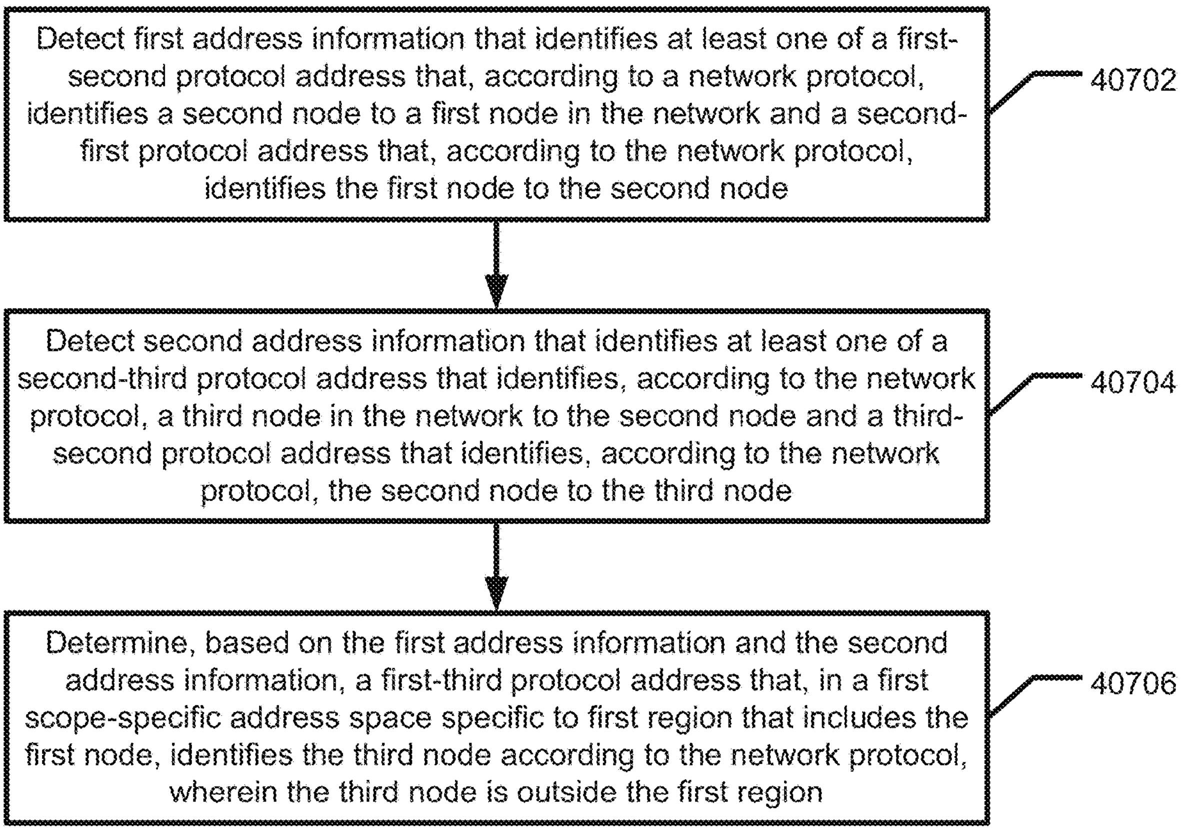

An execution environment 40401, such as illustrated in FIGS. 86A-C may include an arrangement of components that may operate to perform a method illustrated in FIG. 89. The system illustrated by the arrangement includes a routing component 40404, a separator component 40406, and a forwarding component 40408. A suitable execution environment includes a processor, such as processor 40104, to process an instruction in at least one of an routing component, a separator component, and an forwarding component.

With reference to FIG. 89, a block 40702 illustrates that the method includes detecting first address information that identifies at least one of a first-second protocol address that, according to a network protocol, identifies a second node to a first node in the network and a second-first protocol address that, according to the network protocol, identifies the first node to the second node. Accordingly, the systems in FIGS. 86A-C include means for detecting first address information that identifies at least one of a first-second protocol address that, according to a network protocol, identifies a second node to a first node in the network and a second-first protocol address that, according to the network protocol, identifies the first node to the second node. The each system includes one or more processors and logic encoded in one or more computer readable media for execution by the one or more processors that when executed is operable for and/or is otherwise included in detecting first address information that identifies at least one of a first-second protocol address that, according to a network protocol, identifies a second node to a first node in the network and a second-first protocol address that, according to the network protocol, identifies the first node to the second node.

For example, the arrangements in FIGS. 86A-C include a routing component 40404 that is operable for and/or is otherwise included in detecting first address information that identifies at least one of a first-second protocol address that, according to a network protocol, identifies a second node to a first node in the network and a second-first protocol address that, according to the network protocol, identifies the first node to the second node. Additionally or alternatively, a routing component 40404 may identify a previous-current protocol address that identifies the current node, with respect to the data in the received data unit, to a previous node included in communicatively coupling the source node and destination node. Further, the routing component 40404 may identify a current-previous protocol address that identifies the previous node, with respect to the current node.

With reference to FIG. 7, a block 40704 illustrates that the method includes detecting second address information that identifies at least one of a second-third protocol address that identifies, according to the network protocol, a third node in the network to the second node and a third-second protocol address that identifies, according to the network protocol, the second node to the third node. Accordingly, the systems in FIGS. 86A-C include means for detecting second address information that identifies at least one of a second-third protocol address that identifies, according to the network protocol, a third node in the network to the second node and a third-second protocol address that identifies, according to the network protocol, the second node to the third node. The system includes one or more processors and logic encoded in one or more computer readable media for execution by the one or more processors that when executed is operable for and/or is otherwise included in detecting second address information that identifies at least one of a second-third protocol address that identifies, according to the network protocol, a third node in the network to the second node and a third-second protocol address that identifies, according to the network protocol, the second node to the third node.

For example, the arrangements in FIGS. 86A-C include a separator component 40406 that is operable for and/or is otherwise included in detecting second address information that identifies at least one of a second-third protocol address that identifies, according to the network protocol, a third node in the network to the second node and a third-second protocol address that identifies, according to the network protocol, the second node to the third node. Alternatively or additionally, a separator component 40406 may detect second address information that identifies at least one of a current-next protocol address that identifies, according to the network protocol, a next node in the network to the current node and a next-current protocol address that identifies, according to the network protocol, the current node to the next node With reference to FIG. 89, a block 40706 illustrates that the method includes determining, based on the first address information and the second address information, a first-third protocol address that, in a first scope-specific address space specific to first region that includes the first node, identifies the third node according to the network protocol, wherein the third node is outside the first region. Accordingly, the system in FIGS. 86A-C includes means for determining, based on the first address information and the second address information, a first-third protocol address that, in a first scope-specific address space specific to first region that includes the first node, identifies the third node according to the network protocol, wherein the third node is outside the first region. The system includes one or more processors and logic encoded in one or more computer readable media for execution by the one or more processors that when executed is operable for and/or is otherwise included in determining, based on the first address information and the second address information, a first-third protocol address that, in a first scope-specific address space specific to first region that includes the first node, identifies the third node according to the network protocol, wherein the third node is outside the first region.

For example, the arrangements in FIGS. 86A-C include an forwarding component 40408 that is operable for and/or is otherwise included in determining, based on the first address information and the second address information, a first-third protocol address that, in a first scope-specific address space specific to first region that includes the first node, identifies the third node according to the network protocol, wherein the third node is outside the first region. Alternatively or additionally, a forwarding component 40408 may determine, based on the first address information and the second address information, a first-third path-based protocol address that identifies a network path that communicatively couples the first node and the third node.

Figure 90:
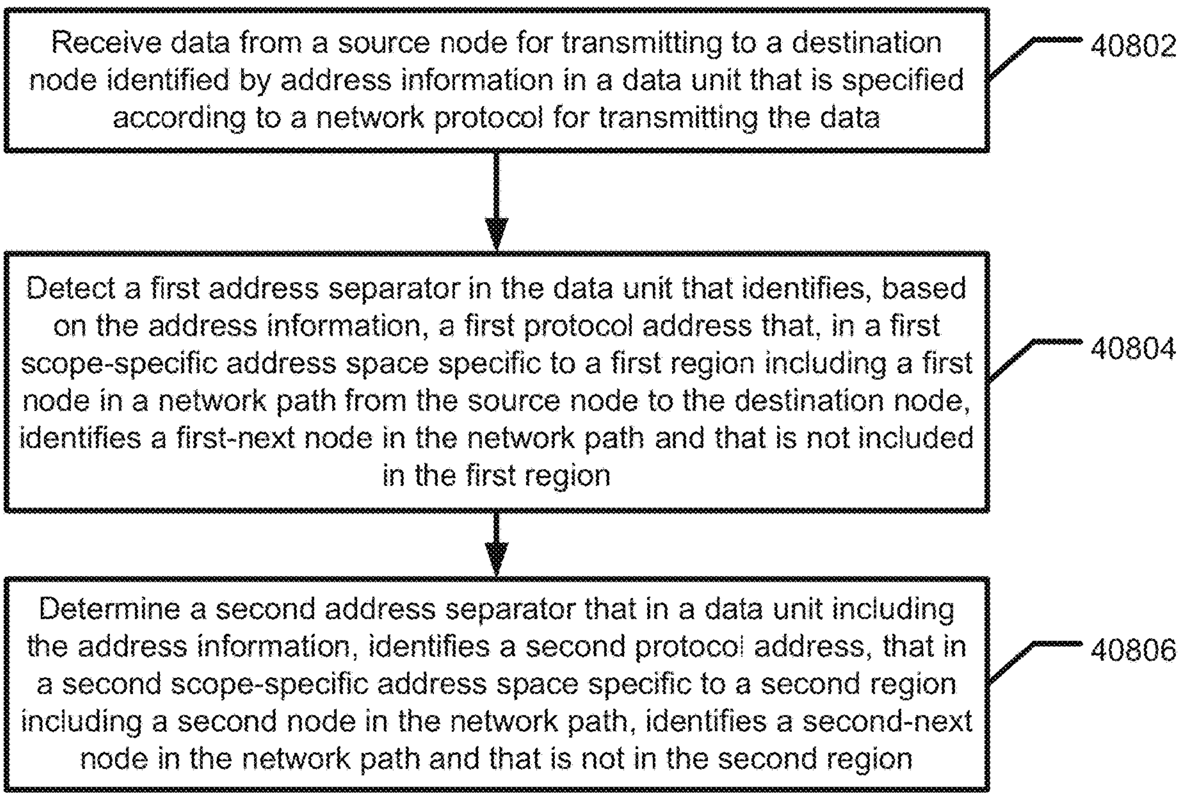

An execution environment 40401, such as illustrated in FIGS. 86A-C may include an arrangement of components that may operate to perform a method illustrated in FIG. 90. The system illustrated by the arrangement includes an in-data component 40402, a routing component 40404, and a separator component 40406. A suitable execution environment includes a processor, such as processor 40104, to process an instruction in at least one of an in-data component, a routing component, and a separator component.

With reference to FIG. 90, a block 40802 illustrates that the method includes receiving data from a source node for transmitting to a destination node identified by address information in a data unit that is specified according to a network protocol for transmitting the data. Accordingly, the systems in FIGS. 86A-C include means for receiving data from a source node for transmitting to a destination node identified by address information in a data unit that is specified according to a network protocol for transmitting the data. The system includes one or more processors and logic encoded in one or more computer readable media for execution by the one or more processors that when executed is operable for and/or is otherwise included in receiving data from a source node for transmitting to a destination node identified by address information in a data unit that is specified according to a network protocol for transmitting the data.

For example, the arrangements in FIGS. 86A-C include a in-data component 40402 that is operable for and/or is otherwise included in receiving data from a source node for transmitting to a destination node identified by address information in a data unit that is specified according to a network protocol for transmitting the data.

With reference to FIG. 90, a block 40804 illustrates that the method includes detecting a first address separator in the data unit that identifies, based on the address information, a first protocol address that, in a first scope-specific address space specific to a first region including a first node in a network path from the source node to the destination node, identifies a first-next node in the network path and that is not included in the first region. Accordingly, the system in FIGS. 86A-C includes means for detecting a first address separator in the data unit that identifies, based on the address information, a first protocol address that, in a first scope-specific address space specific to a first region including a first node in a network path from the source node to the destination node, identifies a first-next node in the network path and that is not included in the first region. The system includes one or more processors and logic encoded in one or more computer readable media for execution by the one or more processors that when executed is operable for and/or is otherwise included in detecting a first address separator in the data unit that identifies, based on the address information, a first protocol address that, in a first scope-specific address space specific to a first region including a first node in a network path from the source node to the destination node, identifies a first-next node in the network path and that is not included in the first region.

For example, the arrangements in FIGS. 86A-C include a routing component 40404 that is operable for and/or is otherwise included in detecting a first address separator in the data unit that identifies, based on the address information, a first protocol address that, in a first scope-specific address space specific to a first region including a first node in a network path from the source node to the destination node, identifies a first-next node in the network path and that is not included in the first region.

With reference to FIG. 90, a block 40806 illustrates that the method includes determining a second address separator that in a data unit including the address information, identifies a second protocol address, that in a second scope-specific address space specific to a second region including a second node in the network path, identifies a second-next node in the network path and that is not in the second region. Accordingly, the systems in FIGS. 86A-C include means for determining a second address separator that in a data unit including the address information, identifies a second protocol address, that in a second scope-specific address space specific to a second region including a second node in the network path, identifies a second-next node in the network path and that is not in the second region. The system includes one or more processors and logic encoded in one or more computer readable media for execution by the one or more processors that when executed is operable for and/or is otherwise included in determining a second address separator that in a data unit including the address information, identifies a second protocol address, that in a second scope-specific address space specific to a second region including a second node in the network path, identifies a second-next node in the network path and that is not in the second region.

For example, the arrangements in FIG. 86A-C include a separator component 40406 that is operable for and/or is otherwise included in determining a second address separator that in a data unit including the address information, identifies a second protocol address, that in a second scope-specific address space specific to a second region including a second node in the network path, identifies a second-next node in the network path and that is not in the second region.

Figure 91:
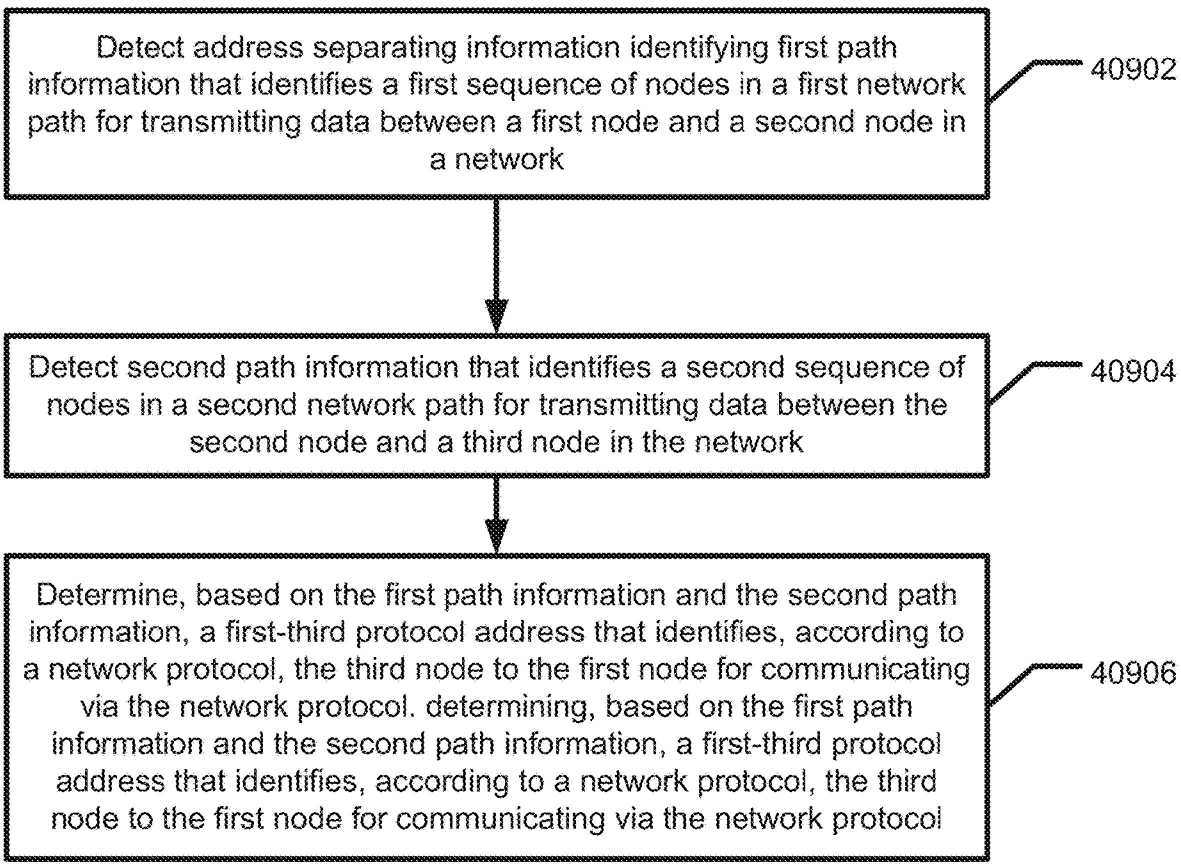

An execution environment 40401, such as illustrated in FIGS. 86A-C may include an arrangement of components that may operate to perform a method illustrated in FIG. 91. The system illustrated by the arrangement includes a routing component 40404 and a forwarding component 40408. A suitable execution environment includes a processor, such as processor 40104, to process an instruction in at least one of an routing component and a forwarding component.

With reference to FIG. 91, a block 40902 illustrates that the method includes detecting address separating information identifying first path information that identifies a first sequence of nodes in a first network path for transmitting data between a first node and a second node in a network. Accordingly, the systems in FIGS. 86A-C include means for detecting address separating information identifying first path information that identifies a first sequence of nodes in a first network path for transmitting data between a first node and a second node in a network. The system includes one or more processors and logic encoded in one or more computer readable media for execution by the one or more processors that when executed is operable for and/or is otherwise included in detecting address separating information identifying first path information that identifies a first sequence of nodes in a first network path for transmitting data between a first node and a second node in a network.

For example, the arrangements in FIGS. 86A-C include a routing component 40404 that is operable for and/or is otherwise included in detecting address separating information identifying first path information that identifies a first sequence of nodes in a first network path for transmitting data between a first node and a second node in a network.

With reference to FIG. 91, a block 40904 illustrates that the method includes detecting second path information that identifies a second sequence of nodes in a second network path for transmitting data between the second node and a third node in the network. Accordingly, the systems in FIGS. 86A-C include means for detecting second path information that identifies a second sequence of nodes in a second network path for transmitting data between the second node and a third node in the network. The system includes one or more processors and logic encoded in one or more computer readable media for execution by the one or more processors that when executed is operable for and/or is otherwise included in detecting second path information that identifies a second sequence of nodes in a second network path for transmitting data between the second node and a third node in the network.

For example, the arrangement in FIGS. 86A-C includes a routing component 40404 that is operable for and/or is otherwise included in detecting second path information that identifies a second sequence of nodes in a second network path for transmitting data between the second node and a third node in the network.

With reference to FIG. 91, a block 40906 illustrates that the method includes determining, based on the first path information and the second path information, a first-third protocol address that identifies, according to a network protocol, the third node to the first node for communicating via the network protocol. Accordingly, the systems in FIGS. 86A-C include means for determining, based on the first path information and the second path information, a first-third protocol address that identifies, according to a network protocol, the third node to the first node for communicating via the network protocol. The system includes one or more processors and logic encoded in one or more computer readable media for execution by the one or more processors that when executed is operable for and/or is otherwise included in determining, based on the first path information and the second path information, a first-third protocol address that identifies, according to a network protocol, the third node to the first node for communicating via the network protocol.

For example, the arrangements in FIGS. 86A-C include a forwarding component 40408 that is operable for and/or is otherwise included in determining, based on the first path information and the second path information, a first-third protocol address that identifies, according to a network protocol, the third node to the first node for communicating via the network protocol.

Figure 92:
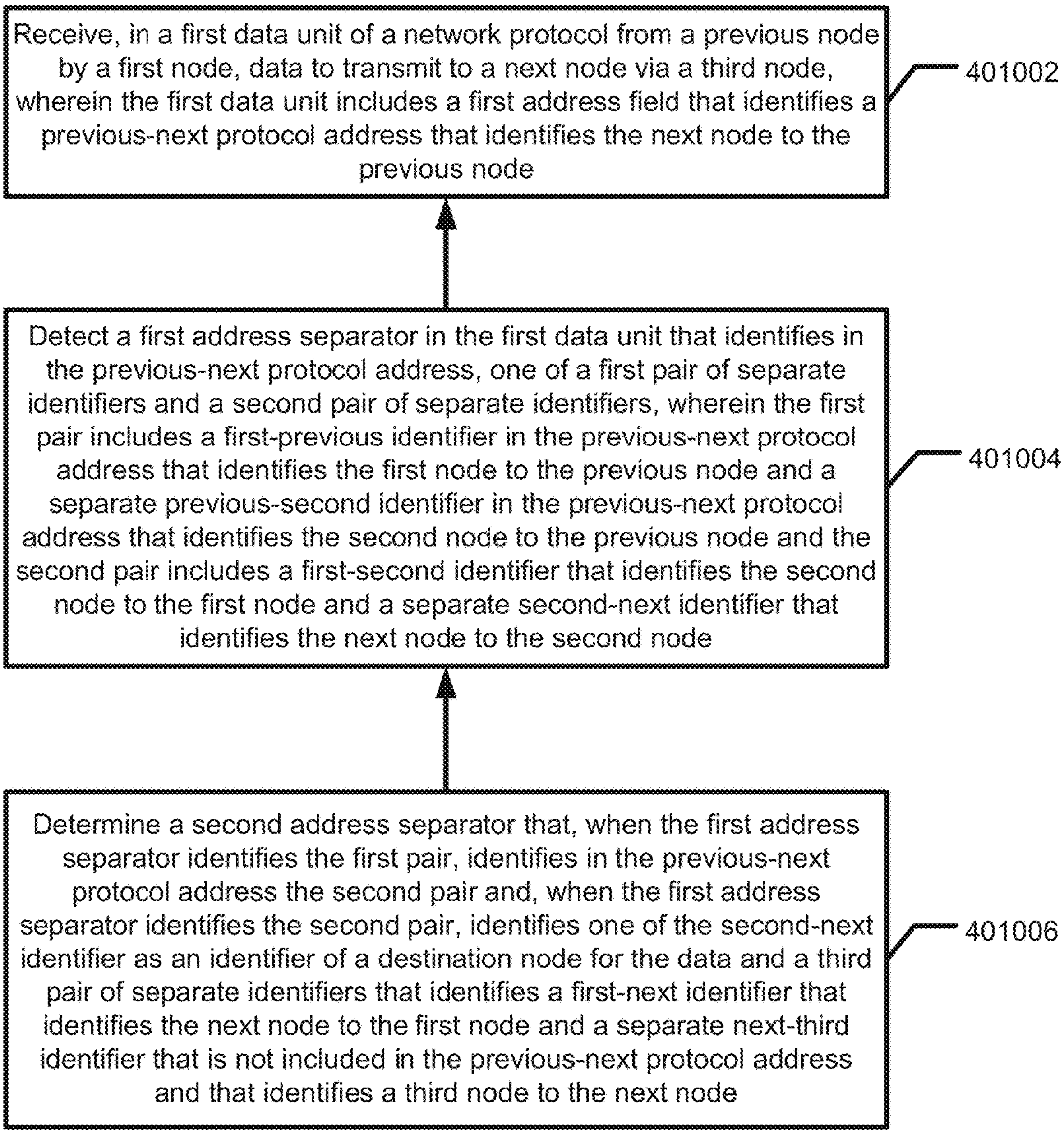

An execution environment 40401, such as illustrated in FIGS. 86A-C may include an arrangement of components that may operate to perform a method illustrated in FIG. 92. The system illustrated by the arrangement includes an in-data component 40402, a routing component 40404, and a forwarding component 40408. A suitable execution environment includes a processor, such as processor 40104, to process an instruction in at least one of a in-data component, a routing component, and a forwarding component.

With reference to FIG. 92, a block 401002 illustrates that the method includes receiving, in a first data unit of a network protocol from a previous node by a first node, data to transmit to a next node, wherein the first data unit includes a first address field that identifies a previous-next protocol address that identifies the next node to the previous node. Accordingly, the systems in FIGS. 86A-C include means for receiving, in a first data unit of a network protocol from a previous node by a first node, data to transmit to a next node, wherein the first data unit includes a first address field that identifies a previous-next protocol address that identifies the next node to the previous node. The system includes one or more processors and logic encoded in one or more computer readable media for execution by the one or more processors that when executed is operable for and/or is otherwise included in receiving, in a first data unit of a network protocol from a previous node by a first node, data to transmit to a next node, wherein the first data unit includes a first address field that identifies a previous-next protocol address that identifies the next node to the previous node.

For example, the arrangements in FIGS. 86A-C include a in-data component 40402 that is operable for and/or is otherwise included in receiving, in a first data unit of a network protocol from a previous node by a first node, data to transmit to a next node, wherein the first data unit includes a first address field that identifies a previous-next protocol address that identifies the next node to the previous node.

With reference to FIG. 92, a block 401004 illustrates that the method includes detecting a first address separator in the first data unit that identifies in the previous-next protocol address, one of a first pair of separate identifiers and a second pair of separate identifiers, wherein the first pair includes a first-previous identifier in the previous-next protocol address that identifies the first node to the previous node and a separate previous-second identifier in the previous-next protocol address that identifies the second node to the previous node and the second pair includes a first-second identifier that identifies the second node to the first node and a separate second-next identifier that identifies the next node to the second node. Accordingly, the systems in FIGS. 86A-C include means for detecting a first address separator in the first data unit that identifies in the previous-next protocol address, one of a first pair of separate identifiers and a second pair of separate identifiers, wherein the first pair includes a first-previous identifier in the previous-next protocol address that identifies the first node to the previous node and a separate previous-second identifier in the previous-next protocol address that identifies the second node to the previous node and the second pair includes a first-second identifier that identifies the second node to the first node and a separate second-next identifier that identifies the next node to the second node. The system includes one or more processors and logic encoded in one or more computer readable media for execution by the one or more processors that when executed is operable for and/or is otherwise included in detecting a first address separator in the first data unit that identifies in the previous-next protocol address, one of a first pair of separate identifiers and a second pair of separate identifiers, wherein the first pair includes a first-previous identifier in the previous-next protocol address that identifies the first node to the previous node and a separate previous-second identifier in the previous-next protocol address that identifies the second node to the previous node and the second pair includes a first-second identifier that identifies the second node to the first node and a separate second-next identifier that identifies the next node to the second node.

For example, the arrangements in FIGS. 86A-C include a routing component 40404 that is operable for and/or is otherwise included in detecting a first address separator in the first data unit that identifies in the previous-next protocol address, one of a first pair of separate identifiers and a second pair of separate identifiers, wherein the first pair includes a first-previous identifier in the previous-next protocol address that identifies the first node to the previous node and a separate previous-second identifier in the previous-next protocol address that identifies the second node to the previous node and the second pair includes a first-second identifier that identifies the second node to the first node and a separate second-next identifier that identifies the next node to the second node.

With reference to FIG. 92, a block 401006 illustrates that the method includes determining a second address separator that, when the first address separator identifies the first pair, identifies in the previous-next protocol address the second pair and, when the first address separator identifies the second pair, identifies one of the second-next identifier as an identifier of a destination node for the data and a third pair of separate identifiers that identifies a first-next identifier that identifies the next node to the first node and a separate next-third identifier that is not included in the previous-next protocol address and that identifies a third node to the next node. Accordingly, the systems in FIG. 86A-C include means for determining a second address separator that, when the first address separator identifies the first pair, identifies in the previous-next protocol address the second pair and, when the first address separator identifies the second pair, identifies one of the second-next identifier as an identifier of a destination node for the data and a third pair of separate identifiers that identifies a first-next identifier that identifies the next node to the first node and a separate next-third identifier that is not included in the previous-next protocol address and that identifies a third node to the next node. The system includes one or more processors and logic encoded in one or more computer readable media for execution by the one or more processors that when executed is operable for and/or is otherwise included in determining a second address separator that, when the first address separator identifies the first pair, identifies in the previous-next protocol address the second pair and, when the first address separator identifies the second pair, identifies one of the second-next identifier as an identifier of a destination node for the data and a third pair of separate identifiers that identifies a first-next identifier that identifies the next node to the first node and a separate next-third identifier that is not included in the previous-next protocol address and that identifies a third node to the next node.

For example, the arrangements in FIGS. 86A-C include a forwarding component 40408 that is operable for and/or is otherwise included in determining a second address separator that, when the first address separator identifies the first pair, identifies in the previous-next protocol address the second pair and, when the first address separator identifies the second pair, identifies one of the second-next identifier as an identifier of a destination node for the data and a third pair of separate identifiers that identifies a first-next identifier that identifies the next node to the first node and a separate next-third identifier that is not included in the previous-next protocol address and that identifies a third node to the next node.

Figure 93:
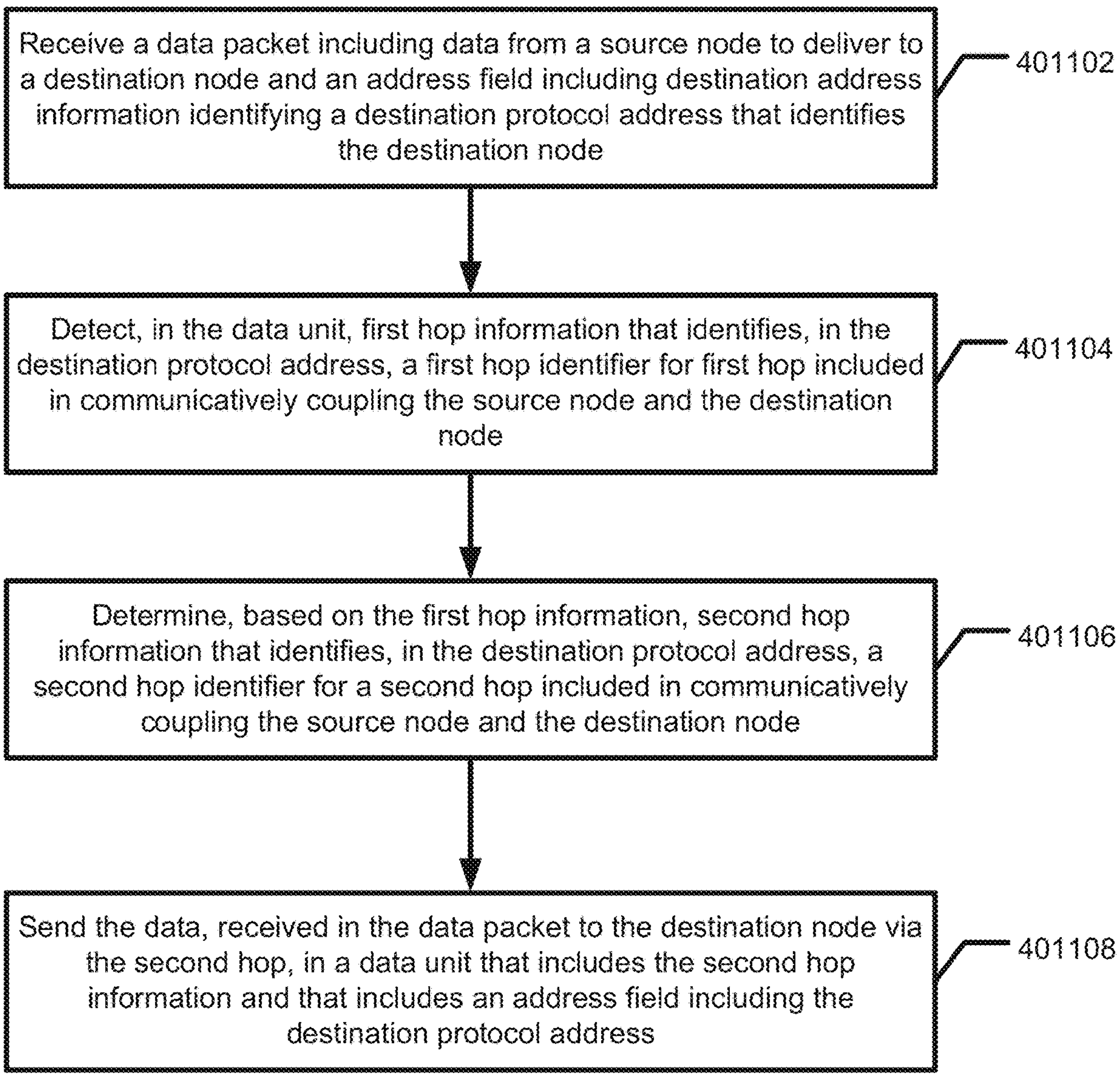

An execution environment 40401, such as illustrated in FIGS. 86A-C may include an arrangement of components that may operate to perform a method illustrated in FIG. 93. The system illustrated by the arrangement includes an in-data component 40402, a routing component 40404, a separator component 40406, and an forwarding component 40408. A suitable execution environment includes a processor, such as processor 40104, to process an instruction in at least one of an in-data component, a routing component, a separator component, and an forwarding component.

With reference to FIG. 93, a block 401102 illustrates that the method includes receiving a data unit including data from a source node to deliver to a destination node and an address field including destination address information identifying a destination protocol address that identifies the destination node. Accordingly, the systems in FIGS. 86A-C include means for receiving a data unit including data from a source node to deliver to a destination node and an address field including destination address information identifying a destination protocol address that identifies the destination node. The system for adjusting a separator field for a protocol address includes one or more processors and logic encoded in one or more computer readable media for execution by the one or more processors that when executed is operable for and/or is otherwise included in receiving a data unit including data from a source node to deliver to a destination node and an address field including destination address information identifying a destination protocol address that identifies the destination node.

For example, the arrangements in FIGS. 86A-C include a in-data component 40402 that is operable for and/or is otherwise included in receiving a data unit including data from a source node to deliver to a destination node and an address field including destination address information identifying a destination protocol address that identifies the destination node.

With reference to FIG. 93, a block 401104 illustrates that the method includes detecting, in the data unit, a first hop information that identifies, in the destination protocol address, a first hop identifier for first hop included in communicatively coupling the source node and the destination node. Accordingly, the systems in FIGS. 86A-C include means for detecting, in the data unit, a first hop information that identifies, in the destination protocol address, a first hop identifier for first hop included in communicatively coupling the source node and the destination node. The system includes one or more processors and logic encoded in one or more computer readable media for execution by the one or more processors that when executed is operable for and/or is otherwise included in detecting, in the data unit, a first hop information that identifies, in the destination protocol address, a first hop identifier for first hop included in communicatively coupling the source node and the destination node.

For example, the arrangements in FIGS. 86A-C include a routing component 40404 that is operable for and/or is otherwise included in detecting, in the data unit, a first hop information that identifies, in the destination protocol address, a first hop identifier for first hop included in communicatively coupling the source node and the destination node.

With reference to FIG. 93, a block 401106 illustrates that the method includes determining, based on the first hop information, second hop information that identifies, in the destination protocol address, a second hop identifier for a second hop included in communicatively coupling the source node and the destination node. Accordingly, the systems in FIGS. 86A-C include means for determining, based on the first hop information, second hop information that identifies, in the destination protocol address, a second hop identifier for a second hop included in communicatively coupling the source node and the destination node. The system includes one or more processors and logic encoded in one or more computer readable media for execution by the one or more processors that when executed is operable for and/or is otherwise included in determining, based on the first hop information, second hop information that identifies, in the destination protocol address, a second hop identifier for a second hop included in communicatively coupling the source node and the destination node.

For example, the arrangements in FIGS. 86A-C include a separator component 40406 that is operable for and/or is otherwise included in determining, based on the first hop information, second hop information that identifies, in the destination protocol address, a second hop identifier for a second hop included in communicatively coupling the source node and the destination node.

With reference to FIG. 93, a block 401108 illustrates that the method includes sending the data, received in the data packet to the destination node via the second hop, in a data unit that includes the second hop information and that includes an address field including the destination protocol address. Accordingly, the system in FIGS. 86A-C includes means for sending the data, received in the data packet to the destination node via the second hop, in a data unit that includes the second hop information and that includes an address field including the destination protocol address. The system includes one or more processors and logic encoded in one or more computer readable media for execution by the one or more processors that when executed is operable for and/or is otherwise included in sending the data, received in the data packet to the destination node via the second hop, in a data unit that includes the second hop information and that includes an address field including the destination protocol address.

For example, the arrangement in FIGS. 86A-C includes a forwarding component 40408 that is operable for and/or is otherwise included in sending the data, received in the data packet to the destination node via the second hop, in a data unit that includes the second hop information and that includes an address field including the destination protocol address.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that operate to perform the functionality described herein and may be implemented in software, hardware, or a combination of the two. While at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a software component in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. By way of example, and not limitation, computer readable media may comprise computer storage media and communication media. Computer storage media includes volatile and nonvolatile, removable and non-removable media implemented in any method or technology for storage of information such as computer readable instructions, data structures, software components or other data. Computer storage media includes, but is not limited to, Random Access Memory (RAM), Read Only Memory (ROM); Electrically Erasable Programmable Read Only Memory (EEPROM); flash memory or other memory technology; portable computer diskette; Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by an execution environment.

Communication media typically embodies computer readable instructions, data structures, software components, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Thus, the subject matter described herein may be embodied in many different forms, and all such forms are contemplated to be within the scope of what is claimed. It will be understood that various details may be changed without departing from the scope of the claimed subject matter.

The use of the terms "a" and "a" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The use of "including", "comprising", "having", and variations thereof are meant to encompass the items listed thereafter and equivalents thereof as well as additional items and equivalents thereof. Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided to", "received from", "identified to", "interoperated" and similar terms and their variants.

As used herein, any reference to an entity "in" an association is equivalent to describing the entity as "included in and/or identified by" the association, unless explicitly indicated otherwise.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety, unless explicitly indicated otherwise. In case of conflict, the present disclosure, including definitions, will control. In addition, the materials, methods, and examples are illustrative only and not intended to be limiting.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

Figure 94:
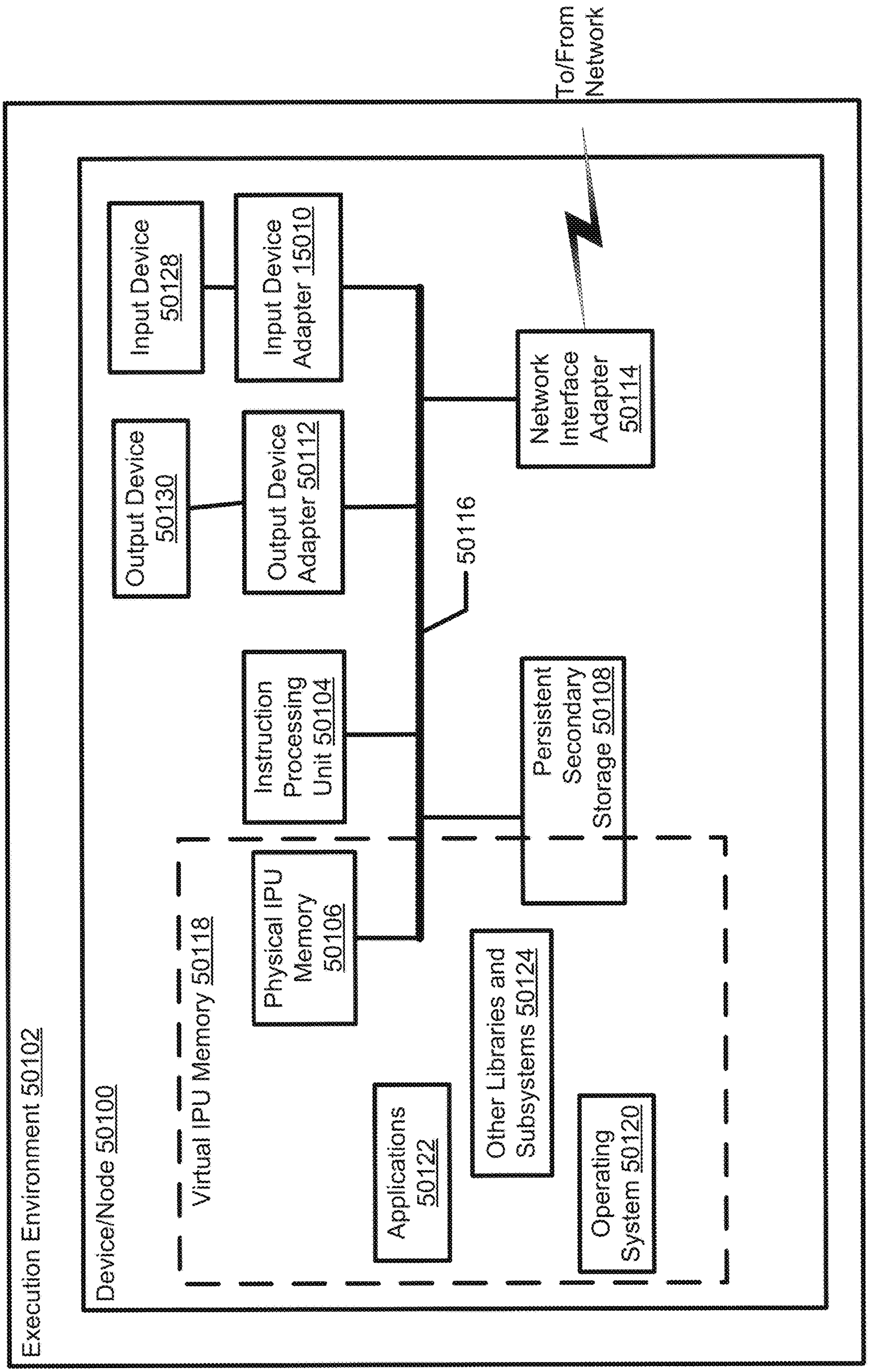

An exemplary device included in an execution environment that may be programmed, adapted, modified, and/or otherwise configured according to the subject matter is illustrated in FIG. 94. FIG. 94 illustrates a hardware device 50100 included in an execution environment 50102. FIG. 94 illustrates that execution environment 50102 includes a processor 50104, such as one or more microprocessors; a physical processor memory 50106 including storage locations identified by addresses in a physical memory address space of processor 50104; a persistent secondary storage 50108, such as one or more hard drives and/or flash storage media; an input device adapter 50110, such as a key or keypad hardware, a keyboard adapter, and/or a mouse adapter; an output device adapter 50112, such as a display and/or an audio adapter to present information to a user; a network interface component, illustrated by a network interface adapter 50114, to communicate via a network such as a LAN and/or WAN; and a mechanism that operatively couples elements 50104-50114, illustrated as a bus 50116. Elements 50104-114 may be operatively coupled by various means. Bus 50116 may comprise any type of bus architecture, including a memory bus, a peripheral bus, a local bus, and/or a switching fabric.

Processor 50104 may access instructions and data via one or more memory address spaces in addition to the physical memory address space. A memory address space includes addresses identifying locations in a processor memory. The addresses in a memory address space are included in defining a processor memory. Processor 50104 may have more than one processor memory. Thus, processor 50104 may have more than one memory address space. Processor 50104 may access a location in a processor memory by processing an address identifying the location. The processed address may be identified by an operand of an instruction and/or may be identified by a register and/or other portion of processor 50104.

FIG. 94 illustrates a virtual processor memory 50118 spanning at least part of physical processor memory 50106 and may span at least part of persistent secondary storage 50108. Virtual memory addresses in a memory address space may be mapped to physical memory addresses identifying locations in physical processor memory 50106. Both physical processor memory 50106 and virtual processor memory 50118 are processor memory, as defined above.

Physical processor memory 50106 may include various types of memory technologies. Exemplary memory technologies include static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data output RAM (EDO RAM), Extended Data output DRAM (EDO DRAM), Burst Extended Data output DRAM (BEDO DRAM), Enhanced DRAM (EDRAM), synchronous DRAM (SDRAM), JEDEC SRAM, PC 50100 SDRAM, Double Data Rate SDRAM (DDR SDRAM), Enhanced SDRAM (ESDRAM), SyncLink DRAM (SLDRAM), Ferroelectric RAM (FRAM), RAMBUS DRAM (RDRAM) Direct DRAM (DRDRAM), and/or XDRTM DRAM. Physical processor memory 50106 may include volatile memory as illustrated in the previous sentence and/or may include non-volatile memory such as non-volatile flash RAM (NVRAM) and/or ROM.

Persistent secondary storage 50108 may include one or more flash memory storage devices, one or more hard disk drives, one or more magnetic disk drives, and/or one or more optical disk drives. Persistent secondary storage may include a removable data storage medium. The drives and their associated computer readable media provide volatile and/or nonvolatile storage for computer-executable instructions, data structures, software components, and other data.

Execution environment 50102 may include software components stored in persistent secondary storage 50108, in remote storage accessible via a network, and/or in a processor memory. FIG. 94 illustrates execution environment 50102 including an operating system 50120, one or more applications 50122, and other software components and/or data components illustrated by other libraries and subsystems 50124. In an aspect, some or all software components may be stored in locations accessible to processor 50104 in a shared memory address space shared by the software components. The software components accessed via the shared memory address space may be stored in a shared processor memory defined by the shared memory address space. In another aspect, a first software component may be stored in one or more locations accessed by processor 50104 in a first address space and a second software component may be stored in one or more locations accessed by processor 50104 in a second address space. The first software component is stored in a first processor memory defined by the first address space and the second software component is stored in a second processor memory defined by the second address space.

Execution environment 50102 may receive user-provided information via one or more input devices illustrated by an input device 50128. Input device 50128 provides input information to other components in execution environment 50102 via input device adapter 50110. Execution environment 50102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 50128 included in execution environment 50102 may be included in device 50100 as FIG. 94 illustrates or may be external (not shown) to device 50100. Execution environment 50102 may include one or more internal and/or external input devices. External input devices may be connected to device 50100 via corresponding network interfaces such as a serial port, a parallel port, and/or a universal serial bus (USB) port. Input device adapter 50110 may receive input and provide a representation to bus 50116 to be received by processor 50104, physical processor memory 50106, and/or other components included in execution environment 50102.

An output device 50130 in FIG. 94 exemplifies one or more output devices that may be included in and/or that may be external to and operatively coupled to device 50100. For example, output device 50130 is illustrated connected to bus 50116 via output device adapter 50112. Output device 50130 may be a display device. Exemplary display devices include liquid crystal displays (LCDs), light emitting diode (LED) displays, and projectors. Output device 50130 presents output of execution environment 50102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. FIG. 94 illustrates network interface adapter (NIA) 50114 as a network interface component included in execution environment 50102 to operatively couple device 50100 to a network. A network interface component includes a network interface hardware (NIH) component and optionally a network interface software (NIS) component. Exemplary network interface components include network interface controllers, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., AMPS, TDMA, CDMA, GSM, GPRS UMTS, and/or PCS network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

Figure 95:
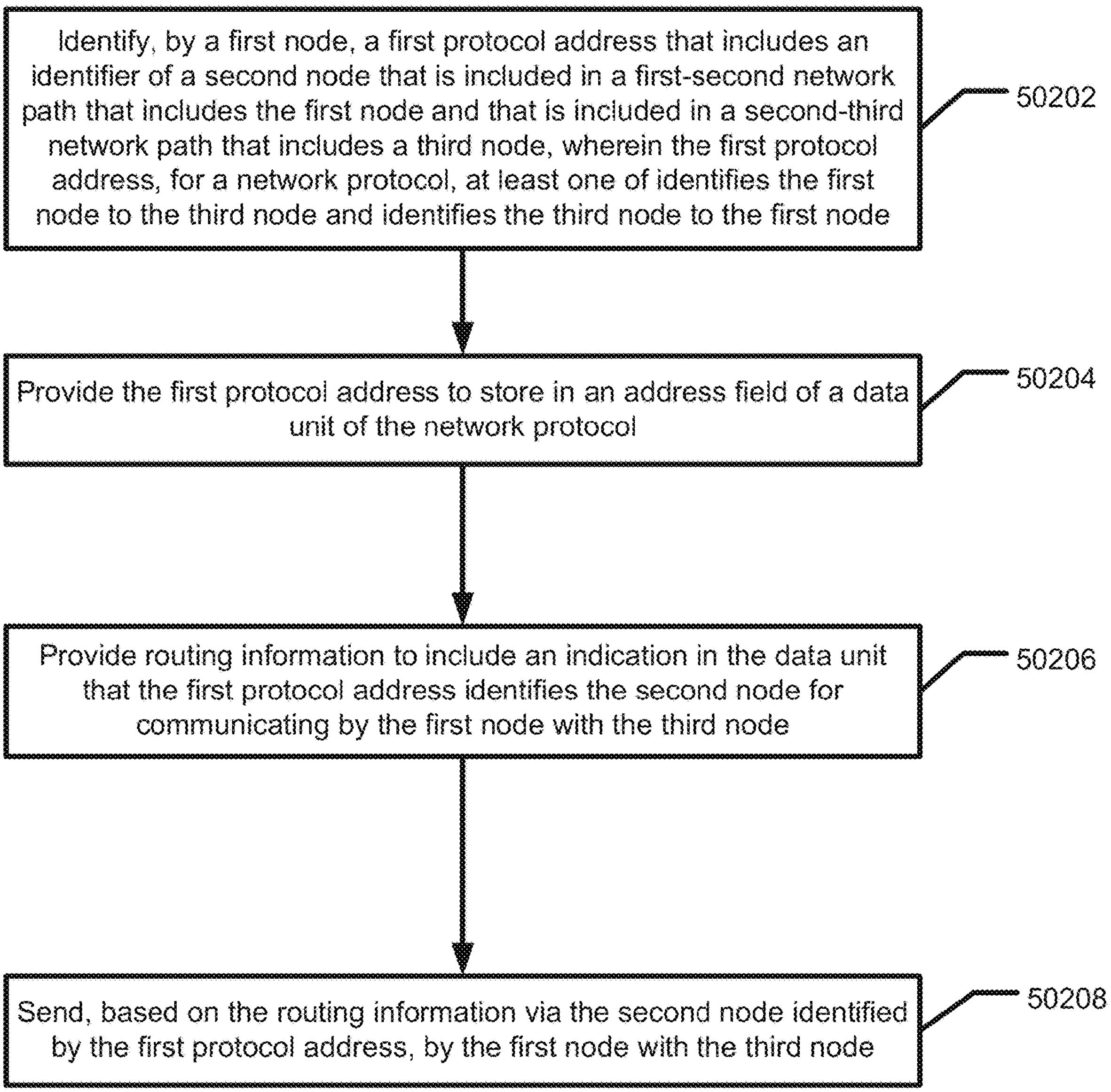
Figure 96:
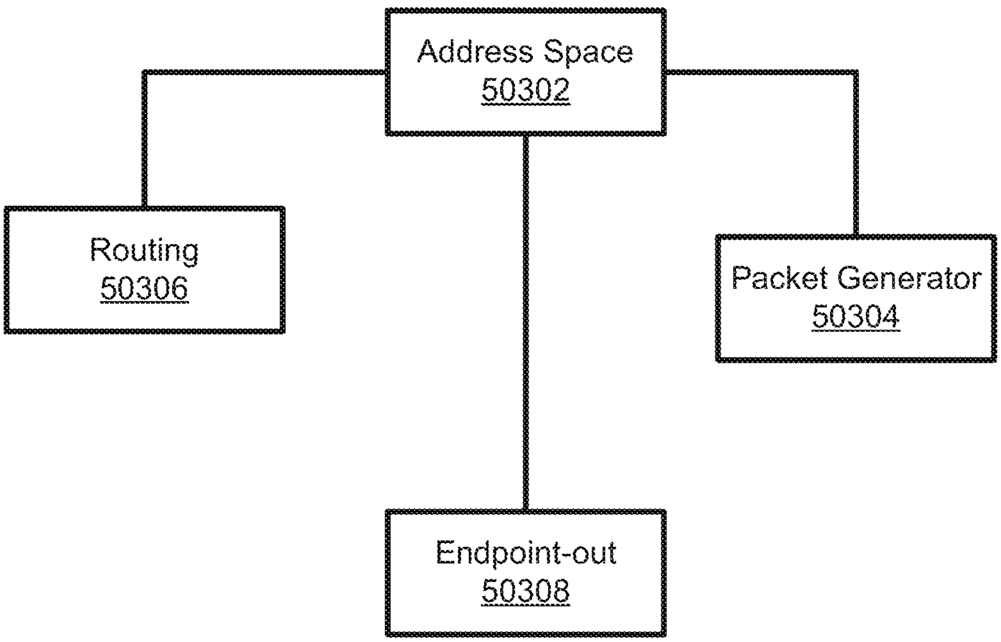

FIG. 96 illustrates an arrangement of components in a system that operates in an execution environment, such as execution environment 50102 in FIG. 94. The arrangement of components in the system operates to perform the method illustrated in FIG. 95. The system illustrated includes an address space component 50302, a packet generator component 50304, a routing component 50306, and an endpoint-out component 50308. A suitable execution environment includes a processor, such as processor 50104, to process an instruction in at least one of an address space component, a packet generator component, a routing component, and an endpoint-out component.

Some components, illustrated in the drawings are identified by numbers with an alphanumeric suffix. A component may be referred to generically in the singular or the plural by dropping a suffix of a portion thereof of the component's identifier. For example, execution environments; such as execution environment 50401*a*, execution environment 50401*b*, and their adaptations and analogs; are referred to herein generically as an execution environment 50401 or execution environments 50401 when describing more than one. Other components identified with an alphanumeric suffix may be referred to generically or as a group in a similar manner.

Figure 97A:
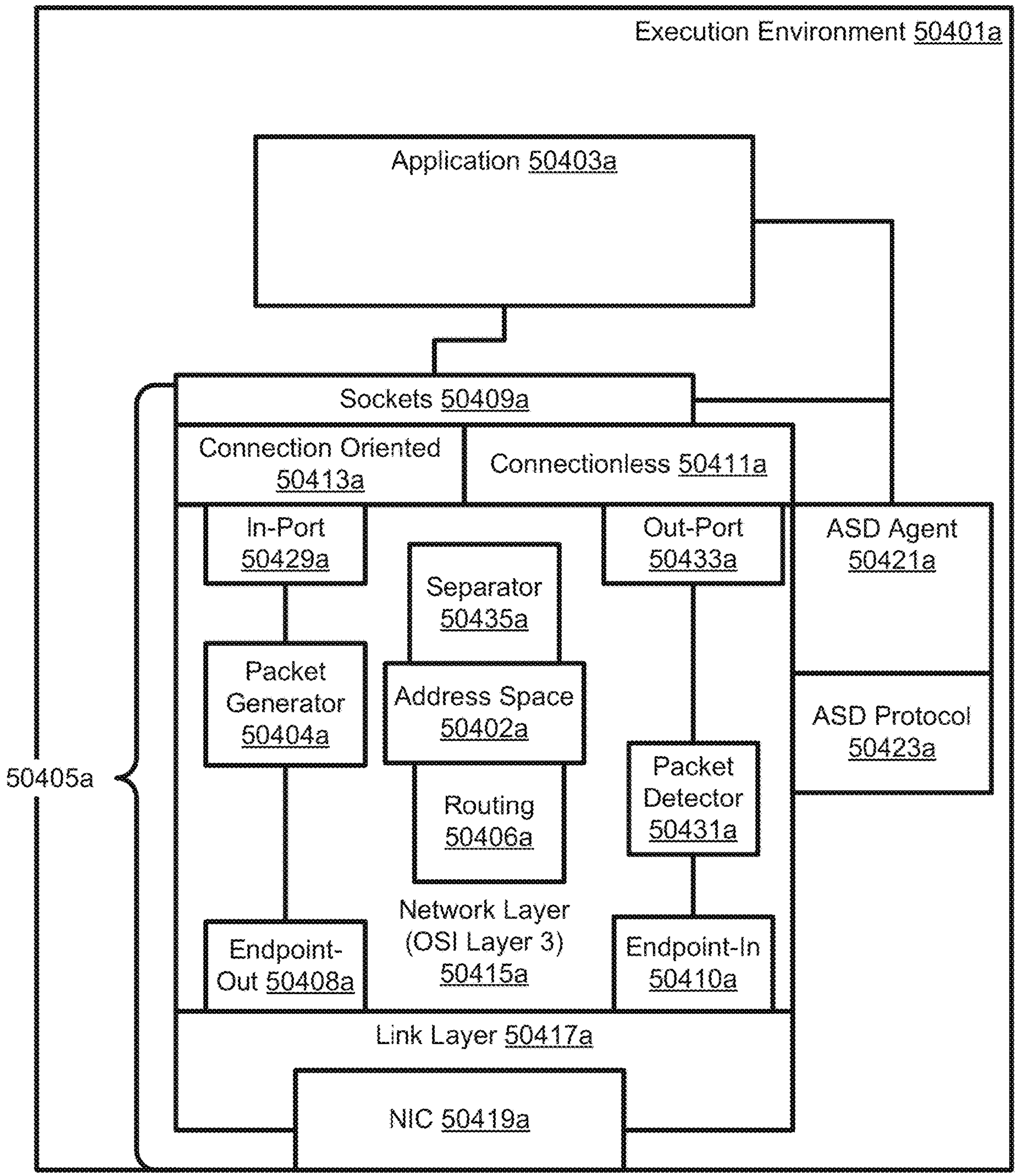
Figure 97B:
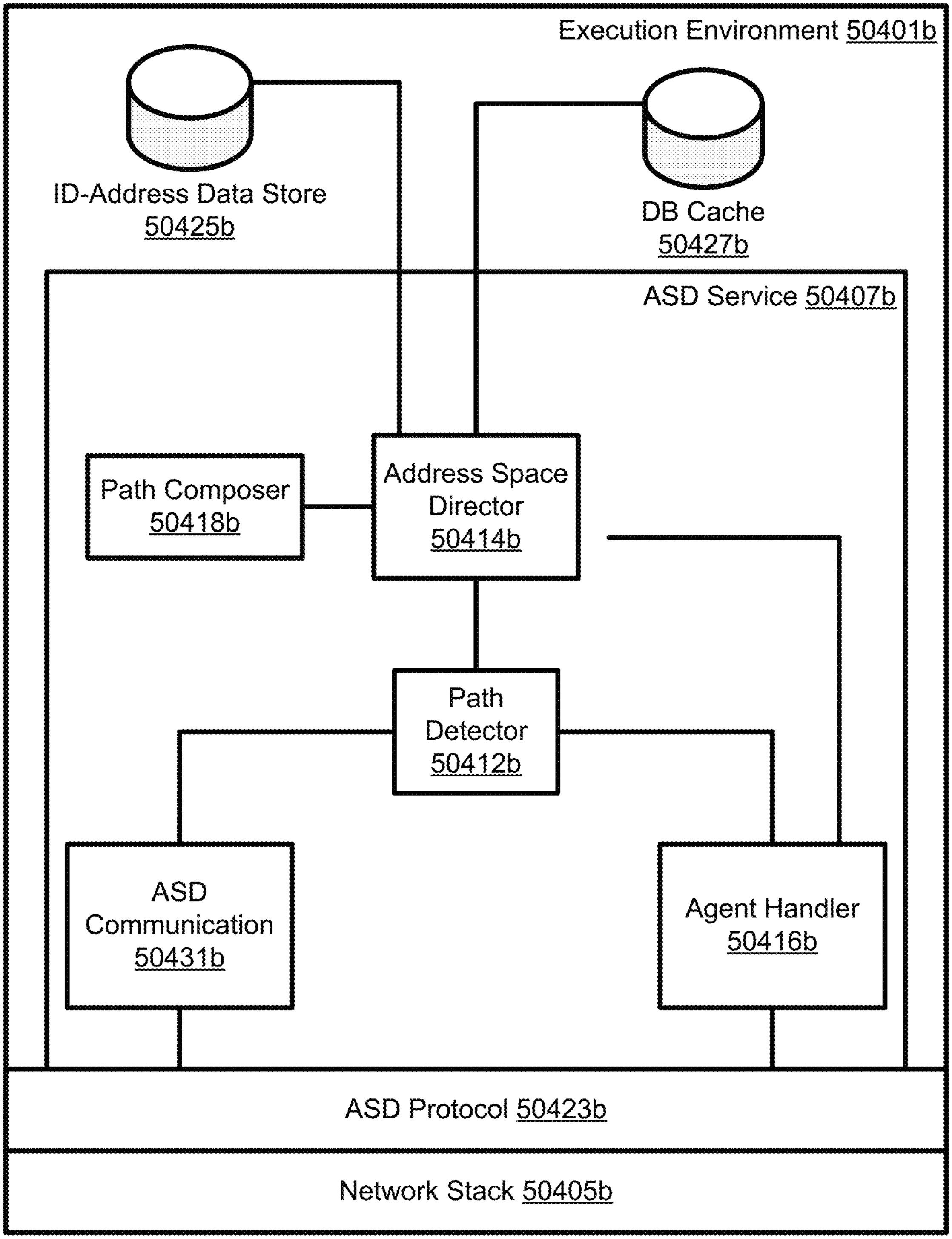
Figure 98:
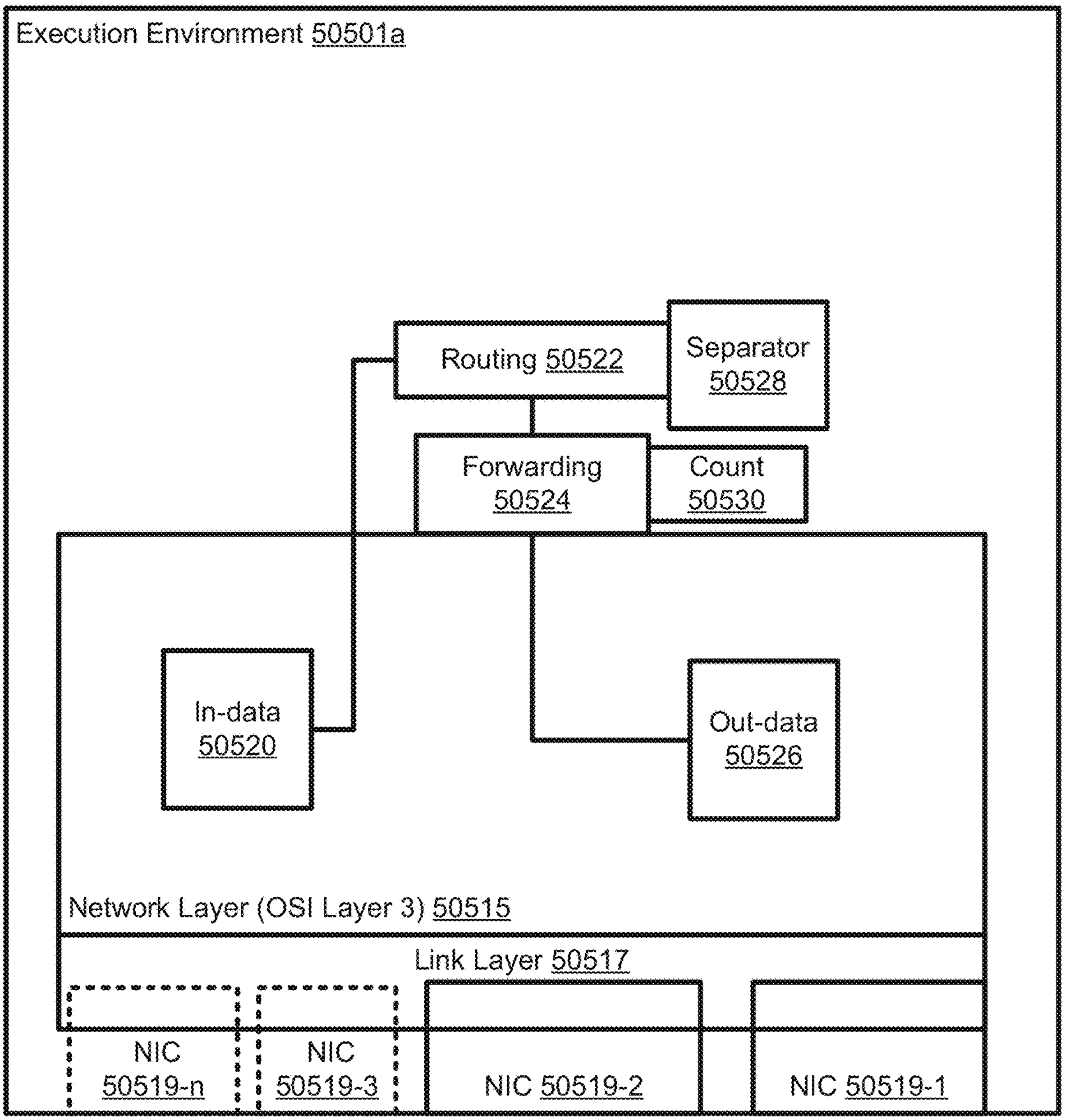

Some or all of the exemplary components illustrated in FIG. 96 may perform the method illustrated in FIG. 95 in a number of execution environments. FIG. 97A is block diagrams illustrating the components of FIG. 96 and/or analogs of the components of FIG. 96 respectively adapted for operation in an execution environment 50401*a* that includes and/or otherwise is provided by one or more nodes. FIG. 97B illustrates an execution environment 50401*b* which hosts an address space directory (ASD) service 50403*b*. Execution environment 50401*b* may be an instance and/or analog of execution environment 50401*a*. FIG. 98 illustrates an execution environment 50501 for hosting an arrangement of components for relaying data units of a network protocol via a network.

FIG. 94 illustrates components of an exemplary device that may at least partially provide and/or otherwise be included in an execution environment. The components illustrated in FIGS. 97A-B, and 50598 may be included in or otherwise combined with the components of FIG. 94 to create a variety of arrangements of components according to the subject matter described herein. Those skilled in the art will understand that other execution environments in addition to the various adaptations, analogs, and instances of the execution environments described herein are suitable for hosting an adaptation of the arrangement in FIG. 96.

FIGS. 99A-C respectively illustrate networks 50600 including nodes that in various aspects may include adaptations, analogs, and instances of the execution environments 50401, illustrated in FIG. 97A-B, as well as nodes that that in various aspects may include adaptations, analogs, and instances of execution environment 50501, illustrated in FIG. 98. The various illustrated nodes are operatively coupled via network interface components to the respective networks 50600 in FIGS. 99A-C. While any node may perform the method illustrated in FIG. 95, for ease of illustration, each of FIGS. 99A-C includes nodes 50602 for describing adaptations of the arrangement in FIG. 96 performing different aspects of the subject matter described herein. An adaptation, analog, and/or instance of execution environment 50401*a*, in FIG. 97A, may be described as being included in and/or operating in a node 50602 in describing some aspects of the subject matter of the present disclosure. In describing other aspects, a node 50602 may be described as including and/or otherwise providing an adaptation, analog, and/or instance of execution environment 50401*b* in FIG. 97B. An adaptation, analog, and/or instance of execution environment 50501, in FIG. 98, may be described as being included in and/or operating in a path node 50604, in FIGS. 99A-C, to describe some aspects of the subject matter of the present disclosure. Exemplary path nodes 50604 include a router, a gateway, a switch, a virtual private network concentrator, a modem, a wireless access point, a bridge, a hub, a repeater, a firewall, a proxy server, an application for relaying messages, and the like.

FIG. 97A illustrates an execution environment 50401*a* hosting a program, illustrated by an application 50403*a* that sends and/or receives data via a network stack 50405*a*. FIG. 97B illustrates an execution environment 50401*b* including an address space directory (ASD) service 50407*b*, that sends and receives data by interoperating directly and/or indirectly with one or more components of a network stack 50405*b*. The network stacks 50405 in FIG. 97A and in FIG. 97B may be structured according to a layered architecture or model. FIG. 97A illustrates components that may be included in a network stack having a layered structure. The network stack 50405*b* may be structured analogously or may be structured in another manner known to those skilled in the art. Some components illustrated in the network stack 50405*a* correspond to components of the layered architecture specified by the Open System Interconnection (OSI) model, known to those skilled in the art. For example, network stacks 50405 may comply with the specifications for protocols included in the TCP/IP protocol suite. The OSI model specifies a seven-layer stack. The TCP/IP protocol suite may be mapped to layers three and four of the seven layers. Those skilled in the art will understand that fewer or more layers may be included in various adaptations, analogs, and/or instances of execution environments 50401 illustrated in FIG. 97A and in FIG. 97B, and in aspects described herein as well as other execution environments suitable for hosting an adaptation of the arrangement of components illustrated in FIG. 96.

An application, such as an application 50403*a* and/or an ASD service 50407*b*, operating in a node 50602, may exchange data with another node 50602 by interoperating with one or more components of a corresponding network stack 50405. In FIG. 97A, an application 50403*a* may interoperate with a sockets component 50409*a* to access a protocol endpoint, via a socket, to send data via one or more data units to and/or to receive data via an one or more data units from another node 50602. The application may specify an attribute of a network protocol to the sockets component 50409*a* to open a specified type of protocol endpoint of a network protocol supporting the specified attribute.

FIG. 97A illustrates a sockets component 50409*a* operatively coupled to a connectionless component 50411*a* supporting an unreliable transport layer protocol where delivery of data is not guaranteed and a connection-oriented component 50413*a* configured to support a reliable transport layer protocol designed to guarantee data delivery or to otherwise notify the application of a delivery failure. The user datagram protocol (UDP) in the TCP/IP protocol suite is currently the most widely used connectionless transport layer protocol. The most widely used connection-oriented transport layer protocol currently in use is the transmission control protocol (the TCP) also included in the TCP/IP protocol suite.

Transport layer protocols supported by connectionless component 50411*a* and by connection-oriented component 50413*a* generate transport layer data units to include data received from an operatively coupled application to deliver the data via the data units according to a network layer protocol to a transport layer protocol endpoint, such as a socket, in another node 50602. Analogously, data sent via an application in another node via a transport layer component may be received according to the network layer protocol by a compatible transport layer component, such as a connection-oriented component 50413*a* and/or by a connectionless component 50411*a*, to deliver via a socket to an application operating in the execution environment 50401*a* in the receiving other node 50602.

FIG. 97A illustrates a network layer component 50415*a* that delivers data according to a network layer protocol from a source node to a destination node across a link, a LAN, a WAN, and/or an internet, such as the Internet and/or an intranet.

A network layer protocol is designed and configured to deliver data across one or more communication links and/or networks between nodes in a network or internet. In FIG. 97A, a network layer component 50415*a* may receive a transport layer data unit from a connection-oriented component 50413*a* or a connectionless component 50411*a*, or data from another component in execution environment 50401*a*. The network layer component 50415*a* may format and/or otherwise package the data in network layer data units. The data units may be sent, via a link layer protocol, to a next node in a network path to a destination node.

One or more link layer protocols may be included in communicatively coupling a source node and a destination node via a network path that includes one or more path nodes. In FIG. 97A, a network layer component 50415*a* may provide a network layer data unit as data (i.e. a message) to a component supporting a link layer protocol compatible with exchanging data via a physical data transmission medium coupled to a NIC. A link layer component 50417*a*, in FIG. 97A, illustrates a component in execution environment 50401*a* supporting a link layer protocol. Exemplary link layer protocols include Ethernet, Token-ring, and asynchronous transfer mode (ATM), to name a few. Some or all of a link layer component 50417*a* may be included in a NIC, as illustrated in FIG. 97A by a NIC 50419*a*. Exemplary physical data transmission median include Ethernet cables of various types, co-axial cable, and fiber optic cable, and various media suitable for carrying various types of wireless signals.

For ease of illustration, the description that follows focuses on IP networks and protocols in the TCP/IP suite due to their wide use and because they are well-known in the art. Those skilled in the art will understand that the scope of the subject matter described is not limited to IP networks.

With respect to FIG. 97A, a link layer component 50417*a* may receive a network layer data unit for a network layer component 50415*a*. The network layer data unit may be formatted as one or more IP protocol packets from the network layer component 50415*a* supporting the Internet Protocol (IP). The link layer component 50417*a* packages IP packets from network layer component 50415*a* according to the particular link layer protocol supported. The link layer component 50417*a* may include a network layer data unit in one or more link layer data units. Analogously, the link layer component 50417*a* interprets data, received as signals transmitted by the physical medium operatively coupled to the NIC 50419*a*, according to a particular link layer protocol supported to receive network layer data units in one or more link layer data units. The link layer component 50417*a* may strip off link layer specific data and transfer the payload of the link layer data units to the network layer component 50415*a* to process the included network layer data unit.

A network layer component 50415*a* operating in a node 50602 may communicate with one or more nodes 50602 over a LAN, a link, and/or a network of networks such as an intranet or the Internet. A network layer component 50415*a* in the node 50602 may receive transport layer data units, for example, formatted as TCP packets from a connection-oriented layer component 50413*a* and/or transport layer data units formatted as UDP packets from a connectionless component 50411*a* illustrated in FIG. 97A. The network layer component 50415*a* packages transport layer data units from the connection-oriented component 50413*a* and/or the transport layer data units from the connectionless component 50411*a* into network layer data units, such as IP packets, to transmit across a network 50600 operatively coupled to the node. The network 50600 may be and/or may include an internet.

Analogously, the network layer component 50415*a* interprets data, received from a link layer component 50417*a* in a node 50602, as IP protocol data and detects IP packets in the received data. The network layer component 50415*a* may strip off IP layer specific data and transfer the payload of one or more IP packets to the connection-oriented layer component 50413*a* and/or to the connectionless component 50411*a* to process as transport layer data units according to a particular transport layer protocol.

As described above, FIGS. 97A-B each illustrate adaptations of network stacks 50405 that send and receive data over a network, such as networks 50600 illustrated in FIGS. 99A-C, via a network interface component, such as a NIC 50419*a*. For example, an application 50403*a* in FIG. 97A operating in a first node 50602 may interoperate with an ASD service 50407*b* and/or another application operating in a second node 50602 via their respective network stacks: the network stack 50405*a* and the network stack 50405*b*.

In addition to the protocols described above, protocols corresponding to layers in the OSI model above the transport layer may be included in communicating via a network. The term "application protocol" as used herein refers to any protocol or combination of protocols that correspond to one or more layers in the OSI reference model above the transport layer. Programs and executables operating in execution environments may communicate via one or more application protocols. Exemplary application protocols include a hypertext transfer protocol (HTTP), various remote procedure call (RPC) protocols, various instant messaging protocol, email protocols, and various presence protocols.

Data exchanged between nodes 50602 in a network 50600 may be exchanged via data units of one or more protocols. Each layer of a network stack may provide a layer specific protocol component. Some protocols, combine services from multiple layers of the OSI model into a single layer such as the Systems Network Architecture (SNA) protocol. Still others may take a hybrid approach. With the advent of software defined networking and flexible protocols such as OpenFlow, new protocols and variations of existing protocols are being introduced and will be introduced that are within the scope of the subject matter of the present disclosure.

A network protocol is defined by one or more formatting rules and/or a vocabulary referred to as a schema. The schema defines valid data units to exchange between and/or among protocol endpoints defined by the respective network protocol. A network protocol also specifies and/or otherwise is compatible with one or more address spaces for identifying protocol endpoints for exchanging data. The terms "identifier space" and "address space" are used interchangeably herein. For example, various versions of hypertext transfer protocol (HTTP) specify a format for HTTP uniform resource locators (URL). HTTP specifies a location in a HTTP header that identifies a URL as an identifier or address from the HTTP address space that identifies both a resource and recipient of a HTTP data unit. The transmission control protocol (TCP) specifies a format and vocabulary for a TCP header including a destination protocol endpoint field for including what the TCP refers to as a destination port number that, when combined with a destination protocol address from an IP packet, identifies a transport layer protocol endpoint of a receiver of data included in a TCP data unit. A sending endpoint is similarly identified by a source port number included in a source protocol endpoint field of a TCP data unit and a source protocol address from an IP data unit.

Other exemplary address spaces that identify protocol endpoints in various protocols include an email address space identifying a protocol endpoint for the simple mail transfer protocol (SMTP), a telephone number address space for various telephony protocols, instant message address spaces for various instant message protocols, and media access control (MAC) addresses for various link layer protocols, to name just a few examples.

In delivering data across a network between protocol endpoints, addresses from address spaces of the various protocols at the various layers may be translated and/or otherwise mapped between the various layers of a network stack. For example, a unicast IP address in an IP packet is mapped to link layer addresses for the various links the IP packet is transported across in a network path via a path node between a source node sending the IP packet and a destination node receiving the IP packet. Addresses at the various layers are assigned from a suitable address space of network protocols of the respective layers.

Since addresses from address spaces at various layers of a network stack are often not suited for remembering and/or identifying by users, an address space of symbolic identifiers or names may be used to provide aliases for addresses in an address space identifying protocol endpoints corresponding to a protocol supported by a layer of a network stack. The domain name space is a well-known identifier space of names for identifying nodes and/or network interfaces as protocol endpoints of the IP protocol in the Internet, private internets, and intranets. The domain name system (DNS) is a collection of domain name system services maintaining databases that associate names from the domain name space with protocol addresses, in particular with IP addresses. The domain name space defines a global name space shared across the Internet.

FIG. 97B illustrates an execution environment 50401*b* hosting an address space directory (ASD) service 50407*b*, such as a DNS service. An adaptation of the arrangement of components in FIG. 96 is illustrated operating in the ASD service 50407*b*. The ASD service 50407*b* is configured to receive a request from an ASD agent component 50421*a* in FIG. 97A to resolve a symbolic identifier to a protocol address of a protocol endpoint. An application 50403*a* or other component in an execution environment 50401*a* may communicate with an ASD service 50407*b* via an application specific ASD protocol supported by an ASD agent component 50421*a* illustrated in FIG. 97A and an ASD protocol component 50423*b* in each of FIGS. 97A-B. A server ASD protocol component 50423*b* may communicate with other ASD services in other nodes included in an ASD system. Exemplary ASD protocols include the DNS protocol, the lightweight directory access protocol (LDAP), and the X.500 protocol.

FIG. 99B illustrates a network path, as defined above, for transmitting data via a network protocol from a first node **50602*b*1 to a fifth node 50602*b*5 in a network 50600*b* that includes a sequence of nodes including of the first node 50602*b*1, a first path node 50604*b*1, a second path node 50604*b*2, and the fifth node 50602*b*5. In FIG. 99C, a first network path communicatively coupling a seventh node 50602*c*7 and an eighth path node 50604*c*8 includes a first sequence of nodes including the seventh node 50602*c*7, a ninth path node 50604*c*9, and the eighth path node 50604*c*8. The first network path, as FIG. 99C illustrates, is included in a second network path communicatively coupling the seventh node 50602*c*7 and a second node 50602*c*2 that includes a second sequence of nodes including the nodes in the first sequence, a seventh path node 50604*c*7, and the second node 50602*c*2**. A network path may be a physical network path and/or a logical network path based on a particular network protocol defining the protocol endpoints.

FIG. 99B, illustrates a number of network paths and hop paths communicatively coupling a first node **50602*b*1 and a fifth node 50602*b*5 in a network 50600*b*. One hop path illustrated includes a sequence of hops including a first hop 50608*b*1, a sixth hop 50608*b*6, and a ninth hop 50608*b*9. In FIG. 99C, the first network path described above communicatively coupling the seventh node 50602*c*7 and the eighth path node 50604*e*8 includes a first sequence of hops including a first hop 50608*c*1 and a second hop 50608*c*2. The first network path is included in the second network path described above that includes a second sequence of hops including the first sequence of hops, a third hop 50608*c*3, and a fourth hop 50608*c*4**.

In FIG. 99B, the network path described above communicatively coupling the first node **50602*b*1 and the fifth node 50602*b*5 includes a sequence of network interfaces including a network interface in the first path node 50604*b*1 in the first hop 50608*b*1, a network interface in the second path node 50604*b*2 in the sixth hop 50608*b*6, and a network interface in the fifth node 50602*b*5 in the ninth hop 50608*b*9. The network paths, in FIG. 99**C and described above, may analogously be described as a sequence of network interfaces.

Methods, Systems, and Operation

With reference to FIG. 95, a block 50202 illustrates that the method includes identifying, by a first node, a first protocol address that includes an identifier of a second node that is included in a first-second network path that includes the first node and that is included in a second-third network path that includes a third node, wherein the first protocol address, for a network protocol, at least one of identifies the first node to the third node and identifies the third node to the first node. Accordingly, a system for source routing includes means for identifying, by a first node, a first protocol address that includes an identifier of a second node that is included in a first-second network path that includes the first node and that is included in a second-third network path that includes a third node, wherein the first protocol address, for a network protocol, at least one of identifies the first node to the third node and identifies the third node to the first node. The system for source routing includes one or more processors and logic encoded in one or more computer readable media for execution by the one or more processors that when executed is operable for and/or is otherwise included in identifying, by a first node, a first protocol address that includes an identifier of a second node that is included in a first-second network path that includes the first node and that is included in a second-third network path that includes a third node, wherein the first protocol address, for a network protocol, at least one of identifies the first node to the third node and identifies the third node to the first node.

For example, the arrangement in FIG. 96 includes an address space component 50302 that is operable for and/or is otherwise included in identifying, by a first node, a first protocol address that includes an identifier of a second node that is included in a first-second network path that includes the first node and that is included in a second-third network path that includes a third node, wherein the first protocol address, for a network protocol, at least one of identifies the first node to the third node and identifies the third node to the first node.

FIG. 97A illustrate address space components 50402 as adaptations and/or analogs of the address space component 50302 in FIG. 96. One or more address space components 50402 operate in an execution environment 50401. In FIG. 97A, an address space component **50402*a* is illustrated as a component of a network layer component 50415*a*. In FIG. 97B, an address space component (not shown) for an application layer protocol may be included in an ASD protocol component 50423*b*. A node 50602 may include an address space component 50402. A path node 50604** may also include an adaptation and/or an analog of an address space component.

With reference to FIG. 95, a block 50204 illustrates that the method includes providing the first protocol address to store in an address field of a data unit of the network protocol. Accordingly, a system for source routing includes means for providing the first protocol address to store in an address field of a data unit of the network protocol. The system for source routing includes one or more processors and logic encoded in one or more computer readable media for execution by the one or more processors that when executed is operable for and/or is otherwise included in providing the first protocol address to store in an address field of a data unit of the network protocol.

For example, the arrangement in FIG. 96 includes a packet generator component 50304 that is operable for and/or is otherwise included in providing the first protocol address to store in an address field of a data unit of the network protocol. FIG. 97A illustrates packet generator component **50404*a* as an adaptation and/or analog of the packet generator component 50304 in FIG. 96. One or more packet generator components 50404*a* operate in an execution environment 50401*a*. In FIG. 97A, a packet generator component 50404*a* is illustrated as component of a network layer component 50415*a*. A path node 50604** may also include an adaptation and/or an analog of a packet generator component.

In FIG. 95, a block 50206 illustrates that the method includes providing routing information to include an indication in the data unit that the first protocol address identifies the second node for communicating by the first node with the third node. Accordingly, a system for source routing includes means for providing routing information to include an indication in the data unit that the first protocol address identifies the second node for communicating by the first node with the third node. The system for source routing includes one or more processors and logic encoded in one or more computer readable media for execution by the one or more processors that when executed is operable for and/or is otherwise included in providing routing information to include an indication in the data unit that the first protocol address identifies the second node for communicating by the first node with the third node.

For example, the arrangement in FIG. 96 includes a routing component 50306 that is operable for and/or is otherwise included in providing routing information to include an indication in the data unit that the first protocol address identifies the second node for communicating by the first node with the third node. FIG. 97A illustrates routing components 50406*a* as an adaptation and/or analog of the routing component 50306 in FIG. 96. One or more routing in FIG. 97A, a routing component 50406*a* is illustrated as component of an ASD agent component 50421*a*. A path node 50604 may also include an adaptation and/or an analog of a routing component 50308.

With reference to FIG. 95, a block 50208 illustrates that the method includes sending, based on the routing information via the second node identified by the first protocol address, by the first node with the third node. Accordingly, a system for source routing includes means for sending, based on the routing information via the second node identified by the first protocol address, by the first node with the third node. The system for source routing includes one or more processors and logic encoded in one or more computer readable media for execution by the one or more processors that when executed is operable for and/or is otherwise included in sending, based on the routing information via the second node identified by the first protocol address, by the first node with the third node.

For example, the arrangement in FIG. 96 includes an endpoint-out component 50308 that is operable for and/or is otherwise included in sending, based on the routing information via the second node identified by the first protocol address, by the first node with the third node. FIG. 97A illustrates endpoint-out components 50408*a* as an adaptation and/or analog of the endpoint-out component 50308 in FIG. 3A. One or more endpoint-out components 50408*a* operate in an execution environment 50401*a*. A path node 50604 may also include an adaptation and/or an analog of an endpoint out component 50308.

While the subject matter disclosed herein is applicable to network protocols at various layers, the present disclosure describes embodiments at layer three (i.e. the network layer) and layer two (i.e. the link layer) of the OSI stack. Examples of network layer protocols that may be modified to support various types of source routing include an Internet Protocol (IP), DECNet outing Protocol (DRP), an Internetwork Packet Exchange (IPX) protocol, an Internet Datagram Protocol (IDP), a VINES Internet Protocol, and a Datagram Delivery Protocol (DDP). Examples of link layer protocols that may be modified to support source routing as described herein include Ethernet protocols, Token-ring protocols, FDDI protocol, and an asynchronous transfer mode (ATM) protocol.

Data to transmit in a payload portion of a data unit of a network protocol may be received from an application process, such as application 50403*a*, operating in an execution environment, such as execution environment 50401*a* in FIG. 97A, of a source node such as various nodes 50602 in FIGS. 99A-C. The data may be received by a protocol layer component, such as network layer component 50415*a*, that operates in the execution environment according to a network protocol.

In an aspect, a source route may be identified by a network protocol address, such as scope-specific protocol address and/or a path-based protocol address. A "source-route protocol address", as the term is used herein, is a protocol address of a network protocol that identifies a protocol endpoint in a second node for a first node, and that also identifies at least one node that communicatively couples the first node and the second node.

With respect to FIG. 99A and FIG. 97A, an instance of an execution environment 50401*a* may be included and/or otherwise may be provided by a first node 50602*a*1 in a first region 50606*a*1 including a portion of a network 50600*a*. An in-port component 429*a* may receive data to transmit to a destination node. An address space component 50402*a* in the first node 50602*a*1 may receive and/or otherwise detect address information from an application 50403*a* and/or one or more of a sockets component 50409*a*, a connection-oriented component 50413*a*, a connectionless component 50411*a*9, and an ASD agent component 421*a*. The address information may include and/or otherwise identify a source-route protocol address identifying a route to a destination node. The route identified may be loose route, may be a strict route, or a record route option may be specified.

A protocol address may be formatted as required by the network protocol and address space supported by the network layer component 50415*a*. Schemas for source route address spaces are illustrated in FIGS. 100A-E and are described below. Alternatively or additionally, the protocol address may be received in another form, such as a text string. For example, a name or symbolic identifier of a destination node may be received and/or otherwise identified by an address space component 50402*a*.

Address information may be detected by the address space component 50402*a*. The address space component 50402*a* may interoperate with a packet generator component 50404*a*, which may include instructions that when executed by processor are included in generating and/or storing a representation of the source-route protocol address as address information in a data unit specified according to the network protocol supported by the network layer component 50415*a*. The address space component 50402*a* may interoperate with a packet generator component 50404*a* to include the address information in the data unit as specified by the network protocol.

In FIG. 99A, an identifier, "502.502.503.503", identifies a route by identifying a sequence of network interfaces of nodes in a network path communicatively coupling the second node 50602*a*2 and nodes in the first region 50606*a*1. The identifier identifies the second node 50602*a*2 to nodes in the first region 50606*a*1. Exemplary representations are described below with respect to FIGS. 100A-E below.

A packet generator component 50404*a* in an execution environment 50401*a* of the first node 50602*a*1 may include one or more instructions that when performed by the first node 50602*a*1 identifies a source protocol address based on address information represented in a data unit of a network protocol to identify the first node 50602*a*1 as the source node of the data in the data unit. The source protocol address may be a source-route protocol address identifying the source node for one or more other nodes in the network. The packet generator component 50404*a* may interoperate with the address space component 50402*a* to receive the source address information to include a representation of the source protocol address in the data unit.

An address space component 50402*a* in the first node 50602*a*1 may identify a source protocol address that identifies some or all of a route in network 50600*a*. The sequence, "501.501.500.503", identifies a route via a sequence of network interfaces in a network path from the second node 50602*a*2 to the first node 50602*a*1 that identifies the first node 50602*a*1. The source protocol address may be pre-specified to the first node 50602*a*1 via a user and/or may be determined based on a previous communication with the second node 50602*a*2. The source protocol address may be retrieved via a request to an address space directory service, as described in more detail below.

A packet generator component 50404*a* may receive source address information that identifies a source-route protocol address that identifies the first node 50602*a*1. In FIG. 99A, the number '3' may identify a network interface of the first node 50602*a*1 in the scope of the first region 50606*a*1. As the data is transmitted via the network path identified by the first protocol address to the second node 50602*a*2, the source address information included in one or more data units, included in transmitting the data, may be augmented and/or otherwise updated to provide source address information from which the second node 50602*a*2 may detect and/or may otherwise determine a source-route protocol address that identifies the first node 50602*a*1 in an address space usable by the second node 50602*a*2.

Returning to FIG. 97A and FIG. 99A, address information may be detected, by an address space component 50402*a* operating in a network layer component 50415*a*, in an address representation in a data unit received via the network 50600*a*. An instance of an execution environment 50401*a* may include and/or otherwise may be provided by the third node 50602*a*3 in the network 50600*a*. An address space component 50402*a* in the third node 50602*a*3 may receive and/or otherwise detect address information in a data unit received from another node, such as the second node 50602*a*2 via a NIC 50419*a* and a link layer component 50417*a* operating in the third node 50602*a*3, as described above. The data unit may be received from the link layer component 50417*a* via an endpoint-in component 50410*a* in the network layer component 50415*a*. The data unit may be identified and/or otherwise detected by a packet detector component 431*a* interoperating with the endpoint-in component 50410*a*.

The packet detector component 431*a* may detect an address representation in the data unit according to a schema defined by a network layer protocol supported by the network layer component 50415*a*. The address information represented may be provided to an address space component 50402*a*. An address space component 50402*a* operating in the third node 50602*a*3 may receive and/or otherwise detect the address information via a packet detector component 50431*a*.

The address space component 50402*a* may determine an address space that includes a source-route protocol address identified by the address information. For example, the address space component 50402*a* may identify that a protocol address detected in the address information is in a third scope-specific address space specific to a third region 50606*a*3 that includes the third node 50602*a*3 in detecting an identifier of a node, such as the second node 50602*a*2, that sent the data in the received data unit.

When the protocol address, identified in address information is detected by the address space component 50402*a*, is not in an address space that is usable for sending data to another node, the address space component 50402*a* may determine a protocol address in a suitable address space as described in more detail below. The address space component 50402*a* may receive address information that identifies the third node, in a second scope-specific address space of the second node that sent the data unit. The address space component 50402*a* may determine a third-second protocol address that, in a third node-specific address space specific to the third node, identifies the second node 50602*a*2. The data in the data unit may be provided by the network layer component 50415*a* to a protocol endpoint identified by a higher layer protocol as described above via an out-port component 50433*a*.

A source-route protocol address may be formatted to be included in data units of an existing network protocol. For example, a schema for a source-route protocol address space may be defined to include an address in the address space in an address field of a header of the IP protocol according to a currently existing specification, such as RFC 791 and/or RFC 3513. While such protocol addresses may have the same or substantially similar rules for valid format and content as those currently in use, the protocol addresses when processed according to the subject matter described herein identify a strict or loose route. For details on the format and vocabularies of current address spaces refer to the appropriate specification. A type bit and/or a pattern of bits in a data unit header may be defined by a network protocol to indicate that address information in the data unit that identifies a protocol address that identifies a source route.

FIGS. 100A-E illustrate a number of exemplary address representations 50702 illustrating various address formats and vocabularies for representing protocol addresses that identify a source-route. Various portions of the respective address representations 50702 are illustrated as contiguous, but need not be so in various embodiments according to the subject matter described herein. Each of the types of address representation 50702 shown in FIGS. 100A-E may be included in a destination protocol address portion and/or a source protocol address portion of an IPv4 data unit header and/or an IPv6 data unit header. Further, data units of various link layer protocols may be adapted to include analogous source-route protocol addresses for transmitting via one or more link layer networks. A protocol address may be identified as a source-route address protocol address by a bit pattern or identifier defined to identify a protocol address as a source-route protocol address. The bit pattern or identifier may be stored in a type bits portion of a data unit, such as an IP packet, and/or in some other specified location. The bit pattern may identify whether a protocol address identifies a strict source route or a loose source route. In some aspects, whether a source-route protocol address identifies a strict route or a loose route may be determined based on the source-route protocol address itself in addition to and/or instead of based on the address type field.

FIG. 100A illustrates an address representation 50702*a* that may be included in a data unit or packet of an Internet Protocol and/or may be used to transmit data via packets of a link layer protocol (e.g. via one or more link layer switches). An address representation 50702*a* may identify a source-route protocol address that includes one or more source-route protocol addresses, such as one or more scope-specific addresses for one or more respective nodes in a network path for transmitting data from one path end node to another. In an aspect, an address representation 50702*a* may be processed as including at least three portions. An address separator field 50704*a* is illustrated including a binary number. In FIG. 100A, the binary number illustrated equals seventeen in base ten. The number in the address separator field 50704*a* identifies a boundary in an address information field 50706*a* separating a first address field 50708*a* and a second address field 50710*a*. The address separator field may identify the protocol address as a source-route protocol address. The first address field 50708*a* may identify a first protocol address that identifies a second node included in the network path. The second address field 50710*a* may identify a second protocol address that identifies the third node.

With respect to FIG. 99A, an address representation 50702*a* may be included in a data unit including data from the first node 50602*a*1 to transmit to the second node 50602*a*2. As described above, the sequence, "502.502.503.503", may be represented in an address information field 50706*a* to identify a first-second protocol address that, for the first node 50602*a*1, identifies the second node 50602*a*2. The first-second protocol address may be an identifier that, in the first scope-specific address space, identifies the second node 50602*a*2.

At the first node 50602*a*1, a packet generator component 50404*a* and/or an address space component 50402*a* operating in the first node 50602*a*1 may set and/or otherwise detect a value in the address separator field 50704*a* that indicates a first address field 50708*a* has a zero size. The entire address information field 50706*a*, thus, constitutes a second address field 50710*a* at the first node 50602*a*1 and identifies the first-second protocol address that may be set and/or otherwise detected by the separator component 50437.

At a third path node 50604*a*3, an address separator field 50704*a* in a data unit including the data from the first node 50602*a*1 may be set to and/or otherwise may be detected, by a separator component 50435*a* and/or an address space component 50402*a* in the third path node 50604*a*3, as a value that identifies "503.503", in a first address field 50708*a*. The information in the first address field 50708*a* identifies a protocol address identifies the second node 50602*a*2. The value in the address separator field also identifies a second address field 50710*a* that identifies "502.502" as a protocol address that, for the first node 50602*a*1, identifies the third path node 50604*a*3. At the second node 50602*a*2 a data unit including the data from the first node 50602*a*1 may include a value, set and/or detected by a separator component in the second node 50602*a*2, in an address separator field 50704*a* that indicates that the address information field 50706*a* includes only a first address field 50708*a* identifying "502.502.503.503" as the first protocol address.

As the data from the first node 50602*a*1 is transmitted from node to node in the network path the value represented in an address separator field 50704*a* in an address information field 50706*a* in a data unit including the data or a portion thereof may be adjusted by respective separator components 50528 in respective execution environment 50150 of the nodes in the network path to identify a protocol address in a suitable address space for the respective nodes.

The above describes an address representation 50702*a* processed to identify destination address information in a data unit of a network protocol, such as an IP protocol and/or a layer two protocol. An address representation 50702*a* may include source address information with respect to a node receiving data in a data unit, described in the previous paragraph, sent from the first node 50602*a*1 to the second node 50602*a*2. An address information field 50706*a* including source address information at the third path node 50604*a*3 may include a first address field 50708*a* identifying the sequence, "500.503", that identifies a source-route protocol address that, for the third path node 50604*a*3, identifies the first node 50602*a*1 as the source node for the data in the data unit. The address information field 50706*a* including the source address information at the third path node 50604*a*3 may include a second address field 50710*a* identifying the sequence "501.501" that identifies a source-route protocol address that, for the second node 50602*a*2, identifies the third path node 50604*a*3.

FIG. 100B illustrates another type of address representation 50702*b* that may be included in a data unit to provide address information according to a particular network protocol, such as IP, IPX, or ATM. Instead of or in addition to including an address separator field 50704*a* that distinguishes a first address field 50708*a* from a second address field 50710*a* based on a bit count, a bit-mask may be specified as one or more address separator fields 50704*b* to identify a first address field 50708*b* and a second address field 50710*b* in an address information field 50706*b*. Address information represented as illustrated in FIG. 100B may be processed in an analogous manner to that described for the address information represented in FIG. 100A based on the bit mask address separator field(s) 50704*b* rather than and/or in addition to a size address separator field 50704*a* illustrated in FIG. 100A.

FIG. 100C illustrates an address representation 50702*c* identifying one or more source-route protocol addresses. An address information field 50706*c* may be interpreted as one or more source-route protocol addresses based on one or more address separator field(s) 50704*c*. Address separator fields 50704*c* are specified according to a network protocol to distinguish one protocol address from another in an address information field 50706*c*. FIG. 100C illustrates an address separator field 50704*a* that distinguishes and/or identifies hop identifiers. The address separator fields 50704*c* distinguish separate hop identifiers based on changes in values of bits in consecutive address separator fields 50704*c*. In FIG. 100C, a first address separator field 50704*c*1 includes one or more one valued bits that correspond to bit positions in the address information field 50706*c* to identify a first address field referred to in FIG. 100C as a first hop information field. Source-route protocol addresses that include more than one hop may be distinguished similarly as shown in FIG. 100B. Combinations of hop identifiers and path identifiers may be distinguished as source-route protocol addresses by address separator fields 50704*a*. An illustrated second hop information field 50704*c*2 includes one or more zero valued bits to identify a second hop information field in address information field 50706*c*. Additional alternating sequences of one valued bits and zero valued bits illustrated by address separator fields 50704*c*3-12*c* correspond to and identify other hop information fields identifying hops in a network path communicatively coupling a pair of path end nodes and identified by a source-route protocol address.

In FIG. 99C, a hop may be identified by an interface identifier of a network interface in a pair of communicatively coupled nodes included in the hop. For example, the number, '1' may serve as a hop identifier specific to a second path node 50604*c*2 to identify a fifth hop 50608*c*5 including the second path node 50604*c*2 and a fourth path node 50604*c*4. The number '1' also identifies a network path for exchanging data between the two nodes. The number '1' may also be a protocol address that, for the second path node 50604*c*2, identifies the fourth path node 50604*c*4. The number '1' may also identify a hop for the fourth path node 50604*c*4 to exchange data with the second path node 50604*c*2; may also be a protocol address that, for the fourth path node 50604*c*4 identifies the second path node 50604*c*2; and may identify a particular network interface of the second path node 50604*c*2 and/or of the fourth path node 50604*c*4.

A first node 50602*c*1 may identify a second node 50602*c*2 by a first-second source-route protocol address that, for a node in a first region 50606*c*1 including the first node 50602*c*1, identifies the second node 50602*c*2. The first-second protocol address may include and/or otherwise may be based on a sequence of hop identifiers "500.501.503.502.501". Note that other network paths are illustrated for transmitting data from the first node 50602*c*1 to the second node 50602*c*2 and may also be and/or otherwise may identify source-route protocol addresses identify the second node 50602*c*2 to nodes in the first region 50606*c*1.

The second node 50602*c*2 may identify a third node 50602*c*3 by a second-third source-route protocol address that, for the second node 50602*c*2, identifies the third node 50602*c*3. The protocol address may be based on a sequence of hop identifiers "501.503.500" that identifies the third node 50602*c*3 with respect to the second node 50602*c*2.

The hop identifiers, "500.501.503.502.501", may be represented in an address representation 50702*c* in a data unit for sending data from the first node 50602*c*1 to the second node 50602*c*2. The hop identifiers, "501.503.501-500", may be represented in an address representation 50702*c* in a data unit for sending data from the second node 50602*c*2 to the third node 50602*c*3. The identifiers may be given a bit or binary representation and the hop identifiers may be distinguished or separated via address separator fields 50704*c* as described above with respect to FIG. 100C. An address separator field analogous to that shown in FIG. 100A may also or alternatively be included and processed as described above. Assignment of hop identifiers is described in application Ser. No. 13/727,649 filed on 2012 Dec. 27, entitled "Methods, Systems, and Computer Program Products for Assigning an interface Identifier to a Network Interface"; application Ser. No. 13/727,655 filed on 2012 Dec. 27, entitled "Methods, Systems, and Computer Program Products for Determining a Shared identifier for a Hop in a Network", and application Ser. No. 13/727,657 filed on 2012 Dec. 27, entitled "Methods, Systems, and Computer Program Products for Determining a Hop Identifier for a Network Protocol", by the present inventor.

Note that the address information that identifies source-route protocol addresses for the second node 50602*c*2 and for the third node 50602*c*3 in the preceding description may include information for identifying a return path or a portion thereof. For example, the second-third protocol address "501.503.501-500" identifies "500-501.503.501", which may be included in a third-second protocol address that identifies the second node 50602*c*2 for nodes to the third node 50602*c*3. The first-second protocol address, "500.501.503.502.501", identifies "501.502.503.501" that identifies a network path from the second node to the first region 50606*c*1. The sequence, "501.502.503.501", however, does not identify any network interfaces of nodes in the first region 50606*c*1. Separate source address information may be included in a data unit sent to the second node 50602*c*2 that includes data sent from the first node 50602*c*1. The source address information may identify "501.502.503.501.101" as a second-first protocol address that identifies the first node 50602*c*2. In, the first region 50606*c*1, '101' may be a scoped address that identifies the first node 50602*c*1 in the scope of the first region 50606*c*1. Thus, a source-route protocol address may include a scoped address.

As described in the previous paragraph, a hop may be assigned an identifier that is shared by the pair of nodes in the hop. Thus, a sequence of hop identifiers may serve as a source-route protocol address in one address space when processed in one order of the sequence and may serve as another source-route protocol address specific for another node when processed according to another order of the sequence.

FIG. 100D includes an address representation 50702*d* illustrating aspects of a schema for representing path information based on identifiers of network interfaces or other suitable pairs of numbers for identifying protocol endpoints of a hop and/or a network path. An address information field 50706*d* includes path information identifying a network path for communicating data between a pair of path end nodes in the network path. FIG. 100D illustrates that an address representation 50702*d* may include one or more address separator fields 50704*d* that correspond to and/or otherwise identify respective one or more portions of the address information field 50706*d* that are based on a pair of identifiers of protocol endpoints.

An address separator field 50704*d* includes series of one valued bits and zero valued bits. A change from a one value to a zero value and vice versa may indicate a boundary that separates protocol endpoint identifiers and/or interface identifiers. An address separator field 50704*d*1 includes one zero valued bit followed by four one valued bits. The zero valued bit may be defined to indicate that a first network interface in a first hop identifier is one bit long with a corresponding position in the address information field 50706*d*.

FIG. 100D identifies the first interface identifier as the number '1' in base ten. The four one valued bits in the first address separator field 50704*d*1 may be similarly defined to identify the location of a second interface identifier in the first hop identifier. The second interface identifier, as illustrated in FIG. 100D, has the value '10' in base ten. The first hop identifier includes the numbers '1' and '10'. The first hop identifier may be represented as a string, "501-5010". A second hop identifier is located by the end of the series of four one valued bits in the first address separator field 50704*d*1 to a series of three zero valued bits that identify a boundary of a second address separator field 50704*d*2 for second hop information identifying a second hop identifier, and the three zero valued bits also identify the location of a first interface identifier in second hop information in the address information field 50706*d*. Two subsequent one valued bits identify the location in the address information field 50706*d* of a second interface identifier in the second hop information. The second hop identifier includes the numbers '7' and '0' in base ten. The remaining address separator fields 50704*d* may be processed similarly. The protocol address illustrated FIG. 100D may be represented textually as "501-5010.506-500.500-505.501-5014.505-500.506".

Note that the address separator field 50704*d*6 does not identify a pair of identifiers and is similar to address separator fields 50704*c* in FIG. 100C. Alternatively, an address separator field 50704*d* may correspond to a portion of an address information field 50706*d* that identifies a scoped address. This is illustrated to demonstrate that protocol addresses may be uniform or non-uniform in their format and content.

In FIG. 99B, a first node 50602*b*1 and a second node 50602*b*2 may be included in respective regions. Each of the two nodes may identify the other by a protocol address in a respective address space. For example, a sequence of pairs of interface identifiers "50151-50254.50151-5010" may be a protocol address that, for the first node 50602*b*1, identifies the second node 50602*b*2. The first node may send a data unit including an address representation 50702*d* of the type illustrated in FIG. 100D.

Note that reversing the interface identifiers yields the identifier "5010-50151.50254-50151" that may be a protocol address that, for the second node **50602*b*2, identifies the first node 50602*b*1. The second node 50602*b*2 and a third node 50602*b*3 may be included in regions that respectively include the nodes. Each of the two nodes may identify the other by a protocol address in a respective address space. A sequence of pairs of interface identifiers "5010-50254.50151-5010" may be a protocol address that, for the second node 50602*b*2, identifies the third node 50602*b*3. Reversing the interface identifiers yields the identifier "5010-50151.50254-5010" that may be a protocol address that, for the third node 50602*b*3, identifies the second node 50602*b*2**.

A sequence of hop identifiers based on interface identifiers may serve as a source-route protocol address in one address space when processed in one order of the sequence and may serve as another source-route protocol address for another node when processed according to another order of the sequence.

FIG. 100E illustrates an address representation **50702*e* that further demonstrates that a protocol address may be based on path information. An address representation 50702*e* may include portions that include path information and/or portions that include scoped addresses. An address separator field 50704*e* is defined to distinguish address fields in a manner similar to the method described for distinguishing hop identifiers in FIG. 100C. A first address information field 50706*e*1 corresponding to the first address separator field 50704*e*1 includes a single interface identifier for an outbound network interface for a first node as described above with respect to FIG. 100A and FIG. 99C. A second address information field 50706*e*2 corresponding to a second address separator field 50704*e*2 may include a scoped address having an inside scope, an outside scope, or both. A node processing the second address information field 50706*e*2** may be included in a portion of a network spanned by the scope of the scoped address. The node may process the scoped address accordingly.

See application Ser. No. 11/962,285, by the present inventor, filed on 2007 Dec. 21, entitled "Methods and Systems for Sending Information to a Zone Included in an Internet Network" for a description of addresses having outside scope and/or inside scope and processing of such addresses. A third address information field **50706*e*3 corresponding to a third address separator field 50704*e*3 may include a pair of identifiers as described with respect to FIG. 100D. A fourth address information field 50706*e*4 corresponding to a fourth address separator field 50704*e*4 may include a protocol address analogous to one of the types of addresses described with respect to the second address information field 50706*e*2** such as a local-scoped address.

In FIG. 99B, a first node **50602*b*1 may be included in a first region that includes network interfaces coupling nodes to a first network 50606*b*1 included in the network 50600*b*. A second node 50602*b*2 may be included in a second region that includes network interfaces coupling nodes to a second network 50606*b*2. Each of the two nodes may identify the other by a source-route protocol address. For example, a sequence of scoped addresses "50254.5010" may be a protocol address that may identify the second node 50602*b*2 to the first node 50602*b*1, as well as to other nodes in the first region defined by the first network 50606*b*1. A data unit including an address represented as in 50702*e* in FIG. 100E may identify a source-route protocol address based on a sequence of scoped addresses. Similarly, a sequence of scoped addresses 50254.50103 may be a protocol address that identifies a third node 50602*b*3 to the second node 50602*b*2 as well as to other nodes in the second region defined by the second network 50606*b*2**.

As described above, a source-destination protocol address may include and/or may otherwise identify source-destination path information identifying a source-destination network path included in communicatively coupling the source node and the destination node. A source-destination protocol address may include and/or may otherwise identify first hop information identifying a first hop including a first pair of communicatively coupled nodes included in communicatively coupling the source node and the destination node. At least one the hop identifier may include and/or may otherwise identify an identifier of at least one of the nodes in the first pair. The identifier of the at least one of the nodes in the first pair may include and/or otherwise may identify a network interface that is included in communicatively coupling the first pair. A source-destination protocol address may include and/or may otherwise identify a plurality of hop identifiers in an identifiable first order and in an identifiable second order, wherein the source-destination protocol address includes the plurality of hop identifiers in the first order and a destination-source protocol address, that identifies the source node to the destination node, includes the plurality of hop identifiers in the second order. At least one of the first order and the second order may be identified in the data unit by sequence information defined by a schema of the network protocol. The sequence information may be represented separately from the plurality of hop identifiers A first hop including a first hop node and a second hop node, both in the network path, may be identified with respect to the source node by a source hop identifier, for example in a source scope-specific address space specific to a source region that includes the source node. The first hop including the first hop node and the second hop node, both in the network path, may be identified with respect to the destination node by a destination hop identifier in the destination scope-specific address space.

The description above with respect to FIGS. 100A-E and FIGS. 99A-C demonstrates that not only are nodes identifiable via source-route protocol addresses, but a hop in a network may be identified by a source-route identifier. In FIG. 99C, a third hop **50608*c*3 between a seventh path node 50604*c*7 and an eighth path node 50604*c*8 may be identified with respect to a first node 50602*c*1 by a hop identifier relative to the first node 50602*c*1. The sequence "500.501.503.502.503" identifies the third hop 50608*c*1 that includes a seventh path node 50604*c*7 and the eighth path node 50604*c*8. The third hop 50608*c*3 identified with respect to a sixth path node 50604*c*6 may be identified by the sequence, "500.503". The number, '3', is an identifier that, relative to the seventh path node 50604*c*7, identifies the third hop 50608*c*3**.

FIG. 99C illustrates that the third hop **50608*c*3 includes the seventh path node 50604*d*7 and the eighth path node 50604*c*8. A third hop identifier relative to the first region 50606*c*1 may be represented as "501.500.501.500.503", as FIG. 99C illustrates. The third hop identifier includes a hop identifier '3' that identifies the third hop 50608*c*3 with respect to an eighth path node 50604*c*8. "501.500.501.500.503" identifies a route to the third hop for the nodes in the first region 50606*c*1. The seventh path node 50604*c*7 is included in a network path from the first node 50602*c*1 to the eighth path node 50604*c*8 that includes the third hop 50608*c*3**.

A protocol address that for a network protocol identifies a second node to a first node may include an identifier of a network path included in communicatively coupling a first node and a second node. For example, with respect to FIGS. 100A-E and FIG. 99C, a sequence, "101.501.503.502.503.500-502", may represent a protocol address that identifies an eleventh node 50602*c*11 to a first node 50602*c*1 in a network 50600*c*. The address may be for a network layer protocol and/or one or more link layer protocols supported by portions of the network 50600*c*.

A protocol address that for a network protocol identifies a second node to a first node may include first hop information identifying a first hop including a first pair of communicatively coupled nodes included in communicatively coupling the first node and the second node. The sequence, "500.501.503.502.503.500-502", described in the previous paragraph includes the hop identifier "501" which identifies a fifth hop 50608*c*5 in the network 50600*c*. The fifth hop 50602*c*5 includes a fourth path node 50604*c*4 and a second path node 50604*c*2, included in a network path that communicatively couples the first node 50602*c*1 and the eleventh node 50602*c*11.

A hop identifier in a source-route protocol address may include a network interface identifier of a network interface of a node in the hop. In network 50600*b* in FIG. 99B, a sequence, "50151-50254.50151-5010", identifies a second node 50602*b*2 to a first node 50602*b*1. "50151-50254" is a scoped hop identifier that in the first network region 50606*b*1 identifies a first hop 50608*b*1 including the first node 50602*b*1 and a first path node 50604*b*1. "50151-5010" is a hop identifier that in the second network region 50606*b*2 identifies a fourth hop 50608*b*4 including the first path node 50604*b*1 and the second node 50602*b*2.

A source-route protocol address that for a network protocol identifies a second node to a first node may be defined by a network protocol to include a network interface identifier identifying a network interface included in communicatively coupling a first node and a second node. With respect to FIG. 99B and the previous paragraph, '254' is an identifier of a network interface of the first path node 50604*b*1 in the first network region. With respect to FIG. 99C, '2' is a network interface identifier of the eleventh path node 50602*c*11 in a fourth network region 50606*c*4. FIG. 99C further illustrates that '3' may identify a network interface of a seventh path node 50604*c*7 to an eighth path node 50604*c*8 in a third hop 50608*c*3. '3' may alternatively or additionally identify a network interface of the eighth path node 50604*c*8 to the seventh path node 50604*c*7 in the third hop 50608*c*3

As described above, a source-route protocol address may be identified that, for a destination node, identifies a source node. The protocol address that identifies the destination node may include address information that identifies the source node. In FIG. 99B, the sequence, "50151-50254.50151-5010", that identifies a second node 50602*b*2 to a first node 50602*b*1 includes the sequence "5010-50151.50254-50151" that for a network protocol identifies the first node 50602*b*1 to the second node 50602*b*2.

A network may be represented in a topological space. The domain name system includes a hierarchical representation of the Internet, but currently neither the hierarchical structure of the name space nor the hierarchical structure of the IP address space represents communicatively couplings and/or routes in the network.

As described with respect to FIGS. 100A-E and FIGS. 99A-C, Identifying a source-route protocol address that for a network protocol identifies a second node to a first node may include identifying a second location of the second node in a topological space relative to a first location in the topological space of the first node. The source-route protocol address identifies the second location relative to the first location. The source-route protocol address may identify a path location of a path node represented in the topological space, wherein the path location is included in a path in the topological space that connects the first location and the second location. The source-route protocol address that for a network protocol identifies a second node to a first node may identify a sequence of locations in the path in the topological space.

Sending data in a data unit by a first node may include detecting, in the data unit, address separating information specified according to the network protocol for detecting at least one of a first-next protocol address information and a next-first protocol address information. The address separating information may be updated for identifying, by a next node included in communicatively coupling the first node and the second node, the at least one of the first-next protocol address information and next-first protocol address information in the address information, wherein the next-first protocol address information includes information for identifying the first node.

A source-route protocol address, that for a network protocol identifies a second node to a first node, may include a first path node protocol address that, for the first node, identifies a first path node included in a first network path included in communicatively coupling the first node and the second node. Additionally or alternatively, a source-route protocol address, that for a network protocol identifies a second node to a first node, may include a second path node protocol address that, for the path node, identifies the second node. The path node is included in a network path that communicatively couples the first node and the second node Further, identifying a source-route protocol address that for a network protocol identifies a second node to a first node may include identifying, based on the source-route protocol address, the first path node protocol address and based on the second path node protocol address Sending data from a first node to a second node identified by a source-route protocol address may include sending the data via a path node in a network path communicatively coupling the first node and the second node. The source-route protocol address may include a first path node protocol address that identifies the path node to the first node and the source-route protocol address may include a path node second protocol address that identifies the second node to the first path node for the network protocol Further, a source-route protocol address that, for a network protocol, identifies a second node to a first node may include a first hop identifier that identifies a first hop in a network path. The first hop may include one or both of the first node and the first path node. A first hop identifier may be assigned to identify the first hop in response to a negotiation between the first node and another node in the first hop. A source-route protocol address that for a network protocol identifies a second node to a first node may include a second hop identifier that identifies a second hop in the network path, wherein the second hop includes at least one of the second node and the first path node A source-route protocol address that, for a network protocol, identifies a second node to a first node may include a hop identifier that identifies a hop in the network path. The hop includes a first hop node and a second hop node that are communicatively coupled via a first network interface in the first hop node and via a second network interface in the second hop node. The first hop identifier may include at one or more of a first network interface identifier identifying the first network interface and a second network interface identifying the second network interface to at least one of the first hop node and the second hop node In FIG. 98, an in-data component 50520 is included in network layer component 50515 of an execution environment 50501. A path node 50604 in FIGS. 99A-C may include an adaptation and/or analog of the execution environment 50501. Data communicated between a source node and a destination node may be received by a path node 50604 via of a NIC, such as first NIC 50519-94, operatively coupling the path node 50604 to a previous network path including the source node and the path node 50604 An in-data component 50520 may detect one or more network layer protocol data units in data received from the link layer component 50517. For example, the in-data component 50520 may detect one or more IP packets in data received in one or more Ethernet frames. In-data component 50520 may detect a network layer data unit that includes data from a source node to relay to a destination node identified in address information in the detected network layer data unit as defined by a particular network layer protocol. A network interface component 50519 in a path node 50604 may receive data communicated from a source node via a previous network path included in a network 50600. One or more network paths may exist for receiving the data.

A path node 50604 may receive data from a source node 50602 to transmit the received data to a destination node 50602 via a specified network protocol. For example, a path node 50604 may receive and transmit a data unit at a link layer as performed by an Ethernet bridge and a multiple protocol labeling switch (MPLS). Further, a path node 50604 may receive and transmit a data unit at a network layer as performed by an Internet protocol (IP) router. Still further, a path node 50604 may receive and transmit a data unit at an application layer, as defined above.

Data received from a source node by a path node 50604 may be received via one or more previous path nodes 50604 in one or more hops identified in a destination protocol address. Data may be received by a current path node 50604 from a previous node based on a previous-current protocol address. The previous-current protocol address may be a source-route protocol address that, for the previous node, identifies the current node as described in detail below.

In FIG. 98, a routing component 50522 is illustrated operatively coupled to a network layer component 50515. A routing component 50522 may detect a protocol address of a next node based on a schema for including address information in a data unit of a corresponding network protocol. The address information may be detected in a data unit by the routing component 50522. In another aspect, address information may be detected by an in-data component 50520 that operates to provide some or all of the address information to the routing component 50522 to detect a protocol address of a next node.

Whether a protocol address is a source-route protocol address may be determined, by a routing component 50522, by a bit pattern or identifier defined to identify a protocol address type, category, and/or class. The bit pattern or identifier may be located by the routing component 50522 stored in a type bits portion of an IP packet and/or in some other specified location. Those skilled in the art will realize that neither the schemas, which define a format rule(s) and/or a vocabulary rule(s) for a protocol address, described nor the protocols in which their use is described are exhaustive.

An address representation 50702*a*, in FIG. 100A, may be detected by an in-data component 50520 and/or a routing component 50522 in a data unit or packet of an Internet Protocol or other network protocol. For example, a routing component 50522, in a current path node 50604, may process information in a previous address field 50708*a* to identify a previous address that, for a previous node in the network path, identifies the current path node 50604. A routing component 50522 may identify, based on information in a next address field 50710*a*, a next protocol address, that identifies a next node in the network path.

Alternatively or additionally, a routing component 50522 may identify, based on information in a next address field 50710*a*, a current protocol address, that identifies the current node. A routing component 50522 interoperating with an in-data component 50520 may determine a next protocol address that identifies the next node, based on the current protocol address. In another aspect, a routing component may determine the current address based on the next protocol address.

With respect to FIG. 99A, an address representation 50702*a* may be included in a data unit including data from a first node 50602*a*1 to transmit to a second node 50602*a*2. The sequence, “502.502.503.503”, may be represented in an address information field 50706*a* to identify a protocol address that identifies the second node 50602*a*2. At the first node 50602*a*1, the address separator field 50704*a* may be set, by a separator component 50528, to include a size of zero for a previous address field 50708*a*. The address information field 50706*a*, thus includes a next address field 50710*a* at the first node 50602*a*1 and identifies the second node 50602*a*2 with respect to nodes in the first network region 50606*a*1.

At a second path node 50604*a*2, an address separator field 50704*a*, in a data unit including the data from the first node 50602*a*1, may include a value, ‘2’, that identifies, in a previous address field 50708*a*, a protocol address that identifies a second path node 50604*a*2. A routing component 50522 in a first path node 50604*a*1 may detect the value. The routing component 50404*a* interoperating with a separator component 50528 may also identify, based on the value in the address separator field 50704*a*, a next address field 50710*a* that identifies “502.503.502” as a next protocol address that identifies the second node 50602*a*2. The separator component 50528 may detect the next protocol address.

At the second node 50602*a*2, a data unit including the data from the first node 50602*a*1 may include a value in an address separator field 50704*a* that indicates that the address information field includes only a previous address field 50708*a* identifying “502.502.503.503”, which is the destination protocol address when interpreted in the context of the first network region 50606*a*1.

In FIG. 99A, at the second node 50602*a*2 the value in the separator address field and/or in another portion of the data unit may be defined to indicate that the address information field 50706*a* also includes information for determining and/or otherwise identifying a protocol address that identifies a network interface of a node, in the first network region 50606*a*1, in a network path from the second node 50602*a*2 to the first node 50602*a*1. The address information field 50706*a* in some aspects may include information for determining a protocol address that identifies the first node 50602*a*1.

The above description describes an address representation 50702*a* processed in the role of a destination protocol address in a data unit of a network protocol, such as an IP protocol. As a source protocol address with respect to a data unit, described in the previous paragraph, sent from the first node 50602*a*1 to the second node 50602*a*2, an address information field 50706*a*, at the second path node 50604*a*2, may include a previous address field 50708*a* identifying the sequence, "503", that identifies a protocol address that identifies the first node 50602*a*1 as a sender of the data in the data unit. The address information field 50706*a* including the source address information at the second path node 50604*a*2 may include a next address field 50710*a*, identified by an address separator field 50704*a*, identifying the sequence "501.501.500" that identifies a protocol address that identifies the second path node 50604*a*2 to the second node 50602*a*2 as a path node 50604 in a network path traversed by the data sent from the second node 50602*a*2.

An in-data component 50520 may detect address information in a data unit specified according to a network protocol to include a destination protocol address portion and a source protocol address portion as, for example, current IP packet headers are specified. Alternatively, an in-data component 50520 may detect address information in a data unit defined to include an address portion that identifies a source-route protocol address identifying a source node for one node in a network path traversed by the packet and identifies a source-route protocol address identifying a destination node for another node in the network path.

Address information formatted as illustrated in FIG. 100B may be processed by a routing component 50522 interoperating with an in-data component 50520 and/or a separator component 50528 in an analogous manner to that described above based on a bit mask address separator field(s) 50704*b* rather than and/or in addition to a size address separator field 50704*a* illustrated in FIG. 100A.

FIG. 100C illustrates an address representation 50702*c* identifying path information that may be detected by a routing component 50522. An address information field 50706*c* may be interpreted as a network path identifier based on address separator field(s) 50704*c* in a data unit. Address separator fields are specified according to a network protocol to distinguish one path identifier from another path identifier in an address information field 50706*c*.

In an aspect, illustrated in FIG. 100C, a routing component 50520 and/or a separator component 50528 may distinguish hop identifiers, since a single hop is a network path. A separator component 50528 may distinguish separate hop identifiers based on changes in values in bits of consecutive address separator fields 50704*c*. Combinations of hop identifiers and path identifiers may be distinguished by a routing component 50522 and/or a separator component 50528 based on information in address separator fields 50704.

In FIG. 99C, a seventh path node 50604*c*7 in the identified network path may identify the eighth node 50602*c*8 based on another sequence of hop identifiers, "503.500.5051". The sequence of hop identifiers may identify a protocol address that, for the seventh path node 50604*c*7, identifies the eighth node 50602*c*8. Note that a routing component 50522 and/or a separator component 50528 operating in the seventh path node 50604*c*7 may detect the sequence, "503.500.5051", in and/or otherwise based on the protocol address of the eighth node 50602*c*8. Further, the routing component 50522 and/or the separator component 50528 may detect a protocol address for the eighth path node 50604*c*8 as well as a protocol address for the ninth path node 50604*c*9, in and/or otherwise based on the sequence, "503.500.5051". The detected protocol addresses may be specific to the second network region 50606*c*2 as illustrated in FIG. 99C.

Note that the address information that identifies one or more protocol addresses for the seventh path node 50604*c*7 and for the eighth node 50602*c*8 in the preceding description may include information that identifies a return path or a portion thereof. For example, the sequence address, "503.500.5051", identifies, "500.503", which may be a protocol address that identifies the seventh path node 50604*c*7 for the ninth path node 50604*c*9 operating as a gateway for nodes in the third network region 50606*c*3. The sequence, "501.503.502", identifies, "502.503.501", that identifies a network path from the seventh path node 50604*c*7 to a node having a network interface in first network region 50606*c*1, illustrated by a second path node 50604*c*2.

A routing component 50522 and/or an in-data component 50520 may operate based on the schema or a portion of the schema illustrated in FIG. 100D. In FIG. 99B, a first node 50602*b*1 may identify a third node 50602*b*3 by a destination protocol address usable by a the first node 50602*b*1, where the protocol address is based on pairs of network interface identifiers as described in the previous paragraphs. For example, FIG. 99B illustrates a sequence of pairs of network interface identifiers, "50151-50254.50151-50254.50151-5010", may be a protocol address that, for the first node 50602*b*1, identifies the third node 50602*b*3. The first node 50602*b*1 may send a data unit including an address representation 50702*d* illustrated in FIG. 100D. Note that reversing the network interface identifiers yields the identifier, "5010-50151.50254-50151.50254-50151", that may be a protocol address that, for the third node 50602*b*3, identifies the first node 50602*b*1.

For a first path node 50604*b*1, an address representation 50702*d* in a data unit including data received from the first node 50602*b*1 may include previous address information identified by a routing component 50522 based on one or more address separator fields 50704 that identify the "151-254" and/or that identify the sequence "254-151". The sequence ordered as "151-254" may identify a protocol address that, for the first node 50602*b*1, identifies the first path node 50604*b*1. The sequenced ordered as "50254-50151" may identify a protocol address that, for the first path node 50604*b*1, identifies the first node 50602*a*1.

Further for the first path node 50604*b*1, the address representation 50702*d* may include next address information identified by the routing component 50522 based on one or more address separator fields 50704*d* that identify the sequence, "50151-50254.50151-50254.50151-5010", in a first order and/or in a second order. The sequence, "50151-50254.50151-50254.50151-5010", in the first order may identify a protocol address that, in the first path node-specific address space, identifies the third node 50602*b*3. The sequence, "5010-50151.50254-50151", in the second order may identify a protocol address that, in the third node-specific address space, identifies the first path node 50604*b*1.

In FIG. 99B, a first node 50602*b*1 may be included in a first network region that includes network interfaces coupling nodes to a first network 50614*b*1 included in a network 50600*b*. A third node 50606*b*3 may be included in a third network region that includes network interfaces coupling nodes to a third network 50614*b*3. Each of the two nodes may identify the other by a respective source-route protocol address. For example, a sequence of scoped addresses, "50254.50254.5010", may be a protocol address that may identify the third node 50606*b*3 to the first node 50602*b*1 as well as to other nodes in the first network region defined by the first network 50614*b*1. A data unit including an address representation 50702*e* in FIG. 100E may identify a source-route protocol address based on a sequence of scoped addresses.

For a second path node **50604*b*2, an address representation 50702*e* in a data unit including data received from the first node 50602*b*1 may include previous address information identified by a routing component 50522 in the second path node 50604*b*2 based on one or more address separator fields 50704*e* that identifies previous sequence, "50254.50254" in previous address information in the address representation 50702*e*. The previous sequence may identify a protocol address that, for the first node 50602*b*1, identifies the second path node 50604*b*2**.

Further for the second path node **50604*b*2, the previous address information identified by a routing component 50522 in the second path node 50604*b*2 identifies a first scoped address, '50254', that in the scope of the second network 50614*b*2 identifies a network interface of the second path node 50604*b*2 to nodes with network interfaces in the second network 50614*b*2**.

Still further for the second path node **50604*b*2, the address representation 50702*e* may include next address information identified by the routing component 50522 in the second path node 50604*b*2 based on one or more address separator fields 50704*e* that identifies a scoped address, '5010'. The scoped address '5010', in the scope of the third network 50614*b*3, identifies the third node 50602*b*3 to nodes with network interfaces in the third network 50614*b*3, such as the second path node 50604*c*2**.

In FIG. 98, a routing component 50522 may provide a next protocol address of a next node and/or forwarding information based on the next protocol address to a forwarding component 50524 to determine a network interface for sending data from a source node to a destination node via a next node in a network path from a current path node including the forwarding component 50524. In FIG. 98, a forwarding component 50524 is illustrated operatively coupled to a network layer component 50515 and operatively coupled to the routing component 50522.

Determining a next network interface based on a protocol address of a next node may include detecting a network interface identifier in the protocol address. In FIG. 99C, data in a data unit may be received by the seventh path node **50604*c*7 from the first node 50602*c*1. Address information in the data unit may identify the eighth node 50602*c*8 via a protocol address, "101.500.501.503.502.503.500.51", representing a sequence of hops in a network path including the first node 50602*c*1 and the eighth node 50602*c*8**.

As described above, the routing component may determine that a protocol address based on the sequence, "503.500.51 identifies the eighth node **50602*c*8 with respect to the seventh path node 50604*c*7. Further, the hop identifier, '3', may identify the eighth path node 50604*c*8 as a next node with respect to the seventh path node 50604*c*7. The number '3', as described above is assigned to identify a hop including the seventh path seventh path node 50604*c*7 and the eighth path node, and thus identifies a network interface, in the seventh path node 50604*c*7**, that is included in the hop.

A source-route protocol address may include one or more of a first scoped protocol address that identifies a node, in a first pair of nodes in the first-third network path included in communicatively coupling the first node and the third node, to another node in the first pair, wherein the first pair is included in a region of the network included in a span of the first scoped protocol address and a second scoped protocol address that identifies a node, in a second pair of nodes in the third-second network path included in communicatively coupling the second node and the third node, to another node in the second pair, wherein the second pair is included in a region of the network included in a span of the first scoped protocol address. A source-route protocol address may include one or both of a first hop identifier that identifies a first hop that includes a first pair of nodes included in communicatively coupling the first node and the third node and a second hop identifier that identifies a second hop that includes a second pair of nodes included in communicatively coupling the second node and the third node. One or more of the first node, the second node, and the third node are included in the first pair and/or the second pair. A source-route protocol address may include a second hop identifier that identifies the first hop to the first node which is not included in the pair A source-route protocol address may include first identifiers in a first portion of the plurality that in the first order identifies the first node to a path node and that in the second order identifies the path node to the first node. The source-route protocol address may include second identifiers, in a second portion of the plurality that in the first order identifies the second node to the path node and that in the second order identifies the path node to the second node A source-route protocol address be identified by an address type field in a data unit header of a network protocol. The address type may identify a loose source route option, a strict source route option, a record route option, routing type zero, or a routing type four.

A source-route protocol address may be included one or more of a scope-specific protocol address, a scoped protocol address, a path-based protocol address, a hop-based protocol address, and a network interface based protocol address.

In an aspect, a first node may instruct a second node to send data to the first node identified by a source-route protocol address. Alternatively or additionally, the first node may instruct the second node to receive and accept data from the first node sent via a source-route protocol address. Still further, the second node may send a request to the first node for a source-route protocol address for communicating with the first node. FIG. 97A illustrates an arrangement of components operating in an execution environment **50401*a* to perform a method illustrated in FIG. 101. The system illustrated by the arrangement includes an endpoint-out component 50408*a* and a routing component 50406*a***.

With reference to FIG. 101, a block 50802 illustrates that the method includes sending, by a first node to a third node via third protocol address in a first data unit of a first network protocol and that identifies the third node, a first data unit of the first network protocol to identify to the third node at least one of a first-third protocol address and a third-first protocol address, wherein the first-third protocol address identifies a first-third network path including a first-second node communicatively coupling the first node to the third node and the third-first protocol address identifies a third-first network path including a third-second node communicatively coupling the third node to the first node. Accordingly, the system in FIG. 97A includes means for sending, by a first node to a third node via third protocol address in a first data unit of a first network protocol and that identifies the third node, a first data unit of the first network protocol to identify to the third node at least one of a first-third protocol address and a third-first protocol address, wherein the first-third protocol address identifies a first-third network path including a first-second node communicatively coupling the first node to the third node and the third-first protocol address identifies a third-first network path including a third-second node communicatively coupling the third node to the first node. The system includes one or more processors and logic encoded in one or more computer readable media for execution by the one or more processors that when executed is operable for and/or is otherwise included in sending, by a first node to a third node via third protocol address in a first data unit of a first network protocol and that identifies the third node, a first data unit of the first network protocol to identify to the third node at least one of a first-third protocol address and a third-first protocol address, wherein the first-third protocol address identifies a first-third network path including a first-second node communicatively coupling the first node to the third node and the third-first protocol address identifies a third-first network path including a third-second node communicatively coupling the third node to the first node.

For example, the arrangement in FIG. 97A includes an endpoint-out component 50408*a* that is operable for and/or is otherwise included in sending, by a first node to a third node via third protocol address in a first data unit of a first network protocol and that identifies the third node, a first data unit of the first network protocol to identify to the third node at least one of a first-third protocol address and a third-first protocol address, wherein the first-third protocol address identifies a first-third network path including a first-second node communicatively coupling the first node to the third node and the third-first protocol address identifies a third-first network path including a third-second node communicatively coupling the third node to the first node.

A block 50804, in FIG. 101, illustrates that the method includes in, response to the sending in block 50802, at least one of sending, by the first node to the third node via the first-third protocol address, first-third data via the first-third network path and receiving, by the first node from the third node via the third-first protocol address, third-first data via the third-first network path. Accordingly, the system in FIG. 97A includes means for, in response to the sending in block 50802, at least one of sending, by the first node to the third node via the first-third protocol address, first-third data via the first-third network path and receiving, by the first node from the third node via the third-first protocol address, third-first data via the third-first network path. The system includes one or more processors and logic encoded in one or more computer readable media for execution by the one or more processors that when executed is operable for and/or is otherwise included in, in response to the sending in block 50802, at least one of sending, by the first node to the third node via the first-third protocol address, first-third data via the first-third network path and receiving, by the first node from the third node via the third-first protocol address, third-first data via the third-first network path.

For example, the arrangement in FIG. 97A includes a routing component 50406*a* that is operable for and/or is otherwise included in, in response to the sending in block 50802, at least one of sending, by the first node to the third node via the first-third protocol address, first-third data via the first-third network path and receiving, by the first node from the third node via the third-first protocol address, third-first data via the third-first network path. The first node may send a data unit including an indicator to record a route between the first node and the third node rather than or in addition to explicitly sending a source-route protocol address to the third node. The first node and the third node may communicate a source-route protocol address via a first network protocol, while the source protocol address may be in an address space of a second network protocol. The first network protocol and the second network protocol may operate at the same, different, or functionally overlapping layers of a network stack.

FIG. 97A illustrates an arrangement of components operating in an execution environment 50401*a* to perform a method illustrated in FIG. 102. The system illustrated by the arrangement includes an endpoint-in component 50410*a* and a routing component 50406*a*.

With reference to FIG. 102, a block 50902 illustrates that the method includes receiving, by a first node from a third node via first protocol address of a network protocol that identifies the first node, a data unit of the network protocol that includes at least one of a first-third protocol address and a third-first protocol address, wherein the first-third protocol address identifies a first-third network path including a first-second node communicatively coupling the first node to the third node and the third-first protocol address identifies a third-first network path including a third-second node communicatively coupling the third node to the first node. Accordingly, the system in FIG. 97A includes means for receiving, by a first node from a third node via first protocol address of a network protocol that identifies the first node, a data unit of the network protocol that includes at least one of a first-third protocol address and a third-first protocol address, wherein the first-third protocol address identifies a first-third network path including a first-second node communicatively coupling the first node to the third node and the third-first protocol address identifies a third-first network path including a third-second node communicatively coupling the third node to the first node. The system includes one or more processors and logic encoded in one or more computer readable media for execution by the one or more processors that when executed is operable for and/or is otherwise included in receiving, by a first node from a third node via first protocol address of a network protocol that identifies the first node, a data unit of the network protocol that includes at least one of a first-third protocol address and a third-first protocol address, wherein the first-third protocol address identifies a first-third network path including a first-second node communicatively coupling the first node to the third node and the third-first protocol address identifies a third-first network path including a third-second node communicatively coupling the third node to the first node.

For example, the arrangement in FIG. 97A includes an endpoint-in component 50410*a* that is operable for and/or is otherwise included in receiving, by a first node from a third node via first protocol address of a network protocol that identifies the first node, a data unit of the network protocol that includes at least one of a first-third protocol address and a third-first protocol address, wherein the first-third protocol address identifies a first-third network path including a first-second node communicatively coupling the first node to the third node and the third-first protocol address identifies a third-first network path including a third-second node communicatively coupling the third node to the first node.

A block 50904, in FIG. 102, illustrates that the method includes, in response to the receiving in block 50902, at least one of sending, by the first node to the third node via the first-third protocol address, data via the first-third network path and receiving, by the first node from the third node via the third-first protocol address, data via the third-first network path. Accordingly, the system in FIG. 97A includes means for, in response to the receiving in block 50902, at least one of sending, by the first node to the third node via the first-third protocol address, data via the first-third network path and receiving, by the first node from the third node via the third-first protocol address, data via the third-first network path. The system includes one or more processors and logic encoded in one or more computer readable media for execution by the one or more processors that when executed is operable for and/or is otherwise included in, in response to the receiving in block 50902, at least one of sending, by the first node to the third node via the first-third protocol address, data via the first-third network path and receiving, by the first node from the third node via the third-first protocol address, data via the third-first network path.

For example, the arrangement in FIG. 97A includes a routing component 50406*a* that is operable for and/or is otherwise included in, in response to the receiving in block 50902, at least one of sending, by the first node to the third node via the first-third protocol address, data via the first-third network path and receiving, by the first node from the third node via the third-first protocol address, data via the third-first network path.

In another aspect, for security, performance, energy, pricing, and/or other reasons, a first node may send data to a second node via a first route (loose or strict) and may receive data from the second node via a second route (loose or strict). FIG. 97A illustrates an arrangement of components operating in an execution environment 50401*a* to perform a method illustrated in FIG. 103. The system illustrated by the arrangement includes an address space component 50402*a* and an endpoint component such as endpoint-out component 50408*a* and/or endpoint-in component 50410*a*.

With reference to FIG. 103, a block 501002 illustrates that the method includes identifying, by a first node, a first protocol address that identifies a first path node that is included in a first network path that includes the first node and that is included in a second network path that includes a second node, wherein the first protocol address for a network protocol at least one of identifies the first node to the second node and identifies the second node to the first node. Accordingly, the system in FIG. 97A includes means for identifying, by a first node, a first protocol address that identifies a first path node that is included in a first network path that includes the first node and that is included in a second network path that includes a second node, wherein the first protocol address for a network protocol at least one of identifies the first node to the second node and identifies the second node to the first node. The system includes one or more processors and logic encoded in one or more computer readable media for execution by the one or more processors that when executed is operable for and/or is otherwise included in identifying, by a first node, a first protocol address that identifies a first path node that is included in a first network path that includes the first node and that is included in a second network path that includes a second node, wherein the first protocol address for a network protocol at least one of identifies the first node to the second node and identifies the second node to the first node.

For example, the arrangement in FIG. 97A includes an address space component 50402*a* that is operable for and/or is otherwise included in identifying, by a first node, a first protocol address that identifies a first path node that is included in a first network path that includes the first node and that is included in a second network path that includes a second node, wherein the first protocol address for a network protocol at least one of identifies the first node to the second node and identifies the second node to the first node.

A block 501004, in FIG. 103, illustrates that the method includes communicating, based on the first protocol address, by the first node with the second node via the first path node via the network protocol. Accordingly, the system in FIG. 97A includes means for communicating, based on the first protocol address, by the first node with the second node via the first path node via the network protocol. The system includes one or more processors and logic encoded in one or more computer readable media for execution by the one or more processors that when executed is operable for and/or is otherwise included in communicating, based on the first protocol address, by the first node with the second node via the first path node via the network protocol.

For example, the arrangement in FIG. 97A includes an endpoint-out component 50408*a* and an endpoint-in component 50410*a* each of which is operable for and/or is otherwise included in communicating, based on the first protocol address, by the first node with the second node via the first path node via the network protocol.

A block 501006, in FIG. 103, illustrates that the method includes communicating, based on a second protocol address via third network path that includes the first node and the second, by the first node with the second node, wherein the first path node is not included in the third network path. Accordingly, the system in FIG. 97A includes means for communicating, based on a second protocol address via third network path that includes the first node and the second, by the first node with the second node, wherein the first path node is not included in the third network path. The system includes one or more processors and logic encoded in one or more computer readable media for execution by the one or more processors that when executed is operable for and/or is otherwise included in communicating, based on a second protocol address via third network path that includes the first node and the second, by the first node with the second node, wherein the first path node is not included in the third network path.

For example, the arrangement in FIG. 97A includes an endpoint-out component 50408*a* and an endpoint-in component 50410*a* each of which is operable for and/or is otherwise included in communicating, based on a second protocol address via third network path that includes the first node and the second node, wherein the first path node is not included in the third network path.

As described above, a first node and a second node may utilize more than one route in communicating via a network. To determine an alternate route, one or both of the nodes may request a source-route protocol address from an address space directory service, such as a DNS service. FIG. 97B illustrates an arrangement of components operating in an execution environment 50401*a* to perform a method illustrated in FIG. 104. The system illustrated by the arrangement includes a path detector component 50412*b*, an address space director component 50414*b*, and an agent handler component 50416*b*.

With reference to FIG. 104, a block 501102 illustrates that the method includes receiving, from a first node by a directory service, a first protocol address of a network protocol that identifies a first network path, wherein the first node and the second node are path end nodes in the first network path. Accordingly, the system in FIG. 97B includes means for receiving, from a first node by a directory service, a first protocol address of a network protocol that identifies a first network path, wherein the first node and the second node are path end nodes in the first network path. The system includes one or more processors and logic encoded in one or more computer readable media for execution by the one or more processors that when executed is operable for and/or is otherwise included in receiving, from a first node by a directory service, a first protocol address of a network protocol that identifies a first network path, wherein the first node and the second node are path end nodes in the first network path.

For example, the arrangement in FIG. 97B includes a path detector component 50412*b* that is operable for and/or is otherwise included in receiving, from a first node by a directory service, a first protocol address of a network protocol that identifies a first network path, wherein the first node and the second node are path end nodes in the first network path.

With reference to FIG. 104, a block 501104 illustrates that the method includes identifying a second network path that includes the first node as a path end node and the second node as a path end node, wherein the second network path at least one of does not include a first path node in the first network path and includes a second path node not included in the first network path. Accordingly, the system in FIG. 97B includes means for identifying a second network path that includes the first node as a path end node and the second node as a path end node, wherein the second network path at least one of does not include a first path node in the first network path and includes a second path node not included in the first network path. The system includes one or more processors and logic encoded in one or more computer readable media for execution by the one or more processors that when executed is operable for and/or is otherwise included in identifying a second network path that includes the first node as a path end node and the second node as a path end node, wherein the second network path at least one of does not include a first path node in the first network path and includes a second path node not included in the first network path.

For example, the arrangement in FIG. 97B includes an address space director component 50414*b* that is operable for and/or is otherwise included in identifying a second network path that includes the first node as a path end node and the second node as a path end node, wherein the second network path at least one of does not include a first path node in the first network path and includes a second path node not included in the first network path.

With reference to FIG. 104, a block 501106 illustrates that the method includes providing the second protocol address to at least one of the first node and the second node for exchanging, via the second protocol address, data in a data unit of the network protocol via the second network path. Accordingly, the system in FIG. 97B includes means for providing the second protocol address to at least one of the first node and the second node for exchanging, via the second protocol address, data in a data unit of the network protocol via the second network path. The system includes one or more processors and logic encoded in one or more computer readable media for execution by the one or more processors that when executed is operable for and/or is otherwise included in providing the second protocol address to at least one of the first node and the second node for exchanging, via the second protocol address, data in a data unit of the network protocol via the second network path.

For example, the arrangement in FIG. 97B includes an agent handler component 50416*b* that is operable for and/or is otherwise included in providing the second protocol address to at least one of the first node and the second node for exchanging, via the second protocol address, data in a data unit of the network protocol via the second network path.

A path node may determine whether to forward a data unit of network protocol based on a number of nodes, hops, and/or network interfaces in a network path traversed by the data and/or in a network path to be traversed by the data. Discarding a data unit that exceeds a hop limit, for example, may discard data units with routes that include a loop. Discarding such data units may, additionally or alternatively, restrict a scope of communications. FIG. 98 illustrates an arrangement of components operating in an execution environment 50150 to perform a method illustrated in FIG. 105. The system illustrated by the arrangement includes an in-data component 50520, a routing component 50522, and a forwarding component 50524.

With reference to FIG. 105, a block 501202 illustrates that the method includes receiving a protocol address, of a network protocol, identifying a network path for transmitting data via a network to a destination node identified by the protocol address. Accordingly, the system in FIG. 98 includes means for receiving a protocol address, of a network protocol, identifying a network path for transmitting data via a network to a destination node identified by the protocol address. The system includes one or more processors and logic encoded in one or more computer readable media for execution by the one or more processors that when executed is operable for and/or is otherwise included in receiving a protocol address, of a network protocol, identifying a network path for transmitting data via a network to a destination node identified by the protocol address.

For example, the arrangement in FIG. 98 includes an in-data component 50520 that is operable for and/or is otherwise included in receiving a protocol address, of a network protocol, identifying a network path for transmitting data via a network to a destination node identified by the protocol address.

With reference to FIG. 105, a block 501204 illustrates that the method includes determining, based on a count of protocol hops in the network path, whether a specified threshold condition is met. Accordingly, the system in FIG. 98 includes means for determining, based on a count of hops in the network path, whether a specified threshold condition is met. The system includes one or more processors and logic encoded in one or more computer readable media for execution by the one or more processors that when executed is operable for and/or is otherwise included in determining, based on a count of hops in the network path, whether a specified threshold condition is met.

For example, the arrangement in FIG. 98 includes a routing component 50522 that is operable for and/or is otherwise included in determining, based on a count of hops in the network path, whether a specified threshold condition is met.

With reference to FIG. 105, a block 501206 illustrates that the method includes not sending the data to the destination node, in response to determining that the threshold condition is met. Accordingly, the system in FIG. 98 includes means for not transmitting the data to the destination node, in response to determining that the threshold condition is met. The system includes one or more processors and logic encoded in one or more computer readable media for execution by the one or more processors that when executed is operable for and/or is otherwise included in not transmitting the data to the destination node, in response to determining that the threshold condition is met.

For example, the arrangement in FIG. 98 includes a forwarding component 50526 that is operable for and/or is otherwise included in not transmitting the data to the destination node, in response to determining that the threshold condition is met. Not transmitting may including discarding the data. Not transmitting may including sending and/or otherwise reporting the data and/or detection of the threshold condition to another node. A field may be defined in a data unit for maintaining a hop count.

Alternatively or additionally, source node and/or a path node may detect a loop in a network path identified by a source-route protocol address. A routing component may remove the loop by modifying the source-route protocol address. Alternatively, the data in the data unit may be discarded. Loops may be detected by an ASD service, by matching predefined patterns that may be scope-specific. Pattern matching may be used for detecting relatively small loops in a route, while hop count thresholds may be more efficient for identifying source-route protocol addresses that may include relatively larger loops.

FIG. 98 illustrates an arrangement of components operating in an execution environment 50150 to perform a method illustrated in FIG. 106. The system illustrated by the arrangement includes an in-data component 50520, a routing component 50524, a count component 50530, and a forwarding component 50526.

Security, performance, reliability, and the like may be improved by changing a route for sending data to a destination. A path node may change a destination address by identifying a source-route protocol address to change the route to a destination node. For example, the arrangement in FIG. 98 includes a forwarding component 50526 that is operable for and/or is otherwise included in not transmitting the data to the destination node, in response to determining that the threshold condition is met.

FIG. 98 illustrates an arrangement of components operating in an execution environment 50250 to perform a method illustrated in FIG. 106. The system illustrated by the arrangement includes an in-data component 50520, a routing component 50522, a forwarding component 50524, and an out-data component 50526.

With reference to FIG. 106, a block 501302 illustrates that the method includes receiving a protocol address of a network protocol for transmitting data via a network to a destination node identified by the protocol address. Accordingly, the system in FIG. 50598 includes means for receiving a protocol address of a network protocol for transmitting data via a network to a destination node identified by the protocol address. The system includes one or more processors and logic encoded in one or more computer readable media for execution by the one or more processors that when executed is operable for and/or is otherwise included in receiving a protocol address of a network protocol for transmitting data via a network to a destination node identified by the protocol address.

For example, the arrangement in FIG. 98 includes an in-data component 50520 that is operable for and/or is otherwise included in receiving a protocol address of a network protocol for transmitting data via a network to a destination node identified by the protocol address.

With reference to FIG. 106, a block 501304 illustrates that the method includes identifying, based on the protocol address, a first path node included in communicatively coupling, via the network protocol, a source node and the destination node. Accordingly, the system in FIG. 98 includes means for identifying, based on the protocol address, a first path node included in communicatively coupling, via the network protocol, a source node and the destination node. The system includes one or more processors and logic encoded in one or more computer readable media for execution by the one or more processors that when executed is operable for and/or is otherwise included in identifying, based on the protocol address, a first path node included in communicatively coupling, via the network protocol, a source node and the destination node.

For example, the arrangement in FIG. 98 includes a routing component 50522 that is operable for and/or is otherwise included in identifying, based on the protocol address, a first path node included in communicatively coupling, via the network protocol, a source node and the destination node.

With reference to FIG. 106, a block 501306 illustrates that the method includes changing the protocol address to include a path node identifier of the first path node, wherein the changed protocol address identifies the destination node. Accordingly, the system in FIG. 98 includes means for changing the protocol address to include a path node identifier of the first path node, wherein the changed protocol address identifies the destination node. The system includes one or more processors and logic encoded in one or more computer readable media for execution by the one or more processors that when executed is operable for and/or is otherwise included in changing the protocol address to include a path node identifier of the first path node, wherein the changed protocol address identifies the destination node.

For example, the arrangement in FIG. 98 includes a forwarding component 50524 that is operable for and/or is otherwise included in changing the protocol address to include a path node identifier of the first path node, wherein the changed protocol address identifies the destination node.

With reference to FIG. 106, a block 501308 illustrates that the method includes sending, based on the changed protocol address, the data to the destination node via the path node. Accordingly, the system in FIG. 98 includes means for sending, based on the changed protocol address, the data to the destination node via the path node. The system includes one or more processors and logic encoded in one or more computer readable media for execution by the one or more processors that when executed is operable for and/or is otherwise included in sending, based on the changed protocol address, the data to the destination node via the path node.

A source-route protocol address may include a sequence of scoped addresses. For example, the arrangement in FIG. 98 includes an out-data component 50526 that is operable for and/or is otherwise included in sending, based on the changed protocol address, the data to the destination node via the path node.

FIG. 98 illustrates an arrangement of components operating in an execution environment 50150 to perform a method illustrated in FIG. 107. The system illustrated by the arrangement includes an in-data component 50520, a routing component 50522, and a forwarding component 50524.

With reference to FIG. 107, a block 501402 illustrates that the method includes receiving data, by a first path node via a first network interface in a first network scope and identified in the first network scope by a first scoped protocol address, wherein the data is sent by a source node to a destination network interface of a destination node identified by a destination protocol address in a header of the data unit and wherein the first scoped protocol address is included in the destination protocol address. Accordingly, the system in FIG. 98 includes means for receiving data, by a first path node via a first network interface in a first network scope and identified in the first network scope by a first scoped protocol address, wherein the data is sent by a source node to a destination network interface of a destination node identified by a destination protocol address in a header of the data unit and wherein the first scoped protocol address is included in the destination protocol address. The system includes one or more processors and logic encoded in one or more computer readable media for execution by the one or more processors that when executed is operable for and/or is otherwise included in receiving data, by a first path node via a first network interface in a first network scope and identified in the first network scope by a first scoped protocol address, wherein the data is sent by a source node to a destination network interface of a destination node identified by a destination protocol address in a header of the data unit and wherein the first scoped protocol address is included in the destination protocol address.

For example, the arrangement in FIG. 98 includes an in-data component 50520 that is operable for and/or is otherwise included in receiving data, by a first path node via a first network interface in a first network scope and identified in the first network scope by a first scoped protocol address, wherein the data is sent by a source node to a destination network interface of a destination node identified by a destination protocol address in a header of the data unit and wherein the first scoped protocol address is included in the destination protocol address.

With reference to FIG. 107, a block 501404 illustrates that the method includes detecting, in the destination protocol address, a second scoped protocol address that in a second network scope identifies a second network interface in a network path communicatively coupling the first path node and the destination node via the destination network interface. Accordingly, the system in FIG. 98 includes means for detecting, in the destination protocol address, a second scoped protocol address that in a second network scope identifies a second network interface in a network path communicatively coupling the first path node and the destination node via the destination network interface. The system includes one or more processors and logic encoded in one or more computer readable media for execution by the one or more processors that when executed is operable for and/or is otherwise included in detecting, in the destination protocol address, a second scoped protocol address that in a second network scope identifies a second network interface in a network path communicatively coupling the first path node and the destination node via the destination network interface.

For example, the arrangement in FIG. 98 includes a routing component 50522 that is operable for and/or is otherwise included in detecting, in the destination protocol address, a second scoped protocol address that in a second network scope identifies a second network interface in a network path communicatively coupling the first path node and the destination node via the destination network interface.

With reference to FIG. 107, a block 501406 illustrates that the method includes sending, in a data unit of the network protocol, the received data for delivery to the second path node via the second network interface identified by the second scoped protocol address. Accordingly, the system in FIG. 98 includes means for transmitting, in a data unit of the network protocol, the received data for delivery to the second path node via the second network interface identified by the second scoped protocol address. The system includes one or more processors and logic encoded in one or more computer readable media for execution by the one or more processors that when executed is operable for and/or is otherwise included in transmitting, in a data unit of the network protocol, the received data for delivery to the second path node via the second network interface identified by the second scoped protocol address.

For example, the arrangement in FIG. 98 includes a forwarding component 50524 that is operable for and/or is otherwise included in transmitting, in a data unit of the network protocol, the received data for delivery to the second path node via the second network interface identified by the second scoped protocol address.

As described above, a route may be changed while data is in transit from a source node to a destination node. FIG. 97B illustrates an arrangement of components operating in an execution environment 50401*b* to perform a method illustrated in FIG. 108. The system illustrated by the arrangement includes an address space director component 50414*b*, a path composer component 50418*b*, a path detector component 50412*b*, and an ASD communication component 431*b* or an agent handler component 50418*b*.

With reference to FIG. 108, a block 501502 illustrates that the method includes receiving a first protocol address that identifies a first route communicatively coupling a first node and second node, wherein the first protocol address for the network protocol at least one of identifies the first node to the second node and identifies the second node to the first node. Accordingly, the system in FIG. 97B includes means for receiving a first protocol address that identifies a first route communicatively coupling a first node and second node, wherein the first protocol address for the network protocol at least one of identifies the first node to the second node and identifies the second node to the first node. The system includes one or more processors and logic encoded in one or more computer readable media for execution by the one or more processors that when executed is operable for and/or is otherwise included in receiving a first protocol address that identifies a first route communicatively coupling a first node and second node, wherein the first protocol address for the network protocol at least one of identifies the first node to the second node and identifies the second node to the first node.

For example, the arrangement in FIG. 97B includes an address space director component 50414*b* that is operable for and/or is otherwise included in receiving a first protocol address that identifies a first route communicatively coupling a first node and second node, wherein the first protocol address for the network protocol at least one of identifies the first node to the second node and identifies the second node to the first node.

With reference to FIG. 108, a block 501504 illustrates that the method includes receiving a routing criterion. First and third node can be gateways. Accordingly, the system in FIG. 97B includes means for receiving a routing criterion. First and third node can be gateways. The system includes one or more processors and logic encoded in one or more computer readable media for execution by the one or more processors that when executed is operable for and/or is otherwise included in receiving a routing criterion.

For example, the arrangement in FIG. 97B includes a path composed component 50418*b* that is operable for and/or is otherwise included in receiving a routing criterion. The routing criterion may include and/or otherwise may be based on a policy and/or attribute relating to at least one of a quality of service, security, a geo-space, and the like.

With reference to FIG. 108, a block 501506 illustrates that the method includes determining, based on the response, that the route meets the routing criterion. Accordingly, the system in FIG. 97B includes means for determining, based on the response, that the route meets the routing criterion. The system includes one or more processors and logic encoded in one or more computer readable media for execution by the one or more processors that when executed is operable for and/or is otherwise included in determining, based on the response, that the route meets the routing criterion.

For example, the arrangement in FIG. 97B includes a path detector component 50412*b* that is operable for and/or is otherwise included in determining, based on the response, that the route meets the routing criterion.

With reference to FIG. 108, a block 501508 illustrates that the method includes sending a second protocol address that identifies a second route different than the first route and that communicatively couples the first node and the second node, wherein the second protocol address for the network protocol at least one of identifies the first node to the second node and identifies the second node to the first node. Accordingly, the system in FIG. 97B includes means for sending a second protocol address that identifies a second route different than the first route and that communicatively couples the first node and the second node, wherein the second protocol address for the network protocol at least one of identifies the first node to the second node and identifies the second node to the first node. The system includes one or more processors and logic encoded in one or more computer readable media for execution by the one or more processors that when executed is operable for and/or is otherwise included in sending a second protocol address that identifies a second route different than the first route and that communicatively couples the first node and the second node, wherein the second protocol address for the network protocol at least one of identifies the first node to the second node and identifies the second node to the first node.

For example, the arrangement in FIG. 97B includes an ASD communication component 431*b* and an agent handler component 50418*b* each of which is operable for and/or is otherwise included in sending a second protocol address that identifies a second route different than the first route and that communicatively couples the first node and the second node, wherein the second protocol address for the network protocol at least one of identifies the first node to the second node and identifies the second node to the first node.

FIG. 97A illustrates an arrangement of components operating in an execution environment 50401*a* to perform a method illustrated in FIG. 109. The system illustrated by the arrangement includes an address space component 50402*a*, an ASD agent component 421*a*, and an endpoint-out component 50408*a* as well as an endpoint-in component 50410*a*.

With reference to FIG. 109, a block 501602 illustrates that the method includes receiving, by a first node, a first protocol address that identifies a route that includes a second node, wherein the first protocol address for the network protocol at least one of identifies the first node to a third node and identifies the third node to the first node. Accordingly, the system in FIG. 97A includes means for receiving, by a first node, a first protocol address that identifies a route that includes a second node, wherein the first protocol address for the network protocol at least one of identifies the first node to a third node and identifies the third node to the first node. For example, the arrangement in FIG. 97A includes an address space component 50402*a* that is operable for and/or is otherwise included in receiving, by a first node, a first protocol address that identifies a route that includes a second node, wherein the first protocol address for the network protocol at least one of identifies the first node to a third node and identifies the third node to the first node. The system includes one or more processors and logic encoded in one or more computer readable media for execution by the one or more processors that when executed is operable for and/or is otherwise included in receiving, by a first node, a first protocol address that identifies a route that includes a second node, wherein the first protocol address for the network protocol at least one of identifies the first node to a third node and identifies the third node to the first node.

With reference to FIG. 109, a block 501604 illustrates that the method includes sending a message, by the first node to a topology service, to determine whether the route meets a routing criterion. Accordingly, the system in FIG. 97A includes means for sending a message, by the first node to a topology service, to determine whether the route meets a routing criterion. The system Accordingly, the system in FIG. 97A includes one or more processors and logic encoded in one or more computer readable media for execution by the one or more processors that when executed is operable for and/or is otherwise included in sending a message, by the first node to a topology service, to determine whether the route meets a routing criterion.

For example, the arrangement in FIG. 97A includes an ASD agent component 421*a* that is operable for and/or is otherwise included in sending a message, by the first node to a topology service, to determine whether the route meets a routing criterion.

With reference to FIG. 109, a block 501606 illustrates that the method includes receiving, from the topology service by the first node, a response that indicates the route meets the routing criterion. Accordingly, the system in FIG. 97A includes means for receiving, from the topology service by the first node, a response that indicates the route meets the routing criterion. The system includes one or more processors and logic encoded in one or more computer readable media for execution by the one or more processors that when executed is operable for and/or is otherwise included in receiving, from the topology service by the first node, a response that indicates the route meets the routing criterion.

For example, the arrangement in FIG. 97A includes an ASD agent component 421*a* that is operable for and/or is otherwise included in receiving, from the topology service by the first node, a response that indicates the route meets the routing criterion.

With reference to FIG. 109, a block 501608 illustrates that the method includes communicating, based on the first protocol address via the second node, by first node with the third node. Accordingly, the system in FIG. 97A includes means for communicating, based on the first protocol address via the second node, by first node with the third node. The system includes one or more processors and logic encoded in one or more computer readable media for execution by the one or more processors that when executed is operable for and/or is otherwise included in communicating, based on the first protocol address via the second node, by first node with the third node.

For example, the arrangement in FIG. 97A includes an endpoint-out component 50408*a* and an endpoint-in component 50410*a* each of which is operable for and/or is otherwise included in communicating, based on the first protocol address via the second node, by first node with the third node.

To verify that source-route protocol address, a first node and a second node may communicate a source-route protocol address in a data unit of a network protocol addressed with a protocol address that is not a source-route protocol address. Such an exchange may aid in preventing address spoofing. FIG. 97A illustrates an arrangement of components operating in an execution environment 50401*a* to perform a method illustrated in FIG. 110. The system illustrated by the arrangement includes an endpoint-in component 50410*a*2, an address space component 50402*a*, and an endpoint-out component 50408*a*.

With reference to FIG. 110, a block 501702 illustrates that the method includes communicating a source-route protocol address by a first end node via a data unit of a network protocol sent to a second end node identified by an address field of the data unit that does not identify the source-route protocol address, wherein the address field at least one of identifies a source protocol address that identifies one of the first end node and the second end node as a source node for the message and identifies a destination protocol address that identifies the other one of the first end node and the second end node as a destination node for the message. Accordingly, the system in FIG. 97A includes means for communicating a source-route protocol address by a first end node via a data unit of a network protocol sent to a second end node identified by an address field of the data unit that does not identify the source-route protocol address, wherein the address field at least one of identifies a source protocol address that identifies one of the first end node and the second end node as a source node for the message and identifies a destination protocol address that identifies the other one of the first end node and the second end node as a destination node for the message. The system includes one or more processors and logic encoded in one or more computer readable media for execution by the one or more processors that when executed is operable for and/or is otherwise included in communicating a source-route protocol address by a first end node via a data unit of a network protocol sent to a second end node identified by an address field of the data unit that does not identify the source-route protocol address, wherein the address field at least one of identifies a source protocol address that identifies one of the first end node and the second end node as a source node for the message and identifies a destination protocol address that identifies the other one of the first end node and the second end node as a destination node for the message.

For example, the arrangement in FIG. 97A includes an endpoint-out component 50408*a* and an endpoint-in component 50410*a* each of which is operable for and/or is otherwise included in communicating a source-route protocol address by a first end node via a data unit of a network protocol sent to a second end node identified by an address field of the data unit that does not identify the source-route protocol address, wherein the address field at least one of identifies a source protocol address that identifies one of the first end node and the second end node as a source node for the message and identifies a destination protocol address that identifies the other one of the first end node and the second end node as a destination node for the message.

With reference to FIG. 110, a block 501704 illustrates that the method includes determining, based on at least one of the source protocol address and the destination protocol address, that the source-route protocol address identifies at least one of the first end node and the second end node, wherein the source-route protocol address includes an identifier of a first path node for communicating between the first end node and the second end node. Accordingly, the system in FIG. 97A includes means for determining, based on at least one of the source protocol address and the destination protocol address, that the source-route protocol address identifies at least one of the first end node and the second end node, wherein the source-route protocol address includes an identifier of a first path node for communicating between the first end node and the second end node. The system includes one or more processors and logic encoded in one or more computer readable media for execution by the one or more processors that when executed is operable for and/or is otherwise included in determining, based on at least one of the source protocol address and the destination protocol address, that the source-route protocol address identifies at least one of the first end node and the second end node, wherein the source-route protocol address includes an identifier of a first path node for communicating between the first end node and the second end node.

For example, the arrangement in FIG. 97A includes an address space component 50402*a* that is operable for and/or is otherwise included in determining, based on at least one of the source protocol address and the destination protocol address, at least one of that an end node identified by the source-route protocol address is the source node and that an end node identified by the source-route protocol address is the destination node, wherein the source-route protocol address includes an identifier of a first path node for communicating between the first end node and the second end node.

With reference to FIG. 110, a block 501706 illustrates that the method includes at least one of sending, by the first end node via the first path node to the second end node identified by the source-route protocol address in an address field of a first data unit, of the network protocol, data via the first data unit and receiving, from the second end node via the first path node by first end node identified by the source-route protocol address in an address field of a second data unit of the network protocol, data via the second data unit. Accordingly, the system in FIG. 97A includes means for at least one of sending, by the first end node via the first path node to the second end node identified by the source-route protocol address in an address field of a first data unit, of the network protocol, data via the first data unit and receiving, from the second end node via the first path node by first end node identified by the source-route protocol address in an address field of a second data unit of the network protocol, data via the second data unit. The system includes one or more processors and logic encoded in one or more computer readable media for execution by the one or more processors that when executed is operable for and/or is otherwise included in at least one of sending, by the first end node via the first path node to the second end node identified by the source-route protocol address in an address field of a first data unit, of the network protocol, data via the first data unit and receiving, from the second end node via the first path node by first end node identified by the source-route protocol address in an address field of a second data unit of the network protocol, data via the second data unit.

For example, the arrangement in FIG. 97A includes an endpoint-out component 50408*a* and an endpoint-in component 50410*a* each of which is operable for and/or is otherwise included in at least one of sending, by the first end node via the first path node to the second end node identified by the source-route protocol address in an address field of a first data unit, of the network protocol, data via the first data unit and receiving, from the second end node via the first path node by first end node identified by the source-route protocol address in an address field of a second data unit of the network protocol, data via the second data unit.

FIG. 97A illustrates an arrangement of components operating in an execution environment 50401*a* to perform a method illustrated in FIG. 111. The system illustrated by the arrangement includes an endpoint-out component 50408*a* and an endpoint-in component 50410*a*.

With reference to FIG. 111, a block 501802 illustrates that the method includes sending, by a first node to a second node, data in a payload of a first data unit of a network protocol, wherein the second node is identified by a destination address field of the first data unit. Accordingly, the system in FIG. 97A includes means for sending, by a first node to a second node, data in a payload of a first data unit of a network protocol, wherein the second node is identified by a destination address field of the first data unit. The system includes one or more processors and logic encoded in one or more computer readable media for execution by the one or more processors that when executed is operable for and/or is otherwise included in sending, by a first node to a second node, data in a payload of a first data unit of a network protocol, wherein the second node is identified by a destination address field of the first data unit.

For example, the arrangement in FIG. 97A includes an endpoint-out component 50408*a* that is operable for and/or is otherwise included in sending, by a first node to a second node, data in a payload of a first data unit of a network protocol, wherein the second node is identified by a destination address field of the first data unit. The data may be sent via a network path determined after the sending described in block 501802 or the payload may be sent via a network path and the destination address field does not include a protocol address of any node in the network other than the second node.

With reference to FIG. 111, a block 501804 illustrates that the method includes receiving, in an address field of a second data unit of the network protocol, a protocol address that at least one of identifies the second node to the first node and identifies the first node to the second node. Accordingly, the system in FIG. 97A includes means for receiving, in an address field of a second data unit of the network protocol, a protocol address that at least one of identifies the second node to the first node and identifies the first node to the second node. The system includes one or more processors and logic encoded in one or more computer readable media for execution by the one or more processors that when executed is operable for and/or is otherwise included in receiving, in an address field of a second data unit of the network protocol, a protocol address that at least one of identifies the second node to the first node and identifies the first node to the second node.

For example, the arrangement in FIG. 97A includes an endpoint-in component 50410*a* that is operable for and/or is otherwise included in receiving, in an address field of a second data unit of the network protocol, a protocol address that at least one of identifies the second node to the first node and identifies the first node to the second node.

With reference to FIG. 111, a block 501806 illustrates that the method includes at least one of sending, by the first node to the second node, data in a third data unit of the network protocol, wherein the third data unit includes the first protocol address that identifies a first network path that includes the first node and a first path node as path end nodes and that identifies a second network path that includes the first path node and the second node as path end nodes. Accordingly, the system in FIG. 97A includes means for at least one of sending, by the first node to the second node, data in a third data unit of the network protocol, wherein the third data unit includes the first protocol address that identifies a first network path that includes the first node and a first path node as path end nodes and that identifies a second network path that includes the first path node and the second node as path end nodes. The system includes one or more processors and logic encoded in one or more computer readable media for execution by the one or more processors that when executed is operable for and/or is otherwise included in at least one of sending, by the first node to the second node, data in a third data unit of the network protocol, wherein the third data unit includes the first protocol address that identifies a first network path that includes the first node and a first path node as path end nodes and that identifies a second network path that includes the first path node and the second node as path end nodes.

For example, the arrangement in FIG. 97A includes an endpoint-out component 50410*a* that is operable for and/or is otherwise included sending, by the first node to the second node, data in a third data unit of the network protocol, wherein the third data unit includes the first protocol address that identifies a first network path that includes the first node and a first path node as path end nodes and that identifies a second network path that includes the first path node and the second node as path end nodes.

FIG. 97B illustrates an arrangement of components operating in an execution environment 50401*b* to perform a method illustrated in FIG. 112. The system illustrated by the arrangement includes an ASD communications component 431*b*2, an address space director component 50414*b*, a path composer component 50418*b*8, and an agent handler component 50416*b*.

With reference to FIG. 112, a block 501902 illustrates that the method includes identifying a first-third protocol address, wherein the first-third protocol address at least one of identifies a first node to a third and identifies the third node to the first node. Accordingly, the system in FIG. 97B includes means for identifying a first-third protocol address, wherein the first-third protocol address at least one of identifies a first node to a third and identifies the third node to the first node. The system includes one or more processors and logic encoded in one or more computer readable media for execution by the one or more processors that when executed is operable for and/or is otherwise included in identifying a first-third protocol address, wherein the first-third protocol address at least one of identifies a first node to a third and identifies the third node to the first node.

For example, the arrangement in FIG. 97B includes an ASD communications component 431*b*2 that is operable for and/or is otherwise included in identifying a first-third protocol address, wherein the first-third protocol address at least one of identifies a first node to a third and identifies the third node to the first node.

With reference to FIG. 112, a block 501904 illustrates that the method includes identifying a second-third protocol address, wherein the second-third protocol address at least one of identifies a second node to the third and identifies the third node to the second node. Accordingly, the system in FIG. 97B includes means for identifying a second-third protocol address, wherein the second-third protocol address at least one of identifies a second node to the third and identifies the third node to the second node. The system includes one or more processors and logic encoded in one or more computer readable media for execution by the one or more processors that when executed is operable for and/or is otherwise included in identifying a second-third protocol address, wherein the second-third protocol address at least one of identifies a second node to the third and identifies the third node to the second node.

For example, the arrangement in FIG. 97B includes an address space director component 50414*b* that is operable for and/or is otherwise included in identifying a second-third protocol address, wherein the second-third protocol address at least one of identifies a second node to the third and identifies the third node to the second node.

With reference to FIG. 112, a block 501906 illustrates that the method includes determining, based on the first-third protocol address and on the first-third protocol address, wherein the first-second protocol address at least one of identifies the first node to the second node and identifies the second node to the first node. Accordingly, the system in FIG. 97B includes means for determining, based on the first-third protocol address and on the first-third protocol address, wherein the first-second protocol address at least one of identifies the first node to the second node and identifies the second node to the first node. The system includes one or more processors and logic encoded in one or more computer readable media for execution by the one or more processors that when executed is operable for and/or is otherwise included in determining, based on the first-third protocol address and on the first-third protocol address, wherein the first-second protocol address at least one of identifies the first node to the second node and identifies the second node to the first node.

For example, the arrangement in FIG. 97B includes a path composer component 50418*b* that is operable for and/or is otherwise included in determining, based on the first-third protocol address and on the first-third protocol address, wherein the first-second protocol address at least one of identifies the first node to the second node and identifies the second node to the first node.

FIG. 98 illustrates an arrangement of components operating in an execution environment 50150 to perform a method illustrated in FIG. 113. The system illustrated by the arrangement includes an in-data component 50520, a routing component 50522, and an out-data component 50526.

With reference to FIG. 113, a block 502002 illustrates that the method includes receiving, by a path node, a data unit, of network a protocol, that includes data sent from a source node for delivery to a destination node identified by a first protocol address in an address field of the data unit, wherein the protocol address does not include an identifier of any particular path node that communicatively couples the source node and the destination node. Accordingly, the system in FIG. 98 includes means for receiving, by a path node, a data unit, of network a protocol, that includes data sent from a source node for delivery to a destination node identified by a first protocol address in an address field of the data unit, wherein the protocol address does not include an identifier of any particular path node that communicatively couples the source node and the destination node. The system includes one or more processors and logic encoded in one or more computer readable media for execution by the one or more processors that when executed is operable for and/or is otherwise included in receiving, by a path node, a data unit, of network a protocol, that includes data sent from a source node for delivery to a destination node identified by a first protocol address in an address field of the data unit, wherein the protocol address does not include an identifier of any particular path node that communicatively couples the source node and the destination node.

For example, the arrangement in FIG. 98 includes an in-data component 50520 that is operable for and/or is otherwise included in receiving, by a path node, a data unit, of network a protocol, that includes data sent from a source node for delivery to a destination node identified by a first protocol address in an address field of the data unit, wherein the protocol address does not include an identifier of any particular path node that communicatively couples the source node and the destination node.

With reference to FIG. 113, a block 502004 illustrates that the method includes identifying a first path node identifier that identifies a first path node in a first network path that communicatively couples the relay node and the destination node. Accordingly, the system in FIG. 98 includes means for identifying a first path node identifier that identifies a first path node in a first network path that communicatively couples the relay node and the destination node. The system includes one or more processors and logic encoded in one or more computer readable media for execution by the one or more processors that when executed is operable for and/or is otherwise included in identifying a first path node identifier that identifies a first path node in a first network path that communicatively couples the relay node and the destination node.

For example, the arrangement in FIG. 98 includes a routing component 50522 that is operable for and/or is otherwise included in identifying a first path node identifier that identifies a first path node in a first path that communicatively couples the relay node and the destination node.

With reference to FIG. 113, a block 502006 illustrates that the method includes sending the data to the destination node via the first path node, wherein the data is sent in a data unit of the network protocol that includes the first path identifier in an address field of the data unit. Accordingly, the system in FIG. 98 includes means for sending the data to the destination node via the first path node, wherein the data is sent in a data unit of the network protocol that includes the first path identifier in an address field of the data unit. The system includes one or more processors and logic encoded in one or more computer readable media for execution by the one or more processors that when executed is operable for and/or is otherwise included in sending the data to the destination node via the first path node, wherein the data is sent in a data unit of the network protocol that includes the first path identifier in an address field of the data unit.

For example, the arrangement in FIG. 98 includes an out-data component 50526 that is operable for and/or is otherwise included in sending the data to the destination node via the first path node, wherein the data is sent in a data unit of the network protocol that includes the first path identifier in an address field of the data unit.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that operate to perform the functionality described herein and may be implemented in software, hardware, or a combination of the two. While at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a software component in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. By way of example, and not limitation, computer readable media may comprise computer storage media and communication media. Computer storage median includes volatile and nonvolatile, removable and non-removable media implemented in any method or technology for storage of information such as computer readable instructions, data structures, software components or other data. Computer storage median includes, but is not limited to, Random Access Memory (RAM), Read Only Memory (ROM); Electrically Erasable Programmable Read Only Memory (EEPROM); flash memory or other memory technology; portable computer diskette; Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by an execution environment.

Communication media typically embodies computer readable instructions, data structures, software components, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication median includes wired media such as a wired network or direct-wired connection, and wireless media such as acoustic, RF, infrared and other wireless media. Combinations of any of the above should also be included within the scope of computer readable media.

Thus, the subject matter described herein may be embodied in many different forms, and all such forms are contemplated to be within the scope of what is claimed. It will be understood that various details may be changed without departing from the scope of the claimed subject matter.

The use of the terms "a" and "a" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The use of "including", "comprising", "having", and variations thereof are meant to encompass the items listed thereafter and equivalents thereof as well as additional items and equivalents thereof. Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided to", "received from", "identified to", "interoperated" and similar terms and their variants.

As used herein, any reference to an entity "in" an association is equivalent to describing the entity as "included in and/or identified by" the association, unless explicitly indicated otherwise.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety unless otherwise indicated. In case of conflict, the present disclosure, including definitions, will control. In addition, the materials, methods, and examples are illustrative only and not intended to be limiting.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

An exemplary device included in an execution environment that may be programmed, adapted, modified, and/or otherwise configured according to the subject matter is illustrated in FIG. 114. FIG. 114 illustrates a hardware device 60100 included in an execution environment 60102. FIG. 114 illustrates that execution environment 60102 includes a processor 60104, such as one or more microprocessors; a physical processor memory 60106 including storage locations identified by addresses in a physical memory address space of processor 60104; a persistent secondary storage 60108, such as one or more hard drives and/or flash storage media; an input device adapter 60110, such as a key or keypad hardware, a keyboard adapter, and/or a mouse adapter; an output device adapter 60112, such as a display and/or an audio adapter to present information to a user; a network interface component, illustrated by a network interface adapter 60114, to communicate via a network such as a LAN and/or WAN; and a mechanism that operatively couples elements 60104-60114, illustrated as a bus 60116. Elements 60104-60114 may be operatively coupled by various means. Bus 60116 may comprise any type of bus architecture, including a memory bus, a peripheral bus, a local bus, and/or a switching fabric.

Processor 60104 may access instructions and data via one or more memory address spaces in addition to the physical memory address space. A memory address space includes addresses identifying locations in a processor memory. The addresses in a memory address space are included in defining a processor memory. Processor 60104 may have more than one processor memory. Thus, processor 60104 may have more than one memory address space. Processor 60104 may access a location in a processor memory by processing an address identifying the location. The processed address may be identified by an operand of an instruction and/or may be identified by a register and/or other portion of processor 60104.

FIG. 114 illustrates a virtual processor memory 60118 spanning at least part of physical processor memory 60106 and may span at least part of persistent secondary storage 60108. Virtual memory addresses in a memory address space may be mapped to physical memory addresses identifying locations in physical processor memory 60106. Both physical processor memory 60106 and virtual processor memory 60118 are processor memory, as defined above.

Physical processor memory 60106 may include various types of memory technologies. Exemplary memory technologies include static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data output RAM (EDO RAM), Extended Data output DRAM (EDO DRAM), Burst Extended Data output DRAM (BEDO DRAM), Enhanced DRAM (EDRAM), synchronous DRAM (SDRAM), JEDEC SRAM, PC 60100 SDRAM, Double Data Rate SDRAM (DDR SDRAM), Enhanced SDRAM (ESDRAM), SyncLink DRAM (SLDRAM), Ferroelectric RAM (FRAM), RAMBUS DRAM (RDRAM) Direct DRAM (DRDRAM), and/or XDRTM DRAM. Physical processor memory 60106 may include volatile memory as illustrated in the previous sentence and/or may include non-volatile memory such as non-volatile flash RAM (NVRAM) and/or ROM.

Persistent secondary storage 60108 may include one or more flash memory storage devices, one or more hard disk drives, one or more magnetic disk drives, and/or one or more optical disk drives. Persistent secondary storage may include a removable data storage medium. The drives and their associated computer readable media provide volatile and/or nonvolatile storage for computer-executable instructions, data structures, software components, and other data.

Execution environment 60102 may include software components stored in persistent secondary storage 60108, in remote storage accessible via a network, and/or in a processor memory. FIG. 114 illustrates execution environment 60102 including an operating system 60120, one or more applications 60122, and other software components and/or data components illustrated by other libraries and subsystems 60124. In an aspect, some or all software components may be stored in locations accessible to processor 60104 in a shared memory address space shared by the software components. The software components accessed via the shared memory address space may be stored in a shared processor memory defined by the shared memory address space. In another aspect, a first software component may be stored in one or more locations accessed by processor 60104 in a first address space and a second software component may be stored in one or more locations accessed by processor 60104 in a second address space. The first software component is stored in a first processor memory defined by the first address space and the second software component is stored in a second processor memory defined by the second address space.

Execution environment 60102 may receive user-provided information via one or more input devices illustrated by an input device 60128. Input device 60128 provides input information to other components in execution environment 60102 via input device adapter 60110. Execution environment 60102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 60128 included in execution environment 60102 may be included in device 60100 as FIG. 114 illustrates or may be external (not shown) to device 60100. Execution environment 60102 may include one or more internal and/or external input devices. External input devices may be connected to device 60100 via corresponding network interfaces such as a serial port, a parallel port, and/or a universal serial bus (USB) port. Input device adapter 60110 may receive input and provide a representation to bus 60116 to be received by processor 60104, physical processor memory 60106, and/or other components included in execution environment 60102.

An output device 60130 in FIG. 114 exemplifies one or more output devices that may be included in and/or that may be external to and operatively coupled to device 60100. For example, output device 60130 is illustrated connected to bus 60116 via output device adapter 60112. Output device 60130 may be a display device. Exemplary display devices include liquid crystal displays (LCDs), light emitting diode (LED) displays, and projectors. Output device 60130 presents output of execution environment 60102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. FIG. 114 illustrates network interface adapter (NIA) 60114 as a network interface component included in execution environment 60102 to operatively couple device 60100 to a network. A network interface component includes a network interface hardware (NIH) component and optionally a network interface software (NIS) component. Exemplary network interface components include network interface controllers, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., AMPS, TDMA, CDMA, GSM, GPRS UMTS, and/or PCS network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

FIG. 116 illustrates an arrangement of components in a system that operates in an execution environment, such as execution environment 60102 in FIG. 114. The arrangement of components in the system operates to perform the method illustrated in FIG. 115. The system illustrated includes a routing component 60302, a net-monitor component 60304, and a net-manager component 60306. A suitable execution environment includes a processor, such as processor 60104, to process an instruction in at least one of a routing component, a net-monitor component, a routing component, and a net-manager component.

Some components, illustrated in the drawings are identified by numbers with an alphanumeric suffix. A component may be referred to generically in the singular or the plural by dropping a suffix of a portion thereof of the component's identifier. For example, execution environments; such as execution environment 60401*a*, execution environment 60401*b*, and their adaptations and analogs; are referred to herein generically as an execution environment 60401 or execution environments 60401 when describing more than one. Other components identified with an alphanumeric suffix may be referred to generically or as a group in a similar manner.

Some or all of the exemplary components illustrated in FIG. 116 may perform the method illustrated in FIG. 115 in a number of execution environments. FIG. 117A is block diagrams illustrating the components of FIG. 116 and/or analogs of the components of FIG. 116 respectively adapted for operation in an execution environment 60401*a* that includes and/or otherwise is provided by one or more nodes. FIG. 117B illustrates an execution environment 60401*b* which hosts an address space directory (ASD) service 60403*b*. Execution environment 60401*b* may be an instance and/or analog of execution environment 60401*a*. FIG. 118 illustrates an execution environment 60501 for hosting an arrangement of components for relaying data units of a network protocol via a network.

FIG. 114 illustrates components of an exemplary device that may at least partially provide and/or otherwise be included in an execution environment. The components illustrated in FIGS. 117A-B, and 118 may be included in or otherwise combined with the components of FIG. 114 to create a variety of arrangements of components according to the subject matter described herein. Those skilled in the art will understand that other execution environments in addition to the various adaptations, analogs, and instances of the execution environments described herein are suitable for hosting an adaptation of the arrangement in FIG. 116.

FIGS. 119A-C respectively illustrate networks 60600 including nodes that in various aspects may include adaptations, analogs, and instances of the execution environments 60401, illustrated in FIG. 117A-B, as well as nodes that that in various aspects may include adaptations, analogs, and instances of execution environment 60501, illustrated in FIG. 118. The various illustrated nodes are operatively coupled via network interface components to the respective networks 60600 in FIGS. 119A-C. While any node may perform the method illustrated in FIG. 115, for ease of illustration, each of FIGS. 119A-C includes nodes 60602 for describing adaptations of the arrangement in FIG. 116 performing different aspects of the subject matter described herein. An adaptation, analog, and/or instance of execution environment 60401*a*, in FIG. 117A, may be described as being included in and/or operating in a node 60602 in describing some aspects of the subject matter of the present disclosure. In describing other aspects, a node 60602 may be described as including and/or otherwise providing an adaptation, analog, and/or instance of execution environment 60401*b* in FIG. 117B. An adaptation, analog, and/or instance of execution environment 60501, in FIG. 118, may be described as being included in and/or operating in a path node 60604, in FIGS. 119A-C, to describe some aspects of the subject matter of the present disclosure. Exemplary path nodes 60604 include a router, a gateway, a switch, a virtual private network concentrator, a modem, a wireless access point, a bridge, a hub, a repeater, a firewall, a proxy server, an application for relaying messages, and the like.

FIG. 117A illustrates an execution environment 60401*a* hosting a program, illustrated by an application 60403*a* that sends and/or receives data via a network stack 60405*a*. FIG. 117B illustrates an execution environment 60401*b* including an address space directory (ASD) service 60407*b*, that sends and receives data by interoperating directly and/or indirectly with one or more components of a network stack 60405*b*. The network stacks 60405 in FIG. 117A and in FIG. 117B may be structured according to a layered architecture or model. FIG. 117A illustrates components that may be included in a network stack having a layered structure. The network stack 60405*b* may be structured analogously or may be structured in another manner known to those skilled in the art. Some components illustrated in the network stack 60405*a* correspond to components of the layered architecture specified by the Open System Interconnection (OSI) model, known to those skilled in the art. For example, network stacks 60405 may comply with the specifications for protocols included in the TCP/IP protocol suite. The OSI model specifies a seven-layer stack. The TCP/IP protocol suite may be mapped to layers three and four of the seven layers. Those skilled in the art will understand that fewer or more layers may be included in various adaptations, analogs, and/or instances of execution environments 60401 illustrated in FIG. 117A and in FIG. 117B, and in aspects described herein as well as other execution environments suitable for hosting an adaptation of the arrangement of components illustrated in FIG. 116.

An application, such as an application 60403*a* and/or an ASD service 60407*b*, operating in respective nodes 60602, may exchange data with another node 60602 by interoperating with one or more components of a corresponding network stack 60405. In FIG. 117A, an application 60403*a* may interoperate with a sockets component 60409*a* to access a protocol endpoint, via a socket, to send data via one or more data units to and/or to receive data via one or more data units from another node 60602. The application may specify a preferred and/or a required attribute of a network protocol to the sockets component 60409*a* to open a specified type of protocol endpoint of a network protocol supporting the specified attribute.

FIG. 117A illustrates a sockets component 60409*a* operatively coupled to a connectionless component 60411*a* supporting an unreliable transport layer protocol where delivery of data is not guaranteed and a connection-oriented component 60413*a* configured to support a reliable transport layer protocol designed to guarantee data delivery or to otherwise notify the application of a delivery failure. The user datagram protocol (UDP) in the TCP/IP protocol suite is currently the most widely used connectionless transport layer protocol. The most widely used connection-oriented transport layer protocol currently in use is the transmission control protocol (the TCP) also included in the TCP/IP protocol suite.

Transport layer protocols supported by connectionless component 60411*a* and by connection-oriented component 60413*a* generate transport layer data units to include data received from an operatively coupled application to deliver the data via the data units according to a network layer protocol to a transport layer protocol endpoint, such as a socket, in another node 60602. Analogously, data sent via an application in another node via a transport layer component may be received according to the network layer protocol by a compatible transport layer component, such as a connection-oriented component 60413*a* and/or by a connectionless component 60411*a*, to deliver via a socket to an application operating in the execution environment 60401*a* in the receiving other node 60602.

FIG. 117A illustrates a network layer component 60415*a* that delivers data according to a network layer protocol from a source node to a destination node across a link, a LAN, a WAN, and/or an internet, such as the Internet and/or an intranet. A network layer protocol is designed and configured to deliver data across one or more communication links and/or networks between nodes in a network or internet. In FIG. 117A, a network layer component 60415*a* may receive a transport layer data unit from a connection-oriented component 60413*a* or a connectionless component 60411*a*, or data from another component in execution environment 60401*a*. The network layer component 60415*a* may format and/or otherwise package the data in network layer data units. The data units may be sent, via a link layer protocol, to a next node in a network path to a destination node.

One or more link layer protocols may be included in communicatively coupling a first node and a second node via a network path that includes one or more path nodes. In FIG. 117A, a network layer component 60415*a* may provide a network layer data unit as data (i.e. a message) to a component supporting a link layer protocol compatible with exchanging data via a physical data transmission medium coupled to a NIC. A link layer component 60417*a*, in FIG. 117A, illustrates a component in execution environment 60401*a* supporting a link layer protocol. Exemplary link layer protocols include Ethernet, Token-ring, and asynchronous transfer mode (ATM), to name a few. Some or all of a link layer component 60417*a* may be included in a NIC, as illustrated in FIG. 117A by a NIC 60419*a*. Exemplary physical data transmission median include Ethernet cables of various types, co-axial cable, and fiber optic cable, and various media suitable for carrying various types of wireless signals.

With respect to FIG. 117A, a link layer component 60417*a* may receive a network layer data unit for a network layer component 60415*a*. The network layer data unit may be formatted as one or more IP protocol packets from the network layer component 60415*a* supporting the Internet Protocol (IP). The link layer component 60417*a* packages IP packets from network layer component 60415*a* according to the particular link layer protocol supported. The link layer component 60417*a* may include a network layer data unit in one or more link layer data units. Analogously, the link layer component 60417*a* interprets data, received as signals transmitted by the physical medium operatively coupled to the NIC 60419*a*, according to a particular link layer protocol supported to receive network layer data units in one or more link layer data units. The link layer component 60417*a* may strip off link layer specific data and transfer the payload of the link layer data units to the network layer component 60415*a* to process the included network layer data unit.

A network layer component 60415*a* operating in a node 60602, illustrated in FIGS. 119A-C, may communicate with one or more other nodes 60602 over a LAN, a link, and/or a network of networks such as an intranet or the Internet. A network layer component 60415*a* in the node 60602 may receive transport layer data units, for example, formatted as TCP packets from a connection-oriented layer component 60413*a* and/or transport layer data units formatted as UDP packets from a connectionless component 60411*a* illustrated in FIG. 117A. The network layer component 60415*a* packages transport layer data units from the connection-oriented component 60413*a* and/or the transport layer data units from the connectionless component 60411*a* into network layer data units, such as IP packets, to transmit across a network 60600 operatively coupled to the node. The network 60600 may be and/or may include an internet.

Analogously, the network layer component 60415*a* operating in a node 60602 may interpret data, received from a link layer component 60417*a*, as IP protocol data and may detect IP packets in the received data. The network layer component 60415*a* may strip off IP layer specific data and transfer the payload of one or more IP packets to the connection-oriented layer component 60413*a* and/or to the connectionless component 60411_a_ to process as transport layer data units according to a particular transport layer protocol.

In addition to the protocols described above, protocols corresponding to layers in the OSI model above the transport layer may be included in communicating via a network. The term "application protocol" as used herein refers to any protocol or combination of protocols that correspond to one or more layers in the OSI reference model above the transport layer. Programs and executables operating in execution environments may communicate via one or more application protocols. Exemplary application protocols include a hypertext transfer protocol (HTTP), various remote procedure call (RPC) protocols, various instant messaging protocol, email protocols, and various presence protocols.

Data exchanged between nodes 60602 in a network 60600 may be exchanged via data units of one or more protocols. Each layer of a network stack may provide a layer specific protocol component. Some protocols, combine services from multiple layers of the OSI model into a single layer such as the Systems Network Architecture (SNA) protocol. Still others may take a hybrid approach. With the advent of software defined networking and flexible protocols such as OpenFlow, new protocols and variations of existing protocols are being introduced and will be introduced that are within the scope of the subject matter of the present disclosure.

A network protocol specifies and/or is otherwise is compatible with one or more address spaces for identifying protocol endpoints for exchanging data. The terms "identifier space" and "address space" are used interchangeably herein. For example, various versions of hypertext transfer protocol (HTTP) specify a format for HTTP uniform resource locators (URL). HTTP specifies a location in a HTTP header that identifies a URL as an identifier or address from the HTTP address space that identifies both a resource and recipient of a HTTP data unit. The transmission control protocol (TCP) specifies a format and vocabulary for a TCP header including a destination protocol endpoint field for including what the TCP refers to as a destination port number that, when combined with a destination protocol address from an IP packet, identifies a transport layer protocol endpoint of a receiver of data included in a TCP data unit. A sending endpoint is similarly identified by a source port number included in a source protocol endpoint field of a TCP data unit and a source protocol address from an IP data unit.

Other exemplary address spaces that identify protocol endpoints in various protocols include an email address space identifying a protocol endpoint for the simple mail transfer protocol (SMTP), a telephone number address space for various telephony protocols, instant message address spaces for various instant message protocols, and media access control (MAC) addresses for various link layer protocols, to name just a few examples.

Since addresses from address spaces at various layers of a network stack are often not suited for remembering and/or identifying by users, an address space of symbolic identifiers or names may be used to provide aliases for addresses in an address space identifying protocol endpoints corresponding to a protocol supported by a layer of a network stack. The domain name space is a well-known identifier space of names for identifying nodes and/or network interfaces as protocol endpoints of the IP protocol in the Internet, private internets, and intranets. The domain name system (DNS) is a collection of domain name system services maintaining databases that associate names from the domain name space with protocol addresses, in particular with IP addresses. The domain name space defines a global name space shared across the Internet.

FIG. 117B illustrates an execution environment 60401_b_ hosting an address space directory (ASD) service 60407_b_, such as a DNS service. The ASD service 60407_b_ is configured to receive a request from an ASD agent component 60421_a_ in FIG. 117A to resolve a symbolic identifier to a protocol address of a protocol endpoint. An application 60403_a_ or other component in an execution environment 60401_a_ may communicate with an ASD service 60407_b_ via an application specific ASD protocol supported by an ASD agent component 60421_a_ illustrated in FIG. 117A and an ASD protocol component 60423_b_ in each of FIGS. 117A-B. A server ASD protocol component 60423_b_ may communicate with other ASD services in other nodes included in an ASD system. Exemplary ASD protocols include the DNS protocol, the lightweight directory access protocol (LDAP), and the X.500 protocol.

In FIG. 118, a data-in component 60520 is included in network layer component 60515 of an execution environment 60501. A path node 60604 in FIGS. 119A-C may include an adaptation and/or analog of the execution environment 60501. Data communicated between a source node and a destination node may be received by a path node 60604 via of a NIC, such as first NIC 60519-114, operatively coupling the path node 60604 to a previous network path including the source node and the path node 60604. A data-in component 60520 may detect one or more network layer protocol data units in data received from the link layer component 60517. For example, the data-in component 60520 may detect one or more IP packets in data received in one or more Ethernet frames. Data-in component 60520 may detect a network layer data unit that includes data from a source node to relay to a destination node identified by a protocol address in the detected network layer data unit as defined by a particular network layer protocol. A network interface component 60519 in a path node 60604 may receive data communicated from a source node via a previous network path included in a network 60600. One or more network paths may exist for receiving the data.

A path node 60604 may receive data from a source node 60602 to transmit the received data to a destination node 60602 via a specified network protocol. For example, a path node 60604 may receive and transmit a data unit at a link layer as performed by an Ethernet bridge and a multiple protocol labeling switch (MPLS). Further, a path node 60604 may receive and transmit a data unit at a network layer as performed by an Internet protocol (IP) router. Still further, a path node 60604 may receive and transmit a data unit at an application layer, as defined above.

Data received from a source node by a path node 60604 may be received via one or more previous path nodes 60604 in one or more hops identified in a destination protocol address. Data may be received by a current path node 60604 from a previous node based on a previous-current protocol address. The previous-current protocol address may be a source-route protocol address that, for the previous node, identifies the current node as described in detail below.

In FIG. 118, a routing component 60522 is illustrated operatively coupled to a network layer component 60515. A routing component 60522 may detect a protocol address of a next node based on a schema for including a protocol address in a data unit of a corresponding network protocol. In another aspect, a protocol address may be detected by a data-in component 60520 that operates to provide some or all of the protocol address to the routing component 60522 to detect a protocol address of a next node.

Whether a protocol address is a source-route protocol address may be determined, by a routing component 60522, by a bit pattern or identifier defined to identify a protocol address type, category, and/or class. The bit pattern or identifier may be located by the routing component 60522 stored in a type bits portion of an IP packet and/or in some other specified location. Those skilled in the art will realize that neither the schemas, which define a format rule(s) and/or a vocabulary rule(s) for a protocol address, described nor the protocols in which their use is described are exhaustive.

FIG. 119B illustrates a network path, as defined above, for transmitting data via a network protocol from a first node **60602*b*1 to a fifth node 60602*b*5 in a network 60600*b* that includes a sequence of nodes including of the first node 60602*b*1, a first path node 60604*b*1, a second path node 60604*b*2, and the fifth node 60602*b*5. In FIG. 119C, a first network path communicatively coupling a seventh node 60602*c*7 and an eighth path node 60604*c*8 includes a first sequence of nodes including the seventh node 60602*c*7, a ninth path node 60604*c*9, and the eighth path node 60604*c*8. The first network path, as FIG. 119C illustrates, is included in a second network path communicatively coupling the seventh node 60602*c*7 and a second node 60602*c*2 that includes a second sequence of nodes including the nodes in the first sequence, a seventh path node 60604*c*7, and the second node 60602*c*2**. A network path may be a physical network path and/or a logical network path based on a particular network protocol defining the protocol endpoints.

FIG. 119B, illustrates a number of network paths and hop paths communicatively coupling a first node **60602*b*1 and a fifth node 60602*b*5 in a network 60600*b*. One hop path illustrated includes a sequence of hops including a first hop 60608*b*1, a sixth hop 60608*b*6, and a ninth hop 60608*b*9. In FIG. 119C, the first network path described above communicatively coupling the seventh node 60602*c*7 and the eighth path node 60604*c*8 includes a first sequence of hops including a first hop 60608*c*1 and a second hop 60608*c*2. The first network path is included in the second network path described above that includes a second sequence of hops including the first sequence of hops, a third hop 60608*c*3, and a fourth hop 60608*c*4**.

In FIG. 119B, the network path described above communicatively coupling the first node **60602*b*1 and the fifth node 60602*b*5 includes a sequence of network interfaces including a network interface in the first path node 60604*b*1 in the first hop 60608*b*1, a network interface in the second path node 60604*b*2 in the sixth hop 60608*b*6, and a network interface in the fifth node 60602*b*5 in the ninth hop 60608*b*9. The network paths, in FIG. 119**C and described above, may analogously be described as a sequence of network interfaces.

Methods, Systems, and Operation Details

With reference to FIG. 115, a block 60202 illustrates that the method includes receiving a first protocol address that, for a network protocol, identifies a second node to a first node, wherein the first protocol address identifies a first path node in a first network path to route data sent via the network protocol from the first node to the second node. Accordingly, a system for changing a protocol address by a network relay includes means for receiving a first protocol address that, for a network protocol, identifies a second node to a first node, wherein the first protocol address identifies a first path node in a first network path to route data sent via the network protocol from the first node to the second node. The system for changing a protocol address by a network relay includes one or more processors and logic encoded in one or more computer readable media for execution by the one or more processors that when executed is operable for and/or is otherwise included in receiving a first protocol address that, for a network protocol, identifies a second node to a first node, wherein the first protocol address identifies a first path node in a first network path to route data sent via the network protocol from the first node to the second node.

For example, the arrangement in FIG. 116 includes a routing component 60302 that is operable for and/or is otherwise included in receiving a first protocol address that, for a network protocol, identifies a second node to a first node, wherein the first protocol address identifies a first path node in a first network path to route data sent via the network protocol from the first node to the second node. FIGS. 117A and 118 illustrate routing components as adaptations and/or analogs of the routing component 60302 in FIG. 116. One or more routing components operate in an execution environment 60401 and/or in an execution environment 60501.

With reference to FIG. 115, a block 60204 illustrates that the method includes detecting at least one of a first attribute of the first network path and a second attribute of a second network path for routing data sent from the first node to the second node, wherein the second network path at least one includes a second path node not included in the first network path and excludes the first path node included in the first network path. Accordingly, a system for changing a protocol address by a network relay includes means for detecting at least one of a first attribute of the first network path and a second attribute of a second network path for routing data sent from the first node to the second node, wherein the second network path at least one includes a second path node not included in the first network path and excludes the first path node included in the first network path. The system for changing a protocol address by a network relay includes one or more processors and logic encoded in one or more computer readable media for execution by the one or more processors that when executed is operable for and/or is otherwise included in detecting at least one of a first attribute of the first network path and a second attribute of a second network path for routing data sent from the first node to the second node, wherein the second network path at least one includes a second path node not included in the first network path and excludes the first path node included in the first network path.

For example, the arrangement in FIG. 116 includes a net-monitor component 60304 that is operable for and/or is otherwise included in detecting at least one of a first attribute of the first network path and a second attribute of a second network path for routing data sent from the first node to the second node, wherein the second network path at least one includes a second path node not included in the first network path and excludes the first path node included in the first network path. FIGS. 117A and 118 illustrate net-monitor components as adaptations and/or analogs of the net-monitor component 60304 in FIG. 116. One or more net-monitor components operate in an execution environment 60401 and/or an execution environment 60501.

In FIG. 115, a block 60206 illustrates that the method includes identifying a second protocol address that identifies the second node, wherein the second protocol address identifies the second network path rather than the first network path by at least one of identifying the second path node and not identifying the first path node. Accordingly, a system for changing a protocol address by a network relay includes means for identifying a second protocol address that identifies the second node, wherein the second protocol address identifies the second network path rather than the first network path by at least one of identifying the second path node and not identifying the first path node. The system for changing a protocol address by a network relay includes one or more processors and logic encoded in one or more computer readable media for execution by the one or more processors that when executed is operable for and/or is otherwise included in identifying a second protocol address that identifies the second node, wherein the second protocol address identifies the second network path rather than the first network path by at least one of identifying the second path node and not identifying the first path node.

For example, the arrangement in FIG. 116 includes a routing component 60306 that is operable for and/or is otherwise included in identifying a second protocol address that identifies the second node, wherein the second protocol address identifies the second network path rather than the first network path by at least one of identifying the second path node and not identifying the first path node. FIGS. 117A and 118 illustrate routing components as adaptations and/or analogs of the routing component 60306 in FIG. 116. One or more routing components operate in an execution environment 60401 and/or in an execution environment 60501.

With reference to FIG. 115, a block 60208 illustrates that the method includes selecting, based on at least one of the first attribute and the second attribute the second protocol address rather than the first protocol address. Accordingly, a system for changing a protocol address by a network relay includes means for selecting, based on at least one of the first attribute and the second attribute the second protocol address rather than the first protocol address. The system for changing a protocol address by a network relay includes one or more processors and logic encoded in one or more computer readable media for execution by the one or more processors that when executed is operable for and/or is otherwise included in selecting, based on at least one of the first attribute and the second attribute the second protocol address rather than the first protocol address.

For example, the arrangement in FIG. 116 includes a net-manager component 60308 that is operable for and/or is otherwise included in selecting, based on at least one of the first attribute and the second attribute the second protocol address rather than the first protocol address. FIGS. 117A and 118 illustrate net-manager components as adaptations and/or analogs of the net-manager component 60308 in FIG. 117A. One or more net-manager components operate in an execution environment 60401 and/or in an execution environment 60501.

With reference to FIG. 115, a block 60210 illustrates that the method includes selecting, based on at least one of the first attribute and the second attribute the second protocol address rather than the first protocol address. Accordingly, a system for changing a protocol address by a network relay includes means for selecting, based on at least one of the first attribute and the second attribute the second protocol address rather than the first protocol address. The system for changing a protocol address by a network relay includes one or more processors and logic encoded in one or more computer readable media for execution by the one or more processors that when executed is operable for and/or is otherwise included in selecting, based on at least one of the first attribute and the second attribute the second protocol address rather than the first protocol address.

For example, the arrangement in FIG. 116 includes a data-out component 60310 that is operable for and/or is otherwise included in sending, based on the second protocol address, the data via a network protocol to the second node. FIGS. 117A and 118 illustrate data-out components as adaptations and/or analogs of the data-out component 60310 in FIG. 117A. One or more data-out components operate in an execution environment 60401 and/or an execution environment 60501.

While the subject matter disclosed herein is applicable to network protocols at various layers, the present disclosure describes embodiments at layer three (i.e. the network layer) and layer two (i.e. the link layer) of the OSI stack. Network protocols at other layers of the OSI stack are within the scope of the subject matter described herein. Examples of network layer protocols that may be modified to support various types of source routing include an Internet Protocol (IP), DECNet outing Protocol (DRP), an Internetwork Packet Exchange (IPX) protocol, an Internet Datagram Protocol (IDP), a VINES Internet Protocol, and a Datagram Delivery Protocol (DDP). Examples of link layer protocols that may be modified to support source routing as described herein include Ethernet protocols, Token-ring protocols, FDDI protocol, and an asynchronous transfer mode (ATM) protocol.

Data to transmit in a payload portion of a data unit of a network protocol may be received from an application process, such as application 60403*a*, operating in an execution environment, such as execution environment 60401*a* in FIG. 117A, of a source node such as various nodes 60602 in FIGS. 119A-C. The data may be received by a protocol layer component, such as network layer component 60415*a*, that operates in the execution environment according to a network protocol.

With respect to FIG. 119A and FIG. 117A, an instance of an execution environment 60401*a* may be included and/or otherwise may be provided by a first node 60602*a*1 in a first region 60606*a*1 including a portion of a network 60600*a*. An in-port component 60429*a* may receive data to transmit to a destination node. An address space component 60414*a* in the first node 60602*a*1 may receive and/or otherwise detect a protocol address from an application 60403*a* and/or one or more of a sockets component 60409*a*, a connection-oriented component 60413*a*, a connectionless component 60411*a*, and an ASD agent component 60421*a*. The protocol address may include and/or otherwise identify a source-route protocol address identifying a route to a destination node. The route identified may be loose route or may be a strict route. Alternatively, an address may identify the destination node without identifying any particular node in a route from the source node to the destination node. An option may be set that indicates that a route is to be recorded, as a source-route protocol address, while the data traverses the network from the source node to the destination node.

Schemas for protocol addresses that may be source-route protocol addresses are illustrated in FIGS. 120A-E and are described below. A protocol address, which may be a source-route protocol address, may be detected by the address space component 60414*a*. The address space component 60414*a* may interoperate with a packet generator component 60408*a*, which may include instructions that when executed by a processor are included in generating and/or storing a representation of the source-route protocol address in a data unit specified according to the network protocol supported by the network layer component 60415*a*. The address space component 60414*a* may interoperate with the packet generator component 60408*a* to include the protocol address in the data unit as specified by the network protocol.

In FIG. 119A, an identifier, "602.602.602.600", identifies a route by identifying a sequence of network interfaces of nodes in a network path communicatively coupling the second node 60602*a*2 and nodes in the first region 60606*a*1. The identifier identifies the second node 60602*a*2 to nodes in the first region 60606*a*1. Exemplary representations are described below with respect to FIGS. 120A-E below.

A packet generator component 60408*a* in an execution environment 60401*a* of the first node 60602*a*1 may include one or more instructions that when performed by the first node 60602*a*1 identifies a protocol address and stores the protocol address in a data unit of the network protocol to identify the first node 60602*a*1 as the source node of the data in the data unit. The protocol address may be a source-route protocol address identifying the source node for one or more other nodes in the network.

An address space component 60414*a* in the first node 60602*a*1 may identify a protocol address that identifies some or all of a route in network 60600*a* to the first node 60602*a*1. The sequence, "601.601.600.603", identifies a route via a sequence of network interfaces in a network path from the second node 60602*a*2 to the first node 60602*a*1 that identifies the first node 60602*a*1. The protocol address may be pre-specified to the first node 60602*a*1 via a user and/or may be determined based on a previous communication with the second node 60602*a*2. The protocol address may be retrieved via a request to an address space directory service, as described in more detail below.

In FIG. 119A, the number '3' may identify a network interface of the first node 60602*a*1 in the scope of the first region 60606*a*1. As the data is transmitted via the network path identified by the protocol address, "602.602.602.600", to the second node 60602*a*2, a protocol address for the first node 60602*a*1 included in one or more data units, included in transmitting the data, may be augmented and/or otherwise updated to provide a source protocol address from which the second node 60602*a*2 may detect and/or may otherwise determine a source-route protocol address that identifies the first node 60602*a*1 in an address space usable by the second node 60602*a*2.

Returning to FIG. 117A and FIG. 119A, an instance of an execution environment 60401*a* may include and/or otherwise may be provided by the third node 60602*a*3 in the network 60600*a*. An address space component 60414*a* in the third node 60602*a*3 may receive and/or otherwise detect a protocol address in a data unit received from another node, such as the second node 60602*a*2 via a NIC 60419*a* and a link layer component 60417*a* operating in the third node 60602*a*3, as described above. The data unit may be received from the link layer component 60417*a* via a data-in component 60412*a* in the network layer component 60415*a*. The data unit may be identified and/or otherwise detected by a packet detector component 60431*a* interoperating with the data-in component 60412*a*.

The packet detector component 60431*a* may detect an address representation in the data unit according to a schema defined by a network layer protocol supported by the network layer component 60415*a*. The protocol address represented may be provided to an address space component 60414*a*. An address space component 60414*a* operating in the third node 60602*a*3 may receive and/or otherwise detect the protocol address via a packet detector component 60431*a*.

The address space component 60414*a* may determine an address space that includes a source-route protocol address identified by the protocol address. For example, the address space component 60414*a* may identify that a protocol address detected in the protocol address is in a third scope-specific address space specific to a third region 60606*a*3 that includes the third node 60602*a*3 in detecting an identifier of a node, such as the second node 60602*a*2, that sent the data in the received data unit.

When the protocol address is detected by the address space component 60414*a*, is not in an address space that is usable for sending data to another node, the address space component 60414*a* may determine a protocol address in a suitable address space as described in more detail below. The address space component 60414*a* may receive a protocol address that identifies the third node 60602*a*3, in a second scope-specific address space of the second node 60602*a*2 that sent the data unit. The address space component 60414*a* may determine a third-second source-route protocol address that, in a third node-specific address space specific to the third node, identifies the second node 60602*a*2. The data in the data unit may be provided by the network layer component 60415*a* to a protocol endpoint identified by a higher layer protocol as described above via an out-port component 60433*a*.

A source-route protocol address may be formatted to be included in data units of an existing network protocol. For example, a schema for a source-route protocol address space may be defined to include an address in the address space in an address field of a header of the IP protocol according to a currently existing specification, such as RFC 791 and/or RFC 3513. While such protocol addresses may have the same or substantially similar rules for valid format and content as those currently in use, the protocol addresses when processed according to the subject matter described herein identify a strict or loose route. For details on the format and vocabularies of current address spaces refer to the appropriate specification. A type bit and/or a pattern of bits in a data unit header may be defined by a network protocol to indicate that a protocol address in the data unit identifies a source route.

FIGS. 120A-E illustrate a number of exemplary address representations 60702 illustrating various address formats and vocabularies for representing protocol addresses that identify a source-route. Various portions of the respective address representations 60702 are illustrated as contiguous, but need not be so in various embodiments according to the subject matter described herein. Each of the types of address representation 60702 shown in FIGS. 120A-E may be included in a destination protocol address portion and/or a source protocol address portion of an IPv4 data unit header and/or an IPv6 data unit header. Further, data units of various link layer protocols may be adapted to include analogous source-route protocol addresses for transmitting via one or more link layer networks. A protocol address may be identified as a source-route address protocol address by a bit pattern or identifier defined to identify a protocol address as a source-route protocol address. The bit pattern or identifier may be stored in a type bits portion of a data unit, such as an IP packet, and/or in some other specified location. The bit pattern may identify whether a protocol address identifies a strict source route or a loose source route. In some aspects, whether a source-route protocol address identifies a strict route or a loose route may be determined based on the source-route protocol address itself in addition to and/or instead of based on another field in a data unit.

FIG. 120A illustrates an address representation 60702*a* that may be included in a data unit or packet of a network layer protocol and/or may be used to transmit data via packets of a link layer protocol (e.g. via one or more link layer switches). An address representation 60702*a* may identify a source-route protocol address that includes one or more source-route protocol addresses, such as one or more scope-specific addresses for one or more respective nodes in a network path for transmitting data from one path end node to another. In an aspect, an address representation 60702*a* may be processed as including at least three portions. An address separator field 60704*a* is illustrated including a binary number. In FIG. 120A, the binary number illustrated equals seventeen in base ten. The number in the address separator field 60704*a* identifies a boundary in a protocol address field 60706*a* separating a first address field 60708*a* and a second address field 60710*a*. The address separator field may identify the protocol address as a source-route protocol address. The first address field 60708*a* may identify a first protocol address that identifies a second node included in the network path. The second address field 60710*a* may identify a second protocol address that identifies the third node. A node may change at least the second address field 60710*a* as described in further detail below.

With respect to FIG. 119A, an address representation 60702*a* may be included in a data unit including data from the first node 60602*a*1 to transmit to the second node 60602*a*2. As described above, the sequence, "602.602.602.600", may be represented in a protocol address field 60706*a* to identify a first-second protocol address that, for the first node 60602*a*1, identifies the second node 60602*a*2. The first-second protocol address may be an identifier that, in the first scope-specific address space, identifies the second node 60602*a*2.

At the first node 60602*a*1, a packet generator component 60408*a* and/or an address space component 60414*a* operating in the first node 60602*a*1 may set and/or otherwise detect a value in the address separator field 60704*a* that indicates a first address field 60708*a* has a zero size. The entire protocol address field 60706*a*, thus, constitutes a second address field 60710*a* at the first node 60602*a*1 and identifies the first-second protocol address that may be set and/or otherwise detected by the separator component 60437.

A net-monitor component 60404*a* may receive a message identifying an attribute of a node, a network interface, a hop, and/or other component of a route. For example, a net-monitor component 60404*a* in first node 60602*a*1 may receive information indicating that that a first path node 60604*a*1 identified by the protocol address "602.602.602.600" is congested, has not provided authorization for relaying data to the second node 60602*a*2, has a cost associated with it that exceeds a threshold conditions, has been compromised by an attacker, and/or other attribute. In response the net-manager component 60406*a* may determine whether an alternative route exists from the first node 60602*a*1 to the second node 60602*a*1. The net-manager component 60406*a* may request an alternative route from an ASD service 60403*b*, in FIG. 117B. The net-manager component 60406*a* may interoperate with the ASD service 60403*b* via an ASD agent 60421*a* as described above. An ASD service may maintain a representation of a topology of some or all of a network. With respect to FIG. 119A, an ASD service 60403*b* may identify "602.602.600.601" as an alternate route. Net-monitor component 60404*a* in first node 60602*a*1 and/or in any node 60602 in network 60600*a* may identify an attribute of the second route identified by "602.602.600.601", such as a measure of congestion. A net-monitor component may determine that the route identified by "602.602.600.601" is preferable to the route identified by "602.602.602.600" based on indications of congestion for the two routes. One or more attributes of each route may be processed by one or more net-monitor components operating in network 60600*a* in selecting a route from two or more alternative routes.

An attribute for selecting a route may be based on a routing metric. A routing metric may be single dimensional or multi-dimensional. For example, quality of service (QOS) metrics are often multi-dimensional. A routing metric may be analytically specified, empirically specified, or based on one or more analytically specified metrics and one or more empirically specified metrics. A routing metric may be based on one or more of a link, a node, a network interface, one or more network protocols, and a protocol address type. An attribute and/or metric may be based on one or more of latency, throughput, capacity, congestion, an error rate, reliability, security, link utilization, a hop count, a time, a duration, and a data unit size. An attribute or metric may be passively monitored, actively probed, and/or piggy-back probed by one or more nodes in a network which may cooperate in monitoring a network. Nodes that monitor a network may interact as peers, as master-slave, as a hierarchy, and/or any other suitable architecture.

An alternative protocol address and corresponding route may be selected by a path node while data is in transit from the first node 60602*a*1 to the second node 60602*a*2. In FIG. 119A, at a third path node 60604*a*3, an address separator field 60704*a* in a data unit including the data from the first node 60602*a*1 may be set to and/or otherwise may be detected, by a separator component 60528 and/or an address space component 60514 in the third path node 60604*a*3, as a value that identifies "602.600", in a second address field 60710*a*. The information in the second address field 60710*a* identifies a protocol address identifies the second node 60602*a*2. The value in the address separator field also identifies a first address field 60708*a* that identifies "602.602" as a protocol address that, for the first node 60602*a*1, identifies the third path node 60604*a*3.

FIG. 118 illustrates a net-monitor component 60504 in an execution environment 60501 of the third path node 60604*a*3 that may receive a message identifying an attribute of a node, a network interface, a hop, and/or other component of a route. As with the first node 60602*a*1, the net-monitor component 60504 in the third path node 60604*a*4 may receive information indicating that the first path node 60604*a*1 identified to the third path node 60604*a*3 by the identifier '2' in the protocol address "602.602.602.600" is congested, has not provided authorization for relaying data to the second node 60602*a*2, has a cost associated with it that exceeds a threshold conditions, has been compromised by an attacker, and/or other attribute. In response the net-manager component 60506 may determine whether an alternative route exist from the third path node 60604*a*3 to the second node 60602*a*1. The net-manager component 60506 may request an alternative route from an ASD service 60403*b*, in FIG. 117B, in a manager analogous to that described above for net-manager component 60406*a*. Alternatively or additionally, the net-manager component 60506 may interoperate directly with the first path node 60602*a*1 and/or with a link that communicatively couples the first path node 60604*a*1 and the third path node 60604*a*3. The net-manager component 60506 may also detect an attribute of the third node 60602*a*3 and/or the link between the third path node 60604*a*3 and the third node 60602*a*3. Based on the attribute information associated respectively with a path to the second node 60602*a*2 via the first path node 60604*a*1 and via the third node 60602*a*3, the net-manager component 60506 may select the network path or a portion thereof identified by the protocol address "600.601" that identifies the second node 60602*a*2 for the third path node 60604*a*3. In response, the net-manager component 60506 may replace the address "602.602.602.600" with the address "602.602.600.601". The new address may be included in a data unit to transmit the data from the first node 60602*a*1 to the second node 60602*a*2.

As the data from the first node 60602*a*1 is transmitted from node to node in the network path the value represented in an address separator field 60704*a* in a protocol address field 60706*a* in a data unit including the data or a portion thereof may be adjusted by respective separator components 60528 in respective execution environments 60501 of the path nodes in the network path to identify a protocol address in a suitable address space for the respective nodes. As described above, as the data from the first node 60602*a*1 is transmitted from node to node in the network path the destination protocol address may be changed to select a route to the second node 60602*a*2 based on attributes of the respective alternative routes, if any.

In an aspect, a protocol address that does not identify a source route may be replaced with a source-route protocol address and vice versa as data traverses a path from a source node to a destination node.

The above describes an address representation 60702*a* processed to identify a destination protocol address in a data unit of a network protocol, such as an IP protocol and/or a layer two protocol. An address representation 60702*a* may include a protocol address that identifies a source node to a node receiving data in a data unit. A protocol address field 60706*a* including a source protocol address at the third path node 60604*a*3 may include a first address field 60708*a* identifying the sequence, "600.603", that identifies a source-route protocol address that, for the third path node 60604*a*3, identifies the first node 60602*a*1 as the source node for the data in the data unit. The protocol address field 60706*a* including the source protocol address at the third path node 60604*a*3 may include a second address field 60710*a* identifying the sequence "601.601" that identifies a source-route protocol address that, for the second node 60602*a*2, identifies the third path node 60604*a*3.

Just as a destination protocol address may be changed, a source protocol address may also be changed by a source node and/or by one or more path nodes. A source-route protocol address that identifies a source node may identify a same or a different route between the source node and the destination node as a source-route protocol address that identifies one or both of the destination node and the source node. Attribute(s) utilized in selecting a route from the destination node to the source node may differ from the attributes processed in selecting a route from the source node to the destination node. Alternatively or additionally, policies and/or processing of path attributes may differ as well.

FIG. 120B illustrates another type of address representation 60702*b* that may be included in a data unit to provide a protocol address according to a particular network protocol, such as IP, IPX, or ATM. Instead of or in addition to including an address separator field 60704*a* that distinguishes a first address field 60708*a* from a second address field 60710*a* based on a bit count, a bit-mask may be specified as one or more address separator fields 60704*b* to identify a first address field 60708*b* and a second address field 60710*b* in a protocol address field 60706*b*. A protocol address represented as illustrated in FIG. 120B may be processed in an analogous manner to that described for the protocol address represented in FIG. 120A based on the bit mask address separator field(s) 60704*b* rather than and/or in addition to a size address separator field 60704*a* illustrated in FIG. 120A.

FIG. 120C illustrates an address representation 60702*c* identifying one or more protocol addresses, some or all of which may be source-route protocol addresses. A protocol address field 60706*c* may be interpreted as one or more source-route protocol addresses based on one or more address separator field(s) 60704*c*. Address separator fields 60704*c* are specified according to a network protocol to distinguish one protocol address from another in a protocol address field 60706*c*. FIG. 120C illustrates an address separator field 60704*a* that distinguishes and/or identifies hop identifiers. The address separator fields 60704*c* distinguish separate hop identifiers based on changes in values of bits in consecutive address separator fields 60704*c*. In FIG. 120C, a first address separator field 60704*c*1 includes one or more one valued bits that correspond to bit positions in the protocol address field 60706*c* to identify a first address field referred to in FIG. 120C as a first hop information field. Source-route protocol addresses that include more than one hop may be distinguished similarly as shown in FIG. 120B. Combinations of hop identifiers and path identifiers may be distinguished as source-route protocol addresses by address separator fields 60704*a*. An illustrated second hop information field 60704*c*2 includes one or more zero valued bits to identify a second hop information field in protocol address field 60706*c*. Additional alternating sequences of one valued bits and zero valued bits illustrated by address separator fields 60704*c*3-12*c* correspond to and identify other hop information fields identifying hops in a network path communicatively coupling a pair of path end nodes and identified by a source-route protocol address. Hop identifiers and/or path identifier may be replaced by a suitable alternative as data is transmitted to a destination node.

In FIG. 119C, a hop may be identified by an interface identifier of a network interface in a pair of communicatively coupled nodes included in the hop. For example, the number, '1' may serve as a hop identifier specific to a second path node 60604*c*2 to identify a fifth hop 60608*c*5 including the second path node 60604*c*2 and a fourth path node 60604*c*4. The number '1' also identifies a network path for exchanging data between the two nodes. The number '1' may also be a protocol address that, for the second path node 60604*c*2, identifies the fourth path node 60604*c*4. The number '1' may also identify a hop for the fourth path node 60604*c*4 to exchange data with the second path node 60604*c*2; may also be a protocol address that, for the fourth path node 60604*c*4 identifies the second path node 60604*c*2; and may identify a particular network interface of the second path node 60604*c*2 and/or of the fourth path node 60604*c*4.

A first node 60602*c*1 may identify a second node 60602*c*2 by a first-second source-route protocol address that, for a node in a first region 60606*c*1 including the first node 60602*c*1, identifies the second node 60602*c*2. The first-second protocol address may include and/or otherwise may be based on a sequence of hop identifiers "600.601.603.602.601". Note that other network paths are illustrated for transmitting data from the first node 60602*c*1 to the second node 60602*c*2 and may also be and/or otherwise may identify source-route protocol addresses identify the second node 60602*c*2 to nodes in the first region 60606*c*1.

A node included in transmitting data from a source node to a destination node may select an alternative hop identifier based on an attribute of one of more hops included in communicatively couple the source node and the destination node. For example, the second node **60602*a*2, in FIG. 119A, may transmit data to a fifth node 60602*a*5 identified by the second node 60602*a*2 by the protocol address "600-601.602-601.602-600.602-604". The second path node 60604*a*2 may receive the data. A net-monitor component in the second path node 60604*a*2 and/or in another node may detect that the network interface of the fifth node 60602*a*5 identified by "2-4" is asleep or disabled. Rather than consuming power to activate the network interface, a net-manager component may instruct a routing component in the second path node 60604*a*2 to change the protocol address to "600-601.602-601.602-600.602-601" to deliver the data via another network interface of the fifth node 60602*a*5**.

With respect to FIG. 119C, the second node **60602*c*2 may identify a sixth node 60602*c*6 by a second-sixth source-route protocol address that, for the second node 60602*c*2, identifies the sixth node 60602*c*6. The protocol address may be based on a sequence of hop identifiers "601.600.602" that identifies the sixth node 60602*c*6 with respect to the second node 60602*c*2. The hop identifiers, "601.600.602", may be represented in an address representation 60702*c* in a data unit for sending data from the second node 60602*c*2 to the sixth node 60602*c*6. The identifiers may be given a bit or binary representation and the hop identifiers may be distinguished or separated via address separator fields 60704*c* as described above with respect to FIG. 120C. An address separator field analogous to that shown in FIG. 120**A may also or alternatively be included and processed as described above. Assignment of hop identifiers is described in application Ser. No. 13/727,649 filed on 2012 Dec. 27, entitled "Methods, Systems, and Computer Program Products for Assigning an interface Identifier to a Network Interface"; application Ser. No. 13/727,655 filed on 2012 Dec. 27, entitled "Methods, Systems, and Computer Program Products for Determining a Shared identifier for a Hop in a Network", and application Ser. No. 13/727,657 filed on 2012 Dec. 27, entitled "Methods, Systems, and Computer Program Products for Determining a Hop Identifier for a Network Protocol", by the present inventor.

In FIG. 119B, a first node **60602*b*1 and a second node 60602*b*2 may each identify the other by a same protocol address. For example, a sequence of pairs of interface identifiers "60151-60254.60151-6010" may be a protocol address that, for the first node 60602*b*1, identifies the second node 60602*b*2. The first node may send a data unit including an address representation 60702*d* of the type illustrated in FIG. 120D. Note that reversing or otherwise processing in reverse order the interface identifiers yields the identifier "6010-60151.60254-60151" that may be a protocol address that, for the second node 60602*b*2, identifies the first node 60602*b*1**. A sequence of hop identifiers based on interface identifiers may serve as a source-route protocol address in one order of the sequence and may serve as another source-route protocol address for another node when processed according to another order of the sequence.

FIG. 120E illustrates an address representation **60702*e* that further demonstrates that a protocol address may be based on path information. An address representation 60702*e* may include portions that include path information and/or portions that include scoped addresses. An address separator field 60704*e* is defined to distinguish address fields in a manner similar to the method described for distinguishing hop identifiers in FIG. 120C. A first protocol address field 60706*e*1 corresponding to the first address separator field 60704*e*1 includes a single interface identifier for an outbound network interface for a first node as described above with respect to FIG. 120A and FIG. 119C. A second protocol address field 60706*e*2 corresponding to a second address separator field 60704*e*2 may include a scoped address having an inside scope, an outside scope, or both. A node processing the second protocol address field 60706*e*2** may be included in a portion of a network spanned by the scope of the scoped address. The node may process the scoped address accordingly.

See application Ser. No. 11/962,285, by the present inventor, filed on 2007 Dec. 21, entitled "Methods and Systems for Sending Information to a Zone Included in an Internet Network" for a description of addresses having outside scope and/or inside scope and processing of such addresses. A third protocol address field **60706*e*3 corresponding to a third address separator field 60704*e*3 may include a pair of identifiers as described with respect to FIG. 120D. A fourth protocol address field 60706*e*4 corresponding to a fourth address separator field 60704*e*4 may include a protocol address analogous to one of the types of addresses described with respect to the second protocol address field 60706*e*2** such as a local-scoped address.

In FIG. 119B, a first node **60602*b*1 may be included in a first region that includes network interfaces coupling nodes to a first network 60606*b*1 included in the network 60600*b*. A second node 60602*b*2 may be included in a second region that includes network interfaces coupling nodes to a second network 60606*b*2. Each of the two nodes may identify the other by a source-route protocol address. For example, a sequence of scoped addresses "60254.6010" may be a protocol address that may identify the second node 60602*b*2 to the first node 60602*b*1, as well as to other nodes in the first region defined by the first network 60606*b*1. A data unit including an address represented as in 60702*e* in FIG. 120E may identify a source-route protocol address based on a sequence of scoped addresses. Similarly, a sequence of scoped addresses "60254.6010" may be a protocol address that identifies a third node 60602*b*3 to the second node 60602*b*2 as well as to other nodes in the second region defined by the second network 60606*b*2**.

As described above, a source-route protocol address may include and/or may otherwise identify path information identifying a network path included in communicatively coupling a sending node and a receiving node. A source-route protocol address may include and/or may otherwise identify first hop information identifying a first hop including a first pair of communicatively coupled nodes included in communicatively coupling the source node and the destination node. At least one the hop identifier may include and/or may otherwise identify an identifier of at least one of the nodes in the first pair. The identifier of the at least one of the nodes in the first pair may include and/or otherwise may identify a network interface that is included in communicatively coupling the first pair. A source-route protocol address may include and/or may otherwise identify a plurality of hop identifiers in an identifiable first order and in an identifiable second order, wherein the source-route protocol address includes the plurality of hop identifiers in the first order and another source-route protocol address, that identifies the source node to the destination node, includes the plurality of hop identifiers in the second order. At least one of the first order and the second order may be identified in the data unit by sequence information defined by a schema of the network protocol. The sequence information may be represented separately from the plurality of hop identifiers An address representation **60702*a*, in FIG. 120A, may be detected by a data-in component 60520 and/or a routing component 60522 in a data unit or packet of an Internet Protocol or other network protocol. For example, a routing component 60522, in a current path node 60604, may process information in a previous address field 60708***a* to identify a previous address that, for a previous node in the network path, identifies the current path node 60604. A routing component 60522 may identify, based on information in a next address field 60710*a*, a next protocol address, that identifies a next node in the network path.

Alternatively or additionally, a routing component 60522 may identify, based on information in a next address field 60710*a*, a current protocol address, that identifies the current node. A routing component 60522 interoperating with a data-in component 60520 may determine a next protocol address that identifies the next node, based on the current protocol address. In another aspect, a routing component may determine the current address based on the next protocol address.

A source-route protocol address may include one or more of a first scoped protocol address that identifies a node, in a first pair of nodes in the first-third network path included in communicatively coupling the first node and the third node, to another node in the first pair, wherein the first pair is included in a region of the network included in a span of the first scoped protocol address and a second scoped protocol address that identifies a node, in a second pair of nodes in the third-second network path included in communicatively coupling the second node and the third node, to another node in the second pair, wherein the second pair is included in a region of the network included in a span of the first scoped protocol address. A source-route protocol address may include one or both of a first hop identifier that identifies a first hop that includes a first pair of nodes included in communicatively coupling the first node and the third node and a second hop identifier that identifies a second hop that includes a second pair of nodes included in communicatively coupling the second node and the third node. One or more of the first node, the second node, and the third node are included in the first pair and/or the second pair. A source-route protocol address may include a second hop identifier that identifies the first hop to the first node which is not included in the pair FIG. 117A and FIG. 118 each illustrate an arrangement of components that may operate to perform a method illustrated in FIG. 121. The systems illustrated by the arrangements each include a processor, such as processor 60104, to process an instruction in at least one of a routing component, a net-monitor component, and a data-out component.

With reference to FIG. 121, a block 60802 illustrates that the method includes receiving a first protocol address identifying a first network path to send first data to a second node identified by the first protocol address, wherein the first network path includes a first path node. The systems described each include one or more processors and logic encoded in one or more computer readable media for execution by the one or more processors that when executed is operable for and/or is otherwise included in receiving a first protocol address identifying a first network path to send first data to a second node identified by the first protocol address, wherein the first network path includes a first path node. For example, the arrangements in FIG. 117A and FIG. 118 each include a routing component that is operable for and/or is otherwise included in receiving a first protocol address identifying a first network path to send first data to a second node identified by the first protocol address, wherein the first network path includes a first path node.

With reference to FIG. 121, a block 60804 illustrates that the method includes detecting a second network path that at least one of includes a second path node not included in the first network path and excludes the first path node included in the first network path, wherein the second network path is identified by a second protocol address. The systems described each include one or more processors and logic encoded in one or more computer readable media for execution by the one or more processors that when executed is operable for and/or is otherwise included in detecting a second network path that at least one of includes a second path node not included in the first network path and excludes the first path node included in the first network path, wherein the second network path is identified by a second protocol address. For example, the arrangements in FIG. 117A and FIG. 118 each include a net-monitor component that is operable for and/or is otherwise included in detecting a second network path that at least one of includes a second path node not included in the first network path and excludes the first path node included in the first network path, wherein the second network path is identified by a second protocol address.

With reference to FIG. 121, a block 60806 illustrates that the method includes storing the first data in a payload portion of a second data unit, wherein the second data unit includes an address field that identifies the second protocol address. The systems described each include one or more processors and logic encoded in one or more computer readable media for execution by the one or more processors that when executed is operable for and/or is otherwise included in storing the first data in a payload portion of a second data unit, wherein the second data unit includes an address field that identifies the second protocol address. For example, the arrangements in FIG. 117A and FIG. 118 each include a packet generator component that is operable for and/or is otherwise included in storing the first data in a payload portion of a second data unit, wherein the second data unit includes an address field that identifies the second protocol address.

With reference to FIG. 121, a block 60808 illustrates that the method includes transmitting the second data unit to send the first data to the second node via the second network path. The systems described each include one or more processors and logic encoded in one or more computer readable media for execution by the one or more processors that when executed is operable for and/or is otherwise included in transmitting the second data unit to send the first data to the second node via the second network path. For example, the arrangements in FIG. 117A and FIG. 118 each include a data-out component that is operable for and/or is otherwise included in transmitting the second data unit to send the first data to the second node via the second network path.

With respect to FIG. 119A, an address representation 60702*a* may be included in a data unit including data from a first node 60602*a*1 to transmit to a second node 60602*a*2. The sequence, "602.602.602.600", may be represented in a protocol address field 60706*a* to identify a protocol address that identifies the second node 60602*a*2. At the first node 60602*a*1, the address separator field 60704*a* may be set, by a separator component 60528, to include a size of zero for a previous address field 60708*a*. The protocol address field 60706*a*, thus includes a next address field 60710*a* at the first node 60602*a*1 and identifies the second node 60602*a*2 with respect to nodes in the first network region 60606*a*1.

At a second path node 60604*a*2, an address separator field 60704*a*, in a data unit including the data from the first node 60602*a*1, may include a value, '2', that identifies, in a previous address field 60708*a*, a protocol address that identifies a third path node 60604*a*3. A routing component 60522 in a second path node 60604_a_2 may detect the value. The routing component 60522 interoperating with a separator component 60528 may also identify, based on the value in the address separator field 60704_a_, a next address field 60710_a_ that identifies "602.602.600" as a next protocol address that identifies the second node 60602_a_2. The separator component 60528 may detect the next protocol address.

At the second node 60602_a_2, a data unit including the data from the first node 60602_a_1 may include a value in an address separator field 60704_a_ that indicates that the protocol address field includes only a previous address field 60708_a_ identifying "602.602.602.600", which is the destination protocol address in the context of the first network region 60606_a_1.

In FIG. 119A, at the second node 60602_a_2 the value in the separator address field and/or in another portion of the data unit may be defined to indicate that the protocol address field 60706_a_ also includes information for determining and/or otherwise identifying a protocol address that identifies a network interface of a node, in the first network region 60606_a_1, in a network path from the second node 60602_a_2 to the first node 60602_a_1. The protocol address field 60706_a_ in some aspects may include information for determining a protocol address that identifies the first node 60602_a_1.

As a source protocol address with respect to a data unit, described in the previous paragraph, sent from the first node 60602_a_1 to the second node 60602_a_2, a protocol address field 60706_a_, at the second path node 60604_a_2, may include a previous address field 60708_a_ identifying the sequence, "3", that identifies a protocol address that identifies the first node 60602_a_1 as a sender of the data in the data unit. The protocol address field 60706_a_ including the source protocol address at the second path node 60604_a_2 may include a next address field 60710_a_, identified by an address separator field 60704_a_, identifying the sequence "601.601.600" that identifies a protocol address that identifies the second path node 60604_a_2 to the second node 60602_a_2 as a path node 60604 in a network path traversed by the data sent from the second node 60602_a_2.

A data-in component 60520 may detect a protocol address in a data unit specified according to a network protocol to include a destination protocol address portion and a source protocol address portion as, for example, current IP packet headers are specified. Alternatively, a data-in component 60520 may detect a protocol address in a data unit defined to include an address portion that identifies a source-route protocol address identifying a source node for one node in a network path traversed by the packet and identifies a source-route protocol address identifying a destination node for another node in the network path.

FIG. 119A illustrates that a net-monitor component in a node in network 60600_a_ may detect attributes associated with various network paths, hops, links, and/or network interfaces. The net-monitor component may interoperate with a net-manager component in a node in network 60600_a_ to determine an optimal and/or better path according to some criterion. Any of the nodes in the network path identified by "602.602.602.600", based on information from the net-manager component a packet generator component in any of the nodes in the path identified by "602.602.602.600", may change the protocol address to select another route to the second node 60602_a_2.

FIG. 118 illustrates an arrangement of components that may operate in an execution environment to perform a method illustrated in FIG. 122. The system illustrated by the arrangement includes a processor, such as processor 60104, to process an instruction in at least one of a data-in component, a net-monitor component, a net-manager component, and a data-out component.

With reference to FIG. 122, a block 60902 illustrates that the method includes receiving first data in a first data unit of a network protocol to route to a second node via a first network path identified in a first protocol address, wherein the first protocol address is received in an address field of the first data unit. The system in FIG. 118 includes one or more processors and logic encoded in one or more computer readable media for execution by the one or more processors that when executed is operable for and/or is otherwise included in receiving first data in a first data unit of a network protocol to route to a second node via a first network path identified in a first protocol address, wherein the first protocol address is received in an address field of the first data unit.

For example, the arrangement in FIG. 118 includes a data-in component 60502 that is operable for and/or is otherwise included in receiving first data in a first data unit of a network protocol to route to a second node via a first network path identified in a first protocol address, wherein the first protocol address is received in an address field of the first data unit.

With reference to FIG. 122, a block 60904 illustrates that the method includes detecting a first value of a first routing metric measured based on the first network path and a second value of the first routing metric measured based on the second network path. The system in FIG. 118 includes one or more processors and logic encoded in one or more computer readable media for execution by the one or more processors that when executed is operable for and/or is otherwise included in detecting a first value of a first routing metric measured based on the first network path and a second value of the first routing metric measured based on the second network path.

For example, the arrangement in FIG. 118 includes a net-monitor component 60504 that is operable for and/or is otherwise included in detecting a first value of a first routing metric measured based on the first network path and a second value of the first routing metric measured based on the second network path.

With reference to FIG. 122, a block 60906 illustrates that the method includes selecting the second network path based on the first value and the second value. The system in FIG. 118 includes one or more processors and logic encoded in one or more computer readable media for execution by the one or more processors that when executed is operable for and/or is otherwise included in selecting the second network path based on the first value and the second value.

For example, the arrangement in FIG. 118 includes a net-manager component 60506 that is operable for and/or is otherwise included in selecting the second network path based on the first value and the second value.

With reference to FIG. 122, a block 60908 illustrates that the method includes sending the first data in a second data unit of the network protocol to route to the second node via the second network path identified in a second protocol address represented in an address field of the second data unit. The system in FIG. 118 includes one or more processors and logic encoded in one or more computer readable media for execution by the one or more processors that when executed is operable for and/or is otherwise included in sending the first data in a second data unit of the network protocol to route to the second node via the second network path identified in a second protocol address represented in an address field of the second data unit.

For example, the arrangement in FIG. 118 includes a data-out component 60508 that is operable for and/or is otherwise included in sending the first data in a second data unit of the network protocol to route to the second node via the second network path identified in a second protocol address represented in an address field of the second data unit.

FIG. 120C illustrates an address representation 60702*c* identifying path information that may be detected by a routing component 60522. A protocol address field 60706*c* may be interpreted as a network path identifier based on address separator field(s) 60704*c* in a data unit. Address separator fields are specified according to a network protocol to distinguish one path identifier from another path identifier in a protocol address field 60706*c*.

In an aspect, illustrated in FIG. 120C, a routing component 60520 and/or a separator component 60528 may distinguish hop identifiers, since a single hop is a network path. A separator component 60528 may distinguish separate hop identifiers based on changes in values in bits of consecutive address separator fields 60704*c*. Combinations of hop identifiers and path identifiers may be distinguished by a routing component 60522 and/or a separator component 60528 based on information in address separator fields 60704.

Hop attribute data may be detected by one or more net-monitor components operating in network 60600*c*. In FIG. 119C, a second node 60602*c*2 may identify an eighth hop 60608*c*1 based on another sequence of hop identifiers, "601.600". The sequence of hop identifiers may identify a protocol address that, for the second path node 60602*c*2, identifies a sixth path node 60604*c*6. Note that a routing component 60522 and/or a separator component 60528 operating in the seventh path node 60604*c*7 may detect the sequence, "601.600.602", in and/or received in a data unit from the second node 60602*c*2 to send data in the data unit to a sixth node 60602*c*6. The seventh path node 60604*c*7 may, as instructed by a net-manager component, send the data to a fifth path node 60604*c*5 in a data unit including the protocol address "601.602.603.602.601.602" that identifies the sixth node 60602*c*6 to the second node 60602*c*2.

Note that the seventh path node 60604*c*7 may leave unchanged a source protocol address "602.600.601" that identifies the second node 60602*c*2 as the source of the data to the sixth node 60602*c*6. Alternatively, the seventh path node 60604*c*7 or any other node included in transmitting the data may change the source protocol address to any suitable protocol address that identifies the second node 60602*c*2 to the sixth node 60602*c*6. The source protocol address may be a source-route protocol address or not.

FIG. 118 illustrates an arrangement of components that may operate in an execution environment to perform a method illustrated in FIG. 123. The system illustrated by the arrangement includes a processor, such as processor 60104, to process an instruction in at least one of a routing component, a net-manager component, and a data-out component.

With reference to FIG. 123, a block 601002 illustrates that the method includes receiving first data in a first data unit of a first network protocol to route to a second node via a first network path identified in a first protocol address, wherein the first protocol address is received in an address field of the first data unit. The system in FIG. 118 includes one or more processors and logic encoded in one or more computer readable media for execution by the one or more processors that when executed is operable for and/or is otherwise included in receiving first data in a first data unit of a first network protocol to route to a second node via a first network path identified in a first protocol address, wherein the first protocol address is received in an address field of the first data unit. For example, the arrangement in FIG. 118 includes a routing component 60502 that is operable for and/or is otherwise included in receiving first data in a first data unit of a first network protocol to route to a second node via a first network path identified in a first protocol address, wherein the first protocol address is received in an address field of the first data unit.

With reference to FIG. 123, a block 601004 illustrates that the method includes detecting that the first protocol address is included in an address space of a second network protocol, wherein the first protocol address, for the second protocol address, identifies the second node. The system in FIG. 118 includes one or more processors and logic encoded in one or more computer readable media for execution by the one or more processors that when executed is operable for and/or is otherwise included in detecting that the first protocol address is included in an address space of a second network protocol, wherein the first protocol address, for the second protocol address, identifies the second node. For example, the arrangement in FIG. 118 includes a net-manager component 60504 that is operable for and/or is otherwise included in detecting that the first protocol address is included in an address space of a second network protocol, wherein the first protocol address, for the second protocol address, identifies the second node.

With reference to FIG. 123, a block 601006 illustrates that the method includes sending the first data in a second data unit of the second network protocol to route to the second node via the first network path identified by the first protocol address represented in an address field of the second data unit. The system in FIG. 118 includes one or more processors and logic encoded in one or more computer readable media for execution by the one or more processors that when executed is operable for and/or is otherwise included in sending the first data in a second data unit of the second network protocol to route to the second node via the first network path identified by the first protocol address represented in an address field of the second data unit. For example, the arrangement in FIG. 118 includes a data-out component 60506 that is operable for and/or is otherwise included in sending the first data in a second data unit of the second network protocol to route to the second node via the first network path identified by the first protocol address represented in an address field of the second data unit.

In transmitting data from a source node to a destination node, the data may be transmitted by different network protocols corresponding to different portions of a network path from the source node to the destination node. In FIG. 119C, the fourth path node 60604*c*4 may receive data from the first node 60602*c*1 in one or more data units of the IP protocol. The data may be in a payload of a TCP packet or a UDP packet transmitted by the IP packet(s). The source-route protocol address "600.601.603.602.601" identifies the fourth path node 60604*c*4 as a path node in a route to the second node 60604*c*2. The fourth path node 60604*c*4 may operate as a protocol gateway. In one aspect, the fourth path node 60604*c*4 may send the data received from the first node via the IP protocol to the second node via one or more link layer protocols in a switched linked layer network. The protocol address "600.601.603.602.601" may be represented as a destination address in a data unit of a link layer protocol, such as an Ethernet protocol. For the link layer protocol, "603.602.601" identifies a route from the fourth path node 60604*c*4 to the second node 60602*c*2 via the link layer protocol(s) of the links identified by '603', '602', and '601', respectively. While the same protocol address may be used (though in address spaces of different protocols), in another aspect, the fourth path node 60604_c_4 may translate the IP protocol address to an address in an address of the outgoing protocol, which may be a link layer protocol or protocol mapped to another layer of the network stack.

Further still, the fourth path node 60604_c_4 may change network protocols based on a route selected to transmit the data to the second node 60602_c_2. For example, the fourth path node 60604_c_4 may select a route from the fourth path node 60604_c_4 to the second node 60602_c_2 identified by the protocol address "602.601.600.601". The fourth path node 60604_c_4 may send the data in a data unit of the IP protocol, in a payload of an HTTP message, or in some other suitable protocol different than the network protocol associated with the path identified by "603.602.601".

Different protocols may all map to a same layer of a network stack or may map to different layers. A protocol address may be stored in a data unit of a first network protocol according to a first schema for the first network protocol and the same protocol address may be stored in a data unit of a second network protocol according to a second schema for the second network protocol. An address space component and/or packet generator component may transform the protocol address from a first representation of the first protocol address, valid for the first schema, into a second representation of the protocol address valid for the second schema of the second network protocol.

FIG. 118 illustrates an arrangement of components that may operate in an execution environment to perform a method illustrated in FIG. 124. The system illustrated by the arrangement includes a processor, such as processor 60104, to process an instruction in at least one of a data-in component, a routing component, and a data-out component.

With reference to FIG. 124, a block 601102 illustrates that the method includes receiving, via a first network path selected based on a first routing metric, first data in a first data unit of a first network protocol to route to a second node, wherein a first protocol address received in an address field of the first data unit includes an identifier the first network path and includes an identifier of the second node. The system in FIG. 118 includes one or more processors and logic encoded in one or more computer readable media for execution by the one or more processors that when executed is operable for and/or is otherwise included in receiving, via a first network path selected based on a first routing metric, first data in a first data unit of a first network protocol to route to a second node, wherein a first protocol address received in an address field of the first data unit includes an identifier the first network path and includes an identifier of the second node. For example, the arrangement in FIG. 118 includes a data-in component 60502 that is operable for and/or is otherwise included in receiving, via a first network path selected based on a first routing metric, first data in a first data unit of a first network protocol to route to a second node, wherein a first protocol address received in an address field of the first data unit includes an identifier the first network path and includes an identifier of the second node.

With reference to FIG. 124, a block 601104 illustrates that the method includes selecting, based on a second routing metric, a second network path for sending the first data to the second node. The system in FIG. 118 includes one or more processors and logic encoded in one or more computer readable media for execution by the one or more processors that when executed is operable for and/or is otherwise included in selecting, based on a second routing metric, a second network path for sending the first data to the second node. For example, the arrangement in FIG. 118 includes a routing component 60504 that is operable for and/or is otherwise included in selecting, based on a second routing metric, a second network path for sending the first data to the second node.

With reference to FIG. 124, a block 601106 illustrates that the method includes sending the first data to the second node via the second network path by sending the first data in a payload portion of a second data unit that includes an address field including a second protocol address that identifies the second node and that identifies the second network path. The system in FIG. 118 includes one or more processors and logic encoded in one or more computer readable media for execution by the one or more processors that when executed is operable for and/or is otherwise included in sending the first data to the second node via the second network path by sending the first data in a payload portion of a second data unit that includes an address field including a second protocol address that identifies the second node and that identifies the second network path. For example, the arrangement in FIG. 118 includes a data-out component 60506 that is operable for and/or is otherwise included in sending the first data to the second node via the second network path by sending the first data in a payload portion of a second data unit that includes an address field including a second protocol address that identifies the second node and that identifies the second network path.

A routing metric may be selected based on a source node, a destination node, a protocol address of one or more network protocols in a protocol stack, a node in a network path included in communicatively coupling a sending node and a receiving node, a network service provider, a geospatial location, a date, a time, a customer, and the like.

A node may receive a message that identifies a routing metric. A message identifying a routing metric may be received from an ASD service, such as a DNS service and/or service that represents some or all of a network in a topology and/or metric space. Alternatively or additionally, a message identifying a routing metric may be received from a node identified as the destination node for data in a data unit, from a node in a region of the network that includes the destination node, from the source node, from a node in a region of the network that includes the source node, from a path node that may relay data from the source node and the path node. Still further, a routing metric may be identified in a data unit including data from a source node to deliver to a destination node.

In FIG. 119B, a first node 60602_b_1 may be included in a first network region that includes network interfaces coupling nodes to a first network 60614_b_1 included in a network 60600_b_. A third node 60606_b_3 may be included in a third network region that includes network interfaces coupling nodes to a third network 60614_b_3. Each of the two nodes may identify the other by a respective source-route protocol address. For example, a sequence of scoped addresses, "60254.60254.6010", may be a protocol address that may identify the third node 60606_b_3 to the first node 60602_b_1 as well as to other nodes in the first network region defined by the first network 60614_b_1. A data unit including an address representation 60702_e_ in FIG. 120E may identify a source-route protocol address based on a sequence of scoped addresses. The data unit may include a field that identifies a routing metric. The data unit may identify more than one routing metric. The routing metrics may be applied to specified under specific conditions. For example, a power cost-based metric may be included in determining a route when transmitted data is transmitted by a first network provider. A throughput metric may be included in determining a route when the data is transmitted by a second network service provider.

FIG. 117A and FIG. 118 each illustrate an arrangement of components that may operate in an execution environment to perform a method illustrated in FIG. 125. The systems illustrated by the arrangements each include a processor, such as processor 60104, to process an instruction in at least one of a routing component, a net-manager component, a net-monitor component, a routing component, and a data-out component.

With reference to FIG. 125, a block 601202 illustrates that the method includes detecting, by a current node, first data to send to an identified second node. The systems each include one or more processors and logic encoded in one or more computer readable media for execution by the one or more processors that when executed is operable for and/or is otherwise included in detecting, by a current node, first data to send to an identified second node. For example, the arrangements in FIG. 117A and FIG. 118 each include a routing component that is operable for and/or is otherwise included in detecting, by a current node, first data to send to an identified second node.

With reference to FIG. 125, a block 601204 illustrates that the method includes selecting a first routing metric from a plurality of routing metrics, wherein the selecting is based on at least one of a previous node that sent the received first data, the current node, and a next node included in a communicative coupling of the current node and the second node. The systems each include one or more processors and logic encoded in one or more computer readable media for execution by the one or more processors that when executed is operable for and/or is otherwise included in selecting a first routing metric from a plurality of routing metrics, wherein the selecting is based on at least one of a previous node that sent the received first data, the current node, and a next node included in a communicative coupling of the current node and the second node. For example, the arrangements in FIG. 117A and FIG. 118 each include a net-manager component that is operable for and/or is otherwise included in selecting a first routing metric from a plurality of routing metrics, wherein the selecting is based on at least one of a previous node that sent the received first data, the current node, and a next node included in a communicative coupling of the current node and the second node.

With reference to FIG. 125, a block 601206 illustrates that the method includes identifying, based on the first routing metric, a first network path from a plurality of network paths that communicatively couple the current node and the second node. The systems each include one or more processors and logic encoded in one or more computer readable media for execution by the one or more processors that when executed is operable for and/or is otherwise included in identifying, based on the first routing metric, a first network path from a plurality of network paths that communicatively couple the current node and the second node. For example, the arrangements in FIG. 117A and FIG. 118 each include a net-monitor component that is operable for and/or is otherwise included in identifying, based on the first routing metric, a first network path from a plurality of network paths that communicatively couple the current node and the second node.

With reference to FIG. 125, a block 601208 illustrates that the method includes determining a first protocol address of a network protocol, wherein the first protocol address identifies the first network path. The systems each include one or more processors and logic encoded in one or more computer readable media for execution by the one or more processors that when executed is operable for and/or is otherwise included in determining a first protocol address of a network protocol, wherein the first protocol address identifies the first network path. For example, the arrangements in FIG. 117A and FIG. 118 each include a routing component 60508 that is operable for and/or is otherwise included in determining a first protocol address of a network protocol, wherein the first protocol address identifies the first network path.

With reference to FIG. 125, a block 601210 illustrates that the method includes sending the first data via the first network path to the second node by sending the data in a first data unit, of the network protocol, that includes an address field including the first protocol address. The systems each include one or more processors and logic encoded in one or more computer readable media for execution by the one or more processors that when executed is operable for and/or is otherwise included in sending the first data via the first network path to the second node by sending the data in a first data unit, of the network protocol, that includes an address field including the first protocol address. For example, the arrangements in FIG. 117A and FIG. 118 each include a data-out component 60510 that is operable for and/or is otherwise included in sending the first data via the first network path to the second node by sending the data in a first data unit, of the network protocol, that includes an address field including the first protocol address.

FIG. 117A and FIG. 118 each illustrates an arrangement of components that may operate in an execution environment to perform a method illustrated in FIG. 126. The systems illustrated by the arrangements include each include a processor, such as processor 60104, to process an instruction in at least one of a routing component, a net-monitor component, a net-manager component, an address space component, and a data-out component.

With reference to FIG. 126, a block 601302 illustrates that the method includes receiving a first protocol address identifying a first network path to send first data to a second node identified by the first protocol address. The systems each include one or more processors and logic encoded in one or more computer readable media for execution by the one or more processors that when executed is operable for and/or is otherwise included in receiving a first protocol address identifying a first network path to send first data to a second node identified by the first protocol address. For example, the arrangement in FIG. 117A and FIG. 118 each include a routing component 60402*a* that is operable for and/or is otherwise included in receiving a first protocol address identifying a first network path to send first data to a second node identified by the first protocol address.

With reference to FIG. 126, a block 601304 illustrates that the method includes determining that the first network path is not available for sending the first data to the second node. The systems each includes one or more processors and logic encoded in one or more computer readable media for execution by the one or more processors that when executed is operable for and/or is otherwise included in determining that the first network path is not available for sending the first data to the second node. For example, the arrangements in FIG. 117A and FIG. 118 each include a net-monitor component 60404*a* that is operable for and/or is otherwise included in determining that the first network path is not available for sending the first data to the second node.

With reference to FIG. 126, a block 601306 illustrates that the method includes identifying a second network path that is available for sending the first data to the second node. The systems each include one or more processors and logic encoded in one or more computer readable media for execution by the one or more processors that when executed is operable for and/or is otherwise included in identifying a second network path that is available for sending the first data to the second node. For example, the arrangements in FIG. 117A and FIG. 118 each include a net-manager component 60406*a* that is operable for and/or is otherwise included in identifying a second network path that is available for sending the first data to the second node.

With reference to FIG. 126, a block 601308 illustrates that the method includes determining a second protocol address that identifies the second network path and that identifies the second node. The systems each include one or more processors and logic encoded in one or more computer readable media for execution by the one or more processors that when executed is operable for and/or is otherwise included in determining a second protocol address that identifies the second network path and that identifies the second node. For example, the arrangements in FIG. 117A and FIG. 118 each include an address space component 60408*a* that is operable for and/or is otherwise included in determining a second protocol address that identifies the second network path and that identifies the second node.

With reference to FIG. 126, a block 601310 illustrates that the method includes sending the first data via the second network path to the second node by sending the data in a first data unit, of a network protocol, that includes an address field including the second protocol address. The systems each include one or more processors and logic encoded in one or more computer readable media for execution by the one or more processors that when executed is operable for and/or is otherwise included in sending the first data via the second network path to the second node by sending the data in a first data unit, of a network protocol, that includes an address field including the second protocol address. For example, the arrangements in FIG. 117A and FIG. 118 each include a data-out component 60410*a* that is operable for and/or is otherwise included in sending the first data via the second network path to the second node by sending the data in a first data unit, of a network protocol, that includes an address field including the second protocol address.

Determining that a network path is not available may include detecting that a node, a hop, a network interface component, and/or software component is not operating to transfer data in a network path. Determining that a network path is not available may include detecting an error condition associated with at least portion of the first network path. Determining that a network path is not available may include determining that no authorization has been granted to send the first data via the first network path. Determining that a network path is not available may include receiving a message including an indicating that the first network path is not available. The message may indicate the network path is not available for sending the first data to the second node. The network path or a portion thereof may be available for other purposes.

FIG. 117A and FIG. 118 each illustrates an arrangement of components that may operate in an execution environment to perform a method illustrated in FIG. 127. The systems illustrated by the arrangements each include a processor, such as processor 60104, to process an instruction in at least one of a routing component, a net-manager component, an address space component, and a data-out component.

With reference to FIG. 127, a block 601402 illustrates that the method includes receiving a first protocol address identifying a first network path for sending first data to a second node identified by the first protocol address. The systems each include one or more processors and logic encoded in one or more computer readable media for execution by the one or more processors that when executed is operable for and/or is otherwise included in receiving a first protocol address identifying a first network path for sending first data to a second node identified by the first protocol address. For example, the arrangements in FIG. 117A and FIG. 118 each include routing component that is operable for and/or is otherwise included in receiving a first protocol address identifying a first network path for sending first data to a second node identified by the first protocol address.

With reference to FIG. 127, a block 601404 illustrates that the method includes detecting a rerouting rule to send the data via a second network path rather than via the first network path. The systems each includes one or more processors and logic encoded in one or more computer readable media for execution by the one or more processors that when executed is operable for and/or is otherwise included in detecting a rerouting rule to send the data via a second network path rather than via the first network path. For example, the arrangements in FIG. 117A and FIG. 118 each include net-manager component that is operable for and/or is otherwise included in detecting a rerouting rule to send the data via a second network path rather than via the first network path.

With reference to FIG. 127, a block 601406 illustrates that the method includes identifying a second protocol address that identifies the second network path and that identifies the second node. The systems each includes one or more processors and logic encoded in one or more computer readable media for execution by the one or more processors that when executed is operable for and/or is otherwise included in identifying a second protocol address that identifies the second network path and that identifies the second node. For example, the arrangements in FIG. 117A and FIG. 118 each include an address space component that is operable for and/or is otherwise included in identifying a second protocol address that identifies the second network path and that identifies the second node.

With reference to FIG. 127, a block 601408 illustrates that the method includes sending the first data via the second network path to the second node by sending the data in a first data unit, of a network protocol, that includes an address field including the second protocol address. The systems each include one or more processors and logic encoded in one or more computer readable media for execution by the one or more processors that when executed is operable for and/or is otherwise included in sending the first data via the second network path to the second node by sending the data in a first data unit, of a network protocol, that includes an address field including the second protocol address. For example, the arrangements in FIG. 117A and FIG. 118 each include a data-out component that is operable for and/or is otherwise included in sending the first data via the second network path to the second node by sending the data in a first data unit, of a network protocol, that includes an address field including the second protocol address.

FIG. 117A and FIG. 118 each illustrate an arrangement of components that may operate in an execution environment to perform a method illustrated in FIG. 128. The systems illustrated by the arrangements each include a processor, such as processor 60104, to process an instruction in at least one of a routing component, an address space component, and a data-out component.

With reference to FIG. 128, a block 601502 illustrates that the method includes receiving a first protocol address identifying a first network path for sending first data to a second node identified by the first protocol address. The systems each includes one or more processors and logic encoded in one or more computer readable media for execution by the one or more processors that when executed is operable for and/or is otherwise included in receiving a first protocol address identifying a first network path for sending first data to a second node identified by the first protocol address. For example, the arrangements in FIG. 117A and FIG. 118 each include a routing component that is operable for and/or is otherwise included in receiving a first protocol address identifying a first network path for sending first data to a second node identified by the first protocol address.

With reference to FIG. 128, a block 601504 illustrates that the method includes performing a lookup operation, based on at least one of the first network path and the second node, to identify a second protocol address that identifies a second network path and that identifies the second node. The systems each include one or more processors and logic encoded in one or more computer readable media for execution by the one or more processors that when executed is operable for and/or is otherwise included in performing a lookup operation, based on at least one of the first network path and the second node, to identify a second protocol address that identifies a second network path and that identifies the second node. For example, the arrangements in FIG. 117A and FIG. 118 each include an address space component that is operable for and/or is otherwise included in performing a lookup operation, based on at least one of the first network path and the second node, to identify a second protocol address that identifies a second network path and that identifies the second node.

With reference to FIG. 128, a block 601506 illustrates that the method includes sending the first data via the second network path to the second node by sending the data in a first data unit, of a network protocol, that includes an address field including the second protocol address. The systems each includes one or more processors and logic encoded in one or more computer readable media for execution by the one or more processors that when executed is operable for and/or is otherwise included in sending the first data via the second network path to the second node by sending the data in a first data unit, of a network protocol, that includes an address field including the second protocol address. For example, the arrangements in FIG. 117A and FIG. 118 each include a data-out component that is operable for and/or is otherwise included in sending the first data via the second network path to the second node by sending the data in a first data unit, of a network protocol, that includes an address field including the second protocol address.

FIG. 117A and FIG. 118 each illustrate an arrangement of components that may operate in an execution environment to perform a method illustrated in FIG. 129. The systems illustrated by the arrangements each include a processor, such as processor 60104, to process an instruction in at least one of a routing component, a net-monitor component, a net-manager component, and a net-manager component.

With reference to FIG. 129, a block 601602 illustrates that the method includes receiving a first protocol address that previously identified a second node. The systems each include one or more processors and logic encoded in one or more computer readable media for execution by the one or more processors that when executed is operable for and/or is otherwise included in receiving a first protocol address that previously identified a second node. For example, the arrangements in FIG. 117A and FIG. 118 each include a routing component that is operable for and/or is otherwise included in receiving a first protocol address that previously identified a second node.

With reference to FIG. 129, a block 601604 illustrates that the method includes determining that the first protocol address no longer identifies the second node. The systems each include one or more processors and logic encoded in one or more computer readable media for execution by the one or more processors that when executed is operable for and/or is otherwise included in determining that the first protocol address no longer identifies the second node. For example, the arrangements in FIG. 117A and FIG. 118 each include a net-monitor component that is operable for and/or is otherwise included in determining that the first protocol address no longer identifies the second node.

With reference to FIG. 129, a block 601606 illustrates that the method includes identifying a second protocol address that identifies the second node. The systems each include one or more processors and logic encoded in one or more computer readable media for execution by the one or more processors that when executed is operable for and/or is otherwise included in identifying a second protocol address that identifies the second node. For example, the arrangements in FIG. 117A and FIG. 118 each include a net-manager component that is operable for and/or is otherwise included in identifying a second protocol address that identifies the second node.

With reference to FIG. 129, a block 601608 illustrates that the method includes at least one of discarding the first data, sending the first data to the second node by sending the data in a first data unit, of a network protocol, that includes an address field including the second protocol address, sending the first data in a data unit of a network protocol that includes an address field that includes a protocol address of node that sent the data to deliver to the second node; and performing an operation to record the receiving of the first protocol address. The systems each include one or more processors and logic encoded in one or more computer readable media for execution by the one or more processors that when executed is operable for and/or is otherwise included in at least one of discarding the first data, sending the first data to the second node by sending the data in a first data unit, of a network protocol, that includes an address field including the second protocol address, sending the first data in a data unit of a network protocol that includes an address field that includes a protocol address of node that sent the data to deliver to the second node; and performing an operation to record the receiving of the first protocol address. For example, the arrangements in FIG. 117A and FIG. 118 each include a net-manager component that is operable for and/or is otherwise included in at least one of discarding the first data, sending the first data to the second node by sending the data in a first data unit, of a network protocol, that includes an address field including the second protocol address, sending the first data in a data unit of a network protocol that includes an address field that includes a protocol address of node that sent the data to deliver to the second node; and performing an operation to record the receiving of the first protocol address.

FIG. 117A and FIG. 118 each illustrate an arrangement of components that may operate in an execution environment to perform a method illustrated in FIG. 130. The systems illustrated by the arrangements each include a processor, such as processor 60104, to process an instruction in at least one of a routing component, a net-manager component, a data-out component, and a data-out component With reference to FIG. 130, a block 601702 illustrates that the method includes receiving a first protocol address identifying a first network path for sending first data to a second node identified by the first protocol address. The systems each include one or more processors and logic encoded in one or more computer readable media for execution by the one or more processors that when executed is operable for and/or is otherwise included in receiving a first protocol address identifying a first network path for sending first data to a second node identified by the first protocol address. For example, the arrangements in FIG. 117A and FIG. 118 each include a routing component that is operable for and/or is otherwise included in receiving a first protocol address identifying a first network path for sending first data to a second node identified by the first protocol address.

With reference to FIG. 130, a block 601704 illustrates that the method includes identifying a second protocol address that identifies the second network path and that identifies the second node. The systems each include one or more processors and logic encoded in one or more computer readable media for execution by the one or more processors that when executed is operable for and/or is otherwise included in identifying a second protocol address that identifies the second network path and that identifies the second node. For example, the arrangements in FIG. 117A and FIG. 118 each include a net-manager component that is operable for and/or is otherwise included in identifying a second protocol address that identifies the second network path and that identifies the second node.

With reference to FIG. 130, a block 601706 illustrates that the method includes sending the first data via the first network path to the second node by sending the first data in a first data unit, of a network protocol, that includes an address field including the first protocol address. The systems each include one or more processors and logic encoded in one or more computer readable media for execution by the one or more processors that when executed is operable for and/or is otherwise included in sending the first data via the first network path to the second node by sending the first data in a first data unit, of a network protocol, that includes an address field including the first protocol address. For example, the arrangements in FIG. 117A and FIG. 118 each include a data-out component that is operable for and/or is otherwise included in sending the first data via the first network path to the second node by sending the first data in a first data unit, of a network protocol, that includes an address field including the first protocol address.

With reference to FIG. 130, a block 601708 illustrates that the method includes sending the first data via the second network path to the second node by sending the first data in a first data unit, of a network protocol, that includes an address field including the second protocol address. The systems each include one or more processors and logic encoded in one or more computer readable media for execution by the one or more processors that when executed is operable for and/or is otherwise included in sending the first data via the second network path to the second node by sending the first data in a first data unit, of a network protocol, that includes an address field including the second protocol address. For example, the arrangements in FIG. 117A and FIG. 118 each include a data-out component that is operable for and/or is otherwise included in sending the first data via the second network path to the second node by sending the first data in a first data unit, of a network protocol, that includes an address field including the second protocol address.

In an aspect, a source node and/or one or more path nodes included in transmitting data via a network protocol from the source node to a destination node identified by a protocol address of the network protocol, may send the data by more than one route. Some of the data may be sent by one route and some by another. Network efficiency may be improved by sending each packet via a route determined to be optimal for the packet according to a specified criterion. In another aspect, to increase reliability the same data may be sent via more than one route. This ensures data traverses the fastest route in a group of routes and increases the likelihood that the data will reach its destination without resending the data.

In FIG. 119C, the second node 60602*c*2 may send first data via one or more data units of a network protocol to deliver the data to the sixth node 60602*c*6 identified in the data unit(s) by a protocol address, which may be a source-route protocol address or not. The data may be received by a seventh path node 60604*c*7. The seventh path node 60604*c*7 may, based on an attribute of the data, a route to the sixth node 60602*c*6, and/or other suitable criterion, may send some or all of the data via a first route identified by the protocol address "602.603.602.601.602" and may send some or all of the data via a second route identified by the protocol address "600.602".

As described in the previous paragraph, a hop may be assigned an identifier that is shared by the pair of nodes in the hop. Thus, a sequence of hop identifiers may serve as a source-route protocol address in one address space when processed in one order of the sequence and may serve as another source-route protocol address specific for another node when processed according to another order of the sequence.

FIG. 117A and FIG. 118 each illustrate an arrangement of components that may operate in an execution environment to perform a method illustrated in FIG. 131. The systems illustrated by the arrangements each include a processor, such as processor 60104, to process an instruction in at least one of a routing component, a net-manager component, a net-monitor component, a routing component, and a data-out component.

With reference to FIG. 131, a block 601802 illustrates that the method includes detecting, by a current node, first data to send via a first network protocol to an identified second node. The systems each include one or more processors and logic encoded in one or more computer readable media for execution by the one or more processors that when executed is operable for and/or is otherwise included in detecting, by a current node, first data to send via a first network protocol to an identified second node. For example, the arrangements in FIG. 117A and FIG. 118 each include a routing component that is operable for and/or is otherwise included in detecting, by a current node, first data to send via a first network protocol to an identified second node.

With reference to FIG. 131, a block 601804 illustrates that the method includes selecting a first routing metric from a plurality of routing metrics, wherein the selecting is based on a data unit of a second network protocol included in the first data, a protocol address of the second network protocol identifying a protocol endpoint of the second network protocol in the second node, and type of data in the first data. The systems each include one or more processors and logic encoded in one or more computer readable media for execution by the one or more processors that when executed is operable for and/or is otherwise included in selecting a first routing metric from a plurality of routing metrics, wherein the selecting is based on a data unit of a second network protocol included in the first data, a protocol address of the second network protocol identifying a protocol endpoint of the second network protocol in the second node, and type of data in the first data. For example, the arrangements in FIG. 117A and FIG. 118 each include a net-manager component that is operable for and/or is otherwise included in selecting a first routing metric from a plurality of routing metrics, wherein the selecting is based on a data unit of a second network protocol included in the first data, a protocol address of the second network protocol identifying a protocol endpoint of the second network protocol in the second node, and type of data in the first data.

With reference to FIG. 131, a block 601806 illustrates that the method includes identifying, based on the first routing metric, a first network path from a plurality of network paths that communicatively couple the current node and the second node. The systems each include one or more processors and logic encoded in one or more computer readable media for execution by the one or more processors that when executed is operable for and/or is otherwise included in identifying, based on the first routing metric, a first network path from a plurality of network paths that communicatively couple the current node and the second node. For example, the arrangements in FIG. 117A and FIG. 118 each include a net-monitor component 60506 that is operable for and/or is otherwise included in identifying, based on the first routing metric, a first network path from a plurality of network paths that communicatively couple the current node and the second node.

With reference to FIG. 131, a block 601808 illustrates that the method includes determining a first protocol address of a network protocol, wherein the first protocol address identifies the first network path. The systems each include one or more processors and logic encoded in one or more computer readable media for execution by the one or more processors that when executed is operable for and/or is otherwise included in determining a first protocol address of a network protocol, wherein the first protocol address identifies the first network path. For example, the arrangements in FIG. 117A and FIG. 118 each include a routing component that is operable for and/or is otherwise included in determining a first protocol address of a network protocol, wherein the first protocol address identifies the first network path.

With reference to FIG. 131, a block 601810 illustrates that the method includes sending the first data via the first network path to the second node by sending the data in a first data unit, of the network protocol, that includes an address field including the first protocol address. The systems each include one or more processors and logic encoded in one or more computer readable media for execution by the one or more processors that when executed is operable for and/or is otherwise included in sending the first data via the first network path to the second node by sending the data in a first data unit, of the network protocol, that includes an address field including the first protocol address. For example, the arrangements in FIG. 117A and FIG. 118 each include a data-out component that is operable for and/or is otherwise included in sending the first data via the first network path to the second node by sending the data in a first data unit, of the network protocol, that includes an address field including the first protocol address.

FIG. 118 illustrates an arrangement of components that may operate in an execution environment to perform a method illustrated in FIG. 132. The system illustrated by the arrangement includes a data-in component 60502, a routing component 60504, a net-manager component 60506, an address space component 60508, and a data-out component 60510. A suitable execution environment includes a processor, such as processor 60104, to process an instruction in at least one of includes a data-in component, a routing component, a net-manager component, an address space component, and a data-out component.

With reference to FIG. 132, a block 601902 illustrates that the method includes receiving, by a path node, first data in a first data unit of a network protocol to route to a second node identified by a first protocol address, wherein the first protocol address is received in an address field of the first data unit. The system includes one or more processors and logic encoded in one or more computer readable media for execution by the one or more processors that when executed is operable for and/or is otherwise included in receiving, by a path node, first data in a first data unit of a network protocol to route to a second node identified by a first protocol address, wherein the first protocol address is received in an address field of the first data unit. For example, the arrangement in FIG. 118 includes a data-in component 60502 that is operable for and/or is otherwise included in receiving, by a path node, first data in a first data unit of a network protocol to route to a second node identified by a first protocol address, wherein the first protocol address is received in an address field of the first data unit.

With reference to FIG. 132, a block 601904 illustrates that the method includes detecting a routing field in the first data unit. The system includes one or more processors and logic encoded in one or more computer readable media for execution by the one or more processors that when executed is operable for and/or is otherwise included in detecting a routing field in the first data unit. For example, the arrangement in FIG. 118 includes a routing component 60504 that is operable for and/or is otherwise included in detecting a routing field in the first data unit.

With reference to FIG. 132, a block 601906 illustrates that the method includes determining, in response to detecting the routing field, a source-route to the second node. The system includes one or more processors and logic encoded in one or more computer readable media for execution by the one or more processors that when executed is operable for and/or is otherwise included in determining, in response to detecting the routing field, a source-route to the second node. For example, the arrangement in FIG. 118 includes a net-manager component 60506 that is operable for and/or is otherwise included in determining, in response to detecting the routing field, a source-route to the second node.

With reference to FIG. 132, a block 601908 illustrates that the method includes identifying a second protocol address that identifies the source-route. The system includes one or more processors and logic encoded in one or more computer readable media for execution by the one or more processors that when executed is operable for and/or is otherwise included in identifying a second protocol address that identifies the source-route. For example, the arrangement in FIG. 118 includes an address space component 60508 that is operable for and/or is otherwise included in identifying a second protocol address that identifies the source-route.

With reference to FIG. 132, a block 601910 illustrates that the method includes sending the first data via the second network path to the second node by sending the data in a second data unit, of a network protocol, that includes an address field including the second protocol address. The system includes one or more processors and logic encoded in one or more computer readable media for execution by the one or more processors that when executed is operable for and/or is otherwise included in sending the first data via the second network path to the second node by sending the data in a second data unit, of a network protocol, that includes an address field including the second protocol address. For example, the arrangement in FIG. 118 includes a data-out component 60510 that is operable for and/or is otherwise included in sending the first data via the second network path to the second node by sending the data in a second data unit, of a network protocol, that includes an address field including the second protocol address.

With reference to FIG. 133, a flow diagram is provided illustrating another method according to an aspect of the subject matter described herein. A block 602002 illustrates that the method includes receiving, by a path node, first data in a first data unit of a network protocol to route to a second node identified by a first protocol address, wherein the first protocol address is received in an address field of the first data unit. A block 602004 illustrates that the method includes detecting a routing field in the first data unit. A block 602006 illustrates that the method includes determining, in response to detecting the routing field, a source-route to the second node. A block 602008 illustrates that the method includes identifying a second protocol address that identifies the source-route. A block 602010 illustrates that the method includes sending the first data via the second network path to the second node by sending the data in a second data unit, of a network protocol, that includes an address field including the second protocol address.

FIG. 120D includes an address representation **60702*d* illustrating aspects of a schema for representing path information based on identifiers of network interfaces or other suitable pairs of numbers for identifying protocol endpoints of a hop and/or a network path. A protocol address field 60706*d* includes path information identifying a network path for communicating data between a pair of path end nodes in the network path. FIG. 120D illustrates that an address representation 60702*d* may include one or more address separator fields 60704*d* that correspond to and/or otherwise identify respective one or more portions of the protocol address field 60706*d*** that are based on a pair of identifiers of protocol endpoints.

An address separator field **60704*d* includes series of one valued bits and zero valued bits. A change from a one value to a zero value and vice versa may indicate a boundary that separates protocol endpoint identifiers and/or interface identifiers. An address separator field 60704*d*1 includes one zero valued bit followed by four one valued bits. The zero valued bit may be defined to indicate that a first network interface in a first hop identifier is one bit long with a corresponding position in the protocol address field 60706*d*.**

FIG. 120D identifies the first interface identifier as the number '1' in base ten. The four one valued bits in the first address separator field **60704*d*1 may be similarly defined to identify the location of a second interface identifier in the first hop identifier. The second interface identifier, as illustrated in FIG. 120D, has the value '10' in base ten. The first hop identifier includes the numbers '1' and '10'. The first hop identifier may be represented as a string, "1-10". A second hop identifier is located by the end of the series of four one valued bits in the first address separator field 60704*d*1 to a series of three zero valued bits that identify a boundary of a second address separator field 60704*d*2 for second hop information identifying a second hop identifier, and the three zero valued bits also identify the location of a first interface identifier in second hop information in the protocol address field 60706*d*. Two subsequent one valued bits identify the location in the protocol address field 60706*d* of a second interface identifier in the second hop information. The second hop identifier includes the numbers '7' and '0' in base ten. The remaining address separator fields 60704*d* may be processed similarly. The protocol address illustrated FIG. 120**D may be represented textually as "601-6010.606-600.600-605.601-6014.605-600.606".

Note that the address separator field **60704*d*6 does not identify a pair of identifiers and is similar to address separator fields 60704*c* in FIG. 120C. Alternatively, an address separator field 60704*d* may correspond to a portion of a protocol address field 60706*d*** that identifies a scoped address. This is illustrated to demonstrate that protocol addresses may be uniform or non-uniform in their format and content.

In an aspect, in changing a protocol address, a received protocol address may be replaced by a protocol address defined by a different schema. For example, FIG. 6A and FIG. 119B illustrate networks that support protocol addresses as illustrated in each of FIGS. 120A-E.

In FIG. 119C, a third hop **60608*c*3 between a seventh path node 60604*c*7 and an eighth path node 60604*c*8 may be identified with respect to a first node 60602*c*1 by a hop identifier relative to the first node 60602*c*1. The sequence "600.601.603.602.603" identifies the third hop 60608*c*1 that includes a seventh path node 60604*c*7 and the eighth path node 60604*c*8. The third hop 60608*c*3 identified with respect to a sixth path node 60604*c*6 may be identified by the sequence, "600.603". The number, '603', is an identifier that, relative to the seventh path node 60604*c*7, identifies the third hop 60608*c*3**.

FIG. 119C illustrates that the third hop **60608*c*3 includes the seventh path node 60604*d*7 and the eighth path node 60604*c*8. A third hop identifier relative to the first region 60606*c*1 may be represented as "601.600.601.600.603", as FIG. 119C illustrates. The third hop identifier includes a hop identifier '3' that identifies the third hop 60608*c*3 with respect to an eighth path node 60604*c*8. "601.600.601.600.603" identifies a route to the third hop for the nodes in the first region 60606*c*1. The seventh path node 60604*c*7 is included in a network path from the first node 60602*c*1 to the eighth path node 60604*c*8 that includes the third hop 60608*c*3**.

Not only are nodes identifiable via source-route protocol addresses, but a hop in a network may be identified by a source-route identifier. Such addresses may be changed in whole or in part by any node included in transferring data between nodes in a network as described above.

A protocol address that for a network protocol identifies a second node to a first node may include an identifier of a network path included in communicatively coupling a first node and a second node. For example, with respect to FIGS. 120A-E and FIG. 119C, a sequence, "60101-600.601.603.602.603.601-602", may represent a protocol address that identifies an eleventh node **60602*c*11 to a first node 60602*c*1 in a network 60600*c*. The address may be for a network layer protocol and/or one or more link layer protocols supported by portions of the network 60600*c*. A protocol address that for a network protocol identifies a second node to a first node may include first hop information identifying a first hop including a first pair of communicatively coupled nodes included in communicatively coupling the first node and the second node. The sequence, "60101-600.601.603.602.603.600-602", described in the previous paragraph includes the hop identifier "1" which identifies a fifth hop 60608*c*5 in the network 60600*c*. The fifth hop 60602*c*5 includes a fourth path node 60604*c*4 and a second path node 60604*c*2, included in a network path that communicatively couples the first node 60602*c*1 and the eleventh node 60602*c*11**.

A hop identifier in a source-route protocol address may include a network interface identifier of a network interface of a node in the hop. In network 60600*b* in FIG. 119B, a sequence, "60151-60254.60151-6010", identifies a second node 60602*b*2 to a first node 60602*b*1. "60151-60254" is a scoped hop identifier that in the first network region 60606*b*1 identifies a first hop 60608*b*1 including the first node 60602*b*1 and a first path node 60604*b*1. "151-10" is a hop identifier that in the second network region 60606*b*2 identifies a fourth hop 60608*b*4 including the first path node 60604*b*1 and the second node 60602*b*2.

A source-route protocol address that for a network protocol identifies a second node to a first node may be defined by a network protocol to include a network interface identifier identifying a network interface included in communicatively coupling a first node and a second node. With respect to FIG. 119B and the previous paragraph, '60254' is an identifier of a network interface of the first path node 60604*b*1 in the first network region. With respect to FIG. 119C, '2' is a network interface identifier of the eleventh path node 60602*c*11 in a fourth network region 60606*c*4. FIG. 119C further illustrates that '3' may identify a network interface of a seventh path node 60604*c*7 to an eighth path node 60604*c*8 in a third hop 60608*c*3. '3' may alternatively or additionally identify a network interface of the eighth path node 60604*c*8 to the seventh path node 60604*c*7 in the third hop 60608*c*3

A network may be represented in a topological space. The domain name system includes a hierarchical representation of the Internet, but currently neither the hierarchical structure of the name space nor the hierarchical structure of the IP address space represents communicatively couplings and/or routes in the network.

As described with respect to FIGS. 120A-E and FIGS. 119A-C, identifying a source-route protocol address that for a network protocol identifies a second node to a first node may include identifying a second location of the second node in a topological space relative to a first location in the topological space of the first node. The source-route protocol address identifies the second location relative to the first location. The source-route protocol address may identify a path location of a path node represented in the topological space, wherein the path location is included in a path in the topological space that connects the first location and the second location. The source-route protocol address that for a network protocol identifies a second node to a first node may identify a sequence of locations in the path in the topological space. Such addresses may be changed in whole or in part by any node included in transferring data between nodes in a network.

A source-route protocol address be identified by an address type field and/or option field in a data unit header of a network protocol. The address type may identify a loose source route option, a strict source route option, a record route option, routing type zero, a routing type four, and the like.

A source-route protocol address may be included one or more of a scope-specific protocol address, a scoped protocol address, a path-based protocol address, a hop-based protocol address, and a network interface-based protocol address.

1. Introduction 1.1. Motivation The Internet Protocol is designed for use in interconnected systems of packet-switched computer communication networks. Such a system has been called a "catenet" [1]. The internet protocol provides for transmitting blocks of data called datagrams from sources to destinations, where sources and destinations are hosts identified by fixed length addresses. The internet protocol also provides for fragmentation and reassembly of long datagrams, if necessary, for transmission through "small packet" networks. 1.2. Scope The internet protocol is specifically limited in scope to provide the functions necessary to deliver a package of bits (an internet datagram) from a source to a destination over an interconnected system of networks. There are no mechanisms to augment end-to-end data reliability, flow control, sequencing, or other services commonly found in host-to-host protocols. The internet protocol can capitalize on the services of its supporting networks to provide various types and qualities of service. 1.3. Interfaces This protocol is called on by host-to-host protocols in an internet environment. This protocol calls on local network protocols to carry the internet datagram to the next gateway or destination host. For example, a TCP module would call on the internet module to take a TCP segment (including the TCP header and user data) as the data portion of an internet datagram. The TCP module would provide the addresses and other parameters in the internet header to the internet module as arguments of the call. The internet module would then create an internet datagram and call on the local network interface to transmit the internet datagram. In the ARPANET case, for example, the internet module would call on a local net module which would add the 1822 leader [2] to the internet datagram creating an ARPANET message to transmit to the IMP. The ARPANET address would be derived from the internet address by the local network interface and would be the address of some host in the ARPANET, that host might be a gateway to other networks. 1.4. Operation The internet protocol implements two basic functions: addressing and fragmentation. The internet modules use the addresses carried in the internet header to transmit internet datagrams toward their destinations. The selection of a path for transmission is called routing. The internet modules use fields in the internet header to fragment and reassemble internet datagrams when necessary for transmission through "small packet" networks. The model of operation is that an internet module resides in each host engaged in internet communication and in each gateway that interconnects networks. These modules share common rules for interpreting address fields and for fragmenting and assembling internet datagrams. In addition, these modules (especially in gateways) have procedures for making routing decisions and other functions. The internet protocol treats each internet datagram as an independent entity unrelated to any other internet datagram. There are no connections or logical circuits (virtual or otherwise). The internet protocol uses four key mechanisms in providing its service: Type of Service, Time to Live, Options, and Header Checksum. The Type of Service is used to indicate the quality of the service desired. The type of service is an abstract or generalized set of parameters which characterize the service choices provided in the networks that make up the internet. This type of service indication is to be used by gateways to select the actual transmission parameters for a particular network, the network to be used for the next hop, or the next gateway when routing an internet datagram. The Time to Live is an indication of an upper bound on the lifetime of an internet datagram. It is set by the sender of the datagram and reduced at the points along the route where it is processed. If the time to live reaches zero before the internet datagram reaches its destination, the internet datagram is destroyed. The time to live can be thought of as a self destruct time limit. The Options provide for control functions needed or useful in some situations but unnecessary for the most common communications. The options include provisions for timestamps, security, and special routing. The Header Checksum provides a verification that the information used in processing internet datagram has been transmitted correctly. The data may contain errors. If the header checksum fails, the internet datagram is discarded at once by the entity which detects the error. The internet protocol does not provide a reliable communication facility. There are no acknowledgments either end-to-end or hop-by-hop. There is no error control for data, only a header checksum. There are no retransmissions. There is no flow control. Errors detected may be reported via the Internet Control Message Protocol (ICMP) [3] which is implemented in the internet protocol module.

2. Overview 2.1. Relation to Other Protocols The diagram corresponding with FIG. 134A illustrates the place of the internet protocol in the protocol hierarchy. Internet protocol interfaces on one side to the higher level host-to-host protocols and on the other side to the local network protocol. In this context a "local network" may be a small network in a building or a large network such as the ARPANET. 2.2. Model of Operation The model of operation for transmitting a datagram from one application program to another is illustrated by the following scenario: We suppose that this transmission will involve one intermediate gateway. The sending application program prepares its data and calls on its local internet module to send that data as a datagram and passes the destination address and other parameters as arguments of the call. The internet module prepares a datagram header and attaches the data to it. The internet module determines a local network address for this internet address, in this case it is the address of a gateway. It sends this datagram and the local network address to the local network interface. The local network interface creates a local network header, and attaches the datagram to it, then sends the result via the local network. The datagram arrives at a gateway host wrapped in the local network header, the local network interface strips off this header, and turns the datagram over to the internet module. The internet module determines from the internet address that the datagram is to be forwarded to another host in a second network. The internet module determines a local net address for the destination host. It calls on the local network interface for that network to send the datagram. This local network interface creates a local network header and attaches the datagram sending the result to the destination host. At this destination host the datagram is stripped of the local net header by the local network interface and handed to the internet module. The internet module determines that the datagram is for an application program in this host. It passes the data to the application program in response to a system call, passing the source address and other parameters as results of the call. Such functions are exemplified in FIG. 134B.

2.3. Function Description The function or purpose of Internet Protocol is to move datagrams through an interconnected set of networks. This is done by passing the datagrams from one internet module to another until the destination is reached. The internet modules reside in hosts and gateways in the internet system. The datagrams are routed from one internet module to another through individual networks based on the interpretation of an internet address. Thus, one important mechanism of the internet protocol is the internet address. In the routing of messages from one internet module to another, datagrams may need to traverse a network whose maximum packet size is smaller than the size of the datagram. To overcome this difficulty, a fragmentation mechanism is provided in the internet protocol. Addressing A distinction is made between names, addresses, and routes [4]. A name indicates what we seek. An address indicates where it is. A route indicates how to get there. The internet protocol deals primarily with addresses. It is the task of higher level (i.e., host-to-host or application) protocols to make the mapping from names to addresses. The internet module maps internet addresses to local net addresses. It is the task of lower level (i.e., local net or gateways) procedures to make the mapping from local net addresses to routes. Addresses are fixed length of four octets (32 bits). An address begins with a network number, followed by local address (called the "rest" field). There are three formats or classes of internet addresses: in class a, the high order bit is zero, the next 7 bits are the network, and the last 24 bits are the local address; in class b, the high order two bits are one-zero, the next 14 bits are the network and the last 16 bits are the local address; in class c, the high order three bits are one-one-zero, the next 21 bits are the network and the last 8 bits are the local address. Care must be taken in mapping internet addresses to local net addresses; a single physical host must be able to act as if it were several distinct hosts to the extent of using several distinct internet addresses. Some hosts will also have several physical interfaces (multi-homing). That is, provision must be made for a host to have several physical interfaces to the network with each having several logical internet addresses. Examples of address mappings may be found in "Address Mappings" [5]. Fragmentation Fragmentation of an internet datagram is necessary when it originates in a local net that allows a large packet size and must traverse a local net that limits packets to a smaller size to reach its destination. An internet datagram can be marked "don't fragment." Any internet datagram so marked is not to be internet fragmented under any circumstances. If internet datagram marked don't fragment cannot be delivered to its destination without fragmenting it, it is to be discarded instead. Fragmentation, transmission and reassembly across a local network which is invisible to the internet protocol module is called intranet fragmentation and may be used [6]. The internet fragmentation and reassembly procedure needs to be able to break a datagram into an almost arbitrary number of pieces that can be later reassembled. The receiver of the fragments uses the identification field to ensure that fragments of different datagrams are not mixed. The fragment offset field tells the receiver the position of a fragment in the original datagram. The fragment offset and length determine the portion of the original datagram covered by this fragment. The more-fragments flag indicates (by being reset) the last fragment. These fields provide sufficient information to reassemble datagrams. The identification field is used to distinguish the fragments of one datagram from those of another. The originating protocol module of an internet datagram sets the identification field to a value that must be unique for that source-destination pair and protocol for the time the datagram will be active in the internet system. The originating protocol module of a complete datagram sets the more-fragments flag to zero and the fragment offset to zero. To fragment a long internet datagram, an internet protocol module (for example, in a gateway), creates two new internet datagrams and copies the contents of the internet header fields from the long datagram into both new internet headers. The data of the long datagram is divided into two portions on a 8 octet (64 bit) boundary (the second portion might not be an integral multiple of 8 octets, but the first must be). Call the number of 8 octet blocks in the first portion NFB (for Number of Fragment Blocks). The first portion of the data is placed in the first new internet datagram, and the total length field is set to the length of the first datagram. The more-fragments flag is set to one. The second portion of the data is placed in the second new internet datagram, and the total length field is set to the length of the second datagram. The more-fragments flag carries the same value as the long datagram. The fragment offset field of the second new internet datagram is set to the value of that field in the long datagram plus NFB. This procedure can be generalized for an n-way split, rather than the two-way split described. To assemble the fragments of an internet datagram, an internet protocol module (for example at a destination host) combines internet datagrams that all have the same value for the four fields: identification, source, destination, and protocol. The combination is done by placing the data portion of each fragment in the relative position indicated by the fragment offset in that fragment's internet header. The first fragment will have the fragment offset zero, and the last fragment will have the more-fragments flag reset to zero. 2.4. Gateways Gateways implement internet protocol to forward datagrams between networks. Gateways also implement the Gateway to Gateway Protocol (GGP) [7] to coordinate routing and other internet control information. In a gateway the higher level protocols need not be implemented and the GGP functions are added to the IP module. Such configuration is also found in FIG. 134C.

3. Specification 3.1. Internet Header Format A summary of the contents of the internet header is found in FIG. 134D. Note that each tick mark represents one bit position. Version: 4 bits The Version field indicates the format of the internet header. This document describes version 4. IHL: 4 bits Internet Header Length is the length of the internet header in 32 bit words, and thus points to the beginning of the data. Note that the minimum value for a correct header is 5. Type of Service: 8 bits The Type of Service provides an indication of the abstract parameters of the quality of service desired. These parameters are to be used to guide the selection of the actual service parameters when transmitting a datagram through a particular network. Several networks offer service precedence, which somehow treats high precedence traffic as more important than other traffic (generally by accepting only traffic above a certain precedence at time of high load). The major choice is a three way tradeoff between low-delay, high-reliability, and high-throughput, as shown in FIG. 134E. The use of the Delay, Throughput, and Reliability indications may increase the cost (in some sense) of the service. In many networks better performance for one of these parameters is coupled with worse performance on another. Except for very unusual cases at most two of these three indications should be set. The type of service is used to specify the treatment of the datagram during its transmission through the internet system. Example mappings of the internet type of service to the actual service provided on networks such as AUTODIN II, ARPANET, SATNET, and PRNET is given in "Service Mappings" [8]. The Network Control precedence designation is intended to be used within a network only. The actual use and control of that designation is up to each network. The Internetwork Control designation is intended for use by gateway control originators only. If the actual use of these precedence designations is of concern to a particular network, it is the responsibility of that network to control the access to, and use of, those precedence designations. Total Length: 16 bits Total Length is the length of the datagram, measured in octets, including internet header and data. This field allows the length of a datagram to be up to 65,535 octets. Such long datagrams are impractical for most hosts and networks. All hosts must be prepared to accept datagrams of up to 576 octets (whether they arrive whole or in fragments). It is recommended that hosts only send datagrams larger than 576 octets if they have assurance that the destination is prepared to accept the larger datagrams. The number 576 is selected to allow a reasonable sized data block to be transmitted in addition to the required header information. For example, this size allows a data block of 512 octets plus 64 header octets to fit in a datagram. The maximal internet header is 60 octets, and a typical internet header is 20 octets, allowing a margin for headers of higher level protocols. Identification: 16 bits An identifying value assigned by the sender to aid in assembling the fragments of a datagram. Flags: 3 bits is shown in FIG. 134F. Fragment Offset: 13 bits This field indicates where in the datagram this fragment belongs. The fragment offset is measured in units of 8 octets (64 bits). The first fragment has offset zero. Time to Live: 8 bits This field indicates the maximum time the datagram is allowed to remain in the internet system. If this field contains the value zero, then the datagram must be destroyed. This field is modified in internet header processing. The time is measured in units of seconds, but since every module that processes a datagram must decrease the TTL by at least one even if it process the datagram in less than a second, the TTL must be thought of only as an upper bound on the time a datagram may exist. The intention is to cause undeliverable datagrams to be discarded, and to bound the maximum datagram lifetime. Protocol: 8 bits This field indicates the next level protocol used in the data portion of the internet datagram. The values for various protocols are specified in "Assigned Numbers" [9]. Header Checksum: 16 bits A checksum on the header only. Since some header fields change (e.g., time to live), this is recomputed and verified at each point that the internet header is processed. The checksum algorithm is: The checksum field is the 16 bit one's complement of the one's complement sum of all 16 bit words in the header. For purposes of computing the checksum, the value of the checksum field is zero. This is a simple to compute checksum and experimental evidence indicates it is adequate, but it is provisional and may be replaced by a CRC procedure, depending on further experience. Source Address: 32 bits The source address. See section 3.2. Destination Address: 32 bits The destination address. See section 3.2. Options: variable The options may appear or not in datagrams. They must be implemented by all IP modules (host and gateways). What is optional is their transmission in any particular datagram, not their implementation. In some environments the security option may be required in all datagrams. The option field is variable in length. There may be zero or more options. There are two cases for the format of an option: Case 1: A single octet of option-type. Case 2: An option-type octet, an option-length octet, and the actual option-data octets. The option-length octet counts the option-type octet and the option-length octet as well as the option-data octets. The option-type octet is viewed as having 3 fields: 1 bit copied flag, 2 bits option class, 5 bits option number. The copied flag indicates that this option is copied into all fragments on fragmentation. 0=not copied 1=copied The option classes are: 0=control 1=reserved for future use 2=debugging and measurement 3=reserved for future use The following internet options are defined, as shown in FIG. 134G: Specific Option Definitions End of Option List (FIG. 134U). This option indicates the end of the option list. This might not coincide with the end of the internet header according to the internet header length. This is used at the end of all options, not the end of each option, and need only be used if the end of the options would not otherwise coincide with the end of the internet header. May be copied, introduced, or deleted on fragmentation, or for any other reason. No Operation (FIG. 134V). This option may be used between options, for example, to align the beginning of a subsequent option on a 32 bit boundary. May be copied, introduced, or deleted on fragmentation, or for any other reason. Security This option provides a way for hosts to send security, compartmentation, handling restrictions, and TCC (closed user group) parameters. The format for this option is seen in FIG. 134H. Security (S field): 16 bits Specifies one of 16 levels of security (eight of which are reserved for future use). 00000000 00000000—Unclassified; 11110001 00110101—Confidential; 01111000 10011010—EFTO; 10111100 01001101—MMMM; 01011110 00100110—PROG; 10101111 00010011—Restricted; 11010111 10001000—Secret; 01101011 11000101—Top Secret; 00110101 11100010—(Reserved for future use); 10011010 11110001—(Reserved for future use); 01001101 01111000—(Reserved for future use); 00100100 10111101—(Reserved for future use); 00010011 01011110—(Reserved for future use); 10001001 10101111—(Reserved for future use); 11000100 11010110—(Reserved for future use); 11100010 01101011—(Reserved for future use); Compartments (C field): 16 bits An all zero value is used when the information transmitted is not compartmented. Other values for the compartments field may be obtained from the Defense Intelligence Agency. Handling Restrictions (H field): 16 bits The values for the control and release markings are alphanumeric digraphs and are defined in the Defense Intelligence Agency Manual DIAM 65-19, "Standard Security Markings". Transmission Control Code (TCC field): 24 bits Provides a means to segregate traffic and define controlled communities of interest among subscribers. The TCC values are trigraphs, and are available from HQ DCA Code 530. Must be copied on fragmentation. This option appears at most once in a datagram. Loose Source and Record Route (FIG. 134I): the loose source and record route (LSRR) option provides a means for the source of an internet datagram to supply routing information to be used by the gateways in forwarding the datagram to the destination, and to record the route information. The option begins with the option type code. The second octet is the option length which includes the option type code and the length octet, the pointer octet, and length-3 octets of route data. The third octet is the pointer into the route data indicating the octet which begins the next source address to be processed. The pointer is relative to this option, and the smallest legal value for the pointer is 4. A route data is composed of a series of internet addresses. Each internet address is 32 bits or 4 octets. If the pointer is greater than the length, the source route is empty (and the recorded route full) and the routing is to be based on the destination address field. If the address in destination address field has been reached and the pointer is not greater than the length, the next address in the source route replaces the address in the destination address field, and the recorded route address replaces the source address just used, and pointer is increased by four. The recorded route address is the internet module's own internet address as known in the environment into which this datagram is being forwarded. This procedure of replacing the source route with the recorded route (though it is in the reverse of the order it must be in to be used as a source route) means the option (and the IP header as a whole) remains a constant length as the datagram progresses through the internet. This option is a loose source route because the gateway or host IP is allowed to use any route of any number of other intermediate gateways to reach the next address in the route. Must be copied on fragmentation. Appears at most once in a datagram. Strict Source and Record Route (FIG. 134J): the strict source and record route (SSRR) option provides a means for the source of an internet datagram to supply routing information to be used by the gateways in forwarding the datagram to the destination, and to record the route information. The option begins with the option type code. The second octet is the option length which includes the option type code and the length octet, the pointer octet, and length-3 octets of route data. The third octet is the pointer into the route data indicating the octet which begins the next source address to be processed. The pointer is relative to this option, and the smallest legal value for the pointer is 4. A route data is composed of a series of internet addresses. Each internet address is 32 bits or 4 octets. If the pointer is greater than the length, the source route is empty (and the recorded route full) and the routing is to be based on the destination address field. If the address in destination address field has been reached and the pointer is not greater than the length, the next address in the source route replaces the address in the destination address field, and the recorded route address replaces the source address just used, and pointer is increased by four. The recorded route address is the internet module's own internet address as known in the environment into which this datagram is being forwarded. This procedure of replacing the source route with the recorded route (though it is in the reverse of the order it must be in to be used as a source route) means the option (and the IP header as a whole) remains a constant length as the datagram progresses through the internet. This option is a strict source route because the gateway or host IP must send the datagram directly to the next address in the source route through only the directly connected network indicated in the next address to reach the next gateway or host specified in the route. Must be copied on fragmentation. Appears at most once in a datagram. Record Route (FIG. 134K): the record route option provides a means to record the route of an internet datagram. The option begins with the option type code. The second octet is the option length which includes the option type code and the length octet, the pointer octet, and length-3 octets of route data. The third octet is the pointer into the route data indicating the octet which begins the next area to store a route address. The pointer is relative to this option, and the smallest legal value for the pointer is 4. A recorded route is composed of a series of internet addresses. Each internet address is 32 bits or 4 octets. If the pointer is greater than the length, the recorded route data area is full. The originating host must compose this option with a large enough route data area to hold all the address expected. The size of the option does not change due to adding addresses. The initial contents of the route data area must be zero. When an internet module routes a datagram it checks to see if the record route option is present. If it is, it inserts its own internet address as known in the environment into which this datagram is being forwarded into the recorded route beginning at the octet indicated by the pointer, and increments the pointer by four. If the route data area is already full (the pointer exceeds the length) the datagram is forwarded without inserting the address into the recorded route. If there is some room but not enough room for a full address to be inserted, the original datagram is considered to be in error and is discarded. In either case an ICMP parameter problem message may be sent to the source host [3]. Not copied on fragmentation, goes in first fragment only. Appears at most once in a datagram. Stream Identifier (FIG. 134L): this option provides a way for the 16-bit SATNET stream identifier to be carried through networks that do not support the stream concept. Must be copied on fragmentation. Appears at most once in a datagram. Internet Timestamp (FIG. 134W). The Option Length is the number of octets in the option counting the type, length, pointer, and overflow/flag octets (maximum length 40). The Pointer is the number of octets from the beginning of this option to the end of timestamps plus one (i.e., it points to the octet beginning the space for next timestamp). The smallest legal value is 5. The timestamp area is full when the pointer is greater than the length. The Overflow (oflw) [4 bits] is the number of IP modules that cannot register timestamps due to lack of space. The Flag (fig) [4 bits] values are 0—time stamps only, stored in consecutive 32-bit words, 1—each timestamp is preceded with internet address of the registering entity, 3—the internet address fields are prespecified. An IP module only registers its timestamp if it matches its own address with the next specified internet address. The Timestamp is a right-justified, 32-bit timestamp in milliseconds since midnight UT. If the time is not available in milliseconds or cannot be provided with respect to midnight UT then any time may be inserted as a timestamp provided the high order bit of the timestamp field is set to one to indicate the use of a non-standard value. The originating host must compose this option with a large enough timestamp data area to hold all the timestamp information expected. The size of the option does not change due to adding timestamps. The initial contents of the timestamp data area must be zero or internet address/zero pairs. If the timestamp data area is already full (the pointer exceeds the length) the datagram is forwarded without inserting the timestamp, but the overflow count is incremented by one. If there is some room but not enough room for a full timestamp to be inserted, or the overflow count itself overflows, the original datagram is considered to be in error and is discarded. In either case an ICMP parameter problem message may be sent to the source host [3]. The timestamp option is not copied upon fragmentation. It is carried in the first fragment. Appears at most once in a datagram. Padding: variable The internet header padding is used to ensure that the internet header ends on a 32 bit boundary. The padding is zero. 3.2. Discussion The implementation of a protocol must be robust. Each implementation must expect to interoperate with others created by different individuals. While the goal of this specification is to be explicit about the protocol there is the possibility of differing interpretations. In general, an implementation must be conservative in its sending behavior, and liberal in its receiving behavior. That is, it must be careful to send well-formed datagrams, but must accept any datagram that it can interpret (e.g., not object to technical errors where the meaning is still clear). The basic internet service is datagram oriented and provides for the fragmentation of datagrams at gateways, with reassembly taking place at the destination internet protocol module in the destination host. Of course, fragmentation and reassembly of datagrams within a network or by private agreement between the gateways of a network is also allowed since this is transparent to the internet protocols and the higher-level protocols. This transparent type of fragmentation and reassembly is termed "network-dependent" (or intranet) fragmentation and is not discussed further here. Internet addresses distinguish sources and destinations to the host level and provide a protocol field as well. It is assumed that each protocol will provide for whatever multiplexing is necessary within a host. Addressing To provide for flexibility in assigning address to networks and allow for the large number of small to intermediate sized networks the interpretation of the address field is coded to specify a small number of networks with a large number of host, a moderate number of networks with a moderate number of hosts, and a large number of networks with a small number of hosts. In addition there is an escape code for extended addressing mode. Address Formats are shown in FIG. 134M. A value of zero in the network field means this network. This is only used in certain ICMP messages. The extended addressing mode is undefined. Both of these features are reserved for future use. The actual values assigned for network addresses is given in "Assigned Numbers" [9]. The local address, assigned by the local network, must allow for a single physical host to act as several distinct internet hosts. That is, there must be a mapping between internet host addresses and network/host interfaces that allows several internet addresses to correspond to one interface. It must also be allowed for a host to have several physical interfaces and to treat the datagrams from several of them as if they were all addressed to a single host. Address mappings between internet addresses and addresses for ARPANET, SATNET, PRNET, and other networks are described in "Address Mappings" [5]. Fragmentation and Reassembly. The internet identification field (ID) is used together with the source and destination address, and the protocol fields, to identify datagram fragments for reassembly. The More Fragments flag bit (MF) is set if the datagram is not the last fragment. The Fragment Offset field identifies the fragment location, relative to the beginning of the original unfragmented datagram. Fragments are counted in units of 8 octets. The fragmentation strategy is designed so than an unfragmented datagram has all zero fragmentation information (MF=0, fragment offset=0). If an internet datagram is fragmented, its data portion must be broken on 8 octet boundaries. This format allows 2**13=8192 fragments of 8 octets each for a total of 65,536 octets. Note that this is consistent with the datagram total length field (of course, the header is counted in the total length and not in the fragments). When fragmentation occurs, some options are copied, but others remain with the first fragment only. Every internet module must be able to forward a datagram of 68 octets without further fragmentation. This is because an internet header may be up to 60 octets, and the minimum fragment is 8 octets. Every internet destination must be able to receive a datagram of 576 octets either in one piece or in fragments to be reassembled. The fields which may be affected by fragmentation include: (1) options field (2) more fragments flag (3) fragment offset (4) internet header length field (5) total length field (6) header checksum If the Don't Fragment flag (DF) bit is set, then internet fragmentation of this datagram is NOT permitted, although it may be discarded. This can be used to prohibit fragmentation in cases where the receiving host does not have sufficient resources to reassemble internet fragments. One example of use of the Don't Fragment feature is to down line load a small host. A small host could have a boot strap program that accepts a datagram stores it in memory and then executes it. The fragmentation and reassembly procedures are most easily described by examples. The following procedures are example implementations. General notation in the following pseudo programs: "=<" means "less than or equal", "#" means "not equal", "=" means "equal", "←" means "is set to". Also, "x to y" includes x and excludes y; for example, "4 to 7" would include 4, 5, and 6 (but not 7). An Example Fragmentation Procedure The maximum sized datagram that can be transmitted through the next network is called the maximum transmission unit (MTU). If the total length is less than or equal the maximum transmission unit then submit this datagram to the next step in datagram processing; otherwise cut the datagram into two fragments, the first fragment being the maximum size, and the second fragment being the rest of the datagram. The first fragment is submitted to the next step in datagram processing, while the second fragment is submitted to this procedure in case it is still too large. Notation: FO—Fragment Offset IHL—Internet Header Length DF—Don't Fragment flag MF—More Fragments flag TL—Total Length OFO—Old Fragment Offset OIHL—Old Internet Header Length OMF—Old More Fragments flag OTL—Old Total Length NFB—Number of Fragment Blocks MTU—Maximum Transmission Unit Procedure: IF TL=<MTU THEN Submit this datagram to the next step in datagram processing ELSE IF DF=1 THEN discard the datagram ELSE To produce the first fragment: (1) Copy the original internet header; (2) OIHL←IHL; OTL←TL; OFO←FO; OMF←MF; (3) NFB←(MTU−IHL*4)/8; (4) Attach the first NFB*8 data octets; (5) Correct the header: MF←1; TL←(IHL*4)+(NFB*8); Recompute Checksum; (6) Submit this fragment to the next step in datagram processing; To produce the second fragment: (7) Selectively copy the internet header (some options are not copied, see option definitions); (8) Append the remaining data; (9) Correct the header: IHL<-(((OIHL*4)−(length of options not copied))+3)/4; TL←OTL−NFB*8−(OIHL−IHL)*4); FO←OFO+NFB; MF←OMF; Recompute Checksum; (10) Submit this fragment to the fragmentation test; DONE. In the above procedure each fragment (except the last) was made the maximum allowable size. An alternative might produce less than the maximum size datagrams. For example, one could implement a fragmentation procedure that repeatedly divided large datagrams in half until the resulting fragments were less than the maximum transmission unit size. An Example Reassembly Procedure For each datagram the buffer identifier is computed as the concatenation of the source, destination, protocol, and identification fields. If this is a whole datagram (that is both the fragment offset and the more fragments fields are zero), then any reassembly resources associated with this buffer identifier are released and the datagram is forwarded to the next step in datagram processing. If no other fragment with this buffer identifier is on hand then reassembly resources are allocated. The reassembly resources consist of a data buffer, a header buffer, a fragment block bit table, a total data length field, and a timer. The data from the fragment is placed in the data buffer according to its fragment offset and length, and bits are set in the fragment block bit table corresponding to the fragment blocks received. If this is the first fragment (that is the fragment offset is zero) this header is placed in the header buffer. If this is the last fragment (that is the more fragments field is zero) the total data length is computed. If this fragment completes the datagram (tested by checking the bits set in the fragment block table), then the datagram is sent to the next step in datagram processing; otherwise the timer is set to the maximum of the current timer value and the value of the time to live field from this fragment; and the reassembly routine gives up control. If the timer runs out, the all reassembly resources for this buffer identifier are released. The initial setting of the timer is a lower bound on the reassembly waiting time. This is because the waiting time will be increased if the Time to Live in the arriving fragment is greater than the current timer value but will not be decreased if it is less. The maximum this timer value could reach is the maximum time to live (approximately 4.25 minutes). The current recommendation for the initial timer setting is 15 seconds. This may be changed as experience with this protocol accumulates. Note that the choice of this parameter value is related to the buffer capacity available and the data rate of the transmission medium; that is, data rate times timer value equals buffer size (e.g., 10 Kb/s×15 s=150 Kb). Notation: FO—Fragment Offset IHL—Internet Header Length MF—More Fragments flag TTL—Time To Live NFB—Number of Fragment Blocks TL—Total Length TDL—Total Data Length BUFID—Buffer Identifier RCVBT-Fragment Received Bit Table TLB—Timer Lower Bound Procedure is shown in FIG. 134X. In the case that two or more fragments contain the same data either identically or through a partial overlap, this procedure will use the more recently arrived copy in the data buffer and datagram delivered. Identification The choice of the Identifier for a datagram is based on the need to provide a way to uniquely identify the fragments of a particular datagram. The protocol module assembling fragments judges fragments to belong to the same datagram if they have the same source, destination, protocol, and Identifier. Thus, the sender must choose the Identifier to be unique for this source, destination pair and protocol for the time the datagram (or any fragment of it) could be alive in the internet. It seems then that a sending protocol module needs to keep a table of Identifiers, one entry for each destination it has communicated with in the last maximum packet lifetime for the internet. However, since the Identifier field allows 65,536 different values, some host may be able to simply use unique identifiers independent of destination. It is appropriate for some higher level protocols to choose the identifier. For example, TCP protocol modules may retransmit an identical TCP segment, and the probability for correct reception would be enhanced if the retransmission carried the same identifier as the original transmission since fragments of either datagram could be used to construct a correct TCP segment. Type of Service The type of service (TOS) is for internet service quality selection. The type of service is specified along the abstract parameters precedence, delay, throughput, and reliability. These abstract parameters are to be mapped into the actual service parameters of the particular networks the datagram traverses. Precedence. An independent measure of the importance of this datagram. Delay. Prompt delivery is important for datagrams with this indication. Throughput. High data rate is important for datagrams with this indication. Reliability. A higher level of effort to ensure delivery is important for datagrams with this indication. For example, the ARPANET has a priority bit, and a choice between "standard" messages (type 0) and "uncontrolled" messages (type 3), (the choice between single packet and multipacket messages can also be considered a service parameter). The uncontrolled messages tend to be less reliably delivered and suffer less delay. Suppose an internet datagram is to be sent through the ARPANET. Let the internet type of service be given as: Precedence: 5 Delay: 0 Throughput: 1 Reliability: 1 In this example, the mapping of these parameters to those available for the ARPANET would be to set the ARPANET priority bit on since the Internet precedence is in the upper half of its range, to select standard messages since the throughput and reliability requirements are indicated and delay is not. More details are given on service mappings in "Service Mappings" [8]. Time to Live The time to live is set by the sender to the maximum time the datagram is allowed to be in the internet system. If the datagram is in the internet system longer than the time to live, then the datagram must be destroyed. This field must be decreased at each point that the internet header is processed to reflect the time spent processing the datagram. Even if no local information is available on the time actually spent, the field must be decremented by 1. The time is measured in units of seconds (i.e. the value 1 means one second). Thus, the maximum time to live is 255 seconds or 4.25 minutes. Since every module that processes a datagram must decrease the TTL by at least one even if it process the datagram in less than a second, the TTL must be thought of only as an upper bound on the time a datagram may exist. The intention is to cause undeliverable datagrams to be discarded, and to bound the maximum datagram lifetime. Some higher level reliable connection protocols are based on assumptions that old duplicate datagrams will not arrive after a certain time elapses. The TTL is a way for such protocols to have an assurance that their assumption is met. Options The options are optional in each datagram, but required in implementations. That is, the presence or absence of an option is the choice of the sender, but each internet module must be able to parse every option. There can be several options present in the option field. The options might not end on a 32-bit boundary. The internet header must be filled out with octets of zeros. The first of these would be interpreted as the end-of-options option, and the remainder as internet header padding. Every internet module must be able to act on every option. The Security Option is required if classified, restricted, or compartmented traffic is to be passed. Checksum The internet header checksum is recomputed if the internet header is changed. For example, a reduction of the time to live, additions or changes to internet options, or due to fragmentation. This checksum at the internet level is intended to protect the internet header fields from transmission errors. There are some applications where a few data bit errors are acceptable while retransmission delays are not. If the internet protocol enforced data correctness such applications could not be supported. Errors Internet protocol errors may be reported via the ICMP messages [3]. 3.3. Interfaces The functional description of user interfaces to the IP is, at best, fictional, since every operating system will have different facilities. Consequently, we must warn readers that different IP implementations may have different user interfaces. However, all IPs must provide a certain minimum set of services to guarantee that all IP implementations can support the same protocol hierarchy. This section specifies the functional interfaces required of all IP implementations. Internet protocol interfaces on one side to the local network and on the other side to either a higher level protocol or an application program. In the following, the higher level protocol or application program (or even a gateway program) will be called the “user” since it is using the internet module. Since internet protocol is a datagram protocol, there is minimal memory or state maintained between datagram transmissions, and each call on the internet protocol module by the user supplies all information necessary for the IP to perform the service requested. An Example Upper Level Interface The following two example calls satisfy the requirements for the user to internet protocol module communication (“=>” means returns): SEND (src, dst, prot, TOS, TTL, BufPTR, len, Id, DF, opt=>result) where: src=source address dst=destination address prot=protocol TOS=type of service TTL=time to live BufPTR=buffer pointer len=length of buffer Id=Identifier DF=Don’t Fragment opt=option data result=response OK=datagram sent ok Error=error in arguments or local network error Note that the precedence is included in the TOS and the security/compartment is passed as an option. RECV (BufPTR, prot, =>result, src, dst, TOS, len, opt) where: BufPTR=buffer pointer prot=protocol result=response OK=datagram received ok Error=error in arguments len=length of buffer src=source address dst=destination address TOS=type of service opt=option data When the user sends a datagram, it executes the SEND call supplying all the arguments. The internet protocol module, on receiving this call, checks the arguments and prepares and sends the message. If the arguments are good and the datagram is accepted by the local network, the call returns successfully. If either the arguments are bad, or the datagram is not accepted by the local network, the call returns unsuccessfully. On unsuccessful returns, a reasonable report must be made as to the cause of the problem, but the details of such reports are up to individual implementations. When a datagram arrives at the internet protocol module from the local network, either there is a pending RECV call from the user addressed or there is not. In the first case, the pending call is satisfied by passing the information from the datagram to the user. In the second case, the user addressed is notified of a pending datagram. If the user addressed does not exist, an ICMP error message is returned to the sender, and the data is discarded. The notification of a user may be via a pseudo interrupt or similar mechanism, as appropriate in the particular operating system environment of the implementation. A user’s RECV call may then either be immediately satisfied by a pending datagram, or the call may be pending until a datagram arrives. The source address is included in the send call in case the sending host has several addresses (multiple physical connections or logical addresses). The internet module must check to see that the source address is one of the legal address for this host. An implementation may also allow or require a call to the internet module to indicate interest in or reserve exclusive use of a class of datagrams (e.g., all those with a certain value in the protocol field). This section functionally characterizes a USER/IP interface. The notation used is similar to most procedure of function calls in high level languages, but this usage is not meant to rule out trap type service calls (e.g., SVCs, UUOs, EMTs), or any other form of interprocess communication.

Examples & Scenarios Example 1: This is an example of the minimal data carrying internet datagram and is found in FIG. 134N. Note that each tick mark represents one bit position. This is a internet datagram in version 4 of internet protocol; the internet header consists of five 32 bit words, and the total length of the datagram is 21 octets. This datagram is a complete datagram (not a fragment). Example 2: In this example, we show first a moderate size internet datagram (452 data octets) (FIG. 134O), then two internet fragments that might result from the fragmentation of this datagram if the maximum sized transmission allowed were 280 octets. Now the first fragment that results from splitting the datagram after 256 data octets is shown in FIG. 134P. And the second fragment is shown in FIG. 134Q. Example 3: Here, in FIG. 134R, we show an example of a datagram containing options. APPENDIX B: Data Transmission Order The order of transmission of the header and data described in this document is resolved to the octet level. Whenever a diagram shows a group of octets, the order of transmission of those octets is the normal order in which they are read in English. For example, in FIG. 134S, the octets are transmitted in the order they are numbered. Whenever an octet represents a numeric quantity the left most bit in the diagram is the high order or most significant bit. That is, the bit labeled 0 is the most significant bit. For example, FIG. 134T represents the value 170 (decimal). Similarly, whenever a multi-octet field represents a numeric quantity the left most bit of the whole field is the most significant bit. When a multi-octet quantity is transmitted the most significant octet is transmitted first.

GLOSSARY 1822 BBN Report 1822, "The Specification of the Interconnection of a Host and an IMP". The specification of interface between a host and the ARPANET. ARPANET leader The control information on an ARPANET message at the host-IMP interface. ARPANET message The unit of transmission between a host and an IMP in the ARPANET. The maximum size is about 1012 octets (8096 bits). ARPANET packet A unit of transmission used internally in the ARPANET between IMPs. The maximum size is about 126 octets (1008 bits). Destination The destination address, an internet header field. DF The Don't Fragment bit carried in the flags field. Flags An internet header field carrying various control flags. Fragment Offset This internet header field indicates where in the internet datagram a fragment belongs. GGP Gateway to Gateway Protocol, the protocol used primarily between gateways to control routing and other gateway functions. header Control information at the beginning of a message, segment, datagram, packet or block of data. ICMP Internet Control Message Protocol, implemented in the internet module, the ICMP is used from gateways to hosts and between hosts to report errors and make routing suggestions. Identification An internet header field carrying the identifying value assigned by the sender to aid in assembling the fragments of a datagram. IHL The internet header field Internet Header Length is the length of the internet header measured in 32 bit words. IMP The Interface Message Processor, the packet switch of the ARPANET. Internet Address A four octet (32 bit) source or destination address consisting of a Network field and a Local Address field. internet datagram The unit of data exchanged between a pair of internet modules (includes the internet header). internet fragment A portion of the data of an internet datagram with an internet header. Local Address The address of a host within a network. The actual mapping of an internet local address on to the host addresses in a network is quite general, allowing for many to one mappings. MF The More-Fragments Flag carried in the internet header flags field. module An implementation, usually in software, of a protocol or other procedure. more-fragments flag A flag indicating whether or not this internet datagram contains the end of an internet datagram, carried in the internet header Flags field. NFB The Number of Fragment Blocks in a the data portion of an internet fragment. That is, the length of a portion of data measured in 8 octet units. octet An eight bit byte. Options The internet header Options field may contain several options, and each option may be several octets in length. Padding The internet header Padding field is used to ensure that the data begins on 32 bit word boundary. The padding is zero. Protocol In this document, the next higher level protocol identifier, an internet header field. Rest The local address portion of an Internet Address. Source The source address, an internet header field. TCP Transmission Control Protocol: A host-to-host protocol for reliable communication in internet environments. TCP Segment The unit of data exchanged between TCP modules (including the TCP header). TFTP Trivial File Transfer Protocol: A simple file transfer protocol built on UDP. Time to Live An internet header field which indicates the upper bound on how long this internet datagram may exist. TOS Type of Service Total Length The internet header field Total Length is the length of the datagram in octets including internet header and data. TTL Time to Live Type of Service An internet header field which indicates the type (or quality) of service for this internet datagram. UDP User Datagram Protocol: A user level protocol for transaction oriented applications. User The user of the internet protocol. This may be a higher level protocol module, an application program, or a gateway program. Version The Version field indicates the format of the internet header.

REFERENCES

[1] Cerf, V., "The Catenet Model for Internetworking," Information Processing Techniques Office, Defense Advanced Research Projects Agency, IEN 48, July 1978.

[2] Bolt Beranek and Newman, "Specification for the Interconnection of a Host and an IMP," BBN Technical Report 1822, Revised May 1978.

[3] Postel, J., "Internet Control Message Protocol—DARPA Internet Program Protocol Specification," RFC 792, USC/Information Sciences Institute, September 1981.

[4] Shoch, J., "Inter-Network Naming, Addressing, and Routing," COMPCON, IEEE Computer Society, Fall 1978.

[5] Postel, J., "Address Mappings," RFC 796, USC/Information Sciences Institute, September 1981.

[6] Shoch, J., "Packet Fragmentation in Inter-Network Protocols," Computer Networks, v. 3, n. 1, February 1979.

[7] Strazisar, V., "How to Build a Gateway", IEN 109, Bolt Beranek and Newman, August 1979.

[8] Postel, J., "Service Mappings," RFC 795, USC/Information Sciences Institute, September 1981.

[9] Postel, J., "Assigned Numbers," RFC 790, USC/Information Sciences Institute, September 1981.

1.0 Introduction This document defines an IPv6 aggregatable global unicast address format for use in the Internet. The address format defined in this document is consistent with the IPv6 Protocol [IPV6] and the "IPv6 Addressing Architecture" [ARCH]. It is designed to facilitate scalable Internet routing. This documented replaces RFC 2073, "An IPv6 Provider-Based Unicast Address Format". RFC 2073 will become historic. The Aggregatable Global Unicast Address Format is an improvement over RFC 2073 in a number of areas. The major changes include removal of the registry bits because they are not needed for route aggregation, support of EUI-64 based interface identifiers, support of provider and exchange based aggregation, separation of public and site topology, and new aggregation based terminology. The key words "MUST", "MUST NOT", "REQUIRED", "SHALL", "SHALL NOT", "SHOULD", "SHOULD NOT", "RECOMMENDED", "MAY", and "OPTIONAL" in this document are to be interpreted as described in [RFC 2119].

2.0 Overview of the IPv6 Address IPv6 addresses are 128-bit identifiers for interfaces and sets of interfaces. There are three types of addresses: Unicast, Anycast, and Multicast. This document defines a specific type of Unicast address. In this document, fields in addresses are given specific names, for example "subnet". When this name is used with the term "ID" (for "identifier") after the name (e.g., "subnet ID"), it refers to the contents of the named field. When it is used with the term "prefix" (e.g. "subnet prefix") it refers to all of the addressing bits to the left of and including this field. IPv6 unicast addresses are designed assuming that the Internet routing system makes forwarding decisions based on a "longest prefix match" algorithm on arbitrary bit boundaries and does not have any knowledge of the internal structure of IPv6 addresses. The structure in IPv6 addresses is for assignment and allocation. The only exception to this is the distinction made between unicast and multicast addresses. The specific type of an IPv6 address is indicated by the leading bits in the address. The variable-length field comprising these leading bits is called the Format Prefix (FP). This document defines an address format for the 001 (binary) Format Prefix for Aggregatable Global Unicast addresses. The same address format could be used for other Format Prefixes, as long as these Format Prefixes also identify IPv6 unicast addresses. Only the "001" Format Prefix is defined here.

3.0 IPv6 Aggregatable Global Unicast Address Format This document defines an address format for the IPv6 aggregatable global unicast address assignment. The authors believe that this address format will be widely used for IPv6 nodes connected to the Internet. This address format is designed to support both the current provider-based aggregation and a new type of exchange-based aggregation. The combination will allow efficient routing aggregation for sites that connect directly to providers and for sites that connect to exchanges. Sites will have the choice to connect to either type of aggregation entity. While this address format is designed to support exchange-based aggregation (in addition to current provider-based aggregation) it is not dependent on exchanges for it's overall route aggregation properties. It will provide efficient route aggregation with only provider-based aggregation. Aggregatable addresses are organized into a three level hierarchy: —Public Topology—Site Topology—Interface Identifier Public topology is the collection of providers and exchanges who provide public Internet transit services. Site topology is local to a specific site or organization which does not provide public transit service to nodes outside of the site. Interface identifiers identify interfaces on links. As shown in the foregoing, as well as in FIG. 135A, the aggregatable address format is designed to support long-haul providers (shown as P1, P2, P3, and P4), exchanges (shown as X1 and X2), multiple levels of providers (shown at P5 and P6), and subscribers (shown as S.x) Exchanges (unlike current NAPs, FIXes, etc.) will allocate IPv6 addresses. Organizations who connect to these exchanges will also subscribe (directly, indirectly via the exchange, etc.) for long-haul service from one or more long-haul providers. Doing so, they will achieve addressing independence from long-haul transit providers. They will be able to change long-haul providers without having to renumber their organization. They can also be multihomed via the exchange to more than one long-haul provider without having to have address prefixes from each long-haul provider. Note that the mechanisms used for this type of provider selection and portability are not discussed in the document.

3.1 Aggregatable Global Unicast Address Structure The aggregatable global unicast address format is shown in FIG. 135B. The following sections specify each part of the IPv6 Aggregatable Global Unicast address format.

3.2 Top-Level Aggregation ID Top-Level Aggregation Identifiers (TLA ID) are the top level in the routing hierarchy. Default-free routers must have a routing table entry for every active TLA ID and will probably have additional entries providing routing information for the TLA ID in which they are located. They may have additional entries in order to optimize routing for their specific topology, but the routing topology at all levels must be designed to minimize the number of additional entries fed into the default free routing tables. This addressing format supports 8,192 (2ˆ13) TLA ID's. Additional TLA ID's may be added by either growing the TLA field to the right into the reserved field or by using this format for additional format prefixes. The issues relating to TLA ID assignment are beyond the scope of this document. They will be described in a document under preparation.

3.3 Reserved The Reserved field is reserved for future use and must be set to zero. The Reserved field allows for future growth of the TLA and NLA fields as appropriate. See section 4.0 for a discussion.

3.4 Next-Level Aggregation Identifier Next-Level Aggregation Identifier's are used by organizations assigned a TLA ID to create an addressing hierarchy and to identify sites. The organization can assign the top part of the NLA ID in a manner to create an addressing hierarchy appropriate to its network. It can use the remainder of the bits in the field to identify sites it wishes to serve. This is shown in FIG. 135C. Each organization assigned a TLA ID receives 24 bits of NLA ID space. This NLA ID space allows each organization to provide service to approximately as many organizations as the current IPv4 Internet can support total networks. Organizations assigned TLA ID's may also support NLA ID's in their own Site ID space. This allows the organization assigned a TLA ID to provide service to organizations providing public transit service and to organizations who do not provide public transit service. These organizations receiving an NLA ID may also choose to use their Site ID space to support other NLA ID's. This is shown in FIG. 135D. The design of the bit layout of the NLA ID space for a specific TLA ID is left to the organization responsible for that TLA ID. Likewise the design of the bit layout of the next level NLA ID is the responsibility of the previous level NLA ID. It is recommended that organizations assigning NLA address space use "slow start" allocation procedures similar to [RFC2050]. The design of an NLA ID allocation plan is a tradeoff between routing aggregation efficiency and flexibility. Creating hierarchies allows for greater amount of aggregation and results in smaller routing tables. Flat NLA ID assignment provides for easier allocation and attachment flexibility, but results in larger routing tables. 3.5 Site-Level Aggregation Identifier The SLA ID field is used by an individual organization to create its own local addressing hierarchy and to identify subnets. This is analogous to subnets in IPv4 except that each organization has a much greater number of subnets. The 16 bit SLA ID field support 65,535 individual subnets. Organizations may choose to either route their SLA ID "flat" (e.g., not create any logical relationship between the SLA identifiers that results in larger routing tables), or to create a two or more level hierarchy (that results in smaller routing tables) in the SLA ID field. The latter is shown in FIG. 136. The approach chosen for structuring an SLA ID field is the responsibility of the individual organization. The number of subnets supported in this address format should be sufficient for all but the largest of organizations. Organizations which need additional subnets can arrange with the organization they are obtaining Internet service from to obtain additional site identifiers and use this to create additional subnets. 3.6 Interface ID Interface identifiers are used to identify interfaces on a link. They are required to be unique on that link. They may also be unique over a broader scope. In many cases an interfaces identifier will be the same or be based on the interface's link-layer address. Interface IDs used in the aggregatable global unicast address format are required to be 64 bits long and to be constructed in IEEE EUI-64 format [EUI-64]. These identifiers may have global scope when a global token (e.g., IEEE 48 bit MAC) is available or may have local scope where a global token is not available (e.g., serial links, tunnel end-points, etc.). The "u" bit (universal/local bit in IEEE EUI-64 terminology) in the EUI-64 identifier must be set correctly, as defined in [ARCH], to indicate global or local scope. The procedures for creating EUI-64 based Interface Identifiers is defined in [ARCH]. The details on forming interface identifiers is defined in the appropriate "IPv6 over <link>" specification such as "IPv6 over Ethernet" [ETHER], "IPv6 over FDDI" [FDDI], etc.

4.0 Technical Motivation The design choices for the size of the fields in the aggregatable address format were based on the need to meet a number of technical requirements. These are described in the following paragraphs. The size of the Top-Level Aggregation Identifier is 13 bits. This allows for 8,192 TLA ID's. This size was chosen to insure that the default-free routing table in top level routers in the Internet is kept within the limits, with a reasonable margin, of the current routing technology. The margin is important because default-free routers will also carry a significant number of longer (i.e., more-specific) prefixes for optimizing paths internal to a TLA and between TLAs. The important issue is not only the size of the default-free routing table, but the complexity of the topology that determines the number of copies of the default-free routes that a router must examine while computing a forwarding table. Current practice with IPv4 it is common to see a prefix announced fifteen times via different paths. The complexity of Internet topology is very likely to increase in the future. It is important that IPv6 default-free routing support additional complexity as well as a considerably larger internet. It should be noted for comparison that at the time of this writing (spring, 1998) the IPv4 default-free routing table contains approximately 50,000 prefixes. While this shows that it is possible to support more routes than 8,192 it is matter of debate if the number of prefixes supported today in IPv4 is already too high for current routing technology. There are serious issues of route stability as well as cases of providers not supporting all top level prefixes. The technical requirement was to pick a TLA ID size that was below, with a reasonable margin, what was being done with IPv4. The choice of 13 bits for the TLA field was an engineering compromise. Fewer bits would have been too small by not supporting enough top level organizations. More bits would have exceeded what can be reasonably accommodated, with a reasonable margin, with current routing technology in order to deal with the issues described in the previous paragraphs. If in the future, routing technology improves to support a larger number of top level routes in the default-free routing tables there are two choices on how to increase the number TLA identifiers. The first is to expand the TLA ID field into the reserved field. This would increase the number of TLA ID's to approximately 2 million. The second approach is to allocate another format prefix (FP) for use with this address format. Either or a combination of these approaches allows the number of TLA ID's to increase significantly. The size of the Reserved field is 8 bits. This size was chosen to allow significant growth of either the TLA ID and/or the NLA ID fields. The size of the Next-Level Aggregation Identifier field is 24 bits. This allows for approximately sixteen million NLA ID's if used in a flat manner. Used hierarchically it allows for a complexity roughly equivalent to the IPv4 address space (assuming an average network size of 254 interfaces). If in the future additional room for complexity is needed in the NLA ID, this may be accommodated by extending the NLA ID into the Reserved field. The size of the Site-Level Aggregation Identifier field is 16 bits. This supports 65,535 individual subnets per site. The design goal for the size of this field was to be sufficient for all but the largest of organizations. Organizations which need additional subnets can arrange with the organization they are obtaining Internet service from to obtain additional site identifiers and use this to create additional subnets. The Site-Level Aggregation Identifier field was given a fixed size in order to force the length of all prefixes identifying a particular site to be the same length (i.e., 48 bits). This facilitates movement of sites in the topology (e.g., changing service providers and multi-homing to multiple service providers). The Interface ID Interface Identifier field is 64 bits. This size was chosen to meet the requirement specified in [ARCH] to support EUI-64 based Interface Identifiers.

5.0 Acknowledgments The authors would like to express our thanks to Thomas Narten, Bob Fink, Matt Crawford, Allison Mankin, Jim Bound, Christian Huitema, Scott Bradner, Brian Carpenter, John Stewart, and Daniel Karrenberg for their review and constructive comments.

6.0 References [ALLOC] IAB and IESG, "IPv6 Address Allocation Management", RFC 1881, December 1995. [ARCH] Hinden, R., "IP Version 6 Addressing Architecture", RFC 2373, July 1998. [AUTH] Atkinson, R., "IP Authentication Header", RFC 1826, August 1995. [AUTO] Thompson, S., and T. Narten., "IPv6 Stateless Address Autoconfiguration", RFC 1971, August 1996. [ETHER] Crawford, M., "Transmission of IPv6 Packets over Ethernet Networks", Work in Progress. [EUI64] IEEE, "Guidelines for 64-bit Global Identifier (EUI-64) Registration Authority", http://standards.ieee.org/db/oui/tutorials/EUI64.html, March 1997. [FDDI] Crawford, M., "Transmission of IPv6 Packets over FDDI Networks", Work in Progress. [IPV6] Deering, S., and R. Hinden, "Internet Protocol, Version 6 (IPv6) Specification", RFC 1883, December 1995. [RFC2050] Hubbard, K., Kosters, M., Conrad, D., Karrenberg, D., and J. Postel, "Internet Registry IP Allocation Guidelines", BCP 12, RFC 1466, November 1996. [RFC2119] Bradner, S., "Key words for use in RFCs to Indicate Requirement Levels", BCP 14, RFC 2119, March 1997.

7.0 Security Considerations IPv6 addressing documents do not have any direct impact on Internet infrastructure security. Authentication of IPv6 packets is defined in [AUTH].

1. Introduction IP version 6 (IPv6) is a new version of the Internet Protocol, designed as the successor to IP version 4 (IPv4) [RFC-791]. The changes from IPv4 to IPv6 fall primarily into the following categories: o Expanded Addressing Capabilities IPv6 increases the IP address size from 32 bits to 128 bits, to support more levels of addressing hierarchy, a much greater number of addressable nodes, and simpler auto-configuration of addresses. The scalability of multicast routing is improved by adding a "scope" field to multicast addresses. And a new type of address called an "anycast address" is defined, used to send a packet to any one of a group of nodes. o Header Format Simplification Some IPv4 header fields have been dropped or made optional, to reduce the common-case processing cost of packet handling and to limit the bandwidth cost of the IPv6 header. o Improved Support for Extensions and Options Changes in the way IP header options are encoded allows for more efficient forwarding, less stringent limits on the length of options, and greater flexibility for introducing new options in the future. o Flow Labeling Capability A new capability is added to enable the labeling of packets belonging to particular traffic "flows" for which the sender requests special handling, such as non-default quality of service or "real-time" service. o Authentication and Privacy Capabilities Extensions to support authentication, data integrity, and (optional) data confidentiality are specified for IPv6. This document specifies the basic IPv6 header and the initially-defined IPv6 extension headers and options. It also discusses packet size issues, the semantics of flow labels and traffic classes, and the effects of IPv6 on upper-layer protocols. The format and semantics of IPv6 addresses are specified separately in [ADDRARCH]. The IPv6 version of ICMP, which all IPv6 implementations are required to include, is specified in [ICMPv6].

2. Terminology node—a device that implements IPv6. router—a node that forwards IPv6 packets not explicitly addressed to itself. [See Note below]. host—any node that is not a router. [See Note below]. upper layer—a protocol layer immediately above IPv6. Examples are transport protocols such as TCP and UDP, control protocols such as ICMP, routing protocols such as OSPF, and internet or lower-layer protocols being "tunneled" over (i.e., encapsulated in) IPv6 such as IPX, AppleTalk, or IPv6 itself. link—a communication facility or medium over which nodes can communicate at the link layer, i.e., the layer immediately below IPv6. Examples are Ethernets (simple or bridged); PPP links; X.25, Frame Relay, or ATM networks; and internet (or higher) layer "tunnels", such as tunnels over IPv4 or IPv6 itself. neighbors—nodes attached to the same link. interface—a node's attachment to a link. address—an IPv6-layer identifier for an interface or a set of interfaces. packet—an IPv6 header plus payload. link MTU—the maximum transmission unit, i.e., maximum packet size in octets, that can be conveyed over a link. path MTU—the minimum link MTU of all the links in a path between a source node and a destination node. Note: it is possible, though unusual, for a device with multiple interfaces to be configured to forward non-self-destined packets arriving from some set (fewer than all) of its interfaces, and to discard non-self-destined packets arriving from its other interfaces. Such a device must obey the protocol requirements for routers when receiving packets from, and interacting with neighbors over, the former (forwarding) interfaces. It must obey the protocol requirements for hosts when receiving packets from, and interacting with neighbors over, the latter (non-forwarding) interfaces.

3. IPv6 Header Format is shown in FIG. 137A. Version 4-bit Internet Protocol version number=6. Traffic Class 8-bit traffic class field. See section 7. Flow Label 20-bit flow label. See section 6. Payload Length 16-bit unsigned integer. Length of the IPv6 payload, i.e., the rest of the packet following this IPv6 header, in octets. (Note that any extension headers [section 4] present are considered part of the payload, i.e., included in the length count.) Next Header 8-bit selector. Identifies the type of header immediately following the IPv6 header. Uses the same values as the IPv4 Protocol field [RFC-1700 et seq.]. Hop Limit 8-bit unsigned integer. Decremented by 1 by each node that forwards the packet. The packet is discarded if Hop Limit is decremented to zero. Source Address 128-bit address of the originator of the packet. See [ADDRARCH]. Destination Address 128-bit address of the intended recipient of the packet (possibly not the ultimate recipient, if a Routing header is present). See [ADDRARCH] and section 4.4.

4. IPv6 Extension Headers In IPv6, optional internet-layer information is encoded in separate headers that may be placed between the IPv6 header and the upper-layer header in a packet. There are a small number of such extension headers, each identified by a distinct Next Header value. As illustrated in FIG. 137B, an IPv6 packet may carry zero, one, or more extension headers, each identified by the Next Header field of the preceding header. With one exception, extension headers are not examined or processed by any node along a packet's delivery path, until the packet reaches the node (or each of the set of nodes, in the case of multicast) identified in the Destination Address field of the IPv6 header. There, normal demultiplexing on the Next Header field of the IPv6 header invokes the module to process the first extension header, or the upper-layer header if no extension header is present. The contents and semantics of each extension header determine whether or not to proceed to the next header. Therefore, extension headers must be processed strictly in the order they appear in the packet; a receiver must not, for example, scan through a packet looking for a particular kind of extension header and process that header prior to processing all preceding ones. The exception referred to in the preceding paragraph is the Hop-by-Hop Options header, which carries information that must be examined and processed by every node along a packet's delivery path, including the source and destination nodes. The Hop-by-Hop Options header, when present, must immediately follow the IPv6 header. Its presence is indicated by the value zero in the Next Header field of the IPv6 header. If, as a result of processing a header, a node is required to proceed to the next header but the Next Header value in the current header is unrecognized by the node, it should discard the packet and send an ICMP Parameter Problem message to the source of the packet, with an ICMP Code value of 1 ("unrecognized Next Header type encountered") and the ICMP Pointer field containing the offset of the unrecognized value within the original packet. The same action should be taken if a node encounters a Next Header value of zero in any header other than an IPv6 header. Each extension header is an integer multiple of 8 octets long, in order to retain 8-octet alignment for subsequent headers. Multi-octet fields within each extension header are aligned on their natural boundaries, i.e., fields of width n octets are placed at an integer multiple of n octets from the start of the header, for n=1, 2, 4, or 8. A full implementation of IPv6 includes implementation of the following extension headers: Hop-by-Hop Options Routing (Type 0) Fragment Destination Options Authentication Encapsulating Security Payload The first four are specified in this document; the last two are specified in [RFC-2402] and [RFC-2406], respectively. 4.1 Extension Header Order When more than one extension header is used in the same packet, it is recommended that those headers appear in the following order: IPv6 header Hop-by-Hop Options header Destination Options header (note 1) Routing header Fragment header Authentication header (note 2) Encapsulating Security Payload header (note 2) Destination Options header (note 3) upper-layer header note 1: for options to be processed by the first destination that appears in the IPv6 Destination Address field plus subsequent destinations listed in the Routing header. note 2: additional recommendations regarding the relative order of the Authentication and Encapsulating Security Payload headers are given in [RFC-2406]. note 3: for options to be processed only by the final destination of the packet. Each extension header should occur at most once, except for the Destination Options header which should occur at most twice (once before a Routing header and once before the upper-layer header). If the upper-layer header is another IPv6 header (in the case of IPv6 being tunneled over or encapsulated in IPv6), it may be followed by its own extension headers, which are separately subject to the same ordering recommendations. If and when other extension headers are defined, their ordering constraints relative to the above listed headers must be specified. IPv6 nodes must accept and attempt to process extension headers in any order and occurring any number of times in the same packet, except for the Hop-by-Hop Options header which is restricted to appear immediately after an IPv6 header only. Nonetheless, it is strongly advised that sources of IPv6 packets adhere to the above recommended order until and unless subsequent specifications revise that recommendation.

4.2 Options Two of the currently-defined extension headers—the Hop-by-Hop Options header and the Destination Options header—carry a variable number of type-length-value (TLV) encoded "options", illustrated in FIG. 137C. The sequence of options within a header must be processed strictly in the order they appear in the header; a receiver must not, for example, scan through the header looking for a particular kind of option and process that option prior to processing all preceding ones. The Option Type identifiers are internally encoded such that their highest-order two bits specify the action that must be taken if the processing IPv6 node does not recognize the Option Type: 00—skip over this option and continue processing the header. 01—discard the packet. 10—discard the packet and, regardless of whether or not the packet's Destination Address was a multicast address, send an ICMP Parameter Problem, Code 2, message to the packet's Source Address, pointing to the unrecognized Option Type. 11—discard the packet and, only if the packet's Destination Address was not a multicast address, send an ICMP Parameter Problem, Code 2, message to the packet's Source Address, pointing to the unrecognized Option Type. The third-highest-order bit of the Option Type specifies whether or not the Option Data of that option can change en-route to the packet's final destination. When an Authentication header is present in the packet, for any option whose data may change en-route, its entire Option Data field must be treated as zero-valued octets when computing or verifying the packet's authenticating value. 0—Option Data does not change en-route 1—Option Data may change en-route The three high-order bits described above are to be treated as part of the Option Type, not independent of the Option Type. That is, a particular option is identified by a full 8-bit Option Type, not just the low-order 5 bits of an Option Type. The same Option Type numbering space is used for both the Hop-by-Hop Options header and the Destination Options header. However, the specification of a particular option may restrict its use to only one of those two headers. Individual options may have specific alignment requirements, to ensure that multi-octet values within Option Data fields fall on natural boundaries. The alignment requirement of an option is specified using the notation xn+y, meaning the Option Type must appear at an integer multiple of x octets from the start of the header, plus y octets. For example: 2n means any 2-octet offset from the start of the header. 8n+2 means any 8-octet offset from the start of the header, plus 2 octets. There are two padding options which are used when necessary to align subsequent options and to pad out the containing header to a multiple of 8 octets in length. These padding options must be recognized by all IPv6 implementations: Pad1 option (alignment requirement: none) is shown in FIG. 137D NOTE! the format of the Pad1 option is a special case—it does not have length and value fields. The Pad1 option is used to insert one octet of padding into the Options area of a header. If more than one octet of padding is required, the PadN option, described next, should be used, rather than multiple Pad1 options. PadN option (alignment requirement: none) is shown in FIG. 137E The PadN option is used to insert two or more octets of padding into the Options area of a header. For N octets of padding, the Opt Data Len field contains the value N−2, and the Option Data consists of N−2 zero-valued octets. Appendix B contains formatting guidelines for designing new options. 4.3 Hop-by-Hop Options Header The Hop-by-Hop Options header is used to carry optional information that must be examined by every node along a packet's delivery path. The Hop-by-Hop Options header is identified by a Next Header value of 0 in the IPv6 header, and has the format shown in FIG. 137F. Next Header 8-bit selector. Identifies the type of header immediately following the Hop-by-Hop Options header. Uses the same values as the IPv4 Protocol field [RFC-1700 et seq.]. Hdr Ext Len 8-bit unsigned integer. Length of the Hop-by-Hop Options header in 8-octet units, not including the first 8 octets. Options Variable-length field, of length such that the complete Hop-by-Hop Options header is an integer multiple of 8 octets long. Contains one or more TLV-encoded options, as described in section 4.2. The only hop-by-hop options defined in this document are the Pad1 and PadN options specified in section 4.2.

4.4 Routing Header The Routing header is used by an IPv6 source to list one or more intermediate nodes to be "visited" on the way to a packet's destination. This function is very similar to IPv4's Loose Source and Record Route option. The Routing header is identified by a Next Header value of 43 in the immediately preceding header, and has the format shown in FIG. 137G Next Header 8-bit selector. Identifies the type of header immediately following the Routing header. Uses the same values as the IPv4 Protocol field [RFC-1700 et seq.]. Hdr Ext Len 8-bit unsigned integer. Length of the Routing header in 8-octet units, not including the first 8 octets. Routing Type 8-bit identifier of a particular Routing header variant. Segments Left 8-bit unsigned integer. Number of route segments remaining, i.e., number of explicitly listed intermediate nodes still to be visited before reaching the final destination. type-specific data Variable-length field, of format determined by the Routing Type, and of length such that the complete Routing header is an integer multiple of 8 octets long. If, while processing a received packet, a node encounters a Routing header with an unrecognized Routing Type value, the required behavior of the node depends on the value of the Segments Left field, as follows: If Segments Left is zero, the node must ignore the Routing header and proceed to process the next header in the packet, whose type is identified by the Next Header field in the Routing header. If Segments Left is non-zero, the node must discard the packet and send an ICMP Parameter Problem, Code 0, message to the packet's Source Address, pointing to the unrecognized Routing Type. If, after processing a Routing header of a received packet, an intermediate node determines that the packet is to be forwarded onto a link whose link MTU is less than the size of the packet, the node must discard the packet and send an ICMP Packet Too Big message to the packet's Source Address.

The Type 0 Routing header has the format shown in FIG. 137H. Segments Left 8-bit unsigned integer. Number of route segments remaining, i.e., number of explicitly listed intermediate nodes still to be visited before reaching the final destination. Reserved 32-bit reserved field. Initialized to zero for transmission; ignored on reception. Address[1 . . . n] Vector of 128-bit addresses, numbered 1 to n. Multicast addresses must not appear in a Routing header of Type 0, or in the IPv6 Destination Address field of a packet carrying a Routing header of Type 0. A Routing header is not examined or processed until it reaches the node identified in the Destination Address field of the IPv6 header. In that node, dispatching on the Next Header field of the immediately preceding header causes the Routing header module to be invoked, which, in the case of Routing Type 0, performs the following algorithm: if Segments Left=0 {proceed to process the next header in the packet, whose type is identified by the Next Header field in the Routing header} else if Hdr Ext Len is odd {send an ICMP Parameter Problem, Code 0, message to the Source Address, pointing to the Hdr Ext Len field, and discard the packet} else {compute n, the number of addresses in the Routing header, by dividing Hdr Ext Len by 2 if Segments Left is greater than n {send an ICMP Parameter Problem, Code 0, message to the Source Address, pointing to the Segments Left field, and discard the packet} else {decrement Segments Left by 1; compute i, the index of the next address to be visited in the address vector, by subtracting Segments Left from n if Address [i] or the IPv6 Destination Address is multicast {discard the packet} else {swap the IPv6 Destination Address and Address[i] if the IPv6 Hop Limit is less than or equal to 1 {send an ICMP Time Exceeded—Hop Limit Exceeded in Transit message to the Source Address and discard the packet} else {decrement the Hop Limit by 1 resubmit the packet to the IPv6 module for transmission to the new destination}}}} As an example of the effects of the above algorithm, consider the case of a source node S sending a packet to destination node D, using a Routing header to cause the packet to be routed via intermediate nodes I1, I2, and I3. The values of the relevant IPv6 header and Routing header fields on each segment of the delivery path would be as follows: As the packet travels from S to I1: Source Address=S Hdr Ext Len=6 Destination Address=I1 Segments Left=3 Address[1]=I2 Address[2]=I3 Address[3] =D As the packet travels from I1 to I2: Source Address=S Hdr Ext Len=6 Destination Address=I2 Segments Left=2 Address[1]=I1 Address[2]=I3 Address[3]=D As the packet travels from I2 to I3: Source Address=S Hdr Ext Len=6 Destination Address=I3 Segments Left=1 Address[1]=I1 Address[2]=I2 Address[3]=D As the packet travels from I3 to D: Source Address=S Hdr Ext Len=6 Destination Address=D Segments Left=0 Address[1]=I1 Address[2]=I2 Address[3]=I3

4.5 Fragment Header The Fragment header is used by an IPv6 source to send a packet larger than would fit in the path MTU to its destination. (Note: unlike IPv4, fragmentation in IPv6 is performed only by source nodes, not by routers along a packet's delivery path—see section 5.) The Fragment header is identified by a Next Header value of 44 in the immediately preceding header, and has the format shown in FIG. 137I. In order to send a packet that is too large to fit in the MTU of the path to its destination, a source node may divide the packet into fragments and send each fragment as a separate packet, to be reassembled at the receiver. For every packet that is to be fragmented, the source node generates an Identification value. The Identification must be different than that of any other fragmented packet sent recently* with the same Source Address and Destination Address. If a Routing header is present, the Destination Address of concern is that of the final destination. * "recently" means within the maximum likely lifetime of a packet, including transit time from source to destination and time spent awaiting reassembly with other fragments of the same packet. However, it is not required that a source node know the maximum packet lifetime. Rather, it is assumed that the requirement can be met by maintaining the Identification value as a simple, 32-bit, "wrap-around" counter, incremented each time a packet must be fragmented. It is an implementation choice whether to maintain a single counter for the node or multiple counters, e.g., one for each of the node's possible source addresses, or one for each active (source address, destination address) combination.

The initial, large, unfragmented packet is referred to as the "original packet", and it is considered to consist of two parts, as illustrated in FIG. 137J. The Unfragmentable Part consists of the IPv6 header plus any extension headers that must be processed by nodes en route to the destination, that is, all headers up to and including the Routing header if present, else the Hop-by-Hop Options header if present, else no extension headers. The Fragmentable Part consists of the rest of the packet, that is, any extension headers that need be processed only by the final destination node(s), plus the upper-layer header and data. The Fragmentable Part of the original packet is divided into fragments, each, except possibly the last ("rightmost") one, being an integer multiple of 8 octets long. The fragments are transmitted in separate "fragment packets" as illustrated in FIG. 137K and FIG. 137L.

Each fragment packet is composed of: (1) The Unfragmentable Part of the original packet, with the Payload Length of the original IPv6 header changed to contain the length of this fragment packet only (excluding the length of the IPv6 header itself), and the Next Header field of the last header of the Unfragmentable Part changed to 44. (2) A Fragment header containing: The Next Header value that identifies the first header of the Fragmentable Part of the original packet. A Fragment Offset containing the offset of the fragment, in 8-octet units, relative to the start of the Fragmentable Part of the original packet. The Fragment Offset of the first ("leftmost") fragment is 0. An M flag value of 0 if the fragment is the last ("rightmost") one, else an M flag value of 1. The Identification value generated for the original packet. (3) The fragment itself. The lengths of the fragments must be chosen such that the resulting fragment packets fit within the MTU of the path to the packets' destination(s).

At the destination, fragment packets are reassembled into their original, unfragmented form, as illustrated in FIG. 137M. The following rules govern reassembly: An original packet is reassembled only from fragment packets that have the same Source Address, Destination Address, and Fragment Identification. The Unfragmentable Part of the reassembled packet consists of all headers up to, but not including, the Fragment header of the first fragment packet (that is, the packet whose Fragment Offset is zero), with the following two changes: The Next Header field of the last header of the Unfragmentable Part is obtained from the Next Header field of the first fragment's Fragment header. The Payload Length of the reassembled packet is computed from the length of the Unfragmentable Part and the length and offset of the last fragment. For example, a formula for computing the Payload Length of the reassembled original packet is: PL.orig=PL.first—FL.first—8+(8*FO.last)+FL.last where PL.orig=Payload Length field of reassembled packet. PL.first=Payload Length field of first fragment packet. FL.first=length of fragment following Fragment header of first fragment packet. FO.last=Fragment Offset field of Fragment header of last fragment packet. FL.last=length of fragment following Fragment header of last fragment packet. The Fragmentable Part of the reassembled packet is constructed from the fragments following the Fragment headers in each of the fragment packets. The length of each fragment is computed by subtracting from the packet's Payload Length the length of the headers between the IPv6 header and fragment itself; its relative position in Fragmentable Part is computed from its Fragment Offset value. The Fragment header is not present in the final, reassembled packet. The following error conditions may arise when reassembling fragmented packets: If insufficient fragments are received to complete reassembly of a packet within 60 seconds of the reception of the first-arriving fragment of that packet, reassembly of that packet must be abandoned and all the fragments that have been received for that packet must be discarded. If the first fragment (i.e., the one with a Fragment Offset of zero) has been received, an ICMP Time Exceeded—Fragment Reassembly Time Exceeded message should be sent to the source of that fragment. If the length of a fragment, as derived from the fragment packet's Payload Length field, is not a multiple of 8 octets and the M flag of that fragment is 1, then that fragment must be discarded and an ICMP Parameter Problem, Code 0, message should be sent to the source of the fragment, pointing to the Payload Length field of the fragment packet. If the length and offset of a fragment are such that the Payload Length of the packet reassembled from that fragment would exceed 65,535 octets, then that fragment must be discarded and an ICMP Parameter Problem, Code 0, message should be sent to the source of the fragment, pointing to the Fragment Offset field of the fragment packet. The following conditions are not expected to occur, but are not considered errors if they do: The number and content of the headers preceding the Fragment header of different fragments of the same original packet may differ. Whatever headers are present, preceding the Fragment header in each fragment packet, are processed when the packets arrive, prior to queueing the fragments for reassembly. Only those headers in the Offset zero fragment packet are retained in the reassembled packet. The Next Header values in the Fragment headers of different fragments of the same original packet may differ. Only the value from the Offset zero fragment packet is used for reassembly.

4.6 Destination Options Header The Destination Options header is used to carry optional information that need be examined only by a packet's destination node(s). The Destination Options header is identified by a Next Header value of 60 in the immediately preceding header, and has the format shown in FIG. 137N. The only destination options defined in this document are the Pad1 and PadN options specified in section 4.2. Note that there are two possible ways to encode optional destination information in an IPv6 packet: either as an option in the Destination Options header, or as a separate extension header. The Fragment header and the Authentication header are examples of the latter approach. Which approach can be used depends on what action is desired of a destination node that does not understand the optional information: o If the desired action is for the destination node to discard the packet and, only if the packet's Destination Address is not a multicast address, send an ICMP Unrecognized Type message to the packet's Source Address, then the information may be encoded either as a separate header or as an option in the Destination Options header whose Option Type has the value 11 in its highest-order two bits. The choice may depend on such factors as which takes fewer octets, or which yields better alignment or more efficient parsing. o If any other action is desired, the information must be encoded as an option in the Destination Options header whose Option Type has the value 00, 01, or 10 in its highest-order two bits, specifying the desired action (see section 4.2). 4.7 No Next Header The value 59 in the Next Header field of an IPv6 header or any extension header indicates that there is nothing following that header. If the Payload Length field of the IPv6 header indicates the presence of octets past the end of a header whose Next Header field contains 59, those octets must be ignored, and passed on unchanged if the packet is forwarded.

5. Packet Size Issues IPv6 requires that every link in the internet have an MTU of 1280 octets or greater. On any link that cannot convey a 1280-octet packet in one piece, link-specific fragmentation and reassembly must be provided at a layer below IPv6. Links that have a configurable MTU (for example, PPP links [RFC-1661]) must be configured to have an MTU of at least 1280 octets; it is recommended that they be configured with an MTU of 1500 octets or greater, to accommodate possible encapsulations (i.e., tunneling) without incurring IPv6-layer fragmentation. From each link to which a node is directly attached, the node must be able to accept packets as large as that link's MTU. It is strongly recommended that IPv6 nodes implement Path MTU Discovery [RFC-1981], in order to discover and take advantage of path MTUs greater than 1280 octets. However, a minimal IPv6 implementation (e.g., in a boot ROM) may simply restrict itself to sending packets no larger than 1280 octets, and omit implementation of Path MTU Discovery. In order to send a packet larger than a path's MTU, a node may use the IPv6 Fragment header to fragment the packet at the source and have it reassembled at the destination(s). However, the use of such fragmentation is discouraged in any application that is able to adjust its packets to fit the measured path MTU (i.e., down to 1280 octets). A node must be able to accept a fragmented packet that, after reassembly, is as large as 1500 octets. A node is permitted to accept fragmented packets that reassemble to more than 1500 octets. An upper-layer protocol or application that depends on IPv6 fragmentation to send packets larger than the MTU of a path should not send packets larger than 1500 octets unless it has assurance that the destination is capable of reassembling packets of that larger size. In response to an IPv6 packet that is sent to an IPv4 destination (i.e., a packet that undergoes translation from IPv6 to IPv4), the originating IPv6 node may receive an ICMP Packet Too Big message reporting a Next-Hop MTU less than 1280. In that case, the IPv6 node is not required to reduce the size of subsequent packets to less than 1280, but must include a Fragment header in those packets so that the IPv6-to-IPv4 translating router can obtain a suitable Identification value to use in resulting IPv4 fragments. Note that this means the payload may have to be reduced to 1232 octets (1280 minus 40 for the IPv6 header and 8 for the Fragment header), and smaller still if additional extension headers are used.

6. Flow Labels The 20-bit Flow Label field in the IPv6 header may be used by a source to label sequences of packets for which it requests special handling by the IPv6 routers, such as non-default quality of service or "real-time" service. This aspect of IPv6 is, at the time of writing, still experimental and subject to change as the requirements for flow support in the Internet become clearer. Hosts or routers that do not support the functions of the Flow Label field are required to set the field to zero when originating a packet, pass the field on unchanged when forwarding a packet, and ignore the field when receiving a packet. Appendix A describes the current intended semantics and usage of the Flow Label field.

7. Traffic Classes The 8-bit Traffic Class field in the IPv6 header is available for use by originating nodes and/or forwarding routers to identify and distinguish between different classes or priorities of IPv6 packets. At the point in time at which this specification is being written, there are a number of experiments underway in the use of the IPv4 Type of Service and/or Precedence bits to provide various forms of "differentiated service" for IP packets, other than through the use of explicit flow set-up. The Traffic Class field in the IPv6 header is intended to allow similar functionality to be supported in IPv6. It is hoped that those experiments will eventually lead to agreement on what sorts of traffic classifications are most useful for IP packets. Detailed definitions of the syntax and semantics of all or some of the IPv6 Traffic Class bits, whether experimental or intended for eventual standardization, are to be provided in separate documents. The following general requirements apply to the Traffic Class field: o The service interface to the IPv6 service within a node must provide a means for an upper-layer protocol to supply the value of the Traffic Class bits in packets originated by that upper-layer protocol. The default value must be zero for all 8 bits. o Nodes that support a specific (experimental or eventual standard) use of some or all of the Traffic Class bits are permitted to change the value of those bits in packets that they originate, forward, or receive, as required for that specific use. Nodes should ignore and leave unchanged any bits of the Traffic Class field for which they do not support a specific use. o An upper-layer protocol must not assume that the value of the Traffic Class bits in a received packet are the same as the value sent by the packet's source.

8. Upper-Layer Protocol Issues 8.1 Upper-Layer Checksums Any transport or other upper-layer protocol that includes the addresses from the IP header in its checksum computation must be modified for use over IPv6, to include the 128-bit IPv6 addresses instead of 32-bit IPv4 addresses. In particular, FIG. 137O shows the TCP and UDP "pseudo-header" for IPv6. If the IPv6 packet contains a Routing header, the Destination Address used in the pseudo-header is that of the final destination. At the originating node, that address will be in the last element of the Routing header; at the recipient(s), that address will be in the Destination Address field of the IPv6 header. o The Next Header value in the pseudo-header identifies the upper-layer protocol (e.g., 6 for TCP, or 17 for UDP). It will differ from the Next Header value in the IPv6 header if there are extension headers between the IPv6 header and the upper-layer header. o The Upper-Layer Packet Length in the pseudo-header is the length of the upper-layer header and data (e.g., TCP header plus TCP data). Some upper-layer protocols carry their own length information (e.g., the Length field in the UDP header); for such protocols, that is the length used in the pseudo-header. Other protocols (such as TCP) do not carry their own length information, in which case the length used in the pseudo-header is the Payload Length from the IPv6 header, minus the length of any extension headers present between the IPv6 header and the upper-layer header. o Unlike IPv4, when UDP packets are originated by an IPv6 node, the UDP checksum is not optional. That is, whenever originating a UDP packet, an IPv6 node must compute a UDP checksum over the packet and the pseudo-header, and, if that computation yields a result of zero, it must be changed to hex FFFF for placement in the UDP header. IPv6 receivers must discard UDP packets containing a zero checksum, and should log the error. The IPv6 version of ICMP [ICMPv6] includes the above pseudo-header in its checksum computation; this is a change from the IPv4 version of ICMP, which does not include a pseudo-header in its checksum. The reason for the change is to protect ICMP from misdelivery or corruption of those fields of the IPv6 header on which it depends, which, unlike IPv4, are not covered by an internet-layer checksum. The Next Header field in the pseudo-header for ICMP contains the value 58, which identifies the IPv6 version of ICMP. 8.2 Maximum Packet Lifetime Unlike IPv4, IPv6 nodes are not required to enforce maximum packet lifetime. That is the reason the IPv4 "Time to Live" field was renamed "Hop Limit" in IPv6. In practice, very few, if any, IPv4 implementations conform to the requirement that they limit packet lifetime, so this is not a change in practice. Any upper-layer protocol that relies on the internet layer (whether IPv4 or IPv6) to limit packet lifetime ought to be upgraded to provide its own mechanisms for detecting and discarding obsolete packets. 8.3 Maximum Upper-Layer Payload Size When computing the maximum payload size available for upper-layer data, an upper-layer protocol must take into account the larger size of the IPv6 header relative to the IPv4 header. For example, in IPv4, TCP's MSS option is computed as the maximum packet size (a default value or a value learned through Path MTU Discovery) minus 40 octets (20 octets for the minimum-length IPv4 header and 20 octets for the minimum-length TCP header). When using TCP over IPv6, the MSS must be computed as the maximum packet size minus 60 octets, because the minimum-length IPv6 header (i.e., an IPv6 header with no extension headers) is 20 octets longer than a minimum-length IPv4 header. 8.4 Responding to Packets Carrying Routing Headers When an upper-layer protocol sends one or more packets in response to a received packet that included a Routing header, the response packet(s) must not include a Routing header that was automatically derived by "reversing" the received Routing header UNLESS the integrity and authenticity of the received Source Address and Routing header have been verified (e.g., via the use of an Authentication header in the received packet). In other words, only the following kinds of packets are permitted in response to a received packet bearing a Routing header: o Response packets that do not carry Routing headers. o Response packets that carry Routing headers that were NOT derived by reversing the Routing header of the received packet (for example, a Routing header supplied by local configuration). o Response packets that carry Routing headers that were derived by reversing the Routing header of the received packet IF AND ONLY IF the integrity and authenticity of the Source Address and Routing header from the received packet have been verified by the responder. Appendix A. Semantics and Usage of the Flow Label Field A flow is a sequence of packets sent from a particular source to a particular (unicast or multicast) destination for which the source desires special handling by the intervening routers. The nature of that special handling might be conveyed to the routers by a control protocol, such as a resource reservation protocol, or by information within the flow's packets themselves, e.g., in a hop-by-hop option. The details of such control protocols or options are beyond the scope of this document. There may be multiple active flows from a source to a destination, as well as traffic that is not associated with any flow. A flow is uniquely identified by the combination of a source address and a non-zero flow label. Packets that do not belong to a flow carry a flow label of zero. A flow label is assigned to a flow by the flow's source node. New flow labels must be chosen (pseudo-) randomly and uniformly from the range 1 to FFFFF hex. The purpose of the random allocation is to make any set of bits within the Flow Label field suitable for use as a hash key by routers, for looking up the state associated with the flow. All packets belonging to the same flow must be sent with the same source address, destination address, and flow label. If any of those packets includes a Hop-by-Hop Options header, then they all must be originated with the same Hop-by-Hop Options header contents (excluding the Next Header field of the Hop-by-Hop Options header). If any of those packets includes a Routing header, then they all must be originated with the same contents in all extension headers up to and including the Routing header (excluding the Next Header field in the Routing header). The routers or destinations are permitted, but not required, to verify that these conditions are satisfied. If a violation is detected, it should be reported to the source by an ICMP Parameter Problem message, Code 0, pointing to the high-order octet of the Flow Label field (i.e., offset 1 within the IPv6 packet). The maximum lifetime of any flow-handling state established along a flow's path must be specified as part of the description of the state-establishment mechanism, e.g., the resource reservation protocol or the flow-setup hop-by-hop option. A source must not re-use a flow label for a new flow within the maximum lifetime of any flow-handling state that might have been established for the prior use of that flow label. When a node stops and restarts (e.g., as a result of a "crash"), it must be careful not to use a flow label that it might have used for an earlier flow whose lifetime may not have expired yet. This may be accomplished by recording flow label usage on stable storage so that it can be remembered across crashes, or by refraining from using any flow labels until the maximum lifetime of any possible previously established flows has expired. If the minimum time for rebooting the node is known, that time can be deducted from the necessary waiting period before starting to allocate flow labels. There is no requirement that all, or even most, packets belong to flows, i.e., carry non-zero flow labels. This observation is placed here to remind protocol designers and implementors not to assume otherwise. For example, it would be unwise to design a router whose performance would be adequate only if most packets belonged to flows, or to design a header compression scheme that only worked on packets that belonged to flows. Appendix B. Formatting Guidelines for Options This appendix gives some advice on how to lay out the fields when designing new options to be used in the Hop-by-Hop Options header or the Destination Options header, as described in section 4.2. These guidelines are based on the following assumptions: o One desirable feature is that any multi-octet fields within the Option Data area of an option be aligned on their natural boundaries, i.e., fields of width n octets should be placed at an integer multiple of n octets from the start of the Hop-by-Hop or Destination Options header, for n=1, 2, 4, or 8. o Another desirable feature is that the Hop-by-Hop or Destination Options header take up as little space as possible, subject to the requirement that the header be an integer multiple of 8 octets long. o It may be assumed that, when either of the option-bearing headers are present, they carry a very small number of options, usually only one. These assumptions suggest the following approach to laying out the fields of an option: order the fields from smallest to largest, with no interior padding, then derive the alignment requirement for the entire option based on the alignment requirement of the largest field (up to a maximum alignment of 8 octets). This approach is illustrated in the following examples: Example 1 If an option X required two data fields, one of length 8 octets and one of length 4 octets, it would be laid out as shown in FIG. 137P. Its alignment requirement is 8n+2, to ensure that the 8-octet field starts at a multiple-of-8 offset from the start of the enclosing header. A complete Hop-by-Hop or Destination Options header containing this one option would look as shown in FIG. 137Q.

Example 2 If an option Y required three data fields, one of length 4 octets, one of length 2 octets, and one of length 1 octet, it would be laid out as shown in FIG. 137R. Its alignment requirement is 4n+3, to ensure that the 4-octet field starts at a multiple-of-4 offset from the start of the enclosing header. A complete Hop-by-Hop or Destination Options header containing this one option would look as follows as shown in FIG. 137S.

Example 3 A Hop-by-Hop or Destination Options header containing both options X and Y from Examples 1 and 2 would have one of the two formats shown in FIG. 137T, depending on which option appeared first.

Security Considerations The security features of IPv6 are described in the Security Architecture for the Internet Protocol [RFC-2401]. Acknowledgments The authors gratefully acknowledge the many helpful suggestions of the members of the IPng working group, the End-to-End Protocols research group, and the Internet Community At Large. Authors' Addresses Stephen E. Deering Cisco Systems, Inc. 170 West Tasman Drive San Jose, Calif. 95134-1706 USA Phone: +1 408 527 8213 Fax: +1 408 527 8254 EMail: deering@cisco.com Robert M. Hinden Nokia 232 Java Drive Sunnyvale, Calif. 94089 USA Phone: +1 408 990-2004 Fax: +1 408 743-5677 EMail: hinden@iprg.nokia.com References [RFC-2401] Kent, S. and R. Atkinson, "Security Architecture for the Internet Protocol", RFC 2401, November 1998. [RFC-2402] Kent, S. and R. Atkinson, "IP Authentication Header", RFC 2402, November 1998. [RFC-2406] Kent, S. and R. Atkinson, "IP Encapsulating Security Protocol (ESP)", RFC 2406, November 1998. [ICMPv6] Conta, A. and S. Deering, "ICMP for the Internet Protocol Version 6 (IPv6)", RFC 2463, December 1998. [ADDRARCH] Hinden, R. and S. Deering, "IP Version 6 Addressing Architecture", RFC 2373, July 1998. [RFC-1981] McCann, J., Mogul, J. and S. Deering, "Path MTU Discovery for IP version 6", RFC 1981, August 1996. [RFC-791] Postel, J., "Internet Protocol", STD 5, RFC 791, September 1981. [RFC-1700] Reynolds, J. and J. Postel, "Assigned Numbers", STD 2, RFC 1700, October 1994. See also: http://www.iana.org/numbers.html [RFC-1661] Simpson, W., "The Point-to-Point Protocol (PPP)", STD 51, RFC 1661, July 1994. CHANGES SINCE RFC-1883 This memo has the following changes from RFC-1883. Numbers identify the Internet-Draft version in which the change was made. 02) Removed all references to jumbograms and the Jumbo Payload option (moved to a separate document). 02) Moved most of Flow Label description from section 6 to (new) Appendix A. 02) In Flow Label description, now in Appendix A, corrected maximum Flow Label value from FFFFFF to FFFFF (i.e., one less "F") due to reduction of size of Flow Label field from 24 bits to 20 bits. 02) Renumbered (relettered?) the previous Appendix A to be Appendix B. 02) Changed the wording of the Security Considerations section to avoid dependency loop between this spec and the IPsec specs. 02) Updated R. Hinden's email address and company affiliation. In section 3, changed field name "Class" to "Traffic Class" and increased its size from 4 to 8 bits. Decreased size of Flow Label field from 24 to 20 bits to compensate for increase in Traffic Class field. 01) In section 4.1, restored the order of the Authentication Header and the ESP header, which were mistakenly swapped in the 00 version of this memo. 01) In section 4.4, deleted the Strict/Loose Bit Map field and the strict routing functionality from the Type 0 Routing header, and removed the restriction on number of addresses that may be carried in the Type 0 Routing header (was limited to 23 addresses, because of the size of the strict/loose bit map). 01) In section 5, changed the minimum IPv6 MTU from 576 to 1280 octets, and added a recommendation that links with configurable MTU (e.g., PPP links) be configured to have an MTU of at least 1500 octets. 01) In section 5, deleted the requirement that a node must not send fragmented packets that reassemble to more than 1500 octets without knowledge of the destination reassembly buffer size, and replaced it with a recommendation that upper-layer protocols or applications should not do that. 01) Replaced reference to the IPv4 Path MTU Discovery spec (RFC-1191) with reference to the IPv6 Path MTU Discovery spec (RFC-1981), and deleted the Notes at the end of section 5 regarding Path MTU Discovery, since those details are now covered by RFC-1981. 01) In section 6, deleted specification of "opportunistic" flow set-up, and removed all references to the 6-second maximum lifetime for opportunistically established flow state. 01) In section 7, deleted the provisional description of the internal structure and semantics of the Traffic Class field, and specified that such descriptions be provided in separate documents. In section 4, corrected the Code value to indicate "unrecognized Next Header type encountered" in an ICMP Parameter Problem message (changed from 2 to 1). 00) In the description of the Payload Length field in section 3, and of the Jumbo Payload Length field in section 4.3, made it clearer that extension headers are included in the payload length count. 00) In section 4.1, swapped the order of the Authentication header and the ESP header. (NOTE: this was a mistake, and the change was undone in version 01.) 00) In section 4.2, made it clearer that options are identified by the full 8-bit Option Type, not by the low-order 5 bits of an Option Type. Also specified that the same Option Type numbering space is used for both Hop-by-Hop Options and Destination Options headers. 00) In section 4.4, added a sentence requiring that nodes processing a Routing header must send an ICMP Packet Too Big message in response to a packet that is too big to fit in the next hop link (rather than, say, performing fragmentation). 00) Changed the name of the IPv6 Priority field to "Class", and replaced the previous description of Priority in section 7 with a description of the Class field. Also, excluded this field from the set of fields that must remain the same for all packets in the same flow, as specified in section 6. 00) In the pseudo-header in section 8.1, changed the name of the "Payload Length" field to "Upper-Layer Packet Length". Also clarified that, in the case of protocols that carry their own length info (like non-jumbogram UDP), it is the upper-layer-derived length, not the IP-layer-derived length, that is used in the pseudo-header. 00) Added section 8.4, specifying that upper-layer protocols, when responding to a received packet that carried a Routing header, must not include the reverse of the Routing header in the response packet(s) unless the received Routing header was authenticated.

1. Introduction This specification defines the addressing architecture of the IP Version 6 (IPv6) protocol. It includes the basic formats for the various types of IPv6 addresses (unicast, anycast, and multicast). The authors would like to acknowledge the contributions of Paul Francis, Scott Bradner, Jim Bound, Brian Carpenter, Matt Crawford, Deborah Estrin, Roger Fajman, Bob Fink, Peter Ford, Bob Gilligan, Dimitry Haskin, Tom Harsch, Christian Huitema, Tony Li, Greg Minshall, Thomas Narten, Erik Nordmark, Yakov Rekhter, Bill Simpson, Sue Thomson, Markku Savela, and Larry Masinter.

2. IPv6 Addressing IPv6 addresses are 128-bit identifiers for interfaces and sets of interfaces (where "interface" is as defined in section 2 of [IPV6]). There are three types of addresses: Unicast: An identifier for a single interface. A packet sent to a unicast address is delivered to the interface identified by that address. Anycast: An identifier for a set of interfaces (typically belonging to different nodes). A packet sent to an anycast address is delivered to one of the interfaces identified by that address (the "nearest" one, according to the routing protocols' measure of distance). Multicast: An identifier for a set of interfaces (typically belonging to different nodes). A packet sent to a multicast address is delivered to all interfaces identified by that address. There are no broadcast addresses in IPv6, their function being superseded by multicast addresses. In this document, fields in addresses are given a specific name, for example "subnet". When this name is used with the term "ID" for identifier after the name (e.g., "subnet ID"), it refers to the contents of the named field. When it is used with the term "prefix" (e.g., "subnet prefix") it refers to all of the address from the left up to and including this field. In IPv6, all zeros and all ones are legal values for any field, unless specifically excluded. Specifically, prefixes may contain, or end with, zero-valued fields. 2.1 Addressing Model IPv6 addresses of all types are assigned to interfaces, not nodes. An IPv6 unicast address refers to a single interface. Since each interface belongs to a single node, any of that node's interfaces' unicast addresses may be used as an identifier for the node. All interfaces are required to have at least one link-local unicast address (see section 2.8 for additional required addresses). A single interface may also have multiple IPv6 addresses of any type (unicast, anycast, and multicast) or scope. Unicast addresses with scope greater than link-scope are not needed for interfaces that are not used as the origin or destination of any IPv6 packets to or from non-neighbors. This is sometimes convenient for point-to-point interfaces. There is one exception to this addressing model: A unicast address or a set of unicast addresses may be assigned to multiple physical interfaces if the implementation treats the multiple physical interfaces as one interface when presenting it to the internet layer. This is useful for load-sharing over multiple physical interfaces. Currently IPv6 continues the IPv4 model that a subnet prefix is associated with one link. Multiple subnet prefixes may be assigned to the same link. 2.2 Text Representation of Addresses There are three conventional forms for representing IPv6 addresses as text strings: 1. The preferred form is x:x:x:x:x:x:x:x, where the 'x's are the hexadecimal values of the eight 16-bit pieces of the address. Examples: FEDC:BA98:7654:3210:FEDC:BA98:7654:3210 1080:0:0:0:8:800:200C:417A Note that it is not necessary to write the leading zeros in an individual field, but there must be at least one numeral in every field (except for the case described in 2.). 2. Due to some methods of allocating certain styles of IPv6 addresses, it will be common for addresses to contain long strings of zero bits. In order to make writing addresses containing zero bits easier a special syntax is available to compress the zeros. The use of "::" indicates one or more groups of 16 bits of zeros. The "::" can only appear once in an address. The "::" can also be used to compress leading or trailing zeros in an address. For example, the following addresses: 1080:0:0:0:8:800:200C:417A a unicast address FF01:0:0:0:0:0:0:101 a multicast address 0:0:0:0:0:0:0:1 the loopback address 0:0:0:0:0:0:0:0 the unspecified addresses may be represented as: 1080::8:800:200C:417A a unicast address FF01::101 a multicast address ::1 the loopback address :: the unspecified addresses 3. An alternative form that is sometimes more convenient when dealing with a mixed environment of IPv4 and IPv6 nodes is x:x:x:x:x:x:d.d.d.d, where the 'x's are the hexadecimal values of the six high-order 16-bit pieces of the address, and the 'd's are the decimal values of the four low-order 8-bit pieces of the address (standard IPv4 representation). Examples: 0:0:0:0:0:0:13.1.68.3 0:0:0:0:0:FFFF:129.144.52.38 or in compressed form: ::13.1.68.3::FFFF:129.144.52.38 2.3 Text Representation of Address Prefixes The text representation of IPv6 address prefixes is similar to the way IPv4 addresses prefixes are written in CIDR notation [CIDR]. An IPv6 address prefix is represented by the notation: ipv6-address/prefix-length where ipv6-address is an IPv6 address in any of the notations listed in section 2.2. prefix-length is a decimal value specifying how many of the leftmost contiguous bits of the address comprise the prefix.

For example, the following are legal representations of the 60-bit prefix 12AB00000000CD3 (hexadecimal): 12AB:0000:0000:CD30:0000:0000:0000:0000/60 12AB::CD30:0:0:0:0/60 12AB:0:0:CD30::/60 The following are NOT legal representations of the above prefix: 12AB:0:0:CD3/60 may drop leading zeros, but not trailing zeros, within any 16-bit chunk of the address 12AB::CD30/60 address to left of "/" expands to 12AB:0000:0000:0000:0000:000:0000:CD30 12AB::CD3/60 address to left of "/" expands to 12AB:0000:0000:0000:0000:000:0000:0CD3 When writing both a node address and a prefix of that node address (e.g., the node's subnet prefix), the two can combined as follows: the node address 12AB:0:0:CD30:123:4567:89AB:CDEF and its subnet number 12AB:0:0:CD30::/60 can be abbreviated as 12AB:0:0:CD30:123:4567:89AB:CDEF/60

2.4 Address Type Identification The type of an IPv6 address is identified by the high-order bits of the address, as shown in FIG. 138A. The general format of global unicast addresses is described in section 2.5.4. Some special-purpose subtypes of global unicast addresses which contain embedded IPv4 addresses (for the purposes of IPv4-IPv6 interoperation) are described in section 2.5.5. Future specifications may redefine one or more sub-ranges of the global unicast space for other purposes, but unless and until that happens, implementations must treat all addresses that do not start with any of the above-listed prefixes as global unicast addresses. 2.5 Unicast Addresses IPv6 unicast addresses are aggregable with prefixes of arbitrary bit-length similar to IPv4 addresses under Classless Interdomain Routing. There are several types of unicast addresses in IPv6, in particular global unicast, site-local unicast, and link-local unicast. There are also some special-purpose subtypes of global unicast, such as IPv6 addresses with embedded IPv4 addresses or encoded NSAP addresses. Additional address types or subtypes can be defined in the future. IPv6 nodes may have considerable or little knowledge of the internal structure of the IPv6 address, depending on the role the node plays (for instance, host versus router). At a minimum, a node may consider that unicast addresses (including its own) have no internal structure as shown in FIG. 138B. A slightly sophisticated host (but still rather simple) may additionally be aware of subnet prefix(es) for the link(s) it is attached to, where different addresses may have different values for n as shown in FIG. 138C. Though a very simple router may have no knowledge of the internal structure of IPv6 unicast addresses, routers will more generally have knowledge of one or more of the hierarchical boundaries for the operation of routing protocols. The known boundaries will differ from router to router, depending on what positions the router holds in the routing hierarchy. 2.5.1 Interface Identifiers Interface identifiers in IPv6 unicast addresses are used to identify interfaces on a link. They are required to be unique within a subnet prefix. It is recommended that the same interface identifier not be assigned to different nodes on a link. They may also be unique over a broader scope. In some cases an interface's identifier will be derived directly from that interface's link-layer address. The same interface identifier may be used on multiple interfaces on a single node, as long as they are attached to different subnets. Note that the uniqueness of interface identifiers is independent of the uniqueness of IPv6 addresses. For example, a global unicast address may be created with a non-global scope interface identifier and a site-local address may be created with a global scope interface identifier. For all unicast addresses, except those that start with binary value 000, Interface IDs are required to be 64 bits long and to be constructed in Modified EUI-64 format. Modified EUI-64 format based Interface identifiers may have global scope when derived from a global token (e.g., IEEE 802 48-bit MAC or IEEE EUI-64 identifiers [EUI64]) or may have local scope where a global token is not available (e.g., serial links, tunnel end-points, etc.) or where global tokens are undesirable (e.g., temporary tokens for privacy [PRIV]). Modified EUI-64 format interface identifiers are formed by inverting the "u" bit (universal/local bit in IEEE EUI-64 terminology) when forming the interface identifier from IEEE EUI-64 identifiers. In the resulting Modified EUI-64 format the "u" bit is set to one (1) to indicate global scope, and it is set to zero (0) to indicate local scope. The first three octets in binary of an IEEE EUI-64 identifier are shown in FIG. 138D written in Internet standard bit-order, where "u" is the universal/local bit, "g" is the individual/group bit, and "c" are the bits of the company_id. Appendix A: "Creating Modified EUI-64 format Interface Identifiers" provides examples on the creation of Modified EUI-64 format based interface identifiers. The motivation for inverting the "u" bit when forming an interface identifier is to make it easy for system administrators to hand configure non-global identifiers when hardware tokens are not available. This is expected to be case for serial links, tunnel end-points, etc. The alternative would have been for these to be of the form 0200:0:0:1, 0200:0:0:2, etc., instead of the much simpler 1, 2, etc. The use of the universal/local bit in the Modified EUI-64 format identifier is to allow development of future technology that can take advantage of interface identifiers with global scope. The details of forming interface identifiers are defined in the appropriate "IPv6 over <link>" specification such as "IPv6 over Ethernet" [ETHER], "IPv6 over FDDI" [FDDI], etc. 2.5.2 The Unspecified Address The address 0:0:0:0:0:0:0:0 is called the unspecified address. It must never be assigned to any node. It indicates the absence of an address. One example of its use is in the Source Address field of any IPv6 packets sent by an initializing host before it has learned its own address. The unspecified address must not be used as the destination address of IPv6 packets or in IPv6 Routing Headers. An IPv6 packet with a source address of unspecified must never be forwarded by an IPv6 router. 2.5.3 The Loopback Address The unicast address 0:0:0:0:0:0:0:1 is called the loopback address. It may be used by a node to send an IPv6 packet to itself. It may never be assigned to any physical interface. It is treated as having link-local scope, and may be thought of as the link-local unicast address of a virtual interface (typically called "the loopback interface") to an imaginary link that goes nowhere. The loopback address must not be used as the source address in IPv6 packets that are sent outside of a single node. An IPv6 packet with a destination address of loopback must never be sent outside of a single node and must never be forwarded by an IPv6 router. A packet received on an interface with destination address of loopback must be dropped.

2.5.4 Global Unicast Addresses The general format for IPv6 global unicast addresses is shown in FIG. 138E where the global routing prefix is a (typically hierarchically-structured) value assigned to a site (a cluster of subnets/links), the subnet ID is an identifier of a link within the site, and the interface ID is as defined in section 2.5.1. All global unicast addresses other than those that start with binary 000 have a 64-bit interface ID field (i.e., n+m=64), formatted as described in section 2.5.1. Global unicast addresses that start with binary 000 have no such constraint on the size or structure of the interface ID field. Examples of global unicast addresses that start with binary 000 are the IPv6 address with embedded IPv4 addresses described in section 2.5.5 and the IPv6 address containing encoded NSAP addresses specified in [NSAP]. An example of global addresses starting with a binary value other than 000 (and therefore having a 64-bit interface ID field) can be found in [AGGR].

2.5.5 IPv6 Addresses with Embedded IPv4 Addresses The IPv6 transition mechanisms [TRAN] include a technique for hosts and routers to dynamically tunnel IPv6 packets over IPv4 routing infrastructure. IPv6 nodes that use this technique are assigned special IPv6 unicast addresses that carry a global IPv4 address in the low-order 32 bits. This type of address is termed an "IPv4-compatible IPv6 address" and has the format shown in FIG. 138F. Note: The IPv4 address used in the "IPv4-compatible IPv6 address" must be a globally-unique IPv4 unicast address. A second type of IPv6 address which holds an embedded IPv4 address is also defined. This address type is used to represent the addresses of IPv4 nodes as IPv6 addresses. This type of address is termed an "IPv4-mapped IPv6 address" and has the format shown in FIG. 138G. 2.5.6 Local-Use IPv6 Unicast Addresses There are two types of local-use unicast addresses defined. These are Link-Local and Site-Local. The Link-Local is for use on a single link and the Site-Local is for use in a single site. Link-Local addresses have the format shown in FIG. 138H. Link-Local addresses are designed to be used for addressing on a single link for purposes such as automatic address configuration, neighbor discovery, or when no routers are present. Routers must not forward any packets with link-local source or destination addresses to other links. Site-Local addresses have the format shown in FIG. 138I. Site-local addresses are designed to be used for addressing inside of a site without the need for a global prefix. Although a subnet ID may be up to 54-bits long, it is expected that globally-connected sites will use the same subnet IDs for site-local and global prefixes. Routers must not forward any packets with site-local source or destination addresses outside of the site. 2.6 Anycast Addresses An IPv6 anycast address is an address that is assigned to more than one interface (typically belonging to different nodes), with the property that a packet sent to an anycast address is routed to the "nearest" interface having that address, according to the routing protocols' measure of distance. Anycast addresses are allocated from the unicast address space, using any of the defined unicast address formats. Thus, anycast addresses are syntactically indistinguishable from unicast addresses. When a unicast address is assigned to more than one interface, thus turning it into an anycast address, the nodes to which the address is assigned must be explicitly configured to know that it is an anycast address. For any assigned anycast address, there is a longest prefix P of that address that identifies the topological region in which all interfaces belonging to that anycast address reside. Within the region identified by P, the anycast address must be maintained as a separate entry in the routing system (commonly referred to as a "host route"); outside the region identified by P, the anycast address may be aggregated into the routing entry for prefix P. Note that in the worst case, the prefix P of an anycast set may be the null prefix, i.e., the members of the set may have no topological locality. In that case, the anycast address must be maintained as a separate routing entry throughout the entire internet, which presents a severe scaling limit on how many such "global" anycast sets may be supported. Therefore, it is expected that support for global anycast sets may be unavailable or very restricted. One expected use of anycast addresses is to identify the set of routers belonging to an organization providing internet service. Such addresses could be used as intermediate addresses in an IPv6 Routing header, to cause a packet to be delivered via a particular service provider or sequence of service providers. Some other possible uses are to identify the set of routers attached to a particular subnet, or the set of routers providing entry into a particular routing domain. There is little experience with widespread, arbitrary use of internet anycast addresses, and some known complications and hazards when using them in their full generality [ANYCST]. Until more experience has been gained and solutions are specified, the following restrictions are imposed on IPv6 anycast addresses: o An anycast address must not be used as the source address of an IPv6 packet. o An anycast address must not be assigned to an IPv6 host, that is, it may be assigned to an IPv6 router only.

2.6.1 Required Anycast Address The Subnet-Router anycast address is predefined. Its format is shown in FIG. 138J. The "subnet prefix" in an anycast address is the prefix which identifies a specific link. This anycast address is syntactically the same as a unicast address for an interface on the link with the interface identifier set to zero. Packets sent to the Subnet-Router anycast address will be delivered to one router on the subnet. All routers are required to support the Subnet-Router anycast addresses for the subnets to which they have interfaces. The subnet-router anycast address is intended to be used for applications where a node needs to communicate with any one of the set of routers. 2.7 Multicast Addresses An IPv6 multicast address is an identifier for a group of interfaces (typically on different nodes). An interface may belong to any number of multicast groups. Multicast addresses have the format shown in FIG. 138K. The high-order 3 flags are reserved, and must be initialized to 0. T=0 indicates a permanently-assigned ("well-known") multicast address, assigned by the Internet Assigned Number Authority (IANA). T=1 indicates a non-permanently-assigned ("transient") multicast address. scop is a 4-bit multicast scope value used to limit the scope of the multicast group. The values are: 0 reserved 1 interface-local scope 2 link-local scope 3 reserved 4 admin-local scope 5 site-local scope 6 (unassigned) 7 (unassigned) 8 organization-local scope 9 (unassigned) A (unassigned) B (unassigned) C (unassigned) D (unassigned) E global scope F reserved interface-local scope spans only a single interface on a node, and is useful only for loopback transmission of multicast. link-local and site-local multicast scopes span the same topological regions as the corresponding unicast scopes. admin-local scope is the smallest scope that must be administratively configured, i.e., not automatically derived from physical connectivity or other, non-multicast-related configuration. organization-local scope is intended to span multiple sites belonging to a single organization. scopes labeled "(unassigned)" are available for administrators to define additional multicast regions. group ID identifies the multicast group, either permanent or transient, within the given scope. The "meaning" of a permanently-assigned multicast address is independent of the scope value. For example, if the "NTP servers group" is assigned a permanent multicast address with a group ID of 101 (hex), then: FF01:0:0:0:0:0:0:101 means all NTP servers on the same interface (i.e., the same node) as the sender. FF02:0:0:0:0:0:0:101 means all NTP servers on the same link as the sender. FF05:0:0:0:0:0:0:101 means all NTP servers in the same site as the sender. FF0E:0:0:0:0:0:0:101 means all NTP servers in the internet. Non-permanently-assigned multicast addresses are meaningful only within a given scope. For example, a group identified by the non-permanent, site-local multicast address FF15:0:0:0:0:0:0:101 at one site bears no relationship to a group using the same address at a different site, nor to a non-permanent group using the same group ID with different scope, nor to a permanent group with the same group ID. Multicast addresses must not be used as source addresses in IPv6 packets or appear in any Routing header. Routers must not forward any multicast packets beyond of the scope indicated by the scop field in the destination multicast address. Nodes must not originate a packet to a multicast address whose scop field contains the reserved value 0; if such a packet is received, it must be silently dropped. Nodes should not originate a packet to a multicast address whose scop field contains the reserved value F; if such a packet is sent or received, it must be treated the same as packets destined to a global (scop E) multicast address. 2.7.1 Pre-Defined Multicast Addresses The following well-known multicast addresses are pre-defined. The group ID's defined in this section are defined for explicit scope values. Use of these group IDs for any other scope values, with the T flag equal to 0, is not allowed. Reserved Multicast Addresses:

| | | | |
|---|---|---|---|
| FF00:0:0:0:0:0:0:0 | FF01:0:0:0:0:0:0:0 | FF02:0:0:0:0:0:0:0 | FF03:0:0:0:0:0:0:0 |
| FF04:0:0:0:0:0:0:0 | FF05:0:0:0:0:0:0:0 | FF06:0:0:0:0:0:0:0 | FF07:0:0:0:0:0:0:0 |
| FF08:0:0:0:0:0:0:0 | FF09:0:0:0:0:0:0:0 | FF0A:0:0:0:0:0:0:0 | FF0B:0:0:0:0:0:0:0 |
| FF0C:0:0:0:0:0:0:0 | FF0D:0:0:0:0:0:0:0 | FF0E:0:0:0:0:0:0:0 | FF0F:0:0:0:0:0:0:0 |

The above multicast addresses are reserved and shall never be assigned to any multicast group. All Nodes Addresses: FF01:0:0:0:0:0:0:1 FF02:0:0:0:0:0:0:1 The above multicast addresses identify the group of all IPv6 nodes, within scope 1 (interface-local) or 2 (link-local). All Routers Addresses: FF01:0:0:0:0:0:0:2 FF02:0:0:0:0:0:0:2 FF05:0:0:0:0:0:0:2 The above multicast addresses identify the group of all IPv6 routers, within scope 1 (interface-local), 2 (link-local), or 5 (site-local). Solicited-Node Address: FF02:0:0:0:0:1:FFXX:XXXX Solicited-node multicast address are computed as a function of a node's unicast and anycast addresses. A solicited-node multicast address is formed by taking the low-order 24 bits of an address (unicast or anycast) and appending those bits to the prefix FF02:0:0:0:0:1:FF00::/104 resulting in a multicast address in the range FF02:0:0:0:0:1:FF00:0000 to FF02:0:0:0:0:1:FFFF:FFFF For example, the solicited node multicast address corresponding to the IPv6 address 4037::01:800:200E:8C6C is FF02::1:FF0E:8C6C. IPv6 addresses that differ only in the high-order bits, e.g., due to multiple high-order prefixes associated with different aggregations, will map to the same solicited-node address thereby, reducing the number of multicast addresses a node must join. A node is required to compute and join (on the appropriate interface) the associated Solicited-Node multicast addresses for every unicast and anycast address it is assigned. 2.8 A Node's Required Addresses A host is required to recognize the following addresses as identifying itself: o Its required Link-Local Address for each interface. o Any additional Unicast and Anycast Addresses that have been configured for the node's interfaces (manually or automatically). o The loopback address. o The All-Nodes Multicast Addresses defined in section 2.7.1. o The Solicited-Node Multicast Address for each of its unicast and anycast addresses. o Multicast Addresses of all other groups to which the node belongs. A router is required to recognize all addresses that a host is required to recognize, plus the following addresses as identifying itself: o The Subnet-Router Anycast Addresses for all interfaces for which it is configured to act as a router. o All other Anycast Addresses with which the router has been configured. o The All-Routers Multicast Addresses defined in section 2.7.1. 3. Security Considerations IPv6 addressing documents do not have any direct impact on Internet infrastructure security. Authentication of IPv6 packets is defined in [AUTH].

4. IANA Considerations The table and notes at http://www.isi.edu/in-notes/iana/assignments/ipv6-address-space.txt should be replaced with the following: INTERNET PROTOCOL VERSION 6 ADDRESS SPACE The initial assignment of IPv6 address space is shown in FIG. 138L. Notes: 1. The "unspecified address", the "loopback address", and the IPv6 Addresses with Embedded IPv4 Addresses are assigned out of the 0000 0000 binary prefix space. 2. For now, IANA should limit its allocation of IPv6 unicast address space to the range of addresses that start with binary value 001. The rest of the global unicast address space (approximately 85% of the IPv6 address space) is reserved for future definition and use, and is not to be assigned by IANA at this time.

5. References 5.1 Normative References [IPV6] Deering, S. and R. Hinden, "Internet Protocol, Version 6 (IPv6) Specification", RFC 2460, December 1998. [RFC2026] Bradner, S., "The Internet Standards Process—Revision 3", BCP 9, RFC 2026, October 1996. 5.2 Informative References [ANYCST] Partridge, C., Mendez, T. and W. Milliken, "Host Anycasting Service", RFC 1546, November 1993. [AUTH] Kent, S. and R. Atkinson, "IP Authentication Header", RFC 2402, November 1998. [AGGR] Hinden, R., O'Dell, M. and S. Deering, "An Aggregatable Global Unicast Address Format", RFC 2374, July 1998. [CIDR] Fuller, V., Li, T., Yu, J. and K. Varadhan, "Classless Inter-Domain Routing (CIDR): An Address Assignment and Aggregation Strategy", RFC 1519, September 1993. [ETHER] Crawford, M., "Transmission of IPv6 Packets over Ethernet Networks", RFC 2464, December 1998. [EUI64] IEEE, "Guidelines for 64-bit Global Identifier (EUI-64) Registration Authority", http://standards.ieee.org/regauth/oui/tutorials/EUI64.html, March 1997. [FDDI] Crawford, M., "Transmission of IPv6 Packets over FDDI Networks", RFC 2467, December 1998. [MASGN] Hinden, R. and S. Deering, "IPv6 Multicast Address Assignments", RFC 2375, July 1998. [NSAP] Bound, J., Carpenter, B., Harrington, D., Houldsworth, J. and A. Lloyd, "OSI NSAPs and IPv6", RFC 1888, August 1996. [PRIV] Narten, T. and R. Draves, "Privacy Extensions for Stateless Address Autoconfiguration in IPv6", RFC 3041, January 2001. [TOKEN] Crawford, M., Narten, T. and S. Thomas, "Transmission of IPv6 Packets over Token Ring Networks", RFC 2470, December 1998. [TRAN] Gilligan, R. and E. Nordmark, "Transition Mechanisms for IPv6 Hosts and Routers", RFC 2893, August 2000. APPENDIX A: Creating Modified EUI-64 format Interface Identifiers Depending on the characteristics of a specific link or node there are a number of approaches for creating Modified EUI-64 format interface identifiers. This appendix describes some of these approaches. Links or Nodes with IEEE EUI-64 Identifiers The only change needed to transform an IEEE EUI-64 identifier to an interface identifier is to invert the "u" (universal/local) bit. For example, a globally unique IEEE EUI-64 identifier of the form is shown in FIG. 138M where "c" are the bits of the assigned company_id, "0" is the value of the universal/local bit to indicate global scope, "g" is individual/group bit, and "m" are the bits of the manufacturer-selected extension identifier. The IPv6 interface identifier would be of the form shown in FIG. 138N. The only change is inverting the value of the universal/local bit. Links or Nodes with IEEE 802 48 bit MAC's [EUI64] defines a method to create a IEEE EUI-64 identifier from an IEEE 48 bit MAC identifier. This is to insert two octets, with hexadecimal values of 0xFF and 0xFE, in the middle of the 48 bit MAC (between the company_id and vendor supplied id). For example, the 48 bit IEEE MAC with global scope is shown in FIG. 138O where "c" are the bits of the assigned company_id, "0" is the value of the universal/local bit to indicate global scope, "g" is individual/group bit, and "m" are the bits of the manufacturer-selected extension identifier. The interface identifier would be of the form shown in FIG. 138P. When IEEE 802 48 bit MAC addresses are available (on an interface or a node), an implementation may use them to create interface identifiers due to their availability and uniqueness properties. Links with Other Kinds of Identifiers There are a number of types of links that have link-layer interface identifiers other than IEEE EIU-64 or IEEE 802 48-bit MACs. Examples include LocalTalk and Arcnet. The method to create an Modified EUI-64 format identifier is to take the link identifier (e.g., the LocalTalk 8 bit node identifier) and zero fill it to the left. For example, a LocalTalk 8 bit node identifier of hexadecimal value 0x4F results in the following interface identifier are shown in FIG. 138Q. Note that this results in the universal/local bit set to "0" to indicate local scope. Links without Identifiers There are a number of links that do not have any type of built-in identifier. The most common of these are serial links and configured tunnels. Interface identifiers must be chosen that are unique within a subnet-prefix. When no built-in identifier is available on a link the preferred approach is to use a global interface identifier from another interface or one which is assigned to the node itself. When using this approach no other interface connecting the same node to the same subnet-prefix may use the same identifier. If there is no global interface identifier available for use on the link the implementation needs to create a local-scope interface identifier. The only requirement is that it be unique within a subnet prefix. There are many possible approaches to select a subnet-prefix-unique interface identifier. These include: Manual Configuration Node Serial Number Other node-specific token The subnet-prefix-unique interface identifier should be generated in a manner that it does not change after a reboot of a node or if interfaces are added or deleted from the node. The selection of the appropriate algorithm is link and implementation dependent. The details on forming interface identifiers are defined in the appropriate "IPv6 over <link>" specification. It is strongly recommended that a collision detection algorithm be implemented as part of any automatic algorithm. APPENDIX B: Changes from RFC-2373 The following changes were made from RFC-2373 "IP Version 6 Addressing Architecture": —Clarified text in section 2.2 to allow "::" to represent one or more groups of 16 bits of zeros. —Changed uniqueness requirement of Interface Identifiers from unique on a link to unique within a subnet prefix. Also added a recommendation that the same interface identifier not be assigned to different machines on a link. —Change site-local format to make the subnet ID field 54-bit long and remove the 38-bit zero's field. —Added description of multicast scop values and rules to handle the reserved scop value 0. —Revised sections 2.4 and 2.5.6 to simplify and clarify how different address types are identified. This was done to insure that implementations do not build in any knowledge about global unicast format prefixes. Changes include: o Removed Format Prefix (FP) terminology o Revised list of address types to only include exceptions to global unicast and a singe entry that identifies everything else as Global Unicast. o Removed list of defined prefix exceptions from section 2.5.6 as it is now the main part of section 2.4. —Clarified text relating to EUI-64 identifiers to distinguish between IPv6's "Modified EUI-64 format" identifiers and IEEE EUI-64 identifiers. —Combined the sections on the Global Unicast Addresses and NSAP Addresses into a single section on Global Unicast Addresses, generalized the Global Unicast format, and cited [AGGR] and [NSAP] as examples. —Reordered sections 2.5.4 and 2.5.5. —Removed section 2.7.2 Assignment of New IPv6 Multicast Addresses because this is being redefined elsewhere. —Added an IANA considerations section that updates the IANA IPv6 address allocations and documents the NSAP and AGGR allocations. —Added clarification that the "IPv4-compatible IPv6 address" must use global IPv4 unicast addresses. —Divided references in to normative and non-normative sections. —Added reference to [PRIV] in section 2.5.1—Added clarification that routers must not forward multicast packets outside of the scope indicated in the multicast address. —Added clarification that routers must not forward packets with source address of the unspecified address. —Added clarification that routers must drop packets received on an interface with destination address of loopback. —Clarified the definition of IPv4-mapped addresses. —Removed the ABNF Description of Text Representations Appendix. —Removed the address block reserved for IPX addresses. —Multicast scope changes: o Changed name of scope value 1 from "node-local" to "interface-local" o Defined scope value 4 as "admin-local"-Corrected reference to RFC1933 and updated references. —Many small changes to clarify and make the text more consistent.

1. Introduction Internet Protocol version 6 includes support for addresses of different "scope"; that is, both global and non-global (e.g., link-local) addresses. Although non-global addressing has been introduced operationally in the IPv4 Internet, both in the use of private address space ("net 10", etc.) and with administratively scoped multicast addresses, the design of IPv6 formally incorporates the notion of address scope into its base architecture. This document specifies the architectural characteristics, expected behavior, textual representation, and usage of IPv6 addresses of different scopes. Though the current address architecture specification [1] defines unicast site-local addresses, the IPv6 working group decided to deprecate the syntax and the usage [5] and is now investigating other forms of local IPv6 addressing. The usage of any new forms of local addresses will be documented elsewhere in the future. Thus, this document intentionally focuses on link-local and multicast scopes only.

2. Definitions The key words "MUST", "MUST NOT", "REQUIRED", "SHALL", "SHALL NOT", "SHOULD", "SHOULD NOT", "RECOMMENDED", "MAY", and "OPTIONAL" in this document are to be interpreted as described in [2].

3. Basic Terminology The terms link, interface, node, host, and router are defined in [3]. The definitions of unicast address scopes (link-local and global) and multicast address scopes (interface-local, link-local, etc.) are contained in [1].

4. Address Scope Every IPv6 address other than the unspecified address has a specific scope; that is, a topological span within which the address may be used as a unique identifier for an interface or set of interfaces. The scope of an address is encoded as part of the address, as specified in [1]. For unicast addresses, this document discusses two defined scopes: o Link-local scope, for uniquely identifying interfaces within (i.e., attached to) a single link only. o Global scope, for uniquely identifying interfaces anywhere in the Internet. The IPv6 unicast loopback address, ::1, is treated as having link-local scope within an imaginary link to which a virtual "loopback interface" is attached. The unspecified address, ::, is a special case. It does not have any scope because it must never be assigned to any node according to [1]. Note, however, that an implementation might use an implementation dependent semantics for the unspecified address and may want to allow the unspecified address to have specific scopes. For example, implementations often use the unspecified address to represent "any" address in APIs. In this case, implementations may regard the unspecified address with a given particular scope as representing the notion of "any address in the scope". This document does not prohibit such a usage, as long as it is limited within the implementation. [1] defines IPv6 addresses with embedded IPv4 addresses as being part of global addresses. Thus, those addresses have global scope, with regard to the IPv6 scoped address architecture. However, an implementation may use those addresses as if they had other scopes for convenience. For instance, [6] assigns link-local scope to IPv4 auto-configured link-local addresses (the addresses from the prefix 169.254.0.0/16 [7]) and converts those addresses into IPv4-mapped IPv6 addresses in order to perform destination address selection among IPv4 and IPv6 addresses. This would implicitly mean that the IPv4-mapped IPv6 addresses equivalent to the IPv4 auto-configuration link-local addresses have link-local scope. This document does not preclude such a usage, as long as it is limited within the implementation. Anycast addresses [1] are allocated from the unicast address space and have the same scope properties as unicast addresses. All statements in this document regarding unicast apply equally to anycast. For multicast addresses, there are fourteen possible scopes, ranging from interface-local to global (including link-local). The interface-local scope spans a single interface only; a multicast address of interface-local scope is useful only for loopback delivery of multicasts within a single node; for example, as a form of inter-process communication within a computer. Unlike the unicast loopback address, interface-local multicast addresses may be assigned to any interface. There is a size relationship among scopes: o For unicast scopes, link-local is a smaller scope than global. o For multicast scopes, scopes with lesser values in the "scop" subfield of the multicast address (Section 2.7 of [1]) are smaller than scopes with greater values, with interface-local being the smallest and global being the largest. However, two scopes of different size may cover the exact same region of topology. For example, a (multicast) site may consist of a single link, in which both link-local and site-local scope effectively cover the same topological span.

5. Scope Zones A scope zone, or simply a zone, is a connected region of topology of a given scope. For example, the set of links connected by routers within a particular (multicast) site, and the interfaces attached to those links, comprise a single zone of multicast site-local scope. Note that a zone is a particular instance of a topological region (e.g., Alice's site or Bob's site), whereas a scope is the size of a topological region (e.g., a site or a link). The zone to which a particular non-global address pertains is not encoded in the address itself but determined by context, such as the interface from which it is sent or received. Thus, addresses of a given (non-global) scope may be re-used in different zones of that scope. For example, two different physical links may each contain a node with the link-local address fe80::1. Zones of the different scopes are instantiated as follows: o Each interface on a node comprises a single zone of interface-local scope (for multicast only). o Each link and the interfaces attached to that link comprise a single zone of link-local scope (for both unicast and multicast). o There is a single zone of global scope (for both unicast and multicast) comprising all the links and interfaces in the Internet. o The boundaries of zones of a scope other than interface-local, link-local, and global must be defined and configured by network administrators. Zone boundaries are relatively static features, not changing in response to short-term changes in topology. Thus, the requirement that the topology within a zone be "connected" is intended to include links and interfaces that may only be occasionally connected. For example, a residential node or network that obtains Internet access by dial-up to an employer's (multicast) site may be treated as part of the employer's (multicast) site-local zone even when the dial-up link is disconnected. Similarly, a failure of a router, interface, or link that causes a zone to become partitioned does not split that zone into multiple zones. Rather, the different partitions are still considered to belong to the same zone. Zones have the following additional properties: o Zone boundaries cut through nodes, not links. (Note that the global zone has no boundary, and the boundary of an interface-local zone encloses just a single interface.) o Zones of the same scope cannot overlap; i.e., they can have no links or interfaces in common. o A zone of a given scope (less than global) falls completely within zones of larger scope. That is, a smaller scope zone cannot include more topology than would any larger scope zone with which it shares any links or interfaces. o Each zone is required to be "convex" from a routing perspective; i.e., packets sent from one interface to any other in the same zone are never routed outside the zone. Note, however, that if a zone contains a tunneled link (e.g., an IPv6-over-IPv6 tunnel link [8]), a lower layer network of the tunnel can be located outside the zone without breaking the convexity property. Each interface belongs to exactly one zone of each possible scope. Note that this means that an interface belongs to a scope zone regardless of what kind of unicast address the interface has or of which multicast groups the node joins on the interface.

6. Zone Indices Because the same non-global address may be in use in more than one zone of the same scope (e.g., the use of link-local address fe80::1 in two separate physical links) and a node may have interfaces attached to different zones of the same scope (e.g., a router normally has multiple interfaces attached to different links), a node requires an internal means to identify to which zone a non-global address belongs. This is accomplished by assigning, within the node, a distinct "zone index" to each zone of the same scope to which that node is attached, and by allowing all internal uses of an address to be qualified by a zone index. The assignment of zone indices is illustrated in FIG. 139A: Zone Indices Example. This example node has five interfaces: A loopback interface to the imaginary loopback link (a phantom link that goes nowhere). Two interfaces to the same Ethernet link. An interface to a point-to-point link. A tunnel interface (e.g., the abstract endpoint of an IPv6-over-IPv6 tunnel [8], presumably established over either the Ethernet or the point-to-point link). It is thus attached to five interface-local zones, identified by the interface indices 1 through 5. Because the two Ethernet interfaces are attached to the same link, the node is only attached to four link-local zones, identified by link indices 1 through 4. Also note that even if the tunnel interface is established over the Ethernet, the tunnel link gets its own link index, which is different from the index of the Ethernet link zone. Each zone index of a particular scope should contain enough information to indicate the scope, so that all indices of all scopes are unique within the node and zone indices themselves can be used for a dedicated purpose. Usage of the index to identify an entry in the Management Information Base (MIB) is an example of the dedicated purpose. The actual representation to encode the scope is implementation dependent and is out of scope of this document. Within this document, indices are simply represented in a format such as "link index 2" for readability. The zone indices are strictly local to the node. For example, the node on the other end of the point-to-point link may well use entirely different interface and link index values for that link. An implementation should also support the concept of a "default" zone for each scope. And, when supported, the index value zero at each scope SHOULD be reserved to mean "use the default zone". Unlike other zone indices, the default index does not contain any scope, and the scope is determined by the address that the default index accompanies. An implementation may additionally define a separate default zone for each scope. Those default indices can also be used as the zone qualifier for an address for which the node is attached to only one zone; e.g., when using global addresses. At present, there is no way for a node to automatically determine which of its interfaces belong to the same zones; e.g., the same link or the same multicast scope zone larger than interface. In the future, protocols may be developed to determine that information. In the absence of such protocols, an implementation must provide a means for manual assignment and/or reassignment of zone indices. Furthermore, to avoid performing manual configuration in most cases, an implementation should, by default, initially assign zone indices only as follows: o A unique interface index for each interface. o A unique link index for each interface. Then manual configuration would only be necessary for the less common cases of nodes with multiple interfaces to a single link or of those with interfaces to zones of different (multicast-only) scopes. Thus, the default zone index assignments for the example node from FIG. 139A would be as illustrated in FIG. 139B. Manual configuration would then be required to, for example, assign the same link index to the two Ethernet interfaces, as shown in FIG. 139A. As well as initially assigning zone indices, as specified above, an implementation should automatically select a default zone for each scope for which there is more than one choice, to be used whenever an address is specified without a zone index (or with a zone index of zero). For instance, in the example shown in FIG. 139B, the implementation might automatically select intf2 and link2 as the default zones for each of those two scopes. (One possible selection algorithm is to choose the first zone that includes an interface other than the loopback interface as the default for each scope.) A means must also be provided to assign the default zone for a scope manually, overriding any automatic assignment. The unicast loopback address, ::1, may not be assigned to any interface other than the loopback interface. Therefore, it is recommended that, whenever ::1 is specified without a zone index or with the default zone index, it be interpreted as belonging to the loopback link-local zone, regardless of which link-local zone has been selected as the default. If this is done, then for nodes with only a single non-loopback interface (e.g., a single Ethernet interface), the common case, link-local addresses need not be qualified with a zone index. The unqualified address ::1 would always refer to the link-local zone containing the loopback interface. All other unqualified link-local addresses would refer to the link-local zone containing the non-loopback interface (as long as the default link-local zone was set to be the zone containing the non-loopback interface). Because of the requirement that a zone of a given scope fall completely within zones of larger scope (see Section 5, above), two interfaces assigned to different zones of scope S must also be assigned to different zones of all scopes smaller than S. Thus, the manual assignment of distinct zone indices for one scope may require the automatic assignment of distinct zone indices for smaller scopes. For example, suppose that distinct multicast site-local indices 1 and 2 are manually assigned in FIG. 139A and that site 1 contains links 1, 2, and 3, but site 2 only contains link 4. This configuration would cause the automatic creation of corresponding admin-local (i.e., multicast "scop" value 4) indices 1 and 2, because admin-local scope is smaller than site-local scope. With the above considerations, the complete set of zone indices for our example node from FIG. 139A, with the additional configurations here, is shown in FIG. 139C: Complete Zone Indices Example. Although the above examples show the zones being assigned index values sequentially for each scope, starting at one, the zone index values are arbitrary. An implementation may label a zone with any value it chooses, as long as the index value of each zone of all scopes is unique within the node. Zero SHOULD be reserved to represent the default zone. Implementations choosing to follow the recommended basic API [10] will want to restrict their index values to those that can be represented by the sin 6_scope_id field of the sockaddr_in6 structure.

7. Sending Packets When an upper-layer protocol sends a packet to a non-global destination address, it must have a means of identifying the intended zone to the IPv6 layer for cases in which the node is attached to more than one zone of the destination address's scope. Although identification of an outgoing interface is sufficient to identify an intended zone (because each interface is attached to no more than one zone of each scope), in many cases that is more specific than desired. For example, when sending to a link-local unicast address from a node that has more than one interface to the intended link (an unusual configuration), the upper layer protocol may not care which of those interfaces is used for the transmission. Rather, it would prefer to leave that choice to the routing function in the IP layer. Thus, the upper-layer requires the ability to specify a zone index, when sending to a non-global, non-loopback destination address.

8. Receiving Packets When an upper-layer protocol receives a packet containing a non-global source or destination address, the zone to which that address pertains can be determined from the arrival interface, because the arrival interface can be attached to only one zone of the same scope as that of the address under consideration. However, it is recommended that the IP layer convey to the upper layer the correct zone indices for the arriving source and destination addresses, in addition to the arrival interface identifier.

9. Forwarding When a router receives a packet addressed to a node other than itself, it must take the zone of the destination and source addresses into account as follows: o The zone of the destination address is determined by the scope of the address and arrival interface of the packet. The next-hop interface is chosen by looking up the destination address in a (conceptual) routing table specific to that zone (see Section 10). That routing table is restricted to refer to interfaces belonging to that zone. o After the next-hop interface is chosen, the zone of the source address is considered. As with the destination address, the zone of the source address is determined by the scope of the address and arrival interface of the packet. If transmitting the packet on the chosen next-hop interface would cause the packet to leave the zone of the source address, i.e., cross a zone boundary of the scope of the source address, then the packet is discarded. Additionally, if the packet's destination address is a unicast address, an ICMP Destination Unreachable message [4] with Code 2 ("beyond scope of source address") is sent to the source of the original packet. Note that Code 2 is currently left as unassigned in [4], but the IANA will re-assign the value for the new purpose, and [4] will be revised with this change. Note that even if unicast site-local addresses are deprecated, the above procedure still applies to link-local addresses. Thus, if a router receives a packet with a link-local destination address that is not one of the router's own link-local addresses on the arrival link, the router is expected to try to forward the packet to the destination on that link (subject to successful determination of the destination's link-layer address via the Neighbor Discovery protocol [9]). The forwarded packet may be transmitted back through the arrival interface, or through any other interface attached to the same link. A node that receives a packet addressed to itself and containing a Routing Header with more than zero Segments Left (Section 4.4 of [3]) first checks the scope of the next address in the Routing Header. If the scope of the next address is smaller than the scope of the original destination address, the node MUST discard the packet. Otherwise, it swaps the original destination address with the next address in the Routing Header. Then the above forwarding rules apply as follows: o The zone of the new destination address is determined by the scope of the next address and the arrival interface of the packet. The next-hop interface is chosen as per the first bullet of the rules above. o After the next-hop interface is chosen, the zone of the source address is considered as per the second bullet of the rules above. This check about the scope of the next address ensures that when a packet arrives at its final destination, if that destination is link-local, then the receiving node can know that the packet originated on-link. This will help the receiving node send a "response" packet with the final destination of the received packet as the source address without breaking its source zone. Note that it is possible, though generally inadvisable, to use a Routing Header to convey a non-global address across its associated zone boundary in the previously used next address field. For example, consider a case in which a link-border node (e.g., a router) receives a packet with the destination being a link-local address, and the source address a global address. If the packet contains a Routing Header where the next address is a global address, the next-hop interface to the global address may belong to a different link than that of the original destination. This is allowed because the scope of the next address is not smaller than the scope of the original destination.

10. Routing Note that as unicast site-local addresses are deprecated, and link-local addresses do not need routing, the discussion in this section only applies to multicast scoped routing. When a routing protocol determines that it is operating on a zone boundary, it MUST protect inter-zone integrity and maintain intra-zone connectivity. To maintain connectivity, the routing protocol must be able to create forwarding information for the global groups and for all the scoped groups for each of its attached zones. The most straightforward way of doing this is to create (conceptual) forwarding tables for each specific zone. To protect inter-zone integrity, routers must be selective in the group information shared with neighboring routers. Routers routinely exchange routing information with neighboring routers. When a router is transmitting this routing information, it must not include any information about zones other than the zones assigned to the interface used to transmit the information. As an example, the router in FIG. 139D must exchange routing information on five interfaces. The information exchanged is as follows (for simplicity, multicast scopes smaller or larger than the organization scope except global are not considered here): o Interface 1 * All global groups * All organization groups learned from Interfaces 1, 2, and 3 o Interface 2 * All global groups * All organization groups learned from Interfaces 1, 2, and 3 o Interface 3 * All global groups * All organization groups learned from Interfaces 1, 2, and 3 o Interface 4 * All global groups * All organization groups learned from Interface 4 o Interface 5 * All global groups * All organization groups learned from Interface 5 By imposing route exchange rules, zone integrity is maintained by keeping all zone-specific routing information contained within the zone.

11. Textual Representation As already mentioned, to specify an IPv6 non-global address without ambiguity, an intended scope zone should be specified as well. As a common notation to specify the scope zone, an implementation SHOULD support the following format: <address>%<zone_id> where <address> is a literal IPv6 address, <zone_id> is a string identifying the zone of the address, and '%' is a delimiter character to distinguish between <address> and <zone_id>. The following subsections describe detailed definitions, concrete examples, and additional notes of the format. 11.1. Non-Global Addresses The format applies to all kinds of unicast and multicast addresses of non-global scope except the unspecified address, which does not have a scope. The format is meaningless and should not be used for global addresses. The loopback address belongs to the trivial link; i.e., the link attached to the loopback interface. Thus the format should not be used for the loopback address, either. This document does not specify the usage of the format when the <address> is the unspecified address, as the address does not have a scope. This document, however, does not prohibit an implementation from using the format for those special addresses for implementation dependent purposes. 11.2. The <zone_id> Part In the textual representation, the <zone_id> part should be able to identify a particular zone of the address's scope. Although a zone index is expected to contain enough information to determine the scope and to be unique among all scopes as described in Section 6, the <zone_id> part of this format does not have to contain the scope. This is because the <address> part should specify the appropriate scope. This also means that the <zone_id> part does not have to be unique among all scopes. With this loosened property, an implementation can use a convenient representation as <zone_id>. For example, to represent link index 2, the implementation can simply use "2" as <zone_id>, which would be more readable than other representations that contain the "link" scope. When an implementation interprets the format, it should construct the "full" zone index, which contains the scope, from the <zone_id> part and the scope specified by the <address> part. (Remember that a zone index itself should contain the scope, as specified in Section 6.) An implementation SHOULD support at least numerical indices that are non-negative decimal integers as <zone_id>. The default zone index, which should typically be 0 (see Section 6), is included in the integers. When <zone_id> is the default, the delimiter characters "%" and <zone_id> can be omitted. Similarly, if a textual representation of an IPv6 address is given without a zone index, it should be interpreted as <address>%<default ID>, where <default ID> is the default zone index of the scope that <address> has. An implementation MAY support other kinds of non-null strings as <zone_id>. However, the strings must not conflict with the delimiter character. The precise format and semantics of additional strings is implementation dependent. One possible candidate for these strings would be interface names, as interfaces uniquely disambiguate any scopes. In particular, interface names can be used as "default identifiers" for interfaces and links, because by default there is a one-to-one mapping between interfaces and each of those scopes as described in Section 6. An implementation could also use interface names as <zone_id> for scopes larger than links, but there might be some confusion in this use. For example, when more than one interface belongs to the same (multicast) site, a user would be confused about which interface should be used. Also, a mapping function from an address to a name would encounter the same kind of problem when it prints an address with an interface name as a zone index. This document does not specify how these cases should be treated and leaves it implementation dependent. It cannot be assumed that indices are common across all nodes in a zone (see Section 6). Hence, the format MUST be used only within a node and MUST NOT be sent on the wire unless every node that interprets the format agrees on the semantics. 11.3. Examples The following addresses fe80::1234 (on the 1st link of the node) ff02::5678 (on the 5th link of the node) ff08::9abc (on the 10th organization of the node) would be represented as follows: fe80::1234%1 ff02::5678%5 ff08::9abc%10 (Here we assume a natural translation from a zone index to the <zone_id> part, where the Nth zone of any scope is translated into "N".) If we use interface names as <zone_id>, those addresses could also be represented as follows: fe80:1 234% ne0 ff02::5678%pvc1.3 ff08::9abc%interface10 where the interface "ne0" belongs to the 1st link, "pvc1.3" belongs to the 5th link, and "interface10" belongs to the 10th organization. 11.4. Usage Examples Applications that are supposed to be used in end hosts such as telnet, ftp, and ssh may not explicitly support the notion of address scope, especially of link-local addresses. However, an expert user (e.g., a network administrator) sometimes has to give even link-local addresses to such applications. Here is a concrete example. Consider a multi-linked router called "R1" that has at least two point-to-point interfaces (links). Each of the interfaces is connected to another router, "R2" and "R3", respectively. Also assume that the point-to-point interfaces have link-local addresses only. Now suppose that the routing system on R2 hangs up and has to be reinvoked. In this situation, we may not be able to use a global address of R2, because this is routing trouble and we cannot expect to have enough routes for global reachability to R2. Hence, we have to login R1 first and then try to login R2 by using link-local addresses. In this case, we have to give the link-local address of R2 to, for example, telnet. Here we assume the address is fe80::2. Note that we cannot just type % telnet fe80::2 here, since R1 has more than one link and hence the telnet command cannot detect which link it should try to use for connecting. Instead, we should type the link-local address with the link index as follows: % telnet fe80::2%3 where "3" after the delimiter character '%' corresponds to the link index of the point-to-point link. 11.5. Related API An extension to the recommended basic API defines how the format for non-global addresses should be treated in library functions that translate a nodename to an address, or vice versa [11]. 11.6. Omitting Zone Indices The format defined in this document does not intend to invalidate the original format for non-global addresses; that is, the format without the zone index portion. As described in Section 6, in some common cases with the notion of the default zone index, there can be no ambiguity about scope zones. In such an environment, the implementation can omit the "%<zone_id>" part. As a result, it can act as though it did not support the extended format at all. 11.7. Combinations of Delimiter Characters There are other kinds of delimiter characters defined for IPv6 addresses. In this subsection, we describe how they should be combined with the format for non-global addresses. The IPv6 addressing architecture [1] also defines the syntax of IPv6 prefixes. If the address portion of a prefix is non-global and its scope zone should be disambiguated, the address portion SHOULD be in the format. For example, a link-local prefix fe80::/64 on the second link can be represented as follows: fe80::%2/64 In this combination, it is important to place the zone index portion before the prefix length when we consider parsing the format by a name-to-address library function [11]. That is, we can first separate the address with the zone index from the prefix length, and just pass the former to the library function. The preferred format for literal IPv6 addresses in URLs is also defined [12]. When a user types the preferred format for an IPv6 non-global address whose zone should be explicitly specified, the user could use the format for the non-global address combined with the preferred format. However, the typed URL is often sent on the wire, and it would cause confusion if an application did not strip the <zone_id> portion before sending. Note that the applications should not need to care about which kind of addresses they're using, much less parse or strip out the <zone_id> portion of the address. Also, the format for non-global addresses might conflict with the URI syntax [13], since the syntax defines the delimiter character ('%') as the escape character. This conflict would require, for example, that the <zone_id> part for zone 1 with the delimiter be represented as '%251'. It also means that we could not simply copy a non-escaped format from other sources as input to the URI parser. Additionally, if the URI parser does not convert the escaped format before passing it to a name-to-address library, the conversion will fail. All these issues would decrease the benefit of the textual representation described in this section. Hence, this document does not specify how the format for non-global addresses should be combined with the preferred format for literal IPv6 addresses. In any case, it is recommended to use an FQDN instead of a literal IPv6 address in a URL, whenever an FQDN is available.

12. Security Considerations A limited scope address without a zone index has security implications and cannot be used for some security contexts. For example, a link-local address cannot be used in a traffic selector of a security association established by Internet Key Exchange (IKE) when the IKE messages are carried over global addresses. Also, a link-local address without a zone index cannot be used in access control lists. The routing section of this document specifies a set of guidelines whereby routers can prevent zone-specific information from leaking out of each zone. If, for example, multicast site boundary routers allow site routing information to be forwarded outside of the site, the integrity of the site could be compromised. Since the use of the textual representation of non-global addresses is restricted to use within a single node, it does not create a security vulnerability from outside the node. However, a malicious node might send a packet that contains a textual IPv6 non-global address with a zone index, intending to deceive the receiving node about the zone of the non-global address. Thus, an implementation should be careful when it receives packets that contain textual non-global addresses as data.

13. Contributors This document is a combination of several separate efforts. Atsushi Onoe took a significant role in one of them and deeply contributed to the content of Section 11 as a co-author of a separate proposal.

14. Acknowledgements Many members of the IPv6 working group provided useful comments and feedback on this document. In particular, Margaret Wasserman and Bob Hinden led the working group to make a consensus on IPv6 local addressing. Richard Draves proposed an additional rule to process Routing header containing scoped addresses. Dave Thaler and Francis Dupont gave valuable suggestions to define semantics of zone indices in terms of related API. Pekka Savola reviewed a version of the document very carefully and made detailed comments about serious problems. Steve Bellovin, Ted Hardie, Bert Wijnen, and Timothy Gleeson reviewed and helped improve the document during the preparation for publication.

15. References 15.1. Normative References [1] Hinden, R. and S. Deering, "Internet Protocol Version 6 (IPv6) Addressing Architecture", RFC 3513, April 2003. [2] Bradner, S., "Key words for use in RFCs to Indicate Requirement Levels", BCP 14, RFC 2119, March 1997. [3] Deering, S. and R. Hinden, "Internet Protocol, Version 6 (IPv6) Specification", RFC 2460, December 1998. [4] Conta, A. and S. Deering, "Internet Control Message Protocol (ICMPv6) for the Internet Protocol Version 6 (IPv6) Specification", RFC 2463, December 1998. 15.2. Informative References [5] Huitema, C. and B. Carpenter, "Deprecating Site Local Addresses", RFC 3879, September 2004. [6] Draves, R., "Default Address Selection for Internet Protocol version 6 (IPv6)", RFC 3484, February 2003. [7] Cheshire, S., Aboba, B., and E. Guttman, "Dynamic Configuration of Link-Local IPv4 Addresses", Work in Progress. [8] Conta, A. and S. Deering, "Generic Packet Tunneling in IPv6 Specification", RFC 2473, December 1998. [9] Narten, T., Nordmark, E., and W. Simpson, "Neighbor Discovery for IP Version 6 (IPv6)", RFC 2461, December 1998. [10] Gilligan, R., Thomson, S., Bound, J., McCann, J., and W. Stevens, "Basic Socket Interface Extensions for IPv6", RFC 3493, February 2003. [11] Gilligan, R., "Scoped Address Extensions to the IPv6 Basic Socket API", Work in Progress, July 2002. [12] Hinden, R., Carpenter, B., and L. Masinter, "Format for Literal IPv6 Addresses in URL's", RFC 2732, December 1999. [13] Berners-Lee, T., Fielding, R., and L. Masinter, "Uniform Resource Identifiers (URI): Generic Syntax", RFC 3986, January 2005.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that operate to perform the functionality described herein and may be implemented in software, hardware, or a combination of the two. While at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a software component in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. By way of example, and not limitation, computer readable media may comprise computer storage media and communication media. Computer storage media includes volatile and nonvolatile, removable and non-removable media implemented in any method or technology for storage of information such as computer readable instructions, data structures, software components or other data. Computer storage media includes, but is not limited to, Random Access Memory (RAM), Read Only Memory (ROM); Electrically Erasable Programmable Read Only Memory (EEPROM); flash memory or other memory technology; portable computer diskette; Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by an execution environment.

Communication media typically embodies computer readable instructions, data structures, software components, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Thus, the subject matter described herein may be embodied in many different forms, and all such forms are contemplated to be within the scope of what is claimed. It will be understood that various details may be changed without departing from the scope of the claimed subject matter.

The use of the terms "a" and "a" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The use of "including", "comprising", "having", and variations thereof are meant to encompass the items listed thereafter and equivalents thereof as well as additional items and equivalents thereof. Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided to", "received from", "identified to", "interoperated" and similar terms and their variants.

As used herein, any reference to an entity "in" an association is equivalent to describing the entity as "included in and/or identified by" the association, unless explicitly indicated otherwise.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety, unless explicitly stated otherwise. In case of conflict, the present disclosure, including definitions, will control. In addition, the materials, methods, and examples are illustrative only and not intended to be limiting.

It is unlikely that the designers of the early network, which is referred to as the "Internet", expected it to become as large as it has become. The fact that the global Internet Protocol (IP) address space, for 32-bit addresses, has been fully allocated is evidence of this. As the Internet grows, new problems will arise and some current problems are getting worse. For example, while network speeds and bandwidth are increasing, so are causes of network latency.

The Internet Engineering Task Force (IETF) has taken steps at various times in the past and are presently taking steps to address a number of problems resulting from the Internet's growth. Problems addressed by the IETF are described in a number of "Request for Comments" (RFC) documents published by the IETF. Documents referenced herein and included by reference include: "Request for Comments" (RFC) document RFC 791 edited by J. Postel, titled "Internet Protocol, DARPA Internet Protocol Specification", published by the IETF in September, 1981;

"Request for Comments" (RFC) document RFC 1519 by V. Fuller, et al, titled "Classless Inter-Domain Routing (CIDR): An Address Assignment and Aggregation Strategy", published by the Internet Engineering Task Force (IEFT), in June, 1999;

"Request for Comments" (RFC) document RFC 2460 by S. Deering, et al, titled "Internet Protocol, Version 6, (IPv6) Specification", published by the IETF in December, 1998;

"Request for Comments" (RFC) document RFC 3513 by R. Hinden, et al, titled "Internet Protocol Version 6 (IPv6) Addressing Architecture", published by the IETF in April, 2003; and "Request for Comments" (RFC) document RFC 2374 by R. Hinden, et al, titled "Aggregatable Global Unicast Address Format", published by the IETF in July, 1998.

RFC 791 states, "The internet protocol implements two basic functions: addressing and fragmentation". RFC 791 goes on to state, "A distinction is made between names, addresses, and routes. A name indicates what we seek. An address indicates where it is. A route indicates how to get there. The internet protocol deals primarily with addresses. It is the task of higher level (i.e., host-to-host or application) protocols to make the mapping from names to addresses. The internet module maps internet addresses to local net addresses. It is the task of lower level (i.e., local net or gateways) procedures to make the mapping from local net addresses to routes".

As demonstrated by the RFCs listed above addressing has been a source of a number of problems. In order to address a number of current and future problems facing the Internet, the subject matter described herein challenges the distinctions asserted in RFC 791 and establishes new relationships between and among names, addresses, and routes. The description herein further demonstrates that current internet addresses do not indicate where a node or network interface component (NIC) of a node is. They provide another global identifier space for identifying nodes and their network interfaces. This global identifier space, to some extent, is duplicative of the domain name space that is also a global identifier space for identifying nodes and network interfaces. This duplication of roles is unnecessary as described below.

All publications, patent applications, patents, and other references mentioned herein are incorporated by reference in their entirety. In case of conflict, the present disclosure, including definitions, will control. In addition, the materials, methods, and examples are illustrative only and not intended to be limiting.

I claim:

1. A non-transitory computer-readable media storing computer instructions that, when executed by one or more processors of a first node in a network, cause the first node to:

receive an Internet Protocol (IP) packet including an extension header which comprises a first path segment list that includes a first identifier and further includes an outside-scope second identifier that, for the first node, identifies a first region that does not include the first node and that is communicatively coupled to the first node via a second node;

select, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment;

modify the IP packet by overwriting the first identifier with the outside-scope second identifier; and forward, via the outgoing network interface and to the second node, data received in the IP packet such that the modified IP packet is forwarded with the data.

2. The non-transitory computer-readable media of claim 1, further including instructions that, when executed by the one or more processors, cause the first node to operate such that the first path segment list comprises an Internet Protocol version six (IPv6) destination address.

3. The non-transitory computer-readable media of claim 1, further including instructions that, when executed by the one or more processors, cause the first node to:

generate and transmit first information identifying the first identifier for identifying the first node; and receive second information identifying the outside-scope second identifier for mapping the outside-scope second identifier to a particular network interface of the first node.

4. The non-transitory computer-readable media of claim 1, further including instructions that, when executed by the one or more processors, cause the first node to operate such that the first identifier and the outside-scope second identifier are included in an Internet Protocol version six (IPv6) header of the IP packet, the IPv6 header including an IPv6 destination field, where the first identifier is contained in the IPv6 destination field when the first node receives the IP packet, and the outside-scope second identifier is contained in the IPv6 destination field when the first node forwards the IP packet.

5. The non-transitory computer-readable media of claim 1, further including instructions that, when executed by the one or more processors, cause the first node to operate such that: path information including the first identifier and the outside-scope second identifier is predetermined by multiple topology nodes.

6. The non-transitory computer-readable media of claim 1, further including instructions that, when executed by the one or more processors, cause the first node to operate such that: path information including the first identifier and the outside-scope second identifier is predetermined by another node other than the first node.

7. The non-transitory computer-readable media of claim 1, further including instructions that, when executed by the one or more processors, cause the first node to operate such that: a network path is specified using a first number of identifiers that is fewer than a second number of identifiers required to specify the network path deterministically.

8. The non-transitory computer-readable media of claim 1, further including instructions that, when executed by the one or more processors, cause the first node to operate such that: the outgoing network interface is selected for forwarding the data, without control signaling after the receipt of the IP packet.

9. The non-transitory computer-readable media of claim 1, further including instructions that, when executed by the one or more processors, cause the first node to operate such that: the data is capable of being forwarded by the first node along different ones of the plurality of path segments.

10. The non-transitory computer-readable media of claim 1, further including instructions that, when executed by the one or more processors, cause the first node to operate such that: the data is capable of being forwarded by the first node along different ones of the plurality of path segments based on a state of the network at a time when the IP packet is received.

11. The non-transitory computer-readable media of claim 1, further including instructions that, when executed by the one or more processors, cause the first node to operate such that: a current state of the network is not maintained by the first node.

12. The non-transitory computer-readable media of claim 1, further including instructions that, when executed by the one or more processors, cause the first node to:

update the extension header by determining an offset based on a length of the outside-scope second identifier.

13. The non-transitory computer-readable media of claim 1, further including instructions that, when executed by the one or more processors, cause the first node to operate such that at least one of:

said selecting is based on a routing table built based on a specified metric;

said selecting is directly based on a specified metric;

said selecting is indirectly based on a specified metric;

said data is forwarded in another IP packet that is the same as the received IP packet;

said data is forwarded in another IP packet that is different from the received IP packet;

for the at least one path segment, the at least one other node includes the second node;

said at least one path segment includes the at least one multi-hop path segment;

said at least one path segment does not include the at least one multi-hop path segment;

said outgoing network interface is selected, based on at least two of the policy, the routing table, or the metric;

said outgoing network interface is selected, based on at least all of the policy, the routing table, and the metric;

said outgoing network interface is selected, based on the policy;

said outgoing network interface is selected, based on the routing table;

said outgoing network interface is selected, based on the metric;

said extension header includes an extension of a header of the IP packet;

said non-transitory computer-readable media includes a plurality of memory portions of a single memory;

said non-transitory computer-readable media includes a single memory;

said non-transitory computer-readable media includes a plurality of distributed media;

said non-transitory computer-readable media includes a plurality of distributed memories;

said extension header includes an extension of a header of the IP packet, where the extension is appended to the header;

said extension header includes an extension of a header of the IP packet, where the extension is integral to the header;

said extension header includes an extension of a header of the IP packet, where the extension is an integrated portion of the header;

said extension header includes a header of the IP packet, where the header is extended;

said extension header includes a header of the IP packet, where the header is extended by being augmented;

said extension header includes one or more other headers;

said extension header includes one or more other headers, with each header including a subset of information;

said extension header includes one or more other extension headers;

said first path segment list is the only path segment list;

said first path segment list includes only the first identifier and the outside-scope second identifier;

said first path segment list includes the first identifier and the outside-scope second identifier, in addition to at least one other identifier;

said first identifier and the outside-scope second identifier are consecutively ordered in the first path segment list;

said first identifier and the outside-scope second identifier are adjacent in the first path segment list;

said first identifier and the outside-scope second identifier are not adjacent in the first path segment list;

said first identifier and the outside-scope second identifier each represent different path segments;

said first identifier and the outside-scope second identifier each represent separate path segments;

said first identifier and the outside-scope second identifier are associated with different path segments;

said first identifier and the outside-scope second identifier are associated with separate path segments;

said first path segment list includes multiple identifiers contiguously stored;

said first path segment list includes multiple identifiers non-contiguously stored;

said first path segment list includes multiple sequential identifiers;

said first path segment list includes multiple non-sequential identifiers;

said first path segment list includes multiple identifiers each with the same storage structure;

said first path segment list includes multiple identifiers each with a different storage structure;

said first path segment list includes multiple identifiers each of the same type;

said first path segment list includes multiple identifiers each of a different type;

said first path segment list includes multiple identifiers each configured to be processed similarly;

said first path segment list includes multiple identifiers each configured to be processed similarly;

said first path segment list includes multiple identifiers each configured to be processed the same;

said non-transitory computer-readable media is included as part of a system that further comprises the first node; or said non-transitory computer-readable media is included as part of the first node.

14. A non-transitory computer-readable media storing computer instructions that, when executed by one or more processors of a first node in a network, cause the first node to:

receive an Internet Protocol (IP) packet including an extension header which comprises a first path segment list that includes a first identifier and further includes an outside-scope second identifier that, for the first node, identifies a first region that does not include the first node and that is communicatively coupled to the first node via a second node;

update the extension header by determining an offset based on a length of the outside-scope second identifier;

select, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment; and forward, via the outgoing network interface and to the second node, data received in the IP packet.

15. An apparatus, comprising:

a first node including at least one non-transitory memory configured to store instructions, and one or more processors in communication with the at least one non-transitory memory, wherein the one or more processors is configured to execute the instructions to cause the first node to:

receive an Internet Protocol (IP) packet including an extension header which comprises a first path segment list that includes a first identifier and further includes an outside-scope second identifier that, for the first node, identifies a first region that does not include the first node and that is communicatively coupled to the first node via a second node;

select, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment; and forward, via the outgoing network interface and to the second node, data received in the IP packet;

wherein the apparatus is configured such that the IP packet is modified before the IP packet is forwarded, the IP packet being modified by overwriting the first identifier with the outside-scope second identifier.

16. The apparatus of claim 15, wherein the first node is configured to operate such that the first path segment list comprises an Internet Protocol version six (IPv6) destination address.

17. The apparatus of claim 15, wherein the first node is configured to:

generate and transmit first information identifying the first identifier for identifying the first node; and receive second information identifying the outside-scope second identifier for mapping the outside-scope second identifier to a particular network interface of the first node.

18. The apparatus of claim 15, wherein the first node is configured to operate such that the first identifier and the outside-scope second identifier are included in an Internet Protocol version six (IPv6) header of the IP packet.

19. The apparatus of claim 15, wherein the first node is configured to operate such that the first identifier and the outside-scope second identifier are included in an Internet Protocol version six (IPv6) header of the IP packet, the IPv6 header including an IPv6 destination field, where the first identifier is contained in the IPv6 destination field when the first node receives the IP packet, and the outside-scope second identifier is contained in the IPv6 destination field when the first node forwards the IP packet.

20. An apparatus, comprising:

a first node including at least one non-transitory memory configured to store instructions, and one or more processors in communication with the at least one non-transitory memory, wherein the one or more processors is configured to execute the instructions to cause the first node to:

receive an Internet Protocol (IP) packet including an extension header which comprises a first path segment list that includes a first identifier and further includes an outside-scope second identifier that, for the first node, identifies a first region that does not include the first node and that is communicatively coupled to the first node via a second node;

update the extension header by determining an offset based on a length of the outside-scope second identifier;

select, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment; and forward, via the outgoing network interface and to the second node, data received in the IP packet.

21. A method, comprising:

at a first node in a network:

receiving an Internet Protocol (IP) packet including an extension header which comprises a first path segment list that includes a first identifier and further includes an outside-scope second identifier that, for the first node, identifies a first region that does not include the first node and that is communicatively coupled to the first node via a second node;

modifying the IP packet by overwriting the first identifier with the outside-scope second identifier;

selecting, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment; and forwarding, via the outgoing network interface, data received in the IP packet such that the modified IP packet is forwarded with the data.

22. A method comprising:

at a first node in a network:

receiving an Internet Protocol (IP) packet including an extension header which comprises a first path segment list that includes a first identifier and further includes an outside-scope second identifier that, for the first node, identifies a first region that does not include the first node and that is communicatively coupled to the first node via a second node;

updating the extension header by determining an offset based on a length of the outside-scope second identifier;

selecting, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment; and forwarding, via the outgoing network interface, data received in the IP packet;

wherein the first path segment list comprises an Internet Protocol version six (IPv6) destination address.

23. A method, comprising:

performing at least one act that is configured to cause a first node to:

receive an Internet Protocol (IP) packet including an extension header which comprises a first path segment list that includes a first identifier and further includes an outside-scope second identifier that, for the first node, identifies a first region that does not include the first node and that is communicatively coupled to the first node via a second node, update the extension header by identifying an offset based on a length of the outside-scope second identifier, select, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment, and forward, via the outgoing network interface and to the second node, data received in the IP packet; and causing storage of a result of the at least one act on non-transitory computer-readable media.

24. A method, comprising:

performing at least one act that is configured to cause a first node to:

receive an Internet Protocol (IP) packet including an extension header which comprises a first path segment list that includes a first identifier and further includes an outside-scope second identifier that, for the first node, identifies a first region that does not include the first node and that is communicatively coupled to the first node via a second node, select, based on the outside-scope second identifier and based on at least one of a policy, a metric, or a routing table, an outgoing network interface included in at least one path segment of a plurality of path segments that communicatively couple the first node and at least one other node communicatively coupled to the first region, the plurality of path segments including at least one multi-hop path segment, modify the IP packet by overwriting the first identifier with the outside-scope second identifier, and forward, via the outgoing network interface and to the second node, data received in the IP packet such that the modified IP packet is forwarded with the data; and causing storage of a result of the at least one act on non-transitory computer-readable media.

25. The method of claim 24, and comprising: performing at least one additional act that is configured to cause the first node to operate such that: the first path segment list comprises an Internet Protocol version six (IPv6) destination address.

26. The method of claim 24, and comprising: performing at least one additional act that is configured to cause the first node to:

generate and transmit first information identifying the first identifier for identifying the first node; and receive second information identifying the outside-scope second identifier for mapping the outside-scope second identifier to a particular network interface of the first node.

27. The method of claim 24, and comprising: performing at least one additional act that is configured to cause the first node to operate such that: the first identifier and the outside-scope second identifier are included in an Internet Protocol version six (IPv6) header of the IP packet, the IPv6 header including an IPv6 destination field, where the first identifier is contained in the IPv6 destination field at the receipt of the IP packet by the first node, and the outside-scope second identifier is contained in the IPv6 destination field at the forwarding of the IP packet by the first node.

28. The method of claim 24, and comprising: performing at least one additional act that is configured to cause the first node to operate such that: path information including the first identifier and the outside-scope second identifier is predetermined by multiple topology nodes.

29. The method of claim 24, and comprising: performing at least one additional act that is configured to cause the first node to operate such that: path information including the first identifier and the outside-scope second identifier is predetermined by another node other than the first node.

30. The method of claim 24, and comprising: performing at least one additional act that is configured to cause the first node to operate such that: a network path is specified using a first number of identifiers that is fewer than a second number of identifiers required to specify the network path deterministically.

31. The method of claim 30, and comprising: performing at least one additional act that is configured to cause the first node to operate such that: the outgoing network interface is selected for forwarding the data, without control signaling with any exterior system for the selection in response to the receipt of the IP packet.

32. The method of claim 31, and comprising: performing at least one additional act that is configured to cause the first node to operate such that: the data is capable of being forwarded by the first node along different ones of the plurality of path segments.

33. The method of claim 31, and comprising: performing at least one additional act that is configured to cause the first node to operate such that: the data is capable of being forwarded by the first node along different ones of the plurality of path segments based on a state of the network at a time when the IP packet is received.

34. The method of claim 32, and comprising: performing at least one additional act that is configured to cause the first node to operate such that: a current state of the network is not maintained by the first node.

35. The method of claim 30, and comprising: performing at least one additional act that is configured to cause the first node to operate such that at least one of:

the selecting is based on a routing table built based on a specified metric;

the selecting is directly based on a specified metric;

the selecting is indirectly based on a specified metric;

the data is forwarded in another IP packet that is the same as the received IP packet;

the data is forwarded in another IP packet that is different from the received IP packet;

for the at least one path segment, the at least one other node includes the second node;

the at least one path segment includes the at least one multi-hop path segment;

the at least one path segment does not include the at least one multi-hop path segment;

the outgoing network interface is selected, based on at least two of the policy, the routing table, or the metric;

the outgoing network interface is selected, based on at least all of the policy, the routing table, and the metric;

the outgoing network interface is selected, based on the policy;

the outgoing network interface is selected, based on the routing table;

the outgoing network interface is selected, based on the metric;

the extension header includes an extension of a header of the IP packet;

the extension header includes an extension of a header of the IP packet, where the extension is appended to the header;

the extension header includes an extension of a header of the IP packet, where the extension is integral to the header;

the extension header includes an extension of a header of the IP packet, where the extension is an integrated portion of the header;

the extension header includes a header of the IP packet, where the header is extended;

the extension header includes a header of the IP packet, where the header is extended by being augmented;

the extension header includes one or more other headers;

the extension header includes one or more other headers, with each header including a subset of information;

the extension header includes one or more other extension headers;

the first path segment list is the only path segment list;

the first path segment list includes only the first identifier and the outside-scope second identifier;

the first path segment list includes the first identifier and the outside-scope second identifier, in addition to at least one other identifier;

the first identifier and the outside-scope second identifier are consecutively ordered in the first path segment list;
the first identifier and the outside-scope second identifier are adjacent in the first path segment list;
the first identifier and the outside-scope second identifier are not adjacent in the first path segment list;
the first identifier and the outside-scope second identifier each represent different path segments;
the first identifier and the outside-scope second identifier each represent separate path segments;
the first identifier and the outside-scope second identifier are associated with different path segments;
the first identifier and the outside-scope second identifier are associated with separate path segments;
the first path segment list includes multiple identifiers contiguously stored;
the first path segment list includes multiple identifiers non-contiguously stored;
the first path segment list includes multiple sequential identifiers;
the first path segment list includes multiple non-sequential identifiers;
the first path segment list includes multiple identifiers each with the same storage structure;
the first path segment list includes multiple identifiers each with a different storage structure;
the first path segment list includes multiple identifiers each of the same type;
the first path segment list includes multiple identifiers each of a different type;
the first path segment list includes multiple identifiers each configured to be processed similarly;
the first path segment list includes multiple identifiers each configured to be processed similarly;
the first path segment list includes multiple identifiers each configured to be processed the same;
the non-transitory computer-readable media is included as part of a system that further comprises the first node;
the non-transitory computer-readable media is included as part of the first node;
the at least one act and the at least one additional act are performed at a certain node other than the first node;
the at least one act and the at least one additional act are performed at a certain node other than the first node;
at least one of the at least one act or the at least one additional act includes a configuration;
at least one of the at least one act or the at least one additional act includes a configuration of instructions;
the at least one act causes the first node to perform the receipt, the selection, the modification, and the forwarding;
the at least one act causes the first node to perform at least one of the receipt, the selection, the modification, or the forwarding;
the at least one act causes at least one operation to be performed other than the receipt, the selection, the modification, and the forwarding;
the causing storage includes causing storage of at least portion of instructions on the non-transitory computer-readable media for being accessible to a user so that the user is capable of installing the at least portion of the instructions on other memory of the first node, for execution;
the causing storage includes causing storage of at least portion of instructions on the non-transitory computer-readable media, that is part of the first node;
the causing storage includes causing storage of at least portion of instructions on the non-transitory computer-readable media, that is part of the first node, so that the first node is provided to a user for use;
the causing storage includes installation;
the causing storage includes causing transfer of at least portion of instructions from persistent storage to volatile memory;
the non-transitory computer-readable media includes a register;
the non-transitory computer-readable media includes volatile memory;
the non-transitory computer-readable media includes persistent storage;
the phrases performing, at least one act, and all first node do not invoke 35 U.S.C. 112, sixth paragraph;
the method further comprises configuring the first node;
the method further comprises coupling the non-transitory computer-readable media to one or more processors;
the non-transitory computer-readable media includes a plurality of memory portions of a single memory;
the non-transitory computer-readable media includes a single memory;
the non-transitory computer-readable media includes a plurality of distributed media;
the non-transitory computer-readable media includes a plurality of distributed memories;
the method further comprises providing the first node;
the method further comprises providing the non-transitory computer-readable media;
the method further comprises providing one or more processors;
the non-transitory computer-readable media is part of the first node; or
the non-transitory computer-readable media is separate from first node memory of the first node.

36. The method of claim 24, and comprising: performing at least one additional act that is configured to cause the first node to operate such that: the first identifier is contained in a destination field at the receipt of the IP packet by the first node, and the outside-scope second identifier is contained in the destination field at the forwarding of the IP packet by the first node.

* * * * *